US005493634A

United States Patent [19]

Bonk et al.

[11] Patent Number: 5,493,634

[45] Date of Patent: Feb. 20, 1996

[54] APPARATUS AND METHOD FOR MULTI-STAGE/MULTI-PROCESS DECOMPOSING

[75] Inventors: Lawrence R. Bonk, Honeoye Falls; Thomas B. Zell, Victor; David A. Catapano, Rochester; Richard E. Bryant, Penfield; Peter M. Krist, Rochester; Ernest L. Legg, Fairport; Irene M. Allen, Pittsford; Paul A. Rulli, Webster; Steven J. Harrington, Holley; Lillian-Liu Hsu, Rochester, all of N.Y.

[73] Assignee: Xerox Corporation, Stamford, Conn.

[21] Appl. No.: 898,761

[22] Filed: Jun. 12, 1992

[51] Int. Cl.[6] .............. G06K 15/00

[52] U.S. Cl. .............. 395/101

[58] Field of Search .............. 395/110, 112, 395/115, 116, 102, 109, 275, 163, 101; 358/282

[56] References Cited

U.S. PATENT DOCUMENTS

| | | | |
|---|---|---|---|
| 4,944,614 | 7/1990 | Tanaka | 400/68 |
| 5,136,688 | 8/1992 | Morikawa et al. | 395/115 |
| 5,175,679 | 12/1992 | Allen et al. | 364/148 |

FOREIGN PATENT DOCUMENTS

| | | |
|---|---|---|
| 428370A3 | 5/1991 | European Pat. Off. . |
| 470782A3 | 2/1992 | European Pat. Off. . |
| 4013369 | 1/1992 | Japan . |
| 4096095 | 3/1992 | Japan . |

OTHER PUBLICATIONS

"Beyond Duplicating: DocuTech Production Publishing" Xerox DocuTech Publishing Series, Xerox Corp., Oct. 1990 610P20955. (Brochure).

"Xerox DocuTech Production Publisher", Xerox DocuTech Publishing Series, Xerox Corp., 10190, 610P20961 (Brochure).

*Primary Examiner*—Raymond J. Bayerl
*Assistant Examiner*—Gabriel Garcia
*Attorney, Agent, or Firm*—Gary B. Cohen; Thomas B. Zell

[57] ABSTRACT

A decomposing apparatus is provided for use in a printing machine of the type adapted to receive a first set of information written in a printer page description language and a second set of information written in a printer page description language. The decomposing apparatus preferably includes: an arrangement for parsing the first set of information into a first set of image related components during a first time interval and the second set of information into a second set of image related components during a second time interval; and, an arrangement for performing image related operations on selected components of the first set of image related components, the image related operations being performed on the first set of image related components during the second interval so that the image related operations can be performed on the first set of image related components substantially concurrently with the second set of information being parsed.

19 Claims, 14 Drawing Sheets

CAPTURE OF NETWORK JOBS

APPARATUS AND METHOD FOR MULTI-STAGE/MULTI-PROCESS DECOMPOSING

Priority is claimed, to the extent to which it is available, to copending U.S. patent application Ser. No. 07/591,325 entitled "System State Controller for Electronic Image Processing Systems," filed Sep. 28, 1990 and to copending U.S. patent application Ser. No. 07/591,324 entitled "Control for Electronic Image Processing Systems," filed Sep. 28, 1990, both of which have at least one Applicant, namely Irene Allen, who is an applicants in the present application.

BACKGROUND OF THE INVENTION

The present invention relates generally to a technique for printing a job written in a printer page description language and more specifically to a multi-process/multi-stage decomposer adapted to decompose higher level primitives into imaging primitives for printing.

Personal computers have become commonplace on the desks of most office workers. Typically, much of the work product of such computers is intended to be transformed into hardcopy via a printer using digital imaging technology. A typical printer configuration for this purpose comprises a dedicated printer coupled to the personal computer ("PC"). However, printers used for this purpose are typically small laser printers which have limited functions and features such as a limited tray capacity which restricts the number and types of copy sheets that can be used to make prints on, or which do not have a finishing capability, etc.

On the other hand, larger high speed laser printers normally have a great deal of finishing and copy sheet capability which would allow the PC user to have, for example, custom printing and finishing of his work product, an option which for many PC users would be highly desirable. In practice, the PCs can be used advantageously with a network printing system of the type combining a number of client inputs, such as the PCs, or the like, and one or more printer outputs. In one example of such network printing systems, a client at one of the inputs sends electronic documents that comprise a job over a local area network (LAN) to one of the printers selected for printing of the job. In particular, LANs provide a means by which users running dedicated processors are able to share resources such as printers, file servers and scanners. Integration of shared resources has been a problem addressed by LAN managers. LAN managers have made different network protocols transparent to devices running different network protocols LANs also have a variety of print drivers emitting different page description languages (PDLs), which are directed to specific print devices.

A PDL, such as Interpress provided by Xerox® Corp. permits arithmetic computation, conditional execution, and procedure definition, in addition to special operations that construct a page image. Typically, a PDL supports imaging characters in a variety of fonts, faces, sizes and orientations, as well as line art, graphics and pictorial images. Because it is a language, the PDL describes a document in terms of software, the software being used to generate primitives that can be imaged onto a substrate with a marking engine. Further information regarding Interpress can be found in the following reference, the pertinent portions of which are incorporated herein by reference:

Harrington, S. J. and Buckley, R. R.
Interpress: The Source Book
Simon & Schuster, Inc.

New York, N.Y.
1988

While the use of a PDL to store and transmit an input document is desirable for several reasons, such use can complicate printing since much effort must be expended by the printer in converting the PDL of the input document into hardware imaging primitives that actually produce the print. In particular, an input format of an input document written in a PDL contains primitives that are at a "higher level" than the imaging primitives, so that the input document must be "taken apart" into its individual imaging components with a decomposing technique or the like. Preferably, a decomposer, with one or more processors and suitable software, is employed to implement the technique.

In operation, the decomposer executes the PDL to generate the imaging primitives. The types of operations required to perform this task include binding of the printer fonts to the requested fonts, any imaging processing on pictorial information, and/or converting line art/graphics to lower level imaging primitives. This process has historically taken much longer than the actual imaging, resulting in loss of throughput. It would therefore be desirable to provide a decomposer that minimizes the amount of time required to perform decomposing functions and, correspondingly, maximizes output.

SUMMARY OF THE INVENTION

In accordance with the present invention there is provided a decomposing apparatus for use in a printing machine of the type adapted to receive a first set of information written in a printer page description language and a second set of information written in a printer page description language. The decomposing apparatus preferably comprises: means for parsing the first set of information into a first set of image related components during a first time interval and the second set of information into a second set of image related components during a second time interval; and, means for performing image related operations on selected components of the first set of image related components, the image related operations being performed on the first set of image related components during the second interval so that the image related operations can be performed on the first set of image related components substantially concurrently with the second set of information being parsed.

These and other aspects of the invention will become apparent from the following description, the description being used to illustrate a preferred embodiment of the invention when read in conjunction with the accompanying drawings.

DESCRIPTION OF PREFERRED EMBODIMENTS

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
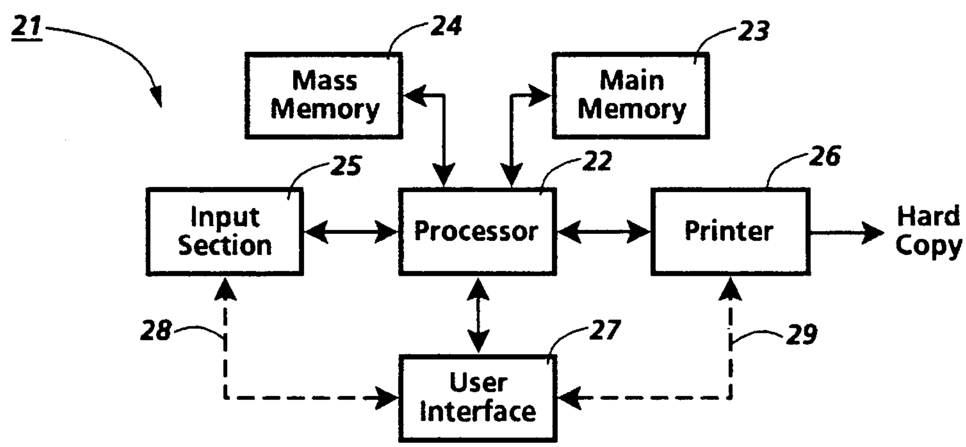
FIG. 1 is a schematic, block diagramatic view of an electronic printing machine in which the present invention can be carried out.

Turning now to the drawings, and at this point especially to FIG. 1, there is an electronic document processing system 21 to illustrate a typical environment for this invention. In keeping with standard practices, the document processing system 21 comprises a digital processor 22 having a main memory 23 and a mass memory 24, an input section 25 for providing a job written in a printer page description language (PDL), and a printer 26 for printing hardcopy renderings of selected image components obtained from the PDL. Furthermore, there is a user interface 27 for enabling a user to interact with the processor 22, the input section 25, and the printer 26.

As will be understood, the user interface 27 collectively represents the input devices through which the user enters image editing and manipulation instructions for the processor 22. Additionally, the interface 27 represents the output devices through which the user receives feedback with respect to the actions that are taken in response to the instructions that are entered by the user or otherwise, such as under program control. For example, the user interface 27 generally includes a keyboard or the like for entering use instructions, a monitor for giving the user a view of the process that is being performed by the processor 22, and a cursor controller for enabling the user to move a cursor for making selections from and/or for entering data into a process that is being displayed by the monitor (none of these conventional components is shown).

The illustrated document processing system 21 is centralized, so it has been simplified by assuming that all control instructions and all image editing and manipulation instructions are executed by the processor 22 under program control. In practice, however, the execution of these instructions may be handled by several different processors, some or all of which may have their own main memory and even their own mass memory. Likewise, either or both of the input section 25 and the printer 26 may have its own user interface, as indicated by the dashed lines 28 and 29, respectively. Indeed, it will be evident that the document processing system 21 could be reconfigured to have a distributed architecture to operate with a remote input section and/or a remote printer (not shown). Data could be transferred from and to such remote input section and printer terminals via dedicated communication links or switched communication networks (also not shown).

Figure 2:
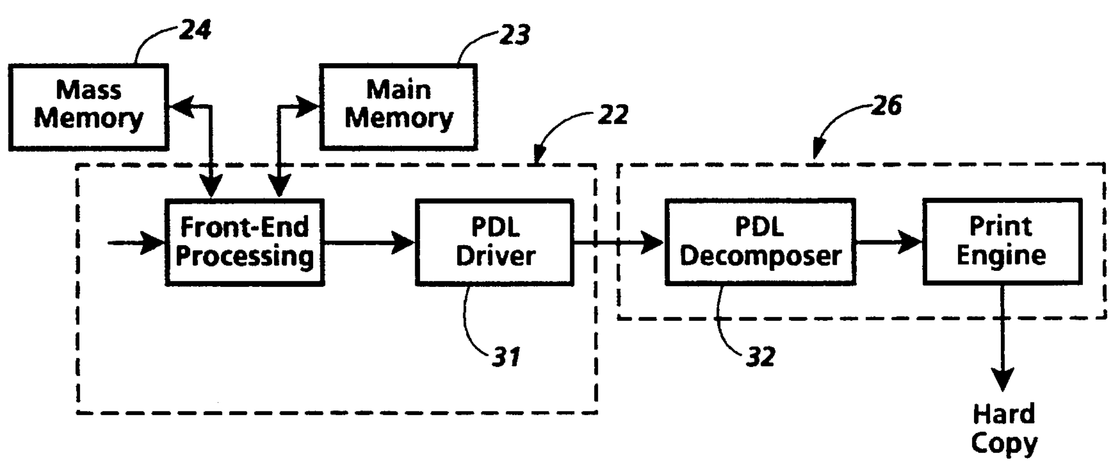
FIG. 2 a schematic, block diagramatic view of a processor/printer interface for the printing machine shown in FIG. 2.

As shown in FIG. 2, the processor 22 preferably includes a PDL driver 31 for transferring to the printer 26 PDL descriptions of the electronic document files that are selected for printing. Thus, the printer 26 is illustrated as having a PDL decomposer 32 for decomposing such PDL descriptions to produce corresponding bitmapped image file. It will be appreciated, particularly in view of the discussion below, that the decomposer 32 is capable of receiving PDL files from mass memory, such as disk, or from off the network "on the fly."

Figure 3A:
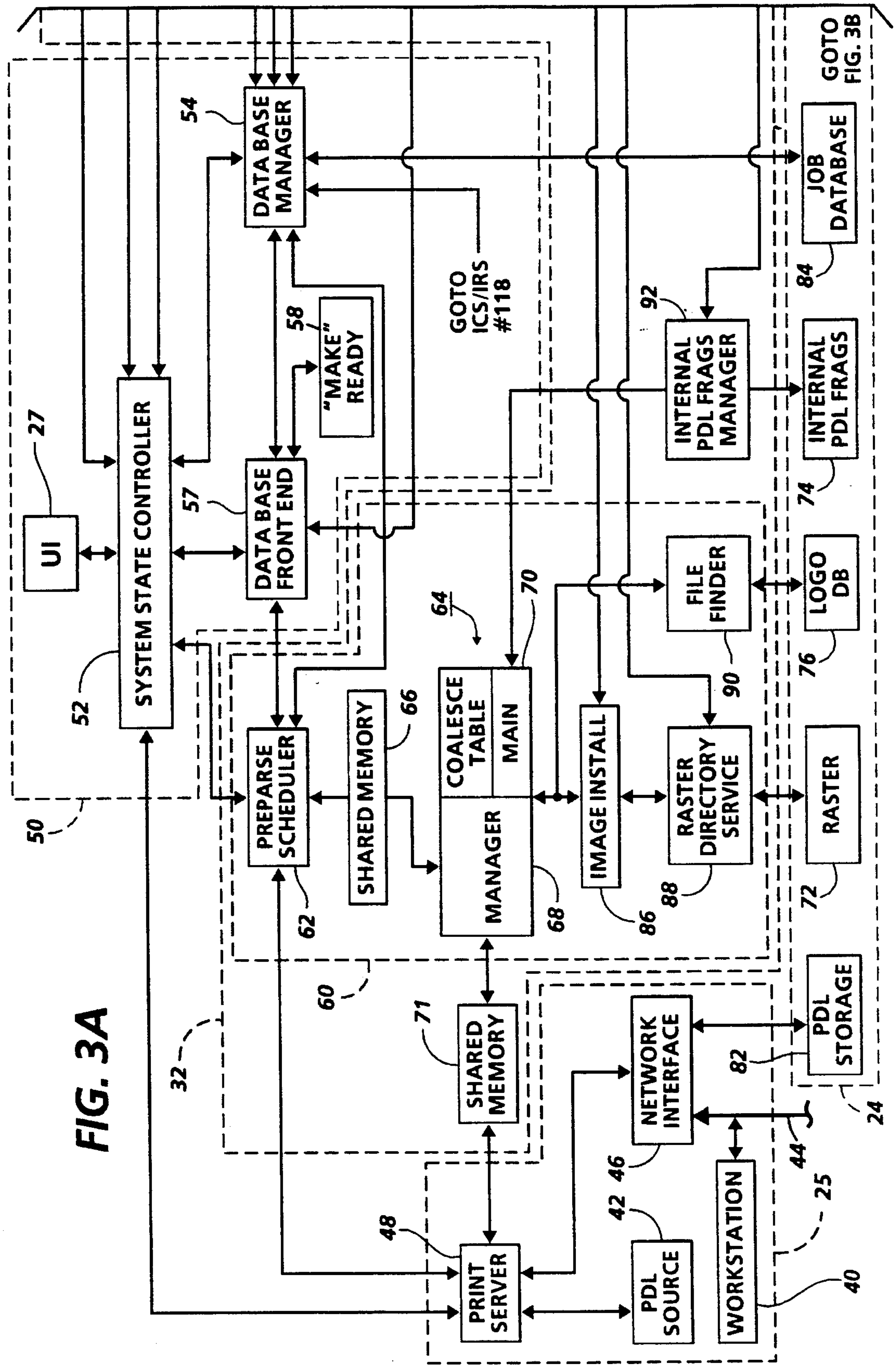
FIGS. 3A and 3B represent a schematic, block diagramatic view of an arrangement for decomposing a job written in a printer page description language.
Figure 3B:
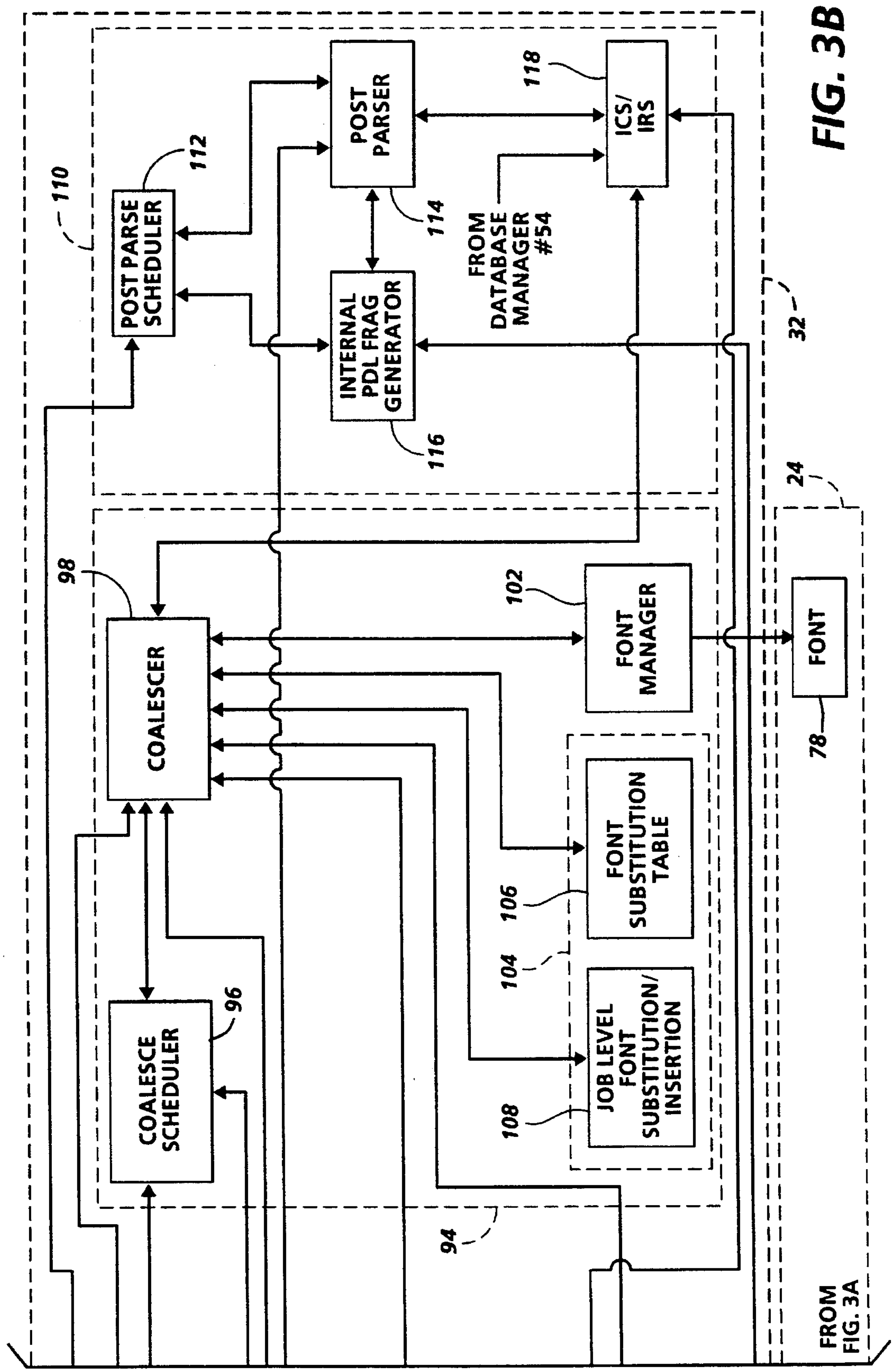

Referring to FIGS. 3A and 3B, an arrangement including the mass memory 24, the input section 25 and the decomposer 32 is shown. Referring specifically to FIG. 3A, the input section 25 preferably comprises up to two PDL emitters, such as a workstation 40, or any other suitable PDL source 42. In one Example the workstation 40 is Xerox® 6085 (the term "Xerox 6085" is trademark used by Xerox® Corp.) workstation coupled with a network 44, such as a network sold by Xerox® Corp. under the trademark of EtherNet™. The network is interfaced with the decomposer 32 by way of a suitable network interface 46, which could include one of many known interfaces such as TCPIP™, AppleTalk™ or Token Ring™. Both of the workstation 40 and the PDL source 42 are interfaced with the decomposer 32 by way of a print server 48, which print server 48 can be a suitable protocol corresponding with the specifications of the PDL Source 42 and/or the network interface 46. The print server 48 communicates with a system manager 50.

In the preferred embodiment, the system manager 50 comprises a system state controller (SSC) 52 of the type disclosed in U.S. Pat. No. 5,170,340 to Prokop et al., the pertinent portions of which are incorporated herein, the user interface (UI) 27, which, in one example, is of the type disclosed in U.S. Pat. No. 5,083,210, the pertinent portions of which are incorporated herein, a database manager 54 and a database front end processor 57. Additionally, the database manager 54 preferably comprises a database job queue 55 (FIG. 10) and a database coalescer table 56. The features of the present invention can be obtained through use of any suitable, commercially available database. Alternatively, one of ordinary skill in the art could, without undue experimentation, construct the database of the present invention by reference to one of several known texts, such as the following text:

Martin, J.
Computer Data-Base Organization
Prentice Hall, Inc.
Englewood Cliffs, N.J.
1975

The database front end processor 57, which serves to define the structure of the PDL job, and the sequence in which image related identifiers stored in the database are operated on, can be constructed by those skilled in the art in view of the type of database manager selected for use. As will appreciated from the discussion below, the database manager 54 is the conduit through which virtually all image related identifiers and all job identifiers ("handles") flow. Moreover, editing of postparsed information is achieved by use of a "make ready" process 58 which is coupled with the front end 57. The "make ready" process, which serves to interpret operator commands for performing bitmap processing, is used in the DocuTech™ electronic printer which is sold by Xerox® Corp.

Referring still to FIG. 3A, the print server 48, the SSC 52 and the data base front end processor 57 each communicate with a parsing section 60 by way of a preparse scheduler 62. In the preferred embodiment, the steps of the parsing section 60 are performed on a MESA™ processor of the type manufactured by Xerox® Corp. The preparse scheduler 62 communicates with a preparser 64 by way of a block of shared memory 66. In the preferred embodiment of the present invention, the preparser consists of a manager section 68 and a main section 70. In one example, the manager section comprises a processor of the type referred to immediately above, and the main section comprises a similar processor and a math coprocessor which, for the most part, is similar to commercially available math coprocessors. Additionally, the manager 68 communicates with the print server 48 by way of a block of memory 71, and the main section 70 is configured to store a coalesce table, the significance of which will be discussed in further detail below.

The preparser 64, which serves to break up PDL into image related components, is capable of storing those components in mass memory 24, which, in the preferred embodiment is a disk storage device, such as the one used on the DocuTech™ electronic printer manufactured by Xerox® Corp. Preferably, the disk storage device is adapted to receive rasters in raster storage section 72 and internal PDL fragments ("internal PDL frags") in internal PDL frags. section 74. It should be recognized that internal PDL fragments are higher level primitives to be imaged on a substrate. In one example, an internal PDL fragment serves to transform coordinate systems inputted to the decomposer for printing. Employment of other storage sections in the mass memory 24 to receive other image related components is contemplated by the present invention.

In practice, the mass memory 24 is configured to not only receive and store the image related components developed by the preparser 64, but to store, on a long term basis, a relatively large variety of logos (in logo DB storage section 76) and fonts (in font section 78). Employment of other storage sections in the mass memory 24 to store other image related components, on a long term basis, is contemplated by the present invention. Additionally, the disk storage device preferably includes section 82 for storing PDL files to be processed and a section 84 for storing all information communicated to the database manager 54. In one example, the job database 84 is adapted to contain a structure for and image related components of a job written in a PDL. It will be appreciated by those skilled in the art that a suitable memory arrangement could be used in place of the job database without affecting the underlying concept of the present invention.

In practice, the preparser 64 is interfaced to the raster section 72 by way of an image install process 86 and a raster directory service (DS) 88, to the logo DB section by way of a file finder process 90 and to the Internal PDL Frags section by Internal PDL Frags Manager 92. In the illustrated embodiment of FIG. 3A, the raster DS 88 is adapted to assign an image identifier to each raster transmitted thereto, and pass each of those identifiers to the preparser 64. Similarly, the internal PDL frags manager 92 is adapted to assign an image identifier to each internal PDL fragment transmitted thereto, and pass each of those identifiers to the preparser 64. On the other hand, the file finder 90 assigns an identifier to calls for logos received at the preparser 64 from the print server 48, and permits the logos to be fetched by the preparser 64 when they are available in the logo DB section 76. When the called for logo is not available in the logo DB section, the file finder 90 is capable of issuing an appropriate fault message for display at the UI 27 or for printing with a hardcopy print.

Referring still to FIG. 3B, the results of the preparsing process are eventually passed on to the coalesce section 94. The coalesce section 94 comprises a coalesce scheduler 96 that communicates with a coalescer 98. The coalescer scheduler 96 functions under the influence of the SSC 52 and the database manager 54 to manage the various functions of the coalescer 98. The coalescer 98 communicates with the fonts storage section 78 by way of a font manager 102. In the preferred embodiment, the fonts storage section 78 comprises a font database and the font manager 102 is capable of interpreting the data structures therein. In particular, the font manager 102 is adapted to scan the data structures of the font database to check whether a font requested by the coalescer 98 is present in the font database. The coalescer 98 also communicates with a font substitution/insertion section 104, the section 104 comprising a font substitution table arrangement 106 of the type described in U.S. Pat. No. 5,167,013 to Hube et al., the pertinent portions of which are incorporated herein by reference, and a job level substitution/insertion process 108. In one example, the insertion aspect of the substitution/insertion process 108 is directed toward a tape source for manually loading fonts of the type used in the DocuTech™ electronic printer sold by Xerox® Corp. In another example, the substitution aspect of the substitution/insertion process 108 is any suitable arrangement in which a user of the decomposer 32 can facilitate the manual substitution of a font available in the font database of the fonts storage section 78 for an unavailable font called for in a job provided from the input section 25.

Image related components of each job are ultimately processed into printable form, or more specifically, to "lower level primitives," by use of a postparsing section 110 which includes a postparse scheduler 112. The postparse scheduler 112 functions under the influence of the SSC 52 and the database manager 54 to manage the various functions of a postparser 114. The postparse scheduler 112 also communicates with an internal PDL frags generator 116, the generator 116 being capable of accessing the internal PDL frags storage section 74, by way of the internal PDL frags manager 92, for generating selected internal PDL fragments stored in the internal PDL frags storage section 74. In turn, the generator 116 communicates with the postparser 114 for passing the selected generated fragments thereto. Each of the coalescer 98 and the postparser 114 communicate with an image processing arrangement 118, the arrangement 118 including an image conversion service (ICS) and an image resampling service (IRS). As should be recognized, the ICS and the IRS provide a host of image processing services for use with the various image components from each processed jobs, such services including image rotation, color processing, halftoning, image resolution (e.g. scaling) and the like. In the preferred embodiment, the ICS/IRS communicates with the image install 86 to perform image processes on selected rasters in the raster storage section 72. The various components of the postparsing arrangement, including the ICS/IRS are commercially available on the DocuTech™ electronic printer sold by Xerox® Corp.

Figure 4:
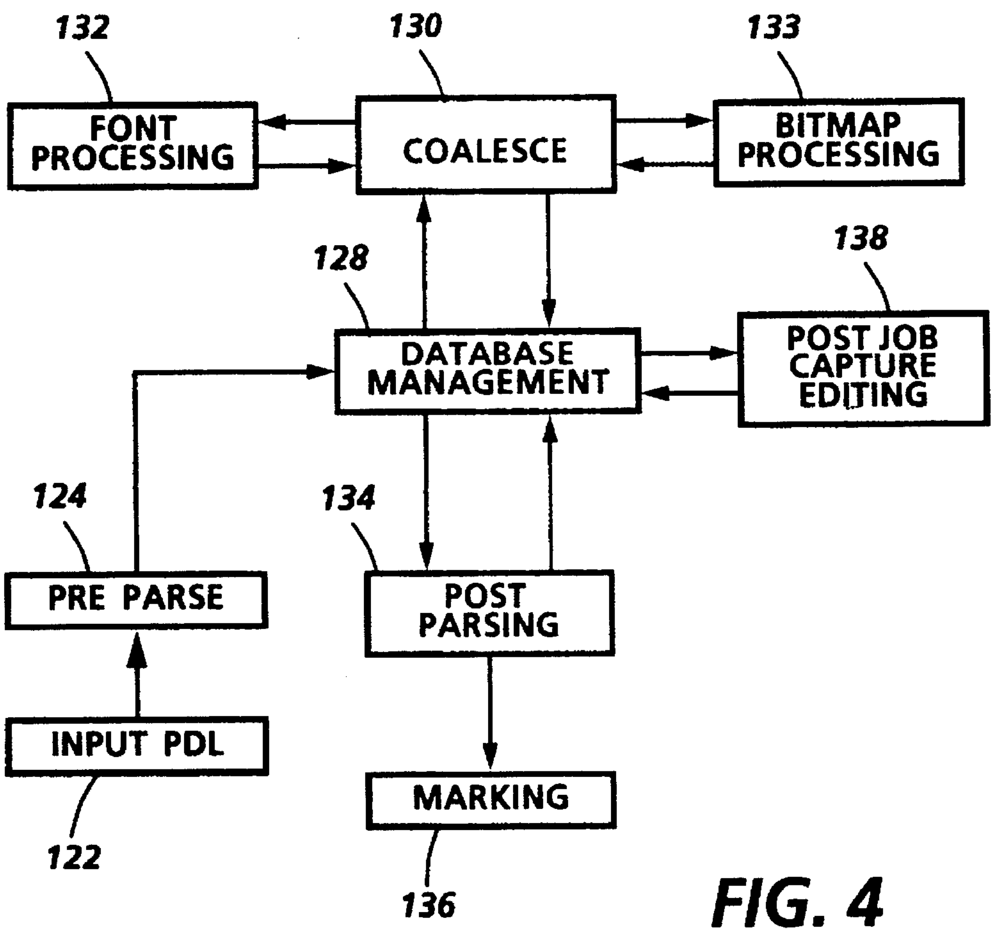
FIG. 4 is a flow diagram providing an overview for the function of the arrangement in FIGS. 3A and 3B.

Referring to FIG. 4, an overview of the operation of the illustrated system of FIG. 3 is shown. To initiate decomposition, a job is communicated from the input section 25 to the decomposer 32 (step 122). After appropriate coordination has occurred, information is passed to the preparse section 64 (step 124), the information is parsed into image related components and, per step 128, identifiers corresponding to the components are stored in the job database 84 by the database manager 54. Some time after a first page of the job is parsed, the identifiers are passed from the database to the coalesce section 94 (step 130) for font processing (step 132) and bitmap processing (step 133). Coalesced information is then postparsed (step 134) to form a bandlist, and the bandlist is marked at step 136. In the preferred embodiment, coalesced information can be edited (step 138), as described below.

Figure 5:
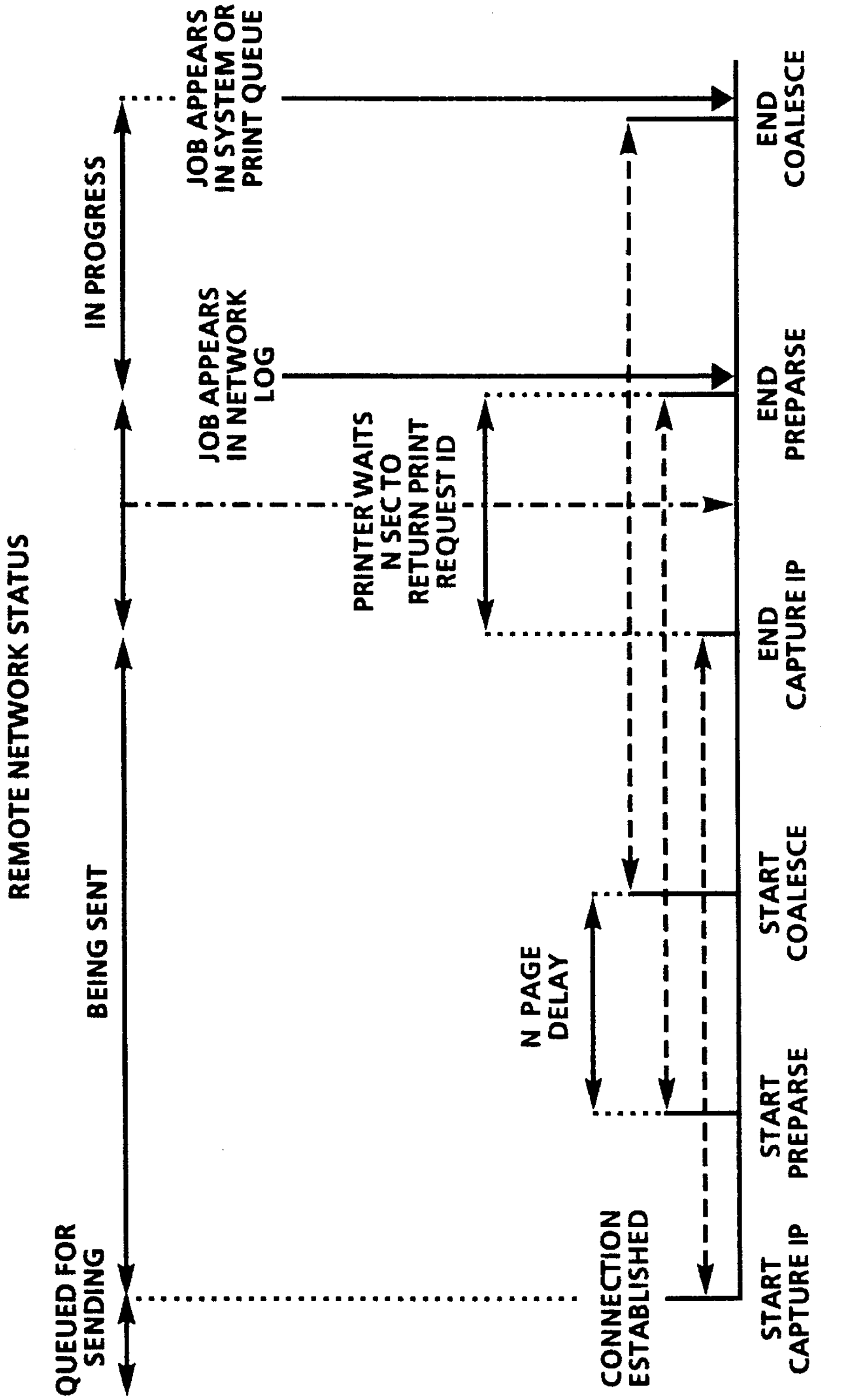
FIG. 5 is a graphic representation illustrating certain functional aspects of the present arrangement.
Figure 10:
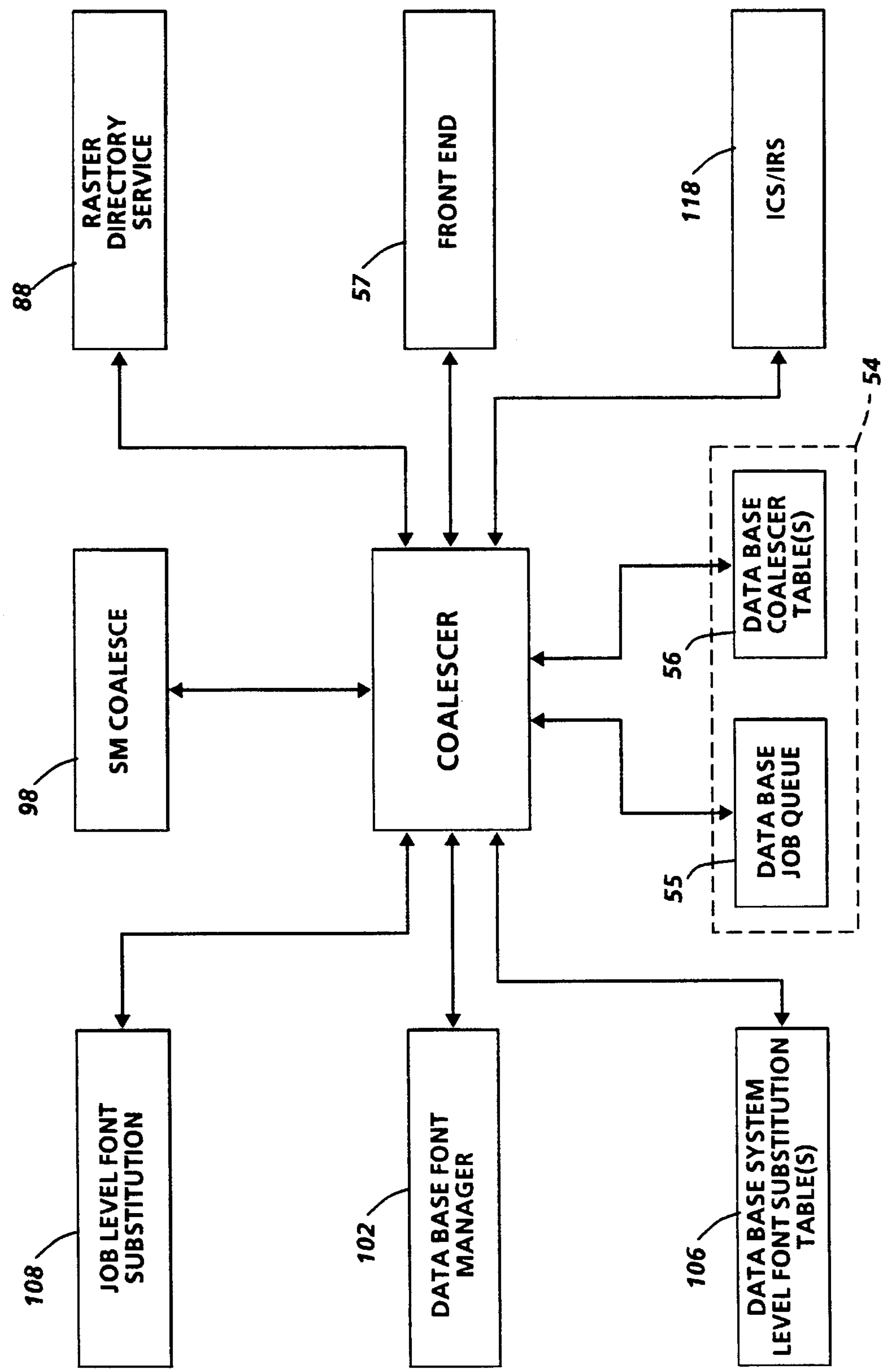
FIG. 10 is a schematic, block diagramatic view of a section of a coalescing section in the decomposing arrangement of FIGS. 3A and 3B.

Referring to FIG. 5, the multi-process capability of the decomposer 32, for even just one job, can be readily appreciated. As illustrated by FIG. 10, the decomposer 32 can preparse a job concurrently with it being captured from the network. After N page(s) of preparsed information has been passed along to the database, the decomposer can start coalescing concurrently with capturing and preparsing. As further illustrated by FIG. 5, the job can be decomposed "on-the-fly" with respect to the network.

A more detailed view of the present invention can be obtained by reference to Appendices A–H, including significant portions of code employed to implement the decomposing technique of the present invention. The code is written in MESA™ language, the details of which are discussed in the commercially available Mesa™ Language Manual (Copyright of Xerox® Corp. 1985), the pertinent portions of which are incorporated herein by reference.

Referring briefly to the Appendices, definitions for the code begin on p. 1, while discussions regarding job capture, parsing and coalescing begin on pp. 297, 360 and 1005, respectively. Further discussion regarding processing of internal PDL fragments begins on pp. 980 and 1005. Some general comments regarding the code, and other specific comments regarding interfaces used in the disclosed code are provided below:

Open or portable systems are achieved if the systems are not bounded by any single utility such as an operating system. Definition files or interfaces provide a level of data abstraction. For example, given a set of interfaces defining required utilities for a decomposer to function in a system, the utilities can be implemented independent of and transparent to the decomposer. An interface between a client and a service is a functional definition between modules. Most importantly an interface is not an executable set of instructions. Alternatively, an interface is defined as an agreed upon protocol between client and service.

More specifically, all decomposer source code presented is accompanied with external interfaces that provide functional specifications for required utilities not included in the Appendix, such as database management, network management, system management, image management and memory management. External interfaces to non-decomposer functional specifications are listed in the Appendix A. Sections B through H of the Appendix list decomposer source code as well as their internal interfaces for each respective module. Internal interfaces enable communication between elements inside individual modules as opposed to external modules.

Figure 6A:
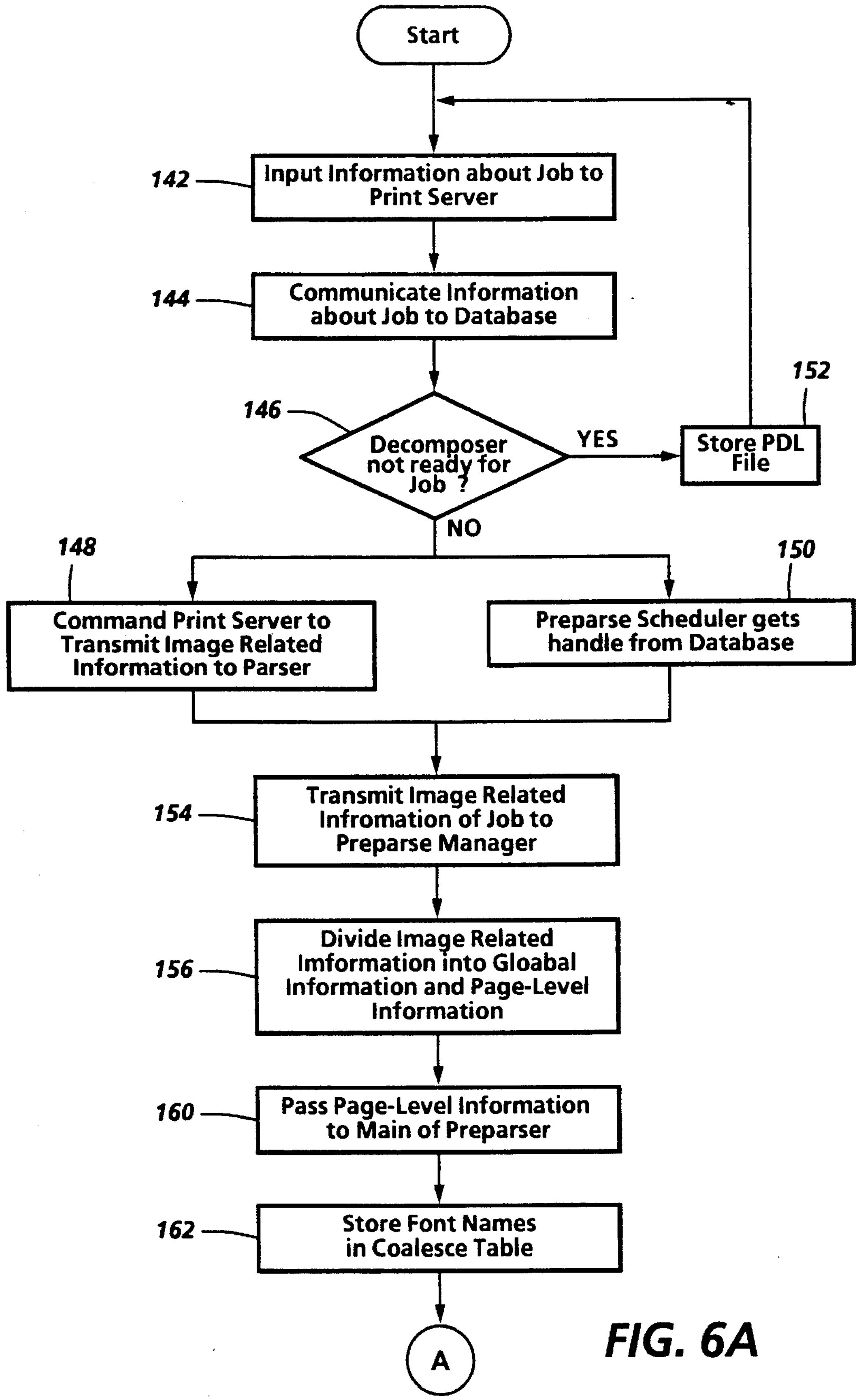
FIGS. 6A and 6B represent a flow diagram depicting the operation of parsing in the decomposing arrangement.
Figure 6B:
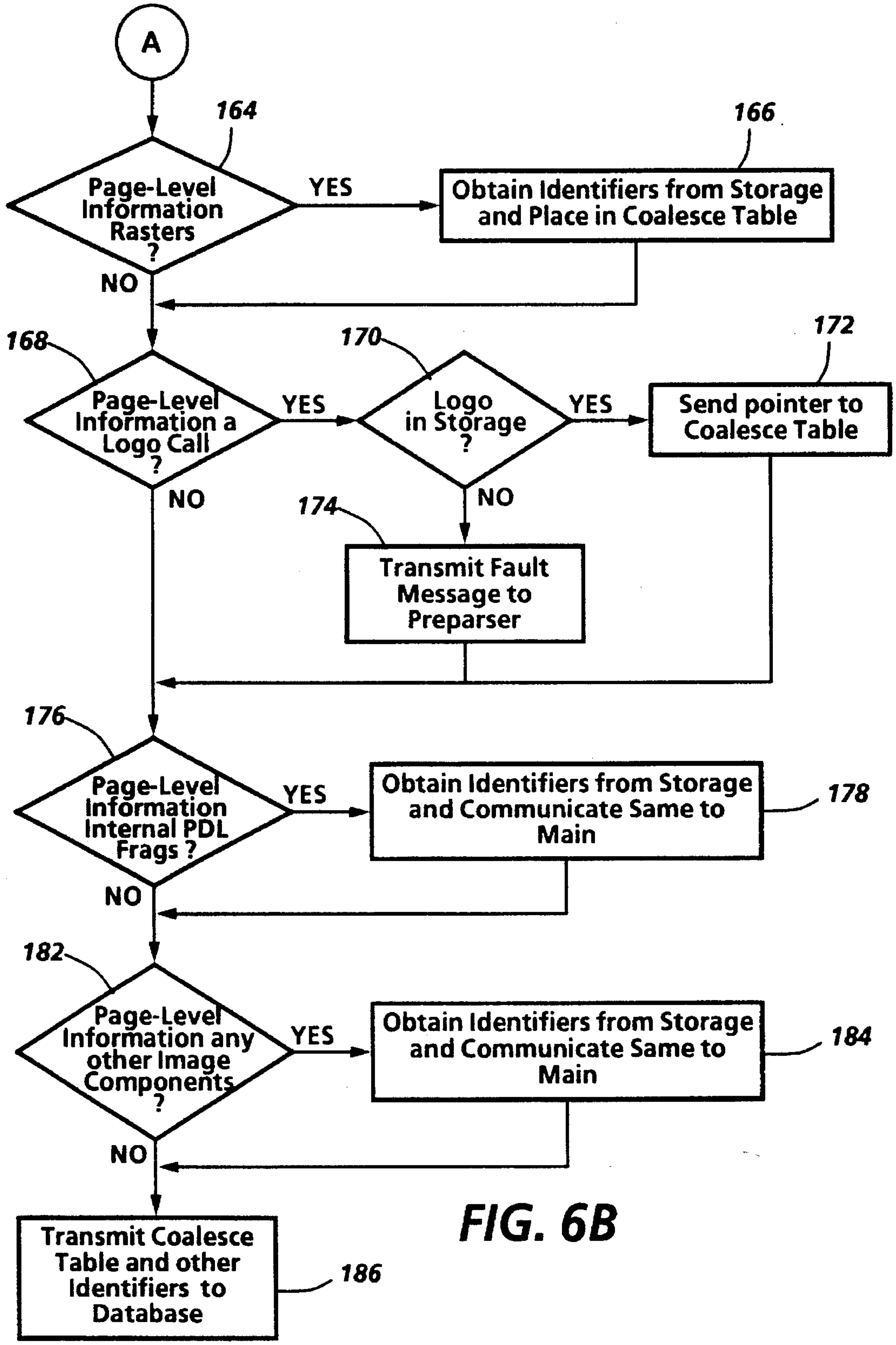
Figure 7:
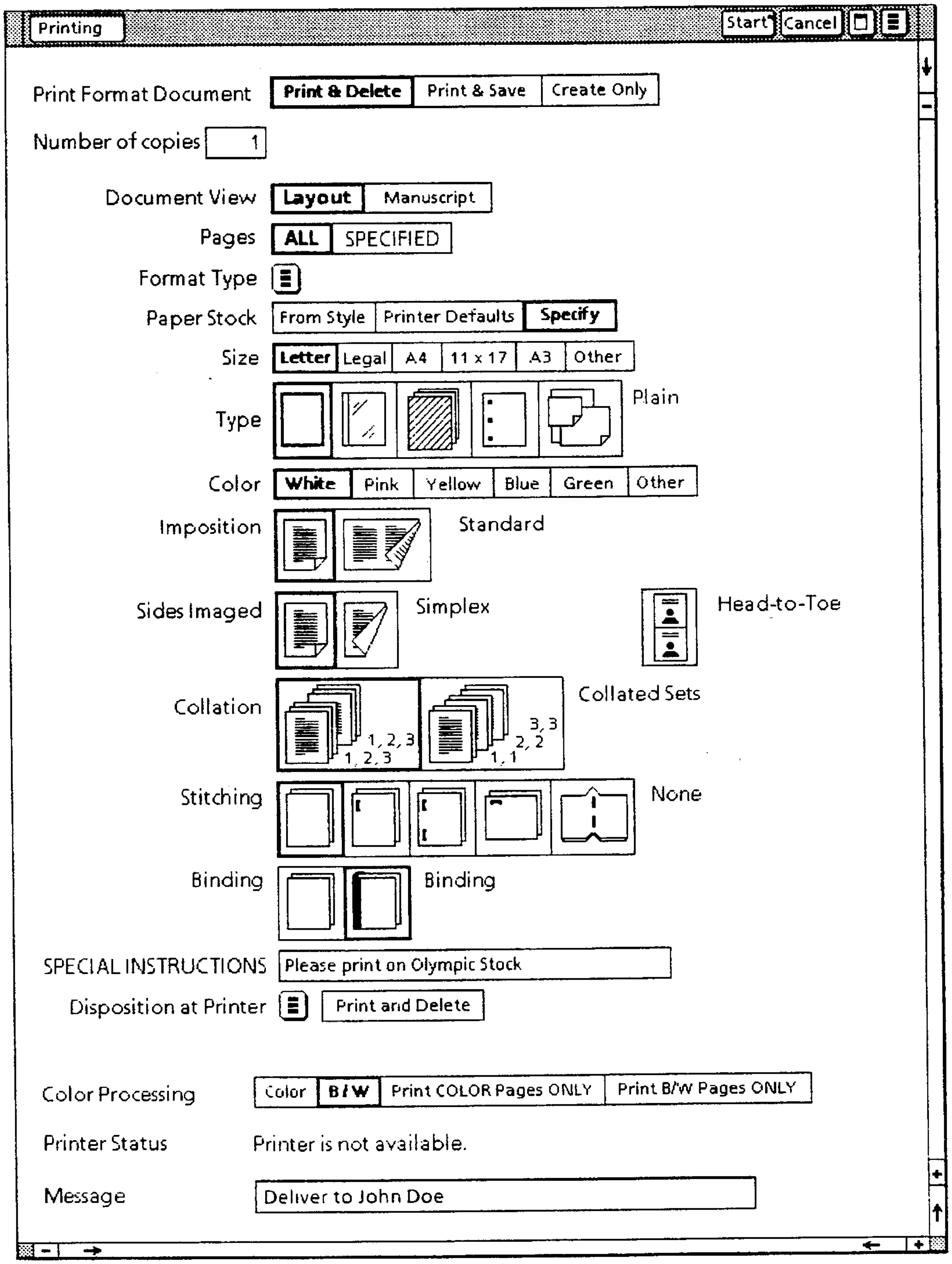
FIG. 7 is a schematic view of a screen displayed on a user interface, the screen comprising a job ticket for programming various instruction to be performed in conjunction with the job.
Figure 8:
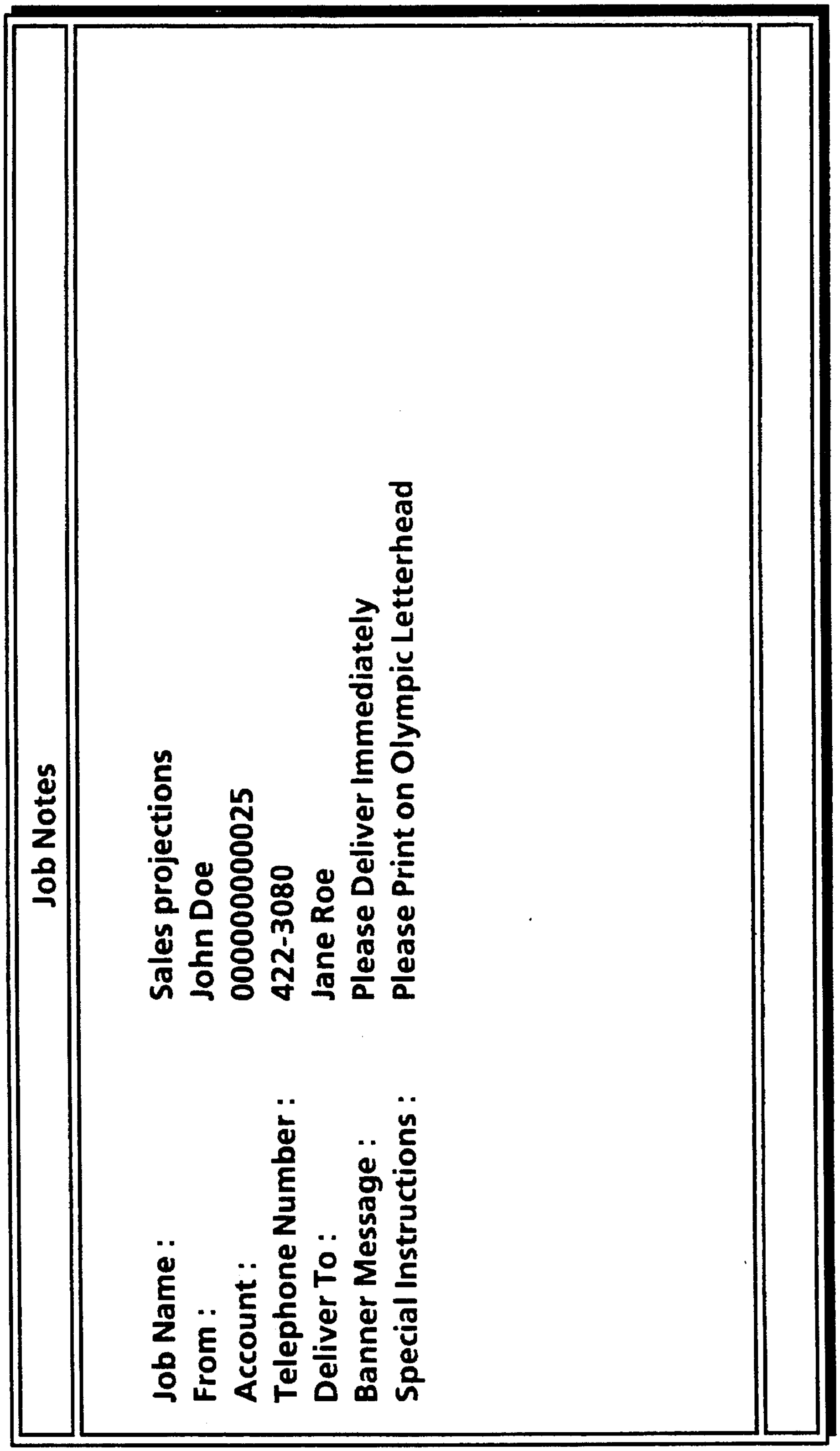
FIG. 8 is a schematic view of a supplemental job ticket capable of being used with the job ticket of FIG. 7.

Referring to FIGS. 6A–6B, the inputting and parsing of the PDL file(s) will be discussed in further detail. Referring specifically to FIG. 6A, at step 142, a job file written in a particular PDL, such as Interpress used by Xerox® Corp., is provided from either the workstation 40 or the PDL source 42. For those situations in which the job is developed on the workstation 40, a job ticket, of the type shown in FIG. 7, may be employed. As illustrated in FIG. 7, the job ticket provides various choices with respect to finishing. In programming the job, it may also be desirable to transmit information to the printer 26 regarding billing and accounting. This type of information can be programmed in a supplementary ticket of the type shown in FIG. 8. It should be recognized that much of the information transmitted to the decomposer 32, in the form of the tickets of FIGS. 7 and 8, is included in the form of global information, versus page level information. Additionally, while generating his/her program, the programmer may include calls to rasters, logos and other like bitmaps that he/she knows is on the machine. Accordingly, as will become clear from the discussion below, that call can be used as an identifier to pull up one or more image related components, such as a logo, for eventual printing at the printer 26.

Upon inputting the PDL job to the print server 48, basic information regarding, for example, the structure of the job and the order in which the job should be processed, is transmitted to the database manager 54 (step 144) by way of the preparse scheduler 62 and the database front end processor 57. The database manager 54 indicates to the SSC 52 that it has a Job, and in due course, provided that the decomposer is ready (see step 146), the SSC 52 commands the print server 48 to begin transmitting blocks of the PDL file to the manager section 68 across shared memory block 71 (step 148) and causes the preparse scheduler 62 to obtain a job identifier ("handle") from the database manager 54 (step 150). The handle represents the information that the preparse scheduler 62 will need to pass the image related identifiers resulting from the parsing process on to the database manager 54. Alternatively, as illustrated by steps 146 and 152, if a job is ready to be inputted concurrent with a job being processed, the job that is ready to be inputted can be stored for subsequent processing As the PDL is transmitted to the manager section 68 (step 154), it is, per step 156, broken down into global information, such as a header and a preamble, and page level information. As mentioned above, such global information can include billing and accounting information. Additionally, the manager 68 finds the beginning of each page within the job file ("master") for setting up the image related components ("data structures") to be received by the main section 70. Essentially, the manager functions as a syntactical analyzer, insuring that the syntax of the encoded PDL master is correct. The manager preferably performs some pre-work for the main 70 and possesses limited interpretative capabilities.

At step 160, page-level information is passed from the manager 68 to the main 70 at which informations, or, more specifically, data structures are created. The main looks into a linked list of set up pages and sequentially decomposes them. The manager and the main can work on separate pages or the main can work ahead of the manager within a page. Once the manager has created a data structure for a page, the main executes data structures within the page for storage in the mass memory 24. Per step 162, the main 70 inserts any font names that it gleans from pages in a coalesce table stored in the main.

Referring to FIG. 6B, once the page-level data structures are available, identifiers therefore are obtained. If rasters or bitmaps are found among the data structures (step 164), they are communicated to the raster storage section 72 by way of the image install 86 and the raster DS 88. Per step 166, the rasters are assigned identifiers by the raster directory service, and the identifiers are passed to the main 70 for placement in the coalesce table. If logo calls, i.e. calls for a merge item, are found among the data structures (step 168), the file finder 90 checks to see if the logos are in the logo DB section 76 (step 170), For those logos in the logo DB, corresponding pointers for the available logos are communicated to the main (step 172) for placement in the coalesce table. For those logos not in the logo DB, a fault message is, per step 174, returned to the main for eventual display or printing into hardcopy. Per steps 176 and 178, internal PDL fragments are created and communicated to the internal PDL frags storage section 74 by way of the internal PDL frags manager 92. Per step 178, the internal PDL fragments are assigned identifiers or "tokens" by the internal PDL frags manager 92, and the identifiers are passed to the main 70. As shown by steps 182 and 184 any other data structures flowing from the main 70 would be handled in a manner similar to that shown for rasters or internal PDL fragments. After all of the identifiers are provided to the main 70, a signal is sent to the preparse scheduler 62, and the identifiers, per 186, are communicated to the database manager 54.

Figure 9:
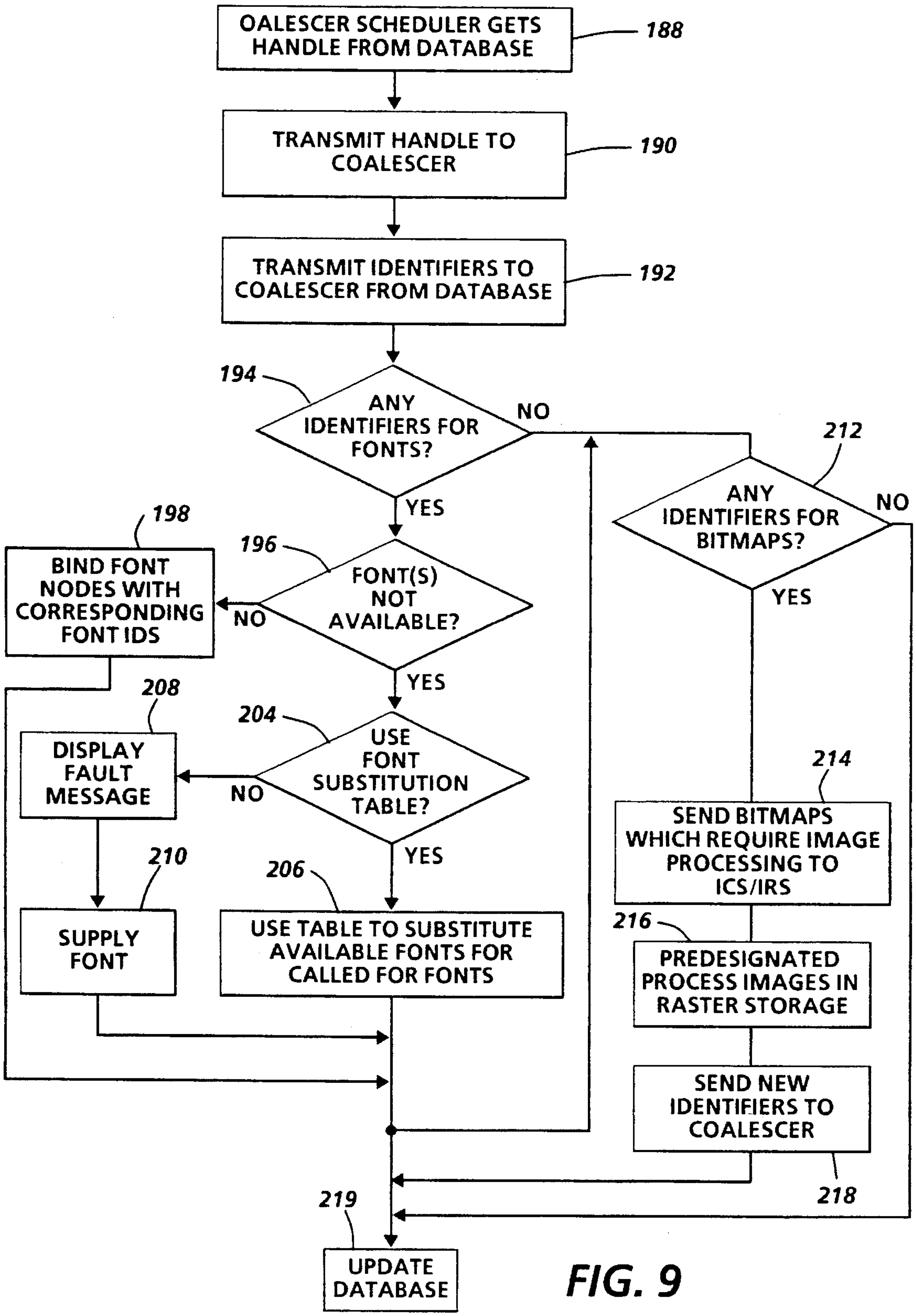
FIG. 9 is a flow diagram depicting the operation of coalescing in the decomposing arrangement.

Referring conjunctively to FIGS. 3, 9 and 10, further discussion with respect to coalescing, i.e. performing font processing and/or bitmap processing on certain stored data structures, is provided. Referring specifically to FIG. 9, at step 188, the coalescer scheduler 96 gets a handle, i.e. job ID, from the database manager 54, and transmits the handle to the coalescer 98 (step 190). The coalescer, in turn, obtains the appropriate coalesce table from the database (step 192). For each font name (see step 194), the availability of its corresponding font in the font section 78 is determined, via step 196, through use of the font manager 102. For each font name that is available in the fonts storage section 78, the font name is bound with a Font ID from the font manager 102 (step 198) , the font ID pointing to an available font in the fonts storage section.

For each font that is not available in the fonts section 78, one of two options is used (see step 204). The options are prioritized by the system operator and need not be prioritized in any particular order. In the first option a font substitution table, of the type disclosed in the U.S. Pat. No. 5,167,013 to Hube et al., is used, per step 206 to provide substitute fonts for respective, unavailable fonts. That is, through use of the font substitution table, each font name in the coalescer table which calls for an unavailable font is mapped against an available font and a suitable font ID is obtained, by way of the font manager 102 to bind each font name corresponding to an unavailable font with a font ID corresponding to an available, substitute font. In the second option, an error message is displayed at the UI 27 (208), by appropriately feeding fault information back through the coalesce scheduler 96 and the SSC 52. Subsequently, at step 210, a substitute font is supplied by a supplementary source, such as a font library stored on stream tape, the stream tape being adapted for use on a networked version of the DocuTech™ electronic printer sold by Xerox® Corp. As will be appreciated, when circumstances permit, called for, unavailable fonts could be made available by loading them into the mass memory 24.

Each identifier representing a bitmap or raster requiring image processing (see step 212), is communicated to the ICS/IRS 118 (step 214) by way of the front end 57 (FIGS. 3 and 10), the database manager 54, the postparse scheduler 112 and the postparser 114 so that a predesignated operations can be performed on predesignated bitmaps. The ICS/IRS cooperatively functions with the image install 86 to achieve the predesignated image processing operations on the predesignated rasters in the raster storage section 72 (step 216) and return new raster identifiers to the coalescer 98. Referring specifically to FIG. 10, upon receiving the new raster identifiers and/or binding the font names with respective font IDs, the database job queue 55 is locked and the database coalesce table 56 is updated (step 219) with the new raster identifiers and the appropriate font information, such as the mappings of the font names with their corresponding font IDs.

Figure 11:
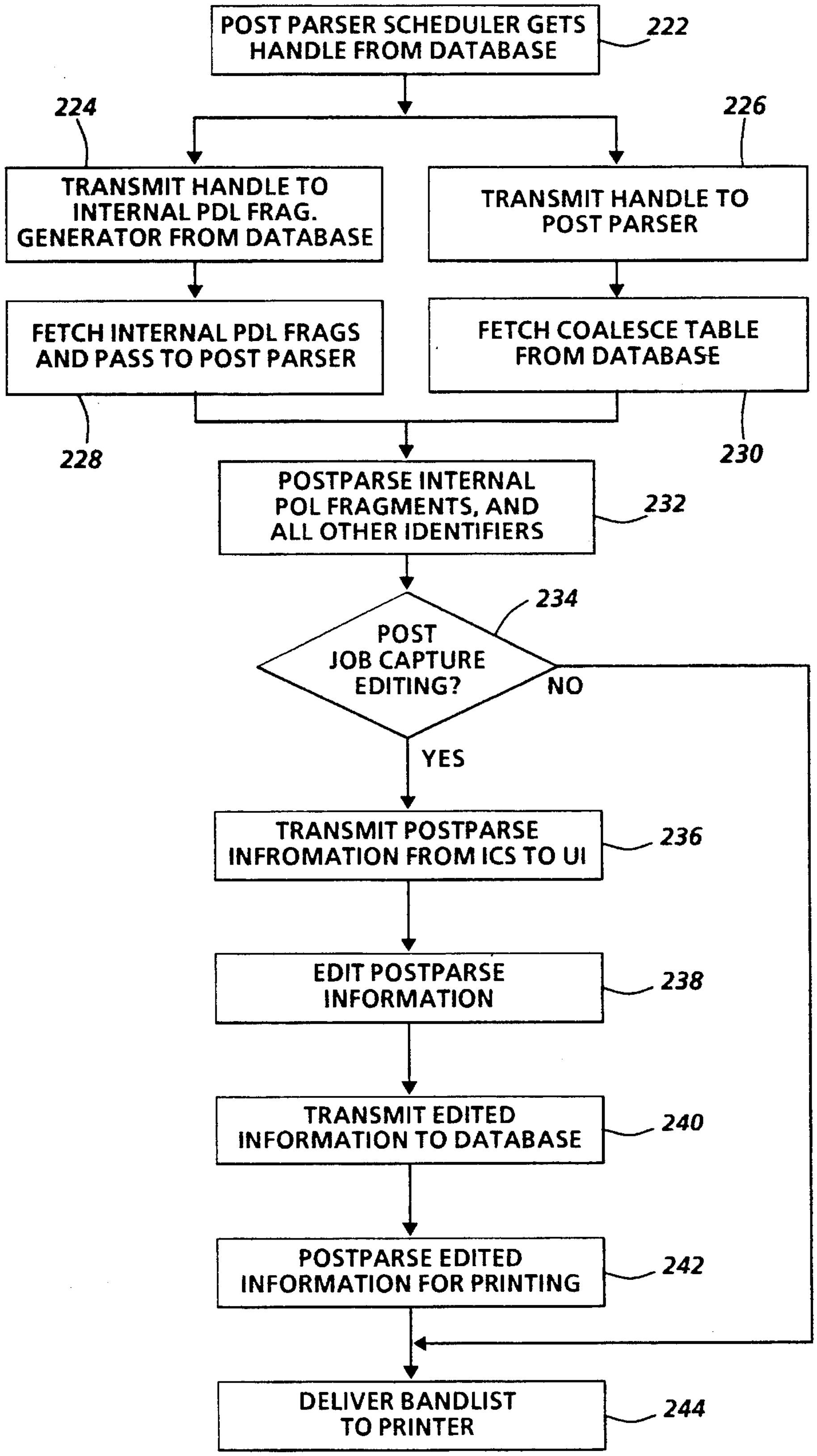
FIG. 11 is a flow diagram depicting the operation of postparsing in the decomposing arrangement.

Referring to FIG. 11, the operation of the postparsing section 110 is explained in further detail. It should be recognized that the flow diagram of FIG. 11 also illustrates a post job capture editing routine, the significance of which will follow from the discussion below. At step 222, the postparser scheduler 112 gets a handle by way of the database manager 54 and passes it to both the internal PDL frags generator 116 (step 224) and the postparser 114 (step 226). In turn, the internal PDL frags generator 116 fetches the appropriate internal PDL fragments from the internal PDL frags storage section 74, via the Internal PDL frags manager 92 (step 228), and the postparser 114 fetches the appropriate raster identifiers and the bound font names, via the database manager (step 230). Upon fetching the above-mentioned information, postparsing is performed at step 232.

Figure 12:
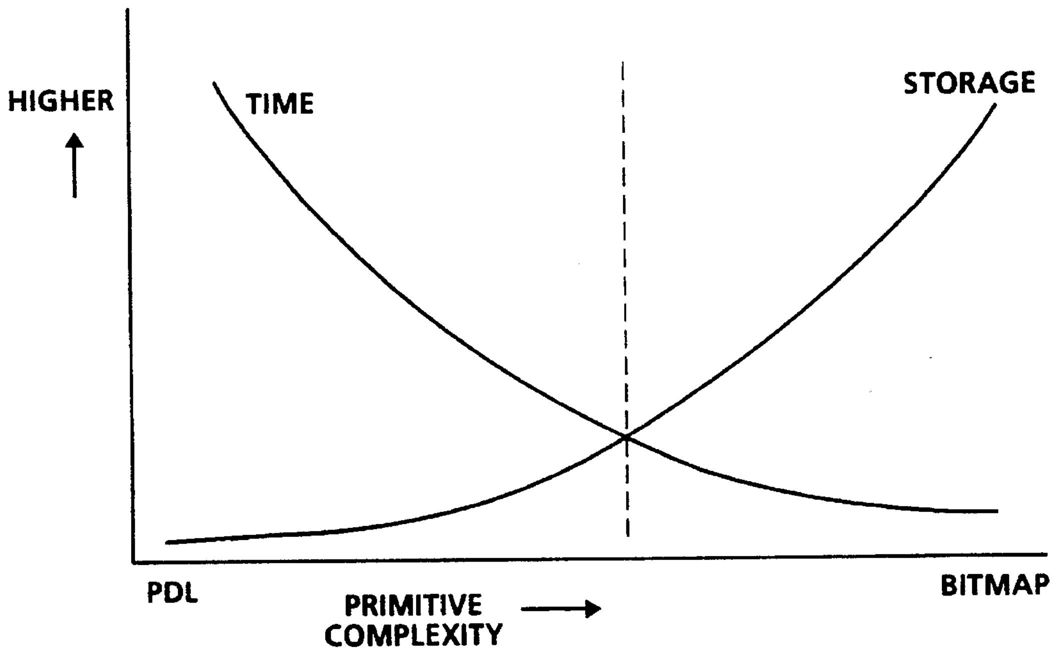
FIG. 12 is a graphic representation illustrating time/storage constraints encountered for various levels of primitives.

In particular, at step 232 the postparser causes all of the data structures to be placed in a suitable form for printing and places the corresponding raster identifiers, font IDs and primitive representations of internal PDL fragments into a bandlist for printing. In view of FIG. 12, it may be desirable to adjust the data structures, during postparsing, to higher or lower primitives, depending on the processing/storage capabilities of the system. As indicated in FIG. 12, higher level primitives, such as those expressed by PDLs, require less storage and relatively more processing time, while bitmaps, which are typically easier to process, require more storage. Accordingly, in compiling the bandlist, maintaining a suitable balance with respect to primitive complexity may be desirable.

Figure 13:
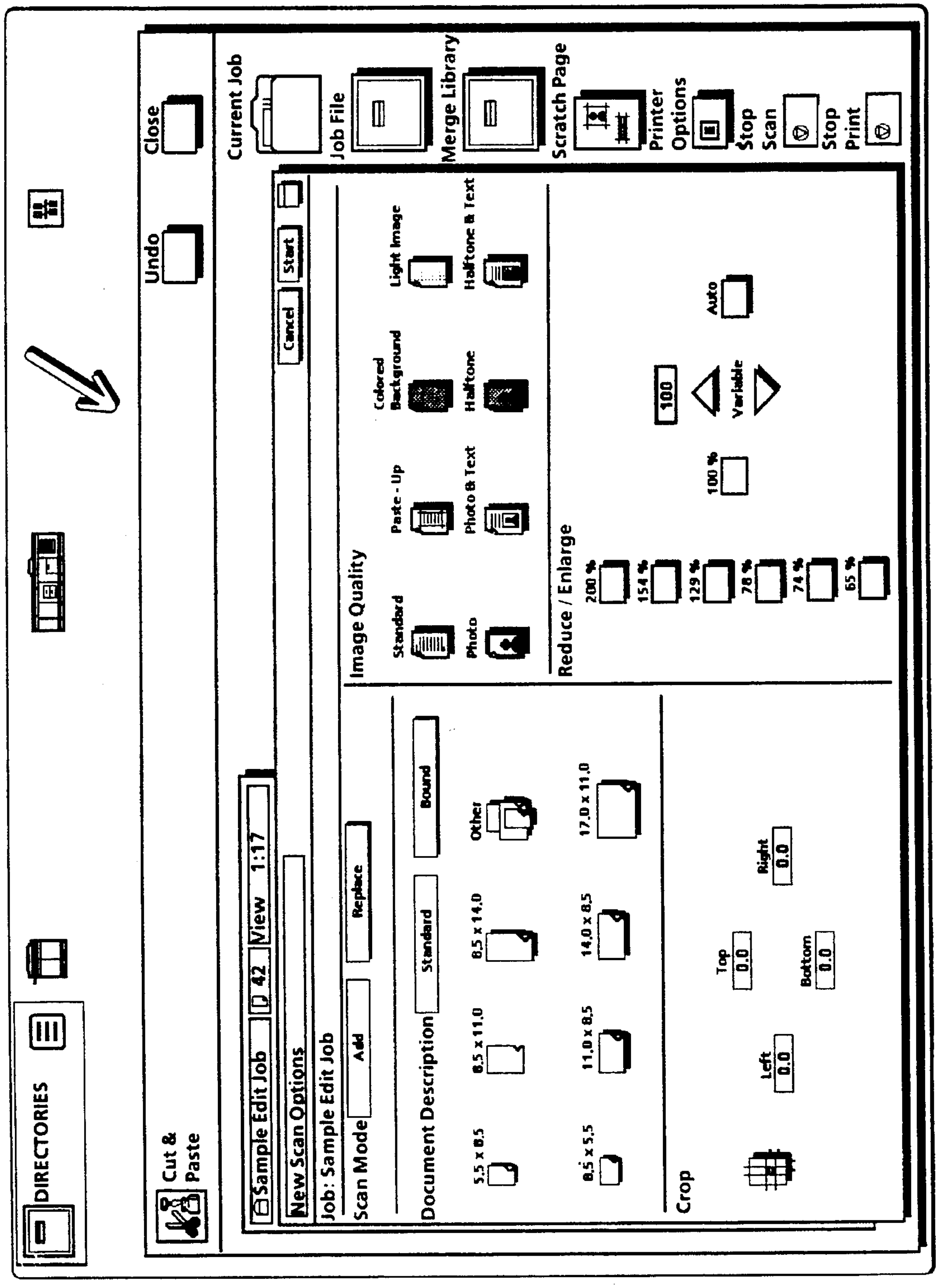
FIG. 13 is a schematic view of a screen displayed on a user interface, the screen comprising a graphic tool for performing an editing function, such as "cut and paste".

Referring again to FIG. 11, it will be appreciated that, subsequent to coalescing, the job can be edited, in a page-by-page manner, before marking thereof. In one example, when editing is desired (see step 234), postparsed information is communicated from the postparser 114 to the UI 27 (step 236), by way of the ICS of image processing section 118, the database manager 54 and the front end 57. As mentioned above, the front end 57 functions cooperatively with the "make ready" process to permit user editing at the UI 27. In one example, editing is performed on selected sections of bits with the UI 27 (step 238). It will be understood that object editing is contemplated by the present invention. Additionally, editing screens of the type used on the DocuTech™ are suitable for use in the present invention, and editing functions of the type enumerated in the DocuTech™ User's Manual, the pertinent portions of which are incorporated herein, are available to the user of the decomposer 32. An exemplary screen used for editing, e.g. "cutting and pasting," is shown in FIG. 13.

It should be understood that editing, for certain operations, can be achieved without postparsing. Examples of such operations would include signaturization, as disclosed in U.S. Pat. No. 5,271,065 to Rourke et al., the pertinent portions of which are incorporated herein by reference, plex changes or other like operations.

Subsequent to editing, the user passes the edited information back to the postparser 114 by way of the database manager 56 (step 240), the front end 57 and the postparse scheduler 112, to postparse for printing (step 242). At step 244, the postparsed information, which can include primitives representative of internal PDL fragments, bound font names and bitmaps, is inserted into a bandlist and delivered to the marking engine for consumption thereby.

Numerous features of the present invention will be apparent to those skilled in the art. One feature of the present invention is that it introduces various levels of concurrency into the decomposition process. On a broader scale, various processes, such as capture, preparse and coalesce can be performed concurrently. Accordingly, information can be parsed into image related components while one of a variety of coalesce functions is being performed. As a result of parsing and coalescing in parallel, the availability of fonts can be checked, and fault conditions for fonts can be managed without impairing preparsing. Moreover, when faults in fonts are found, the condition can corrected without requiring that the job be preparsed again. Finally, the preparse operation does not interfere with the processing of bitmaps. Essentially, processes serve to break decomposition into discrete components, in a "pipeline-fashion" for increasing overall throughput of the system. Accordingly, the longest delay becomes the longest section of the pipe.

Concurrency is also achieved on a finer scale. For example, the preparser preferably functions in two stages so that as many as two pages in a given job can be worked on simultaneously.

Another feature of the present invention is that it maximizes efficiency of job capture off a network. In particular, jobs can be inputted to the decomposer "on-the-fly," and thus need not be stored in mass memory prior to decomposition.

Yet another feature of the present invention is that it provides a decomposer in which post job capture editing can be achieved. That is, in one embodiment, image related identifiers can be edited on a user interface prior to sending any imaging primitives to a marking engine.

Another feature of the present invention is that it provides a scheme in which image related identifiers can be compiled in a central repository, e.g. a database, for use by the various processes of the system. Accordingly, the preparser, coalescer or postparser need not, for the most part, communicate with one another to perform their respective tasks.

```
DIRECTORY
 ACConfigTypes USING [
  AllParms, SingleParm, StatusCode, NetUserName, AuditParms, SecurityParms];

ACConfigSecAdm: DEFINITIONS =
 {

 ChangeSecDefaults: PROCEDURE [
  parmsPtr: LONG POINTER TO ACConfigTypes.SecurityParms]
  RETURNS [status: ACConfigTypes.StatusCode];

 SetAuditEvents: PROCEDURE [parmsPtr: LONG POINTER TO ACConfigTypes.AuditParms]
  RETURNS [status: ACConfigTypes.StatusCode];

 ModifyParm: PROCEDURE [parm: ACConfigTypes.SingleParm]
  RETURNS [status: ACConfigTypes.StatusCode];

 ReportAllParms: PROCEDURE [parmsPtr: LONG POINTER TO ACConfigTypes.AllParms]
  RETURNS [status: ACConfigTypes.StatusCode];

 ReportSingleParm: PROCEDURE [parmPtr: LONG POINTER TO ACConfigTypes.SingleParm]
  RETURNS [status: ACConfigTypes.StatusCode];

 GetNetUserName: PROCEDURE [z: UNCOUNTED ZONE]
  RETURNS [status: ACConfigTypes.StatusCode, name: ACConfigTypes.NetUserName];

 FreeNetUserName: PROCEDURE [
  namePtr: LONG POINTER TO ACConfigTypes.NetUserName, z: UNCOUNTED ZONE];

 ChangeNetUserName: PROCEDURE [name: ACConfigTypes.NetUserName]
  RETURNS [status: ACConfigTypes.StatusCode];

 SetMachinePwd: PROCEDURE [machinePwd: LONG STRING]
  RETURNS [status: ACConfigTypes.StatusCode];

 }.
```

Copyright © 1992 Xerox Corporation All Rights Reserved

```
DIRECTORY
 DirectoryID USING [ObjectID, nullObjectID];

AuditEvents: DEFINITIONS =
 {

 AuditEvent: TYPE = MACHINE DEPENDENT{
  logLogin, logLogoff, logAutoLogoff, logAcquireAccess, logModifyAccess,
  logDeleteAccess, logPrintAndSaveJob, logPrintAndDeleteJob, logStopPrint,
  logStopScan, logSaveJob, logSaveAndResumeJob, logSetACLAcquire,
  logSetACLModify, logSetACLOwner, logChangeJobParameters, logInactiveUser,
  logPasswordExpired, logPasswordMissed, logPasswordChange,
  logInvalidPWChangeShort, logInvalidPWChangeHistory, logInvalidPWChangeLong,
  logChangeDefProtection, logAddNamedList, logDeleteNamedList,
  logChangeNamedList, logAddUser, logDeleteUser, logDisableUser,
  logAddSiteAdmin, logDelSiteAdmin, logAddSecAdmin, logDelSecAdmin,
  logChangePWLength, logChangePWExpiration, logChangePWHistory,
logChangePWMiss,
  logChangeLogoffTime, logCorruptSecDefDB, logMissingSecDefDB,
  logCorruptUserProfDB, logMissingUserProfDB, logCorruptAudit, logMissingAudit,
  logAuditExhausted, logChangedNetJobOwner, logRDDLogin, logRDDLogoff,
  logRDDFailedLogin, logInitializedAudit, logInvalidCredentials, logNetJobPrint,
  logNetJobSave, logRICPortEnabled, logRICPortDisabled, logAuditReportPrinted,
  logESwitchBootSet, logOtherEvent, logAccessXrxBilling, logLoggingEnabled,
  logLoggingDisabled, logFilingRequest, logFileServerStore,
  logFileServerRetrieve, logFileServerDelete, logFileServerStoreSucceeded,
  logFileServerDeleteSucceeded, logFileServerRetrieveSucceeded,
  logFileServerStoreFailed, logFileServerDeleteFailed,
  logFileServerRetrieveFailed, logFilingAbortOperInitiated,
  logFilingAbortSysInitiated, spare(127)};


 StatusCode: TYPE = {
  ok, notFound, insufficientPriv, notSelected, alreadyPrinting, alreadyCopy,
  cannotCopy, cannotLoad, cannotPrint, knownBug};

 LogAuditEvent: PROCEDURE [
  event: AuditEvent, jobId: DirectoryID.ObjectID ← DirectoryID.nullObjectID,
  jobName: LONG STRING ← NIL, versionNumber: CARDINAL ← 0,
  otherName: LONG STRING ← NIL,
  subDirId: DirectoryID.ObjectID ← DirectoryID.nullObjectID];

 PrintLog: PROCEDURE [] RETURNS [status: StatusCode];

 ReinitLog: PROCEDURE [] RETURNS [status: StatusCode];

 CopyLog: PROCEDURE [] RETURNS [status: StatusCode];
```

Copyright © 1992 Xerox Corporation All Rights Reserved

```
LoadLog: PROCEDURE [] RETURNS [status: StatusCode];

}.
```

Copyright © 1992 Xerox Corporation All Rights Reserved

```
DIRECTORY
 Environment USING [Block];

ByteBlt: DEFINITIONS =

 BEGIN

 ByteBlt: PROCEDURE [
  to, from: Environment.Block, overLap: OverLapOption ← ripple]
  RETURNS [nBytes: CARDINAL];

 OverLapOption: TYPE = {ripple, move};

 StartIndexGreaterThanStopIndexPlusOne: ERROR;

 END.
```

Copyright © 1992 Xerox Corporation All Rights Reserved

```
CharCodeMapping: DEFINITIONS =

 BEGIN

 XCCtoICC: PROCEDURE [xcc: LONG STRING, z: UNCOUNTED ZONE]
  RETURNS [icc: LONG STRING];

 ICCtoXCC: PROCEDURE [icc: LONG STRING, z: UNCOUNTED ZONE]
  RETURNS [xcc: LONG STRING];

 END.
```

Copyright © 1992 Xerox Corporation All Rights Reserved

```
-- File: Coalescer.mesa - last edit:

-- Copyright (C) 1988, 1989, 1990, 1991 by Xerox Corporation. All rights reserved.

-- Description: This is the Interface between the Coalescer and modules other than its
Scheduler.

DIRECTORY
 Image USING [Handle],
 JobID USING [ID],
 RasterDirectorySupervisor USING [ID];

Coalescer: DEFINITIONS =
BEGIN

 -- on success only, ICS/IRS provides the new raster id and dimensions.
 ICSCallBack: PROCEDURE [jobID: JobID.ID,
              image: Image.Handle,
              coalescerTableIndex: CARDINAL,
              newRaster: RasterDirectorySupervisor.ID,
              newX: CARDINAL,
              newY: CARDINAL]
        RETURNS[];

 -- data base notifies the Coalescer of success or failure of an ICS/IRS task.
 Notify: PROCEDURE [jobID: JobID.ID,
           faulted: BOOLEAN ← FALSE]
     RETURNS[];

 END.
```

Copyright © 1992 Xerox Corporation All Rights Reserved

```
-- File: CoalescerControl.mesa - last edit:

-- Copyright (C) 1988, 1989, 1990, 1991 by Xerox Corporation. All rights reserved.

-- Description: This is the Interface between the Coalescer and its Scheduler.

DIRECTORY
 CoalescerTable USING [ErrorCode],
 DBError USING [ErrorCode],
 FaultLogger USING [ID],
 FECoalesce USING [ErrorCode],
 Font USING [FontID],
 FontDS USING [ErrorCode],
 FontSubstitutionTable USING [ErrorCode],
 Image USING [ErrorCode, Handle],
 JobID USING [ID],
 JobQ USING [ErrorCode, JobReference],
 Page USING [ErrorCode, Handle, Side],
 ServCoalesce USING [FontSubList],
 RasterDirectorySupervisor USING [FaultCode, ID];

CoalescerControl: DEFINITIONS =
BEGIN

-- TYPES --

 -- reason for abort.
 AbortReason: TYPE = {normal, resources, spare1, spare2};

 -- the procedure the coalescer calls to report problems to the scheduler.
 CallBackProc: TYPE = PROCEDURE [
   context: Context,
   problem: Problem];

 DCSAxis: TYPE = {both, x, y, spare};

 Context: TYPE = LONG POINTER;

 State: TYPE;
 StatePtr: TYPE = LONG POINTER TO State ← NIL;

 Problem: TYPE = RECORD [
  var: SELECT type: ProblemType FROM

   « 1300 » coalescerTableError => [code: CoalescerTable.ErrorCode],
   « 1325 » dbError          => [code: DBError.ErrorCode],
   « 1301 » FECoalesceError   => [code: FECoalesce.ErrorCode],
   « 1302 » fontDSError       => [name: LONG STRING,
                   code: FontDS.ErrorCode],
```

Copyright © 1992 Xerox Corporation All Rights Reserved

```
« 1303 » fontNameNotFound   => [name: LONG STRING],
« 1310 » fontNotFound       => [name: LONG STRING],
« 1305 » fontSubstituted    => [newName: LONG STRING,  -- appearance
            newFontID: Font.FontID, -- warning
            oldName: LONG STRING],

« 1306 » fontSubstitutionFailed1 => [name: LONG STRING],
« 1307 » fontSubstitutionFailed2 => [name: LONG STRING],

« 1329 » fontSubstitutionTableError => [name: LONG STRING,
              code: FontSubstitutionTable.ErrorCode],

« 1308 » fullFormRaster  => [],
« 1311 » genericSWError  => [code: CARDINAL],
« 1312 » icsFaulted      => [],
« 1313 » illegalFormFont  => [name: LONG STRING],
« 1326 » imageError      => [code: Image.ErrorCode], -- Simplify[] only
« 1314 » invalidFontEntry => [name: LONG STRING],   -- unused since ME1.
« 1315 » invalidState    => [code: CARDINAL],
« 1330 » irsTooBig       => [], -- cleared by operator, do not recoalesce.
« 1331 » irsWrongType    => [], -- cleared by operator, do not recoalesce.
« 1316 » jobQError       => [code: JobQ.ErrorCode],
« 1317 » nullRasterID    => [],
« 1318 » otherFormRaster  => [],
« 1327 » pageError       => [code: Page.ErrorCode], -- Simplify[] only
« 1309 » rasterDSError   => [fault: RasterDirectorySupervisor.FaultCode,
           faultID: FaultLogger.ID,
           rasterID: RasterDirectorySupervisor.ID,
           code: CARDINAL],

« 1333 » realException   => [code: CARDINAL], -- 0: font; 1: raster.
« 1332 » resourceFault   => [code: CARDINAL],
« 1328 » scaleApproximated => [actual: LONG STRING,  -- appearance warning
           expected: LONG STRING,
           dcsAxis: DCSAxis],

« 1319 » unImplementedObjectEntryType => [],
« 1320 » unknownFormFont          => [name: LONG STRING],
« 1321 » unknownFormRaster        => [],
« 1322 » unknownObjectEntryType   => [],
« 1323 » zeroAorEonZeroBandD      => [],
« 1324 » zeroBorDonZeroAandE      => [],

« 1334 » switchToDiag          => [],
« 1335 » genericAbort          => [],

spare => [name: LONG STRING,
    data: LONG DESCRIPTOR FOR ARRAY CARDINAL OF CARDINAL],
ENDCASE];
```

Copyright © 1992 Xerox Corporation All Rights Reserved

```
ProblemType: TYPE = {coalescerTableError, dbError, FECoalesceError, fontDSError,
  fontNameNotFound, fontNotFound, fontSubstituted, fontSubstitutionFailed1,
  fontSubstitutionFailed2, fontSubstitutionTableError, fullFormRaster,
  genericSWError, icsFaulted, illegalFormFont, imageError, invalidFontEntry,
  invalidState, irsTooBig, irsWrongType, jobQError, nullRasterID,
  otherFormRaster, pageError, rasterDSError, realException, resourceFault,
  scaleApproximated, unImplementedObjectEntryType, unknownFormFont,
  unknownFormRaster, unknownObjectEntryType, zeroAorEonZeroBandD,
  zeroBorDonZeroAandE, switchToDiag, genericAbort, spare};

-- PROCEDURES --

 -- The Coalesce procedure must wake up or stop and return immediately.
 Abort: PROCEDURE [statePtr: StatePtr, reason: AbortReason ← normal];

 -- process this image.
 Coalesce: PROCEDURE [statePtr: StatePtr,
            pageImage: Image.Handle];

 -- set up to start coalescing a job.
 -- statePtr = NIL means already created.
 Create: PROCEDURE [jobID: JobID.ID,
           jobRef: JobQ.JobReference,
           fontSubList: ServCoalesce.FontSubList,
           fontSubstitution: BOOLEAN,
           statePtr: StatePtr];

 -- Done coalescing this job. free all memory.
 Destroy: PROCEDURE [statePtr: StatePtr];

 -- scheduler tells Coalescer to free its static.
 -- delayed = TRUE means Coalescer has to wait for ICS/IRS to finish.
 FreeStatic: PROCEDURE [statePtr: StatePtr]
       RETURNS [delayed: BOOLEAN];

 -- initialize the Coalescer memory, called before create
 Init: PROCEDURE [callBack: CallBackProc,
          context: Context]
     RETURNS [statePtr: StatePtr];

 -- Tell the Coalescer to have ICS simplify the page.
 Simplify: PROCEDURE [statePtr: StatePtr,
             page: Page.Handle,
             side: Page.Side];

END.
```

Copyright © 1992 Xerox Corporation All Rights Reserved

```
-- File: CoalescerFont.mesa

-- Copyright (C) 1985, 1986, 1987, 1988, 1989, 1990 by Xerox Corporation. All rights
reserved.

<<*********************************************************************
*                                *
* DESCRIPTION: This file provides the type definition used for   *
*    obtaining and coalescing fonts.            *
*                                *
*********************************************************************>>
DIRECTORY
 DirectoryType USING [nullObjectID, ObjectID],
 Font USING [Encoding, Orientation, PointSize],
 ResMgrStorage USING [Pages],
 RTOSFile USING [FileID, nullID],
 Transformation USING [Identity, Matrix];

CoalescerFont: DEFINITIONS =
BEGIN

 <<*******************************************************************
 *                               *
 * DESCRIPTION: Data needed to coalesce a job's font.        *
 *                               *
 *******************************************************************>>
 CoalescerFontRec: TYPE = RECORD[
  -- filled in by CoalescerTable
  index: CARDINAL ← 0,
  authorityID: LONG STRING ← NIL,
  charCodeID: LONG STRING ← NIL,
  typeFaceID: LONG STRING ← NIL,
  transformation: Transformation.Matrix ← Transformation.Identity,

  -- filled in by Coalescer
  pointSize: Font.PointSize ← 0,
  orientation: Font.Orientation ← portrait,

  -- filled in by font directory
  id: DirectoryType.ObjectID ← DirectoryType.nullObjectID,
  subdirectory: DirectoryType.ObjectID ← DirectoryType.nullObjectID,
  metricsFile: RTOSFile.FileID ← RTOSFile.nullID,
  metricsPageOffset: ResMgrStorage.Pages ← 0,
  metricPageLength: ResMgrStorage.Pages ← 0,
  requestedCCID: Font.Encoding ← xcOneOneOne,
  availableCCID: Font.Encoding ← xcOneOneOne];

 <<*******************************************************************
 *                               *
```

Copyright © 1992 Xerox Corporation All Rights Reserved

```
* DESCRIPTION: List of coalescer font entries.          *
*                              *
*******************************************************************>>
CoalescerFontRecList: TYPE = LONG DESCRIPTOR FOR ARRAY CARDINAL OF
  CoalescerFontRec;

END.
```

Copyright © 1992 Xerox Corporation All Rights Reserved

```
-- File: CoalescerOps.mesa - last edit:

-- Copyright (C) 1989, 1990, 1991 by Xerox Corporation. All rights reserved.

DIRECTORY
 IMSTypes USING [CropParams, ScalingParams],
 MRImageConversionService USING [ImageOrientation],
 Transformation USING [Matrix],
 TransformAnalyzerOps USING [TransformationResultsPtr];

CoalescerOps: DEFINITIONS =
 BEGIN

 -- CONSTANTS

 IMSIdentityScale: IMSTypes.ScalingParams = [16, 16];

 PointsPerDot: REAL = 0.1204819; « 1.0 / Font.pixelsPerPoint »

 -- Used with RealFns.AlmostEqual and RealFns.AlmostZero.
 -- This number was chosen to work with fonts from pt sizes 4 to 200.
 -- This number is large enough to avoid calling equal ptsizes unequal and
 -- small enought to avoid calling  unequal pt sizes equal.
 -- For pt size = 4 the error has to be less than X*10 to the -3.
 -- For pt size = 200 the error has to be less than X*10 to the -1.
 -- So we wouldn't want it larger than -4 and any smaller simply gives the
 -- fuzz a greater opportunity to falsely fault the job.
 --
 Fuzz: INTEGER = -4;

 -- TYPES

 -- PROCS

 SetOffsets: PROCEDURE [orient: MRImageConversionService.ImageOrientation,
             xPixel, yPixel: CARDINAL]
       RETURNS[originXOffset, originYOffset: CARDINAL];

 SetUpICS: PROCEDURE [orient: MRImageConversionService.ImageOrientation,
            scale: IMSTypes.ScalingParams,
            t: Transformation.Matrix,
            cropParms: LONG POINTER TO IMSTypes.CropParams,
            yPad: CARDINAL, scanLineModulus: CARDINAL]
      RETURNS[newYPad: CARDINAL];

 SetUpPasses: PROCEDURE [xFormResults:
             TransformAnalyzerOps.TransformationResultsPtr]
        RETURNS [passCount: LONG CARDINAL,
             gbdOrient: MRImageConversionService.ImageOrientation,
             gbdScale: IMSTypes.ScalingParams,
```

Copyright © 1992 Xerox Corporation All Rights Reserved

```
        gbdT: Transformation.Matrix];
END.
```

Copyright © 1992 Xerox Corporation All Rights Reserved

```
-- File: CoalescerTable.mesa

-- Copyright (C) 1985, 1986, 1987, 1988, 1989, 1990 by Xerox Corporation. All rights
reserved.

<<**********************************************************************
*                                          *
* DESCRIPTION:  This file provides the procedures and type      *
*    definitions by which a client may extract, enter and edit   *
*    coalescer table information into the job database.       *
*                                          *
********************************************************************>>
DIRECTORY
 CoalescerFont USING [CoalescerFontRecList],
 DirectoryType USING [nullObjectID, ObjectID],
 Font USING [Orientation],
 FontLoader USING [FontList],
 Image USING [Handle],
 JobBackUp USING [LockID],
 Transformation USING [Identity, Matrix];

CoalescerTable: DEFINITIONS =
BEGIN

 --TYPES

 <<******************************************************************
 *                                         *
 * DESCRIPTION:                                   *
 *   Used by all 3: PreParser, Coalescer & PostParser.        *
 *   The PreParser provides a BitMapEntryLinkHandle.        *
 *   The Coalescer rotates and scales the bitmaps, as needed, to *
 *    make sure that they are in a form acceptable by the rest of *
 *    the system.                                 *
 *   The PostParser reads a BitMapEntryList.                *
 *                                         *
 ****************************************************************>>
 BitMapEntry: TYPE = RECORD [
  bitMapType: BitMapType ← raster,
  id: DirectoryType.ObjectID ← DirectoryType.nullObjectID,
  transformation: Transformation.Matrix ← Transformation.Identity,
  xPixel: CARDINAL ← 0,
  yPixel: CARDINAL← 0,
  yPad: CARDINAL ← 0,
  originXOffset: CARDINAL ← 0,
  originYOffset: CARDINAL← 0];

 <<******************************************************************
 *                                         *
 * DESCRIPTION:  Linked list of bit map entries.           *
```

Copyright © 1992 Xerox Corporation All Rights Reserved

```
*                                   *
*******************************************************************>>
BitMapEntryLink: TYPE = RECORD [
 next: BitMapEntryLinkHandle ← NIL,
 list: BitMapEntryList ← DESCRIPTOR[NIL, 0]];

<<*******************************************************************
*                                   *
* DESCRIPTION: Handle to linked list of bit map entries.     *
*                                   *
*******************************************************************>>
BitMapEntryLinkHandle: TYPE = LONG POINTER TO BitMapEntryLink;

<<*******************************************************************
*                                   *
* DESCRIPTION: List of bit map entries.           *
*                                   *
*******************************************************************>>
BitMapEntryList: TYPE = LONG DESCRIPTOR FOR ARRAY CARDINAL OF
 BitMapEntry;

<<*******************************************************************
*                                   *
* DESCRIPTION: Types of bit map entries.          *
*                                   *
*******************************************************************>>
BitMapType: TYPE = {form, logo, raster, sampled, other};

<<*******************************************************************
*                                   *
* DESCRIPTION: Bit map entry and its coalescer table indes.   *
*                                   *
*******************************************************************>>
CoalescerBitMapEntry: TYPE = RECORD [
 index: CARDINAL ← 0,
 bitMap: BitMapEntry];

<<*******************************************************************
*                                   *
* DESCRIPTION: List of coalescer bit map entries.       *
*                                   *
*******************************************************************>>
CoalescerBitMapEntryList: TYPE = LONG DESCRIPTOR FOR ARRAY CARDINAL
 OF CoalescerBitMapEntry;

<<*******************************************************************
*                                   *
* DESCRIPTION: Lists and lengths of coalescer tables.     *
*                                   *
*******************************************************************>>
```

Copyright © 1992 Xerox Corporation All Rights Reserved

```
CoalescerLists: TYPE = RECORD [
 bitMaps: CoalescerBitMapEntryList ← DESCRIPTOR[NIL, 0],
 bitMapListLength: CARDINAL ← 0,
 fonts: CoalescerFont.CoalescerFontRecList ← DESCRIPTOR[NIL, 0],
 fontListLength: CARDINAL ← 0];

<<*****************************************************************
*                              *
* DESCRIPTION:  Handle to list of coalescer bit map entries.   *
*                              *
*****************************************************************>>
CoalescerListsHandle: TYPE = LONG POINTER TO CoalescerLists;

<<*****************************************************************
*                              *
* DESCRIPTION:  Possible reasons why an error may be raised by a  *
*   procedure manipulating a page.            *
*                              *
*****************************************************************>>
ErrorCode: TYPE = {imageNotAnIPFragment, listLengthNotSufficient,
 indexNotFound, nilImageHandle};

<<*****************************************************************
*                              *
* DESCRIPTION:  List of bit map entries.              *
*                              *
*****************************************************************>>
OrientationList: TYPE = LONG DESCRIPTOR FOR ARRAY CARDINAL OF
 Font.Orientation;

<<*****************************************************************
*                              *
* DESCRIPTION:                      *
*  Used only by the PreParser via AddTable PROCEDURE.    *
*  The PreParser provides a UnknownFontEntryLinkHandle.      *
*                              *
*****************************************************************>>
UnknownFontEntry: TYPE = RECORD [
 authorityID: LONG STRING ← NIL,
 charCodeID: LONG STRING ← NIL,
 typeFaceID: LONG STRING ← NIL,
 transformation: Transformation.Matrix ← Transformation.Identity];

<<*****************************************************************
*                              *
* DESCRIPTION:  Linked list of unknown font entries.         *
*                              *
*****************************************************************>>
UnknownFontEntryLink: TYPE = RECORD [
 next: UnknownFontEntryLinkHandle ← NIL,
```

Copyright © 1992 Xerox Corporation All Rights Reserved

```
list: UnknownFontEntryList ← DESCRIPTOR[NIL, 0]];

<<*****************************************************************
*                          *
* DESCRIPTION:  Handle to unknown font linked list.        *
*                          *
*****************************************************************>>
UnknownFontEntryLinkHandle: TYPE = LONG POINTER TO
 UnknownFontEntryLink;

<<*****************************************************************
*                          *
* DESCRIPTION:  List of unknown font entries.          *
*                          *
*****************************************************************>>
UnknownFontEntryList: TYPE = LONG DESCRIPTOR FOR ARRAY CARDINAL OF
 UnknownFontEntry;

-- SIGNALS

<<*****************************************************************
*                          *
* DESCRIPTION:  Possible signals that can be raised when      *
*   manipulating a coalescer table.          *
*                          *
*****************************************************************>>
Error: SIGNAL [code: ErrorCode];

--PROCEDURES

<<*****************************************************************
*                          *
* FUNCTION:  PreParser uses this to add UnknowFontEntry's and    *
*       BitMapEntry's              *
* PARAMETERS:                *
*    lockID - job to be modified            *
*    image - image where coalscer table is          *
*    fontLinks - linked list of unknown fonts         *
*   bitMapLinks - linked list of bitMaps          *
* RETURN VALUES: none              *
* SIGNALS:                *
*    CoalescerTable.Error[nilImageHandle] - image is nil-valued  *
*    CoalescerTable.Error[imageNotAnIPFragment] - image is not  *
*     an ipFragment              *
*                          *
*****************************************************************>>
AddTables: PROCEDURE [image: Image.Handle, lockID: JobBackUp.LockID,
 bitMapLinks: BitMapEntryLinkHandle,
 fontLinks: UnknownFontEntryLinkHandle];
```

Copyright © 1992 Xerox Corporation All Rights Reserved

```
<<********************************************************************
*                              *
* FUNCTION:  Coalescer uses this to set all UnknowFontEntries   *
*   invalid field to FALSE.                *
* PARAMETERS:                             *
*   lockID - job to be modified                *
* RETURN VALUES: none                          *
* SIGNALS: none                          *
*                              *
*******************************************************************>>
ClearInvalidUnknownFonts: PROCEDURE[lockID: JobBackUp.LockID];

<<********************************************************************
*                              *
* FUNCTION:  Coalescer uses this to obtain and update the tables. *
*                              *
*        On inital call, fills in list according to rules    *
*        listed below. On subsequent calls, updates the      *
*        CoalescerTable entries in list and then fills in the *
*        list with the next set of entries, if any.         *
*                              *
*        On initial call: Coalescer sets *Length = 0.      *
*                              *
*        CoalescerTable implementation sets *Length to      *
*        number of valid entries in each list.            *
*                              *
*        On subsequent calls, the CoalescerTable will update *
*        database with the entries in the list and will load *
*        list with the next set of entries.         *
*                              *
*        Coalescer knows its done when *Length = 0 again.   *
*                              *
* RULES FOR INCLUDING AN ENTRY IN THE LIST:               *
*   BITMAP TABLE:                            *
*   "form"   yes (so Coalescer can report the object fault)   *
*   "logo"   no  (they do not need to be Coalesced)          *
*   "raster  yes IF transformation != Transformation.Identity  *
*   "sampled" yes IF transformation != Transformation.Identity  *
*   "other"  yes (so Coalescer can report the object fault)   *
*                              *
*   FONT TABLE:                    *
*   IF id = DirectoryType.nullObjectID              *
*                              *
* PARAMETERS:                             *
*   lockID - job to be modified                *
*   image - image where coalscer table is             *
*   lists -----                    *
*    bitMaps - list of bitMaps                *
*    bitMapListLength - number of bitmaps in list          *
*     fonts - list of fonts                *
```

Copyright © 1992 Xerox Corporation All Rights Reserved

```
*     fontListLength - number of fonts in list          *
*   zone - to use when allocating font name strings       *
* SIGNALS:                              *
*    CoalescerTable.Error[nilImageHandle] - image is nil-valued *
*    CoalescerTable.Error[imageNotAnIPFragment] - image is not  *
*     an ipFragment                     *
*                            *
*****************************************************************>>
CoalesceTables: PROCEDURE [image: Image.Handle, lockID:
 JobBackUp.LockID, lists: CoalescerListsHandle, zone: UNCOUNTED
 ZONE];

<<*****************************************************************
*                            *
* FUNCTION: Gets the bitmap table for the PostParser.       *
*       PostParser must allocate enough space before calling *
*       this proc by using the results of GetTableSizes.  *
* PARAMETERS:                           *
*    image - image where coalescer table is             *
*    lockID - job where coalescer table is            *
*    bitMapList - list to be filled in with bitMap entries     *
* SIGNALS:                              *
*    CoalescerTable.Error[imageNotAnIPFragment] - image is not  *
*     an ipFragment                     *
*    CoalescerTable.Error[listLengthNotSufficient] - list does  *
*     not have enough room to fit the entire coalescer table   *
*                            *
*****************************************************************>>
GetBitMapTable: PROCEDURE [image: Image.Handle, lockID:
 JobBackUp.LockID, bitMapList: BitMapEntryList];

<<*****************************************************************
*                            *
* FUNCTION: Gets the font tables for the PostParser.        *
*       PostParser must allocate enough space before calling *
*       this proc by using the results of GetTableSizes.  *
* PARAMETERS:                           *
*    image - image where coalescer table is             *
*    lockID - job where coalescer table is            *
*   fontList - list to be filled in with              *
*          FontLoader.FontListEntry's              *
*          GetTables only fills in the fields that it knows *
*          about, PostParser & FontLoader will do the rest. *
* SIGNALS:                              *
*    CoalescerTable.Error[imageNotAnIPFragment] - image is not  *
*     an ipFragment                     *
*    CoalescerTable.Error[listLengthNotSufficient] - list does  *
*     not have enough room to fit the entire coalescer table   *
*                            *
*****************************************************************>>
```

Copyright © 1992 Xerox Corporation All Rights Reserved

```
GetFontAndOrientationTable: PROCEDURE [image: Image.Handle, lockID:
 JobBackUp.LockID, fontList: FontLoader.FontList,
 orientationList: OrientationList];

<<*******************************************************************
*                              *
* FUNCTION:  Get the sizes of the coalescer tables.          *
* PARAMETERS:                                  *
*   lockID - job to be modified                   *
*   image - image where coalscer tables are            *
* RETURN VALUES:                               *
*   bitMapTableSize - number of entries in bitMap table      *
*  fontTableSize - number of entries in font table        *
* SIGNALS:                                 *
*   CoalescerTable.Error[imageNotAnIPFragment] - image is not  *
*    an ipFragment                              *
*   CoalescerTable.Error[nilImageHandle] - image is nil-valued  *
*                              *
*****************************************************************>>
GetTableSizes: PROCEDURE [image: Image.Handle, lockID:
 JobBackUp.LockID] RETURNS[bitMapTableSize, fontTableSize:
 CARDINAL];

<<*******************************************************************
*                              *
* FUNCTION:  Sets a bitMapTableEntry's id.                *
* PARAMETERS:                                  *
*   lockID - job to be modified                   *
*   image - image where coalscer table is              *
*  index - entry changed                        *
*  id - entry's new id                         *
* SIGNALS:                                 *
*   CoalescerTable.Error[nilImageHandle] - image is nil-valued  *
*   CoalescerTable.Error[imageNotAnIPFragment] - image is not  *
*    an ipFragment                              *
*   CoalescerTable.Error[indexNotFound] - invalid index  *
*                              *
*****************************************************************>>
SetBitMapTableEntryID: PROCEDURE[image: Image.Handle, lockID:
 JobBackUp.LockID, index: CARDINAL, id: DirectoryType.ObjectID];

END.
```

Copyright © 1992 Xerox Corporation All Rights Reserved

```
DIRECTORY
 Environment USING [Block],
 NetworkStream USING [ClassOfService],
 Stream USING [Handle],
 System USING [GreenwichMeanTime, NetworkAddress];

Courier: DEFINITIONS =
 BEGIN

 SystemElement: TYPE = System.NetworkAddress;

 Handle: TYPE = LONG POINTER TO READONLY Object;
 Object: TYPE = RECORD [
  remote: SystemElement,
  programNumber: LONG CARDINAL,
  versionNumber: CARDINAL,
  zone: UNCOUNTED ZONE,
  sH: Stream.Handle,
  classOfService: NetworkStream.ClassOfService];

 Create: PROCEDURE [
  remote: SystemElement, programNumber: LONG CARDINAL, versionNumber:
CARDINAL,
  zone: UNCOUNTED ZONE, classOfService: NetworkStream.ClassOfService]
  RETURNS [cH: Handle];

 Delete: PROCEDURE [cH: Handle];

 Call: PROCEDURE [
  cH: Handle, procedureNumber: CARDINAL,
  arguments, results: Parameters ← nullParameters,
  timeoutInSeconds: LONG CARDINAL ← LAST[LONG CARDINAL],
  requestDataStream: BOOLEAN ← FALSE,
  streamCheckoutProc: PROCEDURE [cH: Handle] ← NIL] RETURNS [sH: Stream.Handle];

 ReleaseDataStream: PROCEDURE [cH: Handle];

 RemoteErrorSignalled: ERROR [errorNumber: CARDINAL, arguments: Arguments];

 VersionMismatch: ERROR [versionRange: VersionRange];
 VersionRange: TYPE = RECORD [low, high: CARDINAL];

 ExportRemoteProgram: PROCEDURE [
  programNumber: LONG CARDINAL, versionRange: VersionRange,
  dispatcher: Dispatcher, serviceName: LONG STRING ← NIL, zone: UNCOUNTED ZONE,
  classOfService: NetworkStream.ClassOfService];

 UnexportRemoteProgram: PROCEDURE [
  programNumber: LONG CARDINAL, versionRange: VersionRange];
```

Copyright © 1992 Xerox Corporation All Rights Reserved

```
Dispatcher: TYPE = PROCEDURE [
 cH: Handle, procedureNumber: CARDINAL, arguments: Arguments,
 results: Results];

SignalRemoteError: ERROR [
 errorNumber: CARDINAL, arguments: Parameters ← nullParameters];

InvalidArguments: ERROR;

NoSuchProcedureNumber: ERROR;


Free: PROCEDURE [parameters: Parameters, zone: UNCOUNTED ZONE];

SerializeParameters: PROCEDURE [parameters: Parameters, sH: Stream.Handle];
DeserializeParameters: PROCEDURE [
 parameters: Parameters, sH: Stream.Handle, zone: UNCOUNTED ZONE];


Error: ERROR [errorCode: ErrorCode];

ErrorCode: TYPE = {
 transmissionMediumHardwareProblem, transmissionMediumUnavailable,
 transmissionMediumNotReady, noAnswerOrBusy, noRouteToSystemElement,
 transportTimeout, remoteSystemElementNotResponding, noCourierAtRemoteSite,
 tooManyConnections, invalidMessage, noSuchProcedureNumber, returnTimedOut,
 callerAborted, unknownErrorInRemoteProcedure, streamNotYours,
 truncatedTransfer, parameterInconsistency, invalidArguments,
 noSuchProgramNumber, protocolMismatch, duplicateProgramExport,
 noSuchProgramExport, invalidHandle, noError};


Parameters: TYPE = RECORD [location: LONG POINTER, description: Description];
nullParameters: Parameters = [NIL, NIL];

Arguments: TYPE = PROCEDURE [argumentsRecord: Parameters ← nullParameters];

Results: TYPE = PROCEDURE [
 resultsRecord: Parameters ← nullParameters,
 requestDataStream: BOOLEAN ← FALSE] RETURNS [sH: Stream.Handle];

Description: TYPE = PROCEDURE [notes: Notes];

Notes: TYPE = POINTER TO READONLY NotesObject;
NotesObject: TYPE = RECORD [
 zone: UNCOUNTED ZONE,
 operation: {fetch, store, free},
 noteSize: NoteSize,
 noteLongCardinal: NoteLongCardinal,
```

Copyright © 1992 Xerox Corporation All Rights Reserved

```
 noteLongInteger: NoteLongInteger,
 noteParameters: NoteParameters,
 noteChoice: NoteChoice,
 noteDeadSpace: NoteDeadSpace,
 noteString: NoteString,
 noteSpace: NoteSpace,
 noteArrayDescriptor: NoteArrayDescriptor,
 noteDisjointData: NoteDisjointData,
 noteBlock: NoteBlock];
NoteSize: TYPE = PROCEDURE [size: CARDINAL] RETURNS [location: LONG POINTER];

NoteLongCardinal: TYPE = PROCEDURE [site: LONG POINTER TO LONG CARDINAL];

NoteLongInteger: TYPE = PROCEDURE [site: LONG POINTER TO LONG INTEGER];

NoteParameters: TYPE = PROCEDURE [site: LONG POINTER, description: Description];

NoteChoice: TYPE = PROCEDURE [
 site: LONG POINTER, size: CARDINAL,
 variant: LONG DESCRIPTOR FOR ARRAY OF CARDINAL, tag: LONG POINTER ← NIL];
NoteDeadSpace: TYPE = PROCEDURE [site: LONG POINTER, size: CARDINAL];

NoteString: TYPE = PROCEDURE [site: LONG POINTER TO LONG STRING];

NoteSpace: TYPE = PROCEDURE [site: LONG POINTER, size: CARDINAL];

NoteArrayDescriptor: TYPE = PROCEDURE [
 site: LONG POINTER, elementSize: CARDINAL, upperBound: CARDINAL];
NoteDisjointData: TYPE = PROCEDURE [
 site: LONG POINTER TO LONG POINTER, description: Description];

NoteBlock: TYPE = PROCEDURE [block: Environment.Block];

LocalSystemElement: PROCEDURE RETURNS [SystemElement];

Exports: TYPE = ARRAY CARDINAL OF ExportItem;
ExportItem: TYPE = MACHINE DEPENDENT RECORD [
 programNumber(0): LONG CARDINAL,
 versionRange(2): VersionRange,
 serviceName(4): LONG STRING,
 exportTime(6): System.GreenwichMeanTime];
EnumerateExports: PROCEDURE RETURNS [enum: LONG DESCRIPTOR FOR Exports];
FreeEnumeration: PROCEDURE [enum: LONG DESCRIPTOR FOR Exports];

END.
```

Copyright © 1992 Xerox Corporation All Rights Reserved

```
DIRECTORY

 Auth USING [HashedPassword, Key];

CSRDefaults: DEFINITIONS =

 BEGIN

 BinderType: TYPE = {uso, rx};

 KeyboardType: TYPE = {
  Danish, Dutch, Finnish, French, German, Italian, Norwegian, Spanish, Swedish,
  UK, US};

 ImageTrimRangeType: TYPE = CARDINAL [0..48];
 ImageTrimType: TYPE = {TrimLeft, TrimRight, TrimTop, TrimBottom};

 ImageTrimRecord: TYPE = RECORD [
  TrimLeft: ImageTrimRangeType,
  TrimRight: ImageTrimRangeType,
  TrimTop: ImageTrimRangeType,
  TrimBottom: ImageTrimRangeType];

 MarketRegion: TYPE = {uso, rx, xci, rxUK, rxSweden};

 PrinterType: TYPE = {xenith, gladiator};

 OutputDeviceType: TYPE = {finisher, stacker2bin};

 SBMType: TYPE = {a3, a3a4};

 GetAuthAndOrCHConfigured: PROCEDURE [ «parameters» ]
  RETURNS [configured: BOOLEAN];

 GetBinderType: PROCEDURE [ «parameters» ] RETURNS [type: BinderType];

 GetBypassTransportType: PROCEDURE [ «parameters» ] RETURNS [type: SBMType];
```

Copyright © 1992 Xerox Corporation All Rights Reserved

GetDFAConfigured: PROCEDURE [ «parameters» ] RETURNS [configured: BOOLEAN];

GetFilingConfigured: PROCEDURE [ «parameters» ] RETURNS [configured: BOOLEAN];

GetForeignInterfaceConfigured: PROCEDURE [ «parameters» ]
RETURNS [configured: BOOLEAN];

GetHighCapFeederConfigured: PROCEDURE [ «parameters» ]
RETURNS [configured: BOOLEAN];

GetImageTrimValues: PROCEDURE RETURNS [itr: ImageTrimRecord];

GetKeyboardType: PROCEDURE [] RETURNS [keyboard: KeyboardType];

GetMachineDomainName: PROCEDURE [zone: UNCOUNTED ZONE]
RETURNS [domain: LONG STRING];

GetMachineOrganization: PROCEDURE [zone: UNCOUNTED ZONE]
RETURNS [organization: LONG STRING];

GetMachineSimplePassword: PROCEDURE [ «parameters» ]
RETURNS [password: Auth.HashedPassword];

GetMachineStrongPassword: PROCEDURE [ «parameters» ]
RETURNS [password: Auth.Key];

GetMarketRegion: PROCEDURE [] RETURNS [market: MarketRegion];

Copyright © 1992 Xerox Corporation All Rights Reserved

GetNetworkConfigured: PROCEDURE [ «parameters» ] RETURNS [configured: BOOLEAN];

GetNumberOfFeedersConfigured: PROCEDURE [ «parameters» ]
RETURNS [feeders: CARDINAL];

GetOutputDeviceConfigured: PROCEDURE [ «parameters» ]
RETURNS [configured: OutputDeviceType];

GetPrinterConfigured: PROCEDURE [ «parameters» ] RETURNS [configured: BOOLEAN];

GetPrinterType: PROCEDURE [ «parameters» ] RETURNS [printerType: PrinterType];

GetPrintServiceName: PROCEDURE [zone: UNCOUNTED ZONE]
RETURNS [printerName: LONG STRING];

GetRICConfigured: PROCEDURE [ «parameters» ] RETURNS [configured: BOOLEAN];

GetScannerConfigured: PROCEDURE [ «parameters» ] RETURNS [configured: BOOLEAN];

GetSecondLanguageConfigured: PROCEDURE [ «parameters» ]
RETURNS [configured: BOOLEAN];

GetSBMType: PROCEDURE [ «parameters» ] RETURNS [type: SBMType];

Copyright © 1992 Xerox Corporation All Rights Reserved

```
SetAuthAndOrCHConfigured: PROCEDURE [configured: BOOLEAN];

SetBinderType: PROCEDURE [type: BinderType];

SetBypassTransportType: PROCEDURE [type: SBMType];

SetDFAConfigured: PROCEDURE [configured: BOOLEAN];

SetFilingConfigured: PROCEDURE [configured: BOOLEAN];

SetForeignInterfaceConfigured: PROCEDURE [configured: BOOLEAN];

SetHighCapFeederConfigured: PROCEDURE [configured: BOOLEAN];

SetImageTrimValues: PROCEDURE [type: ImageTrimType, value: ImageTrimRangeType];

SetKeyboardType: PROCEDURE [keyboard: KeyboardType];

SetMachineDomainName: PROCEDURE [domain: LONG STRING];

SetMachineOrganization: PROCEDURE [organization: LONG STRING];

SetMachineSimplePassword: PROCEDURE [password: Auth.HashedPassword];
```

Copyright © 1992 Xerox Corporation All Rights Reserved

```
SetMachineStrongPassword: PROCEDURE [password: Auth.Key];

SetMarketRegion: PROCEDURE [market: MarketRegion];

SetNetworkConfigured: PROCEDURE [configured: BOOLEAN];

SetOutputDeviceConfigured: PROCEDURE [configured: OutputDeviceType];

SetPrinterConfigured: PROCEDURE [configured: BOOLEAN];

SetPrinterType: PROCEDURE [printerType: PrinterType];

SetPrintServiceName: PROCEDURE [printerName: LONG STRING];

SetRICConfigured: PROCEDURE [configured: BOOLEAN];

SetScannerConfigured: PROCEDURE [configured: BOOLEAN];

SetSecondLanguageConfigured: PROCEDURE [configured: BOOLEAN];

SetSBMType: PROCEDURE [type: SBMType];


END.
```

Copyright © 1992 Xerox Corporation All Rights Reserved

Copyright © 1992 Xerox Corporation All Rights Reserved

```
-- File: DBError.mesa

-- Copyright (C) 1986, 19 1, 1987, 1988, 1989, 1990 by Xerox Corporation. All rights
reserved.

<<*********************************************************************
*                                    *
* DESCRIPTION: This file provides the definition for the        *
*   database's operation failure error.              *
*                                    *
*********************************************************************>>

DBError: DEFINITIONS =
BEGIN

 -- TYPES

 <<*******************************************************************
 *                                    *
 * DESCRIPTION: Possible reasons why a database procedure fails. *
 *                                    *
 *******************************************************************>>
 ErrorCode: TYPE = {corruptedObject, dataError, diskError, diskFull,
  maxExceeded, memoryFull, missingFile, resourceError, spare1,
  spare2};

 -- SIGNALS

 <<*******************************************************************
 *                                    *
 * DESCRIPTION: Error raised when a database procedure fails.   *
 *                                    *
 *******************************************************************>>
 OperationFailed: SIGNAL[code: ErrorCode];

END.
```

Copyright © 1992 Xerox Corporation All Rights Reserved

```
DBReferenceCount: DEFINITIONS =
 BEGIN

 ScavengeIPFiles: PROCEDURE;

 SetRefCountsAndScavengeOrphans: PROCEDURE;

 END.
```

Copyright © 1992 Xerox Corporation All Rights Reserved

```
-- File: DirectoryType.mesa - last edit:

-- Copyright (C) 1986, 19 1, 1987, 1988, 1989, 1990, 1991 by Xerox Corporation. All rights
reserved.

<<*******************************************************************
*                                  *
* DESCRIPTION:  This file provides the type definitions for     *
*    the creation and manipulation of system directories backed  *
*    by disk files.  A directory is a list of common objects    *
*    stored in segmentZones.                    *
*                                  *
*******************************************************************>>
DIRECTORY
 DirectoryID USING [nullObjectID, ObjectID],
 RTOSFile USING [FileID],
 SegZone USING [Base, nil, RelString];

DirectoryType: DEFINITIONS =
BEGIN

 -- TYPES

 <<*******************************************************************
 *                                 *
 * DESCRIPTION:  Types of accesses to a directory object.      *
 *                                 *
 *******************************************************************>>
 Access: TYPE = {owner, none, all, namedList};

 <<*******************************************************************
 *                                 *
 * DESCRIPTION:  Base pointer to the start of one of a directory's *
 *    segmentZones.                        *
 *                                 *
 *******************************************************************>>
 Base: TYPE = SegZone.Base;

 <<*******************************************************************
 *                                 *
 * DESCRIPTION:  Possible access operator has to a directory     *
 *    object.                        *
 *                                 *
 *******************************************************************>>
 CurrentOperatorAccess: TYPE = {acquire, modify, none};

 <<*******************************************************************
 *                                 *
 * DESCRIPTION:  A piece of a directory that needs to be backed   *
```

Copyright © 1992 Xerox Corporation All Rights Reserved

```
*                                  *
*******************************************************************>>
DirtyObject: TYPE = RECORD[
 -- object which is dirty
 object: NodePtr,
 -- offSet from object to where dirty words begin
 offSet: CARDINAL,
 -- size in words of dirty words
 size: CARDINAL];

<<*******************************************************************
*                                  *
* DESCRIPTION: Possible entry key (item that uniquely identifies *
*    directory objects) for a directory.          *
*                                  *
*******************************************************************>>
EntryKey: TYPE = MACHINE DEPENDENT {id(0), index(2), none(5)};

<<*******************************************************************
*                                  *
* DESCRIPTION: Entry key item and its value.          *
*                                  *
*******************************************************************>>
EntryKeyItem: TYPE = RECORD[
 item: SELECT key: EntryKey FROM
  id => [id: ObjectID],
  index => [index: LONG CARDINAL],
 ENDCASE];

<<*******************************************************************
*                                  *
* DESCRIPTION: Runtime reference to a directory.          *
*                                  *
*******************************************************************>>
Handle: TYPE = LONG POINTER TO Head;

<<*******************************************************************
*                                  *
* DESCRIPTION: Opaque definition of a directory head.          *
*                                  *
*******************************************************************>>
Head: TYPE;

<<*******************************************************************
*                                  *
* DESCRIPTION: Unique id of a directory. The ID is valid across *
*    boots of the system.          *
*                                  *
*******************************************************************>>
ID: TYPE[4];
```

Copyright © 1992 Xerox Corporation All Rights Reserved

```
<<**************************************************************
*                         *
* DESCRIPTION:  List of directory indexes.          *
*                         *
**************************************************************>>
IndexList: TYPE = LONG DESCRIPTOR FOR ARRAY CARDINAL OF
 LONG CARDINAL;

<<**************************************************************
*                         *
* DESCRIPTION:  Runtime reference to a directory.          *
*                         *
**************************************************************>>
Name: TYPE = LONG STRING;

<<**************************************************************
*                         *
* DESCRIPTION:  Distribution list.          *
*                         *
**************************************************************>>
NamedList: TYPE = LONG STRING;

<<**************************************************************
*                         *
* DESCRIPTION:  Reference to a node allocated in a directory.    *
*                         *
**************************************************************>>
NodePtr: TYPE = RECORD[
 segmentZone: CARDINAL,
 pointer: RelPointer];

<<**************************************************************
*                         *
* DESCRIPTION:  Data representation of a nullID.          *
*                         *
**************************************************************>>
NullIDRep: PRIVATE TYPE = RECORD[a, b, c, d: CARDINAL];

<<**************************************************************
*                         *
* DESCRIPTION:  Unique id reference to a directory object.     *
*                         *
**************************************************************>>
ObjectID: TYPE = DirectoryID.ObjectID;

<<**************************************************************
*                         *
* DESCRIPTION:  List of directory objects.          *
*                         *
```

Copyright © 1992 Xerox Corporation All Rights Reserved

```
*****************************************************************>>
ObjectIDList: TYPE = LONG DESCRIPTOR FOR ARRAY CARDINAL OF
 ObjectID;

<<*****************************************************************
*                                                                 *
* DESCRIPTION: Runtime id to an "accessable" directory object.    *
*                                                                 *
*****************************************************************>>
ObjectLockID: TYPE[2];

<<*****************************************************************
*                                                                 *
* DESCRIPTION: Name of a directory object.                        *
*                                                                 *
*****************************************************************>>
ObjectName: TYPE = LONG STRING;

<<*****************************************************************
*                                                                 *
* DESCRIPTION: Position within a directory.                       *
*                                                                 *
*****************************************************************>>
ObjectPosition: TYPE = RECORD[
 var: SELECT position: QueueLocation FROM
  alphabeticalByName => [],
  first, last => [key: EntryKey],
  after, before => [object: EntryKeyItem],
 ENDCASE];

<<*****************************************************************
*                                                                 *
* DESCRIPTION: Possible types of directory objects.               *
*                                                                 *
*****************************************************************>>
ObjectType: TYPE = {font, form, job, jobSeparator, logo,
 pageSeparator, rasterImage, savedProgram, setAddress,
 subDirectory, jobRaster, loopBackRaster, mergeRaster, resImage,
 spare1, spare2};

<<*****************************************************************
*                                                                 *
* DESCRIPTION: Possible security accesses to a directory object.  *
*                                                                 *
*****************************************************************>>
OperatorAccess: TYPE = RECORD[
 item: SELECT access: Access FROM
  all => [],
  namedList => [list: NamedList],
  none => [],
```

Copyright © 1992 Xerox Corporation All Rights Reserved

```
  owner => [],
 ENDCASE];

<<******************************************************************
*                                    *
* DESCRIPTION:  Owner of a directory object.          *
*                                    *
******************************************************************>>
Owner: TYPE = LONG STRING;

<<******************************************************************
*                                    *
* DESCRIPTION:  Possible components of the public part of a     *
*    directory object.                 *
*                                    *
******************************************************************>>
PublicPiece: TYPE = {file, id, idString, index, name, private,
 referenceCount, security, type, versionNumber};

<<******************************************************************
*                                    *
* DESCRIPTION:  An item of the public portion of a directory    *
*    object.                           *
*                                    *
******************************************************************>>
PublicPieceItem: TYPE = RECORD[
 var: SELECT piece: PublicPiece FROM
  file => [file: RTOSFile.FileID],
  id => [object: ObjectID],
  idString => [idString: LONG STRING],
  index => [index: LONG CARDINAL],
  name => [name: ObjectName],
  private => [private: NodePtr],
  referenceCount => [referenceCount: CARDINAL],
  security => [security: SecurityInfo],
  type => [type: ObjectType],
  versionNumber => [versionNumber: CARDINAL],
 ENDCASE];

<<******************************************************************
*                                    *
* DESCRIPTION:  List of public piece items.           *
*                                    *
******************************************************************>>
PublicPieceItems: TYPE = LONG DESCRIPTOR FOR ARRAY CARDINAL OF
 PublicPieceItem;

<<******************************************************************
*                                    *
* DESCRIPTION:  List of public componenets of a directory object. *
```

Copyright © 1992 Xerox Corporation All Rights Reserved

```
*                              *
*****************************************************************>>
PublicPieces: TYPE = LONG DESCRIPTOR FOR ARRAY CARDINAL OF
 PublicPiece;

<<*****************************************************************
*                              *
* DESCRIPTION: Where an object can be located with respect to   *
*    other object.                   *
*                              *
*****************************************************************>>
QueueLocation: TYPE = {after, alphabeticalByName, before, first,
 last};

<<*****************************************************************
*                              *
* DESCRIPTION: Call back procedure that determines the segment  *
*    zones referenced by the private part of a directory object. *
*                              *
*****************************************************************>>
RegisterProc: TYPE = PROCEDURE[base: Base, private: NodePtr]
 RETURNS[segmentZones: SegmentZones];

<<*****************************************************************
*                              *
* DESCRIPTION: Relative pointer to an object within a        *
*    directory's segment zone.          *
*                              *
*****************************************************************>>
RelPointer: TYPE = Base RELATIVE POINTER;

<<*****************************************************************
*                              *
* DESCRIPTION: Relative pointer version of a LONG STRING.    *
*                              *
*****************************************************************>>
RelString: TYPE = SegZone.RelString;

<<*****************************************************************
*                              *
* DESCRIPTION: Security information of a directory object.   *
*                              *
*****************************************************************>>
SecurityInfo: TYPE = RECORD[
 acquireAccess: OperatorAccess ← [all[]],
 currentOperatorAccess: CurrentOperatorAccess ← modify,
 modifyAccess: OperatorAccess ← [all[]],
 owner: Owner ← NIL];

<<*****************************************************************
```

Copyright © 1992 Xerox Corporation All Rights Reserved

```
*                                    *
* DESCRIPTION:  Set of segmentZone indexes within a directory.  *
*                                    *
*****************************************************************>>
SegmentZones: TYPE = LONG DESCRIPTOR FOR ARRAY CARDINAL OF
 CARDINAL;

<<*****************************************************************
*                                    *
* DESCRIPTION:  Reference to a string allocated in a directory.  *
*                                    *
*****************************************************************>>
StringPtr: TYPE = RECORD[
 segmentZone: CARDINAL,
 pointer: RelString];

-- CONSTANTS

<<*****************************************************************
*                                    *
* DESCRIPTION:  NIL relative pointer.                *
*                                    *
*****************************************************************>>
nilPointer: RelPointer = SegZone.nil;

<<*****************************************************************
*                                    *
* DESCRIPTION:  Null directory handle.               *
*                                    *
*****************************************************************>>
nullHandle: Handle = NIL;

<<*****************************************************************
*                                    *
* DESCRIPTION:  Null directory id.                   *
*                                    *
*****************************************************************>>
nullID: ID = LOOPHOLE[NullIDRep[0, 0, 0, 0]];

<<*****************************************************************
*                                    *
* DESCRIPTION:  Null node pointer.                   *
*                                    *
*****************************************************************>>
nullNodePtr: NodePtr = LOOPHOLE[LONG[0]];

<<*****************************************************************
*                                    *
* DESCRIPTION:  Null directory object ID.            *
*                                    *
```

Copyright © 1992 Xerox Corporation All Rights Reserved

```
*******************************************************************>>
nullObjectID: ObjectID = DirectoryID.nullObjectID;

<<*******************************************************************
*                          *
* DESCRIPTION:  Null objectLockID.            *
*                          *
*******************************************************************>>
nullObjectLockID: ObjectLockID = LOOPHOLE[LONG[0]];

<<*******************************************************************
*                          *
* DESCRIPTION:  Null string pointer.            *
*                          *
*******************************************************************>>
nullStringPtr: StringPtr = LOOPHOLE[LONG[0]];

END.
```

Copyright © 1992 Xerox Corporation All Rights Reserved

```
-- Environment.mesa

-- Copyright (C) Xerox Corporation 1982. All rights reserved.

Environment: DEFINITIONS =

 BEGIN

 -- Fundamental properties of the Mesa processor

 bitsPerWord: CARDINAL = 16;
 logBitsPerWord: CARDINAL = 4; -- logarithm of bitsPerWord

 bitsPerByte, bitsPerCharacter: CARDINAL = 8;
 logBitsPerByte, logBitsPerChar: CARDINAL = 3; -- logarithm of bitsPerByte

 bytesPerWord, charsPerWord: CARDINAL = bitsPerWord/bitsPerByte;
 logBytesPerWord, logCharsPerWord: CARDINAL = logBitsPerWord - logBitsPerByte; --
logarithm of bytesPerWord

 wordsPerPage: CARDINAL = 256;
 bytesPerPage, charsPerPage: CARDINAL = wordsPerPage*bytesPerWord;
 logWordsPerPage: CARDINAL = 8; -- logarithm of wordsPerPage
 logBytesPerPage, logCharsPerPage: CARDINAL = logWordsPerPage + logBytesPerWord;
-- logarithm of bytesPerPage

 -- The following is the base pointer to the first 64K of virtual memory
 first64K: Base = LOOPHOLE[LONG[0]];

 maxINTEGER: INTEGER = LAST[INTEGER]; -- 32767
 minINTEGER: INTEGER = FIRST[INTEGER]; -- -32768
 maxCARDINAL: CARDINAL = LAST[CARDINAL]; -- 177777B
 maxLONGINTEGER: LONG INTEGER = LAST[LONG INTEGER]; -- 2147483647
 minLONGINTEGER: LONG INTEGER = FIRST[LONG INTEGER]; -- -2147483648
 maxLONGCARDINAL: LONG CARDINAL = LAST[LONG CARDINAL]; -- 4294967295

 Byte: TYPE = [0..255];
 Word: TYPE = [0..65535];

 Long, LongNumber: TYPE = MACHINE DEPENDENT RECORD [
  SELECT OVERLAID * FROM
   lc => [lc: LONG CARDINAL],
   li => [li: LONG INTEGER],
   lp => [lp: LONG POINTER],
   lu => [lu: LONG UNSPECIFIED],
   num => [lowbits, highbits: CARDINAL],
   any => [low, high: UNSPECIFIED],
   ENDCASE];

 -- Common types used throughout Pilot
```

Copyright © 1992 Xerox Corporation All Rights Reserved

```
Base: TYPE = LONG BASE POINTER;

BitAddress: TYPE = MACHINE DEPENDENT RECORD [
 word: LONG POINTER,
 reserved: [0..LAST[WORD]/bitsPerWord) ← 0,
 bit: [0..bitsPerWord)];

Block: TYPE = RECORD [
 -- descriptor for arbitrary sequence of bytes
 blockPointer: LONG POINTER TO PACKED ARRAY [0..0) OF Byte,
 startIndex, stopIndexPlusOne: CARDINAL];
nullBlock: Block = [NIL, 0, 0];

maxPagesInMDS: CARDINAL = 256;

PageNumber: TYPE = LONG CARDINAL --[0..2**24-2]--;
 -- Note that 2**24-2 is one less than the highest numbered VM page
 -- provided by the hardware; the highest numbered VM page, 2**24-1, is
 -- pre-empted for system purposes.
 firstPageNumber: PageNumber = 0;
 lastPageNumber: PageNumber = 16777214 --2**24-2--;
PageOffset: TYPE = PageNumber;
 firstPageOffset: PageOffset = firstPageNumber;
 lastPageOffset: PageOffset = lastPageNumber;
PageCount: TYPE = LONG CARDINAL --[0..2**24-1]--;
 firstPageCount: PageCount = 0;
 lastPageCount: PageCount = lastPageNumber+1;


-- PageNumber/LONG POINTER conversions

LongPointerFromPage: PROCEDURE [page: PageNumber]
 RETURNS [LONG POINTER] = INLINE {RETURN[LOOPHOLE[page*wordsPerPage]]};

PageFromLongPointer: PROCEDURE [pointer: LONG POINTER]
 RETURNS [PageNumber] = INLINE {
 RETURN[LOOPHOLE[pointer, PageNumber]/wordsPerPage]};


-- The following is OBSOLETE and is retained here for compatibility only.

maxPagesInVM: PageCount = lastPageCount;

END.
```

Copyright © 1992 Xerox Corporation All Rights Reserved

```
DIRECTORY
 FaultLogger USING [ID],
 JobID USING [ID],
 JobQ USING [Priority],
 ResMgrIDs USING [TransactionID];

EventHandler: DEFINITIONS =
 BEGIN
 threshold1Value: LONG CARDINAL = 64000;
 threshold2Value: LONG CARDINAL = 234000;

 ErrorCode: TYPE = {noJobAccepted, jobFaulted, notReadyForTask, spare1, spare2};

 EventData: TYPE = RECORD [
  state: State, jobInfo: JobRecord, resume: Recovery, faultList: FaultList];
 FaultList: TYPE = RECORD [
  adds: FaultPointer,
  deletes: FaultPointer,
  changes: FaultPointer,
  notifies: FaultPointer];
 FaultNode: TYPE = RECORD [
  record: FaultRecord, next: FaultPointer, prev: FaultPointer];

 FaultPointer: TYPE = LONG POINTER TO FaultNode;

 FaultRecord: TYPE = RECORD [
  faultBucket: CARDINAL,
  priority: PriorityType,
  mask: BOOLEAN,
  sense: CARDINAL,
  zone: CARDINAL,
  uniqueID: LoggerPointer,
  jobID: JobID.ID];
 ID: TYPE = RECORD [trans: ResMgrIDs.TransactionID, module: ModuleID];

 JobRecord: TYPE = RECORD [
  jobID: JobID.ID,
  jobChange: {add, delete, change},
  priority: JobQ.Priority,
  jobSize: CARDINAL,
  state: JobState];

 JobState: TYPE = {interrupted, running};

 LoggerNode: TYPE = RECORD [uniqueID: FaultLogger.ID, next: LoggerPointer];
 LoggerPointer: TYPE = LONG POINTER TO LoggerNode;

 MemoryActionCompleteProcType: TYPE = PROCEDURE [id: ID];
```

Copyright © 1992 Xerox Corporation All Rights Reserved

```
ModuleID: TYPE = {
 batch, billing, coalesce, defaults, diagMgr, directory, filing, font,
 frontEnd, graphics, lts, mark, preParse, printFileMgr, postParse, rasterDB,
 rtos, scan, security, signature, ssc, tem, translator, vudu};

PriorityType: TYPE = {techRepNow, operNow, status, information, operLater};

Recovery: TYPE = {
 none, cancel, resume, cancelSave, save, resumeSave, cancelResume,
 resumeCancelSave};

StartScanResult: TYPE = {cff, conflict, none, platen, rdh, sadh, separator};

State: TYPE = {ready, notReady, running, off};

Error: SIGNAL [code: ErrorCode];

ReportFaultChange: PROCEDURE [id: ID, faultList: FaultList];

ReportJobChange: PROCEDURE [id: ID, jobInfo: JobRecord];

ReportAboutToComplete: PROCEDURE [id: ID, jobID: JobID.ID];

ReportStateChange: PROCEDURE [id: ID, data: EventData];

ResourceAvailable: PROCEDURE [trans: ResMgrIDs.TransactionID]
 RETURNS [resourceAvailable: BOOLEAN ← TRUE];

END.
```

Copyright © 1992 Xerox Corporation All Rights Reserved

```
-- File: EventLogger.mesa

-- Copyright (C) 1985, 1986, 1987, 1988 by Xerox Corporation. All rights reserved.

DIRECTORY
 ;

EventLogger: DEFINITIONS =
 BEGIN


-- PROCEDURES

 Event: TYPE = CARDINAL;
 -- Event values are assigned outside of this interface.

 CreateLog: PROCEDURE [entries: CARDINAL];
 << Sets up the internal logger database (ie: allocates memory, etc.). Somebody should
call this before using Log.  Entries is the number of Log entries that the log can hold. >>

 DestroyLog: PROCEDURE;
 << Frees the internal logger database (ie: deallocates memory, etc.)>>

 Log: PROCEDURE[event: Event];
 << Causes logger to time stamp and enter event into its database. >>

 ResetLog: PROCEDURE;
 << Emptys the internal logger database.>>


 END... RMLogger
```

Copyright © 1992 Xerox Corporation All Rights Reserved

```
-- File: FaultLogger.mesa

-- Copyright (C) 1987, 1988, 1989 by Xerox Corporation. All rights reserved.

FaultLogger: DEFINITIONS =

BEGIN

-- Constants
 firstFaultNumber: FaultNumber = FIRST[FaultNumber];

 lastFaultNumber: FaultNumber = LAST[FaultNumber];

 nullLogID: ID = LOOPHOLE[LAST[LONG CARDINAL]];

-- Types
 SubSystem: TYPE = MACHINE DEPENDENT {null(0), print(1), control(2), scan(3)};

 SWModule: TYPE = MACHINE DEPENDENT {
        null(0), diagMgr(1), dialog(2), graphics(3), imageMgmt(4),
        makeReady(5), iit(6), print(7), scan(8), sysMgr(9),
        sysSW(10), tem(11), topLevel(12), plmEast(13), plmWest(14),
        iot(15), rasterDB(16), directory(17), security(18),
        decomposer(19), ics(20), fonts(21), gladiator(22), filing(23),
         spare8(24), spare9(25), spare10(26), spare11(27), spare12(28), (99)};

 Reserved: TYPE = [0..999];

 FaultNumber: TYPE = CARDINAL;

 Fault: TYPE = RECORD [
    subsystem: SubSystem,
    swModule: SWModule,       -- software module name
    reserved: Reserved ← 0,    -- reserved field
    faultNumber: FaultNumber];   -- problem number

 ID : TYPE[2];

-- Procedures Interfaces
<<**************************************************************************
****
 DESCRIPTION:
  Log logs the specified fault.

 INPUTS:
   fault that is to be logged.  shutdown specifies whether or not the
   fault caused a shut down.

 OUTPUTS:
```

Copyright © 1992 Xerox Corporation All Rights Reserved

```
   returns an ID that can later be used to determine the original fault.
******************************************************************************
>>
 Log : PROCEDURE [fault: Fault, shutdown: BOOLEAN ← FALSE]
   RETURNS[id: ID];

END.. -- FaultLogger.
```

Copyright © 1992 Xerox Corporation All Rights Reserved

```
DIRECTORY
 IOTTypes USING [Feeder];
FeatureStatusDefaults: DEFINITIONS =
 BEGIN

 BinType: TYPE = CARDINAL [1..2];

 GetPostParseParms: PROCEDURE []
  RETURNS [
   APenabled: BOOLEAN, BPenabled: BOOLEAN, EPenabled: BOOLEAN,
   CharSubEnabled: BOOLEAN];

 GetAccountingPageEnabled: PROCEDURE [] RETURNS [enabled: BOOLEAN];

 SetAccountingPageEnabled: PROCEDURE [enabled: BOOLEAN];

 GetAccountingPageEnabledStored: PROCEDURE [] RETURNS [enabled: BOOLEAN];

 SetAccountingPageEnabledStored: PROCEDURE [enabled: BOOLEAN];

 GetAutoBinSwitching: PROCEDURE [] RETURNS [enabled: BOOLEAN];

 SetAutoBinSwitching: PROCEDURE [enabled: BOOLEAN];

 GetAutoSizeEnabled: PROCEDURE [] RETURNS [enabled: BOOLEAN];

 SetAutoSizeEnabled: PROCEDURE [enabled: BOOLEAN];

 GetBarCodeReaderEnabled: PROCEDURE [] RETURNS [enabled: BOOLEAN];
```

Copyright © 1992 Xerox Corporation All Rights Reserved

```
SetBarCodeReaderEnabled: PROCEDURE [enabled: BOOLEAN];

GetBinEnabled: PROCEDURE [bin: BinType] RETURNS [enabled: BOOLEAN];

SetBinEnabled: PROCEDURE [bin: BinType, enabled: BOOLEAN];

GetBinderEnabled: PROCEDURE [] RETURNS [enabled: BOOLEAN];

SetBinderEnabled: PROCEDURE [enabled: BOOLEAN];

GetBreakPageEnabled: PROCEDURE [] RETURNS [enabled: BOOLEAN];

SetBreakPageEnabled: PROCEDURE [enabled: BOOLEAN];

GetBreakPageEnabledStored: PROCEDURE [] RETURNS [enabled: BOOLEAN];

SetBreakPageEnabledStored: PROCEDURE [enabled: BOOLEAN];

GetBypassTransportInPlace: PROCEDURE [] RETURNS [inPlace: BOOLEAN];

SetBypassTransportInPlace: PROCEDURE [inPlace: BOOLEAN];

GetCFFEnabled: PROCEDURE [] RETURNS [enabled: BOOLEAN];

SetCFFEnabled: PROCEDURE [enabled: BOOLEAN];

GetCharSubstitutionEnabled: PROCEDURE [] RETURNS [enabled: BOOLEAN];

SetCharSubstitutionEnabled: PROCEDURE [enabled: BOOLEAN];

GetDFAEnabled: PROCEDURE [] RETURNS [enabled: BOOLEAN];
```

Copyright © 1992 Xerox Corporation All Rights Reserved

```
SetDFAEnabled: PROCEDURE [enabled: BOOLEAN];

GetDuplexEnabled: PROCEDURE [] RETURNS [enabled: BOOLEAN];

SetDuplexEnabled: PROCEDURE [enabled: BOOLEAN];

GetErrorPageEnabled: PROCEDURE [] RETURNS [enabled: BOOLEAN];

SetErrorPageEnabled: PROCEDURE [enabled: BOOLEAN];

GetErrorPageEnabledStored: PROCEDURE [] RETURNS [enabled: BOOLEAN];

SetErrorPageEnabledStored: PROCEDURE [enabled: BOOLEAN];

GetFinisherEnabled: PROCEDURE [] RETURNS [enabled: BOOLEAN];

SetFinisherEnabled: PROCEDURE [enabled: BOOLEAN];

GetFontSubstitutionEnabled: PROCEDURE [] RETURNS [enabled: BOOLEAN];

SetFontSubstitutionEnabled: PROCEDURE [enabled: BOOLEAN];

GetIPCaptureEnabled: PROCEDURE [] RETURNS [enabled: BOOLEAN];

SetIPCaptureEnabled: PROCEDURE [enabled: BOOLEAN];

GetManualBinSwitchingEnabled: PROCEDURE [] RETURNS [enabled: BOOLEAN];

SetManualBinSwitchingEnabled: PROCEDURE [enabled: BOOLEAN];

GetPaperSizeCheckEnabled: PROCEDURE [feeder: IOTTypes.Feeder]
 RETURNS [enabled: BOOLEAN];
```

Copyright © 1992 Xerox Corporation All Rights Reserved

```
SetPaperSizeCheckEnabled: PROCEDURE [feeder: IOTTypes.Feeder, enabled: BOOLEAN];

GetPaperSizeCheckEnabledStored: PROCEDURE [feeder: IOTTypes.Feeder]
 RETURNS [enabled: BOOLEAN];

SetPaperSizeCheckEnabledStored: PROCEDURE [
 feeder: IOTTypes.Feeder, enabled: BOOLEAN];

GetRDHEnabled: PROCEDURE [] RETURNS [enabled: BOOLEAN];

SetRDHEnabled: PROCEDURE [enabled: BOOLEAN];

GetRICEnabled: PROCEDURE [] RETURNS [enabled: BOOLEAN];

SetRICEnabled: PROCEDURE [enabled: BOOLEAN];

GetSADHEnabled: PROCEDURE [] RETURNS [enabled: BOOLEAN];

SetSADHEnabled: PROCEDURE [enabled: BOOLEAN];

GetStitcherEnabled: PROCEDURE [] RETURNS [enabled: BOOLEAN];

SetStitcherEnabled: PROCEDURE [enabled: BOOLEAN];

GetFeederEnabled: PROCEDURE [feeder: IOTTypes.Feeder]
 RETURNS [enabled: BOOLEAN];

SetFeederEnabled: PROCEDURE [feeder: IOTTypes.Feeder, enabled: BOOLEAN];

END.
```

Copyright © 1992 Xerox Corporation All Rights Reserved

Copyright © 1992 Xerox Corporation All Rights Reserved

```
-- File: FECoalesce.mesa

-- Copyright (C) 1988, 1989 by Xerox Corporation. All rights reserved.

-- DESCRIPTION: This interface provides the procedures used for the interface
--        between the coalescer and FrontEnd.

DIRECTORY
 DecomposerCommon USING [ClientContext],
 Image USING [Handle],
 JobID USING [ID],
 MRImageConversionService USING [ImageProcessingTask],
 Page USING [Handle, Side],
 PublicPrinting USING [MediumDimensions],
 Transformation USING [Matrix];

FECoalesce: DEFINITIONS =

 BEGIN «FECoalesce»

 -- TYPES --

 CoalesceInfo: TYPE = RECORD[
  pageHdl: Page.Handle,
  pageSide: Page.Side,
  task: MRImageConversionService.ImageProcessingTask,
  transformation: Transformation.Matrix];
 --
 -- Record of info needed for coalesce tasks
 --

 CoalesceInfoPtr: TYPE = LONG POINTER TO CoalesceInfo;
 --
 -- Pointer to coalesce task info
 --

 ErrorCode: TYPE = {jobIDNotFound, stepNotAdded};
 --
 -- Possible errors raised by procs in this interface
 --

 GetCPInfo: TYPE = RECORD[
```

Copyright © 1992 Xerox Corporation All Rights Reserved

```
 image: Image.Handle,
 mediaDims: PublicPrinting.MediumDimensions,
 preParserContext: DecomposerCommon.ClientContext];
--
-- Record of info needed for GetCP tasks
--

GetCPInfoPtr: TYPE = LONG POINTER TO GetCPInfo;
--
-- Pointer to GetCP task info
--

-- SIGNALS --

Error: SIGNAL [code: ErrorCode];

-- PROCEDURES --

ScheduleCoalesceSteps: PROCEDURE [
 jobID: JobID.ID, coalesceInfo: CoalesceInfoPtr];

-- FUNCTION: Adds postParse, ics, and notify for coalesce steps to the job.
--
-- PARAMETERS:
--  jobID - ID of the job to add the steps to
--  coalesceInfo - record of task info
--
-- RETURN VALUES: none
--
-- SIGNALS: jobIDNotFound, stepNotAdded


ScheduleGetCPSteps: PROCEDURE [jobID: JobID.ID, getCPInfo: GetCPInfoPtr];

-- FUNCTION: Adds postParse and notify for GetCP steps to the job.
--
-- PARAMETERS:
--  jobID - ID of the job to add the steps to
--  getCPInfo - record of task info
--
-- RETURN VALUES: none
--
-- SIGNALS: jobIDNotFound, stepNotAdded

END. «FECoalesce»
```

Copyright © 1992 Xerox Corporation All Rights Reserved

Copyright © 1992 Xerox Corporation All Rights Reserved

Copyright © 1992 Xerox Corporation All Rights Reserved

```
DIRECTORY
 JobBackUp USING [LockID],
 JobID USING [ID],
 Page USING [Handle, Side],
 RasterDirectorySupervisor USING [ID],
 RTOSFile USING [FileID];

FEfromSched: DEFINITIONS =

 BEGIN

 ErrorCode: TYPE = {
  corruptedJob, diskFull, jobIDNotFound, limitsExceeded, notASigJob,
  sheetNotFound};

 Error: SIGNAL [code: ErrorCode];

 CleanUpInterruptedJob: PROCEDURE [lockID: JobBackUp.LockID];

 ConvertToStandard: PROCEDURE [lockID: JobBackUp.LockID];

 DeleteJob: PROCEDURE [lockID: JobBackUp.LockID];

 DeletePreParseJob: PROCEDURE [jobID: JobID.ID];

 FaultSystemLogo: PROCEDURE [faultedLogo: RTOSFile.FileID]
  RETURNS [systemLogoFaulted: BOOLEAN];

 FaultSystemLogoUsingID: PROCEDURE [faultedLogo: RasterDirectorySupervisor.ID]
  RETURNS [systemLogoFaulted: BOOLEAN];

 GetSignaturePages: PROCEDURE [
  jobID: JobID.ID, sheetNum: CARDINAL, sheetSide: Page.Side]
  RETURNS [page1, page2: Page.Handle, pageSide1, pageSide2: Page.Side];

 SaveJob: PROCEDURE [lockID: JobBackUp.LockID];

 ScheduleRotate: PROCEDURE [lockID: JobBackUp.LockID];

 END.
```

Copyright © 1992 Xerox Corporation All Rights Reserved

```
DIRECTORY
 DirectoryType USING [OperatorAccess],
 JobBackUp USING [LockID],
 JobQ USING [CreateDateOption, Disposition, JobReference, Priority],
 MRSignature USING [
  defaultTrimOffset, defaultTrimSizeX, defaultTrimSizeY, TrimOffset, TrimSizeX,
  TrimSizeY],
 PublicPrinting USING [Finishing, MediumDimensions];

FENetSupport: DEFINITIONS =

 BEGIN

 OtherOption: TYPE = RECORD [
  name: LONG STRING, data: LONG DESCRIPTOR FOR ARRAY CARDINAL OF CARDINAL];

 PreParseOptionsType: TYPE = {
  copyCount, collated, docComment, docCreateDate, docCreator, docEndMessage,
  docName, docStartMessage, finishing, finishingMessage, jobAccount,
  jobAcquireAccess, jobComment, jobEndMessage, jobModifyAccess, jobName,
  jobOwner, jobPriority, jobStartMessage, recipientName, senderName, signature,
  slipSheet, other};

 PreParseOptions: TYPE = LONG DESCRIPTOR FOR ARRAY CARDINAL OF
  PreParseOptionsChoice;


 PreParseOptionsChoice: TYPE = RECORD [
  SELECT tag: PreParseOptionsType FROM
  copyCount => [copyCount: CARDINAL ← 1],
  collated => [collated: BOOLEAN ← TRUE],
  docComment => [docComment: LONG STRING ← NIL],
  docCreateDate => [docCreateDate: JobQ.CreateDateOption],
  docCreator => [docCreator: LONG STRING ← NIL],
  docEndMessage => [docEndMessage: LONG STRING ← NIL],
  docName => [docName: LONG STRING ← NIL],
  docStartMessage => [docStartMessage: LONG STRING ← NIL],
  finishing => [
   finishing: PublicPrinting.Finishing ← none,
   stitchA: CARDINAL ← 0,
   stitchB: CARDINAL ← 0,
   stitchNormal: BOOLEAN ← TRUE],
  finishingMessage => [finishingMessage: LONG STRING ← NIL],
  jobAccount => [jobAccount: LONG STRING ← NIL],
  jobAcquireAccess => [jobAcquireAccess: DirectoryType.OperatorAccess],
  jobComment => [jobComment: LONG STRING ← NIL],
  jobEndMessage => [jobEndMessage: LONG STRING ← NIL],
  jobModifyAccess => [jobModifyAccess: DirectoryType.OperatorAccess],
  jobName => [jobName: LONG STRING ← NIL],
```

Copyright © 1992 Xerox Corporation All Rights Reserved

```
 jobOwner => [jobOwner: LONG STRING ← NIL],
 jobPriority => [priority: JobQ.Priority ← medium],
 jobStartMessage => [jobStartMessage: LONG STRING ← NIL],
 recipientName => [recipientName: LONG STRING ← NIL],
 senderName => [senderName: LONG STRING ← NIL],
 signature => [
  trimOffset: MRSignature.TrimOffset ← MRSignature.defaultTrimOffset,
  trimSizeX: MRSignature.TrimSizeX ← MRSignature.defaultTrimSizeX,
  trimSizeY: MRSignature.TrimSizeY ← MRSignature.defaultTrimSizeY],
 slipSheet => [
  on: BOOLEAN ← FALSE, dimensions: PublicPrinting.MediumDimensions ← [0, 0]],
 other => [otherOption: OtherOption],
 ENDCASE];


PreParseParmsReady: PROCEDURE [
 disposition: JobQ.Disposition, preParseOptions: PreParseOptions,
 jobReference: JobQ.JobReference, lockID: JobBackUp.LockID];


END.
```

Copyright © 1992 Xerox Corporation All Rights Reserved

```
DIRECTORY
 RasterDirectorySupervisor USING [ID];

FileFinder: DEFINITIONS =
 BEGIN

 Status: TYPE = {found, notFound, noAccess};

 Directory: TYPE = {img, res, lgo, xcs, lib, spl, seq, frm, fnt};

 FindSIF: PROCEDURE [
  name: LONG STRING, folder: LONG STRING, directory: Directory]
  RETURNS [status: Status, id: RasterDirectorySupervisor.ID];


 END.
```

Copyright © 1992 Xerox Corporation All Rights Reserved

```
DIRECTORY
 Inline USING [HighHalf],
 Real USING [Fix];

FixedPointReal: DEFINITIONS IMPORTS Inline, Real =

 BEGIN

 Number: TYPE = MACHINE DEPENDENT RECORD [
  SELECT OVERLAID * FROM
  if => [frac: CARDINAL, int: INTEGER],
  li => [li: LONG INTEGER],
  lc => [lc: LONG CARDINAL],
  ENDCASE];


 half: Number = [if[int: 0, frac: LOOPHOLE[FIRST[INTEGER]]]];



 Abs: PROCEDURE [n: Number] RETURNS [Number] = INLINE {
  RETURN[IF n.li < 0 THEN [li[-n.li]] ELSE [li[n.li]]]};

 Add: PROCEDURE [m, n: Number] RETURNS [Number] = INLINE {
  RETURN[[li[m.li + n.li]]]};

 Ceil: PROCEDURE [n: Number] RETURNS [INTEGER] = INLINE {
  RETURN[IF n.frac = 0 THEN n.int ELSE n.int + 1]};

 Div: PROCEDURE [n, d: Number] RETURNS [Number] = INLINE {
  RETURN[FromReal[ToReal[n] / ToReal[d]]]};

 DivInt: PROCEDURE [n: Number, d: INTEGER] RETURNS [Number];

 Fix: PROCEDURE [n: Number] RETURNS [INTEGER] = INLINE {
  RETURN[IF n.int < 0 THEN Inline.HighHalf[n.li + 177777B] ELSE n.int]};

 Floor: PROCEDURE [n: Number] RETURNS [INTEGER] = INLINE {RETURN[n.int]};

 FromRational: PROCEDURE [n, d: INTEGER] RETURNS [Number];

 FromReal: PROCEDURE [real: REAL] RETURNS [Number] = INLINE {
  RETURN[[li[Real.Fix[65536.0 * real]]]]};

 Mul: PROCEDURE [m, n: Number] RETURNS [Number];

 MulDiv: PROCEDURE [m, n, d: INTEGER] RETURNS [Number];

 MulInt: PROCEDURE [m: Number, n: INTEGER] RETURNS [Number];
```

Copyright © 1992 Xerox Corporation All Rights Reserved

```
Neg: PROCEDURE [num: Number] RETURNS [Number] = INLINE {RETURN[[li[-num.li]]]};

Round: PROCEDURE [n: Number] RETURNS [INTEGER] = INLINE {
 RETURN[
  IF n.int < 0 THEN Inline.HighHalf[n.li + 77777B]
  ELSE Inline.HighHalf[n.li + 100000B]]};

Sub: PROCEDURE [m, n: Number] RETURNS [Number] = INLINE {
 RETURN[[li[m.li - n.li]]]};

ToReal: PROCEDURE [n: Number] RETURNS [REAL] = INLINE {
 RETURN[n.int + n.frac / 65536.0]};

END.
```

Copyright © 1992 Xerox Corporation All Rights Reserved

```
DIRECTORY
 DirectoryType USING [ObjectID, ObjectIDList],
 Font USING [
  Encoding, Escapement, FamilyName, FontVersion, Orientation, PointSize],
 CoalescerFont USING [CoalescerFontRecList],
 ResMgrStorage USING [Pages],
 RTOSFile USING [FileID, nullID];

FontDS: DEFINITIONS =
 BEGIN

 ErrorCode: TYPE = {
  directoryCorrupted, directoryMissing, fontFaulted, fontNotFound,
  fontReferenced, nameInUse, operationFailed, subdirectoryNotFound};

 FontFileInfo: TYPE = RECORD [
  rasterPageOffset: ResMgrStorage.Pages ← 0,
  rasterPageLength: ResMgrStorage.Pages ← 0,
  metricPageOffset: ResMgrStorage.Pages ← 0,
  metricPageLength: ResMgrStorage.Pages ← 0];

 FontRec: TYPE = RECORD [
  name: LONG STRING ← NIL,
  pointSize: Font.PointSize ← 0,
  heightInPixels: CARDINAL ← 0,
  fontVersion: Font.FontVersion,
  maxEscapement: Font.Escapement,
  fontFile: RTOSFile.FileID ← RTOSFile.nullID,
  orientationArray: OrientationArray,
  faulted: BOOLEAN ← FALSE];

 FontRecPtr: TYPE = LONG POINTER TO FontRec;

 NameAndID: TYPE = RECORD [
  name: Font.FamilyName, id: DirectoryType.ObjectID, faulted: BOOLEAN];

 NameAndIDList: TYPE = LONG DESCRIPTOR FOR ARRAY CARDINAL OF NameAndID;

 Orientation: TYPE = Font .Orientation[inverseLandscape..portrait];
```

Copyright © 1992 Xerox Corporation All Rights Reserved

```
OrientationArray: TYPE = ARRAY Orientation OF FontFileInfo;

Rotation: TYPE = {rotate90, rotate180, rotate270};

SubdirectoryData: TYPE = RECORD [
 name: LONG STRING ← NIL,
 authorityID: LONG STRING ← NIL,
 charCodeID: LONG STRING ← NIL,
 typeFaceID: LONG STRING ← NIL];

Error: ERROR [code: ErrorCode];

AddFont: PROCEDURE [subdirectory: SubdirectoryData, fontRecPtr: FontRecPtr]
 RETURNS [newID: DirectoryType.ObjectID];

CoalesceFonts: PROCEDURE [list: CoalescerFont.CoalescerFontRecList]
 RETURNS [someNotFound: BOOLEAN];

DeleteFont: PROCEDURE [
 font: DirectoryType.ObjectID, subdirectory: DirectoryType.ObjectID];

DeleteSubdirectory: PROCEDURE [subdirectory: DirectoryType.ObjectID];

DereferenceFont: PROCEDURE [
 font: DirectoryType.ObjectID, subdirectory: DirectoryType.ObjectID,
 count: CARDINAL ← 1] RETURNS [newReferenceCount: CARDINAL];

EnumerateSubdirectoryNames: PROCEDURE [zone: UNCOUNTED ZONE]
 RETURNS [names: NameAndIDList];

FindRotated: PROCEDURE [
 subdirectory: DirectoryType.ObjectID, font: DirectoryType.ObjectID,
 orientation: Font.Orientation, rotation: Rotation]
 RETURNS [
  metricPageOffset: ResMgrStorage.Pages,
  metricPageLength: ResMgrStorage.Pages];
```

Copyright © 1992 Xerox Corporation All Rights Reserved

```
FreeFontRec: PROCEDURE [fontRecPtr: FontRecPtr, zone: UNCOUNTED ZONE];

GetFont: PROCEDURE [
 font: DirectoryType.ObjectID, subdirectory: DirectoryType.ObjectID,
 zone: UNCOUNTED ZONE] RETURNS [fontData: FontRecPtr];

GetFontFromFile: PROCEDURE [file: RTOSFile.FileID, offset: ResMgrStorage.Pages]
 RETURNS [font: DirectoryType.ObjectID, subdirectory: DirectoryType.ObjectID];

GetFontIDFromName: PROCEDURE [
 name: LONG STRING, subdirectory: DirectoryType.ObjectID]
 RETURNS [font: DirectoryType.ObjectID];

GetFontNameFromID: PROCEDURE [
 font: DirectoryType.ObjectID, subdirectory: DirectoryType.ObjectID,
 zone: UNCOUNTED ZONE] RETURNS [name: LONG STRING];

GetNumberOfFonts: PROCEDURE [subdirectory: DirectoryType.ObjectID]
 RETURNS [numberOfFonts: CARDINAL];

GetNumberOfSubdirectories: PROCEDURE RETURNS [number: CARDINAL];

GetNumberOfTotalFonts: PROCEDURE RETURNS [numberOfFonts: CARDINAL];

GetSubdirectoryIDFromName: PROCEDURE [name: LONG STRING]
 RETURNS [subdirectory: DirectoryType.ObjectID];

GetSubdirectoryNameFromID: PROCEDURE [
 subdirectory: DirectoryType.ObjectID, zone: UNCOUNTED ZONE]
 RETURNS [name: LONG STRING];

GetSubdirectoryNameFields: PROCEDURE [
 subdirectory: DirectoryType.ObjectID, zone: UNCOUNTED ZONE]
 RETURNS [
  authorityID: LONG STRING, charCodeID: LONG STRING, typeFaceID: LONG STRING];

IsSystemFont: PROCEDURE [fontFile: RTOSFile.FileID]
 RETURNS [isSystemFont: BOOLEAN];
```

Copyright © 1992 Xerox Corporation All Rights Reserved

```
ListFonts: PROCEDURE [
 beginNum, endNum: CARDINAL, subdirectory: DirectoryType.ObjectID,
 zone: UNCOUNTED ZONE] RETURNS [fonts: DirectoryType.ObjectIDList];

ListSubdirectories: PROCEDURE [beginNum, endNum: CARDINAL, zone: UNCOUNTED
ZONE]
 RETURNS [subdirectories: DirectoryType.ObjectIDList];

LookUpFont: PROCEDURE [
 subdirectory: DirectoryType.ObjectID, size: Font.PointSize,
 orientation: Font.Orientation]
 RETURNS [
  font: DirectoryType.ObjectID, metricsFile: RTOSFile.FileID,
  metricPageOffset: ResMgrStorage.Pages,
  metricPageLength: ResMgrStorage.Pages];

LookUpFontForFamilySub: PROCEDURE [
 subdirectory: DirectoryType.ObjectID, size: Font.PointSize,
 orientation: Font.Orientation, zone: UNCOUNTED ZONE]
 RETURNS [
  font: DirectoryType.ObjectID, metricsFile: RTOSFile.FileID,
  metricPageOffset: ResMgrStorage.Pages,
  metricPageLength: ResMgrStorage.Pages, ccid: Font.Encoding,
  name: LONG STRING];

LookUpFontForFontSub: PROCEDURE [
 subdirectory: DirectoryType.ObjectID, font: DirectoryType.ObjectID,
 orientation: Font.Orientation, zone: UNCOUNTED ZONE]
 RETURNS [
  metricsFile: RTOSFile.FileID, metricPageOffset: ResMgrStorage.Pages,
  metricPageLength: ResMgrStorage.Pages, ccid: Font.Encoding,
  name: LONG STRING];

ReferenceFont: PROCEDURE [
 font: DirectoryType.ObjectID, subdirectory: DirectoryType.ObjectID];

SetFaulted: PROCEDURE [
 font: DirectoryType.ObjectID, subdirectory: DirectoryType.ObjectID,
 faulted: BOOLEAN];

SetFaultedByFile: PROCEDURE [
```

Copyright © 1992 Xerox Corporation All Rights Reserved

```
 rasterFile: RTOSFile.FileID, rasterPageOffset: ResMgrStorage.Pages,
 faulted: BOOLEAN];

SetFont: PROCEDURE [
 font: DirectoryType.ObjectID, subdirectory: DirectoryType.ObjectID,
 fontData: FontRecPtr, copyName: BOOLEAN];

SetFontReferenceCount: PROCEDURE [
 font: DirectoryType.ObjectID, subdirectory: DirectoryType.ObjectID,
 referenceCount: CARDINAL];

END.
```

Copyright © 1992 Xerox Corporation All Rights Reserved

```
– File: FontManager.mesa - last edit:

– Copyright (C) 1987, 1988, 1989, 1990 by Xerox Corporation. All rights reserved.

DIRECTORY
 Font USING [Encoding, PointSize],
 Transformation USING [Matrix];

FontManager: DEFINITIONS =
BEGIN

  MakeCCID: PROCEDURE[characterCode: LONG STRING] RETURNS [ccid: Font.Encoding];

  MakeFontName: PROCEDURE[ptSize: Font.PointSize,
    z: UNCOUNTED ZONE] RETURNS [name: LONG STRING];

  MakeFontNameFromTransformation: PROCEDURE[xform: Transformation.Matrix,
    z: UNCOUNTED ZONE] RETURNS [name: LONG STRING];

  MakeFamilyName: PROCEDURE[a,b,c: LONG STRING, z: UNCOUNTED ZONE] RETURNS
[name: LONG STRING];

  MakeFullName: PROCEDURE [a,b,c: LONG STRING, ptSize: Font.PointSize, z: UNCOUNTED
ZONE] RETURNS [name: LONG STRING];

  StartUp: PROCEDURE[];
    <<
     StartUp is called to initialize the FontManager.
    >>

END...
```

Copyright © 1992 Xerox Corporation All Rights Reserved

```
-- File: FontSubstitutionTable.mesa - last edit:

-- Copyright (C) 1986, 19 1, 1987, 1988, 1989, 1990 by Xerox Corporation. All rights
reserved.

<<*********************************************************************
*                                  *
* DESCRIPTION:  This file provides the procedures and type        *
*    definitions by which a client may extract and enter font      *
*    substitituion information into the font substition table.    *
*                                  *
*********************************************************************>>
DIRECTORY
 DirectoryType USING [ObjectID],
 Font USING [Encoding, Orientation, PointSize],
 ResMgrStorage USING [Pages],
 RTOSFile USING [FileID];

FontSubstitutionTable: DEFINITIONS =
BEGIN

 -- TYPES

 <<*******************************************************************
 *                                 *
 * DESCRIPTION:  Possible types of incoming font fields.          *
 *                                 *
 *******************************************************************>>
 Choice: TYPE = {blank, name, pointSize, wildCard};

 <<*******************************************************************
 *                                 *
 * DESCRIPTION:  Data that defines a font substitution table entry.*
 *                                 *
 *******************************************************************>>
 Entry: TYPE = RECORD[
  incoming: IncomingFont,
  substituting: SubstitutingFont];

 <<*******************************************************************
 *                                 *
 * DESCRIPTION:  Possible reasons why an error may be raised by a  *
 *    procedure manipulating the font substitution table.        *
 *                                 *
 *******************************************************************>>
 ErrorCode: TYPE = {entryNotFound, substituteNotFound, tableFull};

 <<*******************************************************************
 *                                 *
 * DESCRIPTION:  Single element defining an incoming font.        *
```

Copyright © 1992 Xerox Corporation All Rights Reserved

```
******************************************************************>>
FontField: TYPE = RECORD[
 type: SELECT choice: Choice FROM
  blank => [],
  pointSize => [size: Font.PointSize],
  wildCard => [],
 ENDCASE];

<<******************************************************************
*                              *
* DESCRIPTION:  Data that defines an incoming font entry.     *
*                              *
******************************************************************>>
IncomingFont: TYPE = RECORD[
 authorityID: TypefaceField,
 charCodeID: TypefaceField,
 typeFaceID: TypefaceField,
 font: FontField];

<<******************************************************************
*                              *
* DESCRIPTION:  Data that defines a substituting font entry.   *
*                              *
******************************************************************>>
SubstitutingFont: TYPE = RECORD[
 -- concatenated name
 authorityID: LONG STRING,
 charCodeID: LONG STRING,
 typeFaceID: LONG STRING,
 font: FontField];

<<******************************************************************
*                              *
* DESCRIPTION:  Table entry for dialog display.          *
*                              *
******************************************************************>>
TableEntry: TYPE = RECORD[
 entry: Entry,
 onDisk: BOOLEAN];

<<******************************************************************
*                              *
* DESCRIPTION:  List of table entries.               *
*                              *
******************************************************************>>
TableEntryList: TYPE = LONG DESCRIPTOR FOR ARRAY CARDINAL OF
 TableEntry;

<<******************************************************************
*                              *
```

Copyright © 1992 Xerox Corporation All Rights Reserved

```
* DESCRIPTION: Entry's index into the substitution table.     *
*                                                             *
*******************************************************************>>
TableIndex: TYPE = CARDINAL;

<<*******************************************************************
*                                                             *
* DESCRIPTION: Single element defining a typeface field.      *
*                                                             *
*******************************************************************>>
TypefaceField: TYPE = RECORD[
 type: SELECT choice: Choice FROM
  blank => [],
  name => [name: LONG STRING],
  wildCard => [],
 ENDCASE];

-- CONSTANTS

<<*******************************************************************
*                                                             *
* DESCRIPTION: Maximum number of entries in table.            *
*                                                             *
*******************************************************************>>
maxNumberOfEntries: TableIndex = 560;

<<*******************************************************************
*                                                             *
* DESCRIPTION: Null table entry.                              *
*                                                             *
*******************************************************************>>
nullEntry: TableIndex = 0;

-- SIGNALS

<<*******************************************************************
*                                                             *
* DESCRIPTION: Possible signals that can be raised from this  *
*   interface.                                                *
*                                                             *
*******************************************************************>>
Error: SIGNAL[code: ErrorCode];

-- PROCEDURES

<<*******************************************************************
*                                                             *
* FUNCTION: Adds a new entry into the font substitution table. *
* PARAMETERS:                                                 *
*   entry - new entry                                         *
```

Copyright © 1992 Xerox Corporation All Rights Reserved

```
*   afterEntry - entry the new entry is placed after.  If    *
*    afterEntry is nullEntry, add new entry at top of table.  *
* RETURN VALUES:                                  *
*   entryIndex - new entry's table index          *
*   onDisk - TRUE if substituting font is on disk       *
* SIGNALS:                                 *
*   Error[entryNotFound] - afterEntry doesn't exist      *
*   Error[tableFull] - table is full            *
*                                 *
*******************************************************************>>
AddEntry: PROCEDURE[entry: Entry, afterEntry: TableIndex]
 RETURNS[entryIndex: TableIndex, onDisk: BOOLEAN];

<<*******************************************************************
*                                 *
* FUNCTION:  Deletes an entry from the font substitution table.  *
* PARAMETERS:                              *
*   entry - entry to be deleted                *
* RETURN VALUES: none                           *
* SIGNALS:                                 *
*   Error[entryNotFound] - entry doesn't exist          *
*                                 *
*******************************************************************>>
DeleteEntry: PROCEDURE[entry: TableIndex];

<<*******************************************************************
*                                 *
* FUNCTION:  Returns the entries in the table from begIndex to  *
*   endIndex.                              *
* PARAMETERS:                              *
*   begIndex - first entry to be retrieved           *
*   endIndex - last entry to be retrieved            *
*   zone - zone where descriptor and strings are allocated   *
* RETURN VALUES:                               *
*   entries - list of entries                  *
* SIGNALS:                                 *
*   Error[entryNotFound] - entry doesn't exist          *
*                                 *
*******************************************************************>>
EnumerateEntries: PROCEDURE[begIndex, endIndex: TableIndex, zone:
 UNCOUNTED ZONE] RETURNS[entries: TableEntryList];

<<*******************************************************************
*                                 *
* FUNCTION:  Finds the substituting font for a desired font.   *
* PARAMETERS:                              *
*   subdirectory - font's family                 *
*   size - point size of font                  *
*   orientation - orientation of font               *
*   zone - memory space where name is allocated         *
```

Copyright © 1992 Xerox Corporation All Rights Reserved

```
* RETURN VALUES:                                  *
*   substitutingFamily - subdirectory of substitute        *
*   substitutingFont - fontID of substitute          *
*   substitutingMetricsFile - metrics file of substitute    *
*   substitutingMetricsPageOffset - metrics page offset of    *
*     substitute                   *
*   substitutingMetricsPageLength - metrics page length of    *
*     substitute                   *
*   characterCode - characterCode of substitute          *
*   name - font's family name                *
* SIGNALS:                         *
*   Error[substituteNotFound] - no substitute exists for font  *
*                             *
*******************************************************************>>
FindSubstitute: PROCEDURE[authorityID: LONG STRING,
 charCodeID: LONG STRING, typeFaceID: LONG STRING, size:
 Font.PointSize, orientation: Font.Orientation, zone: UNCOUNTED
 ZONE] RETURNS[substitutingFamily: DirectoryType.ObjectID,
 substitutingFont: DirectoryType.ObjectID,
 substitutingMetricsFile: RTOSFile.FileID,
 substitutingMetricsPageOffset: ResMgrStorage.Pages,
 substitutingMetricsPageLength: ResMgrStorage.Pages,
 characterCode: Font.Encoding, name: LONG STRING];

<<*******************************************************************
*                             *
* FUNCTION:  Returns the number of entries in the table.      *
* PARAMETERS: none                          *
* RETURN VALUES:                            *
*   numberOfEntries -  number of entries in the table       *
* SIGNALS: none                           *
*                             *
*******************************************************************>>
GetNumberOfEntries: PROCEDURE RETURNS[numberOfEntries: CARDINAL];

<<*******************************************************************
*                             *
* FUNCTION:  Modifies an existing entry.             *
* PARAMETERS:                           *
*   entry - entry modified                  *
*   newValues - entry's new values                *
* RETURN VALUES: none                        *
* SIGNALS:                         *
*   Error[entryNotFound] - entry doesn't exist           *
*                             *
*******************************************************************>>
ModifyEntry: PROCEDURE[entry: TableIndex, newValues: Entry];

<<*******************************************************************
*                             *
```

Copyright © 1992 Xerox Corporation All Rights Reserved

```
 * FUNCTION: Moves an entry within the table.              *
 * PARAMETERS:                                *
 *   entry - entry moved                         *
 *   afterEntry - entry the moved entry is placed after. If   *
 *    afterEntry is 0, move to top of table.              *
 * RETURN VALUES: none                            *
 * SIGNALS:                                 *
 *   Error[entryNotFound] - entry or afterEntry doesn't exist   *
 *                                     *
*****************************************************************>>
 MoveEntry: PROCEDURE[entry: TableIndex, afterEntry: TableIndex];

END.
```

Copyright © 1992 Xerox Corporation All Rights Reserved

```
DIRECTORY
 Environment USING [lastPageCount, PageCount, wordsPerPage],
 Space USING [defaultSwapUnitSize, SwapUnitSize];

Heap: DEFINITIONS =
 BEGIN


 NWords: TYPE = [0..32766);
 unlimitedSize: Environment.PageCount = Environment.lastPageCount;
 minimumNodeSize: READONLY NWords;
 systemZone: READONLY UNCOUNTED ZONE;
 systemMDSZone: READONLY MDSZone;

 Type: TYPE = {normal, uniform, mds};

 Create: PROC [
  initial: Environment.PageCount,
  maxSize: Environment.PageCount ← unlimitedSize,
  increment: Environment.PageCount ← 4,
  swapUnitSize: Space.SwapUnitSize ← Space.defaultSwapUnitSize,
  threshold: NWords ← minimumNodeSize,
  largeNodeThreshold: NWords ← Environment.wordsPerPage / 2,
  ownerChecking: BOOLEAN ← FALSE, checking: BOOLEAN ← FALSE]
  RETURNS [UNCOUNTED ZONE];

 CreateUniform: PROC [
  initial: Environment.PageCount,
  maxSize: Environment.PageCount ← unlimitedSize,
  increment: Environment.PageCount ← 4,
  swapUnitSize: Space.SwapUnitSize ← Space.defaultSwapUnitSize,
  objectSize: NWords, ownerChecking: BOOLEAN ← FALSE, checking: BOOLEAN ← FALSE]
  RETURNS [UNCOUNTED ZONE];

 CreateMDS: PROC [
  initial: Environment.PageCount,
  maxSize: Environment.PageCount ← unlimitedSize,
  increment: Environment.PageCount ← 4,
  swapUnitSize: Space.SwapUnitSize ← Space.defaultSwapUnitSize,
  threshold: NWords ← minimumNodeSize,
  largeNodeThreshold: NWords ← Environment.wordsPerPage / 2,
  ownerChecking: BOOLEAN ← FALSE, checking: BOOLEAN ← FALSE] RETURNS
[MDSZone];

 Delete: PROC [z: UNCOUNTED ZONE, checkEmpty: BOOLEAN ← FALSE];

 DeleteMDS: PROC [z: MDSZone, checkEmpty: BOOLEAN ← FALSE];
```

Copyright © 1992 Xerox Corporation All Rights Reserved

```
Attributes: TYPE = RECORD [
 SELECT tag: Type FROM
 normal => [
  largeNodePages: Environment.PageCount,
  threshold, largeNodeThreshold: NWords],
 uniform => [objectSize: NWords],
 ENDCASE];

GetAttributes: PROC [z: UNCOUNTED ZONE]
 RETURNS [
  heapPages, maxSize, increment: Environment.PageCount,
  swapUnitSize: Space.SwapUnitSize, ownerChecking, checking: BOOLEAN,
  attributes: Attributes];

GetAttributesMDS: PROC [z: MDSZone]
 RETURNS [
  heapPages, largeNodePages, maxSize, increment: Environment.PageCount,
  swapUnitSize: Space.SwapUnitSize, threshold, largeNodeThreshold: NWords,
  ownerChecking, checking: BOOLEAN];

Expand: PROC [z: UNCOUNTED ZONE, pages: Environment.PageCount];
ExpandMDS: PROC [z: MDSZone, pages: Environment.PageCount];
Flush: PROC [z: UNCOUNTED ZONE];
FlushMDS: PROC [z: MDSZone];
OwnerChecking: PROC [z: UNCOUNTED ZONE] RETURNS [BOOLEAN];
OwnerCheckingMDS: PROC [z: MDSZone] RETURNS [BOOLEAN];
Prune: PROC [z: UNCOUNTED ZONE];
PruneMDS: PROC [z: MDSZone];
CheckOwner: PROC [p: LONG POINTER, z: UNCOUNTED ZONE];
CheckOwnerMDS: PROC [p: POINTER, z: MDSZone];
SetChecking: PROC [z: UNCOUNTED ZONE, checking: BOOLEAN];
SetCheckingMDS: PROC [z: MDSZone, checking: BOOLEAN];


Error: ERROR [type: ErrorType];

ErrorType: TYPE = {
 insufficientSpace, invalidHeap, invalidNode, invalidZone, invalidOwner,
 otherError, invalidSize, invalidParameters, maxSizeExceeded};


Handle: TYPE = UNCOUNTED ZONE;
MDSHandle: TYPE = MDSZone;

MakeNode: PROC [z: UNCOUNTED ZONE ← systemZone, n: NWords]
 RETURNS [p: LONG POINTER];
MakeMDSNode: PROC [z: MDSZone ← systemMDSZone, n: NWords] RETURNS [p:
POINTER];

FreeNode: PROC [z: UNCOUNTED ZONE ← systemZone, p: LONG POINTER];
```

Copyright © 1992 Xerox Corporation All Rights Reserved

```
FreeMDSNode: PROC [z: MDSZone ← systemMDSZone, p: POINTER];

END.
```

Copyright © 1992 Xerox Corporation All Rights Reserved

```
HWStatus: DEFINITIONS =

 BEGIN
 VideoChannels: TYPE = RECORD [h1Chan, h2Chan, i1Chan, i2Chan: BOOLEAN];
 GetVideoChannelsFunctional: PROCEDURE [] RETURNS [channel: VideoChannels];
 END.
```

Copyright © 1992 Xerox Corporation All Rights Reserved

```
DIRECTORY
 ESCAlpha USING [alpha, aFSTICKY],
 Inline,
 Mopcodes USING [zESC],
 Real,
 RealOps;

Ieee: DEFINITIONS IMPORTS Inline =
 BEGIN OPEN Real, RealOps;

 SingleReal: TYPE = MACHINE DEPENDENT RECORD [
  m2: CARDINAL, sign: BOOLEAN, exp: [0..377B], m1: [0..177B]];

 Details: TYPE = MACHINE DEPENDENT RECORD [
  sign: BOOLEAN, sticky: BOOLEAN, blank: [0..7777B], type: Real.NumberType];

 Ext: TYPE = RECORD [det: Details, exp: INTEGER, frac: LongNumber];

 LongNumber: TYPE = Inline.LongNumber;


 HiBit: CARDINAL = 100000B;
 NotHiBit: CARDINAL = 077777B;
 ExponentBias: INTEGER = 127;
 ExponentMask: INTEGER = 077600B;
 ExponentShift: INTEGER = 7;
 HiFractionMask: INTEGER = 177B;
 LowSignificandMask: CARDINAL = 177400B;
 FractionShift: INTEGER = 8;
 LeastSignificandBit: INTEGER = 0400B;
 HiddenBit: CARDINAL = 100000B;
 StickyBits: CARDINAL = 77B;
 NotStickyBits: CARDINAL = 177700B;
 MagicLI: LONG INTEGER = LOOPHOLE[20000000000B];
 HalfLC: LONG CARDINAL = LOOPHOLE[20000000000B];
 MagicI: INTEGER = FIRST[INTEGER];
 SignBit: CARDINAL = 100000B;
 ExpSingleMax: INTEGER = 127;
 ExpSingleMin: INTEGER = -126;
 DenormalizedExponent: INTEGER = -127;
 NaNExponent: INTEGER = 128;
 LargestSignificand: LONG CARDINAL = 37777777400B;
 BiasAdjust: INTEGER = 192;


 aSETS: ESCAlpha.alpha = 120B;


 fpmode: RealOps.Mode;
```

Copyright © 1992 Xerox Corporation All Rights Reserved

```
stickyFlags: ExceptionFlags;
thisTimeExceptions: ExceptionFlags;
myExtended: Extended;

LN: PROC [r: LONG UNSPECIFIED] RETURNS [LongNumber] = INLINE {
 RETURN[LOOPHOLE[r, LongNumber]]; };

BitOn: PROC [a, b: UNSPECIFIED] RETURNS [BOOLEAN] = INLINE {
 RETURN[Inline.BITAND[a, b] # 0]; };

Normalized: PROC [g: INTEGER] RETURNS [BOOLEAN] = INLINE {
 RETURN[Inline.BITAND[g, HiddenBit] # 0]; };


ADC3: PROC [a, b, c: CARDINAL] RETURNS [CARDINAL, CARDINAL] = INLINE {
 s: LongNumber;
 s.lc _ LONG[a] + LONG[b] + LONG[c];
 RETURN[s.highbits, s.lowbits];
 };


ADC2: PROC [a, b: CARDINAL] RETURNS [CARDINAL, CARDINAL] = INLINE {
 s: LongNumber; s.lc _ LONG[a] + LONG[b]; RETURN[s.highbits, s.lowbits]; };


Unpack: PROC [REAL] RETURNS [Ext];
Pack: PROC [POINTER TO Ext] RETURNS [REAL];
Round: PROC [POINTER TO Ext];
StepTwo: PROC [POINTER TO Ext];
GRS: PROC [g: INTEGER] RETURNS [INTEGER];
PostNormalize: PROC [POINTER TO Ext];
LongShift: PROC [z: LONG UNSPECIFIED, count: INTEGER]
 RETURNS [LONG UNSPECIFIED] = LOOPHOLE[Inline.DBITSHIFT];
RShift: PROC [z: LONG UNSPECIFIED] RETURNS [LONG UNSPECIFIED] = INLINE {
 RETURN[Inline.DBITSHIFT[z, -1]]};
LShift: PROC [z: LONG UNSPECIFIED] RETURNS [LONG UNSPECIFIED] = INLINE {
 RETURN[Inline.DBITSHIFT[z, 1]]};
RShift1in1: PROC [z: LONG UNSPECIFIED] RETURNS [LONG UNSPECIFIED];
DeNormalize: PROC [z: POINTER TO Ext, count: INTEGER];
Mul32: PROC [x, y: LongNumber] RETURNS [LongNumber, LongNumber];
FixExtended: PUBLIC PROC [z: Ext, rmode: RoundingMode]
 RETURNS [v: LONG INTEGER, invalid, overflow: BOOLEAN];
SetInexactResult: PROC;
SetInvalidOperation: PROC;
SetDivisionByZero: PROC;
SetUnderflow: PROC [POINTER TO Ext];
SetOverflow: PROC [POINTER TO Ext];
SetFixOverflow: PROC;
CVExtended: PROC [POINTER TO Ext];
CFExtended: PROC [zz: LONG POINTER TO Extended, z: POINTER TO Ext];
```

Copyright © 1992 Xerox Corporation All Rights Reserved

```
NormalType: PROC [x, y: Details] RETURNS [INTEGER];

MicroStickySet: PROC;

lResultSticky: CARDINAL = 1;
lResultEnable: CARDINAL = 100000B;

MicroSticky: PROC [CARDINAL] RETURNS [CARDINAL] = MACHINE CODE {
 Mopcodes.zESC, ESCAlpha.aFSTICKY; };

Initieee: PROC;

funny: INTEGER = 02B;
TNnn: INTEGER = 00B;
TNnz: INTEGER = 01B;
TNzn: INTEGER = 02B;
TNzz: INTEGER = 03B;

END.
```

Copyright © 1992 Xerox Corporation All Rights Reserved

```
DIRECTORY
 IIPFragmentDS USING [IIPFragmentRec];

IIPFragMgr: DEFINITIONS =
 BEGIN

 Error: ERROR [code: ErrorCode];
 ErrorCode: TYPE = {
  invalidFileID, invalidFragID, invalidHandle, invalidTransID, noResources,
  allocError, other, wrongBlock};

 DeleteFrag: PROCEDURE [fragInfo: IIPFragmentDS.IIPFragmentRec];

 END.
```

Copyright © 1992 Xerox Corporation All Rights Reserved

```
DIRECTORY
 BlockStream USING [Block, nullBlock],
 DecomposerCommon USING [ClientContext],
 FaultLogger USING [ID, nullLogID],
 InternalIP USING [SourceParameters],
 ResMgr USING [Status],
 ResMgrIDs USING [ID, TransactionID],
 ResMgrStorage USING [BufferList, Pages],
 RTOSFile USING [ErrorType, FileID, nullID];

IIPFragMgrInternal: DEFINITIONS =
 BEGIN


 IIPGenBlockSizeInPages: CARDINAL = 1;
 MaxIIPFragBufferSizeInPages: CARDINAL = 30;
 NumberOfPrePBlocks: CARDINAL = 3;
 NumberOfIIPGenBlocks: CARDINAL = 4;
 FileSizeInPages: CARDINAL = 3100;
 ExtendSizeInPages: CARDINAL = FileSizeInPages;
 DefaultRMID: ResMgrIDs.ID = [trans: captureIP, module: iipGen];



 CurrentDirectoryPtr: TYPE = LONG POINTER TO CurrentDirectory ← NIL;
 CurrentDirectory: TYPE = RECORD [
  dir: DirectoryPtr ← NIL, next: CurrentDirectoryPtr ← NIL];

 DirectoryPtr: TYPE = LONG POINTER TO Directory ← NIL;
 Directory: TYPE = RECORD [
  fileID: RTOSFile.FileID ← RTOSFile.nullID,
  RMID: ResMgrIDs.ID ← DefaultRMID,
  fragCount: CARDINAL ← 0,
  fileSizeInPages: ResMgrStorage.Pages ← 0,
  freePages: ResMgrStorage.Pages ← FileSizeInPages,
  next: DirectoryPtr ← NIL];

 CurrentFragment: TYPE = RECORD [
  dir: DirectoryPtr ← NIL,
  basePage: ResMgrStorage.Pages ← 0,
  lengthInWords: LONG CARDINAL ← 0];

 Object: TYPE = RECORD [
  prePH: DecomposerCommon.ClientContext ← LOOPHOLE[LONG[0]],
  currentFragment: CurrentFragment ← [],
  prePBlockAvail: CONDITION,
  availPrePQ: InternalPrePBlockPtr ← NIL,
  acquirePrePQ: InternalPrePBlockPtr ← NIL,
  ID: ResMgrIDs.ID ← DefaultRMID];
```

Copyright © 1992 Xerox Corporation All Rights Reserved

```
InternalIIPGenBlockPtr: TYPE = LONG POINTER TO InternalIIPGenBlock;
InternalIIPGenBlock: TYPE = RECORD [
 next: InternalIIPGenBlockPtr ← NIL,
 buffer: ResMgrStorage.BufferList ← NIL,
 block: BlockStream.Block ← BlockStream.nullBlock];

InternalPrePBlockPtr: TYPE = LONG POINTER TO InternalPrePBlock;
InternalPrePBlock: TYPE = RECORD [
 next: InternalPrePBlockPtr ← NIL,
 buffer: ResMgrStorage.BufferList ← NIL,
 block: BlockStream.Block ← BlockStream.nullBlock];

PostParseMemQPtr: TYPE = LONG POINTER TO PostParseMemQRec;
PostParseMemQRec: TYPE = RECORD [
 next: PostParseMemQPtr ← NIL,
 transID: ResMgrIDs.TransactionID,
 availIIPGenQ: InternalIIPGenBlockPtr ← NIL,
 usedIIPGenQ: InternalIIPGenBlockPtr ← NIL,
 iipGenBlockAvail: CONDITION];

ErrCode: TYPE = {
 noFreeStaticSpace, notMyStatic, notAllocated, staticAllocationFailed,
 corruptStatic, corruptInternalList, memoryNotInitialized, tooManyFragFiles,
 tooManyFrags, other};
IntErrors: ERROR [code: ErrCode];

DiskErrCodeType: TYPE = {rtosFileError, rmError};
DiskErrCodeRec: TYPE = RECORD [
 context: DecomposerCommon.ClientContext,
 faultID: FaultLogger.ID ← FaultLogger.nullLogID,
 var: SELECT err: DiskErrCodeType FROM
  rtosFileError => [errorType: RTOSFile.ErrorType],
  rmError => [code: ResMgr.Status],
  ENDCASE];
DiskErrors: ERROR [error: DiskErrCodeRec];


zone: UNCOUNTED ZONE;
sourceParms: InternalIP.SourceParameters;

END.
```

Copyright © 1992 Xerox Corporation All Rights Reserved

```
DIRECTORY
 BlockStream USING [
  AcquireBlockProcedure, Block, ReturnBlockProcedure, StreamHandle],
 DecomposerCommon USING [ClientContext],
 DirectoryID USING [ObjectID],
 IIPGenTypes USING [Handle],
 ResMgrIDs USING [TransactionID],
 RTOSFile USING [FileID];

IIPFragMgrPrivate: DEFINITIONS =
 BEGIN

 Handle: TYPE = LONG POINTER TO Object;
 Object: TYPE;

 AcquireBlock: BlockStream.AcquireBlockProcedure;


 AddFileToList: PROCEDURE [fileID: RTOSFile.FileID, fragCount: CARDINAL];


 Create: PROCEDURE [
  prePH: DecomposerCommon.ClientContext, transID: ResMgrIDs.TransactionID]
  RETURNS [h: Handle];


 EndOfJob: PROCEDURE [h: Handle];


 FreePrePStatic: PROCEDURE [h: Handle];


 FreePostPStatic: PROCEDURE [transID: ResMgrIDs.TransactionID];


 GetFragID: PROCEDURE [bsH: BlockStream.StreamHandle]
  RETURNS [fragID: DirectoryID.ObjectID];


 IncFragCount: PROCEDURE [fileID: RTOSFile.FileID, num: CARDINAL ← 1];


 Init: PROCEDURE [];


 InstallFrag: PROCEDURE [h: Handle] RETURNS [bsH: BlockStream.StreamHandle];


 ReOpenFrag: PROCEDURE [
```

Copyright © 1992 Xerox Corporation All Rights Reserved

```
fragID: DirectoryID.ObjectID, bsH: BlockStream.StreamHandle,
length: LONG CARDINAL] RETURNS [block: BlockStream.Block];

Resume: PROCEDURE [h: Handle, abort: BOOLEAN ← FALSE];

ReturnBlock: BlockStream.ReturnBlockProcedure;

SendFrag: PROCEDURE [iipH: IIPGenTypes.Handle, frag: DirectoryID.ObjectID];

END.
```

Copyright © 1992 Xerox Corporation All Rights Reserved

```
DIRECTORY

 ASWFileTypes USING [rasterJob],
 Environment USING [Byte],
 FaultLogger USING [ID, nullLogID],
 ResMgrIDs USING [ID],
 ResMgrStorage USING [BufferList],
 RasterDirectorySupervisor USING [FaultCode, ID, nullID],
 RasterObjects USING [Direction, ImageType, PixelOverhead, PixelSequence],
 RTOSFile USING [FileID],
 Scan USING [
  DocumentStamp, MoireAwayValue, PageRange, ScanningAttributes, ScreenSize,
  TRCValues],
 Transformation USING [Matrix];

IM: DEFINITIONS =

 BEGIN


 Buffer: TYPE = RECORD [
  pointer: LONG POINTER TO PACKED ARRAY OF Environment.Byte,
  bufferSizeInBytes: LONG CARDINAL,
  lengthInBytes: LONG CARDINAL ← 0];

 FaultCode: TYPE = CARDINAL;

 InstallStatus: TYPE = RECORD [
  SELECT status: Status FROM
  completed => [id: RasterDirectorySupervisor.ID],
  imError => [
   fault: FaultCode, faultID: FaultLogger.ID ← FaultLogger.nullLogID],
  dirError => [
   fault: RasterDirectorySupervisor.FaultCode,
   faultID: FaultLogger.ID ← FaultLogger.nullLogID]
  ENDCASE];

 InstallStatusProcType: TYPE = PROCEDURE [
  installHandle: InstallHandle, installStatus: InstallStatus];

 InstallHandle: TYPE [2];

 InstallHandleRep: TYPE = RECORD [a, b: CARDINAL];

 InstallType: TYPE = {
  loopBack, nonRotated, tiledBatch, tiledCnP, tiledCoalecse, simplifyPage};

 NullInstallHandle: InstallHandle = LOOPHOLE[InstallHandleRep[a: 0, b: 0]];
```

Copyright © 1992 Xerox Corporation All Rights Reserved

```
Status: TYPE = {completed, imError, dirError};

Error: ERROR [
 fault: FaultCode, faultID: FaultLogger.ID ← FaultLogger.nullLogID];

AbortInstall: PROCEDURE [installHandle: InstallHandle];

AbortPreParserInstall: PROCEDURE [installHandle: InstallHandle];

AcquireBuffer: PROCEDURE [
 installHandle: InstallHandle, allocateBufferSizeInBytes: LONG CARDINAL,
 waitTillAvailable: BOOLEAN ← FALSE] RETURNS [buffer: Buffer];

AcquirePBTBuffer: PROCEDURE [
 installHandle: InstallHandle, clientId: ResMgrIDs.ID,
 allocateBufferSizeInBytes: LONG CARDINAL, waitTillAvailable: BOOLEAN ← FALSE]
 RETURNS [buffer: Buffer];

CheckToReuseBuffer: PROCEDURE [] RETURNS [ok: BOOLEAN];

CreateInstall: PROCEDURE [
 clientId: ResMgrIDs.ID, installStatusProc: InstallStatusProcType,
 fileSizeInBytesHint: LONG CARDINAL, maxBlockSizeInBytes: LONG CARDINAL,
 aswFileType: CARDINAL ← ASWFileTypes.rasterJob,
 installType: InstallType ← nonRotated, overrideLimits: BOOLEAN ← FALSE,
 waitForInstallAvailable: BOOLEAN ← FALSE]
 RETURNS [installHandle: InstallHandle];

EndOfRESInstall: PROCEDURE [] RETURNS [];

MakeRES: PROCEDURE [Id: RasterDirectorySupervisor.ID]
 RETURNS [fileId: RTOSFile.FileID];

InstallRES: PROCEDURE [
 clientId: ResMgrIDs.ID, resFileName: LONG STRING, replace: BOOLEAN ← TRUE,
 permFile: BOOLEAN ← TRUE] RETURNS [Id: RasterDirectorySupervisor.ID];

ReturnBuffer: PROCEDURE [installHandle: InstallHandle, buffer: Buffer]
 RETURNS [];

ReturnPBTBuffer: PROCEDURE [
 installHandle: InstallHandle, clientId: ResMgrIDs.ID, buffer: Buffer]
 RETURNS [];

TransmitBreakTable: PROCEDURE [
 installHandle: InstallHandle, clientId: ResMgrIDs.ID, pbtBuffer: Buffer]
```

Copyright © 1992 Xerox Corporation All Rights Reserved

```
 RETURNS [];

TransmitInfo: PROCEDURE [
 installHandle: InstallHandle,
 imageType: RasterObjects.ImageType ← pixelVector,
 pixelArrayLengthInBytes: LONG CARDINAL _ 0,
 breakTableLengthInBytes: CARDINAL _ 0, scansPerBreak: CARDINAL ← 16,
 xPixel: CARDINAL, yPixel: CARDINAL,
 pixelSequenceType: RasterObjects.PixelSequence,
 pixelV0ThroughV3: RasterObjects.PixelOverhead,
 xDirection: RasterObjects.Direction, yDirection: RasterObjects.Direction,
 docStamp: Scan.DocumentStamp, pageSelect: Scan.PageRange,
 moireAwayValue: Scan.MoireAwayValue ← 1, screenSize: Scan.ScreenSize,
 scanningAttributes: Scan.ScanningAttributes, trcValues: Scan.TRCValues,
 prevFamilyImageId: RasterDirectorySupervisor.ID ←
  RasterDirectorySupervisor.nullID];

TransmitPixelBlock: PROCEDURE [installHandle: InstallHandle, buffer: Buffer]
 RETURNS [];

TransmitPixelArrayBlock: PROCEDURE [
 installHandle: InstallHandle, buffer: Buffer,
 pixelV0ThroughV3: RasterObjects.PixelOverhead,
 pixelSequenceType: RasterObjects.PixelSequence, lastBuffer: BOOLEAN ← FALSE,
 firstBuffer: BOOLEAN ← FALSE] RETURNS [];

TransmitPixelBufferList: PROCEDURE [
 installHandle: InstallHandle, bufferList: ResMgrStorage.BufferList,
 continueDataLengthInBytes: LONG CARDINAL ← 0,
 continueFileSizeInBytes: LONG CARDINAL ← 0, dataLengthInBytes: LONG CARDINAL,
 pixelEncodingOffset: LONG CARDINAL,
 pixelSequenceType: RasterObjects.PixelSequence,
 pixelV0ThroughV3: RasterObjects.PixelOverhead,
 createContinueFile: BOOLEAN ← FALSE, firstBuffer: BOOLEAN ← FALSE,
 lastBuffer: BOOLEAN ← FALSE, oddByte: BOOLEAN ← FALSE] RETURNS [];

TransmitPixelVectorBlock: PROCEDURE [
 installHandle: InstallHandle, buffer: Buffer,
 pixelV0ThroughV3: RasterObjects.PixelOverhead,
 pixelSequenceType: RasterObjects.PixelSequence, lastBuffer: BOOLEAN ← FALSE,
 firstBuffer: BOOLEAN ← FALSE] RETURNS [];

TransmitPixelVectorInfo: PROCEDURE [
 installHandle: InstallHandle, transformation: Transformation.Matrix,
 imageType: RasterObjects.ImageType ← ipPixelVector,
 pixelArrayLengthInBytes: LONG CARDINAL _ 0, xScale: REAL, yScale: REAL,
 xPixel: CARDINAL, yPixel: CARDINAL] RETURNS [];

END.
```

Copyright © 1992 Xerox Corporation All Rights Reserved

```
-- File: Image.mesa - last edit:

-- Copyright (C) 1985, 1986, 1987, 1988, 1989, 1990 by Xerox Corporation. All rights
reserved.

DIRECTORY
 DirectoryType USING [nullObjectID, ObjectID],
 GrayImage USING [ConversionMethod],
 JobBackUp USING [Base, LockID],
 RasterDirectorySupervisor USING [ID],
 Transformation USING [Identity, Matrix];

Image: DEFINITIONS =
 BEGIN

 --TYPES

 Box: TYPE = RECORD [ --units in master coordinate system (600spi)
  xDimension: CARDINAL,
  yDimension: CARDINAL,
  xPosition: INTEGER,
  yPosition: INTEGER];

 Color: TYPE = RECORD [NATURAL]; -- white = 0, black = NATURAL.LAST

 CompositeType: TYPE = {joinedComposite, rasterComposite, ruleComposite,
  ipFragmentComposite};

 Directory: TYPE = {job, logo};

 EnumerateProc: TYPE = PROC [object: Handle, location: ImageLocation]
  RETURNS [continue: BOOLEAN ← TRUE];

 ErrorCode: TYPE = {invalidHandle, invalidLogo, invalidSubdirectory, nilHandle,
  notAComposite, notARule, notAnIpFragment, notARaster, invalidRemove,
rasterNotFound};

 Handle: TYPE[2];

 ImageOrientation: TYPE = {none, rotate90, rotate180, rotate270, mirrorLeftToRight,
  mirrorTopToLeft, mirrorTopToBottom, mirrorTopToRight};

 ImageLocation: TYPE = RECORD[
  item: SELECT dir: Directory FROM
   job => [lockID: JobBackUp.LockID],
   logo => [logo: DirectoryType.ObjectID, subdirectory:
    DirectoryType.ObjectID],
  ENDCASE];

 ImageQualityMode: TYPE = {coloredBasic, coloredSpecial,
```

Copyright © 1992 Xerox Corporation All Rights Reserved

```
 lowFreqHalftoneSpecial, pasteUpBasic, pasteUpSpecial,
 photoBasic, photoSpecial, photoText, standardBasic,
 standardSpecial};

IpFragmentAttributes: TYPE = RECORD[
 ipFragmentID: DirectoryType.ObjectID];

Object: TYPE;

ObjectData: TYPE = RECORD[
 objectType: Image.ObjectType,
 t: Transformation.Matrix,
 color: Image.Color,
 box: Image.Box,
 partOfLogo: BOOLEAN];

ObjectType: TYPE = {raster, rule, ipFragment, composite};

RasterAttributes: TYPE = RECORD [
 rasterID: RasterDirectorySupervisor.ID];

--CONSTANTS

black: Color = [NATURAL.LAST];
nullHandle: Handle = LOOPHOLE[LONG[0]];
white: Color = [0];

--ERRORs:

Error: ERROR [code: ErrorCode];

--PROCEDURES

Close: PROCEDURE [object: Handle, location: ImageLocation];
 -- To be called when the image is no longer needed for display purposes
-- Raises Error[invalidLogo] if logo does not exist
-- Raises Error[invalidSubdirectory] if logo subdirectory does not exist

ConcatT: PROCEDURE[object: Handle, location: ImageLocation,
 t: Transformation.Matrix];
-- concatenates t to the current transformation
-- Raises Error[nilHandle] if object = nilPointer
-- Raises Error[invalidLogo] if logo does not exist
-- Raises Error[invalidSubdirectory] if logo subdirectory does not exist

ConvertIPFragmentToRaster: PROC[location: ImageLocation, object:
 Handle, attributes: RasterAttributes];
-- Raises Error[nilHandle] if object = nilPointer
-- Raises Error[notAnIpFragment] if object's ObjectType is not ipFragment
```

Copyright © 1992 Xerox Corporation All Rights Reserved

```
Copy: PROCEDURE [object: Handle, copyDisplayImage: BOOLEAN ← FALSE,
 location: ImageLocation, copiesLocation: ImageLocation]
 RETURNS [copy: Handle];
 -- 'object' is the image to be copied
 -- 'lockID' is the lock of the job in which 'object' resides
 -- 'copiesLockID' is the lock of the job for which 'copy' is
 --   to be allocated.
 -- If copyDisplayImage is true, the Display Image will be copied
 -- Raises Error[invalidLogo] if logo does not exist
 -- Raises Error[invalidSubdirectory] if logo subdirectory does not exist


CreateIpFragment: PROCEDURE [location: ImageLocation,
 box: Box, color: Color ← black, attributes: IpFragmentAttributes ←
 [DirectoryType.nullObjectID], transformation:
 Transformation.Matrix ← Transformation.Identity]
 RETURNS [object: Handle];
 -- 'lockID' is the lock of the job for which 'object' is
 -- Raises Error[invalidLogo] if logo does not exist
 -- Raises Error[invalidSubdirectory] if logo subdirectory does not exist
 --   to be allocated.

CreateRaster: PROCEDURE [location: ImageLocation, box: Box,
 color: Color ← black, attributes: RasterAttributes,
 transformation: Transformation.Matrix ← Transformation.Identity,
 imageQualityMode: ImageQualityMode ← standardBasic]
 RETURNS [object: Handle];
 -- 'lockID' is the lock of the job for which 'object' is
 --   to be allocated.
 -- Raises Error[invalidLogo] if logo does not exist
 -- Raises Error[invalidSubdirectory] if logo subdirectory does not exist

CreateRasterComposite: PROCEDURE [location: ImageLocation, box: Box,
 color: Color ← black, attributes: RasterAttributes,
 transformation: Transformation.Matrix ← Transformation.Identity,
 imageQualityMode: ImageQualityMode ← standardBasic]
 RETURNS [object: Handle];

CreateRule: PROCEDURE [location: ImageLocation, box: Box, color: Color]
 RETURNS [object: Handle];
 -- 'lockID' is the lock of the job for which 'object' is
 -- to be allocated.
 -- Raises Error[invalidLogo] if logo does not exist
 -- Raises Error[invalidSubdirectory] if logo subdirectory does not exist

Delete: PROC [object: Handle, location: ImageLocation];
-- NOTE:  object MUST be removed from the tree before calling Delete or the
--   database will be corrupted
-- Raises Error[nilHandle] if object = nilPointer
-- Raises Error[invalidLogo] if logo does not exist
```

Copyright © 1992 Xerox Corporation All Rights Reserved

```
-- Raises Error[invalidSubdirectory] if logo subdirectory does not exist

DeleteFiles: PROC [object: Handle, base: JobBackUp.Base];
-- deletes all of the RES files of the given image.
-- NOTE: Should only be called when deleting the job since it will leave the
--    remaining Image.Object in an inconsistant state
-- Raises Error[invalidLogo] if logo does not exist
-- Raises Error[invalidSubdirectory] if logo subdirectory does not exist

EnumerateObjectsFirstToLast: PROC [composite: Handle, location: ImageLocation,
 proc: EnumerateProc];
-- visit children of composite in first to last order
-- Raises Error[nilHandle] if composite = nilPointer
-- Raises Error[notAComposite] if composite's ObjectType is not composite
-- Raises Error[invalidLogo] if logo does not exist
-- Raises Error[invalidSubdirectory] if logo subdirectory does not exist

EnumerateObjectsLastToFirst: PROC [composite: Handle, location: ImageLocation,
 proc: EnumerateProc];
--visit children of composite in last to first order
-- Raises Error[nilHandle] if composite = nilPointer
-- Raises Error[notAComposite] if composite's ObjectType is not composite
-- Raises Error[invalidLogo] if logo does not exist
-- Raises Error[invalidSubdirectory] if logo subdirectory does not exist

EnumerateSingleObjectsFirstToLast: PROC [composite: Handle,
 location: ImageLocation, proc: EnumerateProc];
-- visit all single objects descended from composite in first to last order
-- Raises Error[nilHandle] if composite = nilPointer
-- Raises Error[invalidLogo] if logo does not exist
-- Raises Error[invalidSubdirectory] if logo subdirectory does not exist

EnumerateSingleObjectsLastToFirst: PROC [composite: Handle,
 location: ImageLocation, proc: EnumerateProc];
-- visit all single objects descended from composite in last to first order
-- Raises Error[nilHandle] if composite = nilPointer
-- Raises Error[invalidLogo] if logo does not exist
-- Raises Error[invalidSubdirectory] if logo subdirectory does not exist

GetBox: PROC [object: Handle, location: ImageLocation] RETURNS [box: Box];
-- Raises Error[nilHandle] if object = nilPointer
-- Raises Error[invalidLogo] if logo does not exist
-- Raises Error[invalidSubdirectory] if logo subdirectory does not exist

GetColor: PROC [object: Handle, location: ImageLocation]
 RETURNS [color: Color];
-- Raises Error[invalidHandle] if object's ObjectType is not raster or rule
-- Raises Error[nilHandle] if object = nilPointer
-- Raises Error[invalidLogo] if logo does not exist
-- Raises Error[invalidSubdirectory] if logo subdirectory does not exist
```

Copyright © 1992 Xerox Corporation All Rights Reserved

GetCompositeType: PROC [object: Handle, location: ImageLocation]
RETURNS [compositeType: CompositeType];
-- Raises Error[nilHandle] if object = nilPointer
-- Raises Error[notAComposite] if object's ObjectType is not composite
-- Raises Error[invalidLogo] if logo does not exist
-- Raises Error[invalidSubdirectory] if logo subdirectory does not exist GetDisplayAlgorithm: PROCEDURE [object: Handle, location: ImageLocation]
RETURNS [algorithm: GrayImage.ConversionMethod];
-- Raises Error[invalidLogo] if logo does not exist
-- Raises Error[invalidSubdirectory] if logo subdirectory does not exist GetFirstChild: PROC [object: Handle, location: ImageLocation]
RETURNS [firstChild: Handle];
-- Raises Error[nilHandle] if object = nilPointer
-- Raises Error[notAComposite] if object's ObjectType is not composite
-- Raises Error[invalidLogo] if logo does not exist
-- Raises Error[invalidSubdirectory] if logo subdirectory does not exist GetImageQualityMode: PROC[object: Handle, location: ImageLocation]
RETURNS[mode: ImageQualityMode];
-- Raises Error[nilHandle] if object = nilPointer
-- Raises Error[notARaster] if object's ObjectType is not raster GetIpFragmentAttributes: PROC [object: Handle, location: ImageLocation]
RETURNS [attributes: IpFragmentAttributes];
-- Raises Error[nilHandle] if object = nilPointer
-- Raises Error[notAnIpFragment] if object's ObjectType is not ipFragment
-- Raises Error[invalidLogo] if logo does not exist
-- Raises Error[invalidSubdirectory] if logo subdirectory does not exist GetIpFragmentDimensions: PROC [object: Handle, location:
ImageLocation] RETURNS [xDim, yDim: CARDINAL];
-- Raises Error[nilHandle] if object = nilPointer
-- Raises Error[notAnIpFragment] if object's ObjectType is not ipFragment
-- Raises Error[invalidLogo] if logo does not exist
-- Raises Error[invalidSubdirectory] if logo subdirectory does not exist GetLastChild: PROC [object: Handle, location: ImageLocation]
RETURNS [lastChild: Handle];
-- Raises Error[nilHandle] if object = nilPointer
-- Raises Error[notAComposite] if object's ObjectType is not composite
-- Raises Error[invalidLogo] if logo does not exist
-- Raises Error[invalidSubdirectory] if logo subdirectory does not exist GetNext: PROC [object: Handle, location: ImageLocation] RETURNS [next: Handle];
-- Raises Error[nilHandle] if object = nilPointer
-- Raises Error[invalidLogo] if logo does not exist
-- Raises Error[invalidSubdirectory] if logo subdirectory does not exist Copyright © 1992 Xerox Corporation All Rights Reserved

```
GetObjectData: PROCEDURE[object: Image.Handle, location:
 Image.ImageLocation] RETURNS[objectData: ObjectData];

GetObjectType: PROC [object: Handle, location: ImageLocation]
 RETURNS [objectType: ObjectType];
-- Raises Error[nilHandle] if object = nilPointer
-- Raises Error[invalidLogo] if logo does not exist
-- Raises Error[invalidSubdirectory] if logo subdirectory does not exist

GetOrientation: PROCEDURE [object: Handle, location: ImageLocation]
 RETURNS [orientation: ImageOrientation];
-- Raises Error[invalidLogo] if logo does not exist
-- Raises Error[invalidSubdirectory] if logo subdirectory does not exist

GetParent: PROC [object: Handle, location: ImageLocation]
 RETURNS [parent: Handle];
-- Raises Error[nilHandle] if object = nilPointer
-- Raises Error[invalidLogo] if logo does not exist
-- Raises Error[invalidSubdirectory] if logo subdirectory does not exist

GetPrevious: PROC [object: Handle, location: ImageLocation]
 RETURNS [previous: Handle];
-- Raises Error[nilHandle] if object = nilPointer
-- Raises Error[invalidLogo] if logo does not exist
-- Raises Error[invalidSubdirectory] if logo subdirectory does not exist

GetRasterAttributes: PROC [object: Handle, location: ImageLocation]
 RETURNS [attributes: RasterAttributes];
-- Raises Error[nilHandle] if object = nilPointer
-- Raises Error[notARaster] if object's ObjectType is not raster
-- Raises Error[invalidLogo] if logo does not exist
-- Raises Error[invalidSubdirectory] if logo subdirectory does not exist

GetSelectionLockOut: PROCEDURE [object: Handle, location: ImageLocation]
  RETURNS [isLocked: BOOLEAN];
-- Raises Error[nilHandle] if object = nilPointer
-- Raises Error[invalidLogo] if logo does not exist
-- Raises Error[invalidSubdirectory] if logo subdirectory does not exist

GetT: PROCEDURE[object: Handle, location: ImageLocation]
 RETURNS[t: Transformation.Matrix];
-- returns the current transformation
-- Raises Error[nilHandle] if object = nilPointer
-- Raises Error[invalidLogo] if logo does not exist
-- Raises Error[invalidSubdirectory] if logo subdirectory does not exist

GetTransparency: PROC [object: Handle, location: ImageLocation]
 RETURNS [transparent: BOOLEAN];
-- Raises Error[invalidHandle] if object's ObjectType is not raster or rule
```

Copyright © 1992 Xerox Corporation All Rights Reserved

```
-- Raises Error[nilHandle] if object = nilPointer
-- Raises Error[invalidLogo] if logo does not exist
-- Raises Error[invalidSubdirectory] if logo subdirectory does not exist

InsertAfter: PROC [object: Handle, previous: Handle, location: ImageLocation];
-- Inserts object into tree after previous
-- NOTE: object.parent, object.previous and object.next MUST = nilPointer
--  and previous.parent MUST NOT = nilPointer
--  otherwise the database will be corrupted
-- Raises Error[invalidHandle] if the ObjectType of an ancestor of previous
--   is not composite ( cannot occur in a valid database )
-- Raises Error[nilHandle] if object or previous = nilPointer
-- Raises Error[notAComposite] if previous.parent's ObjectType # composite
--   ( cannot occur in a valid database )
-- Raises Error[invalidLogo] if logo does not exist
-- Raises Error[invalidSubdirectory] if logo subdirectory does not exist

InsertBefore: PROC [object: Handle, next: Handle, location: ImageLocation];
-- Inserts object into tree before next
-- NOTE: object.parent, object.previous and object.next MUST = nilPointer
--  and next.parent MUST NOT = nilPointer
--  otherwise the database will be corrupted
-- Raises Error[invalidHandle] if the ObjectType of an ancestor of next
--   is not composite ( cannot occur in a valid database )
-- Raises Error[nilHandle] if object or next = nilPointer
-- Raises Error[notAComposite] if next.parent's ObjectType # composite
--   ( cannot occur in a valid database )
-- Raises Error[invalidLogo] if logo does not exist
-- Raises Error[invalidSubdirectory] if logo subdirectory does not exist

InsertFirstChild: PROC [object: Handle, composite: Handle,
 location: ImageLocation];
-- Inserts object as first child of composite
-- NOTE: object.parent, object.previous and object.next MUST = nilPointer
--  otherwise the database will be corrupted
-- Raises Error[invalidHandle] if the ObjectType of an ancestor of composite
--   is not composite ( cannot occur in a valid database )
-- Raises Error[nilHandle] if object = nilPointer
-- Raises Error[notAComposite] if composite's ObjectType # composite
-- Raises Error[invalidLogo] if logo does not exist
-- Raises Error[invalidSubdirectory] if logo subdirectory does not exist

InsertLastChild: PROC [object: Handle, composite: Handle,
 location: ImageLocation];
-- Inserts object as last child of composite
-- NOTE: object.parent, object.previous and object.next MUST = nilPointer
--  otherwise the database will be corrupted
-- Raises Error[invalidHandle] if the ObjectType of an ancestor of composite
--   is not composite ( cannot occur in a valid database )
```

Copyright © 1992 Xerox Corporation All Rights Reserved

```
-- Raises Error[nilHandle] if object = nilPointer
-- Raises Error[notAComposite] if composite's ObjectType # composite
-- Raises Error[invalidLogo] if logo does not exist
-- Raises Error[invalidSubdirectory] if logo subdirectory does not exist

IntersectBoxes: PROCEDURE [box1, box2: Image.Box]
 RETURNS [intersectBox: Image.Box];

IsLogo: PROCEDURE[image: Image.Handle, location:
 Image.ImageLocation] RETURNS[isLogo: BOOLEAN];

IsOrphan: PROCEDURE[image: Image.Handle, lockID: JobBackUp.LockID]
 RETURNS[isOrphan: BOOLEAN];

JoinBoxes: PROCEDURE[box1, box2: Box] RETURNS[joined: Box];

MakeComposite: PROC [first: Handle, last: Handle, location: ImageLocation]
 RETURNS [composite: Handle];
-- 'lockID' is the lock of the job from which 'object' is
-- to be allocated from, and the job where first and last reside.
-- make a composite out of ADJACENT objects first thru last
-- Raises Error[invalidHandle] if first and last are not in the correct
--  order on the same level of the tree
-- Raises Error[notAComposite] if first.parent's ObjectType # composite
 -- ( cannot occur in a valid database )
-- Raises Error[invalidLogo] if logo does not exist
-- Raises Error[invalidSubdirectory] if logo subdirectory does not exist

NilAllDisplayImages: PROCEDURE[object: Image.Handle,
 location: Image.ImageLocation, deleteDisplayImage: BOOLEAN ←
 TRUE];
-- Raises Error[invalidLogo] if logo does not exist
-- Raises Error[invalidSubdirectory] if logo subdirectory does not exist

PurgeAllDisplayImages: PROCEDURE [object: Handle,
 location: ImageLocation];
-- Raises Error[invalidLogo] if logo does not exist
-- Raises Error[invalidSubdirectory] if logo subdirectory does not exist

Remove: PROC [object: Handle, location: ImageLocation];
-- delinks object from parent and siblings
-- Raises Error[nilHandle] if object = nilPointer
-- Raises Error[invalidRemove] if object.parent = nilPointer
-- Raises Error[invalidLogo] if logo does not exist
-- Raises Error[invalidSubdirectory] if logo subdirectory does not exist

Replace: PROCEDURE [old, new: Handle, location: ImageLocation];
-- equivalent to
--  Image.InsertAfter[object: new, previous: old, lockID: lockID];
--  Image.Remove[object: old, lockID: lockID];
```

Copyright © 1992 Xerox Corporation All Rights Reserved

-- Raises Error[invalidLogo] if logo does not exist
-- Raises Error[invalidSubdirectory] if logo subdirectory does not exist SetBox: PROC [object: Handle, box: Box, location: ImageLocation];
-- Raises Error[nilHandle] if object = nilPointer
-- Raises Error[invalidLogo] if logo does not exist
-- Raises Error[invalidSubdirectory] if logo subdirectory does not exist SetColor: PROC [object: Handle, color: Color, location: ImageLocation];
-- Raises Error[invalidHandle] if object's ObjectType # raster or rule
-- Raises Error[nilHandle] if object = nilPointer
-- Raises Error[invalidLogo] if logo does not exist
-- Raises Error[invalidSubdirectory] if logo subdirectory does not exist SetDisplayAlgorithm: PROCEDURE[object: Handle,
algorithm: GrayImage.ConversionMethod, location: ImageLocation];
-- Raises Error[invalidLogo] if logo does not exist
-- Raises Error[invalidSubdirectory] if logo subdirectory does not exist SetIPFragmentAttributes: PROCEDURE[object: Handle, attributes:
IpFragmentAttributes, deleteExisting: BOOLEAN ← TRUE, location:
ImageLocation];
-- sets the attributes associated with 'object' to 'attributes'
-- Raises Error[nilHandle] if object = nilPointer
-- Raises Error[notANIPFragment] if object's ObjectType is not ipFragment SetImageQualityMode: PROC[object: Handle, mode: ImageQualityMode,
location: ImageLocation];
-- Raises Error[nilHandle] if object = nilPointer
-- Raises Error[notARaster] if object's ObjectType is not raster SetOrientation: PROCEDURE [object: Handle,
orientation: ImageOrientation, location: ImageLocation];
-- Raises Error[invalidLogo] if logo does not exist
-- Raises Error[invalidSubdirectory] if logo subdirectory does not exist SetPosition: PROC [object: Handle, xPosition: INTEGER, yPosition: INTEGER,
location: ImageLocation];
-- Raises Error[nilHandle] if object = nilPointer
-- Raises Error[invalidLogo] if logo does not exist
-- Raises Error[invalidSubdirectory] if logo subdirectory does not exist SetRasterAttributes: PROC [object: Handle, attributes:
RasterAttributes, xDim: CARDINAL, yDim: CARDINAL, deleteExisting:
BOOLEAN ← TRUE, location: ImageLocation];
-- sets the attributes associated with 'object' to 'attributes'
-- Raises Error[nilHandle] if object = nilPointer
-- Raises Error[notARaster] if object's ObjectType is not raster
-- Raises Error[invalidLogo] if logo does not exist
-- Raises Error[invalidSubdirectory] if logo subdirectory does not exist Copyright © 1992 Xerox Corporation All Rights Reserved

```
SetSelectionLockOut: PROCEDURE [object: Handle,
 locked: BOOLEAN, location: ImageLocation];
-- Raises Error[nilHandle] if object = nilPointer
-- Raises Error[invalidLogo] if logo does not exist
-- Raises Error[invalidSubdirectory] if logo subdirectory does not exist

SetT: PROCEDURE[object: Handle, location: ImageLocation,
 t: Transformation.Matrix];
-- replaces the existing transformation with t
-- Raises Error[nilHandle] if object = nilPointer
-- Raises Error[invalidLogo] if logo does not exist
-- Raises Error[invalidSubdirectory] if logo subdirectory does not exist

UnMakeComposite: PROC [composite: Handle, location: ImageLocation]
 RETURNS [first: Handle, last: Handle];
-- puts the children of 'composite' in the tree where 'composite' was
--  and deletes 'composite'
-- Raises Error[nilHandle] if composite = nilPointer
-- Raises Error[notAComposite] if composite's ObjectType is not composite
-- Raises Error[invalidLogo] if logo does not exist
-- Raises Error[invalidSubdirectory] if logo subdirectory does not exist

END.
```

Copyright © 1992 Xerox Corporation All Rights Reserved

```
DIRECTORY
 DirectoryType USING [nullObjectID, ObjectID],
 GrayImage USING [ConversionMethod],
 JobBackUp USING [Base, LockID],
 RasterDirectorySupervisor USING [ID],
 Transformation USING [Identity, Matrix];

Image: DEFINITIONS =
 BEGIN


 Box: TYPE = RECORD [
  xDimension: CARDINAL,
  yDimension: CARDINAL,
  xPosition: INTEGER,
  yPosition: INTEGER];

 Color: TYPE = RECORD [NATURAL];
 CompositeType: TYPE = {
  joinedComposite, rasterComposite, ruleComposite, ipFragmentComposite};

 Directory: TYPE = {job, logo};

 EnumerateProc: TYPE = PROC [object: Handle, location: ImageLocation]
  RETURNS [continue: BOOLEAN ← TRUE];

 ErrorCode: TYPE = {
  invalidHandle, invalidLogo, invalidSubdirectory, nilHandle, notAComposite,
  notARule, notAnIpFragment, notARaster, invalidRemove, rasterNotFound};

 Handle: TYPE [2];

 ImageOrientation: TYPE = {
  none, rotate90, rotate180, rotate270, mirrorLeftToRight, mirrorTopToLeft,
  mirrorTopToBottom, mirrorTopToRight};

 ImageLocation: TYPE = RECORD [
  item: SELECT dir: Directory FROM
   job => [lockID: JobBackUp.LockID],
   logo => [
    logo: DirectoryType.ObjectID, subdirectory: DirectoryType.ObjectID],
   ENDCASE];

 ImageQualityMode: TYPE = {
  coloredBasic, coloredSpecial, halftoneText, highFreqHalftoneBasic,
  highFreqHalftoneSpecial, lightImageBasic, lightImageSpecial,
  lowFreqHalftoneBasic, lowFreqHalftoneSpecial, pasteUpBasic, pasteUpSpecial,
  photoBasic, photoSpecial, photoText, standardBasic, standardSpecial};
```

Copyright © 1992 Xerox Corporation All Rights Reserved

```
IpFragmentAttributes: TYPE = RECORD [ipFragmentID: DirectoryType.ObjectID];

Object: TYPE;

ObjectData: TYPE = RECORD [
 objectType: Image.ObjectType,
 t: Transformation.Matrix,
 color: Image.Color,
 box: Image.Box,
 partOfLogo: BOOLEAN];

ObjectType: TYPE = {raster, rule, ipFragment, composite};

RasterAttributes: TYPE = RECORD [rasterID: RasterDirectorySupervisor.ID];


black: Color = [NATURAL.LAST];
nullHandle: Handle = LOOPHOLE[LONG[0]];
white: Color = [0];


Error: ERROR [code: ErrorCode];


Close: PROCEDURE [object: Handle, location: ImageLocation];

ConcatT: PROCEDURE [
 object: Handle, location: ImageLocation, t: Transformation.Matrix];

ConvertIPFragmentToRaster: PROC [
 location: ImageLocation, object: Handle, attributes: RasterAttributes];

Copy: PROCEDURE [
 object: Handle, copyDisplayImage: BOOLEAN ← FALSE, location: ImageLocation,
 copiesLocation: ImageLocation] RETURNS [copy: Handle];


CreateIpFragment: PROCEDURE [
 location: ImageLocation, box: Box, color: Color ← black,
 attributes: IpFragmentAttributes ← [DirectoryType.nullObjectID],
 transformation: Transformation.Matrix ← Transformation.Identity]
 RETURNS [object: Handle];

CreateRaster: PROCEDURE [
 location: ImageLocation, box: Box, color: Color ← black,
 attributes: RasterAttributes,
 transformation: Transformation.Matrix ← Transformation.Identity,
 imageQualityMode: ImageQualityMode ← standardBasic] RETURNS [object: Handle];

CreateRasterComposite: PROCEDURE [
```

Copyright © 1992 Xerox Corporation All Rights Reserved

```
 location: ImageLocation, box: Box, color: Color ← black,
 attributes: RasterAttributes,
 transformation: Transformation.Matrix ← Transformation.Identity,
 imageQualityMode: ImageQualityMode ← standardBasic] RETURNS [object: Handle];

CreateRule: PROCEDURE [location: ImageLocation, box: Box, color: Color]
 RETURNS [object: Handle];

Delete: PROC [object: Handle, location: ImageLocation];

DeleteFiles: PROC [object: Handle, base: JobBackUp.Base];

EnumerateObjectsFirstToLast: PROC [
 composite: Handle, location: ImageLocation, proc: EnumerateProc];

EnumerateObjectsLastToFirst: PROC [
 composite: Handle, location: ImageLocation, proc: EnumerateProc];

EnumerateSingleObjectsFirstToLast: PROC [
 composite: Handle, location: ImageLocation, proc: EnumerateProc];

EnumerateSingleObjectsLastToFirst: PROC [
 composite: Handle, location: ImageLocation, proc: EnumerateProc];

GetBox: PROC [object: Handle, location: ImageLocation] RETURNS [box: Box];

GetColor: PROC [object: Handle, location: ImageLocation] RETURNS [color: Color];

GetCompositeType: PROC [object: Handle, location: ImageLocation]
 RETURNS [compositeType: CompositeType];

GetDisplayAlgorithm: PROCEDURE [object: Handle, location: ImageLocation]
 RETURNS [algorithm: GrayImage.ConversionMethod];

GetFirstChild: PROC [object: Handle, location: ImageLocation]
 RETURNS [firstChild: Handle];

GetImageQualityMode: PROC [object: Handle, location: ImageLocation]
 RETURNS [mode: ImageQualityMode];

GetIpFragmentAttributes: PROC [object: Handle, location: ImageLocation]
 RETURNS [attributes: IpFragmentAttributes];

GetIpFragmentDimensions: PROC [object: Handle, location: ImageLocation]
 RETURNS [xDim, yDim: CARDINAL];

GetLastChild: PROC [object: Handle, location: ImageLocation]
 RETURNS [lastChild: Handle];

GetNext: PROC [object: Handle, location: ImageLocation] RETURNS [next: Handle];
```

Copyright © 1992 Xerox Corporation All Rights Reserved

```
GetObjectData: PROCEDURE [object: Image.Handle, location: Image.ImageLocation]
 RETURNS [objectData: ObjectData];

GetObjectType: PROC [object: Handle, location: ImageLocation]
 RETURNS [objectType: ObjectType];

GetOrientation: PROCEDURE [object: Handle, location: ImageLocation]
 RETURNS [orientation: ImageOrientation];

GetParent: PROC [object: Handle, location: ImageLocation]
 RETURNS [parent: Handle];

GetPrevious: PROC [object: Handle, location: ImageLocation]
 RETURNS [previous: Handle];

GetRasterAttributes: PROC [object: Handle, location: ImageLocation]
 RETURNS [attributes: RasterAttributes];

GetSelectionLockOut: PROCEDURE [object: Handle, location: ImageLocation]
 RETURNS [isLocked: BOOLEAN];

GetT: PROCEDURE [object: Handle, location: ImageLocation]
 RETURNS [t: Transformation.Matrix];

GetTransparency: PROC [object: Handle, location: ImageLocation]
 RETURNS [transparent: BOOLEAN];

InsertAfter: PROC [object: Handle, previous: Handle, location: ImageLocation];

InsertBefore: PROC [object: Handle, next: Handle, location: ImageLocation];

InsertFirstChild: PROC [
 object: Handle, composite: Handle, location: ImageLocation];


InsertLastChild: PROC [
 object: Handle, composite: Handle, location: ImageLocation];

IntersectBoxes: PROCEDURE [box1, box2: Image.Box]
 RETURNS [intersectBox: Image.Box];

IsLogo: PROCEDURE [image: Image.Handle, location: Image.ImageLocation]
 RETURNS [isLogo: BOOLEAN];

IsOrphan: PROCEDURE [image: Image.Handle, lockID: JobBackUp.LockID]
 RETURNS [isOrphan: BOOLEAN];

JoinBoxes: PROCEDURE [box1, box2: Box] RETURNS [joined: Box];
```

Copyright © 1992 Xerox Corporation All Rights Reserved

```
MakeComposite: PROC [first: Handle, last: Handle, location: ImageLocation]
 RETURNS [composite: Handle];

NilAllDisplayImages: PROCEDURE [
 object: Image.Handle, location: Image.ImageLocation,
 deleteDisplayImage: BOOLEAN ← TRUE];

PurgeAllDisplayImages: PROCEDURE [object: Handle, location: ImageLocation];

Remove: PROC [object: Handle, location: ImageLocation];

Replace: PROCEDURE [old, new: Handle, location: ImageLocation];

SetBox: PROC [object: Handle, box: Box, location: ImageLocation];

SetColor: PROC [object: Handle, color: Color, location: ImageLocation];

SetDisplayAlgorithm: PROCEDURE [
 object: Handle, algorithm: GrayImage.ConversionMethod,
 location: ImageLocation];

SetIPFragmentAttributes: PROCEDURE [
 object: Handle, attributes: IpFragmentAttributes,
 deleteExisting: BOOLEAN ← TRUE, location: ImageLocation];

SetImageQualityMode: PROC [
 object: Handle, mode: ImageQualityMode, location: ImageLocation];

SetOrientation: PROCEDURE [
 object: Handle, orientation: ImageOrientation, location: ImageLocation];

SetPosition: PROC [
 object: Handle, xPosition: INTEGER, yPosition: INTEGER,
 location: ImageLocation];

SetRasterAttributes: PROC [
 object: Handle, attributes: RasterAttributes, xDim: CARDINAL, yDim: CARDINAL,
 deleteExisting: BOOLEAN ← TRUE, location: ImageLocation];

SetSelectionLockOut: PROCEDURE [
 object: Handle, locked: BOOLEAN, location: ImageLocation];

SetT: PROCEDURE [
 object: Handle, location: ImageLocation, t: Transformation.Matrix];

UnMakeComposite: PROC [composite: Handle, location: ImageLocation]
 RETURNS [first: Handle, last: Handle];

END.
```

Copyright © 1992 Xerox Corporation All Rights Reserved

```
-- File: ImageResamplingService.mesa - last edit:

-- Copyright (C) 1990, 1991 by Xerox Corporation. All rights reserved.

DIRECTORY
 FaultLogger USING [ID, nullLogID],
 MRImageConversionService USING [ImageProcessingTask],
 RasterDirectorySupervisor USING [ID];

ImageResamplingService: DEFINITIONS =

 BEGIN

 --Types
  FaultCode: TYPE = CARDINAL;
  TaskType: TYPE = {normal, makeA16x32Tile};

  IRSStatusProc: TYPE = PROCEDURE [
   rasterID: RasterDirectorySupervisor.ID, newX, newY: CARDINAL,
   fault: FaultCode, faultID: FaultLogger.ID ← FaultLogger.nullLogID];

 --FaultCodes
  noError: FaultCode = 100;
  imageNotFound: FaultCode = 101;
  noStaticAllocation: FaultCode = 102;
  invalidTransformation: FaultCode = 103;
  otherIMError: FaultCode = 104;
  otherRasterDBError: FaultCode = 105;
  irsAborted: FaultCode = 106;
  irsFatalSWFault: FaultCode = 107;
  spare: FaultCode = 108;

 --Procs
  DoImage: PROCEDURE [
   irsRec: MRImageConversionService.ImageProcessingTask.imageResampling,
   irsCompleted: IRSStatusProc] RETURNS [];

  -- This procedure can only be called when an irs task is running.
  Abort: PROCEDURE [] RETURNS [];

  -- This proc should be called by the Coalescer to inform the Resampler
  -- that the next call to the DoImage proc should generate tiled samples.
  SetUpResampler: PROCEDURE [] RETURNS [];

 END.
```

Copyright © 1992 Xerox Corporation All Rights Reserved

```
-- File: IMSTypes.mesa - last edit:

-- Copyright (C) 1988, 1990, 1991 by Xerox Corporation. All rights reserved.

-- Common TYPE definitions for the Image Management System

DIRECTORY
 RTOSIGStructures USING [
  BandlistObject, BandstartTable, FontBitmapPtrTable, FontDescrPtrTable,
  ImageDescrTable, InkwellBitmapArray];

IMSTypes: DEFINITIONS = {

-- CONSTANTS

 numOfCols: CARDINAL = 16;
 numOfRows: CARDINAL = 16;

-- TYPES

 ApertureSize: TYPE = [1..64];

 BLConfig: TYPE = MACHINE DEPENDENT RECORD [
  bandstartBase: LONG POINTER TO RTOSIGStructures.BandstartTable ← NIL,
  bandlistBase:  LONG POINTER TO RTOSIGStructures.BandlistObject ← NIL];

 BLMode: TYPE = MACHINE DEPENDENT {loadAndGo(0), ObjAtATime(2),
partialBL(8000H)};

 CompressorParams: TYPE = {
  diag,
  normal,
  noRepeats,
  rawAndRepeat,
  rawOnly,
  ghoText,
  ghoHalftone,
  fontEncoding};

 CropParams: TYPE = RECORD [
  xDisplacement: PixelDisplacement ← 0,
  yDisplacement: PixelDisplacement ← 0,
  xLength:    PixelLength ← 0,
  yLength:    PixelLength ← 0];

 DitherTable: TYPE = ARRAY [0..numOfRows) OF ARRAY [0..numOfCols) OF WORD;

 DrcParams: TYPE = RECORD [
  useDither:      BOOLEAN ← FALSE,
```

Copyright © 1992 Xerox Corporation All Rights Reserved

```
 windowDisplacement: WindowDisplacement ← 2,
 thresholdTable:   LONG POINTER TO ThresholdTable ← NIL,
 ditherTable:   LONG POINTER TO DitherTable ← NIL,
 ditherTableSize:   CARDINAL ← 16];

ImageType: TYPE = {
 normal,
 tiled};

MakeReadyParms: TYPE = LONG POINTER TO MakeReadyObject;
MakeReadyObject: TYPE = RECORD [
 blMode:      BLMode ← loadAndGo,
 operation:      OperationMode ← displayConversion,
 outMode:      OutputMode ← normal,
 input:      PageParams,
 rotation:      RotationParams ← zero,
 scaling:      ScalingParams,
 cropping:      CropParams,
 drc:      DrcParams,
 vgcParams:      VgcParams,
 compParams:      CompressorParams ← normal,
 retryParams:      RetryParams ← normal,      -- For Fifo Overflow
 retryMode:      BOOLEAN ← FALSE];

OperationMode: TYPE = MACHINE DEPENDENT {
 compression(0),      -- Create compressed data.
 displayConversion(1),      -- Create display data.
 compressionRotation(2),      -- Create rotated compressed data.
 displayConversionRotation(3), -- Create rotated display data.
 compDiag(4),      -- Input from IOCB, create compressed data.
 (15)};

<< Determines the source of output. Normal should be used for the normal case.
 The remaining modes enable bypassed output and are primarily for diagnostics
 and checkout. >>
OutputMode: TYPE = {
 normal,
 scaler,
 rotator,
 videoGen,
 vex};

PageParams: TYPE = RECORD [
 scanlinesPerPage: CARDINAL ← 0,
 bitsPerScanline:  CARDINAL ← 0];

PixelDisplacement: TYPE = CARDINAL;

PixelLength: TYPE = CARDINAL;
```

Copyright © 1992 Xerox Corporation All Rights Reserved

```
PrintloadConfig: TYPE = MACHINE DEPENDENT RECORD [
 inkwellBitmaps:   LONG POINTER TO RTOSIGStructures.InkwellBitmapArray,
 fontBitmapPtrBase: LONG POINTER TO RTOSIGStructures.FontBitmapPtrTable,
 fontDescrPtrBase:  LONG POINTER TO RTOSIGStructures.FontDescrPtrTable,
 imageDescrBase:    LONG POINTER TO RTOSIGStructures.ImageDescrTable];

RotationParams: TYPE = {
 zero,
 minusNinety};

ScaleFactor: TYPE = CARDINAL [1..16];

ScalingParams: TYPE = RECORD [
 xScale: ScaleFactor ← 16, -- ScaleFactor/16
 yScale: ScaleFactor ← 16];

RetryParams: TYPE = MACHINE DEPENDENT {     -- For Fifo Overflow
 normal(0),
 FIFOoverflow(1),
 (15)};

ThresholdTable: TYPE = ARRAY [0..16) OF CARDINAL;

VgcParams: TYPE = RECORD [
 blConfig:     BLConfig,
 printLoadConfig: PrintloadConfig];

WindowDisplacement: TYPE = [1..64];

}... -- IMSTypes
```

Copyright © 1992 Xerox Corporation All Rights Reserved

```
DIRECTORY
 Environment USING [LongNumber],
 ESCAlpha USING [
  aBLTLR, aDAND, aDIOR, aDSHIFT, aDXOR, aLUDIV, aROTATE, aSDDIV, aUDIV, aUDDIV,
  aXOR],
 Mopcodes USING [
  zAND, zBLT, zBLTL, zESC, zLIN1, zMUL, zIOR, zREC, zREC2, zSHIFT];

Inline: DEFINITIONS =
 BEGIN OPEN ESCAlpha, Mopcodes;

 LongCARDINAL: TYPE = LONG CARDINAL;

 LongNumber: TYPE = Environment.LongNumber;

 COPY: PROCEDURE [from: POINTER, nwords: CARDINAL, to: POINTER] = MACHINE CODE
  BEGIN zBLT END;

 LongCOPY: PROCEDURE [from: LONG POINTER, nwords: CARDINAL, to: LONG POINTER]
=
  MACHINE CODE BEGIN zBLTL END;

 LongCOPYReverse: PROCEDURE [
  from: LONG POINTER, nwords: CARDINAL, to: LONG POINTER] = MACHINE CODE
  BEGIN Mopcodes.zESC, ESCAlpha.aBLTLR END;

 DIVMOD: PROCEDURE [num, den: CARDINAL] RETURNS [quotient, remainder:
CARDINAL] =
  MACHINE CODE BEGIN zESC, aUDIV; zREC END;

 LDIVMOD: PROCEDURE [numlow: WORD, numhigh: CARDINAL, den: CARDINAL]
  RETURNS [quotient, remainder: CARDINAL] = MACHINE CODE
  BEGIN zESC, aLUDIV; zREC END;

 LongMult: PROCEDURE [CARDINAL, CARDINAL] RETURNS [product: LONG CARDINAL] =
  MACHINE CODE BEGIN zMUL; zREC END;

 LongDiv: PROCEDURE [num: LONG CARDINAL, den: CARDINAL] RETURNS [CARDINAL] =
  MACHINE CODE BEGIN zESC, aLUDIV END;

 LongDivMod: PROCEDURE [num: LONG CARDINAL, den: CARDINAL]
  RETURNS [quotient, remainder: CARDINAL] = MACHINE CODE
  BEGIN zESC, aLUDIV; zREC END;


 BitOp: TYPE = PROCEDURE [UNSPECIFIED, UNSPECIFIED] RETURNS [UNSPECIFIED];

 BITAND: BitOp = MACHINE CODE BEGIN zAND END;
```

Copyright © 1992 Xerox Corporation All Rights Reserved

```
BITOR: BitOp = MACHINE CODE BEGIN zIOR END;

BITXOR: BitOp = MACHINE CODE BEGIN zESC, aXOR END;

BITNOT: PROCEDURE [UNSPECIFIED] RETURNS [UNSPECIFIED] = MACHINE CODE
 BEGIN zLIN1; zESC, aXOR END;

BITSHIFT: PROCEDURE [value: UNSPECIFIED, count: INTEGER] RETURNS [UNSPECIFIED] =
 MACHINE CODE BEGIN zSHIFT END;

BITROTATE: PROCEDURE [value: UNSPECIFIED, count: INTEGER]
 RETURNS [UNSPECIFIED] = MACHINE CODE BEGIN zESC, aROTATE END;


LowHalf: PROCEDURE [u: LONG UNSPECIFIED] RETURNS [UNSPECIFIED] = INLINE
 BEGIN RETURN[LOOPHOLE[u, LongNumber].lowbits] END;

HighHalf: PROCEDURE [u: LONG UNSPECIFIED] RETURNS [UNSPECIFIED] = INLINE
 BEGIN RETURN[LOOPHOLE[u, LongNumber].highbits] END;

BytePair: TYPE = MACHINE DEPENDENT RECORD [high, low: [0..377B]];

LowByte: PROCEDURE [u: UNSPECIFIED] RETURNS [UNSPECIFIED] = INLINE
 BEGIN RETURN[LOOPHOLE[u, BytePair].low] END;

HighByte: PROCEDURE [u: UNSPECIFIED] RETURNS [UNSPECIFIED] = INLINE
 BEGIN RETURN[LOOPHOLE[u, BytePair].high] END;


UDDivMod: PROCEDURE [num, den: LONG CARDINAL]
 RETURNS [quotient, remainder: LONG CARDINAL] = MACHINE CODE
 BEGIN zESC, aUDDIV; zREC2 END;

SDDivMod: PROCEDURE [num, den: LONG INTEGER]
 RETURNS [quotient, remainder: LONG INTEGER] = MACHINE CODE
 BEGIN zESC, aSDDIV; zREC2 END;

DBitOp: TYPE = PROCEDURE [LONG UNSPECIFIED, LONG UNSPECIFIED]
 RETURNS [LONG UNSPECIFIED];

DBITAND: DBitOp = MACHINE CODE BEGIN zESC, aDAND END;

DBITOR: DBitOp = MACHINE CODE BEGIN zESC, aDIOR END;

DBITXOR: DBitOp = MACHINE CODE BEGIN zESC, aDXOR END;

DBITNOT: PROCEDURE [LONG UNSPECIFIED] RETURNS [LONG UNSPECIFIED] = MACHINE
CODE
 BEGIN zLIN1; zLIN1; zESC, aDXOR END;
```

Copyright © 1992 Xerox Corporation All Rights Reserved

```
DBITSHIFT: PROCEDURE [value: LONG UNSPECIFIED, count: INTEGER]
 RETURNS [LONG UNSPECIFIED] = MACHINE CODE BEGIN zESC, aDSHIFT END;

END.
```

Copyright © 1992 Xerox Corporation All Rights Reserved

```
-- File: JobBackUp.mesa

-- Copyright (C) 1986, 19 1, 1987, 1988 by Xerox Corporation. All rights reserved.

<<*********************************************************************
*                              *
* DESCRIPTION: This file provides the procedures and type      *
*   definitions by which is used for backing up a job.     *
*                              *
*******************************************************************>>

DIRECTORY
 SegZone USING [Base, DirtyObjectProc, nil, RelString];

JobBackUp: DEFINITIONS =
BEGIN

 -- TYPES

 <<*******************************************************************
 *                             *
 * DESCRIPTION: Base pointer to the start of a job's backing file.*
 *                             *
 *****************************************************************>>
 Base: TYPE = SegZone.Base;

 <<*******************************************************************
 *                             *
 * DESCRIPTION: A piece of a job that needs to be backed up.    *
 *                             *
 *****************************************************************>>
 DirtyObject: TYPE = RECORD[
  -- relative pointer to object containing dirty words
  object: Handle,
  -- offSet from relative pointer to where dirty words begin
  offSet: CARDINAL,
  -- size in words of dirty words
  size: CARDINAL];

 <<*******************************************************************
 *                             *
 * DESCRIPTION: Pieces of a job that needs to be backed up.    *
 *                             *
 *****************************************************************>>
 DirtyObjectList: TYPE = LONG DESCRIPTOR FOR ARRAY CARDINAL OF
  DirtyObject;

 <<*******************************************************************
 *                             *
```

Copyright © 1992 Xerox Corporation All Rights Reserved

```
* DESCRIPTION:  Possible reasons why an error may be raised by a  *
*    procedure using a lockID.                                     *
*                                                                  *
*******************************************************************>>
ErrorCode: TYPE = {invalidLockID};

<<*******************************************************************
*                                                                  *
* DESCRIPTION:  Handle to a job object.                            *
*                                                                  *
*******************************************************************>>
Handle: TYPE = RECORD[
 segmentZone: CARDINAL,
 pointer: JobBackUp.Base RELATIVE POINTER];

<<*******************************************************************
*                                                                  *
* DESCRIPTION:  ID to identify a locked job.                       *
*                                                                  *
*******************************************************************>>
LockID: TYPE = [0..lockIDRange];

<<*******************************************************************
*                                                                  *
* DESCRIPTION:  Relative pointer version of a LONG STRING.         *
*                                                                  *
*******************************************************************>>
RelString: TYPE = SegZone.RelString;

<<*******************************************************************
*                                                                  *
* DESCRIPTION:  Reference to a string allocated in a job.          *
*                                                                  *
*******************************************************************>>
StringPtr: TYPE = RECORD[
 segmentZone: CARDINAL,
 pointer: RelString];

-- CONSTANTS

<<*******************************************************************
*                                                                  *
* DESCRIPTION:  Maximum number of locked jobs.                     *
*                                                                  *
*******************************************************************>>
lockIDRange: CARDINAL = 15;

<<*******************************************************************
*                                                                  *
* DESCRIPTION:  NIL relative pointer.                              *
```

Copyright © 1992 Xerox Corporation All Rights Reserved

```
*                                    *
*******************************************************************>>
nilPointer: Base RELATIVE POINTER = SegZone.nil;

<<*******************************************************************
*                                    *
* DESCRIPTION: NULL handle.                    *
*                                    *
*******************************************************************>>
nullHandle: Handle = [segmentZone: 0, pointer: nilPointer];

<<*******************************************************************
*                                    *
* DESCRIPTION: NULL lockID.                    *
*                                    *
*******************************************************************>>
nullLockID: LockID = 0;

<<*******************************************************************
*                                    *
* DESCRIPTION: NULL handle.                    *
*                                    *
*******************************************************************>>
nullStringPtr: StringPtr = [segmentZone: 0, pointer: nilPointer];

-- SIGNALS

<<*******************************************************************
*                                    *
* DESCRIPTION: Possible signals that can be raised from this   *
*   interface.                         *
*                                    *
*******************************************************************>>
Error: SIGNAL [code: ErrorCode];

-- PROCEDURES

<<*******************************************************************
*                                    *
* FUNCTION: Allocates space in a job's segmentZone.        *
* PARAMETERS:                               *
*   words - size of space to be allocated          *
*   lockID - job where space will be allocated           *
* RETURN VALUES:                              *
*   node - pointer to allocated space            *
* SIGNALS: none                              *
*                                    *
*******************************************************************>>
Allocate: PROCEDURE[lockID: LockID, words: CARDINAL] RETURNS[node:
 JobBackUp.Handle];
```

Copyright © 1992 Xerox Corporation All Rights Reserved

```
<<*****************************************************************
*                                      *
* FUNCTION: Allocates a relative string version of a long string *
*    in a job.                             *
* PARAMETERS:                               *
*    lockID - job to be allocated in              *
*    ls - string to make a relative version of          *
* RETURN VALUES:                              *
*    ns - relative version of ls                  *
* SIGNALS: none                              *
*                                      *
*****************************************************************>>
AllocateString: PROCEDURE[lockID: LockID, ls: LONG STRING]
 RETURNS[string: StringPtr];

<<*****************************************************************
*                                      *
* FUNCTION: Creates a LONG STRING version of a relative string  *
*    from a specified zone.                      *
* PARAMETERS:                               *
*    string - relative string                    *
*    lockID - job string is in                   *
*    zone - zone the LONG STRING will be allocated from      *
* RETURN VALUES:                              *
*    newString - LONG STRING version of string          *
* SIGNALS: none                              *
*                                      *
*****************************************************************>>
CopyToNewString: PROCEDURE[string: StringPtr, lockID: LockID,
 zone: UNCOUNTED ZONE] RETURNS[newString: LONG STRING];

<<*****************************************************************
*                                      *
* FUNCTION: Deallocates space in a job's segmentZone.       *
* PARAMETERS:                               *
*    lockID - job where space will be deallocated         *
*    node - pointer to space to be deallocated          *
* RETURN VALUES: none                           *
* SIGNALS: none                              *
*                                      *
*****************************************************************>>
Deallocate: PROCEDURE[lockID: LockID, node: Handle];

<<*****************************************************************
*                                      *
* FUNCTION: Adds another dirty object to the list of items in  *
*    the job that needs to be backed up when the job is forced  *
*    out.                                *
* PARAMETERS:                               *
```

Copyright © 1992 Xerox Corporation All Rights Reserved

```
*   lockID - job to be forced out                    *
*   dirtyObject - new item to be added to the force out list  *
*    of the job                              *
* RETURN VALUES: none                        *
* SIGNALS: none                        *
*                              *
*******************************************************************>>
RegisterDirtyObject: PROCEDURE[lockID: LockID,
 dirtyObject: DirtyObject];

<<*******************************************************************
*                              *
* FUNCTION:  Adds dirty object sto the list of items in the job  *
*   that needs to be backed up when the job is forced out.   *
* PARAMETERS: none                        *
* RETURN VALUES: none                        *
* SIGNALS: none                        *
*                              *
*******************************************************************>>
RegisterDirtyWords: SegZone.DirtyObjectProc;

<<*******************************************************************
*                              *
* FUNCTION:  Makes sure that a lockID is valid.          *
* PARAMETERS:                        *
*   lockID - lockID to be validated                    *
* RETURN VALUES: none                        *
* SIGNALS:                        *
*   JobBackUp.Error[invalidLockID] - lockID is not valid     *
*                              *
*******************************************************************>>
ValidateLockID: PROCEDURE[lockID: LockID];

END.
```

Copyright © 1992 Xerox Corporation All Rights Reserved

```
DIRECTORY
 FaultLogger USING [ID],
 JobBackUp USING [LockID],
 JobID USING [ID],
 Page USING [Handle, Side];

JobFault: DEFINITIONS =
 BEGIN


 EnumFaultProc: TYPE = PROCEDURE [fault: FaultRecordPtr]
  RETURNS [continue: BOOLEAN ← TRUE];


 EnumWarningProc: TYPE = PROCEDURE [warning: WarningRecordPtr]
  RETURNS [continue: BOOLEAN ← TRUE];


 FaultList: TYPE = LONG DESCRIPTOR FOR ARRAY CARDINAL OF FaultRecord;


 FaultRecord: TYPE = RECORD [
  fault: CARDINAL,
  uniqueID: FaultLogger.ID,
  page1: Page.Handle,
  side1: Page.Side,
  page2: Page.Handle,
  side2: Page.Side,
  severityType: SeverityType,
  card1, card2, card3: CARDINAL,
  string1: LONG STRING,
  string2: LONG STRING,
  real: REAL];


 FaultRecordPtr: TYPE = LONG POINTER TO READONLY FaultRecord;


 SeverityType: TYPE = {
  appearanceWarning, appearanceError, masterWarning, masterError,
  operationalError, systemError, comment};


 WarningList: TYPE = LONG DESCRIPTOR FOR ARRAY CARDINAL OF WarningRecord;


 WarningRecord: TYPE = RECORD [
  warning: FaultRecord,
```

Copyright © 1992 Xerox Corporation All Rights Reserved

```
 redetectable: BOOLEAN,
 pageNumber1: CARDINAL,
 pageNumber2: CARDINAL];

WarningRecordPtr: TYPE = LONG POINTER TO READONLY WarningRecord;

Add: PROCEDURE [lockID: JobBackUp.LockID, fault: FaultRecord];

AddSevereFault: PROCEDURE [
 jobID: JobID.ID, fault: JobFault.FaultRecord,
 redisplaySystemFile: BOOLEAN ← FALSE];

AddWarning: PROCEDURE [
 lockID: JobBackUp.LockID, warning: WarningRecord,
 checkIfDuplicate: BOOLEAN ← FALSE];

AddWarnings: PROCEDURE [lockID: JobBackUp.LockID, warning: WarningList];

ClearAllFaults: PROCEDURE [lockID: JobBackUp.LockID];

ClearWarnings: PROCEDURE [lockID: JobBackUp.LockID];

CopyFaults: PROCEDURE [fromLockID, toLockID: JobBackUp.LockID];

CopyWarnings: PROCEDURE [
 fromLockID, toLockID: JobBackUp.LockID, onlyNonRedectable: BOOLEAN ← FALSE];

EnumCriticalFaults: PROCEDURE [jobID: JobID.ID, proc: EnumFaultProc];

EnumFaults: PROCEDURE [lockID: JobBackUp.LockID, proc: EnumFaultProc];

EnumWarnings: PROCEDURE [lockID: JobBackUp.LockID, proc: EnumWarningProc];

GetAllFaults: PROCEDURE [lockID: JobBackUp.LockID, zone: UNCOUNTED ZONE]
 RETURNS [faults: FaultList];
```

Copyright © 1992 Xerox Corporation All Rights Reserved

```
GetCriticalFaults: PROCEDURE [jobID: JobID.ID, zone: UNCOUNTED ZONE]
 RETURNS [faults: FaultList];

GetAllWarnings: PROCEDURE [
 lockID: JobBackUp.LockID, number: CARDINAL ← LAST[CARDINAL],
 zone: UNCOUNTED ZONE] RETURNS [warnings: WarningList];

GetNumberOfFaults: PROCEDURE [lockID: JobBackUp.LockID]
 RETURNS [numberOfFaults: CARDINAL];

GetNumberOfWarnings: PROCEDURE [lockID: JobBackUp.LockID]
 RETURNS [numberOfWarnings: CARDINAL];

END.
```

Copyright © 1992 Xerox Corporation All Rights Reserved

```
-- File: JobID.mesa - last edit:

-- Copyright (C) 1986, 1988 by Xerox Corporation. All rights reserved.

-- DESCRIPTION: This interface defines the job id for the system.

DIRECTORY
 DirectoryID USING [nullObjectID, ObjectID];

JobID: DEFINITIONS =
BEGIN

 -- TYPES

 ID: TYPE = DirectoryID.ObjectID;

 -- CONSTANTS

 nullID: ID = DirectoryID.nullObjectID;

END.
```

Copyright © 1992 Xerox Corporation All Rights Reserved

```
-- File: JobQ.mesa

-- Copyright (C) 1986, 19 1, 1987, 1988, 1989, 1990 by Xerox Corporation. All rights
reserved.

<<**********************************************************************
*                                   *
* DESCRIPTION: This file provides the procedures and type       *
*    definitions by which a client may extract and enter job     *
*    specific information into the job database.           *
*                                   *
**********************************************************************>>

DIRECTORY
 AccountMgrCommon USING [AccountNumber],
 AccountRecord USING [Handle],
 DirectoryType USING [CurrentOperatorAccess, OperatorAccess, Owner,
  SecurityInfo],
 JobBackUp USING [LockID],
 JobID USING [ID],
 JobLog USING [Status],
 MRSignature USING [Parameters],
 PageNumTypes USING [PageNumParms],
 PublicPrinting USING [ColorTypes, Finishing, InternalMedia,
  InternalMedium, MediumDimensions, PaperType],
 RTOSFile USING [FileID, nullID],
 SMStep USING [ParmsHandle, StepRecord],
 System USING [GreenwichMeanTime];

JobQ: DEFINITIONS =
BEGIN

 -- TYPES

 <<*********************************************************************
 *                                  *
 * DESCRIPTION: Possible statuses of an owner's account.       *
 *                                  *
 *********************************************************************>>
 AccountStatus: TYPE = {active, deleted, inactive};

 <<*********************************************************************
 *                                  *
 * DESCRIPTION: Darkness of job.                   *
 *                                  *
 *********************************************************************>>
  Contrast: TYPE = MACHINE DEPENDENT RECORD[
   variant(0): SELECT contrastSelection(0): ContrastSelection FROM
    normal, darker, lighter, default => [],
```

Copyright © 1992 Xerox Corporation All Rights Reserved

```
ENDCASE];

<<*******************************************************************
*                              *
* DESCRIPTION:  Types of darkness levels.          *
*                              *
*******************************************************************>>
ContrastSelection: TYPE = MACHINE DEPENDENT{normal(0), darker(1),
 lighter(2), programmable(3), default(255)};

<<*******************************************************************
*                              *
* DESCRIPTION:  Job cover information.             *
*                              *
*******************************************************************>>
Covers: TYPE = {back, front, frontAndBack, none};

<<*******************************************************************
*                              *
* DESCRIPTION:  Programmed covers.                 *
*                              *
*******************************************************************>>
CoversRec: TYPE = RECORD[
 type: SELECT covers: Location FROM
  none => [],
  front, back => [sidesImaged: Location,
   medium: PublicPrinting.InternalMedium],
  both => [sidesImagedFront, sidesImagedBack: Location,
   mediumFront, mediumBack: PublicPrinting.InternalMedium],
 ENDCASE];

<<*******************************************************************
*                              *
* DESCRIPTION:  Net job's creation date.           *
*                              *
*******************************************************************>>
CreateDateOption: TYPE = RECORD[
 var: SELECT type: CreateDateType FROM
 cardinal => [cardinal: LONG CARDINAL],
 string => [string: LONG STRING],
 ENDCASE];

<<*******************************************************************
*                              *
* DESCRIPTION:  Types of creation dates.           *
*                              *
*******************************************************************>>
CreateDateType: TYPE = {cardinal, string};

<<*******************************************************************
```

Copyright © 1992 Xerox Corporation All Rights Reserved

```
*                                   *
* DESCRIPTION:  Customer account job will be charged to.       *
*                                   *
*****************************************************************>>
CustomerAcct: TYPE = AccountMgrCommon.AccountNumber ← NIL;

<<*****************************************************************
*                                   *
* DESCRIPTION:  Darkness level.                    *
*                                   *
*****************************************************************>>
Darkness: TYPE = MACHINE DEPENDENT RECORD[
  fine  (0:0..7) : [0..256),
  coarse (0:8..15): [0..256)];

<<*****************************************************************
*                                   *
* DESCRIPTION:  The possible dispositions of a job.        *
*                                   *
*****************************************************************>>
Disposition: TYPE = {delete, printAndDelete, printAndSave, proof,
 save} ← printAndDelete;

<<*****************************************************************
*                                   *
* DESCRIPTION:  Possible reasons why an error may be raised by a  *
*    procedure manipulating a job.                  *
*                                   *
*****************************************************************>>
ErrorCode: TYPE = {dirtyJob, jobCorrupted, jobDirectoryCorrupted,
 jobIDNotFound, jobIncomplete, multipleReferences,
 operationFailed, operatorDoesNotHaveAccess, readOnlyReferenceUsed,
 tooManyLockedJobs};

<<*****************************************************************
*                                   *
* DESCRIPTION:  List of jobs.                    *
*                                   *
*****************************************************************>>
JobIDList: TYPE = LONG DESCRIPTOR FOR ARRAY CARDINAL OF JobID.ID;

<<*****************************************************************
*                                   *
* DESCRIPTION:  Name of the job.                   *
*                                   *
*****************************************************************>>
JobName: TYPE = LONG STRING ← NIL;

<<*****************************************************************
*                                   *
```

Copyright © 1992 Xerox Corporation All Rights Reserved

```
* DESCRIPTION: Reference handle to a job.              *
*                          *
******************************************************************>>
JobReference: TYPE[2];

<<******************************************************************
*                          *
* DESCRIPTION: Centralized information of a job.        *
*                          *
******************************************************************>>
JobRoot: TYPE = RECORD[
 -- status of owner's account
 accountStatus: AccountStatus ← active,
 -- who can access the job
 acquireAccess: DirectoryType.OperatorAccess ← [all[]],
 -- handle to job's billing information
 billingHandle: AccountRecord.Handle ← NIL,
 -- breakPageNeeded of job
 breakPageNeeded: BOOLEAN ← FALSE,
 -- collation of job
 collated: BOOLEAN ← TRUE,
 -- job's print darkness settings
 contrast: Contrast ← [normal[]],
 -- quantity of job
 copyCount: CARDINAL ← 1,
 -- covers on a job
 covers: Covers ← none,
 -- type of access that the current operator has
 currentOperatorAccess: DirectoryType.CurrentOperatorAccess ←
  modify,
 -- customer's account
 customerAcct: CustomerAcct ← NIL,
 -- create date of job.
 dateStamp: System.GreenwichMeanTime,
 -- type of job deletion
 deletionType: JobLog.Status ← completedWarnings,
 -- if a job can be printed in service mode
 diagnosticsJob: BOOLEAN ← FALSE,
 -- the disposition of the job (ie: PrintAndSave)
 disposition: Disposition,
 -- finishing of job
 finishing: PublicPrinting.Finishing ← sampleTray,
 -- whether job is an internal print job
 internalPrintJob: BOOLEAN ← FALSE,
 -- medium of an internal print job
 internalPrintMedium: PublicPrinting.InternalMedium,
 -- name of job
 jobName: JobName ← NIL,
 -- job was created in multiple scan blocks
 jobSupplement: BOOLEAN ← FALSE,
```

Copyright © 1992 Xerox Corporation All Rights Reserved

```
--TRUE implies paper stock is set to light paper
lightWeightPaper: BOOLEAN ← FALSE,
-- [1..N] or [N..1] printing desired
markOneToN: BOOLEAN ← FALSE,
-- message for job
message: LONG STRING ← NIL,
-- who can modify the job
modifyAccess: DirectoryType.OperatorAccess ← [all[]],
-- whether job is a net job
netJob: BOOLEAN ← FALSE,
-- root information of net jobs
netJobInfo: NetRecord ← [],
-- number of pages currently in job.
numberOfPages: CARDINAL ← 0,
-- owner of job
owner: DirectoryType.Owner ← NIL,
-- page numbering specified in job.
pageNumbering: PageNumTypes.PageNumParms,
-- pointer to the print file.
printFile: RTOSFile.FileID ← RTOSFile.nullID,
-- whether or not the print file is valid.
-- Not valid if MakeReady or GBoard has altered job.
printFileValid: BOOLEAN ← FALSE,
-- priority of the job.
priority: Priority ← low,
-- whether the job is a proof job
proofJob: BOOLEAN ← FALSE,
-- scan count of job
scanCount: CARDINAL ← 0,
-- whether the job is a signature job
signatureJob: BOOLEAN ← FALSE,
-- job's slipSheeting
slipSheet: SlipSheet,
-- first stitch's position offset
stitchA: CARDINAL,
-- second stitch's position offset
stitchB: CARDINAL,
-- TRUE implies head positions equal to normal
stitchNormal: BOOLEAN ← TRUE,
-- time of job's submission to the print queue
submissionTime: System.GreenwichMeanTime ← [0],
-- version number of job's name
versionNumber: CARDINAL ← 0];

<<*******************************************************************
*                              *
* DESCRIPTION: The possible location of covers and images.    *
*                              *
*******************************************************************>>
Location: TYPE = {back, both, front, none};
```

Copyright © 1992 Xerox Corporation All Rights Reserved

```
<<*******************************************************************
*                               *
* DESCRIPTION: Call back procedure for a job's medium.      *
*                               *
******************************************************************>>
MediumProc: TYPE = PROCEDURE[
 medium: PublicPrinting.InternalMedium,
jobPlex: JobQ.Plex] RETURNS[continue: BOOLEAN ← TRUE];

<<*******************************************************************
*                               *
* DESCRIPTION: Net job's information.              *
*                               *
******************************************************************>>
NetRecord: TYPE = RECORD[
 -- break page string (from the master)
 docComment: LONG STRING ← NIL,
 -- time of the creation of the master
 docCreateDate: CreateDateOption ← [cardinal[0]],
 -- creator of the document
 docCreator: LONG STRING ← NIL,
 -- message string (from the master)
 docEndMessage: LONG STRING ← NIL,
 -- net name for document
 docName: LONG STRING ← NIL,
 -- message string (from the master)
 docStartMessage: LONG STRING ← NIL,
 -- message string (from the master)
 finishingMessage: LONG STRING ← NIL,
  -- message string (from the master)
 jobEndMessage: LONG STRING ← NIL,
 -- message string (from the master)
 jobStartMessage: LONG STRING ← NIL,
 -- recipient of job
 recipientName: DirectoryType.Owner ← NIL,
 -- sender of job
 senderName: DirectoryType.Owner ← NIL];

<<*******************************************************************
*                               *
* DESCRIPTION: The possible plexes of a job.         *
*                               *
******************************************************************>>
Plex: TYPE = {duplex, intermixed, simplex};

<<*******************************************************************
*                               *
* DESCRIPTION: Print information of a job.          *
*                               *
```

Copyright © 1992 Xerox Corporation All Rights Reserved

```
*****************************************************************>>
PrintRecord: TYPE = RECORD[
 collated: BOOLEAN,
 contrast: Contrast,
 copyCount: CARDINAL,
 finishing: PublicPrinting.Finishing,
 lightWeightPaper: BOOLEAN,
 markOneToN: BOOLEAN,
 stitchNormal: BOOLEAN];

<<*****************************************************************
*                                    *
* DESCRIPTION: The possible job priorities.          *
*                                    *
*****************************************************************>>
Priority: TYPE = {interrupt, high, medium, low};

<<*****************************************************************
*                                    *
* DESCRIPTION: Call back proc to retrieve job root information. *
*                                    *
*****************************************************************>>
RootProc: TYPE = PROCEDURE[jobRoot: JobQ.JobRoot];

<<*****************************************************************
*                                    *
* DESCRIPTION: Data used by the scan scheduler.          *
*                                    *
*****************************************************************>>
ScanData: TYPE[smScanDataSize];

<<*****************************************************************
*                                    *
* DESCRIPTION: Types of system scratch jobs.          *
*                                    *
*****************************************************************>>
ScratchJobType: TYPE = {filing, normal};

<<*****************************************************************
*                                    *
* DESCRIPTION: Data used for segment printing.          *
*                                    *
*****************************************************************>>
SegmentRecord: TYPE = RECORD[
 numberOfSegments: CARDINAL,
 valid: BOOLEAN];

<<*****************************************************************
*                                    *
* DESCRIPTION: Data used for signatures.          *
```

Copyright © 1992 Xerox Corporation All Rights Reserved

```
*                                *
*******************************************************************>>
SignatureParms: TYPE = MRSignature.Parameters;

<<*******************************************************************
*                                *
* DESCRIPTION: Job's slip sheeting information.        *
*                                *
*******************************************************************>>
SlipSheet: TYPE = RECORD[
 required: BOOLEAN,
 medium: PublicPrinting.InternalMedium];

-- SIGNALS

<<*******************************************************************
*                                *
* DESCRIPTION: Possible signals that can be raised from this   *
*   interface.                      *
*                                *
*******************************************************************>>
Error: SIGNAL [code: ErrorCode];

-- CONSTANTS

<<*******************************************************************
*                                *
* DESCRIPTION: Null job reference.          *
*                                *
*******************************************************************>>
nullJobReference: JobReference = LOOPHOLE[LONG[0]];

<<*******************************************************************
*                                *
* DESCRIPTION: Read only job reference.        *
*                                *
*******************************************************************>>
readOnlyJobReference: JobReference = LOOPHOLE[LAST[LONG CARDINAL]];

<<*******************************************************************
*                                *
* DESCRIPTION: Size of scan scheduler data.       *
*                                *
*******************************************************************>>
smScanDataSize: CARDINAL = 8;

-- PROCEDURES

<<*******************************************************************
*                                *
```

Copyright © 1992 Xerox Corporation All Rights Reserved

```
* FUNCTION: Sets the version number of toJobID to be version *
*   number of fromJobID.                          *
* PARAMETERS:                                     *
*   toJobID - job whose version number is changed     *
*   fromJobID - job's whose version number is used    *
* RETURN VALUES: none                             *
* SIGNALS:                                        *
*   JobQ.Error[jobIDNotFound] - toJobID or fromJobID is not in *
*    the queue                                    *
*                                                 *
*******************************************************************>>
AdjustVersionNumber: PROCEDURE[toJobID, fromJobID: JobID.ID];

<<*******************************************************************
*                                                 *
* FUNCTION: Changes values for a job's medium.        *
* PARAMETERS:                                     *
*   lockID - job whose medium is changed              *
*   mediaIndex - which medium to change (count starts at 1)  *
*   colorChanged - medium's color changed             *
*   typeChanged - medium's type changed               *
*   sizeChanged - medium's size changed               *
*   modulusChanged - medium's modulus changed             *
*   newColor - medium's new color                     *
*   newType - medium's new type                       *
*   newSize - medium's new size                       *
*   newModulus - medium's new modulus                 *
* RETURN VALUES: none                             *
* SIGNALS: none                                   *
*                                                 *
*******************************************************************>>
AlterJobMedium: PROCEDURE[lockID: JobBackUp.LockID, mediaIndex:
 CARDINAL, colorChanged, typeChanged, sizeChanged, modulusChanged:
 BOOLEAN ← FALSE, newColor: PublicPrinting.ColorTypes ← white,
 newType: PublicPrinting.PaperType ← standard, newSize:
 PublicPrinting.MediumDimensions ← [0,0], newModulus: CARDINAL ←
 0];

<<*******************************************************************
*                                                 *
* FUNCTION: Backs up a client's job's dirty words list.     *
*   the clients dirty word's list.                    *
* PARAMETERS:                                     *
*   lockID - job to be backed up                      *
*   allowMultipleRef - If TRUE, the backup may be delayed    *
*    because of multiple references for the same data,    *
*    otherwise a signal is raised if there are multiple    *
*    references.                                  *
* RETURN VALUES: none                             *
* SIGNALS:                                        *
```

Copyright © 1992 Xerox Corporation All Rights Reserved

```
*   JobQ.Error[multipleReferences] - another reference besides *
*    job exists and allowMultipleRef = FALSE.          *
*                            *
*****************************************************************>>
BackUpJob: PROCEDURE[lockID: JobBackUp.LockID, allowMultipleRef:
 BOOLEAN ← TRUE];

<<*****************************************************************
*                            *
* FUNCTION:  Removes the admin sheet medium.          *
* PARAMETERS:                      *
*   lockID - job to be changed               *
* RETURN VALUES: none                      *
* SIGNALS: none                      *
*                            *
*****************************************************************>>
ClearAdminSheetMedium: PROCEDURE[lockID: JobBackUp.LockID];

<<*****************************************************************
*                            *
* FUNCTION:  Sees if specific types of medium are in the job's  *
*   media list.                  *
* PARAMETERS:                      *
*   lockID - job to be checked               *
* RETURN VALUES:                      *
*   orderedStock - TRUE if job has orderedStock medium    *
*   precutTab - TRUE if job has precutTab medium      *
*   threePitchStock - TRUE if job has threePitchStock medium  *
*   transparency - TRUE if job has transparency medium     *
* SIGNALS: none                      *
*                            *
*****************************************************************>>
ContainsMediumInJob: PROCEDURE[lockID: JobBackUp.LockID]
 RETURNS[orderedStock, precutTab, threePitchStock, transparency:
 BOOLEAN];

<<*****************************************************************
*                            *
* FUNCTION:  Makes a copy of the job structure of a job and adds *
*   it to the end of the job queue.            *
* PARAMETERS:                      *
*   jobID - job to be copied                *
*   proofJob - TRUE if job's copy is a proof          *
*   operatorCopy - TRUE if operator selected copy job       *
*   resumeAndSave - TRUE if operator selected resumeAndSave   *
*   toArchive - TRUE if adding job to archive directory     *
* RETURN VALUES:                      *
*   newJobID - id of the copy                *
* SIGNALS:                      *
*   JobQ.Error[jobIDNotFound] - jobID is not in the queue     *
```

Copyright © 1992 Xerox Corporation All Rights Reserved

```
*   JobQ.Error[operatorDoesNotHaveAccess] - current operator   *
*    does not have access to job                  *
*   JobQ.Error[tooManyLockedJobs] - too many locked jobs      *
*                            *
******************************************************************>>
Copy: PROCEDURE[jobID: JobID.ID, proofJob: BOOLEAN, operatorCopy:
 BOOLEAN, resumeAndSave: BOOLEAN, toArchive: BOOLEAN ← FALSE]
 RETURNS[newJobID: JobID.ID];

<<******************************************************************
*                            *
* FUNCTION: Determines if current operator is owner of job.   *
* PARAMETERS:                      *
*   jobID - job looked at            *
* RETURN VALUES:                     *
*   isOwner - TRUE if current operator is owner of job     *
* SIGNALS:                     *
*   JobQ.Error[jobIDNotFound] - jobID is not in the queue    *
*                            *
******************************************************************>>
CurrentOperatorIsOwner: PROCEDURE[jobID: JobID.ID] RETURNS[isOwner:
 BOOLEAN];

<<******************************************************************
*                            *
* FUNCTION: Deletes a job from the job queue.          *
* PARAMETERS:                      *
*   jobID - job to be deleted              *
* RETURN VALUES: none                    *
* SIGNALS:                     *
*   JobQ.Error[jobIncomplete] - job still has steps to complete *
*                            *
******************************************************************>>
Delete: PROCEDURE[jobID: JobID.ID];

<<******************************************************************
*                            *
* FUNCTION: Dereferences a job.              *
* PARAMETERS:                      *
*   jobID - job to be dereferenced             *
* RETURN VALUES: none                    *
* SIGNALS:                     *
*   JobQ.Error[dirtyJob] - job has words to be backed up. This *
*    signal can be resumed.                *
*                            *
******************************************************************>>
DereferenceJob: PROCEDURE[job: JobReference];

<<******************************************************************
*                            *
```

Copyright © 1992 Xerox Corporation All Rights Reserved

```
* FUNCTION: Creates a new job and adds it to the end of the job *
*   queue.                                   *
* PARAMETERS:                                *
*   jobRoot - root information of job to be created       *
* RETURN VALUES:                             *
*   newjobID - id of new job                 *
*   versionNumber - version number of job's name          *
*   dateStamp - creation time of job         *
* SIGNALS: none                              *
*                                            *
******************************************************************>>
Enter: PROCEDURE[jobRoot: JobRoot] RETURNS[newJobID: JobID.ID,
 versionNumber: CARDINAL, dateStamp: System.GreenwichMeanTime];

<<******************************************************************
*                                            *
* FUNCTION: Calls proc for each unique medium on the job, the  *
*   plex passed to the proc is the overall job plex.     *
* PARAMETERS:                                *
*   lockID - The lockID of the job.          *
*   proc - The procedure to be called for each medium on the job*
*   zone - zone which media strings should be allocated from, if*
*      NIL, the strings are not copied.      *
* RETURN VALUES: none                        *
* SIGNALS: none                              *
*                                            *
******************************************************************>>
EnumerateMediaAndPlex: PROCEDURE[lockID: JobBackUp.LockID, proc:
 MediumProc, zone: UNCOUNTED ZONE];

<<******************************************************************
*                                            *
* FUNCTION: Returns the next job in the filing service queue   *
*   after the job specified by jobID. IF jobID = JobID.nullID, *
*   it returns the first job in the print queue. If there is  *
*   no job after the "current" job, JobID.nullID is returned.  *
* PARAMETERS:                                *
*   jobID - "current" job being looked at    *
* RETURN VALUES:                             *
*   nextJobID - next job in filing queue after "current" job  *
* SIGNALS:                                   *
*   JobQ.Error[jobIDNotFound] - jobID is not in the system    *
*                                            *
******************************************************************>>
EnumerateNextFilingJob: PROCEDURE[jobID: JobID.ID]
 RETURNS[nextJobID: JobID.ID];

<<******************************************************************
*                                            *
* FUNCTION: Returns the next job in the queue after the job   *
```

Copyright © 1992 Xerox Corporation All Rights Reserved

```
*   specified by jobID.  IF jobID = JobID.nullID, it       *
*   returns the first job in the queue.  If there is no job   *
*   after the "current" job, JobID.nullID is returned.       *
* PARAMETERS:                            *
*   jobID - "current" job being looked at           *
* RETURN VALUES:                           *
*   nextJobID - next job in job queue after "current" job    *
* SIGNALS:                             *
*   JobQ.Error[jobIDNotFound] - jobID is not in the system    *
*                               *
*****************************************************************>>
EnumerateNextJob: PROCEDURE[jobID: JobID.ID]
 RETURNS[nextJobID: JobID.ID];

<<*****************************************************************
*                               *
* FUNCTION: Returns the next normal job not in the print queue  *
*   after the job specified by jobID. IF jobID = JobID.nullID, *
*   it returns the first job not in the print queue.  If there  *
*   is no job after the "current" job, JobID.nullID is returned.*
* PARAMETERS:                            *
*   jobID - "current" job being looked at           *
* RETURN VALUES:                           *
*   nextJobID - next job in job queue after "current" job    *
* SIGNALS:                             *
*   JobQ.Error[jobIDNotFound] - jobID is not in the system    *
*                               *
*****************************************************************>>
EnumerateNextNonPrintJob: PROCEDURE[jobID: JobID.ID]
 RETURNS[nextJobID: JobID.ID];

<<*****************************************************************
*                               *
* FUNCTION: Returns the next job in the print queue after the   *
*   job specified by jobID.  IF jobID = JobID.nullID, it     *
*   returns the first job in the print queue.  If there is no  *
*   job after the "current" job, JobID.nullID is returned.    *
* PARAMETERS:                            *
*   jobID - "current" job being looked at           *
* RETURN VALUES:                           *
*   nextJobID - next job in job queue after "current" job    *
* SIGNALS:                             *
*   JobQ.Error[jobIDNotFound] - jobID is not in the system    *
*                               *
*****************************************************************>>
EnumerateNextPrintJob: PROCEDURE[jobID: JobID.ID]
 RETURNS[nextJobID: JobID.ID];

<<*****************************************************************
*                               *
```

Copyright © 1992 Xerox Corporation All Rights Reserved

```
* FUNCTION: Deallocates the strings in a jobRoot.          *
* PARAMETERS:                                              *
*   jobRoot - jobRoot whose strings will be deallocated    *
*   zone - zone where strings in root were allocated from  *
* RETURN VALUES: none                                      *
* SIGNALS: none                                            *
*                                                          *
*******************************************************************>>
FreeJobRoot: PROCEDURE[jobRoot: JobRoot, zone: UNCOUNTED ZONE];

<<*******************************************************************
*                                                          *
* FUNCTION: Returns a job's adminSheetMedium.              *
* PARAMETERS:                                              *
*   lockID - job checked                                   *
*   zone - zone where strings are allocated                *
* RETURN VALUES:                                           *
*   medium - adminSheetMedium of job                       *
* SIGNALS: none                                            *
*                                                          *
*******************************************************************>>
GetAdminSheetMedium: PROCEDURE[lockID: JobBackUp.LockID, zone:
 UNCOUNTED ZONE] RETURNS[medium: PublicPrinting.InternalMedium];

<<*******************************************************************
*                                                          *
* FUNCTION: Returns a job's billing handle.                *
* PARAMETERS:                                              *
*   lockID - job whose billingHandle is returned           *
* RETURN VALUES:                                           *
*   billingHandle - billingHandle of job                   *
* SIGNALS: none                                            *
*                                                          *
*******************************************************************>>
GetBillingHandle: PROCEDURE[lockID: JobBackUp.LockID]
 RETURNS[billingHandle: AccountRecord.Handle];

<<*******************************************************************
*                                                          *
* FUNCTION: Returns a job's covers.                        *
* PARAMETERS:                                              *
*   lockID - job checked                                   *
* RETURN VALUES:                                           *
*   covers - covers of job                                 *
* SIGNALS: none                                            *
*                                                          *
*******************************************************************>>
GetCovers: PROCEDURE[lockID: JobBackUp.LockID]
 RETURNS[covers: JobQ.Covers];
```

Copyright © 1992 Xerox Corporation All Rights Reserved

```
<<*****************************************************************
*                              *
* FUNCTION: Returns a job's programmed covers.        *
* PARAMETERS:                              *
*   lockID - job whose programmed covers is returned    *
*   zone - space where strings are allocated. If zone is NIL, *
*    don't allocate any strings                *
* RETURN VALUES:                              *
*   covers - programmed covers of job              *
* SIGNALS: none                              *
*                              *
*****************************************************************>>
GetCoversRec: PROCEDURE[lockID: JobBackUp.LockID, zone: UNCOUNTED
 ZONE] RETURNS[covers: CoversRec];

<<*****************************************************************
*                              *
* FUNCTION: Returns a job's current operator access.     *
* PARAMETERS:                              *
*   jobID - job whose current operator access is returned  *
* RETURN VALUES:                              *
*   currentOperatorAccess - current operator access of job  *
* SIGNALS: none                              *
*                              *
*****************************************************************>>
GetCurrentOperatorAccess: PROCEDURE[jobID: JobID.ID]
 RETURNS[currentOperatorAccess:
 DirectoryType.CurrentOperatorAccess];

<<*****************************************************************
*                              *
* FUNCTION: Returns a job's customer account.        *
* PARAMETERS:                              *
*   lockID - job looked at                    *
*   zone - space where strings are allocated         *
* RETURN VALUES:                              *
*   account - customer account of job            *
* SIGNALS: none                              *
*                              *
*****************************************************************>>
GetCustomerAccount: PROCEDURE[lockID: JobBackUp.LockID, zone:
 UNCOUNTED ZONE] RETURNS[account: CustomerAcct];

<<*****************************************************************
*                              *
* FUNCTION: Returns whether a job is diagnostic or not.    *
* PARAMETERS:                              *
*   lockID - job checked                      *
* RETURN VALUES:                              *
*   diagnosticsJob - diagnosticsJob of job           *
```

Copyright © 1992 Xerox Corporation All Rights Reserved

```
* SIGNALS: none                          *
*                           *
******************************************************************>>
GetDiagnosticsJob: PROCEDURE[lockID: JobBackUp.LockID]
 RETURNS[diagnosticsJob: BOOLEAN];

<<******************************************************************
*                           *
* FUNCTION:  Returns a job's disposition.          *
* PARAMETERS:                            *
*   lockID - job checked                  *
* RETURN VALUES:                          *
*   disposition - disposition of job          *
* SIGNALS: none                          *
*                           *
******************************************************************>>
GetDisposition: PROCEDURE[lockID: JobBackUp.LockID]
 RETURNS[disposition: Disposition];

<<******************************************************************
*                           *
* FUNCTION:  Returns a job's finishing.          *
* PARAMETERS:                            *
*   lockID - job checked                  *
* RETURN VALUES:                          *
*   finishing - finishing of job            *
* SIGNALS: none                          *
*                           *
******************************************************************>>
GetFinishing: PROCEDURE[lockID: JobBackUp.LockID]
 RETURNS[finishing: PublicPrinting.Finishing];

<<******************************************************************
*                           *
* FUNCTION:  Returns the id of a job.          *
* PARAMETERS:                            *
*   name - name of job                    *
*   versionNumber - versionNumber of name          *
* RETURN VALUES:                          *
*   id - id of name                    *
* SIGNALS:                          *
*   Error[jobIDNotFound] - name is not in the queue       *
*                           *
******************************************************************>>
GetIDFromName: PROCEDURE[name: LONG STRING, versionNumber: CARDINAL]
 RETURNS[id: JobID.ID];

<<******************************************************************
*                           *
* FUNCTION:  Returns whether a job is an internal print job.   *
```

Copyright © 1992 Xerox Corporation All Rights Reserved

```
* PARAMETERS:                          *
*   lockID - job checked                *
* RETURN VALUES:                        *
*   internalPrintJob - internalPrintJob of job        *
* SIGNALS: none                        *
*                         *
*****************************************************************>>
GetInternalPrintJob: PROCEDURE[lockID: JobBackUp.LockID]
 RETURNS[internalPrintJob: BOOLEAN];

<<*****************************************************************
*                         *
* FUNCTION: Gets the interrupt value on a job, used for scan   *
*  interrupts.                    *
* PARAMETERS:                          *
*   lockID - job to be modified             *
* RETURN VALUES:                        *
*   interrupt - the interrupt value           *
* SIGNALS: none                        *
*                         *
*****************************************************************>>
GetInterrupt: PROCEDURE[lockID: JobBackUp.LockID]
   RETURNS [interrupt: BOOLEAN];

<<*****************************************************************
*                         *
* FUNCTION: Returns a lockID's jobID              *
* PARAMETERS:                          *
*   lockID - lockID whose jobID is returned          *
* RETURN VALUES:                        *
*   jobID - lockID's jobID                *
* SIGNALS: none                        *
*                         *
*****************************************************************>>
GetJobID: PROCEDURE[lockID: JobBackUp.LockID] RETURNS[jobID:
 JobID.ID];

<<*****************************************************************
*                         *
* FUNCTION: Database macro designed to grab all task independent *
*   information required to process a 'new' PostParse request. *
* PARAMETERS:                          *
*   lockID - job whose info is returned          *
*   stepRecord - step record used to acquire step parms    *
*   zone - zone where descriptors are allocated from      *
*   rootProc - calpback proc used to acquire job root info   *
* RETURN VALUES:                        *
*   media - media of job                 *
*   parms - step parameters of the particular task       *
*   plex - output plex of job               *
```

Copyright © 1992 Xerox Corporation All Rights Reserved

```
* SIGNALS: none                          *
*                          *
*******************************************************************>>
GetJobInfo: PROCEDURE[lockID: JobBackUp.LockID, stepRecord:
 SMStep.StepRecord, zone: UNCOUNTED ZONE, rootProc: RootProc]
 RETURNS[media: PublicPrinting.InternalMedia, parms:
 SMStep.ParmsHandle, plex: Plex];

<<*******************************************************************
*                          *
* FUNCTION:  Returns the plex of a job.          *
* PARAMETERS:                          *
*   lockID - job whose info is returned          *
* RETURN VALUES:                          *
*   plex - plex of job                          *
* SIGNALS: none                          *
*                          *
*******************************************************************>>
GetJobPlex: PROCEDURE[lockID: JobBackUp.LockID] RETURNS[plex: Plex];

<<*******************************************************************
*                          *
* FUNCTION:  Returns a job's root.          *
* PARAMETERS:                          *
*   lockID - job whose root is returned          *
*   zone - zone which strings in root are allocated from.  If  *
*    it's NIL, don't allocate strings.          *
* RETURN VALUES:                          *
*   jobRoot - root of job                          *
* SIGNALS: none                          *
*                          *
*******************************************************************>>
GetJobRoot: PROCEDURE[lockID: JobBackUp.LockID, zone: UNCOUNTED
 ZONE ← NIL] RETURNS[jobRoot: JobRoot];

<<*******************************************************************
*                          *
* FUNCTION:  Returns a job's mark submit counter.          *
* PARAMETERS:                          *
*   lockID - job whose mark submit counter is returned          *
* RETURN VALUES:                          *
*   counter - mark submit counter of job          *
* SIGNALS: none                          *
*                          *
*******************************************************************>>
GetMarkSubmitCounter: PROCEDURE[lockID: JobBackUp.LockID]
 RETURNS[counter: CARDINAL];

<<*******************************************************************
*                          *
```

Copyright © 1992 Xerox Corporation All Rights Reserved

```
* FUNCTION: Returns the plex of a job and the media used by the *
*   pages of a job.                      *
* PARAMETERS:                            *
*   lockID - job whose info is returned         *
*   zone - zone which media is allocated from.          *
* RETURN VALUES:                         *
*   media - media of job                 *
*   plex - plex of job                   *
* SIGNALS: none                          *
*                                *
*****************************************************************>>
GetMediaAndPlex: PROCEDURE[lockID: JobBackUp.LockID, zone: UNCOUNTED
 ZONE] RETURNS[media: PublicPrinting.InternalMedia, plex: Plex];

<<*****************************************************************
*                                *
* FUNCTION: Returns the name and version number of a job.    *
* PARAMETERS:                            *
*   id - id of job                       *
*   zone - zone where name is allocated from            *
* RETURN VALUES:                         *
*   name - name of job                   *
*   versionNumber - versionNumber of name            *
* SIGNALS:                               *
*   Error[jobIDNotFound] - id is not in the queue          *
*                                *
*****************************************************************>>
GetNameFromID: PROCEDURE[id: JobID.ID, zone: UNCOUNTED
 ZONE] RETURNS[name: JobName, versionNumber: CARDINAL];

<<*****************************************************************
*                                *
* FUNCTION: Copies the job name into the passed in string. If  *
*   the name is too long for the string, the name is truncated *
*   and the longer return value is set to TRUE.          *
* PARAMETERS:                            *
*   id - id of job                       *
*   string - string where name is filled into          *
* RETURN VALUES:                         *
*   longer - TRUE if name of job is longer than string's length *
*   versionNumber - versionNumber of name             *
* SIGNALS:                               *
*   Error[jobIDNotFound] - id is not in the queue          *
*                                *
*****************************************************************>>
GetNameFromJob: PROCEDURE[id: JobID.ID, string: LONG STRING]
 RETURNS[longer: BOOLEAN, versionNumber: CARDINAL];

<<*****************************************************************
*                                *
```

Copyright © 1992 Xerox Corporation All Rights Reserved

```
* FUNCTION: Returns whether a job is a net job.          *
* PARAMETERS:                        *
*   lockID - job checked              *
* RETURN VALUES:                      *
*   netJob - netJob of job            *
* SIGNALS: none                      *
*                           *
******************************************************************>>
GetNetJob: PROCEDURE[lockID: JobBackUp.LockID]
 RETURNS[netJob: BOOLEAN];

<<******************************************************************
*                           *
* FUNCTION: Returns the number of jobs in the print queue.    *
* PARAMETERS:                        *
*   forDisplay - only jobs displayed to operator        *
* RETURN VALUES:                      *
*   numberOfJobs - number of jobs             *
* SIGNALS: none                      *
*                           *
******************************************************************>>
GetNumberOfJobsInPrintQueue: PROCEDURE[forDisplay: BOOLEAN]
 RETURNS[numberOfJobs: CARDINAL];

<<******************************************************************
*                           *
* FUNCTION: Returns the number of jobs in the system file.    *
* PARAMETERS:                        *
*   forDisplay - only jobs displayed to operator        *
* RETURN VALUES:                      *
*   numberOfJobs - number of jobs             *
* SIGNALS: none                      *
*                           *
******************************************************************>>
GetNumberOfJobsInSystemFile: PROCEDURE[forDisplay: BOOLEAN]
 RETURNS[numberOfJobs: CARDINAL];

<<******************************************************************
*                           *
* FUNCTION: Returns the number of media on the job.       *
* PARAMETERS:                        *
*   lockID - job looked at             *
* RETURN VALUES:                      *
*   number - number of media of job           *
* SIGNALS: none                      *
*                           *
******************************************************************>>
GetNumberOfMedia: PROCEDURE[lockID: JobBackUp.LockID]
 RETURNS[number: CARDINAL];
```

Copyright © 1992 Xerox Corporation All Rights Reserved

```
<<*******************************************************************
*                              *
* FUNCTION: Returns the number of pages on the job.        *
* PARAMETERS:                                  *
*   lockID - job whose number of pages is returned      *
*   countTabs - include tab pages in count        *
* RETURN VALUES:                                 *
*   numberOfPages - number of pages of job          *
* SIGNALS: none                                *
*                              *
*******************************************************************>>
GetNumberOfPages: PROCEDURE[lockID: JobBackUp.LockID, countTabs:
 BOOLEAN ← TRUE] RETURNS[numberOfPages: CARDINAL];

<<*******************************************************************
*                              *
* FUNCTION: Returns the number of pages sides on the job.     *
* PARAMETERS:                                  *
*   lockID - job whose number of page sides is returned     *
*   countTabs - include tab pages in count        *
* RETURN VALUES:                                 *
*   numberOfPageSides - number of page sides of job        *
* SIGNALS: none                                *
*                              *
*******************************************************************>>
GetNumberOfPageSides: PROCEDURE[lockID: JobBackUp.LockID, countTabs:
 BOOLEAN ← TRUE] RETURNS[numberOfPageSides: CARDINAL];

<<*******************************************************************
*                              *
* FUNCTION: Returns the owner of the job.            *
* PARAMETERS:                                  *
*   jobID - job to be modified                   *
*   zone - zone which owner is allocated from.        *
* RETURN VALUES:                                 *
*   owner - owner of job                         *
* SIGNALS: none                                *
*                              *
*******************************************************************>>
GetOwner: PROCEDURE[jobID: JobID.ID, zone: UNCOUNTED
 ZONE] RETURNS[owner: DirectoryType.Owner];

<<*******************************************************************
*                              *
* FUNCTION: Returns the page numbering on the job.         *
* PARAMETERS:                                  *
*   lockID - job whose page numbering is returned        *
* RETURN VALUES:                                 *
*   pageNumbering - page numbering of job           *
* SIGNALS: none                                *
```

Copyright © 1992 Xerox Corporation All Rights Reserved

```
*                              *
*******************************************************************>>
GetPageNumbering: PROCEDURE[lockID: JobBackUp.LockID]
 RETURNS[pageNumbering: PageNumTypes.PageNumParms];

<<*******************************************************************
*                              *
* FUNCTION: Returns the printFileValid on the job.        *
* PARAMETERS:                      *
*   lockID - job whose printFileValid is returned        *
* RETURN VALUES:                    *
*   printFileValid - printFileValid of job         *
* SIGNALS: none                    *
*                              *
*******************************************************************>>
GetPrintFileValid: PROCEDURE[lockID: JobBackUp.LockID]
 RETURNS[printFileValid: BOOLEAN];

<<*******************************************************************
*                              *
* FUNCTION: Returns the print info of the job.        *
* PARAMETERS:                      *
*   lockID - job looked at                *
* RETURN VALUES:                    *
*   printRecord - print info of job          *
* SIGNALS: none                    *
*                              *
*******************************************************************>>
GetPrintRecord: PROCEDURE[lockID: JobBackUp.LockID]
 RETURNS[printRecord: PrintRecord];

<<*******************************************************************
*                              *
* FUNCTION: Returns the priority on the job.        *
* PARAMETERS:                      *
*   lockID - job whose priority is returned        *
* RETURN VALUES:                    *
*   priority - priority of job             *
* SIGNALS: none                    *
*                              *
*******************************************************************>>
GetPriority: PROCEDURE[lockID: JobBackUp.LockID]
 RETURNS[priority: Priority];

<<*******************************************************************
*                              *
* FUNCTION: Returns whether a job is a proof or not.        *
* PARAMETERS:                      *
*   lockID - job checked                 *
* RETURN VALUES:                    *
```

Copyright © 1992 Xerox Corporation All Rights Reserved

```
*   proofJob - proofJob of job                    *
* SIGNALS: none                             *
*                               *
*******************************************************************>>
GetProofJob: PROCEDURE[lockID: JobBackUp.LockID]
 RETURNS[proofJob: BOOLEAN];

<<*******************************************************************
*                               *
* FUNCTION:  Returns a job's scan count.               *
* PARAMETERS:                               *
*   lockID - job whose scan data is returned           *
* RETURN VALUES:                              *
*   scanCount - scan count of job                *
* SIGNALS: none                             *
*                               *
*******************************************************************>>
GetScanCount: PROCEDURE[lockID: JobBackUp.LockID]
 RETURNS[scanCount: CARDINAL];

<<*******************************************************************
*                               *
* FUNCTION:  Returns a job's scan data.               *
* PARAMETERS:                               *
*   lockID - job whose scan data is returned           *
* RETURN VALUES:                              *
*   scanData - scanData of job                   *
*   initialized - TRUE if scanData had been initialized; FALSE *
*    otherwise                          *
* SIGNALS: none                             *
*                               *
*******************************************************************>>
GetScanData: PROCEDURE[lockID: JobBackUp.LockID]
 RETURNS[initialized: BOOLEAN, scanData: ScanData];

<<*******************************************************************
*                               *
* FUNCTION:  Returns a scratch job's jobID.              *
* PARAMETERS:                               *
*   type - which scratch job to be returned            *
* RETURN VALUES:                              *
*   scratchJob - scratch job's jobID               *
* SIGNALS: none                             *
*                               *
*******************************************************************>>
GetScratchJob: PROCEDURE[type: ScratchJobType] RETURNS[scratchJob:
 JobID.ID];

<<*******************************************************************
*                               *
```

Copyright © 1992 Xerox Corporation All Rights Reserved

```
* FUNCTION: Returns a job's programmed covers.        *
* PARAMETERS:                              *
*   jobID - job whose security info is returned        *
*   zone - space where strings are allocated.          *
* RETURN VALUES:                            *
*   securityInfo - security information of job         *
* SIGNALS: none                             *
*                                     *
*****************************************************************>>
GetSecurityInfo: PROCEDURE[jobID: JobID.ID, zone: UNCOUNTED
 ZONE] RETURNS[securityInfo: DirectoryType.SecurityInfo];

<<*****************************************************************
*                                     *
* FUNCTION: Returns a job's segment record.            *
* PARAMETERS:                              *
*   lockID - job whose segment record is returned       *
* RETURN VALUES:                            *
*   segmentRecord - segmentRecord of job               *
* SIGNALS: none                             *
*                                     *
*****************************************************************>>
GetSegmentRecord: PROCEDURE[lockID: JobBackUp.LockID]
 RETURNS[segmentRecord: SegmentRecord];

<<*****************************************************************
*                                     *
* FUNCTION: Returns whether in Service Mode or not.       *
* PARAMETERS: none                            *
* RETURN VALUES:                            *
*   inServiceMode - TRUE if in Service Mode, FALSE otherwise  *
* SIGNALS: none                             *
*                                     *
*****************************************************************>>
GetServiceMode: PROCEDURE RETURNS[inServiceMode: BOOLEAN];

<<*****************************************************************
*                                     *
* FUNCTION: Returns whether a job is signature or not.     *
* PARAMETERS:                              *
*   lockID - job checked                      *
* RETURN VALUES:                            *
*   signatureJob - signatureJob of job            *
* SIGNALS: none                             *
*                                     *
*****************************************************************>>
GetSignatureJob: PROCEDURE[lockID: JobBackUp.LockID]
 RETURNS[signatureJob: BOOLEAN];

<<*****************************************************************
```

Copyright © 1992 Xerox Corporation All Rights Reserved

```
*                               *
* FUNCTION:  Returns the signature parms on the job.          *
* PARAMETERS:                   *
*    lockID - job whose signature parms is returned         *
* RETURN VALUES:                  *
*    signatureParms - signature parms of job            *
* SIGNALS: none                 *
*                               *
****************************************************************>>
GetSignatureParms: PROCEDURE[lockID: JobBackUp.LockID]
 RETURNS[signatureParms: SignatureParms];

<<****************************************************************
*                               *
* FUNCTION:  Sets the jobName of a job.              *
* PARAMETERS:                   *
*    jobID - job to be changed            *
*    jobName - new jobName                *
* RETURN VALUES:                  *
*    newVersionNumber - jobName's version number            *
* SIGNALS: none                 *
*                               *
****************************************************************>>
JobNameSet: PROC[jobID: JobID.ID, jobName: JobName]
 RETURNS[newVersionNumber: CARDINAL];

<<****************************************************************
*                               *
* FUNCTION:  Lists the jobs in the system queue of the desired  *
*    range.  If endNum is CARDINAL.LAST, then list to the end of *
*    the queue.                *
* PARAMETERS:                   *
*    beginNum - first job desired             *
*    endNum - last job desired               *
*    forDisplay - list only jobs displayed to operator       *
*    zone - where descriptor is allocated from          *
* RETURN VALUES:                  *
*    jobs - list of desired jobs                *
* SIGNALS: none                 *
*                               *
****************************************************************>>
ListNonPrintJobs: PROCEDURE[beginNum, endNum: CARDINAL, forDisplay:
 BOOLEAN, zone: UNCOUNTED ZONE] RETURNS[jobs: JobIDList];

<<****************************************************************
*                               *
* FUNCTION:  Lists the jobs in the print queue of the desired   *
*    range.  If endNum is CARDINAL.LAST, then list to the end of *
*    the queue.                *
* PARAMETERS:                   *
```

Copyright © 1992 Xerox Corporation All Rights Reserved

```
*    beginNum - first job desired                 *
*    endNum - last job desired                    *
*    forDisplay - list only jobs displayed to operator       *
*    zone - where descriptor is allocated from           *
* RETURN VALUES:                                  *
*    jobs - list of desired jobs                  *
* SIGNALS: none                                   *
*                          *
*****************************************************************>>
ListPrintJobs: PROCEDURE[beginNum, endNum: CARDINAL, forDisplay:
 BOOLEAN, zone: UNCOUNTED ZONE] RETURNS[jobs: JobIDList];

<<*****************************************************************
*                          *
* FUNCTION: Locks a job. Several people can lock a job with    *
*    readOnly TRUE. (ie. they will only be reading the job)    *
* PARAMETERS:                                     *
*    job - job to be locked                       *
*    jobID - id of job to be locked                  *
*    readOnly - whether the job will be modified or not        *
* RETURN VALUES:                                  *
*    lockID - id of the locked job (use to modify the job)     *
* SIGNALS:                                        *
*    JobQ.Error[jobIDNotFound] - job is not in the queue       *
*    JobQ.Error[readOnlyReferenceUsed] - job is          *
*      readOnlyJobReference but readOnly is FALSE          *
*    JobQ.Error[tooManyLockedJobs] - too many locked jobs      *
*                          *
*****************************************************************>>
LockJob: PROCEDURE[job: JobReference, jobID: JobID.ID, readOnly:
 BOOLEAN ← FALSE] RETURNS[lockID: JobBackUp.LockID];

<<*****************************************************************
*                          *
* FUNCTION: Sets the current operator access value for all jobs. *
* PARAMETERS:                                     *
*    operator - current operator                     *
* RETURN VALUES: none                                *
* SIGNALS: none                                   *
*                          *
*****************************************************************>>
Login: PROCEDURE[operator: DirectoryType.Owner];

<<*****************************************************************
*                          *
* FUNCTION: Sets the current operator access value for all jobs *
*    to be none.                               *
* PARAMETERS: none                                *
* RETURN VALUES: none                                *
* SIGNALS: none                                   *
```

Copyright © 1992 Xerox Corporation All Rights Reserved

```
*                                  *
********************************************************************>>
LogoffForSecureSite: PROCEDURE;

<<********************************************************************
*                                  *
* FUNCTION: Sees if a medium is in a job's media list.        *
* PARAMETERS:                                  *
*   lockID - job to be checked                      *
*   medium - medium looked for                        *
* RETURN VALUES:                                 *
*   mediumInJob - TRUE if job has medium, FALSE otherwise     *
* SIGNALS: none                                 *
*                                  *
********************************************************************>>
MediumInJob: PROCEDURE[lockID: JobBackUp.LockID, medium:
 PublicPrinting.InternalMedium] RETURNS[mediumInJob: BOOLEAN];

<<********************************************************************
*                                  *
* FUNCTION: Moves a job before another job in the queue.      *
* PARAMETERS:                                  *
*   jobID - job to be moved                        *
*   beforeJobID - what job the job should be moved before     *
* RETURN VALUES: none                               *
* SIGNALS:                                 *
*   JobQ.Error[jobIDNotFound] - jobID (or beforeJobID) is not  *
*    in the queue                               *
*   JobQ.Error[operatorDoesNotHaveAccess] - current operator   *
*    does not have access to job                      *
*   JobQ.Error[tooManyLockedJobs] - too many locked jobs      *
*                                  *
********************************************************************>>
Move: PROCEDURE[jobID: JobID.ID, beforeJobID: JobID.ID];

<<********************************************************************
*                                  *
* FUNCTION: Moves a job to the end of the print queue.       *
* PARAMETERS:                                  *
*   jobToMove - job to be moved                        *
* RETURN VALUES: none                               *
* SIGNALS:                                 *
*   JobQ.Error[jobIDNotFound] - jobToMove is not in the queue  *
*   JobQ.Error[operatorDoesNotHaveAccess] - current operator   *
*    does not have access to job                      *
*   JobQ.Error[tooManyLockedJobs] - too many locked jobs      *
*                                  *
********************************************************************>>
MoveToEndOfPrintQueue: PROCEDURE[jobToMove: JobID.ID];
```

Copyright © 1992 Xerox Corporation All Rights Reserved

```
<<*******************************************************************
*                               *
* FUNCTION: Moves a job to the system queue.                *
* PARAMETERS:                       *
*   jobToMove - job to be moved                 *
* RETURN VALUES: none                       *
* SIGNALS:                      *
*   JobQ.Error[jobIDNotFound] - jobToMove is not in the queue *
*   JobQ.Error[operatorDoesNotHaveAccess] - current operator  *
*    does not have access to job                *
*   JobQ.Error[tooManyLockedJobs] - too many locked jobs      *
*                               *
*******************************************************************>>
MoveToSystemQueue: PROCEDURE[jobToMove: JobID.ID];

<<*******************************************************************
*                               *
* FUNCTION: Sets the logo objects of a job to be            *
*   [DirectoryType.nullObjectID, DirectoryType.nullObjectID, 0].*
* PARAMETERS:                       *
*   lockID - job to be modified                 *
* RETURN VALUES: none                       *
* SIGNALS: none                     *
*                               *
*******************************************************************>>
NullLogoObjects: PROCEDURE[lockID: JobBackUp.LockID];

<<*******************************************************************
*                               *
* FUNCTION: Determines if a user owns any jobs.             *
* PARAMETERS:                       *
*   user - user checked                     *
* RETURN VALUES:                        *
*   ownsAJob - TRUE if user owns a job, FALSE otherwise       *
* SIGNALS: none                     *
*                               *
*******************************************************************>>
OwnsAJob: PROCEDURE[user: DirectoryType.Owner] RETURNS[ownsAJob:
 BOOLEAN];

<<*******************************************************************
*                               *
* FUNCTION: Sets the print file of a job (and its print file  *
*   validity to TRUE). IF name is RTOSFile.nullID, print file *
*   validity is set to FALSE.                   *
* PARAMETERS:                       *
*   lockID - job to be modified                 *
*   name - new print file                   *
* RETURN VALUES: none                       *
* SIGNALS: none                     *
```

Copyright © 1992 Xerox Corporation All Rights Reserved

```
*                                 *
*******************************************************************>>
PrintFileSet: PROCEDURE[lockID: JobBackUp.LockID, name:
 RTOSFile.FileID];

<<*******************************************************************
*                                 *
* FUNCTION:  Sets the print file validity of a job.          *
* PARAMETERS:                          *
*   lockID - job to be modified                *
*   valid - new print file validity              *
* RETURN VALUES: none                          *
* SIGNALS: none                        *
*                                 *
*******************************************************************>>
PrintFileValiditySet: PROCEDURE[lockID: JobBackUp.LockID, valid:
 BOOLEAN];

<<*******************************************************************
*                                 *
* FUNCTION:  References a job.  A client's reference contains   *
*   the clients dirty word's list.  After a client has      *
*   completed his/her updates, s/he should call DereferenceJob. *
* PARAMETERS:                          *
*   jobID - job to be referenced                *
* RETURN VALUES:                          *
*   reference - job's reference handle              *
* SIGNALS:                          *
*   JobQ.Error[jobIDNotFound] - jobID is not in the queue     *
*                                 *
*******************************************************************>>
ReferenceJob: PROCEDURE[jobID: JobID.ID] RETURNS[reference:
 JobReference];

<<*******************************************************************
*                                 *
* FUNCTION:  Changes all references of oldUser to be newUser.   *
* PARAMETERS:                          *
*   oldUser - user's old name                 *
*   newUser - user's new name                  *
* RETURN VALUES: none                          *
* SIGNALS: none                        *
*                                 *
*******************************************************************>>
RenameUser: PROCEDURE[oldUser: DirectoryType.Owner, newUser:
 DirectoryType.Owner];

<<*******************************************************************
*                                 *
* FUNCTION:  Sets job's owner's account.              *
```

Copyright © 1992 Xerox Corporation All Rights Reserved

```
* PARAMETERS:                          *
*   lockID - job to be modified           *
*   account - new account                *
* RETURN VALUES: none                     *
* SIGNALS: none                        *
*                            *
*****************************************************************>>
SetAccount: PROCEDURE[lockID: JobBackUp.LockID, account:
 CustomerAcct];

<<*****************************************************************
*                            *
* FUNCTION: Sets status of job's owner's account.          *
* PARAMETERS:                          *
*   lockID - job to be modified           *
*   accountStatus - new accountStatus           *
* RETURN VALUES: none                     *
* SIGNALS: none                        *
*                            *
*****************************************************************>>
SetAccountStatus: PROCEDURE[lockID: JobBackUp.LockID, accountStatus:
 AccountStatus];

<<*****************************************************************
*                            *
* FUNCTION: Sets who can acquire a job.          *
* PARAMETERS:                          *
*   jobID - job to be modified            *
*   acquireAccess - new acquireAccess          *
* RETURN VALUES: none                     *
* SIGNALS: none                        *
*                            *
*****************************************************************>>
SetAcquireAccess: PROCEDURE[jobID: JobID.ID, acquireAccess:
 DirectoryType.OperatorAccess];

<<*****************************************************************
*                            *
* FUNCTION: Sets the adminSheetMedium of a job.          *
* PARAMETERS:                          *
*   lockID - job to be modified           *
*   medium - new medium                   *
* RETURN VALUES: none                     *
* SIGNALS: none                        *
*                            *
*****************************************************************>>
SetAdminSheetMedium: PROCEDURE[lockID: JobBackUp.LockID,
 medium: PublicPrinting.InternalMedium];

<<*****************************************************************
```

Copyright © 1992 Xerox Corporation All Rights Reserved

```
*                                  *
* FUNCTION: Sets billing handle of job.        *
* PARAMETERS:                              *
*   lockID - job to be modified                *
*   billingHandle - new billingHandle              *
* RETURN VALUES: none                          *
* SIGNALS: none                            *
*                                  *
******************************************************************>>
SetBillingHandle: PROCEDURE[lockID: JobBackUp.LockID, billingHandle:
 AccountRecord.Handle];

<<******************************************************************
*                                  *
* FUNCTION: Specifies whether job needs a break page.       *
* PARAMETERS:                              *
*   lockID - job to be modified                *
*   breakPageNeeded - new breakPageNeeded             *
* RETURN VALUES: none                          *
* SIGNALS: none                            *
*                                  *
******************************************************************>>
SetBreakPageNeeded: PROCEDURE[lockID: JobBackUp.LockID,
 breakPageNeeded: BOOLEAN];

<<******************************************************************
*                                  *
* FUNCTION: Specifies which covers a job has.         *
* PARAMETERS:                              *
*   lockID - job to be modified                *
*   covers - new covers                      *
* RETURN VALUES: none                          *
* SIGNALS: none                            *
*                                  *
******************************************************************>>
SetCovers: PROCEDURE[lockID: JobBackUp.LockID, covers: Covers];

<<******************************************************************
*                                  *
* FUNCTION: Specifies which covers a job is programmed with.   *
* PARAMETERS:                              *
*   lockID - job to be modified                *
*   covers - new covers                      *
* RETURN VALUES: none                          *
* SIGNALS: none                            *
*                                  *
******************************************************************>>
SetCoversRec: PROCEDURE[lockID: JobBackUp.LockID, covers:
 CoversRec];
```

Copyright © 1992 Xerox Corporation All Rights Reserved

```
<<*******************************************************************
*                         *
* FUNCTION: Sets the dateStamp of a job.              *
* PARAMETERS:                        *
*   lockID - job to be modified           *
*   dateStamp - new value of job's dateStamp         *
* RETURN VALUES: none                   *
* SIGNALS: none                     *
*                         *
*****************************************************************>>
SetDateStamp: PROCEDURE[lockID: JobBackUp.LockID,
 dateStamp: System.GreenwichMeanTime];

<<*******************************************************************
*                         *
* FUNCTION: Sets the deletionType of a job.             *
* PARAMETERS:                        *
*   lockID - job to be modified           *
*   deletionType - new value of job's deletionType         *
* RETURN VALUES: none                   *
* SIGNALS: none                     *
*                         *
*****************************************************************>>
SetDeletionType: PROCEDURE[lockID: JobBackUp.LockID,
 deletionType: JobLog.Status];

<<*******************************************************************
*                         *
* FUNCTION: Specifies if a job can be printed in service mode. *
* PARAMETERS:                        *
*   lockID - job to be modified           *
*   diagnosticsJob - new value of service mode specification *
* RETURN VALUES: none                   *
* SIGNALS: none                     *
*                         *
*****************************************************************>>
SetDiagnosticsJob: PROCEDURE[lockID: JobBackUp.LockID,
 diagnosticsJob: BOOLEAN];

<<*******************************************************************
*                         *
* FUNCTION: Sets the disposition of a job.              *
* PARAMETERS:                        *
*   lockID - job to be modified           *
*   disposition - new disposition          *
* RETURN VALUES: none                   *
* SIGNALS: none                     *
*                         *
*****************************************************************>>
SetDisposition: PROCEDURE[lockID: JobBackUp.LockID, disposition:
```

Copyright © 1992 Xerox Corporation All Rights Reserved

```
 Disposition];

<<*****************************************************************
*                              *
* FUNCTION: Sets the internalPrintMedium of a job.          *
* PARAMETERS:                         *
*   lockID - job to be modified              *
*   medium - new medium                      *
* RETURN VALUES: none                        *
* SIGNALS: none                         *
*                              *
*****************************************************************>>
SetInternalPrintMedium: PROCEDURE[lockID: JobBackUp.LockID,
 medium: PublicPrinting.InternalMedium];

<<*****************************************************************
*                              *
* FUNCTION: Sets the interrupt value on a job, used for scan    *
*   interrupts.                     *
* PARAMETERS:                         *
*   lockID - job to be modified              *
*   interrupt - the interrupt value           *
* RETURN VALUES: none                        *
* SIGNALS: none                         *
*                              *
*****************************************************************>>
SetInterrupt: PROCEDURE[lockID: JobBackUp.LockID, interrupt:
 BOOLEAN];

<<*****************************************************************
*                              *
* FUNCTION: Sets the jobSupplement value on a job.          *
* PARAMETERS:                         *
*   lockID - job to be modified              *
*   jobSupplement - the jobSupplement value          *
* RETURN VALUES: none                        *
* SIGNALS: none                         *
*                              *
*****************************************************************>>
SetJobSupplement: PROCEDURE[lockID: JobBackUp.LockID, jobSupplement:
 BOOLEAN];

<<*****************************************************************
*                              *
* FUNCTION: Sets the mark submit counter value on a job.        *
* PARAMETERS:                         *
*   lockID - job to be modified              *
*   counter - the mark submit counter value         *
* RETURN VALUES: none                        *
* SIGNALS: none                         *
```

Copyright © 1992 Xerox Corporation All Rights Reserved

```
*                              *
*****************************************************************>>
SetMarkSubmitCounter: PROCEDURE[lockID: JobBackUp.LockID, counter:
 CARDINAL];

<<*****************************************************************
*                              *
* FUNCTION:  Sets the message value on a job.              *
* PARAMETERS:                          *
*    lockID - job to be modified               *
*    message - the message value                 *
* RETURN VALUES: none                          *
* SIGNALS: none                        *
*                              *
*****************************************************************>>
SetMessage: PROCEDURE[lockID: JobBackUp.LockID, message:
 LONG STRING];

<<*****************************************************************
*                              *
* FUNCTION:  Sets who can modify a job.              *
* PARAMETERS:                          *
*    jobID - job to be modified                *
*    modifyAccess - new modifyAccess                 *
* RETURN VALUES: none                          *
* SIGNALS: none                        *
*                              *
*****************************************************************>>
SetModifyAccess: PROCEDURE[jobID: JobID.ID, modifyAccess:
 DirectoryType.OperatorAccess];

<<*****************************************************************
*                              *
* FUNCTION:  Sets the owner of the job.              *
* PARAMETERS:                          *
*    jobID - job to be modified                *
*    owner - owner of job                    *
* RETURN VALUES: none                          *
* SIGNALS: none                        *
*                              *
*****************************************************************>>
SetOwner: PROCEDURE[jobID: JobID.ID, owner: DirectoryType.Owner];

<<*****************************************************************
*                              *
* FUNCTION:  Sets the page numbering of a job.              *
* PARAMETERS:                          *
*    lockID - job to be modified               *
*    pageNumbering - new page numbering                *
* RETURN VALUES: none                          *
```

Copyright © 1992 Xerox Corporation All Rights Reserved

```
* SIGNALS: none                        *
*                            *
******************************************************************>>
SetPageNumbering: PROCEDURE[lockID: JobBackUp.LockID, pageNumbering:
 PageNumTypes.PageNumParms];

<<******************************************************************
*                            *
* FUNCTION: Sets the print info of a job.            *
* PARAMETERS:                         *
*    lockID - job to be modified               *
*    printRecord - new print info               *
* RETURN VALUES: none                        *
* SIGNALS: none                        *
*                            *
******************************************************************>>
SetPrintRecord: PROCEDURE[lockID: JobBackUp.LockID, printRecord:
 PrintRecord];

<<******************************************************************
*                            *
* FUNCTION: Sets the priority of a job.            *
* PARAMETERS:                         *
*    lockID - job to be modified               *
*    priority - new priority               *
* RETURN VALUES: none                        *
* SIGNALS: none                        *
*                            *
******************************************************************>>
SetPriority: PROCEDURE[lockID: JobBackUp.LockID, priority:
 Priority];

<<******************************************************************
*                            *
* FUNCTION: Sets the proofJob value of a job.            *
* PARAMETERS:                         *
*    lockID - job to be modified               *
*    priority - new proofJob value               *
* RETURN VALUES: none                        *
* SIGNALS: none                        *
*                            *
******************************************************************>>
SetProofJob: PROCEDURE[lockID: JobBackUp.LockID, proofJob:
 BOOLEAN];

<<******************************************************************
*                            *
* FUNCTION: Sets the recipientName value of a job.            *
* PARAMETERS:                         *
*    lockID - job to be modified               *
```

Copyright © 1992 Xerox Corporation All Rights Reserved

```
*   recipientName - new recipientName value            *
* RETURN VALUES: none                          *
* SIGNALS: none                           *
*                                *
******************************************************************>>
SetRecipientName: PROCEDURE[lockID: JobBackUp.LockID, recipientName:
 DirectoryType.Owner];

<<******************************************************************
*                                *
* FUNCTION:  Sets the scan count of a job.            *
* PARAMETERS:                            *
*   lockID - job to be modified                 *
*   scanCount - new scan count                   *
* RETURN VALUES: none                          *
* SIGNALS: none                           *
*                                *
******************************************************************>>
SetScanCount: PROCEDURE[lockID: JobBackUp.LockID, scanCount:
 CARDINAL];

<<******************************************************************
*                                *
* FUNCTION:  Sets the scan data of a job.            *
* PARAMETERS:                            *
*   lockID - job to be modified                 *
*   scanData - new scanData                    *
* RETURN VALUES: none                          *
* SIGNALS: none                           *
*                                *
******************************************************************>>
SetScanData: PROCEDURE[lockID: JobBackUp.LockID, scanData:
 ScanData];

<<******************************************************************
*                                *
* FUNCTION:  Sets the segmentRecord value of a job.        *
* PARAMETERS:                            *
*   lockID - job to be modified                 *
*   segmentRecord - new segmentRecord value          *
* RETURN VALUES: none                          *
* SIGNALS: none                           *
*                                *
******************************************************************>>
SetSegmentRecord: PROCEDURE[lockID: JobBackUp.LockID, segmentRecord:
 SegmentRecord];

<<******************************************************************
*                                *
* FUNCTION:  Sets the senderName value of a job.         *
```

Copyright © 1992 Xerox Corporation All Rights Reserved

```
* PARAMETERS:                                    *
*   lockID - job to be modified                    *
*   senderName - new senderName value                  *
* RETURN VALUES: none                              *
* SIGNALS: none                                  *
*                                        *
*******************************************************************>>
SetSenderName: PROCEDURE[lockID: JobBackUp.LockID, senderName:
 DirectoryType.Owner];

<<*******************************************************************
*                                        *
* FUNCTION: Sets whether in Service Mode or not.          *
* PARAMETERS:                                    *
*   inServiceMode - new mode value                   *
* RETURN VALUES: none                              *
* SIGNALS: none                                  *
*                                        *
*******************************************************************>>
SetServiceMode: PROCEDURE[inServiceMode: BOOLEAN];

<<*******************************************************************
*                                        *
* FUNCTION: Sets the signatureJob value of a job.         *
* PARAMETERS:                                    *
*   lockID - job to be modified                    *
*   signatureJob - new signatureJob value              *
* RETURN VALUES: none                              *
* SIGNALS: none                                  *
*                                        *
*******************************************************************>>
SetSignatureJob: PROCEDURE[lockID: JobBackUp.LockID, signatureJob:
 BOOLEAN];

<<*******************************************************************
*                                        *
* FUNCTION: Sets the signature parms of a job.           *
* PARAMETERS:                                    *
*   lockID - job to be modified                    *
*   signatureParms - new signatureParms                *
* RETURN VALUES: none                              *
* SIGNALS: none                                  *
*                                        *
*******************************************************************>>
SetSignatureParms: PROCEDURE[lockID: JobBackUp.LockID,
 signatureParms: SignatureParms];

<<*******************************************************************
*                                        *
* FUNCTION: Sets the slip sheeting of a job.            *
```

Copyright © 1992 Xerox Corporation All Rights Reserved

```
* PARAMETERS:                          *
*   lockID - job to be modified          *
*   slipSheet - new slipSheet           *
* RETURN VALUES: none                    *
* SIGNALS: none                        *
*                                *
*******************************************************************>>
SetSlipSheeting: PROCEDURE[lockID: JobBackUp.LockID, slipSheet:
 SlipSheet];

<<*******************************************************************
*                                *
* FUNCTION: Unlocks a job.                *
* PARAMETERS:                          *
*   lockID - id of locked job            *
* RETURN VALUES: none                    *
* SIGNALS: none                        *
*                                *
*******************************************************************>>
UnlockJob: PROCEDURE[lockID: JobBackUp.LockID];

<<*******************************************************************
*                                *
* FUNCTION: Updates the submission time of a job to the current *
*   Greenwich mean time.                *
* PARAMETERS:                          *
*   lockID - job to be modified          *
* RETURN VALUES: none                    *
* SIGNALS: none                        *
*                                *
*******************************************************************>>
UpdateSubmissionTime: PROCEDURE[lockID: JobBackUp.LockID];

END.
```

Copyright © 1992 Xerox Corporation All Rights Reserved

```
DIRECTORY
 JobBackUp USING [LockID],
 JobQ USING [Location];

JobQPlus: DEFINITIONS =
 BEGIN

 GetCoversLocation: PROCEDURE [lockID: JobBackUp.LockID]
  RETURNS [coversLocation: JobQ.Location];

 GetNumberOfJobs: PROCEDURE
  RETURNS [numberOfJobs: CARDINAL, systemLimitReached: BOOLEAN];

 GetStitching: PROCEDURE [lockID: JobBackUp.LockID]
  RETURNS [stitchNormal: BOOLEAN, stitchA, stitchB: CARDINAL];

 SetCoversLocation: PROCEDURE [
  lockID: JobBackUp.LockID, coversLocation: JobQ.Location];

 SetRecyclableJob: PROCEDURE [lockID: JobBackUp.LockID, recyclableJob: BOOLEAN];

 SetStitching: PROCEDURE [
  lockID: JobBackUp.LockID, stitchNormal: BOOLEAN, stitchA, stitchB: CARDINAL];

 END.
```

Copyright © 1992 Xerox Corporation All Rights Reserved

```
DIRECTORY
 JobID USING [ID],
 JobBackUp USING [LockID],
 ResMgrIDs USING [TransactionID],
 SMStep USING [ParmsHandle, StepRecord, StepType];

JobStep: DEFINITIONS =
 BEGIN


 ErrorCode: TYPE = {
  invalidStepConnection, newStepNotAllowed, nilStepHandle, noJobReady,
  noStepOfStepType, stepAboveCurrentStep, stepAlreadyCompleted,
  stepAlreadyConnected, stepCurrentlyBusy, stepNoNotFound, stepNotCurrent,
  stepNotFound, stepsNotStreamed};


 RootStep: TYPE = RECORD [jobStep: Step, stepHandle: StepHandle];


 Status: TYPE = {
  aborted, done, faulted, interrupted, new, ready, readyWaiting, running,
  runningWaiting};


 Step: TYPE = RECORD [
  stepRecord: SMStep.StepRecord,
  transactionID: ResMgrIDs.TransactionID,
  status: Status ← done];


 StepConnection: TYPE = {nil, partialSequential, sequential, stream};


 StepHandle: TYPE [2];


 StepKind: TYPE = {partialSequential, sequential, stream};


 StepObject: TYPE;


 StepProc: TYPE = PROCEDURE [step: StepHandle, clientData: LONG POINTER ← NIL];


 nullStepHandle: StepHandle = LOOPHOLE[LONG[0]];
```

Copyright © 1992 Xerox Corporation All Rights Reserved

```
Error: SIGNAL [code: ErrorCode];

ApproveTransaction: PROCEDURE [
 transaction: ResMgrIDs.TransactionID, turnOn: BOOLEAN];

ClearAllStepsForFiling: PROCEDURE [
 lockID: JobBackUp.LockID, filingParms: SMStep.ParmsHandle];

Delete: PROCEDURE [lockID: JobBackUp.LockID, step: StepHandle];

EnumerateNextCurrentStep: PROCEDURE [
 lockID: JobBackUp.LockID, stepHandle: StepHandle]
 RETURNS [step: Step, nextStepHandle: StepHandle];

EnumerateNextIdleStep: PROCEDURE [
 lockID: JobBackUp.LockID, stepHandle: StepHandle]
 RETURNS [nextStepHandle: StepHandle];

EnumerateNextPartialSequentialStep: PROCEDURE [
 lockID: JobBackUp.LockID, stepHandle: StepHandle]
 RETURNS [step: Step, nextStepHandle: StepHandle];

EnumerateNextSequentialStep: PROCEDURE [
 lockID: JobBackUp.LockID, stepHandle: StepHandle]
 RETURNS [step: Step, nextStepHandle: StepHandle];

EnumerateNextStream: PROCEDURE [
 lockID: JobBackUp.LockID, stepHandle: StepHandle]
 RETURNS [step: Step, nextStepHandle: StepHandle];

EnumerateNextStreamStep: PROCEDURE [
 lockID: JobBackUp.LockID, stepHandle: StepHandle]
 RETURNS [step: Step, nextStepHandle: StepHandle];

EnumeratePreviousStep: PROCEDURE [
 lockID: JobBackUp.LockID, stepHandle: StepHandle]
```

Copyright © 1992 Xerox Corporation All Rights Reserved

```
RETURNS [step: Step, previousStepHandle: StepHandle, stepKind: StepKind];

EnumerateStream: PROCEDURE [
 lockID: JobBackUp.LockID, step: StepHandle, stepProc: StepProc,
 clientData: LONG POINTER ← NIL];

GetNextJob: PROCEDURE [
 stepType: SMStep.StepType, skipRunningJobs: BOOLEAN ← FALSE,
 transaction: ResMgrIDs.TransactionID] RETURNS [jobID: JobID.ID];

GetRootStep: PROCEDURE [
 lockID: JobBackUp.LockID, stepType: SMStep.StepType,
 transaction: ResMgrIDs.TransactionID ← logging] RETURNS [rootStep: RootStep];

GetStep: PROCEDURE [lockID: JobBackUp.LockID, stepHandle: StepHandle]
 RETURNS [step: Step];

OnStream: PROCEDURE [lockID: JobBackUp.LockID, step: StepHandle]
 RETURNS [onStream: BOOLEAN ← FALSE];

PutAfter: PROCEDURE [
 lockID: JobBackUp.LockID, step: Step, target: StepHandle, stepKind: StepKind]
 RETURNS [newStep: StepHandle];

PutASAP: PROCEDURE [lockID: JobBackUp.LockID, step: Step];

PutBefore: PROCEDURE [
 lockID: JobBackUp.LockID, step: Step, target: StepHandle, stepKind: StepKind]
 RETURNS [newStep: StepHandle];

PutLast: PROCEDURE [lockID: JobBackUp.LockID, step: Step]
 RETURNS [newStep: StepHandle];

StatusGet: PROCEDURE [lockID: JobBackUp.LockID, stepHandle: StepHandle]
 RETURNS [status: Status];

StatusPut: PROCEDURE [
 lockID: JobBackUp.LockID, status: Status, stepHandle: StepHandle];
```

Copyright © 1992 Xerox Corporation All Rights Reserved

END.

Copyright © 1992 Xerox Corporation All Rights Reserved

```
-- File: MemoryPartitions.mesa - last edit:

-- Copyright (C) 1987, 1988, 1990 by Xerox Corporation. All rights reserved.

DIRECTORY
 ResMgrIDs USING [ID],
 ResMgrStorage USING [Pages];

MemoryPartitions: DEFINITIONS = BEGIN

 -- TYPEs

 GetStaticPages: PROCEDURE [id: ResMgrIDs.ID]
  RETURNS [pages: ResMgrStorage.Pages];

  -- Returns the static memory allocation for the specified client.

 GetVirtualRange: PROCEDURE [id: ResMgrIDs.ID]
  RETURNS [vmStart, vmEnd: LONG POINTER];

  -- Returns the virtural memory range for the specified client.

  END.
```

Copyright © 1992 Xerox Corporation All Rights Reserved

```
DIRECTORY
 ResMgrIDs USING [ID],
 ResMgrStorage USING [Pages];

MemoryPartitions: DEFINITIONS =
 BEGIN

 GetStaticPages: PROCEDURE [id: ResMgrIDs.ID]
  RETURNS [pages: ResMgrStorage.Pages];

 GetVirtualRange: PROCEDURE [id: ResMgrIDs.ID]
  RETURNS [vmStart, vmEnd: LONG POINTER];

 END.
```

Copyright © 1992 Xerox Corporation All Rights Reserved

```
DIRECTORY
 PSB USING [PsbFlags, PsbIndex, PsbLink],
 System USING [Pulses];

MicroLog: DEFINITIONS =
 BEGIN

 CSB: TYPE = MACHINE DEPENDENT RECORD [
  startOfLog(0): CARDINAL, endOfLog(1): CARDINAL, nextPtr(2): CARDINAL];
 LogEntry: TYPE = MACHINE DEPENDENT RECORD [
  globalFrame(0): CARDINAL,
  programCounter(1): CARDINAL,
  mpuDescriptor(2): MpuDescriptor,
  psbLink(3): PSB.PsbLink,
  psbFlags(4): PSB.PsbFlags,
  psbDataWord(5): PsbDataWord,
  timeStamp(6): System.Pulses];
 MpuDescriptor: TYPE = MACHINE DEPENDENT RECORD [
  spare(0:0..0): [0..1],
  extInt0(0:1..1): BOOLEAN,
  extInt1(0:2..2): BOOLEAN,
  psb(0:3..12): PSB.PsbIndex,
  directed(0:13..13): BOOLEAN,
  stopPending(0:14..14): BOOLEAN,
  scheduled(0:15..15): BOOLEAN];
 PsbDataWord: TYPE = MACHINE DEPENDENT RECORD [
  mpuCacheId(0:0..3): CARDINAL [2..10), unknown(0:4..15): CARDINAL [0..4095]];

 Initialize: PROCEDURE [];

 StartLogging: PROCEDURE [];

 StopLogging: PROCEDURE [];

 ClearLog: PROCEDURE [];

 END.
```

Copyright © 1992 Xerox Corporation All Rights Reserved

```
-- File: MRImageConversionService.mesa - last edit:

-- Copyright (C) 1986, 1987, 1988, 1989, 1990 by Xerox Corporation. All rights reserved.

DIRECTORY
 DisplayImage USING [ImageHeader],
 GrayImage USING [ConversionMethod],
 Image USING [Handle, nullHandle],
 IMSTypes USING [CropParams, ScalingParams, WindowDisplacement],
 JobID USING [ID],
 JobQ USING [JobReference],
 RasterDirectorySupervisor USING [ID],
 ResMgrIDs USING [TransactionID],
 ResMgrStorage USING [Pages],
 RTOSFile USING [FileID, nullID],
 RTOSWindow USING [Handle],
 Transformation USING [Matrix];


MRImageConversionService: DEFINITIONS =
 BEGIN

 --Types

 DRCInfo: TYPE = RECORD [displacement: IMSTypes.WindowDisplacement,
           conversionMethod: GrayImage.ConversionMethod];

 ImageProcessingTask: TYPE = RECORD [
  transaction: ResMgrIDs.TransactionID,
  destination: Image.Handle,
  jobRef: JobQ.JobReference,
  var: SELECT type: Task FROM
   cropOrientScale =>[crop:IMSTypes.CropParams,
     orientation:ImageOrientation,
     scale:IMSTypes.ScalingParams,
     scanUpdates: ScanUpdateRec],
   loopBack => [crop:IMSTypes.CropParams,
     orientation:ImageOrientation,
     scale:IMSTypes.ScalingParams,
     pdbFile: RTOSFile.FileID,
     pdbPage: ResMgrStorage.Pages,
     pdbOffset: CARDINAL],
   simplifyPage => [crop:IMSTypes.CropParams,
     orientation:ImageOrientation,
     scale:IMSTypes.ScalingParams],
   displayResolutionConversion => [
    drc: DRCInfo,
    orientation: ImageOrientation,
    crop: IMSTypes.CropParams,
    scale: IMSTypes.ScalingParams,
```

Copyright © 1992 Xerox Corporation All Rights Reserved

```
    wH: RTOSWindow.Handle,
    imageHeader: DisplayImage.ImageHeader],
   imageResampling = > [
    transformation: Transformation.Matrix,
    rasterID: RasterDirectorySupervisor.ID,
    yPadding: CARDINAL,
    coalescerIndex: CARDINAL],
   printResolutionConversion = >[
    action: PRCAction,
    crop:IMSTypes.CropParams,
    orientation:ImageOrientation,
    scale:IMSTypes.ScalingParams,
    rasterID: RasterDirectorySupervisor.ID,
    coalescerIndex: CARDINAL],
   ENDCASE] ← [destination: Image.nullHandle, transaction: pageEdit,
    jobRef: LOOPHOLE[LONG[0]], var:
     loopBack[crop:[], orientation:none, scale:[],
         pdbFile:RTOSFile.nullID, pdbPage:0, pdbOffset:0]];

 ImageOrientation: TYPE = {
  none, rotate90, rotate180, rotate270, mirrorLeftToRight, mirrorTopToLeft,
  mirrorTopToBottom, mirrorTopToRight};

  Priority: TYPE = {now, next, last};

 PRCAction: TYPE = {compression, decompression, normal, spare1, spare2};

 ScanUpdateRec: TYPE = RECORD[cropSizeX, cropSizeY: CARDINAL ← 0,
            cropOffsetX, cropOffsetY:CARDINAL ← 0];

 Task: TYPE = {cropOrientScale, displayResolutionConversion, imageResampling,
loopBack, printResolutionConversion, simplifyPage};

 --Procedures

 ClearFaults: PROCEDURE [];

 DoIt: PROCEDURE [id: JobID.ID, task: ImageProcessingTask] RETURNS [];

 Initialize: PROCEDURE [];

 MemoryShutDown: PROCEDURE[];

 PowerDown: PROCEDURE [];

 ResumeFromOverflow: PROCEDURE [];

 -- This proc may not be necessary due to the existance of MemoryShutDown
 AbortICS: PROCEDURE [id: JobID.ID, task: ImageProcessingTask];
```

Copyright © 1992 Xerox Corporation All Rights Reserved

END.

Copyright © 1992 Xerox Corporation All Rights Reserved

```
DIRECTORY
 JobQ USING [Disposition, Plex, Priority],
 PublicPrinting USING [InternalMedia, Finishing];

NetDefaults: DEFINITIONS =
 BEGIN

 NetJobParmsRec: TYPE = RECORD [
  finishing: PublicPrinting.Finishing,
  plex: JobQ.Plex,
  priority: JobQ.Priority];


 «Constants»


 «Variables»


 GetDefaultNetMedia: PROCEDURE [
  defaultNetMedia: PublicPrinting.InternalMedia, zone: UNCOUNTED ZONE];


 GetExportedServicesOnline: PROCEDURE [] RETURNS [online: BOOLEAN];


 GetExportedServicesOnlineStored: PROCEDURE [] RETURNS [online: BOOLEAN];


 GetFilingEnabled: PROCEDURE [] RETURNS [enabled: BOOLEAN];


 GetFilingEnabledStored: PROCEDURE [] RETURNS [enabled: BOOLEAN];


 GetNetJobDisposition: PROCEDURE [] RETURNS [disposition: JobQ.Disposition];


 GetNetJobParms: PUBLIC PROCEDURE [] RETURNS [parms: NetJobParmsRec];
```

Copyright © 1992 Xerox Corporation All Rights Reserved

```
GetPrintingServiceEnabled: PUBLIC PROCEDURE [] RETURNS [enabled: BOOLEAN];

GetPrintSpoolingEnabled: PROCEDURE [] RETURNS [enabled: BOOLEAN];

GetPrintSpoolingEnabledStored: PROCEDURE [] RETURNS [enabled: BOOLEAN];

SetExportedServicesOnline: PROCEDURE [online: BOOLEAN];

SetExportedServicesOnlineStored: PROCEDURE [online: BOOLEAN];

SetFilingEnabled: PROCEDURE [enabled: BOOLEAN];

SetFilingEnabledStored: PROCEDURE [enabled: BOOLEAN];

SetNetJobDisposition: PROCEDURE [disposition: JobQ.Disposition];

SetPrintingServiceEnabled: PUBLIC PROCEDURE [enabled: BOOLEAN];

SetPrintSpoolingEnabled: PROCEDURE [enabled: BOOLEAN];

SetPrintSpoolingEnabledStored: PROCEDURE [enabled: BOOLEAN];

END.
```

Copyright © 1992 Xerox Corporation All Rights Reserved

Copyright © 1992 Xerox Corporation All Rights Reserved

```
DIRECTORY
 NetworkLog USING [LoggingRecord];

NetLogExtra: DEFINITIONS =

 BEGIN

 ReLogNetJob: PROCEDURE [netInfo: NetworkLog.LoggingRecord];

 END.
```

Copyright © 1992 Xerox Corporation All Rights Reserved

```
DIRECTORY
 ResMgrStorage USING [Pages];

NetServSM: DEFINITIONS =
 BEGIN

 PurgeCompleted: PROCEDURE [];

 SetServiceSwitch: PROCEDURE [onLine: BOOLEAN];

 SetPrint3ServerSwitch: PROCEDURE [enable: BOOLEAN];

 SetSpoolingSwitch: PROCEDURE [enable: BOOLEAN];

 SetFilingSwitch: PROCEDURE [enable: BOOLEAN];

 SetMaxConnections: PROCEDURE [newLimit: CARDINAL] RETURNS [ok: BOOLEAN];

 SetStreamSwitch: PROCEDURE [enable: BOOLEAN];

 SetDIFSwitch: PROCEDURE [enable: BOOLEAN];

 SetMaxDiskUsage: PROCEDURE [pages: ResMgrStorage.Pages];

 SetJobQueueDepth: PROCEDURE [depth: CARDINAL];

 END.
```

Copyright © 1992 Xerox Corporation All Rights Reserved

```
DIRECTORY
 JobID USING [ID],
 System USING [GreenwichMeanTime];

NetworkLog: DEFINITIONS =

 BEGIN

 maxCharInObjectName: CARDINAL = 27;
 maxCharInSenderName: CARDINAL = 23;
 maxEntriesInLog: CARDINAL = 200;
 nulChar: CHARACTER = 0C;

 statusLengthInWords: CARDINAL =
  SIZE[Event] -
   (SIZE[ObjectName] + SIZE[SenderName] + SIZE[CARDINAL] + SIZE[
     System.GreenwichMeanTime]);


 Destination: TYPE = {
  printQueue, systemQueue, spare1, spare2, spare3, spare4, spare5, spare6,
  spare7, spare8, spare9, spare10, spare11, spare12, spare13, spare14};

 JobStatus: TYPE = {
  received, faulted, deletedTimeOut, deletedProb, spare1, spare2, spare3,
  spare4, spare5, spare6, spare7, spare8, spare9, spare10, spare11, spare12};

 MessageStatus: TYPE = {
  noMessage, jobStartMessage, finishingMessage, mediaMessage, jobEndMessage,
  startXfinish, startXmedia, startXend, finishXmedia, finishXend, mediaXend,
  startXfinishXmedia, startXfinishXend, startXendXmedia, finishXmediaXend,
  startXfinishXmediaXend, spare1, spare2, spare3, spare4, spare5, spare6,
  spare7, spare8, spare9, spare10, spare11, spare12, spare13, spare14, spare15,
  spare16};

 Update: TYPE = {jobStatus, messageStatus, both};

 Event: TYPE = RECORD [
  objectName: ObjectName,
  senderName: SenderName,
  version: CARDINAL,
  submissionTime: System.GreenwichMeanTime,
  destination: Destination,
  messageStatus: MessageStatus,
  jobStatus: JobStatus];

 EventArray: TYPE = LONG POINTER TO ARRAY [0..maxEntriesInLog) OF Event;

 LoggingRecord: TYPE = RECORD [
```

Copyright © 1992 Xerox Corporation All Rights Reserved

```
 jobID: JobID.ID,
 objectName: LONG STRING,
 senderName: LONG STRING,
 version: CARDINAL,
 submissionTime: System.GreenwichMeanTime,
 destination: Destination,
 messageStatus: MessageStatus,
 jobStatus: JobStatus];

ObjectName: TYPE = PACKED ARRAY [0..maxCharInObjectName) OF CHARACTER;

SenderName: TYPE = PACKED ARRAY [0..maxCharInSenderName) OF CHARACTER;

Status: TYPE = {ok, error, noItemsInList, spare1, spare2, spare3};


GetNetworkLog: PROCEDURE [list: EventArray]
 RETURNS [status: Status, numInLog: CARDINAL];

LogNetJob: PROCEDURE [netLogRecord: LoggingRecord];

UpdateStatus: PROCEDURE [
 jobID: JobID.ID, update: Update, jobStatus: JobStatus,
 messageStatus: MessageStatus]

END.
```

Copyright © 1992 Xerox Corporation All Rights Reserved

```
DIRECTORY
 EventHandler USING [FaultPointer, LoggerPointer];
NodeHandler: DEFINITIONS =
 BEGIN
 RequestUniqueID: PROCEDURE [number: CARDINAL]
  RETURNS [uniqueIDNodes: EventHandler.LoggerPointer];
 FreeUniqueID: PROCEDURE [uniqueIDNodes: EventHandler.LoggerPointer];
 RequestFaultNode: PROCEDURE [number: CARDINAL]
  RETURNS [faultNodes: EventHandler.FaultPointer];
 FreeFaultNode: PROCEDURE [faultNodes: EventHandler.FaultPointer];
 END.
```

Copyright © 1992 Xerox Corporation All Rights Reserved

```
-- File: Page.mesa

-- Copyright (C) 1985, 1986, 1987, 1988, 1989, 1990, 1991 by Xerox Corporation. All rights
reserved.

<<*********************************************************************
*                                *
* DESCRIPTION: This file provides the procedures and type       *
*    definitions by which a client may extract, enter and edit   *
*    page information into the job database.              *
*                                *
******************************************************************>>
DIRECTORY
 DirectoryType USING [ObjectID],
 Image USING [Box, EnumerateProc, Handle, nullHandle],
 JobID USING [ID],
 JobBackUp USING [LockID],
 PublicPrinting USING [InternalMedium, MediumDimensions, Plex],
 PublicPrintUtility USING [FreeMedium],
 SMStep USING [StepRecord];

Page: DEFINITIONS
IMPORTS PublicPrintUtility =
BEGIN

 --TYPES

 <<******************************************************************
 *                               *
 * DESCRIPTION: Procedure that allows enumerating through the    *
 *    pages of a job.                      *
 *                               *
 ***************************************************************>>
 EnumProc: TYPE = PROCEDURE[lockID: JobBackUp.LockID,
  page: Handle] RETURNS [continue: BOOLEAN ← TRUE];

 <<******************************************************************
 *                               *
 * DESCRIPTION: Possible reasons why an error may be raised by a *
 *    procedure manipulating a page.               *
 *                               *
 ***************************************************************>>
 ErrorCode: TYPE = {nilPageHandle, noMoreRoom,
  noPageAvailable, pageNumberNotFound, sideHasImages,
  thatImageAlreadyExists};

 <<******************************************************************
 *                               *
 * DESCRIPTION: Handle to a page.                  *
 *                               *
```

```
Handle: TYPE[2];

<<********************************************************************
*                               *
* DESCRIPTION:  Page insert.                *
*                               *
********************************************************************>>
Insert: TYPE = RECORD[
 number: CARDINAL,
 medium: PublicPrinting.InternalMedium];

<<********************************************************************
*                               *
* DESCRIPTION:  Page origin.                *
*                               *
********************************************************************>>
Origin: TYPE = RECORD[
 fast: INTEGER,
 slow: INTEGER];

<<********************************************************************
*                               *
* DESCRIPTION:  Places to add a page.               *
*                               *
********************************************************************>>
PageLocation: TYPE = {after, before, first, last};

<<********************************************************************
*                               *
* DESCRIPTION:  Parameters of a page.               *
*                               *
********************************************************************>>
Parameters: TYPE = RECORD[
 backSideImageShift: CARDINAL ← 0,
 blockStartBackSide: BOOLEAN ← FALSE,
 blockStartFrontSide: BOOLEAN ← FALSE,
 chapterStart: BOOLEAN ← FALSE,
 headToToe: BOOLEAN ← FALSE,
 insert: Insert,
 medium: PublicPrinting.InternalMedium,
 originBack: Origin ← [0, 0],
 originFront: Origin ← [0, 0],
 plex: PublicPrinting.Plex,
 rotationBack: Rotation ← none,
 rotationFront: Rotation ← none,
 simplexInputBackSide: BOOLEAN ← TRUE,
 simplexInputFrontSide: BOOLEAN ← TRUE];

<<********************************************************************
*                               *
```

Copyright © 1992 Xerox Corporation All Rights Reserved

```
* DESCRIPTION: Parameters of a page filled in during scan.     *
*                               *
*****************************************************************>>
ParametersFromScan: TYPE = RECORD[
 backSideImageShift: CARDINAL ← 0,
 blockStartBackSide: BOOLEAN ← FALSE,
 blockStartFrontSide: BOOLEAN ← FALSE,
 headToToe: BOOLEAN ← FALSE,
 originBack: Origin ← [0, 0],
 originFront: Origin ← [0, 0],
 plex: PublicPrinting.Plex,
 rotationBack: Rotation ← none,
 rotationFront: Rotation ← none,
 simplexInputBackSide: BOOLEAN ← TRUE,
 simplexInputFrontSide: BOOLEAN ← TRUE];

<<*****************************************************************
*                               *
* DESCRIPTION: Range of pages.                *
*                               *
*****************************************************************>>
Range: TYPE = RECORD[
 begPage: Handle,
 endPage: Handle];

<<*****************************************************************
*                               *
* DESCRIPTION: Rotation of a page side.           *
*                               *
*****************************************************************>>
Rotation: TYPE = {none, d90, d180, d270};

<<*****************************************************************
*                               *
* DESCRIPTION: Sides of a page.               *
*                               *
*****************************************************************>>
Side: TYPE = {back, front};

<<*****************************************************************
*                               *
* DESCRIPTION: Range of page sides.             *
*                               *
*****************************************************************>>
SideRange: TYPE = RECORD[
 begPage: Handle,
 begPageSide: Side,
 endPage: Handle,
 endPageSide: Side];
```

Copyright © 1992 Xerox Corporation All Rights Reserved

```
<<*******************************************************************
*                                *
* DESCRIPTION: Information used for signaturization.        *
*                                *
*******************************************************************>>
SignatureData: TYPE = RECORD[
 nextImageBack: Image.Handle ← Image.nullHandle,
 nextImageBackBox: Image.Box ← [0,0,0,0],
 nextImageFront: Image.Handle ← Image.nullHandle,
 nextImageFrontBox: Image.Box ← [0,0,0,0],
 nextPage: Page.Handle ← Page.nullHandle,
 prevImageBack: Image.Handle ← Image.nullHandle,
 prevImageBackBox: Image.Box ← [0,0,0,0],
 prevImageFront: Image.Handle ← Image.nullHandle,
 prevImageFrontBox: Image.Box ← [0,0,0,0],
 prevPage: Page.Handle ← Page.nullHandle];

<<*******************************************************************
*                                *
* DESCRIPTION: Location of signature information.        *
*                                *
*******************************************************************>>
SignatureTarget: TYPE = RECORD[
 var: SELECT type: SignatureTargetType FROM
  handle => [page: Page.Handle],
  number => [num: CARDINAL],
  first => [],
  last => [],
  none => [],
  ENDCASE];

<<*******************************************************************
*                                *
* DESCRIPTION: Types of signature targets.        *
*                                *
*******************************************************************>>
SignatureTargetType: TYPE = {first, handle, last, none, number};

-- CONSTANTS

<<*******************************************************************
*                                *
* DESCRIPTION: Null handle.        *
*                                *
*******************************************************************>>
nullHandle: Handle = LOOPHOLE[LONG[0]];

-- SIGNALS

<<*******************************************************************
```

Copyright © 1992 Xerox Corporation All Rights Reserved

```
*                                   *
* DESCRIPTION:  Possible signals that can be raised when       *
*   manipulating a page.                            *
*                                   *
*****************************************************************>>
Error: SIGNAL [code: ErrorCode];

<<*****************************************************************
*                                   *
* DESCRIPTION:  Indicates that scan has not completed adding all  *
*   the pages to the job or have not set all pages valid.       *
*                                   *
*****************************************************************>>
PageListIncomplete: SIGNAL;

--PROCEDURES

<<*****************************************************************
*                                   *
* FUNCTION:  Adds a page to a job after a target page.          *
* PARAMETERS:                               *
*    lockID - job to be modified                   *
*    page - page to be added                       *
*    target - page the new page is to be added after          *
* RETURN VALUES: none                          *
* SIGNALS:                                  *
*    Page.Error[nilPageHandle] - page or target is nil-valued   *
*                                   *
*****************************************************************>>
AddAfter: PROCEDURE [page: Handle, target: Handle, lockID:
 JobBackUp.LockID];

<<*****************************************************************
*                                   *
* FUNCTION:  Adds a page to a job before a target page.         *
* PARAMETERS:                               *
*    lockID - job to be modified                   *
*    page - page to be added                       *
*    target - page the new page is to be added before         *
* RETURN VALUES: none                          *
* SIGNALS:                                  *
*    Page.Error[nilPageHandle] - page or target is nil-valued   *
*                                   *
*****************************************************************>>
AddBefore: PROCEDURE [page: Handle, target: Handle, lockID:
 JobBackUp.LockID];

<<*****************************************************************
*                                   *
* FUNCTION:  Adds a page to a job as the first page in the page  *
```

Copyright © 1992 Xerox Corporation All Rights Reserved

```
*   queue.                              *
* PARAMETERS:                                *
*   lockID - job to be modified                *
*   page - page to be added                    *
* RETURN VALUES: none                          *
* SIGNALS:                                *
*   Page.Error[nilPageHandle] - page is nil-valued          *
*                         *
******************************************************************>>
AddFirst: PROCEDURE[page: Handle, lockID: JobBackUp.LockID];

<<******************************************************************
*                         *
* FUNCTION: Adds a page to a job as the last page in the page   *
*   queue.                              *
* PARAMETERS:                                *
*   lockID - job to be modified                *
*   page - page to be added                    *
* RETURN VALUES: none                          *
* SIGNALS:                                *
*   Page.Error[nilPageHandle] - page is nil-valued          *
*                         *
******************************************************************>>
AddLast: PROCEDURE[page: Handle, lockID: JobBackUp.LockID];

<<******************************************************************
*                         *
* FUNCTION: Adds a loopback image to the job.              *
* PARAMETERS:                                *
*   lockID - job to be modified                *
*   sheet - loopback image's sheet number              *
*   side - loopback image's sheet side              *
*   image - loopback image                     *
* RETURN VALUES: none                          *
* SIGNALS:                                *
*   Page.Error[nilPageHandle] - page is nil-valued          *
*                         *
******************************************************************>>
AddLoopbackImage: PROCEDURE[lockID: JobBackUp.LockID, sheet:
 CARDINAL, side: Side, image: Image.Handle];

<<******************************************************************
*                         *
* FUNCTION: Compares the medium of two pages on a job and      *
*   returns whether they are the same.             *
* PARAMETERS:                                *
*   lockID - job where pages are                 *
*   pageA, pageB - pages to be compared              *
* RETURN VALUES:                               *
*   same - whether the pages have the same medium or not      *
```

Copyright © 1992 Xerox Corporation All Rights Reserved

```
* SIGNALS:                                  *
*    Page.Error[nilPageHandle] - page is nil-valued        *
*                                   *
*****************************************************************>>
CompareMedium: PROCEDURE[pageA, pageB: Handle, lockID:
 JobBackUp.LockID] RETURNS[same: BOOLEAN];

<<*****************************************************************
*                                   *
* FUNCTION:  Makes a copy of a page and inserts it before a      *
*    specified page.  If the beforePage = JobBackUp.nilpointer,  *
*    it copies it to the bottom of the page queue.       *
* PARAMETERS:                              *
*    lockID - job where page is                      *
*    page - page to be copied                        *
*    toLockId - job where page is to be copied to         *
*    beforePage - page the "copied page" is placed before      *
* RETURN VALUES:                            *
*    newPage - the "copy" of page                     *
* SIGNALS:                                  *
*    Page.Error[nilPageHandle] - page is nil-valued        *
*                                   *
*****************************************************************>>
Copy: PROCEDURE[page: Handle, lockID: JobBackUp.LockID, beforePage:
 Handle, toLockID: JobBackUp.LockID] RETURNS[newPage: Handle];

<<*****************************************************************
*                                   *
* FUNCTION:  Makes a copy of a range of pages and inserts them   *
*    before a specified page.  If the beforePage =          *
*    JobBackUp.nilpointer, it copies them to the bottom of the  *
*    page queue.                           *
* PARAMETERS:                              *
*    lockID - job where pages are                     *
*    pages - pages to be copied                      *
*    toLockId - job where page is to be copied to         *
*    beforePage - page the "copied pages" are placed before    *
* RETURN VALUES:                            *
*    newPages - the "copies" of pages                  *
* SIGNALS:                                  *
*    Page.Error[nilPageHandle] - page is nil-valued        *
*                                   *
*****************************************************************>>
CopyRange: PROCEDURE[pages: Range, lockID: JobBackUp.LockID,
 beforePage: Handle, toLockID: JobBackUp.LockID] RETURNS[newPages:
 Range];

<<*****************************************************************
*                                   *
* FUNCTION:  Makes a copy of a page side's images to an existing  *
```

Copyright © 1992 Xerox Corporation All Rights Reserved

```
*    page.                           *
* PARAMETERS:                            *
*    lockID - job where page is              *
*    page - page whose side will be copied          *
*    side - which side of the page to be copied       *
*    toLockId - job where page side is to be copied to     *
*    toPage - page where the page side is to be copied to    *
*    toSide - side where the page side is to be copied to     *
* RETURN VALUES: none                          *
* SIGNALS:                          *
*    Page.Error[nilPageHandle] - page or toPage is nil-valued   *
*    Page.Error[sideHasImages] - page side that your copying to  *
*     already has images on it.                 *
*                              *
*****************************************************************>>
CopySide: PROCEDURE[page: Handle, toPage: Handle, lockID:
 JobBackUp.LockID, side:Side, toLockID: JobBackUp.LockID, toSide:
 Side];

<<*****************************************************************
*                              *
* FUNCTION:  Creates a new page node.                *
* PARAMETERS:                            *
*    lockID - job where page is created              *
*    parameters - new page's parameters               *
*    valid - validity of a page                  *
* RETURN VALUES:                           *
*    page - handle to new page                    *
* SIGNALS: none                            *
*                              *
*****************************************************************>>
Create: PROCEDURE [lockID: JobBackUp.LockID,
 parameters: Parameters, valid: BOOLEAN] RETURNS[page: Handle];

<<*****************************************************************
*                              *
* FUNCTION:  Creates a new page and adds it to the job.       *
* PARAMETERS:                            *
*    lockID - job where page is created              *
*    parameters - new page's parameters               *
*    valid - validity of a page                  *
*    location - where in job page is added              *
*    locPage - for after/before page location             *
* RETURN VALUES: none                          *
* SIGNALS: none                            *
*                              *
*****************************************************************>>
CreateAndAddPage: PROCEDURE [lockID: JobBackUp.LockID,
 parameters: Parameters, valid: BOOLEAN, location: PageLocation,
 locPage: Handle];
```

Copyright © 1992 Xerox Corporation All Rights Reserved

```
<<******************************************************************
*                              *
* FUNCTION: Creates "num" pages and adds them to the bottom    *
*   of a job.                  *
* PARAMETERS:                  *
*   lockID - job where page is created         *
*   parameters - new page's parameters          *
*   valid - validity of a page              *
*   num - number of pages made                *
* RETURN VALUES: none                *
* SIGNALS: none                *
*                              *
******************************************************************>>
CreateNPagesAndAdd: PROCEDURE [lockID: JobBackUp.LockID,
 parameters: Parameters, valid: BOOLEAN, num: CARDINAL];

<<******************************************************************
*                              *
* FUNCTION: Creates a page with the medium specified in the    *
*   job's covers record.          *
* PARAMETERS:                   *
*   lockID - job where page is created         *
*   parameters - new page's parameters          *
*   frontCover - specifies which cover's medium to be used    *
*   valid - validity of the page           *
* RETURN VALUES:                 *
*   page - handle to new page. If job doesn't have specified  *
*    cover, return nullHandle             *
* SIGNALS: none                 *
*                              *
******************************************************************>>
CreatePageFromCovers: PROCEDURE[lockID: JobBackUp.LockID,
 parameters: ParametersFromScan, frontCover, valid: BOOLEAN]
 RETURNS[page: Handle];

<<******************************************************************
*                              *
* FUNCTION: Creates a page with the medium specified in the    *
*   scan step's medium field.          *
* PARAMETERS:                   *
*   lockID - job where page is created         *
*   parameters - new page's parameters          *
*   valid - validity of the page           *
* RETURN VALUES:                 *
*   page - handle to new page.              *
* SIGNALS:                 *
*   SMScanStep.Error[notAScanStep] - step is not a scan step   *
*                              *
******************************************************************>>
```

Copyright © 1992 Xerox Corporation All Rights Reserved

```
CreatePageFromScanStep: PROCEDURE[lockID: JobBackUp.LockID,
 parameters: ParametersFromScan, stepRecord: SMStep.StepRecord,
 valid: BOOLEAN] RETURNS[page: Handle];

<<******************************************************************
*                              *
* FUNCTION: Deletes a page.                    *
* PARAMETERS:                          *
*   lockID - job where page is                 *
*   page - page to be deleted                  *
* RETURN VALUES: none                          *
* SIGNALS:                         *
*   Page.Error[nilPageHandle] - page is nil-valued         *
*                              *
******************************************************************>>
Delete: PROCEDURE[page: Handle, lockID: JobBackUp.LockID];

<<******************************************************************
*                              *
* FUNCTION: Deletes all loopback images on the job.          *
* PARAMETERS:                          *
*   lockID - job where page is                 *
* RETURN VALUES: none                          *
* SIGNALS: none                          *
*                              *
******************************************************************>>
DeleteLoopbackImages: PROCEDURE[lockID: JobBackUp.LockID];

<<******************************************************************
*                              *
* FUNCTION: Deletes a range of pages.                *
* PARAMETERS:                          *
*   lockID - job where pages are                 *
*   pages - pages to be deleted                  *
*   dereferenceImages - if TRUE, dereferences images in range  *
* RETURN VALUES: none                          *
* SIGNALS:                         *
*   Page.Error[nilPageHandle] - page is nil-valued         *
*                              *
******************************************************************>>
DeleteRange: PROCEDURE [pages: Range, lockID: JobBackUp.LockID,
 dereferenceImages: BOOLEAN ← TRUE];

<<******************************************************************
*                              *
* FUNCTION: Dereferences the images on a range of pages in the  *
*   "range" job.                       *
* PARAMETERS:                          *
*   pages - pages to be derefenced                 *
* RETURN VALUES: none                          *
```

Copyright © 1992 Xerox Corporation All Rights Reserved

```
* SIGNALS:                               *
*   Page.Error[nilPageHandle] - page is nil-valued        *
*                                 *
*******************************************************************>>
DereferenceRangeOnRangeJob: PROCEDURE[pages: Range];

<<*******************************************************************
*                                 *
* FUNCTION:  Deletes a page's side.            *
* PARAMETERS:                           *
*   lockID - job where page is                 *
*   page - page whose side will be deleted           *
*   side - which side of the page to be deleted          *
* RETURN VALUES:                          *
*   cover - the desired cover                 *
* SIGNALS:                               *
*   Page.Error[nilPageHandle] - page is nil-valued        *
*                                 *
*******************************************************************>>
DeleteSide: PROCEDURE[page: Handle, side: Side, lockID:
 JobBackUp.LockID];

<<*******************************************************************
*                                 *
* FUNCTION:  Removes the logo from the specified page sides.   *
* PARAMETERS:                           *
*   lockID - job where page sides are              *
*   pageSides - page sides to be demerged            *
*   logo - logo demerged                      *
*   subdirectory - subdirectory of logo demerged          *
* RETURN VALUES: none                        *
* SIGNALS:                               *
*   Page.Error[nilPageHandle] - page is nil-valued        *
*                                 *
*******************************************************************>>
DemergeLogo: PROCEDURE [pageSides: SideRange, lockID:
 JobBackUp.LockID, logo: DirectoryType.ObjectID, subdirectory:
 DirectoryType.ObjectID];

<<*******************************************************************
*                                 *
* FUNCTION:  Calls proc for every page in the specified page   *
*   range in a N-to-one order.  If begPage is NIL, enumeration *
*   starts at the last page of the job.  If endPage is NIL,   *
*   enumeration ends at the first page of the job.        *
* PARAMETERS:                           *
*   lockID - job to list pages of                *
*   range - range of pages that proc is called on         *
*   proc - enumeration procedure                *
* RETURN VALUES: none                        *
```

Copyright © 1992 Xerox Corporation All Rights Reserved

```
* SIGNALS: none                    *
*                         *
*******************************************************************>>
EnumBackward: PROCEDURE [lockID: JobBackUp.LockID, pages: Range,
 proc: EnumProc];

<<*******************************************************************
*                         *
* FUNCTION:  Calls proc for every non-logo image on the page    *
*   side.                      *
* PARAMETERS:                     *
*   lockID - job to list pages of        *
*   page - page specified              *
*   side - side of page              *
*   proc - enumeration procedure             *
* RETURN VALUES: none                    *
* SIGNALS: none                    *
*                         *
*******************************************************************>>
EnumerateNonLogoImages: PROCEDURE [page: Page.Handle, side:
 Page.Side, proc: Image.EnumerateProc, lockID: JobBackUp.LockID];

<<*******************************************************************
*                         *
* FUNCTION:  Calls proc for every raster image on the page side. *
* PARAMETERS:                     *
*   lockID - job to list pages of        *
*   page - page specified              *
*   side - side of page              *
*   proc - enumeration procedure             *
* RETURN VALUES: none                    *
* SIGNALS: none                    *
*                         *
*******************************************************************>>
EnumerateRasterImages: PROCEDURE [page: Page.Handle, side:
 Page.Side, proc: Image.EnumerateProc, lockID: JobBackUp.LockID];

<<*******************************************************************
*                         *
* FUNCTION:  Calls proc for every page in the specified page    *
*   range in a one-to-N order.  If begPage is NIL, enumeration  *
*   starts at the first page of the job.  If endPage is NIL,   *
*   enumeration ends at the last page of the job.          *
* PARAMETERS:                     *
*   lockID - job to list pages of        *
*   range - range of pages that proc is called on         *
*   proc - enumeration procedure             *
* RETURN VALUES: none                    *
* SIGNALS: none                    *
*                         *
```

Copyright © 1992 Xerox Corporation All Rights Reserved

```
*******************************************************************>>
EnumForward: PROCEDURE [lockID: JobBackUp.LockID, pages: Range,
 proc: EnumProc];

<<*******************************************************************
*                              *
* FUNCTION:  Deallocates all dynamic items in parameters.     *
* PARAMETERS:                          *
*    parameters - parameters freed            *
*    zone - zone from which parameter's strings were allocated  *
* RETURN VALUES: none                   *
* SIGNALS: none                        *
*                              *
*******************************************************************>>
FreeParameters: PROCEDURE[parameters: Parameters, zone:
 UNCOUNTED ZONE] = INLINE
BEGIN
 PublicPrintUtility.FreeMedium[medium: @parameters.medium, z:
  zone];
 PublicPrintUtility.FreeMedium[medium: @parameters.insert.medium,
  z: zone];
END;

<<*******************************************************************
*                              *
* FUNCTION:  Gets the image on the back of a page.         *
* PARAMETERS:                          *
*    lockID - job where page is                 *
*    page - page to get back image of              *
* RETURN VALUES:                         *
*    image -  handle to page's back image              *
* SIGNALS:                          *
*    Page.Error[nilPageHandle] - page is nil-valued         *
*                              *
*******************************************************************>>
GetBackImage: PROCEDURE[page: Handle, lockID: JobBackUp.LockID]
 RETURNS[image: Image.Handle];

<<*******************************************************************
*                              *
* FUNCTION:  Gets the backup image on the specified side of a   *
*    page.                          *
* PARAMETERS:                          *
*    lockID - job where page is                 *
*    page - page to get backup image of             *
*    side - side of page to get backup image of           *
* RETURN VALUES:                         *
*    image -  handle to page's back image              *
* SIGNALS:                          *
*    Page.Error[nilPageHandle] - page is nil-valued         *
```

Copyright © 1992 Xerox Corporation All Rights Reserved

```
*                               *
*******************************************************************>>
GetBackupImage: PROCEDURE[page: Handle, side: Side, lockID:
 JobBackUp.LockID] RETURNS[image: Image.Handle];

<<*******************************************************************
*                               *
* FUNCTION: Gets the chapterStart of a page.          *
* PARAMETERS:                           *
*   lockID - job where page is                *
*   page - page to retrieve plex of               *
* RETURN VALUES:                          *
*   chapterStart - chapterStart of page             *
* SIGNALS:                            *
*   Page.Error[nilPageHandle] - page is nil-valued        *
*                               *
*******************************************************************>>
GetChapterStart: PROCEDURE[lockID: JobBackUp.LockID, page: Handle]
 RETURNS[chapterStart: BOOLEAN];

<<*******************************************************************
*                               *
* FUNCTION: Returns the pages that form the covers of the job. *
*   If job has a front cover, frontCover is first page in job. *
*   If job has a back cover, backCover is last page in job.  *
*   Page.nullHandle is returned if job doesn't have that cover. *
* PARAMETERS:                           *
*   lockID - job checked                    *
* RETURN VALUES:                          *
*   frontCover - page that is the job's front cover       *
*   backCover - page that is the job's back cover        *
* SIGNALS: none                         *
*                               *
*******************************************************************>>
GetCoverPages: PROCEDURE[lockID: JobBackUp.LockID]
 RETURNS[frontCover, backCover: Handle];

<<*******************************************************************
*                               *
* FUNCTION: Gets the first page in a job.           *
* PARAMETERS:                           *
*   lockID - job where page is                *
* RETURN VALUES:                          *
*   page - first page in the job                *
* SIGNALS: none                         *
*                               *
*******************************************************************>>
GetFirst: PROCEDURE[lockID: JobBackUp.LockID]
 RETURNS [page: Handle];
```

Copyright © 1992 Xerox Corporation All Rights Reserved

```
<<*******************************************************************
*                                  *
* FUNCTION:  Gets the image on the front of a page.          *
* PARAMETERS:                          *
*   lockID - job where page is                *
*   page - page to get front image of              *
* RETURN VALUES:                        *
*   image -  handle to page's front image              *
* SIGNALS:                           *
*   Page.Error[nilPageHandle] - page is nil-valued          *
*                                  *
*******************************************************************>>
GetFrontImage: PROCEDURE[page: Handle, lockID: JobBackUp.LockID]
 RETURNS[image: Image.Handle];

<<*******************************************************************
*                                  *
* FUNCTION:  Gets the headToToe of a page.          *
* PARAMETERS:                          *
*   lockID - job where page is                *
*   page - page to retrieve plex of              *
* RETURN VALUES:                        *
*   headToToe - headToToe of page              *
* SIGNALS:                           *
*   Page.Error[nilPageHandle] - page is nil-valued          *
*                                  *
*******************************************************************>>
GetHeadToToe: PROCEDURE[lockID: JobBackUp.LockID, page: Handle]
 RETURNS[headToToe: BOOLEAN];

<<*******************************************************************
*                                  *
* FUNCTION:  Macro that gets the image for the page's side. If   *
*   getSimplified = TRUE, image is the simplified page (if    *
*   there is one).  Otherwise, it is the page side's image    *
* PARAMETERS:                          *
*   lockID - job where page is                *
*   page - page to get front image of              *
*   side - side of page to get image of              *
*   getSimplified - get simplified page if there is one      *
* RETURN VALUES:                        *
*   image -  handle to page side's image              *
*   simplified - TRUE if image returned is the simplifed page  *
* SIGNALS:                           *
*   Page.Error[nilPageHandle] - page is nil-valued          *
*                                  *
*******************************************************************>>
GetImage: PROCEDURE[page: Handle, side: Side, getSimplified:
 BOOLEAN, lockID: JobBackUp.LockID] RETURNS[image: Image.Handle,
 simplified: BOOLEAN];
```

Copyright © 1992 Xerox Corporation All Rights Reserved

```
<<********************************************************************
*                                 *
* FUNCTION:  Gets the insert of a page.                    *
* PARAMETERS:                                     *
*    lockID - job where page is                        *
*    page - page to retrieve plex of                     *
*    zone - zone from which insert's strings are allocated.   *
* RETURN VALUES:                                   *
*    insert - insert of page                            *
* SIGNALS:                                     *
*    Page.Error[nilPageHandle] - page is nil-valued            *
*                                 *
********************************************************************>>
GetInsert: PROCEDURE[lockID: JobBackUp.LockID, page: Handle, zone:
 UNCOUNTED ZONE] RETURNS[insert: Insert];

<<********************************************************************
*                                 *
* FUNCTION:  Gets the job a page is attached to.              *
* PARAMETERS:                                     *
*    lockID - job where page is                        *
*    page - page to be checked                          *
* RETURN VALUES:                                   *
*    jobID - job page is attached to (JobID.nullID if page is   *
*      not attached to a job)                          *
* SIGNALS: none                                   *
*                                 *
********************************************************************>>
GetJobID: PROCEDURE[page: Handle, lockID: JobBackUp.LockID]
 RETURNS[jobID: JobID.ID];

<<********************************************************************
*                                 *
* FUNCTION:  Gets the last page in a job.                  *
* PARAMETERS:                                     *
*    lockID - job where page is                        *
* RETURN VALUES:                                   *
*    page - last page in the job                        *
* SIGNALS: none                                   *
*                                 *
********************************************************************>>
GetLast: PROCEDURE[lockID: JobBackUp.LockID]
 RETURNS [page: Handle];

<<********************************************************************
*                                 *
* FUNCTION:  Gets the logo on the specified side of a page.  If  *
*    no logo is on the page side, nullObjectID is returned.    *
* PARAMETERS:                                     *
```

Copyright © 1992 Xerox Corporation All Rights Reserved

```
*   lockID - job where page is                *
*   page - page to get backup image of            *
*   side - side of page to get backup image of          *
* RETURN VALUES:                           *
*   logo - logo on page                    *
*   subdirectory - logo's subdirectory            *
*   image - image which is the logo              *
* SIGNALS:                              *
*   Page.Error[nilPageHandle] - page is nil-valued      *
*                                *
*******************************************************************>>
GetLogo: PROCEDURE[page: Handle, side: Side, lockID:
 JobBackUp.LockID] RETURNS[logo: DirectoryType.ObjectID,
 subdirectory: DirectoryType.ObjectID, image: Image.Handle];

<<*******************************************************************
*                                *
* FUNCTION: Gets the first page's medium dimensions.      *
* PARAMETERS:                            *
*   lockID - job looked at                  *
* RETURN VALUES:                           *
*   dimensions - medium dimensions of page          *
* SIGNALS: none                           *
*                                *
*******************************************************************>>
GetMediumDimensionsOfFirstPage: PROCEDURE[lockID: JobBackUp.LockID]
 RETURNS[dimensions: PublicPrinting.MediumDimensions];

<<*******************************************************************
*                                *
* FUNCTION: Gets the loopback image on the specified side of a  *
*   sheet.                            *
* PARAMETERS:                            *
*   lockID - job where page is                *
*   sheet - sheet to get loopback image of          *
*   side - side of sheet to get loopback image of       *
* RETURN VALUES:                           *
*   image - sheet's loopback image              *
* SIGNALS: none                           *
*                                *
*******************************************************************>>
GetLoopbackImage: PROCEDURE[sheet: CARDINAL, side: Side, lockID:
 JobBackUp.LockID] RETURNS[image: Image.Handle];

<<*******************************************************************
*                                *
* FUNCTION: Gets the next page in a job after a specific page.  *
* PARAMETERS:                            *
*   lockID - job where page is                *
*   target - page which you want the next page after      *
```

Copyright © 1992 Xerox Corporation All Rights Reserved

```
*   raisePageListIncomplete - when TRUE the signal        *
*    PageListIncomplete is raised when its conditions are met *
* RETURN VALUES:                          *
*   page - page following target              *
* SIGNALS:                                 *
*   Page.PageListIncomplete - you are at the last page in the  *
*    job and scanning of the job is done or the next page is  *
*    invalid and PageListIncomplete is TRUE        *
*   Page.Error[nilPageHandle] - target is nil-valued       *
*                                *
*****************************************************************>>
GetNext: PROCEDURE[target: Handle, lockID: JobBackUp.LockID,
 raisePageListIncomplete: BOOLEAN ← FALSE] RETURNS[page: Handle];

<<*****************************************************************
*                                *
* FUNCTION:  Gets the box that encloses all image objects on the *
*   page except logos.                   *
* PARAMETERS:                          *
*   lockID - job where page is               *
*   page - page to get data from                *
*   side - side of page to get data from            *
* RETURN VALUES:                          *
*   box -  "super" box of page side              *
* SIGNALS:                                 *
*   Page.Error[nilPageHandle] - page is nil-valued        *
*                                *
*****************************************************************>>
GetNonLogoSuperBox: PROCEDURE[page: Handle, side: Side, lockID:
 JobBackUp.LockID] RETURNS[box: Image.Box];

<<*****************************************************************
*                                *
* FUNCTION:  Gets the page's number. Page numbering starts at 1. *
* PARAMETERS:                          *
*   lockID - job where page is               *
*   page - page looked at                  *
*   countTabs - include tab pages in count           *
* RETURN VALUES:                          *
*   number - number of page                  *
* SIGNALS:                                 *
*   Page.Error[nilPageHandle] - page is nil-valued        *
*                                *
*****************************************************************>>
GetNumberOfPage: PROCEDURE[lockID: JobBackUp.LockID, page:
 Handle, countTabs: BOOLEAN ← TRUE] RETURNS[number: CARDINAL];

<<*****************************************************************
*                                *
* FUNCTION:  Gets the number of pages on a job that has the    *
```

Copyright © 1992 Xerox Corporation All Rights Reserved

```
*   desired medium.                *
* PARAMETERS:                      *
*   lockID - job where page is        *
*   medium - desired medium             *
* RETURN VALUES:                     *
*   number - number of pages            *
* SIGNALS: none                     *
*                          *
*******************************************************************>>
GetNumberOfPagesWithMedium: PROCEDURE[lockID: JobBackUp.LockID,
 medium: PublicPrinting.InternalMedium] RETURNS[number: CARDINAL];

<<*******************************************************************
*                          *
* FUNCTION: Gets the page side's number. Page numbering starts  *
*  at 1.                      *
* PARAMETERS:                      *
*   lockID - job where page is        *
*   page - page looked at            *
*   side - side looked at           *
*   countTabs - include tab pages in count          *
* RETURN VALUES:                     *
*   number - number of page side            *
* SIGNALS:                       *
*   Page.Error[nilPageHandle] - page is nil-valued         *
*                          *
*******************************************************************>>
GetNumberOfSide: PROCEDURE[lockID: JobBackUp.LockID, page:
 Handle, side: Side, countTabs: BOOLEAN ← TRUE] RETURNS[number:
 CARDINAL];

<<*******************************************************************
*                          *
* FUNCTION: Gets the num'th page in a job. Page numbering starts *
*   at 1.                      *
* PARAMETERS:                      *
*   lockID - job where page is        *
*   num - number of page wanted           *
* RETURN VALUES:                     *
*   page - handle to num'th page            *
* SIGNALS:                       *
*   Page.Error[pageNumberNotFound] - there is no num'th page  *
*                          *
*******************************************************************>>
GetPageNo: PROCEDURE[lockID: JobBackUp.LockID, num:
 CARDINAL] RETURNS [page: Handle];

<<*******************************************************************
*                          *
* FUNCTION: Gets the num'th page side in a job. Page numbering  *
```

Copyright © 1992 Xerox Corporation All Rights Reserved

```
*   starts at 1.                        *
* PARAMETERS:                                *
*   lockID - job where page is                   *
*   num - number of page side wanted                *
* RETURN VALUES:                                 *
*   page - handle to num'th page                   *
*   side - which side of page                    *
* SIGNALS:                                   *
*   Page.Error[pageNumberNotFound] - there is no num'th page  *
*    side                              *
*                                    *
*******************************************************************>>
GetPageSide: PROCEDURE[lockID: JobBackUp.LockID, num:
 CARDINAL] RETURNS [page: Handle, side: Side];

<<*******************************************************************
*                                    *
* FUNCTION: Gets the validation of a page.           *
* PARAMETERS:                                *
*   lockID - job where page is                   *
*   page - page to retrieve validation of             *
* RETURN VALUES:                                 *
*   valid - whether the page is valid or not            *
* SIGNALS:                                   *
*   Page.Error[nilPageHandle] - page is nil-valued          *
*                                    *
*******************************************************************>>
GetPageValid: PROCEDURE[lockID: JobBackUp.LockID, page: Handle]
 RETURNS[valid: BOOLEAN];

<<*******************************************************************
*                                    *
* FUNCTION: Gets the parameters of a page.           *
* PARAMETERS:                                *
*   lockID - job where page is                   *
*   page - page to get the parameters of              *
*   zone - zone from which parameter's strings are allocated.  *
*    IF zone is NIL, strings are not allocated.          *
* RETURN VALUES:                                 *
*   parameters - parameters of page                 *
* SIGNALS:                                   *
*   Page.Error[nilPageHandle] - page is nil-valued          *
*                                    *
*******************************************************************>>
GetParameters: PROCEDURE[page: Handle, lockID: JobBackUp.LockID,
 zone: UNCOUNTED ZONE] RETURNS [parameters: Parameters];

<<*******************************************************************
*                                    *
* FUNCTION: Gets the scan-related parameters of a page.      *
```

Copyright © 1992 Xerox Corporation All Rights Reserved

```
* PARAMETERS:                                           *
*   lockID - job where page is                          *
*   page - page to get the parameters of                *
*   zone - zone from which parameter's strings are allocated. *
*     IF zone is NIL, strings are not allocated.        *
* RETURN VALUES:                                        *
*   parameters - parameters of page                     *
* SIGNALS:                                              *
*   Page.Error[nilPageHandle] - page is nil-valued      *
*                                                       *
*******************************************************************>>
GetParametersFromScan: PROCEDURE[page: Handle, lockID:
 JobBackUp.LockID] RETURNS [parameters: ParametersFromScan];

<<*******************************************************************
*                                                       *
* FUNCTION: Gets the plex of a page.                    *
* PARAMETERS:                                           *
*   lockID - job where page is                          *
*   page - page to retrieve plex of                     *
* RETURN VALUES:                                        *
*   plex - plex of page                                 *
* SIGNALS:                                              *
*   Page.Error[nilPageHandle] - page is nil-valued      *
*                                                       *
*******************************************************************>>
GetPlex: PROCEDURE[lockID: JobBackUp.LockID, page: Handle]
 RETURNS[plex: PublicPrinting.Plex];

<<*******************************************************************
*                                                       *
* FUNCTION: Gets the previous page in a job after a specific *
*   page.                                               *
* PARAMETERS:                                           *
*   lockID - job where page is                          *
*   target - page which you want the previous page after *
*   raisePageListIncomplete - when TRUE the signal      *
*     PageListIncomplete is raised when its conditions are met *
* RETURN VALUES:                                        *
*   page - page before target                           *
* SIGNALS:                                              *
*   Page.PageListIncomplete - you are at the last page in the *
*     job and scanning of the job is done or the previous page *
*     is invalid and PageListIncomplete is TRUE         *
*   Page.Error[nilPageHandle] - target is nil-valued    *
*                                                       *
*******************************************************************>>
GetPrevious: PROCEDURE [target: Handle, lockID: JobBackUp.LockID,
 raisePageListIncomplete: BOOLEAN ← FALSE] RETURNS [page: Handle];
```

Copyright © 1992 Xerox Corporation All Rights Reserved

```
<<*******************************************************************
*                                *
* FUNCTION:  Gets signature data information for signaturization. *
* PARAMETERS:                        *
*   lockID - job looked at             *
*   nextTarget - page which you want the next information for  *
*   prevTarget - page which you want the prior information for  *
*   raisePageListIncomplete - when TRUE the signal        *
*    PageListIncomplete is raised when its conditions are met  *
* RETURN VALUES:                     *
*   page - page before target                  *
* SIGNALS:                        *
*   Page.PageListIncomplete - you are at the last page in the  *
*    job and scanning of the job is done or the previous page  *
*    is invalid and PageListIncomplete is TRUE        *
*   Page.Error[nilPageHandle] - nextTarget or prevTarget is   *
*    nil-valued                   *
*                                *
*******************************************************************>>
GetSignatureData: PROCEDURE[nextTarget, prevTarget:
 SignatureTarget, lockID: JobBackUp.LockID,
 raisePageListIncomplete: BOOLEAN ← FALSE] RETURNS[signature:
 SignatureData];

<<*******************************************************************
*                                *
* FUNCTION:  Gets the simplified page version of the page.     *
* PARAMETERS:                        *
*   lockID - job where page is               *
*   page - page to get simplified page of           *
*   side - side of page to get simplified page from        *
* RETURN VALUES:                     *
*   simplifiedPage -  handle to page's simplifiedPage       *
* SIGNALS:                        *
*   Page.Error[nilPageHandle] - page is nil-valued          *
*                                *
*******************************************************************>>
GetSimplifiedPage: PROCEDURE[page: Handle, side: Side, lockID:
 JobBackUp.LockID] RETURNS[simplifiedPage: Image.Handle];

<<*******************************************************************
*                                *
* FUNCTION:  Gets the total number of pages (including inserts)  *
*   on a job.                      *
* PARAMETERS:                        *
*   lockID - job looked at              *
* RETURN VALUES:                     *
*   pageCount -  total page count               *
* SIGNALS:  none                      *
*                                *
```

Copyright © 1992 Xerox Corporation All Rights Reserved

```
*****************************************************************>>
GetTotalPageCount: PROCEDURE[lockID: JobBackUp.LockID] RETURNS[
 pageCount: CARDINAL];

<<*****************************************************************
*                    *
* FUNCTION: Moves a page before a specified page. If the    *
*   beforePage = JobBackUp.nilpointer,it moves it to the    *
*   bottom of the page queue.                    *
* PARAMETERS:                    *
*   lockID - job where page is                    *
*   page - page to be moved                    *
*   toLockId - job where page is to be moved to                    *
*   beforePage - page the "moved page" is placed before    *
* RETURN VALUES:                    *
*   newPage - newPage handle of the page moved (needed since  *
*    when moving to another job, page is re-allocated)    *
* SIGNALS:                    *
*   Page.Error[nilPageHandle] - page is nil-valued    *
*                    *
*****************************************************************>>
Move: PROCEDURE[page: Handle, lockID: JobBackUp.LockID, beforePage:
 Handle, toLockID: JobBackUp.LockID] RETURNS[newPage: Handle];

<<*****************************************************************
*                    *
* FUNCTION: Moves a range of pages before a specified page. If *
*   the beforePage = JobBackUp.nilpointer,it moves them to the *
*   bottom of the page queue.                    *
* PARAMETERS:                    *
*   lockID - job where page is                    *
*   pages - pages to be moved                    *
*   toLockId - job where page is to be moved to                    *
*   beforePage - page the "moved page" is placed before    *
* RETURN VALUES:                    *
*   newPages - newPage handles of the pages moved (needed since *
*    when moving to another job, pages are re-allocated)    *
* SIGNALS:                    *
*   Page.Error[nilPageHandle] - page is nil-valued    *
*                    *
*****************************************************************>>
MoveRange: PROCEDURE[pages: Range, lockID: JobBackUp.LockID,
 beforePage: Handle, toLockID: JobBackUp.LockID] RETURNS[newPages:
 Range];

<<*****************************************************************
*                    *
* FUNCTION: Moves a page's side to another page.    *
* PARAMETERS:                    *
*   lockID - job where page is                    *
```

Copyright © 1992 Xerox Corporation All Rights Reserved

```
*    page - page whose side will be moved            *
*    side - which side of the page to be moved          *
*    toLockId - job where page side is to be moved to      *
*    toPage - page where the page side is to be  moved to     *
*    toSide - side where the page side is to be moved to     *
* RETURN VALUES: none                      *
* SIGNALS:                         *
*    Page.Error[nilPageHandle] - page or toPage is nil-valued   *
*    Page.Error[sideHasImages] - page side that your moving to  *
*     already has images on it.              *
*                          *
*******************************************************************>>
MoveSide: PROCEDURE[page: Handle, lockID: JobBackUp.LockID,
 side: Side, toPage: Handle, toLockID: JobBackUp.LockID,
 toSide: Side];

<<*******************************************************************
*                          *
* FUNCTION:  Nulls out the loopback images on the job.        *
* PARAMETERS:                        *
*    lockID - job to be modified               *
* RETURN VALUES: none                       *
* SIGNALS: none                       *
*                          *
*******************************************************************>>
NullLoopbackImages: PROCEDURE[lockID: JobBackUp.LockID];

<<*******************************************************************
*                          *
* FUNCTION:  Puts an image on the back of a page.          *
* PARAMETERS:                        *
*    lockID - job where page is               *
*    image - image put on back of page              *
*    page - page where image will be put              *
* RETURN VALUES: none                       *
* SIGNALS:                         *
*    Page.Error[nilPageHandle] - page is nil-valued        *
*    Page.Error[thatImageAlreadyExists] - page has a back image  *
*                          *
*******************************************************************>>
PutBackImage: PROCEDURE[page: Handle, image: Image.Handle,
 lockID: JobBackUp.LockID];

<<*******************************************************************
*                          *
* FUNCTION:  Sets the backup image of a page's side.  If an image *
*    is already there, it is deleted.             *
* PARAMETERS:                        *
*    lockID - job where page is               *
*    image - image put on back of page              *
```

Copyright © 1992 Xerox Corporation All Rights Reserved

```
*    page - page where image will be put                *
*    side - side of page to put backup image on            *
* RETURN VALUES: none                           *
* SIGNALS: none                            *
*                              *
*******************************************************************>>
PutBackupImage: PROCEDURE[page: Handle, image: Image.Handle,
 side: Side, lockID: JobBackUp.LockID];

<<*******************************************************************
*                              *
* FUNCTION: Puts an image on the front of a page.          *
* PARAMETERS:                             *
*    lockID - job where page is                   *
*    image - image put on front of page                *
*    page - page where image will be put               *
* RETURN VALUES: none                           *
* SIGNALS:                              *
*    Page.Error[nilPageHandle] - page is nil-valued          *
*    Page.Error[thatImageAlreadyExists] - page has a front image *
*                              *
*******************************************************************>>
PutFrontImage: PROCEDURE[page: Handle, image: Image.Handle,
 lockID: JobBackUp.LockID];

<<*******************************************************************
*                              *
* FUNCTION: Sets the parameters of a page.             *
* PARAMETERS:                             *
*    lockID - job where page is                   *
*    page - page to be modified                    *
*    parameters - new parameters of page                *
* RETURN VALUES: none                           *
* SIGNALS:                              *
*    Page.Error[nilPageHandle] - page is nil-valued          *
*                              *
*******************************************************************>>
PutParameters: PROCEDURE[page: Handle, parameters: Parameters,
 lockID: JobBackUp.LockID];

<<*******************************************************************
*                              *
* FUNCTION: Sets the scan-related parameters of a page.       *
* PARAMETERS:                             *
*    lockID - job where page is                   *
*    page - page to be modified                    *
*    parameters - new parameters of page                *
* RETURN VALUES: none                           *
* SIGNALS:                              *
*    Page.Error[nilPageHandle] - page is nil-valued          *
```

Copyright © 1992 Xerox Corporation All Rights Reserved

```
*                               *
**********************************************************************>>
PutParametersFromScan: PROCEDURE[page: Handle, parameters:
 ParametersFromScan, lockID: JobBackUp.LockID];

<<**********************************************************************
*                               *
* FUNCTION: Sets the simplified page of a page. If an image   *
*   is already there, it is deleted.              *
* PARAMETERS:                      *
*   lockID - job where page is              *
*   simplifiedPage - image put on page               *
*   page - page where image will be put               *
*   side - side of page to put simplified page on        *
* RETURN VALUES: none                     *
* SIGNALS: none                    *
*                               *
**********************************************************************>>
PutSimplifiedPage: PROCEDURE[page: Handle, side: Side,
 simplifiedPage: Image.Handle, lockID: JobBackUp.LockID];

<<**********************************************************************
*                               *
* FUNCTION: Removes the page from a job.            *
* PARAMETERS:                      *
*   lockID - job where page is              *
*   page - page who will be removed               *
* RETURN VALUES: none                     *
* SIGNALS:                     *
*   Page.Error[nilPageHandle] - page is nil-valued        *
*                               *
**********************************************************************>>
Remove: PROCEDURE[page: Handle, lockID: JobBackUp.LockID];

<<**********************************************************************
*                               *
* FUNCTION: Removes the back image of a page.            *
* PARAMETERS:                      *
*   lockID - job where page is              *
*   page - page where image will be removed from          *
* RETURN VALUES:                      *
*   image - back image of page               *
* SIGNALS:                     *
*   Page.Error[nilPageHandle] - page is nil-valued        *
*                               *
**********************************************************************>>
RemoveBackImage: PROCEDURE[page: Handle, lockID: JobBackUp.LockID]
 RETURNS [image: Image.Handle];

<<**********************************************************************
```

Copyright © 1992 Xerox Corporation All Rights Reserved

```
*                                                  *
* FUNCTION: Removes the backup image of a page's side.      *
* PARAMETERS:                                      *
*   lockID - job where page is                     *
*   page - page where image will be removed from          *
*   side - side of page where image will be removed from  *
* RETURN VALUES:                                   *
*   image - back image of page                     *
* SIGNALS:                                         *
*   Page.Error[nilPageHandle] - page is nil-valued        *
*                                                  *
*******************************************************************>>
RemoveBackupImage: PROCEDURE[page: Handle, side: Side, lockID:
 JobBackUp.LockID] RETURNS [image: Image.Handle];

<<*******************************************************************
*                                                  *
* FUNCTION: Removes the front image of a page.            *
* PARAMETERS:                                      *
*   lockID - job where page is                     *
*   page - page where image will be removed from          *
* RETURN VALUES:                                   *
*   image - front image of page                    *
* SIGNALS:                                         *
*   Page.Error[nilPageHandle] - page is nil-valued        *
*                                                  *
*******************************************************************>>
RemoveFrontImage: PROCEDURE[page: Handle, lockID: JobBackUp.LockID]
 RETURNS [image: Image.Handle];

<<*******************************************************************
*                                                  *
* FUNCTION: Removes the image from a job.                 *
* PARAMETERS:                                      *
*   lockID - job where image is                    *
*   image - image to be removed                    *
* RETURN VALUES: none                              *
* SIGNALS: none                                    *
*                                                  *
*******************************************************************>>
RemoveImage: PROCEDURE[image: Image.Handle, lockID:
 JobBackUp.LockID];

<<*******************************************************************
*                                                  *
* FUNCTION: Sets all pages to be valid.                   *
* PARAMETERS:                                      *
*   lockID - job to be modified                    *
* RETURN VALUES: none                              *
* SIGNALS: none                                    *
```

Copyright © 1992 Xerox Corporation All Rights Reserved

```
*                                    *
*******************************************************************>>
SetAllPagesValid: PROCEDURE[lockID: JobBackUp.LockID];

<<*******************************************************************
*                                    *
* FUNCTION:  Sets the chapterStart field of a page.          *
* PARAMETERS:                                    *
*   lockID - job to be modified                      *
*   page - page modified                           *
*   chapterStart - new value of page's chapterStart         *
* RETURN VALUES: none                               *
* SIGNALS:                                   *
*   Page.Error[nilPageHandle] - page is nil-valued          *
*                                    *
*******************************************************************>>
SetChapterStart: PROCEDURE[lockID: JobBackUp.LockID, page: Handle,
 chapterStart: BOOLEAN];

<<*******************************************************************
*                                    *
* FUNCTION:  Sets the headToToe field of a page range.        *
* PARAMETERS:                                    *
*   lockID - job to be modified                      *
*   pages - pages modified                          *
*   headToToe - new value of pages' headToToe             *
* RETURN VALUES: none                               *
* SIGNALS:                                   *
*   Page.Error[nilPageHandle] - page is nil-valued          *
*                                    *
*******************************************************************>>
SetHeadToToe: PROCEDURE[lockID: JobBackUp.LockID, pages: Range,
 headToToe: BOOLEAN];

<<*******************************************************************
*                                    *
* FUNCTION:  Sets the insert field of a page.           *
* PARAMETERS:                                    *
*   lockID - job to be modified                      *
*   page - page modified                           *
*   insert - new value of page's insert                *
* RETURN VALUES: none                               *
* SIGNALS:                                   *
*   Page.Error[nilPageHandle] - page is nil-valued          *
*                                    *
*******************************************************************>>
SetInsert: PROCEDURE[lockID: JobBackUp.LockID, page: Handle,
 insert: Insert];

<<*******************************************************************
```

Copyright © 1992 Xerox Corporation All Rights Reserved

```
*                                                  *
* FUNCTION: Sets the validity (whether a service can use the   *
*   page) of a page.                               *
*   finished.                                      *
* PARAMETERS:                                      *
*   lockID - job to be modified                    *
*   page - page to be modified                     *
*   valid - validity of a page                     *
* RETURN VALUES: none                              *
* SIGNALS:                                         *
*   Page.Error[nilPageHandle] - page is nil-valued *
*                                                  *
******************************************************************>>
SetPageValidity: PROCEDURE[lockID: JobBackUp.LockID, page: Handle,
 valid: BOOLEAN];

<<******************************************************************
*                                                  *
* FUNCTION: Sets the boolean specifying if scanning of a job is *
*   finished.                                      *
* PARAMETERS:                                      *
*   lockID - job to be modified                    *
*   pageListCompleted - new value of job's page progression   *
* RETURN VALUES: none                              *
* SIGNALS: none                                    *
*                                                  *
******************************************************************>>
SetPageListCompleted: PROCEDURE[lockID: JobBackUp.LockID,
 pageListCompleted: BOOLEAN];

<<******************************************************************
*                                                  *
* FUNCTION: Sets the rotation of a page side.      *
* PARAMETERS:                                      *
*   lockID - job where page is                     *
*   page - page modified                           *
*   side - side of page modified                   *
*   rotation - rotation of the page side           *
* RETURN VALUES: none                              *
* SIGNALS:                                         *
*   Page.Error[nilPageHandle] - page is nil-valued *
*                                                  *
******************************************************************>>
SetRotation: PROCEDURE[lockID: JobBackUp.LockID, page: Handle,
 side: Side, rotation: Rotation];

END.
```

Copyright © 1992 Xerox Corporation All Rights Reserved

```
DIRECTORY
 StreamScheduler USING [Handle];

PreParseStreamScheduler: DEFINITIONS =

 BEGIN

 Handle: TYPE = StreamScheduler.Handle;

 PreParseCount: TYPE = CARDINAL;

 IncrementPreParseCount: PROCEDURE [handle: Handle, count: CARDINAL ← 1];

 END.
```

Copyright © 1992 Xerox Corporation All Rights Reserved

```
DIRECTORY
 BlockStream USING [StreamHandle],
 Courier USING [ErrorCode],
 FaultLogger USING [ID],
 JobID USING [ID],
 ResMgr USING [Status],
 ResMgrStorage USING [Pages],
 RMDirectory USING [ErrorCode],
 RTOSFile USING [FileID],
 Stream USING [CompletionCode];

Print3SM: DEFINITIONS =
 BEGIN


 CallBackProc: TYPE = PROCEDURE [clientID: JobID.ID, problem: Problem];

 MgrStatus: TYPE = {
  noError, systemError, invalidPrintParameters, masterTooLarge,
  mediumUnavailable, serviceUnavailable, spoolingDisabled, tooManyClients,
  insufficientSpoolSpace, spare1, spare2, spare3, spare4};

 SourceStatus: TYPE = {
  aborted, completed, running, interrupted, spare1, spare2, spare3};

 Operation: TYPE = {
  abort, resumeAbort, interrupt, resumeInterrupt, returnPrintID, cancelJob,
  spare1, spare2, spare3};

 ProblemType: TYPE = {
  aborted, badStreamHandle, courierError, directoryError, invalidIPBuffer,
  resMgrError, streamTimeOut, unknownNetResponce, spare};

 Problem: TYPE = RECORD [
  var: SELECT type: ProblemType FROM
   aborted => [],
   badStreamHandle => [],
   courierError => [code: Courier.ErrorCode],
   directoryError => [code: RMDirectory.ErrorCode, faultID: FaultLogger.ID],
   invalidIPBuffer => [code: CARDINAL],
   resMgrError => [code: ResMgr.Status, faultID: FaultLogger.ID],
   streamTimeOut => [],
   unknownNetResponce => [code: Stream.CompletionCode],
   spare => [code: CARDINAL],
   ENDCASE];

 Source: TYPE = {disk, net, spare};
```

Copyright © 1992 Xerox Corporation All Rights Reserved

```
CloseSource: PROCEDURE [source: Source, size: ResMgrStorage.Pages];

OperateOnSource: PROCEDURE [
 clientID: JobID.ID, operation: Operation, why: MgrStatus]
 RETURNS [status: SourceStatus];

StartSource: PROCEDURE [
 clientID: JobID.ID, source: Source, streamHandle: BlockStream.StreamHandle,
 fileID: RTOSFile.FileID, callBackProc: CallBackProc]
 RETURNS [status: SourceStatus];

END.
```

Copyright © 1992 Xerox Corporation All Rights Reserved

```
DIRECTORY
 JobID USING [ID],
 ResMgrIDs USING [TransactionID];

PrintTTY: DEFINITIONS =

 BEGIN

 Event: TYPE = {
  abort, abortAllJobs, aborted, abortingIIPBuffers, abortingInterruptedJob,
  aboutToAbort, aboutToComplete, aboutToInterrupt, adminSegCompleted,
  adminSegStarted, auditTrail, bufferFull, charCodeMissing, clientAbort,
  clientCompleted, coalesceImageTask, commandRejected, completed,
  contrastChange, crashRecoveryComplete, customerBilling, diagnostics, diskFull,
  dryUp, dryUpResumed, faulted, icsResources, ignoredCommand, ignoredResume,
  insertBandsTask, interrupt, interruptASAP, interrupted, interruptHeld,
  interruptSet, iipAborted, irsTask, jobAccepted, jobBadInDB, jobIrrecoverable,
  jobRecovered, loopbackTask, mediaNotLoaded, passComplete, pfmError,
  postParserError, postParserReset, printingInstructionsComplete,
  printFileDeleted, printFileReferenced, printTask, proceedFromInterrupt,
  proceedFromSuspend, processingJob, r1Needed, r1NoLongerNeeded,
  recoverInterrupt, recycle, resetMainLoop, reset, restartingJob, resumed,
  sampleDelivered, schedSWError, segmentJob, segmentDone, separators,
  sheetWritten, shutdown, shutdownCompleted, signatureTask, simplifyPageTask,
  singleImageTask, startingJob, suspend, suspendedByRequest,
  suspendedComplexPage, suspendedDiskSaturated, suspendedFatalError,
  suspendedReceived, suspendedStaticFreed, suspendFreeStatic, xeroxBilling,
  spare1, spare2, spare3};

 Sched: TYPE = {coalesce, mark, null, postParse, preParse};

 nullCode: LONG CARDINAL = LAST[LONG CARDINAL];

 UnknownEvent: ERROR;

 LogEvent: PROCEDURE [
  sched: Sched, event: Event, id: JobID.ID, transID: ResMgrIDs.TransactionID,
  code: LONG CARDINAL ← nullCode, segNum: CARDINAL ← 0];

 END.
```

Copyright © 1992 Xerox Corporation All Rights Reserved

```
Process: DEFINITIONS =
 BEGIN

 InitializeMonitor: PROCEDURE [monitor: LONG POINTER TO MONITORLOCK];
 InitializeCondition: PROCEDURE [
  condition: LONG POINTER TO CONDITION, ticks: Ticks];

 Ticks: TYPE = CARDINAL;
 Milliseconds: TYPE = CARDINAL;
 Seconds: TYPE = CARDINAL;

 MsecToTicks: PROCEDURE [msec: Milliseconds] RETURNS [ticks: Ticks];
 SecondsToTicks: PROCEDURE [seconds: Seconds] RETURNS [ticks: Ticks];
 TicksToMsec: PROCEDURE [ticks: Ticks] RETURNS [msec: Milliseconds];

 SetTimeout: PROCEDURE [condition: LONG POINTER TO CONDITION, ticks: Ticks];
 DisableTimeout: PROCEDURE [condition: LONG POINTER TO CONDITION];

 Detach: PROCEDURE [process: PROCESS];

 GetCurrent: PROCEDURE RETURNS [process: PROCESS];

 Priority: TYPE = [0..7];
 priorityBackground: READONLY Priority;
 priorityNormal: READONLY Priority;
 priorityForeground: READONLY Priority;

 SetPriority: PROCEDURE [priority: Priority];
 GetPriority: PROCEDURE RETURNS [priority: Priority];

 Abort: PROCEDURE [process: UNSPECIFIED];
 CancelAbort: PROCEDURE [process: UNSPECIFIED];
 DisableAborts: PROCEDURE [condition: LONG POINTER TO CONDITION];
 EnableAborts: PROCEDURE [condition: LONG POINTER TO CONDITION];
 AbortPending: PROCEDURE [] RETURNS [abortPending: BOOLEAN];

 Pause: PROCEDURE [ticks: Ticks];
 Yield: PROCEDURE;

 ValidateProcess: PROCEDURE [process: UNSPECIFIED];

 InvalidProcess: ERROR [process: UNSPECIFIED];
 TooManyProcesses: ERROR;

 END.
```

Copyright © 1992 Xerox Corporation All Rights Reserved

Interfaces
----------
CoalescerControl.mesa FontLoaderPrivate.mesa IIPFragMgrPrivate.mesa IIPGen.mesa ImageResamplingService.mesa NetServSMExtra.mesa PreParser.mesa PreParserCallBack.mesa Print3SM.mesa Copyright © 1992 Xerox Corporation All Rights Reserved

```
DIRECTORY
 PublicPrinting USING [InternalMedia, InternalMedium];

PublicPrintUtility: DEFINITIONS =

 BEGIN

 CompareMedium: PROCEDURE [first, second: PublicPrinting.InternalMedium]
  RETURNS [equivalent: BOOLEAN];

 CopyMediaList: PROCEDURE [in: PublicPrinting.InternalMedia, z: UNCOUNTED ZONE]
  RETURNS [out: PublicPrinting.InternalMedia];

 CopyMedium: PROCEDURE [in: PublicPrinting.InternalMedium, z: UNCOUNTED ZONE]
  RETURNS [out: PublicPrinting.InternalMedium];

 FreeMediaList: PROCEDURE [
  media: LONG POINTER TO PublicPrinting.InternalMedia, z: UNCOUNTED ZONE];

 FreeMedium: PROCEDURE [
  medium: LONG POINTER TO PublicPrinting.InternalMedium, z: UNCOUNTED ZONE];

 END.
```

Copyright © 1992 Xerox Corporation All Rights Reserved

```
-- File: RasterDirectorySupervisor.mesa

-- Description: Defines the interface for managing raster directory.
--        The data structure of a raster is defined in RasterObjects.

-- Copyright (C) 1984, 1986, 1987, 1988, 1989, 1990 by Xerox Corporation. All rights
reserved.

DIRECTORY
  DirectoryID USING [ObjectID],
  DirectoryType USING [Name],
  FaultLogger USING [ID, nullLogID],
  RasterObjects USING [RasterInfoPointer, RasterInfoPtr, RESInfoPointer,
    RESInfoPtr, ScanInfoPtr, ScanInfoPointer],
  RTOSFile USING [FileID, UserFileType],
  RTOSIGStructures USING [TiledImageBreakTablePtr],
  Transformation USING [Matrix];

RasterDirectorySupervisor: DEFINITIONS =

  BEGIN

  -- Types --

  DirectoryInfo: TYPE = RECORD [
    prevRaster: ID ← nullID,
    nextRaster: ID ← nullID];

  DescOfRasterDirEntryKeys: TYPE = LONG DESCRIPTOR FOR ARRAY CARDINAL OF
    RasterDirEntryKeys;


  ID : TYPE = DirectoryID.ObjectID;

  nullIDRep: MACHINE DEPENDENT RECORD [a, b, c: CARDINAL] = [0, 0, 0];

  FaultCode: TYPE = CARDINAL;
    -- rasterDB faults and SysSW faults are defined in
    --   RasterDirectoryFaults.mesa.

  RasterDirEntryKeys: TYPE = RECORD [
    name: LONG STRING,
    id: ID];

  RasterList: TYPE = LONG DESCRIPTOR FOR ARRAY CARDINAL OF RasterListObject;

  RasterListObject: TYPE = RECORD [
    raster: ID,
    refCount: CARDINAL];
```

Copyright © 1992 Xerox Corporation All Rights Reserved

```
-- Errors --

Error: ERROR [
  fault: FaultCode ← 89,
  faultID: FaultLogger.ID ← FaultLogger.nullLogID];

-- Constants --

nullID: ID = LOOPHOLE[nullIDRep];

-- Variable --

rasterDirLoaded: BOOLEAN;


-- Procedures --


ConvertRasterDB: PROCEDURE[]
  RETURNS [];
  -- Converts RasterDirectory to the upgrade version.
  -- Raises none

DereferenceRaster: PROCEDURE [id: ID]
  RETURNS [];
  -- Gets an id as an entry key to the RasterDirectory.
  -- Decreases reference count by 1.
  -- Unregisters a raster if the reference count becomes zero. RES file
  --   or Pixel file is deleted in this case.
  -- Raises imageNotFound, refCountLessThanZero, resStaticCounterNotZero,
  --     pvStaticCounterNotZero
  --   ResMgr Error: diskFault,
  --   RMCache Error: fileSystemError

Enumerate: PROCEDURE [z: UNCOUNTED ZONE]
  RETURNS [num: CARDINAL, descOfRasters: DescOfRasterDirEntryKeys];
  -- Enumerates raster database starting from the first entry.
  -- Returns the enumerated number and DescOfRasterDirEntryKeys
  --   of the Raster Directory.
  -- Raises none

EnumeratedNumber: PUBLIC PROCEDURE []
  RETURNS [number: CARDINAL];
  -- Returns the numbers of object that are in the Raster Directory.
  -- REPORTS none

GetRasterDirectoryName: PROCEDURE []
  RETURNS [directoryName: DirectoryType.Name];
  -- Returns the file name of the rasterDB.
  -- Raises none
```

Copyright © 1992 Xerox Corporation All Rights Reserved

```
GetRasterDirectoryID: PROCEDURE []
 RETURNS [dirId: RTOSFile.FileID];
 -- Returns the RTOSFile id of the rasterDB.
 -- Raises none.

GetIDFromName: PROCEDURE [name: LONG STRING]
 RETURNS [id: ID];
 -- Gets a res file name for named images.
 -- Returns the entry key - id.
 -- Raises imageNotFound

GetImageIdFromRasterId: PROCEDURE [id: ID]
 RETURNS [imageId: RTOSFile.FileID];
 -- Returns RTOSFile id of the raster.
 -- Raises imageNotFound, noStaticAllocation,
 --  ResMgr Error: diskFault, needToCoalesce, rmInvalidBuffer, invalidHandle
 --  RMCache Error: fileSystemError, otherRMCacheError, rmcInvalidHandle,
 --   baseOutOfRange,
 --  RTOSFile Error: unknownFile, unknownPage

GetNameFromID: PROCEDURE [id: ID, z: UNCOUNTED ZONE]
 RETURNS [name: LONG STRING];
 -- Gets a entry key - id for named images.
 -- Returns the res file name. The "name" is a pointer to
 --  Heap node in zone z.
 -- Raises imageNotFound

GetRasterInfo: PROCEDURE [id: ID,
   rasterInfoPtr: RasterObjects.RasterInfoPtr]
 RETURNS [];
 -- Gets an id and a location to fill up the RasterObjects.RasterInfo data.
 -- rasterInfoPtr points to the RasterObjects.RasterInfo which is
 --  allocated by client.
 -- For tiled images, tiledImageBreakTable and tiledImageXYTable spaces
 --  must be also allocated if both of the tables are expected to be
 --  inculed in the RasterInfo.
 -- It is the client's responsibility to free the space.
 -- Raises imageNotFound noStaticAllocation,
 --  ResMgr Error: diskFault, needToCoalesce, rmInvalidBuffer, invalidHandle
 --  RMCache Error: fileSystemError, otherRMCacheError, rmcInvalidHandle,
 --   baseOutOfRange,
 --  RTOSFile Error: unknownFile, unknownPage

GetRasterInfoPtr: PROCEDURE [id: ID, needPBT: BOOLEAN ← FALSE]
 RETURNS[rasterInfoPointer: RasterObjects.RasterInfoPointer];
 -- Gets an id and returns a READONLY pointer to the RasterInfo
 --  in Raster Directory. The raster id is locked to other access.
 --  Client must call ReleaseRasterInfoPtr to unlock this raster id
 --  after viewing the data.
```

Copyright © 1992 Xerox Corporation All Rights Reserved

```
-- RasterInfo.tiledBreakAndXYTablePtr also points to the varying break
--   table; it is NIL for the default needPBT case (FALSE). Clients
--   need to load the the break table must pass in a TRUE needPBT.
-- Raises imageNotFound, noStaticAllocation. RasterDirectory also
--   raises others which include: ResMgr Error: diskFault,
--   needToCoalesce, rmInvalidBuffer, invalidHandle;
--   RMCache Error: fileSystemError, otherRMCacheError,
--   rmcInvalidHandle, baseOutOfRange; and RTOSFile Error: ,
--   unknownFile unknownPage.

GetRESInfo: PROCEDURE [id: ID,
   resInfoPtr: RasterObjects.RESInfoPtr]
  RETURNS [];
  -- Gets an id and a location to fill up the RasterObjects.RESInfo data.
  -- resInfoPtr points to the RasterObjects.RESInfo which is allocated by
  --   client.
  -- For tiled images, tiledImageBreakTable and tiledImageXYTable spaces
  --   must be also allocated if both of the tables are expected to be
  --   inculed in the RESInfo.
  -- It is the client's responsibility to free the space.
  -- Raises imageNotFound, noStaticAllocation. RasterDirectory also
  --   raises others which include: ResMgr Error: diskFault,
  --   needToCoalesce, rmInvalidBuffer, invalidHandle;
  --   RMCache Error: fileSystemError, otherRMCacheError,
  --   rmcInvalidHandle, baseOutOfRange; and RTOSFile Error: ,
  --   unknownFile unknownPage.

GetRESInfoPtr: PROCEDURE [id: ID, needPBT: BOOLEAN ← FALSE]
  RETURNS[resInfoPointer: RasterObjects.RESInfoPointer];
  -- Gets an id and returns a READONLY pointer to the RESInfo
  --   in Raster Directory. The raster id is locked to other access.
  --   Client must call ReleaseRESInfoPtr to unlock this raster id
  --   after viewing the data.
  -- RasterInfo.tiledBreakAndXYTablePtr also points to the varying break
  --   table; it is NIL for the default needPBT case (FALSE). Clients
  --   need to load the the break table must pass in a TRUE needPBT.
  -- Raises imageNotFound, noStaticAllocation. RasterDirectory also
  --   raises others which include: ResMgr Error: diskFault,
  --   needToCoalesce, rmInvalidBuffer, invalidHandle;
  --   RMCache Error: fileSystemError, otherRMCacheError,
  --   rmcInvalidHandle, baseOutOfRange; and RTOSFile Error: ,
  --   unknownFile unknownPage.

GetScanInfo: PROCEDURE [id: ID,
   scanInfoPtr: RasterObjects.ScanInfoPtr]
  RETURNS [];
  -- Gets an id and a location to fill up the RasterObjects.ScanInfo data.
  -- scanInfoPtr points to the RasterObjects.ScanInfo which is
  --   allocated by client.
  -- It is the client's responsibility to free the space.
```

Copyright © 1992 Xerox Corporation All Rights Reserved

```
-- Raises imageNotFound; RasterDirectory also raises:
--   ResMgr Error: diskFault
--   RMCache Error: fileSystemError

GetScanInfoPtr: PROCEDURE [id: ID]
 RETURNS[scanInfoPointer: RasterObjects.ScanInfoPointer];
 -- Gets an id and returns a READONLY pointer to the ScanInfo
 --   in Raster Directory.
 -- Note: the raster id is locked to other access.
 --   Client must call ReleaseScanInfoPtr to unlock this raster id
 --   after viewing the data.
 -- Raises imageNotFound; RasterDirectory also raises:
 --   ResMgr Error: diskFault
 --   RMCache Error: fileSystemError

GetTiledImagePBTAndXYTable: PROCEDURE [id: ID,
   tiledBreakAndXYTablePtr: RTOSIGStructures.TiledImageBreakTablePtr]
 RETURNS [];
 -- Gets an id and a location to fill up the tiledImageBreakTable and
 --   tiledImageXYTable data.
 -- tiledBreakAndXYTablePtr is allocated by client.  Space should be
 --   allocated for both tiledImageBreakTable and tiledImageXYTable
 --   data.  And it is the client'sresponsibility to free the space.
 -- Raises imageNotFound, noStaticAllocation.  RasterDirectory also raises:
 --   ResMgr Error: diskFault, invalidHandle, rmInvalidBuffer, needToCoalesce
 --   RMCache Error: fileSystemError, otherRMCacheError, rmcInvalidHandle,
 --   RTOSFile Error: unknownFile, unknownPage

GetTransformedImage: PROCEDURE [currentRaster: ID,
   desiredTransformation: Transformation.Matrix]
 RETURNS [requiredTRaster: ID,
   requiredTansformation: Transformation.Matrix,
   needsICS: BOOLEAN ← FALSE];
 -- for Coalescer use only.
 -- No operation is needed if requiredTransformation is identity.
 -- No rotate operation is needed if requiredTransformation is not
 --   identity and needsICS is FALSE.
 -- Raises imageNotFound

InitRasterDirectory: PROCEDURE []
 RETURNS [];
 -- Reestablishes rasterDB from previous boot.  This is equivalent
 --   to booting without 'e switch.  All good images will be
 --   preserved.
 -- Interfaces with RasterDirectoryInitController.
 -- Raises none

NameRasterfromId: PROCEDURE [id: ID,
   name: LONG STRING,
   permImage: BOOLEAN ← FALSE]
```

Copyright © 1992 Xerox Corporation All Rights Reserved

```
 RETURNS [];
 -- Name a registered raster.
 -- Raster can be set to permanent. Permanent image will not be
 --   deleted after printing; it must be deleted by operator,
 --   systemAdmin, or net clients.
 -- Raises imageNotFound

PruneRasterDirectory: PROCEDURE [rasterList: RasterList]
 RETURNS [];
 -- For using on preparing system power-off only.
 -- Purges unused rasters in the RasterDirectory (booting without 'e switch).
 -- All images that are referenced by jobs will be preserved.
 -- Interfaces with RasterDirectoryInitController.
 -- Raises none

ReferenceRaster: PROCEDURE [id: ID]
 RETURNS [];
 -- Gets an idString or a name as an entry key to the Raster directory.
 -- Increases reference count by 1.
 -- Raises imageNotFound,
 --   ResMgr Error: diskFault
 --   RMCache Error: fileSystemError

ReInitRasterDirectory: PROCEDURE []
 RETURNS [];
 -- Initializes rasterDB without previously installed images.
 -- This is equivalent to booting with 'e switch. the only
 --   images that will be preserved are the Diagnostic
 --   testing patterns (*.res files). res files will not be
 --   preserved if error directoryNotFound occurs.
 -- Raises none

ReleaseRasterInfoPtr: PROCEDURE [id: ID, needPBT: BOOLEAN ← FALSE]
 RETURNS [];
 -- Unlocks a raster entry in Raster Directory.
 -- needPBT must be TRUE, if TRUE needPBT was used when calling
 --   GetRasterInfoPtr.
 -- For tiled images or varying break table, upon returning of the call,
 --   the tiledBreakAndXYTablePtr may not necessarily point to the
 --   break table data.
 -- Raises imageNotFound, rasterPtrNotReleased. RasterDirectory also
 --   raises other errors:
 --   RMCache Error: rmcInvalidHandle, fileSystemError, baseOutOfRange,
 --   RTOSFile Error: unknownFile, unknownPage

ReleaseRESInfoPtr: PROCEDURE [id: ID, needPBT: BOOLEAN ← FALSE]
 RETURNS [];
 -- Unlocks a raster entry in Raster Directory.
 -- needPBT must be TRUE, if TRUE needPBT was used when calling
 --   GetRESInfoPtr.
```

Copyright © 1992 Xerox Corporation All Rights Reserved

```
-- For tiled images or varying break table, upon returning of the call,
--   the RasterInfo.tiledBreakAndXYTablePtr may not necessarily point
--   to the break table data.
-- Raises imageNotFound, rasterPtrNotReleased. RasterDirectory also
--   raises other errors:
--   RMCache Error: rmcInvalidHandle, fileSystemError, baseOutOfRange,
--   RTOSFile Error: unknownFile, unknownPage

ReleaseScanInfoPtr: PROCEDURE [id: ID]
 RETURNS [];
 -- Unlocks a raster entry in Raster Directory.
 -- Raises imageNotFound

ResetRasterFileType: PROCEDURE [id: ID,
   newFileType: RTOSFile.UserFileType]
 RETURNS [];
 -- Changes raster fileType from rasterJob to client desired fileType.
 -- Raises imageNotFound

ResetRasterRefCount: PROCEDURE [id: ID,
   referenceCount: CARDINAL]
 RETURNS [];
 -- Gets an id as an entry key to the RasterDirectory.
 -- Image reference count is reset to referenceCount.
 -- Raises imageNotFound

END...
```

Copyright © 1992 Xerox Corporation All Rights Reserved

```
DIRECTORY
 DirectoryID USING [ObjectID],
 DirectoryType USING [Name],
 FaultLogger USING [ID, nullLogID],
 RasterObjects USING [
  RasterInfoPointer, RasterInfoPtr, RESInfoPointer, RESInfoPtr, ScanInfoPtr,
  ScanInfoPointer],
 RTOSFile USING [FileID, UserFileType],
 RTOSIGStructures USING [TiledImageBreakTablePtr],
 Transformation USING [Matrix];

RasterDirectorySupervisor: DEFINITIONS =

 BEGIN

 DirectoryInfo: TYPE = RECORD [prevRaster: ID ← nullID, nextRaster: ID ← nullID];

 DescOfRasterDirEntryKeys: TYPE = LONG DESCRIPTOR FOR ARRAY CARDINAL OF
  RasterDirEntryKeys;

 ID: TYPE = DirectoryID.ObjectID;

 nullIDRep: MACHINE DEPENDENT RECORD [a, b, c: CARDINAL] = [0, 0, 0];

 FaultCode: TYPE = CARDINAL;

 RasterDirEntryKeys: TYPE = RECORD [name: LONG STRING, id: ID];

 RasterList: TYPE = LONG DESCRIPTOR FOR ARRAY CARDINAL OF RasterListObject;

 RasterListObject: TYPE = RECORD [raster: ID, refCount: CARDINAL];

 Error: ERROR [
  fault: FaultCode ← 89, faultID: FaultLogger.ID ← FaultLogger.nullLogID];

 nullID: ID = LOOPHOLE[nullIDRep];

 rasterDirLoaded: BOOLEAN;

 ConvertRasterDB: PROCEDURE [] RETURNS [];
```

Copyright © 1992 Xerox Corporation All Rights Reserved

```
DereferenceRaster: PROCEDURE [id: ID] RETURNS [];

Enumerate: PROCEDURE [z: UNCOUNTED ZONE]
 RETURNS [num: CARDINAL, descOfRasters: DescOfRasterDirEntryKeys];

EnumeratedNumber: PUBLIC PROCEDURE [] RETURNS [number: CARDINAL];

GetRasterDirectoryName: PROCEDURE []
 RETURNS [directoryName: DirectoryType.Name];

GetRasterDirectoryID: PROCEDURE [] RETURNS [dirId: RTOSFile.FileID];

GetIDFromName: PROCEDURE [name: LONG STRING] RETURNS [id: ID];

GetImageIdFromRasterId: PROCEDURE [id: ID] RETURNS [imageId: RTOSFile.FileID];

GetNameFromID: PROCEDURE [id: ID, z: UNCOUNTED ZONE]
 RETURNS [name: LONG STRING];

GetRasterInfo: PROCEDURE [id: ID, rasterInfoPtr: RasterObjects.RasterInfoPtr]
 RETURNS [];

GetRasterInfoPtr: PROCEDURE [id: ID, needPBT: BOOLEAN ← FALSE]
 RETURNS [rasterInfoPointer: RasterObjects.RasterInfoPointer];

GetRESInfo: PROCEDURE [id: ID, resInfoPtr: RasterObjects.RESInfoPtr] RETURNS [];

GetRESInfoPtr: PROCEDURE [id: ID, needPBT: BOOLEAN ← FALSE]
 RETURNS [resInfoPointer: RasterObjects.RESInfoPointer];

GetScanInfo: PROCEDURE [id: ID, scanInfoPtr: RasterObjects.ScanInfoPtr]
 RETURNS [];

GetScanInfoPtr: PROCEDURE [id: ID]
 RETURNS [scanInfoPointer: RasterObjects.ScanInfoPointer];

GetTiledImagePBTAndXYTable: PROCEDURE [
 id: ID, tiledBreakAndXYTablePtr: RTOSIGStructures.TiledImageBreakTablePtr]
 RETURNS [];

GetTransformedImage: PROCEDURE [
 currentRaster: ID, desiredTransformation: Transformation.Matrix]
 RETURNS [
  requiredTRaster: ID, requiredTansformation: Transformation.Matrix,
  needsICS: BOOLEAN ← FALSE];

InitRasterDirectory: PROCEDURE [] RETURNS [];

NameRasterfromId: PROCEDURE [
```

Copyright © 1992 Xerox Corporation All Rights Reserved

```
 id: ID, name: LONG STRING, permImage: BOOLEAN ← FALSE] RETURNS [];

PruneRasterDirectory: PROCEDURE [rasterList: RasterList] RETURNS [];

ReferenceRaster: PROCEDURE [id: ID] RETURNS [];

ReInitRasterDirectory: PROCEDURE [] RETURNS [];

ReleaseRasterInfoPtr: PROCEDURE [id: ID, needPBT: BOOLEAN ← FALSE] RETURNS [];

ReleaseRESInfoPtr: PROCEDURE [id: ID, needPBT: BOOLEAN ← FALSE] RETURNS [];

ReleaseScanInfoPtr: PROCEDURE [id: ID] RETURNS [];

ResetRasterFileType: PROCEDURE [id: ID, newFileType: RTOSFile.UserFileType]
 RETURNS [];

ResetRasterRefCount: PROCEDURE [id: ID, referenceCount: CARDINAL] RETURNS [];

END.
```

Copyright © 1992 Xerox Corporation All Rights Reserved

```
-- File: RasterObjects.mesa - last edit:

-- Copyright (C) 1986, 1987, 1988, 1989, 1991 by Xerox Corporation. All rights reserved.

DIRECTORY
 Compressor USING [PredictParms],
 ResMgrStorage USING [Pages],
 RTOSFile USING [FileID],
 RTOSIGStructures USING [TiledImageBreakTablePtr],
 Scan USING [DocumentStamp, MoireAwayValue, PageRange, ScanningAttributes,
   ScreenSize, TRCValues],
 Transformation USING [Matrix];

RasterObjects: DEFINITIONS =

 BEGIN

  Direction: TYPE = MACHINE DEPENDENT {
   leftToRight, rightToLeft, topToBottom, bottomToTop};

  RasterInfo: TYPE = MACHINE DEPENDENT RECORD [
   fileId(0): RTOSFile.FileID,
   imageType(4): ImageType,
   oddByte(5): BOOLEAN ← FALSE,
   -- indicates pixel encoding starts on odd byte
   fileSizeInDiskPages(6): ResMgrStorage.Pages,
   -- Size of image file
   pixelLengthInWords(8): LONG CARDINAL,
   breakTableLengthInWords(10): CARDINAL,
   -- for tiledImage, the breakTableLengthInWords includes
   --   PBTTable, XYTable, one word of the breakTableOffset,
   --   and one word of the NumOfBreakEntry.
   pixelEncodingOffset(11): LONG CARDINAL,
   -- word offset in img file to encoding data.
   -- ( 0 = no header/trailer)
   breakTableOffset(13): LONG CARDINAL,
   -- word offset from encoding portion to break table.
   scansPerBreak(15): CARDINAL ← 16, -- 0 = varying breaks
   numberOfBreakTableEntries(16): LONG CARDINAL,
   pixelSequenceType(18): PixelSequence,
   pixelV0ThroughV3(19): PixelOverhead, -- First 4 words of data
   tiledBreakAndXYTablePtr(23): RTOSIGStructures.TiledImageBreakTablePtr ← NIL];
   << * Some general infomation about the breakTable and pixelArray
    related fields:
   For RES and tiledRES (hand made only, any emitter generate this?)
    image types, "pixelLengthInWords" is (breakTableOffset -
    pixelEncodingOffset). And the entire file is stored on disk.
   For pixelVector and tiledPixelVector image types, there is no
    header/trailer and PixelOverhead data. Only the pixelArray and
```

Copyright © 1992 Xerox Corporation All Rights Reserved

```
    breakTable (includes PBTTable, XYTable, breakTableLengthInWords,
    XYTableLengthInWords for tiledPixelVector) are stored under
    the fileId. Also, there is a page gap between the pixelArray
    (compressed bits) and breakTable. Therefore, pixelLengthInWords
    and breakTableLengthInWords are the fields that provode
    the actual word length for the pixelArray (compressed bits)
    and breaktable.
   For all cases, the image file is trancated in ResMgrStorage.Pages.
   tiledBreakAndXYTablePtr points to both tiledImageBreakTable and
    tiledImageXYTable. Client should allocate space for both break
    table and XY table. Change is made due to use caching.
   tiledBreakAndXYTablePtr is also used to point the the normal break table
    for the image with varying scansPerBreak. >>

 ImageType: TYPE = MACHINE DEPENDENT {
  RES(0), tiledPixelVector, tiledRES, AIS, brush, ipPixelVector,
  pixelVector, IMG, arbitraryRotatedPV, stripeTilePV, spare1, spare2, spare3, (127)};

 PixelOverhead: TYPE = RECORD [
  var: SELECT OVERLAID PixelSequence FROM
   font, adaptive => [
     breakTable: CARDINAL,
     -- 0 = no break table
     predictors: Compressor.PredictParms,
     scanLength: CARDINAL,
     -- scan length in pixels
     nScanLines: CARDINAL],
     -- number of scan lines
   packed => [
     bitsPerSample: CARDINAL,
     -- number of bits per sample
     scanLength: CARDINAL],
     -- in pixels
   compressed => [
     breakTable: CARDINAL,
     -- 0 = no break table
     nRange: CARDINAL,
     -- specifies predictor for half-tone mode
     scanLength: CARDINAL],
     -- scan length in pixels
   ccitt => [
     scanLength: CARDINAL,
     -- scan length in pixels
     reverseBits: CARDINAL],
   largeVec => [
     bytesPerVector: CARDINAL],
   spare1, spare2 => [
     words: ARRAY [0..4) OF CARDINAL],
   ENDCASE];
```

Copyright © 1992 Xerox Corporation All Rights Reserved

```
PixelSequence: TYPE = MACHINE DEPENDENT {adaptive(0), packed, compressed, ccitt,
font, largeVec, spare1, spare2, spare3, (127)};

PixelArray: TYPE = MACHINE DEPENDENT RECORD [
  xPixel(0): CARDINAL,
  yPixel(1): CARDINAL,
  samplesPerPixel(2): CARDINAL,
  maxSampleValues(3): CARDINAL,
  samplesInterleaved(4): CARDINAL,
  m(5): Transformation.Matrix,
  samples(18): RasterInfo];

RESInfo: TYPE = MACHINE DEPENDENT RECORD [
  imageScaleX(0): REAL,
  imageScaleY(2): REAL,
  xDimension(4): CARDINAL,
  yDimension(5): CARDINAL,
  maskImage(6): PixelArray,
  hasColorImage(49): BOOLEAN,
  hasColorOpr(50): BOOLEAN,
  hasImageProps(51):BOOLEAN,
  signature(52): CARDINAL];

RESInfoPtr: TYPE = LONG POINTER TO RESInfo;

RESInfoPointer: TYPE = LONG POINTER TO READONLY RESInfo;

ScanInfo: TYPE = MACHINE DEPENDENT RECORD [
  xDirection(0): Direction,
  yDirection(1): Direction,
  docStamp(2): Scan.DocumentStamp,
  moireAwayValue (7): Scan.MoireAwayValue,
  pageSelect(8): Scan.PageRange,
  screenSize(11): Scan.ScreenSize,
  scanningAttributes(12): Scan.ScanningAttributes,
  trcValues(25): Scan.TRCValues];

ScanInfoPtr: TYPE = LONG POINTER TO ScanInfo;

ScanInfoPointer: TYPE = LONG POINTER TO READONLY ScanInfo;

RasterInfoPtr: TYPE = LONG POINTER TO RasterInfo;

RasterInfoPointer: TYPE = LONG POINTER TO READONLY RasterInfo;


END..
```

Copyright © 1992 Xerox Corporation All Rights Reserved

```
-- Real.mesa

-- Copyright (C) Xerox Corporation 1981, 1982. All rights reserved.

DIRECTORY
 ESCAlpha,
 Mopcodes USING [zESC];

Real: DEFINITIONS =
 BEGIN

 -- See IEEE floating point standard for more information.

 -- Extended is the internal form of a single precision
 -- floating point number. If the type of a value is
 -- infinity or zero, only the sign is interesting.
 -- In these cases, exp and frac are undefined.
 -- If spec = nan, then exp is undefined and frac
 -- contains the nan significand. Some constant
 -- nans are defined below. If spec is normal,
 -- then sign, exp, and frac describe the value.
 -- If sign is true, then the number is negative.
 -- Exp is the binary exponent. Frac is the significand
 -- (the binary point is between bits 0 and 1 -
 -- normalized numbers are between 1 and 2).

 NumberType: TYPE = MACHINE DEPENDENT{normal, zero, infinity, nan};

 Extended: TYPE = RECORD [
  type: NumberType, sign: BOOLEAN, exp: INTEGER, frac: LONG CARDINAL];

 -- Constants

 -- Useful REAL values.
 PlusZero: REAL = LOOPHOLE[LONG[00000000000B]];
 MinusZero: REAL = LOOPHOLE[20000000000B];
 PlusInfinity: REAL = LOOPHOLE[17740000000B];
 MinusInfinity: REAL = LOOPHOLE[37740000000B];
 LargestNumber: REAL = LOOPHOLE[17737777777B]; -- almost infinity
 SmallestNormalizedNumber: REAL = LOOPHOLE[00040000000B];

 -- You may want to use TrappingNaN to initialize storage.

 NonTrappingNaN: REAL = LOOPHOLE[17740000001B];
 TrappingNaN: REAL = LOOPHOLE[17740000002B];

 -- Values that may be encountered as vp.frac during an exception.

 TrapNonTrappingNaN: LONG CARDINAL = LONG[1];
```

Copyright © 1992 Xerox Corporation All Rights Reserved

```
TrapTrappingNaN: LONG CARDINAL = LONG[2];
AddInfinityNaN: LONG CARDINAL = LONG[3];
MultiplyInfinityNaN: LONG CARDINAL = LONG[4];
DivideInfinityNaN: LONG CARDINAL = LONG[5];

-- Exceptions
Flag: TYPE = BOOLEAN _ FALSE;

Exception: TYPE = MACHINE DEPENDENT{
 fixOverflow, inexactResult, invalidOperation, divisionByZero, overflow,
 underflow};

ExceptionFlags: TYPE = PACKED ARRAY Exception OF Flag;

NoExceptions: ExceptionFlags = ALL[FALSE];
AllExceptions: ExceptionFlags = ALL[TRUE];
UsualExceptions: ExceptionFlags =
 [fixOverflow: TRUE, invalidOperation: TRUE, divisionByZero: TRUE,
  overflow: TRUE];

-- The six kinds of exceptions have independent
-- "sticky" flags that remember if the exception
-- has occurred since the last call to SetStickyFlags.
-- SetStickyFlags is provided so that procedures may
-- save and restore the state for others.

SetStickyFlags: PROC [new: ExceptionFlags _ NoExceptions]
 RETURNS [old: ExceptionFlags];

GetStickyFlags: PROC RETURNS [ExceptionFlags];

-- This signal is raised if any enabled exception occurs.
-- Flags reports all the exceptions which occurred during
-- the faulted operation (including those which are
-- disabled). On RESUME, the client is expected to
-- return a fixed up copy of the reference or NIL, in
-- which case the standard fixup will happen. Operations
-- in this interface only raise RealException on the
-- conditions mentioned in UsualExceptions, above.
-- Usually, RealException can be resumed, but certain
-- exceptions, such as invalidOperation raised as a
-- result of compare or one of the Fixes, cannot be
-- resumed. If a RESUME is done in such a case, the
-- ERROR RealError is raised.

RealException: SIGNAL [flags: ExceptionFlags, vp: LONG POINTER TO Extended]
 RETURNS [LONG POINTER TO Extended];

RealError: ERROR;
```

Copyright © 1992 Xerox Corporation All Rights Reserved

```
-- INITIALIZATION

-- The procedure InitReals must be called before any
-- floating point operations are called. Alternatively,
-- RealControl must be STARTed. It is ok to call
-- InitReals more than once.

InitReals: PROC;
RealControl: PROGRAM;

MaxSinglePrecision: CARDINAL = 9;
DefaultSinglePrecision: CARDINAL = 7;

-- The decimal to binary routines may cause exceptions
-- in the normal course of their work. In particular,
-- InexactResult, Overflow, and Underflow. They
-- always use rounding mode rn (round to nearest).

-- ReadFloat needs to return the character after
-- the end of the number.

DefaultPutback: PROC [CHARACTER]; -- discards the character

ReadReal: PROC [
 get: PROC RETURNS [CHARACTER], putback: PROC [CHARACTER] _ DefaultPutback]
 RETURNS [REAL];

StringToReal: PROC [LONG STRING] RETURNS [REAL];

-- PairToReal converts the value fr*10**exp10 to real.

PairToReal: PROC [fr: LONG INTEGER, exp10: INTEGER] RETURNS [REAL];

-- The binary to decimal routines will not cause
-- exceptions. The decimal output is rounded to
-- precision significant digits in rounding mode rn.
-- ForceE _ TRUE forces output in scientific notation.

WriteReal: PROC [
 cp: PROC [CHARACTER], r: REAL, precision: CARDINAL _ DefaultSinglePrecision,
 forceE: BOOLEAN _ FALSE];

AppendReal: PROC [
 s: LONG STRING, r: REAL, precision: CARDINAL _ DefaultSinglePrecision,
 forceE: BOOLEAN _ FALSE];

-- Real to Pair converts value r to fr*10**exp10.
-- fr will have precision significant digits.

RealToPair: PROC [r: REAL, precision: CARDINAL _ DefaultSinglePrecision]
```

Copyright © 1992 Xerox Corporation All Rights Reserved

```
RETURNS [type: NumberType, fr: LONG INTEGER, exp10: INTEGER];

-- Operations

-- These three Fixes truncate (round to integer in mode rz).

Fix: PROC [REAL] RETURNS [LONG INTEGER] = MACHINE CODE {
 Mopcodes.zESC, ESCAlpha.aFIX; };

FixI: PROC [REAL] RETURNS [INTEGER] = MACHINE CODE {
 Mopcodes.zESC, ESCAlpha.aFIXI; };

FixC: PROC [REAL] RETURNS [CARDINAL] = MACHINE CODE {
 Mopcodes.zESC, ESCAlpha.aFIXC; };

-- These three Fixes round.

RoundLI: PROC [REAL] RETURNS [LONG INTEGER] = MACHINE CODE {
 Mopcodes.zESC, ESCAlpha.aROUND; };

RoundI: PROC [REAL] RETURNS [INTEGER] = MACHINE CODE {
 Mopcodes.zESC, ESCAlpha.aROUNDI; };

RoundC: PROC [REAL] RETURNS [CARDINAL] = MACHINE CODE {
 Mopcodes.zESC, ESCAlpha.aROUNDC; };

-- Remainder of a/b.

FRem: PROC [a, b: REAL] RETURNS [REAL] = MACHINE CODE {
 Mopcodes.zESC, ESCAlpha.aFREM; };

-- These operations are normally generated by the compiler.

FAdd: PROC [a, b: REAL] RETURNS [REAL] = MACHINE CODE {
 Mopcodes.zESC, ESCAlpha.aFADD; };

FSub: PROC [a, b: REAL] RETURNS [REAL] = MACHINE CODE {
 Mopcodes.zESC, ESCAlpha.aFSUB; };

FMul: PROC [a, b: REAL] RETURNS [REAL] = MACHINE CODE {
 Mopcodes.zESC, ESCAlpha.aFMUL; };

FDiv: PROC [a, b: REAL] RETURNS [REAL] = MACHINE CODE {
 Mopcodes.zESC, ESCAlpha.aFDIV; };

FComp: PROC [a, b: REAL] RETURNS [INTEGER] = MACHINE CODE
 {Mopcodes.zESC, ESCAlpha.aFCOMP; };

Float: PROC [LONG INTEGER] RETURNS [REAL] = MACHINE CODE
 {Mopcodes.zESC, ESCAlpha.aFLOAT; };
```

Copyright © 1992 Xerox Corporation All Rights Reserved

END.

Copyright © 1992 Xerox Corporation All Rights Reserved

```
-- RealFns.mesa

-- Copyright Xerox Corporation 1980

RealFns: DEFINITIONS =
 BEGIN

 Exp: PROC [REAL] RETURNS [REAL];
 -- For an input argument n, returns en (e=2.718...).
 -- Computed by continued fractions.

 Log: PROC [base, arg: REAL] RETURNS [REAL];
 -- Computes logarithm to the base base of arg.
 -- Computed by Ln(arg)/Ln(base).

 Ln: PROC [REAL] RETURNS [REAL];
 -- Computes the natural logarithm (base e) of the input argument.

 SqRt: PROC [REAL] RETURNS [REAL];
 -- Calculates the square root of the input value by Newton's iteration.

 Root: PROC [index, arg: REAL] RETURNS [REAL];
 -- Calculates the index root of arg by e(Ln(arg)/index).

 Power: PROC [base, exponent: REAL] RETURNS [REAL];
 -- Calculates base to the exponent power by e(exponent*Ln(base)).

 Sin: PROC [radians: REAL] RETURNS [sin: REAL];
 SinDeg: PROC [degrees: REAL] RETURNS [sin: REAL];
 Cos: PROC [radians: REAL] RETURNS [cos: REAL];
 CosDeg: PROC [degrees: REAL] RETURNS [cos: REAL];
 Tan: PROC [radians: REAL] RETURNS [tan: REAL];
 TanDeg: PROC [degrees: REAL] RETURNS [tan: REAL];
 -- Computes the trigonometric function by polynomial;
 --   good to 7.33 decimal places.

 ArcTan: PROC [y, x: REAL] RETURNS [radians: REAL];
 ArcTanDeg: PROC [y, x: REAL] RETURNS [degrees: REAL];
 -- Good to 8.7 decimal places.

 -- AlmostZero returns TRUE if ABS[x] is smaller than 2^distance.
 AlmostZero: PROC [x: REAL, distance: [-126..127]] RETURNS [BOOLEAN];

 -- AlmostEqual returns TRUE if ABS[x-y]/MAX[ABS[x],ABS[y]]
 --   is smaller than 2^distance. That is, the exponent of the result
 --   of the subtract must be ABS[distance] smaller than the larger
 --   exponent of the operands.
 AlmostEqual: PROC [y, x: REAL, distance: [-126..0]] RETURNS [BOOLEAN];

 -- In both these procedures, distance should be negative!
```

Copyright © 1992 Xerox Corporation All Rights Reserved

END.

Copyright © 1992 Xerox Corporation All Rights Reserved

```
DIRECTORY
 Real USING [ExceptionFlags, UsualExceptions];

RealOps: DEFINITIONS =
 BEGIN

 RoundingMode: TYPE = MACHINE DEPENDENT{rn, rz, rm, rp};
 DefaultRoundingMode: RoundingMode = rn;

 InfinityMode: TYPE = MACHINE DEPENDENT{projective, affine};
 DefaultInfinityMode: InfinityMode = projective;

 NormalizationMode: TYPE = MACHINE DEPENDENT{warning, normalizing};
 DefaultNormalizationMode: NormalizationMode = warning;

 Mode: TYPE = MACHINE DEPENDENT RECORD [
  blank(0:0..5): [0..77B] _ NULL,
  im(0:6..6): InfinityMode _ projective,
  nm(0:7..7): NormalizationMode _ warning,
  round(0:8..9): RoundingMode _ rn,
  traps(0:10..15): Real.ExceptionFlags _ Real.UsualExceptions];

 DefMode: Mode = [
  blank: 0, im: projective, nm: warning, round: rn,
  traps: Real.UsualExceptions];
 FixMode: Mode = [
  blank: 0, im: projective, nm: warning, round: rz,
  traps: Real.UsualExceptions];

 SetMode: PROC [new: Mode] RETURNS [old: Mode];

 GetMode: PROC RETURNS [Mode];

 FAdd: PROC [a, b: REAL, m: Mode _ DefMode] RETURNS [REAL];
 FSub: PROC [a, b: REAL, m: Mode _ DefMode] RETURNS [REAL];
 FMul: PROC [a, b: REAL, m: Mode _ DefMode] RETURNS [REAL];
 FDiv: PROC [a, b: REAL, m: Mode _ DefMode] RETURNS [REAL];
 FComp: PROC [a, b: REAL, m: Mode _ DefMode] RETURNS [INTEGER];
 FRem: PROC [a, b: REAL, m: Mode _ DefMode] RETURNS [REAL];
 Float: PROC [a: LONG INTEGER, m: Mode _ DefMode] RETURNS [REAL];
 RoundLI: PROC [a: REAL, m: Mode _ DefMode] RETURNS [LONG INTEGER];
 RoundI: PROC [a: REAL, m: Mode _ DefMode] RETURNS [INTEGER];
 RoundC: PROC [a: REAL, m: Mode _ DefMode] RETURNS [CARDINAL];
```

Copyright © 1992 Xerox Corporation All Rights Reserved

```
InitReals: PROC;
Microcode: BOOLEAN;
END.
```

Copyright © 1992 Xerox Corporation All Rights Reserved

```
DIRECTORY
 Mopcodes USING [zESC],
 RTOSESCAlpha USING [aSCALER];

ResamplerOpCodes: DEFINITIONS =
 BEGIN

 ScalerMode: TYPE = MACHINE DEPENDENT{
  noRotate(0), rotate90(1), rotate180(2), rotate270(3), xFlip(4), yFlip(5),
  swapXY(6), swapNegateXY(7), (8191)};

 Extras: TYPE = MACHINE DEPENDENT RECORD [
  mode(0): ScalerMode,
  indexBit(1): CARDINAL,
  destPixelCount(2): CARDINAL,
  wordOffsetX(3): LONG INTEGER,
  wordOffsetXPlusOne(5): LONG INTEGER,
  slowScanIncrement(7): LONG CARDINAL,
  fastScanIncrement(9): LONG CARDINAL,
  prevS(11): CARDINAL,
  prevF(12): CARDINAL,
  tempStackVariable(13): LONG INTEGER ← 0];

 Scale: PROCEDURE [
  constants: LONG POINTER TO Extras, sourcePtr: LONG POINTER,
  resultPtr: LONG POINTER, fscanOffset, sScanOffset: LONG CARDINAL,
  numScanLines: INTEGER, mesaBit: CARDINAL ← 8000H] = MACHINE CODE {
  Mopcodes.zESC, RTOSESCAlpha.aSCALER};


 END.
```

Copyright © 1992 Xerox Corporation All Rights Reserved

```
-- File: ResMgr.mesa - last edit:

-- Copyright (C) 1987, 1988, 1989, 1990, 1991 by Xerox Corporation. All rights reserved.

DIRECTORY
 FaultLogger USING [ID],
 ResMgrIDs USING [ID],
 ResMgrStorage USING [BufferList, Pages],
 RTOSFile USING [FileID];

ResMgr: DEFINITIONS = BEGIN

 -- Constants
 nullTransferID: TransferID = LOOPHOLE[nullTransferIDRep];
 nullTransferIDRep: PRIVATE ARRAY [0..TransferID.SIZE) OF CARDINAL = ALL[0];

 -- TYPEs

 Status: TYPE = {
  diskFault,     -- Raised by WaitForCompletion, Read/WriteSync when disk fails.
  invalidBuffer,     -- Bad BufferList passed to Resource Manager.
  invalidHandle,     -- Raised by Abort, ChainedWrite, and WaitForCompletion on
         -- a handle that is no longer thought to be in the system.
  missingBuffers,  -- Buffers unaccounted for during coalesce.
  needToCoalesce, -- Allocate static failed because client's virtual
         -- range is fragmented.
  waitAborted,-- Raised by WaitForCompletion when the transfer is aborted.
  writeProtected,  -- Raised on attempt to write to a write protected file.
  invalidOperation,    -- Raised on read/write operation if transferSize <= 0.
  insufficientResources}; -- Raised on any operation that allocates resources,
         -- indicates that ResMgr is currently using all of its resources

 TransferID: TYPE[4];

 -- ERRORs
 Error: ERROR [code: Status, faultID: FaultLogger.ID];

 -- ------------------
 -- MEMORY PROCEDUREs
 -- ------------------

 Allocate: PROCEDURE [
  id: ResMgrIDs.ID, Pages: ResMgrStorage.Pages, base: LONG POINTER ← NIL,
  waitTillAvailable: BOOLEAN ← TRUE, asMuchAsPossible: BOOLEAN ← FALSE]
  RETURNS [buffer: ResMgrStorage.BufferList];
```

Copyright © 1992 Xerox Corporation All Rights Reserved

```
 -- Allocates memory and an associated BufferDescriptor. All fields of the
 -- BufferDescriptor are initialized. If there is not enough real memory
 -- to satisfy the request then the BufferList will be NIL.
 -- If asMuchAsPossible is TRUE, then the remaining static and r1 memory for
 -- the client will be determined and MIN[pages, (static+r1 remaining)] will
 -- be allocated in the client's virtual range. If there is no remaining
 -- memory for the client, then the returned BufferList will be NIL.
 -- Raises: invalidBuffer, needToCoalesce, insufficientResources.

AllocateBufferDescriptor: PROCEDURE RETURNS [buffer: ResMgrStorage.BufferList];
 -- Allocates a BufferDescriptor and returns a pointer to it. All
 -- BufferDescriptors are deallocated by calls to FreeBufferList or Write
 -- operations with freeWhenComplete = TRUE.
 -- Raises: insufficientResources.

Coalesce: PROCEDURE [
 id: ResMgrIDs.ID, bufferList: ResMgrStorage.BufferList,
 startAddr: LONG POINTER, pageCount: ResMgrStorage.Pages];
 -- Remaps the real memory in the virtual range specifed by startAddr and
 -- pageCount (a subrange of the clients virtual range) such that all
 -- allocated memory is contiguous within the range. The client provides a
 -- list of buffer descriptors, identifying the buffers to be coalesced.
 -- Coalesce modifies the base fields of the buffer descriptors.
 -- Raises: missingBuffers, invalidBuffer, insufficientResources.

Extend: PROCEDURE [
 id: ResMgrIDs.ID, buffer: ResMgrStorage.BufferList,
 waitTillAvailable: BOOLEAN ← TRUE];
 -- The current buffer (buffer.allocateSize) is extended by
 -- buffer.extendByPages. If the base is NIL and allocateSize is zero, a
 -- new buffer is allocated, and its base address is written into
 -- buffer.base. For clients managing their own memory, the base should
 -- specify an address within the clients virtual range, at which real
 -- memory will be mapped. If 'waitTillAvailable' = FALSE and not enough
 -- memory is available to satisfy the request, then the base will be
 -- returned NIL.
 -- Raises: invalidBuffer, needToCoalesce, insufficientResources.

FreeBufferDescriptor: PROCEDURE [buffer: ResMgrStorage.BufferList];
 -- Frees a list of BufferDescriptors. Does not deallocate the memory.
 -- Raises: none

FreeBufferList: PROCEDURE [
 id: ResMgrIDs.ID, buffer: ResMgrStorage.BufferList];
 -- Frees all memory associated with the BufferList and deallocates the
 -- BufferDescriptors.
 -- Raises: invalidBuffer.

SwapBuffers: PROCEDURE [
 id0, id1: ResMgrIDs.ID, buffer0, buffer1: ResMgrStorage.BufferList];
```

Copyright © 1992 Xerox Corporation All Rights Reserved

```
-- Swaps the memory contents of two equal-sized blocks of allocated memory.
-- Raises: invalidBuffer.

Truncate: PROCEDURE [
 id: ResMgrIDs.ID, buffer: ResMgrStorage.BufferList];
 -- Returns memory to the free pool as specified by the 'extendByPages'
 -- field for each BufferDescriptor in the list. Truncate will not
 -- deallocate the BufferDescriptors.
 -- Raises: invalidBuffer.


-- ~~~~~~~~~~~~~~~~~~~
-- DISK PROCEDUREs
-- ~~~~~~~~~~~~~~~~~~~

Abort: PROCEDURE [xferId: TransferID];
 -- Can be called after ReserveRead, ReadAsync, WriteAsync or ChainedWrite
 -- to abort that operation. If the xferId is from a ReserveRead, then
 -- any memory added to any of the buffers will be returned to the system.
 -- The xferId parameter is invalid after Abort returns.
 -- Raises: invalidHandle, insufficientResources.
 -- Raises: RMCache.Error[invalidOperation]

ChainedWrite: PROCEDURE [
 xferId: TransferID, id: ResMgrIDs.ID, buffer: ResMgrStorage.BufferList,
 transferSize: ResMgrStorage.Pages, freeWhenComplete: BOOLEAN ← TRUE];
 -- Used to data chain write operations. (Write multiple memory buffers
 -- contiguously to disk). The TransferID passed in is obtained from a
 -- call to WriteAsync for the first buffer. All subsequent buffers can
 -- then be passed into ChainedWrite along with the TransferID. Buffers
 -- from the BufferList are written sequentially until the transfer is
 -- complete (transferSize pages have been written). The memory must
 -- belong to the client 'id'.
 -- Raises: invalidHandle, invalidBuffer, writeProtected, invalidOperation
 -- Raises: insufficientResources
 -- Raises: RTOSFile.Error(s)

ReadAsync: PROCEDURE [
 id: ResMgrIDs.ID, fileID: RTOSFile.FileID,
 fileOffset: ResMgrStorage.Pages,
 buffer: ResMgrStorage.BufferList, transferSize: ResMgrStorage.Pages]
 RETURNS [xferId: TransferID];
 -- Inserts read operations in the disk queue. ReadAsync will immediately
 -- return a TransferID that the Client must use to call
 -- WaitForCompletion, when it is time to synchronize. Each buffer in the
 -- BufferList is read sequentially until the transfer is complete
 -- (transferSize pages have been read).
 -- Raises: invalidBuffer, invalidOperation, insufficientResources.
 -- Raises: RTOSFile.Error(s)
```

Copyright © 1992 Xerox Corporation All Rights Reserved

```
ReadSync: PROCEDURE [
 id: ResMgrIDs.ID, fileID: RTOSFile.FileID,
 fileOffset: ResMgrStorage.Pages,
 buffer: ResMgrStorage.BufferList, transferSize: ResMgrStorage.Pages];
 -- Inserts read operations in the disk queue and blocks until the
 -- operation is complete. Each buffer in the BufferList is read
 -- sequentially until the transfer is complete (transferSize pages have
 -- been read).
 -- Raises: invalidBuffer, diskFault, invalidOperation, insufficientResources.
 -- Raises: RTOSFile.Error(s)

WaitForCompletion: PROCEDURE [xferId: TransferID];
 -- Called after ReserveRead, ReadAsync, or WriteAsync. Synchronizes the
 -- client with the disk operation. Read => buffers are filled. Write =>
 -- transfer is complete. The xferId parameter is invalid after
 -- WaitForCompletion returns. For ReserveRead transfers the status will
 -- be returned via the Operation status field and no errors will be raised.
 -- Raises: invalidHandle, diskFault, late, waitAborted.

WriteAsync: PROCEDURE [
 id: ResMgrIDs.ID, freeWhenComplete: BOOLEAN ← TRUE,
 fileID: RTOSFile.FileID, fileOffset: ResMgrStorage.Pages,
 buffer: ResMgrStorage.BufferList, transferSize: ResMgrStorage.Pages]
 RETURNS [xferId: TransferID];
 -- Inserts write operations in the disk queue. WriteAsync will
 -- immediately return a TransferID that the Client must use to call
 -- WaitForCompletion, when it is time to synchronize. Also frees the
 -- memory and deallocates the BufferDescriptors if freeWhenComplete is
 -- TRUE. Each buffer in the BufferList is written sequentially until the
 -- transfer is complete (transferSize pages have been written).
 -- Raises: invalidBuffer, writeProtected, invalidOperation, insufficientResources.
 -- Raises: RTOSFile.Error(s)

WriteSync: PROCEDURE [
 id: ResMgrIDs.ID, freeWhenComplete: BOOLEAN ← TRUE,
 fileID: RTOSFile.FileID, fileOffset: ResMgrStorage.Pages,
 buffer: ResMgrStorage.BufferList, transferSize: ResMgrStorage.Pages];
 -- Inserts write operations in the disk queue and blocks until the
 -- operation is complete. Also frees the memory and deallocates the
 -- BufferDescriptors if freeWhenComplete is TRUE. Each buffer in the
 -- BufferList is written sequentially until the transfer is complete
 -- (transferSize pages have been written).
 -- Raises: invalidBuffer, writeProtected, diskFault, invalidOperation
 -- Raises: insufficientResources.
 -- Raises: RTOSFile.Error(s)

END.
```

Copyright © 1992 Xerox Corporation All Rights Reserved

```
-- File: ResMgrHeap.mesa - last edit:

-- Copyright (C) 1990, 1991 by Xerox Corporation. All rights reserved.

DIRECTORY
 ResMgrStorage USING [BufferList, Pages];

ResMgrHeap: DEFINITIONS =
 BEGIN

 -- This interface must be used exclusively for heaps created here.
 -- You cannot use an UNCOUNTED ZONE from ResMgrHeap with the Heap interface
 -- or vice-versa!

 -- Mesa's NEW and FREE operators should be used to allocate and deallocate nodes from
 -- a ResMgrHeap.


 -- TYPES
 HeapOverhead: TYPE = RECORD [
  normalHeapData,   -- for each call to Create
  normalBlockData,  -- for each call to Create & Expand
  normalNodeData,   -- for each call to NEW (MakeNode)

  uniformHeapData,  -- for each call to CreateUniform
  uniformBlockData, -- for each call to CreateUniform & Expand
  uniformNodeData,  -- for each call to NEW (MakeNode)
  ownerCheckingOvhd: CARDINAL];
        -- for each call to NEW (MakeNode) when ownerChecking = TRUE

 NWords: TYPE = [0..32766]; -- limit on node size
 HeapFullProc: TYPE = PROCEDURE [UNCOUNTED ZONE, ResMgrStorage.Pages];
 Percentage: TYPE = CARDINAL [0..100];

 -- PROCEDURES - CREATING AND DELETING HEAPS

 Create: PROC [
  bl: ResMgrStorage.BufferList, heapFull: HeapFullProc,
  heapFullWarning: HeapFullProc ← NIL, warningThreshold: Percentage ← 0,
  maxSize: ResMgrStorage.Pages,
  ownerChecking: BOOLEAN ← FALSE, checking: BOOLEAN ← FALSE,
  incrementSize: ResMgrStorage.Pages]
  RETURNS [UNCOUNTED ZONE];
 CreateUniform: PROC [
  bl: ResMgrStorage.BufferList, heapFull: HeapFullProc,
  heapFullWarning: HeapFullProc ← NIL, warningThreshold: Percentage ← 0,
  maxSize: ResMgrStorage.Pages, objectSize: NWords,
  ownerChecking: BOOLEAN ← FALSE, checking: BOOLEAN ← FALSE,
  incrementSize: ResMgrStorage.Pages]
  RETURNS [UNCOUNTED ZONE];
```

Copyright © 1992 Xerox Corporation All Rights Reserved

```
 -- Create/CreateUniform must be called with a BufferList that describes a
 -- contiguous block of allocated ResMgr memory (ie. a single
 -- BufferDescriptor). The BufferDescriptor will remain in use by the
 -- ResMgrHeap implementation until the heap is deleted. The inital heap
 -- size will be determined by the size of the allocated buffer. On
 -- attempt to allocate a node from a full heap (MakeNode), the callBack
 -- procedure "heapFull" will be called (if its value is non-NIL. Clients
 -- can induce a callBack when the heap is nearly full; "heapFullWarning"
 -- is called when the heap is "warningThreshold" percent full. The callBack
 -- procedure may call "Expand" to grow the heap, or implement another
 -- recovery option. Clients must supply a value for incrementSize which
 -- will be used to determine how much space should be allocated when
 -- expanding a heap.
 -- Raises ResMgrHeap.Error {invalidBuffer, maxSizeExceeded}

Expand: PROC [z: UNCOUNTED ZONE, bl: ResMgrStorage.BufferList];
 -- Expand must be called with a BufferList that describes allocated
 -- ResMgr memory. The BufferDescriptor will remain in use by the
 -- ResMgrHeap implementation until the heap is deleted or pruned.
 -- Raises ResMgrHeap.Error {invalidBuffer, invalidHeap, maxSizeExceeded}

Prune: PROC [z: UNCOUNTED ZONE] RETURNS [ResMgrStorage.BufferList];
 -- Removes all empty zones from the heap. Returns a BufferList which
 -- describes the freed zones. It is the clients responsibility to
 -- deallocate the ResMgr memory and buffer descriptors.
 -- Raises ResMgrHeap.Error {invalidHeap}


-- PROCEDURES - CREATING AND DELETING NODES - Retained for Compatibility

MakeNode: PROC [z: UNCOUNTED ZONE, n: NWords] RETURNS [p: LONG POINTER];
 -- If heap space is exhausted, the client call back procedure (heapFull)
 -- will be called and followed by a second attempt to create the node.
 -- If the second attempt fails, insufficientSpace is raised. The
 -- heapfull threshold is checked if the first attempt to create the node
 -- is successful. If remaining heap space exceeds the client defined
 -- threshold, the call back procedure (heapFullWarning) is called before
 -- MakeNode returns.
 -- Raises ResMgrHeap.Error {insufficientSpace, invalidParameter}
FreeNode: PROC [z: UNCOUNTED ZONE, p: LONG POINTER];
 -- Raises ResMgrHeap.Error {invalidNode, invalidHeap}


-- PROCEDURES - MISCELLANEOUS

EnumerateZones: PROC [z: UNCOUNTED ZONE]
 RETURNS [ResMgrStorage.BufferList];
 -- Returns a BufferList which describes the buffers that make up the
 -- heap. The bufferDescriptors are linked in "reverse order", with the
 -- initial zone buffer at the end of the chain. NOTE - to delete a heap
```

Copyright © 1992 Xerox Corporation All Rights Reserved

```
 -- the client should deallocate the ResMgr memory and buffer descriptors
 -- that are enumerated.
 -- Raises ResMgrHeap.Error {invalidHeap}
GetAttributes: PROC [z: UNCOUNTED ZONE]
 RETURNS [
  heapPages, maxSize, objectSize, incrementSize, peakSize: ResMgrStorage.Pages,
  ownerChecking, checking: BOOLEAN];
 -- heapPages is the current size of the heap in pages.
 -- maxSize is the maxSize provided by the client at Create-time.
 -- objectSize is the uniform size to be allocated from this heap.
 -- returns zero for objectSize of normal heap.
 -- incrementSize is the number of pages
 -- Raises ResMgrHeap.Error {invalidHeap}
GetOverhead: PROC RETURNS [overhead: HeapOverhead];
 -- provides the overhead values for ResMgrHeaps to aid users in determining
 -- pages required to handle their data and the heap overhead.
 -- Raises no errors.
CheckOwner: PROC [p: LONG POINTER, z: UNCOUNTED ZONE];
 -- Raises ResMgrHeap.Error {invalidNode, invalidOwner}
SetChecking: PROC [z: UNCOUNTED ZONE, checking: BOOLEAN];
 -- Raises ResMgrHeap.Error {invalidHeap}

-- ERRORS

Error: ERROR [type: ErrorType];
ErrorType: TYPE = {insufficientSpace, invalidBuffer, invalidHeap,
 invalidNode, invalidOwner, otherError, invalidParameters, maxSizeExceeded};

END.
```

Copyright © 1992 Xerox Corporation All Rights Reserved

```
-- File: ResMgrIDs.mesa - last edit:

-- Copyright (C) 1987, 1988, 1989, 1990, 1991 by Xerox Corporation. All rights reserved.

DIRECTORY
;

ResMgrIDs: DEFINITIONS = BEGIN

  -- TYPEs
  ID: TYPE = RECORD [trans: TransactionID, module: ModuleID];

  TransactionID: TYPE = {
   background, captureIP, coalesceJob, diagnostics, diskToPrint,
   fontMgr, filing, logging, netInstallRES, pageEdit, scanToDisk,
   tapeInstall, userInteraction};

  ModuleID: TYPE = {
   admin, anonymous, billing, diagMgr, directory, fontFileMgr,
   grayInstall, heap, ics, iipGen, irs, imageInstall, mark, markB, netServe,
   preParse, postParse, printFileMgr, printFileMgrB, rasterDB, ric, rtos, scan,
   streamTape, sysMgt, tem};

  -- ModuleID 'anonymous' gets no memory, but some intermediate priority for
  -- the disk.  This should allow for clients that VM.Alloc their memory and
  -- occansionally use the disk.

  END.
```

Copyright © 1992 Xerox Corporation All Rights Reserved

```
-- File: ResMgrStorage.mesa - last edit:


-- Copyright (C) 1987 by Xerox Corporation. All rights reserved.

DIRECTORY
 Environment USING [bytesPerPage, wordsPerPage];

ResMgrStorage: DEFINITIONS = BEGIN

  -- Constants

  bytesPerPage: CARDINAL = Environment.bytesPerPage;
  wordsPerPage: CARDINAL = Environment.wordsPerPage;

  -- TYPEs

  BufferDescriptor: TYPE = RECORD [
   next: BufferList,
   base: LONG POINTER,          -- Pointer to data; see note below
   allocateSize: Pages,       -- How long current buffer is.
   extendByPages: LONG INTEGER];     -- How many pages to add to buffer

  BufferList: TYPE = LONG POINTER TO BufferDescriptor;

  Pages: TYPE = LONG CARDINAL;


  -- PROCEDUREs

  PagesFromBytes: PROC [bytes: LONG CARDINAL] RETURNS [Pages] = INLINE {
   RETURN[(bytes + bytesPerPage - 1) / bytesPerPage]};

  PagesFromWords: PROCEDURE [words: LONG CARDINAL] RETURNS [Pages] = INLINE {
   RETURN[(words + wordsPerPage - 1) / wordsPerPage]};

  END.
```

Copyright © 1992 Xerox Corporation All Rights Reserved

```
DIRECTORY

 FaultLogger USING [ID],
 RTOSFile USING [FileID, nullID],
 Time USING [Packed];

RMDirectory: DEFINITIONS =
 BEGIN


 maxNameLength: CARDINAL = 32;


 Error: ERROR [code: ErrorCode, faultID: FaultLogger.ID];
 ErrorCode: TYPE = {
  directoryFull, idInUse, nameInUse, nameTooLong, noDirectory, noMoreNames,
  noSuchId, noSuchName, versionMismatch};


 Enumerate: PROCEDURE [name: LONG STRING, next: LONG STRING];


 GetByteLengthForFile: PROCEDURE [name: LONG STRING]
  RETURNS [byteLength: LONG CARDINAL] = INLINE {
  RETURN[byteLength ← GetByteLengthForFileID[IdFromName[name]]]};


 GetByteLengthForFileID: PROCEDURE [id: RTOSFile.FileID]
  RETURNS [byteLength: LONG CARDINAL];


 GetCreateDateForFile: PROCEDURE [name: LONG STRING]
  RETURNS [createDate: Time.Packed] = INLINE {
  RETURN[createDate ← GetCreateDateForFileID[IdFromName[name]]]};


 GetCreateDateForFileID: PROCEDURE [id: RTOSFile.FileID]
  RETURNS [createDate: Time.Packed];


 GetLastWriteDateForFile: PROCEDURE [name: LONG STRING]
  RETURNS [lastWriteDate: Time.Packed] = INLINE {
  RETURN[lastWriteDate ← GetLastWriteDateForFileID[IdFromName[name]]]};


 GetLastWriteDateForFileID: PROCEDURE [id: RTOSFile.FileID]
  RETURNS [lastWriteDate: Time.Packed];
```

Copyright © 1992 Xerox Corporation All Rights Reserved

```
IdFromName: PROCEDURE [name: LONG STRING]
 RETURNS [id: RTOSFile.FileID _ RTOSFile.nullID];

NameFromId: PROCEDURE [name: LONG STRING, id: RTOSFile.FileID];

Register: PROCEDURE [name: LONG STRING, id: RTOSFile.FileID];

RegisterNewID: PROCEDURE [name: LONG STRING, id: RTOSFile.FileID];

SetByteLengthForFile: PROCEDURE [name: LONG STRING, byteLength: LONG CARDINAL]
=
 INLINE {SetByteLengthForFileID[IdFromName[name], byteLength]};

SetByteLengthForFileID: PROCEDURE [
 id: RTOSFile.FileID, byteLength: LONG CARDINAL];

SetCreateDateForFileID: PROCEDURE [
 fileID: RTOSFile.FileID, createDate: Time.Packed];

SetCreateDateForFile: PROCEDURE [name: LONG STRING, createDate: Time.Packed] =
 INLINE {SetCreateDateForFileID[IdFromName[name], createDate]};

SetLastWriteDateForFile: PROCEDURE [
 name: LONG STRING, lastWriteDate: Time.Packed] = INLINE {
 SetLastWriteDateForFileID[IdFromName[name], lastWriteDate]};

SetLastWriteDateForFileID: PROCEDURE [
 id: RTOSFile.FileID, lastWriteDate: Time.Packed];

UnRegister: PROCEDURE [name: LONG STRING];

END.
```

Copyright © 1992 Xerox Corporation All Rights Reserved

```
-- File: RTOSFile.mesa - last edit:

-- Copyright (C) 1987, 1988, 1989, 1990, 1991 by Xerox Corporation. All rights reserved.

DIRECTORY
 FaultLogger USING [ID],
 ResMgrStorage USING [Pages],
 Time USING [Packed];

RTOSFile: DEFINITIONS =
 BEGIN

 -- CONSTANTS
 firstFileType: CARDINAL = ORD[FIRST[FileType]];
 lastFileType: CARDINAL = ORD[LAST[FileType]];
 firstClientType: CARDINAL = ORD[FileType.firstClientType];
 lastClientType: CARDINAL = ORD[FileType.lastClientType];
 firstUserType: CARDINAL = firstFileType;
 lastUserType: CARDINAL = lastClientType;

 -- TYPES

 DiskStatus: TYPE = {available, replacement, failure, notUsed};

 Disk: TYPE = {disk0, disk1, disk2, disk3};

 ErrorType: TYPE = {
  cannotReadFromDisk, cannotWriteToDisk, fileNotExpandable,
  fileTypeInconsistent, insufficientContiguousSpace, invalidChannel,
  invalidLV, invalidPageNumber, invalidParameter, invalidPV,
  invalidThreshold, invalidTrucateSize, invalidUserMemory, noSpace,
  noSpaceInBadPageTable, outOfVAMObjects, tooManyExtensions,
  tooManyLogicalVolumes, unknownFile, unknownPage, diskUnavailable,
  invalidOperation};

 FileID: TYPE[4];

 ScavengeStatus: TYPE = {success, unRecoverable};

 FileType: TYPE = MACHINE DEPENDENT {
  boot(0), germ(1), systemFont(2), systemMerge(3), plmBVEE(4), plmKBD(5),
  plmProg(6), admin(7), config(11), firstClientType(100),
  lastClientType(199), reserved(255)};
 --
 -- NOTE: Clients can allocate file types in the ClientFileType range: [100..199].
 -- CAUTION: File Types < 100 and >= 200 are reserved for the file system.
 -- CAUTION: don't change position of systemFont and config, refer to streamTape
document.
 --
```

Copyright © 1992 Xerox Corporation All Rights Reserved

```
ClientFileType: TYPE = CARDINAL[firstClientType..lastClientType]; -- Client types in this
range.

UserFileType: TYPE = CARDINAL[firstUserType..lastUserType]; -- all valid types.

SystemFileType: TYPE = CARDINAL[firstFileType..lastFileType]; -- All types

SpaceThreshold: TYPE = {onFull, threshold1, threshold2, Threshold3, Threshold4};
<< full    -- noSpace raised on true Disk Full.>>
<< Threshold1 -- noSpace raised on Threshold1 exceeded.>>
<< Threshold2 -- noSpace raised on Threshold2 exceeded.>>
<< Threshold3 -- noSpace raised on Threshold3 exceeded.>>
<< Threshold4 -- noSpace raised on Threshold4 exceeded.>>
<< Each threshold relates to the number of free pages remaining in the volume.
 The thresholds should be assigned with sizes that are acsending in order.>>

LogicalDiskAddr: TYPE = LONG CARDINAL;

LogicalRun: TYPE = RECORD [
 size: CARDINAL,
 diskAddr: LogicalDiskAddr];

NullFileIDRep: PRIVATE TYPE = RECORD [a, b, c, d: CARDINAL];

nullID: FileID = LOOPHOLE[NullFileIDRep[0, 0, 0, 0]];

TotalTable: TYPE = ARRAY[firstFileType..lastFileType] OF ResMgrStorage.Pages;


-- ERRORS and Signals
Error: SIGNAL [errorType: ErrorType, faultID: FaultLogger.ID];

-- PROCEDURES

CompressVolume: PROCEDURE [fileType: UserFileType];
<<Compresses the Logical Volume that contains the specified file type. >>

Create: PROCEDURE [
 fileType: UserFileType, size: ResMgrStorage.Pages,
 replicated, contiguous: BOOLEAN, threshold: SpaceThreshold ← threshold2]
 RETURNS [fileID: FileID];
<<Creates a file of specified size in pages and returns a unique ID which
should be used to access the file. The fileType implies where the file is
to be located. The client can also specify whether the file is contiguous
or non-contiguous, and if multiple copies of the file are required. The
threshold parameter specifies when the "noSpace" error will be raised. The
default is the true noSpace condition. The other thresholds must be set by
the SetThreshold procedure. The file properties default to
eraseProtect:OFF, writeProtect:OFF. Raises Errors: diskUnavailable,
fileTypeInconsistent, insufficientContiguousSpace, noSpace,
```

Copyright © 1992 Xerox Corporation All Rights Reserved

```
Delete: PROCEDURE [fileID: FileID];
<<Deletes the specified file. Raises Errors: diskUnavailable, invalidLV, and
unknownFile.>>

DeleteFilesOfFileType: PROCEDURE [fileType: UserFileType];
<<Deletes all the files of specified fileType. Raises Errors:
diskUnavailable, and fileTypeInconsistent.>>

Extend: PROCEDURE [
 fileID: FileID, nPagesToExtendBy: ResMgrStorage.Pages,
 threshold: SpaceThreshold ← threshold2];
<<Extends the file by specified file size in pages. Contiguous files
cannot be extended. A file can only be extended upto specified number of
non-contiguous runs. The threshold parameter specifies when the "noSpace"
error will be raised. The default is the true noSpace condition. The other
thresholds must be set by the SetThreshold procedure. Raises Errors:
diskUnavailable, fileNotExpandable, invalidLV, noSpace, outOfVAMObjects,
tooManyExtensions, unknownFile.>>

EnumerateFiles: PROCEDURE [
 action: PROCEDURE [fileID: FileID] RETURNS[done: BOOLEAN]];
<<Enumerates all files on the disk. Raises Errors: diskUnavailable. The
"done" return parameter will terminate the enumeration when TRUE. Raises
Errors: diskUnavailable>>

EnumerateFilesOfFileType: PROCEDURE [
 fileType: SystemFileType, action: PROCEDURE [fileID:FileID] RETURNS[done:
BOOLEAN]];
<<Enumerates all files of the specified fileType. The "done" return
parameter will terminate the enumeration when TRUE. Raises Errors:
diskUnavailable, and fileTypeInconsistent.>>

GetDiskStatus: PROCEDURE [disk: Disk]
 RETURNS [status: DiskStatus];
<<Gets the status of the specified disk.>>


<< NOTE: The comments for the following four procedures use the terms
logical size and physical size. Logical size refers to the amount of space,
in pages, that is actually available to the client in the file. Physical size
is the entire amount of disk space that the file takes up, including file
system overhead. >>

GetFileInfo: PROCEDURE [
 fileID: FileID, volumeName: LONG STRING]
 RETURNS [
  allocateDate: Time.Packed, size: ResMgrStorage.Pages,
  fileType: SystemFileType,
  contiguous, replicated, eraseProtected: BOOLEAN,
```

Copyright © 1992 Xerox Corporation All Rights Reserved contiguous or non-contiguous, file is replicated or not, whether the file is erase protected or not, and logical disk address of the file.

NOTE: For a superdisk file, the logical file size may be greater than the size requested in the create, and the desired size after extends, and truncates.

Raises Error: diskUnavailable, invalidLV, and unknownFile.>>

GetSizeOfFileType: PROCEDURE [fileType: SystemFileType]
 RETURNS[pagesUsed: ResMgrStorage.Pages];
<<Procedure Returns the total number of pages being used by the specified fileType. This is the actual (physical) number of pages used by the fileType.
Raises Errors: diskUnavailable, and fileTypeInconsistent.>>

GetTotalsForFileTypes: PROCEDURE [totalTable: LONG POINTER TO TotalTable];
<<Procedure Returns the total number of pages being used by each fileType. The totals are the actual (physical) number of pages used by each file type in the user volume.
Raises Errors: diskUnavailable.>>

GetVolumeInfo: PROCEDURE [fileType: SystemFileType]
 RETURNS [sizeInPages, freePageCount: ResMgrStorage.Pages];
<< Returns information about the Logical Volume that contains the specified file type. sizeInPages and freePageCount are physical sizes. >>

MigrateToReplacedDisks: PROCEDURE [];
<< Initiates Migrate for New Disk Install. All Superdisk files are deleted. Replicated files are rebuilt from an available disk.>>

RestoreCriticalFiles: PROCEDURE [disk: Disk];
<<Copies replicated files to the specified disk.>>

ScavengeFile: PROCEDURE [fileID: FileID] RETURNS [status: ScavengeStatus];
<<This procedure will use all the utlities at the file systems disposal to repair the file specified by fileID. The time to scavenge the file will depend on the size, and the number of retries necessary to recover the data. Raises Error: diskUnavailable, invalidLV, and unknownFile.>>

SetEraseProtect: PROCEDURE [fileID: FileID, eraseProtect: BOOLEAN];
<<Sets the eraseProtect Flag. Files with eraseProtect set will not be deleted when EraseFiles is called. Raises Error: diskUnavailable, invalidLV, and unknownFile.>>

SetFileType: PROCEDURE [fileID: FileID, fileType: UserFileType];
<<Sets the fileType attribute for this file. Raises Error: diskUnavailable, invalidLV, and unknownFile.>>

SetThreshold: PROCEDURE [

Copyright © 1992 Xerox Corporation All Rights Reserved fileType: UserFileType, threshold: SpaceThreshold, size: ResMgrStorage.Pages];
<< Sets the free space thresholds for for The Logical Volume implied by fileType. Raises Error[s]: invalidThreshold, invalidLV >>

Truncate: PROCEDURE [fileID: FileID, size: ResMgrStorage.Pages];
<<Truncates the file to the specified size in pages. Raises Error: diskUnavailable, invalidLV, invalidTrucateSize, outOfVAMObjects, and unknownFile.>>

END.

Copyright © 1992 Xerox Corporation All Rights Reserved

```
DIRECTORY
 RTOSMP2PrincOps: TYPE USING [CacheID, MesaID, MpuID];

RTOSMP2Process: DEFINITIONS =
 BEGIN

 CacheID: TYPE = RTOSMP2PrincOps.CacheID;
 MesaID: TYPE = RTOSMP2PrincOps.MesaID;
 MpuID: TYPE = RTOSMP2PrincOps.MpuID;


 ErrorCode: TYPE = {invalidChannel, invalidProcess, illegalProcess};
 Error: ERROR [code: ErrorCode];

 ChannelCount: PROC RETURNS [NAT];

 ChannelStatus: PROC [channel: MesaID] RETURNS [exists, restricted: BOOL];

 RestrictChannel: PROC [channel: MesaID];

 UnrestrictChannel: PROC [channel: MesaID];

 ProcessStatus: PROC [process: PROCESS]
  RETURNS [valid, directed: BOOL, channel: MesaID];

 DirectProcess: PROC [process: PROCESS, channel: MesaID];

 UndirectProcess: PROC [process: PROCESS];

 END.
```

Copyright © 1992 Xerox Corporation All Rights Reserved

```
-- File: RTOSOutload.mesa - last edit:

-- Copyright (C) 1991 by Xerox Corporation. All rights reserved.

DIRECTORY
 Space USING [Interval];

RTOSOutload: DEFINITIONS = BEGIN

 -- TYPES
 VMInterval: TYPE = Space.Interval;

 -- PROCEDURES
 Include: PROCEDURE [interval: VMInterval];
  -- Adds the range of virtual memory defined by 'interval' to the virtual
  -- memory that will be included in the outload.

 Exclude: PROCEDURE [interval: VMInterval];
  -- Removes the range of virtual memory defined by 'interval' from the virtual
  -- memory that will be included in the outload.

 END...
```

Copyright © 1992 Xerox Corporation All Rights Reserved

```
DIRECTORY
 File USING [File, PageCount],
 System USING [GreenwichMeanTime];

Runtime: DEFINITIONS =
 BEGIN

 ControlLink: TYPE = LONG UNSPECIFIED;
 GenericProgram: TYPE = LONG UNSPECIFIED;

 GlobalFrame: PROCEDURE [link: ControlLink] RETURNS [PROGRAM];
 LoadConfig: PROCEDURE [
  file: File.File, offset: File.PageCount, codeLinks: BOOLEAN ← FALSE]
  RETURNS [PROGRAM];
 NewConfig: PROCEDURE [
  file: File.File, offset: File.PageCount, codeLinks: BOOLEAN ← FALSE];
 RunConfig: PROCEDURE [
  file: File.File, offset: File.PageCount, codeLinks: BOOLEAN ← FALSE];
 UnNewConfig: PROCEDURE [link: ControlLink];
 UnNew: PROCEDURE [frame: PROGRAM];
 VersionMismatch: SIGNAL [module: LONG STRING];

 SelfDestruct: PROCEDURE;

 nullProgram, NullProgram: PROGRAM = NIL;
 ValidateGlobalFrame: PROCEDURE [frame: GenericProgram];
 InvalidGlobalFrame: ERROR [frame: GenericProgram];
 ValidateFrame: PROCEDURE [frame: UNSPECIFIED];
 InvalidFrame: ERROR [frame: UNSPECIFIED];


 CallDebugger: PROCEDURE [LONG STRING];
 Interrupt: PROCEDURE [];


 GetBcdTime: PROCEDURE RETURNS [System.GreenwichMeanTime];
 GetBuildTime: PROCEDURE RETURNS [System.GreenwichMeanTime];
 GetCaller: PROCEDURE RETURNS [PROGRAM];


 GetTableBase: PROCEDURE [frame: PROGRAM] RETURNS [LONG POINTER];


 IsBound: PROCEDURE [link: ControlLink] RETURNS [BOOLEAN];


 BoundsFault: SIGNAL;
 ConfigError: ERROR [type: ConfigErrorType];
 ConfigErrorType: TYPE = {
```

Copyright © 1992 Xerox Corporation All Rights Reserved

```
 badCode, exportedTypeClash, invalidConfig, missingCode, unknown};
ControlFault: SIGNAL [source: ControlLink];
DivideCheck: SIGNAL;
LinkageFault: ERROR;
NarrowFault: ERROR;
PointerFault: SIGNAL;
PortFault: ERROR;
StartFault: ERROR [dest: PROGRAM];
UnboundProcedure: SIGNAL [dest: ControlLink];
ZeroDivisor: SIGNAL;

END.
```

Copyright © 1992 Xerox Corporation All Rights Reserved

```
-- File: ServCoalesce.mesa - last edit:

-- Copyright (C) 1989 by Xerox Corporation. All rights reserved.

DIRECTORY
  Font USING [FontID],
  SMStep USING [StepType];

ServCoalesce: DEFINITIONS =

BEGIN << ServCoalesce >>

  -- TYPES
  FontSub: TYPE = RECORD [
    fontName: LONG STRING,
    subFont: Font.FontID];

  FontSubList: TYPE = LONG DESCRIPTOR FOR ARRAY CARDINAL OF FontSub;

  Parms: TYPE = RECORD [
    fontList: FontSubList];

  ParmsHandle: TYPE = LONG POINTER TO Parms ← NIL;

  -- CONSTANTS
  coalesceStep: SMStep.StepType = ['C, 's];

END. << ServCoalesce >>
```

Copyright © 1992 Xerox Corporation All Rights Reserved

```
DIRECTORY
 DecomposerCommon USING [ImagingProperties],
 FEPrint USING [BinderSwitchOptions, LeadEdgeScreenSetting, ResultType],
 IOTTypes USING [Feeder],
 JobID USING [ID],
 MarkerSystemControl USING [
  Action, ComplexityParams, FeatureType, IOTPropertiesPtr],
 PublicPrinting USING [Finishing, MediumDimensions];

SMMark: DEFINITIONS =

 BEGIN

 FinishingArray: TYPE = LONG DESCRIPTOR FOR FinishingLimits;

 FinishingLimits: TYPE = ARRAY PublicPrinting.Finishing OF ARRAY PaperWeight OF
  FinisherLimit;

 FinisherLimit: TYPE = RECORD [
  minNumSheets: CARDINAL, maxCollated: CARDINAL, maxUncollated: CARDINAL];

 PaperWeight: TYPE = {light, normal};

 AdjustBinderTape: PROCEDURE [length: CARDINAL] RETURNS [successful: BOOLEAN];


 AutoBinderControl: PROCEDURE [on: BOOLEAN];


 BinderControl: PROCEDURE [modeSwitch: FEPrint.BinderSwitchOptions]
  RETURNS [result: FEPrint.ResultType];


 FeederControl: PROCEDURE [
  feeder: IOTTypes.Feeder, action: MarkerSystemControl.Action _ select]
  RETURNS [result: FEPrint.ResultType];


 GetComplexityParams: PROCEDURE []
  RETURNS [cp: MarkerSystemControl.ComplexityParams];


 GetImagingProperties: PROCEDURE [
  mediumDimensions: PublicPrinting.MediumDimensions]
  RETURNS [imagingProps: DecomposerCommon.ImagingProperties];
```

Copyright © 1992 Xerox Corporation All Rights Reserved

```
GetIOTProperties: PROCEDURE [z: UNCOUNTED ZONE]
 RETURNS [iot: MarkerSystemControl.IOTPropertiesPtr];


GetFinishingLimits: PROCEDURE [z: UNCOUNTED ZONE]
 RETURNS [limits: FinishingArray];


PrintOptionsOpen: PROCEDURE [] RETURNS [ok: BOOLEAN];


SamplePrint: PROCEDURE [] RETURNS [result: FEPrint.ResultType];


SetFeature: PROCEDURE [
 feature: MarkerSystemControl.FeatureType, disabled: BOOLEAN]
 RETURNS [result: FEPrint.ResultType];


SetLeadEdgeScreen: PROCEDURE [setting: FEPrint.LeadEdgeScreenSetting]
 RETURNS [result: FEPrint.ResultType];


SetJobDarkness: PROCEDURE [coarse: CARDINAL, fine: CARDINAL, id: JobID.ID]
 RETURNS [result: FEPrint.ResultType];

SetPaperSizeCheckEnabled: PROCEDURE [feeder: IOTTypes.Feeder, enabled: BOOLEAN];

SetSystemDarkness: PROCEDURE [coarse: CARDINAL, fine: CARDINAL, id: JobID.ID]
 RETURNS [result: FEPrint.ResultType];


UnloadStacker: PROCEDURE [] RETURNS [result: FEPrint.ResultType];

END.
```

Copyright © 1992 Xerox Corporation All Rights Reserved

```
DIRECTORY
 DirectoryType USING [OperatorAccess],
 JobBackUp USING [LockID],
 JobID USING [ID],
 JobQ USING [CreateDateOption, Disposition, JobReference, Priority],
 MRSignature USING [defaultTrimSizeX, defaultTrimSizeY, TrimSizeX, TrimSizeY],
 PublicPrinting USING [
  Finishing, Formatter, InternalMedia, MediumDimensions, PagesToPrint, Plex,
  Printer, Spooler, Status],
 RTOSFile USING [FileID, nullID],
 ServPreParse USING [DefaultRecord],
 System USING [GreenwichMeanTime],
 UserProfile USING [DefaultJobAccess];


SMNetSupport: DEFINITIONS =

 BEGIN

 JobParms: TYPE = RECORD [
  access: UserProfile.DefaultJobAccess ← [[all[]], [all[]]],
  accountNum: LONG STRING ← NIL,
  copyCount: CARDINAL ← 1,
  createDate: System.GreenwichMeanTime,
  defaulted: ServPreParse.DefaultRecord ← [
   copyCount: TRUE, jobCreateDate: TRUE, jobName: TRUE, medium: TRUE,
   message: TRUE, pagesToPrint: TRUE, plex: TRUE, priority: TRUE,
   recipientName: TRUE, senderName: TRUE, staple: TRUE],
  finishing: PublicPrinting.Finishing ← sampleTray,
  ipFileID: RTOSFile.FileID ← RTOSFile.nullID,
  jobName: LONG STRING ← NIL,
  media: PublicPrinting.InternalMedia ← DESCRIPTOR[NIL, 0],
  message: LONG STRING ← NIL,
  owner: LONG STRING ← NIL,
  pagesToPrint: PublicPrinting.PagesToPrint ← [var: range[[1, LAST[CARDINAL]]]],
  plex: PublicPrinting.Plex ← simplex,
  priority: JobQ.Priority ← medium,
  recipientName: LONG STRING ← NIL,
  senderName: LONG STRING ← NIL];


 JobParmsPtr: TYPE = LONG POINTER TO JobParms;

 OtherOption: TYPE = RECORD [
  name: LONG STRING, data: LONG DESCRIPTOR FOR ARRAY CARDINAL OF CARDINAL];

 PreParseOptionsType: TYPE = {
  copyCount, collated, docComment, docCreateDate, docCreator, docEndMessage,
  docName, docStartMessage, finishing, finishingMessage, jobAccount,
```

Copyright © 1992 Xerox Corporation All Rights Reserved

```
jobAcquireAccess, jobComment, jobEndMessage, jobModifyAccess, jobName,
jobOwner, jobPriority, jobStartMessage, recipientName, senderName, signature,
slipSheet, other};

PreParseOptions: TYPE = LONG DESCRIPTOR FOR ARRAY CARDINAL OF
 PreParseOptionsChoice;

PreParseOptionsChoice: TYPE = RECORD [
 SELECT tag: PreParseOptionsType FROM
 copyCount => [copyCount: CARDINAL ← 1],
 collated => [collated: BOOLEAN ← TRUE],
 docComment => [docComment: LONG STRING ← NIL],
 docCreateDate => [docCreateDate: JobQ.CreateDateOption],
 docCreator => [docCreator: LONG STRING ← NIL],
 docEndMessage => [docEndMessage: LONG STRING ← NIL],
 docName => [docName: LONG STRING ← NIL],
 docStartMessage => [docStartMessage: LONG STRING ← NIL],
 finishing => [finishing: PublicPrinting.Finishing ← none],
 finishingMessage => [finishingMessage: LONG STRING ← NIL],
 jobAccount => [jobAccount: LONG STRING ← NIL],
 jobAcquireAccess => [jobAcquireAccess: DirectoryType.OperatorAccess],
 jobComment => [jobComment: LONG STRING ← NIL],
 jobEndMessage => [jobEndMessage: LONG STRING ← NIL],
 jobModifyAccess => [jobModifyAccess: DirectoryType.OperatorAccess],
 jobName => [jobName: LONG STRING ← NIL],
 jobOwner => [jobOwner: LONG STRING ← NIL],
 jobPriority => [priority: JobQ.Priority ← medium],
 jobStartMessage => [jobStartMessage: LONG STRING ← NIL],
 recipientName => [recipientName: LONG STRING ← NIL],
 senderName => [senderName: LONG STRING ← NIL],
 signature => [
  trimSizeX: MRSignature.TrimSizeX ← MRSignature.defaultTrimSizeX,
  trimSizeY: MRSignature.TrimSizeY ← MRSignature.defaultTrimSizeY],
 slipSheet => [dimensions: PublicPrinting.MediumDimensions],
 other => [otherOption: OtherOption],
 ENDCASE];

PrinterProperties: TYPE = RECORD [
 media: PublicPrinting.InternalMedia ← DESCRIPTOR[NIL, 0],
 staple: BOOLEAN ← FALSE,
 twoSided: BOOLEAN ← FALSE];

PrinterStatus: TYPE = RECORD [
 postParser: PublicPrinting.Formatter ← available,
 media: PublicPrinting.InternalMedia ← DESCRIPTOR[NIL, 0],
 printer: PublicPrinting.Printer ← available,
 spooler: PublicPrinting.Spooler ← available];
```

Copyright © 1992 Xerox Corporation All Rights Reserved

```
Error: SIGNAL [code: ErrorCode];

ErrorCode: TYPE = {
 mediumUnavailable, invalidPrintParameters, systemError, spare1, spare2};


GetPrinterProperties: PROCEDURE [z: UNCOUNTED ZONE]
 RETURNS [properties: PrinterProperties];


GetPrinterStatus: PROCEDURE [z: UNCOUNTED ZONE] RETURNS [status: PrinterStatus];


GetPrintRequestStatus: PROCEDURE [requestID: JobID.ID]
 RETURNS [status: PublicPrinting.Status];


PreParseParmsReady: PROCEDURE [
 disposition: JobQ.Disposition, preParseOptions: PreParseOptions,
 jobReference: JobQ.JobReference, lockID: JobBackUp.LockID];


Print: PROCEDURE [jobParms: JobParmsPtr] RETURNS [printRequestID: JobID.ID];


END.
```

Copyright © 1992 Xerox Corporation All Rights Reserved

```
DIRECTORY
 JobBackUp USING [LockID];

SMStep: DEFINITIONS =
 BEGIN


 ErrorCode: TYPE = {nilHandle};


 ParmsHandle: TYPE = LONG POINTER;


 StepParmsHandle: TYPE [2];


 StepRecord: TYPE = RECORD [parms: StepParmsHandle, type: StepType];


 StepType: TYPE = PACKED ARRAY [0..2) OF CHARACTER;


 nullStepParmsHandle: StepParmsHandle = LOOPHOLE[LONG[0]];


 Error: ERROR [code: ErrorCode];


 CreateStep: PROCEDURE [
  lockID: JobBackUp.LockID, stepType: StepType, parmsHandle: ParmsHandle]
  RETURNS [stepRecord: StepRecord];


 FreeParmsHandle: PROCEDURE [stepType: StepType, parmsHandle: ParmsHandle];


 GetStepParms: PROCEDURE [lockID: JobBackUp.LockID, stepRecord: StepRecord]
  RETURNS [parmsHandle: ParmsHandle];

 END.
```

Copyright © 1992 Xerox Corporation All Rights Reserved

```
DIRECTORY;

SSCRollover: DEFINITIONS =
 BEGIN

 WaitForRoll: PROCEDURE [];

 END.
```

Copyright © 1992 Xerox Corporation All Rights Reserved

```
DIRECTORY
 Environment USING [Block, Byte, Word];

Stream: DEFINITIONS =
 BEGIN

 Handle: TYPE = LONG POINTER TO Object;
 Byte: TYPE = Environment.Byte;
 Word: TYPE = Environment.Word;
 SubSequenceType: TYPE = [0..256);
 Block: TYPE = Environment.Block;
 InputOptions: TYPE = RECORD [
  terminateOnEndRecord: BOOLEAN ← FALSE,
  signalLongBlock: BOOLEAN ← FALSE,
  signalShortBlock: BOOLEAN ← FALSE,
  signalSSTChange: BOOLEAN ← FALSE,
  signalEndOfStream: BOOLEAN ← FALSE,
  signalAttention: BOOLEAN ← FALSE,
  signalTimeout: BOOLEAN ← TRUE,
  signalEndRecord: BOOLEAN ← FALSE];
 defaultInputOptions: InputOptions = [];
 CompletionCode: TYPE = {
  normal, endRecord, sstChange, endOfStream, attention, timeout};
 Position: TYPE = LONG CARDINAL;
 Milliseconds: TYPE = LONG CARDINAL;

 GetByte: PROCEDURE [sH: Handle] RETURNS [byte: Byte] = INLINE {
  RETURN[sH.getByte[sH]]};
 GetChar: PROCEDURE [sH: Handle] RETURNS [char: CHARACTER] = INLINE {
  RETURN[LOOPHOLE[sH.getByte[sH]]]};
 GetWord: PROCEDURE [sH: Handle] RETURNS [word: Word] = INLINE {
  RETURN[sH.getWord[sH]]};
 GetBlock: PROCEDURE [sH: Handle, block: Block]
  RETURNS [
   bytesTransferred: CARDINAL, why: CompletionCode, sst: SubSequenceType] =
  INLINE {[bytesTransferred, why, sst] ← sH.get[sH, block, sH.options]};

 SetInputOptions: PROCEDURE [sH: Handle, options: InputOptions] = INLINE {
  sH.options ← options};

 PutByte: PROCEDURE [sH: Handle, byte: Byte] = INLINE {sH.putByte[sH, byte]};
 PutChar: PROCEDURE [sH: Handle, char: CHARACTER] = INLINE {
  sH.putByte[sH, LOOPHOLE[char]]};
 PutWord: PROCEDURE [sH: Handle, word: Word] = INLINE {sH.putWord[sH, word]};
 PutBlock: PROCEDURE [sH: Handle, block: Block, endRecord: BOOLEAN ← FALSE] =
  INLINE {sH.put[sH, block, endRecord]};
 PutString: PROCEDURE [
  sH: Handle, string: LONG STRING, endRecord: BOOLEAN ← FALSE] = INLINE
  BEGIN
```

Copyright © 1992 Xerox Corporation All Rights Reserved

```
 block: Block = [LOOPHOLE[@string.text], 0, string.length];
 sH.put[sH, block, endRecord];
 END;

SendNow: PROCEDURE [sH: Handle, endRecord: BOOLEAN ← TRUE] = INLINE {
 sH.sendNow[sH, endRecord]};

SetSST: PROCEDURE [sH: Handle, sst: SubSequenceType] = INLINE {
 sH.setSST[sH, sst]};

SendAttention: PROCEDURE [sH: Handle, byte: Byte] = INLINE {
 sH.sendAttention[sH, byte]};

WaitForAttention: PROCEDURE [sH: Handle] RETURNS [Byte] = INLINE {
 RETURN[sH.waitAttention[sH]]};

Delete: PROCEDURE [sH: Handle] = INLINE {sH.delete[sH]};

GetPosition: PROCEDURE [sH: Handle] RETURNS [position: Position] = INLINE {
 RETURN[sH.getPosition[sH]]};
SetPosition: PROCEDURE [sH: Handle, position: Position] = INLINE {
 sH.setPosition[sH, position]};
Attention: SIGNAL [nextIndex: CARDINAL];
EndOfStream: SIGNAL [nextIndex: CARDINAL];
LongBlock: SIGNAL [nextIndex: CARDINAL];
ShortBlock: ERROR;
SSTChange: SIGNAL [sst: SubSequenceType, nextIndex: CARDINAL];
TimeOut: SIGNAL [nextIndex: CARDINAL];
InvalidOperation: ERROR;
EndRecord: SIGNAL [nextIndex: CARDINAL];

Object: TYPE = RECORD [
 options: InputOptions,
 getByte: GetByteProcedure,
 putByte: PutByteProcedure,
 getWord: GetWordProcedure,
 putWord: PutWordProcedure,
 get: GetProcedure,
 put: PutProcedure,
 setSST: SetSSTProcedure,
 sendAttention: SendAttentionProcedure,
 waitAttention: WaitAttentionProcedure,
 delete: DeleteProcedure,
 getPosition: GetPositionProcedure,
 setPosition: SetPositionProcedure,
 sendNow: SendNowProcedure,
 clientData: LONG POINTER,
 getSST: GetSSTProcedure,
 getTimeout: GetTimeoutProcedure,
 setTimeout: SetTimeoutProcedure];
```

Copyright © 1992 Xerox Corporation All Rights Reserved

```
GetByteProcedure: TYPE = PROCEDURE [sH: Handle] RETURNS [byte: Byte];
PutByteProcedure: TYPE = PROCEDURE [sH: Handle, byte: Byte];
GetWordProcedure: TYPE = PROCEDURE [sH: Handle] RETURNS [word: Word];
PutWordProcedure: TYPE = PROCEDURE [sH: Handle, word: Word];
GetProcedure: TYPE = PROCEDURE [sH: Handle, block: Block, options: InputOptions]
 RETURNS [
  bytesTransferred: CARDINAL, why: CompletionCode, sst: SubSequenceType];
PutProcedure: TYPE = PROCEDURE [sH: Handle, block: Block, endRecord: BOOLEAN];
SetSSTProcedure: TYPE = PROCEDURE [sH: Handle, sst: SubSequenceType];
SendAttentionProcedure: TYPE = PROCEDURE [sH: Handle, byte: Byte];
WaitAttentionProcedure: TYPE = PROCEDURE [sH: Handle] RETURNS [Byte];
DeleteProcedure: TYPE = PROCEDURE [sH: Handle];
GetPositionProcedure: TYPE = PROCEDURE [sH: Handle]
 RETURNS [position: Position];
SetPositionProcedure: TYPE = PROCEDURE [sH: Handle, position: Position];
SendNowProcedure: TYPE = PROCEDURE [sH: Handle, endRecord: BOOLEAN];
GetSSTProcedure: TYPE = PROCEDURE [sH: Handle] RETURNS [sst: SubSequenceType];
GetTimeoutProcedure: TYPE = PROCEDURE [sH: Handle]
 RETURNS [waitTime: Milliseconds];
SetTimeoutProcedure: TYPE = PROCEDURE [sH: Handle, waitTime: Milliseconds];

defaultObject: READONLY Object;
END.
```

Copyright © 1992 Xerox Corporation All Rights Reserved

```
DIRECTORY
 JobBackUp USING [LockID],
 JobID USING [ID],
 JobStep USING [StepHandle];

StreamScheduler: DEFINITIONS =

 BEGIN
```

Copyright © 1992 Xerox Corporation All Rights Reserved

```
  nullHandleRep: MACHINE DEPENDENT RECORD [a, b, c: WORD] = [0, 0,
0];

 nullHandle: Handle = LOOPHOLE[nullHandleRep];


 Buffer: TYPE = CARDINAL [0..2];

 ErrorCode: TYPE = {
  invalidService, nilHandle, stepNotFound, tooManyStepsRunning};

 Handle: TYPE [3];

 StepHandle: TYPE = JobStep.StepHandle;


 Error: SIGNAL [code: ErrorCode];


 GetHandle: PROCEDURE [
  lockID: JobBackUp.LockID, jobID: JobID.ID, step: StepHandle]
  RETURNS [handle: Handle];

 GetServiceRate: PROCEDURE [handle: Handle] RETURNS [ppm:
CARDINAL];

 MonitorService: PROCEDURE [lockID: JobBackUp.LockID, handle: Handle];

 ReturnStreamHandle: PROCEDURE [
  lockID: JobBackUp.LockID, handlePtr: LONG POINTER TO Handle];

 StepComplete: PROCEDURE [
  lockID: JobBackUp.LockID, handlePtr: LONG POINTER TO Handle,
  faulted: BOOLEAN];
```

Copyright © 1992 Xerox Corporation All Rights Reserved

```
DIRECTORY
 Environment USING [
  bitsPerCharacter, charsPerPage, charsPerWord, logCharsPerPage];

String: DEFINITIONS =
 BEGIN

 bitsPerCharacter: CARDINAL = Environment.bitsPerCharacter;
 charsPerPage: CARDINAL = Environment.charsPerPage;
 charsPerWord: CARDINAL = Environment.charsPerWord;
 logCharsPerPage: CARDINAL = Environment.logCharsPerPage;

 SubStringDescriptor: TYPE = RECORD [
  base: LONG STRING, offset, length: CARDINAL];

 SubString: TYPE = LONG POINTER TO SubStringDescriptor;

 Overflow: SIGNAL;
 InvalidNumber: SIGNAL;
 StringBoundsFault: SIGNAL [s: LONG STRING] RETURNS [ns: LONG STRING];

 Length: PROCEDURE [s: LONG STRING] RETURNS [CARDINAL] = INLINE {
  RETURN[IF s = NIL THEN 0 ELSE s.length]};

 Empty: PROCEDURE [s: LONG STRING] RETURNS [BOOLEAN] = INLINE {
  RETURN[s = NIL OR s.length = 0]};

 WordsForString: PROCEDURE [nchars: CARDINAL] RETURNS [CARDINAL] = INLINE {
  RETURN[SIZE[StringBody [nchars]]]};

 AppendChar: PROCEDURE [s: LONG STRING, c: CHARACTER];
 AppendString: PROCEDURE [to: LONG STRING, from: LONG STRING];

 Copy: PROCEDURE [to, from: LONG STRING];

 Equal, Equivalent: PROCEDURE [s1, s2: LONG STRING] RETURNS [BOOLEAN];

 Compare: PROCEDURE [s1, s2: LONG STRING, ignoreCase: BOOLEAN ← TRUE]
  RETURNS [INTEGER];
 AppendSubString: PROCEDURE [to: LONG STRING, from: SubString];

 EqualSubString, EquivalentSubString: PROCEDURE [s1, s2: SubString]
  RETURNS [BOOLEAN];

 DeleteSubString: PROCEDURE [s: SubString];

 UpperCase, LowerCase: PROCEDURE [c: CHARACTER] RETURNS [CHARACTER];
```

Copyright © 1992 Xerox Corporation All Rights Reserved

```
StringToNumber: PROCEDURE [s: LONG STRING, radix: CARDINAL ← 10]
 RETURNS [UNSPECIFIED];

StringToDecimal: PROCEDURE [s: LONG STRING] RETURNS [INTEGER] = INLINE
 BEGIN RETURN[StringToNumber[s, 10]] END;
StringToOctal: PROCEDURE [s: LONG STRING] RETURNS [UNSPECIFIED] = INLINE
 BEGIN RETURN[StringToNumber[s, 8]]; END;

StringToLongNumber: PROCEDURE [s: LONG STRING, radix: CARDINAL ← 10]
 RETURNS [LONG UNSPECIFIED];

AppendNumber: PROCEDURE [s: LONG STRING, n: UNSPECIFIED, radix: CARDINAL ← 10];
AppendDecimal: PROCEDURE [s: LONG STRING, n: INTEGER];
AppendOctal: PROCEDURE [s: LONG STRING, n: UNSPECIFIED];

AppendLongNumber: PROCEDURE [
 s: LONG STRING, n: LONG UNSPECIFIED, radix: CARDINAL ← 10];
AppendLongDecimal: PROCEDURE [s: LONG STRING, n: LONG INTEGER];


MakeString: PROCEDURE [z: UNCOUNTED ZONE, maxlength: CARDINAL]
 RETURNS [LONG STRING] = INLINE {RETURN[z.NEW[StringBody [maxlength]]]};
MakeMDSString: PROCEDURE [z: MDSZone, maxlength: CARDINAL] RETURNS [STRING]
=
 INLINE {RETURN[z.NEW[StringBody [maxlength]]]};
FreeString: PROCEDURE [z: UNCOUNTED ZONE, s: LONG STRING] = INLINE {z.FREE[@s]};
FreeMDSString: PROCEDURE [z: MDSZone, s: STRING] = INLINE {z.FREE[@s]};
AppendCharAndGrow: PROC [
 to: LONG POINTER TO LONG STRING, c: CHARACTER, z: UNCOUNTED ZONE];
AppendExtensionIfNeeded: PROC [
 to: LONG POINTER TO LONG STRING, extension: LONG STRING, z: UNCOUNTED ZONE]
 RETURNS [BOOLEAN];
AppendStringAndGrow: PROC [
 to: LONG POINTER TO LONG STRING, from: LONG STRING, z: UNCOUNTED ZONE,
 extra: CARDINAL ← 0];
Replace: PROC [
 to: LONG POINTER TO LONG STRING, from: LONG STRING, z: UNCOUNTED ZONE];

CopyToNewString: PROCEDURE [
 s: LONG STRING, z: UNCOUNTED ZONE, longer: CARDINAL ← 0]
 RETURNS [newS: LONG STRING];
ExpandString: PROCEDURE [
 s: LONG POINTER TO LONG STRING, longer: CARDINAL, z: UNCOUNTED ZONE];


StringLength: PROCEDURE [s: LONG STRING] RETURNS [CARDINAL] = INLINE {
 RETURN[Length[s]]};

EmptyString: PROCEDURE [s: LONG STRING] RETURNS [BOOLEAN] = INLINE {
 RETURN[Empty[s]]};
```

Copyright © 1992 Xerox Corporation All Rights Reserved

```
EqualString, EqualStrings: PROCEDURE [s1, s2: LONG STRING] RETURNS [BOOLEAN] =
 INLINE {RETURN[Equal[s1, s2]]};

EquivalentString, EquivalentStrings: PROCEDURE [s1, s2: LONG STRING]
 RETURNS [BOOLEAN] = INLINE {RETURN[Equivalent[s1, s2]]};

CompareStrings: PROCEDURE [s1, s2: LONG STRING, ignoreCase: BOOLEAN ← TRUE]
 RETURNS [INTEGER] = INLINE {RETURN[Compare[s1, s2, ignoreCase]]};

EqualSubStrings: PROCEDURE [s1, s2: SubString] RETURNS [BOOLEAN] = INLINE {
 RETURN[EqualSubString[s1, s2]]};
EquivalentSubStrings: PROCEDURE [s1, s2: SubString] RETURNS [BOOLEAN] = INLINE {
 RETURN[EquivalentSubString[s1, s2]]};

END.
```

Copyright © 1992 Xerox Corporation All Rights Reserved

```
-- File: StringSort.mesa -

-- Copyright (C) 1989 by Elizabeth Bennett & Xerox Corp. All rights reserved.

DIRECTORY
  String;

StringSort: DEFINITIONS =
BEGIN

-- TYPES

Ordering: TYPE = {lessThan, equal, greaterThan};


--PROCEDURES

UpperCase: PROCEDURE [c: CHARACTER] RETURNS [CHARACTER];

LowerCase: PROCEDURE [c: CHARACTER] RETURNS [CHARACTER];

Compare: PROCEDURE [s1, s2: LONG STRING, ignoreCase: BOOLEAN ← TRUE]
  RETURNS [INTEGER];

Equivalent: PROCEDURE [s1, s2: LONG STRING]
  RETURNS [BOOLEAN];

EquivalentSubString: PROCEDURE [s1, s2: String.SubString]
  RETURNS [BOOLEAN];

END.
```

Copyright © 1992 Xerox Corporation All Rights Reserved

```
DIRECTORY
 DirectoryType USING [ObjectID],
 Environment USING [Byte],
 FEPrint USING [LeadEdgeScreenSetting],
 IOTTypes USING [UnloadOptions],
 JobID USING [ID],
 JobQ USING [Plex],
 PublicPrinting USING [Finishing, InternalMedium, MediumDimensions];

SwitchesDefaults: DEFINITIONS =
 {

 NumBiasLevels: CARDINAL = 11;
 NumBrightLevels: CARDINAL = 16;
 NumContrastLevels: CARDINAL = 16;
 NumModeLevels: CARDINAL = 5;
 NumVolumeLevels: CARDINAL = 11;

 AudioFreq: TYPE = {hz600, hz800, hz1000};
 AbsBrightness: TYPE = Environment.Byte;
 OprBrightness: TYPE = [1..NumBrightLevels];
 biasType: TYPE = CARDINAL [1..NumBiasLevels];
 BinderControlModeRec: TYPE = RECORD [mode: BinderMode, on: BOOLEAN];
 BinderMode: TYPE = {manual, automatic};
 BinderTape: TYPE = CARDINAL;
 BinderTimeOut: TYPE = CARDINAL [15..90];
 BrtLimit: TYPE = Environment.Byte;
 BrtLimits: TYPE = RECORD [min: BrtLimit, max: BrtLimit];
 Contrast: TYPE = [1..NumContrastLevels];
 DarknessType: TYPE = {job, system};
 HighContrast: TYPE = INTEGER [190..255];
 InternalReportType: TYPE = RECORD [
  logo: ReportLogoRecordType,
  medium: PublicPrinting.InternalMedium,
  plex: JobQ.Plex];
 LanguageType: TYPE = {primary, secondary};
 MeasurementType: TYPE = {inches, mm};
 modeType: TYPE = CARDINAL [1..NumModeLevels];
 Offset: TYPE = {atPage, none, withinPage};
 OffsetRange: TYPE = CARDINAL [8..500];
 printdarknessRec: TYPE = RECORD [
  jobMode: modeType,
  jobBias: biasType,
  sysMode: modeType,
  sysBias: biasType,
```

Copyright © 1992 Xerox Corporation All Rights Reserved

```
 id: JobID.ID];
PrinterRec: TYPE = RECORD [
 tape: BinderTape,
 offsetCollated: BOOLEAN,
 offsetUncollated: UncollatedOffsetType,
 unloadAt: IOTTypes.UnloadOptions];
ReportLogoType: TYPE = {system, none, customer};
ReportLogoRecordType: TYPE = RECORD [
 logoType: ReportLogoType,
 subDir: DirectoryType.ObjectID,
 logoID: DirectoryType.ObjectID];
ScreenTimeOut: TYPE = CARDINAL [0..20];
StitcherBucket: TYPE = {bucket1, bucket2, bucket3, bucket4};
StitcherPlacementRecord: TYPE = RECORD [HeadA: CARDINAL, HeadB: CARDINAL];
StitcherTableRec: TYPE = RECORD [
 portrait: CARDINAL,
 landscape: CARDINAL,
 bucket1: StitcherPlacementRecord,
 bucket2: StitcherPlacementRecord,
 bucket3: StitcherPlacementRecord,
 bucket4: StitcherPlacementRecord];
UncollatedOffsetType: TYPE = RECORD [
 offset: Offset ← none, number: OffsetRange ← 10];
UnfinishedCollatedCapacity: TYPE = CARDINAL [20..125];
Volume: TYPE = [0..NumVolumeLevels);


GetAbsBrightness: PROCEDURE RETURNS [absBright: AbsBrightness];


GetAudio: PROCEDURE [freq: AudioFreq] RETURNS [volume: Volume];


GetBinderControlModeCurr: PROCEDURE RETURNS [controlMode:
BinderControlModeRec];


GetBinderControlModeStored: PROCEDURE
 RETURNS [controlMode: BinderControlModeRec];


GetBinderPowerOffPending: PROCEDURE [] RETURNS [pending: BOOLEAN];
```

Copyright © 1992 Xerox Corporation All Rights Reserved

```
GetBinderTapeAdjust: PROCEDURE [] RETURNS [tape: BinderTape];

GetBinderTimeout: PROCEDURE [] RETURNS [timeout: BinderTimeOut];

GetBrightnessLimits: PROCEDURE [BrtLimitsPTR: LONG POINTER TO BrtLimits];

GetCollatedOffset: PROCEDURE RETURNS [on: BOOLEAN];

GetContrast: PROCEDURE RETURNS [contrast: Contrast];

GetGenDefaultName: PROCEDURE [] RETURNS [genDefaultName: BOOLEAN];

GetHighContrast: PROCEDURE RETURNS [highContrast: HighContrast];

GetInternalReport: PUBLIC PROCEDURE [
 report: LONG POINTER TO SwitchesDefaults.InternalReportType,
 zone: UNCOUNTED ZONE];

GetInternalReportLogo: PUBLIC PROCEDURE [] RETURNS [logo: ReportLogoRecordType];

GetInternalReportMedium: PUBLIC PROCEDURE [
 mediumPTR: LONG POINTER TO PublicPrinting.InternalMedium,
 zone: UNCOUNTED ZONE];

GetInternalReportPlex: PUBLIC PROCEDURE [] RETURNS [plex: JobQ.Plex];

GetLanguageType: PROCEDURE [] RETURNS [language: LanguageType];
```

Copyright © 1992 Xerox Corporation All Rights Reserved

```
GetLeadEdgeScreen: PROCEDURE []
 RETURNS [leadEdgeScreen: FEPrint.LeadEdgeScreenSetting];

GetMeasureType: PROCEDURE [] RETURNS [measurement: MeasurementType];

GetOprBrightness: PROCEDURE RETURNS [opBright: OprBrightness];

GetPrintDarkness: PROCEDURE [darknessType: DarknessType]
 RETURNS [mode: modeType, bias: biasType, id: JobID.ID];

GetPrinterRec: PROCEDURE [ «parameters» ] RETURNS [printerRec: PrinterRec];

GetRestoreDefaultValues: PROCEDURE [] RETURNS [restoreDefaults: BOOLEAN];

GetScreenTimeout: PROCEDURE [] RETURNS [screenTimeOut: ScreenTimeOut];

GetStitchHeadPlacement: PROCEDURE [
 finishing: PublicPrinting.Finishing, dims: PublicPrinting.MediumDimensions]
 RETURNS [stitchPlacement: StitcherPlacementRecord];

GetStreamPrintEnabled: PROCEDURE [] RETURNS [enabled: BOOLEAN];

GetUncollatedOffset: PROCEDURE [] RETURNS [offsetRec: UncollatedOffsetType];

GetUnfinishedCollatedCapacity: PROCEDURE []
 RETURNS [unfinishedCollatedCapacity: UnfinishedCollatedCapacity];
```

Copyright © 1992 Xerox Corporation All Rights Reserved

```
GetUnloadAt: PROCEDURE [] RETURNS [unloadAt: IOTTypes.UnloadOptions];

SetAbsBrightness: PROCEDURE [absBright: AbsBrightness];

SetAudio: PROCEDURE [freq: AudioFreq, volume: Volume];

SetBinderControlModeCurr: PROCEDURE [controlMode: BinderControlModeRec];

SetBinderControlModeStored: PROCEDURE [controlMode: BinderControlModeRec];

SetBinderPowerOffPending: PROCEDURE [pending: BOOLEAN];

SetBinderTapeAdjust: PROCEDURE [tape: BinderTape];

SetBinderTimeout: PROCEDURE [timeout: BinderTimeOut];

SetBrightnessLimits: PROCEDURE [BrtLimitsPTR: BrtLimits];

SetCollatedOffset: PROCEDURE [on: BOOLEAN];

SetContrast: PROCEDURE [contrast: Contrast];

SetGenDefaultName: PROCEDURE [genDefaultName: BOOLEAN];
```

Copyright © 1992 Xerox Corporation All Rights Reserved

```
SetHighContrast: PROCEDURE [highContrast: HighContrast];

SetInternalReportLogo: PUBLIC PROCEDURE [
 logo: SwitchesDefaults.ReportLogoRecordType];

SetInternalReportMedium: PUBLIC PROCEDURE [
 medium: PublicPrinting.InternalMedium];

SetInternalReportPlex: PUBLIC PROCEDURE [plex: JobQ.Plex];

SetLanguageType: PROCEDURE [language: LanguageType];

SetLeadEdgeScreen: PROCEDURE [leadEdgeScreen: FEPrint.LeadEdgeScreenSetting];

SetMeasureType: PROCEDURE [measurement: MeasurementType];

SetOprBrightness: PROCEDURE [opBright: OprBrightness];

SetPrintDarkness: PROCEDURE [
 darknessType: DarknessType, bias: biasType, mode: modeType, id: JobID.ID];

SetRestoreDefaultValues: PROCEDURE [restoreDefaults: BOOLEAN];

SetScreenTimeout: PROCEDURE [screenTimeOut: ScreenTimeOut];

SetStitchHeadPlacement: PROCEDURE [
```

Copyright © 1992 Xerox Corporation All Rights Reserved

```
 finishing: PublicPrinting.Finishing, dims: PublicPrinting.MediumDimensions,
 stitchPlacement: StitcherPlacementRecord];


SetStreamPrintEnabled: PROCEDURE [enabled: BOOLEAN];


SetUncollatedOffset: PROCEDURE [offsetRec: UncollatedOffsetType];


SetUnfinishedCollatedCapacity: PROCEDURE [
 unfinishedCollatedCapacity: UnfinishedCollatedCapacity];


SetUnloadAt: PROCEDURE [unloadAt: IOTTypes.UnloadOptions];


}.
```

Copyright © 1992 Xerox Corporation All Rights Reserved

```
-- System.mesa

-- Copyright (C) Xerox Corporation 1982. All rights reserved.

DIRECTORY
  Device USING [Type],
  ESCAlpha USING [aRRIT],
  Mopcodes USING [zESC];

System: DEFINITIONS =

BEGIN

  -- Universal identifiers

UniversalID: TYPE [5];
nullIDRep: MACHINE DEPENDENT RECORD [a, b, c, d, e: WORD] = [0, 0, 0, 0, 0];
  -- never returned by GetUniversalID
nullID: UniversalID = LOOPHOLE[nullIDRep];
GetUniversalID: PROCEDURE RETURNS [uid: UniversalID];
VolumeID: TYPE = RECORD [UniversalID]; -- another useful special case of UniversalID
PhysicalVolumeID: TYPE = RECORD [UniversalID]; -- yet another useful special case of
UniversalID


  -- Network addresses

NetworkAddress: TYPE = MACHINE DEPENDENT RECORD [
  net: NetworkNumber,
  host: HostNumber,
  socket: SocketNumber];
NetworkNumber: TYPE [2];
HostNumber: TYPE [3];
SocketNumber: TYPE [1];

nullNetworkAddress: NetworkAddress = [
  net: nullNetworkNumber,
  host: nullHostNumber,
  socket: nullSocketNumber];
nullNetworkNumber: NetworkNumber = LOOPHOLE[LONG[0]];
nullHostNumberRep: MACHINE DEPENDENT RECORD [a, b, c: WORD] = [0, 0, 0];
nullHostNumber: HostNumber = LOOPHOLE[nullHostNumberRep];
broadcastHostNumberRep: MACHINE DEPENDENT RECORD [a, b, c: WORD] =
  [177777B, 177777B, 177777B];
broadcastHostNumber: HostNumber = LOOPHOLE[broadcastHostNumberRep];
nullSocketNumber: SocketNumber = LOOPHOLE[0];

localHostNumber: READONLY HostNumber;
```

Copyright © 1992 Xerox Corporation All Rights Reserved

```
GreenwichMeanTime: TYPE = RECORD [LONG CARDINAL];
  -- A greenwich mean time t represents the time which is t-gmtEpoch seconds after
  -- midnight, 1 January 1968, the time chosen as the epoch or beginning of the Pilot
  -- time standard. Within the range in which they overlap, the Alto and Pilot time
  -- standards assign identical bit patterns, but the Pilot standard runs an additional
  -- 67 years before overflowing.
  -- Greenwich mean times should be compared directly only for equality; to find which of
  -- two gmt's comes first, apply SecondsSinceEpoch to each and compare the result. If t2
  -- is a gmt known to occur after t1, then t2-t1 is the seconds between t1 and t2. If t
  -- is a gmt, then System.GreenwichMeanTime[t+60] is the gmt one minute after t.
gmtEpoch: GreenwichMeanTime = [2114294400];
  -- = (67 years * 365 days + 16 leap days) * 24 hours * 60 minutes * 60 seconds
GetGreenwichMeanTime: PROCEDURE RETURNS [gmt: GreenwichMeanTime];
SecondsSinceEpoch: PROCEDURE [gmt: GreenwichMeanTime] RETURNS [LONG
CARDINAL] =
  INLINE BEGIN RETURN[gmt-gmtEpoch] END;
AdjustGreenwichMeanTime: PROCEDURE [gmt: GreenwichMeanTime, delta: LONG
INTEGER]
  RETURNS [GreenwichMeanTime] = INLINE BEGIN RETURN[[gmt+delta]] END;

LocalTimeParameters: TYPE = MACHINE DEPENDENT RECORD [
  direction(0:0..0): WestEast, -- e.g. Pacific is west
  zone(0:1..4): [0..12], -- e.g. Pacific is 8
  zoneMinutes(1:0..6): [0..59],
  beginDST(0:5..15): [0..366], -- e.g. April 30 is 121
  endDST(1:7..15): [0..366]]; -- e.g. October 31 is 305
WestEast: TYPE = MACHINE DEPENDENT {west(0), east(1)};
GetLocalTimeParameters: PROCEDURE [pvID: PhysicalVolumeID ← [nullID]]
  RETURNS [params: LocalTimeParameters];
  -- The parameter pvID should normally be defaulted.
LocalTimeParametersUnknown: ERROR;
SetLocalTimeParameters: PROCEDURE [
    params: LocalTimeParameters, pvID: PhysicalVolumeID ← [nullID]];
  -- The parameter pvID should normally be defaulted.


  -- Interval timing

Microseconds: TYPE = LONG CARDINAL;
Pulses: TYPE = RECORD [pulses: LONG CARDINAL];
GetClockPulses: PROCEDURE RETURNS [p: Pulses] = MACHINE CODE
  {Mopcodes.zESC, ESCAlpha.aRRIT};
PulsesToMicroseconds: PROCEDURE [p: Pulses] RETURNS [m: Microseconds];
MicrosecondsToPulses: PROCEDURE [m: Microseconds] RETURNS [p: Pulses];
Overflow: ERROR;


  -- Old interval timer mechanism (clients should convert GetClockPulses)
```

Copyright © 1992 Xerox Corporation All Rights Reserved

```
GetIntervalTime: PROCEDURE [t: TimerHandle] RETURNS [m: Microseconds];

  -- System power control

PowerOff: PROCEDURE;
SetAutomaticPowerOn: PROCEDURE [time: GreenwichMeanTime, externalEvent:
BOOLEAN];
ResetAutomaticPowerOn: PROCEDURE;

  -- System boot switches

Switches: TYPE = PACKED ARRAY CHARACTER OF UpDown;
UpDown: TYPE = MACHINE DEPENDENT {up (0), down (1)};
switches: READONLY Switches;
defaultSwitches: Switches = ALL[up];
isUtilityPilot: READONLY BOOLEAN;
IsUtilityPilot: PROCEDURE RETURNS [BOOLEAN] = INLINE {RETURN[isUtilityPilot]};

  -- System boot device

BootDevice: TYPE = RECORD [device: Device.Type, index: CARDINAL];
systemBootDevice: READONLY BootDevice;

END.
```

Copyright © 1992 Xerox Corporation All Rights Reserved

```
SystemLimits: DEFINITIONS =
 BEGIN

 bitMapsPerPage: CARDINAL;

 fontsEntries: CARDINAL;

 fontsPerJob: CARDINAL;

 fontsPerPage: CARDINAL;

 fontSubdirectories: CARDINAL;

 iipFragFiles: CARDINAL;

 iipFragments: CARDINAL;

 jobsInArchive: CARDINAL;

 jobsInSystem: CARDINAL;

 maxCopyCount: CARDINAL;

 mediaPerJob: CARDINAL;

 mergeItemsPerSubdirectory: CARDINAL;

 mergeSubdirectories: CARDINAL;

 objectFaultsPerJob: CARDINAL;

 rastersJob: CARDINAL;

 rastersLoopback: CARDINAL;

 rastersMergeItem: CARDINAL;

 rastersTotalInSystem: CARDINAL;

 savedPrograms: CARDINAL;

 separators: CARDINAL;

 warningsPerJob: CARDINAL;


 authorityID: CARDINAL;
 charCodeID: CARDINAL;
```

Copyright © 1992 Xerox Corporation All Rights Reserved

```
typeFaceID: CARDINAL;

finishingMessage: CARDINAL;
docComment: CARDINAL;
docCreator: CARDINAL;
docName: CARDINAL;
docStartMessage: CARDINAL;
docEndMessage: CARDINAL;
jobAccountName: CARDINAL;
jobComment: CARDINAL;
jobCreateDate: CARDINAL;
jobEndMessage: CARDINAL;
jobName: CARDINAL;
jobMessage: CARDINAL;
jobStartMessage: CARDINAL;
recipientName: CARDINAL;
senderName: CARDINAL;
mediumName: CARDINAL;
mediumMessage: CARDINAL;
mediumColor: CARDINAL;
mediumType: CARDINAL;

preParseBackupPoint: CARDINAL;

spare1: CARDINAL;
spare2: CARDINAL;

END.
```

Copyright © 1992 Xerox Corporation All Rights Reserved

```
DIRECTORY
 System USING [gmtEpoch, GreenwichMeanTime, LocalTimeParameters];

Time: DEFINITIONS =
 BEGIN

 Packed: TYPE = System.GreenwichMeanTime;

 TimeZoneStandard: TYPE = {Alto, ANSI};

 LTP: TYPE = RECORD [
  r: SELECT t: * FROM
   useSystem = > [], useThese = > [ltp: System.LocalTimeParameters] ENDCASE];

 Unpacked: TYPE = RECORD [
  year: [0..2104],
  month: [0..12),
  day: [0..31],
  hour: [0..24),
  minute: [0..60),
  second: [0..60),
  weekday: [0..6],
  dst: BOOLEAN,
  zone: System.LocalTimeParameters];

 defaultTime: System.GreenwichMeanTime = System.gmtEpoch;

 useSystem: useSystem LTP = [useSystem[]];
 useGMT: useThese LTP = [useThese[[west, 0, 0, 0, 0]]];

 Current: PROCEDURE RETURNS [time: System.GreenwichMeanTime];
 Unpack: PROCEDURE [
  time: System.GreenwichMeanTime ← defaultTime, ltp: LTP ← useSystem]
  RETURNS [unpacked: Unpacked];
 Invalid: ERROR;
 Pack: PROCEDURE [unpacked: Unpacked, useSystemLTP: BOOLEAN ← TRUE]
  RETURNS [time: System.GreenwichMeanTime];
 Append: PROCEDURE [
  s: LONG STRING, unpacked: Unpacked, zone: BOOLEAN ← FALSE,
  zoneStandard: TimeZoneStandard ← ANSI];
 AppendCurrent: PROCEDURE [
  s: LONG STRING, zone: BOOLEAN ← FALSE, ltp: LTP ← useSystem,
  zoneStandard: TimeZoneStandard ← ANSI];

 END.
```

Copyright © 1992 Xerox Corporation All Rights Reserved

```
TopLevel: DEFINITIONS =
 BEGIN
 Main: PROCEDURE;
 WaitAllUp: PROCEDURE;
 END.
```

Copyright © 1992 Xerox Corporation All Rights Reserved

```
-- File: TransformAnalyzerOps.mesa - last edit:

-- Copyright (C) 1990, 1991 by Xerox Corporation. All rights reserved.

DIRECTORY
 IMSTypes USING [ScaleFactor],
 MRImageConversionService USING [ImageOrientation],
 RasterObjects USING [PixelSequence],
 Transformation USING [Matrix];

TransformAnalyzerOps: DEFINITIONS =
 BEGIN

 ErrorCode: TYPE = {corruptResultsRec, arbitraryRotate, nonsenseTransformation,
zeroAorEonZeroBandD, zeroBorDonZeroAandE};

 -- none = not an inkwell candidate.
 -- normal = 16x16 inkwell.
 -- double = 32x32 inkwell with scale=2, so make scale=1 & use inkwell double.
 -- special = can be made into a 16x16 w/o doubling, but at least one of the
 --      dimensions is a power of 2 < 16, so we need to do some repeating
 --     (not scaling) of the pattern to get that(those) dimension(s) = 16.
 -- specialDouble = same as special except that scale=2 and
 --         1 of the dimensions is 32.
 InkwellType: TYPE = {double, none, normal, special, specialDouble};

 InputSpec: TYPE = RECORD [
  inputXDim, inputYDim: CARDINAL,
  pixelSequence: RasterObjects.PixelSequence,
  sampledColor: BOOLEAN,
  t: Transformation.Matrix];

 InputSpecPtr: TYPE = LONG POINTER TO InputSpec ← NIL;

 MultiplePassGbdScale: TYPE = RECORD [
  passesAt2x, passesAt3x, passesAt4x,
  passesAt5x, passesAt6x, passesAt7x, passesAt8x: CARDINAL ← 0,
  deMag: IMSTypes.ScaleFactor ← 16];

 PostRotateType: TYPE = {flip, ninety, none};

 ResultsType: TYPE = {empty, ig, multiplePassGbd, resampler, singlePassGbd};

 SinglePassGbdScale: TYPE = RECORD [
  mag: REAL ← 1.0,
  deMag: IMSTypes.ScaleFactor ← 16];

 TransformationResults: TYPE = RECORD [
  inkwellType: InkwellType ← none,
```

Copyright © 1992 Xerox Corporation All Rights Reserved

```
var: SELECT type: ResultsType FROM

 empty => [],

 ig => [t: Transformation.Matrix],

 multiplePassGbd => [orientation: MRImageConversionService.ImageOrientation,
           x, y: MultiplePassGbdScale],

 resampler => [compress: BOOLEAN,
        decompress: BOOLEAN,
        orientation: MRImageConversionService.ImageOrientation,
        postRotate: PostRotateType,
        t: Transformation.Matrix],

 singlePassGbd => [orientation: MRImageConversionService.ImageOrientation,
          x, y: SinglePassGbdScale],

 ENDCASE] ← [none, empty[]];

TransformationResultsPtr: TYPE = LONG POINTER TO TransformationResults ← NIL;

Error: ERROR [code: ErrorCode];

EvaluateT: PROCEDURE [inputSpecPtr: InputSpecPtr,
          resultsPtr: TransformationResultsPtr];

END.
```

Copyright © 1992 Xerox Corporation All Rights Reserved

```
-- File: Transformation.mesa

-- Copyright (C) 1986, 1987 by Xerox Corporation. All rights reserved.

DIRECTORY;

Transformation: DEFINITIONS =

 BEGIN

 -- Types

 Form: TYPE = MACHINE DEPENDENT {full(0), zeroBandD(1), zeroAandE(2), identity(3),
   rotate90(4), pureTranslation(5), yFlip(6), xFlip(7), rotate180(8), swapXY(9),
   swapNegateXY(10), integerScale(11), rotate270(12), pureScaling(13), other1(14),
   other2(15), other3(16)};

 Matrix: TYPE = RECORD [
  a, e: REAL ← 1,  -- x, y scale
  b, d: REAL ← 0,  -- rotation
  c, f: REAL ← 0,  -- x, y translation
  form: Form ← identity];

 -- Constants

 -- Some "easy" transformations
 Identity: Matrix = [a: 1, b: 0, c: 0, d: 0, e: 1, f: 0, form: identity];
 YFlip: Matrix = [a: 1, b: 0, c: 0, d: 0, e: -1, f: 0, form: yFlip];
 XFlip: Matrix = [a: -1, b: 0, c: 0, d: 0, e: 1, f: 0, form: xFlip];
 Rotate180: Matrix = [a: -1, b: 0, c: 0, d: 0, e: -1, f: 0, form: rotate180];
 Rotate90: Matrix = [a: 0, b: -1, c: 0, d: 1, e: 0, f: 0, form: rotate90];
 Rotate270: Matrix = [a: 0, b: 1, c: 0, d: -1, e: 0, f: 0, form: rotate270];

 END...
```

Copyright © 1992 Xerox Corporation All Rights Reserved

```
-- File: TransformationOps.mesa

-- Copyright (C) 1986, 1987 by Xerox Corporation. All rights reserved.

DIRECTORY
 RealFns USING [CosDeg, SinDeg],
 Transformation USING [Matrix, Rotate90, Rotate270, XFlip, YFlip];

TransformationOps: DEFINITIONS IMPORTS RealFns =

 BEGIN

 -- Types

 Direction: TYPE = {left, right, up, down};

 Point: TYPE = RECORD [x, y: REAL];
 Vec: TYPE = Point;

 -- Constants

 epsilon: REAL = 0.000001;

 -- Procs
 -- The resulting transformations are in the rightmost transformation arg

 ApplyYFlip: PROC [m, ms: LONG POINTER TO Transformation.Matrix]
  RETURNS [LONG POINTER TO Transformation.Matrix] = INLINE {
  s: Transformation.Matrix ← Transformation.YFlip;
  RETURN[Concat[m, @s, ms]]};

 ApplyXFlip: PROC [m, ms: LONG POINTER TO Transformation.Matrix]
  RETURNS [LONG POINTER TO Transformation.Matrix] = INLINE {
  s: Transformation.Matrix ← Transformation.XFlip;
  RETURN[Concat[m, @s, ms]]};

 ApplyRotate: PROC [m, mr: LONG POINTER TO Transformation.Matrix, angle: REAL]
  RETURNS [LONG POINTER TO Transformation.Matrix] = INLINE {
  sin: REAL = RealFns.SinDeg[angle];
  cos: REAL = RealFns.CosDeg[angle];
  r: Transformation.Matrix ← [a: cos, b: -sin, c: 0, d: sin, e: cos, f: 0];
  RETURN[Concat[m, @r, mr]]};

 ApplyRotate270: PROC [m, mr: LONG POINTER TO Transformation.Matrix]
  RETURNS [LONG POINTER TO Transformation.Matrix] = INLINE {
  r: Transformation.Matrix ← Transformation.Rotate270;
  RETURN[Concat[m, @r, mr]]};

 ApplyRotate90: PROC [m, mr: LONG POINTER TO Transformation.Matrix]
  RETURNS [LONG POINTER TO Transformation.Matrix] = INLINE {
```

Copyright © 1992 Xerox Corporation All Rights Reserved

```
r: Transformation.Matrix ← Transformation.Rotate90;
RETURN[Concat[m, @r, mr]]};

ApplyScale: PROC [m, ms: LONG POINTER TO Transformation.Matrix, sx, sy: REAL]
 RETURNS [LONG POINTER TO Transformation.Matrix] = INLINE {
 s: Transformation.Matrix ← [a: sx, e: sy];
 RETURN[Concat[m, @s, ms]]};

ApplyShear: PROC [m, ms: LONG POINTER TO Transformation.Matrix, sx, sy: REAL]
 RETURNS [LONG POINTER TO Transformation.Matrix] = INLINE {
 s: Transformation.Matrix ← [b: sx, d: sy];
 RETURN[Concat[m, @s, ms]]};

ApplyTranslate: PROC [m, mt: LONG POINTER TO Transformation.Matrix, v: Vec]
 RETURNS [LONG POINTER TO Transformation.Matrix] = INLINE {
 t: Transformation.Matrix ← [c: v.x, f: v.y];
 RETURN[Concat[m, @t, mt]]};

Concat: PUBLIC PROC [m, n, mn: LONG POINTER TO Transformation.Matrix]
 RETURNS [LONG POINTER TO Transformation.Matrix] = INLINE {
 mn↑ ← Transformation.Matrix[
  a: m.a*n.a+m.d*n.b, b: m.b*n.a+m.e*n.b,
  c: m.c*n.a+m.f*n.b+n.c, d: m.a*n.d+m.d*n.e,
  e: m.b*n.d+m.e*n.e, f: m.c*n.d+m.f*n.e+n.f];
 SetForm[mn];
 RETURN[mn]};

DCStoICS: PUBLIC PROC [
 m: LONG POINTER TO Transformation.Matrix,
 slow, fast: Direction, sDim, fDim: REAL]
 RETURNS [LONG POINTER TO Transformation.Matrix] = INLINE {
 m↑ ← [
  a: SELECT slow FROM right => 1.0, left => -1.0, ENDCASE => 0.0,
  b: SELECT fast FROM right => 1.0, left => -1.0, ENDCASE => 0.0,
  d: SELECT slow FROM up => 1.0, down => -1.0, ENDCASE => 0.0,
  e: SELECT fast FROM up => 1.0, down => -1.0, ENDCASE => 0.0];
 m.c ← MAX[-(m.a * sDim + m.b * fDim), 0];
 m.f ← MAX[-(m.d * sDim + m.e * fDim), 0];
 SetForm[m];
 RETURN[m]};

ICStoDCS: PUBLIC PROC [
 m: LONG POINTER TO Transformation.Matrix,
 slow, fast: Direction, sDim, fDim: REAL]
 RETURNS [LONG POINTER TO Transformation.Matrix] = INLINE {
 temp: Transformation.Matrix;
 RETURN[Invert[DCStoICS[@temp, slow, fast, sDim, fDim], m]]};

Invert: PUBLIC PROC [m, inv: LONG POINTER TO Transformation.Matrix]
 RETURNS [LONG POINTER TO Transformation.Matrix] = INLINE {
```

Copyright © 1992 Xerox Corporation All Rights Reserved

```
den: REAL = (m.a*m.e)-(m.b*m.d);
IF ABS[den] < epsilon THEN RETURN[NIL];
inv↑ ← Transformation.Matrix[
 a: m.e/den, b: -m.b/den, c: ((m.b*m.f)-(m.e*m.c))/den,
 d: -m.d/den, e: m.a/den, f: ((m.c*m.d)-(m.a*m.f))/den];
SetForm[inv];
RETURN[inv]};

SetForm: PROC [m: LONG POINTER TO Transformation.Matrix];

TransformPoint: PROC [m: LONG POINTER TO Transformation.Matrix, v: Vec]
 RETURNS [Vec] = INLINE {
 IF m = NIL THEN RETURN[v];
 SELECT m.form FROM
  zeroBandD, integerScale => RETURN[[m.a*v.x+m.c, m.e*v.y+m.f]];
  pureScaling => RETURN[[m.a*v.x, m.e*v.y]];
  zeroAandE => RETURN[[m.b*v.y+m.c, m.d*v.x+m.f]];
  identity => RETURN[[v.x, v.y]];
  pureTranslation => RETURN[[m.c+v.x, m.f+v.y]];
  yFlip => RETURN[[v.x+m.c, m.f-v.y]];
  xFlip => RETURN[[m.c-v.x, m.f+v.y]];
  rotate180 => RETURN[[m.c-v.x, m.f-v.y]];
  swapXY => RETURN[[v.y+m.c, v.x+m.f]];
  rotate270 => RETURN[[v.y+m.c, -v.x+m.f]];
  rotate90 => RETURN[[m.c-v.y, v.x+m.f]];
  swapNegateXY => RETURN[[-v.y+m.c, -v.x+m.f]];
  ENDCASE => RETURN[[m.a*v.x+m.b*v.y+m.c, m.d*v.x+m.e*v.y+m.f]]};

TransformVector, TransformVec: PROC [
 m: LONG POINTER TO Transformation.Matrix, v: Vec]
 RETURNS [Vec] = INLINE {
 IF m = NIL THEN RETURN[v];
 SELECT m.form FROM
  zeroBandD, pureScaling, integerScale => RETURN[[m.a*v.x, m.e*v.y]];
  zeroAandE => RETURN[[m.b*v.y, m.d*v.x]];
  identity => RETURN[[v.x, v.y]];
  pureTranslation => RETURN[[v.x, v.y]];
  yFlip => RETURN[[v.x, -v.y]];
  xFlip => RETURN[[-v.x, v.y]];
  rotate180 => RETURN[[-v.x, -v.y]];
  swapXY => RETURN[[v.y, v.x]];
  rotate270 => RETURN[[v.y, -v.x]];
  rotate90 => RETURN[[-v.y, v.x]];
  swapNegateXY => RETURN[[-v.y, -v.x]];
  ENDCASE => RETURN[[m.a*v.x+m.b*v.y, m.d*v.x+m.e*v.y]]};

END...
```

Copyright © 1992 Xerox Corporation All Rights Reserved

```
DIRECTORY
 AccountMgrCommon USING [AccountNumber],
 System USING [GreenwichMeanTime],
 UserProfile USING [
  ListingDirection, NewUserHandle, Password, ProfileState, ServicePrivilege,
  SecAdminModProp, SecAdminViewHandle, Session, UserID, UserName];

UPSecAdmin: DEFINITIONS =

 BEGIN

 SeqUsers: TYPE = RECORD [
  numUsers: CARDINAL ← 0, userList: SEQUENCE length: CARDINAL OF UserRecord];

 UserList: TYPE = LONG POINTER TO SeqUsers;

 UserRecord: TYPE = RECORD [
  userName: UserProfile.UserName,
  lastSession: UserProfile.Session,
  profileState: UserProfile.ProfileState];

 StatusCode: TYPE = {
  ok, notFound, acctNotFound, acctInactive, acqListInvalid, modListInvalid,
  memberInvalid, csrID, csrPassword, csrAccount, notCSRAccount, defaultAccess,
  defaultAudit, defaultAdmin, defaultNoPwd, defaultName, defaultID, defaultNet,
  adminPwdReqd, mustHavePwd, pwdReusedTooSoon, pwdTooLong, pwdTooShort,
  pwdNotRequired, netPwdReqd, idInUse, idTooLong, idTooShort, duplicateId,
  nameInUse, nameTooShort, nameTooLong, duplicateName, netOwner, outOfBounds,
  ownsJobs, shortList, insufficientPriv, nilString, notAllowedOnCSR,
  notAllowedOnDefaultUser, notAllowedOnNewUser, notAllowedOnOnlySecAdmin,
  dBaseDisappeared, noRoom, knownBug, acConfigNotLoaded, notYetLoaded};

 maxNumCodes: CARDINAL = 5;

 AddNewUser: PROCEDURE [user: UserProfile.NewUserHandle]
  RETURNS [status: StatusCode, position: CARDINAL];

 AdminModifyUser: PROCEDURE [
  currentName: UserProfile.UserName, userProfile: UserProfile.NewUserHandle]
```

Copyright © 1992 Xerox Corporation All Rights Reserved

```
 RETURNS [status: StatusCode, position: CARDINAL];

ChangePassword: PROCEDURE [
 name: UserProfile.UserName, password: UserProfile.Password]
 RETURNS [status: StatusCode, lastPwdChange: System.GreenwichMeanTime];

ChangeProperty: PROCEDURE [
 name: UserProfile.UserName, newSetting: UserProfile.SecAdminModProp]
 RETURNS [status: StatusCode];

ChangeUserID: PROCEDURE [
 name: UserProfile.UserName, newUserID: UserProfile.UserID]
 RETURNS [status: StatusCode];

ChangeUserName: PROCEDURE [name, newUserName: UserProfile.UserName]
 RETURNS [
  status: StatusCode, newPosition: CARDINAL, isCurrentOperator: BOOLEAN];

DeleteUser: PROCEDURE [name: UserProfile.UserName] RETURNS [status: StatusCode];

FreeSecAdminView: PROCEDURE [
 ptr: LONG POINTER TO UserProfile.SecAdminViewHandle, z: UNCOUNTED ZONE];

FreeUserList: PROCEDURE [ptr: LONG POINTER TO UserList, z: UNCOUNTED ZONE];

IsAccountValid: PROCEDURE [
 account: AccountMgrCommon.AccountNumber,
 currentName: UserProfile.UserName ← NIL,
 servicePriv: UserProfile.ServicePrivilege ← none]
 RETURNS [status: StatusCode];

IsNetAccount: PROCEDURE [account: AccountMgrCommon.AccountNumber]
 RETURNS [status: BOOLEAN];

IsPwdStringValid: PROCEDURE [
 password: LONG STRING, currentName: UserProfile.UserName ← NIL,
 servicePriv: UserProfile.ServicePrivilege ← none]
 RETURNS [status: StatusCode];
```

Copyright © 1992 Xerox Corporation All Rights Reserved

```
IsUserIDValid: PROCEDURE [
 id: UserProfile.UserID, currentName: UserProfile.UserName ← NIL,
 servicePriv: UserProfile.ServicePrivilege ← none]
 RETURNS [status: StatusCode];

IsUserNameValid: PROCEDURE [
 name: UserProfile.UserName, currentName: UserProfile.UserName ← NIL,
 servicePriv: UserProfile.ServicePrivilege ← none]
 RETURNS [status: StatusCode];

ListUsers: PROCEDURE [
 hint: UserProfile.UserName ← NIL, useHint: BOOLEAN ← FALSE,
 startAt: CARDINAL ← 0, numRequested: CARDINAL,
 direction: UserProfile.ListingDirection ← forward, z: UNCOUNTED ZONE]
 RETURNS [status: StatusCode, userList: UserList];

SizeDBase: PROCEDURE [] RETURNS [status: StatusCode, numUsers: CARDINAL];

ViewProfile: PROCEDURE [name: UserProfile.UserName, z: UNCOUNTED ZONE]
 RETURNS [status: StatusCode, profile: UserProfile.SecAdminViewHandle];

END.
```

Copyright © 1992 Xerox Corporation All Rights Reserved

```
DIRECTORY
 Courier USING [Description, Handle, SystemElement],
 Stream USING [Handle];

XStream: DEFINITIONS =
 BEGIN
 Object: TYPE;
 Handle: TYPE = LONG POINTER TO Object;

 Request: TYPE = RECORD [
  SELECT access: * FROM
  none => [],
  stream => [sH: Stream.Handle],
  proc => [proc: PROC [Handle]],
  deferred => [sink, source: Courier.SystemElement],
  ENDCASE];

 Create: PROC [Handle] RETURNS [Stream.Handle];


 Copy: PROC [sink, source: Stream.Handle];


 Destroy: PROC [Handle];
 Make: PROC [request: Request] RETURNS [handle: Handle];


 ServerCheckout: PROC [Courier.Handle, Request];
 UserCheckout: PROC [Courier.Handle];


 AbortTransfer: PROC [Stream.Handle];


 CancelTransfer: PROC [Handle];


 DescribeSink: Courier.Description;
 DescribeSource: Courier.Description;

 BUG: ERROR [code: Code];
 Code: TYPE = {bug, reused, lost, protocol, undeleted};

 END.
```

Copyright © 1992 Xerox Corporation All Rights Reserved

```
DIRECTORY
 JobID USING [ID, nullID],
 PublicPrinting USING [MediumDimensions, PaperSize];

Print3: DEFINITIONS =

 BEGIN
 HashedPassword: TYPE = CARDINAL;

 Boolean: TYPE = MACHINE DEPENDENT RECORD [zeros: [0..77777B], value: BOOLEAN];
 OtherSizeRecord: TYPE = RECORD [width, length: CARDINAL];
 Time: TYPE = LONG CARDINAL;

 PrintAttributes: TYPE = LONG DESCRIPTOR FOR ARRAY PrintAttributesIndex OF
  PrintAttributesChoice;
 PrintAttributesIndex: TYPE = [0..3);
 PrintAttributesChoice: TYPE = RECORD [
  SELECT tag: * FROM
  printObjectName => [printObjectName: LONG STRING],
  printObjectCreateDate => [printObjectCreateDate: Time],
  senderName => [senderName: LONG STRING],
  ENDCASE];

 PrintOptions: TYPE = LONG DESCRIPTOR FOR ARRAY PrintOptionsIndex OF
  PrintOptionsChoice;
 PrintOptionsIndex: TYPE = [0..10);
 PrintOptionsChoice: TYPE = RECORD [
  SELECT tag: * FROM
  printObjectSize => [printObjectSize: LONG CARDINAL],
  recipientName => [recipientName: LONG STRING],
  message => [message: LONG STRING],
  copyCount => [copyCount: CARDINAL],
  pagesToPrint => [pagesToPrint: PagesToPrintRecord],
  mediumHint => [mediumHint: Medium],
  priorityHint => [priorityHint: PriorityHintEnum],
  releaseKey => [releaseKey: HashedPassword],
  staple => [staple: Boolean],
  twoSided => [twoSided: Boolean],
  ENDCASE];

 PagesToPrintRecord: TYPE = RECORD [
  beginningPageNumber, endingPageNumber: CARDINAL];

 PriorityHintEnum: TYPE = MACHINE DEPENDENT{
  low(0), normal(1), high(2), (CARDINAL.LAST - 1)};

 PrinterProperties: TYPE = LONG DESCRIPTOR FOR ARRAY PrinterPropertiesIndex OF
  PrintPropertiesChoice;
 PrinterPropertiesIndex: TYPE = [0..3);
```

Copyright © 1992 Xerox Corporation All Rights Reserved

```
PrintPropertiesChoice: TYPE = RECORD [
 SELECT tag: * FROM
 media => [media: Media],
 staple => [staple: Boolean],
 twoSided => [twoSided: Boolean],
 ENDCASE];

PrinterStatus: TYPE = LONG DESCRIPTOR FOR ARRAY PrinterStatusIndex OF
 PrinterStatusChoice;
PrinterStatusIndex: TYPE = [0..4);
PrinterStatusChoice: TYPE = RECORD [
 SELECT tag: * FROM
 spooler => [spooler: SpoolerEnum],
 formatter => [formatter: FormatterEnum],
 printer => [printer: PrinterEnum],
 media => [media: Media],
 ENDCASE];

SpoolerEnum: TYPE = MACHINE DEPENDENT{
 available(0), busy(1), disabled(2), full(3), (CARDINAL.LAST - 1)};
FormatterEnum: TYPE = MACHINE DEPENDENT{
 available(0), busy(1), disabled(2), (CARDINAL.LAST - 1)};
PrinterEnum: TYPE = MACHINE DEPENDENT{
 available(0), busy(1), disabled(2), needsAttention(3), needsKeyOperator(4),
 (CARDINAL.LAST - 1)};

Media: TYPE = LONG DESCRIPTOR FOR ARRAY MediaIndex OF Medium;
MediaIndex: TYPE = [0..100);
Medium: TYPE = RECORD [SELECT tag: * FROM paper => [paper: Paper], ENDCASE];

PaperType: TYPE = MACHINE DEPENDENT{unknown(0), knownSize, otherSize(2)};
Paper: TYPE = MACHINE DEPENDENT RECORD [
 var(0): SELECT type(0): PaperType FROM
  unknown => [],
  knownSize => [knownSize(1): PublicPrinting.PaperSize],
  otherSize => [otherSize(1): PublicPrinting.MediumDimensions],
  ENDCASE];

RequestStatus: TYPE = LONG DESCRIPTOR FOR ARRAY RequestStatusIndex OF
 RequestStatusChoice;
RequestStatusIndex: TYPE = [0..2);
RequestStatusChoice: TYPE = RECORD [
 SELECT tag: * FROM
 status => [status: RequestStatusEnum],
 statusMessage => [statusMessage: LONG STRING],
 ENDCASE];
RequestStatusEnum: TYPE = MACHINE DEPENDENT{
 pending(0), inProgress(1), completed(2), completedWithWarning(3), unknown(4),
 rejected(5), aborted(6), canceled(7), held(8), (CARDINAL.LAST - 1)};
```

Copyright © 1992 Xerox Corporation All Rights Reserved

```
RequestID: TYPE = RECORD [
 jobID: JobID.ID ← JobID.nullID, zero: LONG CARDINAL ← 0];

Busy: ERROR;
ConnectionError: ERROR [problem: ConnectionProblem];
ConnectionProblem: TYPE = MACHINE DEPENDENT{
 noRoute(0), noResponse(1), transmissionHardware(2), transportTimeout(3),
 tooManyLocalConnections(4), tooManyRemoteConnections(5), missingCourier(6),
 missingProgram(7), missingProcedure(8), protocolMismatch(9),
 parameterInconsistency(10), invalidMessage(11), returnTimedOut(12),
 otherCallProblem(177777B)};
InsufficientSpoolSpace: ERROR;
InvalidPrintParameters: ERROR;
MasterTooLarge: ERROR;
MediumUnavailable: ERROR;
ServiceUnavailable: ERROR;
SpoolingDisabled: ERROR;
SpoolingQueueFull: ERROR;
SystemError: ERROR;
TooManyClients: ERROR;
TransferError: ERROR [problem: TransferProblem];
TransferProblem: TYPE = MACHINE DEPENDENT{
 aborted(0), formatIncorrect(2), noRendezvous(3), wrongDirection(4),
 (CARDINAL.LAST - 1)};
Undefined: ERROR [problem: UndefinedProblem];
UndefinedProblem: TYPE = CARDINAL;

END.
```

Copyright © 1992 Xerox Corporation All Rights Reserved

```
Print3Control: DEFINITIONS =
 BEGIN
 DisableSpooling: PROCEDURE [];
 EnableSpooling: PROCEDURE [];
 ExportService: PROCEDURE [];
 Init: PROCEDURE [];
 UnexportService: PROCEDURE [];
 END.
```

Copyright © 1992 Xerox Corporation All Rights Reserved

```
DIRECTORY
 Courier USING [Description, Dispatcher],
 Print3 USING [
  ConnectionProblem, PrintAttributes, PrintOptions, PrinterProperties,
  PrinterStatus, RequestID, RequestStatus, TransferProblem, UndefinedProblem],
 XStream USING [Handle];

Print3Courier: DEFINITIONS =

 BEGIN

 programNumber: LONG CARDINAL = 4;
 version: CARDINAL = 3;

 Dispatcher: Courier.Dispatcher;

 Print: CARDINAL = 0;
 GetPrinterProperties: CARDINAL = 1;
 GetPrintRequestStatus: CARDINAL = 2;
 GetPrinterStatus: CARDINAL = 3;

 Busy: CARDINAL = 0;
 InsufficientSpoolSpace: CARDINAL = 1;
 InvalidPrintParameters: CARDINAL = 2;
 MasterTooLarge: CARDINAL = 3;
 MediumUnavailable: CARDINAL = 4;
 ServiceUnavailable: CARDINAL = 5;
 SpoolingDisabled: CARDINAL = 6;
 SpoolingQueueFull: CARDINAL = 7;
 SystemError: CARDINAL = 8;
 TooManyClients: CARDINAL = 9;
 Undefined: CARDINAL = 10;
 ConnectionError: CARDINAL = 11;
 TransferError: CARDINAL = 12;

 PrintArgs: TYPE = RECORD [
  master: XStream.Handle,
  printAttributes: Print3.PrintAttributes,
  printOptions: Print3.PrintOptions];
 PrintRes: TYPE = RECORD [printRequestID: Print3.RequestID];
 DescribePrintArgs: Courier.Description;
 DescribePrintRes: Courier.Description;

 GetPrinterPropertiesRes: TYPE = RECORD [properties: Print3.PrinterProperties];
 DescribeGetPrinterPropertiesRes: Courier.Description;

 GetPrintRequestStatusArgs: TYPE = RECORD [printRequestID: Print3.RequestID];
 GetPrintRequestStatusRes: TYPE = RECORD [status: Print3.RequestStatus];
 DescribeGetPrintRequestStatusArgs: Courier.Description;
```

Copyright © 1992 Xerox Corporation All Rights Reserved

```
DescribeGetPrintRequestStatusRes: Courier.Description;

GetPrinterStatusRes: TYPE = RECORD [status: Print3.PrinterStatus];
DescribeGetPrinterStatusRes: Courier.Description;

ConnectionErrorArgs: TYPE = RECORD [problem: Print3.ConnectionProblem];
TransferErrorArgs: TYPE = RECORD [problem: Print3.TransferProblem];
UndefinedArgs: TYPE = RECORD [problem: Print3.UndefinedProblem];
DescribeConnectionErrorArgs: Courier.Description;
DescribeTransferErrorArgs: Courier.Description;
DescribeUndefinedArgs: Courier.Description;

Init: PROCEDURE [];

END.
```

Copyright © 1992 Xerox Corporation All Rights Reserved

```
DIRECTORY
 Print3 USING [
  PrintAttributes, PrinterProperties, PrinterStatus, PrintOptions, RequestID,
  RequestStatus],
 Stream USING [Handle];

Print3Server: DEFINITIONS =

 BEGIN

 GetPrinterProperties: PROCEDURE []
  RETURNS [properties: Print3.PrinterProperties];
 GetPrintRequestStatus: PROCEDURE [printRequestID: Print3.RequestID]
  RETURNS [status: Print3.RequestStatus];
 GetPrinterStatus: PROCEDURE [] RETURNS [status: Print3.PrinterStatus];

 FreePrinterProperties: PROCEDURE [properties: Print3.PrinterProperties];
 FreePrintRequestStatus: PROCEDURE [status: Print3.RequestStatus];
 FreePrinterStatus: PROCEDURE [status: Print3.PrinterStatus];

 Print: PROCEDURE [
  master: Stream.Handle, printAttributes: Print3.PrintAttributes,
  printOptions: Print3.PrintOptions] RETURNS [printRequestID: Print3.RequestID];

 END.
```

Copyright © 1992 Xerox Corporation All Rights Reserved

```
DIRECTORY
 PublicPrinting USING [Spooler],
 ResMgrStorage USING [Pages];

Print3Status: DEFINITIONS =
 BEGIN

 heap: UNCOUNTED ZONE;


 CheckDiskUsage: PROCEDURE [masterSize: ResMgrStorage.Pages, completed:
BOOLEAN];

 CheckServiceEnabled: PROCEDURE [];

 CloseConnection: PROCEDURE [streamOn: BOOLEAN, error: BOOLEAN];

 CloseDiskConnection: PROCEDURE [size: ResMgrStorage.Pages];

 CloseStreamConnection: PROCEDURE [];

 OpenConnection: PROCEDURE [] RETURNS [streamOn: BOOLEAN];

 GetSpoolingStatus: PROCEDURE [] RETURNS [status: PublicPrinting.Spooler];

 CheckStatus: PROCEDURE [] RETURNS [disabled: BOOLEAN];
```

Copyright © 1992 Xerox Corporation All Rights Reserved

```
DIRECTORY
 BlockStream USING [Block, StreamHandle],
 JobID USING [ID],
 Print3SM USING [CallBackProc, MgrStatus],
 ResMgrStorage USING [Pages],
 RTOSFile USING [FileID],
 Stream USING [Handle],
 String USING [SubStringDescriptor];

Print3Stream: DEFINITIONS =
 BEGIN

 defaultFileSize: ResMgrStorage.Pages = 50;
 extendFileBy: ResMgrStorage.Pages = 50;

 connectionLimit: CARDINAL = 6;
 bufferSize: CARDINAL = 50;

 pagesInBuffer: CARDINAL;
 bytesInBuffer: CARDINAL;


 Abort: PROCEDURE [clientID: JobID.ID];

 AddNetJob: PROCEDURE [clientID: JobID.ID]
  RETURNS [
   abort: BOOLEAN, sH: BlockStream.StreamHandle, status: Print3SM.MgrStatus,
   callBackProc: Print3SM.CallBackProc];

 CheckInterrupt: PROCEDURE [clientID: JobID.ID]
  RETURNS [interrupt: BOOLEAN, status: Print3SM.MgrStatus];

 Delete: PROCEDURE [clientID: JobID.ID];

 InitList: PROCEDURE [];

 RegisterFile: PROCEDURE [
  fileName: LONG STRING, fileID: RTOSFile.FileID,
  postfix: String.SubStringDescriptor, fileNumber: CARDINAL ← 1,
  forceNumber: BOOLEAN ← FALSE, ipCaptureMode: BOOLEAN ← FALSE]
  RETURNS [version: CARDINAL];

 SpoolFromDisk: PROCEDURE [
  fileID: RTOSFile.FileID, clientID: JobID.ID,
  streamHandle: BlockStream.StreamHandle, callBackProc: Print3SM.CallBackProc];

 SpoolToDisk: PROCEDURE [
  ipFileSize: LONG CARDINAL, master: Stream.Handle, ipFileName: LONG STRING,
  ipCaptureMode: BOOLEAN]
```

Copyright © 1992 Xerox Corporation All Rights Reserved

```
  RETURNS [
   ipFile: RTOSFile.FileID, masterSize: ResMgrStorage.Pages,
   version: CARDINAL];

SpoolToPreParser: PROCEDURE [
  clientID: JobID.ID, fileSizeInBytes: LONG CARDINAL, master: Stream.Handle,
  sH: BlockStream.StreamHandle, callBackProc: Print3SM.CallBackProc];

RaiseError: PROCEDURE [status: Print3SM.MgrStatus];

Transmit: PROCEDURE [
  clientID: JobID.ID, sh: BlockStream.StreamHandle, block: BlockStream.Block,
  eof: BOOLEAN]
  RETURNS [abort: BOOLEAN, blockReturned: BOOLEAN, status: Print3SM.MgrStatus];

END.
```

Copyright © 1992 Xerox Corporation All Rights Reserved

```
DIRECTORY
 NetServIgnition USING [],
 NetServSM USING [],
 Print3Control USING [ExportService, Init, UnexportService],
 TopLevel USING [WaitAllUp];

NetServControlImpl: PROGRAM
 IMPORTS Print3Control, TopLevel EXPORTS NetServIgnition, NetServSM =

 BEGIN


 Init: PUBLIC PROCEDURE [] =

  BEGIN
  Print3Control.Init[];

  END;

 SetServiceSwitch: PUBLIC PROCEDURE [onLine: BOOLEAN] =

  BEGIN
  IF onLine THEN Print3Control.ExportService[]
  ELSE Print3Control.UnexportService[];
  END;

 SetFilingSwitch: PUBLIC PROCEDURE [enable: BOOLEAN] =

  BEGIN

  END;

 Shutdown: PUBLIC PROCEDURE [] =

  BEGIN END;


 Wait: PROCEDURE [] =

  BEGIN
  TopLevel.WaitAllUp[];

  END;


 END.
```

Copyright © 1992 Xerox Corporation All Rights Reserved

```
DIRECTORY
 Courier USING [Description],
 JobID USING [ID],
 Print3 USING [
  Boolean, ConnectionProblem, FormatterEnum, Paper, PagesToPrintRecord,
  PrintAttributes, PrintAttributesChoice, PrintAttributesIndex, PrinterEnum,
  PrinterProperties, PrinterPropertiesIndex, PrinterStatus, PrinterStatusChoice,
  PrinterStatusIndex, PrintOptions, PrintOptionsChoice, PrintOptionsIndex,
  PrintPropertiesChoice, PriorityHintEnum, Media, MediaIndex, Medium, RequestID,
  RequestStatus, RequestStatusChoice, RequestStatusEnum, RequestStatusIndex,
  SpoolerEnum, TransferProblem, UndefinedProblem],
 Print3Courier USING [
  ConnectionErrorArgs, GetPrintRequestStatusArgs, GetPrintRequestStatusRes,
  GetPrinterPropertiesRes, GetPrinterStatusRes, PrintArgs, PrintRes,
  TransferErrorArgs, UndefinedArgs],
 PublicPrinting USING [MediumDimensions, PaperSize],
 XStream USING [DescribeSource];

Print3CourierImpl: PROGRAM IMPORTS XStream EXPORTS Print3Courier =

 BEGIN


 DescribeConnectionErrorArgs: PUBLIC Courier.Description =
  BEGIN
  p: LONG POINTER TO Print3Courier.ConnectionErrorArgs ← notes.noteSize[
   SIZE[Print3Courier.ConnectionErrorArgs]];
  notes.noteParameters[p, DescribeConnectionProblem];
  END;

 DescribeGetPrinterPropertiesRes: PUBLIC Courier.Description =
  BEGIN
  p: LONG POINTER TO Print3Courier.GetPrinterPropertiesRes ← notes.noteSize[
   SIZE[Print3Courier.GetPrinterPropertiesRes]];
  notes.noteParameters[@p.properties, DescribePrinterProperties];
  END;

 DescribeGetPrinterStatusRes: PUBLIC Courier.Description =
  BEGIN
  p: LONG POINTER TO Print3Courier.GetPrinterStatusRes ← notes.noteSize[
   SIZE[Print3Courier.GetPrinterStatusRes]];
  notes.noteParameters[p, DescribePrintPrinterStatus];
  END;

 DescribeGetPrintRequestStatusArgs: PUBLIC Courier.Description =
  BEGIN
  p: LONG POINTER TO Print3Courier.GetPrintRequestStatusArgs ← notes.noteSize[
   SIZE[Print3Courier.GetPrintRequestStatusArgs]];
  notes.noteParameters[p, DescribePrintRequestID];
```

Copyright © 1992 Xerox Corporation All Rights Reserved

```
END;

DescribeGetPrintRequestStatusRes: PUBLIC Courier.Description =
 BEGIN
 p: LONG POINTER TO Print3Courier.GetPrintRequestStatusRes ← notes.noteSize[
  SIZE[Print3Courier.GetPrintRequestStatusRes]];
 notes.noteParameters[p, DescribePrintRequestStatus];
 END;

DescribePrintArgs: PUBLIC Courier.Description =
 BEGIN
 p: LONG POINTER TO Print3Courier.PrintArgs ← notes.noteSize[
  SIZE[Print3Courier.PrintArgs]];
 notes.noteParameters[@p.master, XStream.DescribeSource];
 notes.noteParameters[@p.printAttributes, DescribePrintAttributes];
 notes.noteParameters[@p.printOptions, DescribePrintOptions];
 END;

DescribePrintRes: PUBLIC Courier.Description =
 BEGIN
 p: LONG POINTER TO Print3Courier.PrintRes ← notes.noteSize[
  SIZE[Print3Courier.PrintRes]];
 notes.noteParameters[@p.printRequestID, DescribePrintRequestID];
 END;

DescribeTransferErrorArgs: PUBLIC Courier.Description =
 BEGIN
 p: LONG POINTER TO Print3Courier.TransferErrorArgs ← notes.noteSize[
  SIZE[Print3Courier.TransferErrorArgs]];
 notes.noteParameters[p, DescribeTransferProblem];
 END;

DescribeUndefinedArgs: PUBLIC Courier.Description =
 BEGIN
 p: LONG POINTER TO Print3Courier.UndefinedArgs ← notes.noteSize[
  SIZE[Print3Courier.UndefinedArgs]];
 notes.noteParameters[p, DescribeUndefinedProblem];
 END;

Init: PUBLIC PROCEDURE [] = {};


DescribeBoolean: Courier.Description = {
 [] ← notes.noteSize[SIZE[Print3.Boolean]]};

DescribeCardinal: Courier.Description = {[] ← notes.noteSize[SIZE[CARDINAL]]};

DescribeConnectionProblem: Courier.Description = {
 [] ← notes.noteSize[SIZE[Print3.ConnectionProblem]]; };
```

Copyright © 1992 Xerox Corporation All Rights Reserved

```
DescribeJobID: Courier.Description = {[] ← notes.noteSize[SIZE[JobID.ID]]; };

DescribeFormatterEnum: Courier.Description = {
 [] ← notes.noteSize[SIZE[Print3.FormatterEnum]]; };

DescribeKnownSize: Courier.Description = {
 [] ← notes.noteSize[SIZE[PublicPrinting.PaperSize]]; };

DescribeMedia: Courier.Description =
 BEGIN
 p: LONG POINTER TO Print3.Media ← notes.noteSize[SIZE[Print3.Media]];
 notes.noteArrayDescriptor[p, SIZE[Print3.Medium], 100];
 FOR i: Print3.MediaIndex IN [0..p↑.LENGTH) DO
  notes.noteParameters[@p↑[i], DescribeMedium]; ENDLOOP;
 END;

DescribeMedium: Courier.Description =
 BEGIN
 pLength: ARRAY [0..1) OF CARDINAL ← [SIZE[paper Print3.Medium]];
 p: LONG POINTER TO Print3.Medium ← notes.noteSize[SIZE[Print3.Medium]];
 notes.noteChoice[
  site: p, size: SIZE[Print3.Medium], variant: DESCRIPTOR[pLength]];
 WITH p↑ SELECT FROM
  paper => notes.noteParameters[@paper, DescribePaper];
  ENDCASE;
 END;

DescribePagesToPrint: Courier.Description =
 BEGIN
 p: LONG POINTER TO Print3.PagesToPrintRecord ← notes.noteSize[
  SIZE[Print3.PagesToPrintRecord]];
 notes.noteParameters[@p.beginningPageNumber, DescribeCardinal];
 notes.noteParameters[@p.endingPageNumber, DescribeCardinal];
 END;

DescribePaper: Courier.Description =
 BEGIN
 pLength: ARRAY [0..3) OF CARDINAL ← [
  SIZE[unknown Print3.Paper], SIZE[knownSize Print3.Paper], SIZE[
  otherSize Print3.Paper]];
 p: LONG POINTER TO Print3.Paper ← notes.noteSize[SIZE[Print3.Paper]];
 notes.noteChoice[
  site: p, size: SIZE[Print3.Paper], variant: DESCRIPTOR[pLength]];
 WITH p↑ SELECT FROM
  unknown => {};
  knownSize => notes.noteParameters[@knownSize, DescribeKnownSize];
  otherSize => notes.noteParameters[@otherSize, DescribeOtherSize];
  ENDCASE;
 END;
```

Copyright © 1992 Xerox Corporation All Rights Reserved

```
DescribePrintAttributes: Courier.Description =
 BEGIN
 pLength: ARRAY Print3.PrintAttributesIndex OF CARDINAL ← [
  SIZE[printObjectName Print3.PrintAttributesChoice], SIZE[
  printObjectCreateDate Print3.PrintAttributesChoice], SIZE[
  senderName Print3.PrintAttributesChoice]];
 p: LONG POINTER TO Print3.PrintAttributes ← notes.noteSize[
  SIZE[Print3.PrintAttributes]];
 notes.noteArrayDescriptor[p, SIZE[Print3.PrintAttributesChoice], 3];
 FOR i: Print3.PrintAttributesIndex IN [0..p↑.LENGTH) DO
  notes.noteChoice[
   site: @p↑[i], size: SIZE[Print3.PrintAttributesChoice],
   variant: DESCRIPTOR[pLength]];
  WITH p↑[i] SELECT FROM
   printObjectName => notes.noteString[@printObjectName];
   printObjectCreateDate => notes.noteLongCardinal[@printObjectCreateDate];
   senderName => notes.noteString[@senderName];
   ENDCASE;
  ENDLOOP;
 END;

DescribePrinterEnum: Courier.Description = {
 [] ← notes.noteSize[SIZE[Print3.PrinterEnum]]; };

DescribePrinterProperties: Courier.Description =
 BEGIN
 pLength: ARRAY Print3.PrinterPropertiesIndex OF CARDINAL ← [
  SIZE[media Print3.PrintPropertiesChoice], SIZE[
  staple Print3.PrintPropertiesChoice], SIZE[
  twoSided Print3.PrintPropertiesChoice]];
 p: LONG POINTER TO Print3.PrinterProperties ← notes.noteSize[
  SIZE[Print3.PrinterProperties]];
 notes.noteArrayDescriptor[p, SIZE[Print3.PrintPropertiesChoice], 4];
 FOR i: Print3.PrinterPropertiesIndex IN [0..p↑.LENGTH) DO
  notes.noteChoice[
   site: @p↑[i], size: SIZE[Print3.PrintPropertiesChoice],
   variant: DESCRIPTOR[pLength]];
  WITH p↑[i] SELECT FROM
   media => notes.noteParameters[@media, DescribeMedia];
   staple => notes.noteParameters[@staple, DescribeBoolean];
   twoSided => notes.noteParameters[@twoSided, DescribeBoolean];
   ENDCASE;
  ENDLOOP;
 END;

DescribePrintPrinterStatus: Courier.Description =
 BEGIN
 pLength: ARRAY Print3.PrinterStatusIndex OF CARDINAL ← [
  SIZE[spooler Print3.PrinterStatusChoice], SIZE[
  formatter Print3.PrinterStatusChoice], SIZE[
```

Copyright © 1992 Xerox Corporation All Rights Reserved

```
  printer Print3.PrinterStatusChoice], SIZE[
  media Print3.PrinterStatusChoice]];
 p: LONG POINTER TO Print3.PrinterStatus ← notes.noteSize[
  SIZE[Print3.PrinterStatus]];
 notes.noteArrayDescriptor[p, SIZE[Print3.PrinterStatusChoice], 4];
 FOR i: Print3.PrinterStatusIndex IN [0..p↑.LENGTH) DO
  notes.noteChoice[
   site: @p↑[i], size: SIZE[Print3.PrinterStatusChoice],
   variant: DESCRIPTOR[pLength]];
  WITH p↑[i] SELECT FROM
   spooler => notes.noteParameters[@spooler, DescribeSpoolerEnum];
   formatter => notes.noteParameters[@formatter, DescribeFormatterEnum];
   printer => notes.noteParameters[@printer, DescribePrinterEnum];
   media => notes.noteParameters[@media, DescribeMedia];
   ENDCASE;
  ENDLOOP;
 END;

DescribePrintRequestID: Courier.Description =
 BEGIN
 p: LONG POINTER TO Print3.RequestID ← notes.noteSize[SIZE[Print3.RequestID]];
 notes.noteParameters[@p.jobID, DescribeJobID];
 notes.noteLongCardinal[@p.zero];
 END;

DescribePrintRequestStatus: Courier.Description =
 BEGIN
 pLength: ARRAY Print3.RequestStatusIndex OF CARDINAL ← [
  SIZE[status Print3.RequestStatusChoice], SIZE[
  statusMessage Print3.RequestStatusChoice]];
 p: LONG POINTER TO Print3.RequestStatus ← notes.noteSize[
  SIZE[Print3.RequestStatus]];
 notes.noteArrayDescriptor[p, SIZE[Print3.RequestStatusChoice], 2];
 FOR i: Print3.RequestStatusIndex IN [0..p↑.LENGTH) DO
  notes.noteChoice[
   site: @p↑[i], size: SIZE[Print3.RequestStatusChoice],
   variant: DESCRIPTOR[pLength]];
  WITH p↑[i] SELECT FROM
   status => notes.noteParameters[@status, DescribeRequestStatusEnum];
   statusMessage => notes.noteString[@statusMessage];
   ENDCASE;
  ENDLOOP;
 END;

DescribePrintOptions: Courier.Description =
 BEGIN
 pLength: ARRAY Print3.PrintOptionsIndex OF CARDINAL ← [
  SIZE[printObjectSize Print3.PrintOptionsChoice], SIZE[
  recipientName Print3.PrintOptionsChoice], SIZE[
  message Print3.PrintOptionsChoice], SIZE[
```

Copyright © 1992 Xerox Corporation All Rights Reserved

```
   copyCount Print3.PrintOptionsChoice], SIZE[
   pagesToPrint Print3.PrintOptionsChoice], SIZE[
   mediumHint Print3.PrintOptionsChoice], SIZE[
   priorityHint Print3.PrintOptionsChoice], SIZE[
   releaseKey Print3.PrintOptionsChoice], SIZE[
   staple Print3.PrintOptionsChoice], SIZE[
   twoSided Print3.PrintOptionsChoice]];
  p: LONG POINTER TO Print3.PrintOptions ← notes.noteSize[
   SIZE[Print3.PrintOptions]];
  notes.noteArrayDescriptor[p, SIZE[Print3.PrintOptionsChoice], 10];
  FOR i: Print3.PrintOptionsIndex IN [0..p ↑ .LENGTH) DO
   notes.noteChoice[
    site: @p ↑ [i], size: SIZE[Print3.PrintOptionsChoice],
    variant: DESCRIPTOR[pLength]];
   WITH p ↑ [i] SELECT FROM
    printObjectSize => notes.noteLongCardinal[@printObjectSize];
    recipientName => notes.noteString[@recipientName];
    message => notes.noteString[@message];
    copyCount => notes.noteParameters[@copyCount, DescribeCardinal];
    pagesToPrint => notes.noteParameters[@pagesToPrint, DescribePagesToPrint];
    mediumHint => notes.noteParameters[@mediumHint, DescribeMedium];
    priorityHint => notes.noteParameters[@priorityHint, DescribePriorityHint];
    releaseKey => notes.noteParameters[@releaseKey, DescribeCardinal];
    staple => notes.noteParameters[@staple, DescribeBoolean];
    twoSided => notes.noteParameters[@twoSided, DescribeBoolean];
    ENDCASE;
   ENDLOOP;
  END;

DescribePriorityHint: Courier.Description = {
 [] ← notes.noteSize[SIZE[Print3.PriorityHintEnum]]};

DescribeOtherSize: Courier.Description =
 BEGIN
 p: LONG POINTER TO PublicPrinting.MediumDimensions ← notes.noteSize[
  SIZE[PublicPrinting.MediumDimensions]];
 notes.noteParameters[@p.widthInMillimeters, DescribeCardinal];
 notes.noteParameters[@p.lengthInMillimeters, DescribeCardinal];
 END;

DescribeRequestStatusEnum: Courier.Description = {
 [] ← notes.noteSize[SIZE[Print3.RequestStatusEnum]]; };

DescribeSpoolerEnum: Courier.Description = {
 [] ← notes.noteSize[SIZE[Print3.SpoolerEnum]]; };

DescribeTransferProblem: Courier.Description = {
 [] ← notes.noteSize[SIZE[Print3.TransferProblem]]; };

DescribeUndefinedProblem: Courier.Description = {
```

Copyright © 1992 Xerox Corporation All Rights Reserved

```
[] ← notes.noteSize[SIZE[Print3.UndefinedProblem]]; };
END.
```

Copyright © 1992 Xerox Corporation All Rights Reserved

```
DIRECTORY
 Courier USING [
  Arguments, Dispatcher, Error, Free, NoSuchProcedureNumber, Results,
  SignalRemoteError],
 EventLogger USING [Log],
 Print3 USING [
  Busy, ConnectionError, InsufficientSpoolSpace, InvalidPrintParameters,
  MasterTooLarge, MediumUnavailable, ServiceUnavailable, SpoolingDisabled,
  SpoolingQueueFull, SystemError, TooManyClients, TransferError, Undefined],
 Print3Courier USING [
  Busy, ConnectionError, ConnectionErrorArgs, GetPrinterPropertiesRes,
  GetPrintRequestStatusArgs, GetPrintRequestStatusRes, GetPrinterStatusRes,
  InsufficientSpoolSpace, InvalidPrintParameters, MasterTooLarge,
  MediumUnavailable, PrintArgs, PrintRes, ServiceUnavailable, SpoolingDisabled,
  SpoolingQueueFull, SystemError, TooManyClients, DescribeConnectionErrorArgs,
  TransferError, TransferErrorArgs, DescribeGetPrinterPropertiesRes,
  UndefinedArgs, DescribeGetPrinterStatusRes, DescribeGetPrintRequestStatusArgs,
  DescribeGetPrintRequestStatusRes, DescribePrintArgs, DescribePrintRes,
  DescribeTransferErrorArgs, DescribeUndefinedArgs, Undefined],
 Print3Server USING [
  FreePrinterStatus, FreePrinterProperties, FreePrintRequestStatus,
  GetPrinterProperties, GetPrintRequestStatus, GetPrinterStatus, Print],
 Print3Status USING [heap],
 Runtime USING [CallDebugger],
 Stream USING [Delete, Handle, InvalidOperation, TimeOut],
 XStream USING [AbortTransfer, BUG, Create];

Print3Impl: PROGRAM
 IMPORTS
  Courier, EventLogger, Print3, Print3Courier, Print3Server, Print3Status,
  Runtime, Stream, XStream
 EXPORTS Print3Courier =

 BEGIN

 Dispatcher: PUBLIC Courier.Dispatcher =
  BEGIN
  ENABLE
   BEGIN
   Print3.Busy => {
    Courier.SignalRemoteError[errorNumber: Print3Courier.Busy]; };
   Print3.ConnectionError => {
    args: Print3Courier.ConnectionErrorArgs ← [problem];
    Courier.SignalRemoteError[
     errorNumber: Print3Courier.ConnectionError,
     arguments: [@args, Print3Courier.DescribeConnectionErrorArgs]];
    };
   Print3.InsufficientSpoolSpace => {
    Courier.SignalRemoteError[
```

Copyright © 1992 Xerox Corporation All Rights Reserved

```
    errorNumber: Print3Courier.InsufficientSpoolSpace];
   };
  Print3.InvalidPrintParameters = > {
   Courier.SignalRemoteError[
    errorNumber: Print3Courier.InvalidPrintParameters];
   };
  Print3.MasterTooLarge = > {
   Courier.SignalRemoteError[errorNumber: Print3Courier.MasterTooLarge]; };
  Print3.MediumUnavailable = > {
   Courier.SignalRemoteError[errorNumber: Print3Courier.MediumUnavailable];
   };
  Print3.ServiceUnavailable = > {
   Courier.SignalRemoteError[errorNumber: Print3Courier.ServiceUnavailable];
   };
  Print3.SpoolingDisabled = > {
   Courier.SignalRemoteError[errorNumber: Print3Courier.SpoolingDisabled]; };
  Print3.SpoolingQueueFull = > {
   Courier.SignalRemoteError[errorNumber: Print3Courier.SpoolingQueueFull];
   };
  Print3.SystemError = > {
   Courier.SignalRemoteError[errorNumber: Print3Courier.SystemError]; };
  Print3.TooManyClients = > {
   Courier.SignalRemoteError[errorNumber: Print3Courier.TooManyClients]; };
  Print3.TransferError = > {
   args: Print3Courier.TransferErrorArgs ← [problem];
   Courier.SignalRemoteError[
    errorNumber: Print3Courier.TransferError,
    arguments: [@args, Print3Courier.DescribeTransferErrorArgs]];
   };
  Print3.Undefined = > {
   args: Print3Courier.UndefinedArgs ← [problem];
   Courier.SignalRemoteError[
    errorNumber: Print3Courier.Undefined,
    arguments: [@args, Print3Courier.DescribeUndefinedArgs]];
   };
  END;
 SELECT procedureNumber FROM
  0 = > DoPrint[arguments, results];
  1 = > DoGetPrinterProperties[arguments, results];
  2 = > DoGetPrintRequestStatus[arguments, results];
  3 = > DoGetPrinterStatus[arguments, results];
  ENDCASE = > Courier.NoSuchProcedureNumber;
 END;

DoPrint: PROCEDURE [arguments: Courier.Arguments, results: Courier.Results] =
 BEGIN
 args: Print3Courier.PrintArgs;
 res: Print3Courier.PrintRes;
 stream: Stream.Handle;
```

Copyright © 1992 Xerox Corporation All Rights Reserved

```
EventLogger.Log[event: 551];
arguments[[@args, Print3Courier.DescribePrintArgs]];

stream ← XStream.Create[args.master];

res.printRequestID ← Print3Server.Print[
 master: stream, printAttributes: args.printAttributes,
 printOptions: args.printOptions !

 Courier.Error =>
  BEGIN
  XStream.AbortTransfer[
   stream !
   ABORTED, XStream.BUG, Courier.Error, Stream.InvalidOperation =>
    CONTINUE];
  Stream.Delete[stream];
  Courier.Free[[@args, Print3Courier.DescribePrintArgs], Print3Status.heap];
  SELECT errorCode FROM
   transportTimeout => GOTO streamTimeout;
   protocolMismatch => GOTO protocolMismatch;
   returnTimedOut => GOTO returnTimedOut;
   noRouteToSystemElement => GOTO noRoute;
   transmissionMediumHardwareProblem => GOTO transmissionHardware;
   tooManyConnections => GOTO tooManyLocalConnections;
   parameterInconsistency => GOTO parameterInconsistency;
   invalidMessage => GOTO invalidMessage;
   ENDCASE => GOTO noResponse;
  END;

 Stream.TimeOut =>
  BEGIN
  XStream.AbortTransfer[
   stream !
   ABORTED, XStream.BUG, Courier.Error, Stream.InvalidOperation =>
    CONTINUE];
  Stream.Delete[stream];
  Courier.Free[[@args, Print3Courier.DescribePrintArgs], Print3Status.heap];
  GOTO streamTimeout;
  END;

 XStream.BUG =>
  BEGIN
  XStream.AbortTransfer[
   stream !
   ABORTED, XStream.BUG, Courier.Error, Stream.InvalidOperation =>
    CONTINUE];
  Stream.Delete[stream];
  Courier.Free[[@args, Print3Courier.DescribePrintArgs], Print3Status.heap];
  SELECT code FROM
   protocol => GOTO protocolMismatch;
```

Copyright © 1992 Xerox Corporation All Rights Reserved

```
    ENDCASE => GOTO systemError;
   END;

  ABORTED =>
   BEGIN
   Stream.Delete[stream];
   Courier.Free[[@args, Print3Courier.DescribePrintArgs], Print3Status.heap];
   GOTO noResponse;
   END;

  Print3.ConnectionError, Print3.InsufficientSpoolSpace,
   Print3.MasterTooLarge, Print3.InvalidPrintParameters, Print3.Undefined,
   Print3.ServiceUnavailable, Print3.TooManyClients,
   Print3.SpoolingQueueFull, Print3.SystemError, Print3.SpoolingDisabled,
   Print3.TransferError, Print3.MediumUnavailable, Print3.Busy =>
   BEGIN
   XStream.AbortTransfer[
    stream !
    ABORTED, XStream.BUG, Courier.Error, Stream.InvalidOperation =>
     CONTINUE];
   Stream.Delete[stream];
   Courier.Free[[@args, Print3Courier.DescribePrintArgs], Print3Status.heap];
   END;

  ];

 Stream.Delete[stream];

 BEGIN
 ENABLE
  Courier.Error =>
   Runtime.CallDebugger["Make outload, Call Paul Reilly 2-1207"L];

 Courier.Free[[@args, Print3Courier.DescribePrintArgs], Print3Status.heap];

 [] ← results[[@res, Print3Courier.DescribePrintRes]];
 END;


 EventLogger.Log[event: 552];
 EXITS
  systemError => Print3.SystemError;
  noResponse => Print3.ConnectionError[noResponse];
  streamTimeout => Print3.ConnectionError[transportTimeout];
  noRoute => Print3.ConnectionError[noRoute];
  transmissionHardware => Print3.ConnectionError[transmissionHardware];
  tooManyLocalConnections => Print3.ConnectionError[tooManyLocalConnections];
  protocolMismatch => Print3.ConnectionError[protocolMismatch];
  parameterInconsistency => Print3.ConnectionError[parameterInconsistency];
  invalidMessage => Print3.ConnectionError[invalidMessage];
```

Copyright © 1992 Xerox Corporation All Rights Reserved

```
  returnTimedOut => Print3.ConnectionError[returnTimedOut];
 END;

DoGetPrinterProperties: PROCEDURE [
 arguments: Courier.Arguments, results: Courier.Results] =
 BEGIN
 res: Print3Courier.GetPrinterPropertiesRes;

 arguments[];
 res.properties ← Print3Server.GetPrinterProperties[];
 [] ← results[[@res, Print3Courier.DescribeGetPrinterPropertiesRes]];

 Print3Server.FreePrinterProperties[res];
 END;

DoGetPrintRequestStatus: PROCEDURE [
 arguments: Courier.Arguments, results: Courier.Results] =
 BEGIN
 args: Print3Courier.GetPrintRequestStatusArgs;
 res: Print3Courier.GetPrintRequestStatusRes;

 arguments[[@args, Print3Courier.DescribeGetPrintRequestStatusArgs]];
 res.status ← Print3Server.GetPrintRequestStatus[args.printRequestID];

 Courier.Free[
  [@args, Print3Courier.DescribeGetPrintRequestStatusArgs],
  Print3Status.heap];
 [] ← results[[@res, Print3Courier.DescribeGetPrintRequestStatusRes]];

 Print3Server.FreePrintRequestStatus[res.status];
 END;

DoGetPrinterStatus: PROCEDURE [
 arguments: Courier.Arguments, results: Courier.Results] =
 BEGIN
 res: Print3Courier.GetPrinterStatusRes;

 arguments[];
 res.status ← Print3Server.GetPrinterStatus[];
 [] ← results[[@res, Print3Courier.DescribeGetPrinterStatusRes]];

 Print3Server.FreePrinterStatus[res.status];
 END;

END.
```

Copyright © 1992 Xerox Corporation All Rights Reserved

```
DIRECTORY
 ACConfigSecAdm USING [GetNetUserName, FreeNetUserName],
 ACConfigTypes USING [NetUserName, StatusCode],
 ASWFileTypes USING [ipCapture],
 BlockStream USING [StreamHandle],
 CharCodeMapping USING [XCCtoICC],
 JobID USING [ID, nullID],
 JobQ USING [Plex],
 NetDefaults USING [GetDefaultNetMedia, GetNetJobParms, NetJobParmsRec],
 NetworkLog USING [LogNetJob],
 Print3 USING [
  ConnectionProblem, Media, Medium, Paper, PaperType, PrintAttributes,
  PrinterProperties, PrinterPropertiesIndex, PrinterStatus, PrinterStatusChoice,
  PrintOptions, PrintPropertiesChoice, PriorityHintEnum, RequestID,
  RequestStatus, RequestStatusChoice, TransferProblem, UndefinedProblem],
 Print3Server USING [],
 Print3SM USING [CallBackProc, MgrStatus],
 Print3Stream USING [
  Abort, AddNetJob, Delete, RaiseError, RegisterFile, SpoolToDisk,
  SpoolToPreParser],
 Print3Status USING [
  CheckServiceEnabled, CloseConnection, GetSpoolingStatus, heap, OpenConnection,
  CloseDiskConnection],
 PublicPrinting USING [
  Finishing, InternalMedia, InternalMedium, MediumDimensions, nullMedium,
  PaperSize, Plex],
 PublicPrintUtility USING [FreeMediaList],
 ResMgr USING [Allocate, Error, WriteSync],
 ResMgrStorage USING [BufferList, Pages, PagesFromWords],
 RMDirectory USING [Error, maxNameLength, NameFromId, UnRegister],
 RTOSFile USING [Create, Delete, Error, FileID, nullID],
 Stream USING [Handle],
 String USING [Compare, CopyToNewString, Equal, FreeString, Length],
 SMNetSupport USING [
  GetPrinterProperties, GetPrinterStatus, GetPrintRequestStatus, JobParms,
  Print, PrinterProperties, PrinterStatus],
 System USING [switches],
 SystemLimits USING [jobMessage, jobName, recipientName, senderName],
 Time USING [Current, defaultTime],
 UPSecAdmin USING [FreeSecAdminView, StatusCode, ViewProfile],
 UserProfile USING [SecAdminViewHandle];

Print3ServerImpl: PROGRAM
 IMPORTS
  ACConfigSecAdm, CharCodeMapping, NetDefaults, NetworkLog, Print3Stream,
  Print3Status, PublicPrintUtility, ResMgr, ResMgrStorage, RMDirectory,
  RTOSFile, SMNetSupport, System, SystemLimits, String, Time, UPSecAdmin
 EXPORTS Print3, Print3Server =
```

Copyright © 1992 Xerox Corporation All Rights Reserved

```
BEGIN

WordSeq: TYPE = RECORD [SEQUENCE COMPUTED CARDINAL OF WORD];

BasePtr: TYPE = LONG BASE POINTER;
CharArray: TYPE = PACKED ARRAY [0..0) OF CHARACTER;
CharArrayOffset: TYPE = BasePtr RELATIVE POINTER TO CharArray;
nullCharArray: CharArrayOffset = LOOPHOLE[0];

Specified: TYPE = RECORD [
 name: BOOLEAN ← FALSE,
 createDate: BOOLEAN ← FALSE,
 sender: BOOLEAN ← FALSE,
 size: BOOLEAN ← FALSE,
 recipient: BOOLEAN ← FALSE,
 msg: BOOLEAN ← FALSE,
 count: BOOLEAN ← FALSE,
 pages: BOOLEAN ← FALSE,
 medium: BOOLEAN ← FALSE,
 priority: BOOLEAN ← FALSE,
 release: BOOLEAN ← FALSE,
 finish: BOOLEAN ← FALSE,
 plex: BOOLEAN ← FALSE];

ProtocolPtr: TYPE = LONG POINTER TO ProtocolRecord;

ProtocolRecord: TYPE = RECORD [
 specified: Specified ← [],
 staple: BOOLEAN ← FALSE,
 twoSided: BOOLEAN ← FALSE,
 paperError: BOOLEAN ← FALSE,
 mediumError: BOOLEAN ← FALSE,
 optionsError: BOOLEAN ← FALSE,
 attributesError: BOOLEAN ← FALSE,
 mediumHint: Print3.PaperType ← knownSize,
 knownSize: PublicPrinting.PaperSize ← usLetter,
 priorityHint: Print3.PriorityHintEnum ← normal,
 printObjectCreateDate: LONG CARDINAL ← 0,
 printObjectSize: LONG CARDINAL ← 0,
 copyCount: CARDINAL ← 0,
 beginningPageNumber: CARDINAL ← 0,
 endingPageNumber: CARDINAL ← 0,
 widthInMillimeters: CARDINAL ← 0,
 lengthInMillimeters: CARDINAL ← 0,
 releaseKey: CARDINAL ← 0,
 printObjectNameLength: CARDINAL ← 0,
 printObjectNameRel: CharArrayOffset ← nullCharArray,
 senderNameLength: CARDINAL ← 0,
 senderNameRel: CharArrayOffset ← nullCharArray,
```

Copyright © 1992 Xerox Corporation All Rights Reserved

```
 recipientNameLength: CARDINAL ← 0,
 recipientNameRel: CharArrayOffset ← nullCharArray,
 messageLength: CARDINAL ← 0,
 messageRel: CharArrayOffset ← nullCharArray];

bypassName: LONG STRING ← "saveip enabled";
zone: UNCOUNTED ZONE ← Print3Status.heap;


Busy: PUBLIC ERROR = CODE;
ConnectionError: PUBLIC ERROR [problem: Print3.ConnectionProblem] = CODE;
InsufficientSpoolSpace: PUBLIC ERROR = CODE;
InvalidPrintParameters: PUBLIC ERROR = CODE;
MasterTooLarge: PUBLIC ERROR = CODE;
MediumUnavailable: PUBLIC ERROR = CODE;
ServiceUnavailable: PUBLIC ERROR = CODE;
SpoolingDisabled: PUBLIC ERROR = CODE;
SpoolingQueueFull: PUBLIC ERROR = CODE;
SystemError: PUBLIC ERROR = CODE;
TooManyClients: PUBLIC ERROR = CODE;
TransferError: PUBLIC ERROR [problem: Print3.TransferProblem] = CODE;
Undefined: PUBLIC ERROR [problem: Print3.UndefinedProblem] = CODE;


GetPrinterProperties: PUBLIC PROCEDURE []
 RETURNS [properties: Print3.PrinterProperties] =

 BEGIN
 media: Print3.Media;
 props: SMNetSupport.PrinterProperties;
 numProp: CARDINAL = Print3.PrinterPropertiesIndex.LAST + 1;

 Print3Status.CheckServiceEnabled[];

 props ← SMNetSupport.GetPrinterProperties[zone];

 properties ← DESCRIPTOR[
  zone.NEW[WordSeq [Print3.PrintPropertiesChoice.SIZE * numProp]], numProp];

 media ← DESCRIPTOR[
  zone.NEW[WordSeq [Print3.Medium.SIZE * props.media.LENGTH]],
   props.media.LENGTH];

 FOR i: CARDINAL IN [0..props.media.LENGTH) DO
  media[i] ← [paper[XlateMedium[props.media[i]]]]; ENDLOOP;

 properties[0] ← [media[media]];
 properties[1] ← [staple[[0, props.staple]]];
 properties[2] ← [twoSided[[0, props.twoSided]]];
```

Copyright © 1992 Xerox Corporation All Rights Reserved

```
PublicPrintUtility.FreeMediaList[@props.media, zone];
END;

GetPrintRequestStatus: PUBLIC PROCEDURE [printRequestID: Print3.RequestID]
 RETURNS [status: Print3.RequestStatus] =

 BEGIN
 StatusArray: TYPE = ARRAY [0..1) OF Print3.RequestStatusChoice;

 Print3Status.CheckServiceEnabled[];

 status ← DESCRIPTOR[zone.NEW[StatusArray], 1];

 status[0] ← [
  status[
  LOOPHOLE[SMNetSupport.GetPrintRequestStatus[
  requestID: printRequestID.jobID]]]];
 END;

GetPrinterStatus: PUBLIC PROCEDURE [] RETURNS [status: Print3.PrinterStatus] =

 BEGIN
 StatusArray: TYPE = ARRAY [0..4) OF Print3.PrinterStatusChoice;
 media: Print3.Media;
 printerStatus: SMNetSupport.PrinterStatus;

 Print3Status.CheckServiceEnabled[];

 printerStatus ← SMNetSupport.GetPrinterStatus[zone];
 printerStatus.spooler ← Print3Status.GetSpoolingStatus[];

 media ← DESCRIPTOR[
  zone.NEW[WordSeq [Print3.Medium.SIZE * printerStatus.media.LENGTH]],
   printerStatus.media.LENGTH];

 FOR i: CARDINAL IN [0..printerStatus.media.LENGTH) DO
  media[i] ← [paper[XlateMedium[printerStatus.media[i]]]]; ENDLOOP;

 status ← DESCRIPTOR[zone.NEW[StatusArray], 4];

 status[0] ← [spooler[LOOPHOLE[printerStatus.spooler]]];
 status[1] ← [formatter[LOOPHOLE[printerStatus.postParser]]];
 status[2] ← [printer[LOOPHOLE[printerStatus.printer]]];
 status[3] ← [media[media]];

 PublicPrintUtility.FreeMediaList[@printerStatus.media, zone];
 END;
```

Copyright © 1992 Xerox Corporation All Rights Reserved

```
Print: PUBLIC PROCEDURE [
 master: Stream.Handle, printAttributes: Print3.PrintAttributes,
 printOptions: Print3.PrintOptions]
 RETURNS [printRequestID: Print3.RequestID] =

 BEGIN
 streamOn: BOOLEAN;
 aborted: BOOLEAN;
 bypass: BOOLEAN ← FALSE;
 clientStatus: Print3SM.MgrStatus;
 acStatus: ACConfigTypes.StatusCode;
 upStatus: UPSecAdmin.StatusCode;

 masterSize: ResMgrStorage.Pages ← 0;
 sH: BlockStream.StreamHandle;
 netUserName: ACConfigTypes.NetUserName;
 profile: UserProfile.SecAdminViewHandle;
 ipFileSize: LONG CARDINAL ← 0;
 protocolFile: RTOSFile.FileID ← RTOSFile.nullID;
 version: CARDINAL ← 1;
 jobParms: SMNetSupport.JobParms;
 defaultsRec: NetDefaults.NetJobParmsRec;
 intMediaArray: ARRAY [0..1) OF PublicPrinting.InternalMedium;
 intMediaArray[0] ← PublicPrinting.nullMedium;

 Print3Status.CheckServiceEnabled[];

 streamOn ← Print3Status.OpenConnection[];

 jobParms ← [
  access: [[all[]], [all[]]], accountNum: NIL, copyCount: 1,
  createDate: Time.defaultTime,
  defaulted: [
  TRUE, TRUE, TRUE, TRUE, TRUE, TRUE, TRUE, TRUE, TRUE, TRUE, TRUE],
  finishing: sampleTray, ipFileID: RTOSFile.nullID, jobName: "Job"L,
  media: DESCRIPTOR[intMediaArray], message: NIL, owner: NIL,
  pagesToPrint: [range[[1, LAST[CARDINAL]]]], plex: simplex, priority: medium,
  recipientName: NIL, senderName: NIL];

 [acStatus, netUserName] ← ACConfigSecAdm.GetNetUserName[zone];
 IF acStatus # success THEN {
  Print3Status.CloseConnection[streamOn, TRUE]; ERROR SystemError; };
 jobParms.owner ← netUserName;


 IF System.switches['n] = down
  AND String.Compare[s1: netUserName, s2: bypassName, ignoreCase: TRUE] = 0
  THEN {
  bypass ← TRUE;
  streamOn ← FALSE;
```

Copyright © 1992 Xerox Corporation All Rights Reserved

```
  protocolFile ← DumpInstructions[printAttributes, printOptions];
  };

 [upStatus, profile] ← UPSecAdmin.ViewProfile[jobParms.owner, zone];
 IF upStatus # ok THEN {
  ACConfigSecAdm.FreeNetUserName[@netUserName, zone];
  Print3Status.CloseConnection[streamOn, TRUE];
  ERROR SystemError;
  };
 jobParms.access ← profile.defaultJobACL;
 jobParms.accountNum ← profile.defaultAccount;

 NetDefaults.GetDefaultNetMedia[jobParms.media, zone];
 jobParms.media[0].tabEdge ← right;
 defaultsRec ← NetDefaults.GetNetJobParms[];

 FOR index: CARDINAL IN [0..LENGTH[printOptions]) DO
  WITH p: printOptions[index] SELECT FROM

   printObjectSize => ipFileSize ← p.printObjectSize;

   recipientName =>
    IF NOT String.Equal[p.recipientName, ""L] THEN {
     jobParms.recipientName ← CharCodeMapping.XCCtoICC[
      xcc: p.recipientName, z: zone];
     CS[jobParms.recipientName, SystemLimits.recipientName];
     jobParms.defaulted.recipientName ← FALSE};

   message =>
    IF NOT String.Equal[p.message, ""L] THEN {
     jobParms.message ← CharCodeMapping.XCCtoICC[xcc: p.message, z: zone];
     CS[jobParms.message, SystemLimits.jobMessage];
     jobParms.defaulted.message ← FALSE};

   copyCount => {
    jobParms.copyCount ← p.copyCount; jobParms.defaulted.copyCount ← FALSE};

   pagesToPrint => {
    jobParms.pagesToPrint ← [
     range[
     [
     p.pagesToPrint.beginningPageNumber,
     p.pagesToPrint.endingPageNumber]]];
    jobParms.defaulted.pagesToPrint ← FALSE;
    };

   mediumHint => {
    WITH q: p.mediumHint SELECT FROM
     paper => {
      WITH q.paper SELECT FROM
```

Copyright © 1992 Xerox Corporation All Rights Reserved

```
        unknown => NULL;

        knownSize => {
         jobParms.defaulted.medium ← FALSE;
         jobParms.media[0].mediumDimensions ← TranslateKnownSize[
          knownSize !
          MediumUnavailable =>
           CleanUp[jobParms, streamOn, TRUE, profile, zone]; ]};

        otherSize => {
         jobParms.defaulted.medium ← FALSE;
         jobParms.media[0].mediumDimensions ← otherSize};

        ENDCASE => {
         CleanUp[jobParms, streamOn, TRUE, profile, zone];
         ERROR SystemError;
         };

      };
     ENDCASE => {
      CleanUp[jobParms, streamOn, TRUE, profile, zone];
      ERROR SystemError;
      };
    };

   priorityHint => {
    NULL;

    };

   releaseKey => NULL;
   staple => {
    IF p.staple.value THEN jobParms.finishing ← portraitSingleStitch;
    jobParms.defaulted.staple ← FALSE;
    };

   twoSided => {
    IF p.twoSided.value THEN jobParms.plex ← duplex;
    jobParms.defaulted.plex ← FALSE;
    };
   ENDCASE => {
    CleanUp[jobParms, streamOn, TRUE, profile, zone]; ERROR SystemError; };
  ENDLOOP;

 FOR i: CARDINAL IN [0..LENGTH[printAttributes]) DO
  WITH p: printAttributes[i] SELECT FROM
   printObjectName =>
    IF NOT String.Equal[p.printObjectName, ""L] THEN {
     jobParms.jobName ← CharCodeMapping.XCCtoICC[
      xcc: p.printObjectName, z: zone];
```

Copyright © 1992 Xerox Corporation All Rights Reserved

```
    CS[jobParms.jobName, SystemLimits.jobName];
    jobParms.defaulted.jobName ← FALSE;
    };
  printObjectCreateDate = > {
   jobParms.createDate ← [p.printObjectCreateDate];
   jobParms.defaulted.jobCreateDate ← FALSE;
   };
  senderName = >
   IF NOT String.Equal[p.senderName, ""L] THEN {
    jobParms.senderName ← CharCodeMapping.XCCtoICC[
     xcc: p.senderName, z: zone];
    CS[jobParms.senderName, SystemLimits.senderName];
    jobParms.defaulted.senderName ← FALSE;
    };
  ENDCASE;
 ENDLOOP;

IF jobParms.defaulted.jobCreateDate THEN jobParms.createDate ← Time.Current[];

IF jobParms.defaulted.recipientName AND ˜jobParms.defaulted.senderName THEN
 jobParms.recipientName ← String.CopyToNewString[
  s: jobParms.senderName, z: zone];

IF jobParms.finishing # portraitSingleStitch THEN
 jobParms.finishing ←
  SELECT defaultsRec.finishing FROM none = > none, ENDCASE = > sampleTray;


IF jobParms.defaulted.plex THEN
 SELECT defaultsRec.plex FROM
  duplex = > jobParms.plex ← duplex;
  intermixed = > jobParms.plex ← duplex;
  simplex = > jobParms.plex ← simplex;
  ENDCASE;

IF ˜jobParms.defaulted.medium AND System.switches['U] = down THEN
 jobParms.defaulted.medium ← TRUE;

IF NOT streamOn THEN
 [jobParms.ipFileID, masterSize, version] ← Print3Stream.SpoolToDisk[
  ipFileSize, master, jobParms.jobName, bypass !
  UNWIND = > CleanUp[jobParms, streamOn, TRUE, profile, zone]; ];

IF bypass THEN
 [] ← Print3Stream.RegisterFile[
  fileName: jobParms.jobName, fileID: protocolFile, postfix: [".ii"L, 0, 3],
  fileNumber: version, forceNumber: TRUE, ipCaptureMode: bypass];

printRequestID.jobID ← SMNetSupport.Print[@jobParms];
```

Copyright © 1992 Xerox Corporation All Rights Reserved

```
IF printRequestID.jobID = JobID.nullID THEN {
 CleanUp[jobParms, streamOn, TRUE, profile, zone];
 IF NOT streamOn THEN {
  DeleteFile[jobParms.ipFileID];
  Print3Status.CloseDiskConnection[masterSize]};
 IF bypass THEN DeleteFile[protocolFile];
 ERROR SpoolingQueueFull};

IF streamOn THEN
 BEGIN
 callBackProc: Print3SM.CallBackProc;
 [aborted, sH, clientStatus, callBackProc] ← Print3Stream.AddNetJob[
  printRequestID.jobID];

 IF aborted THEN {
  Print3Stream.Abort[printRequestID.jobID];
  Print3Stream.Delete[printRequestID.jobID];
  CleanUp[jobParms, streamOn, FALSE, profile, zone];
  Print3Stream.RaiseError[clientStatus];
  };

 Print3Stream.SpoolToPreParser[
  clientID: printRequestID.jobID, fileSizeInBytes: ipFileSize,
  master: master, sH: sH, callBackProc: callBackProc !
  UNWIND => {
   CleanUp[jobParms, streamOn, FALSE, profile, zone];
   Print3Stream.Delete[printRequestID.jobID];
   }; ];
 Print3Stream.Delete[printRequestID.jobID];
 END
ELSE
 NetworkLog.LogNetJob[
  netLogRecord: [
  jobID: printRequestID.jobID, objectName: jobParms.jobName,
  senderName: jobParms.senderName, version: 1,
  submissionTime: Time.Current[], destination: printQueue,
  messageStatus: noMessage, jobStatus: received]];

CleanUp[jobParms, streamOn, FALSE, profile, zone];

END;


FreePrinterProperties: PUBLIC PROCEDURE [properties: Print3.PrinterProperties] =

 BEGIN
 FOR i: CARDINAL IN [0..LENGTH[properties]) DO
  WITH p: properties[i] SELECT FROM
   media => zone.FREE[@p.media.BASE];
   ENDCASE;
```

Copyright © 1992 Xerox Corporation All Rights Reserved

```
   ENDLOOP;

  zone.FREE[@properties.BASE];
  END;

 FreePrintRequestStatus: PUBLIC PROCEDURE [status: Print3.RequestStatus] =

  BEGIN zone.FREE[@status.BASE]; END;

 FreePrinterStatus: PUBLIC PROCEDURE [status: Print3.PrinterStatus] =

  BEGIN
  FOR i: CARDINAL IN [0..LENGTH[status]) DO
   WITH p: status[i] SELECT FROM media => zone.FREE[@p.media.BASE]; ENDCASE;
   ENDLOOP;

  zone.FREE[@status.BASE];
  END;


 CleanUp: PROCEDURE [
  job: SMNetSupport.JobParms, streamOn: BOOLEAN, error: BOOLEAN,
  userProfile: UserProfile.SecAdminViewHandle, z: UNCOUNTED ZONE] =
  BEGIN
  ACConfigSecAdm.FreeNetUserName[@job.owner, z];
  UPSecAdmin.FreeSecAdminView[ptr: @userProfile, z: z];
  IF job.message # NIL THEN String.FreeString[z: z, s: job.message];
  IF job.recipientName # NIL THEN String.FreeString[z: z, s: job.recipientName];
  IF job.senderName # NIL THEN String.FreeString[z: z, s: job.senderName];
  IF ~job.defaulted.jobName AND job.jobName # NIL THEN
   String.FreeString[z: z, s: job.jobName];
  IF job.media[0].name # NIL THEN String.FreeString[z: z, s: job.media[0].name];
  IF job.media[0].message # NIL THEN
   String.FreeString[z: z, s: job.media[0].name];
  IF job.media[0].otherPaperType # NIL THEN
   String.FreeString[z: z, s: job.media[0].name];
  IF job.media[0].otherColor # NIL THEN
   String.FreeString[z: z, s: job.media[0].name];

  Print3Status.CloseConnection[streamOn, error];
  END;

 TranslateKnownSize: PROCEDURE [knownSize: PublicPrinting.PaperSize]
  RETURNS [dims: PublicPrinting.MediumDimensions] =
  BEGIN
  width: CARDINAL;
  length: CARDINAL;
  SELECT knownSize FROM
   dontUse => ERROR MediumUnavailable;
   usLetter => {width ← 216; length ← 279};
```

Copyright © 1992 Xerox Corporation All Rights Reserved

```
usLegal => {width ← 216; length ← 356};
a3 => {width ← 297; length ← 420};
a4 => {width ← 210; length ← 297};
isoB4 => {width ← 250; length ← 353};
jisB4 => {width ← 257; length ← 364};

a0 => {width ← 841; length ← 1189};
a1 => {width ← 594; length ← 841};
a2 => {width ← 420; length ← 594};
a5 => {width ← 148; length ← 210};
a6 => {width ← 105; length ← 148};
a7 => {width ← 74; length ← 105};
a8 => {width ← 52; length ← 74};
a9 => {width ← 37; length ← 52};
a10 => {width ← 26; length ← 37};

isoB0 => {width ← 1000; length ← 1414};
isoB1 => {width ← 707; length ← 1000};
isoB2 => {width ← 500; length ← 707};
isoB3 => {width ← 353; length ← 500};
isoB5 => {width ← 176; length ← 250};
isoB6 => {width ← 125; length ← 176};
isoB7 => {width ← 88; length ← 125};
isoB8 => {width ← 62; length ← 88};
isoB9 => {width ← 44; length ← 62};
isoB10 => {width ← 31; length ← 44};

jisB0 => {width ← 1030; length ← 1456};
jisB1 => {width ← 728; length ← 1030};
jisB2 => {width ← 515; length ← 728};
jisB3 => {width ← 364; length ← 515};
jisB5 => {width ← 182; length ← 257};
jisB6 => {width ← 128; length ← 182};
jisB7 => {width ← 91; length ← 128};
jisB8 => {width ← 64; length ← 91};
jisB9 => {width ← 45; length ← 64};
jisB10 => {width ← 32; length ← 45};

ENDCASE => ERROR MediumUnavailable;
dims ← [width, length];
END;

CS: PROCEDURE [string: LONG STRING, max: CARDINAL] =
BEGIN
IF string.length > max THEN {
 string.length ← max;
 IF max > 3 THEN {
  string[max - 1] ← '.; string[max - 2] ← '.; string[max - 3] ← '.; };
 };
END;
```

Copyright © 1992 Xerox Corporation All Rights Reserved

```
DumpInstructions: PROCEDURE [
 printAttributes: Print3.PrintAttributes, printOptions: Print3.PrintOptions]
 RETURNS [fileID: RTOSFile.FileID ← RTOSFile.nullID] =
 BEGIN
 rec: ProtocolPtr ← NIL;
 base: BasePtr ← NIL;
 words: CARDINAL ← 0;
 pages: ResMgrStorage.Pages ← 0;
 num: CARDINAL ← 0;
 buffer: ResMgrStorage.BufferList ← NIL;
 tempOffset: CharArrayOffset ← LOOPHOLE[SIZE[ProtocolRecord]];

 FOR i: CARDINAL IN [0..LENGTH[printOptions]) DO
  WITH p: printOptions[i] SELECT FROM
   recipientName = > {
    num ← String.Length[p.recipientName];
    IF num # 0 THEN words ← words + ((num + 1) / 2)};
   message = > {
    num ← String.Length[p.message];
    IF num # 0 THEN words ← words + ((num + 1) / 2)};
   ENDCASE;
  ENDLOOP;
 FOR i: CARDINAL IN [0..LENGTH[printAttributes]) DO
  WITH p: printAttributes[i] SELECT FROM
   printObjectName = > {
    num ← String.Length[p.printObjectName];
    IF num # 0 THEN words ← words + ((num + 1) / 2)};
   senderName = > {
    num ← String.Length[p.senderName];
    IF num # 0 THEN words ← words + ((num + 1) / 2)};
   ENDCASE;
  ENDLOOP;
 words ← words + SIZE[ProtocolRecord];
 pages ← ResMgrStorage.PagesFromWords[words];

 buffer ← ResMgr.Allocate[
  id: [trans: captureIP, module: netServe], Pages: pages, base: NIL,
  waitTillAvailable: TRUE !
  ResMgr.Error = >
   IF code = needToCoalesce THEN ERROR InsufficientSpoolSpace
   ELSE ERROR SystemError];
 IF buffer = NIL THEN SystemError;

 rec ← buffer.base;
 base ← rec;

 rec ↑ ← [];

 FOR i: CARDINAL IN [0..LENGTH[printOptions]) DO
```

Copyright © 1992 Xerox Corporation All Rights Reserved

```
WITH p: printOptions[i] SELECT FROM
 printObjectSize = > {
  rec.printObjectSize ← p.printObjectSize; rec.specified.size ← TRUE};
 recipientName = > {
  IF NOT String.Equal[p.recipientName, ""L] THEN {
   rec.recipientNameRel ← tempOffset;
   tempOffset ← tempOffset + LOOPHOLE[(p.recipientName.length + 1) / 2];
   rec.recipientNameLength ← p.recipientName.length;
   FOR i: CARDINAL IN [0..p.recipientName.length) DO
    base[rec.recipientNameRel][i] ← p.recipientName[i]; ENDLOOP;
   };
  rec.specified.recipient ← TRUE};
 message = > {
  IF NOT String.Equal[p.message, ""L] THEN {
   rec.messageRel ← tempOffset;
   tempOffset ← tempOffset + LOOPHOLE[(p.message.length + 1) / 2];
   rec.messageLength ← p.message.length;
   FOR i: CARDINAL IN [0..p.message.length) DO
    base[rec.messageRel][i] ← p.message[i]; ENDLOOP;
   };
  rec.specified.msg ← TRUE};
 copyCount = > {rec.copyCount ← p.copyCount; rec.specified.count ← TRUE};
 pagesToPrint = > {
  rec.beginningPageNumber ← p.pagesToPrint.beginningPageNumber;
  rec.endingPageNumber ← p.pagesToPrint.endingPageNumber;
  rec.specified.pages ← TRUE;
  };
 mediumHint = > {
  WITH q: p.mediumHint SELECT FROM
   paper = >
    WITH j: q.paper SELECT FROM
     unknown = > rec.mediumHint ← unknown;
     knownSize = > {
      rec.mediumHint ← knownSize; rec.knownSize ← j.knownSize; };
     otherSize = > {
      rec.mediumHint ← otherSize;
      rec.widthInMillimeters ← j.otherSize.widthInMillimeters;
      rec.lengthInMillimeters ← j.otherSize.lengthInMillimeters;
      };
     ENDCASE = > rec.paperError ← TRUE;
   ENDCASE = > rec.mediumError ← TRUE;
  rec.specified.medium ← TRUE};
 priorityHint = > {
  rec.priorityHint ← p.priorityHint; rec.specified.priority ← TRUE};
 releaseKey = > {
  rec.releaseKey ← p.releaseKey; rec.specified.release ← TRUE};
 staple = > {rec.staple ← p.staple.value; rec.specified.finish ← TRUE};
 twoSided = > {rec.twoSided ← p.twoSided.value; rec.specified.plex ← TRUE};
 ENDCASE = > rec.optionsError ← TRUE;
ENDLOOP;
```

Copyright © 1992 Xerox Corporation All Rights Reserved

```
FOR i: CARDINAL IN [0..LENGTH[printAttributes]) DO
 WITH p: printAttributes[i] SELECT FROM
  printObjectName => {
   IF NOT String.Equal[p.printObjectName, ""L] THEN {
    rec.printObjectNameRel ← tempOffset;
    tempOffset ←
     tempOffset + LOOPHOLE[(p.printObjectName.length + 1) / 2];
    rec.printObjectNameLength ← p.printObjectName.length;
    FOR i: CARDINAL IN [0..p.printObjectName.length) DO
     base[rec.printObjectNameRel][i] ← p.printObjectName[i]; ENDLOOP;
    };
   rec.specified.name ← TRUE};
  printObjectCreateDate => {
   rec.printObjectCreateDate ← p.printObjectCreateDate;
   rec.specified.createDate ← TRUE};
  senderName => {
   IF NOT String.Equal[p.senderName, ""L] THEN {
    rec.senderNameRel ← tempOffset;
    tempOffset ← tempOffset + LOOPHOLE[(p.senderName.length + 1) / 2];
    rec.senderNameLength ← p.senderName.length;
    FOR i: CARDINAL IN [0..p.senderName.length) DO
     base[rec.senderNameRel][i] ← p.senderName[i]; ENDLOOP;
    };
   rec.specified.sender ← TRUE};
  ENDCASE => rec.attributesError ← TRUE;
 ENDLOOP;

fileID ← RTOSFile.Create[
 fileType: ASWFileTypes.ipCapture, size: pages, replicated: FALSE,
 contiguous: FALSE !
 RTOSFile.Error =>
  SELECT errorType FROM
   insufficientContiguousSpace, noSpace => InsufficientSpoolSpace;
   ENDCASE => SystemError];
ResMgr.WriteSync[
 id: [trans: captureIP, module: netServe], freeWhenComplete: TRUE,
 fileID: fileID, fileOffset: 0, buffer: buffer, transferSize: pages !
 ResMgr.Error => SystemError]

END;

DeleteFile: PROCEDURE [fileID: RTOSFile.FileID] =
 BEGIN
 ENABLE BEGIN RMDirectory.Error => CONTINUE; RTOSFile.Error => CONTINUE; END;

 fileName: LONG STRING ← [RMDirectory.maxNameLength];
 RMDirectory.NameFromId[name: fileName, id: fileID];
 RMDirectory.UnRegister[name: fileName];
 RTOSFile.Delete[fileID: fileID];
```

Copyright © 1992 Xerox Corporation All Rights Reserved

```
END;

XlateMedium: PROCEDURE [medium: PublicPrinting.InternalMedium]
 RETURNS [paper: Print3.Paper] =

 BEGIN
 width: CARDINAL ← medium.mediumDimensions.widthInMillimeters;
 length: CARDINAL ← medium.mediumDimensions.lengthInMillimeters;
 name: PublicPrinting.PaperSize ← dontUse;

 name ←
  SELECT width FROM
   216 =>
    IF length = 279 THEN usLetter
    ELSE IF length = 356 THEN usLegal ELSE dontUse,
   841 => IF length = 1189 THEN a0 ELSE dontUse,
   594 => IF length = 841 THEN a1 ELSE dontUse,
   420 => IF length = 594 THEN a2 ELSE dontUse,
   297 => IF length = 420 THEN a3 ELSE dontUse,
   210 => IF length = 297 THEN a4 ELSE dontUse,
   148 => IF length = 297 THEN a5 ELSE dontUse,
   105 => IF length = 148 THEN a6 ELSE dontUse,
   74 => IF length = 105 THEN a7 ELSE dontUse,
   52 => IF length = 74 THEN a8 ELSE dontUse,
   37 => IF length = 52 THEN a9 ELSE dontUse,

   1000 => IF length = 1414 THEN isoB0 ELSE dontUse,
   707 => IF length = 1000 THEN isoB1 ELSE dontUse,
   500 => IF length = 707 THEN isoB2 ELSE dontUse,
   353 => IF length = 500 THEN isoB3 ELSE dontUse,
   250 => IF length = 353 THEN isoB4 ELSE dontUse,
   176 => IF length = 250 THEN isoB5 ELSE dontUse,
   125 => IF length = 176 THEN isoB6 ELSE dontUse,
   88 => IF length = 125 THEN isoB7 ELSE dontUse,
   62 => IF length = 88 THEN isoB8 ELSE dontUse,
   44 => IF length = 62 THEN isoB9 ELSE dontUse,
   31 => IF length = 44 THEN isoB10 ELSE dontUse,

   1030 => IF length = 1456 THEN jisB0 ELSE dontUse,
   728 => IF length = 1030 THEN jisB1 ELSE dontUse,
   515 => IF length = 728 THEN jisB2 ELSE dontUse,
   364 => IF length = 515 THEN jisB3 ELSE dontUse,
   257 => IF length = 364 THEN jisB4 ELSE dontUse,
   182 => IF length = 257 THEN jisB5 ELSE dontUse,
   128 => IF length = 182 THEN jisB6 ELSE dontUse,
   91 => IF length = 128 THEN jisB7 ELSE dontUse,
   64 => IF length = 91 THEN jisB8 ELSE dontUse,
   45 => IF length = 64 THEN jisB9 ELSE dontUse,
   32 => IF length = 45 THEN jisB9 ELSE dontUse,
```

Copyright © 1992 Xerox Corporation All Rights Reserved

```
    ENDCASE => dontUse;

  IF name # dontUse THEN paper ← [knownSize[name]]
  ELSE paper ← [otherSize[[width, length]]];

  END;

END.
```

Copyright © 1992 Xerox Corporation All Rights Reserved

```
DIRECTORY
 BlockStream USING [Block, StreamHandle],
 EventHandler USING [
  FaultPointer, ID, LoggerPointer, PriorityType, ReportFaultChange],
 FaultLogger USING [ID, Log],
 JobID USING [ID, nullID],
 NodeHandler USING [RequestFaultNode, RequestUniqueID],
 Print3Status USING [CloseDiskConnection, CloseStreamConnection, heap],
 Print3Stream USING [SpoolFromDisk],
 Print3SM USING [CallBackProc, MgrStatus, Operation, Source, SourceStatus],
 Process USING [
  Detach, DisableTimeout, InitializeCondition, SetTimeout, SecondsToTicks,
  Ticks],
 ResMgrStorage USING [Pages],
 RTOSFile USING [FileID],
 SSCRollover USING [WaitForRoll];

Print3SMImpl: MONITOR
 IMPORTS
  EventHandler, FaultLogger, NodeHandler, Print3Status, Print3Stream, Process,
  SSCRollover
 EXPORTS Print3Stream, Print3SM =

 BEGIN

 State: TYPE = {
  streamReady, mgrReady, running, completed, waiting, streamAborted,
  mgrAborted};

 ContextHandle: TYPE = LONG POINTER TO ContextNode;
 ContextNode: TYPE = RECORD [
  state: State,
  netStatus: Print3SM.SourceStatus ← running,
  mgrStatus: Print3SM.MgrStatus ← noError,
  source: Print3SM.Source,
  sH: BlockStream.StreamHandle ← NIL,
  callBack: Print3SM.CallBackProc,
  id: JobID.ID ← JobID.nullID,
  wait: CONDITION,
  next: ContextHandle ← NIL];


 headList: ContextHandle ← NIL;
 contextCount: CARDINAL ← 0;
 timeout: Process.Ticks ← 0;

 CloseSource: PUBLIC ENTRY PROCEDURE [
  source: Print3SM.Source, size: ResMgrStorage.Pages] =
```

Copyright © 1992 Xerox Corporation All Rights Reserved

```
BEGIN
ENABLE UNWIND => NULL;

SELECT source FROM
 disk => Print3Status.CloseDiskConnection[size];
 net => Print3Status.CloseStreamConnection[];
 ENDCASE;
END;

OperateOnSource: PUBLIC ENTRY PROCEDURE [
 clientID: JobID.ID, operation: Print3SM.Operation, why: Print3SM.MgrStatus]
 RETURNS [status: Print3SM.SourceStatus] =
 BEGIN
 ENABLE UNWIND => NULL;
 p: ContextHandle ← headList;

 WHILE p # NIL DO
  IF p.id = clientID THEN
   BEGIN
   IF why # noError AND p.mgrStatus = noError THEN p.mgrStatus ← why;
   SELECT operation FROM

    abort => {
     SELECT p.state FROM
      running => p.state ← mgrAborted;
      waiting => {
       IF why = serviceUnavailable OR why = spoolingDisabled THEN
        RETURN[status: completed];
       p.state ← mgrAborted;
       NOTIFY p.wait;
       RETURN[status: running];
       };
      streamReady, mgrReady => {p.state ← mgrAborted; NOTIFY p.wait; };
      streamAborted => NULL;
      completed => RETURN[status: completed];
      mgrAborted => NULL;
      ENDCASE => FatalError[p.id];
     RETURN[status: p.netStatus];
     };


    returnPrintID => {
     SELECT p.state FROM
      waiting => NOTIFY p.wait;
      completed => NULL;
      streamAborted => NULL;
      ENDCASE => FatalError[p.id];
     RETURN[status: p.netStatus];
     };
```

Copyright © 1992 Xerox Corporation All Rights Reserved

```
    cancelJob => {
     SELECT p.state FROM
      streamReady => {p.state ← mgrAborted; NOTIFY p.wait; };
      ENDCASE => FatalError[p.id];
     Print3Status.CloseStreamConnection[];
     RETURN[status: p.netStatus];
     };
    ENDCASE;
   END;
  p ← p.next;
  ENDLOOP;

 IF operation = cancelJob THEN RETURN[status: spare1];

 status ← completed;
 END;

StartSource: PUBLIC ENTRY PROCEDURE [
 clientID: JobID.ID, source: Print3SM.Source,
 streamHandle: BlockStream.StreamHandle, fileID: RTOSFile.FileID,
 callBackProc: Print3SM.CallBackProc]
 RETURNS [netStatus: Print3SM.SourceStatus ← completed] =
 BEGIN
 ENABLE UNWIND => NULL;
 p: ContextHandle ← headList;

 SELECT source FROM

  disk =>
   BEGIN
   p ← Register[clientID, running, disk];
   p.sH ← streamHandle;
   p.callBack ← callBackProc;
   Process.Detach[
    FORK Print3Stream.SpoolFromDisk[
    fileID: fileID, clientID: clientID, streamHandle: streamHandle,
    callBackProc: callBackProc]];
   RETURN[running];
   END;

  net =>
   BEGIN
   WHILE p # NIL DO
    IF p.id = clientID THEN
     SELECT p.state FROM
      streamReady => {
       p.sH ← streamHandle;
       p.callBack ← callBackProc;
```

Copyright © 1992 Xerox Corporation All Rights Reserved

```
        p.state ← mgrReady;
        NOTIFY p.wait;
        RETURN[running];
        };
       ENDCASE => FatalError[p.id];
     p ← p.next;
     ENDLOOP;
    p ← Register[clientID, mgrReady, net];
    p.sH ← streamHandle;
    p.callBack ← callBackProc;
    WAIT p.wait;
    RETURN[running];
    END;

   ENDCASE;

  END;


 Abort: PUBLIC ENTRY PROCEDURE [clientID: JobID.ID] =
  BEGIN
  ENABLE UNWIND => NULL;
  p: ContextHandle ← headList;
  WHILE p # NIL DO
   IF p.id = clientID THEN
    BEGIN p.netStatus ← completed; p.state ← streamAborted; RETURN; END;
   p ← p.next;
   ENDLOOP;
  END;

 AddNetJob: PUBLIC ENTRY PROCEDURE [clientID: JobID.ID]
  RETURNS [
   abort: BOOLEAN ← FALSE, sH: BlockStream.StreamHandle ← NIL,
   status: Print3SM.MgrStatus ← noError,
   callBackProc: Print3SM.CallBackProc ← NIL] =
  BEGIN
  ENABLE UNWIND => NULL;
  p: ContextHandle ← headList;


  WHILE p # NIL DO
   IF p.id = clientID THEN
    BEGIN
    NOTIFY p.wait;
    IF p.state = mgrAborted THEN RETURN[abort: TRUE, status: p.mgrStatus];
    p.state ← running;
    RETURN[sH: p.sH, callBackProc: p.callBack];
    END;
   p ← p.next;
   ENDLOOP;
```

Copyright © 1992 Xerox Corporation All Rights Reserved

```
 p ← Register[clientID, streamReady, net];
 WAIT p.wait;
 IF p.state = mgrAborted THEN RETURN[abort: TRUE, status: p.mgrStatus];
 p.state ← running;
 sH ← p.sH;
 callBackProc ← p.callBack;
 END;

Delete: PUBLIC ENTRY PROCEDURE [clientID: JobID.ID] =
 BEGIN
 ENABLE UNWIND => NULL;
 p: ContextHandle ← headList;
 IF p.id = clientID THEN
  BEGIN
  contextCount ← contextCount - 1;
  headList ← p.next;
  Print3Status.heap.FREE[@p];
  RETURN;
  END
 ELSE
  BEGIN
  pp: ContextHandle ← p.next;
  WHILE pp # NIL DO
   IF pp.id = clientID THEN
    BEGIN
    contextCount ← contextCount - 1;
    p.next ← pp.next;
    Print3Status.heap.FREE[@pp];
    RETURN;
    END;
   pp ← pp.next;
   p ← p.next;
   ENDLOOP;
  END;
 FatalError[JobID.nullID];
 END;

InitList: PUBLIC ENTRY PROCEDURE =
 BEGIN
 ENABLE UNWIND => NULL;
 timeout ← Process.SecondsToTicks[seconds: 20];
 headList ← NIL;
 contextCount ← 0;
 END;

Transmit: PUBLIC PROCEDURE [
 clientID: JobID.ID, sh: BlockStream.StreamHandle, block: BlockStream.Block,
 eof: BOOLEAN]
 RETURNS [
```

Copyright © 1992 Xerox Corporation All Rights Reserved

```
  abort: BOOLEAN ← FALSE, blockReturned: BOOLEAN ← FALSE,
  status: Print3SM.MgrStatus ← noError] =
 BEGIN
 p: ContextHandle ← NIL;

 [abort, blockReturned, status, p] ← TransmitInternal[
  clientID, sh, block, eof];

 IF NOT abort THEN
  BEGIN
  sh.transmit[sh, block];
  IF eof THEN {
   sh.setEOF[sh]; [abort, blockReturned, status] ← DoEOF[p, sh]; };
  END;
 END;


DoEOF: ENTRY PROCEDURE [p: ContextHandle, sh: BlockStream.StreamHandle]
 RETURNS [
  abort: BOOLEAN ← FALSE, blockReturned: BOOLEAN ← FALSE,
  status: Print3SM.MgrStatus ← noError] =
 BEGIN
 ENABLE UNWIND = > NULL;
 p.netStatus ← completed;
 SELECT p.source FROM
  disk = > p.state ← completed;
  net = >
   BEGIN
   Process.SetTimeout[condition: @p.wait, ticks: timeout];
   p.state ← waiting;
   WAIT p.wait;
   IF p.state = mgrAborted THEN RETURN[TRUE, TRUE, p.mgrStatus];
   p.state ← completed;
   END;
  ENDCASE;
 END;

TransmitInternal: ENTRY PROCEDURE [
 clientID: JobID.ID, sh: BlockStream.StreamHandle, block: BlockStream.Block,
 eof: BOOLEAN]
 RETURNS [
  abort: BOOLEAN ← FALSE, blockReturned: BOOLEAN ← FALSE,
  status: Print3SM.MgrStatus ← noError, p: ContextHandle] =
 BEGIN
 ENABLE UNWIND = > NULL;
 p ← headList;
 WHILE p # NIL DO
  IF p.id = clientID THEN
   SELECT p.state FROM
    mgrAborted, streamAborted = > RETURN[TRUE, FALSE, p.mgrStatus, p];
```

Copyright © 1992 Xerox Corporation All Rights Reserved

```
    running => RETURN[FALSE, TRUE, noError, p];
    ENDCASE => FatalError[p.id];
  p ← p.next;
  ENDLOOP;
 FatalError[JobID.nullID];
 END;

Register: PROCEDURE [clientID: JobID.ID, state: State, source: Print3SM.Source]
 RETURNS [p: ContextHandle ← NIL] =
 BEGIN
 p ← Print3Status.heap.NEW[ContextNode];
 p.id ← clientID;
 p.state ← state;
 p.source ← source;
 contextCount ← contextCount + 1;
 Process.InitializeCondition[condition: @p.wait, ticks: 1];
 Process.DisableTimeout[condition: @p.wait];
 IF headList = NIL THEN headList ← p ELSE {p.next ← headList; headList ← p; };
 END;

FatalError: PROCEDURE [jobID: JobID.ID] =
 BEGIN
 faultPtr: EventHandler.FaultPointer;
 uniqueIDNode: EventHandler.LoggerPointer;
 id: FaultLogger.ID;

 id ← FaultLogger.Log[
  fault: [subsystem: control, swModule: sysMgr, faultNumber: 1600]];
 faultPtr ← NodeHandler.RequestFaultNode[number: 1];
 uniqueIDNode ← NodeHandler.RequestUniqueID[number: 1];
 uniqueIDNode ↑ ← [uniqueID: id, next: NIL];
 faultPtr ↑ ← [
  record: [
  faultBucket: 4404, priority: operNow, mask: FALSE, sense: 0, zone: 0,
  uniqueID: uniqueIDNode, jobID: jobID], next: NIL, prev: NIL];

 EventHandler.ReportFaultChange[
  id: [trans: captureIP, module: preParse],
  faultList: [adds: faultPtr, deletes: NIL, changes: NIL, notifies: NIL]];
 SSCRollover.WaitForRoll[];

 END;

END.
```

Copyright © 1992 Xerox Corporation All Rights Reserved

```
DIRECTORY
 Courier USING [ExportRemoteProgram, UnexportRemoteProgram],
 EventHandler USING [MemoryActionCompleteProcType],
 Heap USING [systemZone],
 JobQPlus USING [GetNumberOfJobs],
 NetServSM USING [],
 NetServSMExtra USING [],
 PublicPrinting USING [Spooler],
 Print3 USING [
  Busy, ServiceUnavailable, SpoolingDisabled, TooManyClients,
  InsufficientSpoolSpace, SpoolingQueueFull],
 Print3Control USING [],
 Print3Courier USING [Dispatcher, Init, programNumber, version],
 Print3Status USING [],
 Print3Stream USING [connectionLimit, InitList],
 Process USING [Detach],
 ResMgrIDs USING [TransactionID],
 ResMgrStorage USING [bytesPerPage, Pages],
 System USING [switches];

Print3StatusImpl: MONITOR
 IMPORTS
  Courier, Heap, JobQPlus, Print3, Print3Courier, Print3Stream, Process, System
 EXPORTS Print3Control, NetServSM, NetServSMExtra, Print3Status, Print3Stream =

 BEGIN

 spoolingEnabled: BOOLEAN ← FALSE;
 serviceEnabled: BOOLEAN ← TRUE;
 serviceON: BOOLEAN ← FALSE;
 streamAvailable: BOOLEAN ← TRUE;
 purgeON: BOOLEAN ← TRUE;
 shutdown: BOOLEAN ← FALSE;

 diskUsage: ResMgrStorage.Pages ← 0;
 maxDiskUsage: ResMgrStorage.Pages ← 8000;
 openConnections: CARDINAL ← 0;
 maxConnections: CARDINAL ← 1;
 maxConnectionsOffPSwitch: CARDINAL = 6;

 heap: PUBLIC UNCOUNTED ZONE ← Heap.systemZone;
 pagesInBuffer: PUBLIC CARDINAL ← 10;
 bytesInBuffer: PUBLIC CARDINAL ← pagesInBuffer * ResMgrStorage.bytesPerPage;

 memoryClearProc: EventHandler.MemoryActionCompleteProcType ← NIL;


 Shutdown: PUBLIC ENTRY PROCEDURE [
  id: ResMgrIDs.TransactionID,
```

Copyright © 1992 Xerox Corporation All Rights Reserved

```
proc: EventHandler.MemoryActionCompleteProcType] =

BEGIN
ENABLE UNWIND => NULL;

spoolingEnabled ← FALSE;
shutdown ← TRUE;

IF openConnections = 0 THEN {
 Process.Detach[FORK proc[[captureIP, signature]]]; RETURN; };

memoryClearProc ← proc;
END;

Resume: PUBLIC ENTRY PROCEDURE [] =

BEGIN
ENABLE UNWIND => NULL;

spoolingEnabled ← TRUE;
shutdown ← FALSE;
END;

CheckStatus: PUBLIC ENTRY PROCEDURE [] RETURNS [disabled: BOOLEAN] =

BEGIN
ENABLE UNWIND => NULL;

disabled ←
 IF shutdown OR NOT serviceEnabled OR NOT spoolingEnabled THEN TRUE
 ELSE FALSE;
END;

CheckServiceEnabled: PUBLIC ENTRY PROCEDURE [] =

BEGIN
ENABLE UNWIND => NULL;

IF purgeON THEN RETURN WITH ERROR Print3.Busy;

IF NOT serviceEnabled THEN RETURN WITH ERROR Print3.ServiceUnavailable;
END;

CloseConnection: PUBLIC ENTRY PROCEDURE [streamOn: BOOLEAN, error: BOOLEAN] =

BEGIN
ENABLE UNWIND => NULL;

IF error THEN {
 IF openConnections # 0 THEN openConnections ← openConnections - 1;
```

Copyright © 1992 Xerox Corporation All Rights Reserved

```
  IF streamOn THEN streamAvailable ← TRUE;
  }
 ELSE
  IF NOT streamOn AND openConnections # 0 THEN
   openConnections ← openConnections - 1;

 IF shutdown THEN DoShutdown[];
 END;

CloseDiskConnection: PUBLIC ENTRY PROCEDURE [size: ResMgrStorage.Pages] =

 BEGIN
 ENABLE UNWIND => NULL;

 IF diskUsage <= size THEN diskUsage ← 0 ELSE diskUsage ← diskUsage - size;
 END;

CloseStreamConnection: PUBLIC ENTRY PROCEDURE [] =

 BEGIN
 ENABLE UNWIND => NULL;

 streamAvailable ← TRUE;
 IF openConnections # 0 THEN openConnections ← openConnections - 1;
 IF shutdown THEN DoShutdown[];
 END;

ExportService: PUBLIC ENTRY PROCEDURE [] =

 BEGIN
 ENABLE UNWIND => NULL;

 IF serviceON THEN RETURN;

 Courier.ExportRemoteProgram[
  programNumber: Print3Courier.programNumber,
  versionRange: [Print3Courier.version, Print3Courier.version], zone: heap,
  dispatcher: Print3Courier.Dispatcher, classOfService: bulk,
  serviceName: "PrintProtocol"L];

 serviceON ← TRUE;
 END;

Init: PUBLIC ENTRY PROCEDURE [] =

 BEGIN
 ENABLE UNWIND => NULL;

 Print3Stream.InitList[];
 Print3Courier.Init[];
```

Copyright © 1992 Xerox Corporation All Rights Reserved

```
  IF System.switches['P] = down THEN maxConnections ← maxConnectionsOffPSwitch;
  IF System.switches['n] = down THEN maxDiskUsage ← LAST[LONG CARDINAL];
  END;

 CheckDiskUsage: PUBLIC ENTRY PROCEDURE [
  masterSize: ResMgrStorage.Pages, completed: BOOLEAN] =

  BEGIN
  ENABLE UNWIND => NULL;

  IF (diskUsage + masterSize) >= maxDiskUsage THEN
   RETURN WITH ERROR Print3.InsufficientSpoolSpace;
  IF completed THEN diskUsage ← diskUsage + masterSize;
  END;

 GetSpoolingStatus: PUBLIC ENTRY PROCEDURE []
  RETURNS [status: PublicPrinting.Spooler] =

  BEGIN
  ENABLE UNWIND => NULL;

  IF NOT spoolingEnabled THEN status ← disabled
  ELSE
   IF JobQPlus.GetNumberOfJobs[].systemLimitReached THEN status ← full
   ELSE
    IF openConnections < maxConnections THEN status ← available
    ELSE status ← busy;
  END;

 OpenConnection: PUBLIC ENTRY PROCEDURE [] RETURNS [streamOn: BOOLEAN ←
FALSE] =

  BEGIN
  ENABLE UNWIND => NULL;

  IF NOT spoolingEnabled THEN RETURN WITH ERROR Print3.SpoolingDisabled;

  IF JobQPlus.GetNumberOfJobs[].systemLimitReached THEN
   RETURN WITH ERROR Print3.SpoolingQueueFull;

  IF openConnections >= maxConnections THEN
   RETURN WITH ERROR Print3.TooManyClients;

  IF streamAvailable THEN BEGIN streamOn ← TRUE; streamAvailable ← FALSE; END;

  openConnections ← openConnections + 1;
  END;

 PurgeCompleted: PUBLIC ENTRY PROCEDURE [] =
  BEGIN
```

Copyright © 1992 Xerox Corporation All Rights Reserved

```
 purgeON ← FALSE;
 END;

SetJobQueueDepth: PUBLIC ENTRY PROCEDURE [depth: CARDINAL] =
 BEGIN
 ENABLE UNWIND = > NULL;

 END;

SetMaxConnections: PUBLIC ENTRY PROCEDURE [newLimit: CARDINAL]
 RETURNS [ok: BOOLEAN ← TRUE] =

 BEGIN
 ENABLE UNWIND = > NULL;

 IF openConnections # 0 THEN RETURN[ok: FALSE];

 IF newLimit IN [0..Print3Stream.connectionLimit] THEN
  BEGIN maxConnections ← newLimit; SetBufferSize[maxConnections]; END
 ELSE ok ← FALSE;
 END;

SetMaxDiskUsage: PUBLIC ENTRY PROCEDURE [pages: ResMgrStorage.Pages] =
 BEGIN
 ENABLE UNWIND = > NULL;

 maxDiskUsage ← pages;
 END;

SetPrint3ServerSwitch: PUBLIC ENTRY PROCEDURE [onLine: BOOLEAN] =

 BEGIN
 ENABLE UNWIND = > NULL;

 serviceEnabled ← onLine;
 END;

SetSpoolingSwitch: PUBLIC ENTRY PROCEDURE [enable: BOOLEAN] =

 BEGIN
 ENABLE UNWIND = > NULL;

 spoolingEnabled ← enable;
 END;

SetStreamSwitch: PUBLIC ENTRY PROCEDURE [enable: BOOLEAN] =

 BEGIN
 ENABLE UNWIND = > NULL;
```

Copyright © 1992 Xerox Corporation All Rights Reserved

```
 IF openConnections = 0 THEN streamAvailable ← enable;
 END;

UnexportService: PUBLIC ENTRY PROCEDURE [] =

 BEGIN
 ENABLE UNWIND => NULL;

 IF NOT serviceON THEN RETURN;

 Courier.UnexportRemoteProgram[
  programNumber: Print3Courier.programNumber,
  versionRange: [Print3Courier.version, Print3Courier.version]];

 serviceON ← FALSE;
 END;


DoShutdown: PROCEDURE [] =
 BEGIN
 IF openConnections = 0 AND memoryClearProc # NIL THEN {
  memoryClearProc[[captureIP, signature]]; memoryClearProc ← NIL; };
 END;

SetBufferSize: PROCEDURE [connections: CARDINAL] =
 BEGIN

 IF streamAvailable AND connections # 0 THEN connections ← connections - 1;

 pagesInBuffer ←
  SELECT connections FROM
   6 => 8,
   5 => 10,
   4 => 12,
   3 => 16,
   2 => 25,
   1 => 50,
   ENDCASE => 0;
 bytesInBuffer ← pagesInBuffer * ResMgrStorage.bytesPerPage;
 END;

END.
```

Copyright © 1992 Xerox Corporation All Rights Reserved

```
DIRECTORY
 ASWFileTypes USING [interpress, ipCapture],
 BlockStream USING [Block, nullBlock, StreamHandle],
 Courier USING [Error],
 Environment USING [Block],
 JobID USING [ID],
 Print3 USING [
  ConnectionError, InvalidPrintParameters, InsufficientSpoolSpace,
  MasterTooLarge, MediumUnavailable, ServiceUnavailable, SpoolingDisabled,
  SystemError, TooManyClients, Undefined],
 Print3SM USING [CallBackProc, MgrStatus, Problem],
 Print3Status USING [CheckDiskUsage, CheckStatus],
 Print3Stream USING [
  Abort, bytesInBuffer, defaultFileSize, Delete, extendFileBy, pagesInBuffer,
  Transmit],
 ResMgr USING [
  Abort, Allocate, ChainedWrite, Error, FreeBufferList, ReadSync,
  nullTransferID, TransferID, WaitForCompletion, WriteAsync],
 ResMgrStorage USING [
  BufferDescriptor, BufferList, bytesPerPage, Pages, PagesFromBytes],
 RMDirectory USING [
  Error, GetByteLengthForFileID, Register, IdFromName, SetByteLengthForFileID,
  UnRegister, maxNameLength, NameFromId],
 RTOSFile USING [
  Create, Delete, Error, Extend, FileID, GetFileInfo, nullID, Truncate],
 Stream USING [CompletionCode, GetBlock, Handle, TimeOut],
 String USING [
  AppendChar, AppendNumber, AppendSubString, Length, SubStringDescriptor,
  AppendString],
 XStream USING [BUG];

Print3StreamImpl: PROGRAM
 IMPORTS
  Courier, Print3, Print3Status, Print3Stream, ResMgr, ResMgrStorage,
  RMDirectory, RTOSFile, Stream, String, XStream
 EXPORTS Print3Stream =
 BEGIN


 RaiseError: PUBLIC PROCEDURE [status: Print3SM.MgrStatus] =
  BEGIN

  SELECT status FROM
   systemError, noError => ERROR Print3.SystemError;
   invalidPrintParameters => ERROR Print3.InvalidPrintParameters;
   masterTooLarge => ERROR Print3.MasterTooLarge;
   mediumUnavailable => ERROR Print3.MediumUnavailable;
   serviceUnavailable => ERROR Print3.ServiceUnavailable;
   spoolingDisabled => ERROR Print3.SpoolingDisabled;
```

Copyright © 1992 Xerox Corporation All Rights Reserved

```
  tooManyClients => ERROR Print3.TooManyClients;
  insufficientSpoolSpace => ERROR Print3.InsufficientSpoolSpace;
  ENDCASE => ERROR Print3.Undefined[0];
 END;

SpoolFromDisk: PUBLIC PROCEDURE [
 fileID: RTOSFile.FileID, clientID: JobID.ID,
 streamHandle: BlockStream.StreamHandle, callBackProc: Print3SM.CallBackProc] =
 BEGIN
 resMgrBuffer: ResMgrStorage.BufferDescriptor;
 fileOffset: ResMgrStorage.Pages ← 0;
 fileSizeInBytes: LONG CARDINAL ← 0;
 fileSizeInPages: ResMgrStorage.Pages ← 0;
 ipBlock: BlockStream.Block ← BlockStream.nullBlock;
 transSize: ResMgrStorage.Pages ← 0;
 bytesTransfered: LONG CARDINAL ← 0;
 aborted: BOOLEAN;
 blockReturned: BOOLEAN;
 finished: BOOLEAN;

 IF streamHandle = NIL THEN
  BEGIN
  Print3Stream.Abort[clientID];
  callBackProc[clientID: clientID, problem: [badStreamHandle[]]];
  Print3Stream.Delete[clientID: clientID];
  GOTO quit;
  END;

 fileSizeInBytes ← RMDirectory.GetByteLengthForFileID[
  id: fileID !
  RMDirectory.Error => {
   Print3Stream.Abort[clientID];
   streamHandle.setEOF[sH: streamHandle];
   callBackProc[
    clientID: clientID, problem: [directoryError[code, faultID]]];
   Print3Stream.Delete[clientID: clientID];
   GOTO quit}; ];

 fileSizeInPages ← ResMgrStorage.PagesFromBytes[fileSizeInBytes];

 DO
  [block: ipBlock] ← streamHandle.acquire[sH: streamHandle, length: 0];

  IF ipBlock = BlockStream.nullBlock THEN
   BEGIN
   callBackProc[clientID: clientID, problem: [invalidIPBuffer[code: 3]]];
   GOTO abort;
   END;

  transSize ← CheckTransSize[blockP: @ipBlock];
```

Copyright © 1992 Xerox Corporation All Rights Reserved

```
IF transSize = 0 THEN {
 callBackProc[clientID: clientID, problem: [invalidIPBuffer[code: 1]]];
 GOTO abortAndReturn};

IF (fileOffset + transSize) > fileSizeInPages THEN
 BEGIN
 IF fileOffset = 0 THEN transSize ← fileSizeInPages
 ELSE transSize ← fileSizeInPages - fileOffset;
 ipBlock.stopIndexPlusOne ← ResMgrStorage.bytesPerPage * transSize;
 END;

IF (transSize + fileOffset) = fileSizeInPages THEN {
 bytesTransfered ← ResMgrStorage.bytesPerPage * fileOffset;
 ipBlock.stopIndexPlusOne ← fileSizeInBytes - bytesTransfered;
 };

resMgrBuffer ← [
 base: LOOPHOLE[ipBlock.blockPointer], next: NIL, allocateSize: transSize,
 extendByPages: 0];
ResMgr.ReadSync[
 id: [trans: captureIP, module: netServe], fileID: fileID,
 fileOffset: fileOffset, buffer: @resMgrBuffer, transferSize: transSize !
 ResMgr.Error => {
  callBackProc[
   clientID: clientID,
   problem: [resMgrError[code: code, faultID: faultID]]];
  GOTO abortAndReturn}];

fileOffset ← transSize + fileOffset;

IF fileSizeInPages = fileOffset THEN finished ← TRUE ELSE finished ← FALSE;
[abort: aborted, blockReturned: blockReturned] ← Print3Stream.Transmit[
 clientID, streamHandle, ipBlock, finished];

IF aborted THEN {
 IF NOT blockReturned THEN GOTO abortAndReturn ELSE GOTO abort};

IF finished THEN GOTO exit;

REPEAT
 exit => NULL;
 abort =>
  BEGIN
  Print3Stream.Abort[clientID];
  streamHandle.setEOF[sH: streamHandle];
  END;
 abortAndReturn =>
  BEGIN
  Print3Stream.Abort[clientID];
  streamHandle.return[streamHandle, ipBlock];
```

Copyright © 1992 Xerox Corporation All Rights Reserved

```
    streamHandle.setEOF[sH: streamHandle];
    END;
  ENDLOOP;

 Print3Stream.Delete[clientID: clientID];

 EXITS quit = > NULL;
 END;

SpoolToDisk: PUBLIC PROCEDURE [
 ipFileSize: LONG CARDINAL, master: Stream.Handle, ipFileName: LONG STRING,
 ipCaptureMode: BOOLEAN]
 RETURNS [
  ipFile: RTOSFile.FileID ← RTOSFile.nullID,
  masterSize: ResMgrStorage.Pages ← 0, version: CARDINAL] =
 BEGIN
 initialSizeFile: ResMgrStorage.Pages ← Print3Stream.defaultFileSize;

 BEGIN
 ENABLE
  UNWIND = >
   BEGIN
   error: BOOLEAN ← FALSE;
   tempString: LONG STRING ← [RMDirectory.maxNameLength];
   IF ipFile # RTOSFile.nullID THEN
    BEGIN
    RTOSFile.Delete[ipFile];
    RMDirectory.NameFromId[
     tempString, ipFile ! RMDirectory.Error = > {error ← TRUE; CONTINUE}];
    IF NOT error THEN
     RMDirectory.UnRegister[
      name: tempString ! RMDirectory.Error = > CONTINUE];
    END;
   END;

 Print3Status.CheckDiskUsage[
  masterSize: ResMgrStorage.PagesFromBytes[ipFileSize], completed: FALSE];

 IF ipFileSize # 0 THEN
  initialSizeFile ← ResMgrStorage.PagesFromBytes[ipFileSize];

 ipFile ← RTOSFile.Create[
  fileType:
  IF ipCaptureMode THEN ASWFileTypes.ipCapture ELSE ASWFileTypes.interpress,
  size: initialSizeFile, replicated: FALSE, contiguous: FALSE !
  RTOSFile.Error = >
   SELECT errorType FROM
    insufficientContiguousSpace, noSpace = > Print3.InsufficientSpoolSpace;
    ENDCASE = > Print3.SystemError; ];
```

Copyright © 1992 Xerox Corporation All Rights Reserved

```
version ← RegisterFile[
 fileName: ipFileName, fileID: ipFile, postfix: [".ip"L, 0, 3],
 ipCaptureMode: ipCaptureMode];

RetrieveIPFile[ipFile, initialSizeFile, master];

masterSize ← RTOSFile.GetFileInfo[
 ipFile, NIL ! RTOSFile.Error = > CONTINUE].size;

Print3Status.CheckDiskUsage[masterSize: masterSize, completed: TRUE];

END;
END;

SpoolToPreParser: PUBLIC PROCEDURE [
 clientID: JobID.ID, fileSizeInBytes: LONG CARDINAL, master: Stream.Handle,
 sH: BlockStream.StreamHandle, callBackProc: Print3SM.CallBackProc] =
 BEGIN
 why: Stream.CompletionCode ← normal;
 bytesTransferred: CARDINAL ← 0;
 totalBytesTransfered: CARDINAL ← 0;
 abort: BOOLEAN;
 blockReturned: BOOLEAN;
 status: Print3SM.MgrStatus;
 ipBlock: BlockStream.Block;

 IF sH = NIL THEN
  BEGIN
  Print3Stream.Abort[clientID];
  callBackProc[clientID: clientID, problem: [badStreamHandle[]]];
  ERROR Print3.SystemError;
  END;

 DO
  [block: ipBlock] ← sH.acquire[sH: sH, length: 0];

  IF ipBlock = BlockStream.nullBlock THEN
   BEGIN
   Print3Stream.Abort[clientID];
   sH.setEOF[sH: sH];
   callBackProc[clientID: clientID, problem: [invalidIPBuffer[code: 2]]];
   RaiseError[systemError];
   END;

  [bytesTransferred: bytesTransferred, why: why] ← Stream.GetBlock[
   sH: master,
   block: [
   blockPointer: LOOPHOLE[ipBlock.blockPointer],
   startIndex: CARDINAL[ipBlock.startIndex],
   stopIndexPlusOne: CARDINAL[ipBlock.stopIndexPlusOne]] !
```

Copyright © 1992 Xerox Corporation All Rights Reserved

```
Courier.Error =>
 ReportError[
  [courierError[errorCode]], clientID, sH, ipBlock, callBackProc];
ABORTED => ReportError[[aborted[]], clientID, sH, ipBlock, callBackProc];
Stream.TimeOut =>
 ReportError[[streamTimeOut[]], clientID, sH, ipBlock, callBackProc];
XStream.BUG =>
 ReportError[[spare[code.ORD]], clientID, sH, ipBlock, callBackProc]; ];

ipBlock.stopIndexPlusOne ← LONG[bytesTransferred];

totalBytesTransfered ← totalBytesTransfered + bytesTransferred;

SELECT why FROM
 normal =>
  [abort: abort, status: status] ← Print3Stream.Transmit[
   clientID, sH, ipBlock, FALSE];
 endOfStream => {
  [abort, blockReturned, status] ← Print3Stream.Transmit[
   clientID, sH, ipBlock, TRUE];
  IF NOT abort THEN GOTO exit
  ELSE
   BEGIN
   Print3Stream.Abort[clientID];
   IF NOT blockReturned THEN sH.return[sH, ipBlock];
   sH.setEOF[sH];
   IF status = noError THEN GOTO exit;
   RaiseError[status];
   END};
 timeout, endRecord, sstChange, attention => {
  callBackProc[clientID: clientID, problem: [unknownNetResponce[why]]];
  Print3Stream.Abort[clientID];
  sH.return[sH, ipBlock];
  sH.setEOF[sH: sH];
  ERROR Print3.ConnectionError[invalidMessage]};
 ENDCASE;

IF abort THEN
 BEGIN
 IF status # noError THEN
  BEGIN
  sH.return[sH, ipBlock];
  sH.setEOF[sH: sH];
  Print3Stream.Abort[clientID];
  RaiseError[status];
  END;

 WHILE NOT AbortDone[sH, why, ipBlock, clientID, callBackProc] DO
  [bytesTransferred: bytesTransferred, why: why] ← Stream.GetBlock[
   sH: master,
```

Copyright © 1992 Xerox Corporation All Rights Reserved

```
      block: [
      blockPointer: LOOPHOLE[ipBlock.blockPointer],
      startIndex: CARDINAL[ipBlock.startIndex],
      stopIndexPlusOne: CARDINAL[ipBlock.stopIndexPlusOne]] !
      Courier.Error = >
       ReportError[
        [courierError[errorCode]], clientID, sH, ipBlock, callBackProc];
      ABORTED = >
       ReportError[[aborted[]], clientID, sH, ipBlock, callBackProc];
      Stream.TimeOut = >
       ReportError[[streamTimeOut[]], clientID, sH, ipBlock, callBackProc];
      XStream.BUG = >
       ReportError[[spare[code.ORD]], clientID, sH, ipBlock, callBackProc];
      ];
     ENDLOOP;
    GOTO exit;
    END;
   REPEAT exit = > NULL;
   ENDLOOP;

  END;


 AbortDone: PROCEDURE [
  sh: BlockStream.StreamHandle, why: Stream.CompletionCode,
  block: BlockStream.Block, clientID: JobID.ID,
  callBackProc: Print3SM.CallBackProc] RETURNS [done: BOOLEAN ← FALSE] =
  BEGIN

  SELECT why FROM
   normal = > RETURN;
   endOfStream = > {
    Print3Stream.Abort[clientID];
    sh.return[sh, block];
    sh.setEOF[sh];
    RETURN[done ← TRUE]};
   timeout, endRecord, sstChange, attention = > {
    callBackProc[clientID: clientID, problem: [unknownNetResponce[why]]];
    Print3Stream.Abort[clientID];
    sh.return[sh, block];
    sh.setEOF[sh];
    ERROR Print3.ConnectionError[invalidMessage]};
   ENDCASE;
  END;

 CheckTransSize: PROCEDURE [blockP: LONG POINTER TO BlockStream.Block]
  RETURNS [transValue: ResMgrStorage.Pages ← 0] =
  BEGIN
  blockLengthPageOffset: ResMgrStorage.Pages;
  blockLengthInBytes: LONG CARDINAL ← blockP.stopIndexPlusOne;
```

Copyright © 1992 Xerox Corporation All Rights Reserved

```
 IF blockLengthInBytes = 0 THEN RETURN[0];
 transValue ← ResMgrStorage.PagesFromBytes[blockLengthInBytes];

 blockLengthPageOffset ← blockLengthInBytes MOD ResMgrStorage.bytesPerPage;

 IF blockLengthPageOffset > 0 THEN
  BEGIN
  blockLengthInBytes ← blockLengthInBytes - blockLengthPageOffset;
  IF blockLengthInBytes = 0 THEN RETURN[0]
  ELSE {
   transValue ← ResMgrStorage.PagesFromBytes[blockLengthInBytes];
   blockP.stopIndexPlusOne ← blockLengthInBytes;
   };
  END
 ELSE transValue ← ResMgrStorage.PagesFromBytes[blockLengthInBytes];
 END;

ReportError: PROCEDURE [
 problem: Print3SM.Problem, clientID: JobID.ID, sH: BlockStream.StreamHandle,
 ipBlock: BlockStream.Block, callBackProc: Print3SM.CallBackProc] =
 BEGIN

 sH.return[sH, ipBlock];
 sH.setEOF[sH];
 Print3Stream.Abort[clientID];
 callBackProc[clientID, problem];
 END;

RegisterFile: PUBLIC PROCEDURE [
 fileName: LONG STRING, fileID: RTOSFile.FileID,
 postfix: String.SubStringDescriptor, fileNumber: CARDINAL ← 1,
 forceNumber: BOOLEAN ← FALSE, ipCaptureMode: BOOLEAN ← FALSE]
 RETURNS [version: CARDINAL] =

 BEGIN
 tempString: LONG STRING ← [RMDirectory.maxNameLength];
 fileNameLength: CARDINAL ← String.Length[fileName];
 maxStringLength: CARDINAL = RMDirectory.maxNameLength - 9;

 IF fileNameLength > maxStringLength THEN fileNameLength ← maxStringLength;
 tempString.length ← fileNameLength;
 FOR i: CARDINAL IN [0..fileNameLength) DO
  tempString[i] ← fileName[i]; ENDLOOP;
 IF ipCaptureMode THEN {
  tempString.length ← 0;
  String.AppendString[to: tempString, from: "CaptureIP"L];
  fileNameLength ← String.Length[tempString];
  };
 String.AppendChar[tempString, '-];
```

Copyright © 1992 Xerox Corporation All Rights Reserved

```
String.AppendNumber[s: tempString, n: fileNumber];
String.AppendSubString[to: tempString, from: @postfix];

RMDirectory.Register[
 name: tempString, id: fileID !
 RMDirectory.Error =>
  IF code = nameInUse AND NOT forceNumber THEN {
   fileNumber ← fileNumber + 1;
   tempString.length ← fileNameLength;
   String.AppendChar[tempString, '-];
   String.AppendNumber[s: tempString, n: fileNumber];
   String.AppendSubString[to: tempString, from: @postfix];
   RETRY}
  ELSE
   IF code = nameInUse AND forceNumber THEN {
    fileID: RTOSFile.FileID ← RMDirectory.IdFromName[
     tempString ! RMDirectory.Error => ERROR Print3.SystemError];
    RTOSFile.Delete[fileID ! RTOSFile.Error => ERROR Print3.SystemError];
    RETRY}
   ELSE ERROR Print3.SystemError];
version ← fileNumber;
END;

RetrieveIPFile: PROCEDURE [
 fileID: RTOSFile.FileID, fileSize: ResMgrStorage.Pages,
 stream: Stream.Handle] =

 BEGIN

 byteCount: LONG CARDINAL ← 0;
 bytesTransferred: CARDINAL;
 pagesTransferred: ResMgrStorage.Pages;
 pageCount: ResMgrStorage.Pages ← 0;
 truncateSize: LONG CARDINAL ← 0;
 why: Stream.CompletionCode ← normal;
 xferId: ResMgr.TransferID ← ResMgr.nullTransferID;
 buffer: ResMgrStorage.BufferList ← NIL;

 BEGIN
 ENABLE
  UNWIND =>
   BEGIN
   IF xferId # ResMgr.nullTransferID THEN {
    ResMgr.Abort[xferId]; xferId ← ResMgr.nullTransferID};
   IF buffer # NIL THEN {
    ResMgr.FreeBufferList[
     id: [trans: captureIP, module: netServe], buffer: buffer];
    buffer ← NIL};
   END;
```

Copyright © 1992 Xerox Corporation All Rights Reserved

```
BEGIN
ENABLE
 ResMgr.Error => {
  buffer ← NIL;
  IF code = needToCoalesce THEN ERROR Print3.InsufficientSpoolSpace
  ELSE ERROR Print3.SystemError};

UNTIL why = endOfStream DO

 IF Print3Status.CheckStatus[].disabled THEN ERROR Print3.SpoolingDisabled;

 buffer ← ResMgr.Allocate[
  id: [trans: captureIP, module: netServe],
  Pages: Print3Stream.pagesInBuffer, base: NIL, waitTillAvailable: TRUE];

 IF buffer = NIL THEN Print3.SystemError;

 [bytesTransferred: bytesTransferred, why: why] ← Stream.GetBlock[
  stream, [
  blockPointer: buffer.base, startIndex: 0,
  stopIndexPlusOne: Print3Stream.bytesInBuffer]];

 pagesTransferred ← ResMgrStorage.PagesFromBytes[LONG[bytesTransferred]];

 IF (pageCount + pagesTransferred) > fileSize THEN
  BEGIN
  RTOSFile.Extend[
   fileID: fileID, nPagesToExtendBy: Print3Stream.extendFileBy !
   RTOSFile.Error =>
    SELECT errorType FROM
     insufficientContiguousSpace, noSpace =>
      ERROR Print3.InsufficientSpoolSpace;
     ENDCASE => Print3.SystemError; ];
  fileSize ← fileSize + Print3Stream.extendFileBy;
  END;

 IF xferId = ResMgr.nullTransferID THEN
  xferId ← ResMgr.WriteAsync[
   id: [trans: captureIP, module: netServe], freeWhenComplete: TRUE,
   fileID: fileID, fileOffset: pageCount, buffer: buffer,
   transferSize: pagesTransferred]
 ELSE
  ResMgr.ChainedWrite[
   xferId: xferId, id: [trans: captureIP, module: netServe],
   buffer: buffer, transferSize: pagesTransferred, freeWhenComplete: TRUE];

 buffer ← NIL;
 byteCount ← byteCount + bytesTransferred;
 pageCount ← pageCount + pagesTransferred;
```

Copyright © 1992 Xerox Corporation All Rights Reserved

```
  ENDLOOP;

 ResMgr.WaitForCompletion[xferId: xferId];
 xferId ← ResMgr.nullTransferID;

 RMDirectory.SetByteLengthForFileID[
  id: fileID, byteLength: byteCount !
  RMDirectory.Error => ERROR Print3.SystemError];

 truncateSize ← ResMgrStorage.PagesFromBytes[byteCount];
 RTOSFile.Truncate[fileID: fileID, size: truncateSize];

 END;
 END;
 END;

END.
```

Copyright © 1992 Xerox Corporation All Rights Reserved

```
PreParseSchedBucket: DEFINITIONS =

 BEGIN
 diskFull: CARDINAL = 4400;
 diskFullPreParser: CARDINAL = 1201;
 diskFullFragMgr: CARDINAL = 1202;
 diskFullEmbededImage: CARDINAL = 1203;
 diskFullPreParserStateSave: CARDINAL = 1204;

 degradedMode: CARDINAL = 4405;

 hardwareProblemReboot: CARDINAL = 4402;

 insufficientResource: CARDINAL = 4403;

 functionFault: CARDINAL = 4401;

 fatalSWErrorReboot: CARDINAL = 4404;
 fatalSWErrorInPreParser: CARDINAL = 4000;
 fatalSWErrorInSched: CARDINAL = 1200;
 fatalSWErrorInNet: CARDINAL = 1600;

 netJobArrived: CARDINAL = 5011;
 END.
```

Copyright © 1992 Xerox Corporation All Rights Reserved

```
DIRECTORY
 CSRDefaults USING [PrinterType],
 DecomposerCommon USING [Corner, ClientContext],
 EventHandler USING [MemoryActionCompleteProcType],
 FaultLogger USING [ID, nullLogID],
 JobBackUp USING [LockID, nullLockID],
 JobID USING [ID],
 JobFault USING [SeverityType],
 JobStep USING [Status],
 IIPFragMgrPrivate USING [Handle],
 Image USING [Handle],
 NetworkLog USING [JobStatus],
 Page USING [Handle, nullHandle, Side],
 PreParser USING [
  BookletSignatureOption, Handle, JobMediaDataPtr, JobProceedDataPtr,
  OptionsPtr, PageResultsPtr, PutStatusProc, ReferenceEdge, Status],
 PreParseSchedTask USING [ErrorType, ObjectFaultHandle, Task],
 Print3SM USING [CallBackProc, MgrStatus, Source],
 PublicPrinting USING [Finishing],
 ResMgrIDs USING [TransactionID],
 ResMgrStorage USING [BufferList],
 FENetSupport USING [PreParseOptions];

PreParseSchedMgr: DEFINITIONS =
 BEGIN

 Command: TYPE = {mediaReady, pageReady, endJob, addBlankPage, noOp, none};

 DatabaseCode: TYPE = {DBError, CoalescerTable, Page, Image, JobQ, SMNetSupport};

 DeleteCode: TYPE = {
  abortNetOnly, netAborted, streamTimeOut, courierError, fatalError,
  nilStartResultsPtr, nilInstructionsPtr, xStreamError};

 Instance: TYPE = LONG POINTER TO InstanceRecord;
 InstanceRecord: TYPE = RECORD [
  preParserHandle: PreParser.Handle ← NIL,
  iipFragMgrHandle: IIPFragMgrPrivate.Handle ← NIL,
  id: ResMgrIDs.TransactionID ← captureIP,
  state: StateType ← [ready, ready],
  command: Command ← none,
  cWaiting: BOOLEAN ← FALSE,
  sWaiting: BOOLEAN ← FALSE,
  commandCV: CONDITION,
  task: PreParseSchedTask.Task ← NIL,
  heap: UNCOUNTED ZONE ← NIL,
  buffer: ResMgrStorage.BufferList ← NIL];
```

Copyright © 1992 Xerox Corporation All Rights Reserved

```
State: TYPE = {
 ready, starting, running, shutdown, aboutToAbort, aborted, completed,
 aboutToSuspend, suspended, proceedFromSuspend};

StateType: TYPE = RECORD [currentState: State, lastState: State];

WordSeq: TYPE = RECORD [SEQUENCE COMPUTED CARDINAL OF WORD];


duplexYFlipSupport: BOOLEAN;
printerType: CSRDefaults.PrinterType;
imagerVersionSupport: CARDINAL;
iotResolution: CARDINAL;
maxPaperLength: CARDINAL;
maxPaperWidth: CARDINAL;
minPaperLength: CARDINAL;
minPaperWidth: CARDINAL;
numPBGs: CARDINAL;
numVGs: CARDINAL;


AllocateMemory: PROCEDURE [instance: Instance];

DumpObjectFaultList: PROCEDURE [
 instance: Instance, offThePage: BOOLEAN, lockID: JobBackUp.LockID,
 pageFaults: PreParseSchedTask.ObjectFaultHandle];
NotifySchedUp: PROCEDURE [];
SetFaultList: PROCEDURE [
 instance: Instance, command: Command, pageResults: PreParser.PageResultsPtr]
 RETURNS [pageFaults: PreParseSchedTask.ObjectFaultHandle ← NIL];

NewSideReady: PROCEDURE [
 instance: Instance, lockID: JobBackUp.LockID,
 sideParms: PreParser.PageResultsPtr];

CreatePageWithFrontImage: PROCEDURE [
 instance: Instance, image: Image.Handle, lockID: JobBackUp.LockID,
 sideParms: PreParser.PageResultsPtr];

AddBlankPage: PROCEDURE [instance: Instance];

DoBackCovers: PROCEDURE [
 instance: Instance, lockID: JobBackUp.LockID, emptyBackSide: BOOLEAN];

EndTask: PROCEDURE [
 instance: Instance, pageFaults: PreParseSchedTask.ObjectFaultHandle];

StatusNotify: PreParser.PutStatusProc;

NetCallBack: Print3SM.CallBackProc;
```

Copyright © 1992 Xerox Corporation All Rights Reserved

```
SchedulerProcess: PROCEDURE [instance: Instance];

DoCommand: PROCEDURE [
 instance: Instance, command: Command,
 pageResults: PreParser.PageResultsPtr ← NIL];

WaitForCommand: PROCEDURE [instance: Instance]
 RETURNS [
  command: Command, pageResults: PreParser.PageResultsPtr ← NIL,
  pageFaults: PreParseSchedTask.ObjectFaultHandle];

SoftwareError: PROCEDURE [];

CopyJobMediaData: PROCEDURE [data: PreParser.JobMediaDataPtr, z: UNCOUNTED
ZONE]
 RETURNS [copy: PreParser.JobMediaDataPtr];

FreeProceedData: PROCEDURE [
 data: PreParser.JobProceedDataPtr, z: UNCOUNTED ZONE];

FreeNetSupportOptions: PROCEDURE [
 data: FENetSupport.PreParseOptions, z: UNCOUNTED ZONE];

FreeStatus: PROCEDURE [status: PreParser.Status, z: UNCOUNTED ZONE];

FreeTask: PROCEDURE [task: PreParseSchedTask.Task, z: UNCOUNTED ZONE];

AcquireInstance: PROCEDURE [id: ResMgrIDs.TransactionID]
 RETURNS [instance: Instance];
ReleaseInstance: PROCEDURE [instance: Instance];

CreateInstance: PROCEDURE [id: ResMgrIDs.TransactionID]
 RETURNS [instance: Instance];


FindContextID: PROCEDURE [contextID: DecomposerCommon.ClientContext]
 RETURNS [instance: Instance];

FindResMgrID: PROCEDURE [
 resMgrID: ResMgrIDs.TransactionID, always: BOOLEAN ← FALSE]
 RETURNS [instance: Instance];

FindJobID: PROCEDURE [jobID: JobID.ID] RETURNS [instance: Instance];


HoldTask: PROCEDURE [instance: Instance] RETURNS [ok: BOOLEAN];

ReleaseTask: PROCEDURE [instance: Instance];
```

Copyright © 1992 Xerox Corporation All Rights Reserved

```
IncSense: PROCEDURE [instance: Instance];

GetSense: PROCEDURE [instance: Instance] RETURNS [sense: CARDINAL];

ResetSense: PROCEDURE [instance: Instance];

ResourceFault: PROCEDURE [instance: Instance] RETURNS [exists: BOOLEAN];

SetResourceFault: PROCEDURE [instance: Instance];

FaultNet: PROCEDURE [instance: Instance];

NetFaulted: PROCEDURE [instance: Instance] RETURNS [faulted: BOOLEAN];

GetState: PROCEDURE [instance: Instance] RETURNS [state: State];

NewState: PROCEDURE [instance: Instance, newState: State];

GetLogStatus: PROCEDURE [instance: Instance]
 RETURNS [status: NetworkLog.JobStatus];

SetLogStatus: PROCEDURE [
 instance: Instance, status: NetworkLog.JobStatus, abortStep: BOOLEAN ← FALSE];

GetEndStatus: PROCEDURE [instance: Instance] RETURNS [status: JobStep.Status];

SetEndStatus: PROCEDURE [instance: Instance, status: JobStep.Status];

GetReboot: PROCEDURE [instance: Instance] RETURNS [reboot: BOOLEAN];

SetRebootTrue: PROCEDURE [instance: Instance];

AbortJob: PROCEDURE [instance: Instance] RETURNS [abort: BOOLEAN];

AssessAbort: PROCEDURE [instance: Instance]
 RETURNS [return: BOOLEAN, source: Print3SM.Source];

GetAborted: PROCEDURE [instance: Instance] RETURNS [aborted: BOOLEAN];

SetTask: PROCEDURE [instance: Instance, taskPtr: PreParseSchedTask.Task];

InternalErrorCode: TYPE = {abort};
InternalError: SIGNAL [code: InternalErrorCode];

Add: PROCEDURE [
 fault: CARDINAL, instance: Instance, type: PreParseSchedTask.ErrorType,
 severityType: JobFault.SeverityType, side1: Page.Side ← front,
 functionFault: BOOLEAN ← FALSE, page1: Page.Handle ← Page.nullHandle,
 uniqueID: FaultLogger.ID ← FaultLogger.nullLogID, card1: CARDINAL ← 0,
 card2: CARDINAL ← 0, card3: CARDINAL ← 0, string1: LONG STRING ← NIL,
```

Copyright © 1992 Xerox Corporation All Rights Reserved

```
 string2: LONG STRING ← NIL, real: REAL ← 0.0,
 lockID: JobBackUp.LockID ← JobBackUp.nullLockID] RETURNS [ok: BOOLEAN];

BookletSignature: PROCEDURE [
 instance: Instance, signature: PreParser.BookletSignatureOption];

DoPrintingInstructions: PROCEDURE [
 instructions: PreParser.OptionsPtr, instance: Instance];

NotifyNetJobArrived: PROCEDURE [
 instance: Instance, endingStatus: JobStep.Status];

SetReferenceEdge: PROCEDURE [
 referenceEdge: PreParser.ReferenceEdge, instance: Instance]
 RETURNS [refEdge: PreParser.ReferenceEdge];

GetCorner: PROCEDURE [rotation: INTEGER]
 RETURNS [corner: DecomposerCommon.Corner];

GetRotation: PROCEDURE [corner: DecomposerCommon.Corner]
 RETURNS [rotation: INTEGER];

FatalError: PROCEDURE [
 instance: Instance, severityType: JobFault.SeverityType,
 why: Print3SM.MgrStatus ← noError, functionFault: BOOLEAN ← FALSE,
 fault: CARDINAL, arg1: CARDINAL ← 0, arg2: CARDINAL ← 0, arg3: CARDINAL ← 0];

CheckDimensions: PROCEDURE [length: CARDINAL, width: CARDINAL]
 RETURNS [bad: BOOLEAN];

SetImageShift: PROCEDURE [instance: Instance, xShift: BOOLEAN, shift: REAL]
 RETURNS [result: INTEGER];

CheckPostConflicts: PROCEDURE [instance: Instance, lockID: JobBackUp.LockID]
 RETURNS [conflicts: BOOLEAN];

CheckPreConflicts: PROCEDURE [
 instance: Instance, currentFinishing: PublicPrinting.Finishing,
 slipSheetEntry: CARDINAL, collatedEntry: CARDINAL, copyCountEntry: CARDINAL,
 finishingEntry: CARDINAL] RETURNS [conflicts: BOOLEAN, plexChanged: BOOLEAN];

CS: PROCEDURE [string: LONG STRING, max: CARDINAL];

Shutdown: PROCEDURE [
 id: ResMgrIDs.TransactionID, proc: EventHandler.MemoryActionCompleteProcType];
END.
```

Copyright © 1992 Xerox Corporation All Rights Reserved

```
DIRECTORY
 JobFault USING [SeverityType];

PreParseSchedObject: DEFINITIONS =
 BEGIN
 mediumUnavailable: CARDINAL = 1203;
 shutdown: CARDINAL = 1207;
 insufficientResources: CARDINAL = 1208;
 databaseError: CARDINAL = 1241;
 systemError: CARDINAL = 1287;
 diskFull: CARDINAL = 1294;
 invalidPrintParameters: CARDINAL = 1295;
 systemLimitTooManyFonts: CARDINAL = 1515;
 systemLimitTooManyRasters: CARDINAL = 1516;
 switchToDiag: CARDINAL = 1591;

 powerOff: CARDINAL = 1297;
 genericAbort: CARDINAL = 1298;

 unknownAccountName: CARDINAL = 1500;
 duplexTabs: CARDINAL = 1501;
 duplexTransparencies: CARDINAL = 1502;
 finishingNotSupported: CARDINAL = 1503;
 noImageForCovers: CARDINAL = 1504;
 badFinishingForSlipSheet: CARDINAL = 1506;
 invalidMediaForStacker: CARDINAL = 1507;
 uncollatedPreTab: CARDINAL = 1508;
 maxSizeForTrans: CARDINAL = 1509;
 maxSizeForTab: CARDINAL = 1510;
 noUnCollatedSlipSheets: CARDINAL = 1511;
 noStackFinForSig: CARDINAL = 1512;
 badBindSize: CARDINAL = 1513;
 uncollatedStichedOutOfRange: CARDINAL = 1514;
 DFAUncollated: CARDINAL = 1517;
 DFANotEnabled: CARDINAL = 1518;
 mediaMessage: CARDINAL = 1519;
 finishingMessage: CARDINAL = 1520;
 DFAIllegalPaper: CARDINAL = 1521;
 DFAFolding: CARDINAL = 1527;
 foldingNotSupported: CARDINAL = 1532;
 badMediaForStitch: CARDINAL = 1533;
 clearForNonTrans: CARDINAL = 1534;
 modulusOutOfRange: CARDINAL = 1535;
 badMediaForSig: CARDINAL = 1536;
 noSimplexSig: CARDINAL = 1537;
 tooManyMediaForSig: CARDINAL = 1538;
 trimming: CARDINAL = 1526;
 copyRunBinderySelect: CARDINAL = 1541;
```

Copyright © 1992 Xerox Corporation All Rights Reserved

```
binderyIndexOutOfRange: CARDINAL = 1542;
pageRunTooLong: CARDINAL = 1543;
copyRunTooLong: CARDINAL = 1544;
illegalFinishingCombination: CARDINAL = 1545;
pageRunBinderySelect: CARDINAL = 1546;
authorizedHold: CARDINAL = 1548;
impositionsNotSupported: CARDINAL = 1549;
sourcePageDimRunTooLong: CARDINAL = 1550;

bindingNotSupported: CARDINAL = 1594;
doubleStitchNotSupported: CARDINAL = 1595;
landscapeStitchNotSupported: CARDINAL = 1596;
noPagesInJob: CARDINAL = 1597;
copyCountZero: CARDINAL = 1592;
copyCountOverLimit: CARDINAL = 1593;
badMediaForSigA3or17x11: CARDINAL = 1598;
tooManyMediaForSigA3or17x11: CARDINAL = 1599;
noSlipSheetsToSBM: CARDINAL = 1279;
preCutTabNotSupported: CARDINAL = 1280;
fullCutTabNotSupported: CARDINAL = 1288;

badPreParserBuffer: CARDINAL = 1281;
diskFaultWhenReadingIPFile: CARDINAL = 1282;
invalidBufferWhenReadingIPFile: CARDINAL = 1283;
problemWithNameOfIPFile: CARDINAL = 1284;
badStreamHandle: CARDINAL = 1291;
unknownNetResponce: CARDINAL = 1292;
clientTimedOut: CARDINAL = 1293;
netAborted: CARDINAL = 1524;
courierError: CARDINAL = 1525;
xStreamError: CARDINAL = 1590;

imageFileNotFound: CARDINAL = 1205;
insertFileNotFound: CARDINAL = 1201;
insertFileProblem: CARDINAL = 1206;
noSuchInsertFileType: CARDINAL = 1202;
unimplementedRESInfo: CARDINAL = 1204;

errorOperatorExecuted: CARDINAL = 1252;
decompressorNotFound: CARDINAL = 1253;
longSequencesNotImpld: CARDINAL = 1220;
nestedContentInstrsUnimpld: CARDINAL = 1221;
unimplementedFeature: CARDINAL = 1222;
unimplementedTypeConversion: CARDINAL = 1223;
colorSubstitued: CARDINAL = 1589;

iipFragMgrErrorDisk: CARDINAL = 1209;
invalidNode: CARDINAL = 1255;
memoryResourceExhausted: CARDINAL = 1256;
otherSoftwareProblem: CARDINAL = 1257;
```

Copyright © 1992 Xerox Corporation All Rights Reserved

```
preParserStateRead: CARDINAL = 1258;
preParserStateWrite: CARDINAL = 1259;
imageInstallNotAvailable: CARDINAL = 1551;
insufficientMemory: CARDINAL = 1522;
insufficientDiskSpace: CARDINAL = 1523;

badInsertFileSyntax: CARDINAL = 1225;
badPropertyVectorStructure: CARDINAL = 1261;
badTypeForPropertyName: CARDINAL = 1262;
imagingOperatorInPreamble: CARDINAL = 1263;
invalidArgumentValue: CARDINAL = 1264;
invalidSequenceType: CARDINAL = 1265;
notAnInterpressFile: CARDINAL = 1226;
nestedCORRECTs: CARDINAL = 1227;
noFontSpecified: CARDINAL = 1229;
problemProcessingFonts: CARDINAL = 1278;
numericError: CARDINAL = 1228;
otherMasterProblem: CARDINAL = 1266;
propertyNameNotFound: CARDINAL = 1267;
stackNotEmptyAtPageEnd: CARDINAL = 1268;
unexpectedIPFunction: CARDINAL = 1230;
unexpectedEOF: CARDINAL = 1231;
zeroDivideAttempted: CARDINAL = 1269;
negativeMakeVecLUbounds: CARDINAL = 1299;
invalidCurrentPosition: CARDINAL = 1530;
smHeapAllocationError: CARDINAL = 1539;
mgrSMHeapAllocationError: CARDINAL = 1540;
rasterDirectoryFull: CARDINAL = 1547;
iipFragMgrError: CARDINAL = 1216;
unexpectedError: CARDINAL = 1200;

badOperandValue: CARDINAL = 1210;
badFrameIndex: CARDINAL = 1211;
badISetIndex: CARDINAL = 1212;
badISetUsage: CARDINAL = 1213;
badMediaIndex: CARDINAL = 1214;
badTypeInstructionProblem: CARDINAL = 1270;
badValueInstructionProblem: CARDINAL = 1271;
badVectorIndex: CARDINAL = 1215;
findOperationFailed: CARDINAL = 1272;
invalidTypeForSetFont: CARDINAL = 1219;
invalidOperandTypeOnStack: CARDINAL = 1218;
markContextMismatch: CARDINAL = 1273;
markMissingAtPageEnd: CARDINAL = 1274;
markNotFoundOnStack: CARDINAL = 1224;
noFSetForSetFont: CARDINAL = 1217;
outputOperatorNotAllowed: CARDINAL = 1232;
stackUnderflow: CARDINAL = 1233;
unexpectedMark: CARDINAL = 1234;
unexpectedOperator: CARDINAL = 1235;
```

Copyright © 1992 Xerox Corporation All Rights Reserved

```
unimplementedSequenceType: CARDINAL = 1275;
unrecognizedInstructionProblem: CARDINAL = 1276;
unrecognizedOperand: CARDINAL = 1236;
unrecognizedOperator: CARDINAL = 1237;
coverMediaIndex: CARDINAL = 1587;

tooManyFontNames: CARDINAL = 1238;
tooManyManagedObjects: CARDINAL = 1239;
tooManyNestedBodies: CARDINAL = 1240;
arithmeticError: CARDINAL = 1531;
tooManyFragFiles: CARDINAL = 1552;
tooManyFrags: CARDINAL = 1553;

initialSetupFailed: CARDINAL = 1242;
pageInitError: CARDINAL = 1245;
softwareBugNoIIP: CARDINAL = 1247;
unexpectedEndcase: CARDINAL = 1249;
unexpectedSignal: CARDINAL = 1250;
unexpectedIPTrap: CARDINAL = 1251;
imageInstallError: CARDINAL = 1285;
imageInstallDirectoryError: CARDINAL = 1286;
imageInstallOtherError: CARDINAL = 1289;
imageInstallBccError: CARDINAL = 1290;
imageInstallAcqBufferError: CARDINAL = 1296;
imageNodeListCorrupted: CARDINAL = 1277;
postScriptJobError: CARDINAL = 1528;
postScriptJobAborted: CARDINAL = 1529;

mediaWeight: CARDINAL = 1554;
orderedPosition: CARDINAL = 1555;
finishEdge: CARDINAL = 1556;
labelsPerRow: CARDINAL = 1557;
labelsPerColumn: CARDINAL = 1558;
cluster: CARDINAL = 1559;
signatureShift: CARDINAL = 1560;
bindDirection: CARDINAL = 1561;
resultSheetSize: CARDINAL = 1562;
offsetStacking: CARDINAL = 1563;
mediaSelect: CARDINAL = 1564;
jobEndWait: CARDINAL = 1565;
jobStartWait: CARDINAL = 1566;
jobPageCount: CARDINAL = 1567;
jobTotalSize: CARDINAL = 1568;
jobPriority: CARDINAL = 1569;
jobErrorReporting: CARDINAL = 1570;
jobPolicy: CARDINAL = 1571;
processOffset: CARDINAL = 1572;
inserts: CARDINAL = 1573;
diecutName: CARDINAL = 1574;
diecutPosition: CARDINAL = 1575;
```

Copyright © 1992 Xerox Corporation All Rights Reserved

```
otherBinderyOperation: CARDINAL = 1576;
bindingColor: CARDINAL = 1577;
otherBindingColor: CARDINAL = 1578;
bindingType: CARDINAL = 1579;
otherBindingType: CARDINAL = 1580;
highlightColor: CARDINAL = 1581;
breakPageFont: CARDINAL = 1582;
breakPageType: CARDINAL = 1583;
outputPosition: CARDINAL = 1584;
contentOutputPosition: CARDINAL = 1585;
pageBinderyFinishingSelect: CARDINAL = 1586;
unsupportedinstruction: CARDINAL = 1588;

powerOffST: JobFault.SeverityType = systemError;
genericAbortST: JobFault.SeverityType = systemError;
bindingNotSupportedST: JobFault.SeverityType = operationalError;
doubleStitchNotSupportedST: JobFault.SeverityType = operationalError;
landscapeStitchNotSupportedST: JobFault.SeverityType = operationalError;
noPagesInJobST: JobFault.SeverityType = operationalError;
copyCountZeroST: JobFault.SeverityType = operationalError;
copyCountOverLimitST: JobFault.SeverityType = operationalError;
badMediaForSigA3or17x11ST: JobFault.SeverityType = operationalError;
tooManyMediaForSigA3or17x11ST: JobFault.SeverityType = operationalError;
noSlipSheetsToSBMST: JobFault.SeverityType = operationalError;
preCutTabNotSupportedST: JobFault.SeverityType = operationalError;
fullCutTabNotSupportedST: JobFault.SeverityType = operationalError;

mediumUnavailableST: JobFault.SeverityType = operationalError;
shutdownST: JobFault.SeverityType = systemError;
insufficientResourcesST: JobFault.SeverityType = masterError;
databaseErrorST: JobFault.SeverityType = systemError;
systemErrorST: JobFault.SeverityType = systemError;
diskFullST: JobFault.SeverityType = systemError;
invalidPrintParametersST: JobFault.SeverityType = masterWarning;
systemLimitTooManyFontsST: JobFault.SeverityType = masterError;
systemLimitTooManyRastersST: JobFault.SeverityType = masterError;

unknownAccountNameST: JobFault.SeverityType = systemError;
duplexTabsST: JobFault.SeverityType = operationalError;
duplexTransparenciesST: JobFault.SeverityType = operationalError;
finishingNotSupportedST: JobFault.SeverityType = operationalError;
noImageForCoversST: JobFault.SeverityType = operationalError;
badFinishingForSlipSheetST: JobFault.SeverityType = operationalError;
invalidMediaForStackerST: JobFault.SeverityType = operationalError;
uncollatedPreTabST: JobFault.SeverityType = operationalError;
maxSizeForTransST: JobFault.SeverityType = operationalError;
maxSizeForTabST: JobFault.SeverityType = operationalError;
noUnCollatedSlipSheetsST: JobFault.SeverityType = operationalError;
noStackFinForSigST: JobFault.SeverityType = operationalError;
```

Copyright © 1992 Xerox Corporation All Rights Reserved

```
badBindSizeST: JobFault.SeverityType = operationalError;
uncollatedStichedOutOfRangeST: JobFault.SeverityType = operationalError;
DFAUncollatedST: JobFault.SeverityType = operationalError;
DFANotEnabledST: JobFault.SeverityType = operationalError;
mediaMessageST: JobFault.SeverityType = masterWarning;
finishingMessageST: JobFault.SeverityType = masterWarning;
DFAIllegalPaperST: JobFault.SeverityType = operationalError;
trimmingST: JobFault.SeverityType = operationalError;
DFAFoldingST: JobFault.SeverityType = operationalError;
foldingNotSupportedST: JobFault.SeverityType = operationalError;
badMediaForStitchST: JobFault.SeverityType = operationalError;
clearForNonTransST: JobFault.SeverityType = operationalError;
modulusOutOfRangeST: JobFault.SeverityType = operationalError;
badMediaForSigST: JobFault.SeverityType = operationalError;
noSimplexSigST: JobFault.SeverityType = operationalError;
tooManyMediaForSigST: JobFault.SeverityType = operationalError;
copyRunBinderySelectST: JobFault.SeverityType = masterWarning;
binderyIndexOutOfRangeST: JobFault.SeverityType = masterWarning;
pageRunTooLongST: JobFault.SeverityType = masterWarning;
copyRunTooLongST: JobFault.SeverityType = masterWarning;
illegalFinishingCombinationST: JobFault.SeverityType = operationalError;
pageRunBinderySelectST: JobFault.SeverityType = masterWarning;
authorizedHoldST: JobFault.SeverityType = systemError;
impositionsNotSupportedST: JobFault.SeverityType = operationalError;
sourcePageDimRunTooLongST: JobFault.SeverityType = masterWarning;

badPreParserBufferST: JobFault.SeverityType = systemError;
diskFaultWhenReadingIPFileST: JobFault.SeverityType = systemError;
invalidBufferWhenReadingIPFileST: JobFault.SeverityType = systemError;
problemWithNameOfIPFileST: JobFault.SeverityType = systemError;
badStreamHandleST: JobFault.SeverityType = systemError;
unknownNetResponceST: JobFault.SeverityType = systemError;
clientTimedOutST: JobFault.SeverityType = systemError;
netAbortedST: JobFault.SeverityType = systemError;
courierErrorST: JobFault.SeverityType = systemError;

mediaWeightST: JobFault.SeverityType = operationalError;
orderedPositionST: JobFault.SeverityType = operationalError;
finishEdgeST: JobFault.SeverityType = operationalError;
labelsPerRowST: JobFault.SeverityType = operationalError;
labelsPerColumnST: JobFault.SeverityType = operationalError;
clusterST: JobFault.SeverityType = operationalError;
signatureShiftST: JobFault.SeverityType = operationalError;
bindDirectionST: JobFault.SeverityType = operationalError;
resultSheetSizeST: JobFault.SeverityType = operationalError;
offsetStackingST: JobFault.SeverityType = operationalError;
mediaSelectST: JobFault.SeverityType = operationalError;
jobEndWaitST: JobFault.SeverityType = operationalError;
jobStartWaitST: JobFault.SeverityType = operationalError;
jobPageCountST: JobFault.SeverityType = operationalError;
```

Copyright © 1992 Xerox Corporation All Rights Reserved

```
jobTotalSizeST: JobFault.SeverityType = operationalError;
jobPriorityST: JobFault.SeverityType = operationalError;
jobErrorReportingST: JobFault.SeverityType = operationalError;
jobPolicyST: JobFault.SeverityType = operationalError;
processOffsetST: JobFault.SeverityType = operationalError;
insertsST: JobFault.SeverityType = operationalError;
diecutNameST: JobFault.SeverityType = operationalError;
diecutPositionST: JobFault.SeverityType = operationalError;
otherBinderyOperationST: JobFault.SeverityType = operationalError;
bindingColorST: JobFault.SeverityType = operationalError;
otherBindingColorST: JobFault.SeverityType = operationalError;
bindingTypeST: JobFault.SeverityType = operationalError;
otherBindingTypeST: JobFault.SeverityType = operationalError;
highlightColorST: JobFault.SeverityType = operationalError;
breakPageFontST: JobFault.SeverityType = operationalError;
breakPageTypeST: JobFault.SeverityType = operationalError;
outputPositionST: JobFault.SeverityType = operationalError;
contentOutputPositionST: JobFault.SeverityType = operationalError;
pageBinderyFinishingSelectST: JobFault.SeverityType = operationalError;
xStreamErrorST: JobFault.SeverityType = systemError;
unsupportedinstructionST: JobFault.SeverityType = operationalError;
switchToDiagST: JobFault.SeverityType = systemError;
END.
```

Copyright © 1992 Xerox Corporation All Rights Reserved

```
DIRECTORY
 DecomposerCommon USING [ClientContext],
 EventHandler USING [MemoryActionCompleteProcType],
 FaultLogger USING [ID, nullLogID],
 JobID USING [ID, nullID],
 JobFault USING [SeverityType],
 JobStep USING [nullStepHandle, Status, StepHandle],
 JobQ USING [Disposition, JobReference, nullJobReference],
 NetworkLog USING [JobStatus],
 Page USING [Handle, nullHandle, Side],
 PreParser USING [
  BindingDirection, CoversRep, JobMediaDataPtr, JobProceedDataPtr,
  PageResultsPtr],
 Print3SM USING [Source],
 PublicPrinting USING [InternalMedia, MediumDimensions, Plex],
 ServPreParse USING [ParmsHandle],
 FENetSupport USING [PreParseOptions],
 StreamScheduler USING [Handle, nullHandle],
 System USING [GreenwichMeanTime];

PreParseSchedTask: DEFINITIONS =
 BEGIN


 ErrorType: TYPE = {fault, warning, both};

 ZoneType: TYPE = {private, system};

 nullContext: RECORD [a, b: CARDINAL] = [0, 0];

 MediaInfo: TYPE = LONG POINTER TO MediaInfoSeq;
 MediaInfoSeq: TYPE = RECORD [PACKED SEQUENCE length: CARDINAL OF
MediaInfoRep];
 MediaInfoRep: TYPE = RECORD [
  used: BOOLEAN, parallelX: BOOLEAN, mediaRotated: BOOLEAN, error: MediaError] ←
  [FALSE, TRUE, FALSE, none];

 MediaError: TYPE = {none, plexTranError, plexTabError};

 ObjectFaultHandle: TYPE = LONG POINTER TO ObjectFaultNode;
 ObjectFaultNode: TYPE = RECORD [
  next: ObjectFaultHandle ← NIL,
  error: ErrorType ← fault,
  zone: ZoneType ← private,
  side1: Page.Side ← front,
  functionFault: BOOLEAN ← FALSE,
  severityType: JobFault.SeverityType ← appearanceWarning,
  sheetNumber: LONG CARDINAL ← 0,
  uniqueID: FaultLogger.ID ← FaultLogger.nullLogID,
```

Copyright © 1992 Xerox Corporation All Rights Reserved

```
 fault: CARDINAL ← 0,
 card1: CARDINAL ← 0,
 card2: CARDINAL ← 0,
 card3: CARDINAL ← 0,
 string1: LONG STRING ← NIL,
 string2: LONG STRING ← NIL,
 real: REAL ← 0.0];

CoversData: TYPE = LONG POINTER TO CoversRec;
CoversRec: TYPE = RECORD [
 rec: PreParser.CoversRep,
 shift: BOOLEAN ← FALSE,
 plex: PublicPrinting.Plex ← simplex,
 side: PublicPrinting.Plex ← simplex,
 index: CARDINAL ← 0];

SignatureData: TYPE = LONG POINTER TO SignatureDataRec;
SignatureDataRec: TYPE = RECORD [
 sourceDims: BOOLEAN ← FALSE,
 checkResultSheet: BOOLEAN ← FALSE,
 bindDirection: PreParser.BindingDirection ← null,
 numPages: CARDINAL ← 0,
 page: PublicPrinting.MediumDimensions ← [0, 0],
 resultSheetSize: PublicPrinting.MediumDimensions ← [0, 0],
 maxShift: CARDINAL ← 0];

Task: TYPE = LONG POINTER TO TaskRecord;
TaskRecord: TYPE = RECORD [
 aborted: BOOLEAN ← FALSE,
 abortStep: BOOLEAN ← FALSE,
 shutdownFault: BOOLEAN ← FALSE,
 binSelect: BOOLEAN ← FALSE,
 done: BOOLEAN ← FALSE,
 collated: BOOLEAN ← TRUE,
 covers: BOOLEAN ← FALSE,
 disposition: JobQ.Disposition ← printAndDelete,
 endMessage: BOOLEAN ← FALSE,
 endStatus: JobStep.Status ← done,
 finishingMsg: BOOLEAN ← FALSE,
 folding: BOOLEAN ← FALSE,
 forcedSave: BOOLEAN ← FALSE,
 foreignRef: BOOLEAN ← FALSE,
 headToToe: BOOLEAN ← FALSE,
 holdTask: BOOLEAN ← FALSE,
 lastSideDirty: BOOLEAN ← FALSE,
 logStatus: NetworkLog.JobStatus ← faulted,
 mediaMessage: BOOLEAN ← FALSE,
 netFaulted: BOOLEAN ← FALSE,
 pageError: BOOLEAN ← FALSE,
 ppCompleted: BOOLEAN ← FALSE,
```

Copyright © 1992 Xerox Corporation All Rights Reserved

```
reboot: BOOLEAN ← FALSE,
resouceFault: BOOLEAN ← FALSE,
shutdown: BOOLEAN ← FALSE,
signature: BOOLEAN ← FALSE,
slipSheet: BOOLEAN ← FALSE,
source: Print3SM.Source ← net,
startMessage: BOOLEAN ← FALSE,
streamOn: BOOLEAN ← FALSE,
waitingToAbort: BOOLEAN ← FALSE,
xShiftOn: BOOLEAN ← FALSE,
yShiftOn: BOOLEAN ← FALSE,
xShift: INTEGER ← 0,
yShift: INTEGER ← 0,
clientContext: DecomposerCommon.ClientContext ← LOOPHOLE[nullContext],
copyCount: CARDINAL ← 0,
coversInfo: CoversData ← NIL,
faultHandle: ObjectFaultHandle ← NIL,
holdCount: CARDINAL ← 0,
jobID: JobID.ID ← JobID.nullID,
jobName: LONG STRING ← NIL,
jobSender: LONG STRING ← NIL,
jobMediaData: PreParser.JobMediaDataPtr ← NIL,
jobQReference: JobQ.JobReference ← JobQ.nullJobReference,
lastPage: Page.Handle ← Page.nullHandle,
media: PublicPrinting.InternalMedia ← DESCRIPTOR[NIL, 0],
mediaInfo: MediaInfo ← NIL,
options: FENetSupport.PreParseOptions ← DESCRIPTOR[NIL, 0],
parms: ServPreParse.ParmsHandle ← NIL,
pageCount: LONG CARDINAL ← 0,
pageFaults: ObjectFaultHandle ← NIL,
pageResults: PreParser.PageResultsPtr ← NIL,
pageRun: CARDINAL ← 0,
proceedData: PreParser.JobProceedDataPtr ← NIL,
resourceSense: CARDINAL ← 0,
signatureData: SignatureData ← NIL,
sheetCount: LONG CARDINAL ← 0,
shutdownProc: EventHandler.MemoryActionCompleteProcType ← NIL,
streamHandle: StreamScheduler.Handle ← StreamScheduler.nullHandle,
stepHandle: JobStep.StepHandle ← JobStep.nullStepHandle,
submissionTime: System.GreenwichMeanTime ← [0],
version: CARDINAL ← 0,
wait: CONDITION];

END.
```

Copyright © 1992 Xerox Corporation All Rights Reserved

```
DIRECTORY
 CSRDefaults USING [GetPrinterType, PrinterType],
 DBError USING [OperationFailed],
 DBReferenceCount USING [ScavengeIPFiles],
 EventHandler USING [Error, ErrorCode, ReportStateChange],
 HWStatus USING [GetVideoChannelsFunctional, VideoChannels],
 IIPFragMgrPrivate USING [Create, Handle],
 IOTTypes USING [Feeder],
 JobBackUp USING [LockID],
 JobID USING [ID, nullID],
 JobQ USING [
  DereferenceJob, Error, FreeJobRoot, GetJobRoot, JobName, JobReference,
  JobRoot, LockJob, ReferenceJob, UnlockJob, BackUpJob],
 JobStep USING [Error, GetNextJob, GetRootStep, RootStep, StatusPut, StepHandle],
 MarkerSystemControl USING [IOTPropertiesPtr],
 NetServSM USING [PurgeCompleted],
 Page USING [DeleteRange, GetFirst, GetPageNo, Handle, nullHandle],
 PreParser USING [
  JobProceedData, JobProceedDataPtr, Option, OptionsPtr, OptionPtr,
  OptionsHeader, OptionType, PutCommand],
 PreParseSchedMgr USING [
  AcquireInstance, AllocateMemory, CreateInstance, FreeTask, Instance, NewState,
  NotifySchedUp, ReleaseInstance, SchedulerProcess, SetTask, StatusNotify],
 PreParseSchedTask USING [TaskRecord, Task],
 Print3SM USING [OperateOnSource],
 PrintTTY USING [LogEvent],
 Process USING [Detach],
 PublicPrinting USING [
  InternalMedia, RunOfCardinalRep, RunOfCardinalSeq, RunOfRunOfCardinalRep,
  RunofRunOfCardinalSeq],
 PublicPrintUtility USING [CopyMediaList],
 ResMgrIDs USING [TransactionID],
 RTOSFile USING [FileID, nullID],
 ServPreParse USING [preParseStep, ParmsHandle],
 SMMark USING [GetIOTProperties],
 SMPreParse USING [],
 SMPreParseSSC USING [],
 SMStep USING [GetStepParms],
 String USING [CopyToNewString],
 StreamScheduler USING [GetHandle],
 System USING [switches],
 TopLevel USING [WaitAllUp];


PreParseSchedImplA: MONITOR
 IMPORTS
  CSRDefaults, DBError, DBReferenceCount, EventHandler, HWStatus,
  IIPFragMgrPrivate, JobQ, JobStep, NetServSM, Page, PreParser,
  PreParseSchedMgr, PrintTTY, Print3SM, Process, PublicPrintUtility, SMMark,
```

Copyright © 1992 Xerox Corporation All Rights Reserved

```
 SMStep, StreamScheduler, String, System, TopLevel
EXPORTS SMPreParse, SMPreParseSSC, PreParseSchedMgr =

BEGIN


duplexYFlipSupport: PUBLIC BOOLEAN ← FALSE;
purgeON: BOOLEAN ← TRUE;
printerType: PUBLIC CSRDefaults.PrinterType ← xenith;

imagerVersionSupport: PUBLIC CARDINAL ← 0;
iotResolution: PUBLIC CARDINAL ← 0;
maxPaperLength: PUBLIC CARDINAL ← 0;
maxPaperWidth: PUBLIC CARDINAL ← 0;
minPaperLength: PUBLIC CARDINAL ← 0;
minPaperWidth: PUBLIC CARDINAL ← 0;
numPBGs: PUBLIC CARDINAL ← 0;
numVGs: PUBLIC CARDINAL ← 0;


IOTInitialized: PUBLIC PROCEDURE [] = BEGIN END;

GetNewTask: PUBLIC ENTRY PROCEDURE [] =
 BEGIN
 ENABLE UNWIND = > NULL;

 instance: PreParseSchedMgr.Instance ← NIL;
 jobID: JobID.ID;
 task: PreParseSchedTask.Task ← NIL;

 instance ← PreParseSchedMgr.AcquireInstance[captureIP];
 IF instance # NIL THEN {
  jobID ← JobStep.GetNextJob[
   stepType: ServPreParse.preParseStep, transaction: instance.id,
   skipRunningJobs: TRUE !
   JobStep.Error = > {
    IF purgeON THEN {
     DBReferenceCount.ScavengeIPFiles[];
     NetServSM.PurgeCompleted[];
     purgeON ← FALSE;
     };
    PreParseSchedMgr.ReleaseInstance[instance];
    SIGNAL EventHandler.Error[noJobAccepted];
    }; ];

  task ← BuildTask[jobID, instance];

  IF task # NIL THEN {
   PreParseSchedMgr.SetTask[instance, task]; StartPreParser[instance]; }
  ELSE {
```

Copyright © 1992 Xerox Corporation All Rights Reserved

```
    PreParseSchedMgr.ReleaseInstance[instance];

    [] ← Print3SM.OperateOnSource[
     clientID: jobID, operation: cancelJob, why: systemError];
    SIGNAL EventHandler.Error[noJobAccepted];
    };
   }
  ELSE SIGNAL EventHandler.Error[noJobAccepted];
  END;
 Init: PUBLIC PROCEDURE [] = BEGIN Process.Detach[FORK WaitForAllUp[]]; END;

 BuildTask: PROCEDURE [jobID: JobID.ID, instance: PreParseSchedMgr.Instance]
  RETURNS [task: PreParseSchedTask.Task] =
  BEGIN
  lockID: JobBackUp.LockID;
  rootStep: JobStep.RootStep;
  jobReference: JobQ.JobReference;

  task ← NIL;

  jobReference ← JobQ.ReferenceJob[
   jobID: jobID ! JobQ.Error, DBError.OperationFailed => GOTO failed; ];

  lockID ← JobQ.LockJob[
   job: jobReference, jobID: jobID, readOnly: FALSE !
   JobQ.Error, DBError.OperationFailed => {
    JobQ.DereferenceJob[job: jobReference]; GOTO failed}];

  rootStep ← JobStep.GetRootStep[
   lockID: lockID, stepType: ServPreParse.preParseStep,
   transaction: instance.id !
   JobStep.Error, DBError.OperationFailed => {
    JobQ.UnlockJob[lockID: lockID];
    JobQ.DereferenceJob[job: jobReference];
    PreParseSchedMgr.FreeTask[task, instance.heap];
    task ← NIL;
    GOTO failed;
    }; ];

  JobStep.StatusPut[
   lockID, running, rootStep.stepHandle !
   JobStep.Error, DBError.OperationFailed => {
    JobQ.UnlockJob[lockID: lockID];
    JobQ.DereferenceJob[job: jobReference];
    GOTO failed;
    }; ];

  JobQ.BackUpJob[lockID: lockID];

  task ← instance.heap.NEW[PreParseSchedTask.TaskRecord];
```

Copyright © 1992 Xerox Corporation All Rights Reserved

```
task.jobID ← jobID;
task.jobQReference ← jobReference;
task.clientContext ← LOOPHOLE[instance];

task.stepHandle ← rootStep.stepHandle;

task.parms ← SMStep.GetStepParms[
 lockID: lockID, stepRecord: rootStep.jobStep.stepRecord];

FillInProceedData[
 task, instance.id, instance.iipFragMgrHandle, lockID, instance.heap];

IF task.parms.ipFileID = RTOSFile.nullID THEN task.source ← net
ELSE task.source ← disk;

IF System.switches['C] = up THEN {
 task.streamOn ← TRUE;
 task.streamHandle ← StreamScheduler.GetHandle[
  lockID: lockID, jobID: jobID, step: rootStep.stepHandle];
 };

JobQ.UnlockJob[lockID: lockID];

EXITS failed => NULL;
END;

FillInProceedData: PROCEDURE [
 task: PreParseSchedTask.Task, id: ResMgrIDs.TransactionID,
 iipFragMgrHandle: IIPFragMgrPrivate.Handle, lockID: JobBackUp.LockID,
 heap: UNCOUNTED ZONE] =
 BEGIN
 jobRoot: JobQ.JobRoot;
 runOfCardinal: PublicPrinting.RunOfCardinalSeq ← NIL;
 runOfRunOfCardinal: PublicPrinting.RunofRunOfCardinalSeq ← NIL;
 tempMedia: PublicPrinting.InternalMedia ← PublicPrintUtility.CopyMediaList[
  in: task.parms.media, z: heap];

 task.proceedData ← heap.NEW[
  PreParser.JobProceedData ← [
  clientContext: task.clientContext,
  fragMgrHandle: LOOPHOLE[iipFragMgrHandle],
  statusProc: PreParseSchedMgr.StatusNotify, options: NIL, defaults: NIL,
  zone: heap, fileID: task.parms.ipFileID]];


 task.proceedData.options ← heap.NEW[PreParser.OptionsHeader];
 task.proceedData.defaults ← heap.NEW[PreParser.OptionsHeader];
 FOR i: PreParser.OptionType IN PreParser.OptionType DO
  task.proceedData.defaults.offsets[i] ← NIL;
  task.proceedData.options.offsets[i] ← NIL;
```

Copyright © 1992 Xerox Corporation All Rights Reserved

```
  ENDLOOP;
 task.proceedData.options.version ← 1;
 task.proceedData.options.first ← NIL;
 task.proceedData.defaults.version ← 1;
 task.proceedData.defaults.first ← NIL;

 jobRoot ← JobQ.GetJobRoot[lockID: lockID, zone: heap];

 IF task.parms.topOfQueue THEN
  DoCrashRecovery[lockID, task, jobRoot.numberOfPages];


 task.copyCount ← jobRoot.copyCount;
 runOfCardinal ← heap.NEW[PublicPrinting .RunOfCardinalRep[2]];
 runOfCardinal[0] ← task.copyCount;
 runOfCardinal[1] ← 1;
 IF task.parms.default.copyCount THEN
  task.proceedData.defaults.offsets[copySelect] ← heap.NEW[
   PreParser.Option ← [
   next: NIL, modified: FALSE, optionType: copySelect,
   type: copySelect[copySelect: runOfCardinal]]]
 ELSE
  task.proceedData.options.offsets[copySelect] ← heap.NEW[
   PreParser.Option ← [
   next: NIL, modified: FALSE, optionType: copySelect,
   type: copySelect[copySelect: runOfCardinal]]];

 IF task.parms.default.medium THEN
  task.proceedData.defaults.offsets[media] ← heap.NEW[
   PreParser.Option ← [
   next: NIL, modified: FALSE, optionType: media, type: media[tempMedia]]]
 ELSE
  task.proceedData.options.offsets[media] ← heap.NEW[
   PreParser.Option ← [
   next: NIL, modified: FALSE, optionType: media, type: media[tempMedia]]];

 WITH task.parms.pagesToPrint SELECT FROM
  range => {
   startPageNum: CARDINAL;
   IF range.endingPageNumber = 0 THEN
    range.endingPageNumber ← LAST[CARDINAL];
   IF range.beginPageNumber = 0 THEN range.beginPageNumber ← 1;
   IF range.endingPageNumber < range.beginPageNumber THEN
    range.endingPageNumber ← range.beginPageNumber;
   IF range.beginPageNumber < 2 THEN startPageNum ← 1
   ELSE startPageNum ← range.beginPageNumber - 1;

   IF range.beginPageNumber = 1 AND range.endingPageNumber = LAST[CARDINAL]
    THEN {
    runOfCardinal ← heap.NEW[PublicPrinting .RunOfCardinalRep[2]];
```

Copyright © 1992 Xerox Corporation All Rights Reserved

```
     runOfCardinal[0] ← LAST[CARDINAL];
     runOfCardinal[1] ← 1;
     }
    ELSE
     IF range.beginPageNumber = 1 THEN {
      runOfCardinal ← heap.NEW[PublicPrinting .RunOfCardinalRep[4]];
      runOfCardinal[0] ← range.endingPageNumber;
      runOfCardinal[1] ← 1;
      runOfCardinal[2] ← LAST[CARDINAL];
      runOfCardinal[3] ← 0;
      }
     ELSE
      IF range.endingPageNumber = LAST[CARDINAL] THEN {
       runOfCardinal ← heap.NEW[PublicPrinting .RunOfCardinalRep[4]];
       runOfCardinal[0] ← startPageNum;
       runOfCardinal[1] ← 0;
       runOfCardinal[2] ← LAST[CARDINAL];
       runOfCardinal[3] ← 1;
       }
      ELSE {
       runOfCardinal ← heap.NEW[PublicPrinting .RunOfCardinalRep[6]];
       runOfCardinal[0] ← startPageNum;
       runOfCardinal[1] ← 0;
       runOfCardinal[2] ←
        (range.endingPageNumber + 1) - range.beginPageNumber;
       runOfCardinal[3] ← 1;
       runOfCardinal[4] ← LAST[CARDINAL];
       runOfCardinal[5] ← 0;
       };
    };
   ENDCASE => {
    runOfCardinal ← heap.NEW[PublicPrinting .RunOfCardinalRep[2]];
    runOfCardinal[0] ← LAST[CARDINAL];
    runOfCardinal[1] ← 1;
    };

  runOfRunOfCardinal ← heap.NEW[PublicPrinting .RunOfRunOfCardinalRep[2]];
  runOfRunOfCardinal[0] ← [run[LAST[CARDINAL]]];
  runOfRunOfCardinal[1] ← [select[runOfCardinal]];

  IF task.parms.default.pagesToPrint THEN
   task.proceedData.defaults.offsets[pageSelect] ← heap.NEW[
    PreParser.Option ← [
    next: NIL, modified: FALSE, optionType: pageSelect,
    type: pageSelect[pageSelect: runOfRunOfCardinal]]]
  ELSE
   task.proceedData.options.offsets[pageSelect] ← heap.NEW[
    PreParser.Option ← [
    next: NIL, modified: FALSE, optionType: pageSelect,
    type: pageSelect[pageSelect: runOfRunOfCardinal]]];
```

Copyright © 1992 Xerox Corporation All Rights Reserved

```
IF task.parms.default.plex THEN
 task.proceedData.defaults.offsets[plex] ← heap.NEW[
  PreParser.Option ← [
  next: NIL, modified: FALSE, optionType: plex,
  type: plex[plex: task.parms.plex]]]
ELSE
 task.proceedData.options.offsets[plex] ← heap.NEW[
  PreParser.Option ← [
  next: NIL, modified: FALSE, optionType: plex,
  type: plex[plex: task.parms.plex]]];

IF task.parms.default.staple THEN
 task.proceedData.defaults.offsets[finishing] ← heap.NEW[
  PreParser.Option ← [
  next: NIL, modified: FALSE, optionType: finishing,
  type: finishing[finishing: jobRoot.finishing, firstPageMediaIndex: 0]]]
ELSE
 task.proceedData.options.offsets[finishing] ← heap.NEW[
  PreParser.Option ← [
  next: NIL, modified: FALSE, optionType: finishing,
  type: finishing[finishing: jobRoot.finishing, firstPageMediaIndex: 0]]];

task.proceedData.defaults.offsets[stacking] ← heap.NEW[
 PreParser.Option ← [
 next: NIL, modified: FALSE, optionType: stacking,
 type: stacking[
 collated: jobRoot.collated, slipSheet: jobRoot.slipSheet.required,
 offset: FALSE, slipMedia: 0]]];

task.submissionTime ← jobRoot.dateStamp;
task.version ← jobRoot.versionNumber;
task.collated ← jobRoot.collated;
task.slipSheet ← jobRoot.slipSheet.required;

task.jobSender ← String.CopyToNewString[
 s: jobRoot.netJobInfo.senderName, z: heap];
task.jobName ← String.CopyToNewString[s: jobRoot.jobName, z: heap];

JobQ.FreeJobRoot[jobRoot: jobRoot, zone: heap];

LinkOptions[task.proceedData.defaults];
LinkOptions[task.proceedData.options];

END;

LinkOptions: PROCEDURE [options: PreParser.OptionsPtr] =
 BEGIN
 lastOption: PreParser.OptionType ← copySelect;
 firstFound: BOOLEAN ← FALSE;
```

Copyright © 1992 Xerox Corporation All Rights Reserved

```
FOR option: PreParser.OptionType IN PreParser.OptionType DO
 IF options.offsets[option] # NIL THEN {
  IF firstFound THEN {
   options.offsets[lastOption].next ← options.offsets[option];
   lastOption ← option;
   }
  ELSE {
   firstFound ← TRUE;
   options.first ← options.offsets[option];
   lastOption ← option;
   };
  };
 ENDLOOP;
IF ~firstFound THEN options.first ← NIL;
END;

StartPreParser: PROCEDURE [instance: PreParseSchedMgr.Instance] =
 BEGIN
 PrintTTY.LogEvent[
  sched: preParse, event: startingJob, id: instance.task.jobID,
  transID: instance.id];

 PreParser.PutCommand[
  handle: instance.preParserHandle,
  command: [proceedWithJob[proceedRecord: instance.task.proceedData]]];

 EventHandler.ReportStateChange[
  id: [trans: instance.id, module: preParse],
  data: [
  state: running,
  jobInfo: [
  jobID: instance.task.jobID, jobChange: add, priority: medium,
  jobSize: instance.task.copyCount, state: running], resume: none,
  faultList: [NIL, NIL, NIL, NIL]]];

 END;
DoCrashRecovery: PROCEDURE [
 lockID: JobBackUp.LockID, task: PreParseSchedTask.Task, total: CARDINAL] =
 BEGIN
 lowPage: Page.Handle ← Page.nullHandle;
 highPage: Page.Handle ← Page.nullHandle;
 range: CARDINAL = 100;
 high: CARDINAL ← range;

 DeletePageRange: PROCEDURE [] =
  BEGIN
  lowPage ← Page.GetFirst[lockID: lockID];
  highPage ← Page.GetPageNo[lockID: lockID, num: high];
  Page.DeleteRange[
```

Copyright © 1992 Xerox Corporation All Rights Reserved

```
   pages: [begPage: lowPage, endPage: highPage], lockID: lockID];
  JobQ.BackUpJob[lockID: lockID];
  END;

 IF total = 0 THEN RETURN;

 FOR i: CARDINAL IN [0..(total / range)) DO DeletePageRange[]; ENDLOOP;

 high ← total MOD range;
 IF high # 0 THEN DeletePageRange[];

 END;
WaitForAllUp: PROCEDURE [] =
 BEGIN
 inst: PreParseSchedMgr.Instance ← NIL;

 TopLevel.WaitAllUp[];

 printerType ← CSRDefaults.GetPrinterType[];

 EventHandler.ReportStateChange[
  id: [trans: captureIP, module: preParse],
  data: [
  state: notReady, jobInfo: [JobID.nullID, add, medium, 0, running],
  resume: none, faultList: [NIL, NIL, NIL, NIL]]];

 inst ← PreParseSchedMgr.CreateInstance[id: captureIP];

 PreParseSchedMgr.NotifySchedUp[];

 PreParseSchedMgr.AllocateMemory[inst];

 Process.Detach[FORK PreParseSchedMgr.SchedulerProcess[inst]];

 inst.iipFragMgrHandle ← IIPFragMgrPrivate.Create[
  prePH: LOOPHOLE[inst.preParserHandle], transID: captureIP];

 SetIOTProperties[inst.heap];

 PreParseSchedMgr.NewState[inst, ready];
 EventHandler.ReportStateChange[
  id: [trans: captureIP, module: preParse],
  data: [
  state: ready, jobInfo: [JobID.nullID, add, medium, 0, running],
  resume: none, faultList: [NIL, NIL, NIL, NIL]]];

 END;
SetIOTProperties: PROCEDURE [heap: UNCOUNTED ZONE] =
 BEGIN
 iot: MarkerSystemControl.IOTPropertiesPtr ← NIL;
```

Copyright © 1992 Xerox Corporation All Rights Reserved

```
vChan: HWStatus.VideoChannels;

iot ← SMMark.GetIOTProperties[heap];
IF iot # NIL AND iot.feeders.LENGTH # 0 THEN {
 firstTime: BOOLEAN ← TRUE;
 FOR n: IOTTypes.Feeder IN [feeder0..VAL[iot.feeders.LENGTH - 1]] DO
  IF NOT iot.feeders[n].implemented THEN NULL
  ELSE
   IF firstTime THEN {
    firstTime ← FALSE;
    maxPaperLength ← iot.feeders[n].maxPaperLength;
    minPaperLength ← iot.feeders[n].minPaperLength;
    maxPaperWidth ← iot.feeders[n].maxPaperWidth;
    minPaperWidth ← iot.feeders[n].minPaperWidth;
    }
   ELSE {
    IF maxPaperLength < iot.feeders[n].maxPaperLength THEN
     maxPaperLength ← iot.feeders[n].maxPaperLength;
    IF minPaperLength > iot.feeders[n].minPaperLength THEN
     minPaperLength ← iot.feeders[n].minPaperLength;

    IF maxPaperWidth < iot.feeders[n].maxPaperWidth THEN
     maxPaperWidth ← iot.feeders[n].maxPaperWidth;
    IF minPaperWidth > iot.feeders[n].minPaperWidth THEN
     minPaperWidth ← iot.feeders[n].minPaperWidth;
    };
  ENDLOOP;
 duplexYFlipSupport ← iot.duplexYFlip;
 imagerVersionSupport ← iot.imagerVersion;
 iotResolution ← iot.resolution;
 FreeIOTPropertiesPtr[iot, heap];
 };
vChan ← HWStatus.GetVideoChannelsFunctional[];
IF vChan.h1Chan THEN numVGs ← numVGs + 4;
IF vChan.h2Chan THEN numVGs ← numVGs + 4;
IF vChan.i1Chan THEN numPBGs ← numPBGs + 1;
IF vChan.i2Chan THEN numPBGs ← numPBGs + 1;
END;
FreeIOTPropertiesPtr: PROCEDURE [
 iot: MarkerSystemControl.IOTPropertiesPtr, z: UNCOUNTED ZONE] =
 BEGIN
 IF iot # NIL THEN {
  IF iot.feeders.LENGTH # 0 THEN z.FREE[@iot.feeders.BASE];
  IF iot.speed.LENGTH # 0 THEN z.FREE[@iot.speed.BASE];
  z.FREE[@iot];
  };
 END;
END.
```

Copyright © 1992 Xerox Corporation All Rights Reserved

```
DIRECTORY
 EventHandler USING [MemoryActionCompleteProcType, ReportStateChange],
 FEfromSched USING [DeletePreParseJob],
 JobID USING [ID, nullID],
 PreParser USING [PutCommand],
 PreParseSchedMgr USING [
  Add, AbortJob, AssessAbort, SetLogStatus, FindResMgrID, FindJobID, GetState,
  NewState, SetEndStatus, State, DeleteCode, Shutdown, Instance],
 PreParseSchedObject,
 Print3SM USING [MgrStatus, OperateOnSource, Source, SourceStatus],
 PrintTTY USING [LogEvent],
 Process USING [Detach],
 ResMgrIDs USING [TransactionID],
 SMPreParseSSC USING [AbortReason, AbortStatus, ErrorCode];

PreParseSchedImplB: MONITOR
 IMPORTS
  EventHandler, FEfromSched, PreParser, PreParseSchedMgr, Print3SM, PrintTTY,
  Process
 EXPORTS SMPreParseSSC =
 BEGIN


 Error: PUBLIC SIGNAL [code: SMPreParseSSC.ErrorCode] = CODE;


 EnterDegradedMode: PUBLIC ENTRY PROCEDURE [] = BEGIN ENABLE UNWIND => 
NULL; END;


 ExitDegradedMode: PUBLIC ENTRY PROCEDURE [] = BEGIN ENABLE UNWIND => NULL;
END;


 Shutdown: PUBLIC ENTRY PROCEDURE [
  id: ResMgrIDs.TransactionID,
  proc: EventHandler.MemoryActionCompleteProcType] =
  BEGIN ENABLE UNWIND => NULL; PreParseSchedMgr.Shutdown[id, proc]; END;


 Abort: PUBLIC ENTRY PROCEDURE [
  jobID: JobID.ID, reason: SMPreParseSSC.AbortReason,
  status: SMPreParseSSC.AbortStatus] =
  BEGIN
  ENABLE UNWIND => NULL;

  sourceStatus: Print3SM.SourceStatus;
  mgrStatus: Print3SM.MgrStatus ← systemError;
  instance: PreParseSchedMgr.Instance ← PreParseSchedMgr.FindJobID[jobID];
```

Copyright © 1992 Xerox Corporation All Rights Reserved

```
return: BOOLEAN ← FALSE;
source: Print3SM.Source ← net;

IF instance = NIL THEN SIGNAL Error[taskNotFound];

[return, source] ← PreParseSchedMgr.AssessAbort[instance];
IF return THEN RETURN;

SELECT reason FROM
 netDisabled = > {
  IF source = disk THEN SIGNAL Error[noTaskOnNet];
  mgrStatus ← serviceUnavailable;
  };
 powerOff = > {
  IF NOT PreParseSchedMgr.Add[
   instance: instance, type: both,
   severityType: PreParseSchedObject.powerOffST,
   fault: PreParseSchedObject.powerOff].ok THEN SIGNAL Error[taskNotFound];
  mgrStatus ← serviceUnavailable;
  };
 diagnostics = > {
  IF NOT PreParseSchedMgr.Add[
   instance: instance, type: both,
   severityType: PreParseSchedObject.switchToDiagST,
   fault: PreParseSchedObject.switchToDiag].ok THEN
   SIGNAL Error[taskNotFound];
  mgrStatus ← serviceUnavailable;
  };
 diskFull = > {
  IF NOT PreParseSchedMgr.Add[
   instance: instance, type: both,
   severityType: PreParseSchedObject.diskFullST,
   fault: PreParseSchedObject.diskFull].ok THEN SIGNAL Error[taskNotFound];
  mgrStatus ← masterTooLarge;
  };
 resources = > {
  mgrStatus ← noError;
  IF NOT PreParseSchedMgr.Add[
   instance: instance, type: both,
   severityType: PreParseSchedObject.insufficientResourcesST,
   fault: PreParseSchedObject.insufficientResources].ok THEN
   SIGNAL Error[taskNotFound];
  };
 systemError = > {
  mgrStatus ← systemError;
  IF NOT PreParseSchedMgr.Add[
   instance: instance, type: both, fault: PreParseSchedObject.systemError,
   severityType: PreParseSchedObject.systemErrorST,
   card1: PreParseSchedMgr.DeleteCode.abortNetOnly.ORD].ok THEN
   SIGNAL Error[taskNotFound];
```

Copyright © 1992 Xerox Corporation All Rights Reserved

```
    };
   ENDCASE => {
    mgrStatus ← noError;
    IF NOT PreParseSchedMgr.Add[
     instance: instance, type: both, fault: PreParseSchedObject.genericAbort,
     severityType: PreParseSchedObject.genericAbortST,
     card1: PreParseSchedMgr.DeleteCode.abortNetOnly.ORD].ok THEN
     SIGNAL Error[taskNotFound];
    };

  sourceStatus ← Print3SM.OperateOnSource[
   operation: abort, clientID: jobID, why: mgrStatus];

  IF sourceStatus = aborted THEN GOTO exit;

  IF mgrStatus # noError AND status = abortNetOnly AND source = net THEN {
   IF sourceStatus = completed THEN SIGNAL Error[noTaskOnNet];

   PrintTTY.LogEvent[
    sched: preParse, event: aboutToAbort, id: jobID, transID: instance.id,
    code: PreParseSchedMgr.DeleteCode.abortNetOnly.ORD];
   PreParseSchedMgr.SetLogStatus[instance, deletedProb, TRUE];
   Process.Detach[FORK FEfromSched.DeletePreParseJob[jobID: jobID]];
   }
  ELSE {
   PrintTTY.LogEvent[
    sched: preParse, event: abortAllJobs, id: jobID, transID: instance.id];

   PreParseSchedMgr.SetEndStatus[instance: instance, status: faulted];

   [] ← PreParseSchedMgr.AbortJob[instance];
   };

  EXITS exit => NULL;
  END;

 Resume: PUBLIC ENTRY PROCEDURE [id: ResMgrIDs.TransactionID] =
  BEGIN
  ENABLE UNWIND => NULL;

  instance: PreParseSchedMgr.Instance ← PreParseSchedMgr.FindResMgrID[id, TRUE];
  state: PreParseSchedMgr.State ← PreParseSchedMgr.GetState[instance];

  IF state = suspended THEN {
   PrintTTY.LogEvent[
    sched: preParse, event: proceedFromSuspend, id: instance.task.jobID,
    transID: instance.id];

   EventHandler.ReportStateChange[
    id: [trans: instance.id, module: preParse],
```

Copyright © 1992 Xerox Corporation All Rights Reserved

```
    data: [
    state: running, jobInfo: [JobID.nullID, add, medium, 0, running],
    resume: none, faultList: [NIL, NIL, NIL, NIL]]];

   PreParseSchedMgr.NewState[instance, proceedFromSuspend];

   PreParser.PutCommand[
    handle: instance.preParserHandle, command: [proceedFromSuspend[]]];
   };

  END;
 Stop: PUBLIC ENTRY PROCEDURE [
  id: ResMgrIDs.TransactionID, freeStatic: BOOLEAN] =
  BEGIN
  ENABLE UNWIND => NULL;

  IF freeStatic = FALSE THEN RETURN;
  PreParseSchedMgr.Shutdown[id, NIL];

  END;
 END.
```

Copyright © 1992 Xerox Corporation All Rights Reserved

```
DIRECTORY
 DBError USING [OperationFailed],
 DecomposerCommon USING [ClientContext],
 Environment USING [Byte],
 EventHandler USING [
  FaultPointer, ID, LoggerPointer, PriorityType, ReportFaultChange],
 FaultLogger USING [ID, Log, nullLogID, SubSystem, SWModule],
 FEfromSched USING [DeletePreParseJob],
 Heap USING [Error, systemZone],
 JobBackUp USING [LockID, nullLockID],
 JobFault USING [Add, AddWarning, SeverityType],
 JobID USING [ID, nullID],
 JobQ USING [Error, LockJob, UnlockJob],
 NodeHandler USING [RequestFaultNode, RequestUniqueID],
 Page USING [Handle, nullHandle, Side],
 PreParser USING [PageResultsPtr],
 PreParserCallBack USING [ESSFault, ObjectFault],
 PreParseSchedBucket USING [
  degradedMode, hardwareProblemReboot, fatalSWErrorReboot,
  fatalSWErrorInPreParser, fatalSWErrorInSched, insufficientResource,
  functionFault, diskFull],
 PreParseSchedMgr USING [
  SetLogStatus, FaultNet, FindContextID, FindResMgrID, GetReboot, GetSense,
  Instance, ResetSense, SetEndStatus, DeleteCode, HoldTask, ReleaseTask,
  Command, AbortJob],
 PreParseSchedObject,
 PreParseSchedTask USING [ErrorType, ObjectFaultHandle, ObjectFaultNode],
 Print3SM USING [CallBackProc],
 PrintTTY USING [LogEvent],
 PublicPrinting USING [Plex],
 ResMgrIDs USING [TransactionID],
 SMPreParse USING [LogFault],
 SMPreParseSSC USING [],
 SSCRollover USING [WaitForRoll],
 String USING [FreeString];

PreParseSchedImplC: MONITOR
 IMPORTS
  DBError, EventHandler, FaultLogger, FEfromSched, Heap, JobFault, JobQ,
  NodeHandler, PreParseSchedMgr, PrintTTY, SMPreParse, SSCRollover, String
 EXPORTS PreParserCallBack, PreParseSchedMgr, SMPreParseSSC =

 BEGIN


 schedUp: CONDITION;
 schedNotUp: BOOLEAN ← TRUE;
```

Copyright © 1992 Xerox Corporation All Rights Reserved

```
Add: PUBLIC PROCEDURE [
 fault: CARDINAL, instance: PreParseSchedMgr.Instance,
 type: PreParseSchedTask.ErrorType, severityType: JobFault.SeverityType,
 side1: Page.Side ← front, functionFault: BOOLEAN ← FALSE,
 page1: Page.Handle ← Page.nullHandle,
 uniqueID: FaultLogger.ID ← FaultLogger.nullLogID, card1: CARDINAL ← 0,
 card2: CARDINAL ← 0, card3: CARDINAL ← 0, string1: LONG STRING ← NIL,
 string2: LONG STRING ← NIL, real: REAL ← 0.0,
 lockID: JobBackUp.LockID ← JobBackUp.nullLockID]
 RETURNS [ok: BOOLEAN ← FALSE] =
 BEGIN
 ENABLE UNWIND => NULL;

 lockBefore: BOOLEAN ← TRUE;

 IF PreParseSchedMgr.HoldTask[instance].ok THEN {
  ENABLE
   DBError.OperationFailed, JobQ.Error => {
    PreParseSchedMgr.ReleaseTask[instance]; GOTO exit; };

  IF uniqueID = FaultLogger.nullLogID THEN
   uniqueID ← SMPreParse.LogFault[fault];

  IF functionFault THEN
   DumpToSSC[
    instance: instance, id: uniqueID,
    faultBucket:
    IF fault = PreParseSchedObject.diskFull THEN
    PreParseSchedBucket.diskFull ELSE PreParseSchedBucket.functionFault];

  IF lockID = JobBackUp.nullLockID THEN {
   lockID ← JobQ.LockJob[
    job: instance.task.jobQReference, jobID: instance.task.jobID,
    readOnly: FALSE];
   lockBefore ← FALSE;
   };

  IF type = fault OR type = both THEN {
   JobFault.Add[
    lockID: lockID,
    fault: [
    fault: fault, uniqueID: uniqueID, page1: page1, side1: side1,
    page2: Page.nullHandle, side2: front, severityType: severityType,
    card1: card1, card2: card2, card3: card3, string1: string1,
    string2: string2, real: real]];
   PreParseSchedMgr.SetEndStatus[instance, faulted];
   };

  IF type = warning OR type = both THEN
   JobFault.AddWarning[
```

Copyright © 1992 Xerox Corporation All Rights Reserved

```
      lockID: lockID,
      warning: [
      redetectable: FALSE, pageNumber1: 0, pageNumber2: 0,
      warning: [
      fault: fault, uniqueID: uniqueID, page1: page1, side1: side1,
      page2: Page.nullHandle, side2: front, severityType: severityType,
      card1: card1, card2: card2, card3: card3, string1: string1,
      string2: string2, real: real]]];

   IF NOT lockBefore THEN JobQ.UnlockJob[lockID: lockID];
   PreParseSchedMgr.ReleaseTask[instance];
   ok ← TRUE;
   };

  EXITS exit => NULL;

  END;

 ClearFault: PUBLIC ENTRY PROCEDURE [bucket: CARDINAL] =
  BEGIN ENABLE UNWIND => NULL; END;

 ClearResourceFault: PUBLIC ENTRY PROCEDURE [transID: ResMgrIDs.TransactionID] =
  BEGIN
  ENABLE UNWIND => NULL;

  faultPointer: EventHandler.FaultPointer;
  instance: PreParseSchedMgr.Instance;
  sense: CARDINAL;

  instance ← PreParseSchedMgr.FindResMgrID[transID];
  IF instance = NIL THEN RETURN;
  sense ← PreParseSchedMgr.GetSense[instance];

  faultPointer ← NodeHandler.RequestFaultNode[number: 1];
  faultPointer↑ ← [
   record: [
   faultBucket: PreParseSchedBucket.insufficientResource, sense: sense,
   priority: operNow, mask: FALSE, zone: 0, uniqueID: NIL,
   jobID: instance.task.jobID], next: NIL, prev: NIL];
  EventHandler.ReportFaultChange[
   id: [trans: instance.id, module: preParse],
   faultList: [adds: NIL, deletes: faultPointer, changes: NIL, notifies: NIL]];
  PreParseSchedMgr.ResetSense[instance];

  END;

 DumpObjectFaultList: PUBLIC PROCEDURE [
  instance: PreParseSchedMgr.Instance, offThePage: BOOLEAN,
  lockID: JobBackUp.LockID, pageFaults: PreParseSchedTask.ObjectFaultHandle] =
  BEGIN
```

Copyright © 1992 Xerox Corporation All Rights Reserved

```
ENABLE UNWIND => NULL;

faultPtr: PreParseSchedTask.ObjectFaultHandle ← NIL;
pageHandle: Page.Handle;

BEGIN
ENABLE
 DBError.OperationFailed => {
  WHILE pageFaults # NIL DO
   faultPtr ← pageFaults;
   pageFaults ← faultPtr.next;
   BlowAwayFault[faultPtr, instance];
   ENDLOOP;
  GOTO exit;
  };

IF pageFaults = NIL THEN RETURN;
IF offThePage THEN pageHandle ← Page.nullHandle
ELSE pageHandle ← instance.task.lastPage;

WHILE pageFaults # NIL DO
 faultPtr ← pageFaults;
 pageFaults ← faultPtr.next;

 [] ← Add[
  fault: faultPtr.fault, instance: instance, type: faultPtr.error,
  page1: pageHandle, side1: faultPtr.side1,
  functionFault: faultPtr.functionFault,
  severityType: faultPtr.severityType, uniqueID: faultPtr.uniqueID,
  card1: faultPtr.card1, card2: faultPtr.card2, card3: faultPtr.card3,
  string1: faultPtr.string1, string2: faultPtr.string2, real: faultPtr.real,
  lockID: lockID];

 BlowAwayFault[faultPtr, instance];

 ENDLOOP;

EXITS exit => NULL;
END;
END;

SetFaultList: PUBLIC ENTRY PROCEDURE [
 instance: PreParseSchedMgr.Instance, command: PreParseSchedMgr.Command,
 pageResults: PreParser.PageResultsPtr]
 RETURNS [pageFaults: PreParseSchedTask.ObjectFaultHandle ← NIL] =
 BEGIN
 ENABLE UNWIND => NULL;

 tempPtr: PreParseSchedTask.ObjectFaultHandle ← NIL;
 faultPtr: PreParseSchedTask.ObjectFaultHandle ← instance.task.faultHandle;
```

Copyright © 1992 Xerox Corporation All Rights Reserved

```
side: PublicPrinting.Plex ← simplex;
headNode: BOOLEAN ← TRUE;
pageFaults ← NIL;

IF faultPtr = NIL THEN RETURN[pageFaults: NIL];

SELECT command FROM
 mediaReady, endJob => {
  pageFaults ← instance.task.faultHandle;
  instance.task.faultHandle ← NIL;
  };
 pageReady =>
  WHILE faultPtr # NIL DO
   side ← IF faultPtr.side1 = front THEN simplex ELSE duplex;
   IF faultPtr.sheetNumber = pageResults.sheet THEN {
    IF headNode AND pageFaults = NIL THEN {
     pageFaults ← faultPtr;
     faultPtr ← faultPtr.next;
     pageFaults.next ← NIL;
     instance.task.faultHandle ← faultPtr;
     }
    ELSE
     IF headNode THEN {
      tempPtr ← faultPtr;
      faultPtr ← faultPtr.next;
      tempPtr.next ← pageFaults;
      pageFaults ← tempPtr;
      instance.task.faultHandle ← faultPtr;
      }
     ELSE
      IF pageFaults = NIL THEN {
       pageFaults ← faultPtr;
       tempPtr.next ← faultPtr.next;
       faultPtr ← faultPtr.next;
       pageFaults.next ← NIL;
       }
      ELSE {
       tempPtr.next ← faultPtr.next;
       faultPtr.next ← pageFaults;
       pageFaults ← faultPtr;
       faultPtr ← tempPtr.next;
       };
    }
   ELSE {headNode ← FALSE; tempPtr ← faultPtr; faultPtr ← faultPtr.next; };
   ENDLOOP;
 ENDCASE;
END;

MicrocodeVersionMismatch: PUBLIC PROCEDURE [
 lowestMicrocodeVersion: Environment.Byte, versionOfMicrode: Environment.Byte,
```

Copyright © 1992 Xerox Corporation All Rights Reserved

```
 id: FaultLogger.ID] =
 BEGIN
 ENABLE UNWIND = > NULL;
 instance: PreParseSchedMgr.Instance;

 CheckSchedulerStarted[];


 instance ← PreParseSchedMgr.FindResMgrID[captureIP];
 DumpToSSC[instance, id, PreParseSchedBucket.hardwareProblemReboot];
 SSCRollover.WaitForRoll[];
 END;

NotifySchedUp: PUBLIC ENTRY PROCEDURE [] =
 BEGIN ENABLE UNWIND = > NULL; schedNotUp ← FALSE; BROADCAST schedUp; END;

NetCallBack: PUBLIC Print3SM.CallBackProc =
 BEGIN
 ENABLE UNWIND = > NULL;

 instance: PreParseSchedMgr.Instance;
 deleteCode: CARDINAL ← 0;
 deleteTheJob: BOOLEAN ← FALSE;
 functionFault: BOOLEAN ← FALSE;
 card1: CARDINAL ← 0;
 fault: CARDINAL ← PreParseSchedObject.clientTimedOut;
 uniqueID: FaultLogger.ID ← FaultLogger.nullLogID;
 severityType: JobFault.SeverityType ← systemError;

 instance ← PreParseSchedMgr.FindResMgrID[captureIP];
 IF instance = NIL THEN GOTO exit;

 PreParseSchedMgr.FaultNet[instance];
 PreParseSchedMgr.SetEndStatus[instance, faulted];

 WITH problem SELECT FROM
  aborted = > {
   fault ← PreParseSchedObject.netAborted;
   deleteTheJob ← TRUE;
   deleteCode ← ORD[PreParseSchedMgr.DeleteCode.netAborted];
   severityType ← PreParseSchedObject.netAbortedST;
   };
  badStreamHandle = > {
   fault ← PreParseSchedObject.badStreamHandle;
   severityType ← PreParseSchedObject.badStreamHandleST;
   functionFault ← TRUE;
   };
  courierError = > {
   fault ← PreParseSchedObject.courierError;
   deleteTheJob ← TRUE;
```

Copyright © 1992 Xerox Corporation All Rights Reserved

```
deleteCode ← ORD[PreParseSchedMgr.DeleteCode.courierError];
card1 ← ORD[code];
severityType ← PreParseSchedObject.courierErrorST;
};
directoryError = > {
fault ← PreParseSchedObject.problemWithNameOfIPFile;
card1 ← ORD[code];
uniqueID ← faultID;
severityType ← PreParseSchedObject.problemWithNameOfIPFileST;
functionFault ← TRUE;
};
invalidIPBuffer = > {
fault ← PreParseSchedObject.badPreParserBuffer;
card1 ← code;
severityType ← PreParseSchedObject.badPreParserBufferST;
functionFault ← TRUE;
};
resMgrError = > {
IF code = invalidBuffer THEN {
fault ← PreParseSchedObject.invalidBufferWhenReadingIPFile;
severityType ← PreParseSchedObject.invalidBufferWhenReadingIPFileST;
}
ELSE {
fault ← PreParseSchedObject.diskFaultWhenReadingIPFile;
severityType ← PreParseSchedObject.diskFaultWhenReadingIPFileST;
};
card1 ← ORD[code];
uniqueID ← faultID;
functionFault ← TRUE;
};
streamTimeOut = > {
fault ← PreParseSchedObject.clientTimedOut;
deleteTheJob ← TRUE;
deleteCode ← ORD[PreParseSchedMgr.DeleteCode.streamTimeOut];
severityType ← PreParseSchedObject.clientTimedOutST;
};
unknownNetResponce = > {
fault ← PreParseSchedObject.unknownNetResponce;
card1 ← ORD[code];
severityType ← PreParseSchedObject.unknownNetResponceST;
};
spare = > {
deleteCode ← ORD[PreParseSchedMgr.DeleteCode.xStreamError];
fault ← PreParseSchedObject.xStreamError;
card1 ← code;
severityType ← PreParseSchedObject.xStreamErrorST;
deleteTheJob ← TRUE;
};
ENDCASE;
```

Copyright © 1992 Xerox Corporation All Rights Reserved

```
[] ← Add[
  fault: fault, instance: instance, severityType: severityType,
  functionFault: functionFault, type: both, uniqueID: uniqueID, card1: card1,
  card3: deleteCode];

PreParseSchedMgr.SetLogStatus[
  instance: instance,
  status: IF deleteTheJob THEN deletedTimeOut ELSE faulted,
  abortStep: IF deleteTheJob THEN TRUE ELSE FALSE];

IF deleteTheJob THEN {
  PrintTTY.LogEvent[
    sched: preParse, event: aboutToAbort, code: deleteCode,
    id: instance.task.jobID, transID: instance.id];
  FEfromSched.DeletePreParseJob[jobID: clientID];
  }
ELSE [] ← PreParseSchedMgr.AbortJob[instance];

EXITS exit = > NULL;
END;
ReportESSFault: PUBLIC PROCEDURE [
 context: DecomposerCommon.ClientContext, fault: PreParserCallBack.ESSFault,
 id: FaultLogger.ID] =
 BEGIN
 ENABLE UNWIND = > NULL;

 instance: PreParseSchedMgr.Instance;

 CheckSchedulerStarted[];


 instance ← PreParseSchedMgr.FindResMgrID[captureIP];

 SELECT fault FROM
  fpuProblem = > NULL;
  noMicrocode = > NULL;
  ENDCASE = >
   FatalSWError[
    instance: instance,
    faultNumber: PreParseSchedBucket.fatalSWErrorInSched];

 DumpToSSC[instance, id, PreParseSchedBucket.degradedMode];
 END;
ReportObjectFault: PUBLIC ENTRY PROCEDURE [
 context: DecomposerCommon.ClientContext,
 objectFault: PreParserCallBack.ObjectFault] =
 BEGIN
 ENABLE UNWIND = > NULL;

 faultPtr: PreParseSchedTask.ObjectFaultHandle;
```

Copyright © 1992 Xerox Corporation All Rights Reserved

```
instance: PreParseSchedMgr.Instance;

instance ← PreParseSchedMgr.FindContextID[context];
IF instance = NIL THEN RETURN;

faultPtr ← instance.heap.NEW[
 PreParseSchedTask.ObjectFaultNode ← [] !
 Heap.Error =>
  IF type = maxSizeExceeded THEN {
   faultPtr ← Heap.systemZone.NEW[PreParseSchedTask.ObjectFaultNode ← []];
   faultPtr.zone ← system;
   CONTINUE;
   }; ];

faultPtr.severityType ←
 SELECT objectFault.severity FROM
  appearanceError => appearanceError,
  appearanceWarning => appearanceWarning,
  masterError => masterError,
  masterWarning => masterWarning,
  operationError => operationalError,
  systemError => systemError,
  comment => comment,
  ENDCASE => masterWarning;

faultPtr.error ← both;

InterpretFault[objectFault, faultPtr, instance];

faultPtr.functionFault ← objectFault.functionFault;

faultPtr.next ← instance.task.faultHandle;
instance.task.faultHandle ← faultPtr;

END;

SoftwareError: PUBLIC PROCEDURE [] =
 BEGIN
 ENABLE UNWIND => NULL;
 instance: PreParseSchedMgr.Instance;
 bucket: CARDINAL ← PreParseSchedBucket.fatalSWErrorInSched;


 instance ← PreParseSchedMgr.FindResMgrID[captureIP];

 IF PreParseSchedMgr.GetReboot[instance].reboot THEN
  bucket ← PreParseSchedBucket.fatalSWErrorInPreParser;

 FatalSWError[instance: instance, faultNumber: bucket];
 END;
```

Copyright © 1992 Xerox Corporation All Rights Reserved

```
BlowAwayFault: PROCEDURE [
 faultPtr: PreParseSchedTask.ObjectFaultHandle,
 instance: PreParseSchedMgr.Instance] =
 BEGIN

 IF faultPtr.string1 # NIL THEN
  String.FreeString[z: instance.heap, s: faultPtr.string1];
 IF faultPtr.string2 # NIL THEN
  String.FreeString[z: instance.heap, s: faultPtr.string2];
 IF faultPtr.zone = private THEN instance.heap.FREE[@faultPtr]
 ELSE Heap.systemZone.FREE[@faultPtr];
 END;

DumpToSSC: PROCEDURE [
 instance: PreParseSchedMgr.Instance, id: FaultLogger.ID,
 faultBucket: CARDINAL] =
 BEGIN
 faultPtr: EventHandler.FaultPointer;
 uniqueIDNode: EventHandler.LoggerPointer;
 jobID: JobID.ID ←
  IF instance # NIL AND instance.task # NIL THEN instance.task.jobID
  ELSE jobID ← JobID.nullID;

 faultPtr ← NodeHandler.RequestFaultNode[number: 1];
 uniqueIDNode ← NodeHandler.RequestUniqueID[number: 1];
 uniqueIDNode ↑ ← [uniqueID: id, next: NIL];
 faultPtr ↑ ← [
  record: [
  faultBucket: faultBucket, priority: operNow, mask: FALSE, sense: 0, zone: 0,
  uniqueID: uniqueIDNode, jobID: jobID], next: NIL, prev: NIL];

 EventHandler.ReportFaultChange[
  id: [trans: captureIP, module: preParse],
  faultList: [adds: NIL, deletes: NIL, changes: NIL, notifies: faultPtr]];
 END;

InterpretFault: PROCEDURE [
 fault: PreParserCallBack.ObjectFault, p: PreParseSchedTask.ObjectFaultHandle,
 instance: PreParseSchedMgr.Instance] =
 BEGIN

 p.side1 ← IF fault.side = simplex THEN front ELSE back;
 p.sheetNumber ← fault.sheetNumber;

 WITH fault.problem SELECT FROM
  badOperandValue => {
   p.fault ← PreParseSchedObject.badOperandValue;
   p.card1 ← operandType;
```

Copyright © 1992 Xerox Corporation All Rights Reserved

```
  p.real ← value;
  };
 colorSubstitued => {
  p.fault ← PreParseSchedObject.colorSubstitued; p.string1 ← colorName; };
 errorOperatorExecuted => {
  p.fault ← PreParseSchedObject.errorOperatorExecuted;
  p.string1 ← message;
  p.error ← warning;
  };
 featureNotImplemented =>
  WITH feature SELECT FROM
   longSequencesNotImpld =>
    p.fault ← PreParseSchedObject.longSequencesNotImpld;
   nestedContentInstrsUnimpld =>
    p.fault ← PreParseSchedObject.nestedContentInstrsUnimpld;
   unimplementedFeature => {
    p.fault ← PreParseSchedObject.unimplementedFeature;
    p.card1 ← subCode;
    };
   unimplementedSequenceType => {
    p.fault ← PreParseSchedObject.unimplementedSequenceType;
    p.card1 ← sequenceType;
    };
   unimplementedTypeConversion => {
    p.fault ← PreParseSchedObject.unimplementedTypeConversion;
    p.card1 ← operandType;
    p.card2 ← desiredType;
    };
   cluster => {p.fault ← PreParseSchedObject.cluster; p.string1 ← name; };
   mediaSelect => p.fault ← PreParseSchedObject.mediaSelect;
   jobPolicy => p.fault ← PreParseSchedObject.jobPolicy;
   highLightColor => {
    p.fault ← PreParseSchedObject.highlightColor; p.string1 ← color; };
   breakPageFont => {
    p.fault ← PreParseSchedObject.breakPageFont; p.error ← warning; };
   breakPageType => {
    p.fault ← PreParseSchedObject.breakPageType; p.error ← warning; };
   outPutPositions => {
    p.fault ← PreParseSchedObject.outputPosition; p.error ← warning; };
   pageBinderyFinishingSelect => {
    p.fault ← PreParseSchedObject.pageBinderyFinishingSelect; };
   ENDCASE;
 fileProblem => {
  SELECT problem FROM
   badInsertFileSyntax =>
    p.fault ← PreParseSchedObject.badInsertFileSyntax;
   imageFileNotFound => p.fault ← PreParseSchedObject.imageFileNotFound;
   insertFileNotFound => p.fault ← PreParseSchedObject.insertFileNotFound;
   insertFileProblem => p.fault ← PreParseSchedObject.insertFileProblem;
   unimplementedRESInfo =>
```

Copyright © 1992 Xerox Corporation All Rights Reserved

```
     p.fault ← PreParseSchedObject.unimplementedRESInfo;
    ENDCASE;
   p.string1 ← fileName;
   };
  findOperationFailed = > {
   p.fault ← PreParseSchedObject.findOperationFailed;
   p.card1 ← operatorType;
   p.string1 ← findArgument;
   };
  instructionProblem = > {
   SELECT problem FROM
    unrecognized = >
     p.fault ← PreParseSchedObject.unrecognizedInstructionProblem;
    badValue = > p.fault ← PreParseSchedObject.badValueInstructionProblem;
    badType = > p.fault ← PreParseSchedObject.badTypeInstructionProblem;
    ENDCASE;
   p.string1 ← instruction;
   };
  instructionValue = > {
   SELECT problem FROM
    coverMediaIndex = > p.fault ← PreParseSchedObject.coverMediaIndex;
    ENDCASE;
   p.card1 ← value;
   };
  invalidOperandTypeOnStack = > {
   p.fault ← PreParseSchedObject.invalidOperandTypeOnStack;
   p.card1 ← operatorType;
   p.card2 ← operandNumber;
   p.card3 ← operandType;
   };
  invalidTypeForSetFont = > {
   p.fault ← PreParseSchedObject.invalidTypeForSetFont;
   p.card1 ← frameIndex;
   p.card2 ← operandType;
   };
  markNotFoundOnStack = > {
   p.fault ← PreParseSchedObject.markNotFoundOnStack;
   p.card1 ← operatorType;
   p.card2 ← operandType;
   };
  masterProblem = >
   SELECT problem FROM
    notAnInterpressFile = >
     p.fault ← PreParseSchedObject.notAnInterpressFile;
    nestedCORRECTs = > p.fault ← PreParseSchedObject.nestedCORRECTs;
    noFontSpecified = > p.fault ← PreParseSchedObject.noFontSpecified;
    numericError = > p.fault ← PreParseSchedObject.numericError;
    unexpectedIPFunction = >
     p.fault ← PreParseSchedObject.unexpectedIPFunction;
    unexpectedEOF = > p.fault ← PreParseSchedObject.unexpectedEOF;
```

Copyright © 1992 Xerox Corporation All Rights Reserved

```
    badPropertyVectorStructure =>
     p.fault ← PreParseSchedObject.badPropertyVectorStructure;
    badTypeForPropertyName =>
     p.fault ← PreParseSchedObject.badTypeForPropertyName;
    propertyNameNotFound =>
     p.fault ← PreParseSchedObject.propertyNameNotFound;
    markContextMismatch =>
     p.fault ← PreParseSchedObject.markContextMismatch;
    markMissingAtPageEnd =>
     p.fault ← PreParseSchedObject.markMissingAtPageEnd;
    stackNotEmptyAtPageEnd =>
     p.fault ← PreParseSchedObject.stackNotEmptyAtPageEnd;
    ENDCASE;
  masterProblemWithCode => {
   SELECT problem FROM
    stackUnderflow => p.fault ← PreParseSchedObject.stackUnderflow;
    unexpectedMark => p.fault ← PreParseSchedObject.unexpectedMark;
    unexpectedOperator => p.fault ← PreParseSchedObject.unexpectedOperator;
    unrecognizedOperator =>
     p.fault ← PreParseSchedObject.unrecognizedOperator;
    badFrameIndex => p.fault ← PreParseSchedObject.badFrameIndex;
    badISetIndex => p.fault ← PreParseSchedObject.badISetIndex;
    badISetUsage => p.fault ← PreParseSchedObject.badISetUsage;
    badMediaIndex => p.fault ← PreParseSchedObject.badMediaIndex;
    badVectorIndex => p.fault ← PreParseSchedObject.badVectorIndex;
    invalidSequenceType =>
     p.fault ← PreParseSchedObject.invalidSequenceType;
    outputOperatorNotAllowed =>
     p.fault ← PreParseSchedObject.outputOperatorNotAllowed;
    negativeMakeVecLUbounds =>
     p.fault ← PreParseSchedObject.negativeMakeVecLUbounds;
    ENDCASE;
   p.card1 ← subCode;
   };
  postScriptProblem => {
   SELECT problem FROM
    postScriptJobError => {
     p.fault ← PreParseSchedObject.postScriptJobError;
     p.string1 ← error;
     p.string2 ← command;
     };
    postScriptJobAborted =>
     p.fault ← PreParseSchedObject.postScriptJobAborted;
    ENDCASE;
   };
  printerLimitExceeded => {
   SELECT problem FROM
    insufficientDiskSpace =>
     p.fault ← PreParseSchedObject.insufficientDiskSpace;
    insufficientMemory => p.fault ← PreParseSchedObject.insufficientMemory;
```

Copyright © 1992 Xerox Corporation All Rights Reserved

```
    invalidCurrentPosition =>
     p.fault ← PreParseSchedObject.invalidCurrentPosition;
    smHeapAllocationError =>
     p.fault ← PreParseSchedObject.smHeapAllocationError;
    mgrSMHeapAllocationError =>
     p.fault ← PreParseSchedObject.mgrSMHeapAllocationError;
    resMgrError => p.fault ← PreParseSchedObject.diskFaultWhenReadingIPFile;
    rtosFileError =>
     p.fault ← PreParseSchedObject.diskFaultWhenReadingIPFile;
    rasterDirectoryFull =>
     p.fault ← PreParseSchedObject.rasterDirectoryFull;
    tooManyFragFiles => p.fault ← PreParseSchedObject.tooManyFragFiles;
    tooManyFrags => p.fault ← PreParseSchedObject.tooManyFrags;
    ENDCASE;
   p.card1 ← code;
   };
  unrecoverableDiskError => {
   SELECT diskError FROM
    iipFragMgrError => p.fault ← PreParseSchedObject.iipFragMgrErrorDisk;
    ENDCASE;
   p.uniqueID ← id;
   };
  unrecoverableSoftwareProblem => {
   SELECT swError FROM
    pageInitError => p.fault ← PreParseSchedObject.pageInitError;
    softwareBugNoIIP => p.fault ← PreParseSchedObject.softwareBugNoIIP;
    unexpectedIPTrap => p.fault ← PreParseSchedObject.unexpectedIPTrap;
    invalidNode => p.fault ← PreParseSchedObject.invalidNode;
    ENDCASE;
   };
  unrecoverableSWProblemWithCode => {
   SELECT swError FROM
    unexpectedIPFunction =>
     p.fault ← PreParseSchedObject.unexpectedIPFunction;
    imageInstallError => p.fault ← PreParseSchedObject.imageInstallError;
    imageInstallDirectoryError =>
     p.fault ← PreParseSchedObject.imageInstallDirectoryError;
    unexpectedSignal => p.fault ← PreParseSchedObject.unexpectedSignal;
    imageInstallOtherError =>
     p.fault ← PreParseSchedObject.imageInstallOtherError;
    imageInstallBccError =>
     p.fault ← PreParseSchedObject.imageInstallBccError;
    imageInstallAcqBufferError =>
     p.fault ← PreParseSchedObject.imageInstallAcqBufferError;
    imageInstallNotAvailable =>
     p.fault ← PreParseSchedObject.imageInstallNotAvailable;
    iipFragMgrError => p.fault ← PreParseSchedObject.iipFragMgrError;
    unexpectedError => p.fault ← PreParseSchedObject.unexpectedError;
    ENDCASE;
   p.card1 ← code;
```

Copyright © 1992 Xerox Corporation All Rights Reserved

```
   };
  ENDCASE;
 END;

CheckSchedulerStarted: ENTRY PROCEDURE [] =
 BEGIN ENABLE UNWIND => NULL; IF schedNotUp THEN WAIT schedUp; END;

FatalSWError: PROCEDURE [
 instance: PreParseSchedMgr.Instance, faultNumber: CARDINAL] =
 BEGIN
 id: FaultLogger.ID;

 id ← FaultLogger.Log[
  fault: [subsystem: control, swModule: sysMgr, faultNumber: faultNumber]];
 DumpToSSC[instance, id, PreParseSchedBucket.fatalSWErrorReboot];
 SSCRollover.WaitForRoll[];

 END;
END.
```

Copyright © 1992 Xerox Corporation All Rights Reserved

```
DIRECTORY
 ASWFileTypes USING [ipCapture],
 CoalescerTable USING [BitMapEntryLinkHandle, UnknownFontEntryLinkHandle],
 Heap USING [systemZone],
 PreParser USING [
  JobAttributes, JobResults, JobResultsPtr, JobProceedData, JobProceedDataPtr,
  Option, OptionPtr, OptionsHeader, OptionsPtr, OptionType, PageResults,
  Status],
 PreParseSchedMgr USING [SoftwareError],
 PreParseSchedTask USING [ObjectFaultHandle, Task],
 PublicPrintUtility USING [FreeMediaList],
 RMDirectory USING [Error, IdFromName, maxNameLength, NameFromId, UnRegister],
 RTOSFile USING [Delete, Error, FileID, GetFileInfo, nullID],
 ServPreParse USING [ParmsHandle, preParseStep],
 FENetSupport USING [PreParseOptions],
 SMStep USING [FreeParmsHandle],
 String USING [FreeString, InvalidNumber, StringToNumber];

PreParseSchedImplD: PROGRAM
 IMPORTS
  Heap, PreParseSchedMgr, PublicPrintUtility, RMDirectory, RTOSFile, SMStep,
  String
 EXPORTS PreParseSchedMgr =

 BEGIN

 deleteIP: BOOLEAN ← TRUE;


 FreeStatus: PUBLIC PROCEDURE [status: PreParser.Status, z: UNCOUNTED ZONE] =

  BEGIN
  WITH status SELECT FROM
   preParserStartCompleted => NULL;
   preParserCompleted => z.FREE[@jobResultsPtr];
   preParserPageCompleted =>
    BEGIN
    WHILE pageResultsPtr.bitMapLinks # NIL DO
     bitMapLink: CoalescerTable.BitMapEntryLinkHandle ←
      pageResultsPtr.bitMapLinks;
     pageResultsPtr.bitMapLinks ← pageResultsPtr.bitMapLinks.next;
     IF bitMapLink.list # NIL THEN z.FREE[@bitMapLink.list.BASE];
     z.FREE[@bitMapLink];
     ENDLOOP;
    WHILE pageResultsPtr.fontLinks # NIL DO
     fontLink: CoalescerTable.UnknownFontEntryLinkHandle ←
      pageResultsPtr.fontLinks;
     pageResultsPtr.fontLinks ← pageResultsPtr.fontLinks.next;
```

Copyright © 1992 Xerox Corporation All Rights Reserved

```
      IF fontLink.list # NIL THEN
       BEGIN
       FOR j: CARDINAL IN [0..fontLink.list.LENGTH) DO
        String.FreeString[z, fontLink.list[j].authorityID];
        String.FreeString[z, fontLink.list[j].charCodeID];
        String.FreeString[z, fontLink.list[j].typeFaceID];
        ENDLOOP;
       z.FREE[@fontLink.list.BASE];
       END;
      z.FREE[@fontLink];
      ENDLOOP;
     z.FREE[@pageResultsPtr];
     END;
    ENDCASE => NULL;
   END;

  FreeProceedData: PUBLIC PROCEDURE [
   data: PreParser.JobProceedDataPtr, z: UNCOUNTED ZONE] =

   BEGIN

   FreeOptions[data.options, z];
   FreeOptions[data.defaults, z];

   z.FREE[@data];
   END;

  FreeTask: PUBLIC PROCEDURE [task: PreParseSchedTask.Task, z: UNCOUNTED ZONE] =
   BEGIN
   temp: PreParseSchedTask.ObjectFaultHandle;
   IF task # NIL THEN
    BEGIN



    WHILE task.faultHandle # NIL DO
     temp ← task.faultHandle;
     task.faultHandle ← temp.next;
     IF temp.zone = private THEN NULL ELSE Heap.systemZone.FREE[@temp];
     ENDLOOP;

    WHILE task.pageFaults # NIL DO
     temp ← task.pageFaults;
     task.pageFaults ← temp.next;
     IF temp.zone = private THEN NULL ELSE Heap.systemZone.FREE[@temp];
     ENDLOOP;
```

Copyright © 1992 Xerox Corporation All Rights Reserved

```
  IF task.parms # NIL THEN
   BEGIN
   ENABLE RTOSFile.Error => CONTINUE;

   IF task.parms.ipFileID = RTOSFile.nullID THEN NULL
   ELSE
    IF RTOSFile.GetFileInfo[
     fileID: task.parms.ipFileID, volumeName: NIL].fileType #
     ASWFileTypes.ipCapture THEN
     CleanUpFiles[ipFile: task.parms.ipFileID, nSwitchSet: FALSE]

    ELSE
     IF NOT CheckName[name: task.jobName].bypass THEN
      CleanUpFiles[ipFile: task.parms.ipFileID, nSwitchSet: TRUE]
     ELSE
      CleanUpFiles[
       ipFile: task.parms.ipFileID, nSwitchSet: TRUE, checkLimit: TRUE];

   SMStep.FreeParmsHandle[ServPreParse.preParseStep, task.parms];
   END;



  END;
 END;


FreeNetSupportOptions: PUBLIC PROCEDURE [
 data: FENetSupport.PreParseOptions, z: UNCOUNTED ZONE] =

 BEGIN
 IF data # NIL THEN
  BEGIN

  FOR i: CARDINAL IN [0..data.LENGTH) DO
   WITH p: data[i] SELECT FROM
    docComment =>
     IF p.docComment # NIL THEN String.FreeString[z, p.docComment];
    docCreateDate =>
     WITH p.docCreateDate SELECT FROM
      string => IF string # NIL THEN String.FreeString[z, string];
      ENDCASE;
    docCreator =>
     IF p.docCreator # NIL THEN String.FreeString[z, p.docCreator];
    docEndMessage =>
     IF p.docEndMessage # NIL THEN String.FreeString[z, p.docEndMessage];
    docName => IF p.docName # NIL THEN String.FreeString[z, p.docName];
    docStartMessage =>
     IF p.docStartMessage # NIL THEN
```

Copyright © 1992 Xerox Corporation All Rights Reserved

```
      String.FreeString[z, p.docStartMessage];
    finishingMessage =>
     IF p.finishingMessage # NIL THEN
      String.FreeString[z, p.finishingMessage];
    jobAccount =>
     IF p.jobAccount # NIL THEN String.FreeString[z, p.jobAccount];
    jobAcquireAccess =>
     WITH n: p.jobAcquireAccess SELECT FROM
      namedList => IF n.list # NIL THEN String.FreeString[z, n.list];
      ENDCASE;
    jobComment =>
     IF p.jobComment # NIL THEN String.FreeString[z, p.jobComment];
    jobEndMessage =>
     IF p.jobEndMessage # NIL THEN String.FreeString[z, p.jobEndMessage];
    jobModifyAccess =>
     WITH n: p.jobModifyAccess SELECT FROM
      namedList => IF n.list # NIL THEN String.FreeString[z, n.list];
      ENDCASE;
    jobName => IF p.jobName # NIL THEN String.FreeString[z, p.jobName];
    jobOwner => IF p.jobOwner # NIL THEN String.FreeString[z, p.jobOwner];
    jobStartMessage =>
     IF p.jobStartMessage # NIL THEN
      String.FreeString[z, p.jobStartMessage];
    recipientName =>
     IF p.recipientName # NIL THEN String.FreeString[z, p.recipientName];
    senderName =>
     IF p.senderName # NIL THEN String.FreeString[z, p.senderName];
    other =>
     BEGIN
     IF p.otherOption.name # NIL THEN
      String.FreeString[z, p.otherOption.name];
     IF p.otherOption.data.BASE # NIL THEN
      z.FREE[@p.otherOption.data.BASE];
     END;
    ENDCASE;
   ENDLOOP;

  z.FREE[@data.BASE];
  data ← DESCRIPTOR[NIL, 0];
  END;
 END;


CleanUpFiles: PROCEDURE [
 ipFile: RTOSFile.FileID, nSwitchSet: BOOLEAN, checkLimit: BOOLEAN ← FALSE] =
 BEGIN
 ENABLE BEGIN RMDirectory.Error => CONTINUE; RTOSFile.Error => CONTINUE; END;

 fileLimit: CARDINAL = 5;
 fileName: LONG STRING ← [RMDirectory.maxNameLength];
```

Copyright © 1992 Xerox Corporation All Rights Reserved

```
 instructions: RTOSFile.FileID ← RTOSFile.nullID;

 IF NOT deleteIP THEN RETURN;

 RMDirectory.NameFromId[name: fileName, id: ipFile];
 IF checkLimit AND NOT CheckLimit[fileName].overLimit THEN RETURN;
 RMDirectory.UnRegister[name: fileName];
 RTOSFile.Delete[fileID: ipFile];

 IF nSwitchSet THEN
  BEGIN
  fileName[fileName.length - 1] ← 'i;
  instructions ← RMDirectory.IdFromName[
   fileName ! RMDirectory.Error => GOTO exit];
  RMDirectory.UnRegister[name: fileName];
  RTOSFile.Delete[fileID: instructions];
  END;

 EXITS exit => NULL;
 END;

CheckLimit: PROCEDURE [name: LONG STRING] RETURNS [overLimit: BOOLEAN ← TRUE]
=
 BEGIN
 limit: CARDINAL = 5;
 startNum: CARDINAL = 10;
 i: CARDINAL ← startNum;
 number: LONG STRING ← [RMDirectory.maxNameLength];
 version: CARDINAL ← LAST[CARDINAL];

 WHILE name[i] # '. AND i # name.length DO
  number[i - startNum] ← name[i]; i ← i + 1; ENDLOOP;
 number.length ← i - startNum;
 version ← String.StringToNumber[number ! String.InvalidNumber => GOTO exit];

 IF i # 0 AND version <= limit THEN overLimit ← FALSE;

 EXITS exit => NULL;
 END;

CheckName: PROCEDURE [name: LONG STRING] RETURNS [bypass: BOOLEAN] =
 BEGIN
 bypassName: LONG STRING = "SAVEIP"L;

 LowerCase: PROCEDURE [c: CHARACTER] RETURNS [CHARACTER] =
  BEGIN IF c IN ['A..'Z] THEN c ← c + ('a - 'A); RETURN[c] END;

 IF name = NIL OR name.length < bypassName.length THEN RETURN[bypass: FALSE];

 FOR i: CARDINAL IN [0..bypassName.length) DO
```

Copyright © 1992 Xerox Corporation All Rights Reserved

```
  IF name[i] = bypassName[i] OR name[i] = LowerCase[bypassName[i]] THEN NULL
  ELSE RETURN[bypass: FALSE];
  ENDLOOP;
 bypass ← TRUE;
 END;

FreeJobAttributes: PROCEDURE [
 data: PreParser.JobAttributes, z: UNCOUNTED ZONE] =
 BEGIN
 IF data # NIL THEN
  BEGIN
  IF data.jobCreateDate # NIL THEN
   String.FreeString[z: z, s: data.jobCreateDate];
  IF data.jobName # NIL THEN String.FreeString[z: z, s: data.jobName];
  IF data.jobAccountName # NIL THEN
   String.FreeString[z: z, s: data.jobAccountName];
  IF data.jobComment # NIL THEN String.FreeString[z: z, s: data.jobComment];
  IF data.jobSender # NIL THEN String.FreeString[z: z, s: data.jobSender];
  IF data.jobRecipient # NIL THEN
   String.FreeString[z: z, s: data.jobRecipient];
  IF data.jobStartMessage # NIL THEN
   String.FreeString[z: z, s: data.jobStartMessage];
  IF data.jobEndMessage # NIL THEN
   String.FreeString[z: z, s: data.jobEndMessage];
  z.FREE[@data];
  END;
 END;


FreeOptions: PROCEDURE [ptr: PreParser.OptionsPtr, z: UNCOUNTED ZONE] =

 BEGIN
 IF ptr # NIL THEN
  BEGIN
  FOR option: PreParser.OptionType IN PreParser.OptionType DO
   IF ptr.offsets[option] # NIL THEN
    BEGIN
    SELECT option FROM
     copySelect =>
      IF ptr.offsets[option].copySelect # NIL THEN
       z.FREE[@ptr.offsets[option].copySelect];
     docComment =>
      IF ptr.offsets[option].docComment # NIL THEN
       String.FreeString[z: z, s: ptr.offsets[option].docComment];
     docCreationDate =>
      IF ptr.offsets[option].createDate # NIL THEN
       String.FreeString[z: z, s: ptr.offsets[option].createDate];
     docCreator =>
      IF ptr.offsets[option].docCreator # NIL THEN
```

Copyright © 1992 Xerox Corporation All Rights Reserved

```
      String.FreeString[z: z, s: ptr.offsets[option].docCreator];
    docName =>
     IF ptr.offsets[option].docName # NIL THEN
      String.FreeString[z: z, s: ptr.offsets[option].docName];
    docStartMessage =>
     IF ptr.offsets[option].docStartMessage # NIL THEN
      String.FreeString[z: z, s: ptr.offsets[option].docStartMessage];
    docEndMessage =>
     IF ptr.offsets[option].docEndMessage # NIL THEN
      String.FreeString[z: z, s: ptr.offsets[option].docEndMessage];
    media =>
     PublicPrintUtility.FreeMediaList[@ptr.offsets[option].media, z];
    pageSelect =>
     IF ptr.offsets[option].pageSelect # NIL THEN
      z.FREE[@ptr.offsets[option].pageSelect];
    jobAttributes =>
     FreeJobAttributes[ptr.offsets[option].jobAttributes, z];
    other => FreeOtherOption[ptr.offsets[option], z];
    ENDCASE => NULL;
   z.FREE[@ptr.offsets[option]];
   END;
  ENDLOOP;
 z.FREE[@ptr];
 END;
END;

FreeOtherOption: PROCEDURE [ptr: PreParser.OptionPtr, z: UNCOUNTED ZONE] =

 BEGIN
 IF ptr # NIL THEN
  BEGIN
  FreeOtherOption[ptr.next, z];

  WITH ptr ↑ SELECT ptr.optionType FROM
   other => {
    IF otherOption.name # NIL THEN z.FREE[@otherOption.name];
    IF otherOption.data # NIL THEN z.FREE[@otherOption.data.BASE];
    };
   ENDCASE => PreParseSchedMgr.SoftwareError[];
  z.FREE[@ptr];
  END;
 END;

END.
```

Copyright © 1992 Xerox Corporation All Rights Reserved

```
DIRECTORY
 AuditEvents USING [AuditEvent, LogAuditEvent],
 CSRDefaults USING [BinderType, GetBinderType],
 DecomposerCommon USING [Corner],
 FeatureStatusDefaults USING [GetDFAEnabled],
 FEfromSched USING [ConvertToStandard, DeletePreParseJob],
 NetworkLog USING [Destination, MessageStatus, LogNetJob, JobStatus],
 JobBackUp USING [LockID],
 JobFault USING [SeverityType],
 NetLogExtra USING [ReLogNetJob],
 JobStep USING [Status],
 JobQ USING [GetMediaAndPlex, GetPrintRecord, PrintRecord, SetPrintRecord],
 Page USING [
  GetFirst, GetParameters, Handle, nullHandle, Parameters,
  GetNumberOfPagesWithMedium],
 PreParser USING [BookletSignatureOption],
 PreParseSchedMgr USING [
  Add, AbortJob, SetLogStatus, InternalErrorCode, Instance, GetLogStatus,
  maxPaperLength, maxPaperWidth, minPaperLength, minPaperWidth, DeleteCode,
  printerType],
 PreParseSchedObject,
 PreParseSchedTask USING [SignatureDataRec, Task],
 Print3SM USING [MgrStatus, OperateOnSource, SourceStatus],
 PrintTTY USING [LogEvent],
 Process USING [Detach],
 PublicPrinting USING [ColorTypes, Finishing, InternalMedia, MediumDimensions],
 PublicPrintUtility USING [FreeMediaList, FreeMedium],
 Real USING [Float, RealException, RoundC, RoundI],
 ResMgrIDs USING [TransactionID],
 SMMark USING [GetImagingProperties];

PreParseSchedImplE: PROGRAM
 IMPORTS
  AuditEvents, CSRDefaults, FeatureStatusDefaults, FEfromSched, NetLogExtra,
  JobQ, NetworkLog, Page, PreParseSchedMgr, Print3SM, PrintTTY, Process,
  PublicPrintUtility, Real, SMMark
 EXPORTS PreParseSchedMgr =

 BEGIN

 maxCopyCount: CARDINAL = 9999;

 InternalError: PUBLIC SIGNAL [code: PreParseSchedMgr.InternalErrorCode] = CODE;

 BookletSignature: PUBLIC PROCEDURE [
  instance: PreParseSchedMgr.Instance,
  signature: PreParser.BookletSignatureOption] =
```

Copyright © 1992 Xerox Corporation All Rights Reserved

```
BEGIN
signatureFault: BOOLEAN ← FALSE;
ipOrigin: DecomposerCommon.Corner;
count: CARDINAL ← 0;
width: CARDINAL ← 0;
length: CARDINAL ← 0;
paperWidth: CARDINAL ← 0;
paperLength: CARDINAL ← 0;
resultSheetX: CARDINAL ← 0;
resultSheetY: CARDINAL ← 0;

instance.task.signature ← TRUE;

instance.task.signatureData ← instance.heap.NEW[
 PreParseSchedTask.SignatureDataRec];

IF signature.resultXSheetSize # 0 OR signature.resultYSheetSize # 0 THEN
 BEGIN
 ENABLE
  Real.RealException => {
   [] ← PreParseSchedMgr.Add[
    fault: PreParseSchedObject.invalidPrintParameters, type: both,
    instance: instance, card1: 5,
    severityType: PreParseSchedObject.invalidPrintParametersST];
   CONTINUE};
 instance.task.signatureData.resultSheetSize.widthInMillimeters ←
  Real.RoundC[signature.resultXSheetSize * 1000.0];
 instance.task.signatureData.resultSheetSize.lengthInMillimeters ←
  Real.RoundC[signature.resultYSheetSize * 1000.0];
 instance.task.signatureData.checkResultSheet ← TRUE;
 END;

instance.task.signatureData.maxShift ← Real.RoundC[
 signature.maxShift * 1000.0 !
 Real.RealException => {
  [] ← PreParseSchedMgr.Add[
   fault: PreParseSchedObject.invalidPrintParameters, type: both,
   instance: instance, card1: 3,
   severityType: PreParseSchedObject.invalidPrintParametersST];
  CONTINUE}];
IF signature.maxShift # 0 THEN
 [] ← PreParseSchedMgr.Add[
  instance: instance, type: both, fault: PreParseSchedObject.signatureShift,
  severityType: PreParseSchedObject.signatureShiftST,
  real: signature.maxShift];

instance.task.signatureData.bindDirection ← signature.bindDirection;

IF signature.impositionsPerSurface # 0 THEN
 [] ← PreParseSchedMgr.Add[
```

Copyright © 1992 Xerox Corporation All Rights Reserved

```
    instance: instance, type: both,
    fault: PreParseSchedObject.impositionsNotSupported,
    severityType: PreParseSchedObject.impositionsNotSupportedST,
    card1: signature.impositionsPerSurface];


IF signature.sourcePageDims # NIL THEN
 BEGIN
 instance.task.signatureData.sourceDims ← TRUE;

 FOR i: CARDINAL IN [0..2) DO
  WITH signature.sourcePageDims[i] SELECT FROM
   mediaDim => instance.task.signatureData.page ← mediaDim;
   pageRun => instance.task.signatureData.numPages ← pageRun;
   ENDCASE;
  ENDLOOP;

 IF signature.sourcePageDims.length > 2 THEN
  [] ← PreParseSchedMgr.Add[
   instance: instance, type: both,
   fault: PreParseSchedObject.sourcePageDimRunTooLong,
   severityType: PreParseSchedObject.sourcePageDimRunTooLongST,
   card1: signature.sourcePageDims.length];

 FOR i: CARDINAL IN [0..instance.task.media.LENGTH) DO
  [paperWidth, paperLength] ← instance.task.media[i].mediumDimensions;
  ipOrigin ← instance.task.jobMediaData.orientedImagingProps[i].ipOrigin;

  [width, length] ← instance.task.signatureData.page;

  IF (paperWidth > paperLength AND width > length)
   OR (paperLength > paperWidth AND length > width) THEN {
   ipOrigin ← SELECT ipOrigin FROM LL => UL, UL => LL, ENDCASE => LL; };

  instance.task.jobMediaData.orientedImagingProps[i] ← [
   props: SMMark.GetImagingProperties[[width, length]],
   ipOrigin: ipOrigin];

  ENDLOOP;

 END
ELSE instance.task.signatureData.sourceDims ← FALSE;
FOR i: CARDINAL IN [0..instance.task.media.LENGTH) DO

 [width, length] ← instance.task.media[i].mediumDimensions;
 ipOrigin ← instance.task.jobMediaData.orientedImagingProps[i].ipOrigin;

 ipOrigin ← SELECT ipOrigin FROM LL => UL, UL => LL, ENDCASE => LL;
 IF width > length THEN width ← width / 2 ELSE length ← length / 2;
```

Copyright © 1992 Xerox Corporation All Rights Reserved

```
  instance.task.jobMediaData.orientedImagingProps[i] ← [
   props: SMMark.GetImagingProperties[[width, length]], ipOrigin: ipOrigin];
  ENDLOOP;

 END;

NotifyNetJobArrived: PUBLIC PROCEDURE [
 instance: PreParseSchedMgr.Instance, endingStatus: JobStep.Status] =
 BEGIN

 event: AuditEvents.AuditEvent ← logPrintAndDeleteJob;
 destination: NetworkLog.Destination ← printQueue;
 message: NetworkLog.MessageStatus ← GetMessage[instance.task];
 jobStatus: NetworkLog.JobStatus ← PreParseSchedMgr.GetLogStatus[instance];


 jobStatus ←
  SELECT endingStatus FROM
   faulted => faulted,
   aborted => jobStatus,
   ENDCASE => received;

 SELECT instance.task.disposition FROM
  printAndDelete => {destination ← printQueue; event ← logPrintAndDeleteJob};
  save => {destination ← systemQueue; event ← logSaveJob};
  printAndSave, proof => {
   destination ← systemQueue; event ← logPrintAndSaveJob};
  ENDCASE;

 IF instance.task.source = net THEN
  NetworkLog.LogNetJob[
   [
   jobID: instance.task.jobID, objectName: instance.task.jobName,
   senderName: instance.task.jobSender, version: instance.task.version,
   submissionTime: instance.task.submissionTime, destination: destination,
   messageStatus: message, jobStatus: jobStatus]]
 ELSE
  NetLogExtra.ReLogNetJob[
   [
   jobID: instance.task.jobID, objectName: instance.task.jobName,
   senderName: instance.task.jobSender, version: instance.task.version,
   submissionTime: instance.task.submissionTime, destination: destination,
   messageStatus: message, jobStatus: jobStatus]];

 AuditEvents.LogAuditEvent[
  event: event, jobId: instance.task.jobID, jobName: instance.task.jobName,
  versionNumber: instance.task.version, otherName: NIL];
 END;

GetCorner: PUBLIC PROCEDURE [rotation: INTEGER]
```

Copyright © 1992 Xerox Corporation All Rights Reserved

```
 RETURNS [corner: DecomposerCommon.Corner] =
 BEGIN
 corner ←
  SELECT rotation FROM
   0, 360 => LL,
   90, -270 => UL,
   180, -180 => UR,
   270, -90 => LR,
   ENDCASE => LL;
 END;

GetRotation: PUBLIC PROCEDURE [corner: DecomposerCommon.Corner]
 RETURNS [rotation: INTEGER] =
 BEGIN
 rotation ←
  SELECT corner FROM LL => 0, UL => 90, UR => 180, LR => -90, ENDCASE => 0;
 END;

FatalError: PUBLIC PROCEDURE [
 instance: PreParseSchedMgr.Instance, severityType: JobFault.SeverityType,
 why: Print3SM.MgrStatus ← noError, functionFault: BOOLEAN ← FALSE,
 fault: CARDINAL, arg1: CARDINAL ← 0, arg2: CARDINAL ← 0, arg3: CARDINAL ← 0] =
 BEGIN
 sourceStatus: Print3SM.SourceStatus ← completed;

 PrintTTY.LogEvent[
  sched: preParse, event: schedSWError, id: instance.task.jobID,
  transID: instance.id];

 sourceStatus ← Print3SM.OperateOnSource[
  clientID: instance.task.jobID, operation: abort, why: why];

 [] ← PreParseSchedMgr.Add[
  instance: instance, type: both, functionFault: functionFault,
  severityType: severityType, fault: fault, card1: arg1, card2: arg2,
  card3: arg3];

 IF sourceStatus = completed OR why = noError OR instance.task.source = disk
  THEN [] ← PreParseSchedMgr.AbortJob[instance]

 ELSE
  IF instance.task.source = net THEN
   BEGIN
   PreParseSchedMgr.SetLogStatus[instance, deletedProb, TRUE];
   PrintTTY.LogEvent[
    sched: preParse, event: aboutToAbort,
    code: PreParseSchedMgr.DeleteCode.fatalError.ORD,
    id: instance.task.jobID, transID: instance.id];
   Process.Detach[
    FORK FEfromSched.DeletePreParseJob[jobID: instance.task.jobID]];
```

Copyright © 1992 Xerox Corporation All Rights Reserved

```
   END;
  END;

 CheckDimensions: PUBLIC PROCEDURE [length: CARDINAL, width: CARDINAL]
  RETURNS [bad: BOOLEAN] =
  BEGIN

  IF
   (length < PreParseSchedMgr.minPaperLength
    OR length > PreParseSchedMgr.maxPaperLength)
   OR
    (width < PreParseSchedMgr.minPaperWidth
     OR width > PreParseSchedMgr.maxPaperWidth) THEN bad ← TRUE
  ELSE bad ← FALSE;
  END;

 GetMessage: PROCEDURE [task: PreParseSchedTask.Task]
  RETURNS [messageStautus: NetworkLog.MessageStatus ← noMessage] =
  BEGIN
  messageStautus ←
   SELECT TRUE FROM
    (~task.startMessage AND ~task.finishingMsg AND ~task.mediaMessage
     AND ~task.endMessage) => noMessage,
    (task.startMessage AND ~task.finishingMsg AND ~task.mediaMessage
     AND ~task.endMessage) => jobStartMessage,
    (~task.startMessage AND task.finishingMsg AND ~task.mediaMessage
     AND ~task.endMessage) => finishingMessage,
    (~task.startMessage AND ~task.finishingMsg AND task.mediaMessage
     AND ~task.endMessage) => mediaMessage,
    (~task.startMessage AND ~task.finishingMsg AND ~task.mediaMessage
     AND task.endMessage) => jobEndMessage,
    (task.startMessage AND task.finishingMsg AND ~task.mediaMessage
     AND ~task.endMessage) => startXfinish,
    (task.startMessage AND ~task.finishingMsg AND task.mediaMessage
     AND ~task.endMessage) => startXmedia,
    (task.startMessage AND ~task.finishingMsg AND ~task.mediaMessage
     AND task.endMessage) => startXend,
    (~task.startMessage AND task.finishingMsg AND task.mediaMessage
     AND ~task.endMessage) => finishXmedia,
    (~task.startMessage AND task.finishingMsg AND ~task.mediaMessage
     AND task.endMessage) => finishXend,
    (~task.startMessage AND ~task.finishingMsg AND task.mediaMessage
     AND task.endMessage) => mediaXend,
    (task.startMessage AND task.finishingMsg AND task.mediaMessage
     AND ~task.endMessage) => startXfinishXmedia,
    (task.startMessage AND task.finishingMsg AND ~task.mediaMessage
     AND task.endMessage) => startXfinishXend,
    (task.startMessage AND ~task.finishingMsg AND task.mediaMessage
     AND task.endMessage) => startXendXmedia,
    (~task.startMessage AND task.finishingMsg AND task.mediaMessage
```

Copyright © 1992 Xerox Corporation All Rights Reserved

```
   AND task.endMessage) => finishXmediaXend,
   ENDCASE => startXfinishXmediaXend;
  END;

 SetImageShift: PUBLIC PROCEDURE [
  instance: PreParseSchedMgr.Instance, xShift: BOOLEAN, shift: REAL]
  RETURNS [result: INTEGER ← 0] =
  BEGIN
  ENABLE
   Real.RealException => {
    [] ← PreParseSchedMgr.Add[
     fault: PreParseSchedObject.invalidPrintParameters, type: both,
     instance: instance, card1: 2,
     severityType: PreParseSchedObject.invalidPrintParametersST];
    CONTINUE};
  task: PreParseSchedTask.Task ← instance.task;
  inchesPerMeter: REAL = 39.37;
  dotsPerMeter: REAL;

  dotsPerMeter ←
   SELECT task.jobMediaData.deviceProps.resolution FROM
    600 => 23622,
    300 => 11811,
    1200 => 47244,
    ENDCASE =>
     (Real.Float[task.jobMediaData.deviceProps.resolution] * inchesPerMeter);

  result ← Real.RoundI[dotsPerMeter * shift];
  END;

 CheckPostConflicts: PUBLIC PROCEDURE [
  instance: PreParseSchedMgr.Instance, lockID: JobBackUp.LockID]
  RETURNS [conflicts: BOOLEAN ← FALSE] =

  BEGIN
  jobMedia: PublicPrinting.InternalMedia;
  page: Page.Handle;
  pageParms: Page.Parameters;
  printRecord: JobQ.PrintRecord;
  finishing: PublicPrinting.Finishing ← none;
  finishingChanged: BOOLEAN ← FALSE;
  binderType: CSRDefaults.BinderType;
  numberOfMediaUsed: CARDINAL ← 0;


  IF instance.task.binSelect
   AND (instance.task.pageRun < instance.task.sheetCount) THEN
   BEGIN
   conflicts ← TRUE;
   [] ← PreParseSchedMgr.Add[
```

Copyright © 1992 Xerox Corporation All Rights Reserved

```
    instance: instance, type: both, lockID: lockID,
    fault: PreParseSchedObject.pageRunBinderySelect,
    card1: instance.task.pageRun, card2: CARDINAL[instance.task.sheetCount],
    severityType: PreParseSchedObject.pageRunBinderySelectST];
   END;

  printRecord ← JobQ.GetPrintRecord[lockID];

  [media: jobMedia] ← JobQ.GetMediaAndPlex[lockID: lockID, zone: instance.heap];

  IF instance.task.mediaInfo # NIL THEN
   FOR i: CARDINAL IN [0..instance.task.media.LENGTH) DO
    IF instance.task.mediaInfo[i].used THEN
     BEGIN

     numberOfMediaUsed ← numberOfMediaUsed + 1;

     IF instance.task.media[i].message # NIL THEN
      BEGIN

      [] ← PreParseSchedMgr.Add[
       instance: instance, type: both, lockID: lockID,
       fault: PreParseSchedObject.mediaMessage,
       string1: instance.task.media[i].message,
       severityType: PreParseSchedObject.mediaMessageST];
      conflicts ← TRUE;
      instance.task.mediaMessage ← TRUE;
      END;

     IF instance.task.mediaInfo[i].error # none THEN
      BEGIN
      [] ← PreParseSchedMgr.Add[
       instance: instance, type: both, lockID: lockID,
       fault:
       IF instance.task.mediaInfo[i].error = plexTranError THEN
       PreParseSchedObject.duplexTransparencies
       ELSE PreParseSchedObject.duplexTabs,
       severityType:
       IF instance.task.mediaInfo[i].error = plexTranError THEN
       PreParseSchedObject.duplexTransparenciesST
       ELSE PreParseSchedObject.duplexTabsST];
      conflicts ← TRUE;
      END;

     IF instance.task.signature
      AND instance.task.signatureData.bindDirection # null
      AND
       ((instance.task.signatureData.bindDirection = parallelX
        AND NOT instance.task.mediaInfo[i].parallelX)
        OR
```

Copyright © 1992 Xerox Corporation All Rights Reserved

```
      (instance.task.signatureData.bindDirection = parallelY
       AND instance.task.mediaInfo[i].parallelX)) THEN
    BEGIN
    [] ← PreParseSchedMgr.Add[
     instance: instance, type: both, lockID: lockID,
     fault: PreParseSchedObject.bindDirection,
     severityType: PreParseSchedObject.bindDirectionST];
    conflicts ← TRUE;
    END;

   END;
  ENDLOOP;
FOR i: CARDINAL IN [0..jobMedia.LENGTH) DO

 IF jobMedia[i].paperType = precutTab THEN
  BEGIN
  IF printRecord.finishing = sampleTray THEN
   BEGIN printRecord.finishing ← none; finishingChanged ← TRUE; END;

  IF NOT printRecord.collated AND jobMedia[i].modulus # 1 THEN
   BEGIN
   [] ← PreParseSchedMgr.Add[
    instance: instance, type: both, lockID: lockID,
    fault: PreParseSchedObject.uncollatedPreTab,
    severityType: PreParseSchedObject.uncollatedPreTabST,
    card1: jobMedia[i].modulus];
   printRecord.collated ← TRUE;
   finishingChanged ← TRUE;
   conflicts ← TRUE;
   END;

  END;

 IF instance.task.signature
  AND
   (jobMedia[i].paperType = transparency
    OR jobMedia[i].paperType IN [precutTab..fullcutTab]) THEN
  BEGIN
  [] ← PreParseSchedMgr.Add[
   instance: instance, type: both, lockID: lockID,
   fault:
   IF jobMedia[i].mediumDimensions = [297, 420]
   OR jobMedia[i].mediumDimensions = [279, 432] THEN
   PreParseSchedObject.badMediaForSigA3or17x11
   ELSE PreParseSchedObject.badMediaForSig,
   severityType:
   IF jobMedia[i].mediumDimensions = [297, 420]
   OR jobMedia[i].mediumDimensions = [279, 432] THEN
   PreParseSchedObject.badMediaForSigA3or17x11ST
   ELSE PreParseSchedObject.badMediaForSigST,
```

Copyright © 1992 Xerox Corporation All Rights Reserved

```
    card1: jobMedia[i].paperType.ORD];

   instance.task.signature ← FALSE;
   FEfromSched.ConvertToStandard[lockID];
   conflicts ← TRUE;
   END;


  IF printRecord.finishing IN [portraitSingleStitch..landscapeSingleStitch]
   AND jobMedia[i].mediumDimensions.lengthInMillimeters > 356 THEN
   BEGIN
   [] ← PreParseSchedMgr.Add[
    instance: instance, type: both, lockID: lockID,
    fault: PreParseSchedObject.badMediaForStitch,
    severityType: PreParseSchedObject.badMediaForStitchST,
    card1: jobMedia[i].mediumDimensions.widthInMillimeters,
    card2: jobMedia[i].mediumDimensions.lengthInMillimeters,
    card3: printRecord.finishing.ORD];
   printRecord.finishing ← none;
   finishingChanged ← TRUE;
   conflicts ← TRUE;
   END;

  IF
   (NOT
    (printRecord.finishing = sampleTray
     OR printRecord.finishing = byPassTransport))
   AND
    (jobMedia[i].mediumDimensions.widthInMillimeters > 229
     OR jobMedia[i].mediumDimensions.lengthInMillimeters > 356) THEN
   BEGIN
   IF printRecord.finishing # none THEN
    [] ← PreParseSchedMgr.Add[
     instance: instance, type: both, lockID: lockID,
     fault: PreParseSchedObject.invalidMediaForStacker,
     severityType: PreParseSchedObject.invalidMediaForStackerST,
     card1: jobMedia[i].mediumDimensions.widthInMillimeters,
     card2: jobMedia[i].mediumDimensions.lengthInMillimeters,
     card3: printRecord.finishing.ORD];
   printRecord.finishing ← sampleTray;
   finishingChanged ← TRUE;
   conflicts ← TRUE;
   END;

  IF printRecord.finishing = bindOnly THEN
   BEGIN
   binderType ← CSRDefaults.GetBinderType[];
   IF
    (binderType = uso
     AND NOT (jobMedia[i].mediumDimensions.lengthInMillimeters = 279))
```

Copyright © 1992 Xerox Corporation All Rights Reserved

```
  OR
   (binderType = rx
    AND NOT (jobMedia[i].mediumDimensions.lengthInMillimeters = 297))
  THEN
  BEGIN
  [] ← PreParseSchedMgr.Add[
   instance: instance, type: both, lockID: lockID,
   fault: PreParseSchedObject.badBindSize,
   severityType: PreParseSchedObject.badBindSizeST,
   card1: jobMedia[i].mediumDimensions.widthInMillimeters,
   card2: jobMedia[i].mediumDimensions.lengthInMillimeters,
   card3: IF binderType = uso THEN 279 ELSE 297];
  printRecord.finishing ← sampleTray;
  finishingChanged ← TRUE;
  conflicts ← TRUE;
  END;
 END;

IF PreParseSchedMgr.printerType = gladiator
 AND printRecord.finishing = byPassTransport THEN {
 IF jobMedia[i].mediumDimensions = [297, 420]
  OR jobMedia[i].mediumDimensions = [279, 432] THEN NULL
 ELSE
  BEGIN
  [] ← PreParseSchedMgr.Add[
   instance: instance, type: both, lockID: lockID,
   fault: PreParseSchedObject.DFAIllegalPaper,
   severityType: PreParseSchedObject.DFAIllegalPaperST,
   card1: jobMedia[i].mediumDimensions.widthInMillimeters,
   card2: jobMedia[i].mediumDimensions.lengthInMillimeters];
  printRecord.finishing ← sampleTray;
  finishingChanged ← TRUE;
  conflicts ← TRUE;
  END};

IF jobMedia[i].weight = 0 OR jobMedia[i].weight = 75 THEN NULL
ELSE {
 conflicts ← TRUE;
 [] ← PreParseSchedMgr.Add[
  instance: instance, type: both, lockID: lockID,
  fault: PreParseSchedObject.mediaWeight, card1: jobMedia[i].weight,
  severityType: PreParseSchedObject.mediaWeightST]};

IF jobMedia[i].modulusIndex # 0 THEN {
 conflicts ← TRUE;
 [] ← PreParseSchedMgr.Add[
  instance: instance, type: both, lockID: lockID,
  fault: PreParseSchedObject.orderedPosition,
  card1: jobMedia[i].modulusIndex,
  severityType: PreParseSchedObject.orderedPositionST]};
```

Copyright © 1992 Xerox Corporation All Rights Reserved

```
IF jobMedia[i].tabEdge # right THEN {
 conflicts ← TRUE;
 [] ← PreParseSchedMgr.Add[
  instance: instance, type: both, lockID: lockID,
  fault: PreParseSchedObject.finishEdge, card1: jobMedia[i].tabEdge.ORD,
  severityType: PreParseSchedObject.finishEdgeST]};

IF jobMedia[i].labelRows # 0 THEN {
 conflicts ← TRUE;
 [] ← PreParseSchedMgr.Add[
  instance: instance, type: both, lockID: lockID,
  fault: PreParseSchedObject.labelsPerRow, card1: jobMedia[i].labelRows,
  severityType: PreParseSchedObject.labelsPerRowST]};

IF jobMedia[i].labelColumns # 0 THEN {
 conflicts ← TRUE;
 [] ← PreParseSchedMgr.Add[
  instance: instance, type: both, lockID: lockID,
  fault: PreParseSchedObject.labelsPerColumn,
  card1: jobMedia[i].labelColumns,
  severityType: PreParseSchedObject.labelsPerColumnST]};

IF instance.task.signature AND instance.task.signatureData.checkResultSheet
 AND
  (jobMedia[i].mediumDimensions.widthInMillimeters #
   instance.task.signatureData.resultSheetSize.widthInMillimeters
   OR jobMedia[i].mediumDimensions.lengthInMillimeters #
    instance.task.signatureData.resultSheetSize.lengthInMillimeters)
 THEN {
 conflicts ← TRUE;
 [] ← PreParseSchedMgr.Add[
  instance: instance, type: both, lockID: lockID,
  fault: PreParseSchedObject.resultSheetSize,
  card1: instance.task.signatureData.resultSheetSize.widthInMillimeters,
  card2: instance.task.signatureData.resultSheetSize.lengthInMillimeters,
  severityType: PreParseSchedObject.resultSheetSizeST]};

ENDLOOP;
IF instance.task.signature THEN
 BEGIN
 problem: BOOLEAN ← FALSE;
 numOfPgsWithFirstPgMedium: CARDINAL;
 page ← Page.GetFirst[lockID: lockID];

 IF page # Page.nullHandle AND numberOfMediaUsed < 3 THEN
  BEGIN
  pageParms ← Page.GetParameters[page, lockID, instance.heap];

  numOfPgsWithFirstPgMedium ← Page.GetNumberOfPagesWithMedium[
```

Copyright © 1992 Xerox Corporation All Rights Reserved

```
    lockID, pageParms.medium];

   IF numOfPgsWithFirstPgMedium > 1 AND numberOfMediaUsed # 1 THEN
    problem ← TRUE;

   END;
  IF numberOfMediaUsed > 2 THEN problem ← TRUE;

  IF problem THEN
   BEGIN
   [] ← PreParseSchedMgr.Add[
    instance: instance, type: both, lockID: lockID,
    fault:
    IF pageParms.medium.mediumDimensions = [297, 420]
    OR pageParms.medium.mediumDimensions = [279, 432] THEN
    PreParseSchedObject.tooManyMediaForSigA3or17x11
    ELSE PreParseSchedObject.tooManyMediaForSig,
    severityType:
    IF pageParms.medium.mediumDimensions = [297, 420]
    OR pageParms.medium.mediumDimensions = [279, 432] THEN
    PreParseSchedObject.tooManyMediaForSigA3or17x11ST
    ELSE PreParseSchedObject.tooManyMediaForSigST,
    card1: numberOfMediaUsed];
   instance.task.signature ← FALSE;
   FEfromSched.ConvertToStandard[lockID];
   conflicts ← TRUE;
   END;
  PublicPrintUtility.FreeMedium[@pageParms.medium, instance.heap];
  PublicPrintUtility.FreeMedium[@pageParms.insert.medium, instance.heap];
  END;

 IF finishingChanged THEN JobQ.SetPrintRecord[lockID, printRecord];

 PublicPrintUtility.FreeMediaList[@jobMedia, instance.heap];

 END;

CheckPreConflicts: PUBLIC PROCEDURE [
 instance: PreParseSchedMgr.Instance,
 currentFinishing: PublicPrinting.Finishing, slipSheetEntry: CARDINAL,
 collatedEntry: CARDINAL, copyCountEntry: CARDINAL, finishingEntry: CARDINAL]
 RETURNS [conflicts: BOOLEAN ← FALSE, plexChanged: BOOLEAN ← FALSE] =
 BEGIN

 IF instance.task.slipSheet
  AND
   (currentFinishing IN [portraitSingleStitch..bindOnly]
    OR

     NOT instance.task.collated) THEN
```

Copyright © 1992 Xerox Corporation All Rights Reserved

```
BEGIN
IF NOT instance.task.collated THEN
 [] ← PreParseSchedMgr.Add[
  instance: instance, type: both,
  fault: PreParseSchedObject.noUnCollatedSlipSheets,
  severityType: PreParseSchedObject.noUnCollatedSlipSheetsST];

IF currentFinishing IN [portraitSingleStitch..bindOnly] THEN
 [] ← PreParseSchedMgr.Add[
  instance: instance, type: both,
  fault: PreParseSchedObject.badFinishingForSlipSheet,
  severityType: PreParseSchedObject.badFinishingForSlipSheetST,
  card1: currentFinishing.ORD];


IF slipSheetEntry = LAST[CARDINAL] THEN
 BEGIN
 slipSheetEntry ← instance.task.options.LENGTH;
 instance.task.options.LENGTH ← instance.task.options.LENGTH + 1;
 END;
instance.task.options[slipSheetEntry] ← [slipSheet[on: FALSE]];
instance.task.slipSheet ← FALSE;
conflicts ← TRUE;

END;
IF NOT instance.task.collated
 AND currentFinishing IN [portraitSingleStitch..landscapeSingleStitch]
 AND (instance.task.copyCount < 2 OR instance.task.copyCount > 100) THEN
 BEGIN
 conflicts ← TRUE;
 [] ← PreParseSchedMgr.Add[
  instance: instance, type: both,
  fault: PreParseSchedObject.uncollatedStichedOutOfRange,
  severityType: PreParseSchedObject.uncollatedStichedOutOfRangeST,
  card1: instance.task.copyCount];
 instance.task.copyCount ← IF instance.task.copyCount < 2 THEN 2 ELSE 100;
 IF copyCountEntry = LAST[CARDINAL] THEN
  BEGIN
  copyCountEntry ← instance.task.options.LENGTH;
  instance.task.options.LENGTH ← instance.task.options.LENGTH + 1;
  END;
 instance.task.options[copyCountEntry] ← [
  copyCount[instance.task.copyCount]];
 END;

IF instance.task.copyCount = 0 THEN
 BEGIN
 conflicts ← TRUE;
 [] ← PreParseSchedMgr.Add[
  instance: instance, type: both, fault: PreParseSchedObject.copyCountZero,
```

Copyright © 1992 Xerox Corporation All Rights Reserved

```
    severityType: PreParseSchedObject.copyCountZeroST,
    card1: instance.task.copyCount];
   instance.task.copyCount ← 1;
   IF copyCountEntry = LAST[CARDINAL] THEN
    BEGIN
    copyCountEntry ← instance.task.options.LENGTH;
    instance.task.options.LENGTH ← instance.task.options.LENGTH + 1;
    END;
   instance.task.options[copyCountEntry] ← [
    copyCount[instance.task.copyCount]];
   END;

  IF instance.task.copyCount > maxCopyCount THEN
   BEGIN
   conflicts ← TRUE;
   [] ← PreParseSchedMgr.Add[
    instance: instance, type: both,
    fault: PreParseSchedObject.copyCountOverLimit,
    severityType: PreParseSchedObject.copyCountOverLimitST,
    card1: instance.task.copyCount];
   instance.task.copyCount ← maxCopyCount;
   IF copyCountEntry = LAST[CARDINAL] THEN
    BEGIN
    copyCountEntry ← instance.task.options.LENGTH;
    instance.task.options.LENGTH ← instance.task.options.LENGTH + 1;
    END;
   instance.task.options[copyCountEntry] ← [
    copyCount[instance.task.copyCount]];
   END;

  IF instance.task.folding AND currentFinishing IN [portraitSingleStitch..none]
   THEN
   BEGIN
   conflicts ← TRUE;
   [] ← PreParseSchedMgr.Add[
    instance: instance, type: both,
    fault: PreParseSchedObject.foldingNotSupported,
    severityType: PreParseSchedObject.foldingNotSupportedST];
   END;

  IF currentFinishing = byPassTransport
   AND NOT FeatureStatusDefaults.GetDFAEnabled[].enabled THEN
   BEGIN
   conflicts ← TRUE;
   currentFinishing ← sampleTray;
   [] ← PreParseSchedMgr.Add[
    instance: instance, type: both, fault: PreParseSchedObject.DFANotEnabled,
    severityType: PreParseSchedObject.DFANotEnabledST];
   IF finishingEntry = LAST[CARDINAL] THEN
    BEGIN
```

Copyright © 1992 Xerox Corporation All Rights Reserved

```
  finishingEntry ← instance.task.options.LENGTH;
  instance.task.options.LENGTH ← instance.task.options.LENGTH + 1;
  END;
 instance.task.options[finishingEntry] ← [finishing[sampleTray, 0, 0, TRUE]];
 END;

IF currentFinishing = byPassTransport AND NOT instance.task.folding THEN
 BEGIN
 conflicts ← TRUE;
 [] ← PreParseSchedMgr.Add[
  instance: instance, type: both, fault: PreParseSchedObject.DFAFolding,
  severityType: PreParseSchedObject.DFAFoldingST];
 END;

IF currentFinishing = byPassTransport AND NOT instance.task.collated THEN
 BEGIN
 conflicts ← TRUE;
 [] ← PreParseSchedMgr.Add[
  instance: instance, type: both, fault: PreParseSchedObject.DFAUncollated,
  severityType: PreParseSchedObject.DFAUncollatedST];
 IF collatedEntry = LAST[CARDINAL] THEN
  BEGIN
  collatedEntry ← instance.task.options.LENGTH;
  instance.task.options.LENGTH ← instance.task.options.LENGTH + 1;
  END;
 instance.task.options[collatedEntry] ← [collated[TRUE]];
 END;

IF instance.task.signature AND instance.task.parms.plex = simplex THEN
 BEGIN
 conflicts ← TRUE;
 [] ← PreParseSchedMgr.Add[
  instance: instance, type: both, fault: PreParseSchedObject.noSimplexSig,
  severityType: PreParseSchedObject.noSimplexSigST];
 instance.task.parms.plex ← duplex;
 plexChanged ← TRUE;
 END;

IF PreParseSchedMgr.printerType = gladiator
 AND currentFinishing IN [landscapeSingleStitch..bindOnly] THEN
 BEGIN
 conflicts ← TRUE;
 [] ← PreParseSchedMgr.Add[
  instance: instance, type: both,
  fault:
  SELECT currentFinishing FROM
   landscapeSingleStitch = >
    PreParseSchedObject.landscapeStitchNotSupported,
   doubleStitch = > PreParseSchedObject.doubleStitchNotSupported,
   ENDCASE = > PreParseSchedObject.bindingNotSupported,
```

Copyright © 1992 Xerox Corporation All Rights Reserved

```
   severityType:
   SELECT currentFinishing FROM
    landscapeSingleStitch =>
     PreParseSchedObject.landscapeStitchNotSupportedST,
    doubleStitch => PreParseSchedObject.doubleStitchNotSupportedST,
    ENDCASE => PreParseSchedObject.bindingNotSupportedST,
   card1: currentFinishing.ORD];
  currentFinishing ← none;
  IF finishingEntry = LAST[CARDINAL] THEN
   BEGIN
   finishingEntry ← instance.task.options.LENGTH;
   instance.task.options.LENGTH ← instance.task.options.LENGTH + 1;
   END;
  instance.task.options[finishingEntry] ← [finishing[none, 0, 0, TRUE]];
  END;

 IF instance.task.signature
  AND currentFinishing IN [portraitSingleStitch..bindOnly] THEN
  BEGIN
  conflicts ← TRUE;
  [] ← PreParseSchedMgr.Add[
   instance: instance, type: both,
   fault: PreParseSchedObject.noStackFinForSig,
   severityType: PreParseSchedObject.noStackFinForSigST,
   card1: currentFinishing.ORD];
  currentFinishing ← none;
  IF finishingEntry = LAST[CARDINAL] THEN
   BEGIN
   finishingEntry ← instance.task.options.LENGTH;
   instance.task.options.LENGTH ← instance.task.options.LENGTH + 1;
   END;
  instance.task.options[finishingEntry] ← [finishing[none, 0, 0, TRUE]];
  END;

 END;

END.
```

Copyright © 1992 Xerox Corporation All Rights Reserved

```
DIRECTORY
 CharCodeMapping USING [XCCtoICC],
 DBError USING [ErrorCode, OperationFailed],
 DecomposerCommon USING [Corner, OrientedImagingProps],
 JobBackUp USING [LockID, nullLockID],
 JobFault USING [SeverityType],
 JobQ USING [CreateDateOption, Error, LockJob, SetCovers, UnlockJob],
 MRSignature USING [TrimSizeX, TrimSizeY],
 NetDefaults USING [GetNetJobDisposition],
 PublicPrinting USING [Finishing, MediumDimensions],
 PublicPrintUtility USING [CopyMediaList],
 PreParser USING [
  BinderyFinishingSequence, JobAttributes, JobMediaData, OptionType,
  OptionTypeValid, OptionsPtr, BindFinishSelectSeq, FinishSeq, FinishRep,
  BinderyOperation, ReferenceEdge],
 PreParseSchedMgr USING [
  Add, BookletSignature, CheckDimensions, duplexYFlipSupport, Instance,
  iotResolution, imagerVersionSupport, FatalError, GetCorner, GetRotation,
  numPBGs, numVGs, DoCommand, SetImageShift, DeleteCode, CheckPreConflicts,
  minPaperWidth, maxPaperWidth, minPaperLength, maxPaperLength, WordSeq,
  FreeNetSupportOptions, DatabaseCode],
 PreParseSchedObject,
 PreParseSchedTask USING [CoversRec, MediaInfoSeq, Task],
 Print3SM USING [MgrStatus],
 PrintTTY USING [LogEvent],
 Real USING [Float, RealException, RoundC],
 FENetSupport USING [
  PreParseParmsReady, PreParseOptionsChoice, PreParseOptionsType],
 SMNetSupport USING [Error],
 SMMark USING [GetImagingProperties],
 String USING [CopyToNewString, FreeString],
 SystemLimits,
 SwitchesDefaults USING [GetStitchHeadPlacement];

PreParseSchedImplF: PROGRAM
 IMPORTS
  CharCodeMapping, DBError, JobQ, NetDefaults, PreParseSchedMgr,
  PublicPrintUtility, PrintTTY, Real, SMMark, FENetSupport, SMNetSupport,
  String, SystemLimits, SwitchesDefaults
 EXPORTS PreParseSchedMgr =
 BEGIN

 FinishingRecord: TYPE = RECORD [
  finishing: PublicPrinting.Finishing ← none,
  stitchA: CARDINAL ← 0,
  stitchB: CARDINAL ← 0,
  stitchNormal: BOOLEAN ← TRUE];

 DoPrintingInstructions: PUBLIC PROCEDURE [
```

Copyright © 1992 Xerox Corporation All Rights Reserved

```
instructions: PreParser.OptionsPtr, instance: PreParseSchedMgr.Instance] =
BEGIN
finishingSet: BOOLEAN ← FALSE;
docCreateDateSet: BOOLEAN ← FALSE;
ipOrigin: DecomposerCommon.Corner ← LL;
tempFinishing: FinishingRecord ← [];
tempString: LONG STRING ← NIL;
slipSheetEntry: CARDINAL ← LAST[CARDINAL];
collatedEntry: CARDINAL ← LAST[CARDINAL];
copyCountEntry: CARDINAL ← LAST[CARDINAL];
finishingEntry: CARDINAL ← LAST[CARDINAL];
numberOfOptions: CARDINAL = FENetSupport.PreParseOptionsType.LAST.ORD + 1;
desCount: CARDINAL ← 0;
tempLength: CARDINAL ← 0;
sigDesNum: CARDINAL ← LAST[CARDINAL];
firstPageIndex: CARDINAL ← 0;
lockID: JobBackUp.LockID ← JobBackUp.nullLockID;
mediumDims: PublicPrinting.MediumDimensions ← [0, 0];
trim: PublicPrinting.MediumDimensions ← [0, 0];

IF instructions = NIL THEN {
 PreParseSchedMgr.FatalError[
  instance: instance, fault: PreParseSchedObject.systemError,
  severityType: PreParseSchedObject.systemErrorST,
  arg1: PreParseSchedMgr.DeleteCode.nilInstructionsPtr.ORD];
 GOTO exit;
 };

instance.task.disposition ← NetDefaults.GetNetJobDisposition[];

PrintTTY.LogEvent[
 sched: preParse, event: printingInstructionsComplete,
 id: instance.task.jobID, transID: instance.id];

IF instructions.offsets[media] # NIL AND instructions.offsets[media].modified
 THEN
 instance.task.media ← PublicPrintUtility.CopyMediaList[
  in: instructions.offsets[media]↑.media, z: instance.heap];

IF instance.task.media = NIL AND instance.task.media.LENGTH = 0 THEN
 instance.task.media ← PublicPrintUtility.CopyMediaList[
  in: instance.task.parms.media, z: instance.heap];

instance.task.jobMediaData ← instance.heap.NEW[
 PreParser.JobMediaData ← [
 orientedImagingProps: DESCRIPTOR[NIL, 0],
 deviceProps: [
 resolution: PreParseSchedMgr.iotResolution,
 imagerVersion: PreParseSchedMgr.imagerVersionSupport,
 numUsablePBGs: PreParseSchedMgr.numPBGs,
```

Copyright © 1992 Xerox Corporation All Rights Reserved

```
 numUsableVGs: PreParseSchedMgr.numVGs, decomposerTotalVM: 0,
 decomposerFontVM: 0, numObjectsThreshold: 0,
 duplexYFlip: PreParseSchedMgr.duplexYFlipSupport]]];

instance.task.mediaInfo ← instance.heap.NEW[
 PreParseSchedTask .MediaInfoSeq[instance.task.media.LENGTH]];

instance.task.jobMediaData.orientedImagingProps ← DESCRIPTOR[
 instance.heap.NEW[
  PreParseSchedMgr
  .WordSeq[DecomposerCommon.OrientedImagingProps.SIZE *
       instance.task.media.LENGTH]], instance.task.media.LENGTH];

FOR index: CARDINAL IN [0..instance.task.media.LENGTH) DO
 width: CARDINAL;
 length: CARDINAL;

 instance.task.mediaInfo[index] ← [
  used: FALSE, parallelX: TRUE, mediaRotated: FALSE, error: none];

 CSMF[
  @instance.task.media[index].name, SystemLimits.mediumName, instance.heap];
 CSMF[
  @instance.task.media[index].message, SystemLimits.mediumMessage,
  instance.heap];
 CSMF[
  @instance.task.media[index].otherPaperType, SystemLimits.mediumType,
  instance.heap];
 CSMF[
  @instance.task.media[index].otherColor, SystemLimits.mediumColor,
  instance.heap];

 [width, length] ← instance.task.media[index].mediumDimensions;

 IF PreParseSchedMgr.CheckDimensions[length, width].bad THEN {

  IF PreParseSchedMgr.CheckDimensions[width, length].bad THEN {
   [] ← PreParseSchedMgr.Add[
    instance: instance, type: both,
    fault: PreParseSchedObject.mediumUnavailable,
    severityType: operationalError, card1: width, card2: length];
   width ←
    SELECT TRUE FROM
     width < PreParseSchedMgr.minPaperWidth =>
      PreParseSchedMgr.minPaperWidth,
     width > PreParseSchedMgr.maxPaperWidth =>
      PreParseSchedMgr.maxPaperWidth,
     ENDCASE => width;
   length ←
    SELECT TRUE FROM
```

Copyright © 1992 Xerox Corporation All Rights Reserved

```
      length < PreParseSchedMgr.minPaperLength =>
       PreParseSchedMgr.minPaperLength,
      length > PreParseSchedMgr.maxPaperLength =>
       PreParseSchedMgr.maxPaperLength,
      ENDCASE => length;
    instance.task.media[index].mediumDimensions ← [width, length];
    ipOrigin ← LL;
    }
   ELSE {
    instance.task.media[index].mediumDimensions ← [length, width];
    instance.task.mediaInfo[index].mediaRotated ← TRUE;
    ipOrigin ← UL;
    };
   }
  ELSE ipOrigin ← LL;

  IF width > length THEN
   instance.task.mediaInfo[index].parallelX ← NOT instance.task.mediaInfo[
    index].parallelX;

  instance.task.jobMediaData.orientedImagingProps[index] ← [
   props: SMMark.GetImagingProperties[
   instance.task.media[index].mediumDimensions], ipOrigin: ipOrigin];

  ENDLOOP;

 instance.task.options ← DESCRIPTOR[
  instance.heap.NEW[
   PreParseSchedMgr
   .WordSeq[numberOfOptions * FENetSupport.PreParseOptionsChoice.SIZE]],
   numberOfOptions];

 IF instructions.offsets[jobAttributes] # NIL THEN {
  attributes: PreParser.JobAttributes;
  attributes ← instructions.offsets[jobAttributes] ↑ .jobAttributes;

  IF attributes.jobCreateDate # NIL THEN
   BEGIN
   tempTime: JobQ.CreateDateOption;
   tString: LONG STRING ← CharCodeMapping.XCCtoICC[
    xcc: attributes.jobCreateDate, z: instance.heap];
   CS[tString, SystemLimits.jobCreateDate];
   tempTime ← [string[tString]];
   instance.task.options[desCount] ← [docCreateDate[tempTime]];
   desCount ← desCount + 1;
   docCreateDateSet ← TRUE;
   END;

  IF instance.task.parms.default.jobName AND attributes.jobName # NIL THEN
   BEGIN
```

Copyright © 1992 Xerox Corporation All Rights Reserved

```
  tempString ← CharCodeMapping.XCCtoICC[
   xcc: attributes.jobName, z: instance.heap];
  CS[tempString, SystemLimits.jobName];
  String.FreeString[s: instance.task.jobName, z: instance.heap];
  instance.task.options[desCount] ← [jobName[tempString]];
  desCount ← desCount + 1;
  instance.task.jobName ← String.CopyToNewString[
   s: tempString, z: instance.heap];
  END;

 IF attributes.jobAccountName # NIL THEN
  BEGIN
  tempString ← CharCodeMapping.XCCtoICC[
   xcc: attributes.jobAccountName, z: instance.heap];
  CS[tempString, SystemLimits.jobAccountName];
  instance.task.options[desCount] ← [jobAccount[tempString]];
  desCount ← desCount + 1;
  END;

 IF instance.task.parms.default.message AND attributes.jobComment # NIL THEN
  BEGIN
  tempString ← CharCodeMapping.XCCtoICC[
   xcc: attributes.jobComment, z: instance.heap];
  CS[tempString, SystemLimits.jobComment];
  instance.task.options[desCount] ← [jobComment[tempString]];
  desCount ← desCount + 1;
  END;

 IF NOT instance.task.parms.default.priority OR attributes.jobPriority = 0
  OR attributes.jobPriority = 127 THEN NULL
 ELSE {
  [] ← PreParseSchedMgr.Add[
   fault: PreParseSchedObject.jobPriority,
   severityType: PreParseSchedObject.jobPriorityST, type: both,
   instance: instance, card1: attributes.jobPriority]};

 IF instance.task.parms.default.senderName AND attributes.jobSender # NIL
  THEN
  BEGIN
  tempString ← CharCodeMapping.XCCtoICC[
   xcc: attributes.jobSender, z: instance.heap];
  CS[tempString, SystemLimits.senderName];
  instance.task.options[desCount] ← [senderName[tempString]];
  desCount ← desCount + 1;
  String.FreeString[s: instance.task.jobSender, z: instance.heap];
  instance.task.jobSender ← String.CopyToNewString[
   s: tempString, z: instance.heap];
  END;

 IF instance.task.parms.default.recipientName
```

Copyright © 1992 Xerox Corporation All Rights Reserved

```
 AND attributes.jobRecipient # NIL THEN
 BEGIN
 tempString ← CharCodeMapping.XCCtoICC[
  xcc: attributes.jobRecipient, z: instance.heap];
 CS[tempString, SystemLimits.recipientName];
 instance.task.options[desCount] ← [recipientName[tempString]];
 desCount ← desCount + 1;
 END;

IF attributes.jobStartMessage # NIL THEN
 BEGIN
 tempString ← CharCodeMapping.XCCtoICC[
  xcc: attributes.jobStartMessage, z: instance.heap];
 CS[tempString, SystemLimits.jobStartMessage];
 instance.task.options[desCount] ← [jobStartMessage[tempString]];
 desCount ← desCount + 1;
 instance.task.forcedSave ← TRUE;
 instance.task.startMessage ← TRUE;
 END;

IF attributes.jobEndMessage # NIL THEN
 BEGIN
 tempString ← CharCodeMapping.XCCtoICC[
  xcc: attributes.jobEndMessage, z: instance.heap];
 CS[tempString, SystemLimits.jobEndMessage];
 instance.task.options[desCount] ← [jobEndMessage[tempString]];
 desCount ← desCount + 1;
 instance.task.endMessage ← TRUE;
 END;

IF instance.task.disposition # save THEN
 instance.task.disposition ←
  SELECT attributes.jobDisposition FROM
   printAndDelete => printAndDelete,
   printAndSave => printAndSave,
   hold => save,
   proof => proof,
   ENDCASE => instance.task.disposition;
IF attributes.jobDisposition = authorizedHold THEN {
 PreParseSchedMgr.FatalError[
  instance: instance, fault: PreParseSchedObject.authorizedHold,
  severityType: PreParseSchedObject.authorizedHoldST];
 GOTO exit};
IF attributes.jobStartWait # 0 THEN {
 [] ← PreParseSchedMgr.Add[
  fault: PreParseSchedObject.jobStartWait,
  severityType: PreParseSchedObject.jobStartWaitST, type: both,
  instance: instance, card1: attributes.jobStartWait]};

IF attributes.jobEndWait # 0 THEN {
```

Copyright © 1992 Xerox Corporation All Rights Reserved

```
  [] ← PreParseSchedMgr.Add[
   fault: PreParseSchedObject.jobEndWait,
   severityType: PreParseSchedObject.jobEndWaitST, type: both,
   instance: instance, card1: attributes.jobEndWait]};

 IF attributes.jobErrorAbort # null OR attributes.jobErrorReporting # null
  THEN {
  [] ← PreParseSchedMgr.Add[
   fault: PreParseSchedObject.jobErrorReporting,
   severityType: PreParseSchedObject.jobErrorReportingST, type: both,
   instance: instance, card1: attributes.jobErrorAbort.ORD,
   card2: attributes.jobErrorReporting.ORD]};


 };
FOR option: PreParser.OptionType IN PreParser.OptionTypeValid DO
 IF instructions.offsets[option] # NIL THEN

  SELECT option FROM

   copySelect => {
    IF instructions.offsets[copySelect].modified
     AND instructions.offsets[copySelect] ↑ .copySelect # NIL
     AND instructions.offsets[copySelect] ↑ .copySelect.length > 0 THEN
     BEGIN
     instance.task.copyCount ← instructions.offsets[
      copySelect] ↑ .copySelect[0];
     instance.task.options[desCount] ← [
      copyCount[instance.task.copyCount]];
     copyCountEntry ← desCount;
     desCount ← desCount + 1;
     END;
    };

   docCreationDate => {
    tempTime: JobQ.CreateDateOption;
    IF ˜docCreateDateSet THEN
     BEGIN
     tString: LONG STRING ← CharCodeMapping.XCCtoICC[
      xcc: instructions.offsets[docCreationDate] ↑ .createDate,
      z: instance.heap];
     CS[tString, SystemLimits.jobCreateDate];
     tempTime ← [string[tString]];
     instance.task.options[desCount] ← [docCreateDate[tempTime]];
     desCount ← desCount + 1;
     END;
    };

   docCreator => {
    tempString ← CharCodeMapping.XCCtoICC[
```

Copyright © 1992 Xerox Corporation All Rights Reserved

```
  xcc: instructions.offsets[docCreator] ↑ .docCreator,
  z: instance.heap];
 CS[tempString, SystemLimits.docCreator];
 instance.task.options[desCount] ← [docCreator[tempString]];
 desCount ← desCount + 1;
 };

docName => {
 tempString ← CharCodeMapping.XCCtoICC[
  xcc: instructions.offsets[docName] ↑ .docName, z: instance.heap];
 CS[tempString, SystemLimits.docName];
 instance.task.options[desCount] ← [docName[tempString]];
 desCount ← desCount + 1;
 };

docComment => {
 tempString ← CharCodeMapping.XCCtoICC[
  xcc: instructions.offsets[docComment] ↑ .docComment,
  z: instance.heap];
 CS[tempString, SystemLimits.docComment];
 instance.task.options[desCount] ← [docComment[tempString]];
 desCount ← desCount + 1;
 };

docStartMessage => {
 instance.task.forcedSave ← TRUE;
 instance.task.startMessage ← TRUE;
 tempString ← CharCodeMapping.XCCtoICC[
  xcc: instructions.offsets[docStartMessage] ↑ .docStartMessage,
  z: instance.heap];
 CS[tempString, SystemLimits.docStartMessage];
 instance.task.options[desCount] ← [docStartMessage[tempString]];
 desCount ← desCount + 1;
 };

docEndMessage => {
 instance.task.endMessage ← TRUE;
 tempString ← CharCodeMapping.XCCtoICC[
  xcc: instructions.offsets[docEndMessage] ↑ .docEndMessage,
  z: instance.heap];
 CS[tempString, SystemLimits.docEndMessage];
 instance.task.options[desCount] ← [docEndMessage[tempString]];
 desCount ← desCount + 1;
 };

finishing => {
 tempFinishing.finishing ← instructions.offsets[finishing] ↑ .finishing;
 IF instructions.offsets[finishing].modified THEN
  BEGIN
  finishingSet ← TRUE;
```

Copyright © 1992 Xerox Corporation All Rights Reserved

```
    firstPageIndex ← instructions.offsets[
     finishing] ↑ .firstPageMediaIndex;
    END;
   };

  media => NULL;
  pageSelect => {
   IF instructions.offsets[pageSelect].modified THEN NULL; };

  plex => {
   IF instructions.offsets[plex].modified THEN
    BEGIN
    instance.task.parms.plex ← instructions.offsets[plex] ↑ .plex;
    IF instance.task.parms.plex = duplexHeadToToe THEN
     instance.task.headToToe ← TRUE;
    END;
   };

  xImageShift => {
   instance.task.xShiftOn ← TRUE;
   instance.task.xShift ← PreParseSchedMgr.SetImageShift[
    instance: instance, xShift: TRUE,
    shift: instructions.offsets[xImageShift] ↑ .xImageShift];
   };

  yImageShift => {
   instance.task.yShiftOn ← TRUE;
   instance.task.yShift ← PreParseSchedMgr.SetImageShift[
    instance: instance, xShift: FALSE,
    shift: instructions.offsets[yImageShift] ↑ .yImageShift];
   };

  jobSecurity => NULL;
  jobAttributes => NULL;
  bookletSignature => {
   PreParseSchedMgr.BookletSignature[
    instance: instance,
    signature: instructions.offsets[bookletSignature] ↑ .signature];

   trim ← instance.task.media[firstPageIndex].mediumDimensions;
   IF trim.widthInMillimeters >= trim.lengthInMillimeters THEN
    trim.widthInMillimeters ← trim.widthInMillimeters / 2
   ELSE trim.lengthInMillimeters ← trim.lengthInMillimeters / 2;
   SetTrim[instance.task, desCount, trim, 0];
   sigDesNum ← desCount;
   desCount ← desCount + 1;
   };

  stacking => {
   IF instructions.offsets[stacking].modified THEN
```

Copyright © 1992 Xerox Corporation All Rights Reserved

```
BEGIN
instance.task.collated ← instructions.offsets[stacking] ↑ .collated;
instance.task.slipSheet ← instructions.offsets[stacking] ↑ .slipSheet;

instance.task.options[desCount] ← [
 collated[instance.task.collated]];
collatedEntry ← desCount;
desCount ← desCount + 1;

instance.task.options[desCount] ←
 IF instance.task.slipSheet THEN [
 slipSheet[
 on: TRUE,
 dimensions: instance.task.media[firstPageIndex].mediumDimensions]]
 ELSE [slipSheet[on: FALSE]];
slipSheetEntry ← desCount;
desCount ← desCount + 1;

IF instructions.offsets[stacking] ↑ .offset THEN {
 [] ← PreParseSchedMgr.Add[
   fault: PreParseSchedObject.offsetStacking,
   severityType: PreParseSchedObject.offsetStackingST, type: both,
   instance: instance]};
END;
};

binderyFinishing =>
 BEGIN
 finishingSet ← TRUE;
 DoBinderyFinishing[
  bFinishPtr: instructions.offsets[binderyFinishing].binderySequence,
  binSelect:
  IF instructions.offsets[binderyFinishingSelect] = NIL THEN NIL
  ELSE instructions.offsets[binderyFinishingSelect].binderySelect,
  instance: instance, tempFinishing: @tempFinishing,
  desCount: @desCount, firstPageIndex: firstPageIndex,
  trimDes: sigDesNum];
 END;

covers =>
 BEGIN
 instance.task.covers ← TRUE;
 instance.task.coversInfo ← instance.heap.NEW[
  PreParseSchedTask.CoversRec];
 instance.task.coversInfo.rec ← instructions.offsets[covers].covers ↑ ;
 END;

ENDCASE;
ENDLOOP;
```

Copyright © 1992 Xerox Corporation All Rights Reserved

```
IF NOT finishingSet AND instance.task.parms.default.medium
 AND NOT instance.task.parms.default.staple
 AND tempFinishing.finishing # none THEN finishingSet ← TRUE;

IF finishingSet THEN {
 IF tempFinishing.stitchNormal THEN {
  [[HeadA: tempFinishing.stitchA, HeadB: tempFinishing.stitchB]] ←
   SwitchesDefaults.GetStitchHeadPlacement[
   finishing: tempFinishing.finishing,
   dims: instance.task.media[firstPageIndex].mediumDimensions];
  IF tempFinishing.finishing = landscapeSingleStitch THEN
   tempFinishing.stitchB ←
    instance.task.media[
     firstPageIndex].mediumDimensions.lengthInMillimeters -
     tempFinishing.stitchB};
 instance.task.options[desCount] ← [
  finishing[
  finishing: tempFinishing.finishing, stitchA: tempFinishing.stitchA,
  stitchB: tempFinishing.stitchB,
  stitchNormal: tempFinishing.stitchNormal]];
 finishingEntry ← desCount;
 instance.task.options.LENGTH ← desCount + 1;
 }
ELSE instance.task.options.LENGTH ← desCount;

IF instance.task.forcedSave THEN instance.task.disposition ← save;

IF PreParseSchedMgr.CheckPreConflicts[
 instance, tempFinishing.finishing, slipSheetEntry, collatedEntry,
 copyCountEntry, finishingEntry].plexChanged THEN
 instructions.offsets[plex] ↑ .plex ← instance.task.parms.plex;

FOR i: CARDINAL IN [0..instance.task.media.LENGTH) DO
 mediaRotation: INTEGER ← 0;
 IF instance.task.media[i].tabEdge = left AND NOT instance.task.signature
  THEN {
  instance.task.media[i].tabEdge ← right;
  mediaRotation ← PreParseSchedMgr.GetRotation[
   instance.task.jobMediaData.orientedImagingProps[i].ipOrigin];
  instance.task.jobMediaData.orientedImagingProps[i].ipOrigin ←
   PreParseSchedMgr.GetCorner[mediaRotation + 180];
  };
 ENDLOOP;


lockID ← JobQ.LockJob[
 job: instance.task.jobQReference, jobID: instance.task.jobID,
 readOnly: FALSE !
 JobQ.Error = > {
  DoErrorRecovery[
```

Copyright © 1992 Xerox Corporation All Rights Reserved

```
    lockID: lockID, errorType: JobQ, instance: instance, code: code.ORD];
   GOTO exit};
  DBError.OperationFailed => {
   DoErrorRecovery[
    lockID: lockID, errorType: JobQ, instance: instance, code: code.ORD];
   GOTO exit}];

 IF instance.task.covers THEN
  JobQ.SetCovers[lockID: lockID, covers: frontAndBack];

 FENetSupport.PreParseParmsReady[
  disposition: instance.task.disposition,
  preParseOptions: instance.task.options,
  jobReference: instance.task.jobQReference, lockID: lockID !
  SMNetSupport.Error => {
   DoErrorRecovery[
    lockID: lockID, errorType: SMNetSupport, instance: instance,
    code: code.ORD];
   GOTO exit}];

 JobQ.UnlockJob[lockID: lockID];

 PreParseSchedMgr.FreeNetSupportOptions[instance.task.options, instance.heap];
 instance.task.options ← DESCRIPTOR[NIL, 0];

 PreParseSchedMgr.DoCommand[instance: instance, command: mediaReady];

 EXITS exit => NULL;
 END;

DoErrorRecovery: PROCEDURE [
 lockID: JobBackUp.LockID, errorType: PreParseSchedMgr.DatabaseCode,
 instance: PreParseSchedMgr.Instance, code: CARDINAL] =
 BEGIN
 mgrError: Print3SM.MgrStatus ← systemError;
 severityType: JobFault.SeverityType ← PreParseSchedObject.databaseErrorST;
 fault: CARDINAL ← PreParseSchedObject.databaseError;

 IF errorType = DBError AND code = DBError.ErrorCode.diskFull.ORD THEN {
  fault ← PreParseSchedObject.diskFull;
  mgrError ← insufficientSpoolSpace;
  severityType ← PreParseSchedObject.diskFullST;
  };

 PreParseSchedMgr.FreeNetSupportOptions[instance.task.options, instance.heap];
 IF lockID # JobBackUp.nullLockID THEN
  JobQ.UnlockJob[lockID: lockID ! JobQ.Error => CONTINUE];

 PreParseSchedMgr.FatalError[
  instance: instance, fault: fault, arg1: errorType.ORD, arg2: code,
```

Copyright © 1992 Xerox Corporation All Rights Reserved

```
  severityType: severityType];
 END;
DoBinderyFinishing: PROCEDURE [
 bFinishPtr: PreParser.BinderyFinishingSequence,
 binSelect: PreParser.BindFinishSelectSeq, instance: PreParseSchedMgr.Instance,
 tempFinishing: LONG POINTER TO FinishingRecord,
 desCount: LONG POINTER TO CARDINAL, firstPageIndex: CARDINAL,
 trimDes: CARDINAL] =
 BEGIN

 tempString: LONG STRING ← NIL;
 tempLength: CARDINAL ← 0;
 finishItemSelected: BOOLEAN ← FALSE;
 addWarning: BOOLEAN ← FALSE;
 referenceEdgeSel: PreParser.ReferenceEdge ← left;
 tempRefEdge: PreParser.ReferenceEdge ← left;
 finishSelected: PreParser.BinderyOperation ← other;
 finishPtr: PreParser.FinishSeq;
 finishingRotation: INTEGER ← 0;
 mediaRotation: INTEGER ← 0;

 IF binSelect # NIL THEN {
  FOR j: CARDINAL IN [0..2) DO
   WITH item: binSelect ↑ [j] SELECT FROM
    copyRun = >
     IF item.copyRun < instance.task.copyCount THEN {
      [] ← PreParseSchedMgr.Add[
       fault: PreParseSchedObject.copyRunBinderySelect,
       severityType: PreParseSchedObject.copyRunBinderySelectST,
       type: both, instance: instance, card1: item.copyRun]};
    pageInfo = > {
     FOR i: CARDINAL IN [0..2) DO
      WITH page: item.pageInfo ↑ [i] SELECT FROM
       pageRun = > {
        instance.task.pageRun ← page.pageRun;
        instance.task.binSelect ← TRUE};
       finish = > finishPtr ← page.finish;
       ENDCASE;
      ENDLOOP;
     IF item.pageInfo.length > 2 THEN {
      [] ← PreParseSchedMgr.Add[
       fault: PreParseSchedObject.pageRunTooLong,
       severityType: PreParseSchedObject.pageRunTooLongST, type: both,
       instance: instance, card1: item.pageInfo.length]};
     };
    ENDCASE;
   ENDLOOP;
  IF binSelect.length > 2 THEN {
   [] ← PreParseSchedMgr.Add[
    fault: PreParseSchedObject.copyRunTooLong,
```

Copyright © 1992 Xerox Corporation All Rights Reserved

```
    severityType: PreParseSchedObject.copyRunTooLongST, type: both,
    instance: instance, card1: binSelect.length];
   };
  }
 ELSE {
  finishPtr ← instance.heap.NEW[PreParser .FinishRep[bFinishPtr.length]];
  FOR i: CARDINAL IN [0..bFinishPtr.length) DO finishPtr ↑ [i] ← i; ENDLOOP;
  };


 FOR j: CARDINAL DECREASING IN [0..finishPtr.length) DO
  ENABLE
   Real.RealException = > {
    [] ← PreParseSchedMgr.Add[
     fault: PreParseSchedObject.invalidPrintParameters, type: both,
     instance: instance, card1: 1,
     severityType: PreParseSchedObject.invalidPrintParametersST];
    CONTINUE;
    };

  i: CARDINAL ← finishPtr ↑ [j];
  IF i NOT IN [0..bFinishPtr.length) THEN {
   [] ← PreParseSchedMgr.Add[
    fault: PreParseSchedObject.binderyIndexOutOfRange,
    severityType: PreParseSchedObject.binderyIndexOutOfRangeST, type: both,
    instance: instance, card1: i];
   LOOP;
   };

  IF bFinishPtr ↑ [i].finishingMessage # NIL AND NOT instance.task.finishingMsg
   THEN {
   tempLength ← bFinishPtr ↑ [i].finishingMessage.length;
   tempString ← CharCodeMapping.XCCtoICC[
    xcc: bFinishPtr ↑ [i].finishingMessage, z: instance.heap];
   CS[tempString, SystemLimits.finishingMessage];
   [] ← PreParseSchedMgr.Add[
    fault: PreParseSchedObject.finishingMessage,
    severityType: PreParseSchedObject.finishingMessageST, type: both,
    instance: instance, string1: tempString];
   bFinishPtr ↑ [i].finishingMessage.length ← tempLength;
   instance.task.options[desCount ↑ ] ← [finishingMessage[tempString]];
   desCount ↑ ← desCount ↑ + 1;
   instance.task.forcedSave ← TRUE;
   instance.task.finishingMsg ← TRUE;
   };

  SELECT bFinishPtr ↑ [i].operation FROM

   none = > {
    IF finishItemSelected THEN {
```

Copyright © 1992 Xerox Corporation All Rights Reserved

```
  [] ← PreParseSchedMgr.Add[
   instance: instance, type: both, card1: bFinishPtr ↑ [i].operation.ORD,
   card2: finishSelected.ORD,
   fault: PreParseSchedObject.illegalFinishingCombination,
   severityType: PreParseSchedObject.illegalFinishingCombinationST];
  };
 tempFinishing.finishing ← none;
 finishItemSelected ← TRUE;
 finishSelected ← none;
 };
edgeStitching => {
 IF finishItemSelected THEN {
  [] ← PreParseSchedMgr.Add[
   instance: instance, type: both, card1: bFinishPtr ↑ [i].operation.ORD,
   card2: finishSelected.ORD, card3: bFinishPtr ↑ [i].headCount,
   fault: PreParseSchedObject.illegalFinishingCombination,
   severityType: PreParseSchedObject.illegalFinishingCombinationST];
  tempFinishing.finishing ← none;
  LOOP;
  };

 referenceEdgeSel ← bFinishPtr ↑ [i].referenceEdge;
 finishItemSelected ← TRUE;
 finishSelected ← edgeStitching;

 SELECT bFinishPtr[i].headCount FROM
  1, 2 => {
   tempHeadPos: CARDINAL ← 0;
   headPositionA: CARDINAL ← 0;
   headPositionB: CARDINAL ← 0;
   mediaYSize: CARDINAL ← 0;


   minA: CARDINAL = 10;
   minDualA: CARDINAL = 47;
   maxDualA: CARDINAL = 57;
   maxA: CARDINAL = 58;

   minB: CARDINAL = 228;
   minDualB: CARDINAL = 229;
   maxDualB: CARDINAL = 239;
   maxB: CARDINAL ← 0;

   dualWidth: CARDINAL = 182;

   mediaYSize ←
    IF bFinishPtr[i].referenceYSize = 0.0 THEN instance.task.media[
    firstPageIndex].mediumDimensions.lengthInMillimeters
    ELSE Real.RoundC[bFinishPtr[i].referenceYSize * 1000.0];
```

Copyright © 1992 Xerox Corporation All Rights Reserved

```
IF bFinishPtr[i].headPositions # NIL THEN {

 headPositionA ← Real.RoundC[
  bFinishPtr ↑ [i].headPositions[0] * 1000.0];
 IF bFinishPtr[i].headCount = 2 THEN {
  headPositionB ← Real.RoundC[
   bFinishPtr ↑ [i].headPositions[1] * 1000.0];
  IF headPositionA < headPositionB THEN {
   tempHeadPos ← headPositionA;
   headPositionA ← headPositionB;
   headPositionB ← tempHeadPos;
   };
  };

 maxB ← IF (mediaYSize > 353) THEN 343 ELSE mediaYSize - 10;

 IF bFinishPtr[i].headCount = 1 THEN {
  IF headPositionA < (mediaYSize / 2) THEN {
   tempFinishing.finishing ← landscapeSingleStitch;
   tempFinishing.stitchB ← mediaYSize - headPositionA;
   }
  ELSE {
   tempFinishing.finishing ← portraitSingleStitch;
   tempFinishing.stitchA ← mediaYSize - headPositionA;
   };

  IF
   (tempFinishing.stitchA NOT IN [minA..maxA]
    AND tempFinishing.finishing = portraitSingleStitch)
   OR
    (tempFinishing.stitchB NOT IN [minB..maxB]
     AND tempFinishing.finishing = landscapeSingleStitch) THEN
   addWarning ← TRUE
  ELSE tempFinishing.stitchNormal ← FALSE;

  }
 ELSE
  IF bFinishPtr[i].headCount = 2 THEN {
   tempFinishing.finishing ← doubleStitch;
   tempFinishing.stitchA ← mediaYSize - headPositionA;
   tempFinishing.stitchB ← mediaYSize - headPositionB;


   IF tempFinishing.stitchA IN [minDualA..maxDualA]
    AND tempFinishing.stitchB IN [minDualB..maxDualB]
    AND (tempFinishing.stitchA + dualWidth) =
     tempFinishing.stitchB THEN
    tempFinishing.stitchNormal ← FALSE

   ELSE
```

Copyright © 1992 Xerox Corporation All Rights Reserved

```
IF tempFinishing.stitchA = maxA
 AND tempFinishing.stitchB IN [maxDualB + 1..maxB] THEN
 tempFinishing.stitchNormal ← FALSE

ELSE
 IF tempFinishing.stitchB = minB
  AND tempFinishing.stitchA IN [minA..minDualA - 1] THEN
  tempFinishing.stitchNormal ← FALSE

 ELSE addWarning ← TRUE;

};

}
ELSE {
 tempFinishing.finishing ←
  IF bFinishPtr[i].headCount = 1 THEN portraitSingleStitch
  ELSE doubleStitch;
 };

};
ENDCASE => {
 [] ← PreParseSchedMgr.Add[
  instance: instance, type: both,
  card1: bFinishPtr ↑ [i].operation.ORD,
  card2: bFinishPtr ↑ [i].referenceEdge.ORD,
  card3: bFinishPtr ↑ [i].headCount,
  fault: PreParseSchedObject.finishingNotSupported,
  severityType: PreParseSchedObject.finishingNotSupportedST];
 LOOP;
 };

IF bFinishPtr ↑ [i].headOffset # 0 THEN {
 [] ← PreParseSchedMgr.Add[
  instance: instance, type: both,
  real: bFinishPtr ↑ [i].headOffset * 1000,
  fault: PreParseSchedObject.processOffset,
  severityType: PreParseSchedObject.processOffsetST];
 };
};
binding => {
 IF finishItemSelected THEN {
  [] ← PreParseSchedMgr.Add[
   instance: instance, type: both, card1: bFinishPtr ↑ [i].operation.ORD,
   card2: finishSelected.ORD,
   fault: PreParseSchedObject.illegalFinishingCombination,
   severityType: PreParseSchedObject.illegalFinishingCombinationST];
  tempFinishing.finishing ← none;
  LOOP};
 referenceEdgeSel ← bFinishPtr ↑ [i].referenceEdge;
```

Copyright © 1992 Xerox Corporation All Rights Reserved

```
tempFinishing.finishing ← bindOnly;
finishItemSelected ← TRUE;
finishSelected ← binding;

IF bFinishPtr ↑ [i].bindingColor IN [black..yellow] THEN
 [] ← PreParseSchedMgr.Add[
  instance: instance, type: both,
  card1: bFinishPtr ↑ [i].bindingColor.ORD,
  fault: PreParseSchedObject.bindingColor,
  severityType: PreParseSchedObject.bindingColorST]
ELSE
 IF bFinishPtr ↑ [i].bindingColor = other THEN
  [] ← PreParseSchedMgr.Add[
   instance: instance, type: both,
   string1: bFinishPtr ↑ [i].otherbindingColor,
   fault: PreParseSchedObject.otherBindingColor,
   severityType: PreParseSchedObject.otherBindingColorST];

IF bFinishPtr ↑ [i].bindingType IN [plastic..spiral] THEN
 [] ← PreParseSchedMgr.Add[
  instance: instance, type: both,
  card1: bFinishPtr ↑ [i].bindingType.ORD,
  fault: PreParseSchedObject.bindingType,
  severityType: PreParseSchedObject.bindingTypeST]
ELSE
 IF bFinishPtr ↑ [i].bindingType = other THEN
  [] ← PreParseSchedMgr.Add[
   instance: instance, type: both,
   string1: bFinishPtr ↑ [i].otherBindingType,
   fault: PreParseSchedObject.otherBindingType,
   severityType: PreParseSchedObject.otherBindingTypeST];

};
saddleStitching => {
 IF finishItemSelected THEN {
  [] ← PreParseSchedMgr.Add[
   instance: instance, type: both, card1: bFinishPtr ↑ [i].operation.ORD,
   card2: finishSelected.ORD,
   fault: PreParseSchedObject.illegalFinishingCombination,
   severityType: PreParseSchedObject.illegalFinishingCombinationST];
  tempFinishing.finishing ← none;
  LOOP;
  };

 tempFinishing.finishing ← byPassTransport;
 referenceEdgeSel ← bFinishPtr ↑ [i].referenceEdge;
 finishItemSelected ← TRUE;
 finishSelected ← saddleStitching;
 };
folding => instance.task.folding ← TRUE;
```

Copyright © 1992 Xerox Corporation All Rights Reserved

```
trimming => {
 trim: PublicPrinting.MediumDimensions;
 offset: CARDINAL;

 trim ← [
  widthInMillimeters: Real.RoundC[bFinishPtr ↑ [i].trimXSize * 1000.0],
  lengthInMillimeters: Real.RoundC[bFinishPtr ↑ [i].trimYSize * 1000.0]];
 IF trim.widthInMillimeters > trim.lengthInMillimeters THEN {
  offset ← trim.lengthInMillimeters;
  trim.lengthInMillimeters ← trim.widthInMillimeters;
  trim.widthInMillimeters ← offset};
 offset ← Real.RoundC[bFinishPtr ↑ [i].trimOffset * 1000.0];

 referenceEdgeSel ← bFinishPtr ↑ [i].referenceEdge;

 [] ← PreParseSchedMgr.Add[
  instance: instance, type: both, fault: PreParseSchedObject.trimming,
  severityType: PreParseSchedObject.trimmingST,
  card1: trim.widthInMillimeters, card2: trim.lengthInMillimeters,
  card3: offset];

 IF instance.task.signature THEN
  SetTrim[instance.task, trimDes, trim, offset];

 };
ENDCASE => {

 SELECT bFinishPtr ↑ [i].operation FROM
  dieCutting => {
   IF bFinishPtr ↑ [i].dieCutName # NIL THEN
    [] ← PreParseSchedMgr.Add[
     instance: instance, type: both,
     fault: PreParseSchedObject.diecutName,
     severityType: PreParseSchedObject.diecutNameST,
     string1: bFinishPtr ↑ [i].dieCutName];

   IF bFinishPtr ↑ [i].dieCutDimensionX # 0
    OR bFinishPtr ↑ [i].dieCutDimensionY # 0
    OR bFinishPtr ↑ [i].dieCutOffsetX # 0
    OR bFinishPtr ↑ [i].dieCutOffsetY # 0 THEN
    [] ← PreParseSchedMgr.Add[
     instance: instance, type: both,
     fault: PreParseSchedObject.diecutPosition,
     severityType: PreParseSchedObject.diecutPositionST,
     card1: Real.RoundC[bFinishPtr ↑ [i].dieCutDimensionX * 1000],
     card2: Real.RoundC[bFinishPtr ↑ [i].dieCutOffsetX * 1000],
     card3: Real.RoundC[bFinishPtr ↑ [i].dieCutDimensionY * 1000],
     real: bFinishPtr ↑ [i].dieCutOffsetY * 1000];
   };
```

Copyright © 1992 Xerox Corporation All Rights Reserved

```
      inserting =>
       [] ← PreParseSchedMgr.Add[
        instance: instance, type: both,
        fault: PreParseSchedObject.inserts,
        severityType: PreParseSchedObject.insertsST];

      other =>
       [] ← PreParseSchedMgr.Add[
        instance: instance, type: both,
        fault: PreParseSchedObject.otherBinderyOperation,
        severityType: PreParseSchedObject.otherBinderyOperationST,
        string1: bFinishPtr ↑ [i].otherOperation];

      ENDCASE;

     [] ← PreParseSchedMgr.Add[
      instance: instance, type: both, card1: bFinishPtr ↑ [i].operation.ORD,
      fault: PreParseSchedObject.finishingNotSupported,
      severityType: PreParseSchedObject.finishingNotSupportedST];
     };

   ENDLOOP;

  IF finishSelected = edgeStitching OR finishSelected = binding THEN
   FOR i: CARDINAL IN
    [0..instance.task.jobMediaData.orientedImagingProps.LENGTH) DO
    tempRefEdge ←
     IF instance.task.mediaInfo[i].mediaRotated THEN
     SELECT referenceEdgeSel FROM
      bottom => right,
      right => top,
      top => left,
      left => bottom,
      ENDCASE => top ELSE referenceEdgeSel;

    SELECT tempRefEdge FROM
     left => finishingRotation ← 0;
     right => {
      finishingRotation ← 180;
      IF i = firstPageIndex THEN {
       IF tempFinishing.finishing = portraitSingleStitch THEN
        tempFinishing.finishing ← landscapeSingleStitch
       ELSE
        IF tempFinishing.finishing = landscapeSingleStitch THEN
         tempFinishing.finishing ← portraitSingleStitch;
       };
      };
     ENDCASE => {
      [] ← PreParseSchedMgr.Add[
```

Copyright © 1992 Xerox Corporation All Rights Reserved

```
      instance: instance, type: both, card1: finishSelected.ORD,
      card2: tempRefEdge.ORD,
      fault: PreParseSchedObject.finishingNotSupported,
      severityType: PreParseSchedObject.finishingNotSupportedST];
     tempFinishing.finishing ← none;
     LOOP;
     };

    mediaRotation ← PreParseSchedMgr.GetRotation[
     instance.task.jobMediaData.orientedImagingProps[i].ipOrigin];
    instance.task.jobMediaData.orientedImagingProps[i].ipOrigin ←
     PreParseSchedMgr.GetCorner[mediaRotation + finishingRotation];
    ENDLOOP;

  IF binSelect = NIL THEN instance.heap.FREE[@finishPtr];

  END;
 SetTrim: PROCEDURE [
  task: PreParseSchedTask.Task, desNum: CARDINAL,
  trim: PublicPrinting.MediumDimensions, offset: CARDINAL] =
  BEGIN
  trimSizeX: MRSignature.TrimSizeX;
  trimSizeY: MRSignature.TrimSizeY;
  resolutionDiv100: CARDINAL;

  resolutionDiv100 ← task.jobMediaData.deviceProps.resolution / 100;
  trimSizeX ← ConvertmmToSpots[trim.widthInMillimeters, resolutionDiv100];
  trimSizeY ← ConvertmmToSpots[trim.lengthInMillimeters, resolutionDiv100];
  offset ← ConvertmmToSpots[offset, resolutionDiv100];

  task.options[desNum] ← [
   signature[trimOffset: offset, trimSizeX: trimSizeX, trimSizeY: trimSizeY]];
  END;
 ConvertmmToSpots: PROCEDURE [mm: CARDINAL, resolutionDiv100: CARDINAL]
  RETURNS [spots: CARDINAL] =
  BEGIN
  spots ←
   SELECT mm FROM
    216 => 850,
    279 => 1100,
    330 => 1300,
    356 => 1400,
    432 => 1700,
    140 => 550,
    229 => 900,
    203 => 800,
    254 => 1000,
    190 => 750,
    241 => 950,
    178 => 700,
```

Copyright © 1992 Xerox Corporation All Rights Reserved

```
   152 => 600,
   210 => 830,
   297 => 1170,
   420 => 1650,
   148 => 580,
   ENDCASE => Real.RoundC[Real.Float[mm] / 0.254];
 spots ← spots * resolutionDiv100;
 END;
CSMF: PROCEDURE [
 string: LONG POINTER TO LONG STRING, max: CARDINAL, heap: UNCOUNTED ZONE] =
 BEGIN
 tempString: LONG STRING ← NIL;
 IF string↑ = NIL THEN RETURN;
 tempString ← CharCodeMapping.XCCtoICC[xcc: string↑, z: heap];
 CS[tempString, max];
 String.FreeString[s: string↑, z: heap];
 string↑ ← tempString;
 END;
CS: PUBLIC PROCEDURE [string: LONG STRING, max: CARDINAL] =
 BEGIN
 IF string # NIL AND string.length > max THEN {
  string.length ← max;
  IF max > 3 THEN {
   string[max - 1] ← '.; string[max - 2] ← '.; string[max - 3] ← '.; };
  };
 END;
END.
```

Copyright © 1992 Xerox Corporation All Rights Reserved

```
DIRECTORY
 CoalescerTable USING [Error],
 DBError USING [ErrorCode, OperationFailed],
 Image USING [Error, nullHandle],
 JobBackUp USING [nullLockID, LockID],
 JobFault USING [SeverityType],
 JobQ USING [BackUpJob, Error, JobReference, LockJob, UnlockJob],
 Page USING [
  Error, Handle, GetLast, GetPlex, GetParameters, Parameters, PutParameters,
  GetPrevious, MoveSide, Delete],
 PreParser USING [
  CoverImaging, JobMediaDataPtr, PageResults, PageResultsPtr, PutCommand],
 PreParseSchedMgr USING [
  Add, Command, DumpObjectFaultList, FatalError, FreeStatus, Instance,
  NewSideReady, EndTask, WaitForCommand, DatabaseCode,
  CreatePageWithFrontImage],
 PreParseSchedTask USING [ObjectFaultHandle],
 PreParseSchedObject,
 Print3SM USING [MgrStatus],
 PublicPrinting USING [Plex],
 String USING [FreeString],
 SystemLimits USING [preParseBackupPoint];

PreParseSchedImplG: PROGRAM
 IMPORTS
  CoalescerTable, DBError, Image, JobQ, Page, PreParser, PreParseSchedMgr,
  String, SystemLimits
 EXPORTS PreParseSchedMgr =

 BEGIN

 SchedulerProcess: PUBLIC PROCEDURE [instance: PreParseSchedMgr.Instance] =
  BEGIN
  jobMediaData: PreParser.JobMediaDataPtr ← NIL;
  command: PreParseSchedMgr.Command ← none;
  pageResults: PreParser.PageResultsPtr ← NIL;
  pageFaults: PreParseSchedTask.ObjectFaultHandle ← NIL;

  DO
   [command, pageResults, pageFaults] ← PreParseSchedMgr.WaitForCommand[
    instance];

   SELECT command FROM

    mediaReady =>
     BEGIN
     lockID: JobBackUp.LockID ← JobBackUp.nullLockID;
```

Copyright © 1992 Xerox Corporation All Rights Reserved

```
IF pageFaults # NIL THEN {
 lockID ← JobQ.LockJob[
  job: instance.task.jobQReference, jobID: instance.task.jobID,
  readOnly: FALSE];
 PreParseSchedMgr.DumpObjectFaultList[
  instance: instance, offThePage: TRUE, lockID: lockID,
  pageFaults: pageFaults];
 JobQ.UnlockJob[lockID: lockID]};

PreParser.PutCommand[
 handle: instance.preParserHandle,
 command: [mediaReady[instance.task.jobMediaData]]];
END;

pageReady = >
 BEGIN
 lockID: JobBackUp.LockID ← JobBackUp.nullLockID;

 IF pageResults = NIL THEN RETURN;

 BEGIN
 ENABLE
  BEGIN
  DBError.OperationFailed = > {
   DoErrorRecovery[
    lockID: lockID, errorType: DBError, instance: instance,
    code: code.ORD];
   CONTINUE};
  CoalescerTable.Error = > {
   DoErrorRecovery[
    lockID: lockID, errorType: CoalescerTable, instance: instance,
    code: code.ORD];
   CONTINUE};
  Page.Error = > {
   DoErrorRecovery[
    lockID: lockID, errorType: Page, instance: instance,
    code: code.ORD];
   CONTINUE};
  Image.Error = > {
   DoErrorRecovery[
    lockID: lockID, errorType: Image, instance: instance,
    code: code.ORD];
   CONTINUE};
  JobQ.Error = > {
   DoErrorRecovery[
    lockID: lockID, errorType: JobQ, instance: instance,
    code: code.ORD];
   CONTINUE};
  END;
```

Copyright © 1992 Xerox Corporation All Rights Reserved

```
lockID ← JobQ.LockJob[
 job: instance.task.jobQReference, jobID: instance.task.jobID,
 readOnly: FALSE];

SELECT pageResults.errorStatus FROM
 ok, warnings, errors, fatalError =>
  BEGIN
  IF instance.task.covers THEN
   DoFrontCovers[instance, pageResults, lockID];

  IF instance.task.pageError AND pageResults.side = simplex THEN
   instance.task.pageError ← FALSE;

  PreParseSchedMgr.NewSideReady[
   instance: instance, lockID: lockID, sideParms: pageResults];
  END;

 pageZero =>
  BEGIN
  IF instance.task.covers THEN
   DoFrontCovers[instance, pageResults, lockID];

  PreParseSchedMgr.CreatePageWithFrontImage[
   instance: instance, image: Image.nullHandle, lockID: lockID,
   sideParms: pageResults];
  END;

 ENDCASE;

PreParseSchedMgr.DumpObjectFaultList[
 instance: instance,
 offThePage:
 IF pageResults.errorStatus = pageZero THEN TRUE ELSE FALSE,
 lockID: lockID, pageFaults: pageFaults];

JobQ.UnlockJob[lockID: lockID];

IF (instance.task.pageCount MOD SystemLimits.preParseBackupPoint) = 0
 THEN
 BEGIN
 lockID ← JobQ.LockJob[
  job: instance.task.jobQReference, jobID: instance.task.jobID,
  readOnly: FALSE];
 JobQ.BackUpJob[lockID: lockID];
 JobQ.UnlockJob[lockID: lockID];
 END;

END;
```

Copyright © 1992 Xerox Corporation All Rights Reserved

```
    PreParseSchedMgr.FreeStatus[
     [preParserPageCompleted[pageResults]], instance.heap];
    pageResults ← NIL;
    END;

   endJob =>
    BEGIN
    IF instance.task.pageCount = 0 THEN
     [] ← PreParseSchedMgr.Add[
       fault: PreParseSchedObject.noPagesInJob, instance: instance,
       type: warning, severityType: PreParseSchedObject.noPagesInJobST];
    PreParseSchedMgr.EndTask[instance, pageFaults];
    END;

   addBlankPage =>
    IF instance.task.pageCount = 0 THEN AddBlankPage[instance];

   noOp => NULL;

   ENDCASE;

  ENDLOOP;
 END;

AddBlankPage: PUBLIC PROCEDURE [instance: PreParseSchedMgr.Instance] =
 BEGIN
 lockID: JobBackUp.LockID ← JobQ.LockJob[
  job: instance.task.jobQReference, jobID: instance.task.jobID,
  readOnly: FALSE];
 pageResults: PreParser.PageResults;
 pageResults.plex ← simplex;
 pageResults.mediaIndex ← 0;
 PreParseSchedMgr.CreatePageWithFrontImage[
  instance: instance, image: Image.nullHandle, lockID: lockID,
  sideParms: @pageResults];
 JobQ.UnlockJob[lockID];
 END;

DoBackCovers: PUBLIC PROCEDURE [
 instance: PreParseSchedMgr.Instance, lockID: JobBackUp.LockID,
 emptyBackSide: BOOLEAN] =

 BEGIN
 pageResults: PreParser.PageResults;
 lastPage: Page.Handle ← Page.GetLast[lockID];
 newLastPage: BOOLEAN ← FALSE;
 plex: PublicPrinting.Plex ← Page.GetPlex[lockID, lastPage];
 parms: Page.Parameters ← Page.GetParameters[lastPage, lockID, instance.heap];
 parmsCopy: Page.Parameters ← parms;
```

Copyright © 1992 Xerox Corporation All Rights Reserved

```
CheckLimits[instance, lockID];

SELECT instance.task.coversInfo.rec.backCover FROM

 noImaging =>
  BEGIN

  pageResults.plex ← instance.task.parms.plex;
  pageResults.mediaIndex ←
   IF instance.task.coversInfo.rec.backCoverMediumValid THEN
   instance.task.coversInfo.rec.backCoverMedium
   ELSE instance.task.coversInfo.rec.frontCoverMedium;

  PreParseSchedMgr.CreatePageWithFrontImage[
   instance, Image.nullHandle, lockID, @pageResults];
  newLastPage ← TRUE;
  END;

 both =>
  BEGIN
  parms.medium ← instance.task.media[
   IF instance.task.coversInfo.rec.backCoverMediumValid THEN
   instance.task.coversInfo.rec.backCoverMedium
   ELSE instance.task.coversInfo.rec.frontCoverMedium];

  parms.plex ← duplex;

  Page.PutParameters[lastPage, parms, lockID];

  IF plex = simplex OR emptyBackSide THEN
   BEGIN
   prevPage: Page.Handle ← Page.GetPrevious[
    target: lastPage, lockID: lockID];
   prevPlex: PublicPrinting.Plex ← Page.GetPlex[lockID, prevPage];

   Page.MoveSide[
    page: lastPage, lockID: lockID, side: front, toPage: lastPage,
    toLockID: lockID, toSide: back];

   IF prevPlex = duplex THEN
    Page.MoveSide[
     page: prevPage, lockID: lockID, side: back, toPage: lastPage,
     toLockID: lockID, toSide: front]
   ELSE
    BEGIN
    Page.MoveSide[
     page: prevPage, lockID: lockID, side: front, toPage: lastPage,
     toLockID: lockID, toSide: front];
```

Copyright © 1992 Xerox Corporation All Rights Reserved

```
      Page.Delete[page: prevPage, lockID: lockID];
      END;
     END;
    END;
   outsideOnly = >
    BEGIN
    IF ¯instance.task.signature THEN
     parms.medium ← instance.task.media[
      IF instance.task.coversInfo.rec.backCoverMediumValid THEN
      instance.task.coversInfo.rec.backCoverMedium
      ELSE instance.task.coversInfo.rec.frontCoverMedium];

    parms.plex ← duplex;

    IF plex = simplex OR emptyBackSide THEN
     BEGIN

     Page.PutParameters[lastPage, parms, lockID];
     Page.MoveSide[
      page: lastPage, lockID: lockID, side: front, toPage: lastPage,
      toLockID: lockID, toSide: back];
     END
    ELSE
     BEGIN
     pageResults.plex ← parms.plex;
     pageResults.mediaIndex ←
      IF instance.task.coversInfo.rec.backCoverMediumValid THEN
      instance.task.coversInfo.rec.backCoverMedium
      ELSE instance.task.coversInfo.rec.frontCoverMedium;

     PreParseSchedMgr.CreatePageWithFrontImage[
      instance, Image.nullHandle, lockID, @pageResults];
     newLastPage ← TRUE;

     Page.MoveSide[
      page: lastPage, lockID: lockID, side: back,
      toPage: instance.task.lastPage, toLockID: lockID, toSide: back];
     END;
    END;
   insideOnly = >
    BEGIN

    IF ¯instance.task.signature THEN
     parms.medium ← instance.task.media[
      IF instance.task.coversInfo.rec.backCoverMediumValid THEN
      instance.task.coversInfo.rec.backCoverMedium
      ELSE instance.task.coversInfo.rec.frontCoverMedium];

    IF plex = simplex OR emptyBackSide THEN
     Page.PutParameters[lastPage, parms, lockID]
```

Copyright © 1992 Xerox Corporation All Rights Reserved

```
   ELSE
    BEGIN
    pageResults.plex ← instance.task.parms.plex;

    pageResults.mediaIndex ←
     IF instance.task.coversInfo.rec.backCoverMediumValid THEN
     instance.task.coversInfo.rec.backCoverMedium
     ELSE instance.task.coversInfo.rec.frontCoverMedium;

    PreParseSchedMgr.CreatePageWithFrontImage[
     instance, Image.nullHandle, lockID, @pageResults];
    newLastPage ← TRUE;

    Page.MoveSide[
     page: lastPage, lockID: lockID, side: back,
     toPage: instance.task.lastPage, toLockID: lockID, toSide: front];
    END;
   END;
  ENDCASE;

 IF newLastPage THEN PreParseSchedMgr.NewSideReady[instance, lockID, NIL];

 String.FreeString[instance.heap, parmsCopy.medium.name];
 String.FreeString[instance.heap, parmsCopy.medium.message];
 String.FreeString[instance.heap, parmsCopy.medium.otherPaperType];
 String.FreeString[instance.heap, parmsCopy.medium.otherColor];
 END;

DoFrontCovers: PROCEDURE [
 instance: PreParseSchedMgr.Instance, sideParms: PreParser.PageResultsPtr,
 lockID: JobBackUp.LockID] =
 BEGIN

 SELECT instance.task.coversInfo.rec.frontCover FROM

  noImaging =>
   IF instance.task.pageCount = 0 THEN
    BEGIN
    pageResults: PreParser.PageResults;

    pageResults.plex ← instance.task.parms.plex;
    pageResults.mediaIndex ←
     IF instance.task.coversInfo.rec.frontCoverMediumValid THEN
     instance.task.coversInfo.rec.frontCoverMedium
     ELSE sideParms.mediaIndex;
```

Copyright © 1992 Xerox Corporation All Rights Reserved

```
    IF ¬instance.task.coversInfo.rec.frontCoverMediumValid THEN
     instance.task.coversInfo.rec.frontCoverMedium ← sideParms.mediaIndex;
    PreParseSchedMgr.CreatePageWithFrontImage[
     instance, Image.nullHandle, lockID, @pageResults];
    END;

  both =>
   SELECT instance.task.sheetCount FROM

    0 =>
     BEGIN
     sideParms.plex ← duplex;
     IF instance.task.coversInfo.rec.frontCoverMediumValid THEN
      sideParms.mediaIndex ← instance.task.coversInfo.rec.frontCoverMedium
     ELSE
      instance.task.coversInfo.rec.frontCoverMedium ←
       sideParms.mediaIndex;
     END;

    1 =>
     BEGIN
     IF sideParms.plex = duplex AND sideParms.side = simplex THEN
      SavePageInfo[instance, sideParms];

     IF sideParms.plex = simplex THEN {
      sideParms.plex ← duplex; sideParms.side ← duplex};
     END;

    ENDCASE =>
     IF instance.task.coversInfo.shift THEN
      SavePrevPage[instance, sideParms];

  outsideOnly =>
   IF instance.task.sheetCount = 0 THEN

    BEGIN
    IF sideParms.plex = duplex THEN {
     SavePageInfo[instance, sideParms];
     IF NOT instance.task.signature THEN sideParms.plex ← simplex;
     };
    IF instance.task.coversInfo.rec.frontCoverMediumValid THEN
     sideParms.mediaIndex ← instance.task.coversInfo.rec.frontCoverMedium
    ELSE
     instance.task.coversInfo.rec.frontCoverMedium ← sideParms.mediaIndex;
    END

   ELSE
    IF instance.task.coversInfo.shift THEN
     SavePrevPage[instance, sideParms];
```

Copyright © 1992 Xerox Corporation All Rights Reserved

```
 insideOnly =>
  IF instance.task.pageCount = 0 THEN

   BEGIN
   pageResults: PreParser.PageResults;

   pageResults.mediaIndex ←
    IF instance.task.coversInfo.rec.frontCoverMediumValid THEN
    instance.task.coversInfo.rec.frontCoverMedium
    ELSE sideParms.mediaIndex;
   IF ~instance.task.coversInfo.rec.frontCoverMediumValid THEN
    instance.task.coversInfo.rec.frontCoverMedium ← sideParms.mediaIndex;

   pageResults.plex ← duplex;
   PreParseSchedMgr.CreatePageWithFrontImage[
    instance, Image.nullHandle, lockID, @pageResults];
   IF sideParms.plex = duplex THEN SavePageInfo[instance, sideParms];

   sideParms.plex ← duplex;
   sideParms.side ← duplex;
   END

  ELSE
   IF instance.task.coversInfo.shift THEN
    SavePrevPage[instance, sideParms];

 ENDCASE;

IF instance.task.signature AND instance.task.pageCount = 1 THEN {
 instance.task.coversInfo.rec.backCoverMediumValid ← TRUE;
 instance.task.coversInfo.rec.backCoverMedium ← sideParms.mediaIndex;
 };

END;

CheckLimits: PROCEDURE [
 instance: PreParseSchedMgr.Instance, lockID: JobBackUp.LockID] =
 BEGIN
 backCover: PreParser.CoverImaging ← instance.task.coversInfo.rec.backCover;

 instance.task.coversInfo.rec.backCover ←
  SELECT instance.task.coversInfo.rec.frontCover FROM
   both =>
    SELECT instance.task.coversInfo.rec.backCover FROM
     both =>
      IF instance.task.sheetCount < 4 THEN noImaging
      ELSE instance.task.coversInfo.rec.backCover,
     outsideOnly, insideOnly =>
      IF instance.task.sheetCount < 3 THEN noImaging
      ELSE instance.task.coversInfo.rec.backCover,
```

Copyright © 1992 Xerox Corporation All Rights Reserved

```
    ENDCASE => instance.task.coversInfo.rec.backCover,
   outsideOnly, insideOnly =>
    SELECT instance.task.coversInfo.rec.backCover FROM
     both =>
      IF instance.task.sheetCount < 3 THEN noImaging
      ELSE instance.task.coversInfo.rec.backCover,
     outsideOnly, insideOnly =>
      IF instance.task.sheetCount < 2 THEN noImaging
      ELSE instance.task.coversInfo.rec.backCover,
     ENDCASE => instance.task.coversInfo.rec.backCover,
   ENDCASE => instance.task.coversInfo.rec.backCover;
 IF backCover # instance.task.coversInfo.rec.backCover THEN
  [] ← PreParseSchedMgr.Add[
   fault: PreParseSchedObject.noImageForCovers, instance: instance,
   type: both, severityType: PreParseSchedObject.noImageForCoversST,
   card1: backCover.ORD, lockID: lockID];
 END;

SavePageInfo: PROCEDURE [
 instance: PreParseSchedMgr.Instance, sideParms: PreParser.PageResultsPtr] =
 BEGIN
 instance.task.coversInfo.shift ← TRUE;
 instance.task.coversInfo.plex ← sideParms.plex;
 instance.task.coversInfo.side ← sideParms.side;
 instance.task.coversInfo.index ← sideParms.mediaIndex;
 END;

SavePrevPage: PROCEDURE [
 instance: PreParseSchedMgr.Instance, sideParms: PreParser.PageResultsPtr] =
 BEGIN
 tempIndex: CARDINAL ← sideParms.mediaIndex;
 tempPlex: PublicPrinting.Plex ← sideParms.plex;
 tempSide: PublicPrinting.Plex ← sideParms.side;

 sideParms.mediaIndex ← instance.task.coversInfo.index;
 instance.task.coversInfo.index ← tempIndex;

 sideParms.plex ← instance.task.coversInfo.plex;
 instance.task.coversInfo.plex ← tempPlex;

 sideParms.side ← instance.task.coversInfo.side;
 instance.task.coversInfo.side ← tempSide;
 END;

DoErrorRecovery: PROCEDURE [
 lockID: JobBackUp.LockID, errorType: PreParseSchedMgr.DatabaseCode,
 instance: PreParseSchedMgr.Instance, code: CARDINAL] =
 BEGIN
 fault: CARDINAL ← PreParseSchedObject.databaseError;
 mgrError: Print3SM.MgrStatus ← noError;
```

Copyright © 1992 Xerox Corporation All Rights Reserved

```
severityType: JobFault.SeverityType ← PreParseSchedObject.databaseErrorST;
functionFault: BOOLEAN ← TRUE;

instance.task.pageError ← TRUE;

IF errorType = DBError AND code = DBError.ErrorCode.diskFull.ORD THEN {
 fault ← PreParseSchedObject.diskFull;
 severityType ← PreParseSchedObject.diskFullST;
 mgrError ← insufficientSpoolSpace;
 }

ELSE
 IF errorType = DBError AND code = DBError.ErrorCode.maxExceeded.ORD THEN {
  fault ← PreParseSchedObject.systemLimitTooManyFonts;
  severityType ← PreParseSchedObject.systemLimitTooManyFontsST;
  functionFault ← FALSE};

IF lockID # JobBackUp.nullLockID THEN
 JobQ.UnlockJob[lockID: lockID ! JobQ.Error => CONTINUE];

PreParseSchedMgr.FatalError[
 instance: instance, severityType: severityType,
 functionFault: functionFault, fault: fault, arg1: errorType.ORD,
 arg2: code];
END;

END.
```

Copyright © 1992 Xerox Corporation All Rights Reserved

```
DIRECTORY
 FaultLogger USING [ID, Log, nullLogID, SubSystem, SWModule],
 SMPreParse USING [];

PreParseSchedImplH: PROGRAM

 IMPORTS FaultLogger EXPORTS SMPreParse =
 BEGIN

 LogFault: PUBLIC PROCEDURE [fault: CARDINAL]
  RETURNS [uniqueID: FaultLogger.ID ← FaultLogger.nullLogID] =
  BEGIN
  log: BOOLEAN ←
   SELECT fault FROM
    1200, 1201, 1203, 1204, 1206, 1207, 1208, 1209, 1210, 1211, 1212, 1213,
     1214, 1215, 1216, 1218, 1219, 1220, 1221, 1222, 1223, 1224, 1225, 1226,
     1227, 1228, 1229, 1230, 1231, 1232, 1233, 1234, 1235, 1237, 1241, 1245,
     1247, 1250, 1251, 1255, 1261, 1262, 1265, 1267, 1268, 1270, 1271, 1272,
     1274, 1275, 1276, 1281, 1282, 1283, 1284, 1285, 1286, 1287, 1289, 1290,
     1291, 1292, 1293, 1294, 1295, 1296, 1297, 1298, 1299, 1300, 1301, 1302,
     1308, 1309, 1311, 1312, 1313, 1315, 1316, 1317, 1319, 1323, 1324, 1325,
     1326, 1332, 1333, 1334, 1335, 1515, 1516, 1522, 1523, 1524, 1525, 1530,
     1539, 1540, 1547, 1548, 1551, 1552, 1553, 1591 => TRUE,
    ENDCASE => FALSE;

  IF log THEN
   uniqueID ← FaultLogger.Log[
    fault: [subsystem: control, swModule: decomposer, faultNumber: fault]];
  END;

 END.
```

Copyright © 1992 Xerox Corporation All Rights Reserved

```
DIRECTORY
 DBError USING [ErrorCode, OperationFailed],
 EventHandler USING [FaultNode, FaultPointer, ReportStateChange],
 FENetSupport USING [PreParseParmsReady],
 IIPFragMgrPrivate USING [FreePrePStatic],
 JobBackUp USING [LockID, nullLockID],
 JobID USING [nullID],
 JobFault USING [SeverityType],
 JobStep USING [Status, StatusPut],
 JobQ USING [BackUpJob, Error, JobReference, LockJob, UnlockJob],
 NetDefaults USING [GetNetJobDisposition],
 NodeHandler USING [RequestFaultNode],
 Page USING [SetPageListCompleted],
 PreParser USING [PutStatusProc],
 PreParseSchedBucket USING [insufficientResource],
 PreParseSchedMgr USING [
  Add, DumpObjectFaultList, DoPrintingInstructions, FreeStatus, AbortJob,
  GetEndStatus, GetAborted, GetSense, IncSense, Instance, DeleteCode,
  NetCallBack, NewSideReady, NewState, ReleaseInstance, ResourceFault,
  DatabaseCode, SetEndStatus, SetResourceFault, NotifyNetJobArrived, FatalError,
  DoCommand, CheckPostConflicts, DoBackCovers],
 PreParseSchedObject,
 PreParseSchedTask USING [ObjectFaultHandle, Task],
 Print3SM USING [
  CloseSource, MgrStatus, OperateOnSource, SourceStatus, StartSource],
 PrintTTY USING [Event, LogEvent],
 ResMgrStorage USING [Pages],
 RTOSFile USING [Error, GetFileInfo],
 StreamScheduler USING [StepComplete];


PreParseSchedImplN: PROGRAM
 IMPORTS
  DBError, EventHandler, FENetSupport, IIPFragMgrPrivate, JobQ, JobStep,
  NetDefaults, NodeHandler, Page, PreParseSchedMgr, Print3SM, PrintTTY,
  RTOSFile, StreamScheduler
 EXPORTS PreParseSchedMgr =

 BEGIN


 StatusNotify: PUBLIC PreParser.PutStatusProc =

  BEGIN
  instance: PreParseSchedMgr.Instance ← LOOPHOLE[clientContext];

  WITH status SELECT FROM
```

Copyright © 1992 Xerox Corporation All Rights Reserved

```
preParserReady =>
 BEGIN
 PrintTTY.LogEvent[
  sched: preParse, event: jobAccepted, id: instance.task.jobID,
  transID: instance.id];

 [] ← Print3SM.StartSource[
  clientID: instance.task.jobID, source: instance.task.source,
  streamHandle: ipData, fileID: instance.task.parms.ipFileID,
  callBackProc: PreParseSchedMgr.NetCallBack];
 PreParseSchedMgr.NewState[instance, running];
 END;

preParserStartCompleted =>
 IF printInstrs # NIL THEN
  BEGIN
  PreParseSchedMgr.DoPrintingInstructions[
   instructions: printInstrs.instructions, instance: instance];

  IF instance.task.signature THEN
   printInstrs.resultsFlags.plexMayChange ← FALSE;

  END
 ELSE
  PreParseSchedMgr.FatalError[
   fault: PreParseSchedObject.systemError, instance: instance,
   severityType: PreParseSchedObject.systemErrorST,
   arg1: PreParseSchedMgr.DeleteCode.nilStartResultsPtr.ORD];

preParserPageCompleted =>
 BEGIN

 PreParseSchedMgr.DoCommand[
  instance: instance, command: pageReady, pageResults: pageResultsPtr];
 END;

preParserCompleted =>
 BEGIN
 endingStatus: JobStep.Status ← done;

 PreParseSchedMgr.NewState[instance, completed];

 IF jobResultsPtr = NIL THEN
  BEGIN
  lockID: JobBackUp.LockID ← JobQ.LockJob[
   job: instance.task.jobQReference, jobID: instance.task.jobID,
   readOnly: FALSE];
  instance.task.disposition ← NetDefaults.GetNetJobDisposition[];
  FENetSupport.PreParseParmsReady[
   disposition: instance.task.disposition,
```

Copyright © 1992 Xerox Corporation All Rights Reserved

```
      preParseOptions: DESCRIPTOR[NIL, 0],
      jobReference: instance.task.jobQReference, lockID: lockID];
     JobQ.UnlockJob[lockID: lockID];
     END;

   PreParseSchedMgr.FreeStatus[status, instance.heap];

   PreParseSchedMgr.DoCommand[instance: instance, command: endJob];
   END;

  preParserAborted =>

   BEGIN

   PreParseSchedMgr.NewState[instance, aborted];

   PreParseSchedMgr.SetEndStatus[instance, faulted];

   PreParseSchedMgr.DoCommand[instance: instance, command: endJob];
   END;

  preParserSuspended =>

   BEGIN

   IF NOT PreParseSchedMgr.GetAborted[instance].aborted THEN
    SELECT reason FROM

     resources => {
      PrintTTY.LogEvent[
       sched: preParse, event: suspend, id: instance.task.jobID,
       transID: instance.id];
      ResourceProblem[instance]};

     fatalErrorPreParser, fatalErrorFragMgr => {
      PrintTTY.LogEvent[
       sched: preParse, event: suspendedFatalError,
       id: instance.task.jobID, transID: instance.id];
      [] ← Print3SM.OperateOnSource[
       clientID: instance.task.jobID, operation: abort, why: noError];
      [] ← PreParseSchedMgr.AbortJob[instance]};

     diskFullPreParser => {
      PrintTTY.LogEvent[
       sched: preParse, event: suspendedDiskSaturated,
       id: instance.task.jobID, transID: instance.id];
      PreParseSchedMgr.FatalError[
       instance: instance, fault: PreParseSchedObject.diskFull,
       severityType: PreParseSchedObject.diskFullST,
       why: insufficientSpoolSpace];
```

Copyright © 1992 Xerox Corporation All Rights Reserved

```
     }
    ENDCASE

  ELSE
   PrintTTY.LogEvent[
    sched: preParse, event: ignoredCommand, id: instance.task.jobID,
    transID: instance.id];

  END;

 preParserResumed =>

  BEGIN
  PrintTTY.LogEvent[
   sched: preParse, event: resumed, id: instance.task.jobID,
   transID: instance.id];

  PreParseSchedMgr.NewState[instance, running];
  END;

 ENDCASE;

END;


EndTask: PUBLIC PROCEDURE [
 instance: PreParseSchedMgr.Instance,
 pageFaults: PreParseSchedTask.ObjectFaultHandle] =

 BEGIN
 lockID: JobBackUp.LockID ← JobBackUp.nullLockID;
 ttyEvent: PrintTTY.Event ← completed;
 endingStatus: JobStep.Status ← PreParseSchedMgr.GetEndStatus[instance];
 emptyBackSide: BOOLEAN;

 IIPFragMgrPrivate.FreePrePStatic[instance.iipFragMgrHandle];

 BEGIN
 ENABLE
  BEGIN
  DBError.OperationFailed => {
   DoEndJobErrorRecovery[
    lockID: lockID, errorType: DBError, instance: instance, code: code.ORD];
   CONTINUE};
  JobQ.Error => {
   DoEndJobErrorRecovery[
    lockID: lockID, errorType: JobQ, instance: instance, code: code.ORD];
   CONTINUE};
  END;
```

Copyright © 1992 Xerox Corporation All Rights Reserved

```
lockID ← JobQ.LockJob[
 job: instance.task.jobQReference, jobID: instance.task.jobID,
 readOnly: FALSE];

PreParseSchedMgr.DumpObjectFaultList[instance, TRUE, lockID, pageFaults];

emptyBackSide ← instance.task.lastSideDirty;
PreParseSchedMgr.NewSideReady[
 instance: instance, lockID: lockID, sideParms: NIL];
IF instance.task.covers THEN
 PreParseSchedMgr.DoBackCovers[instance, lockID, emptyBackSide];
Page.SetPageListCompleted[lockID: lockID, pageListCompleted: TRUE];

IF PreParseSchedMgr.CheckPostConflicts[instance, lockID].conflicts THEN
 endingStatus ← faulted;

IF instance.task.shutdownFault THEN
 [] ← PreParseSchedMgr.Add[
  instance: instance, type: fault, fault: PreParseSchedObject.shutdown,
  lockID: lockID, severityType: PreParseSchedObject.shutdownST];

END;

IF PreParseSchedMgr.GetEndStatus[instance].status = aborted THEN
 endingStatus ← aborted;

IF instance.task.streamOn THEN
 StreamScheduler.StepComplete[
  lockID: lockID, handlePtr: @instance.task.streamHandle,
  faulted: IF endingStatus = done THEN FALSE ELSE TRUE];

JobStep.StatusPut[
 lockID: lockID, status: endingStatus, stepHandle: instance.task.stepHandle];

JobQ.BackUpJob[
 lockID: lockID !
 DBError.OperationFailed => {
  DoEndJobErrorRecovery[
   lockID: lockID, errorType: DBError, instance: instance, code: code.ORD];
  CONTINUE}];
JobQ.UnlockJob[lockID: lockID];

[] ← Print3SM.OperateOnSource[
 clientID: instance.task.jobID, operation: returnPrintID, why: noError];

PreParseSchedMgr.NotifyNetJobArrived[instance, endingStatus];

IF instance.task.source = disk THEN {
 pages: ResMgrStorage.Pages ← 0;
```

Copyright © 1992 Xerox Corporation All Rights Reserved

```
   pages ← RTOSFile.GetFileInfo[
    instance.task.parms.ipFileID, NIL ! RTOSFile.Error => CONTINUE].size;
   Print3SM.CloseSource[source: disk, size: pages];
   }
 ELSE Print3SM.CloseSource[source: net, size: 0];


 ttyEvent ←
  SELECT endingStatus FROM
   aborted => aborted,
   faulted => faulted,
   ENDCASE => completed;
 PrintTTY.LogEvent[
  sched: preParse, event: ttyEvent, id: instance.task.jobID,
  transID: instance.id];

 PreParseSchedMgr.ReleaseInstance[instance];

 END;

ResourceProblem: PROCEDURE [instance: PreParseSchedMgr.Instance] =
 BEGIN
 sense: CARDINAL;
 faultPtr: EventHandler.FaultPointer;

 PreParseSchedMgr.IncSense[instance];
 sense ← PreParseSchedMgr.GetSense[instance];

 faultPtr ← NodeHandler.RequestFaultNode[number: 1];
 faultPtr↑ ← [
  record: [
  faultBucket: PreParseSchedBucket.insufficientResource, sense: sense,
  priority: operNow, mask: FALSE, zone: 0, uniqueID: NIL,
  jobID: instance.task.jobID], next: NIL, prev: NIL];

 PreParseSchedMgr.NewState[instance, suspended];

 IF NOT PreParseSchedMgr.ResourceFault[instance].exists THEN
  BEGIN
  PreParseSchedMgr.SetResourceFault[instance];
  EventHandler.ReportStateChange[
   id: [trans: instance.id, module: preParse],
   data: [
   state: notReady,
   jobInfo: [
   jobID: instance.task.jobID, jobChange: change, priority: medium,
   jobSize: instance.task.copyCount, state: running], resume: none,
   faultList: [adds: faultPtr, deletes: NIL, changes: NIL, notifies: NIL]]]
  END
 ELSE
```

Copyright © 1992 Xerox Corporation All Rights Reserved

```
  EventHandler.ReportStateChange[
   id: [trans: instance.id, module: preParse],
   data: [
   state: notReady,
   jobInfo: [
   jobID: instance.task.jobID, jobChange: change, priority: medium,
   jobSize: instance.task.copyCount, state: running], resume: none,
   faultList: [adds: NIL, deletes: NIL, changes: faultPtr, notifies: NIL]]];

 EventHandler.ReportStateChange[
  id: [trans: instance.id, module: preParse],
  data: [
  state: ready, jobInfo: [JobID.nullID, add, medium, 0, running],
  resume: none, faultList: [NIL, NIL, NIL, NIL]]];
 END;


DoEndJobErrorRecovery: PROCEDURE [
 lockID: JobBackUp.LockID, errorType: PreParseSchedMgr.DatabaseCode,
 instance: PreParseSchedMgr.Instance, code: CARDINAL] =
 BEGIN
 faultNum: CARDINAL ← PreParseSchedObject.databaseError;
 severityType: JobFault.SeverityType ← PreParseSchedObject.databaseErrorST;
 functionFault: BOOLEAN ← TRUE;

 IF errorType = DBError AND code = DBError.ErrorCode.diskFull.ORD THEN {
  faultNum ← PreParseSchedObject.diskFull;
  severityType ← PreParseSchedObject.diskFullST};

 [] ← PreParseSchedMgr.Add[
  fault: faultNum, instance: instance, type: fault,
  severityType: severityType, card1: faultNum, card2: code, lockID: lockID,
  functionFault: functionFault];

 END;

END.
```

Copyright © 1992 Xerox Corporation All Rights Reserved

```
DIRECTORY
 CoalescerTable USING [AddTables, UnknownFontEntryLinkHandle],
 Image USING [CreateIpFragment, Handle, nullHandle],
 JobBackUp USING [LockID],
 Page USING [AddLast, Create, PutBackImage, PutFrontImage, SetPageValidity],
 PreParser USING [PageResultsPtr],
 PreParseSchedMgr USING [Add, CS, Instance, printerType],
 PreParseSchedObject,
 PreParseSchedTask USING [MediaInfoSeq, Task],
 PreParseStreamScheduler USING [IncrementPreParseCount],
 PublicPrinting USING [ColorTypes, nullMedium, InternalMedium, PaperType],
 String USING [FreeString],
 SystemLimits USING [authorityID, charCodeID, typeFaceID];

PreParseSchedImplP: PROGRAM
 IMPORTS
  CoalescerTable, Image, Page, PreParseStreamScheduler, PreParseSchedMgr,
  String, SystemLimits
 EXPORTS PreParseSchedMgr =

 BEGIN


 NewSideReady: PUBLIC PROCEDURE [
  instance: PreParseSchedMgr.Instance, lockID: JobBackUp.LockID,
  sideParms: PreParser.PageResultsPtr] =

  BEGIN
  ENABLE UNWIND => NULL;
  side: Image.Handle;
  task: PreParseSchedTask.Task ← instance.task;

  IF sideParms # NIL THEN
   BEGIN
   IF task.mediaInfo[sideParms.mediaIndex].mediaRotated AND NOT task.signature
    THEN {
    sideParms.boxCoords.xPosition ← task.yShift;
    sideParms.boxCoords.yPosition ← -task.xShift;
    IF sideParms.plex = duplex AND sideParms.side = duplex THEN
     sideParms.boxCoords.yPosition ← task.xShift;
    IF sideParms.plex = duplexHeadToToe AND sideParms.side = duplex THEN
     sideParms.boxCoords.xPosition ← -task.yShift;
    }
   ELSE {
    sideParms.boxCoords.xPosition ← task.xShift;
    sideParms.boxCoords.yPosition ← task.yShift;
    IF sideParms.plex = duplex AND sideParms.side = duplex THEN
     sideParms.boxCoords.xPosition ← -task.xShift;
    IF sideParms.plex = duplexHeadToToe AND sideParms.side = duplex THEN
```

Copyright © 1992 Xerox Corporation All Rights Reserved

```
    sideParms.boxCoords.yPosition ← -task.yShift;
   };

  side ← Image.CreateIpFragment[
   location: [job[lockID]], box: sideParms.boxCoords,
   attributes: [sideParms.iipFragID]];

  CheckFontStrings[sideParms.fontLinks];

  CoalescerTable.AddTables[
   image: side, lockID: lockID, bitMapLinks: sideParms.bitMapLinks,
   fontLinks: sideParms.fontLinks];


  IF sideParms.plex = simplex THEN
   BEGIN
   IF task.lastSideDirty THEN ValidatePage[lockID, task];

   CreatePageWithFrontImageInt[
    instance: instance, image: side, lockID: lockID, sideParms: sideParms];
   ValidatePage[lockID, task];
   task.lastSideDirty ← FALSE;
   task.sheetCount ← task.sheetCount + 1;
   END

  ELSE
   IF sideParms.side = simplex THEN
    BEGIN
    IF task.lastSideDirty THEN ValidatePage[lockID, task];

    CreatePageWithFrontImageInt[
     instance: instance, image: side, lockID: lockID,
     sideParms: sideParms];
    task.lastSideDirty ← TRUE;
    task.sheetCount ← task.sheetCount + 1;
    END

   ELSE
    BEGIN
    IF task.pageError THEN {
     CreatePageWithFrontImageInt[
      instance: instance, image: Image.nullHandle, lockID: lockID,
      sideParms: sideParms];
     task.sheetCount ← task.sheetCount + 1;
     };

    Page.PutBackImage[page: task.lastPage, image: side, lockID: lockID];

    ValidatePage[lockID, task];
    task.lastSideDirty ← FALSE;
```

Copyright © 1992 Xerox Corporation All Rights Reserved

```
    task.sheetCount ← task.sheetCount + 1;
    END;

  END
 ELSE
  IF task.lastSideDirty THEN
   BEGIN ValidatePage[lockID, task]; task.lastSideDirty ← FALSE; END;
 END;

CreatePageWithFrontImage: PUBLIC PROCEDURE [
 instance: PreParseSchedMgr.Instance, image: Image.Handle,
 lockID: JobBackUp.LockID, sideParms: PreParser.PageResultsPtr] =
 BEGIN
 ENABLE UNWIND => NULL;

 mediaSet: BOOLEAN ← FALSE;
 infoSet: BOOLEAN ← FALSE;
 mediaArray: ARRAY [0..1) OF PublicPrinting.InternalMedium;

 IF instance.task.lastSideDirty THEN ValidatePage[lockID, instance.task];
 IF sideParms.plex = duplex THEN instance.task.lastSideDirty ← TRUE;

 IF instance.task.media = NIL THEN {
  mediaArray[0] ← [
   NIL, [216, 279], NIL, standard, white, right, NIL, NIL, 0, 0, 0, 0, 0, 0];
  instance.task.media ← DESCRIPTOR[mediaArray];
  mediaSet ← TRUE};

 IF instance.task.mediaInfo = NIL THEN {
  infoSet ← TRUE;
  instance.task.mediaInfo ← instance.heap.NEW[
   PreParseSchedTask .MediaInfoSeq[1]];
  instance.task.mediaInfo[0] ← [
   used: TRUE, parallelX: TRUE, mediaRotated: FALSE, error: none]};

 CreatePageWithFrontImageInt[instance, image, lockID, sideParms];
 IF sideParms.plex = simplex THEN {
  ValidatePage[lockID, instance.task]; instance.task.lastSideDirty ← FALSE};
 IF mediaSet THEN instance.task.media ← NIL;
 IF infoSet THEN instance.heap.FREE[@instance.task.mediaInfo];
 END;

CreatePageWithFrontImageInt: PROCEDURE [
 instance: PreParseSchedMgr.Instance, image: Image.Handle,
 lockID: JobBackUp.LockID, sideParms: PreParser.PageResultsPtr] =

 BEGIN
 ENABLE UNWIND => NULL;

 task: PreParseSchedTask.Task ← instance.task;
```

Copyright © 1992 Xerox Corporation All Rights Reserved

```
mediaError: BOOLEAN ← FALSE;
oldType: PublicPrinting.PaperType ← standard;
oldColor: PublicPrinting.ColorTypes ← white;
oldModulus: CARDINAL ← 0;
oldModulusIndex: CARDINAL ← 0;


IF NOT task.mediaInfo[sideParms.mediaIndex].used THEN
 BEGIN
 task.mediaInfo[sideParms.mediaIndex].used ← TRUE;

 IF PreParseSchedMgr.printerType = gladiator THEN
  BEGIN
  IF task.media[sideParms.mediaIndex].paperType IN [precutTab..fullcutTab]
   THEN
   BEGIN
   task.media[sideParms.mediaIndex].modulus ← 0;
   task.media[sideParms.mediaIndex].modulusIndex ← 0;
   String.FreeString[
    s: task.media[sideParms.mediaIndex].otherPaperType, z: instance.heap];
   [] ← PreParseSchedMgr.Add[
    instance: instance, type: both, lockID: lockID,
    fault:
    IF task.media[sideParms.mediaIndex].paperType = precutTab THEN
    PreParseSchedObject.preCutTabNotSupported
    ELSE PreParseSchedObject.fullCutTabNotSupported,
    severityType:
    IF task.media[sideParms.mediaIndex].paperType = precutTab THEN
    PreParseSchedObject.preCutTabNotSupportedST
    ELSE PreParseSchedObject.fullCutTabNotSupportedST];
   task.media[sideParms.mediaIndex].paperType ← standard;
   END
  END;

 IF task.media[sideParms.mediaIndex].paperType = transparency THEN
  BEGIN

  IF task.media[sideParms.mediaIndex].mediumDimensions.widthInMillimeters >
   229
   OR task.media[sideParms.mediaIndex].mediumDimensions.lengthInMillimeters
    > 356 THEN
   BEGIN
   task.media[sideParms.mediaIndex].paperType ← standard;
   String.FreeString[
    s: task.media[sideParms.mediaIndex].otherPaperType, z: instance.heap];
   IF task.media[sideParms.mediaIndex].color = noColor THEN
    task.media[sideParms.mediaIndex].color ← white;
   [] ← PreParseSchedMgr.Add[
    instance: instance, type: both, lockID: lockID,
    fault: PreParseSchedObject.maxSizeForTrans,
```

Copyright © 1992 Xerox Corporation All Rights Reserved

```
    severityType: PreParseSchedObject.maxSizeForTransST,
    card1: task.media[
    sideParms.mediaIndex].mediumDimensions.widthInMillimeters,
    card2: task.media[
    sideParms.mediaIndex].mediumDimensions.lengthInMillimeters];
   END;
  END
 ELSE
  IF task.media[sideParms.mediaIndex].paperType = precutTab THEN
   BEGIN

   IF task.media[sideParms.mediaIndex].mediumDimensions.widthInMillimeters
    > 229
    OR task.media[
     sideParms.mediaIndex].mediumDimensions.lengthInMillimeters > 356
    THEN
    BEGIN
    task.media[sideParms.mediaIndex].paperType ← standard;
    task.media[sideParms.mediaIndex].modulus ← 0;
    task.media[sideParms.mediaIndex].modulusIndex ← 0;
    String.FreeString[
     s: task.media[sideParms.mediaIndex].otherPaperType,
     z: instance.heap];
    [] ← PreParseSchedMgr.Add[
     instance: instance, type: both, lockID: lockID,
     fault: PreParseSchedObject.maxSizeForTab,
     severityType: PreParseSchedObject.maxSizeForTabST,
     card1: task.media[
     sideParms.mediaIndex].mediumDimensions.widthInMillimeters,
     card2: task.media[
     sideParms.mediaIndex].mediumDimensions.lengthInMillimeters];
    END

   ELSE
    IF task.media[sideParms.mediaIndex].modulus NOT IN [1..100] THEN
     BEGIN
     [] ← PreParseSchedMgr.Add[
      instance: instance, type: both, lockID: lockID,
      fault: PreParseSchedObject.modulusOutOfRange,
      severityType: PreParseSchedObject.modulusOutOfRangeST,
      card1: task.media[sideParms.mediaIndex].modulus];
     task.media[sideParms.mediaIndex].modulus ←
      IF task.media[sideParms.mediaIndex].modulus > 100 THEN 100 ELSE 1;
     END;
   END;
 IF task.media[sideParms.mediaIndex].color = noColor
  AND NOT
   (task.media[sideParms.mediaIndex].paperType = transparency
    OR task.media[sideParms.mediaIndex].paperType = other) THEN
  BEGIN
```

Copyright © 1992 Xerox Corporation All Rights Reserved

```
  [] ← PreParseSchedMgr.Add[
   instance: instance, type: both, lockID: lockID,
   fault: PreParseSchedObject.clearForNonTrans,
   severityType: PreParseSchedObject.clearForNonTransST,
   card1: task.media[sideParms.mediaIndex].paperType.ORD,
   string1: task.media[sideParms.mediaIndex].otherPaperType];
  task.media[sideParms.mediaIndex].color ← white;
  String.FreeString[
   s: task.media[sideParms.mediaIndex].otherColor, z: instance.heap];
  END;

 END;

IF sideParms.plex = duplex THEN

 SELECT task.media[sideParms.mediaIndex].paperType FROM

  precutTab, fullcutTab, transparency = >
   BEGIN
   oldType ← task.media[sideParms.mediaIndex].paperType;
   oldColor ← task.media[sideParms.mediaIndex].color;
   oldModulus ← task.media[sideParms.mediaIndex].modulus;
   oldModulusIndex ← task.media[sideParms.mediaIndex].modulusIndex;
   task.media[sideParms.mediaIndex].paperType ← standard;
   SELECT oldType FROM
    transparency = > {
     task.media[sideParms.mediaIndex].color ← white;
     task.mediaInfo[sideParms.mediaIndex].error ← plexTranError};
    precutTab, fullcutTab = >
     task.mediaInfo[sideParms.mediaIndex].error ← plexTabError;
    ENDCASE;

   mediaError ← TRUE;
   END;

  ENDCASE;

task.lastPage ← Page.Create[
 lockID: lockID, valid: FALSE,
 parameters: [
 insert: [number: 0, medium: PublicPrinting.nullMedium],
 medium: task.media[sideParms.mediaIndex],
 plex: IF sideParms.plex # simplex THEN duplex ELSE simplex,
 headToToe:
 IF task.mediaInfo[sideParms.mediaIndex].mediaRotated THEN NOT task.headToToe
 ELSE task.headToToe]];
IF image # Image.nullHandle THEN
 Page.PutFrontImage[page: task.lastPage, image: image, lockID: lockID];
Page.AddLast[page: task.lastPage, lockID: lockID];
task.pageCount ← task.pageCount + 1;
```

Copyright © 1992 Xerox Corporation All Rights Reserved

```
IF mediaError THEN {
 task.media[sideParms.mediaIndex].modulus ← oldModulus;
 task.media[sideParms.mediaIndex].modulusIndex ← oldModulusIndex;
 task.media[sideParms.mediaIndex].paperType ← oldType;
 task.media[sideParms.mediaIndex].color ← oldColor};
END;


CheckFontStrings: PROCEDURE [table: CoalescerTable.UnknownFontEntryLinkHandle] =
 BEGIN
 WHILE table # NIL DO
  fontLink: CoalescerTable.UnknownFontEntryLinkHandle ← table;
  table ← table.next;
  IF fontLink.list # NIL THEN
   BEGIN
   FOR j: CARDINAL IN [0..fontLink.list.LENGTH) DO
    PreParseSchedMgr.CS[
     fontLink.list[j].authorityID, SystemLimits.authorityID];
    PreParseSchedMgr.CS[
     fontLink.list[j].charCodeID, SystemLimits.charCodeID];
    PreParseSchedMgr.CS[
     fontLink.list[j].typeFaceID, SystemLimits.typeFaceID];
    ENDLOOP;
   END;
  ENDLOOP
 END;

ValidatePage: PROCEDURE [
 lockID: JobBackUp.LockID, task: PreParseSchedTask.Task] =
 BEGIN

 Page.SetPageValidity[lockID: lockID, page: task.lastPage, valid: TRUE];

 IF task.streamOn THEN
  PreParseStreamScheduler.IncrementPreParseCount[
   handle: task.streamHandle, count: 1]
 END;

END.
```

```
DIRECTORY
 DecomposerCommon USING [ClientContext],
 EventHandler USING [MemoryActionCompleteProcType, ReportStateChange],
 Heap USING [Error],
 JobID USING [ID, nullID],
 JobStep USING [Status],
 JobQ USING [DereferenceJob, JobReference, nullJobReference],
 NetworkLog USING [JobStatus],
 PreParser USING [Create, Destroy, PageResultsPtr, PutCommand],
 PreParseSchedMgr USING [
  Command, FreeTask, SetFaultList, Instance, InstanceRecord, State],
 PreParseSchedTask USING [ObjectFaultHandle, Task],
 Print3SM USING [OperateOnSource, Source],
 PrintTTY USING [LogEvent],
 Process USING [Detach, DisableTimeout, InitializeCondition, priorityNormal],
 ResMgr USING [Allocate, Error, FreeBufferList],
 ResMgrIDs USING [TransactionID],
 ResMgrHeap USING [Create, HeapFullProc],
 ResMgrStorage USING [Pages],
 SMPreParse USING [],
 System USING [switches];

PreParseSchedMgrImpl: MONITOR
 IMPORTS
  EventHandler, Heap, JobQ, PreParseSchedMgr, PreParser, Print3SM, PrintTTY,
  Process, ResMgr, ResMgrHeap, System
 EXPORTS PreParseSchedMgr, SMPreParse =

 BEGIN

 heapSize: ResMgrStorage.Pages = 64;


 ipInstance: PreParseSchedMgr.Instance ← NIL;
 ipInstanceRecord: PreParseSchedMgr.InstanceRecord ← [];

 numOfInst: CARDINAL ← 0;
 numOfAvailInst: CARDINAL ← 0;

 AbortJob: PUBLIC ENTRY PROCEDURE [instance: PreParseSchedMgr.Instance]
  RETURNS [abort: BOOLEAN ← FALSE] =
  BEGIN
  ENABLE UNWIND => NULL;

  IF instance.task = NIL THEN RETURN;

  IF ~instance.task.ppCompleted AND ~instance.task.aborted THEN
   BEGIN
```

```
  ChangeState[instance.id, aboutToAbort];
  instance.task.aborted ← TRUE;
  abort ← TRUE;
  PrintTTY.LogEvent[
   sched: preParse, event: abort, id: instance.task.jobID,
   transID: instance.id];
  Process.Detach[
   FORK PreParser.PutCommand[
   handle: instance.preParserHandle, command: [abort[]]]];
  END;

 END;

AcquireInstance: PUBLIC ENTRY PROCEDURE [id: ResMgrIDs.TransactionID]
 RETURNS [instance: PreParseSchedMgr.Instance] =
 BEGIN
 ENABLE UNWIND => NULL;

 SELECT id FROM
  captureIP =>
   IF ipInstance # NIL THEN
    SELECT ipInstance.state.currentState FROM

     ready, shutdown => {

      IF ipInstance.state.currentState = shutdown THEN {
       PrintTTY.LogEvent[
        sched: preParse, event: shutdownCompleted, id: JobID.nullID,
        transID: ipInstance.id];
       AllocateMemory[ipInstance]};

      numOfAvailInst ← numOfAvailInst - 1;
      ChangeState[ipInstance.id, starting];
      RETURN[ipInstance]};

     ENDCASE;
  ENDCASE;
 instance ← NIL;
 END;

AllocateMemory: PUBLIC PROCEDURE [instance: PreParseSchedMgr.Instance] =
 BEGIN
 ENABLE ResMgr.Error => NULL;

 instance.buffer ← ResMgr.Allocate[
  id: [trans: captureIP, module: netServe], Pages: heapSize,
  waitTillAvailable: TRUE];

 instance.heap ← ResMgrHeap.Create[
  bl: instance.buffer, heapFull: PreParseHeapFull, maxSize: heapSize,
```

Copyright © 1992 Xerox Corporation All Rights Reserved

```
  ownerChecking: (System.switches['6] = up), incrementSize: 0];

 [handle: instance.preParserHandle] ← PreParser.Create[
  zone: instance.heap, priority: Process.priorityNormal, transID: instance.id]
 END;

AssessAbort: PUBLIC ENTRY PROCEDURE [instance: PreParseSchedMgr.Instance]
 RETURNS [return: BOOLEAN ← FALSE, source: Print3SM.Source] =
 BEGIN
 ENABLE UNWIND => NULL;

 IF instance.task = NIL THEN RETURN[TRUE, net];
 source ← instance.task.source;

 IF instance.task.waitingToAbort OR instance.task.aborted THEN
  RETURN[TRUE, net];

 IF instance.state.currentState = starting THEN
  BEGIN instance.task.waitingToAbort ← TRUE; WAIT instance.task.wait; END;
 END;

CreateInstance: PUBLIC ENTRY PROCEDURE [id: ResMgrIDs.TransactionID]
 RETURNS [instance: PreParseSchedMgr.Instance ← NIL] =
 BEGIN
 ENABLE UNWIND => NULL;

 SELECT id FROM
  captureIP => {instance ← Create[ipInstance, id]; ipInstance ← instance};
  ENDCASE;
 END;

Dereference: PUBLIC ENTRY PROCEDURE [
 jobID: JobID.ID, reference: JobQ.JobReference] =
 BEGIN
 ENABLE UNWIND => NULL;

 IF ipInstance = NIL OR ipInstance.task = NIL OR ipInstance.task.jobID # jobID
  OR NOT ipInstance.task.streamOn OR NOT ipInstance.task.foreignRef THEN
  JobQ.DereferenceJob[job: reference]

 ELSE ipInstance.task.foreignRef ← FALSE;

 END;

DoCommand: PUBLIC PROCEDURE [
 instance: PreParseSchedMgr.Instance, command: PreParseSchedMgr.Command,
 pageResults: PreParser.PageResultsPtr ← NIL] =
 BEGIN
 ENABLE UNWIND => NULL;
```

Copyright © 1992 Xerox Corporation All Rights Reserved

```
  pageFaults: PreParseSchedTask.ObjectFaultHandle ←
   PreParseSchedMgr.SetFaultList[instance, command, pageResults];

  DoCommandInternal[instance, command, pageResults, pageFaults];
  END;

 DoCommandInternal: ENTRY PROCEDURE [
  instance: PreParseSchedMgr.Instance, command: PreParseSchedMgr.Command,
  pageResults: PreParser.PageResultsPtr,
  pageFaults: PreParseSchedTask.ObjectFaultHandle] =
  BEGIN
  ENABLE UNWIND => NULL;

  IF command = endJob THEN {
   IF instance.task = NIL OR instance.task.ppCompleted THEN RETURN;
   instance.task.ppCompleted ← TRUE;
   }
  ELSE
   IF command = mediaReady THEN
    ChangeState[id: instance.id, newState: starting];

  instance.task.pageResults ← pageResults;
  instance.task.pageFaults ← pageFaults;
  instance.command ← command;

  IF instance.sWaiting THEN {
   instance.sWaiting ← FALSE; NOTIFY instance.commandCV; }
  ELSE {instance.cWaiting ← TRUE; WAIT instance.commandCV};
  END;

 FaultNet: PUBLIC ENTRY PROCEDURE [instance: PreParseSchedMgr.Instance] =
  BEGIN
  ENABLE UNWIND => NULL;

  IF instance.task = NIL THEN RETURN;
  instance.task.netFaulted ← TRUE;
  END;

 FindContextID: PUBLIC ENTRY PROCEDURE [
  contextID: DecomposerCommon.ClientContext]
  RETURNS [instance: PreParseSchedMgr.Instance ← NIL] =
  BEGIN
  ENABLE UNWIND => NULL;

  IF ipInstance # NIL AND ipInstance.task # NIL THEN
   IF ipInstance.task.clientContext = contextID THEN
    RETURN[instance: ipInstance];
  END;

 FindJobID: PUBLIC ENTRY PROCEDURE [jobID: JobID.ID]
```

Copyright © 1992 Xerox Corporation All Rights Reserved

```
 RETURNS [instance: PreParseSchedMgr.Instance ← NIL] =
 BEGIN
 ENABLE UNWIND => NULL;

 IF ipInstance # NIL AND ipInstance.task # NIL
  AND ipInstance.task.jobID = jobID THEN RETURN[instance: ipInstance];
 END;

FindResMgrID: PUBLIC ENTRY PROCEDURE [
 resMgrID: ResMgrIDs.TransactionID, always: BOOLEAN ← FALSE]
 RETURNS [instance: PreParseSchedMgr.Instance ← NIL] =
 BEGIN
 ENABLE UNWIND => NULL;

 IF always THEN RETURN[instance: ipInstance];

 SELECT resMgrID FROM
  captureIP =>
   IF ipInstance # NIL AND ipInstance.task # NIL THEN
    RETURN[instance: ipInstance];
  ENDCASE;

 END;

GetAborted: PUBLIC ENTRY PROCEDURE [instance: PreParseSchedMgr.Instance]
 RETURNS [aborted: BOOLEAN] =
 BEGIN
 ENABLE UNWIND => NULL;

 aborted ← instance.task.aborted;
 END;

GetEndStatus: PUBLIC ENTRY PROCEDURE [instance: PreParseSchedMgr.Instance]
 RETURNS [status: JobStep.Status] =
 BEGIN
 ENABLE UNWIND => NULL;

 status ← instance.task.endStatus;
 IF instance.task.abortStep THEN status ← aborted;
 END;

GetLogStatus: PUBLIC ENTRY PROCEDURE [instance: PreParseSchedMgr.Instance]
 RETURNS [status: NetworkLog.JobStatus ← faulted] =
 BEGIN
 ENABLE UNWIND => NULL;

 IF instance.task = NIL THEN RETURN;
 status ← instance.task.logStatus;
 END;
```

Copyright © 1992 Xerox Corporation All Rights Reserved

```
GetReboot: PUBLIC ENTRY PROCEDURE [instance: PreParseSchedMgr.Instance]
 RETURNS [reboot: BOOLEAN] =
 BEGIN
 ENABLE UNWIND => NULL;

 reboot ← instance.task.reboot;
 END;

GetReference: PUBLIC ENTRY PROCEDURE [jobID: JobID.ID]
 RETURNS [reference: JobQ.JobReference ← JobQ.nullJobReference] =
 BEGIN
 ENABLE UNWIND => NULL;

 IF ipInstance # NIL AND ipInstance.task # NIL
  AND ipInstance.task.jobID = jobID
  AND ipInstance.task.jobQReference # JobQ.nullJobReference THEN
  BEGIN
  reference ← ipInstance.task.jobQReference;
  ipInstance.task.foreignRef ← TRUE;
  END;
 END;

GetSense: PUBLIC ENTRY PROCEDURE [instance: PreParseSchedMgr.Instance]
 RETURNS [sense: CARDINAL] =
 BEGIN
 ENABLE UNWIND => NULL;

 sense ← instance.task.resourceSense;
 END;

GetState: PUBLIC ENTRY PROCEDURE [instance: PreParseSchedMgr.Instance]
 RETURNS [state: PreParseSchedMgr.State] =
 BEGIN
 ENABLE UNWIND => NULL;

 state ← instance.state.currentState;
 END;

HoldTask: PUBLIC ENTRY PROCEDURE [instance: PreParseSchedMgr.Instance]
 RETURNS [ok: BOOLEAN] =
 BEGIN
 ENABLE UNWIND => NULL;

 IF instance.task = NIL THEN RETURN[FALSE];

 instance.task.holdCount ← instance.task.holdCount + 1;
 instance.task.holdTask ← TRUE;
 ok ← TRUE;
 END;
```

Copyright © 1992 Xerox Corporation All Rights Reserved

```
IncSense: PUBLIC ENTRY PROCEDURE [instance: PreParseSchedMgr.Instance] =
 BEGIN
 ENABLE UNWIND => NULL;

 instance.task.resourceSense ← instance.task.resourceSense + 1;
 END;

NetFaulted: PUBLIC ENTRY PROCEDURE [instance: PreParseSchedMgr.Instance]
 RETURNS [faulted: BOOLEAN] =
 BEGIN
 ENABLE UNWIND => NULL;

 IF instance.task.netFaulted THEN faulted ← TRUE ELSE faulted ← FALSE;
 END;

NewState: PUBLIC ENTRY PROCEDURE [
 instance: PreParseSchedMgr.Instance, newState: PreParseSchedMgr.State] =
 BEGIN
 ENABLE UNWIND => NULL;

 IF newState = running AND instance.task.waitingToAbort THEN
  BEGIN instance.task.waitingToAbort ← FALSE; NOTIFY instance.task.wait; END;

 ChangeState[instance.id, newState];
 END;

ReleaseInstance: PUBLIC ENTRY PROCEDURE [instance: PreParseSchedMgr.Instance] =
 BEGIN
 ENABLE UNWIND => NULL;

 IF instance.task # NIL AND instance.task.holdTask THEN
  BEGIN instance.task.done ← TRUE; RETURN; END;

 FreeUpInstance[instance];
 END;

ReleaseTask: PUBLIC ENTRY PROCEDURE [instance: PreParseSchedMgr.Instance] =
 BEGIN
 ENABLE UNWIND => NULL;

 instance.task.holdCount ← instance.task.holdCount - 1;

 IF instance.task.holdCount # 0 THEN RETURN
 ELSE
  IF instance.task.done THEN FreeUpInstance[instance]
  ELSE instance.task.holdTask ← FALSE;
 END;

ResetSense: PUBLIC ENTRY PROCEDURE [instance: PreParseSchedMgr.Instance] =
 BEGIN
```

Copyright © 1992 Xerox Corporation All Rights Reserved

```
 ENABLE UNWIND => NULL;

 instance.task.resourceSense ← 0;
 instance.task.resouceFault ← FALSE;
 END;

ResourceFault: PUBLIC ENTRY PROCEDURE [instance: PreParseSchedMgr.Instance]
 RETURNS [exists: BOOLEAN] =
 BEGIN
 ENABLE UNWIND => NULL;

 IF instance.task.resouceFault THEN exists ← TRUE ELSE exists ← FALSE;
 END;

SetEndStatus: PUBLIC ENTRY PROCEDURE [
 instance: PreParseSchedMgr.Instance, status: JobStep.Status] =
 BEGIN
 ENABLE UNWIND => NULL;

 IF instance.task # NIL THEN instance.task.endStatus ← status;
 END;

SetLogStatus: PUBLIC ENTRY PROCEDURE [
 instance: PreParseSchedMgr.Instance, status: NetworkLog.JobStatus,
 abortStep: BOOLEAN ← FALSE] =
 BEGIN
 ENABLE UNWIND => NULL;

 IF instance.task = NIL THEN RETURN;
 instance.task.logStatus ← status;
 ChangeState[instance.id, aboutToAbort];
 IF abortStep THEN instance.task.abortStep ← TRUE;
 END;

SetRebootTrue: PUBLIC ENTRY PROCEDURE [instance: PreParseSchedMgr.Instance] =
 BEGIN
 ENABLE UNWIND => NULL;

 instance.task.reboot ← TRUE;
 END;

SetResourceFault: PUBLIC ENTRY PROCEDURE [instance: PreParseSchedMgr.Instance] =
 BEGIN
 ENABLE UNWIND => NULL;

 instance.task.resouceFault ← TRUE;
 END;

SetTask: PUBLIC ENTRY PROCEDURE [
 instance: PreParseSchedMgr.Instance, taskPtr: PreParseSchedTask.Task] =
```

Copyright © 1992 Xerox Corporation All Rights Reserved

```
BEGIN
ENABLE UNWIND => NULL;

IF taskPtr = NIL THEN RETURN;
instance.task ← taskPtr;
END;

Shutdown: PUBLIC ENTRY PROCEDURE [
 id: ResMgrIDs.TransactionID,
 proc: EventHandler.MemoryActionCompleteProcType] =
 BEGIN
 ENABLE UNWIND => NULL;

 instance: PreParseSchedMgr.Instance ← ipInstance;

 PrintTTY.LogEvent[
  sched: preParse, event: shutdown, id: JobID.nullID, transID: instance.id];

 IF instance.state.currentState = starting THEN
  BEGIN instance.task.waitingToAbort ← TRUE; WAIT instance.task.wait; END;

 IF instance.task # NIL THEN
  BEGIN
  instance.task.shutdown ← TRUE;
  instance.task.shutdownProc ← proc;

  IF ~instance.task.ppCompleted AND ~instance.task.aborted THEN
   BEGIN
   instance.task.shutdownFault ← TRUE;
   instance.task.aborted ← TRUE;

   PrintTTY.LogEvent[
    sched: preParse, event: abort, id: instance.task.jobID,
    transID: instance.id];

   [] ← Print3SM.OperateOnSource[
    clientID: instance.task.jobID, operation: abort,
    why: serviceUnavailable];
   Process.Detach[
    FORK PreParser.PutCommand[
    handle: instance.preParserHandle, command: [abort[]]]];
   END;
  END

 ELSE DestroyForShutdown[instance, proc];

 END;

WaitForCommand: PUBLIC ENTRY PROCEDURE [instance: PreParseSchedMgr.Instance]
 RETURNS [
```

Copyright © 1992 Xerox Corporation All Rights Reserved

```
  command: PreParseSchedMgr.Command,
  pageResults: PreParser.PageResultsPtr ← NIL,
  pageFaults: PreParseSchedTask.ObjectFaultHandle ← NIL] =
 BEGIN
 ENABLE UNWIND => NULL;

 IF instance.command = none THEN {
  instance.sWaiting ← TRUE; WAIT instance.commandCV};

 pageResults ← instance.task.pageResults;
 instance.task.pageResults ← NIL;
 pageFaults ← instance.task.pageFaults;
 instance.task.pageFaults ← NIL;
 command ← instance.command;
 instance.command ← none;

 IF instance.cWaiting THEN {
  instance.cWaiting ← FALSE; NOTIFY instance.commandCV};
 END;

ChangeState: PROCEDURE [
 id: ResMgrIDs.TransactionID, newState: PreParseSchedMgr.State] =
 BEGIN
 temp: PreParseSchedMgr.Instance ← NIL;

 SELECT id FROM captureIP => temp ← ipInstance; ENDCASE;
 temp.state.lastState ← temp.state.currentState;
 temp.state.currentState ← newState;

 END;

Create: PROCEDURE [
 temp: PreParseSchedMgr.Instance, transID: ResMgrIDs.TransactionID]
 RETURNS [inst: PreParseSchedMgr.Instance ← NIL] =
 BEGIN

 IF temp = NIL THEN
  BEGIN

  inst ← @ipInstanceRecord;
  inst.preParserHandle ← NIL;
  inst.iipFragMgrHandle ← NIL;
  inst.id ← transID;
  inst.state ← [ready, ready];
  inst.task ← NIL;
  inst.command ← none;
  inst.cWaiting ← FALSE;
  inst.sWaiting ← FALSE;
  inst.heap ← NIL;
  inst.buffer ← NIL;
```

Copyright © 1992 Xerox Corporation All Rights Reserved

```
  Process.InitializeCondition[condition: @inst.commandCV, ticks: 1];
  Process.DisableTimeout[condition: @inst.commandCV];
  numOfInst ← numOfInst + 1;
  numOfAvailInst ← numOfAvailInst + 1;
  END;

 END;

DereferenceTask: PROCEDURE [instance: PreParseSchedMgr.Instance] =
 BEGIN
 ENABLE UNWIND => NULL;

 IF NOT instance.task.foreignRef THEN
  BEGIN
  JobQ.DereferenceJob[job: instance.task.jobQReference];
  instance.task.jobQReference ← JobQ.nullJobReference;
  END;
 END;

DestroyForShutdown: PROCEDURE [
 instance: PreParseSchedMgr.Instance,
 proc: EventHandler.MemoryActionCompleteProcType] =
 BEGIN
 ENABLE UNWIND => NULL;

 IF instance.state.currentState # shutdown THEN
  BEGIN
  PreParser.Destroy[handle: instance.preParserHandle, transID: instance.id];
  instance.preParserHandle ← NIL;
  ResMgr.FreeBufferList[
   id: [trans: captureIP, module: netServe], buffer: instance.buffer];
  instance.buffer ← NIL;
  instance.heap ← NIL;

  ChangeState[instance.id, shutdown];
  END;

 IF proc # NIL THEN Process.Detach[FORK proc[[instance.id, preParse]]];
 END;

FreeUpInstance: PROCEDURE [instance: PreParseSchedMgr.Instance] =
 BEGIN
 ENABLE UNWIND => NULL;

 shutdown: BOOLEAN ← FALSE;
 proc: EventHandler.MemoryActionCompleteProcType ← NIL;

 numOfAvailInst ← numOfAvailInst + 1;
 ChangeState[instance.id, ready];
```

Copyright © 1992 Xerox Corporation All Rights Reserved

```
IF instance.task = NIL THEN RETURN;

DereferenceTask[instance];

EventHandler.ReportStateChange[
 id: [trans: instance.id, module: preParse],
 data: [
 state: notReady,
 jobInfo: [
 jobID: instance.task.jobID, jobChange: delete, priority: medium,
 jobSize: instance.task.copyCount, state: running], resume: none,
 faultList: [NIL, NIL, NIL, NIL]]];

shutdown ← instance.task.shutdown;
proc ← instance.task.shutdownProc;

PreParseSchedMgr.FreeTask[instance.task, instance.heap];
instance.task ← NIL;

IF shutdown THEN DestroyForShutdown[instance, proc]
ELSE
 instance.heap ← ResMgrHeap.Create[
  bl: instance.buffer, heapFull: PreParseHeapFull, maxSize: heapSize,
  ownerChecking: (System.switches['6] = up), incrementSize: 0];

EventHandler.ReportStateChange[
 id: [trans: instance.id, module: preParse],
 data: [
 state: ready, jobInfo: [JobID.nullID, add, medium, 0, running],
 resume: none, faultList: [NIL, NIL, NIL, NIL]]];

END;

PreParseHeapFull: PUBLIC ResMgrHeap.HeapFullProc = {
 ERROR Heap.Error[type: maxSizeExceeded]};

END.
```

Copyright © 1992 Xerox Corporation All Rights Reserved

```
DIRECTORY
 DecomposerCommon USING [
  ImagerDeviceProperties, ObjectIndex, OrientedImagingProps, SegmentArgs,
  SegmentEndData, SheetData],
 DecomposerImageData USING [ImageData],
 DirectoryType USING [nullObjectID, ObjectID],
 Font USING [Encoding, Orientation],
 FixedPointReal USING [Number],
 Image USING [Handle],
 ResMgrStorage USING [Pages],
 RTOSFile USING [FileID, nullID],
 RTOSIGStructures USING [InkwellBitmapArray],
 Transformation USING [Matrix];

InternalIP: DEFINITIONS =

 BEGIN

 maxShortTokenSize: CARDINAL = SIZE[MaskDashedStroke];

 TokenType: TYPE = MACHINE DEPENDENT{
  invalidTokenType(0), beginJob(1), beginIIPFrag(2), beginPage(3),
  beginCorrect(4), beginIfCopy(5), coalesceResults(6), correctSpace(7),
  correctMask(8), endCorrect(9), endIfCopy(10), endIIPFrag(11), endJob(12),
  endPage(13), filler(14), maskRectSampledColor(15), maskDashedStroke(16),
  maskDashedStrokeTrajectory(17), maskFill(18), maskImage(19), maskImageIIP(20),
  maskRectangleInt(21), maskRectangle(22), maskStroke(23), maskBoxInt(24),
  maskBox(25), maskVectorXInt(26), maskVectorYInt(27), maskVectorX(28),
  maskVectorY(29), maskVector(30), maskTrapezoidX(31), maskTrapezoidY(32),
  maskUnderline90(33), maskUnderline(34), nop(35), restore(36), save(37),
  saveAll(38), setColor(39), setGray(40), setClipRectangle(41),
  setClipRectangleInt(42), setClipOutline(43), setAmplifySpace(44),
  setCorrectMeasure90(45), setCorrectMeasure(46), setCorrectShrink(47),
  setCorrectTolerance90(48), setCorrectTolerance(49), setFont(50),
  setNoImage(51), setPriorityImportant(52), setPriorityImportantOverride(53),
  setStrokeEnd(54), setStrokeJoint(55), setStrokeWidth(56),
  setStrokeWidthEllipse(57), setXYRel(58), setXY(59), setXYInt(60), show(61),
  showAndXRel(62), startUnderline(63), tRotate90(64), tScaleInt(65), tScale(66),
  tTranslate(67), getCP(68), saveUnderlineStart(69), restoreUnderlineStart(70),
  saveXY(71), restoreXY(72), setInk(73), beginSegment(74), endSegment(75),
  initialize(76), beginPass(77), endPass(78), (LAST[CARDINAL])};

 lastValidTokenType: TokenType = endPass;

 ValidTokenType: TYPE = TokenType [invalidTokenType..lastValidTokenType];

 Token: TYPE = MACHINE DEPENDENT RECORD [
  var(0): SELECT type(0): ValidTokenType FROM
   invalidTokenType => [],
```

Copyright © 1992 Xerox Corporation All Rights Reserved

```
beginJob => [rec(1): BeginJob],
beginIIPFrag => [rec(1): BeginIIPFrag],
beginPage => [rec(1): BeginPage],
beginCorrect => [],
beginIfCopy => [rec(1): BeginIfCopy],
coalesceResults => [rec(1): CoalesceResults],
correctSpace => [rec(1): CorrectSpace],
correctMask => [],
endCorrect => [],
endIfCopy => [],
endIIPFrag => [],
endJob => [rec(1): EndJob],
endPage => [],
filler => [rec(1): Filler],
maskRectSampledColor => [rec(1): MaskRectangle],
maskDashedStroke => [rec(1): MaskDashedStroke],
maskDashedStrokeTrajectory => [rec(1): MaskDashedStrokeTrajectory],
maskFill => [rec(1): MaskFill],
maskImage => [rec(1): MaskImage],
maskImageIIP => [rec(1): MaskImageIIP],
maskRectangleInt => [rec(1): MaskRectangleInt],
maskRectangle => [rec(1): MaskRectangle],
maskStroke => [rec(1): MaskStroke],
maskBoxInt => [rec(1): MaskBoxInt],
maskBox => [rec(1): MaskBox],
maskVectorXInt => [rec(1): MaskVectorXInt],
maskVectorYInt => [rec(1): MaskVectorYInt],
maskVectorX => [rec(1): MaskVectorX],
maskVectorY => [rec(1): MaskVectorY],
maskVector => [rec(1): MaskVector],
maskTrapezoidX => [rec(1): MaskTrapezoidX],
maskTrapezoidY => [rec(1): MaskTrapezoidY],
maskUnderline90 => [rec(1): MaskUnderline90],
maskUnderline => [rec(1): MaskUnderline],
nop => [],
restore => [rec(1): Restore],
save => [],
saveAll => [],
setColor => [rec(1): SetColor],
setGray => [rec(1): SetGray],
setClipRectangle => [rec(1): SetClipRectangle],
setClipRectangleInt => [rec(1): SetClipRectangleInt],
setClipOutline => [rec(1): SetClipOutline],
setAmplifySpace => [rec(1): SetAmplifySpace],
setCorrectMeasure90 => [rec(1): SetCorrectMeasure90],
setCorrectMeasure => [rec(1): SetCorrectMeasure],
setCorrectShrink => [rec(1): SetCorrectShrink],
setCorrectTolerance90 => [rec(1): SetCorrectTolerance90],
setCorrectTolerance => [rec(1): SetCorrectTolerance],
setFont => [rec(1): SetFont],
```

Copyright © 1992 Xerox Corporation All Rights Reserved

```
setNoImage => [rec(1): SetNoImage],
setPriorityImportant => [rec(1): SetPriorityImportant],
setPriorityImportantOverride => [rec(1): SetPriorityImportantOverride],
setStrokeEnd => [rec(1): SetStrokeEnd],
setStrokeJoint => [rec(1): SetStrokeJoint],
setStrokeWidth => [rec(1): SetStrokeWidth],
setStrokeWidthEllipse => [rec(1): SetStrokeWidthEllipse],
setXYRel => [rec(1): SetXYRel],
setXY => [rec(1): SetXY],
setXYInt => [rec(1): SetXYInt],
show => [rec(1): Show],
showAndXRel => [rec(1): ShowAndXRel],
startUnderline => [],
tRotate90 => [rec(1): TRotate90],
tScaleInt => [rec(1): TScaleInt],
tScale => [rec(1): TScale],
tTranslate => [rec(1): TTranslate],
getCP => [],
saveUnderlineStart => [],
restoreUnderlineStart => [],
saveXY => [],
restoreXY => [],
setInk => [rec(1): SetInk],
beginSegment => [rec(1): BeginSegment],
endSegment => [rec(1): EndSegment],
initialize => [],
beginPass => [rec(1): BeginPass],
endPass => [rec(1): EndPass],
ENDCASE];


BeginCorrect: TYPE;
BeginIfCopy: TYPE = MACHINE DEPENDENT RECORD [
 offsetToNextToken(0): OffSetToNextTokenType,
 startCopy(1): CARDINAL,
 endCopy(2:0..31): LONG CARDINAL];
BeginIIPFrag: TYPE = MACHINE DEPENDENT RECORD [
 sourceParms(0): SourceParameters];

BeginJob: TYPE = MACHINE DEPENDENT RECORD [
 sourceParms(0): SourceParameters,
 imagerDeviceProperties(2): DecomposerCommon.ImagerDeviceProperties];

BeginPage: TYPE = MACHINE DEPENDENT RECORD [
 sheetData(0): DecomposerCommon.SheetData,
 imagingProps(10): DecomposerCommon.OrientedImagingProps,
 special(18): BOOLEAN];

BeginPass: TYPE = MACHINE DEPENDENT RECORD [number(0): CARDINAL];
```

Copyright © 1992 Xerox Corporation All Rights Reserved

```
BeginSegment: TYPE = MACHINE DEPENDENT RECORD [
 args(0): DecomposerCommon.SegmentArgs];

CoalesceResults: TYPE = MACHINE DEPENDENT RECORD [
 offsetToNextToken(0): OffSetToNextTokenType,
 entries(1): ARRAY [0..0) OF CoalesceResultsEntry];

CorrectSpace: TYPE = MACHINE DEPENDENT RECORD [vector(0): PixelPoint];

CorrectMask: TYPE;
EndCorrect: TYPE;
EndIfCopy: TYPE;
EndIIPFrag: TYPE;
EndJob: TYPE = MACHINE DEPENDENT RECORD [hPriority(0): BOOLEAN];

EndPage: TYPE;
EndPass: TYPE = MACHINE DEPENDENT RECORD [number(0): CARDINAL];

EndSegment: TYPE = MACHINE DEPENDENT RECORD [
 endData(0): DecomposerCommon.SegmentEndData];

Filler: TYPE = MACHINE DEPENDENT RECORD [
 offsetToNextToken(0): OffSetToNextTokenType,
 fillWords(1): ARRAY [0..0) OF CARDINAL];

MaskDashedStroke: TYPE = MACHINE DEPENDENT RECORD [
 offsetToNextToken(0): OffSetToNextTokenType,
 mappedLength(1): REAL,
 totalLength(3): REAL,
 offset(5): REAL,
 transformation(7): Transformation.Matrix,
 patternCount(20): CARDINAL,
 pattern(21): ARRAY [0..0) OF REAL];

MaskDashedStrokeTrajectory: TYPE = MACHINE DEPENDENT RECORD [
 trajectory: Trajectory];

MaskFill: TYPE = MACHINE DEPENDENT RECORD [
 offsetToNextToken(0): OffSetToNextTokenType,
 odd(1:15..15): BOOLEAN,
 pad(1:0..14): [0..32768) ← 0,
 outline(2): Outline];

MaskImage: TYPE = MACHINE DEPENDENT RECORD [
 origin(0): PixelPoint, imageData(4): id DecomposerImageData.ImageData];

MaskImageIIP: TYPE = MACHINE DEPENDENT RECORD [
 origin(0): PixelPoint, index(4): DecomposerCommon.ObjectIndex];
MaskRectangleInt: TYPE = MACHINE DEPENDENT RECORD [
```

Copyright © 1992 Xerox Corporation All Rights Reserved

```
 p1(0:0..31): PixelPointInt, p2(2:0..31): PixelPointInt];
MaskRectangle: TYPE = MACHINE DEPENDENT RECORD [
 p1(0:0..63): PixelPoint, p2(4:0..63): PixelPoint];
MaskStroke: TYPE = MACHINE DEPENDENT RECORD [
 offsetToNextToken(0): OffSetToNextTokenType,
 closed(1:15..15): BOOLEAN,
 pad(1:0..14): [0..16378),
 trajectory(2): Trajectory];

MaskBoxInt: TYPE = MACHINE DEPENDENT RECORD [
 p1(0): PixelPointInt, p2(2): PixelPointInt];
MaskBox: TYPE = MACHINE DEPENDENT RECORD [p1(0): PixelPoint, p2(4): PixelPoint];
MaskVectorXInt: TYPE = MACHINE DEPENDENT RECORD [
 p1(0): PixelPointInt, y(2): XInt];
MaskVectorYInt: TYPE = MACHINE DEPENDENT RECORD [
 p1(0): PixelPointInt, y(2): YInt];
MaskVectorX: TYPE = MACHINE DEPENDENT RECORD [
 p1(0:0..63): PixelPoint, x(4:0..31): X];
MaskVectorY: TYPE = MACHINE DEPENDENT RECORD [
 p1(0:0..63): PixelPoint, y(4:0..31): Y];
MaskVector: TYPE = MACHINE DEPENDENT RECORD [
 p1(0:0..63): PixelPoint, y(4:0..63): PixelPoint];
MaskTrapezoidX: TYPE = MACHINE DEPENDENT RECORD [
 p1(0): PixelPoint, x2(4): X, p3(6): PixelPoint, x4(10): X];

MaskTrapezoidY: TYPE = MACHINE DEPENDENT RECORD [
 p1(0): PixelPoint, y2(4): Y, p3(6): PixelPoint, y4(10): Y];

MaskUnderline90: TYPE = MACHINE DEPENDENT RECORD [
 dY(0:0..47): Vector90, dHx(3:0..31): FixedPointReal.Number];

MaskUnderline: TYPE = MACHINE DEPENDENT RECORD [
 dY(0:0..63): Vector, dHx(4:0..63): Vector];
Nop: TYPE;
Restore: TYPE = MACHINE DEPENDENT RECORD [level(0): CARDINAL ← 1];
Save: TYPE;
SaveAll: TYPE;
SetAmplifySpace: TYPE = MACHINE DEPENDENT RECORD [
 factor(0): FixedPointReal.Number];

SetClipOutline: TYPE = MACHINE DEPENDENT RECORD [
 offsetToNextToken(0): OffSetToNextTokenType, outLine(1): Outline];

SetClipRectangle: TYPE = MACHINE DEPENDENT RECORD [
 p1(0): PixelPoint, p2(4): PixelPoint];

SetClipRectangleInt: TYPE = MACHINE DEPENDENT RECORD [
 p1(0): PixelPointInt, p2(2): PixelPointInt];

SetColor: TYPE = MACHINE DEPENDENT RECORD [
```

Copyright © 1992 Xerox Corporation All Rights Reserved

```
 origin(0): InternalIP.PixelPoint,
 index(4): DecomposerCommon.ObjectIndex,
 opaque(5): BOOLEAN];

SetCorrectMeasure: TYPE = MACHINE DEPENDENT RECORD [measure(0): Vector];

SetCorrectMeasure90: TYPE = MACHINE DEPENDENT RECORD [measure(0): Vector90];

SetCorrectShrink: TYPE = MACHINE DEPENDENT RECORD [
 factor(0): FixedPointReal.Number];

SetCorrectTolerance: TYPE = MACHINE DEPENDENT RECORD [tolerance(0): Vector];

SetCorrectTolerance90: TYPE = MACHINE DEPENDENT RECORD [tolerance(0): Vector90];

SetFont: TYPE = MACHINE DEPENDENT RECORD [
 index(0): DecomposerCommon.ObjectIndex];

SetGray: TYPE = MACHINE DEPENDENT RECORD [
 fill(0:0..4): [0..32) ← 0, gray(0:5..15): ColorRange];
SetInk: TYPE = MACHINE DEPENDENT RECORD [
 offsetToNextToken(0): OffSetToNextTokenType,
 opaque(1:0..0): BOOLEAN,
 dataDouble(1:1..1): BOOLEAN,
 imageIndex(1:2..15): InkwellIndex,
 inkwellBitmapArray(2): RTOSIGStructures.InkwellBitmapArray];

SetNoImage: TYPE = MACHINE DEPENDENT RECORD [noImage(0): BOOLEAN];

SetPriorityImportant: TYPE = MACHINE DEPENDENT RECORD [important(0): CARDINAL];
SetPriorityImportantOverride: TYPE = MACHINE DEPENDENT RECORD [
 override(0): CARDINAL];
SetStrokeEnd: TYPE = MACHINE DEPENDENT RECORD [
 ends(0:14..15): StrokeEnd, pad(0:0..13): [0..16378) ← 0];

SetStrokeJoint: TYPE = MACHINE DEPENDENT RECORD [
 joints(0:14..15): StrokeJoint, pad(0:0..13): [0..16378) ← 0];

SetStrokeWidth: TYPE = MACHINE DEPENDENT RECORD [
 length(0): FixedPointReal.Number];

SetStrokeWidthEllipse: TYPE = MACHINE DEPENDENT RECORD [length(0): Ellipse];

SetXY: TYPE = MACHINE DEPENDENT RECORD [xy(0): PixelPoint];

SetXYInt: TYPE = MACHINE DEPENDENT RECORD [xy(0): PixelPointInt];

SetXYRel: TYPE = MACHINE DEPENDENT RECORD [delta(0): Vector];
Show: TYPE = MACHINE DEPENDENT RECORD [
 offsetToNextToken(0): OffSetToNextTokenType,
```

Copyright © 1992 Xerox Corporation All Rights Reserved

```
  stringLength(1): CARDINAL,
  string(2): ARRAY [0..0) OF CHAR];

ShowAndXRel: TYPE = MACHINE DEPENDENT RECORD [
  pad(0:0..7): CHAR, char(0:8..15): CHAR, xyRel(1): Vector];

TRotate90: TYPE = MACHINE DEPENDENT RECORD [
  direction(0:14..15): Rotation90, pad(0:0..13): [0..16378) ← 0];

TScale: TYPE = MACHINE DEPENDENT RECORD [
  xScale(0): FixedPointReal.Number, yScale(2): FixedPointReal.Number];

TScaleInt: TYPE = MACHINE DEPENDENT RECORD [
  xScale(0): INTEGER, yScale(1): INTEGER];

TTranslate: TYPE = MACHINE DEPENDENT RECORD [xy(0): Vector];

UnderlineStart: TYPE;


CoalesceEntry: TYPE = RECORD [iH: Image.Handle, rotate180: BOOLEAN];

CoalesceResultsEntry: TYPE = MACHINE DEPENDENT RECORD [
  var(0): SELECT type(0): ObjectEntryType FROM
    systemFont => [systemFontData(1): FontEntryType],
    coalesceEntry => [coalesceEntryData(1): CoalesceEntry],
    ENDCASE];

ColorIndex: TYPE = CARDINAL;

ColorRange: TYPE = [0..1024];

CPData: TYPE = RECORD [
  currentX: REAL, currentY: REAL, underlineStartX: REAL, underlineStartY: REAL];

Ellipse: TYPE = MACHINE DEPENDENT RECORD [
  short(0:0..47): Vector90, long(3:0..47): Vector90];

FontEntryType: TYPE = RECORD [
  id: DirectoryType.ObjectID ← DirectoryType.nullObjectID,
  subDirectory: DirectoryType.ObjectID ← DirectoryType.nullObjectID,
  orientation: Font.Orientation ← portrait,
  metricsFile: RTOSFile.FileID ← RTOSFile.nullID,
  metricPageLength: ResMgrStorage.Pages ← 0,
  metricPageOffset: ResMgrStorage.Pages ← 0,
  originalCharCode: Font.Encoding ← xcOneOneOne,
  substituting: Font.Encoding ← xcOneOneOne];

InkwellIndex: TYPE = [0..16384);
```

Copyright © 1992 Xerox Corporation All Rights Reserved

```
ObjectEntryType: TYPE = MACHINE DEPENDENT{systemFont(0), coalesceEntry(1)};

OffSetToNextTokenType: TYPE = CARDINAL;

Outline: TYPE = MACHINE DEPENDENT RECORD [
 numberOfTrajectories(0): CARDINAL,
 trajectories(1): ARRAY [0..0) OF Trajectory];

PixelPoint: TYPE = RECORD [x, y: FixedPointReal.Number];
PixelPointInt: TYPE = RECORD [x, y: INTEGER];

RealPixelPoint: TYPE = RECORD [x, y: REAL];

Rotation90: TYPE = MACHINE DEPENDENT{r0(0), r90(1), r180(2), r270(3)};

SourceParameters: TYPE = MACHINE DEPENDENT RECORD [
 password(0): CARDINAL ← 54321B, version(1): CARDINAL ← 1];
StrokeAction: TYPE = MACHINE DEPENDENT RECORD [
 fill(0:0..11): [0..4096) ← TRASH,
 type(0:12..15): StrokeType,
 strokeData(1): SELECT OVERLAID StrokeType FROM
  moveTo => [strokeMoveTo(1): StrokeMoveTo],
  lineToX => [strokeLineToX(1): StrokeLineToX],
  lineToY => [strokeLineToY(1): StrokeLineToY],
  lineToXY => [strokeLineToXY(1): StrokeLineToXY],
  curveTo => [strokeCurveTo(1): StrokeCurveTo],
  conicTo => [strokeConicTo(1): StrokeConicTo],
  ENDCASE];

StrokeConicTo: TYPE = RECORD [p1: RealPixelPoint, p2: RealPixelPoint, s: REAL];

StrokeCurveTo: TYPE = RECORD [
 p1: RealPixelPoint, p2: RealPixelPoint, p3: RealPixelPoint];

StrokeEnd: TYPE = MACHINE DEPENDENT{square(0), butt(1), round(2)};

StrokeJoint: TYPE = MACHINE DEPENDENT{miter(0), bevel(1), round(2)};

StrokeLineToX: TYPE = REAL;

StrokeLineToY: TYPE = REAL;

StrokeLineToXY: TYPE = RealPixelPoint;

StrokeMoveTo: TYPE = RealPixelPoint;

StrokeType: TYPE = MACHINE DEPENDENT{
 moveTo(0), lineToX(1), lineToY(2), lineToXY(3), curveTo(4), conicTo(5)};

Trajectory: TYPE = MACHINE DEPENDENT RECORD [
```

Copyright © 1992 Xerox Corporation All Rights Reserved

```
 numberOfStrokes(0): CARDINAL, strokes(1): ARRAY [0..0) OF StrokeAction];

Vector: TYPE = PixelPoint;

Vector90: TYPE = MACHINE DEPENDENT RECORD [
 direction(0:14..15): VectorDirection,
 pad(0:0..13): [0..16384),
 distance(1): FixedPointReal.Number];

Vector90Int: TYPE = MACHINE DEPENDENT RECORD [
 direction(0:14..15): VectorDirection,
 pad(0:0..13): [0..16384),
 distance(1): INTEGER];

VectorDirection: TYPE = MACHINE DEPENDENT{plusX(0), plusY(1)};

X, Y: TYPE = FixedPointReal.Number;

XInt, YInt: TYPE = INTEGER;

END.
```

Copyright © 1992 Xerox Corporation All Rights Reserved

```
IPFunction: DEFINITIONS =

 BEGIN

 Func: TYPE = [0..256);

 ParserType: TYPE = MACHINE DEPENDENT{
  PostVersion(0), ForceFPUOff(1), ForceFPUOn(2), Config(3), PreVersion(4),

  AllocateNode4(5), AllocateNode8(6), AllocateNode16(7), AllocateNode32(8),
  AllocateNode64(9), AllocateNode128(10), AllocateNodeFFL(11),
  AllocateNodeNFL(12), FreeNode4(13), FreeNode8(14), FreeNode16(15),
  FreeNode32(16), FreeNode64(17), FreeNode128(18), FreeNodeFFL(19),
  FreeNodeNFL(20), FPRToReal(21), RealToFPR(22), IP16BitMult(23), Mid1(24),
  Mid2(25), Mid3(26),

  SetBand(27), PutABandEntry(28), TransformIIPPoint(29), TransformIIPVector(30),
  TransformIIPRectangle(31), TransformIIPPointReal(32), PostNextAction(33),
  GenerateNormalImage(34), GenerateFlippedImage(35), GenerateReversedImage(36),
  GenerateReversedAndFlippedImage(37), GenerateRectangle(38),
  PutIncreasingXEntries(39), PutDecreasingXEntries(40), FindVertex(41),

  MaskRectangle(42), PostShow(43), SetXYInt(44), PostSetXY(45),
  PostSetXYRel(46), PostSetFont(47), SetAmplifySpace(48), PostParserSpare(49),
  Loop(50), invalidToken(51), continueGetToken(52), beginPage(53), endPage(54),
  beginJob(55), endJob(56), unexpectedToken(57), unexpectedEOF(58),
  unimplemented(59), maskImage(60), maskImageIIP(61), maskRectangleInt(62),
  maskRectSampledColor(63), setPriorityImportant(64),
  setPriorityImportantOverride(65), setGray(66), setColor(67),
  cResultsFound(68), fontsLoaded(69), cResults(70), setClipRectInt(71),
  setClipOutline(72), beginIIPFrag(73), endIIPFrag(74), postMaskTrapezoidX(75),
  postMaskTrapezoidY(76), skipVariableToken(77), maskVectorXInt(78),
  maskVectorYInt(79), maskVectorX(80), maskVectorY(81), postMaskVector(82),
  postMaskDashedStroke(83), postMaskStroke(84), setStrokeWidth(85),
  setStrokeWidthEllipse(86), setStrokeEnd(87), setStrokeJoint(88),
  setCorrectMeasure90(89), postSetCorrectTolerance(90), postSetNoImage(91),
  beginCorrect(92), endCorrect(93), postGetCP(94), saveXY(95), restoreXY(96),
  maskUnderline90(97), postCorrectSpace(98), postSetCorrectShrink(99),
  postSetCorrectPass(100), postShowAndXRel(101), postShowAndFixedXRel(102),
  tScaleInt(103), tScale(104), tTranslate(105), tRotate90(106),
  postMaskFill(107), saveUnderlineStart(108), restoreUnderlineStart(109),
  setInk(110), beginSegment(111), endSegment(112), initialize(113),
  beginPass(114), endPass(115),

  startUnderline(116), correctMask(117), extendZone(118), fatalError(119),
  nop(120), needIIPBlock(121), stop(122), spare1(123), spare2(124), spare3(125),

  changeState(126), begin(127), end(128), contentInstructions(129),
  correct(130), makeSimpleCO(131), doSaveSimpleBody(132), move(133), getCP(134),
```

Copyright © 1992 Xerox Corporation All Rights Reserved

```
trans(135), continueSequence(136), continueNextAction(137), needIPBlock(138),
needSIF(139), outputOperatorNotAllowed(140), addFontToPage(141),
checkIPHeader(142), exitLoop(143), unrecognizedOperator(144), FPUProblem(145),
uCodeToMesaTransition(146), lineToX(147), lineToY(148), space(149), get(150),
iGet(151), lineTo(152), maskStroke(153), maskDashedStroke(154), moveTo(155),
findOperator(156), showAndXRel(157), showAndFixedXRel(158), findFont(159),
modifyFont(160), setCorrectMeasure(161), setCorrectTolerance(162),
correctSpace(163), makeT(164), concat(165), concatT(166), dup(167), copy(168),
roll(169), exch(170), unmark(171), unmark0(172), abs(173), add(174), and(175),
ceiling(176), div(177), eq(178), floor(179), ge(180), gt(181), mod(182),
mul(183), neg(184), not(185), or(186), sub(187), trunc(188), rem(189),
round(190), type(191), do(192), doSave(193), doSaveAll(194), if(195),
ifCopy(196), ifElse(197), shape(198), getProp(199), getP(200), mergeProp(201),
curveTo(202), arcTo(203), conicTo(204), maskFill(205), maskTrapezoidX(206),
maskTrapezoidY(207), maskUnderline(208), makeOutline(209),
makeOutlineOdd(210), clipOutline(211), clipRectangle(212), findColorOp(213),
findColorModelOp(214), findColor(215), findDecompressor(216),
makeSampledBlack(217), setSampledBlack(218), maskStrokeClosed(219),
maskVector(220), makePixelArray(221), extractPixel(222), maskPixel(223),
spare4(224), spare5(225), spare6(226), spare7(227), spare9(228),
errorOperator(229), Mark(230), PreMaskRectangle(231), PreShow(232), Pop(233),
Rotate(234), Scale(235), Scale2(236), Translate(237), FGet(238), FSet(239),
ISet(240), PreSetFont(241), MakeVec(242), MakeVecLU(243), MakeGray(244),
SetGray(245), PreSetXRel(246), PreSetXY(247), PreSetXYRel(248),
PreSetYRel(249), LeftBrace(250), PreSequence(251), PreSkipSequence(252),
RightBrace(253), Count(254), PrePopOperands(255), PrePushStack(256),
PrePutToken(257), PushShortNumber(258), PreLoop(259),

PreNextAction(260), PopFrame(261), PopStack(262), PushFrame(263),
PreCheckCorrect(264), PreCheckFont(265), PreCheckGraphic(266),
PreCheckPosition(267), PreCheckTextVars(268), PreTransformIPPoint(269),
PreTransformIPVector(270), CopyFrameEntries(271), CopyStackEntry(272),
FreeNodeList(273), FreeStackEntry(274), FreeStackEntryOnly(275),
GuaranteeStackSpace(276), NoteNewT(277), FPUFailure(278),
PreParserSpare(279)};

LastPostParserUCodeValue: CARDINAL = ORD[ParserType.Loop];
LastPreParserMesaValue: CARDINAL = ORD[ParserType.errorOperator];
PreParserUCodeOffset: CARDINAL =
 LastPreParserMesaValue - LastPostParserUCodeValue;

PostVersion: Func = ORD[ParserType.PostVersion];
ForceFPUOff: Func = ORD[ParserType.ForceFPUOff];
ForceFPUOn: Func = ORD[ParserType.ForceFPUOn];
Config: Func = ORD[ParserType.Config];
PreVersion: Func = ORD[ParserType.PreVersion];

AllocateNode4: Func = ORD[ParserType.AllocateNode4];
```

Copyright © 1992 Xerox Corporation All Rights Reserved

```
AllocateNode8: Func = ORD[ParserType.AllocateNode8];
AllocateNode16: Func = ORD[ParserType.AllocateNode16];
AllocateNode32: Func = ORD[ParserType.AllocateNode32];
AllocateNode64: Func = ORD[ParserType.AllocateNode64];
AllocateNode128: Func = ORD[ParserType.AllocateNode128];
AllocateNodeFFL: Func = ORD[ParserType.AllocateNodeFFL];
AllocateNodeNFL: Func = ORD[ParserType.AllocateNodeNFL];
FreeNode4: Func = ORD[ParserType.FreeNode4];
FreeNode8: Func = ORD[ParserType.FreeNode8];
FreeNode16: Func = ORD[ParserType.FreeNode16];
FreeNode32: Func = ORD[ParserType.FreeNode32];
FreeNode64: Func = ORD[ParserType.FreeNode64];
FreeNode128: Func = ORD[ParserType.FreeNode128];
FreeNodeFFL: Func = ORD[ParserType.FreeNodeFFL];
FreeNodeNFL: Func = ORD[ParserType.FreeNodeNFL];
FPRToReal: Func = ORD[ParserType.FPRToReal];
RealToFPR: Func = ORD[ParserType.RealToFPR];
IP16BitMult: Func = ORD[ParserType.IP16BitMult];
Mid1: Func = ORD[ParserType.Mid1];
Mid2: Func = ORD[ParserType.Mid2];
Mid3: Func = ORD[ParserType.Mid3];

SetBand: Func = ORD[ParserType.SetBand];
PutABandEntry: Func = ORD[ParserType.PutABandEntry];
TransformIIPPoint: Func = ORD[ParserType.TransformIIPPoint];
TransformIIPVector: Func = ORD[ParserType.TransformIIPVector];
TransformIIPPointReal: Func = ORD[ParserType.TransformIIPPointReal];
TransformIIPRectangle: Func = ORD[ParserType.TransformIIPRectangle];
PostNextAction: Func = ORD[ParserType.PostNextAction];
GenerateNormalImage: Func = ORD[ParserType.GenerateNormalImage];
GenerateFlippedImage: Func = ORD[ParserType.GenerateFlippedImage];
GenerateReversedImage: Func = ORD[ParserType.GenerateReversedImage];
GenerateReversedAndFlippedImage: Func = ORD[
 ParserType.GenerateReversedAndFlippedImage];
GenerateRectangle: Func = ORD[ParserType.GenerateRectangle];
PutIncreasingXEntries: Func = ORD[ParserType.PutIncreasingXEntries];
PutDecreasingXEntries: Func = ORD[ParserType.PutDecreasingXEntries];
FindVertex: Func = ORD[ParserType.FindVertex];

MaskRectangle: Func = ORD[ParserType.MaskRectangle];
PostShow: Func = ORD[ParserType.PostShow];
SetXYInt: Func = ORD[ParserType.SetXYInt];
PostSetXY: Func = ORD[ParserType.PostSetXY];
PostSetXYRel: Func = ORD[ParserType.PostSetXYRel];
PostSetFont: Func = ORD[ParserType.PostSetFont];
SetAmplifySpace: Func = ORD[ParserType.SetAmplifySpace];
Loop: Func = ORD[ParserType.Loop];

Mark: Func = ORD[ParserType.Mark] - PreParserUCodeOffset;
PreMaskRectangle: Func =
```

Copyright © 1992 Xerox Corporation All Rights Reserved

```
 ORD[ParserType.PreMaskRectangle] - PreParserUCodeOffset;
PreShow: Func = ORD[ParserType.PreShow] - PreParserUCodeOffset;
Pop: Func = ORD[ParserType.Pop] - PreParserUCodeOffset;
Rotate: Func = ORD[ParserType.Rotate] - PreParserUCodeOffset;
Scale: Func = ORD[ParserType.Scale] - PreParserUCodeOffset;
Scale2: Func = ORD[ParserType.Scale2] - PreParserUCodeOffset;
Translate: Func = ORD[ParserType.Translate] - PreParserUCodeOffset;
FGet: Func = ORD[ParserType.FGet] - PreParserUCodeOffset;
FSet: Func = ORD[ParserType.FSet] - PreParserUCodeOffset;
ISet: Func = ORD[ParserType.ISet] - PreParserUCodeOffset;
PreSetFont: Func = ORD[ParserType.PreSetFont] - PreParserUCodeOffset;
MakeVec: Func = ORD[ParserType.MakeVec] - PreParserUCodeOffset;
MakeVecLU: Func = ORD[ParserType.MakeVecLU] - PreParserUCodeOffset;
MakeGray: Func = ORD[ParserType.MakeGray] - PreParserUCodeOffset;
SetGray: Func = ORD[ParserType.SetGray] - PreParserUCodeOffset;
PreSetXRel: Func = ORD[ParserType.PreSetXRel] - PreParserUCodeOffset;
PreSetXY: Func = ORD[ParserType.PreSetXY] - PreParserUCodeOffset;
PreSetXYRel: Func = ORD[ParserType.PreSetXYRel] - PreParserUCodeOffset;
PreSetYRel: Func = ORD[ParserType.PreSetYRel] - PreParserUCodeOffset;
LeftBrace: Func = ORD[ParserType.LeftBrace] - PreParserUCodeOffset;
PreSequence: Func = ORD[ParserType.PreSequence] - PreParserUCodeOffset;
PreSkipSequence: Func = ORD[ParserType.PreSkipSequence] - PreParserUCodeOffset;
RightBrace: Func = ORD[ParserType.RightBrace] - PreParserUCodeOffset;
Count: Func = ORD[ParserType.Count] - PreParserUCodeOffset;
PrePopOperands: Func = ORD[ParserType.PrePopOperands] - PreParserUCodeOffset;
PrePushStack: Func = ORD[ParserType.PrePushStack] - PreParserUCodeOffset;
PrePutToken: Func = ORD[ParserType.PrePutToken] - PreParserUCodeOffset;
PushShortNumber: Func = ORD[ParserType.PushShortNumber] - PreParserUCodeOffset;
PreLoop: Func = ORD[ParserType.PreLoop] - PreParserUCodeOffset;

PreNextAction: Func = ORD[ParserType.PreNextAction] - PreParserUCodeOffset;
PopFrame: Func = ORD[ParserType.PopFrame] - PreParserUCodeOffset;
PopStack: Func = ORD[ParserType.PopStack] - PreParserUCodeOffset;
PushFrame: Func = ORD[ParserType.PushFrame] - PreParserUCodeOffset;
PreCheckCorrect: Func = ORD[ParserType.PreCheckCorrect] - PreParserUCodeOffset;
PreCheckFont: Func = ORD[ParserType.PreCheckFont] - PreParserUCodeOffset;
PreCheckGraphic: Func = ORD[ParserType.PreCheckGraphic] - PreParserUCodeOffset;
PreCheckPosition: Func =
 ORD[ParserType.PreCheckPosition] - PreParserUCodeOffset;
PreCheckTextVars: Func =
 ORD[ParserType.PreCheckTextVars] - PreParserUCodeOffset;
PreTransformIPPoint: Func =
 ORD[ParserType.PreTransformIPPoint] - PreParserUCodeOffset;
PreTransformIPVector: Func =
 ORD[ParserType.PreTransformIPVector] - PreParserUCodeOffset;
CopyFrameEntries: Func =
 ORD[ParserType.CopyFrameEntries] - PreParserUCodeOffset;
CopyStackEntry: Func = ORD[ParserType.CopyStackEntry] - PreParserUCodeOffset;
FreeNodeList: Func = ORD[ParserType.FreeNodeList] - PreParserUCodeOffset;
FreeStackEntry: Func = ORD[ParserType.FreeStackEntry] - PreParserUCodeOffset;
```

Copyright © 1992 Xerox Corporation All Rights Reserved

```
FreeStackEntryOnly: Func =
 ORD[ParserType.FreeStackEntryOnly] - PreParserUCodeOffset;
GuaranteeStackSpace: Func =
 ORD[ParserType.GuaranteeStackSpace] - PreParserUCodeOffset;
NoteNewT: Func = ORD[ParserType.NoteNewT] - PreParserUCodeOffset;
FPUFailure: Func = ORD[ParserType.FPUFailure] - PreParserUCodeOffset;

END.
```

Copyright © 1992 Xerox Corporation All Rights Reserved

```
DIRECTORY

 BlockStream USING [Block, nullBlock],
 DecomposerCommon USING [ClientContext],
 DirectoryID USING [nullObjectID],
 Environment USING [bytesPerWord, wordsPerPage],
 ESCAlpha USING [aFSC, aFSQRT],
 FixedPointReal USING [Number],
 GenericESS USING [DataLockTag],
 JobID USING [ID],
 InternalIP USING [RealPixelPoint, Token],
 IPFunction USING [ParserType],
 Mopcodes USING [zESC],
 ResMgrStorage USING [Pages];

ParserCommon: DEFINITIONS =

 BEGIN


 ActionTraceSize: CARDINAL = 32;

 Bezier: TYPE = ARRAY [0..4) OF Vector;

 ContextPtr: TYPE = LONG POINTER TO Context;

 Context: TYPE = MACHINE DEPENDENT RECORD [
  cacheRegister(0): ARRAY [0..16) OF CARDINAL,
  currentTraceIndex(16): CARDINAL ← 0,
  actionTraceTable(17): ARRAY [0..ActionTraceSize) OF IPFunction.ParserType ←
   ALL[nop],
  nodePtr(49): LONG POINTER ← NIL,
  nodeSizeInWords(51): CARDINAL ← 0,
  jobID(52): JobID.ID ← DirectoryID.nullObjectID,
  currentPosition(55): BlockStream.Block ← BlockStream.nullBlock,
  filler(61): ARRAY [0..3) OF CARDINAL ← ALL[0],
  pagePtr(64): LONG POINTER ← NIL,
  memoryHandle(66): LONG POINTER ← NIL,
  currentPageHandle(68): LONG POINTER ← NIL,
  handle(70): LONG POINTER ← NIL,
  clientContext(72): DecomposerCommon.ClientContext,
  currentBlockPtr(74): LONG POINTER ← NIL,
  contextType(76): ContextType ← undefined,
  autoExtend(77): BOOLEAN ← FALSE,
  fixed(78): FixedPointReal.Number ← [li[0]],
  real1(80): REAL ← 0.0,
  real2(82): REAL ← 0.0,
  nextIPWordPtr(84): LONG POINTER TO InternalIP.Token,
  mid(86): MidRecord,
```

Copyright © 1992 Xerox Corporation All Rights Reserved

```
 data(126): Data ← [fatalError[LAST[CARDINAL]]],
 action(127): IPFunction.ParserType ← nop,
 savedAction(128): IPFunction.ParserType,
 zoneRecPtr(129): ZoneRecPtr];

CurveProc: TYPE = PROCEDURE [p1, p2, p3: Vector];

Data: TYPE = MACHINE DEPENDENT RECORD [
 var(0): SELECT OVERLAID * FROM
  fatalError => [code(0): CARDINAL],
  execAction => [execAction(0): StackActionType],
  newState => [newState(0): State],
  trap => [function(0): CARDINAL],
  ENDCASE];

State: TYPE = MACHINE DEPENDENT{
 executing(0), executingInCORRECT, executingNoOutput, skippingBody, needLBrace,
 node, pastContentInstrs, recordingCO, needBegin, startOfMaster};

ContextType: TYPE = MACHINE DEPENDENT{
 undefined(0), postParserManagerContext(1), postParserMainLoopContext(2),
 preParserManagerContext(3), preParserMainLoopContext(4)};

RealPlusOrMinus: TYPE = RECORD [value: REAL, error: REAL];

StackActionType: TYPE = IPFunction .ParserType[lineToX..PreSetYRel];

MidRecord: TYPE = MACHINE DEPENDENT RECORD [
 p0(0): Vector ← [0.0, 0.0],
 p1(4): Vector ← [0.0, 0.0],
 p2(8): Vector ← [0.0, 0.0],
 p3(12): Vector ← [0.0, 0.0],
 p01(16): Vector ← [0.0, 0.0],
 p12(20): Vector ← [0.0, 0.0],
 p012(24): Vector ← [0.0, 0.0],
 p23(28): Vector ← [0.0, 0.0],
 p123(32): Vector ← [0.0, 0.0],
 p0123(36): Vector ← [0.0, 0.0]];

Node: TYPE = MACHINE DEPENDENT RECORD [
 nodeLength(0): CARDINAL, next(1): NodePtr, data(3): ARRAY [0..0) OF CARDINAL];

NodePtr: TYPE = LONG POINTER TO Node;

Vector: TYPE = InternalIP.RealPixelPoint;

ZonePtr: TYPE = LONG POINTER TO Zone;

Zone: TYPE = MACHINE DEPENDENT RECORD [
 length(0): CARDINAL,
```

Copyright © 1992 Xerox Corporation All Rights Reserved

```
 UBU(1): CARDINAL,
 nextZone(2): ZonePtr ← NIL,
 data(4): ARRAY [0..0) OF CARDINAL];

ZoneRecPtr: TYPE = LONG POINTER TO ZoneRecord;

ZoneRecord: TYPE = MACHINE DEPENDENT RECORD [
 zonePtr(0): ZonePtr ← NIL,
 nodes4(2): NodePtr ← NIL,
 nodes8(4): NodePtr ← NIL,
 nodes16(6): NodePtr ← NIL,
 nodes32(8): NodePtr ← NIL,
 nodes64(10): NodePtr ← NIL,
 nodes128(12): NodePtr ← NIL,
 nodesFFL(14): NodePtr ← NIL,
 nodesNFL(16): NodePtr ← NIL,
 zoneLock(18): GenericESS.DataLockTag];


PagesFromWords: PROCEDURE [n: CARDINAL] RETURNS [pages: ResMgrStorage.Pages]
=
 INLINE {
 RETURN[(n + Environment.wordsPerPage - 1) / Environment.wordsPerPage]};

WordsFromBytes: PROCEDURE [bytes: CARDINAL] RETURNS [words: CARDINAL] = INLINE
{
 RETURN[(bytes + (Environment.bytesPerWord - 1)) / Environment.bytesPerWord]};

FSC: PROCEDURE [a: REAL, scalePowerOf2: INTEGER] RETURNS [s: REAL] = MACHINE
 CODE {Mopcodes.zESC, ESCAlpha.aFSC; };

SqRt: PROCEDURE [REAL] RETURNS [REAL] = MACHINE CODE {
 Mopcodes.zESC, ESCAlpha.aFSQRT; };

ConicToCurves: PROCEDURE [p0, p1, p2: Vector, r: REAL, curveProc: CurveProc];

CurveLength: PROCEDURE [p: Bezier] RETURNS [RealPlusOrMinus];


Add: PROCEDURE [a, b: Vector] RETURNS [Vector] = INLINE {
 RETURN[[a.x + b.x, a.y + b.y]]};

Cross: PROCEDURE [a, b: Vector] RETURNS [REAL] = INLINE {
 RETURN[a.x * b.y - a.y * b.x]};

Dot: PROC [a, b: Vector] RETURNS [REAL] = INLINE {
 RETURN[a.x * b.x + a.y * b.y]};

Half: PROC [a: REAL] RETURNS [REAL] = INLINE {
 RETURN[FSC[a: a, scalePowerOf2: -1]]};
```

Copyright © 1992 Xerox Corporation All Rights Reserved

```
Length: PROCEDURE [a: Vector] RETURNS [REAL] = INLINE {
 RETURN[SqRt[a.x * a.x + a.y * a.y]]};

Mid: PROC [a, b: Vector] RETURNS [Vector] = INLINE {
 RETURN[
  [
   x: FSC[a: (a.x + b.x), scalePowerOf2: -1],
   y: FSC[a: (a.y + b.y), scalePowerOf2: -1]]]};

Mid1: PROC [h: ContextPtr];

Mid2: PROC [h: ContextPtr];

Mid3: PROC [h: ContextPtr];

Mul: PROCEDURE [a: Vector, s: REAL] RETURNS [Vector] = INLINE {
 RETURN[[a.x * s, a.y * s]]};

Sub: PROCEDURE [a, b: Vector] RETURNS [Vector] = INLINE {
 RETURN[[a.x - b.x, a.y - b.y]]};

Square: PROC [a: Vector] RETURNS [REAL] = INLINE {
 RETURN[a.x * a.x + a.y * a.y]};

END.
```

Copyright © 1992 Xerox Corporation All Rights Reserved

```
DIRECTORY
 Environment USING [];
ParserTraps: DEFINITIONS =
 BEGIN
 IPTrapChoice: TYPE = MACHINE DEPENDENT{
  unknownIPPrincOpFunction(0), invalidNode(1), last(255)};
 TrapRecord: TYPE = MACHINE DEPENDENT RECORD [
  var(0): SELECT type(0): IPTrapChoice FROM
   unknownIPPrincOpFunction => [
    ipFunction(1): CARDINAL],
   invalidNode, last => [],
   ENDCASE];

 IPTrapType: TYPE = SIGNAL [trap: TrapRecord];
 IPTrap: IPTrapType;

 Initialize: PROCEDURE [];
 END.
```

Copyright © 1992 Xerox Corporation All Rights Reserved

```
DIRECTORY
 ParserCommon USING [ContextPtr],
 ResMgrStorage USING [BufferList];

ParserZone: DEFINITIONS =
 BEGIN

 AddZoneSegment: PROCEDURE [
  h: ParserCommon.ContextPtr, zoneSegment: ResMgrStorage.BufferList];


 AllocateNode4: PROCEDURE [h: ParserCommon.ContextPtr]
  RETURNS [extendZone: BOOLEAN];
 AllocateNode8: PROCEDURE [h: ParserCommon.ContextPtr]
  RETURNS [extendZone: BOOLEAN];
 AllocateNode16: PROCEDURE [h: ParserCommon.ContextPtr]
  RETURNS [extendZone: BOOLEAN];
 AllocateNode32: PROCEDURE [h: ParserCommon.ContextPtr]
  RETURNS [extendZone: BOOLEAN];
 AllocateNode64: PROCEDURE [h: ParserCommon.ContextPtr]
  RETURNS [extendZone: BOOLEAN];
 AllocateNode128: PROCEDURE [h: ParserCommon.ContextPtr]
  RETURNS [extendZone: BOOLEAN];
 AllocateNodeFFL: PROCEDURE [h: ParserCommon.ContextPtr]
  RETURNS [extendZone: BOOLEAN];
 AllocateNodeNFL: PROCEDURE [h: ParserCommon.ContextPtr]
  RETURNS [extendZone: BOOLEAN];

 FreeNode4: PROCEDURE [h: ParserCommon.ContextPtr] RETURNS [];
 FreeNode8: PROCEDURE [h: ParserCommon.ContextPtr] RETURNS [];
 FreeNode16: PROCEDURE [h: ParserCommon.ContextPtr] RETURNS [];
 FreeNode32: PROCEDURE [h: ParserCommon.ContextPtr] RETURNS [];
 FreeNode64: PROCEDURE [h: ParserCommon.ContextPtr] RETURNS [];
 FreeNode128: PROCEDURE [h: ParserCommon.ContextPtr] RETURNS [];
 FreeNodeFFL: PROCEDURE [h: ParserCommon.ContextPtr] RETURNS [];
 FreeNodeNFL: PROCEDURE [h: ParserCommon.ContextPtr] RETURNS [];


 GetMinBlockSize: PROCEDURE [h: ParserCommon.ContextPtr]
  RETURNS [minimumBlockSizeInPages: CARDINAL];

 GuaranteeNode64: PROCEDURE [h: ParserCommon.ContextPtr]
  RETURNS [extendZone: BOOLEAN];

 Initialize: PROCEDURE [frameSize: CARDINAL];

 InitializeZone: PROCEDURE [h: ParserCommon.ContextPtr];

 END.
```

Copyright © 1992 Xerox Corporation All Rights Reserved

```
DIRECTORY
 BlockStream USING [StreamHandle],
 CoalescerTable USING [BitMapEntryLinkHandle, UnknownFontEntryLinkHandle],
 DecomposerCommon USING [
  ClientContext, CopyRange, ImagerDeviceProperties, OrientedImagingPropsArray],
 DirectoryID USING [ObjectID],
 Image USING [Box],
 Process USING [Priority],
 PublicPrinting USING [
  Finishing, InternalMedia, MediumDimensions, Plex, RunOfCardinalSeq,
  RunofRunOfCardinalSeq],
 ResMgrIDs USING [TransactionID],
 RTOSFile USING [FileID, nullID];

PreParser: DEFINITIONS =

 BEGIN

 Decomposer: TYPE = {lighthouse, masterBlaster, spare};

 JobProceedDataPtr: TYPE = LONG POINTER TO JobProceedData;

 JobProceedData: TYPE = RECORD [
  clientContext: DecomposerCommon.ClientContext,
  fragMgrHandle: DecomposerCommon.ClientContext,
  statusProc: PutStatusProc,
  options: OptionsPtr,
  defaults: OptionsPtr,
  fileID: RTOSFile.FileID ← RTOSFile.nullID,
  zone: UNCOUNTED ZONE];

 PrintInstructionsResultsPtr: TYPE = LONG POINTER TO PrintInstructionsResults;

 PrintInstructionsResults: TYPE = RECORD [
  instructions: OptionsPtr, resultsFlags: ResultsFlags];
 JobMediaDataPtr: TYPE = LONG POINTER TO JobMediaData;

 JobMediaData: TYPE = RECORD [
  orientedImagingProps: DecomposerCommon.OrientedImagingPropsArray,
  deviceProps: DecomposerCommon.ImagerDeviceProperties];

 JobResultsPtr: TYPE = LONG POINTER TO JobResults;

 JobResults: TYPE = RECORD [
  errorStatus: ResultsErrorStatus,
  pageVariations: ResultsFlags,
  mediaUses: PACKED SEQUENCE count: CARDINAL OF BOOLEAN];

 ResultsErrorStatus: TYPE = {ok, warnings, errors, fatalError, pageZero};
```

Copyright © 1992 Xerox Corporation All Rights Reserved

```
PageResultsPtr: TYPE = LONG POINTER TO PageResults;

PageResults: TYPE = RECORD [
 errorStatus: ResultsErrorStatus,
 boxCoords: Image.Box,
 iipFragID: DirectoryID.ObjectID,
 mediaIndex: CARDINAL,
 copyRange: DecomposerCommon.CopyRange,
 plex: PublicPrinting.Plex,
 sheet: LONG CARDINAL,
 side: PublicPrinting.Plex,
 bitMapLinks: CoalescerTable.BitMapEntryLinkHandle,
 fontLinks: CoalescerTable.UnknownFontEntryLinkHandle];

OptionsPtr: TYPE = LONG POINTER TO OptionsHeader;

OptionsHeader: TYPE = RECORD [
 first: OptionPtr, version: CARDINAL, offsets: OptionsLookupTable];
OptionsLookupTable: TYPE = ARRAY OptionType OF OptionPtr;

OptionType: TYPE = {
 copySelect, docCreationDate, docCreator, docName, docComment, docStartMessage,
 docEndMessage, finishing, media, pageSelect, plex, xImageShift, yImageShift,
 jobSecurity, jobAttributes, bookletSignature, stacking, binderyFinishing,
 binderyFinishingSelect, covers, other};

OptionTypeValid: TYPE = OptionType [copySelect..other);

OptionPtr: TYPE = LONG POINTER TO Option;
Option: TYPE = RECORD [
 next: OptionPtr,
 optionType: OptionType,
 modified: BOOLEAN,
 type: SELECT OVERLAID OptionType FROM
  copySelect = > [copySelect: PublicPrinting.RunOfCardinalSeq],
  docComment = > [docComment: LONG STRING],
  docCreationDate = > [createDate: LONG STRING],
  docCreator = > [docCreator: LONG STRING],
  docName = > [docName: LONG STRING],
  docStartMessage = > [docStartMessage: LONG STRING],
  docEndMessage = > [docEndMessage: LONG STRING],
  covers = > [covers: Covers],
  finishing = > [
   finishing: PublicPrinting.Finishing, firstPageMediaIndex: CARDINAL],
  media = > [media: PublicPrinting.InternalMedia],
  pageSelect = > [pageSelect: PublicPrinting.RunofRunOfCardinalSeq],
  plex = > [plex: PublicPrinting.Plex],
  xImageShift = > [xImageShift: REAL],
  yImageShift = > [yImageShift: REAL],
```

Copyright © 1992 Xerox Corporation All Rights Reserved

```
  jobSecurity => [access: AccessGroups],
  jobAttributes => [jobAttributes: JobAttributes],
  bookletSignature => [signature: BookletSignatureOption],
  stacking => [
   collated: BOOL, slipSheet: BOOL, offset: BOOL, slipMedia: CARDINAL],
  binderyFinishing => [binderySequence: BinderyFinishingSequence],
  binderyFinishingSelect => [binderySelect: BindFinishSelectSeq],
  other => [otherOption: OtherOption],
  ENDCASE];

AbortReason: TYPE = MACHINE DEPENDENT{warning(0), error(1), failure(2), null};

Access: TYPE = RECORD [group: AccessGroup ← all, name: LONG STRING ← NIL];
AccessGroup: TYPE = MACHINE DEPENDENT{all(0), owner, none(2), named};
AccessGroups: TYPE = LONG POINTER TO AccessGroupsRep;
AccessGroupsRep: TYPE = RECORD [acquire, modify, owner: Access ← []];

BinderyFinishingOption: TYPE = LONG POINTER TO BinderyFinishingOptionRep;
BinderyFinishingOptionRep: TYPE = RECORD [
 referenceXSize: REAL ← 0,
 referenceYSize: REAL ← 0,
 referenceEdge: ReferenceEdge ← left,
 headOffset: REAL ← 0,
 headCount: CARDINAL ← 0,
 headPositions: RealSequence ← NIL,
 trimOffset: REAL ← 0,
 trimXSize: REAL ← 0,
 trimYSize: REAL ← 0,
 bindingColor: BindingColor ← defaultColor,
 otherbindingColor: LONG STRING ← NIL,
 bindingType: BindingType ← defaultType,
 otherBindingType: LONG STRING ← NIL,
 operation: BinderyOperation ← none,
 otherOperation: LONG STRING ← NIL,
 finishingMessage: LONG STRING ← NIL,
 inserts: InsertSeq ← NIL,
 dieCutName: LONG STRING ← NIL,
 dieCutDimensionX, dieCutDimensionY: REAL ← 0,
 dieCutOffsetX, dieCutOffsetY: REAL ← 0];

BinderyFinishingSequence: TYPE = LONG POINTER TO BinderyFinishingSequenceRep;
BinderyFinishingSequenceRep: TYPE = RECORD [
 SEQUENCE length: CARDINAL OF BinderyFinishingOption];

BindFinishSelectSeq: TYPE = LONG POINTER TO BindFinishSelectRep;
BindFinishSelectRep: TYPE = RECORD [SEQUENCE length: CARDINAL OF BindFinishSel];
BindFinishSel: TYPE = RECORD [
 var: SELECT type: CopyPageType FROM
  copyRun => [copyRun: CARDINAL],
```

Copyright © 1992 Xerox Corporation All Rights Reserved

```
  pageInfo => [pageInfo: FinishOptionSeq],
  ENDCASE];

CopyPageType: TYPE = {copyRun, pageInfo};
PageFinish: TYPE = {pageRun, finish};

FinishOptionSeq: TYPE = LONG POINTER TO FinishOptionRep;
FinishOptionRep: TYPE = RECORD [SEQUENCE length: CARDINAL OF FinishOption];
FinishOption: TYPE = RECORD [
 var: SELECT type: PageFinish FROM
  pageRun => [pageRun: CARDINAL], finish => [finish: FinishSeq], ENDCASE];
FinishSeq: TYPE = LONG POINTER TO FinishRep;
FinishRep: TYPE = RECORD [SEQUENCE length: CARDINAL OF CARDINAL];

BinderyOperation: TYPE = MACHINE DEPENDENT{
 none(0), edgeStitching, saddleStitching, binding, punching, folding, slitting,
 perforating, trimming, inserting, dieCutting, other(127)};

BindingColor: TYPE = MACHINE DEPENDENT{
 defaultColor(0), black, blue, brown, gray, green, red, yellow, other(127)};

BindingDirection: TYPE = MACHINE DEPENDENT{parallelX(0), parallelY(1), null};

BindingType: TYPE = MACHINE DEPENDENT{
 defaultType(0), tape, plastic, perfect, velo, spiral, other(127)};

BookletSignatureOption: TYPE = LONG POINTER TO BookletSignatureOptionRep;
BookletSignatureOptionRep: TYPE = RECORD [
 maxShift: REAL ← 0,
 bindDirection: BindingDirection ← null,
 impositionsPerSurface: CARDINAL ← 0,
 sourcePageDims: SourcePageSequence,
 resultXSheetSize: REAL,
 resultYSheetSize: REAL];

CoverImaging: TYPE = {noImaging, outsideOnly, insideOnly, both};
Covers: TYPE = LONG POINTER TO CoversRep;
CoversRep: TYPE = RECORD [
 frontCoverMedium: CARDINAL ← 0,
 backCoverMedium: CARDINAL ← 0,
 frontCoverMediumValid: BOOLEAN ← FALSE,
 backCoverMediumValid: BOOLEAN ← FALSE,
 frontCover: CoverImaging ← noImaging,
 backCover: CoverImaging ← noImaging];

CardinalSequence: TYPE = LONG POINTER TO CardinalSequenceRep;
CardinalSequenceRep: TYPE = RECORD [SEQUENCE length: CARDINAL OF CARDINAL];

InsertSeq: TYPE = LONG POINTER TO InsertSeqRep;
InsertSeqRep: TYPE = RECORD [SEQUENCE length: CARDINAL OF InsertRep];
```

Copyright © 1992 Xerox Corporation All Rights Reserved

```
InsertRep: TYPE = RECORD [
 insertSizeValid: BOOLEAN ← FALSE,
 insertTopSurfaceValid: BOOLEAN ← FALSE,
 insertName: LONG STRING ← NIL,
 insertSizeX, insertSizeY: REAL ← 0,
 insertEdge: ReferenceEdge ← left,
 insertTopSurface: CARDINAL ← 0,
 insertBin: CARDINAL ← 0,
 insertAfter: CARDINAL ← LAST[CARDINAL]];

JobAttributes: TYPE = LONG POINTER TO JobAttributesRep;
JobAttributesRep: TYPE = RECORD [
 jobCreateDate: LONG STRING ← NIL,
 jobName: LONG STRING ← NIL,
 jobAccountName: LONG STRING ← NIL,
 jobComment: LONG STRING ← NIL,
 jobPageCount: CARDINAL ← 0,
 jobPriority: CARDINAL ← 0,
 jobSender: LONG STRING ← NIL,
 jobRecipient: LONG STRING ← NIL,
 jobStartMessage: LONG STRING ← NIL,
 jobStartWait: CARDINAL ← 0,
 jobEndMessage: LONG STRING ← NIL,
 jobEndWait: CARDINAL ← 0,
 jobTotalSize: LONG CARDINAL ← 0,
 jobDisposition: JobDisposition ← null,
 jobErrorAbort: AbortReason ← null,
 jobErrorReporting: ReportLevel ← null];

JobDisposition: TYPE = MACHINE DEPENDENT{
 printAndDelete(0), printAndSave(1), hold(2), proof(3), authorizedHold(4),
 null};

RealSequence: TYPE = LONG POINTER TO RealSequenceRep;
RealSequenceRep: TYPE = RECORD [SEQUENCE length: CARDINAL OF REAL];

ReferenceEdge: TYPE = MACHINE DEPENDENT{bottom(0), right, top, left(3)};

ReportLevel: TYPE = MACHINE DEPENDENT{terse(0), verbose(1), null};

SourcePageSequence: TYPE = LONG POINTER TO SourcePageSequenceRep;
SourcePageSequenceRep: TYPE = RECORD [
 SEQUENCE length: CARDINAL OF SourcePagePair];
SourcePagePair: TYPE = RECORD [
 var: SELECT type: PageMediaType FROM
  pageRun => [pageRun: CARDINAL],
  mediaDim => [mediaDim: PublicPrinting.MediumDimensions],
  ENDCASE];

PageMediaType: TYPE = {pageRun, mediaDim};
```

Copyright © 1992 Xerox Corporation All Rights Reserved

```
OtherOption: TYPE = RECORD [
 name: LONG STRING, data: LONG DESCRIPTOR FOR ARRAY CARDINAL OF CARDINAL];
NameValuePair: TYPE = RECORD [
 next: NameValuePairPtr,
 name: LONG STRING,
 value: SELECT type: NameValueType FROM
  string => [s: LONG STRING],
  number => [n: LONG INTEGER],
  vectorOfStrings => [vec: SEQUENCE length: CARDINAL OF LONG STRING],
  ENDCASE];

NameValuePairPtr: TYPE = LONG POINTER TO NameValuePair;

NameValueType: TYPE = {string, number, vectorOfStrings};

ResultsFlags: TYPE = RECORD [
 plexMayChange: BOOLEAN,
 mediaMayChange: BOOLEAN,
 onSimplexMayChange: BOOLEAN,
 copySelectMayChange: BOOLEAN,
 pageSelectMayChange: BOOLEAN,
 copiesMayVary: BOOLEAN];
PreParserCommandType: TYPE = {
 abort, null, proceedWithJob, mediaReady, proceedFromSuspend, suspend};

Command: TYPE = RECORD [
 var: SELECT msg: PreParserCommandType FROM
  abort => [],
  null => NULL,
  proceedWithJob => [proceedRecord: JobProceedDataPtr],
  mediaReady => [mediaRecord: JobMediaDataPtr],
  proceedFromSuspend => [],
  suspend => [],
  ENDCASE];

StatusType: TYPE = {
 preParserAborted, preParserStartCompleted, preParserCompleted,
 preParserPageCompleted, preParserReady, preParserSuspended, preParserResumed};

Status: TYPE = RECORD [
 var: SELECT msg: StatusType FROM
  preParserAborted => [],
  preParserStartCompleted => [printInstrs: PrintInstructionsResultsPtr],
  preParserReady => [ipData: BlockStream.StreamHandle],
  preParserCompleted => [jobResultsPtr: JobResultsPtr],
  preParserPageCompleted => [pageResultsPtr: PageResultsPtr],
  preParserSuspended => [reason: SuspendStatus],
  preParserResumed => [],
```

Copyright © 1992 Xerox Corporation All Rights Reserved

```
  ENDCASE];

SuspendStatus: TYPE = {
 resources, fatalErrorPreParser, fatalErrorFragMgr, diskFullPreParser, spare};

Handle: TYPE = LONG POINTER TO Object;

Object: TYPE;

PutStatusProc: TYPE = PROCEDURE [
 clientContext: DecomposerCommon.ClientContext, status: Status];

internalError: ERROR;
invalidCommand: SIGNAL;

Create: PROCEDURE [
 transID: ResMgrIDs.TransactionID, zone: UNCOUNTED ZONE,
 priority: Process.Priority] RETURNS [handle: Handle, decomposer: Decomposer];

Destroy: PROCEDURE [handle: Handle, transID: ResMgrIDs.TransactionID]
 RETURNS [];

PutCommand: PROCEDURE [handle: Handle, command: Command] RETURNS [];

END.
```

Copyright © 1992 Xerox Corporation All Rights Reserved

```
DIRECTORY
 DecomposerCommon USING [ClientContext],
 Environment USING [Byte],
 FaultLogger USING [ID],
 PublicPrinting USING [Plex],
 ResMgrIDs USING [TransactionID];

PreParserCallBack: DEFINITIONS =
 BEGIN

 DiskError: TYPE = {iipFragMgrError};

 ESSFault: TYPE = {fpuProblem, noMicrocode};

 Feature: TYPE = RECORD [
  var: SELECT type: FeatureType FROM
   longSequencesNotImpld => [],
   nestedContentInstrsUnimpld => [],
   unimplementedFeature => [subCode: CARDINAL],
   unimplementedSequenceType => [sequenceType: CARDINAL],
   unimplementedTypeConversion => [
    operandType: CARDINAL, desiredType: CARDINAL],
   cluster => [name: LONG STRING],
   mediaSelect => [],
   jobPolicy => [],
   highLightColor => [color: LONG STRING],
   breakPageFont => [],
   breakPageType => [],
   outPutPositions => [],
   pageBinderyFinishingSelect => [],
   ENDCASE];

 FeatureType: TYPE = {
  longSequencesNotImpld, nestedContentInstrsUnimpld, unimplementedFeature,
  unimplementedSequenceType, unimplementedTypeConversion, cluster, mediaSelect,
  jobPolicy, highLightColor, breakPageFont, breakPageType, outPutPositions,
  pageBinderyFinishingSelect};

 FileProblem: TYPE = {
  badInsertFileSyntax, imageFileNotFound, insertFileNotFound, insertFileProblem,
  unimplementedRESInfo};

 InstructionProblem: TYPE = {badValue, badType, unrecognized};

 InstructionValue: TYPE = {coverMediaIndex};

 MasterProblem: TYPE = {
  notAnInterpressFile, nestedCORRECTs, noFontSpecified, numericError,
```

Copyright © 1992 Xerox Corporation All Rights Reserved

```
 unexpectedIPFunction, unexpectedEOF, badPropertyVectorStructure,
 badTypeForPropertyName, propertyNameNotFound, markContextMismatch,
 markMissingAtPageEnd, stackNotEmptyAtPageEnd};

MasterProblemWithCode: TYPE = {
 stackUnderflow, unexpectedMark, unexpectedOperator, unrecognizedOperator,
 badFrameIndex, badISetIndex, badISetUsage, badMediaIndex, badVectorIndex,
 invalidSequenceType, negativeMakeVecLUbounds, outputOperatorNotAllowed};

PostScriptProblem: TYPE = {postScriptJobError, postScriptJobAborted};

ObjectFault: TYPE = RECORD [
 problem: Problem,
 severity: Severity,
 functionFault: BOOLEAN ← FALSE,
 side: PublicPrinting.Plex,
 sheetNumber: LONG CARDINAL,
 copyNumber: LONG CARDINAL];

PrinterLimit: TYPE = {
 insufficientDiskSpace, insufficientMemory, invalidCurrentPosition,
 mgrSMHeapAllocationError, resMgrError, rtosFileError, rasterDirectoryFull,
 smHeapAllocationError, tooManyFragFiles, tooManyFrags};

Problem: TYPE = RECORD [
 var: SELECT type: ProblemType FROM
  null => [],
  badOperandValue => [operandType: CARDINAL, value: REAL],
  colorSubstitued => [colorName: LONG STRING],
  errorOperatorExecuted => [message: LONG STRING],
  featureNotImplemented => [feature: Feature],
  fileProblem => [problem: FileProblem, fileName: LONG STRING],
  findOperationFailed => [operatorType: CARDINAL, findArgument: LONG STRING],
  instructionProblem => [
   problem: InstructionProblem, instruction: LONG STRING],
  instructionValue => [problem: InstructionValue, value: CARDINAL],
  invalidOperandTypeOnStack => [
   operatorType: CARDINAL, operandNumber: CARDINAL, operandType: CARDINAL],
  invalidTypeForSetFont => [frameIndex: CARDINAL, operandType: CARDINAL],
  markNotFoundOnStack => [operatorType: CARDINAL, operandType: CARDINAL],
  masterProblem => [problem: MasterProblem],
  masterProblemWithCode => [
   problem: MasterProblemWithCode, subCode: CARDINAL],
  postScriptProblem => [
   problem: PostScriptProblem, error: LONG STRING, command: LONG STRING],
  printerLimitExceeded => [
   problem: PrinterLimit, code: CARDINAL, id: FaultLogger.ID],
  unrecoverableDiskError => [diskError: DiskError, id: FaultLogger.ID],
  unrecoverableSoftwareProblem => [swError: SoftwareProblem],
  unrecoverableSWProblemWithCode => [
```

Copyright © 1992 Xerox Corporation All Rights Reserved

```
  swError: SoftwareProblemWithCode, code: CARDINAL],
 ENDCASE];

ProblemType: TYPE = {
 null, badOperandValue, colorSubstitued, errorOperatorExecuted,
 featureNotImplemented, fileProblem, findOperationFailed, instructionProblem,
 instructionValue, invalidOperandTypeOnStack, invalidTypeForSetFont,
 markNotFoundOnStack, masterProblem, masterProblemWithCode, postScriptProblem,
 printerLimitExceeded, unrecoverableDiskError, unrecoverableSoftwareProblem,
 unrecoverableSWProblemWithCode};

Severity: TYPE = {
 appearanceError, appearanceWarning, masterError, masterWarning, comment,
 operationError, systemError};

SoftwareProblem: TYPE = {
 pageInitError, softwareBugNoIIP, unexpectedIPTrap, invalidNode};

SoftwareProblemWithCode: TYPE = {
 iipFragMgrError, imageInstallAcqBufferError, imageInstallBccError,
 imageInstallDirectoryError, imageInstallError, imageInstallNotAvailable,
 imageInstallOtherError, unexpectedIPFunction, unexpectedError,
 unexpectedSignal};


ClearResourceFault: PROCEDURE [transID: ResMgrIDs.TransactionID];

MicrocodeVersionMismatch: PROCEDURE [
 lowestMicrocodeVersion: Environment.Byte, versionOfMicrode: Environment.Byte,
 id: FaultLogger.ID];

ReportESSFault: PROCEDURE [
 context: DecomposerCommon.ClientContext, fault: ESSFault, id: FaultLogger.ID];

ReportObjectFault: PROCEDURE [
 context: DecomposerCommon.ClientContext, objectFault: ObjectFault];

END.
```

Copyright © 1992 Xerox Corporation All Rights Reserved

```
DIRECTORY

 Environment USING [bitsPerByte],
 IM USING [InstallHandle, InstallStatusProcType],
 PreParserCommon USING [ColorOpType, ColorPtr, MainHandle, VectorOfElementsPtr];

PreParserColor: DEFINITIONS =

 BEGIN


 InkWellNumberOfScanLines: CARDINAL = 16;
 InkWellScanLineLength: CARDINAL = 16;
 PaddedInkWellScanLineLength: CARDINAL = 32;
 InkWellBytesPerScanLine: CARDINAL =
  InkWellNumberOfScanLines / Environment.bitsPerByte;
 InkWellSizeInBytes: CARDINAL =
  InkWellBytesPerScanLine * InkWellNumberOfScanLines;
 PaddedInkWellBytesPerScanLine: CARDINAL =
  PaddedInkWellScanLineLength / Environment.bitsPerByte;
 InMemorySizeThreshold: CARDINAL =
  PaddedInkWellBytesPerScanLine * InkWellNumberOfScanLines;


 HandleList: TYPE = LONG POINTER TO HandleListRec;

 HandleListRec: TYPE = RECORD [
  installHandle: IM.InstallHandle,
  hPageHandle: PreParserCommon.MainHandle,
  abortFlag: BOOLEAN ← FALSE,
  next: HandleList ← NIL];


 AddNode: PROCEDURE [hPageHandle: PreParserCommon.MainHandle];


 CheckVectorOfIdent: PUBLIC PROCEDURE [h: PreParserCommon.MainHandle]
  RETURNS [failed: BOOLEAN];

 CleanUpNodeList: PROCEDURE [];


 DeleteNodesForPage: PROCEDURE [sheetNumber: LONG CARDINAL];

 EqualIdentifier: PROCEDURE [h: PreParserCommon.MainHandle, s: LONG STRING]
  RETURNS [equal: BOOLEAN];
```

Copyright © 1992 Xerox Corporation All Rights Reserved

```
FindColor: PROCEDURE [h: PreParserCommon.MainHandle] RETURNS [loop: BOOLEAN];

FindColorModelOp: PROCEDURE [h: PreParserCommon.MainHandle]
 RETURNS [loop: BOOLEAN];

FindColorOp: PROCEDURE [h: PreParserCommon.MainHandle] RETURNS [loop:
BOOLEAN];

FindDecompressor: PROCEDURE [h: PreParserCommon.MainHandle]
 RETURNS [loop: BOOLEAN];

FindNodeInList: PROCEDURE [installHandle: IM.InstallHandle]
 RETURNS [h: PreParserCommon.MainHandle];

DoColorOperator: PROCEDURE [
 h: PreParserCommon.MainHandle, colorOp: PreParserCommon.ColorOpType,
 params: PreParserCommon.VectorOfElementsPtr,
 coords: PreParserCommon.VectorOfElementsPtr] RETURNS [loop: BOOLEAN];

MakeGray: PROCEDURE [h: PreParserCommon.MainHandle]
 RETURNS [loop: BOOLEAN ← FALSE];

MakePixelArray: PROCEDURE [h: PreParserCommon.MainHandle]
 RETURNS [loop: BOOLEAN];

MakeSampledBlack: PROCEDURE [h: PreParserCommon.MainHandle]
 RETURNS [loop: BOOLEAN];

MaskPixel: PROCEDURE [h: PreParserCommon.MainHandle] RETURNS [loop: BOOLEAN];

ReportInstallStatus: IM.InstallStatusProcType;

SetGray: PROCEDURE [h: PreParserCommon.MainHandle]
 RETURNS [loop: BOOLEAN ← FALSE];

SetSampledBlack: PROCEDURE [h: PreParserCommon.MainHandle]
 RETURNS [loop: BOOLEAN ← FALSE];
```

Copyright © 1992 Xerox Corporation All Rights Reserved

```
SetInkWell: PROC [
 h: PreParserCommon.MainHandle, color: PreParserCommon.ColorPtr]
 RETURNS [needIIPBlock: BOOLEAN ← FALSE];

Initialize: PROCEDURE [];

InitializeModuleA: PROCEDURE [];


END.
```

Copyright © 1992 Xerox Corporation All Rights Reserved

```
DIRECTORY
 PreParserCommon USING [
  MainHandle, PixelArrayPtr, StackEntry, TransformationPtr];

PreParserColorPrivate: DEFINITIONS =

 BEGIN

 DistinctColor: TYPE = {yellow, green, red, blue};

 ExtendZone: SIGNAL;

 TryMakeInkWell: PROC [
  h: PreParserCommon.MainHandle, pa: PreParserCommon.PixelArrayPtr,
  um: PreParserCommon.TransformationPtr, clear: BOOLEAN]
  RETURNS [successful: BOOLEAN ← FALSE];

 CreateDistinctColor: PROC [h: PreParserCommon.MainHandle, name: DistinctColor]
  RETURNS [color: PreParserCommon.StackEntry];

 END.
```

Copyright © 1992 Xerox Corporation All Rights Reserved

```
DIRECTORY
 CoalescerTable USING [
  BitMapEntry, BitMapEntryLinkHandle, UnknownFontEntry,
  UnknownFontEntryLinkHandle],
 DecomposerCommon USING [ObjectIndex],
 DirectoryID USING [ObjectID],
 DirectoryType USING [nullObjectID],
 Environment USING [Byte, bytesPerWord, LongNumber, wordsPerPage],
 FixedPointReal USING [Number],
 IM USING [Buffer, InstallHandle],
 InternalIP USING [
  ColorRange, PixelPoint, RealPixelPoint, SetClipRectangleInt, StrokeAction,
  StrokeEnd, StrokeJoint, Token],
 IPFunction USING [ParserType],
 ParserCommon USING [State, ZoneRecord, ZoneRecPtr],
 PreParser USING [
  JobMediaDataPtr, JobProceedDataPtr, Option, OptionPtr, OptionType,
  PageResultsPtr, PrintInstructionsResultsPtr, ResultsErrorStatus],
 PreParserCallBack USING [Severity],
 PreParserControl USING [MainStatus, SIFResult, SIFResultPtr],
 PreParserData USING [
  OperandConversionTablePtr, OperandLookupTablePtr, OperandTablePtr, StackType],
 PreParserTokenContext USING [
  ByteArrayPtr, ParseContext, RBraceOpDataPtr, SequenceLength,
  TokenSizeArrayPtr],
 PublicPrinting USING [Plex, RunOfCardinalSeq, RunofRunOfCardinalSeq],
 RasterObjects USING [PixelOverhead, PixelSequence],
 ResMgrStorage USING [Pages],
 Time USING [Unpacked];

PreParserCommon: DEFINITIONS =
 BEGIN

 MainHandle: TYPE = LONG POINTER TO MainContext;
 MainContext: TYPE = MACHINE DEPENDENT RECORD [
  pc(0): PreParserTokenContext.ParseContext,
  fill1(212): ARRAY [0..9] OF CARDINAL ← ALL[TRASH],
  betweenPages(222:0..0): BOOLEAN,
  fontSubstituted(222:1..1): BOOLEAN,
  mediaIndexReported(222:2..2): BOOLEAN,
  recordingCO(222:3..3): BOOLEAN,
  stopRequested(222:4..4): BOOLEAN,
  warningOccurred(222:5..5): BOOLEAN,
  fill(222:6..7): [0..4),
  errorCode(222:8..15): Environment.Byte,
  correctMeasureX(223): StackEntry,
  correctMeasureY(226): StackEntry,
  currentTIndex(229): TFormIndex,
```

Copyright © 1992 Xerox Corporation All Rights Reserved

```
fGetFramePtr(230): FramePtr,
fontLookup(232): FontLookupRec,
framePtr(296): FramePtr,
frameSaveOption(298): FrameSaveOption,
iipData(299): IIPData,
fill2(377): ARRAY [0..19] OF CARDINAL ← ALL[TRASH],
imagerVars(397): ImagerVars,
integer(469): INTEGER,
nodeList(470): LONG POINTER TO ComplexNode,
operandConversionTablePtr(472): PreParserData.OperandConversionTablePtr,
operandLookupTablePtr(474): PreParserData.OperandLookupTablePtr,
operandTablePtr(476): PreParserData.OperandTablePtr,
P1(478): InternalIP.PixelPoint,
P2(482): InternalIP.PixelPoint,
stackEntry(486): StackEntry,
stackEntryPtr(489): StackEntryPtr,
string(491): String,
sv(502): StackVars,
tempData(523): TempData,
token(608): InternalIP.Token,
tokenSizes(630): PreParserTokenContext.TokenSizeArrayPtr,
topStackRecordEntryCount(632): CARDINAL ← 0,
topStackRecordPtr(633): StackRecordPtr,
zone(635): ParserCommon.ZoneRecord,
fill3(654): ARRAY [0..15] OF CARDINAL ← ALL[TRASH],
availableInkWells(670): InkWellTable,
bufferPtr(842): PreParserTokenContext.ByteArrayPtr,
bitMapLookedUpPtr(844): BitMapEntryPtr,
bitMapEntryPtr(846): BitMapEntryPtr,
bitMapTableCurrentLength(848): CARDINAL,
bitMapTablePtrCurrent(849): CoalescerTable.BitMapEntryLinkHandle,
bitMapTablePtrStart(851): CoalescerTable.BitMapEntryLinkHandle,
bitMapTableTotalLength(853): CARDINAL,
fill4(854): ARRAY [0..19] OF CARDINAL ← ALL[TRASH],
colorOperationStage(874): CARDINAL,
composedOpBlockPtr(875): ComposedOpBlockPtr,
contentResults(877): ContentInstrResults,
cpValid(882): BOOLEAN,
currentFoundFontIndex(883): FoundFontIndex,
currentInkWellIndex(884): CARDINAL,
errorStatus(885): PreParser.ResultsErrorStatus,
extendInkWellTable(886): BOOLEAN,
finishingOption(887): PreParser.OptionPtr,
foundFontChain(889): FoundFontPtr,
foundFontRecordCount(891): FoundFontRange,
frameInitialized(892): BOOLEAN ← FALSE,
jobMediaDataPtr(893): PreParser.JobMediaDataPtr,
inkWellCache(895): InkWellLookUpCache,
lastFontLookUpRecPtr(917): FontLookupRecPtr,
lastPtMCS(919): InternalIP.RealPixelPoint,
```

Copyright © 1992 Xerox Corporation All Rights Reserved

```
 logicalPageNumber(923): LONG CARDINAL,
 mainZoneRecPtr(925): ParserCommon.ZoneRecPtr,
 fill5(927): ARRAY [0..19] OF CARDINAL ← ALL[TRASH],
 masterContentInstrs(947): BOOLEAN,
 mediaSelectOption(948): PreParser.OptionPtr,
 mediaIndex(950): CARDINAL,
 mediumVars(951): MediumVariables,
 mediaVectorCorrection(963): INTEGER ← 0,
 mgrZoneRecPtr(964): ParserCommon.ZoneRecPtr,
 nextIIPWordPtr(966): LONG POINTER TO InternalIP.Token ← NIL,
 onSimplexOption(968): PreParser.OptionPtr,
 pageResultsPtr(970): PreParser.PageResultsPtr ← NIL,
 plex(972): PublicPrinting.Plex,
 plexMode(973): PublicPrinting.Plex,
 proceedDataPtr(974): PreParser.JobProceedDataPtr,
 remainingBytesInBlock(976): LONG CARDINAL,
 remainingIIPCount(978): CARDINAL ← 0,
 sheetNumber(979): CARDINAL,
 side(980): PublicPrinting.Plex,
 smZone(981): UNCOUNTED ZONE,
 stack(983): StackRecord,
 fill6(1045): ARRAY [0..19] OF CARDINAL ← ALL[TRASH],
 startResultsPtr(1065): PreParser.PrintInstructionsResultsPtr,
 statusPtr(1067): LONG POINTER TO PreParserControl.MainStatus,
 tempFramePtr(1069): FramePtr,
 tempVectorPtr(1071): VectorOfElementsPtr,
 unknownFontLookedUpPtr(1073): UnknownFontEntryPtr,
 unknownFontEntryPtr(1075): UnknownFontEntryPtr,
 unknownFontTableCurrentLength(1077): CARDINAL,
 unknownFontTablePtrStart(1078): CoalescerTable.UnknownFontEntryLinkHandle,
 unknownFontTablePtrCurrent(1080): CoalescerTable.UnknownFontEntryLinkHandle,
 unknownFontTableTotalLength(1082): CARDINAL];

AllocateNode8Size: CARDINAL = 8;
AllocateNode16Size: CARDINAL = 16;
AllocateNode32Size: CARDINAL = 32;
AllocateNode64Size: CARDINAL = 64;

Assertion: TYPE = BOOLEAN [TRUE..TRUE];

BitMapEntryPtr: TYPE = LONG POINTER TO CoalescerTable.BitMapEntry;

ClipperPtr: TYPE = LONG POINTER TO Clipper;
Clipper: TYPE = MACHINE DEPENDENT RECORD [
 cn(0): ComplexNode, clip(7): InternalIP.SetClipRectangleInt];

ColorPtr: TYPE = LONG POINTER TO Color;
Color: TYPE = MACHINE DEPENDENT RECORD [
 cn(0): ComplexNode,
 opaque(7): BOOLEAN,
```

Copyright © 1992 Xerox Corporation All Rights Reserved

```
 dataDouble(8): BOOLEAN,
 origin(9): InternalIP.PixelPoint,
 cTableIndex(13): DecomposerCommon.ObjectIndex,
 inkWellCacheIndex(14): CARDINAL,
 coalesceEntry(15): CoalescerTable.BitMapEntry,
 inkWellDataPtr(37): ByteSeq];
ComplexNode: TYPE = MACHINE DEPENDENT RECORD [
 fill(0:0..14): [0..32768) ← 0,
 preambleOwned(0:15..15): BOOLEAN ← FALSE,
 referenceCount(1): CARDINAL ← 1,
 next(2): LONG POINTER TO ComplexNode ← TRASH,
 type(4): ComplexNodeType,
 zoneRecPtr(5): ParserCommon.ZoneRecPtr ← TRASH];

ComplexNodeType: TYPE = MACHINE DEPENDENT{
 clipper(0), composedOp, font, foundFont, frame, outLine, pixelArray,
 pixelVector, string, trajectory, transformation, vectorOfElements, color,
 sifResults};

ColorOpType: TYPE = {
 XeroxGrayLinear, XeroxGrayDensity, XeroxGrayVisual, XeroxYESLinear,
 XeroxRGBLinear, XeroxResearchRGBLinear};

ComposedOpPtr: TYPE = LONG POINTER TO ComposedOp;
ComposedOp: TYPE = MACHINE DEPENDENT RECORD [
 cn(0): ComplexNode,
 var(7): SELECT opType(7): ComposedOpType FROM
  normal => [first(8): ComposedOpBlockPtr, initialFrame(10): FramePtr],
  special => [operatorType(8): OperatorType],
  knownDecompressor => [decompressor(8): RasterObjects.PixelSequence],
  otherDecompressor => [decompressorNamePtr(8): VectorOfElementsPtr],
  colorOpOrModelOp => [
   colorOp(8): BOOLEAN,
   colorOpType(9): ColorOpType,
   params(10): VectorOfElementsPtr],
  ENDCASE];

ComposedOpBlockPtr: TYPE = LONG POINTER TO ComposedOpBlock;
ComposedOpBlock: TYPE = MACHINE DEPENDENT RECORD [
 next(0): ComposedOpBlockPtr,
 nBytes(2): CARDINAL,
 ipData(3): PACKED ARRAY [0..composedOpBlockSize) OF Environment.Byte ← TRASH];

composedOpBlockSize: CARDINAL = 100;

ComposedOpType: TYPE = MACHINE DEPENDENT{
 normal(0), special, knownDecompressor, otherDecompressor, colorOpOrModelOp};

ContentInstrResults: TYPE = RECORD [
 plex: PublicPrinting.Plex ← simultaneousDuplex,
```

Copyright © 1992 Xerox Corporation All Rights Reserved

```
 mediaSelect: CARDINAL ← LAST[CARDINAL],
 onSimplex: PublicPrinting.Plex ← simultaneousDuplex,
 contentPageSelect: PublicPrinting.RunOfCardinalSeq ← NIL];
ContentType: TYPE = {
 contentPlex, pageMediaSelect, pageOnSimplex, contentPageSelect,
 pageBinderyFinishingSelect};

FontPtr: TYPE = LONG POINTER TO Font;
Font: TYPE = MACHINE DEPENDENT RECORD [
 cn(0): ComplexNode,
 name(7): VectorOfElementsPtr,
 transformationPtr(9): TransformationPtr,
 index(11): FoundFontIndex];
FontLookupRecPtr: TYPE = LONG POINTER TO FontLookupRec;
FontLookupRec: TYPE = MACHINE DEPENDENT RECORD [
 next(0): FontLookupRecPtr, table(2): ARRAY FoundFontRange OF FoundFontPtr];

FoundFontPtr: TYPE = LONG POINTER TO FoundFont;
FoundFont: TYPE = RECORD [
 indexInCoalesce: CARDINAL ← 0, coalesceEntry: UnknownFontEntryPtr ← NIL];

foundFontMaxCount: CARDINAL = 31;
FoundFontIndex: TYPE = CARDINAL;
FoundFontRange: TYPE = CARDINAL [0..foundFontMaxCount);
FrameEntryRange: TYPE = [0..frameEntryCount);

FramePtr: TYPE = LONG POINTER TO Frame;
Frame: TYPE = MACHINE DEPENDENT RECORD [
 cn(0): ComplexNode,
 nextFrame(7): FramePtr,
 foundFontPtr(9): FoundFontPtr,
 foundFontIndex(11): FoundFontIndex,
 inkWellBaseIndex(12): CARDINAL,
 entries(13): ARRAY FrameEntryRange OF StackEntry,
 validEntries(163:0..0): BOOLEAN ← FALSE,
 pad(163:1..13): [0..8192),
 frameSaveOption(163:14..15): FrameSaveOption,
 imagerVars(164): ImagerVars];
FrameSize: CARDINAL = SIZE[Frame];

FrameSaveOption: TYPE = MACHINE DEPENDENT{do(0), doSave(1), doSaveAll(2)};


inkWellsPerTable: CARDINAL = 10;
InkWellTableRange: TYPE = CARDINAL [0..inkWellsPerTable);
InkWellSizeInBytes: CARDINAL = 32;
<<((PreParserColor.InkWellScanLineLength/Environment.bitsPerByte)*
  PreParserColor.InkWellNumberOfScanLines);>>
```

Copyright © 1992 Xerox Corporation All Rights Reserved

```
InkWellTablePtr: TYPE = LONG POINTER TO InkWellTable ← NIL;
InkWellTable: TYPE = MACHINE DEPENDENT RECORD [
 next(0): InkWellTablePtr ← NIL,
 table(2): ARRAY InkWellTableRange OF InkWellData];

InkWellData: TYPE = MACHINE DEPENDENT RECORD [
 used(0): BOOLEAN ← FALSE,
 inkWellData(1): PACKED ARRAY [0..InkWellSizeInBytes) OF BYTE];

InkWellLookUpCachePtr: TYPE = LONG POINTER TO InkWellLookUpCache ← NIL;
InkWellLookUpCache: TYPE = MACHINE DEPENDENT RECORD [
 next(0): InkWellLookUpCachePtr ← NIL,
 table(2): ARRAY InkWellTableRange OF InkWellCacheEntry];

InkWellCacheEntry: TYPE = MACHINE DEPENDENT RECORD [
 cached(0): BOOLEAN ← FALSE, inkWellIndex(1): CARDINAL ← 0];

IIPData: TYPE = MACHINE DEPENDENT RECORD [
 imagerVars(0): ImagerVars,
 fill(72:0..5): [0..64) ← 0,
 graphicChanged(72:6..6): BOOLEAN ← FALSE,
 clipperChanged(72:7..7): BOOLEAN ← FALSE,
 fontChanged(72:8..8): BOOLEAN ← FALSE,
 positionChanged(72:9..9): BOOLEAN ← FALSE,
 tChanged(72:10..10): BOOLEAN ← FALSE,
 strokeChanged(72:11..11): BOOLEAN ← FALSE,
 spare1(72:12..12): BOOLEAN ← FALSE,
 spare2(72:13..13): BOOLEAN ← FALSE,
 textImagerVarChanged(72:14..14): BOOLEAN ← FALSE,
 strokeWidthChanged(72:15..15): BOOLEAN ← FALSE,
 blockPtr(73): LONG POINTER TO InternalIP.Token ← NIL,
 currentWordPtr(75): LONG POINTER TO InternalIP.Token ← NIL,
 currentWordCount(77): CARDINAL ← 0];
ImagerVars: TYPE = MACHINE DEPENDENT RECORD [
 t(0): Transformation,
 c(21): FixedPointReal.Number,
 f(23): FixedPointReal.Number,
 tFormHint(25): TFormHint,
 priorityImportant(26): INTEGER,
 color(27): StackEntry,
 strokeWidth(30): REAL,
 strokeWidthX(32): FixedPointReal.Number,
 strokeWidthY(34): FixedPointReal.Number,
 strokeEnd(36): InternalIP.StrokeEnd ← square,
 strokeJoint(37): InternalIP.StrokeJoint ← miter,
 correctPass(38): INTEGER ← 0,
 correctTX(39): FixedPointReal.Number ← [lc[0]],
 correctTY(41): FixedPointReal.Number ← [lc[0]],
 fontIndex(43): DecomposerCommon.ObjectIndex,
 font(44): StackEntry,
```

Copyright © 1992 Xerox Corporation All Rights Reserved

```
 amplifySpace(47): FixedPointReal.Number ← [if[frac: 0, int: 1]],
 correctShrink(49): StackEntry,
 clipper(52): InternalIP.SetClipRectangleInt,
 noImage(56): LONG CARDINAL ← 0,
 dcsX(58): FixedPointReal.Number,
 dcsY(60): FixedPointReal.Number,
 correctMX(62): FixedPointReal.Number ← [lc[0]],
 correctMY(64): FixedPointReal.Number ← [lc[0]],
 tPtr(66): TransformationPtr,
 underlineStart(68): FixedPointReal.Number,
 tAtStartUnderline(70): TransformationPtr];
imagerVarSize: CARDINAL = SIZE[ImagerVars];
imagerVarPersistSize: CARDINAL = SIZE[FixedPointReal.Number] * 4;
imagerVarNonPersistSizeTwo: CARDINAL =
 (SIZE[TransformationPtr] * 2) + SIZE[FixedPointReal.Number];
imagerVarNonPersistSizeOne: CARDINAL =
 imagerVarSize - imagerVarNonPersistSizeTwo - 1 - imagerVarPersistSize;
imagerVarNonPersistSizeTwoOffset: CARDINAL =
 imagerVarNonPersistSizeOne + imagerVarPersistSize + 1;

MediumVariables: TYPE = MACHINE DEPENDENT RECORD [
 mediumXSize(0): REAL,
 mediumYSize(2): REAL,
 fieldXMin(4): REAL,
 fieldYMin(6): REAL,
 fieldXMax(8): REAL,
 fieldYMax(10): REAL];

ModifyFontPtr: TYPE = LONG POINTER TO ModifyFont;
ModifyFont: TYPE = MACHINE DEPENDENT RECORD [
 next(0): ModifyFontPtr,
 tIndex(2): TFormIndex,
 mIndex(3): TFormIndex,
 fontIndex(4): DecomposerCommon.ObjectIndex];
OtherOptionType: TYPE = {copyName, mediaSelect, onSimplex};

NodePtr: TYPE = LONG POINTER TO Node;
Node: TYPE = MACHINE DEPENDENT RECORD [
 nodeLength(0): CARDINAL, next(1): NodePtr, data(3): ARRAY [0..0) OF CARDINAL];

NumberType: TYPE = PreParserData .StackType[fixedPointReal..real];

OperatorType: TYPE = MACHINE DEPENDENT{null(0)};

OutlinePtr: TYPE = LONG POINTER TO Outline;
Outline: TYPE = MACHINE DEPENDENT RECORD [
 cn(0): ComplexNode,
 odd(7): BOOLEAN,
 trajectoryCount(8): CARDINAL,
 trajectories(9): ARRAY [0..0) OF TrajectoryPtr];
```

Copyright © 1992 Xerox Corporation All Rights Reserved

```
PixelArrayPtr: TYPE = LONG POINTER TO PixelArray;
PixelArray: TYPE = MACHINE DEPENDENT RECORD [
 cn(0): ComplexNode,
 type(7): PixelArrayType,
 var(8): SELECT OVERLAID PixelArrayType FROM
  sif => [sifResultPtr(8): LONG POINTER TO PreParserControl.SIFResult],
  embedded => [
   xPixels(8): CARDINAL,
   yPixels(9): CARDINAL,
   samplesPerPixel(10): CARDINAL,
   maxSampleValue(11): CARDINAL,
   samplesInterleaved(12): CARDINAL,
   m(13): TransformationPtr,
   resInfoObjectID(15): DirectoryID.ObjectID,
   pv(18): PixelVectorPtr],
  ENDCASE];

PixelArrayType: TYPE = MACHINE DEPENDENT{sif(0), embedded};

BYTE: TYPE = Environment.Byte;
ByteSeq: TYPE = LONG POINTER TO ByteSeqRep;
ByteSeqRep: TYPE = RECORD [PACKED SEQUENCE COMPUTED CARDINAL OF BYTE];

PixelVectorPtr: TYPE = LONG POINTER TO PixelVector;
PixelVector: TYPE = MACHINE DEPENDENT RECORD [
 cn(0): ComplexNode,
 installH(7): IM.InstallHandle,
 resInfoObjectID(9): DirectoryID.ObjectID,
 bufferIM(12): IM.Buffer ← [NIL, 0, 0],
 continueFileSizeInBytes(18): LONG CARDINAL ← 0,
 currentTokenBytes(20): LONG CARDINAL ← 0,
 firstBuffer(22): BOOLEAN ← FALSE,
 hasPBT(23): BOOLEAN,
 oddByte(24): BOOLEAN ← FALSE,
 pixelLengthInBytes(25): LONG CARDINAL,
 pixelEncodingOffset(27): LONG CARDINAL,
 pixelSequenceType(29): RasterObjects.PixelSequence,
 pixelV0ThroughV3(30): RasterObjects.PixelOverhead,
 sequenceContinued(34): BOOLEAN ← FALSE,
 transmitPixelVectorInfo(35): BOOLEAN ← TRUE,
 continuedAgain(36): BOOLEAN ← FALSE,
 installed(37): BOOLEAN ← FALSE,
 inMemory(38): BOOLEAN ← FALSE,
 inMemoryReferencePtr(39): ByteSeq ← NIL];

RealPixelPoint: TYPE = RECORD [x, y: REAL];

RunOfCardPtr: TYPE = LONG POINTER TO RunOfCardSeq;
RunOfCardSeq: TYPE = MACHINE DEPENDENT RECORD [
```

Copyright © 1992 Xerox Corporation All Rights Reserved

```
 cn(0): ComplexNode, runOfCardinalSeq(7): PublicPrinting.RunOfCardinalSeq];

RunOfRunOfCardPtr: TYPE = LONG POINTER TO RunOfRunOfCardSeq;
RunOfRunOfCardSeq: TYPE = MACHINE DEPENDENT RECORD [
 cn(0): ComplexNode,
 runOfRunOfCardinalSeq(7): PublicPrinting.RunofRunOfCardinalSeq];

ShowXRelState: TYPE = {runChar, runDisp, escapeChar, escapeDisp};

ShowXRelTokenState: TYPE = {
 tokensPut, putShow, putTwoWords, putOneWord, putSetXYRel};

StackEntryPtr: TYPE = LONG POINTER TO StackEntry;
StackEntry: TYPE = MACHINE DEPENDENT RECORD [
 fill(0:0..7): [0..256) ← TRASH,
 type(0:8..15): PreParserData.StackType,
 frameData(1): SELECT OVERLAID PreParserData.StackType FROM
  null => [nullData(1:0..31): LONG CARDINAL],
  fixedPointReal => [fixed(1:0..31): FixedPointReal.Number],
  real => [real(1:0..31): REAL],
  roundedInteger => [integer(1): INTEGER, fill1(2): CARDINAL ← TRASH],
  nullVectorOfElements => [low(1): CARDINAL, count(2): CARDINAL],
  grayColor => [
   colorRange(1): InternalIP.ColorRange, fill2(2): CARDINAL ← TRASH],
  dupPopOrDie => [dupPopOrDie(1:0..31): LONG CARDINAL],
  mark => [mark(1:0..31): FramePtr],
  composedOp => [composedOpPtr(1:0..31): ComposedOpPtr],
  vectorOfElements => [vectorPtr(1:0..31): VectorOfElementsPtr],
  font => [fontPtr(1:0..31): FontPtr],
  outline => [outlinePtr(1:0..31): OutlinePtr],
  trajectory => [trajectory(1:0..31): TrajectoryPtr],
  pixelArray => [pixelArray(1:0..31): PixelArrayPtr],
  pixelVector => [pixelVectorPtr(1:0..31): PixelVectorPtr],
  transformation => [transformationPtr(1:0..31): TransformationPtr],
  clipper => [clipperPtr(1:0..31): ClipperPtr],
  string => [stringPtr(1:0..31): StringPtr],
  color => [colorPtr(1): ColorPtr],
  identifier => [idStringPtr(1:0..31): StringPtr],
  largeVector => [largeVectorPtr(1:0..31): StringPtr],
  runOfCardinalSeq => [runOfCardPtr(1:0..31): RunOfCardPtr],
  runOfRunOfCardinalSeq => [runOfRunOfCardPtr(1:0..31): RunOfRunOfCardPtr],
  cardinal => [cardinal(1): CARDINAL, fill3(2): CARDINAL ← TRASH],
  ENDCASE];

stackEntryCount: CARDINAL = 20;
stackEntryNull: StackEntry = [type: null, frameData: null[nullData: 0]];
StackEntryRange: TYPE = [0..stackEntryCount);

StackRecordPtr: TYPE = LONG POINTER TO StackRecord;
StackRecord: TYPE = MACHINE DEPENDENT RECORD [
```

Copyright © 1992 Xerox Corporation All Rights Reserved

```
  next(0): LONG POINTER TO StackRecord,
  entries(2): ARRAY StackEntryRange OF StackEntry];

StackVars: TYPE = MACHINE DEPENDENT RECORD [
  operand01(0): StackEntry,
  operand02(3): StackEntry,
  operand03(6): StackEntry,
  operand04(9): StackEntry,
  operand05(12): StackEntry,
  operand06(15): StackEntry,
  operand07(18): StackEntry];

StringBodyPtr: TYPE = LONG POINTER TO StringBody;
StringBody: TYPE = MACHINE DEPENDENT RECORD [
  length: CARDINAL,
  maxLength: CARDINAL,
  chars: PACKED ARRAY [0..0) OF Environment.Byte];

StringPtr: TYPE = LONG POINTER TO String;
String: TYPE = MACHINE DEPENDENT RECORD [
  cn(0): ComplexNode,
  length(7): CARDINAL,
  byteOffset(8): CARDINAL,
  base(9): LONG POINTER TO PACKED ARRAY [0..0) OF CHARACTER,
  chars(11): PACKED ARRAY [0..0) OF CHARACTER];
TempData: TYPE = MACHINE DEPENDENT RECORD [
  tempData(0): SELECT OVERLAID * FROM
    checkFont => [
      foundFontPtr(0): FoundFontPtr,
      foundFontIndex(2): FoundFontIndex,
      modifyFontPtr(3): ModifyFontPtr,
      prevModifyFontPtrPtr(5): LONG POINTER TO ModifyFontPtr,
      mIndex(7): DecomposerCommon.ObjectIndex,
      tForm(8): Transformation,
      tIn(29): Transformation,
      orientation(50): INTEGER,
      savedFontName(51): LONG STRING,
      name(53): LONG STRING],
    sequence => [
      byteIndex(0): Environment.LongNumber,
      bytesCopied(2): CARDINAL,
      sifResultPtr(3): PreParserControl.SIFResultPtr,
      byteStart(5): CARDINAL,
      num(6): PreParserTokenContext.SequenceLength,
      numerator(8): LONG INTEGER,
      sifName(10): LONG STRING],
    fakeSequence => [
      spacer(0): ARRAY [0..10) OF CARDINAL, fakeSifName(10): StringBodyPtr],
    errorOperator => [
      errorMessage(0): LONG STRING, severity(2): PreParserCallBack.Severity],
```

Copyright © 1992 Xerox Corporation All Rights Reserved

```
sequencePixelVector => [
 byteInd(0): CARDINAL,
 number(1): MACHINE DEPENDENT RECORD [
  SELECT OVERLAID * FROM
  c => [c: CARDINAL],
  bytes => [bytes: PACKED ARRAY [0..1] OF Environment.Byte],
  ENDCASE],
 v(2): ARRAY [0..3] OF CARDINAL,
 vSave(6): CARDINAL,
 bTableSize(7): LONG CARDINAL,
 bTableOffset(9): LONG CARDINAL],
trajectory => [
 stroke(0): InternalIP.StrokeAction,
 strokeOffset(13): CARDINAL,
 strokeSize(14): CARDINAL,
 currentPtr(15): TrajectoryRecordPtr,
 currentWords(17): CARDINAL,
 currentRecIncrement(18): CARDINAL,
 numPtr(19): LONG POINTER TO REAL,
 trajNum(21): CARDINAL,
 patternCount(22): CARDINAL,
 midReal(23): BOOLEAN,
 spare(24): ARRAY [0..61) OF CARDINAL],
copy => [
 lastStackEntryPtr(0): StackEntryPtr,
 firstStackEntryPtr(2): StackEntryPtr,
 bottomCount(4): INTEGER],
printInstrs => [
 optionPtr(0): PreParser.OptionPtr,
 firstStackEntryPtrFILL(2): PreParserCommon.StackEntryPtr,
 newOptionPtr(4): PreParser.OptionPtr,
 option(6): PreParser.Option,
 fill(14): CARDINAL ← TRASH,
 propertyNameString(15): LONG STRING,
 elementCount(17): LONG CARDINAL,
 lint(19): LONG INTEGER,
 optionSize(21): CARDINAL,
 time(22): Time.Unpacked,
 fill1(27): CARDINAL ← TRASH,
 fill2(28): CARDINAL ← TRASH,
 stackEntryPtrSave(29): PreParserCommon.StackEntryPtr,
 stackEntryPtrA(31): PreParserCommon.StackEntryPtr,
 mediaStackEntryPtr(33): PreParserCommon.StackEntryPtr,
 tempCount(35): CARDINAL,
 opType(36): PreParser.OptionType,
 otherOpType(37): OtherOptionType,
 contentType(38): ContentType,
 found(39): BOOLEAN,
 tempLongCard(40): LONG CARDINAL,
 safeZone(42): ARRAY [0..7) OF CARDINAL,
```

Copyright © 1992 Xerox Corporation All Rights Reserved

```
    dangerZone(49): LONG STRING,
    makeSpace(51): ARRAY [0..34) OF CARDINAL],
   mark => [nodePtr(0): NodePtr],
   showAndXRel => [
    showXRelState(0): ShowXRelState,
    showXRelTokenState(1): ShowXRelTokenState,
    bytesLeft(2): CARDINAL,
    byteOffset(3): CARDINAL,
    tempByte(4): CHAR,
    charSetWord(5): CARDINAL,
    charWord(6): CARDINAL],
   composedOp => [rBracePtr(0): PreParserTokenContext.RBraceOpDataPtr],
   makeSimpleCO => [
    sequenceFiller(0): ARRAY [0..10) OF CARDINAL,
    currentOpBlockPtrPtr(10): LONG POINTER TO ComposedOpBlockPtr,
    currentOpBlockPtr(12): ComposedOpBlockPtr,
    savedState(14): ParserCommon.State,
    savedIPByteIndex(15): CARDINAL,
    savedActionSave(16): IPFunction.ParserType],
   filler => [fill(0): ARRAY [0..85) OF CARDINAL],
   ENDCASE];

 TFormIndex: TYPE = CARDINAL;
 TFormHint: TYPE = MACHINE DEPENDENT{full(0), zeroBandD(1), zeroAandE(2)};

 TrajectoryPtr: TYPE = LONG POINTER TO Trajectory;
 Trajectory: TYPE = MACHINE DEPENDENT RECORD [
  cn(0): ComplexNode,
  strokeCount(7): CARDINAL,
  trajectoryRecPtr(8): TrajectoryRecordPtr];

 TrajectoryRecordPtr: TYPE = LONG POINTER TO TrajectoryRecord;
 TrajectoryRecord: TYPE = MACHINE DEPENDENT RECORD [
  nextPtr(0): TrajectoryRecordPtr,
  wordCount(2): CARDINAL,
  strokes(3): ARRAY [0..TrajectoryFillSize) OF CARDINAL];

 TrajectoryFillSize: CARDINAL = 64 - SIZE[LONG POINTER] - SIZE[CARDINAL];

 TransformationPtr: TYPE = LONG POINTER TO Transformation;
 Transformation: TYPE = MACHINE DEPENDENT RECORD [
  cn(0): ComplexNode,
  a(7): REAL ← 1.0,
  b(9): REAL ← 0.0,
  c(11): REAL ← 0.0,
  d(13): REAL ← 0.0,
  e(15): REAL ← 1.0,
  f(17): REAL ← 0.0,
  tIndex(19): TFormIndex,
  fill1(20:0..14): [0..32768) ← 0,
```

Copyright © 1992 Xerox Corporation All Rights Reserved

```
 includesICSToDCS(20:15..15): BOOLEAN];
UnknownFontEntryPtr: TYPE = LONG POINTER TO CoalescerTable.UnknownFontEntry;

VectorOfElementsPtr: TYPE = LONG POINTER TO VectorOfElements;
VectorOfElements: TYPE = MACHINE DEPENDENT RECORD [
 cn(0): ComplexNode,
 low(7): CARDINAL,
 count(8): CARDINAL,
 elements(9): ARRAY [0..0) OF StackEntry];

Window: TYPE = MACHINE DEPENDENT RECORD [
 xStart(0): INTEGER,
 xEndPlus1(1): INTEGER,
 yStart(2): INTEGER,
 yEndPlus1(3): INTEGER];

frameEntryCount: CARDINAL = 50;
maxFonts: CARDINAL = 10;
maxImages: CARDINAL = 20;
nullBitMapEntry: CoalescerTable.BitMapEntry = [
 bitMapType: other, id: DirectoryType.nullObjectID, transformation: [],
 xPixel: 0, yPixel: 0, yPad: 0, originXOffset: 0, originYOffset: 0];
nullStackEntry: StackEntry = [type: null, frameData: null[nullData: 0]];
nullUnknownFontTableEntry: CoalescerTable.UnknownFontEntry = [
 authorityID: NIL, charCodeID: NIL, typeFaceID: NIL, transformation: []];

UnknownXY: FixedPointReal.Number = [li[li: FIRST[LONG INTEGER]]];

TransformIIPPoint: PROCEDURE [h: MainHandle] RETURNS [];

IntegerToFixedPointReal: PROCEDURE [int: INTEGER]
 RETURNS [fpr: FixedPointReal.Number] = INLINE {
 RETURN[fpr: [if[frac: 0, int: int]]]};

PagesFromWords: PROCEDURE [n: CARDINAL] RETURNS [pages: ResMgrStorage.Pages]
=
 INLINE {
 RETURN[(n + Environment.wordsPerPage - 1) / Environment.wordsPerPage]};

WordsFromBytes: PROCEDURE [bytes: CARDINAL] RETURNS [words: CARDINAL] = INLINE
{
 RETURN[(bytes + (Environment.bytesPerWord - 1)) / Environment.bytesPerWord]};

END.
```

Copyright © 1992 Xerox Corporation All Rights Reserved

```
DIRECTORY
 BlockStream USING [Block, StreamHandle],
 DirectoryID USING [ObjectID],
 Environment USING [Byte],
 PreParser USING [
  Command, JobMediaDataPtr, JobProceedDataPtr, JobResultsPtr, PageResultsPtr,
  PrintInstructionsResultsPtr, ResultsErrorStatus, Status],
 PreParserCallBack USING [ObjectFault],
 PublicPrinting USING [Plex],
 RasterObjects USING [RESInfo],
 ResMgrIDs USING [TransactionID],
 ResMgrStorage USING [BufferDescriptor, BufferList, Pages],
 RTOSMP2Process USING [MpuID];

PreParserControl: DEFINITIONS =
 BEGIN

 BlockType: TYPE = {ipStream, managerContextBuffer, jobZoneSeg};

 CardinalBlock: TYPE = MACHINE DEPENDENT RECORD [
  blockPointer: LONG POINTER TO PACKED ARRAY OF Environment.Byte,
  startIndex, stopIndexPlusOne: CARDINAL];

 Frame: TYPE;

 FrameHandle: TYPE = LONG POINTER TO Frame;

 Handle: TYPE = LONG POINTER TO Object;

 InterruptRestoreState: TYPE = {
  header, ipStream, managerContext, jobZoneSegs, initPageList, restored};

 IPBlockHandle: TYPE = LONG POINTER TO IPBlockListEntry;

 IPBlockListEntry: TYPE = RECORD [
  fwdLink: LONG POINTER TO IPBlockListEntry,
  block: BlockStream.Block,
  ipBuffer: ResMgrStorage.BufferList,
  mainDone: BOOLEAN,
  mgrDone: BOOLEAN,
  status: IPBlockEntryStatus];

 IPBlockEntryStatus: TYPE = {atClient, atPreParser, noBuffer};

 Log: TYPE = RECORD [
  entriesAllocated: CARDINAL,
  entriesInUse: CARDINAL,
  logPtr: LONG POINTER TO LogArray,
  next: CARDINAL];
```

Copyright © 1992 Xerox Corporation All Rights Reserved

```
LogArray: TYPE = ARRAY [0..0) OF LogRec;

LogRec: TYPE = RECORD [
 var: SELECT dataType: LogType FROM
  acquireBlock => [],
  blockAcquired => [block: BlockStream.Block],
  blockReturned => [block: BlockStream.Block],
  command => [cmnd: PreParser.Command],
  deleteStream => [],
  mainStatus => [mainS: MainStatus],
  mgrAction => [mgrA: ManagerAction],
  mgrStatus => [mgrS: ManagerStatus],
  returnBlock => [block: BlockStream.Block],
  setAbort => [],
  setEOF => [],
  state => [pState: PreParserState],
  transmitBlock => [block: BlockStream.Block],
  ENDCASE];

LogType: TYPE = {
 acquireBlock, blockAcquired, returnBlock, command, blockReturned,
 deleteStream, fragMgrError, mainStatus, mgrAction, mgrStatus, setAbort,
 setEOF, state, transmitBlock};

MainContext: TYPE;

MainHandle: TYPE = LONG POINTER TO MainContext;

MainAction: TYPE = {run};

MainStatusType: TYPE = {
 ready, startResults, needIPBlock, needIIPBlock, needZoneExtend,
 needInsertFileInfo, pageDone, stopped, error, pageFound, insertFileFound,
 endJobFound};

MainStatus: TYPE = RECORD [
 var: SELECT type: MainStatusType FROM
  ready => [],
  startResults => [startResultsPtr: PreParser.PrintInstructionsResultsPtr],
  needIPBlock => [betweenPages: BOOLEAN ← FALSE],
  needIIPBlock => [],
  needZoneExtend => [minimumBlockSize: ResMgrStorage.Pages],
  needInsertFileInfo => [sifResultPtr: SIFResultPtr],
  pageDone => [errored: BOOLEAN ← FALSE],
  stopped => [],
  error => [fault: PreParserCallBack.ObjectFault],
  pageFound => [
   byteOffset: LONG CARDINAL,
   frame: FrameHandle,
```

Copyright © 1992 Xerox Corporation All Rights Reserved

```
   logicalPageNumber: LONG CARDINAL,
   mediaIndex: CARDINAL,
   sheetNumber: LONG CARDINAL,
   plex: PublicPrinting.Plex,
   side: PublicPrinting.Plex,
   tFormIndex: CARDINAL],
  insertFileFound => [bounds: CardinalBlock],
  endJobFound => [],
  ENDCASE];

ManagerBlockStatus: TYPE = {init, soj, parsing, sif, needIPBlock, eoj};

ManagerContext: TYPE;

ManagerHandle: TYPE = LONG POINTER TO ManagerContext;

ManagerActionType: TYPE = {
 parseBlock, setMedia, processSIF, pageSetup, getIIPBlock, extendJobZone,
 extendPageZone, releasePage, cleanupJob, init, interrupt,
 proceedFromInterrupt, abort, suspend, proceedFromSuspend};

ManagerAction: TYPE = RECORD [
 var: SELECT type: ManagerActionType FROM
  parseBlock => [
   mainHandle: MainHandle,
   smZone: UNCOUNTED ZONE,
   newZoneBlock: ResMgrStorage.BufferList,
   newIPBlock: IPBlockHandle],
  setMedia => [],
  processSIF => [nodePtr: LONG POINTER],
  pageSetup => [ph: PageHandle],
  getIIPBlock => [ph: PageHandle],
  extendJobZone => [],
  extendPageZone => [ph: PageHandle],
  releasePage => [ph: PageHandle],
  cleanupJob => [],
  init => [],
  interrupt => [parserList: Handle],
  proceedFromInterrupt => [parserList: Handle],
  abort => [],
  suspend => [],
  proceedFromSuspend => [],
  ENDCASE];

ManagerStatusType: TYPE = {
 null, ready, initialized, needIPBlock, startResults, mediaSet, needZoneExtend,
 needSIFNode, pageFound, pageSetupDone, insertFileInfo, newIIPBlock,
 jobZoneExtended, pageZoneExtended, pageReleased, endOfJobFound,
 jobCleanupDone, stopped, error, abortStarted, suspended};
```

Copyright © 1992 Xerox Corporation All Rights Reserved

```
ManagerStatus: TYPE = RECORD [
 var: SELECT type: ManagerStatusType FROM
  null => [],
  ready => [],
  initialized => [],
  needIPBlock => [betweenPages: BOOLEAN ← FALSE],
  startResults => [startResultsPtr: PreParser.PrintInstructionsResultsPtr],
  mediaSet => [],
  needZoneExtend => [minimumBlockSize: ResMgrStorage.Pages],
  needSIFNode => [nodeSizeInWords: LONG CARDINAL],
  pageFound => [
   byteOffset: LONG CARDINAL,
   frame: FrameHandle,
   logicalPageNumber: LONG CARDINAL,
   mediaIndex: CARDINAL,
   sheetNumber: LONG CARDINAL,
   plex: PublicPrinting.Plex,
   side: PublicPrinting.Plex,
   tFormIndex: CARDINAL],
  pageSetupDone => [ph: PageHandle],
  insertFileInfo => [sifResultPtr: SIFResultPtr],
  newIIPBlock => [ph: PageHandle],
  jobZoneExtended => [],
  pageZoneExtended => [ph: PageHandle],
  pageReleased => [ph: PageHandle],
  endOfJobFound => [],
  jobCleanupDone => [],
  stopped => [],
  error => [fault: PreParserCallBack.ObjectFault, ph: PageHandle],
  abortStarted => [],
  suspended => [],
  ENDCASE];

Object: TYPE = RECORD [
 fwdLink: LONG POINTER TO Object,
 acquireContinue: BOOLEAN,
 acquireCV: CONDITION,
 clearMgrResourceFault: BOOLEAN,
 command: PreParser.Command,
 controlCV: CONDITION,
 copyCount: CARDINAL,
 currentEntryPtr: LONG POINTER TO StateBlockEntry,
 currentManagerBlock: LONG POINTER TO IPBlockListEntry,
 currentManagerOffset: LONG CARDINAL,
 currentManagerPage: LONG POINTER TO PageListEntry,
 endOfJobFound: BOOLEAN,
 eofSet: BOOLEAN,
 headerPtr: LONG POINTER,
 ipBlockList: LONG POINTER TO IPBlockListEntry,
 ipStreamHandle: BlockStream.StreamHandle,
```

Copyright © 1992 Xerox Corporation All Rights Reserved

```
jobErrorState: PreParser.ResultsErrorStatus,
jobMediaDataPtr: PreParser.JobMediaDataPtr,
jobProceedDataPtr: PreParser.JobProceedDataPtr,
jobResultsPtr: PreParser.JobResultsPtr,
jobZoneBlockSize: ResMgrStorage.Pages,
jobZoneSegListEnd: ResMgrStorage.BufferList,
jobZoneSegListStart: ResMgrStorage.BufferList,
log: Log,
mainLoopAction: MainAction,
mainLoopActionNeeded: BOOLEAN,
mainLoopCV: CONDITION,
managerAction: ManagerAction,
managerActionNeeded: BOOLEAN,
managerBetweenPages: BOOLEAN,
managerBlockStatus: ManagerBlockStatus,
managerContextBuffer: ResMgrStorage.BufferList,
managerContextSize: CARDINAL,
managerCV: CONDITION,
managerProcess: PROCESS,
mediaCount: CARDINAL,
needZoneExtend: BOOLEAN,
newCommand: BOOLEAN,
newParserStatus: BOOLEAN,
newParserStatusCV: CONDITION,
nextLogicalPageNumber: LONG CARDINAL,
nextPageFrame: FrameHandle,
nextPageIPBlock: LONG POINTER TO IPBlockListEntry,
nextPageMediaIndex: CARDINAL,
nextPageOffset: LONG CARDINAL,
nextPagePlex: PublicPrinting.Plex,
nextPageSheetNumber: LONG CARDINAL,
nextPageSide: PublicPrinting.Plex,
nextPageTFormIndex: CARDINAL,
numberOfIPBlockEntrys: CARDINAL,
numberOfPageEntrys: CARDINAL,
objectFault: PreParserCallBack.ObjectFault,
objectPtr: LONG POINTER TO Object,
pageList: LONG POINTER TO PageListEntry,
parserStatus: PreParser.Status,
printingInstructionsPtr: PreParser.PrintInstructionsResultsPtr,
processorList: LONG POINTER TO ProcessorListEntry,
ptrToManagerContext: MainHandle,
sifNodeSizeInWords: LONG CARDINAL,
smZone: UNCOUNTED ZONE,
state: PreParserState,
stateAtInterrupt: PreParserState,
streamDeleted: BOOLEAN,
transactionID: ResMgrIDs.TransactionID ← captureIP,
zoneExtended: BOOLEAN];
```

Copyright © 1992 Xerox Corporation All Rights Reserved

```
PageHandle: TYPE = LONG POINTER TO PageListEntry;

PageEntryStatus: TYPE = {
 needSetup, ready, inProcess, needIPBlock, needZoneExtend, zoneExtended,
 needInsertFileInfo, needIIPBlock, newIIPBlock, pageCompleted, slewWithErrors,
 releasing, stopped};

PageListEntry: TYPE = RECORD [
 fwdLink: LONG POINTER TO PageListEntry,
 contextSize: CARDINAL,
 currentIPBlock: LONG POINTER TO IPBlockListEntry,
 currentIIPBlock: BlockStream.Block,
 firstIIPBlock: BOOLEAN,
 frame: FrameHandle,
 freeNodeList: SIFResultPtr,
 iipBlockStream: BlockStream.StreamHandle,
 logicalPageNumber: LONG CARDINAL,
 mainSystemsError: BOOLEAN,
 mediaIndex: CARDINAL,
 pageStartOffset: LONG CARDINAL,
 pageContextBuffer: ResMgrStorage.BufferList,
 pageResultsPtr: PreParser.PageResultsPtr,
 plex: PublicPrinting.Plex,
 ptrToPageContext: MainHandle,
 sheetNumber: LONG CARDINAL,
 side: PublicPrinting.Plex,
 sifInfoDest: SIFResultPtr,
 sifInfoList: SIFResultPtr,
 status: PageEntryStatus,
 tFormIndex: CARDINAL,
 zoneBlockSize: ResMgrStorage.Pages,
 zoneSegListEnd: ResMgrStorage.BufferList,
 zoneSegListStart: ResMgrStorage.BufferList];

PreParserState: TYPE = {
 idle, starting, parsingPrintingInstructions, waitingForMediaReady,
 settingMedia, proceeding, suspendingForResources,
 suspendingForPreParserFatalError, suspendingForPreParserDiskSaturation,
 proceedingFromSuspend, aborting};

ProcessorListEntry: TYPE = RECORD [
 processor: RTOSMP2Process.MpuID,
 directMainLoop: BOOLEAN,
 mainLoopProcess: PROCESS,
 fwdLink: LONG POINTER TO ProcessorListEntry];

ProcessorSchedulingAction: TYPE = {restrict, unrestrict};

SIFDataType: TYPE = {font, form, ILF, LGO, RES, unknown};
```

Copyright © 1992 Xerox Corporation All Rights Reserved

```
SIFStatusType: TYPE = {badSyntax, found, noAccess, noSuchDirectory, notFound};

SIFResult: TYPE = RECORD [
 next: LONG POINTER TO SIFResult,
 zoneRecPtr: LONG POINTER,
 objectID: DirectoryID.ObjectID,
 status: SIFStatusType,
 var: SELECT dataType: SIFDataType FROM
  font => [],
  form => [],
  ILF => [],
  LGO => [RESInfo: RasterObjects.RESInfo],
  RES => [RESInfo: RasterObjects.RESInfo],
  unknown => [],
  ENDCASE];

SIFResultPtr: TYPE = LONG POINTER TO SIFResult;

StateBlockEntry: TYPE = RECORD [
 blockType: BlockType,
 entryNumber: CARDINAL,
 pageIndex: CARDINAL,
 listPosition: CARDINAL,
 ipBlockStatus: IPBlockEntryStatus,
 ipBlockReferenceCount: CARDINAL,
 ipBlock: BlockStream.Block,
 rmBlock: ResMgrStorage.BufferDescriptor];

preParserBuffer: ResMgrStorage.BufferList;
preParserLogBuffer: ResMgrStorage.BufferList;
preParserLogZone: READONLY UNCOUNTED ZONE;
preParserZone: READONLY UNCOUNTED ZONE;

Error: ERROR [type: ErrorType];
ErrorType: TYPE = {maxSizeExceeded, otherError};

Initialize: PROCEDURE [];

LogProc: PROC [h: Handle, rec: LogRec];

NotifyMainLoopReady: PROCEDURE [
 handle: Handle, currentPageHandle: PageHandle, status: MainStatus]
 RETURNS [
  action: MainAction, h: MainHandle, pageHandle: PageHandle,
  newIPBlock: BlockStream.Block, newZoneBlock: ResMgrStorage.BufferList,
  newIIPBlock: BlockStream.Block, smZone: UNCOUNTED ZONE];

NotifyManagerReady: PROCEDURE [handle: Handle, status: ManagerStatus]
 RETURNS [action: ManagerAction];
```

Copyright © 1992 Xerox Corporation All Rights Reserved

```
SetState: PROCEDURE [handle: Handle, state: PreParserState];

END.
```

Copyright © 1992 Xerox Corporation All Rights Reserved

```
DIRECTORY

 ParserCommon USING [StackActionType],
 PreParserTokenContext USING [ActionArrayPtr, TokenSizeArrayPtr];

PreParserData: DEFINITIONS =

 BEGIN

 OperandLookupTable: TYPE = ARRAY ParserCommon.StackActionType OF
OperandRelPtr;

 OperandLookupTablePtr: TYPE = LONG POINTER TO OperandLookupTable;

 OperandRelPtr: TYPE = OperandTablePtr RELATIVE POINTER TO OperandEntry;

 OperandEntryPtr: TYPE = LONG POINTER TO OperandEntry;

 OperandEntry: TYPE = MACHINE DEPENDENT RECORD [
  seq: SEQUENCE count: CARDINAL OF OperandType];

 OperandEntryOneNum: TYPE = MACHINE DEPENDENT RECORD [
  count(0): CARDINAL ← 1, op1(1): OperandType ← anyNumber];

 OperandEntryTwoNum: TYPE = MACHINE DEPENDENT RECORD [
  count(0): CARDINAL ← 2,
  op1(1): OperandType ← anyNumber,
  op2(2): OperandType ← anyNumber];

 OperandEntryFourNum: TYPE = MACHINE DEPENDENT RECORD [
  count(0): CARDINAL ← 4,
  op1(1): OperandType ← anyNumber,
  op2(2): OperandType ← anyNumber,
  op3(3): OperandType ← anyNumber,
  op4(4): OperandType ← anyNumber];

 OperandEntryOneReal: TYPE = MACHINE DEPENDENT RECORD [
  count(0): CARDINAL ← 1, op1(1): OperandType ← real];

 OperandEntryTwoReal: TYPE = MACHINE DEPENDENT RECORD [
  count(0): CARDINAL ← 2,
  op1(1): OperandType ← real,
  op2(2): OperandType ← real];

 OperandEntryFourReal: TYPE = MACHINE DEPENDENT RECORD [
  count(0): CARDINAL ← 4,
  op1(1): OperandType ← real,
  op2(2): OperandType ← real,
```

Copyright © 1992 Xerox Corporation All Rights Reserved

```
 op3(3): OperandType ← real,
 op4(4): OperandType ← real];

OperandEntrySixReal: TYPE = MACHINE DEPENDENT RECORD [
 count(0): CARDINAL ← 6,
 op1(1): OperandType ← real,
 op2(2): OperandType ← real,
 op3(3): OperandType ← real,
 op4(4): OperandType ← real,
 op5(5): OperandType ← real,
 op6(6): OperandType ← real];

OperandEntryString: TYPE = MACHINE DEPENDENT RECORD [
 count(0): CARDINAL ← 1, op1(1): OperandType ← string];

OperandEntryTransformation: TYPE = MACHINE DEPENDENT RECORD [
 count(0): CARDINAL ← 1, op1(1): OperandType ← transformation];

OperandEntryPixelArray: TYPE = MACHINE DEPENDENT RECORD [
 count(0): CARDINAL ← 1, op1(1): OperandType ← pixelArray];

OperandEntryForMakePixel: TYPE = MACHINE DEPENDENT RECORD [
 count(0): CARDINAL ← 7,
 op1(1): OperandType ← pixelVector,
 op2(2): OperandType ← transformation,
 op3(3): OperandType ← roundedInteger,
 op4(4): OperandType ← roundedInteger,
 op5(5): OperandType ← roundedInteger,
 op6(6): OperandType ← roundedInteger,
 op7(7): OperandType ← roundedInteger];

OperandEntryOneInt: TYPE = MACHINE DEPENDENT RECORD [
 count(0): CARDINAL ← 1, op1(1): OperandType ← roundedInteger];

OperandEntryTwoInt: TYPE = MACHINE DEPENDENT RECORD [
 count(0): CARDINAL ← 2,
 op1(1): OperandType ← roundedInteger,
 op2(2): OperandType ← roundedInteger];

OperandEntryForModifyFont: TYPE = MACHINE DEPENDENT RECORD [
 count(0): CARDINAL ← 2,
 op1(1): OperandType ← transformation,
 op2(2): OperandType ← font];

OperandEntryOneVec: TYPE = MACHINE DEPENDENT RECORD [
 count(0): CARDINAL ← 1, op1(1): OperandType ← vectorOfElements];

OperandEntryForMakeSampBlack: TYPE = MACHINE DEPENDENT RECORD [
 count(0): CARDINAL ← 3,
 op1(1): OperandType ← roundedInteger,
```

Copyright © 1992 Xerox Corporation All Rights Reserved

```
 op2(2): OperandType ← transformation,
 op3(3): OperandType ← pixelArray];

OperandEntryForMaskDashStroke: TYPE = MACHINE DEPENDENT RECORD [
 count(0): CARDINAL ← 4,
 op1(1): OperandType ← real,
 op2(2): OperandType ← real,
 op3(3): OperandType ← vectorOfElements,
 op4(4): OperandType ← trajectory];

OperandEntryTrajectory: TYPE = MACHINE DEPENDENT RECORD [
 count(0): CARDINAL ← 1, op1(1): OperandType ← trajectory];

OperandEntryRealTrajectory: TYPE = MACHINE DEPENDENT RECORD [
 count(0): CARDINAL ← 2,
 op1(1): OperandType ← real,
 op2(2): OperandType ← trajectory];

OperandEntryTwoRealTrajectory: TYPE = MACHINE DEPENDENT RECORD [
 count(0): CARDINAL ← 3,
 op1(1): OperandType ← real,
 op2(2): OperandType ← real,
 op3(3): OperandType ← trajectory];

OperandEntryFourRealTrajectory: TYPE = MACHINE DEPENDENT RECORD [
 count(0): CARDINAL ← 5,
 op1(1): OperandType ← real,
 op2(2): OperandType ← real,
 op3(3): OperandType ← real,
 op4(4): OperandType ← real,
 op5(5): OperandType ← trajectory];

OperandEntryForConicTo: TYPE = MACHINE DEPENDENT RECORD [
 count(0): CARDINAL ← 6,
 op1(1): OperandType ← real,
 op2(2): OperandType ← real,
 op3(3): OperandType ← real,
 op4(4): OperandType ← real,
 op5(5): OperandType ← real,
 op6(6): OperandType ← trajectory];

OperandEntrySixNum: TYPE = MACHINE DEPENDENT RECORD [
 count(0): CARDINAL ← 6,
 op1(1): OperandType ← anyNumber,
 op2(2): OperandType ← anyNumber,
 op3(3): OperandType ← anyNumber,
 op4(4): OperandType ← anyNumber,
 op5(5): OperandType ← anyNumber,
 op6(6): OperandType ← anyNumber];
```

Copyright © 1992 Xerox Corporation All Rights Reserved

```
OperandEntrySixRealTrajectory: TYPE = MACHINE DEPENDENT RECORD [
 count(0): CARDINAL ← 7,
 op1(1): OperandType ← real,
 op2(2): OperandType ← real,
 op3(3): OperandType ← real,
 op4(4): OperandType ← real,
 op5(5): OperandType ← real,
 op6(6): OperandType ← real,
 op7(7): OperandType ← trajectory];

OperandEntryOutline: TYPE = MACHINE DEPENDENT RECORD [
 count(0): CARDINAL ← 1, op1(1): OperandType ← outline];

OperandEntryComposedOp: TYPE = MACHINE DEPENDENT RECORD [
 count(0): CARDINAL ← 1, op1(1): OperandType ← composedOp];

OperandEntryOneOutline: TYPE = MACHINE DEPENDENT RECORD [
 count(0): CARDINAL ← 1, op1(1): OperandType ← outline];

OperandEntryTwoTransformations: TYPE = MACHINE DEPENDENT RECORD [
 count(0): CARDINAL ← 2,
 op1(1): OperandType ← transformation,
 op2(2): OperandType ← transformation];

OperandEntryIntegerVectorOfElements: TYPE = MACHINE DEPENDENT RECORD [
 count(0): CARDINAL ← 2,
 op1(1): OperandType ← roundedInteger,
 op2(2): OperandType ← vectorOfElements];

OperandEntryIntegerAny: TYPE = MACHINE DEPENDENT RECORD [
 count(0): CARDINAL ← 2,
 op1(1): OperandType ← roundedInteger,
 op2(2): OperandType ← anyOtherThanMark];

OperandEntryForISet: TYPE = MACHINE DEPENDENT RECORD [
 count(0): CARDINAL ← 2,
 op0(1): OperandType ← roundedInteger,
 op1(2): OperandType ← specialISet,
 dcsX(3): OperandType ← fixedPointReal,
 dcsY(4): OperandType ← fixedPointReal,
 CorrectMX(5): OperandType ← fixedPointReal,
 CorrectMY(6): OperandType ← fixedPointReal,
 t(7): OperandType ← transformation,
 priority(8): OperandType ← roundedInteger,
 mediumX(9): OperandType ← anyOtherThanMark,
 mediumY(10): OperandType ← anyOtherThanMark,
 fieldXMin(11): OperandType ← anyOtherThanMark,
 fieldYMin(12): OperandType ← anyOtherThanMark,
 fieldXMax(13): OperandType ← anyOtherThanMark,
 fieldYMax(14): OperandType ← anyOtherThanMark,
```

Copyright © 1992 Xerox Corporation All Rights Reserved

```
 font(15): OperandType ← font,
 color(16): OperandType ← color,
 noImage(17): OperandType ← roundedInteger,
 strokeWidth(18): OperandType ← real,
 strokeEnd(19): OperandType ← roundedInteger,
 underLineStart(20): OperandType ← anyNumber,
 amplifySpace(21): OperandType ← fixedPointReal,
 correctPass(22): OperandType ← roundedInteger,
 correctShrink(23): OperandType ← fixedPointReal,
 correctTX(24): OperandType ← fixedPointReal,
 correctTY(25): OperandType ← fixedPointReal,
 strokeJoint(26): OperandType ← roundedInteger,
 clipper(27): OperandType ← clipper];
OperandEntryIntegerString: TYPE = MACHINE DEPENDENT RECORD [
 count(0): CARDINAL ← 2,
 op1(1): OperandType ← roundedInteger,
 op2(2): OperandType ← string];

OperandEntryRealString: TYPE = MACHINE DEPENDENT RECORD [
 count(0): CARDINAL ← 2,
 op1(1): OperandType ← real,
 op2(2): OperandType ← string];

OperandEntryOneMark: TYPE = MACHINE DEPENDENT RECORD [
 count(0): CARDINAL ← 1, op1(1): OperandType ← mark];

OperandEntryAny: TYPE = MACHINE DEPENDENT RECORD [
 count(0): CARDINAL ← 1, op1(1): OperandType ← anyOtherThanMark];

OperandEntryTwoAny: TYPE = MACHINE DEPENDENT RECORD [
 count(0): CARDINAL ← 2,
 op1(1): OperandType ← anyOtherThanMark,
 op2(2): OperandType ← anyOtherThanMark];

OperandEntryMark: TYPE = MACHINE DEPENDENT RECORD [
 count(0): CARDINAL ← 1, op1(1): OperandType ← mark];

OperandType: TYPE = MACHINE DEPENDENT{
 null(0), fixedPointReal(1), real(2), roundedInteger(3),
 nullVectorOfElements(4), grayColor(5), dupPopOrDie(6), mark(7), composedOp(8),
 pixelArray(9), font(10), outline(11), trajectory(12), vectorOfElements(13),
 pixelVector(14), transformation(15), clipper(16), string(17), color(18),
 identifier(19), largeVector(20), runOfCardinalSeq(21),
 runOfRunOfCardinalSeq(22), cardinal(23), anyOtherThanMark(24), anyNumber(25),
 specialSet(26), (31)};

OperandSimpleRange: TYPE = OperandType [null..mark];

OperandFreeViaNodelistRange: TYPE = OperandType [outline..largeVector];
```

Copyright © 1992 Xerox Corporation All Rights Reserved

```
OperandTypePtr: TYPE = LONG POINTER TO OperandType;

OperandTable: TYPE = RECORD [
 oneNum: OperandEntryOneNum ← [],
 twoNum: OperandEntryTwoNum ← [],
 fourNum: OperandEntryFourNum ← [],
 oneReal: OperandEntryOneReal ← [],
 twoReal: OperandEntryTwoReal ← [],
 fourReal: OperandEntryFourReal ← [],
 sixReal: OperandEntrySixReal ← [],
 string: OperandEntryString ← [],
 transform: OperandEntryTransformation ← [],
 pixelArray: OperandEntryPixelArray ← [],
 forMakePixel: OperandEntryForMakePixel ← [],
 oneInt: OperandEntryOneInt ← [],
 twoInt: OperandEntryTwoInt ← [],
 modifyFont: OperandEntryForModifyFont ← [],
 oneVec: OperandEntryOneVec ← [],
 forMakeSampBlack: OperandEntryForMakeSampBlack ← [],
 forMaskDashStroke: OperandEntryForMaskDashStroke ← [],
 trajectory: OperandEntryTrajectory ← [],
 realTrajectory: OperandEntryRealTrajectory ← [],
 twoRealTrajectory: OperandEntryTwoRealTrajectory ← [],
 fourRealTrajectory: OperandEntryFourRealTrajectory ← [],
 forConicTo: OperandEntryForConicTo ← [],
 sixRealTrajectory: OperandEntrySixRealTrajectory ← [],
 outline: OperandEntryOutline ← [],
 composedOp: OperandEntryComposedOp ← [],
 oneOutline: OperandEntryOneOutline ← [],
 twoTransforms: OperandEntryTwoTransformations ← [],
 integerVectorOfElements: OperandEntryIntegerVectorOfElements ← [],
 integerString: OperandEntryIntegerString ← [],
 realString: OperandEntryRealString ← [],
 integerAny: OperandEntryIntegerAny ← [],
 forISet: OperandEntryForISet ← [],
 any: OperandEntryAny ← [],
 twoAny: OperandEntryTwoAny ← [],
 mark: OperandEntryMark ← []];

OperandTablePtr: TYPE = LONG BASE POINTER TO OperandTable;

OperandConversion: TYPE = MACHINE DEPENDENT{
 done(0), invalidOperand(1), unimplementedConversion(2), markNotFound(3),
 unexpectedMark(4), realToInteger(5), realToFixedPointReal(6),
 largeVectorToString(7), vectorOfElementsToString(8), doSpecialISet(9),
 fixedPointRealToInteger(10), unimplementedRESInfo(11),
 fixedPointRealToReal(12), largeVectorToPixelVector(13),
 largeVectorToVectorOfElements(14)};

OperandConversionTable: TYPE = ARRAY StackType OF OperandConversionRec;
```

Copyright © 1992 Xerox Corporation All Rights Reserved

```
OperandConversionTablePtr: TYPE = LONG POINTER TO OperandConversionTable;

OperandConversionRec: TYPE = ARRAY OperandType OF OperandConversion;

StackType: TYPE = OperandType [VAL[0]..anyOtherThanMark);


debug: BOOLEAN;

microcodeMismatch: BOOLEAN;

execActions: PreParserTokenContext.ActionArrayPtr;

skipActions: PreParserTokenContext.ActionArrayPtr;

tokenSizes: PreParserTokenContext.TokenSizeArrayPtr;

microcodeVersion: CARDINAL;

operandTablePtr: OperandTablePtr;

operandLookupTablePtr: OperandLookupTablePtr;

operandConversionTablePtr: OperandConversionTablePtr;

InitializeModule: PROCEDURE [];
InitializeData: PROCEDURE [];
InitializeMoreData: PROCEDURE [];
UninitializeData: PROCEDURE [];
InitializeModuleA: PROCEDURE [];
InitializeModuleB: PROCEDURE [];
END.
```

Copyright © 1992 Xerox Corporation All Rights Reserved

```
DIRECTORY
 PreParserCommon USING [MainHandle];
PreParserExtra: DEFINITIONS =
 BEGIN

 ArithmeticError: SIGNAL [];

 ClipRectangle: PROCEDURE [h: PreParserCommon.MainHandle]
  RETURNS [loop: BOOLEAN ← FALSE];

 ContinueNextAction: PROCEDURE [h: PreParserCommon.MainHandle] RETURNS [];

 ErrorOp: PROCEDURE [h: PreParserCommon.MainHandle] RETURNS [loop: BOOLEAN];

 FGetMesa: PROCEDURE [h: PreParserCommon.MainHandle] RETURNS [loop: BOOLEAN];

 FSetMesa: PROCEDURE [h: PreParserCommon.MainHandle] RETURNS [loop: BOOLEAN];

 GetCP: PUBLIC PROCEDURE [h: PreParserCommon.MainHandle] RETURNS [loop:
BOOLEAN];

 ISetMesa: PROCEDURE [h: PreParserCommon.MainHandle] RETURNS [loop: BOOLEAN];

 Move: PUBLIC PROCEDURE [h: PreParserCommon.MainHandle] RETURNS [loop:
BOOLEAN];

 NextActionMesa: PROCEDURE [h: PreParserCommon.MainHandle] RETURNS [];

 NoteNewT: PROCEDURE [h: PreParserCommon.MainHandle] RETURNS [];
 PopOperandsMesa: PROCEDURE [h: PreParserCommon.MainHandle]
  RETURNS [alwaysLoop: BOOLEAN ← TRUE];

 ReportFPUProblem: PROCEDURE [h: PreParserCommon.MainHandle];

 SetErrorStatus: PROCEDURE [h: PreParserCommon.MainHandle] RETURNS [];

 SetXYMesa: PROCEDURE [h: PreParserCommon.MainHandle] RETURNS [loop:
BOOLEAN];

 ShowMesa: PUBLIC PROCEDURE [h: PreParserCommon.MainHandle]
```

Copyright © 1992 Xerox Corporation All Rights Reserved

```
 RETURNS [loop: BOOLEAN];

ShowAndXRel: PUBLIC PROCEDURE [h: PreParserCommon.MainHandle]
 RETURNS [loop: BOOLEAN];

ShowAndFixedXRel: PUBLIC PROCEDURE [h: PreParserCommon.MainHandle]
 RETURNS [loop: BOOLEAN];

Trans: PUBLIC PROCEDURE [h: PreParserCommon.MainHandle] RETURNS [loop:
BOOLEAN];


TransformIPPoint: PROCEDURE [h: PreParserCommon.MainHandle] RETURNS [];

TransformIPVector: PROCEDURE [h: PreParserCommon.MainHandle] RETURNS [];

VectorOfElementsToString: PROCEDURE [
 h: PreParserCommon.MainHandle, operationStage: CARDINAL]
 RETURNS [exitPopOperands: BOOLEAN];


Initialize: PROCEDURE;
InitializeModuleA: PROCEDURE;

END.
```

Copyright © 1992 Xerox Corporation All Rights Reserved

```
DIRECTORY

 PreParserCommon USING [MainHandle];

PreParserFilled: DEFINITIONS =

 BEGIN

 MakeOutline: PROCEDURE [h: PreParserCommon.MainHandle]
  RETURNS [loop: BOOLEAN ← FALSE];

 MaskFill: PROCEDURE [h: PreParserCommon.MainHandle]
  RETURNS [loop: BOOLEAN ← FALSE];

 MaskRectangleMesa: PROCEDURE [h: PreParserCommon.MainHandle]
  RETURNS [loop: BOOLEAN ← FALSE];

 MaskTrapezoidX: PROCEDURE [h: PreParserCommon.MainHandle]
  RETURNS [loop: BOOLEAN ← FALSE];

 MaskTrapezoidY: PROCEDURE [h: PreParserCommon.MainHandle]
  RETURNS [loop: BOOLEAN ← FALSE];

 Initialize: PROCEDURE [];

 END.
```

Copyright © 1992 Xerox Corporation All Rights Reserved

```
DIRECTORY
 PreParserCommon USING [MainHandle];

PreParserFont: DEFINITIONS =
 BEGIN

 CheckFontMesa: PROCEDURE [h: PreParserCommon.MainHandle]
  RETURNS [loop: BOOLEAN];

 FindFont: PROCEDURE [h: PreParserCommon.MainHandle] RETURNS [loop: BOOLEAN];

 ModifyFont: PROCEDURE [h: PreParserCommon.MainHandle] RETURNS [loop:
BOOLEAN];

 SetFontMesa: PROCEDURE [h: PreParserCommon.MainHandle] RETURNS [loop:
BOOLEAN];

 Initialize: PROCEDURE;
```

Copyright © 1992 Xerox Corporation All Rights Reserved

```
DIRECTORY

 PreParserCommon USING [ComplexNode, MainHandle, StackEntry, StackEntryPtr];

PreParserFrameStack: DEFINITIONS =

 BEGIN

 ChangeOneComplexNodeRefCount: PUBLIC PROCEDURE [
  cnPtr: LONG POINTER TO PreParserCommon.ComplexNode, delta: INTEGER]
  RETURNS [];

 ChangeRefCountAndFree: PUBLIC PROCEDURE [
  h: PreParserCommon.MainHandle, ptr: LONG POINTER, delta: INTEGER] RETURNS [];

 ComplexNodeRefCount: PUBLIC PROCEDURE [
  h: PreParserCommon.MainHandle, entryPtr: PreParserCommon.StackEntryPtr,
  delta: INTEGER] RETURNS [];

 CleanUpFrames: PROCEDURE [h: PreParserCommon.MainHandle, delta: INTEGER];

 CleanUpPage: PROCEDURE [h: PreParserCommon.MainHandle]
  RETURNS [extendZone: BOOLEAN ← FALSE];

 CopyFrameEntriesPtrs: PUBLIC PROCEDURE [h: PreParserCommon.MainHandle]
  RETURNS [];

 CopyStackEntry: PROCEDURE [h: PreParserCommon.MainHandle]
  RETURNS [nullEntry: BOOLEAN];

 GuaranteeStackSpace: PUBLIC PROCEDURE [h: PreParserCommon.MainHandle]
  RETURNS [extendZone: BOOLEAN];

 ImagerVarsComplexNode: PUBLIC PROCEDURE [
  h: PreParserCommon.MainHandle, delta: INTEGER] RETURNS [];

 PopFrame: PROCEDURE [h: PreParserCommon.MainHandle] RETURNS [];

 PopStack: PROCEDURE [h: PreParserCommon.MainHandle]
  RETURNS [fatalError: BOOLEAN];

 PushFrame: PUBLIC PROCEDURE [h: PreParserCommon.MainHandle]
  RETURNS [extendZone: BOOLEAN];

 PushStack: PROCEDURE [h: PreParserCommon.MainHandle]
  RETURNS [extendZone: BOOLEAN];

 RefChangeComplexNode: PUBLIC PROCEDURE [
  cnPtr: LONG POINTER TO PreParserCommon.ComplexNode, delta: INTEGER]
```

Copyright © 1992 Xerox Corporation All Rights Reserved

```
  RETURNS [];
END.
```

Copyright © 1992 Xerox Corporation All Rights Reserved

```
DIRECTORY

 CoalescerTable USING [
  BitMapEntry, BitMapEntryLink, BitMapEntryLinkHandle, UnknownFontEntry,
  UnknownFontEntryLink, UnknownFontEntryLinkHandle],
 Heap USING [Error],
 PreParserCommon USING [
  nullBitMapEntry, nullUnknownFontTableEntry, MainHandle, maxFonts, maxImages],
 PreParserMainErrors USING [smHeapAllocationError],
 ResMgr USING [Error];

PreParserInline: DEFINITIONS IMPORTS Heap, ResMgr =

 BEGIN


 WordSeq: TYPE = RECORD [SEQUENCE COMPUTED CARDINAL OF WORD];


 CloseBitMapEntry: PROCEDURE [h: PreParserCommon.MainHandle] RETURNS [] = INLINE
  BEGIN
  h.bitMapTableCurrentLength ← h.bitMapTableCurrentLength + 1;
  h.bitMapTableTotalLength ← h.bitMapTableTotalLength + 1;
  h.bitMapEntryPtr ← h.bitMapEntryPtr + SIZE[CoalescerTable.BitMapEntry];
  RETURN[];
  END;
 CloseUnknownFontEntry: PROCEDURE [h: PreParserCommon.MainHandle] RETURNS [] =
  INLINE
  BEGIN
  h.unknownFontTableCurrentLength ← h.unknownFontTableCurrentLength + 1;
  h.unknownFontTableTotalLength ← h.unknownFontTableTotalLength + 1;
  h.unknownFontEntryPtr ←
   h.unknownFontEntryPtr + SIZE[CoalescerTable.UnknownFontEntry];
  RETURN[];
  END;
 OpenBitMapEntry: PROCEDURE [h: PreParserCommon.MainHandle]
  RETURNS [error: BOOLEAN] = INLINE
  BEGIN
  ENABLE {
   Heap.Error, ResMgr.Error => {
    h.errorCode ← PreParserMainErrors.smHeapAllocationError;
    h.pc.pcm.data.code ← 0;
    error ← TRUE;
    CONTINUE}};

  tempBitMapLinkHandle: CoalescerTable.BitMapEntryLinkHandle;

  IF h.bitMapTableCurrentLength = PreParserCommon.maxImages THEN {
   tempBitMapLinkHandle ← h.smZone.NEW[CoalescerTable.BitMapEntryLink];
```

Copyright © 1992 Xerox Corporation All Rights Reserved

```
    tempBitMapLinkHandle.next ← NIL;
    tempBitMapLinkHandle.list ← DESCRIPTOR[
     h.smZone.NEW[
      WordSeq [CoalescerTable.BitMapEntry.SIZE * PreParserCommon.maxImages]],
      PreParserCommon.maxImages];

    FOR index: CARDINAL IN [0..PreParserCommon.maxImages) DO
     tempBitMapLinkHandle.list[index] ← PreParserCommon.nullBitMapEntry;
     ENDLOOP;

    h.bitMapTablePtrCurrent.next ← tempBitMapLinkHandle;
    h.bitMapTablePtrCurrent.list ← DESCRIPTOR[
     h.bitMapTablePtrCurrent.list.BASE, h.bitMapTableCurrentLength];
    h.bitMapTablePtrCurrent ← tempBitMapLinkHandle;
    h.bitMapTableCurrentLength ← 0;
    h.bitMapEntryPtr ← @h.bitMapTablePtrCurrent.list[0]};

  RETURN[FALSE];
  END;
 OpenUnknownFontEntry: PROCEDURE [h: PreParserCommon.MainHandle]
  RETURNS [error: BOOLEAN] = INLINE
  BEGIN
  ENABLE {
   Heap.Error, ResMgr.Error => {
    h.errorCode ← PreParserMainErrors.smHeapAllocationError;
    h.pc.pcm.data.code ← 0;
    error ← TRUE;
    CONTINUE}};

  tempUnknownFontLinkHandle: CoalescerTable.UnknownFontEntryLinkHandle;

  IF h.unknownFontTableCurrentLength = PreParserCommon.maxFonts THEN {
   tempUnknownFontLinkHandle ← h.smZone.NEW[
    CoalescerTable.UnknownFontEntryLink];
   tempUnknownFontLinkHandle.next ← NIL;
   tempUnknownFontLinkHandle.list ← DESCRIPTOR[
    h.smZone.NEW[
     WordSeq
     [CoalescerTable.UnknownFontEntry.SIZE * PreParserCommon.maxFonts]],
     PreParserCommon.maxFonts];
   FOR index: CARDINAL IN [0..PreParserCommon.maxFonts) DO
    tempUnknownFontLinkHandle.list[index] ←
     PreParserCommon.nullUnknownFontTableEntry;
    ENDLOOP;

   h.unknownFontTablePtrCurrent.next ← tempUnknownFontLinkHandle;
   h.unknownFontTablePtrCurrent.list ← DESCRIPTOR[
    h.unknownFontTablePtrCurrent.list.BASE, h.unknownFontTableCurrentLength];
   h.unknownFontTablePtrCurrent ← tempUnknownFontLinkHandle;
   h.unknownFontTableCurrentLength ← 0;
```

Copyright © 1992 Xerox Corporation All Rights Reserved

```
  h.unknownFontEntryPtr ← @h.unknownFontTablePtrCurrent.list[0]};

 RETURN[FALSE];
 END;
LookUpBitMapEntry: PROCEDURE [h: PreParserCommon.MainHandle, index: CARDINAL]
=
 INLINE
 BEGIN

 tableRecordPtr: CoalescerTable.BitMapEntryLinkHandle ← h.bitMapTablePtrStart;

 WHILE index > PreParserCommon.maxImages DO
  index ← index - PreParserCommon.maxImages;
  tableRecordPtr ← tableRecordPtr.next;
  ENDLOOP;

 h.bitMapLookedUpPtr ← @tableRecordPtr.list[index];
 END;

LookUpUnknownFontEntry: PROCEDURE [
 h: PreParserCommon.MainHandle, index: CARDINAL] = INLINE
 BEGIN

 tableRecordPtr: CoalescerTable.UnknownFontEntryLinkHandle ←
  h.unknownFontTablePtrStart;

 WHILE index > PreParserCommon.maxFonts DO
  index ← index - PreParserCommon.maxFonts;
  tableRecordPtr ← tableRecordPtr.next;
  ENDLOOP;

 h.unknownFontLookedUpPtr ← @tableRecordPtr.list[index];
 END;
END.
```

Copyright © 1992 Xerox Corporation All Rights Reserved

```
DIRECTORY;

PreParserInterpress: DEFINITIONS =
 BEGIN

 headerLength: CARDINAL = 17;
 header: PACKED ARRAY [0..headerLength) OF CHARACTER = [
  'I, 'n, 't, 'e, 'r, 'p, 'r, 'e, 's, 's, '/, 'X, 'e, 'r, 'o, 'x, '/];
 LongOperator: TYPE = MACHINE DEPENDENT{
  zero(0), nop(1), setXY(10), setXYRel(11), setXRel(12), setYRel(13),
  lineToX(14), lineToY(15), space(16), get(17), iGet(18), iSet(19), fGet(20),
  fSet(21), show(22), lineTo(23), maskStroke(24), moveTo(25), thirtyTwo(32),
  begin(102), end(103), contentInstructions(105), beginBrace(106),
  endBrace(107), correct(110), makeSimpleCO(114), findOperator(116),
  doSaveSimpleBody(120), showAndFixedXRel(145), showAndXRel(146), findFont(147),
  modifyFont(148), findDecompressor(149), setFont(151), setCorrectMeasure(154),
  setCorrectTolerance(155), correctMask(156), correctSpace(157), getCP(159),
  makeT(160), translate(162), rotate(163), scale(164), concat(165), scale2(166),
  concatT(168), move(169), trans(170), pop(180), dup(181), copy(183), roll(184),
  exch(185), mark(186), unmark(187), count(188), unmark0(192), abs(200),
  add(201), and(202), ceiling(203), div(204), eq(205), floor(206), ge(207),
  gt(208), mod(209), mul(210), neg(211), not(212), or(213), sub(214),
  trunc(215), rem(216), round(217), type(220), do(231), doSave(232),
  doSaveAll(233), if(239), ifCopy(240), ifElse(241), makeVecLU(282),
  makeVec(283), shape(285), getP(286), getProp(287), mergeProp(288),
  curveTo(402), arcTo(403), conicTo(404), maskFill(409), maskRectangle(410),
  maskTrapezoidX(411), maskTrapezoidY(412), startUnderline(413),
  maskUnderline(414), makeOutlineOdd(416), makeOutline(417), clipOutline(418),
  clipRectangle(419), findColorOp(421), findColorModelOp(422), findColor(423),
  setGray(424), makeGray(425), makeSampledBlack(426), setSampledBlack(428),
  maskStrokeClosed(440), maskVector(441), maskDashedStroke(442),
  makePixelArray(450), extractPixel(451), maskPixel(452)};

 ErrorOpCode: CARDINAL = 600;
 ShortOperator: TYPE = LongOperator [zero..thirtyTwo);
 LongValidOperator: TYPE = LongOperator [zero..maskPixel];
 LongAnyOperator: TYPE = LongOperator [zero..maskPixel];
 LongSequenceLengthHigh: TYPE = CARDINAL [0..256);
 LongSequenceLengthLow: TYPE = CARDINAL;

 SequenceType: TYPE = MACHINE DEPENDENT{
  (0), sequenceString(1), sequenceInteger(2), sequenceInsertMaster(3),
  sequenceRational(4), sequenceIdentifier(5), sequenceComment(6),
  sequenceContinued(7), sequenceLargeVector(8), sequencePackedPixelVector(9),
  sequenceCompressedPixelVector(10), sequenceInsertFile(11),
  sequenceAdaptivePixelVector(12), sequenceCCITT4PixelVector(13), (31)};

 shortNumberBias: INTEGER = 4000;

 ShortNumber: TYPE = INTEGER
```

Copyright © 1992 Xerox Corporation All Rights Reserved

```
[(INTEGER[0] - shortNumberBias)..(LAST[INTEGER] - shortNumberBias)];

ShortNumberBiased13: TYPE = [0..8192);
ShortSequenceLength: TYPE = CARDINAL [0..256);

TokenType: TYPE = MACHINE DEPENDENT{
 shortNumber0(0), shortNumber8K(1), shortNumber16K(2), shortNumber24K(3),
 shortOperator(4), longOperator(5), shortSequence(6), longSequence(7)};

Token: TYPE = MACHINE DEPENDENT RECORD [
 var(0): SELECT type(0:0..2): TokenType FROM
  shortNumber0 => [number(0:3..15): ShortNumberBiased13],
  shortNumber8K => [number(0:3..15): ShortNumberBiased13],
  shortNumber16K => [number(0:3..15): ShortNumberBiased13],
  shortNumber24K => [number(0:3..15): ShortNumberBiased13],
  shortOperator => [
   shortOperator(0:3..7): ShortOperator, discard(0:8..15): [0..256) <- 0],
  longOperator => [longOperator(0:3..15): LongOperator],
  shortSequence => [
   sequenceType(0:3..7): SequenceType, length(0:8..15): ShortSequenceLength],
  longSequence => [
   sequenceType(0:3..7): SequenceType,
   lengthHigh(0:8..15): LongSequenceLengthHigh,
   lengthLow(1): LongSequenceLengthLow],
  ENDCASE];

ImagerVariable: TYPE = MACHINE DEPENDENT{
 DCScpx(0), DCScpy(1), correctMX(2), correctMY(3), T(4), priorityImportant(5),
 mediumXSize(6), mediumYSize(7), fieldXMin(8), fieldYMin(9), fieldXMax(10),
 fieldYMax(11), font(12), color(13), noImage(14), strokeWidth(15),
 strokeEnd(16), underlineStart(17), amplifySpace(18), correctPass(19),
 correctShrink(20), correctTX(21), correctTY(22), strokeJoint(23),
 clipper(24)};

StrokeEnd: TYPE = MACHINE DEPENDENT{square(0), butt(1), round(2)};

StrokeJoint: TYPE = MACHINE DEPENDENT{miter(0), bevel(1), round(2)};

END.
```

Copyright © 1992 Xerox Corporation All Rights Reserved

```
DIRECTORY

 BlockStream USING [Block],
 PreParser USING [
  JobMediaDataPtr, JobProceedDataPtr, PageResultsPtr,
  PrintInstructionsResultsPtr],
 PreParserCommon USING [MainHandle],
 PreParserControl USING [
  FrameHandle, Handle, MainHandle, MainStatus, PageHandle],
 PublicPrinting USING [Plex],
 ResMgrStorage USING [BufferList, Pages];

PreParserMain: DEFINITIONS =

 BEGIN

 DoMainLoop: PROCEDURE [handle: PreParserControl.Handle];

 FreeAllOptions: PROCEDURE [
  proceedDataPtr: PreParser.JobProceedDataPtr,
  printingInstructionsPtr: PreParser.PrintInstructionsResultsPtr,
  z: UNCOUNTED ZONE];

 DoTokenLoop: PROCEDURE [
  mainHandle: PreParserControl.MainHandle,
  newZoneBlock: ResMgrStorage.BufferList, smZone: UNCOUNTED ZONE,
  newIPBlock: BlockStream.Block, newIIPBlock: BlockStream.Block]
  RETURNS [status: PreParserControl.MainStatus];

 GetAllocSizes: PROCEDURE []
  RETURNS [
   contextSizeInWords: CARDINAL, zoneBlockSizeInPages: ResMgrStorage.Pages];

 InitContext: PROCEDURE [
  currentPageHandle: PreParserControl.PageHandle, execute: BOOLEAN,
  initialFrame: PreParserControl.FrameHandle,
  initialZoneBlock: ResMgrStorage.BufferList, handle: PreParserControl.Handle,
  jobMediaDataPtr: PreParser.JobMediaDataPtr, logicalPageNumber: LONG CARDINAL,
  mainHandle: PreParserControl.MainHandle, mediaIndex: CARDINAL,
  plex: PublicPrinting.Plex, proceedDataPtr: PreParser.JobProceedDataPtr,
  sheetNumber: LONG CARDINAL, side: PublicPrinting.Plex, tFormIndex: CARDINAL]
  RETURNS [failed: BOOLEAN ← FALSE];

 InitMedia: PROCEDURE [
  mainHandle: PreParserControl.MainHandle,
  jobMediaDataPtr: PreParser.JobMediaDataPtr] RETURNS [failed: BOOLEAN ← FALSE];

 CleanUpContext: PROCEDURE [
  currentPage: PreParserControl.PageHandle,
```

Copyright © 1992 Xerox Corporation All Rights Reserved

```
  mainHandle: PreParserCommon.MainHandle,
  pageResultsPtr: PreParser.PageResultsPtr] RETURNS [];

MgrCleanUpContext: PROCEDURE [mainHandle: PreParserControl.MainHandle]
  RETURNS [];

AllocateNode: PROCEDURE [
  mainHandle: PreParserControl.MainHandle, nodeSizeInWords: CARDINAL]
  RETURNS [nodePtr: LONG POINTER, extendZone: BOOLEAN];

FreeNode: PROCEDURE [
  mainHandle: PreParserControl.MainHandle, nodePtr: LONG POINTER] RETURNS [];

Initialize: PROCEDURE [];
Uninitialize: PROCEDURE [];
END.
```

Copyright © 1992 Xerox Corporation All Rights Reserved

```
DIRECTORY
 Environment USING [Byte];

PreParserMainErrors: DEFINITIONS =
 BEGIN

 ErrorCode: TYPE = CARDINAL;
 InternalErrorCode: TYPE = Environment.Byte;


 unexpectedError: InternalErrorCode = 0;
 unimplementedSequenceType: InternalErrorCode = 1;
 invalidSequenceType: InternalErrorCode = 2;
 unrecognizedOperator: InternalErrorCode = 3;
 unexpectedOperator: InternalErrorCode = 4;
 unexpectedEOF: InternalErrorCode = 5;
 unimplementedFeature: InternalErrorCode = 6;
 unexpectedSignal: InternalErrorCode = 7;
 invalidOperandTypeOnStack: InternalErrorCode = 8;
 unimplementedTypeConversion: InternalErrorCode = 9;
 markNotFoundOnStack: InternalErrorCode = 10;
 unexpectedMark: InternalErrorCode = 11;
 stackUnderflow: InternalErrorCode = 12;
 numericError: InternalErrorCode = 13;
 nestedContentInstrsUnimpld: InternalErrorCode = 14;
 nestedCORRECTs: InternalErrorCode = 15;
 iipFragMgrError: InternalErrorCode = 16;
 longSequencesNotImpld: InternalErrorCode = 17;
 badMediaIndex: InternalErrorCode = 18;
 outputOperatorNotAllowed: InternalErrorCode = 19;
 invalidNode: InternalErrorCode = 20;
 badISetIndex: InternalErrorCode = 21;
 badISetUsage: InternalErrorCode = 22;
 badFrameIndex: InternalErrorCode = 23;
 badFrameIndexFSet: InternalErrorCode = 24;
 badVectorIndex: InternalErrorCode = 26;
 invalidTypeForSetFont: InternalErrorCode = 28;
 unimplementedRESInfo: InternalErrorCode = 30;
 noFontSpecified: InternalErrorCode = 31;
 badOperandValue: InternalErrorCode = 35;
 notAnInterpressFile: InternalErrorCode = 37;
 unexpectedIPTrap: InternalErrorCode = 38;
 softwareBugNoIIP: InternalErrorCode = 39;
 insertFileProblem: InternalErrorCode = 40;
 insertFileNotFound: InternalErrorCode = 41;
 badInsertFileSyntax: InternalErrorCode = 43;
 pageInitError: InternalErrorCode = 45;
 badPropertyVectorStructure: InternalErrorCode = 48;
 badTypeForPropertyName: InternalErrorCode = 51;
```

Copyright © 1992 Xerox Corporation All Rights Reserved

```
propertyNameNotFound: InternalErrorCode = 52;
markMissingAtPageEnd: InternalErrorCode = 54;
stackNotEmptyAtPageEnd: InternalErrorCode = 55;
imageInstallError: InternalErrorCode = 56;
imageInstallDirError: InternalErrorCode = 57;
findOperationFailed: InternalErrorCode = 59;
errorOperatorExecuted: InternalErrorCode = 60;
unexpectedIPFunction: InternalErrorCode = 61;
badPrintingInstrType: InternalErrorCode = 62;
badPrintingInstrValue: InternalErrorCode = 63;
imageInstallOtherError: InternalErrorCode = 64;
imageInstallBccError: InternalErrorCode = 65;
imageInstallAcqBufferError: InternalErrorCode = 67;
negativeMakeVecLUbounds: InternalErrorCode = 71;
insufficientDiskSpace: InternalErrorCode = 73;
insufficientMemory: InternalErrorCode = 74;
invalidCurrentPosition: InternalErrorCode = 75;
smHeapAllocationError: InternalErrorCode = 77;
rasterDirectoryFull: InternalErrorCode = 78;
imageInstallNotAvailable: InternalErrorCode = 68;
tooManyFragFiles: InternalErrorCode = 79;
tooManyFrags: InternalErrorCode = 80;
mgrSMHeapAllocationError: InternalErrorCode = 81;
coverMediaIndex: InternalErrorCode = 82;
colorSubstituted: InternalErrorCode = 83;
initializeFPUProblem: ErrorCode = 880;
noMicrocode: ErrorCode = 950;
fpuProblem: ErrorCode = 951;
microcodeVersionMismatch: ErrorCode = 1000;
END.
```

Copyright © 1992 Xerox Corporation All Rights Reserved

```
DIRECTORY

 BlockStream USING [Block],
 PreParserControl USING [
  Handle, MainAction, MainHandle, MainStatus, PageListEntry],
 ResMgrStorage USING [BufferList];

PreParserMainLoopControl: DEFINITIONS =

 BEGIN

 Initialize: PROCEDURE [] RETURNS [];

 SetMainLoopStatus: PROCEDURE [
  handle: PreParserControl.Handle,
  currentPageHandle: LONG POINTER TO PreParserControl.PageListEntry,
  status: PreParserControl.MainStatus] RETURNS [];

 SetMainLoopReturn: PROCEDURE [handle: PreParserControl.Handle]
  RETURNS [
   needIPBlock: BOOLEAN, needToWait: BOOLEAN,
   action: PreParserControl.MainAction, h: PreParserControl.MainHandle,
   pageHandle: LONG POINTER TO PreParserControl.PageListEntry,
   newIPBlock: BlockStream.Block, newZoneBlock: ResMgrStorage.BufferList,
   newIIPBlock: BlockStream.Block];

 END.
```

Copyright © 1992 Xerox Corporation All Rights Reserved

```
DIRECTORY
 PreParserCommon USING [MainHandle];
PreParserMainOps: DEFINITIONS =
 BEGIN
 CheckGraphic: PROCEDURE [h: PreParserCommon.MainHandle]
  RETURNS [needIIPBlock: BOOLEAN];
 CheckPosition: PROCEDURE [h: PreParserCommon.MainHandle]
  RETURNS [needIIPBlock: BOOLEAN];
 CheckStroke: PROCEDURE [h: PreParserCommon.MainHandle]
  RETURNS [needIIPBlock: BOOLEAN];
 CheckTextVars: PROCEDURE [h: PreParserCommon.MainHandle]
  RETURNS [loop: BOOLEAN];
 FreeNodeList: PROCEDURE [h: PreParserCommon.MainHandle] RETURNS [];
 ShortNumberMesa: PUBLIC PROCEDURE [h: PreParserCommon.MainHandle]
  RETURNS [loop: BOOLEAN ← FALSE];
 PutToken: PROCEDURE [h: PreParserCommon.MainHandle]
  RETURNS [needIIPBlock: BOOLEAN];
 END.
```

Copyright © 1992 Xerox Corporation All Rights Reserved

```
DIRECTORY

 PreParserControl USING [
  Handle, ManagerStatus, PageHandle, ProcessorSchedulingAction];

PreParserManager: DEFINITIONS =

 BEGIN

 DoManager: PROCEDURE [handle: PreParserControl.Handle] RETURNS [];

 DoProcessorScheduling: PROCEDURE [
  parserList: PreParserControl.Handle, handle: PreParserControl.Handle,
  action: PreParserControl.ProcessorSchedulingAction] RETURNS [];

 Initialize: PROCEDURE [] RETURNS [];

 PutPreParserCommand: PROCEDURE [
  parserList: PreParserControl.Handle, h: PreParserControl.Handle] RETURNS [];

 ReportPreParserStatus: PROCEDURE [h: PreParserControl.Handle] RETURNS [];

 SetManagerStatus: PROCEDURE [
  handle: PreParserControl.Handle, status: PreParserControl.ManagerStatus]
  RETURNS [notifyMainLoop: BOOLEAN, notifyStreamAquire: BOOLEAN];

 WritePartialPage: PROCEDURE [
  h: PreParserControl.Handle, ph: PreParserControl.PageHandle] RETURNS [];

 END.
```

Copyright © 1993 Xerox Corporation. All Rights Reserved

```
DIRECTORY

 PreParserCommon USING [MainHandle, PixelArrayPtr],
 PreParserMainErrors USING [InternalErrorCode];

PreParserSequence: DEFINITIONS =

 BEGIN

 LookAhead: PROCEDURE [h: PreParserCommon.MainHandle]
  RETURNS [
   lastBuffer, newBlock, sequenceContinued, lookAheadAgain: BOOLEAN ← FALSE];

 SkipSequenceMesa: PUBLIC PROCEDURE [h: PreParserCommon.MainHandle]
  RETURNS [loop: BOOLEAN];

 SequenceMesa: PROCEDURE [h: PreParserCommon.MainHandle]
  RETURNS [loop: BOOLEAN ← TRUE];

 SIFFound: PUBLIC PROCEDURE [h: PreParserCommon.MainHandle]
  RETURNS [loop: BOOLEAN];

 InstallFailed: SIGNAL [
  imError: PreParserMainErrors.InternalErrorCode, faultCode: CARDINAL];

 InstallPixelArray: PROCEDURE [
  h: PreParserCommon.MainHandle, pa: PreParserCommon.PixelArrayPtr];

 Initialize: PROCEDURE;

 END.
```

Copyright © 1992 Xerox Corporation All Rights Reserved

```
DIRECTORY
 PreParserCommon USING [MainHandle, PixelVectorPtr];

PreParserSequencePrivate: DEFINITIONS =

 BEGIN

 ExtendZone: SIGNAL;
 NeedIPBlock: SIGNAL;
 TryInMemoryPixelVector: PROC [
  h: PreParserCommon.MainHandle, pv: PreParserCommon.PixelVectorPtr]
  RETURNS [succesful: BOOLEAN ← FALSE];

 StartupPixelVectorInstall: PROC [
  h: PreParserCommon.MainHandle, pv: PreParserCommon.PixelVectorPtr];

 END.
```

Copyright © 1992 Xerox Corporation All Rights Reserved

```
DIRECTORY

 Environment USING [bytesPerPage],
 PreParserControl USING [Handle, ManagerStatus];

PreParserSetup: DEFINITIONS =

 BEGIN

 minimumIIPBlockSize: LONG CARDINAL = 1 * Environment.bytesPerPage;
 nominalIPBlockSize: LONG CARDINAL = 87;
 nominalIIPBlockSize: LONG CARDINAL = 30 * Environment.bytesPerPage;
 nominalZoneSize: LONG CARDINAL = 10;

 Initialize: PROCEDURE [] RETURNS [];

 SetupPageList: PROCEDURE [handle: PreParserControl.Handle]
  RETURNS [status: PreParserControl.ManagerStatus];

 SetupPreParser: PROCEDURE [handle: PreParserControl.Handle]
  RETURNS [status: PreParserControl.ManagerStatus];

 END.
```

Copyright © 1992 Xerox Corporation All Rights Reserved

```
DIRECTORY

 BlockStream USING [Block],
 PreParserCommon USING [MainHandle],
 PreParserTokenContext USING [RBraceAction];

PreParserSkeleton: DEFINITIONS =

 BEGIN

 CheckIPHeader: PROCEDURE [h: PreParserCommon.MainHandle]
  RETURNS [loop: BOOLEAN];


 CleanUpFrames: PROCEDURE [h: PreParserCommon.MainHandle] RETURNS [];


 DoOperator: PROCEDURE [h: PreParserCommon.MainHandle] RETURNS [loop:
BOOLEAN];


 FindOperator: PROCEDURE [h: PreParserCommon.MainHandle] RETURNS [loop:
BOOLEAN];


 InitContentInstrs: PROCEDURE [h: PreParserCommon.MainHandle];


 LeftBraceMesa: PROCEDURE [h: PreParserCommon.MainHandle] RETURNS [];


 MakeSimpleCO: PROCEDURE [h: PreParserCommon.MainHandle] RETURNS [loop:
BOOLEAN];


 ProcessBegin: PROCEDURE [h: PreParserCommon.MainHandle] RETURNS [loop:
BOOLEAN];


 ProcessEnd: PROCEDURE [h: PreParserCommon.MainHandle] RETURNS [loop: BOOLEAN];


 PopRBrace: PROCEDURE [h: PreParserCommon.MainHandle];

 PushRBrace: PROCEDURE [
  h: PreParserCommon.MainHandle,
  rBraceAction: PreParserTokenContext.RBraceAction] RETURNS [BOOLEAN];
```

Copyright © 1992 Xerox Corporation All Rights Reserved

```
RightBraceMesa: PROCEDURE [h: PreParserCommon.MainHandle]
 RETURNS [loop: BOOLEAN];

SaveCOData: PROCEDURE [h: PreParserCommon.MainHandle] RETURNS [loop:
BOOLEAN];

SetUpIPBlock: PROCEDURE [
 h: PreParserCommon.MainHandle, newIPBlock: BlockStream.Block] RETURNS [];

SetUpIIPBlock: PROCEDURE [
 h: PreParserCommon.MainHandle, newIIPBlock: BlockStream.Block] RETURNS [];

Initialize: PROCEDURE;

END.
```

Copyright © 1992 Xerox Corporation All Rights Reserved

```
DIRECTORY

 PreParserCommon USING [MainHandle, StackEntry];

PreParserStackOps: DEFINITIONS =

 BEGIN

 SetXYRelMesa: PROCEDURE [h: PreParserCommon.MainHandle] RETURNS [loop:
BOOLEAN];

 SetXRelMesa: PROCEDURE [h: PreParserCommon.MainHandle] RETURNS [loop:
BOOLEAN];

 SetYRelMesa: PROCEDURE [h: PreParserCommon.MainHandle] RETURNS [loop:
BOOLEAN];

 Add: PROCEDURE [h: PreParserCommon.MainHandle] RETURNS [loop: BOOLEAN];

 Sub: PROCEDURE [h: PreParserCommon.MainHandle] RETURNS [loop: BOOLEAN];

 Neg: PROCEDURE [h: PreParserCommon.MainHandle] RETURNS [loop: BOOLEAN];

 Abs: PROCEDURE [h: PreParserCommon.MainHandle] RETURNS [loop: BOOLEAN];

 Floor: PROCEDURE [h: PreParserCommon.MainHandle] RETURNS [loop: BOOLEAN];

 Ceiling: PROCEDURE [h: PreParserCommon.MainHandle] RETURNS [loop: BOOLEAN];

 Trunc: PROCEDURE [h: PreParserCommon.MainHandle] RETURNS [loop: BOOLEAN];

 Round: PROCEDURE [h: PreParserCommon.MainHandle] RETURNS [loop: BOOLEAN];

 Mul: PROCEDURE [h: PreParserCommon.MainHandle] RETURNS [loop: BOOLEAN];

 Div: PROCEDURE [h: PreParserCommon.MainHandle] RETURNS [loop: BOOLEAN];
```

Copyright © 1992 Xerox Corporation All Rights Reserved

```
Mod: PROCEDURE [h: PreParserCommon.MainHandle] RETURNS [loop: BOOLEAN];

Rem: PROCEDURE [h: PreParserCommon.MainHandle] RETURNS [loop: BOOLEAN];

IGet: PROCEDURE [h: PreParserCommon.MainHandle] RETURNS [loop: BOOLEAN];

GetProp: PROCEDURE [h: PreParserCommon.MainHandle] RETURNS [loop: BOOLEAN];

GetP: PROCEDURE [h: PreParserCommon.MainHandle] RETURNS [loop: BOOLEAN];

MergeProp: PROCEDURE [h: PreParserCommon.MainHandle]
 RETURNS [loop: BOOLEAN ← FALSE];

EQ: PROCEDURE [h: PreParserCommon.MainHandle] RETURNS [loop: BOOLEAN];

EQProc: PROCEDURE [
 h: PreParserCommon.MainHandle, stackEntry1: PreParserCommon.StackEntry,
 stackEntry2: PreParserCommon.StackEntry] RETURNS [eq: BOOLEAN];

EQNProc: PROCEDURE [
 h: PreParserCommon.MainHandle, stackEntry1: PreParserCommon.StackEntry,
 stackEntry2: PreParserCommon.StackEntry] RETURNS [eqn: BOOLEAN];

GT: PROCEDURE [h: PreParserCommon.MainHandle] RETURNS [loop: BOOLEAN];

GE: PROCEDURE [h: PreParserCommon.MainHandle] RETURNS [loop: BOOLEAN];

And: PROCEDURE [h: PreParserCommon.MainHandle] RETURNS [loop: BOOLEAN];

Or: PROCEDURE [h: PreParserCommon.MainHandle] RETURNS [loop: BOOLEAN];

Not: PROCEDURE [h: PreParserCommon.MainHandle] RETURNS [loop: BOOLEAN];

Type: PROCEDURE [h: PreParserCommon.MainHandle] RETURNS [loop: BOOLEAN];
```

Copyright © 1992 Xerox Corporation All Rights Reserved

```
Copy: PROCEDURE [h: PreParserCommon.MainHandle] RETURNS [loop: BOOLEAN];

Count: PROCEDURE [h: PreParserCommon.MainHandle]
 RETURNS [loop: BOOLEAN ← FALSE];

Dup: PROCEDURE [h: PreParserCommon.MainHandle] RETURNS [loop: BOOLEAN ←
FALSE];

Exch: PROCEDURE [h: PreParserCommon.MainHandle] RETURNS [loop: BOOLEAN ←
FALSE];

Pop: PUBLIC PROCEDURE [h: PreParserCommon.MainHandle]
 RETURNS [loop: BOOLEAN ← FALSE];

Roll: PROCEDURE [h: PreParserCommon.MainHandle] RETURNS [loop: BOOLEAN];

Mark: PROCEDURE [h: PreParserCommon.MainHandle] RETURNS [loop: BOOLEAN];

UnMark: PROCEDURE [h: PreParserCommon.MainHandle] RETURNS [loop: BOOLEAN];

Initialize: PROCEDURE;

END.
```

Copyright © 1992 Xerox Corporation All Rights Reserved

```
PreParserStaticStrings: DEFINITIONS =
 BEGIN PreParserStaticStringsImpl: PROGRAM; END.
```

Copyright © 1992 Xerox Corporation All Rights Reserved

```
DIRECTORY

 PreParserCommon USING [MainHandle];

PreParserStroke: DEFINITIONS =

 BEGIN

 ArcTo: PROCEDURE [h: PreParserCommon.MainHandle]
  RETURNS [loop: BOOLEAN ← FALSE];

 ConicTo: PROCEDURE [h: PreParserCommon.MainHandle]
  RETURNS [loop: BOOLEAN ← FALSE];

 CurveTo: PROCEDURE [h: PreParserCommon.MainHandle]
  RETURNS [loop: BOOLEAN ← FALSE];

 LineTo: PROCEDURE [h: PreParserCommon.MainHandle]
  RETURNS [loop: BOOLEAN ← FALSE];

 LineToX: PROCEDURE [h: PreParserCommon.MainHandle]
  RETURNS [loop: BOOLEAN ← FALSE];

 LineToY: PROCEDURE [h: PreParserCommon.MainHandle]
  RETURNS [loop: BOOLEAN ← FALSE];

 MaskDashedStroke: PROCEDURE [h: PreParserCommon.MainHandle]
  RETURNS [loop: BOOLEAN ← FALSE];

 MaskStroke: PROCEDURE [h: PreParserCommon.MainHandle]
  RETURNS [loop: BOOLEAN ← FALSE];

 MaskVector: PROCEDURE [h: PreParserCommon.MainHandle]
  RETURNS [loop: BOOLEAN ← FALSE];

 MoveTo: PROCEDURE [h: PreParserCommon.MainHandle]
  RETURNS [loop: BOOLEAN ← FALSE];

 PutTrajectory: PROCEDURE [h: PreParserCommon.MainHandle]
  RETURNS [loop: BOOLEAN ← FALSE];

 Initialize: PROCEDURE [];
 END.
```

Copyright © 1992 Xerox Corporation All Rights Reserved

```
DIRECTORY

 DecomposerCommon USING [Transformation],
 PreParserCommon USING [MainHandle, TransformationPtr],
 Transformation USING [Matrix];

PreParserTForm: DEFINITIONS =

 BEGIN

 Concat: PROCEDURE [h: PreParserCommon.MainHandle]
  RETURNS [loop: BOOLEAN ← FALSE];

 Concatenate: PROCEDURE [
  h: PreParserCommon.MainHandle, t1: PreParserCommon.TransformationPtr,
  t2: PreParserCommon.TransformationPtr,
  tResult: PreParserCommon.TransformationPtr];

 ConcatT: PROCEDURE [h: PreParserCommon.MainHandle]
  RETURNS [loop: BOOLEAN ← FALSE];

 ConvertDCTransToPPCTrans: PROCEDURE [
  h: PreParserCommon.MainHandle,
  fromT: LONG POINTER TO DecomposerCommon.Transformation,
  toT: PreParserCommon.TransformationPtr];

 ConvertPPCTransToTMatrix: PROCEDURE [
  tIn: PreParserCommon.TransformationPtr,
  tOut: LONG POINTER TO Transformation.Matrix];

 ConvertTMatrixToPPCTrans: PROCEDURE [
  h: PreParserCommon.MainHandle, fromT: LONG POINTER TO Transformation.Matrix,
  toT: PreParserCommon.TransformationPtr];

 MakeT: PROCEDURE [h: PreParserCommon.MainHandle]
  RETURNS [loop: BOOLEAN ← FALSE];

 Rotate: PROCEDURE [h: PreParserCommon.MainHandle]
  RETURNS [loop: BOOLEAN ← FALSE];

 Scale: PROCEDURE [h: PreParserCommon.MainHandle]
  RETURNS [loop: BOOLEAN ← FALSE];

 Scale2: PROCEDURE [h: PreParserCommon.MainHandle]
  RETURNS [loop: BOOLEAN ← FALSE];

 Translate: PROCEDURE [h: PreParserCommon.MainHandle]
  RETURNS [loop: BOOLEAN ← FALSE];
```

Copyright © 1992 Xerox Corporation All Rights Reserved

```
Initialize: PROCEDURE [];

END.
```

Copyright © 1992 Xerox Corporation All Rights Reserved

```
DIRECTORY

 Environment USING [Byte],
 InternalIP USING [ValidTokenType],
 IPFunction USING [ParserType],
 ParserCommon USING [Context, State],
 PreParserInterpress USING [Token];

PreParserTokenContext: DEFINITIONS =

 BEGIN

 ByteArray: TYPE = PACKED ARRAY [0..0) OF Environment.Byte;

 ByteArrayPtr: TYPE = LONG POINTER TO ByteArray;

 CardinalBlock: TYPE = MACHINE DEPENDENT RECORD [
  blockPointer(0): LONG POINTER TO Environment.Byte,
  startIndex(2): CARDINAL,
  stopIndexPlusOne(3): CARDINAL];

 ParseContext: TYPE = MACHINE DEPENDENT RECORD [
  pcm(0): ParserCommon.Context,
  fill(131): ARRAY [0..2] OF CARDINAL ← ALL[TRASH],
  ipBufferPtr(134): ByteArrayPtr,
  ipByteIndex(136): CARDINAL,
  ipStopIndexPlusOne(137): CARDINAL,
  nextState(138:0..7): ParserCommon.State,
  state(138:8..15): ParserCommon.State,
  operationStage(139): CARDINAL,
  actionArrayPtr(140): ActionArrayPtr,
  currentTokenBytes(142): CARDINAL,
  rBraceActionRecordPtr(143): RBraceActionRecordPtr,
  rBraceRecordCount(145): CARDINAL,
  rBraceActionArray(146): RBraceActionRecord,
  tokenOverlay(208): TokenOverlay,
  sequenceLength(210): SequenceLength];
 SequenceLength: TYPE = MACHINE DEPENDENT RECORD [
  sequenceLength: SELECT OVERLAID * FROM
   lc => [lc: LONG CARDINAL],
   words => [lowbits: CARDINAL, highbits: CARDINAL],
   bytes => [bytes: PACKED ARRAY [0..3] OF Environment.Byte],
   ENDCASE];

 TokenOverlay: TYPE = MACHINE DEPENDENT RECORD [
  tokenOverlay: SELECT OVERLAID * FROM
   token => [token: PreParserInterpress.Token],
   bytes => [bytes: PACKED ARRAY [0..3] OF Environment.Byte],
   shortNumber => [shortNumber: INTEGER],
```

Copyright © 1992 Xerox Corporation All Rights Reserved

```
  sequence => [sequence: shortSequence PreParserInterpress.Token],
  ENDCASE];

ParseContextPtr: TYPE = LONG POINTER TO ParseContext;

TokenResult: TYPE = MACHINE DEPENDENT{
 zero(0), nop(1), setXY(10), setXYRel(11), setXRel(12), setYRel(13),
 lineToX(14), lineToY(15), space(16), get(17), iGet(18), iSet(19), fGet(20),
 fSet(21), show(22), lineTo(23), maskStroke(24), moveTo(25), thirtyTwo(32),
 begin(102), end(103), contentInstructions(105), leftBrace(106),
 rightBrace(107), correct(110), makeSimpleCO(114), findOperator(116),
 doSaveSimpleBody(120), showAndFixedXRel(145), showAndXRel(146), findFont(147),
 modifyFont(148), findDecompressor(149), setFont(151), setCorrectMeasure(154),
 setCorrectTolerance(155), correctMask(156), correctSpace(157), getCP(159),
 makeT(160), translate(162), rotate(163), scale(164), concat(165), scale2(166),
 concatT(168), move(169), trans(170), pop(180), dup(181), copy(183), roll(184),
 exch(185), mark(186), unmark(187), count(188), unmark0(192), abs(200),
 add(201), and(202), ceiling(203), div(204), eq(205), floor(206), ge(207),
 gt(208), mod(209), mul(210), neg(211), not(212), or(213), sub(214),
 trunc(215), rem(216), round(217), type(220), do(231), doSave(232),
 doSaveAll(233), if(239), ifCopy(240), ifElse(241), makeVecLU(282),
 makeVec(283), shape(285), getP(286), getProp(287), mergeProp(288),
 curveTo(402), arcTo(403), conicTo(404), maskFill(409), maskRectangle(410),
 maskTrapezoidX(411), maskTrapezoidY(412), startUnderline(413),
 maskUnderline(414), makeOutlineOdd(416), makeOutline(417), clipOutline(418),
 clipRectangle(419), findColorOp(421), findColorModelOp(422), findColor(423),
 setGray(424), makeGray(425), makeSampledBlack(426), setSampledBlack(428),
 maskStrokeClosed(440), maskVector(441), maskDashedStroke(442),
 makePixelArray(450), extractPixel(451), maskPixel(452), errorOperator(453),
 sequence(454), shortNumber(455), skipSequence(456)};

RBraceActionType: TYPE = MACHINE DEPENDENT{
 endBody(0), endContentInstrs, endCORRECT, endPage, endPageFound, endPreamble,
 endPrintingInstrs, endMaster, endInsertMaster, endInsertFile, endCO,
 endMakeCO};

RBraceAction: TYPE = MACHINE DEPENDENT RECORD [
 var(0): SELECT type(0): RBraceActionType FROM
  endBody => [
   prevState(1): ParserCommon.State, ifCase(2): RBraceIFCase ← noIFElse],
  endContentInstrs, endCORRECT, endPage, endPageFound, endPreamble,
   endPrintingInstrs, endMaster => [],
  endInsertFile, endInsertMaster => [
   rBraceStreamDataPtr(1:0..31): RBraceStreamDataPtr],
  endCO => [rBraceOpDataPtr(1:0..31): RBraceOpDataPtr],
  endMakeCO => [],
  ENDCASE];

RBraceActionArrayRange: TYPE = [0..maxExecDepth);
```

Copyright © 1992 Xerox Corporation All Rights Reserved

```
RBraceActionPtr: TYPE = LONG POINTER TO RBraceAction;

RBraceIFCase: TYPE = MACHINE DEPENDENT{noIFElse(0), IFElsePush0, IFElsePush1};

RBraceActionRecord: TYPE = MACHINE DEPENDENT RECORD [
 next(0): RBraceActionRecordPtr,
 entries(2): ARRAY RBraceActionArrayRange OF RBraceAction];

RBraceActionRecordPtr: TYPE = LONG POINTER TO RBraceActionRecord;

RBraceStreamData: TYPE = MACHINE DEPENDENT RECORD [
 ipBufferPtr(0): ByteArrayPtr,
 ipByteIndex(2): CARDINAL,
 ipStopIndexPlusOne(3): CARDINAL,
 savedState(4): ParserCommon.State];
RBraceStreamDataPtr: TYPE = LONG POINTER TO RBraceStreamData;

RBraceOpData: TYPE = MACHINE DEPENDENT RECORD [
 ipBufferPtr(0): ByteArrayPtr,
 ipByteIndex(2): CARDINAL,
 ipStopIndexPlusOne(3): CARDINAL,
 ipRemainingBytes(4): LONG CARDINAL,
 savedFramePtr(6): LONG POINTER,
 savedFGetFramePtr(8): LONG POINTER,
 composedOpBlockPtrSave(10): LONG POINTER,
 composedOpPtrSave(12): LONG POINTER];
RBraceOpDataPtr: TYPE = LONG POINTER TO RBraceOpData;

ActionArray: TYPE = ARRAY TokenResult OF IPFunction.ParserType;

ActionArrayPtr: TYPE = LONG POINTER TO ActionArray;

TokenSizeArray: TYPE = ARRAY InternalIP.ValidTokenType OF CARDINAL;

TokenSizeArrayPtr: TYPE = LONG POINTER TO TokenSizeArray;

maxExecDepth: CARDINAL = 20;

END.
```

Copyright © 1992 Xerox Corporation All Rights Reserved

```
DIRECTORY

 PreParserCommon USING [MainHandle];

PreParserVector: DEFINITIONS =

 BEGIN

 Get: PROCEDURE [h: PreParserCommon.MainHandle] RETURNS [loop: BOOLEAN ←
FALSE];

 MakeVec: PROCEDURE [h: PreParserCommon.MainHandle]
  RETURNS [loop: BOOLEAN ← FALSE];

 MakeVecLU: PROCEDURE [h: PreParserCommon.MainHandle]
  RETURNS [loop: BOOLEAN ← FALSE];

 Shape: PROCEDURE [h: PreParserCommon.MainHandle]
  RETURNS [loop: BOOLEAN ← FALSE];

 Initialize: PROCEDURE [];

 END.
```

Copyright © 1992 Xerox Corporation All Rights Reserved

```
DIRECTORY
 DecomposerStartUp USING [],
 IIPFragMgrPrivate USING [Init],
 PostParserController USING [Initialize],
 ParserTraps USING [Initialize],
 PostParserInstance USING [PostParserInitialize],
 PostParserLookAhead USING [Initialize],
 Process USING [Detach];

DecomposerStartUpImpl: PROGRAM
 IMPORTS
  IIPFragMgrPrivate, ParserTraps, PostParserController, PostParserInstance,
  PostParserLookAhead, Process
 EXPORTS DecomposerStartUp =
 BEGIN

 Start: PUBLIC PROCEDURE [] =
  BEGIN
  p1, p2, p3: PROCESS ← NIL;
  ParserTraps.Initialize[];
  p1 ← FORK PostParserInstance.PostParserInitialize[];
  p2 ← FORK PostParserLookAhead.Initialize[];
  p3 ← FORK PostParserController.Initialize[];
  Process.Detach[FORK IIPFragMgrPrivate.Init[]];
  JOIN p1;
  JOIN p2;
  JOIN p3;
  END;
 END.
```

Copyright © 1992 Xerox Corporation All Rights Reserved

```
DIRECTORY
 Environment USING [LongNumber],
 FixedPointReal USING [Abs, Neg, Number],
 Inline USING [HighHalf, LowHalf, LongDiv, LongDivMod, LongMult];

FixedPointRealImpl: PROGRAM IMPORTS FixedPointReal, Inline EXPORTS FixedPointReal
 =

 BEGIN OPEN FixedPointReal;


 DivInt: PUBLIC PROCEDURE [n: FixedPointReal.Number, d: INTEGER]
  RETURNS [FixedPointReal.Number] = {
  q: FixedPointReal.Number;
  negate: BOOLEAN _ (n.li < 0) # (d < 0);
  nPos: Environment.LongNumber;
  dPos: CARDINAL;
  rem: Environment.LongNumber;
  nPos.li _ FixedPointReal.Abs[n].li;
  dPos _ ABS[d];
  [q.int, rem.highbits] _ Inline.LongDivMod[LONG[nPos.highbits], dPos];
  rem.lowbits _ nPos.lowbits + dPos / 2;
  q.frac _ Inline.LongDiv[rem.lc, dPos];
  RETURN[IF negate THEN [li[-q.li]] ELSE q]};

 FromRational: PUBLIC PROCEDURE [n, d: INTEGER] RETURNS [FixedPointReal.Number] =
  {
  q: FixedPointReal.Number;
  negate: BOOLEAN _ (n < 0) # (d < 0);
  nPos: LONG CARDINAL;
  dPos: CARDINAL;
  rem: Environment.LongNumber;
  nPos _ LONG[ABS[n]];
  dPos _ ABS[d];
  [q.int, rem.highbits] _ Inline.LongDivMod[nPos, dPos];
  rem.lowbits _ dPos / 2;
  q.frac _ Inline.LongDiv[rem.lc, dPos];
  RETURN[IF negate THEN [li[-q.li]] ELSE q]};

 Mul: PUBLIC PROC [m, n: Number] RETURNS [Number] = {
  pos: BOOLEAN _ (m.int >= 0) = (n.int >= 0);
  prod: Number;
  IF m.int < 0 THEN m _ m.Neg[];
  IF n.int < 0 THEN n _ n.Neg[];
  prod.frac _ Inline.HighHalf[
   Inline.LongMult[m.frac, n.frac] + (CARDINAL[LAST[NAT]] + 1)];
  prod.int _ m.int * n.int;
  prod _ [
   li[
```

Copyright © 1992 Xerox Corporation All Rights Reserved

```
  prod.li + Inline.LongMult[m.int, n.frac] + Inline.LongMult[m.int, n.int]]];
 RETURN[IF pos THEN prod ELSE [li[-prod.li]]]};

MulDiv: PUBLIC PROCEDURE [m, n, d: INTEGER] RETURNS [FixedPointReal.Number] = {
 q: FixedPointReal.Number;
 negate: BOOLEAN _ FALSE;
 mPos, nPos, dPos: CARDINAL;
 rem: Environment.LongNumber;
 mPos _ ABS[m];
 IF m < 0 THEN negate _ ~negate;
 nPos _ ABS[n];
 IF n < 0 THEN negate _ ~negate;
 dPos _ ABS[d];
 IF d < 0 THEN negate _ ~negate;
 [q.int, rem.highbits] _ Inline.LongDivMod[Inline.LongMult[mPos, nPos], dPos];
 rem.lowbits _ dPos / 2;
 q.frac _ Inline.LongDiv[rem.lc, dPos];
 RETURN[IF negate THEN [li[-q.li]] ELSE q]};

MulInt: PUBLIC PROCEDURE [m: FixedPointReal.Number, n: INTEGER]
 RETURNS [FixedPointReal.Number] = {
 negate: BOOLEAN _ (m.li < 0) # (n < 0);
 mPos: Environment.LongNumber;
 nPos: CARDINAL;
 sum: Environment.LongNumber;
 mPos.li _ m.Abs[].li;
 nPos _ ABS[n];
 sum.lc _ Inline.LongMult[Inline.LowHalf[mPos.lc], nPos];
 sum.highbits _ sum.highbits + Inline.HighHalf[mPos.lc] * nPos;
 RETURN[IF negate THEN [li[-sum.li]] ELSE [li[sum.li]]]};

END.
```

Copyright © 1992 Xerox Corporation All Rights Reserved

```
DIRECTORY
 ParserCommon USING [
  Add, Bezier, CurveProc, FSC, Mul, RealPlusOrMinus, Sub, Square, SqRt, Vector],
 Real USING [LargestNumber];

ParserCommonImpl: PROGRAM IMPORTS ParserCommon EXPORTS ParserCommon =

 BEGIN

 fourThirds: REAL = 1.333333;
 maxReal: REAL = Real.LargestNumber;
 nPts: NAT ← 6;
 threshold: REAL = 0.01;

 ConicToCurves: PUBLIC PROCEDURE [
  p0, p1, p2: ParserCommon.Vector, r: REAL, curveProc: ParserCommon.CurveProc] =
  BEGIN
  IF NOT (r IN [0.0..1.0]) THEN r ← 0.99999;
  IF ABS[r - 0.5] < = threshold THEN {
   f: REAL = fourThirds * r;
   p01: ParserCommon.Vector = [
    p0.x + f * (p1.x - p0.x), p0.y + f * (p1.y - p0.y)];
   p21: ParserCommon.Vector = [
    p2.x + f * (p1.x - p2.x), p2.y + f * (p1.y - p2.y)];
   curveProc[p01, p21, p2]}
  ELSE {
   m: ParserCommon.Vector = [
    x: ParserCommon.FSC[a: (p0.x + p2.x), scalePowerOf2: -1],
    y: ParserCommon.FSC[a: (p0.y + p2.y), scalePowerOf2: -1]];
   p: ParserCommon.Vector = [m.x + r * (p1.x - m.x), m.y + r * (p1.y - m.y)];
   p01: ParserCommon.Vector = [
    p0.x + r * (p1.x - p0.x), p0.y + r * (p1.y - p0.y)];
   p21: ParserCommon.Vector = [
    p2.x + r * (p1.x - p2.x), p2.y + r * (p1.y - p2.y)];
   rNew: REAL = MIN[1.0 / (1.0 + ParserCommon.SqRt[2.0 * (1 - r)]), 0.99999];
   ConicToCurves[p0, p01, p, rNew, curveProc];
   ConicToCurves[p, p21, p2, rNew, curveProc]};
  END;
 CurveLength: PUBLIC PROCEDURE [p: ParserCommon.Bezier]
  RETURNS [ParserCommon.RealPlusOrMinus] =
  BEGIN

  nReal: REAL = nPts;
  min: REAL ← maxReal;
  max: REAL ← 0;
  delta: ARRAY [0..3) OF ParserCommon.Vector = [
   ParserCommon.Sub[p[1], p[0]], ParserCommon.Sub[p[2], p[1]],
   ParserCommon.Sub[p[3], p[2]]];
```

Copyright © 1992 Xerox Corporation All Rights Reserved

```
FOR i: NAT IN [0..nPts] DO
 t: REAL = i / nReal;
 s: REAL = 1.0 - t;
 d01: ParserCommon.Vector ← ParserCommon.Add[
  a: ParserCommon.Mul[delta[0], t], b: ParserCommon.Mul[delta[1], s]];
 d12: ParserCommon.Vector ← ParserCommon.Add[
  a: ParserCommon.Mul[delta[1], t], b: ParserCommon.Mul[delta[2], s]];
 d012: ParserCommon.Vector ← ParserCommon.Add[
  a: ParserCommon.Mul[d01, t], b: ParserCommon.Mul[d12, s]];
 sqr: REAL = ParserCommon.Square[a: d012];

 IF sqr > max THEN max ← sqr;
 IF sqr < min THEN min ← sqr;
 ENDLOOP;

max ← ParserCommon.SqRt[max];
min ← ParserCommon.SqRt[min];

RETURN[[value: (max + min) * 1.5, error: (max - min) * 1.5]];
END;
END.
```

Copyright © 1992 Xerox Corporation All Rights Reserved

```
DIRECTORY

 ESCAlpha USING [aFSC],
 FaultLogger USING [ID, Log],
 FixedPointReal USING [FromReal, ToReal],
 Frame USING [GetReturnFrame, ReadPC, WritePC],
 Ieee USING [ExponentBias, SingleReal],
 InternalIP USING [SetXYRel],
 IPFunction,
 ParserCommon USING [Mid],
 ParserTraps USING [IPTrapType, TrapRecord],
 ParserZone USING [
  AllocateNode4, AllocateNode8, AllocateNode16, AllocateNode32, AllocateNode64,
  AllocateNode128, AllocateNodeFFL, AllocateNodeNFL, FreeNode4, FreeNode8,
  FreeNode16, FreeNode32, FreeNode64, FreeNode128, FreeNodeFFL, FreeNodeNFL],
 PostParserCallBack USING [ESSFault, ReportESSFault],
 PostParserCommon USING [
  MainHandle, NextActionMesa, PutABandEntry, SetAmplifySpaceMesa, SetBand,
  SetFontMesa, SetXYMesa, SetXYIntMesa, TransformIIPPoint, TransformIIPVector,
  TransformIIPPointReal],
 PostParserGraphics USING [GenerateRectangle, MaskRectangleMesa],
 PostParserImage USING [
  GenerateFlippedImage, GenerateNormalImage, GenerateReversedAndFlippedImage,
  GenerateReversedImage, PutIncreasingXEntries, PutDecreasingXEntries],
 PostParserMainErrors USING [fpuProblem],
 PostParserShow USING [ShowMesa],
 PreParserCallBack USING [ESSFault, ReportESSFault],
 PreParserColor USING [MakeGray, SetGray],
 PreParserCommon USING [MainHandle],
 PreParserExtra USING [
  FGetMesa, FSetMesa, ISetMesa, NextActionMesa, NoteNewT, PopOperandsMesa,
  SetXYMesa, ShowMesa, TransformIPPoint, TransformIPVector],
 PreParserFilled USING [MaskRectangleMesa],
 PreParserFont USING [CheckFontMesa, SetFontMesa],
 PreParserFrameStack USING [
  CopyStackEntry, GuaranteeStackSpace, PopFrame, PopStack, PushFrame,
  PushStack],
 PreParserMainOps USING [
  CheckGraphic, CheckPosition, CheckTextVars, PutToken, ShortNumberMesa],
 PreParserSequence USING [SequenceMesa, SkipSequenceMesa],
 PreParserSkeleton USING [LeftBraceMesa, RightBraceMesa],
 PreParserStackOps USING [
  Count, Mark, Pop, SetXRelMesa, SetXYRelMesa, SetYRelMesa],
 PreParserTForm USING [Rotate, Scale, Scale2, Translate],
 PreParserVector USING [MakeVec, MakeVecLU],
 PrincOps USING [ESCTrapTable, LocalFrameHandle, StateVector],
 RTOSESCAlpha USING [aINTERPRESSDECOMPOSER];

ParserTrapsImpl: MONITOR
```

Copyright © 1992 Xerox Corporation All Rights Reserved

```
IMPORTS
 FaultLogger, FixedPointReal, Frame, ParserCommon, ParserZone,
 PostParserCallBack, PostParserCommon, PostParserGraphics, PostParserImage,
 PostParserShow, PreParserCallBack, PreParserColor, PreParserExtra,
 PreParserFilled, PreParserFont, PreParserFrameStack, PreParserMainOps,
 PreParserSequence, PreParserSkeleton, PreParserStackOps, PreParserTForm,
 PreParserVector
EXPORTS ParserTraps =

BEGIN


IPTrap: PUBLIC ParserTraps.IPTrapType = CODE;
trapRecord: ParserTraps.TrapRecord;



BumpPC: PROCEDURE [f: PrincOps.LocalFrameHandle] = INLINE {
 Frame.WritePC[[Frame.ReadPC[f] + 2], f]};

IPMesaFSC: PROCEDURE [a: REAL, scalePowerOf2: INTEGER] RETURNS [s: REAL] =
 BEGIN
 state: PrincOps.StateVector.dst;
 factor: Ieee.SingleReal ← LOOPHOLE[1.0];

 state ← STATE;

 IF scalePowerOf2 NOT IN [-126..127] THEN ERROR;

 factor.exp ← scalePowerOf2 + Ieee.ExponentBias;

 s ← a * LOOPHOLE[factor, REAL];

 BumpPC[Frame.GetReturnFrame[]];
 STATE ← state;
 END;

IPTrapHandler: PROCEDURE [function: CARDINAL, h: PreParserCommon.MainHandle]
 RETURNS [result: BOOLEAN] =
 BEGIN
 state: PrincOps.StateVector.dst;
 postH: PostParserCommon.MainHandle ← LOOPHOLE[h,
PostParserCommon.MainHandle];
 state ← STATE;
 result ← FALSE;
 WHILE TRUE DO
  SELECT function FROM
   IPFunction.PostVersion = > result ← FALSE;
   IPFunction.ForceFPUOff = > result ← FALSE;
   IPFunction.ForceFPUOn = > result ← FALSE;
```

Copyright © 1992 Xerox Corporation All Rights Reserved

```
IPFunction.Config => result ← FALSE;
IPFunction.PreVersion => result ← FALSE;

IPFunction.AllocateNode4 =>
 result ← ParserZone.AllocateNode4[h: @h.pc.pcm];
IPFunction.AllocateNode8 =>
 result ← ParserZone.AllocateNode8[h: @h.pc.pcm];
IPFunction.AllocateNode16 =>
 result ← ParserZone.AllocateNode16[h: @h.pc.pcm];
IPFunction.AllocateNode32 =>
 result ← ParserZone.AllocateNode32[h: @h.pc.pcm];
IPFunction.AllocateNode64 =>
 result ← ParserZone.AllocateNode64[h: @h.pc.pcm];
IPFunction.AllocateNode128 =>
 result ← ParserZone.AllocateNode128[h: @h.pc.pcm];
IPFunction.AllocateNodeFFL =>
 result ← ParserZone.AllocateNodeFFL[h: @h.pc.pcm];
IPFunction.AllocateNodeNFL =>
 result ← ParserZone.AllocateNodeNFL[h: @h.pc.pcm];
IPFunction.FreeNode4 => ParserZone.FreeNode4[h: @h.pc.pcm];
IPFunction.FreeNode8 => ParserZone.FreeNode8[h: @h.pc.pcm];
IPFunction.FreeNode16 => ParserZone.FreeNode16[h: @h.pc.pcm];
IPFunction.FreeNode32 => ParserZone.FreeNode32[h: @h.pc.pcm];
IPFunction.FreeNode64 => ParserZone.FreeNode64[h: @h.pc.pcm];
IPFunction.FreeNode128 => ParserZone.FreeNode128[h: @h.pc.pcm];
IPFunction.FreeNodeFFL => ParserZone.FreeNodeFFL[h: @h.pc.pcm];
IPFunction.FreeNodeNFL => ParserZone.FreeNodeNFL[h: @h.pc.pcm];
IPFunction.FPRToReal =>
 h.pc.pcm.real1 ← FixedPointReal.ToReal[h.pc.pcm.fixed];
IPFunction.RealToFPR =>
 h.pc.pcm.fixed ← FixedPointReal.FromReal[h.pc.pcm.real1];
«IPFunction.IP16BitMult
    => h.pc.pcm.int1 ← h.pc.pcm.int1 * h.pc.pcm.int2;»
IPFunction.Mid1 =>
 h.pc.pcm.mid.p01 ← ParserCommon.Mid[
  a: h.pc.pcm.mid.p0, b: h.pc.pcm.mid.p1];
IPFunction.Mid2 =>
 BEGIN
 h.pc.pcm.mid.p01 ← ParserCommon.Mid[
  a: h.pc.pcm.mid.p0, b: h.pc.pcm.mid.p1];
 h.pc.pcm.mid.p12 ← ParserCommon.Mid[
  a: h.pc.pcm.mid.p1, b: h.pc.pcm.mid.p2];
 h.pc.pcm.mid.p012 ← ParserCommon.Mid[
  a: h.pc.pcm.mid.p01, b: h.pc.pcm.mid.p12];
 END;
IPFunction.Mid3 =>
 BEGIN
 h.pc.pcm.mid.p01 ← ParserCommon.Mid[
  a: h.pc.pcm.mid.p0, b: h.pc.pcm.mid.p1];
 h.pc.pcm.mid.p12 ← ParserCommon.Mid[
```

Copyright © 1992 Xerox Corporation All Rights Reserved

```
  a: h.pc.pcm.mid.p1, b: h.pc.pcm.mid.p2];
 h.pc.pcm.mid.p012 ← ParserCommon.Mid[
  a: h.pc.pcm.mid.p01, b: h.pc.pcm.mid.p12];
 h.pc.pcm.mid.p23 ← ParserCommon.Mid[
  a: h.pc.pcm.mid.p2, b: h.pc.pcm.mid.p3];
 h.pc.pcm.mid.p123 ← ParserCommon.Mid[
  a: h.pc.pcm.mid.p12, b: h.pc.pcm.mid.p23];
 h.pc.pcm.mid.p0123 ← ParserCommon.Mid[
  a: h.pc.pcm.mid.p012, b: h.pc.pcm.mid.p123];
 END;

IPFunction.SetBand => result ← PostParserCommon.SetBand[h: postH];
IPFunction.PutABandEntry =>
 result ← PostParserCommon.PutABandEntry[h: postH];
IPFunction.TransformIIPPoint =>
 PostParserCommon.TransformIIPPoint[h: postH];
IPFunction.TransformIIPVector =>
 PostParserCommon.TransformIIPVector[h: postH];
IPFunction.TransformIIPPointReal =>
 PostParserCommon.TransformIIPPointReal[h: postH];
IPFunction.PostNextAction =>
 BEGIN PostParserCommon.NextActionMesa[h: postH]; result ← TRUE; END;
IPFunction.GenerateNormalImage =>
 result ← PostParserImage.GenerateNormalImage[h: postH];
IPFunction.GenerateFlippedImage =>
 result ← PostParserImage.GenerateFlippedImage[h: postH];
IPFunction.GenerateReversedImage =>
 result ← PostParserImage.GenerateReversedImage[h: postH];
IPFunction.GenerateReversedAndFlippedImage =>
 result ← PostParserImage.GenerateReversedAndFlippedImage[h: postH];
IPFunction.PutIncreasingXEntries =>
 result ← PostParserImage.PutIncreasingXEntries[h: postH];
IPFunction.PutDecreasingXEntries =>
 result ← PostParserImage.PutDecreasingXEntries[h: postH];
IPFunction.GenerateRectangle =>
 result ← PostParserGraphics.GenerateRectangle[h: postH];

IPFunction.MaskRectangle =>
 result ← PostParserGraphics.MaskRectangleMesa[h: postH];
IPFunction.PostShow => result ← PostParserShow.ShowMesa[h: postH];
IPFunction.SetXYInt => result ← PostParserCommon.SetXYIntMesa[h: postH];
IPFunction.PostSetXY => result ← PostParserCommon.SetXYMesa[h: postH];
IPFunction.PostSetXYRel => {
 setXYRel: LONG POINTER TO InternalIP.SetXYRel ←
  LOOPHOLE[postH.pc.tokenPtr];

 postH.mcsPoint ← setXYRel.delta;

 PostParserCommon.TransformIIPVector[h: postH];
 postH.imagerVars.dcsX.li ← postH.imagerVars.dcsX.li + postH.P1.x.li;
```

Copyright © 1992 Xerox Corporation All Rights Reserved

```
postH.imagerVars.dcsY.li ← postH.imagerVars.dcsY.li + postH.P1.y.li};

IPFunction.PostSetFont => result ← PostParserCommon.SetFontMesa[h: postH];
IPFunction.SetAmplifySpace =>
 result ← PostParserCommon.SetAmplifySpaceMesa[h: postH];

IPFunction.PreNextAction =>
 BEGIN PreParserExtra.NextActionMesa[h: h]; result ← TRUE; END;
IPFunction.PopFrame => PreParserFrameStack.PopFrame[h: h];
IPFunction.PopStack => result ← PreParserFrameStack.PopStack[h: h];
IPFunction.PushFrame => result ← PreParserFrameStack.PushFrame[h: h];
IPFunction.PreCheckFont => result ← PreParserFont.CheckFontMesa[h: h];
IPFunction.PreCheckGraphic =>
 result ← PreParserMainOps.CheckGraphic[h: h];
IPFunction.PreCheckPosition =>
 result ← PreParserMainOps.CheckPosition[h: h];
IPFunction.PreCheckTextVars =>
 result ← PreParserMainOps.CheckTextVars[h: h];
IPFunction.PreTransformIPPoint => PreParserExtra.TransformIPPoint[h: h];
IPFunction.PreTransformIPVector => PreParserExtra.TransformIPVector[h: h];
IPFunction.CopyStackEntry =>
 result ← PreParserFrameStack.CopyStackEntry[h: h];
IPFunction.GuaranteeStackSpace =>
 result ← PreParserFrameStack.GuaranteeStackSpace[h: h];
IPFunction.NoteNewT => PreParserExtra.NoteNewT[h: h];
IPFunction.LeftBrace =>
 BEGIN PreParserSkeleton.LeftBraceMesa[h: h]; result ← TRUE; END;
IPFunction.PreSequence => result ← PreParserSequence.SequenceMesa[h: h];
IPFunction.PreSkipSequence =>
 result ← PreParserSequence.SkipSequenceMesa[h: h];
IPFunction.RightBrace => result ← PreParserSkeleton.RightBraceMesa[h: h];
IPFunction.Count => result ← PreParserStackOps.Count[h: h];
IPFunction.Pop => result ← PreParserStackOps.Pop[h: h];
IPFunction.PrePopOperands =>
 BEGIN [] ← PreParserExtra.PopOperandsMesa[h: h]; result ← TRUE; END;
IPFunction.PrePushStack => result ← PreParserFrameStack.PushStack[h: h];
IPFunction.PrePutToken => result ← PreParserMainOps.PutToken[h: h];
IPFunction.PushShortNumber =>
 result ← PreParserMainOps.ShortNumberMesa[h: h];
IPFunction.Mark => result ← PreParserStackOps.Mark[h: h];
IPFunction.PreMaskRectangle =>
 result ← PreParserFilled.MaskRectangleMesa[h: h];
IPFunction.PreShow => result ← PreParserExtra.ShowMesa[h: h];
IPFunction.Rotate => result ← PreParserTForm.Rotate[h: h];
IPFunction.Scale => result ← PreParserTForm.Scale[h: h];
IPFunction.Scale2 => result ← PreParserTForm.Scale2[h: h];
IPFunction.Translate => result ← PreParserTForm.Translate[h: h];
IPFunction.FGet => result ← PreParserExtra.FGetMesa[h: h];
IPFunction.FSet => result ← PreParserExtra.FSetMesa[h: h];
IPFunction.ISet => result ← PreParserExtra.ISetMesa[h: h];
```

Copyright © 1992 Xerox Corporation All Rights Reserved

```
IPFunction.PreSetFont => result ← PreParserFont.SetFontMesa[h: h];
IPFunction.MakeVec => result ← PreParserVector.MakeVec[h: h];
IPFunction.MakeVecLU => result ← PreParserVector.MakeVecLU[h: h];
IPFunction.MakeGray => result ← PreParserColor.MakeGray[h: h];
IPFunction.SetGray => result ← PreParserColor.SetGray[h: h];
IPFunction.PreSetXRel => result ← PreParserStackOps.SetXRelMesa[h: h];
IPFunction.PreSetXY => result ← PreParserExtra.SetXYMesa[h: h];
IPFunction.PreSetXYRel => result ← PreParserStackOps.SetXYRelMesa[h: h];
IPFunction.PreSetYRel => result ← PreParserStackOps.SetYRelMesa[h: h];
IPFunction.FPUFailure =>
 BEGIN
 id: FaultLogger.ID ← FaultLogger.Log[
  fault: [
  subsystem: control, swModule: print,
  faultNumber: PostParserMainErrors.fpuProblem]];

 IF h.pc.pcm.contextType = postParserManagerContext
  OR h.pc.pcm.contextType = postParserMainLoopContext THEN

  PostParserCallBack.ReportESSFault[fault: FPUFailure, id: id]
 ELSE

  PreParserCallBack.ReportESSFault[
   context: h.pc.pcm.clientContext, fault: fpuProblem, id: id];

 function ← h.pc.pcm.data.function;
 LOOP;
 END;
ENDCASE => {
 trapRecord ← [unknownIPPrincOpFunction[function]];
 SIGNAL IPTrap[trap: trapRecord];
 };

EXIT;
ENDLOOP;
BumpPC[Frame.GetReturnFrame[]];
STATE ← state;
END;
Initialize: PUBLIC ENTRY PROCEDURE [] =
BEGIN
PrincOps.ESCTrapTable[RTOSESCAlpha.aINTERPRESSDECOMPOSER] ←
 LOOPHOLE[IPTrapHandler];
PrincOps.ESCTrapTable[ESCAlpha.aFSC] ← LOOPHOLE[IPMesaFSC];
END;
END.
```

Copyright © 1992 Xerox Corporation All Rights Reserved

```
DIRECTORY
 Environment USING [logWordsPerPage, wordsPerPage],
 GenericESS USING [LockData, UnlockData],
 Inline USING [DBITSHIFT, LowHalf],
 IPFunction USING [
  AllocateNodeNFL, FreeNode4, FreeNode8, FreeNode16, FreeNode32, FreeNode64,
  FreeNodeFFL],
 IPMicrocode USING [CALL],
 ParserZone USING [],
 ParserCommon USING [ContextPtr, NodePtr, ZonePtr],
 PostParserJobMemory USING [Error, GetMem],
 PreParserCommon USING [Frame],
 ResMgrStorage USING [BufferList, Pages];

ParserZoneImpl: MONITOR
 IMPORTS GenericESS, Inline, IPMicrocode, PostParserJobMemory EXPORTS ParserZone
 =
 BEGIN

 myFrameSize: CARDINAL ← LAST[CARDINAL];
 minZoneExtend: CARDINAL ← 10;
 AddZoneSegment: PUBLIC PROCEDURE [
  h: ParserCommon.ContextPtr, zoneSegment: ResMgrStorage.BufferList] =
  BEGIN
  newZoneSegment: ParserCommon.ZonePtr ← zoneSegment.base;
  newZoneSegment.length ← Inline.LowHalf[
   Inline.DBITSHIFT[zoneSegment.allocateSize, Environment.logWordsPerPage]];
  newZoneSegment.UBU ← 4;
  newZoneSegment.nextZone ← h.zoneRecPtr.zonePtr;
  h.zoneRecPtr.zonePtr ← newZoneSegment;
  END;

 AllocateNode: PROCEDURE [h: ParserCommon.ContextPtr]
  RETURNS [extendZone: BOOLEAN] =
  BEGIN
  zonePtr: ParserCommon.ZonePtr;
  outPutBlockSize: CARDINAL = 10;

  DO
   zonePtr ← h.zoneRecPtr.zonePtr;
   WHILE zonePtr # NIL DO
    IF zonePtr.UBU + h.nodeSizeInWords + 1 < zonePtr.length THEN {
     h.nodePtr ← LOOPHOLE[zonePtr + zonePtr.UBU, ParserCommon.NodePtr];
     LOOPHOLE[h.nodePtr, ParserCommon.NodePtr].nodeLength ←
      h.nodeSizeInWords;
     LOOPHOLE[h.nodePtr, ParserCommon.NodePtr].next ← NIL;
     h.nodePtr ← h.nodePtr + 1;
     zonePtr.UBU ← zonePtr.UBU + h.nodeSizeInWords + 1;
     RETURN[FALSE];
```

Copyright © 1992 Xerox Corporation All Rights Reserved

```
    };
   zonePtr ← zonePtr.nextZone;
   ENDLOOP;
  IF h.autoExtend THEN {
   newZoneBlock: ResMgrStorage.BufferList ← PostParserJobMemory.GetMem[
    ch: h.memoryHandle,
    numPages:
    ((((h.nodeSizeInWords - 1) / Environment.wordsPerPage) /
      outPutBlockSize) * outPutBlockSize + outPutBlockSize) !
    PostParserJobMemory.Error => {h.savedAction ← h.action; REJECT; }; ];
   AddZoneSegment[h: h, zoneSegment: newZoneBlock];
   LOOP;
   };
  h.savedAction ← h.action;
  h.action ← extendZone;
  RETURN[TRUE];
  ENDLOOP;
 END;

AllocateNode4: PUBLIC PROCEDURE [h: ParserCommon.ContextPtr]
 RETURNS [extendZone: BOOLEAN] =
 BEGIN
 ENABLE {
  UNWIND => NULL;
  ANY => {GenericESS.UnlockData[lock: @h.zoneRecPtr.zoneLock]; REJECT}};
 GenericESS.LockData[lock: @h.zoneRecPtr.zoneLock];
 IF h.zoneRecPtr.nodes4 = NIL THEN {
  h.nodeSizeInWords ← 4;
  extendZone ← AllocateNode[h: h];
  GenericESS.UnlockData[lock: @h.zoneRecPtr.zoneLock];
  RETURN[extendZone]};
 h.nodePtr ← h.zoneRecPtr.nodes4 + 1;
 h.zoneRecPtr.nodes4 ← h.zoneRecPtr.nodes4.next;
 GenericESS.UnlockData[lock: @h.zoneRecPtr.zoneLock];
 RETURN[extendZone: FALSE];
 END;

AllocateNode8: PUBLIC PROCEDURE [h: ParserCommon.ContextPtr]
 RETURNS [extendZone: BOOLEAN] =
 BEGIN
 ENABLE {
  UNWIND => NULL;
  ANY => {GenericESS.UnlockData[lock: @h.zoneRecPtr.zoneLock]; REJECT}};
 GenericESS.LockData[lock: @h.zoneRecPtr.zoneLock];
 IF h.zoneRecPtr.nodes8 = NIL THEN {
  h.nodeSizeInWords ← 8;
  extendZone ← AllocateNode[h: h];
  GenericESS.UnlockData[lock: @h.zoneRecPtr.zoneLock];
  RETURN[extendZone]};
 h.nodePtr ← h.zoneRecPtr.nodes8 + 1;
```

Copyright © 1992 Xerox Corporation All Rights Reserved

```
 h.zoneRecPtr.nodes8 ← h.zoneRecPtr.nodes8.next;
 GenericESS.UnlockData[lock: @h.zoneRecPtr.zoneLock];
 RETURN[extendZone: FALSE];
 END;

AllocateNode16: PUBLIC PROCEDURE [h: ParserCommon.ContextPtr]
 RETURNS [extendZone: BOOLEAN] =
 BEGIN
 ENABLE {
  UNWIND = > NULL;
  ANY = > {GenericESS.UnlockData[lock: @h.zoneRecPtr.zoneLock]; REJECT}};
 GenericESS.LockData[lock: @h.zoneRecPtr.zoneLock];
 IF h.zoneRecPtr.nodes16 = NIL THEN {
  h.nodeSizeInWords ← 16;
  extendZone ← AllocateNode[h: h];
  GenericESS.UnlockData[lock: @h.zoneRecPtr.zoneLock];
  RETURN[extendZone]};
 h.nodePtr ← h.zoneRecPtr.nodes16 + 1;
 h.zoneRecPtr.nodes16 ← h.zoneRecPtr.nodes16.next;
 GenericESS.UnlockData[lock: @h.zoneRecPtr.zoneLock];
 RETURN[extendZone: FALSE];
 END;

AllocateNode32: PUBLIC PROCEDURE [h: ParserCommon.ContextPtr]
 RETURNS [extendZone: BOOLEAN] =
 BEGIN
 ENABLE {
  UNWIND = > NULL;
  ANY = > {GenericESS.UnlockData[lock: @h.zoneRecPtr.zoneLock]; REJECT}};
 GenericESS.LockData[lock: @h.zoneRecPtr.zoneLock];
 IF h.zoneRecPtr.nodes32 = NIL THEN {
  h.nodeSizeInWords ← 32;
  extendZone ← AllocateNode[h: h];
  GenericESS.UnlockData[lock: @h.zoneRecPtr.zoneLock];
  RETURN[extendZone]};
 h.nodePtr ← h.zoneRecPtr.nodes32 + 1;
 h.zoneRecPtr.nodes32 ← h.zoneRecPtr.nodes32.next;
 GenericESS.UnlockData[lock: @h.zoneRecPtr.zoneLock];
 RETURN[extendZone: FALSE];
 END;

AllocateNode64: PUBLIC PROCEDURE [h: ParserCommon.ContextPtr]
 RETURNS [extendZone: BOOLEAN] =
 BEGIN
 ENABLE {
  UNWIND = > NULL;
  ANY = > {GenericESS.UnlockData[lock: @h.zoneRecPtr.zoneLock]; REJECT}};
 GenericESS.LockData[lock: @h.zoneRecPtr.zoneLock];
 IF h.zoneRecPtr.nodes64 = NIL THEN {
  h.nodeSizeInWords ← 64;
```

Copyright © 1992 Xerox Corporation All Rights Reserved

```
    extendZone ← AllocateNode[h: h];
    GenericESS.UnlockData[lock: @h.zoneRecPtr.zoneLock];
    RETURN[extendZone]};
  h.nodePtr ← h.zoneRecPtr.nodes64 + 1;
  h.zoneRecPtr.nodes64 ← h.zoneRecPtr.nodes64.next;
  GenericESS.UnlockData[lock: @h.zoneRecPtr.zoneLock];
  RETURN[extendZone: FALSE];
  END;

AllocateNode128: PUBLIC PROCEDURE [h: ParserCommon.ContextPtr]
  RETURNS [extendZone: BOOLEAN] =
  BEGIN
  ENABLE {
    UNWIND => NULL;
    ANY => {GenericESS.UnlockData[lock: @h.zoneRecPtr.zoneLock]; REJECT}};
  GenericESS.LockData[lock: @h.zoneRecPtr.zoneLock];
  IF h.zoneRecPtr.nodes128 = NIL THEN {
    h.nodeSizeInWords ← 128;
    extendZone ← AllocateNode[h: h];
    GenericESS.UnlockData[lock: @h.zoneRecPtr.zoneLock];
    RETURN[extendZone]};
  h.nodePtr ← h.zoneRecPtr.nodes128 + 1;
  h.zoneRecPtr.nodes128 ← h.zoneRecPtr.nodes128.next;
  GenericESS.UnlockData[lock: @h.zoneRecPtr.zoneLock];
  RETURN[extendZone: FALSE];
  END;

AllocateNodeFFL: PUBLIC PROCEDURE [h: ParserCommon.ContextPtr]
  RETURNS [extendZone: BOOLEAN] =
  BEGIN
  ENABLE {
    UNWIND => NULL;
    ANY => {GenericESS.UnlockData[lock: @h.zoneRecPtr.zoneLock]; REJECT}};
  GenericESS.LockData[lock: @h.zoneRecPtr.zoneLock];
  IF h.zoneRecPtr.nodesFFL = NIL THEN {

    h.nodeSizeInWords ← SIZE[PreParserCommon.Frame];
    extendZone ← AllocateNode[h: h];
    GenericESS.UnlockData[lock: @h.zoneRecPtr.zoneLock];
    RETURN[extendZone]};
  h.nodePtr ← h.zoneRecPtr.nodesFFL + 1;
  h.zoneRecPtr.nodesFFL ← h.zoneRecPtr.nodesFFL.next;
  GenericESS.UnlockData[lock: @h.zoneRecPtr.zoneLock];
  RETURN[extendZone: FALSE];
  END;

AllocateNodeNFL: PUBLIC PROCEDURE [h: ParserCommon.ContextPtr]
  RETURNS [extendZone: BOOLEAN] =
  BEGIN
  ENABLE {
```

Copyright © 1992 Xerox Corporation All Rights Reserved

```
  UNWIND = > NULL;
  ANY = > {GenericESS.UnlockData[lock: @h.zoneRecPtr.zoneLock]; REJECT}};
 previous: ParserCommon.NodePtr;
 previousToSmallest: ParserCommon.NodePtr;
 searchPtr: ParserCommon.NodePtr;
 smallestNodeFound: CARDINAL;
 found: BOOLEAN ← FALSE;
 GenericESS.LockData[lock: @h.zoneRecPtr.zoneLock];
 IF h.zoneRecPtr.nodesNFL = NIL THEN {
  extendZone ← AllocateNode[h: h];
  GenericESS.UnlockData[lock: @h.zoneRecPtr.zoneLock];
  RETURN[extendZone]};
 previous ← NIL;
 previousToSmallest ← NIL;
 searchPtr ← h.zoneRecPtr.nodesNFL;
 smallestNodeFound ← LAST[CARDINAL];
 DO
  IF searchPtr.nodeLength = h.nodeSizeInWords THEN {
   previousToSmallest ← previous; found ← TRUE; EXIT; };
  IF searchPtr.nodeLength > h.nodeSizeInWords
   AND searchPtr.nodeLength < smallestNodeFound THEN {
   previousToSmallest ← previous;
   smallestNodeFound ← searchPtr.nodeLength;
   found ← TRUE;
   };
  previous ← searchPtr;
  searchPtr ← searchPtr.next;
  IF searchPtr = NIL THEN EXIT;
  ENDLOOP;
 IF ~found THEN {
  extendZone ← AllocateNode[h: h];
  GenericESS.UnlockData[lock: @h.zoneRecPtr.zoneLock];
  RETURN[extendZone]};
 IF previous = NIL OR previousToSmallest = NIL THEN {
  h.nodePtr ← h.zoneRecPtr.nodesNFL + 1;
  h.zoneRecPtr.nodesNFL ← h.zoneRecPtr.nodesNFL.next;
  GenericESS.UnlockData[lock: @h.zoneRecPtr.zoneLock];
  RETURN[FALSE]};
 h.nodePtr ← previousToSmallest.next + 1;
 previousToSmallest.next ← previousToSmallest.next.next;
 GenericESS.UnlockData[lock: @h.zoneRecPtr.zoneLock];
 RETURN[FALSE];
 END;

FreeNode4: PUBLIC PROCEDURE [h: ParserCommon.ContextPtr] RETURNS [] =
 BEGIN
 ENABLE {
  UNWIND = > NULL;
  ANY = > {GenericESS.UnlockData[lock: @h.zoneRecPtr.zoneLock]; REJECT}};
 GenericESS.LockData[lock: @h.zoneRecPtr.zoneLock];
```

Copyright © 1992 Xerox Corporation All Rights Reserved

```
 h.nodePtr ← h.nodePtr - 1;
 LOOPHOLE[h.nodePtr, ParserCommon.NodePtr].next ← h.zoneRecPtr.nodes4;
 h.zoneRecPtr.nodes4 ← h.nodePtr;
 GenericESS.UnlockData[lock: @h.zoneRecPtr.zoneLock];
 RETURN[];
 END;

FreeNode8: PUBLIC PROCEDURE [h: ParserCommon.ContextPtr] RETURNS [] =
 BEGIN
 ENABLE {
  UNWIND => NULL;
  ANY => {GenericESS.UnlockData[lock: @h.zoneRecPtr.zoneLock]; REJECT}};
 GenericESS.LockData[lock: @h.zoneRecPtr.zoneLock];
 h.nodePtr ← h.nodePtr - 1;
 LOOPHOLE[h.nodePtr, ParserCommon.NodePtr].next ← h.zoneRecPtr.nodes8;
 h.zoneRecPtr.nodes8 ← h.nodePtr;
 GenericESS.UnlockData[lock: @h.zoneRecPtr.zoneLock];
 RETURN[];
 END;

FreeNode16: PUBLIC PROCEDURE [h: ParserCommon.ContextPtr] RETURNS [] =
 BEGIN
 ENABLE {
  UNWIND => NULL;
  ANY => {GenericESS.UnlockData[lock: @h.zoneRecPtr.zoneLock]; REJECT}};
 GenericESS.LockData[lock: @h.zoneRecPtr.zoneLock];
 h.nodePtr ← h.nodePtr - 1;
 LOOPHOLE[h.nodePtr, ParserCommon.NodePtr].next ← h.zoneRecPtr.nodes16;
 h.zoneRecPtr.nodes16 ← h.nodePtr;
 GenericESS.UnlockData[lock: @h.zoneRecPtr.zoneLock];
 RETURN[];
 END;

FreeNode32: PUBLIC PROCEDURE [h: ParserCommon.ContextPtr] RETURNS [] =
 BEGIN
 ENABLE {
  UNWIND => NULL;
  ANY => {GenericESS.UnlockData[lock: @h.zoneRecPtr.zoneLock]; REJECT}};
 GenericESS.LockData[lock: @h.zoneRecPtr.zoneLock];
 h.nodePtr ← h.nodePtr - 1;
 LOOPHOLE[h.nodePtr, ParserCommon.NodePtr].next ← h.zoneRecPtr.nodes32;
 h.zoneRecPtr.nodes32 ← h.nodePtr;
 GenericESS.UnlockData[lock: @h.zoneRecPtr.zoneLock];
 RETURN[];
 END;

FreeNode64: PUBLIC PROCEDURE [h: ParserCommon.ContextPtr] RETURNS [] =
 BEGIN
 ENABLE {
  UNWIND => NULL;
```

Copyright © 1992 Xerox Corporation All Rights Reserved

```
  ANY => {GenericESS.UnlockData[lock: @h.zoneRecPtr.zoneLock]; REJECT}};
 GenericESS.LockData[lock: @h.zoneRecPtr.zoneLock];
 h.nodePtr ← h.nodePtr - 1;
 LOOPHOLE[h.nodePtr, ParserCommon.NodePtr].next ← h.zoneRecPtr.nodes64;
 h.zoneRecPtr.nodes64 ← h.nodePtr;
 GenericESS.UnlockData[lock: @h.zoneRecPtr.zoneLock];
 RETURN[];
 END;

FreeNode128: PUBLIC PROCEDURE [h: ParserCommon.ContextPtr] RETURNS [] =
 BEGIN
 ENABLE {
  UNWIND => NULL;
  ANY => {GenericESS.UnlockData[lock: @h.zoneRecPtr.zoneLock]; REJECT}};
 GenericESS.LockData[lock: @h.zoneRecPtr.zoneLock];
 h.nodePtr ← h.nodePtr - 1;
 LOOPHOLE[h.nodePtr, ParserCommon.NodePtr].next ← h.zoneRecPtr.nodes128;
 h.zoneRecPtr.nodes128 ← h.nodePtr;
 GenericESS.UnlockData[lock: @h.zoneRecPtr.zoneLock];
 RETURN[];
 END;

FreeNodeFFL: PUBLIC PROCEDURE [h: ParserCommon.ContextPtr] RETURNS [] =
 BEGIN
 ENABLE {
  UNWIND => NULL;
  ANY => {GenericESS.UnlockData[lock: @h.zoneRecPtr.zoneLock]; REJECT}};
 GenericESS.LockData[lock: @h.zoneRecPtr.zoneLock];
 h.nodePtr ← h.nodePtr - 1;
 LOOPHOLE[h.nodePtr, ParserCommon.NodePtr].next ← h.zoneRecPtr.nodesFFL;
 h.zoneRecPtr.nodesFFL ← h.nodePtr;
 GenericESS.UnlockData[lock: @h.zoneRecPtr.zoneLock];
 RETURN[];
 END;

FreeNodeNFL: PUBLIC PROCEDURE [h: ParserCommon.ContextPtr] RETURNS [] =
 BEGIN
 ENABLE {
  UNWIND => NULL;
  ANY => {GenericESS.UnlockData[lock: @h.zoneRecPtr.zoneLock]; REJECT}};
 GenericESS.LockData[lock: @h.zoneRecPtr.zoneLock];
 h.nodePtr ← h.nodePtr - 1;
 LOOPHOLE[h.nodePtr, ParserCommon.NodePtr].next ← h.zoneRecPtr.nodesNFL;
 h.zoneRecPtr.nodesNFL ← h.nodePtr;
 GenericESS.UnlockData[lock: @h.zoneRecPtr.zoneLock];
 RETURN[];
 END;

GetMinBlockSize: PUBLIC PROCEDURE [h: ParserCommon.ContextPtr]
 RETURNS [minimumBlockSizeInPages: CARDINAL] =
```

Copyright © 1992 Xerox Corporation All Rights Reserved

```
BEGIN
RETURN[
 MAX[
  (h.nodeSizeInWords + Environment.wordsPerPage - 1) /
   Environment.wordsPerPage, minZoneExtend]];
END;

GuaranteeNode64: PUBLIC PROCEDURE [h: ParserCommon.ContextPtr]
 RETURNS [extendZone: BOOLEAN] =
 BEGIN
 ENABLE {
  UNWIND => NULL;
  ANY => {GenericESS.UnlockData[lock: @h.zoneRecPtr.zoneLock]; REJECT}};
 IF h.zoneRecPtr.nodes64 # NIL THEN RETURN[extendZone: FALSE];
 IF AllocateNode64[h: h].extendZone THEN RETURN[extendZone: TRUE];
 FreeNode64[h: h];
 RETURN[extendZone: FALSE];
 END;
Initialize: PUBLIC PROCEDURE [frameSize: CARDINAL] RETURNS [] =
 BEGIN myFrameSize ← frameSize; END;
InitializeZone: PUBLIC PROCEDURE [h: ParserCommon.ContextPtr] =
 BEGIN
 h.nodeSizeInWords ← 4;
 THROUGH [0..4) DO
  IF IPMicrocode.CALL[function: IPFunction.AllocateNodeNFL, entryContext: h] #
   0 THEN RETURN;
  [] ← IPMicrocode.CALL[function: IPFunction.FreeNode4, entryContext: h];
  ENDLOOP;
 h.nodeSizeInWords ← 8;
 THROUGH [0..4) DO
  IF IPMicrocode.CALL[function: IPFunction.AllocateNodeNFL, entryContext: h] #
   0 THEN RETURN;
  [] ← IPMicrocode.CALL[function: IPFunction.FreeNode8, entryContext: h];
  ENDLOOP;
 h.nodeSizeInWords ← 16;
 THROUGH [0..4) DO
  IF IPMicrocode.CALL[function: IPFunction.AllocateNodeNFL, entryContext: h] #
   0 THEN RETURN;
  [] ← IPMicrocode.CALL[function: IPFunction.FreeNode16, entryContext: h];
  ENDLOOP;
 h.nodeSizeInWords ← 32;
 THROUGH [0..1) DO
  IF IPMicrocode.CALL[function: IPFunction.AllocateNodeNFL, entryContext: h] #
   0 THEN RETURN;
  [] ← IPMicrocode.CALL[function: IPFunction.FreeNode32, entryContext: h];
  ENDLOOP;
 h.nodeSizeInWords ← 64;
 THROUGH [0..1) DO
  IF IPMicrocode.CALL[function: IPFunction.AllocateNodeNFL, entryContext: h] #
   0 THEN RETURN;
```

Copyright © 1992 Xerox Corporation All Rights Reserved

```
  [] ← IPMicrocode.CALL[function: IPFunction.FreeNode64, entryContext: h];
  ENDLOOP;
 IF (h.contextType = preParserManagerContext)
  OR (h.contextType = preParserMainLoopContext) THEN {
  h.nodeSizeInWords ← myFrameSize;
  THROUGH [0..2) DO
   IF IPMicrocode.CALL[function: IPFunction.AllocateNodeNFL, entryContext: h]
    # 0 THEN RETURN;
   [] ← IPMicrocode.CALL[function: IPFunction.FreeNodeFFL, entryContext: h];
   ENDLOOP;
  };
 END;
END.
```

Copyright © 1992 Xerox Corporation All Rights Reserved

```
DIRECTORY
 DirectoryID USING [ObjectID],
 Environment USING [Byte],
 CoalescerTable USING [BitMapEntry, BitMapEntryLinkHandle],
 FixedPointReal USING [FromReal, Number],
 Heap USING [Error],
 IM USING [Error, InstallHandle, InstallStatusProcType, TransmitPixelVectorInfo],
 Inline USING [BITOR],
 InternalIP USING [Token, ColorRange],
 IPFunction USING [
  AllocateNode16, AllocateNodeNFL, PrePushStack, PrePutToken, RealToFPR],
 IPMicrocode USING [CALL],
 PreParserColor USING [FindNodeInList],
 PreParserColorPrivate USING [CreateDistinctColor, TryMakeInkWell],
 PreParserCommon USING [
  AllocateNode16Size, Assertion, ByteSeq, Color, ColorOpType, ComposedOp,
  MainHandle, maxImages, PixelArray, PixelArrayPtr, PixelVectorPtr, StackEntry,
  StackEntryPtr, TransformationPtr, VectorOfElementsPtr],
 PreParserFrameStack USING [ComplexNodeRefCount, PushStack],
 PreParserInline USING [CloseBitMapEntry, OpenBitMapEntry],
 PreParserInstructions USING [
  EqualIds, CardinalValue, IdentifierValue, MesaStringFromVectorOfIdentifier,
  Warning, WrongType, WrongValue],
 PreParserMainErrors USING [
  badOperandValue, findOperationFailed, imageInstallDirError, imageInstallError,
  imageInstallNotAvailable, insertFileProblem, insufficientMemory,
  invalidOperandTypeOnStack, numericError, rasterDirectoryFull,
  smHeapAllocationError, unexpectedError],
 PreParserMainOps USING [CheckGraphic],
 PreParserSequence USING [InstallPixelArray, InstallFailed],
 PreParserTForm USING [
  Concatenate, ConvertPPCTransToTMatrix, ConvertTMatrixToPPCTrans],
 RasterDirectorySupervisor USING [GetImageIdFromRasterId],
 Real USING [FixI, RealException, RoundI],
 RealFns USING [AlmostEqual, Power],
 RMDirectory USING [Register, UnRegister],
 RTOSFile USING [FileID, nullID],
 Transformation USING [Matrix];

PreParserColorImpl: MONITOR
 IMPORTS
  FixedPointReal, Heap, IM, Inline, IPMicrocode, PreParserColor,
  PreParserColorPrivate, PreParserInline, PreParserInstructions,
  PreParserFrameStack, PreParserMainOps, PreParserSequence, PreParserTForm,
  RasterDirectorySupervisor, Real, RealFns, RMDirectory
 EXPORTS PreParserColor, PreParserColorPrivate =
 BEGIN

 BitMapEntryPtr: TYPE = LONG POINTER TO CoalescerTable.BitMapEntry ← NIL;
```

Copyright © 1992 Xerox Corporation All Rights Reserved

```
AllocateNode16Check: PreParserCommon.Assertion =
 (SIZE[PreParserCommon.ComposedOp] < = PreParserCommon.AllocateNode16Size);
scaleValue: REAL = 1 / (600 * 39.37);

imStatusAvailable: CONDITION;
saveMainHandlePtr: PreParserCommon.MainHandle ← NIL;

ColorNotFound: ERROR = CODE;
ColorOpNotFound: ERROR = CODE;
ColorModelOpNotFound: ERROR = CODE;
InvalidColorParameters: ERROR = CODE;

ExtendZone: PUBLIC SIGNAL = CODE;

CheckVectorOfIdent: PUBLIC PROCEDURE [h: PreParserCommon.MainHandle]
 RETURNS [failed: BOOLEAN ← FALSE] =
 BEGIN
 count: CARDINAL;
 IF h.sv.operand01.type # vectorOfElements THEN GOTO failed;
 count ← h.sv.operand01.vectorPtr ↑ .count;
 h.stackEntryPtr ← @h.sv.operand01.vectorPtr ↑ .elements[0];
 THROUGH [0..count) DO
  IF h.stackEntryPtr ↑ .type # identifier THEN GOTO failed;
  h.stackEntryPtr ← h.stackEntryPtr + SIZE[PreParserCommon.StackEntry];
  ENDLOOP;
 EXITS
  failed = > {
   failed ← TRUE;
   h.errorCode ← PreParserMainErrors.invalidOperandTypeOnStack};
 END;
FindColor: PUBLIC PROCEDURE [h: PreParserCommon.MainHandle]
 RETURNS [loop: BOOLEAN ← FALSE] =
 BEGIN
 ENABLE
  ExtendZone = > {h.pc.pcm.savedAction ← findColor; loop ← TRUE; CONTINUE};
 IF CheckVectorOfIdent[h: h].failed THEN RETURN[loop: TRUE];
 h.stackEntry ← ColorFromColorName[h, h.sv.operand01.vectorPtr];
 PreParserFrameStack.ComplexNodeRefCount[
  h: h, entryPtr: @h.sv.operand01, delta: -1];
 IF IPMicrocode.CALL[function: IPFunction.PrePushStack, entryContext: h].result
  # 0 THEN {h.pc.pcm.savedAction ← PrePushStack; RETURN[loop: TRUE]; };
 END;
FindColorModelOp: PUBLIC PROCEDURE [h: PreParserCommon.MainHandle]
 RETURNS [loop: BOOLEAN ← FALSE] =
 BEGIN
 ENABLE
  ColorModelOpNotFound = > {
   h.pc.pcm.data.code ← PreParserMainErrors.findOperationFailed;
   h.pc.pcm.action ← fatalError;
```

Copyright © 1992 Xerox Corporation All Rights Reserved

```
    h.tempData.name ← PreParserInstructions.IdentifierValue[
     z: h.smZone, s: @h.sv.operand01, acceptVectors: TRUE];
    loop ← TRUE;
    CONTINUE;
    };
  IF CheckVectorOfIdent[h: h].failed THEN RETURN[loop: TRUE];
  h.stackEntry.type ← composedOp;
  h.pc.pcm.zoneRecPtr ← @h.zone;
  IF IPMicrocode.CALL[
   function: IPFunction.AllocateNode16, entryContext: h].result # 0 THEN {
   h.pc.pcm.savedAction ← findColorModelOp; RETURN[loop: TRUE]; };

  h.stackEntry.type ← composedOp;
  h.stackEntry.composedOpPtr ← h.pc.pcm.nodePtr;
  h.stackEntry.composedOpPtr.cn ← [
   fill: 0, preambleOwned: FALSE, referenceCount: 1, next: NIL,
   type: composedOp, zoneRecPtr: @h.zone];

  h.stackEntry.composedOpPtr.var ← colorOpOrModelOp[
   colorOp: FALSE, colorOpType: LookUpColorModelOp[h.sv.operand01.vectorPtr],
   params: NIL];
  PreParserFrameStack.ComplexNodeRefCount[
   h: h, entryPtr: @h.sv.operand01, delta: -1];
  IF IPMicrocode.CALL[function: IPFunction.PrePushStack, entryContext: h].result
   # 0 THEN {h.pc.pcm.savedAction ← PrePushStack; RETURN[loop: TRUE]; };
  END;
 FindColorOp: PUBLIC PROCEDURE [h: PreParserCommon.MainHandle]
  RETURNS [loop: BOOLEAN ← FALSE] =
  BEGIN
  IF CheckVectorOfIdent[h: h].failed THEN RETURN[loop: TRUE];
  h.pc.pcm.data.code ← PreParserMainErrors.findOperationFailed;
  h.pc.pcm.action ← fatalError;
  h.tempData.name ← PreParserInstructions.IdentifierValue[
   z: h.smZone, s: @h.sv.operand01, acceptVectors: TRUE];
  RETURN[loop: TRUE];
  END;
 FindDecompressor: PUBLIC PROCEDURE [h: PreParserCommon.MainHandle]
  RETURNS [loop: BOOLEAN ← FALSE] =
  BEGIN
  IF CheckVectorOfIdent[h: h].failed THEN RETURN[loop: TRUE];
  h.pc.pcm.data.code ← PreParserMainErrors.findOperationFailed;
  h.pc.pcm.action ← fatalError;
  h.tempData.name ← PreParserInstructions.IdentifierValue[
   z: h.smZone, s: @h.sv.operand01, acceptVectors: TRUE];
  RETURN[loop: TRUE];
  END;

 EqualIdentifier: PUBLIC PROCEDURE [
  h: PreParserCommon.MainHandle, s: LONG STRING]
  RETURNS [equal: BOOLEAN ← FALSE] =
```

Copyright © 1992 Xerox Corporation All Rights Reserved

```
  BEGIN
  SameChar: PROC [char1: CHAR, char2: CHAR] RETURNS [BOOLEAN] = INLINE {
   RETURN[Inline.BITOR[char1, 40B] = Inline.BITOR[char2, 40B]]};
  count: CARDINAL;
  IF h.stackEntryPtr ↑ .type # identifier THEN RETURN;
  IF (count ← h.stackEntryPtr ↑ .idStringPtr.length) # s.length THEN RETURN;
  FOR i: CARDINAL IN [0..count) DO
   IF SameChar[h.stackEntryPtr ↑ .idStringPtr.chars[i], s[i]] THEN RETURN;
   ENDLOOP;
  RETURN[equal: TRUE];
  END;

 GetReal: PROC [s: PreParserCommon.StackEntryPtr] RETURNS [r: REAL] =
  BEGIN
  SELECT s.type FROM
   fixedPointReal => r ← s.fixed.int;
   real => r ← s.real;
   cardinal => r ← s.cardinal;
   roundedInteger => r ← s.integer;
   ENDCASE => ERROR PreParserInstructions.WrongType;
  END;
 LookUpColorModelOp: PROC [colorModelName:
PreParserCommon.VectorOfElementsPtr]
  RETURNS [colorOp: PreParserCommon.ColorOpType] =
  BEGIN
  IF colorModelName.count < 2
   OR NOT PreParserInstructions.EqualIds["Xerox"L, @colorModelName.elements[0]]
   THEN ERROR ColorModelOpNotFound
  ELSE {
   name: PreParserCommon.StackEntryPtr = @colorModelName.elements[1];
   SELECT TRUE FROM
    PreParserInstructions.EqualIds["GrayLinear"L, name] =>
     colorOp ← XeroxGrayLinear;
    PreParserInstructions.EqualIds["GrayDensity"L, name] =>
     colorOp ← XeroxGrayDensity;
    PreParserInstructions.EqualIds["GrayVisual"L, name] =>
     colorOp ← XeroxGrayVisual;
    PreParserInstructions.EqualIds["RGBLinear"L, name] =>
     colorOp ← XeroxRGBLinear;
    PreParserInstructions.EqualIds["YESLinear"L, name] =>
     colorOp ← XeroxYESLinear;
    PreParserInstructions.EqualIds["Research"L, name]
     AND (colorModelName.count = 3) => {
     SELECT TRUE FROM
      PreParserInstructions.EqualIds[
       "RGBLinear"L, @colorModelName.elements[2]] =>
       colorOp ← XeroxResearchRGBLinear;
      ENDCASE => ERROR ColorModelOpNotFound;
     };
    ENDCASE => ERROR ColorModelOpNotFound;
```

Copyright © 1992 Xerox Corporation All Rights Reserved

```
  };
 END;
ColorFromColorName: PROC [
 h: PreParserCommon.MainHandle, colorName: PreParserCommon.VectorOfElementsPtr]
 RETURNS [color: PreParserCommon.StackEntry] =
 BEGIN
 ENABLE
  ColorNotFound => {
   colorNameStr: LONG STRING ←
    PreParserInstructions.MesaStringFromVectorOfIdentifier[
    h.smZone, colorName];
   PreParserInstructions.Warning[
    h.pc.pcm.clientContext, [colorSubstitued[colorName: colorNameStr]]];
   color.colorRange ← LAST[InternalIP.ColorRange] / 2;
   CONTINUE;
   };
 color.type ← grayColor;
 IF colorName.count < 2
  OR NOT PreParserInstructions.EqualIds["Xerox"L, @colorName.elements[0]] THEN
  ERROR ColorNotFound;
 SELECT TRUE FROM
  PreParserInstructions.EqualIds["Highlight"L, @colorName.elements[1]] =>
   color.colorRange ← LAST[InternalIP.ColorRange] / 2;
  PreParserInstructions.EqualIds["Solid"L, @colorName.elements[1]] =>
   IF colorName.count # 3 THEN ERROR ColorNotFound
   ELSE {
    name: PreParserCommon.StackEntryPtr = @colorName.elements[2];
    SELECT TRUE FROM
     PreParserInstructions.EqualIds["Black"L, name],
      PreParserInstructions.EqualIds["Blue"L, name],
      PreParserInstructions.EqualIds["Cyan"L, name],
      PreParserInstructions.EqualIds["Red"L, name],
      PreParserInstructions.EqualIds["Green"L, name],
      PreParserInstructions.EqualIds["Black"L, name] =>
      color.colorRange ← LAST[InternalIP.ColorRange];
     PreParserInstructions.EqualIds["White"L, name],
      PreParserInstructions.EqualIds["Yellow"L, name] =>
      color.colorRange ← FIRST[InternalIP.ColorRange];
     ENDCASE => ERROR ColorNotFound;
    };
  PreParserInstructions.EqualIds["Distinct"L, @colorName.elements[1]] =>
   IF colorName.count # 3 THEN ERROR ColorNotFound
   ELSE {
    name: PreParserCommon.StackEntryPtr = @colorName.elements[2];
    SELECT TRUE FROM
     PreParserInstructions.EqualIds["White"L, name] =>
      color.colorRange ← FIRST[InternalIP.ColorRange];
     PreParserInstructions.EqualIds["Gray"L, name] =>
      color.colorRange ← LAST[InternalIP.ColorRange] / 2;
     PreParserInstructions.EqualIds["Black"L, name] =>
```

Copyright © 1992 Xerox Corporation All Rights Reserved

```
      color.colorRange ← LAST[InternalIP.ColorRange];
     PreParserInstructions.EqualIds["Yellow"L, name] =>
      color ← PreParserColorPrivate.CreateDistinctColor[h, yellow];
     PreParserInstructions.EqualIds["Green"L, name] =>
      color ← PreParserColorPrivate.CreateDistinctColor[h, green];
     PreParserInstructions.EqualIds["Red"L, name] =>
      color ← PreParserColorPrivate.CreateDistinctColor[h, red];
     PreParserInstructions.EqualIds["Blue"L, name] =>
      color ← PreParserColorPrivate.CreateDistinctColor[h, blue];
     ENDCASE => ERROR ColorNotFound;
    };
  ENDCASE => ERROR ColorNotFound;
 END;
ColorFromColorOp: PROC [
 colorOp: PreParserCommon.ColorOpType,
 parameters: PreParserCommon.VectorOfElementsPtr]
 RETURNS [constantColor: InternalIP.ColorRange ← 0] = BEGIN END;

ColorFromColorModelOp: PROC [
 colorModel: PreParserCommon.ColorOpType,
 vectorOfNumbers, parameters: PreParserCommon.VectorOfElementsPtr]
 RETURNS [constantColor: InternalIP.ColorRange ← 0] =
 BEGIN
 f: REAL ← 0;
 GetS: PROC [s0Index, pixelMapIndex: CARDINAL] RETURNS [REAL ← 0] = {
  s0: PreParserCommon.StackEntryPtr = @vectorOfNumbers.elements[s0Index];
  IF pixelMapIndex > (parameters.count - 1) THEN RETURN[GetReal[s0]]
  ELSE {
   pixelMap: PreParserCommon.StackEntryPtr = @parameters.elements[
    pixelMapIndex];
   SELECT TRUE FROM
    pixelMap.type = fixedPointReal AND pixelMap.fixed.int = 0 =>
     RETURN[GetReal[s0]];
    pixelMap.type = vectorOfElements => {
     sIndex: CARDINAL = PreParserInstructions.CardinalValue[
      s0, pixelMap.count - 1];
     RETURN[GetReal[@pixelMap.vectorPtr.elements[sIndex]]];
     };
    ENDCASE => ERROR InvalidColorParameters;
   };
  };
 SELECT colorModel FROM
  XeroxGrayLinear =>
   IF parameters.count < 2 OR vectorOfNumbers.count # 1 THEN
    ERROR InvalidColorParameters
   ELSE {
    s: REAL ← 0;
    sWhite: REAL = GetReal[@parameters.elements[0]];
    sBlack: REAL = GetReal[@parameters.elements[1]];
    s ← GetS[0, 2];
```

Copyright © 1992 Xerox Corporation All Rights Reserved

```
    f ← MIN[MAX[((s - sWhite) / (sBlack - sWhite)), 0], 1];
    };
  XeroxGrayDensity =>
   IF parameters.count < 3 OR vectorOfNumbers.count # 1 THEN
    ERROR InvalidColorParameters
   ELSE {
    s, d: REAL ← 0;
    sWhite: REAL = GetReal[@parameters.elements[0]];
    sBlack: REAL = GetReal[@parameters.elements[1]];
    dBlack: REAL = GetReal[@parameters.elements[2]];
    s ← GetS[0, 3];
    d ← ((s - sWhite) / (sBlack - sWhite)) * dBlack;
    f ← MIN[MAX[1 - RealFns.Power[10, -d], 0], 1];
    };
  XeroxGrayVisual =>
   IF parameters.count < 2 OR vectorOfNumbers.count # 1 THEN
    ERROR InvalidColorParameters
   ELSE {
    s, L, Y: REAL ← 0;
    sWhite: REAL = GetReal[@parameters.elements[0]];
    sBlack: REAL = GetReal[@parameters.elements[1]];
    s ← GetS[0, 2];
    L ← (s - sBlack) / (sWhite - sBlack);
    Y ←
     IF L <= 0.08 THEN L / 9.033
     ELSE RealFns.Power[((L + 0.16) / 1.16), 3];
    f ← MIN[MAX[1 - Y, 0], 1];
    };
  XeroxRGBLinear =>
   IF parameters.count < 2 OR vectorOfNumbers.count # 3 THEN
    ERROR InvalidColorParameters
   ELSE {
    sWhite: REAL = GetReal[@parameters.elements[0]];
    sBlack: REAL = GetReal[@parameters.elements[1]];
    R: REAL ← GetS[0, 2];
    G: REAL ← GetS[1, 2];
    B: REAL ← GetS[2, 2];
    R ← (R - sBlack) / (sWhite - sBlack);
    G ← (G - sBlack) / (sWhite - sBlack);
    B ← (B - sBlack) / (sWhite - sBlack);
    f ← MIN[MAX[1 - (0.30 * R + 0.59 * G + 0.11 * B), 0], 1];
    };
  XeroxResearchRGBLinear =>
   IF parameters.count # 1 OR vectorOfNumbers.count # 3 THEN
    ERROR InvalidColorParameters
   ELSE {
    sMax: REAL = GetReal[@parameters.elements[0]];
    R: REAL ← GetReal[@vectorOfNumbers.elements[0]] / sMax;
    G: REAL ← GetReal[@vectorOfNumbers.elements[1]] / sMax;
    B: REAL ← GetReal[@vectorOfNumbers.elements[2]] / sMax;
```

Copyright © 1992 Xerox Corporation All Rights Reserved

```
    f ← MIN[MAX[1 - (0.30 * R + 0.59 * G + 0.11 * B), 0], 1];
    };
  XeroxYESLinear = >
   IF parameters.count < 4 OR vectorOfNumbers.count # 3 THEN
    ERROR InvalidColorParameters
   ELSE {
    sWhite: REAL = GetReal[@parameters.elements[0]];
    sBlack: REAL = GetReal[@parameters.elements[1]];
    Y: REAL ← GetS[0, 4];
    f ← MIN[MAX[1 - ((Y - sBlack) / (sWhite - sBlack)), 0], 1];
    };
  ENDCASE = > NULL;
 constantColor ← Real.RoundI[f * LAST[InternalIP.ColorRange]];
 END;
DoColorOperator: PUBLIC PROCEDURE [
 h: PreParserCommon.MainHandle, colorOp: PreParserCommon.ColorOpType,
 params: PreParserCommon.VectorOfElementsPtr,
 coords: PreParserCommon.VectorOfElementsPtr] RETURNS [loop: BOOLEAN ← FALSE] =
 BEGIN
 ENABLE {
  PreParserInstructions.WrongValue, InvalidColorParameters = > {
   h.pc.pcm.data.code ← PreParserMainErrors.badOperandValue;
   h.pc.pcm.action ← fatalError;
   loop ← TRUE;
   CONTINUE};
  PreParserInstructions.WrongType = > {
   h.pc.pcm.data.code ← PreParserMainErrors.invalidOperandTypeOnStack;
   h.pc.pcm.action ← fatalError;
   loop ← TRUE;
   CONTINUE;
   };
  Real.RealException = > {
   h.pc.pcm.data.code ← PreParserMainErrors.numericError;
   h.pc.pcm.action ← fatalError;
   loop ← TRUE;
   CONTINUE};
  };
 h.stackEntry.type ← grayColor;
 h.stackEntry.colorRange ←
  IF params = NIL THEN ColorFromColorOp[colorOp, coords]
  ELSE ColorFromColorModelOp[colorOp, coords, params];
 END;
MakeGray: PUBLIC PROCEDURE [h: PreParserCommon.MainHandle]
 RETURNS [loop: BOOLEAN ← FALSE] =
 BEGIN
 IF GetGray[h: h].failed THEN {
  h.pc.pcm.data.code ← PreParserMainErrors.invalidOperandTypeOnStack;
  h.pc.pcm.action ← fatalError;
  RETURN[loop: TRUE]};
 IF PreParserFrameStack.PushStack[h: h].extendZone THEN
```

Copyright © 1992 Xerox Corporation All Rights Reserved

```
  BEGIN h.pc.pcm.savedAction ← PrePushStack; RETURN[loop: TRUE]; END;
 END;
MakePixelArray: PUBLIC ENTRY PROCEDURE [h: PreParserCommon.MainHandle]
 RETURNS [loop: BOOLEAN ← FALSE] =
 BEGIN
 ENABLE UNWIND => NULL;
 tempT: Transformation.Matrix;
 pv: PreParserCommon.PixelVectorPtr ← h.sv.operand07.pixelVectorPtr;

 h.pc.pcm.nodeSizeInWords ← SIZE[PreParserCommon.PixelArray];
 h.pc.pcm.zoneRecPtr ← @h.zone;
 IF IPMicrocode.CALL[
  function: IPFunction.AllocateNodeNFL, entryContext: h].result # 0 THEN
  RETURN[loop: TRUE];
 h.stackEntry.type ← pixelArray;
 h.stackEntry.pixelArray ← h.pc.pcm.nodePtr;
 h.stackEntry.pixelArray ↑ ← [
  cn: [
  fill: 0, preambleOwned: FALSE, referenceCount: 1, next: NIL,
  type: pixelArray, zoneRecPtr: @h.zone], type: embedded,
  var: embedded[
  xPixels: CARDINAL[h.sv.operand01.integer],
  yPixels: CARDINAL[h.sv.operand02.integer],
  samplesPerPixel: CARDINAL[h.sv.operand03.integer],
  maxSampleValue: CARDINAL[h.sv.operand04.integer],
  samplesInterleaved: CARDINAL[h.sv.operand05.integer],
  m: h.sv.operand06.transformationPtr, resInfoObjectID: pv.resInfoObjectID,
  pv: pv]];

 IF pv.installed THEN {
  PreParserTForm.ConvertPPCTransToTMatrix[
   tIn: h.sv.operand06.transformationPtr, tOut: @tempT];

  IF pv.transmitPixelVectorInfo THEN {
   h.fill ← 0;

   h.pc.pcm.data.code ← PreParserMainErrors.unexpectedError;
   saveMainHandlePtr ← h;
   IM.TransmitPixelVectorInfo[
    installHandle: pv.installH, transformation: tempT,
    imageType: ipPixelVector,
    pixelArrayLengthInBytes: pv.pixelLengthInBytes, xScale: 0, yScale: 0,
    xPixel: CARDINAL[h.sv.operand01.integer],
    yPixel: CARDINAL[h.sv.operand02.integer] !
    IM.Error => {
     h.integer ← fault;
     h.pc.pcm.data.code ← PreParserMainErrors.imageInstallError;
     h.fill ← 0;
     CONTINUE;
     }; ];
```

Copyright © 1992 Xerox Corporation All Rights Reserved

```
    pv.transmitPixelVectorInfo ← FALSE;

    WHILE h.fill = 0 DO WAIT imStatusAvailable; ENDLOOP;
    saveMainHandlePtr ← NIL;
    IF h.pc.pcm.data.code # PreParserMainErrors.unexpectedError THEN
     GOTO failed;
    };

   h.stackEntry.pixelArray.resInfoObjectID ← pv.resInfoObjectID;
   };
  IF PreParserFrameStack.PushStack[h: h].extendZone THEN {
   h.pc.pcm.savedAction ← PrePushStack; RETURN[loop: TRUE]; };
  EXITS failed => {h.pc.pcm.action ← fatalError; loop ← TRUE};
  END;
 MakeSampledBlack: PUBLIC PROCEDURE [h: PreParserCommon.MainHandle]
  RETURNS [loop: BOOLEAN ← FALSE] =
  BEGIN
  ENABLE {
   ExtendZone => {
    h.pc.pcm.savedAction ← makeSampledBlack; loop ← TRUE; CONTINUE};
   PreParserSequence.InstallFailed => {
    h.pc.pcm.action ← fatalError;
    h.pc.pcm.data.code ← imError;
    h.integer ← faultCode;
    loop ← TRUE;
    CONTINUE};
   };
  pa: PreParserCommon.PixelArrayPtr = h.sv.operand01.pixelArray;
  um: PreParserCommon.TransformationPtr = h.sv.operand02.transformationPtr;
  clear: BOOLEAN = h.sv.operand03.integer = 1;
  IF NOT PreParserColorPrivate.TryMakeInkWell[h, pa, um, clear] THEN {
   IF GetSampled[h: h].loop THEN RETURN[loop: TRUE]; };
  PreParserFrameStack.ComplexNodeRefCount[
   h: h, entryPtr: @h.sv.operand01, delta: -1];
  PreParserFrameStack.ComplexNodeRefCount[
   h: h, entryPtr: @h.sv.operand02, delta: -1];
  IF PreParserFrameStack.PushStack[h: h].extendZone THEN {
   h.pc.pcm.savedAction ← PrePushStack; RETURN[loop: TRUE]; };
  END;
 MaskPixel: PUBLIC PROCEDURE [h: PreParserCommon.MainHandle]
  RETURNS [loop: BOOLEAN ← FALSE] =
  BEGIN
  ENABLE {
   Heap.Error => {
    h.pc.pcm.action ← fatalError;
    h.pc.pcm.data.code ← PreParserMainErrors.smHeapAllocationError;
    loop ← TRUE;
    CONTINUE};
   PreParserSequence.InstallFailed => {
    h.pc.pcm.action ← fatalError;
```

Copyright © 1992 Xerox Corporation All Rights Reserved

```
   h.pc.pcm.data.code ← imError;
   h.integer ← faultCode;
   loop ← TRUE;
   CONTINUE};
  };
 bitmapEntry: CoalescerTable.BitMapEntry;
 rasterObjTPtr: LONG POINTER TO Transformation.Matrix;
 originX, originY: REAL ← 0.0;

 IF h.pc.operationStage = 0 THEN {
  IF PreParserMainOps.CheckGraphic[h: h].needIIPBlock THEN {
   h.pc.pcm.savedAction ← maskPixel; RETURN[loop: TRUE]; };

  IF NOT h.sv.operand01.pixelArray.pv.installed THEN {
   PreParserSequence.InstallPixelArray[h, h.sv.operand01.pixelArray]; };

  IF h.sv.operand01.pixelArray.type = sif THEN {
   WITH sifResult: h.sv.operand01.pixelArray.sifResultPtr SELECT FROM
    RES = > {
     PreParserTForm.ConvertTMatrixToPPCTrans[
      h: h, fromT: @sifResult.RESInfo.maskImage.m, toT: @h.tempData.tIn];
     bitmapEntry ← [
      bitMapType: raster, id: sifResult.objectID,
      xPixel: sifResult.RESInfo.maskImage.xPixel,
      yPixel: sifResult.RESInfo.maskImage.yPixel, yPad: 0,
      originXOffset: 0, originYOffset: 0];
     };
    LGO = > {
     bitmapEntry ← [
      bitMapType: logo, id: sifResult.objectID,
      xPixel: sifResult.RESInfo.maskImage.xPixel,
      yPixel: sifResult.RESInfo.maskImage.yPixel, yPad: 0,
      originXOffset: 0, originYOffset: 0];
     };
    ENDCASE = > {
     h.pc.pcm.action ← fatalError;
     h.pc.pcm.data.code ← PreParserMainErrors.insertFileProblem;
     RETURN[loop: FALSE];
     };
   }
  ELSE
   bitmapEntry ← [
    bitMapType: raster, id: h.sv.operand01.pixelArray.resInfoObjectID,
    xPixel: h.sv.operand01.pixelArray.xPixels,
    yPixel: h.sv.operand01.pixelArray.yPixels, yPad: 0, originXOffset: 0,
    originYOffset: 0];
  PreParserTForm.Concatenate[
   h: h,
   t1:
   IF h.sv.operand01.pixelArray.type = sif THEN @h.tempData.tIn
```

Copyright © 1992 Xerox Corporation All Rights Reserved

```
   ELSE h.sv.operand01.pixelArray.m, t2: @h.imagerVars.t,
   tResult: @h.tempData.tForm];

  SELECT bitmapEntry.bitMapType FROM
   logo, raster = > rasterObjTPtr ← @bitmapEntry.transformation;
   ENDCASE = > {
    h.pc.pcm.action ← fatalError;
    h.pc.pcm.data.code ← PreParserMainErrors.unexpectedError;
    RETURN[loop: FALSE];
    };
  PreParserTForm.ConvertPPCTransToTMatrix[
   tIn: @h.tempData.tForm, tOut: rasterObjTPtr];

  originX ← rasterObjTPtr.c;
  originY ← rasterObjTPtr.f;
  rasterObjTPtr.c ← rasterObjTPtr.f ← 0.0;

  LOOPHOLE[@h.token, LONG POINTER TO maskImageIIP InternalIP.Token] ↑ ← [
   maskImageIIP[
   rec: [
   origin: [
   x: [lc[FixedPointReal.FromReal[originX].li]],
   y: [lc[FixedPointReal.FromReal[originY].li]]],
   index: GetBitmapIndexInCoalesce[h, @bitmapEntry]]]];
  }
 ELSE h.pc.operationStage ← 0;

 IF IPMicrocode.CALL[function: IPFunction.PrePutToken, entryContext: h].result
  # 0 THEN {
  h.pc.operationStage ← 1;
  h.pc.pcm.savedAction ← maskPixel;
  RETURN[loop: TRUE];
  };

 PreParserFrameStack.ComplexNodeRefCount[
  h: h, entryPtr: @h.sv.operand01, delta: -1];
 END;
GetBitmapIndexInCoalesce: PROC [
 h: PreParserCommon.MainHandle, bitmapEntryPtr: BitMapEntryPtr]
 RETURNS [CARDINAL] = {
 FOR bitMapTable: CoalescerTable.BitMapEntryLinkHandle ← h.bitMapTablePtrStart,
  bitMapTable.next UNTIL bitMapTable = NIL DO
  tableSize: CARDINAL =
   IF (bitMapTable = h.bitMapTablePtrCurrent) THEN h.bitMapTableCurrentLength
   ELSE PreParserCommon.maxImages;
  FOR i: CARDINAL IN [0..tableSize) DO
   IF BitMapEntryEqual[bitmapEntryPtr, @bitMapTable.list[i]] THEN RETURN[i];
   ENDLOOP;
  ENDLOOP;
 IF PreParserInline.OpenBitMapEntry[h: h].error THEN
```

Copyright © 1992 Xerox Corporation All Rights Reserved

```
  ERROR Heap.Error[insufficientSpace];
 h.bitMapEntryPtr↑ ← bitmapEntryPtr↑;
 PreParserInline.CloseBitMapEntry[h: h];
 RETURN[h.bitMapTableTotalLength - 1];
 };

BitMapEntryEqual: PROC [x, y: BitMapEntryPtr] RETURNS [BOOLEAN] = INLINE {
 RETURN[
  (x.bitMapType = y.bitMapType) AND (x.id = y.id) AND (x.xPixel = y.xPixel)
   AND (x.yPixel = y.yPixel) AND (x.originXOffset = y.originXOffset)
   AND (x.originYOffset = y.originYOffset)
   AND TransformationAlmostEqual[@x.transformation, @y.transformation]];
 };

TransformationAlmostEqual: PROC [s, t: LONG POINTER TO Transformation.Matrix]
 RETURNS [BOOLEAN] = INLINE {
 RETURN[
  (RealFns.AlmostEqual[s.a, t.a, -4] AND RealFns.AlmostEqual[s.b, t.b, -4]
   AND RealFns.AlmostEqual[s.c, t.c, -4]
   AND RealFns.AlmostEqual[s.d, t.d, -4]
   AND RealFns.AlmostEqual[s.e, t.e, -4]
   AND RealFns.AlmostEqual[s.f, t.f, -4])];
 };

ReportInstallStatus: PUBLIC ENTRY IM.InstallStatusProcType =
 BEGIN
 ENABLE UNWIND => NULL;
 IF saveMainHandlePtr # NIL THEN {
  hPageHandle: PreParserCommon.MainHandle ← PreParserColor.FindNodeInList[
   installHandle: installHandle !
   ANY => {
    saveMainHandlePtr.pc.pcm.data.code ←
     PreParserMainErrors.imageInstallError;
    saveMainHandlePtr.integer ← 2;
    }; ];

  IF hPageHandle = NIL THEN {
   saveMainHandlePtr.pc.pcm.data.code ←
    PreParserMainErrors.imageInstallError;
   saveMainHandlePtr.integer ← 2;
   }
  ELSE {
   IF installHandle # saveMainHandlePtr.sv.operand07.pixelVectorPtr.installH
    THEN {
    saveMainHandlePtr.pc.pcm.data.code ←
     PreParserMainErrors.imageInstallError;
    saveMainHandlePtr.integer ← 2}
   ELSE
    WITH installStatus SELECT FROM
     completed =>
```

Copyright © 1992 Xerox Corporation All Rights Reserved

```
      saveMainHandlePtr.sv.operand07.pixelVectorPtr.resInfoObjectID ← id;
     imError = >
      IF fault # 2 THEN {
       IF fault = 110 THEN {
        saveMainHandlePtr.pc.pcm.data.code ←
         PreParserMainErrors.insufficientMemory;
        saveMainHandlePtr.integer ← fault;
        }
       ELSE
        IF fault = 80 THEN {
         saveMainHandlePtr.pc.pcm.data.code ←
          PreParserMainErrors.rasterDirectoryFull;
         saveMainHandlePtr.integer ← fault;
         }
        ELSE
         IF fault = 112 THEN {
          saveMainHandlePtr.pc.pcm.data.code ←
           PreParserMainErrors.imageInstallNotAvailable;
          saveMainHandlePtr.integer ← fault;
          }
         ELSE {
          saveMainHandlePtr.pc.pcm.data.code ←
           PreParserMainErrors.imageInstallError;
          saveMainHandlePtr.integer ← fault;
          };
      };
     dirError = > {
      saveMainHandlePtr.pc.pcm.data.code ←
       PreParserMainErrors.imageInstallDirError;
      saveMainHandlePtr.integer ← fault;
      };
     ENDCASE;
   };
  saveMainHandlePtr.fill ← 1;
  NOTIFY imStatusAvailable;
  };
 END;
SetGray: PUBLIC PROCEDURE [h: PreParserCommon.MainHandle]
 RETURNS [loop: BOOLEAN ← FALSE] =
 BEGIN
 IF GetGray[h: h].failed THEN {
  h.pc.pcm.data.code ← PreParserMainErrors.invalidOperandTypeOnStack;
  h.pc.pcm.action ← fatalError;
  RETURN[loop: TRUE]};

 IF h.imagerVars.color # h.stackEntry THEN
  BEGIN
  h.imagerVars.color ← h.stackEntry;
  h.iipData.graphicChanged ← TRUE;
  h.iipData.fontChanged ← TRUE;
```

Copyright © 1992 Xerox Corporation All Rights Reserved

```
  END;
 END;
SetSampledBlack: PUBLIC PROCEDURE [h: PreParserCommon.MainHandle]
 RETURNS [loop: BOOLEAN ← FALSE] =
 BEGIN
 ENABLE {
  ExtendZone => {
   h.pc.pcm.savedAction ← setSampledBlack; loop ← TRUE; CONTINUE};
  PreParserSequence.InstallFailed => {
   h.pc.pcm.action ← fatalError;
   h.pc.pcm.data.code ← imError;
   h.integer ← faultCode;
   loop ← TRUE;
   CONTINUE};
  };
 pa: PreParserCommon.PixelArrayPtr = h.sv.operand01.pixelArray;
 clear: BOOLEAN = h.sv.operand03.integer = 1;
 PreParserTForm.Concatenate[
  h: h, t1: h.sv.operand02.transformationPtr, t2: @h.imagerVars.t,
  tResult: @h.tempData.tForm];

 h.sv.operand02.transformationPtr ↑ ← h.tempData.tForm;
 IF NOT PreParserColorPrivate.TryMakeInkWell[
  h, pa, h.sv.operand02.transformationPtr, clear] THEN {
  IF GetSampled[h: h].loop THEN RETURN[loop: TRUE]; };

 IF h.imagerVars.color # h.stackEntry THEN
  BEGIN
  IF h.imagerVars.color.type = color THEN {
   PreParserFrameStack.ComplexNodeRefCount[
    h: h, entryPtr: @h.imagerVars.color, delta: -1];
   };
  h.imagerVars.color ← h.stackEntry;
  h.iipData.graphicChanged ← TRUE;
  h.iipData.fontChanged ← TRUE;
  END;
 PreParserFrameStack.ComplexNodeRefCount[
  h: h, entryPtr: @h.sv.operand01, delta: -1];
 PreParserFrameStack.ComplexNodeRefCount[
  h: h, entryPtr: @h.sv.operand02, delta: -1];
 END;
GetGray: PROC [h: PreParserCommon.MainHandle]
 RETURNS [failed: BOOLEAN ← FALSE] = INLINE {
 h.stackEntry.type ← grayColor;
 SELECT h.sv.operand01.type FROM
  real => {
   x: REAL = h.sv.operand01.real;
   IF (x < 0) OR (x > 1) THEN RETURN[failed: TRUE];
   h.stackEntry.colorRange ← Real.Fix[x * LAST[InternalIP.ColorRange]];
   };
```

Copyright © 1992 Xerox Corporation All Rights Reserved

```
  ENDCASE => {
   x: INTEGER = h.sv.operand01.fixed.int;
   IF (x < 0) OR (x > 1) THEN RETURN[failed: TRUE];
   h.stackEntry.colorRange ← Real.FixI[x * LAST[InternalIP.ColorRange]];
   };
 };
GetSampled: PROCEDURE [h: PreParserCommon.MainHandle]
 RETURNS [loop: BOOLEAN ← FALSE] =
 BEGIN
 temp: FixedPointReal.Number;
 rasterObjTPtr: LONG POINTER TO Transformation.Matrix;
 h.stackEntry.type ← color;

 IF PreParserInline.OpenBitMapEntry[h: h].error THEN {
  h.pc.pcm.action ← fatalError; RETURN[loop: TRUE]; };
 h.pc.pcm.nodeSizeInWords ← SIZE[PreParserCommon.Color];
 h.pc.pcm.zoneRecPtr ← @h.zone;
 IF IPMicrocode.CALL[
  function: IPFunction.AllocateNodeNFL, entryContext: h].result # 0 THEN
  RETURN[loop: TRUE];
 h.stackEntry.colorPtr ← h.pc.pcm.nodePtr;
 IF h.sv.operand01.pixelArray.type = sif THEN {
  WITH sifResult: h.sv.operand01.pixelArray.sifResultPtr SELECT FROM
   RES => {
    PreParserTForm.ConvertTMatrixToPPCTrans[
     h: h, fromT: @sifResult.RESInfo.maskImage.m, toT: @h.tempData.tIn];
    PreParserTForm.Concatenate[
     h: h, t1: @h.tempData.tIn, t2: h.sv.operand02.transformationPtr,
     tResult: @h.tempData.tForm];
    h.bitMapEntryPtr ↑ ← [
     bitMapType: sampled, id: sifResult.objectID,
     xPixel: sifResult.RESInfo.maskImage.xPixel,
     yPixel: sifResult.RESInfo.maskImage.yPixel, yPad: 0, originXOffset: 0,
     originYOffset: 0];
    };
   ENDCASE => {
    h.pc.pcm.action ← fatalError;
    h.pc.pcm.data.code ← PreParserMainErrors.insertFileProblem;
    RETURN[loop: FALSE];
    };
  }
 ELSE {
  PreParserTForm.Concatenate[
   h: h, t1: h.sv.operand01.pixelArray.m,
   t2: h.sv.operand02.transformationPtr, tResult: @h.tempData.tForm];
  h.bitMapEntryPtr ↑ ← [
   bitMapType: sampled, id: h.sv.operand01.pixelArray.resInfoObjectID,
   xPixel: h.sv.operand01.pixelArray.xPixels,
   yPixel: h.sv.operand01.pixelArray.yPixels, yPad: 0, originXOffset: 0,
   originYOffset: 0];
```

Copyright © 1992 Xerox Corporation All Rights Reserved

```
  };

 SELECT h.bitMapEntryPtr.bitMapType FROM
  sampled => rasterObjTPtr ← @h.bitMapEntryPtr.transformation;
  ENDCASE => {
   h.pc.pcm.action ← fatalError;
   h.pc.pcm.data.code ← PreParserMainErrors.unexpectedError;
   RETURN[loop: FALSE];
   };

 PreParserTForm.ConvertPPCTransToTMatrix[
  tIn: @h.tempData.tForm, tOut: rasterObjTPtr];

 h.pc.pcm.real1 ← rasterObjTPtr.c;
 [] ← IPMicrocode.CALL[function: IPFunction.RealToFPR, entryContext: h];
 temp ← h.pc.pcm.fixed;
 h.pc.pcm.real1 ← rasterObjTPtr.f;
 [] ← IPMicrocode.CALL[function: IPFunction.RealToFPR, entryContext: h];
 rasterObjTPtr.c ← 1.0;
 rasterObjTPtr.f ← 0.0;

 h.stackEntry.colorPtr↑ ← [
  cn: [
  fill: 0, preambleOwned: FALSE, referenceCount: 1, next: NIL, type: color,
  zoneRecPtr: @h.zone], opaque: h.sv.operand03.integer = 0, dataDouble: FALSE,
  origin: [x: temp, y: h.pc.pcm.fixed], cTableIndex: h.bitMapTableTotalLength,
  inkWellCacheIndex: 0, coalesceEntry: h.bitMapEntryPtr↑,
  inkWellDataPtr: NIL];
 PreParserInline.CloseBitMapEntry[h: h];
 END;

NameFile: PROCEDURE =
 BEGIN
 idRec: RECORD [
  var: SELECT OVERLAID * FROM
   id => [id: DirectoryID.ObjectID],
   array => [array: ARRAY [1..3] OF CARDINAL],
   ENDCASE] ← [var: array[array: [1, 1, 97]]];
 fileID: RTOSFile.FileID ← RTOSFile.nullID;
 fileName: STRING ← "EmbeddedImage"L;

 fileID ← RasterDirectorySupervisor.GetImageIdFromRasterId[
  id: idRec.id ! ANY => CONTINUE];
 RMDirectory.UnRegister[name: fileName ! ANY => CONTINUE];
 RMDirectory.Register[name: fileName, id: fileID ! ANY => CONTINUE];
 END;
Initialize: PUBLIC PROCEDURE = BEGIN saveMainHandlePtr ← NIL; END;
END.
```

Copyright © 1992 Xerox Corporation All Rights Reserved

```
DIRECTORY
 Environment USING [bitsPerByte, Byte, bytesPerWord],
 FixedPointReal USING [Number],
 IM USING [AbortPreParserInstall, InstallHandle],
 InternalIP USING [Token, ColorRange, OffSetToNextTokenType, SetInk],
 Inline USING [LongCOPY],
 IPFunction USING [AllocateNodeNFL, FreeNodeNFL, PrePutToken],
 IPMicrocode USING [CALL],
 ParserCommon USING [WordsFromBytes],
 PreParserExtra,
 PreParserColor USING [
  HandleList, HandleListRec, InkWellScanLineLength, InkWellNumberOfScanLines,
  InkWellSizeInBytes, InkWellBytesPerScanLine, InMemorySizeThreshold,
  PaddedInkWellBytesPerScanLine],
 PreParserColorPrivate USING [DistinctColor, ExtendZone],
 PreParserCommon USING [
  ByteSeq, Color, ColorPtr, inkWellsPerTable, InkWellTableRange, InkWellTable,
  InkWellTablePtr, InkWellLookUpCache, InkWellLookUpCachePtr, MainHandle,
  PixelArrayPtr, StackEntry, Transformation, TransformationPtr],
 PreParserControl USING [preParserZone],
 PreParserTForm USING [Concatenate],
 PreParserSequence USING [InstallPixelArray],
 RealFns USING [AlmostEqual],
 ResamplerOpCodes USING [Extras, ScalerMode, Scale];

PreParserColorImplA: MONITOR
 IMPORTS
  IM, Inline, IPMicrocode, ParserCommon, PreParserColorPrivate,
  PreParserControl, PreParserTForm, PreParserSequence, RealFns, ResamplerOpCodes
 EXPORTS PreParserColor, PreParserColorPrivate =
 BEGIN

 OrthogonalOrientation: TYPE = MACHINE DEPENDENT{
  noRotate(0), rotate90(1), rotate180(2), rotate270(3), xFlip(4), yFlip(5),
  swapXY(6), swapNegateXY(7), other(8)};

 DistinctPattern: TYPE = PACKED ARRAY [0..64) OF Environment.Byte;
 DistinctTable: ARRAY PreParserColorPrivate.DistinctColor OF DistinctPattern ← [
  [
  00H, 00H, 00H, 00H, 00H, 00H, 00H, 00H, 00H, 00H, 00H, 00H, 00H, 00H, 00H,
  00H, 00H, 00H, 00H, 00H, 00H, 00H, 00H, 00H, 00H, 00H, 00H, 00H, 00H, 00H,
  00H, 00H, 00H, 0FFH, 00H, 00H, 00H, 0FFH, 00H, 00H, 00H, 0FFH, 00H, 00H, 00H,
  0FFH, 00H, 00H, 00H, 0FFH, 00H, 00H, 00H, 0FFH, 00H, 00H, 00H, 0FFH, 00H, 00H,
  00H, 0FFH, 00H, 00H], [
  00H, 3CH, 00H, 00H, 00H, 78H, 00H, 00H, 00H, 0F0H, 00H, 00H, 01H, 0E0H, 00H,
  00H, 03H, 0C0H, 00H, 00H, 07H, 80H, 00H, 00H, 0FH, 00H, 00H, 00H, 1EH, 00H,
  00H, 00H, 3CH, 00H, 00H, 00H, 78H, 00H, 00H, 00H, 0F0H, 00H, 00H, 00H, 0E0H,
  01H, 00H, 00H, 0C0H, 03H, 00H, 00H, 80H, 07H, 00H, 00H, 00H, 0FH, 00H, 00H,
  00H, 1EH, 00H, 00H], [
```

Copyright © 1992 Xerox Corporation All Rights Reserved

```
00H, 0FFH, 00H, 00H, 00H, 0FFH, 00H, 00H, 00H, 0FFH, 00H, 00H, 00H, 0FFH, 00H,
00H, 00H, 0FFH, 00H, 00H, 00H, 0FFH, 00H, 00H, 00H, 0FFH, 00H, 00H, 00H, 0FFH,
00H, 00H, 0FFH, 00H, 00H, 00H, 0FFH, 00H, 00H, 00H, 0FFH, 00H, 00H, 00H, 0FFH,
00H, 00H, 00H, 0FFH, 00H, 00H, 00H, 0FFH, 00H, 00H, 00H, 0FFH, 00H, 00H, 00H,
0FFH, 00H, 00H, 00H], [
0FFH, 0DFH, 00H, 00H, 0FFH, 8FH, 00H, 00H, 0FFH, 8FH, 00H, 00H, 0FFH, 0DFH,
00H, 00H, 0FFH, 0FDH, 00H, 00H, 0FFH, 0F8H, 00H, 00H, 0FFH, 0F8H, 00H, 00H,
0FFH, 0FDH, 00H, 00H, 0DFH, 0FFH, 00H, 00H, 8FH, 0FFH, 00H, 00H, 8FH, 0FFH,
00H, 00H, 0DFH, 0FFH, 00H, 00H, 0FDH, 0FFH, 00H, 00H, 0F8H, 0FFH, 00H, 00H,
0F8H, 0FFH, 00H, 00H, 0FDH, 0FFH, 00H, 00H]];

listHead: PreParserColor.HandleList ← NIL;
listEnd: PreParserColor.HandleList ← NIL;

AddNode: PUBLIC ENTRY PROCEDURE [hPageHandle: PreParserCommon.MainHandle] =
 BEGIN
 ENABLE UNWIND => NULL;
 newNode: PreParserColor.HandleList ← PreParserControl.preParserZone.NEW[
  PreParserColor.HandleListRec];
 newNode↑ ← [
  hPageHandle.stackEntry.pixelVectorPtr.installH, hPageHandle, FALSE, NIL];
 IF listHead = NIL THEN {listHead ← newNode; listEnd ← newNode; }
 ELSE {listEnd.next ← newNode; listEnd ← newNode};
 END;
CleanUpNodeList: PUBLIC ENTRY PROCEDURE [] =
 BEGIN
 ENABLE UNWIND => NULL;
 ptr: PreParserColor.HandleList ← listHead;
 nextNode: PreParserColor.HandleList ← NIL;
 UNTIL ptr = NIL DO
  IM.AbortPreParserInstall[installHandle: ptr.installHandle];
  nextNode ← ptr.next;
  PreParserControl.preParserZone.FREE[@ptr];
  ptr ← nextNode;
  ENDLOOP;
 listHead ← listEnd ← NIL;
 END;

DeleteNodesForPage: PUBLIC ENTRY PROCEDURE [sheetNumber: LONG CARDINAL] =
 BEGIN
 ENABLE UNWIND => NULL;
 nextNode, prevNode: PreParserColor.HandleList ← NIL;
 ptr: PreParserColor.HandleList ← listHead;
 WHILE ptr # NIL DO
  IF ptr.hPageHandle.sheetNumber = sheetNumber THEN {
   SELECT ptr FROM
    listHead => {listHead ← ptr.next; nextNode ← ptr.next; };
    listEnd => {prevNode.next ← NIL; listEnd ← prevNode; nextNode ← NIL; };
    ENDCASE => {prevNode.next ← ptr.next; nextNode ← ptr.next; };
   IM.AbortPreParserInstall[installHandle: ptr.installHandle];
```

Copyright © 1992 Xerox Corporation All Rights Reserved

```
    PreParserControl.preParserZone.FREE[@ptr];
    ptr ← nextNode;
    }
   ELSE {prevNode ← ptr; ptr ← ptr.next; };
   ENDLOOP;
  IF listHead = NIL THEN listEnd ← NIL;
  END;
 FindNodeInList: PUBLIC ENTRY PROCEDURE [installHandle: IM.InstallHandle]
  RETURNS [h: PreParserCommon.MainHandle] =
  BEGIN
  ENABLE UNWIND => NULL;
  ptr: PreParserColor.HandleList ← listHead;
  prevPtr: PreParserColor.HandleList ← NIL;
  UNTIL ptr = NIL DO
   IF ptr.installHandle = installHandle THEN {
    h ← ptr.hPageHandle;
    IF ptr = listHead THEN listHead ← ptr.next;
    IF ptr = listEnd THEN listEnd ← prevPtr;
    IF prevPtr # NIL THEN prevPtr.next ← ptr.next;
    PreParserControl.preParserZone.FREE[@ptr];
    RETURN;
    }
   ELSE {prevPtr ← ptr; ptr ← ptr.next; LOOP; };
   ENDLOOP;
  IF ptr = NIL THEN h ← NIL;
  END;
 InkWellEqual: PROC [a, b: PreParserCommon.ByteSeq] RETURNS [BOOLEAN] = {
  bytesPerScanLine: CARDINAL =
   PreParserColor.InkWellScanLineLength / Environment.bitsPerByte;
  padding: CARDINAL =
   PreParserColor.PaddedInkWellBytesPerScanLine - bytesPerScanLine;
  aIndex, bIndex: CARDINAL ← 0;
  FOR i: CARDINAL IN [0..PreParserColor.InkWellNumberOfScanLines) DO
   FOR j: CARDINAL IN [0..bytesPerScanLine) DO
    IF a[aIndex] # b[bIndex] THEN RETURN[FALSE];
    aIndex ← aIndex + 1;
    bIndex ← bIndex + 1;
    ENDLOOP;
   aIndex ← aIndex + padding;
   ENDLOOP;
  RETURN[TRUE]};

 CopyInkWellData: PROC [src, dest: PreParserCommon.ByteSeq] = {
  bytesPerScanLine: CARDINAL =
   PreParserColor.InkWellScanLineLength / Environment.bitsPerByte;
  padding: CARDINAL =
   PreParserColor.PaddedInkWellBytesPerScanLine - bytesPerScanLine;
  srcIndex, destIndex: CARDINAL ← 0;
  FOR i: CARDINAL IN [0..PreParserColor.InkWellNumberOfScanLines) DO
   FOR j: CARDINAL IN [0..bytesPerScanLine) DO
```

Copyright © 1992 Xerox Corporation All Rights Reserved

```
    dest[destIndex] ← src[srcIndex];
    srcIndex ← srcIndex + 1;
    destIndex ← destIndex + 1;
    ENDLOOP;
  srcIndex ← srcIndex + padding;
  ENDLOOP;
 };

LookUpInkWell: PROC [
 h: PreParserCommon.MainHandle, color: PreParserCommon.ColorPtr]
 RETURNS [cached: BOOLEAN ← FALSE, inkWellIndex: CARDINAL ← 0] = {
 localCacheIndex: CARDINAL ← color.inkWellCacheIndex;
 cacheTable: PreParserCommon.InkWellLookUpCachePtr ← @h.inkWellCache;
 WHILE localCacheIndex >= PreParserCommon.inkWellsPerTable DO
  localCacheIndex ← localCacheIndex - PreParserCommon.inkWellsPerTable;
  cacheTable ← cacheTable.next;
  ENDLOOP;
 IF cacheTable.table[localCacheIndex].cached THEN
  RETURN[
   cached: TRUE,
    inkWellIndex: cacheTable.table[localCacheIndex].inkWellIndex]
 ELSE {
  inkWellDataPtr: PreParserCommon.ByteSeq ← color.inkWellDataPtr;
  done: BOOLEAN ← FALSE;
  tablePtr: PreParserCommon.InkWellTablePtr ← @h.availableInkWells;
  WHILE NOT done AND tablePtr # NIL DO
   FOR tableIndex: CARDINAL IN PreParserCommon.InkWellTableRange DO
    IF tablePtr.table[tableIndex].used = FALSE THEN {
     CopyInkWellData[
      inkWellDataPtr, LOOPHOLE[@tablePtr.table[tableIndex].inkWellData]];
     tablePtr.table[tableIndex].used ← TRUE;
     cacheTable.table[localCacheIndex].cached ← TRUE;
     cacheTable.table[localCacheIndex].inkWellIndex ← inkWellIndex;
     IF tableIndex = LAST[PreParserCommon.InkWellTableRange]
      AND tablePtr.next = NIL THEN h.extendInkWellTable ← TRUE;
     RETURN[cached: FALSE, inkWellIndex: inkWellIndex]}
    ELSE {
     IF InkWellEqual[
      inkWellDataPtr, LOOPHOLE[@tablePtr.table[tableIndex].inkWellData]]
      THEN {
      cacheTable.table[localCacheIndex].cached ← TRUE;
      cacheTable.table[localCacheIndex].inkWellIndex ← inkWellIndex;
      RETURN[cached: TRUE, inkWellIndex: inkWellIndex]}
     ELSE inkWellIndex ← inkWellIndex + 1;
     };
    ENDLOOP;
   tablePtr ← tablePtr.next;
   ENDLOOP;
  };
 };
```

Copyright © 1992 Xerox Corporation All Rights Reserved

```
SetInkWell: PUBLIC PROC [
 h: PreParserCommon.MainHandle, color: PreParserCommon.ColorPtr]
 RETURNS [needIIPBlock: BOOLEAN ← FALSE] = {
 cached: BOOLEAN ←
  IF h.colorOperationStage > 0 THEN h.tempData.found ELSE FALSE;
 inkWellIndex: CARDINAL ←
  IF h.colorOperationStage > 0 THEN h.tempData.tempCount ELSE 0;
 tokenOffsetSize: CARDINAL =
  SIZE[InternalIP.SetInk] - SIZE[InternalIP.OffSetToNextTokenType];
 setInk: setInk InternalIP.Token ← [
  setInk[
  rec: [
  opaque: color.opaque, dataDouble: color.dataDouble, imageIndex: 0,
  offsetToNextToken: tokenOffsetSize, inkwellBitmapArray: TRASH]]];
 IF h.colorOperationStage < 1 THEN
  [cached, inkWellIndex] ← LookUpInkWell[h, color];
 IF h.colorOperationStage < 2 THEN {
  setInk.rec.imageIndex ← inkWellIndex;
  IF NOT cached THEN
   setInk.rec.offsetToNextToken ←
    ParserCommon.WordsFromBytes[PreParserColor.InkWellSizeInBytes] +
     tokenOffsetSize;
  h.token ← setInk;
  IF IPMicrocode.CALL[IPFunction.PrePutToken, h] # 0 THEN {
   h.tempData.found ← cached;
   h.tempData.tempCount ← inkWellIndex;
   h.colorOperationStage ← 1;
   RETURN[needIIPBlock: TRUE]};
  };
 IF NOT cached THEN {
  srcPtr: PreParserCommon.ByteSeq ← color.inkWellDataPtr;
  destPtr: PreParserCommon.ByteSeq ← LOOPHOLE[h.iipData.currentWordPtr,
   PreParserCommon.ByteSeq];
  bytesToCopy: CARDINAL = MIN[
   PreParserColor.InkWellSizeInBytes,
   (h.iipData.currentWordCount * Environment.bytesPerWord)];
  padding: CARDINAL =
   PreParserColor.PaddedInkWellBytesPerScanLine -
    PreParserColor.InkWellBytesPerScanLine;
  startOffset: CARDINAL =
   IF h.colorOperationStage < 2 THEN 0
   ELSE CARDINAL[h.tempData.tempLongCard];
  srcIndex: CARDINAL ←
   IF h.colorOperationStage < 2 THEN 0
   ELSE CARDINAL[h.tempData.elementCount];
  destIndex: CARDINAL ← 0;
  FOR i: CARDINAL IN [startOffset..bytesToCopy) DO
   destPtr[destIndex] ← srcPtr[srcIndex];
   srcIndex ← srcIndex + 1;
```

Copyright © 1992 Xerox Corporation All Rights Reserved

```
  destIndex ← destIndex + 1;
  IF srcIndex MOD PreParserColor.InkWellBytesPerScanLine = 0 THEN
   srcIndex ← srcIndex + padding;
  ENDLOOP;
 IF PreParserColor.InkWellSizeInBytes > bytesToCopy THEN {
  h.tempData.tempLongCard ← bytesToCopy;
  h.tempData.elementCount ← srcIndex;
  h.tempData.found ← cached;
  h.tempData.tempCount ← inkWellIndex;
  h.pc.pcm.action ← needIIPBlock;
  h.colorOperationStage ← 3;
  RETURN[needIIPBlock: TRUE]};
 h.iipData.currentWordPtr ←
  h.iipData.currentWordPtr + ParserCommon.WordsFromBytes[
   bytesToCopy - startOffset];
 h.iipData.currentWordCount ←
  h.iipData.currentWordCount - ParserCommon.WordsFromBytes[
   bytesToCopy - startOffset];
 };
h.colorOperationStage ← 0;
};

TryMakeInkWell: PUBLIC PROC [
 h: PreParserCommon.MainHandle, pa: PreParserCommon.PixelArrayPtr,
 um: PreParserCommon.TransformationPtr, clear: BOOLEAN]
 RETURNS [successful: BOOLEAN ← FALSE] = {
 IF pa.type = embedded AND pa.pv.inMemory THEN {
  successful: BOOLEAN;
  colorRange: InternalIP.ColorRange;
  [successful, colorRange] ← GrayFromInkWell[
   pa.pv.inMemoryReferencePtr, clear];
  IF successful THEN {
   h.stackEntry.type ← grayColor; h.stackEntry.colorRange ← colorRange; }
  ELSE {
   originX, originY: FixedPointReal.Number ← [li[0]];
   bitsToDevice: PreParserCommon.Transformation;
   orientation: OrthogonalOrientation;
   scaleFactor: REAL;
   PreParserTForm.Concatenate[h, pa.m, um, @bitsToDevice];
   [orientation, scaleFactor] ← AnalazyeT[@bitsToDevice];
   IF (orientation = other)
    OR NOT
     (RealFns.AlmostEqual[scaleFactor, 1.0, -4]
      OR RealFns.AlmostEqual[scaleFactor, 2.0, -4]) THEN {
    IF NOT pa.pv.installed THEN PreParserSequence.InstallPixelArray[h, pa];
    RETURN[successful: FALSE];
    };
   GuaranteeInkWellSpace[h];
   IF h.pc.operationStage <= 1 THEN {
    h.pc.pcm.nodeSizeInWords ← SIZE[PreParserCommon.Color];
```

Copyright © 1992 Xerox Corporation All Rights Reserved

```
    h.pc.pcm.zoneRecPtr ← @h.zone;
    IF IPMicrocode.CALL[IPFunction.AllocateNodeNFL, h].result # 0 THEN {
     h.pc.operationStage ← 1; SIGNAL PreParserColorPrivate.ExtendZone};
    h.stackEntry.colorPtr ← h.pc.pcm.nodePtr;
    };
   h.stackEntry.type ← color;
   h.stackEntry.colorPtr ↑ ← [
    cn: [
    fill: 0, preambleOwned: FALSE, referenceCount: 1, next: NIL,
    type: color, zoneRecPtr: @h.zone], opaque: ~clear,
    dataDouble: RealFns.AlmostEqual[scaleFactor, 2.0, -4],
    origin: [x: originX, y: originY], cTableIndex: 0,
    inkWellCacheIndex: h.currentInkWellIndex,
    inkWellDataPtr: InkWellFromPixelArray[h, pa, orientation]];
   h.currentInkWellIndex ← h.currentInkWellIndex + 1;
   h.pc.operationStage ← 0;
   };
  RETURN[successful: TRUE];
 };
};

AnalazyeT: PROC [t: PreParserCommon.TransformationPtr]
 RETURNS [
  orientation: OrthogonalOrientation ← other, scaleFactor: REAL ← 0.0] = {
 IF ((ABS[t.a] # ABS[t.e]) OR (ABS[t.b] # ABS[t.b])) THEN RETURN[];
 SELECT TRUE FROM
  (t.a = 0.0 AND t.e = 0.0 AND (t.b = 0.0 OR t.d = 0.0)),
   (t.b = 0.0 AND t.d = 0.0 AND (t.a = 0.0 OR t.e = 0.0)),
   (t.a # 0.0 AND t.e # 0.0 AND (t.b # 0.0 OR t.d # 0.0)),
   (t.b # 0.0 AND t.d # 0.0 AND (t.a # 0.0 OR t.e # 0.0)) => NULL;
  (t.a < 0.0 AND t.e < 0.0) => {
   orientation ← rotate180; scaleFactor ← ABS[t.a]};
  (t.a < 0.0 AND t.e > 0.0) => {orientation ← xFlip; scaleFactor ← ABS[t.a]};
  (t.a > 0.0 AND t.e < 0.0) => {orientation ← yFlip; scaleFactor ← ABS[t.a]};
  (t.a > 0.0 AND t.e > 0.0) => {
   orientation ← noRotate; scaleFactor ← ABS[t.a]};
  (t.b < 0.0 AND t.d < 0.0) => {
   orientation ← swapNegateXY; scaleFactor ← ABS[t.b]};
  (t.b < 0.0 AND t.d > 0.0) => {
   orientation ← rotate90; scaleFactor ← ABS[t.b]};
  (t.b > 0.0 AND t.d < 0.0) => {
   orientation ← rotate270; scaleFactor ← ABS[t.b]};
  (t.b > 0.0 AND t.d > 0.0) => {orientation ← swapXY; scaleFactor ← ABS[t.b]};
  ENDCASE => NULL;
 };

GrayFromInkWell: PROC [inkWellDataPtr: PreParserCommon.ByteSeq, clear: BOOLEAN]
 RETURNS [mapsToGray: BOOLEAN ← FALSE, grayValue: InternalIP.ColorRange ← 0] =
 {
 b: Environment.Byte = inkWellDataPtr[0];
```

Copyright © 1992 Xerox Corporation All Rights Reserved

```
bytesPerScanLine: CARDINAL =
 PreParserColor.InkWellScanLineLength / Environment.bitsPerByte;
padding: CARDINAL =
 PreParserColor.PaddedInkWellBytesPerScanLine - bytesPerScanLine;
index: CARDINAL ← 0;
IF (((b # 0H) AND (b # 0FFH)) OR (b = 0H AND clear)) THEN RETURN[];
FOR i: CARDINAL IN [0..PreParserColor.InkWellNumberOfScanLines) DO
 FOR j: CARDINAL IN [0..bytesPerScanLine) DO
  IF inkWellDataPtr[index] # b THEN RETURN[]; index ← index + 1; ENDLOOP;
 index ← index + padding;
 ENDLOOP;
RETURN[
 mapsToGray: TRUE,
  grayValue:
  IF b = 0 THEN FIRST[InternalIP.ColorRange]
  ELSE LAST[InternalIP.ColorRange]];
};

InkWellFromPixelArray: PROC [
 h: PreParserCommon.MainHandle, pa: PreParserCommon.PixelArrayPtr,
 orientation: OrthogonalOrientation]
 RETURNS [inkWellDataPtr: PreParserCommon.ByteSeq] = {
 wordsPerScanLine: CARDINAL = ParserCommon.WordsFromBytes[
  PreParserColor.PaddedInkWellBytesPerScanLine];
 mode: ResamplerOpCodes.ScalerMode ← VAL[orientation];
 sourcePtr: LONG POINTER ← pa.pv.inMemoryReferencePtr;
 constants: ResamplerOpCodes.Extras;
 resultPtr: LONG POINTER ← NIL;
 fscanOffset, sScanOffset: LONG CARDINAL;
 numScanLines: INTEGER ← PreParserColor.InkWellNumberOfScanLines;
 h.pc.pcm.nodeSizeInWords ← ParserCommon.WordsFromBytes[
  PreParserColor.InMemorySizeThreshold];
 h.pc.pcm.zoneRecPtr ← @h.zone;
 IF IPMicrocode.CALL[IPFunction.AllocateNodeNFL, h].result # 0 THEN {
  h.pc.operationStage ← 2; SIGNAL PreParserColorPrivate.ExtendZone};
 resultPtr ← h.pc.pcm.nodePtr;
 [constants, fscanOffset, sScanOffset, sourcePtr] ← DetermineScaleParameters[
  mode, sourcePtr, pa.yPixels, wordsPerScanLine];
 ResamplerOpCodes.Scale[
  @constants, sourcePtr, resultPtr, fscanOffset, sScanOffset, numScanLines,
  8000H];
 inkWellDataPtr ← resultPtr;
 };

DetermineScaleParameters: PROC [
 mode: ResamplerOpCodes.ScalerMode, sourcePtr: LONG POINTER,
 ySize, paddedWordsPerScanLine: INTEGER]
 RETURNS [
  constants: ResamplerOpCodes.Extras, fscanOffset, sScanOffset: LONG CARDINAL,
  newSourcePtr: LONG POINTER] = {
```

Copyright © 1992 Xerox Corporation All Rights Reserved

```
constants.mode ← mode;
constants.indexBit ← 0;
constants.destPixelCount ← ySize;
constants.slowScanIncrement ← 10000H;
newSourcePtr ← sourcePtr;
constants.fastScanIncrement ← 10000H;
constants.tempStackVariable ← 0;
SELECT mode FROM
 noRotate => {
  constants.wordOffsetX ← paddedWordsPerScanLine;
  constants.wordOffsetXPlusOne ← paddedWordsPerScanLine + 2;
  fscanOffset ← 8000H;
  sScanOffset ← 8000H;
  constants.prevF ← 0H;
  constants.prevS ← 0H;
  };
 rotate90 => {
  constants.wordOffsetX ← paddedWordsPerScanLine;
  constants.wordOffsetXPlusOne ← paddedWordsPerScanLine + 2;
  fscanOffset ← 0F8000H;
  sScanOffset ← 8000H;
  constants.prevF ← 0FH;
  constants.prevS ← 0H;
  };
 rotate180 => {
  constants.wordOffsetX ← -paddedWordsPerScanLine;
  constants.wordOffsetXPlusOne ← -paddedWordsPerScanLine - 2;
  fscanOffset ← 0F8000H;
  sScanOffset ← 0F8000H;
  newSourcePtr ← sourcePtr + ((ySize - 1) * paddedWordsPerScanLine);
  constants.prevF ← 0FH;
  constants.prevS ← 0FH;
  };
 rotate270 => {
  constants.wordOffsetX ← -paddedWordsPerScanLine;
  constants.wordOffsetXPlusOne ← -paddedWordsPerScanLine - 2;
  fscanOffset ← 8000H;
  sScanOffset ← 0F8000H;
  newSourcePtr ← sourcePtr + ((ySize - 1) * paddedWordsPerScanLine);
  constants.prevF ← 0H;
  constants.prevS ← 0FH;
  };
 xFlip => {
  constants.wordOffsetX ← -paddedWordsPerScanLine;
  constants.wordOffsetXPlusOne ← -paddedWordsPerScanLine - 2;
  fscanOffset ← 8000H;
  sScanOffset ← 0F8000H;
  newSourcePtr ← sourcePtr + ((ySize - 1) * paddedWordsPerScanLine);
  constants.prevF ← 0H;
  constants.prevS ← 0FH;
```

Copyright © 1992 Xerox Corporation All Rights Reserved

```
  };
  yFlip => {
   constants.wordOffsetX ← paddedWordsPerScanLine;
   constants.wordOffsetXPlusOne ← paddedWordsPerScanLine + 2;
   fscanOffset ← 0F8000H;
   sScanOffset ← 8000H;
   constants.prevF ← 0FH;
   constants.prevS ← 0H;
   };
  swapXY => {
   constants.wordOffsetX ← paddedWordsPerScanLine;
   constants.wordOffsetXPlusOne ← paddedWordsPerScanLine + 2;
   fscanOffset ← 8000H;
   sScanOffset ← 8000H;
   constants.prevF ← 0H;
   constants.prevS ← 0H;
   };
  swapNegateXY => {
   constants.wordOffsetX ← -paddedWordsPerScanLine;
   constants.wordOffsetXPlusOne ← -paddedWordsPerScanLine - 2;
   fscanOffset ← 0F8000H;
   sScanOffset ← 0F8000H;
   newSourcePtr ← sourcePtr + ((ySize - 1) * paddedWordsPerScanLine);
   constants.prevF ← 0FH;
   constants.prevS ← 0FH;
   };
  ENDCASE;
 };

GuaranteeInkWellSpace: PROC [h: PreParserCommon.MainHandle] = {
 localCacheIndex: CARDINAL ← h.currentInkWellIndex;
 cacheTable: PreParserCommon.InkWellLookUpCachePtr ← @h.inkWellCache;
 WHILE localCacheIndex >= PreParserCommon.inkWellsPerTable DO
  localCacheIndex ← localCacheIndex - PreParserCommon.inkWellsPerTable;
  IF cacheTable.next = NIL THEN {
   h.pc.pcm.zoneRecPtr ← @h.zone;
   h.pc.pcm.nodeSizeInWords ← SIZE[PreParserCommon.InkWellLookUpCache];
   IF IPMicrocode.CALL[IPFunction.AllocateNodeNFL, h] # 0 THEN
    SIGNAL PreParserColorPrivate.ExtendZone;
   cacheTable.next ← LOOPHOLE[h.pc.pcm.nodePtr,
    PreParserCommon.InkWellLookUpCachePtr];
   cacheTable.next.next ← NIL;
   };
  cacheTable ← cacheTable.next;
  ENDLOOP;
 cacheTable.table[localCacheIndex].cached ← FALSE;
 IF h.extendInkWellTable THEN {
  tablePtr: PreParserCommon.InkWellTablePtr ← @h.availableInkWells;
  h.pc.pcm.nodeSizeInWords ← SIZE[PreParserCommon.InkWellTable];
  h.pc.pcm.zoneRecPtr ← @h.zone;
```

Copyright © 1992 Xerox Corporation All Rights Reserved

```
  IF IPMicrocode.CALL[IPFunction.AllocateNodeNFL, h].result # 0 THEN
   SIGNAL PreParserColorPrivate.ExtendZone;
  WHILE tablePtr.next # NIL DO tablePtr ← tablePtr.next ENDLOOP;
  tablePtr.next ← LOOPHOLE[h.pc.pcm.nodePtr, PreParserCommon.InkWellTablePtr];
  tablePtr ← tablePtr.next;
  tablePtr.next ← NIL;
  FOR tableIndex: CARDINAL IN PreParserCommon.InkWellTableRange DO
   tablePtr.table[tableIndex].used ← FALSE; ENDLOOP;
  h.extendInkWellTable ← FALSE;
  };
 };

CreateDistinctColor: PUBLIC PROC [
 h: PreParserCommon.MainHandle, name: PreParserColorPrivate.DistinctColor]
 RETURNS [color: PreParserCommon.StackEntry] = {
 originX, originY: FixedPointReal.Number ← [li[0]];
 wordsToCopy: CARDINAL = ParserCommon.WordsFromBytes[
  PreParserColor.InMemorySizeThreshold];
 inkWellDataPtr: PreParserCommon.ByteSeq ← NIL;
 GuaranteeInkWellSpace[h];
 color.type ← color;
 color.colorPtr ← NIL;
 BEGIN
 ENABLE
  UNWIND = > {
   IF color.colorPtr # NIL THEN {
    h.pc.pcm.zoneRecPtr ← @h.zone;
    h.pc.pcm.nodePtr ← color.colorPtr;
    [] ← IPMicrocode.CALL[IPFunction.FreeNodeNFL, h];
    };
   };
 h.pc.pcm.nodeSizeInWords ← SIZE[PreParserCommon.Color];
 h.pc.pcm.zoneRecPtr ← @h.zone;
 IF IPMicrocode.CALL[IPFunction.AllocateNodeNFL, h].result # 0 THEN
  SIGNAL PreParserColorPrivate.ExtendZone;
 color.colorPtr ← h.pc.pcm.nodePtr;
 h.pc.pcm.nodeSizeInWords ← wordsToCopy;
 IF IPMicrocode.CALL[IPFunction.AllocateNodeNFL, h].result # 0 THEN
  SIGNAL PreParserColorPrivate.ExtendZone;
 inkWellDataPtr ← LOOPHOLE[h.pc.pcm.nodePtr, PreParserCommon.ByteSeq];
 color.colorPtr ↑ ← [
  cn: [
  fill: 0, preambleOwned: FALSE, referenceCount: 1, next: NIL, type: color,
  zoneRecPtr: @h.zone], opaque: TRUE, dataDouble: TRUE,
  origin: [x: originX, y: originY], cTableIndex: 0,
  inkWellCacheIndex: h.currentInkWellIndex, inkWellDataPtr: inkWellDataPtr];
 Inline.LongCOPY[
  from: LOOPHOLE[@DistinctTable[name], LONG POINTER], nwords: wordsToCopy,
  to: inkWellDataPtr];
 h.currentInkWellIndex ← h.currentInkWellIndex + 1;
```

Copyright © 1992 Xerox Corporation All Rights Reserved

```
 END;
 };

InitializeModuleA: PUBLIC PROCEDURE = BEGIN listHead ← NIL; listEnd ← NIL; END;
END.
```

Copyright © 1992 Xerox Corporation All Rights Reserved

```
DIRECTORY
 BlockStream USING [Block, nullBlock, Object, StreamHandle],
 DecomposerCommon USING [ClientContext],
 Environment USING [bytesPerPage],
 EventLogger USING [Log],
 IIPFragMgr USING [Error],
 IIPFragMgrInternal USING [DiskErrors],
 IIPFragMgrPrivate USING [EndOfJob],
 Inline USING [LowHalf],
 ParserZone USING [Initialize],
 PreParser USING [
  Command, Decomposer, Handle, JobProceedData, JobProceedDataPtr, PageResults,
  Status],
 PreParserCallBack USING [
  ClearResourceFault, ObjectFault, Problem, ReportObjectFault, Severity],
 PreParserColor USING [CleanUpNodeList],
 PreParserCommon USING [FrameSize, MainHandle],
 PreParserControl USING [
  ErrorType, Handle, Initialize, IPBlockEntryStatus, IPBlockHandle,
  IPBlockListEntry, LogProc, LogRec, PageEntryStatus, PageHandle, PageListEntry,
  PreParserState, MainAction, MainHandle, MainStatus, ManagerAction,
  ManagerStatus, Object, ProcessorSchedulingAction, SIFResult],
 PreParserData USING [InitializeData, InitializeModule],
 PreParserInstance USING [CreateInstance, PreParserInit, ProcessorScheduling],
 PreParserMain USING [
  AllocateNode, FreeAllOptions, FreeNode, InitContext, MgrCleanUpContext],
 PreParserMainLoopControl USING [SetMainLoopReturn, SetMainLoopStatus],
 PreParserManager USING [
  DoProcessorScheduling, PutPreParserCommand, ReportPreParserStatus,
  SetManagerStatus],
 PreParserSetup USING [nominalZoneSize],
 Process USING [Abort, Priority],
 PublicPrinting USING [Plex],
 ResMgr USING [Allocate, Error, FreeBufferList],
 ResMgrIDs USING [ModuleID, TransactionID],
 ResMgrHeap USING [Create, HeapFullProc, Percentage],
 ResMgrStorage USING [BufferList, Pages];

PreParserControlImpl: MONITOR
 IMPORTS
  EventLogger, IIPFragMgr, IIPFragMgrInternal, IIPFragMgrPrivate, Inline,
  ParserZone, Process, PreParserCallBack, PreParserColor, PreParserControl,
  PreParserData, PreParserInstance, PreParserMain, PreParserMainLoopControl,
  PreParserManager, ResMgr, ResMgrHeap
 EXPORTS PreParser, PreParserControl =
 BEGIN

 Error: PUBLIC ERROR [type: PreParserControl.ErrorType] = CODE;
```

Copyright © 1992 Xerox Corporation All Rights Reserved

```
Handle: PUBLIC TYPE = LONG POINTER TO PreParserControl.Object;
IPBlockHandle: TYPE = LONG POINTER TO PreParserControl.IPBlockListEntry;

ipBlocksAcquired, ipBlocksTransmitted: CARDINAL ← 0;
preParserList: Handle ← NIL;
preParserBuffer: PUBLIC ResMgrStorage.BufferList ← NIL;
preParserLogBuffer: PUBLIC ResMgrStorage.BufferList ← NIL;
preParserLogZone: PUBLIC UNCOUNTED ZONE ← NIL;
preParserZone: PUBLIC UNCOUNTED ZONE ← NIL;


startPreParse: CARDINAL = 151;
preParserLogZoneSize: ResMgrStorage.Pages = 3;
preParserZoneSize: ResMgrStorage.Pages = 30;
preParserZonePercent: ResMgrHeap.Percentage = 0;
preParserZoneIncrement: ResMgrStorage.Pages = 0;

AcquireBlock: PUBLIC ENTRY PROCEDURE [
 sH: BlockStream.StreamHandle, length: LONG CARDINAL]
 RETURNS [block: BlockStream.Block] =
 BEGIN
 ENABLE UNWIND => NULL;
 handle: Handle ← preParserList;
 block ← BlockStream.nullBlock;

 UNTIL handle.ipStreamHandle = sH DO
  handle ← handle.fwdLink; IF handle = NIL THEN RETURN; ENDLOOP;

 PreParserControl.LogProc[h: handle, rec: [var: acquireBlock[]]];

 UNTIL (block ← GetAvailableBlock[handle: handle]) # BlockStream.nullBlock DO
  handle.acquireContinue ← FALSE;
  UNTIL handle.acquireContinue DO WAIT handle.acquireCV; ENDLOOP;
  ENDLOOP;

 ipBlocksAcquired ← ipBlocksAcquired + 1;
 END;
CleanUpJob: INTERNAL PROCEDURE [handle: Handle] RETURNS [] =
 BEGIN
 action: PreParserControl.ProcessorSchedulingAction;
 blockEntry, blockTemp: IPBlockHandle;
 h: PreParserCommon.MainHandle ← NIL;
 pageEntry, pageTemp: PreParserControl.PageHandle;

 IF handle.clearMgrResourceFault THEN {
  PreParserCallBack.ClearResourceFault[transID: handle.transactionID];
  handle.clearMgrResourceFault ← FALSE};

 IIPFragMgrPrivate.EndOfJob[
  h: LOOPHOLE[handle.jobProceedDataPtr.fragMgrHandle] !
```

Copyright © 1992 Xerox Corporation All Rights Reserved

```
IIPFragMgrInternal.DiskErrors = > {
 WITH error: error SELECT FROM
  rtosFileError = > {
   handle.objectFault.problem ← [
    printerLimitExceeded[
    problem: rtosFileError, code: ORD[error.errorType],
    id: error.faultID]];
   handle.objectFault.functionFault ← TRUE};
  rmError = > {
   handle.objectFault.problem ← [
    printerLimitExceeded[
    problem: resMgrError, code: ORD[error.code], id: error.faultID]];
   handle.objectFault.functionFault ← TRUE};
  ENDCASE = > REJECT;
 handle.objectFault.severity ← systemError;
 handle.objectFault.side ← simplex;
 handle.objectFault.sheetNumber ← LAST[CARDINAL];
 handle.objectFault.copyNumber ← 1;
 PreParserCallBack.ReportObjectFault[
  context: handle.jobProceedDataPtr.clientContext,
  objectFault: handle.objectFault];
 CONTINUE}];


blockTemp ← handle.ipBlockList;
UNTIL blockTemp = NIL DO
 blockEntry ← blockTemp;
 blockTemp ← blockEntry.fwdLink;
 IF blockEntry.ipBuffer # NIL THEN {
  IF blockEntry.ipBuffer # NIL THEN
   BEGIN
   ResMgr.FreeBufferList[
    id: [trans: handle.transactionID, module: preParse],
    buffer: blockEntry.ipBuffer ! ResMgr.Error = > CONTINUE];
   END;
  blockEntry.status ← noBuffer;
  blockEntry.mainDone ← TRUE;
  blockEntry.mgrDone ← TRUE;
  blockEntry.block ← [NIL, 0, 0];
  blockEntry.ipBuffer ← NIL};
 ENDLOOP;

PreParserColor.CleanUpNodeList[];

pageTemp ← handle.pageList;
UNTIL pageTemp = NIL DO
 pageEntry ← pageTemp;
 pageTemp ← pageEntry.fwdLink;
 IF pageEntry.pageContextBuffer # NIL THEN
  BEGIN
```

Copyright © 1992 Xerox Corporation All Rights Reserved

```
   IF pageEntry.ptrToPageContext # NIL THEN
    PreParserMain.MgrCleanUpContext[
     mainHandle: LOOPHOLE[pageEntry.ptrToPageContext]];
   ResMgr.FreeBufferList[
    id: [trans: handle.transactionID, module: preParse],
    buffer: pageEntry.pageContextBuffer ! ResMgr.Error = > CONTINUE];
   pageEntry.pageContextBuffer ← NIL;
   pageEntry.ptrToPageContext ← NIL;
   END;
  IF pageEntry.zoneSegListStart # NIL THEN
   BEGIN
   ResMgr.FreeBufferList[
    id: [trans: handle.transactionID, module: preParse],
    buffer: pageEntry.zoneSegListStart ! ResMgr.Error = > CONTINUE];
   pageEntry.zoneSegListStart ← NIL;
   pageEntry.zoneSegListEnd ← NIL;
   END;
  pageEntry.currentIPBlock ← NIL;
  pageEntry.pageStartOffset ← 0;
  pageEntry.frame ← NIL;
  pageEntry.mediaIndex ← 0;
  pageEntry.plex ← simplex;
  pageEntry.tFormIndex ← 0;
  pageEntry.contextSize ← 0;
  pageEntry.zoneBlockSize ← 0;
  pageEntry.iipBlockStream ← NIL;
  pageEntry.firstIIPBlock ← TRUE;
  pageEntry.currentIIPBlock ← [NIL, 0, 0];
  pageEntry.sifInfoList ← NIL;
  pageEntry.sifInfoDest ← NIL;
  ENDLOOP;
 handle.pageList.currentIPBlock ← handle.ipBlockList;

 IF handle.jobProceedDataPtr # NIL AND handle.jobProceedDataPtr.options # NIL
  THEN
  PreParserMain.FreeAllOptions[
   proceedDataPtr: handle.jobProceedDataPtr,
   printingInstructionsPtr: handle.printingInstructionsPtr,
   z: handle.smZone];


 IF handle.jobMediaDataPtr # NIL THEN
  BEGIN
  IF handle.jobMediaDataPtr.orientedImagingProps # NIL
   AND handle.jobMediaDataPtr.orientedImagingProps.BASE # NIL THEN
   handle.smZone.FREE[@handle.jobMediaDataPtr.orientedImagingProps.BASE];
  handle.smZone.FREE[@handle.jobMediaDataPtr];
  END;

 IF handle.managerContextBuffer # NIL THEN
```

Copyright © 1992 Xerox Corporation All Rights Reserved

```
  BEGIN
  PreParserMain.MgrCleanUpContext[
   mainHandle: LOOPHOLE[handle.ptrToManagerContext]];
  ResMgr.FreeBufferList[
   id: [trans: handle.transactionID, module: preParse],
   buffer: handle.managerContextBuffer ! ResMgr.Error = > CONTINUE];
  handle.managerContextBuffer ← NIL;
  handle.ptrToManagerContext ← NIL;
  END;
 IF handle.jobZoneSegListStart # NIL THEN
  BEGIN
  ResMgr.FreeBufferList[
   id: [trans: handle.transactionID, module: preParse],
   buffer: handle.jobZoneSegListStart ! ResMgr.Error = > CONTINUE];
  handle.jobZoneSegListStart ← NIL;
  handle.jobZoneSegListEnd ← NIL;
  END;

 IF handle.processorList.directMainLoop THEN {
  action ← unrestrict;
  PreParserInstance.ProcessorScheduling[handle: handle, action: action]};

 IF handle.state = parsingPrintingInstructions THEN
  SetState[handle: handle, state: proceeding];

 handle.command ← [null[]];
 handle.managerBetweenPages ← TRUE;

 handle.endOfJobFound ← FALSE;
 handle.eofSet ← FALSE;
 handle.managerBlockStatus ← init;
 handle.currentManagerOffset ← 0;
 handle.nextPageIPBlock ← NIL;

 END;
Create: PUBLIC ENTRY PROCEDURE [
 transID: ResMgrIDs.TransactionID, zone: UNCOUNTED ZONE,
 priority: Process.Priority]
 RETURNS [handle: PreParser.Handle, decomposer: PreParser.Decomposer] =
 BEGIN
 ENABLE UNWIND = > NULL;


 ParserZone.Initialize[frameSize: PreParserCommon.FrameSize];

 PreParserControl.Initialize[];
 PreParserInstance.PreParserInit[];

 PreParserData.InitializeModule[];
```

Copyright © 1992 Xerox Corporation All Rights Reserved

```
decomposer ← lighthouse;
preParserList ← PreParserInstance.CreateInstance[
 priority: priority, transactionID: transID];
preParserList.smZone ← zone;
preParserList.ipStreamHandle ← preParserZone.NEW[
 BlockStream.Object ← [
 bufPtr: NIL, delete: NIL, acquire: AcquireBlock, receive: NIL,
 return: ReturnBlock, transmit: TransmitBlock, setAbort: NIL, setEOF: SetEOF,
 setTimeout: NIL]];
handle ← LOOPHOLE[preParserList, PreParser.Handle];

PreParserData.InitializeData[];
END;
Destroy: PUBLIC PROCEDURE [
handle: PreParser.Handle, transID: ResMgrIDs.TransactionID] RETURNS [] =
BEGIN
myHandle: Handle = LOOPHOLE[handle, Handle];

IF myHandle.managerProcess # NIL THEN {
 Process.Abort[myHandle.managerProcess];
 JOIN myHandle.managerProcess;
 myHandle.managerProcess ← NIL};
IF myHandle.processorList.mainLoopProcess # NIL THEN {
 Process.Abort[myHandle.processorList.mainLoopProcess];
 JOIN myHandle.processorList.mainLoopProcess;
 myHandle.processorList.mainLoopProcess ← NIL};

IF preParserBuffer # NIL THEN {
 ResMgr.FreeBufferList[
  id: [trans: transID, module: preParse], buffer: preParserBuffer];
 preParserBuffer ← NIL;
 preParserZone ← NIL;
 };

IF preParserLogBuffer # NIL THEN {
 ResMgr.FreeBufferList[
  id: [trans: transID, module: preParse], buffer: preParserLogBuffer];
 preParserLogBuffer ← NIL;
 preParserLogZone ← NIL;
 };
END;
ExtendJobZone: INTERNAL PROCEDURE [h: Handle] RETURNS [ok: BOOLEAN ← FALSE] =
BEGIN
IF h.jobZoneSegListEnd.next # NIL THEN ERROR;
h.jobZoneBlockSize ← MAX[PreParserSetup.nominalZoneSize, h.jobZoneBlockSize];
h.jobZoneSegListEnd.next ← ResMgr.Allocate[
 id: [trans: h.transactionID, module: preParse], Pages: h.jobZoneBlockSize,
 waitTillAvailable: FALSE !
 ResMgr.Error => {h.jobZoneSegListEnd.next ← NIL; CONTINUE}];
IF h.jobZoneSegListEnd.next # NIL THEN
```

Copyright © 1992 Xerox Corporation All Rights Reserved

```
  BEGIN
  h.jobZoneSegListEnd ← h.jobZoneSegListEnd.next;
  h.jobZoneSegListEnd.next ← NIL;
  ok ← TRUE;
  IF h.clearMgrResourceFault THEN {
   PreParserCallBack.ClearResourceFault[transID: h.transactionID];
   h.clearMgrResourceFault ← FALSE};
  END;
 END;
ExtendPageZone: INTERNAL PROCEDURE [
 page: LONG POINTER TO PreParserControl.PageListEntry, h: Handle]
 RETURNS [ok: BOOLEAN ← FALSE] =
 BEGIN
 IF page.zoneSegListEnd.next # NIL THEN ERROR;
 page.zoneBlockSize ← MAX[PreParserSetup.nominalZoneSize, page.zoneBlockSize];
 page.zoneSegListEnd.next ← ResMgr.Allocate[
  id: [trans: h.transactionID, module: preParse], Pages: page.zoneBlockSize,
  waitTillAvailable: FALSE !
  ResMgr.Error => {page.zoneSegListEnd.next ← NIL; CONTINUE}];
 IF page.zoneSegListEnd.next # NIL THEN
  BEGIN
  page.zoneSegListEnd ← page.zoneSegListEnd.next;
  page.zoneSegListEnd.next ← NIL;
  ok ← TRUE;
  IF h.clearMgrResourceFault THEN {
   PreParserCallBack.ClearResourceFault[transID: h.transactionID];
   h.clearMgrResourceFault ← FALSE};
  END;
 END;
GetAvailableBlock: INTERNAL PROCEDURE [handle: PreParserControl.Handle]
 RETURNS [block: BlockStream.Block] =
 BEGIN
 blockEntry: IPBlockHandle;
 block ← BlockStream.nullBlock;

 blockEntry ← handle.ipBlockList;
 UNTIL blockEntry = NIL DO
  IF blockEntry.mainDone AND blockEntry.mgrDone
   AND blockEntry.status = atPreParser THEN
   BEGIN
   block ← blockEntry.block;
   blockEntry.status ← atClient;
   PreParserControl.LogProc[
    h: handle, rec: [var: blockAcquired[block: block]]];
   RETURN;
   END;
  blockEntry ← blockEntry.fwdLink;
  ENDLOOP;

 END;
```

Copyright © 1992 Xerox Corporation All Rights Reserved

```
Initialize: PUBLIC PROCEDURE [] RETURNS [] =
 BEGIN
 preParserBuffer ← ResMgr.Allocate[
  id: [trans: captureIP, module: preParse], Pages: preParserZoneSize,
  base: NIL, waitTillAvailable: TRUE !
  ResMgr.Error => {preParserBuffer ← NIL; CONTINUE}; ];
 IF preParserBuffer = NIL THEN ERROR
 ELSE {
  preParserZone ← ResMgrHeap.Create[
   bl: preParserBuffer, heapFull: PreParserZoneFull,
   heapFullWarning: PreParserZoneFull,
   warningThreshold: preParserZonePercent, maxSize: preParserZoneSize,
   ownerChecking: TRUE, checking: TRUE, incrementSize: preParserZoneIncrement
   ! ResMgr.Error => {preParserZone ← NIL; CONTINUE}];
  };
 IF preParserZone = NIL THEN ERROR;

 preParserLogBuffer ← ResMgr.Allocate[
  id: [trans: captureIP, module: preParse], Pages: preParserLogZoneSize,
  base: NIL, waitTillAvailable: TRUE !
  ResMgr.Error => {preParserLogBuffer ← NIL; CONTINUE}; ];
 IF preParserLogBuffer = NIL THEN ERROR
 ELSE {
  preParserLogZone ← ResMgrHeap.Create[
   bl: preParserLogBuffer, heapFull: PreParserZoneFull,
   heapFullWarning: PreParserZoneFull,
   warningThreshold: preParserZonePercent, maxSize: preParserLogZoneSize,
   ownerChecking: TRUE, checking: TRUE, incrementSize: preParserZoneIncrement
   ! ResMgr.Error => {preParserZone ← NIL; CONTINUE}];
  };
 IF preParserLogZone = NIL THEN ERROR;
 END;
LastMgrIPBlock: INTERNAL PROCEDURE [handle: Handle] RETURNS [] =
 BEGIN
 blockEntry: IPBlockHandle ← NIL;

 FOR blockEntry ← handle.ipBlockList, blockEntry ← blockEntry.fwdLink UNTIL
  blockEntry = NIL DO blockEntry.mgrDone ← TRUE; ENDLOOP;

 UpdateBlockList[handle: handle];

 handle.currentManagerBlock ← NIL;
 END;
NotifyMainLoopReady: PUBLIC ENTRY PROCEDURE [
 handle: Handle,
 currentPageHandle: LONG POINTER TO PreParserControl.PageListEntry,
 status: PreParserControl.MainStatus]
 RETURNS [
  action: PreParserControl.MainAction, h: PreParserControl.MainHandle,
  pageHandle: LONG POINTER TO PreParserControl.PageListEntry,
```

Copyright © 1992 Xerox Corporation All Rights Reserved

```
 newIPBlock: BlockStream.Block, newZoneBlock: ResMgrStorage.BufferList,
 newIIPBlock: BlockStream.Block, smZone: UNCOUNTED ZONE] =
BEGIN
ENABLE UNWIND => NULL;
needIPBlock: BOOLEAN ← FALSE;
needToWait: BOOLEAN ← TRUE;
tempRec: mainStatus PreParserControl.LogRec;

action ← run;
h ← handle.ptrToManagerContext;
pageHandle ← NIL;
newIPBlock ← BlockStream.nullBlock;
newZoneBlock ← NIL;
newIIPBlock ← BlockStream.nullBlock;
smZone ← handle.smZone;

PreParserMainLoopControl.SetMainLoopStatus[
 handle: handle, currentPageHandle: currentPageHandle, status: status];


tempRec.mainS ← status;
PreParserControl.LogProc[h: handle, rec: tempRec];

IF currentPageHandle # NIL THEN
 SELECT currentPageHandle.status FROM
  pageCompleted, slewWithErrors => UpdateBlockList[handle: handle];
  ENDCASE;


handle.managerActionNeeded ← TRUE;
NOTIFY handle.managerCV;

DO
 UNTIL handle.mainLoopActionNeeded DO WAIT handle.mainLoopCV; ENDLOOP;
 handle.mainLoopActionNeeded ← FALSE;

 IF handle.pageList.status = needIIPBlock
  OR handle.pageList.status = slewWithErrors
  OR handle.pageList.status = needZoneExtend THEN LOOP;

 IF handle.state = proceeding OR handle.state = aborting THEN {
  [needIPBlock: needIPBlock, needToWait: needToWait, h: h,
   pageHandle: pageHandle, newIPBlock: newIPBlock,
   newZoneBlock: newZoneBlock, newIIPBlock: newIIPBlock] ←
   PreParserMainLoopControl.SetMainLoopReturn[handle: handle];

  IF needIPBlock THEN UpdateBlockList[handle: handle];

  IF needToWait THEN LOOP ELSE RETURN}
 ELSE LOOP;
```

Copyright © 1992 Xerox Corporation All Rights Reserved

```
  ENDLOOP;
 END;
NotifyManagerReady: PUBLIC ENTRY PROCEDURE [
 handle: Handle, status: PreParserControl.ManagerStatus]
 RETURNS [action: PreParserControl.ManagerAction] =
 BEGIN
 ENABLE UNWIND => NULL;
 blockEntry: IPBlockHandle;
 pageEntry, pageTemp: LONG POINTER TO PreParserControl.PageListEntry;
 tempSIFResultPtr: LONG POINTER TO PreParserControl.SIFResult;
 needToWait, initError, extendZone: BOOLEAN ← FALSE;
 nodePtr: LONG POINTER ← NIL;
 sifNodeSize: CARDINAL;
 tempResults: LONG POINTER TO PreParser.PageResults ← NIL;
 notifyMainLoop, notifyStreamAquire: BOOLEAN ← FALSE;
 statusRec: mgrStatus PreParserControl.LogRec;

 [notifyMainLoop: notifyMainLoop, notifyStreamAquire: notifyStreamAquire] ←
  PreParserManager.SetManagerStatus[handle: handle, status: status];

 statusRec.mgrS ← status;
 PreParserControl.LogProc[h: handle, rec: statusRec];

 IF notifyStreamAquire THEN {
  handle.acquireContinue ← TRUE; NOTIFY handle.acquireCV};
 IF notifyMainLoop THEN {
  handle.mainLoopActionNeeded ← TRUE; NOTIFY handle.mainLoopCV};

 DO
  UNTIL handle.managerActionNeeded DO WAIT handle.managerCV; ENDLOOP;
  handle.managerActionNeeded ← FALSE;

  IF handle.newCommand THEN
   BEGIN
   handle.newCommand ← FALSE;
   WITH handle.command SELECT FROM
    mediaReady =>
     BEGIN
     handle.managerAction ← [setMedia[]];
     action ← handle.managerAction;
     RETURN;
     END;
    abort =>
     BEGIN
     IF NOT handle.endOfJobFound THEN
      handle.endOfJobFound ← StopMainAndMgr[handle: handle];

     IF handle.eofSet AND handle.endOfJobFound THEN {
      CleanUpJob[handle: handle];
      handle.managerAction ← [cleanupJob[]];
```

Copyright © 1992 Xerox Corporation All Rights Reserved

```
     action ← handle.managerAction;
     RETURN}
    ELSE {handle.newCommand ← TRUE; LOOP};
    END;

   proceedFromSuspend =>
    BEGIN
    PreParserManager.DoProcessorScheduling[
     parserList: preParserList, handle: handle, action: restrict];
    PreParserManager.ReportPreParserStatus[h: handle];
    handle.mainLoopActionNeeded ← TRUE;
    NOTIFY handle.mainLoopCV;
    END;

   suspend =>
    BEGIN
    handle.managerAction ← [suspend[]];
    action ← handle.managerAction;
    RETURN;
    END;

   ENDCASE;
  END;

 IF handle.eofSet THEN
  SELECT handle.state FROM
   waitingForMediaReady, suspendingForResources,
    suspendingForPreParserFatalError, suspendingForPreParserDiskSaturation
     => LOOP;
   ENDCASE;

 IF handle.managerBlockStatus = eoj AND handle.currentManagerBlock # NIL THEN
  LastMgrIPBlock[handle: handle];

 IF handle.managerBlockStatus = eoj AND NOT handle.endOfJobFound THEN {
  pageEntry ← handle.pageList;
  UNTIL pageEntry = NIL DO
   IF pageEntry.status # needSetup THEN EXIT;
   pageEntry ← pageEntry.fwdLink
   ENDLOOP;
  IF pageEntry = NIL THEN handle.endOfJobFound ← TRUE};

 IF handle.endOfJobFound THEN {
  IF handle.eofSet THEN {
   CleanUpJob[handle: handle];
   handle.managerAction ← [cleanupJob[]];
   action ← handle.managerAction;
   RETURN}
  ELSE LOOP};
```

Copyright © 1992 Xerox Corporation All Rights Reserved

```
pageEntry ← handle.pageList;
UNTIL pageEntry = NIL DO
 IF pageEntry.status = needIIPBlock THEN
  BEGIN
  handle.managerAction ← [getIIPBlock[ph: pageEntry]];

  action ← handle.managerAction;
  RETURN;
  END;
 pageEntry ← pageEntry.fwdLink;
 ENDLOOP;

FOR pageEntry ← handle.pageList, pageEntry.fwdLink UNTIL pageEntry = NIL DO
 IF pageEntry.status = slewWithErrors THEN
  SlewWithErrors[handle: handle, cp: pageEntry];
 ENDLOOP;

pageEntry ← handle.pageList;
UNTIL pageEntry = NIL OR pageEntry.status = inProcess DO
 IF pageEntry.status = pageCompleted THEN
  BEGIN
  pageEntry.status ← releasing;

  handle.managerAction ← [releasePage[ph: pageEntry]];

  action ← handle.managerAction;
  RETURN;
  END;
 pageEntry ← pageEntry.fwdLink;
 ENDLOOP;

pageEntry ← handle.pageList;
UNTIL pageEntry = NIL DO
 IF pageEntry.status = needZoneExtend THEN

  BEGIN
  pageTemp ← pageEntry.fwdLink;
  UNTIL pageTemp = NIL DO
   IF pageTemp.status = needSetup AND pageTemp.zoneSegListStart # NIL
    AND pageTemp.zoneSegListStart.allocateSize > = pageTemp.zoneBlockSize
    THEN EXIT;
   pageTemp ← pageTemp.fwdLink;
   ENDLOOP;

  IF pageTemp = NIL THEN
   BEGIN
   IF ExtendPageZone[page: pageEntry, h: handle] THEN
    BEGIN
```

Copyright © 1992 Xerox Corporation All Rights Reserved

```
      pageEntry.status ← zoneExtended;
      handle.mainLoopActionNeeded ← TRUE;
      NOTIFY handle.mainLoopCV;
      END
    ELSE BEGIN SetSupendForResources[h: handle]; GOTO resourceFault; END;
    END
   ELSE
    BEGIN
    pageEntry.zoneSegListEnd.next ← pageTemp.zoneSegListStart;
    pageEntry.zoneSegListEnd ← pageTemp.zoneSegListStart;
    pageTemp.zoneSegListStart ← pageTemp.zoneSegListStart.next;
    IF pageTemp.zoneSegListStart = NIL THEN {
      pageTemp.zoneSegListEnd ← NIL}
    ELSE {pageEntry.zoneSegListEnd.next ← NIL};
    pageEntry.status ← zoneExtended;
    handle.mainLoopActionNeeded ← TRUE;
    NOTIFY handle.mainLoopCV;
    END;
   END;
  pageEntry ← pageEntry.fwdLink;
  REPEAT resourceFault = > LOOP;
  ENDLOOP;

 pageEntry ← handle.pageList;
 UNTIL pageEntry = NIL DO
  IF pageEntry.freeNodeList # NIL THEN
   BEGIN
   UNTIL pageEntry.freeNodeList = NIL DO
    tempSIFResultPtr ← pageEntry.freeNodeList;
    pageEntry.freeNodeList ← pageEntry.freeNodeList.next;
    PreParserMain.FreeNode[
     mainHandle: handle.ptrToManagerContext, nodePtr: tempSIFResultPtr];
    ENDLOOP;
   END;
  pageEntry ← pageEntry.fwdLink;
  ENDLOOP;

 IF handle.managerBlockStatus = sif THEN
  BEGIN
  IF handle.zoneExtended THEN handle.zoneExtended ← FALSE;
  sifNodeSize ← Inline.LowHalf[u: handle.sifNodeSizeInWords];
  [nodePtr: nodePtr, extendZone: extendZone] ← PreParserMain.AllocateNode[
   mainHandle: handle.ptrToManagerContext, nodeSizeInWords: sifNodeSize];
  IF extendZone THEN
   BEGIN
   IF NOT ExtendJobZone[h: handle] THEN
    BEGIN SetSupendForResources[h: handle]; LOOP; END;
   END;

  handle.managerBlockStatus ← parsing;
```

Copyright © 1992 Xerox Corporation All Rights Reserved

```
handle.managerAction ← [processSIF[nodePtr: nodePtr]];
action ← handle.managerAction;
RETURN;
END;
IF handle.needZoneExtend THEN

BEGIN
handle.needZoneExtend ← FALSE;
IF ExtendJobZone[h: handle] THEN
 BEGIN
 handle.managerAction ← [
  parseBlock[
  mainHandle: handle.ptrToManagerContext,
  newZoneBlock: handle.jobZoneSegListEnd, smZone: handle.smZone,
  newIPBlock: NIL]];
 action ← handle.managerAction;
 RETURN;
 END
ELSE
 BEGIN
 SetSupendForResources[h: handle];
 handle.needZoneExtend ← FALSE;
 LOOP;
 END;
END;
IF handle.managerBlockStatus = needIPBlock THEN
BEGIN
blockEntry ← handle.currentManagerBlock;

IF blockEntry.fwdLink # NIL AND NOT blockEntry.fwdLink.mgrDone THEN
 BEGIN
 blockEntry.mgrDone ← TRUE;

 blockEntry ← blockEntry.fwdLink;
 handle.currentManagerBlock ← blockEntry;

 IF NOT handle.managerBetweenPages THEN {
  FOR pageEntry ← handle.pageList, pageEntry.fwdLink UNTIL pageEntry =
   NIL DO
   IF pageEntry.logicalPageNumber =
    LOOPHOLE[handle.ptrToManagerContext,
    PreParserCommon.MainHandle].logicalPageNumber THEN
    SELECT pageEntry.status FROM
     ready, inProcess, needIPBlock, needZoneExtend, zoneExtended,
      needInsertFileInfo, needIIPBlock, newIIPBlock =>
      handle.currentManagerBlock.mainDone ← FALSE;
     slewWithErrors => SlewWithErrors[handle: handle, cp: pageEntry];
     ENDCASE;
   ENDLOOP;
  };
```

Copyright © 1992 Xerox Corporation All Rights Reserved

```
    UpdateBlockList[handle: handle];

    handle.currentManagerOffset ← blockEntry.block.startIndex;

    handle.managerBlockStatus ← parsing;

    handle.managerAction ← [
     parseBlock[
     mainHandle: handle.ptrToManagerContext, newZoneBlock: NIL,
     smZone: handle.smZone, newIPBlock: blockEntry]];
    action ← handle.managerAction;
    RETURN;
    END
   ELSE
    BEGIN
    IF handle.eofSet AND handle.state # aborting THEN {
     handle.objectFault.problem ← [masterProblem[problem: unexpectedEOF]];
     handle.objectFault.severity ← systemError;
     handle.objectFault.side ← handle.nextPageSide;
     handle.objectFault.sheetNumber ← handle.nextPageSheetNumber;
     handle.objectFault.copyNumber ← 1;
     PreParserCallBack.ReportObjectFault[
      context: handle.jobProceedDataPtr.clientContext,
      objectFault: handle.objectFault];

     handle.command ← [suspend[]];
     handle.newCommand ← TRUE;
     SetState[handle: handle, state: suspendingForPreParserFatalError];

     handle.managerActionNeeded ← TRUE;
     LOOP}
    ELSE LOOP;
    END;
   END;

  needToWait ← FALSE;
  IF handle.nextPageIPBlock # NIL THEN
   BEGIN
   pageEntry ← handle.pageList;
   UNTIL pageEntry = NIL DO
    IF pageEntry.status = needSetup THEN
     BEGIN
     IF pageEntry.zoneSegListStart # NIL THEN
      BEGIN
      pageEntry.currentIPBlock ← handle.nextPageIPBlock;
      pageEntry.frame ← handle.nextPageFrame;
      pageEntry.logicalPageNumber ← handle.nextLogicalPageNumber;
      pageEntry.mediaIndex ← handle.nextPageMediaIndex;
      pageEntry.pageStartOffset ← handle.nextPageOffset;
```

Copyright © 1992 Xerox Corporation All Rights Reserved

```
pageEntry.plex ← handle.nextPagePlex;
pageEntry.sheetNumber ← handle.nextPageSheetNumber;
pageEntry.side ← handle.nextPageSide;
pageEntry.tFormIndex ← handle.nextPageTFormIndex;

handle.nextPageFrame ← NIL;
handle.nextPageIPBlock ← NIL;
handle.nextLogicalPageNumber ← 0;
handle.nextPageMediaIndex ← 0;
handle.nextPageOffset ← 0;
handle.nextPagePlex ← simplex;
handle.nextPageSheetNumber ← 0;
handle.nextPageSide ← simplex;
handle.nextPageTFormIndex ← 0;

handle.managerAction ← [pageSetup[ph: pageEntry]];

action ← handle.managerAction;
RETURN;
END
ELSE
BEGIN
pageTemp ← pageEntry.fwdLink;
UNTIL pageTemp = NIL DO
 IF pageTemp.status = needSetup AND pageTemp.zoneSegListStart # NIL
  AND pageTemp.zoneSegListStart.allocateSize >=
   pageTemp.zoneBlockSize THEN EXIT;
 pageTemp ← pageTemp.fwdLink;
 ENDLOOP;

IF pageTemp = NIL THEN {needToWait ← TRUE; EXIT}
ELSE
 BEGIN
 pageEntry.zoneSegListStart ← pageTemp.zoneSegListStart;
 pageEntry.zoneSegListEnd ← pageTemp.zoneSegListStart;

 pageTemp.zoneSegListStart ← pageTemp.zoneSegListStart.next;
 IF pageTemp.zoneSegListStart = NIL THEN {
  pageTemp.zoneSegListEnd ← NIL}
 ELSE {pageEntry.zoneSegListEnd.next ← NIL};

 pageEntry.currentIPBlock ← handle.nextPageIPBlock;
 pageEntry.frame ← handle.nextPageFrame;
 pageEntry.logicalPageNumber ← handle.nextLogicalPageNumber;
 pageEntry.mediaIndex ← handle.nextPageMediaIndex;
 pageEntry.pageStartOffset ← handle.nextPageOffset;
 pageEntry.plex ← handle.nextPagePlex;
 pageEntry.sheetNumber ← handle.nextPageSheetNumber;
 pageEntry.side ← handle.nextPageSide;
 pageEntry.tFormIndex ← handle.nextPageTFormIndex;
```

Copyright © 1992 Xerox Corporation All Rights Reserved

```
      handle.nextPageFrame ← NIL;
      handle.nextPageIPBlock ← NIL;
      handle.nextLogicalPageNumber ← 0;
      handle.nextPageMediaIndex ← 0;
      handle.nextPageOffset ← 0;
      handle.nextPagePlex ← simplex;
      handle.nextPageSheetNumber ← 0;
      handle.nextPageSide ← simplex;
      handle.nextPageTFormIndex ← 0;

      handle.managerAction ← [pageSetup[ph: pageEntry]];

      action ← handle.managerAction;
      RETURN;
      END;
     END;
    END;
   pageEntry ← pageEntry.fwdLink;
   ENDLOOP;
  needToWait ← TRUE;
  END;
 IF needToWait THEN LOOP;

 IF handle.managerBlockStatus = parsing THEN
  BEGIN
  handle.managerAction ← [
   parseBlock[
   mainHandle: handle.ptrToManagerContext, newZoneBlock: NIL,
   smZone: handle.smZone, newIPBlock: NIL]];
  action ← handle.managerAction;
  RETURN;
  END;

 IF handle.managerBlockStatus = soj THEN
  BEGIN
  IF handle.currentManagerBlock.mgrDone = FALSE THEN
   BEGIN
   initError ← FALSE;
   initError ← PreParserMain.InitContext[
    currentPageHandle: NIL, execute: FALSE, initialFrame: NIL,
    initialZoneBlock: handle.jobZoneSegListEnd, handle: handle,
    jobMediaDataPtr: handle.jobMediaDataPtr, logicalPageNumber: 0,
    mainHandle: handle.ptrToManagerContext, mediaIndex: 0, plex: simplex,
    proceedDataPtr: handle.jobProceedDataPtr, sheetNumber: 0,
    side: simplex, tFormIndex: 0];
   IF initError THEN
    BEGIN
    handle.objectFault.severity ← systemError;
```

Copyright © 1992 Xerox Corporation All Rights Reserved

```
      handle.objectFault.side ← handle.nextPageSide;
      handle.objectFault.sheetNumber ← 0;
      handle.objectFault.copyNumber ← 0;

      PreParserCallBack.ReportObjectFault[
       context: handle.jobProceedDataPtr.clientContext,
       objectFault: handle.objectFault];

      handle.command ← [suspend[]];
      handle.newCommand ← TRUE;

      SetState[handle: handle, state: suspendingForPreParserFatalError];

      handle.managerActionNeeded ← TRUE;
      LOOP;
      END;

     handle.managerAction ← [
      parseBlock[
      mainHandle: handle.ptrToManagerContext, newZoneBlock: NIL,
      smZone: handle.smZone, newIPBlock: handle.currentManagerBlock]];
     handle.managerBlockStatus ← parsing;

     action ← handle.managerAction;
     RETURN;
     END;
    END;

   IF handle.state = starting THEN
    BEGIN
    handle.managerAction ← [init[]];
    action ← handle.managerAction;
    RETURN;
    END;
   ENDLOOP;
  END;
 PreParserZoneFull: ResMgrHeap.HeapFullProc =
  BEGIN ERROR Error[type: maxSizeExceeded]; END;

 PutCommand: PUBLIC ENTRY PROCEDURE [
  handle: PreParser.Handle, command: PreParser.Command] RETURNS [] =
  BEGIN
  ENABLE UNWIND => NULL;
  h: Handle ← LOOPHOLE[handle, Handle];

  PreParserControl.LogProc[h: h, rec: [var: command[cmnd: command]]];

  WITH command SELECT FROM
   abort =>
    SELECT h.state FROM
```

Copyright © 1992 Xerox Corporation All Rights Reserved

```
    idle => RETURN;
    starting, settingMedia, proceedingFromSuspend, aborting => ERROR;
    ENDCASE;

  proceedWithJob =>
   BEGIN
   IF h.state # idle THEN ERROR;
   EventLogger.Log[event: startPreParse];
   ipBlocksAcquired ← ipBlocksTransmitted ← 0;
   END;

  mediaReady => IF h.state # waitingForMediaReady THEN ERROR;

  proceedFromSuspend => IF h.state # suspendingForResources THEN ERROR;

  suspend => ERROR;

  ENDCASE => ERROR;
 h.command ← command;

 PreParserManager.PutPreParserCommand[parserList: preParserList, h: h];

 h.managerActionNeeded ← TRUE;
 NOTIFY h.managerCV;
 RETURN;
 END;

ReturnBlock: PUBLIC ENTRY PROCEDURE [
 sH: BlockStream.StreamHandle, block: BlockStream.Block] RETURNS [] =
 BEGIN
 ENABLE UNWIND => NULL;
 handle: Handle ← preParserList;
 temp, prev, blockEntry: LONG POINTER TO PreParserControl.IPBlockListEntry;

 UNTIL handle.ipStreamHandle = sH DO
  handle ← handle.fwdLink; IF handle = NIL THEN RETURN; ENDLOOP;
 PreParserControl.LogProc[h: handle, rec: [var: returnBlock[block: block]]];

 prev ← NIL;
 blockEntry ← handle.ipBlockList;
 UNTIL blockEntry = NIL DO
  IF blockEntry.status = atClient THEN
   BEGIN
   IF blockEntry.block.blockPointer = block.blockPointer THEN
    BEGIN
    blockEntry.status ← atPreParser;
    IF blockEntry.fwdLink = NIL THEN RETURN;

    temp ← handle.ipBlockList;
    UNTIL temp.fwdLink = NIL DO temp ← temp.fwdLink; ENDLOOP;
```

Copyright © 1992 Xerox Corporation All Rights Reserved

```
      temp.fwdLink ← blockEntry;
      IF prev = NIL THEN handle.ipBlockList ← blockEntry.fwdLink
      ELSE prev.fwdLink ← blockEntry.fwdLink;
      blockEntry.fwdLink ← NIL;
      PreParserControl.LogProc[
       h: handle, rec: [var: blockReturned[block: block]]];

      RETURN;
      END;
     END;
    prev ← blockEntry;
    blockEntry ← blockEntry.fwdLink;
    ENDLOOP;
   END;
  SetEOF: PUBLIC ENTRY PROCEDURE [sH: BlockStream.StreamHandle] RETURNS [] =
   BEGIN
   ENABLE UNWIND = > NULL;
   handle: Handle ← preParserList;

   UNTIL handle.ipStreamHandle = sH DO
    handle ← handle.fwdLink; IF handle = NIL THEN RETURN; ENDLOOP;
   PreParserControl.LogProc[h: handle, rec: [var: setEOF[]]];

   handle.eofSet ← TRUE;

   handle.managerActionNeeded ← TRUE;
   NOTIFY handle.managerCV

   END;
  SetSupendForResources: INTERNAL PROCEDURE [h: Handle] =
   BEGIN
   h.command ← [suspend[]];
   h.newCommand ← TRUE;

   SetState[handle: h, state: suspendingForResources];

   h.clearMgrResourceFault ← TRUE;
   h.managerActionNeeded ← TRUE;
   END;
  SlewWithErrors: INTERNAL PROCEDURE [
   handle: Handle, cp: LONG POINTER TO PreParserControl.PageListEntry] =
   BEGIN
   nextPageSetUp: BOOLEAN ← FALSE;

   IF cp.fwdLink # NIL THEN
    IF handle.nextPageIPBlock # NIL OR cp.fwdLink.status # needSetup THEN {
     nextPageSetUp ← TRUE;
     cp.status ← pageCompleted;
     handle.mainLoopActionNeeded ← TRUE;
     NOTIFY handle.mainLoopCV;
```

Copyright © 1992 Xerox Corporation All Rights Reserved

```
  };

 IF cp.currentIPBlock # NIL THEN {
  IF NOT nextPageSetUp THEN {
   UNTIL cp.currentIPBlock = handle.currentManagerBlock DO
    cp.currentIPBlock.mainDone ← TRUE;
    cp.currentIPBlock ← cp.currentIPBlock.fwdLink;
    ENDLOOP;
   UpdateBlockList[handle: handle]}
  ELSE {
   UNTIL cp.currentIPBlock = cp.fwdLink.currentIPBlock DO
    cp.currentIPBlock.mainDone ← TRUE;
    cp.currentIPBlock ← cp.currentIPBlock.fwdLink;
    ENDLOOP;
   UpdateBlockList[handle: handle];
   cp.currentIPBlock ← NIL;
   RETURN};
  };

 IF handle.managerBlockStatus = eoj AND NOT nextPageSetUp THEN {
  cp.currentIPBlock ← NIL;
  cp.status ← pageCompleted;
  handle.mainLoopActionNeeded ← TRUE;
  NOTIFY handle.mainLoopCV;
  RETURN};

 END;
SetState: PUBLIC PROCEDURE [
 handle: Handle, state: PreParserControl.PreParserState] =
 BEGIN

 handle.state ← state;
 PreParserControl.LogProc[h: handle, rec: [var: state[pState: state]]];
 END;

StopMainAndMgr: INTERNAL PROCEDURE [handle: Handle]
 RETURNS [MainAndMgrFinished: BOOLEAN] =
 BEGIN
 mainWorking, pageStopped, readyPage: BOOLEAN ← FALSE;
 pageEntry, tempPage: PreParserControl.PageHandle;
 sh: BlockStream.StreamHandle;

 MainAndMgrFinished ← FALSE;

 FOR pageEntry ← handle.pageList, pageEntry ← pageEntry.fwdLink UNTIL pageEntry
  = NIL DO
  SELECT pageEntry.status FROM
   needIPBlock, needZoneExtend, needInsertFileInfo, needIIPBlock,
    pageCompleted, slewWithErrors, stopped => {
    IF pageEntry.currentIPBlock # NIL THEN
```

Copyright © 1992 Xerox Corporation All Rights Reserved

```
      pageEntry.currentIPBlock.mainDone ← TRUE;
     pageStopped ← TRUE;
     pageEntry.status ← needSetup;
     pageEntry.currentIPBlock ← NIL;
     sh ← pageEntry.iipBlockStream;
     IF sh # NIL OR pageEntry.currentIIPBlock # BlockStream.nullBlock THEN {
      sh.return[
       sH: sh, block: pageEntry.currentIIPBlock !
       IIPFragMgr.Error => CONTINUE];
      sh.delete[sH: sh ! IIPFragMgr.Error => CONTINUE];
      pageEntry.currentIIPBlock ← BlockStream.nullBlock}};
    ready => readyPage ← TRUE;
    ENDCASE;
   ENDLOOP;

  IF readyPage THEN {
   FOR pageEntry ← handle.pageList, pageEntry ← pageEntry.fwdLink UNTIL
    pageEntry = NIL DO
    SELECT pageEntry.status FROM
     ready => {
      FOR tempPage ← handle.pageList, tempPage ← tempPage.fwdLink UNTIL
       tempPage = NIL DO
       IF pageEntry # tempPage
        AND pageEntry.currentIPBlock = tempPage.currentIPBlock
        AND NOT tempPage.currentIPBlock.mainDone THEN {
        mainWorking ← TRUE; EXIT}
       ENDLOOP;
      IF NOT mainWorking THEN {
       pageEntry.currentIPBlock.mainDone ← TRUE;
       pageStopped ← TRUE;
       mainWorking ← FALSE;
       pageEntry.status ← needSetup;
       pageEntry.currentIPBlock ← NIL;
       sh ← pageEntry.iipBlockStream;
       IF sh # NIL OR pageEntry.currentIIPBlock # BlockStream.nullBlock
        THEN {
        sh.return[
         sH: sh, block: pageEntry.currentIIPBlock !
         IIPFragMgr.Error => CONTINUE];
        pageEntry.currentIIPBlock ← BlockStream.nullBlock;
        sh.delete[sH: sh ! IIPFragMgr.Error => CONTINUE]}}};
     ENDCASE;
    ENDLOOP};

  IF pageStopped THEN UpdateBlockList[handle: handle];

  IF handle.currentManagerBlock # NIL THEN LastMgrIPBlock[handle: handle];

  handle.managerBlockStatus ← eoj;
```

Copyright © 1992 Xerox Corporation All Rights Reserved

```
 pageEntry ← handle.pageList;
 UNTIL pageEntry = NIL DO
  IF pageEntry.status # needSetup THEN EXIT;
  pageEntry ← pageEntry.fwdLink;
  ENDLOOP;
 IF pageEntry = NIL THEN MainAndMgrFinished ← TRUE;

 END;
TransmitBlock: PUBLIC ENTRY PROCEDURE [
 sH: BlockStream.StreamHandle, block: BlockStream.Block] RETURNS [] =
 BEGIN
 ENABLE UNWIND => NULL;
 done: BOOLEAN ← FALSE;
 blockEntry: LONG POINTER TO PreParserControl.IPBlockListEntry;
 pageEntry: LONG POINTER TO PreParserControl.PageListEntry ← NIL;
 handle: Handle ← preParserList;

 UNTIL handle.ipStreamHandle = sH DO
  handle ← handle.fwdLink; IF handle = NIL THEN RETURN; ENDLOOP;
 PreParserControl.LogProc[h: handle, rec: [var: transmitBlock[block: block]]];

 ipBlocksTransmitted ← ipBlocksTransmitted + 1;

 blockEntry ← handle.ipBlockList;
 UNTIL blockEntry = NIL DO
  IF blockEntry.status = atClient THEN
   BEGIN
   IF blockEntry.block.blockPointer = block.blockPointer THEN {
    IF handle.managerBlockStatus = eoj THEN {
     blockEntry.status ← atPreParser;
     handle.acquireContinue ← TRUE;
     NOTIFY handle.acquireCV;
     RETURN}
    ELSE {
     blockEntry.block.startIndex ← block.startIndex;
     blockEntry.block.stopIndexPlusOne ← block.stopIndexPlusOne;
     blockEntry.status ← atPreParser;
     blockEntry.mainDone ← TRUE;
     blockEntry.mgrDone ← FALSE}};
   END;
  blockEntry ← blockEntry.fwdLink;
  ENDLOOP;

 IF handle.parserStatus.msg = preParserSuspended THEN RETURN;

 IF handle.managerBlockStatus = init THEN
  BEGIN
  handle.currentManagerBlock ← handle.ipBlockList;
  handle.currentManagerOffset ← handle.ipBlockList.block.startIndex;
```

Copyright © 1992 Xerox Corporation All Rights Reserved

```
  handle.managerBlockStatus ← soj;

  handle.managerActionNeeded ← TRUE;
  NOTIFY handle.managerCV;
  RETURN;
  END;

 IF handle.managerBlockStatus = needIPBlock THEN
  BEGIN handle.managerActionNeeded ← TRUE; NOTIFY handle.managerCV; END;

 pageEntry ← handle.pageList;
 UNTIL pageEntry = NIL OR done DO
  IF pageEntry.status = needIPBlock THEN
   BEGIN
   handle.mainLoopActionNeeded ← TRUE;
   NOTIFY handle.mainLoopCV;

   done ← TRUE;
   END;
  pageEntry ← pageEntry.fwdLink;
  ENDLOOP;

 RETURN;
 END;
UpdateBlockList: INTERNAL PROCEDURE [handle: Handle] =
 BEGIN
 availableBlock: BOOLEAN ← FALSE;
 blockAvailableStart, blockAvailableCurrent, blockEntry, firstActiveBlock,
  nextBlock, previousActiveBlock: IPBlockHandle ← NIL;

 blockEntry ← handle.ipBlockList;
 UNTIL blockEntry = NIL DO
  IF blockEntry.mainDone AND blockEntry.mgrDone AND blockEntry.ipBuffer # NIL
   THEN {
   availableBlock ← TRUE;
   blockEntry.block.startIndex ← 0;
   blockEntry.block.stopIndexPlusOne ←
    (blockEntry.ipBuffer.allocateSize * Environment.bytesPerPage)};

  blockEntry ← blockEntry.fwdLink;
  ENDLOOP;

 IF availableBlock THEN {
  blockEntry ← handle.ipBlockList;
  UNTIL blockEntry = NIL DO
   nextBlock ← blockEntry.fwdLink;
   IF blockEntry.mainDone AND blockEntry.mgrDone THEN {
    IF blockAvailableStart = NIL THEN {
     blockAvailableStart ← blockAvailableCurrent ← blockEntry;
     blockAvailableStart.fwdLink ← blockAvailableCurrent.fwdLink ← NIL}
```

Copyright © 1992 Xerox Corporation All Rights Reserved

```
    ELSE {
     blockAvailableCurrent.fwdLink ← blockEntry;
     blockAvailableCurrent ← blockEntry;
     blockAvailableCurrent.fwdLink ← NIL}}
   ELSE {
    IF firstActiveBlock = NIL THEN {
     firstActiveBlock ← previousActiveBlock ← blockEntry;
     firstActiveBlock.fwdLink ← previousActiveBlock.fwdLink ← NIL}
    ELSE {
     previousActiveBlock.fwdLink ← blockEntry;
     previousActiveBlock ← blockEntry}};
   blockEntry ← nextBlock;
   ENDLOOP;

  IF firstActiveBlock # NIL THEN {
   handle.ipBlockList ← firstActiveBlock;
   previousActiveBlock.fwdLink ← blockAvailableStart};

  handle.acquireContinue ← TRUE;
  NOTIFY handle.acquireCV};

 END;
END.
```

Copyright © 1992 Xerox Corporation All Rights Reserved

```
DIRECTORY
 Environment USING [Byte],
 FaultLogger USING [ID, Log],
 GenericESS USING [cacheGranularity],
 Inline USING [LongCOPY],
 IPFunction USING [ParserType, PreVersion],
 IPMicrocode USING [CALL],
 PreParserCallBack USING [ESSFault, MicrocodeVersionMismatch, ReportESSFault],
 PreParserColor USING [Initialize, InitializeModuleA],
 PreParserControl USING [preParserZone],
 PreParserData,
 PreParserInstructions USING [
  Initialize, InitializeModuleA, InitializeModuleB, InitializeData,
  UninitializeData],
 PreParserMain USING [Initialize],
 PreParserMainErrors USING [microcodeVersionMismatch, noMicrocode],
 PreParserSkeleton USING [Initialize],
 PreParserStackOps USING [Initialize],
 PreParserStroke USING [Initialize],
 PreParserTokenContext USING [ActionArray],
 Process USING [Detach],
 TopLevel USING [WaitAllUp];

PreParserDataImpl: PROGRAM
 IMPORTS
  FaultLogger, Inline, IPMicrocode, PreParserCallBack, PreParserColor,
  PreParserControl, PreParserData, PreParserInstructions, PreParserMain,
  PreParserSkeleton, PreParserStackOps, PreParserStroke, Process, TopLevel
 EXPORTS PreParserData =

 BEGIN

 version: MACHINE DEPENDENT RECORD [
  var(0): SELECT OVERLAID * FROM
   cardinal => [card(0): CARDINAL],
   versions => [
    lowestSupportedVersion(0:0..7): Environment.Byte,
    versionOfMicrocode(0:8..15): Environment.Byte],
   ENDCASE];

 InitializeData: PUBLIC PROCEDURE =
  BEGIN
  OctetWords: PROCEDURE [n: CARDINAL] RETURNS [words: CARDINAL] = INLINE
   BEGIN
   RETURN[
    ((n + GenericESS.cacheGranularity - 1) / GenericESS.cacheGranularity) *
     GenericESS.cacheGranularity];
   END;
```

Copyright © 1992 Xerox Corporation All Rights Reserved

```
IF PreParserData.execActions = NIL THEN {
 PreParserData.execActions ← PreParserControl.preParserZone.NEW[
  PreParserTokenContext.ActionArray];
 PreParserData.execActions[VAL[0]] ← unrecognizedOperator;
 Inline.LongCOPY[
  from: LOOPHOLE[@PreParserData.execActions[VAL[0]]],
  nwords: SIZE[PreParserTokenContext.ActionArray] - 1,
  to: @PreParserData.execActions[VAL[1]]];
 PreParserData.execActions[nop] ← nop;
 PreParserData.execActions[setXY] ← PreSetXY;
 PreParserData.execActions[setXYRel] ← PreSetXYRel;
 PreParserData.execActions[setXRel] ← PreSetXRel;
 PreParserData.execActions[setYRel] ← PreSetYRel;
 PreParserData.execActions[lineToX] ← lineToX;
 PreParserData.execActions[lineToY] ← lineToY;
 PreParserData.execActions[space] ← space;
 PreParserData.execActions[get] ← get;
 PreParserData.execActions[iGet] ← iGet;
 PreParserData.execActions[iSet] ← ISet;
 PreParserData.execActions[fGet] ← FGet;
 PreParserData.execActions[fSet] ← FSet;
 PreParserData.execActions[show] ← PreShow;
 PreParserData.execActions[lineTo] ← lineTo;
 PreParserData.execActions[maskStroke] ← maskStroke;
 PreParserData.execActions[moveTo] ← moveTo;
 PreParserData.execActions[begin] ← begin;
 PreParserData.execActions[end] ← end;
 PreParserData.execActions[contentInstructions] ← contentInstructions;
 PreParserData.execActions[leftBrace] ← LeftBrace;
 PreParserData.execActions[rightBrace] ← RightBrace;
 PreParserData.execActions[correct] ← correct;
 PreParserData.execActions[makeSimpleCO] ← makeSimpleCO;
 PreParserData.execActions[findOperator] ← findOperator;
 PreParserData.execActions[doSaveSimpleBody] ← doSaveSimpleBody;
 PreParserData.execActions[showAndXRel] ← showAndXRel;
 PreParserData.execActions[showAndFixedXRel] ← showAndFixedXRel;
 PreParserData.execActions[findFont] ← findFont;
 PreParserData.execActions[modifyFont] ← modifyFont;
 PreParserData.execActions[findDecompressor] ← findDecompressor;
 PreParserData.execActions[setFont] ← PreSetFont;
 PreParserData.execActions[setCorrectMeasure] ← setCorrectMeasure;
 PreParserData.execActions[setCorrectTolerance] ← setCorrectTolerance;
 PreParserData.execActions[correctMask] ← correctMask;
 PreParserData.execActions[correctSpace] ← correctSpace;
 PreParserData.execActions[getCP] ← getCP;
 PreParserData.execActions[makeT] ← makeT;
 PreParserData.execActions[trans] ← trans;
 PreParserData.execActions[rotate] ← Rotate;
 PreParserData.execActions[scale] ← Scale;
 PreParserData.execActions[concat] ← concat;
```

Copyright © 1992 Xerox Corporation All Rights Reserved

```
PreParserData.execActions[scale2] ← Scale2;
PreParserData.execActions[concatT] ← concatT;
PreParserData.execActions[move] ← move;
PreParserData.execActions[translate] ← Translate;
PreParserData.execActions[pop] ← Pop;
PreParserData.execActions[dup] ← dup;
PreParserData.execActions[copy] ← copy;
PreParserData.execActions[roll] ← roll;
PreParserData.execActions[exch] ← exch;
PreParserData.execActions[mark] ← Mark;
PreParserData.execActions[unmark] ← unmark;
PreParserData.execActions[unmark0] ← unmark0;
PreParserData.execActions[count] ← Count;
PreParserData.execActions[abs] ← abs;
PreParserData.execActions[add] ← add;
PreParserData.execActions[and] ← and;
PreParserData.execActions[ceiling] ← ceiling;
PreParserData.execActions[div] ← div;
PreParserData.execActions[eq] ← eq;
PreParserData.execActions[floor] ← floor;
PreParserData.execActions[ge] ← ge;
PreParserData.execActions[gt] ← gt;
PreParserData.execActions[mod] ← mod;
PreParserData.execActions[mul] ← mul;
PreParserData.execActions[neg] ← neg;
PreParserData.execActions[not] ← not;
PreParserData.execActions[or] ← or;
PreParserData.execActions[sub] ← sub;
PreParserData.execActions[trunc] ← trunc;
PreParserData.execActions[rem] ← rem;
PreParserData.execActions[round] ← round;
PreParserData.execActions[type] ← type;
PreParserData.execActions[do] ← do;
PreParserData.execActions[doSave] ← doSave;
PreParserData.execActions[doSaveAll] ← doSaveAll;
PreParserData.execActions[if] ← if;
PreParserData.execActions[ifCopy] ← ifCopy;
PreParserData.execActions[ifElse] ← ifElse;
PreParserData.execActions[makeVecLU] ← MakeVecLU;
PreParserData.execActions[makeVec] ← MakeVec;
PreParserData.execActions[shape] ← shape;
PreParserData.execActions[getP] ← getP;
PreParserData.execActions[getProp] ← getProp;
PreParserData.execActions[mergeProp] ← mergeProp;
PreParserData.execActions[curveTo] ← curveTo;
PreParserData.execActions[arcTo] ← arcTo;
PreParserData.execActions[conicTo] ← conicTo;
PreParserData.execActions[maskFill] ← maskFill;
PreParserData.execActions[maskRectangle] ← PreMaskRectangle;
PreParserData.execActions[maskTrapezoidX] ← maskTrapezoidX;
```

Copyright © 1992 Xerox Corporation All Rights Reserved

```
PreParserData.execActions[maskTrapezoidY] ← maskTrapezoidY;
PreParserData.execActions[startUnderline] ← startUnderline;
PreParserData.execActions[maskUnderline] ← maskUnderline;
PreParserData.execActions[makeOutlineOdd] ← makeOutlineOdd;
PreParserData.execActions[makeOutline] ← makeOutline;
PreParserData.execActions[clipOutline] ← clipOutline;
PreParserData.execActions[clipRectangle] ← clipRectangle;
PreParserData.execActions[findColorOp] ← findColorOp;
PreParserData.execActions[findColorModelOp] ← findColorModelOp;
PreParserData.execActions[findColor] ← findColor;
PreParserData.execActions[findDecompressor] ← findDecompressor;
PreParserData.execActions[setGray] ← SetGray;
PreParserData.execActions[makeGray] ← MakeGray;
PreParserData.execActions[makeSampledBlack] ← makeSampledBlack;
PreParserData.execActions[setSampledBlack] ← setSampledBlack;
PreParserData.execActions[maskStrokeClosed] ← maskStrokeClosed;
PreParserData.execActions[maskVector] ← maskVector;
PreParserData.execActions[maskDashedStroke] ← maskDashedStroke;
PreParserData.execActions[makePixelArray] ← makePixelArray;
PreParserData.execActions[extractPixel] ← extractPixel;
PreParserData.execActions[maskPixel] ← maskPixel;
PreParserData.execActions[errorOperator] ← errorOperator;
PreParserData.execActions[sequence] ← PreSequence;
PreParserData.execActions[shortNumber] ← PushShortNumber;
PreParserData.execActions[skipSequence] ← PreSkipSequence;
};

IF PreParserData.skipActions = NIL THEN {
PreParserData.skipActions ← PreParserControl.preParserZone.NEW[
 PreParserTokenContext.ActionArray];
PreParserData.skipActions[VAL[0]] ← PreLoop;
Inline.LongCOPY[
 from: LOOPHOLE[@PreParserData.skipActions[VAL[0]]],
 nwords: SIZE[PreParserTokenContext.ActionArray] - 1,
 to: @PreParserData.skipActions[VAL[1]]];
PreParserData.skipActions[begin] ← begin;
PreParserData.skipActions[end] ← end;
PreParserData.skipActions[contentInstructions] ← contentInstructions;
PreParserData.skipActions[leftBrace] ← PreParserData.execActions[leftBrace];
PreParserData.skipActions[rightBrace] ← PreParserData.execActions[
 rightBrace];
PreParserData.skipActions[sequence] ← PreParserData.execActions[
 skipSequence];
PreParserData.skipActions[skipSequence] ← PreParserData.execActions[
 skipSequence];
PreParserData.skipActions[nop] ← PreParserData.execActions[nop];
};
IF PreParserData.operandTablePtr = NIL THEN {
PreParserData.operandTablePtr ← PreParserControl.preParserZone.NEW[
 PreParserData.OperandTable ← []];
```

Copyright © 1992 Xerox Corporation All Rights Reserved

```
  };
 PreParserData.InitializeMoreData[];
 PreParserInstructions.InitializeData[];
 END;
UninitializeData: PUBLIC PROCEDURE [] =
 BEGIN
 PreParserControl.preParserZone.FREE[@PreParserData.execActions];
 PreParserControl.preParserZone.FREE[@PreParserData.skipActions];
 PreParserControl.preParserZone.FREE[@PreParserData.operandTablePtr];
 PreParserControl.preParserZone.FREE[@PreParserData.operandLookupTablePtr];
 PreParserControl.preParserZone.FREE[@PreParserData.operandConversionTablePtr];
 PreParserControl.preParserZone.FREE[@PreParserData.tokenSizes];
 PreParserInstructions.UninitializeData[];
 END;
InitializeModule: PUBLIC PROCEDURE [] =
 BEGIN
 ENABLE ANY => CONTINUE;
 lowestMicrocodeVersion: Environment.Byte ← 6;
 softwareVersion: Environment.Byte ← 6;

 ReportMicrocodeMismatch: PROCEDURE [] =
  BEGIN
  faultID: FaultLogger.ID;
  TopLevel.WaitAllUp[];
  IF PreParserData.microcodeMismatch THEN {
   faultID ← FaultLogger.Log[
    fault: [
    subsystem: control, swModule: print,
    faultNumber: PreParserMainErrors.microcodeVersionMismatch],
    shutdown: FALSE];
   PreParserCallBack.MicrocodeVersionMismatch[
    lowestMicrocodeVersion: version.lowestSupportedVersion,
    versionOfMicrode: version.versionOfMicrocode, id: faultID];
   }
  ELSE {
   faultID ← FaultLogger.Log[
    fault: [
    subsystem: control, swModule: print,
    faultNumber: PreParserMainErrors.noMicrocode], shutdown: FALSE];
   PreParserCallBack.ReportESSFault[
    context: LOOPHOLE[LONG[0]], fault: noMicrocode, id: faultID];
   };
  END;
 PreParserColor.Initialize[];
 PreParserColor.InitializeModuleA[];
 PreParserData.InitializeModuleA[];
 PreParserInstructions.Initialize[];
 PreParserInstructions.InitializeModuleA[];
 PreParserInstructions.InitializeModuleB[];
```

Copyright © 1992 Xerox Corporation All Rights Reserved

```
  PreParserMain.Initialize[];
  PreParserSkeleton.Initialize[];
  PreParserStackOps.Initialize[];
  PreParserStroke.Initialize[];

  version.card ← IPMicrocode.CALL[
   function: IPFunction.PreVersion, entryContext: NIL].result;

  IF softwareVersion < version.lowestSupportedVersion
   OR lowestMicrocodeVersion > version.versionOfMicrocode THEN
   PreParserData.microcodeVersion ← 0
  ELSE
   PreParserData.microcodeVersion ← MIN[
    softwareVersion, version.versionOfMicrocode];
  IF PreParserData.microcodeVersion = 0 THEN {
   PreParserData.microcodeMismatch ← version.versionOfMicrocode # 0;
   Process.Detach[FORK ReportMicrocodeMismatch[]]};
  END;
 END.
```

Copyright © 1992 Xerox Corporation All Rights Reserved

```
DIRECTORY
 BlockStream USING [Block],
 CoalescerTable USING [
  BitMapEntry, BitMapEntryLink, BitMapEntryLinkHandle, UnknownFontEntry,
  UnknownFontEntryLink, UnknownFontEntryLinkHandle],
 DecomposerCommon USING [
  Corner, ImagerDeviceProperties, ImagingProperties, ObjectIndexNull,
  OrientedImagingProps],
 Environment USING [Byte, bytesPerWord],
 FaultLogger USING [nullLogID],
 FixedPointReal USING [half, Number],
 Heap USING [Error],
 IIPFragMgr USING [Error],
 IIPFragMgrPrivate USING [GetFragID],
 IIPFragMgrInternal USING [IntErrors],
 Image USING [Box],
 InternalIP USING [ColorRange, Token],
 IPMicrocode USING [CALL],
 IPFunction USING [PrePushStack, PrePutToken],
 GenericESS USING [DataLockTag],
 ParserZone USING [AddZoneSegment, InitializeZone],
 PreParser USING [
  JobMediaDataPtr, JobProceedDataPtr, PageResults, PageResultsPtr,
  ResultsErrorStatus],
 PreParserCallBack USING [ObjectFault, PrinterLimit, Problem],
 PreParserCommon,
 PreParserControl USING [FrameHandle, Handle, MainHandle, PageHandle],
 PreParserData,
 PreParserFrameStack USING [CleanUpFrames, ImagerVarsComplexNode, PushFrame],
 PreParserMain USING [],
 PreParserMainErrors USING [softwareBugNoIIP],
 PreParserSetup USING [nominalIIPBlockSize],
 PreParserSkeleton USING [SetUpIIPBlock],
 PublicPrinting USING [Plex],
 Real USING [Float, RoundI],
 ResMgr USING [Error],
 ResMgrStorage USING [BufferList, Pages];

PreParserDataImplA: PROGRAM
 IMPORTS
  Heap, IPMicrocode, IIPFragMgr, IIPFragMgrInternal, IIPFragMgrPrivate,
  PreParserData, PreParserFrameStack, PreParserSkeleton, ParserZone, Real,
  ResMgr
 EXPORTS PreParserControl, PreParserData, PreParserMain =
 BEGIN

 MainContext: PUBLIC TYPE = PreParserCommon.MainContext;
 WordSeq: TYPE = RECORD [SEQUENCE COMPUTED CARDINAL OF WORD];
```

Copyright © 1992 Xerox Corporation All Rights Reserved

```
inchesPerMeter: REAL = 39.37;
fixedPointReal0: FixedPointReal.Number = [li[li: 0]];

zoneLock: GenericESS.DataLockTag ← [0];
GetAllocSizes: PUBLIC PROCEDURE []
 RETURNS [
  contextSizeInWords: CARDINAL, zoneBlockSizeInPages: ResMgrStorage.Pages] =
 BEGIN
 contextSizeInWords ← SIZE[PreParserCommon.MainContext];
 zoneBlockSizeInPages ← 40;
 END;
InitContext: PUBLIC PROCEDURE [
 currentPageHandle: PreParserControl.PageHandle, execute: BOOLEAN,
 initialFrame: PreParserControl.FrameHandle,
 initialZoneBlock: ResMgrStorage.BufferList, handle: PreParserControl.Handle,
 jobMediaDataPtr: PreParser.JobMediaDataPtr, logicalPageNumber: LONG CARDINAL,
 mainHandle: PreParserControl.MainHandle, mediaIndex: CARDINAL,
 plex: PublicPrinting.Plex, proceedDataPtr: PreParser.JobProceedDataPtr,
 sheetNumber: LONG CARDINAL, side: PublicPrinting.Plex, tFormIndex: CARDINAL]
 RETURNS [failed: BOOLEAN ← FALSE] =
 BEGIN
 ENABLE {
  Heap.Error, ResMgr.Error => {
   handle.objectFault.problem ← [
    printerLimitExceeded[
    problem: mgrSMHeapAllocationError, code: 0, id: FaultLogger.nullLogID]];
   failed ← TRUE;
   CONTINUE}};
 h: PreParserCommon.MainHandle = mainHandle;
 h.pc ← [
  pcm: [
  cacheRegister: ALL[0], currentPageHandle: currentPageHandle, handle: handle,
  clientContext: proceedDataPtr.clientContext,
  contextType:
  IF execute THEN preParserMainLoopContext ELSE preParserManagerContext,
  nextIIPWordPtr: NIL, savedAction: checkIPHeader, zoneRecPtr: @h.zone],
  ipBufferPtr: NIL, ipByteIndex: 0, ipStopIndexPlusOne: 0,
  nextState: executing, state: IF execute THEN executing ELSE startOfMaster,
  operationStage: 0,
  actionArrayPtr:
  IF execute THEN PreParserData.execActions ELSE PreParserData.skipActions,
  currentTokenBytes: 0, rBraceActionRecordPtr: @h.pc.rBraceActionArray,
  rBraceRecordCount: 2,
  rBraceActionArray: [next: NIL, entries: ALL[[endPage[]]]],
  tokenOverlay: [bytes[bytes: ALL[0]]], sequenceLength: [lc[lc: 0]]];

 h.zone ← [NIL, NIL, NIL, NIL, NIL, NIL, NIL, NIL, NIL, zoneLock];
 h.mediaIndex ← mediaIndex;
 h.plex ← plex;
 h.side ← side;
```

Copyright © 1992 Xerox Corporation All Rights Reserved

```
IF execute THEN {
  h.pc.pcm.savedAction ← fatalError;
  h.pc.pcm.data.code ← PreParserMainErrors.softwareBugNoIIP};
h.pc.rBraceActionArray.entries[1] ←
  IF execute THEN [endPage[]] ELSE [endMaster[]];

h.warningOccurred ← FALSE;
h.fontSubstituted ← FALSE;
h.errorCode ← LAST[Environment.Byte];
h.stopRequested ← FALSE;
h.mediaIndexReported ← FALSE;
h.recordingCO ← FALSE;
h.betweenPages ← ~execute;
h.fill ← 0;
IF execute THEN {h.mainZoneRecPtr ← @h.zone; h.mgrZoneRecPtr ← NIL}
ELSE {h.mainZoneRecPtr ← NIL; h.mgrZoneRecPtr ← @h.zone};

ParserZone.AddZoneSegment[h: @h.pc.pcm, zoneSegment: initialZoneBlock];

ParserZone.InitializeZone[h: @h.pc.pcm];

h.pc.pcm.nodePtr ← NIL;
h.pc.pcm.nodeSizeInWords ← 0;

h.stackEntryPtr ← NIL;
h.sv ← [
  operand01: [type: null, frameData: null[nullData: 0]],
  operand02: [type: null, frameData: null[nullData: 0]],
  operand03: [type: null, frameData: null[nullData: 0]],
  operand04: [type: null, frameData: null[nullData: 0]],
  operand05: [type: null, frameData: null[nullData: 0]],
  operand06: [type: null, frameData: null[nullData: 0]],
  operand07: [type: null, frameData: null[nullData: 0]]];

h.topStackRecordPtr ← @h.stack;
h.stack.next ← NIL;
IF PreParserData.debug THEN
  h.stack.entries ← ALL[PreParserCommon.nullStackEntry];
h.topStackRecordEntryCount ← 0;
h.stackEntry ← [type: mark, frameData: mark[mark: NIL]];
[] ← IPMicrocode.CALL[function: IPFunction.PrePushStack, entryContext: h];

h.string ← [
  cn: [
  fill: 0, preambleOwned: TRUE, referenceCount: 1, next: NIL, type: string,
  zoneRecPtr: NIL], length: 0, byteOffset: 0, base: NIL, chars: TRASH];

h.framePtr ← h.fGetFramePtr ← LOOPHOLE[initialFrame];
IF execute THEN {
```

Copyright © 1992 Xerox Corporation All Rights Reserved

```
  h.frameSaveOption ← do;
  h.frameInitialized ← FALSE;
  IF PreParserFrameStack.PushFrame[h: h].extendZone THEN {
   handle.objectFault.problem ← [
    unrecoverableSoftwareProblem[pageInitError]];
   RETURN[failed: TRUE]};
  h.fGetFramePtr ← NIL;
  h.tempFramePtr ← NIL;
  h.framePtr.nextFrame ← NIL;
  h.frameInitialized ← TRUE;
  };

 h.tempFramePtr ← NIL;

 IF execute THEN
  failed ← InitMedia[
   mainHandle: mainHandle, jobMediaDataPtr: jobMediaDataPtr].failed
 ELSE
  h.mediumVars.mediumXSize ← h.mediumVars.fieldXMax ←
h.mediumVars.mediumYSize
    ← h.mediumVars.fieldYMax ← 0.0;

 h.mediumVars.fieldXMin ← h.mediumVars.fieldYMin ← 0.0;
 h.imagerVars.priorityImportant ← 0;
 h.imagerVars.color ← [
  type: grayColor,
  frameData: grayColor[colorRange: LAST[InternalIP.ColorRange]]];
 h.imagerVars.strokeWidth ← 0.0;
 h.imagerVars.strokeWidthX ← fixedPointReal0;
 h.imagerVars.strokeWidthY ← fixedPointReal0;
 h.imagerVars.strokeEnd ← square;
 h.imagerVars.strokeJoint ← miter;
 h.imagerVars.correctPass ← 0;
 h.imagerVars.correctTX ← fixedPointReal0;
 h.imagerVars.correctTY ← fixedPointReal0;
 h.imagerVars.fontIndex ← DecomposerCommon.ObjectIndexNull;
 h.imagerVars.font ← [type: null, frameData: null[nullData: 0]];
 h.imagerVars.amplifySpace ← [if[frac: 0, int: 1]];
 h.imagerVars.correctShrink ← [
  type: fixedPointReal,
  frameData: fixedPointReal[fixed: FixedPointReal.half]];
 h.imagerVars.dcsX ← h.imagerVars.c;
 h.imagerVars.dcsY ← h.imagerVars.f;
 h.imagerVars.correctMX ← fixedPointReal0;
 h.imagerVars.correctMY ← fixedPointReal0;
 h.imagerVars.tPtr ← NIL;
 h.imagerVars.underlineStart ← fixedPointReal0;
 h.imagerVars.tAtStartUnderline ← NIL;
 h.imagerVars.noImage ← 0;
 h.correctMeasureX ← [type: null, frameData: null[nullData: 0]];
```

Copyright © 1992 Xerox Corporation All Rights Reserved

```
h.correctMeasureY ← h.correctMeasureX;
h.nodeList ← NIL;
h.composedOpBlockPtr ← NIL;
h.tempVectorPtr ← NIL;
h.P1 ← h.P2 ← [x: fixedPointReal0, y: fixedPointReal0];
h.token ← [invalidTokenType[]];
h.integer ← 0;
h.masterContentInstrs ← FALSE;
h.finishingOption ← NIL;
h.onSimplexOption ← NIL;
h.mediaSelectOption ← NIL;
h.startResultsPtr ← NIL;
h.plexMode ← simplex;
h.contentResults ← [];
h.logicalPageNumber ← logicalPageNumber;
h.iipData ← [imagerVars: h.imagerVars];
h.iipData.imagerVars.fontIndex ← LAST[CARDINAL] - 1;

h.smZone ← handle.smZone;
h.pageResultsPtr ← h.smZone.NEW[PreParser.PageResults];
h.bitMapTablePtrStart ← h.smZone.NEW[CoalescerTable.BitMapEntryLink];
h.bitMapTablePtrCurrent ← h.bitMapTablePtrStart;
h.bitMapTablePtrStart.list ← DESCRIPTOR[
 h.smZone.NEW[
  WordSeq [CoalescerTable.BitMapEntry.SIZE * PreParserCommon.maxImages]],
  PreParserCommon.maxImages];

h.unknownFontTablePtrStart ← h.smZone.NEW[
 CoalescerTable.UnknownFontEntryLink];
h.unknownFontTablePtrCurrent ← h.unknownFontTablePtrStart;
h.unknownFontTablePtrStart.list ← DESCRIPTOR[
 h.smZone.NEW[
  WordSeq
  [CoalescerTable.UnknownFontEntry.SIZE * PreParserCommon.maxFonts]],
  PreParserCommon.maxFonts];

FOR index: CARDINAL IN [0..PreParserCommon.maxImages) DO
 h.bitMapTablePtrStart.list[index] ← PreParserCommon.nullBitMapEntry;
 ENDLOOP;
FOR index: CARDINAL IN [0..PreParserCommon.maxFonts) DO
 h.unknownFontTablePtrStart.list[index] ←
  PreParserCommon.nullUnknownFontTableEntry;
 ENDLOOP;
h.bitMapTablePtrStart.next ← NIL;
h.unknownFontTablePtrStart.next ← NIL;
h.bitMapLookedUpPtr ← NIL;
h.unknownFontLookedUpPtr ← NIL;

h.bitMapTableCurrentLength ← h.bitMapTableTotalLength ← 0;
h.unknownFontTableCurrentLength ← h.unknownFontTableTotalLength ← 0;
```

Copyright © 1992 Xerox Corporation All Rights Reserved

```
h.bitMapEntryPtr ← @h.bitMapTablePtrStart.list[0];
h.unknownFontEntryPtr ← @h.unknownFontTablePtrStart.list[0];

h.pageResultsPtr.bitMapLinks ← h.bitMapTablePtrStart;
h.pageResultsPtr.fontLinks ← h.unknownFontTablePtrStart;
h.pageResultsPtr.plex ← plex;
h.pageResultsPtr.sheet ← sheetNumber;
h.pageResultsPtr.side ← side;


h.tokenSizes ← PreParserData.tokenSizes;
h.operandTablePtr ← PreParserData.operandTablePtr;
h.operandLookupTablePtr ← PreParserData.operandLookupTablePtr;
h.operandConversionTablePtr ← PreParserData.operandConversionTablePtr;
h.proceedDataPtr ← proceedDataPtr;
h.currentTIndex ← IF execute THEN tFormIndex ELSE 1;
h.currentFoundFontIndex ←
 IF execute THEN LOOPHOLE[initialFrame,
 PreParserCommon.FramePtr].foundFontIndex ELSE 0;
h.currentInkWellIndex ←
 IF execute THEN LOOPHOLE[initialFrame,
 PreParserCommon.FramePtr].inkWellBaseIndex ELSE 0;

h.foundFontChain ← NIL;
h.fontLookup ← [next: NIL, table: ALL[NIL]];
h.errorStatus ← ok;

h.availableInkWells.next ← NIL;
h.inkWellCache.next ← NIL;
h.colorOperationStage ← 0;
FOR i: CARDINAL IN PreParserCommon.InkWellTableRange DO
 h.availableInkWells.table[i].used ← FALSE;
 h.inkWellCache.table[i].cached ← FALSE;
 ENDLOOP;

IF sheetNumber > LAST[CARDINAL] THEN {
 handle.objectFault.problem ← [unrecoverableSoftwareProblem[pageInitError]];
 RETURN[failed: TRUE]};

IF sheetNumber = 0 THEN h.mediaVectorCorrection ← 0;
h.sheetNumber ← CARDINAL[sheetNumber];
END;
InitMedia: PUBLIC PROCEDURE [
 mainHandle: PreParserControl.MainHandle,
 jobMediaDataPtr: PreParser.JobMediaDataPtr]
 RETURNS [failed: BOOLEAN ← FALSE] =
 BEGIN
 h: PreParserCommon.MainHandle = mainHandle;
 imagingPropsPtr: LONG POINTER TO DecomposerCommon.OrientedImagingProps;
```

Copyright © 1992 Xerox Corporation All Rights Reserved

```
devicePropsPtr: LONG POINTER TO DecomposerCommon.ImagerDeviceProperties =
 @jobMediaDataPtr.deviceProps;
corner: DecomposerCommon.Corner;
scale, pageWidthReal, pageHeightReal: REAL;
pageWidth, pageHeight: INTEGER;
h.jobMediaDataPtr ← jobMediaDataPtr;
IF h.pc.pcm.contextType = preParserManagerContext THEN RETURN;
imagingPropsPtr ← @jobMediaDataPtr.orientedImagingProps[h.mediaIndex];
corner ←
 IF h.plex = duplex AND devicePropsPtr.duplexYFlip THEN
 SELECT imagingPropsPtr.ipOrigin FROM
  LL => IF devicePropsPtr.duplexYFlip THEN UR ELSE LL,
  LR => IF devicePropsPtr.duplexYFlip THEN LR ELSE UL,
  UL => IF devicePropsPtr.duplexYFlip THEN UL ELSE LR,
  ENDCASE => IF devicePropsPtr.duplexYFlip THEN LL ELSE UR
 ELSE imagingPropsPtr.ipOrigin;

IF devicePropsPtr.resolution = 0 THEN RETURN[failed: TRUE];
scale ←
 SELECT devicePropsPtr.resolution FROM
  600 => (600.0 / 2.54 * 100.0),
  300 => (300.0 / 2.54 * 100.0),
  1200 => (1200.0 / 2.54 * 100.0),
  ENDCASE => (Real.Float[devicePropsPtr.resolution] * inchesPerMeter);


pageHeight ←
 imagingPropsPtr.props.yPageEnd - imagingPropsPtr.props.yPageStart;
pageHeightReal ← Real.Float[pageHeight];
pageWidth ← imagingPropsPtr.props.xPageEnd - imagingPropsPtr.props.xPageStart;
pageWidthReal ← Real.Float[pageWidth];

h.imagerVars.t ← [
 cn: [
 fill: 0, preambleOwned: FALSE, referenceCount: 1, next: NIL,
 type: transformation, zoneRecPtr: NIL], a: 0.0, b: 0.0, c: 0.0, d: 0.0,
 e: 0.0, f: 0.0, tIndex: 0, includesICSToDCS: TRUE];

SELECT corner FROM
 LL => {
  h.imagerVars.t.a ← scale;
  h.imagerVars.t.e ← scale;
  h.imagerVars.c ← fixedPointReal0;
  h.imagerVars.f ← fixedPointReal0;
  h.imagerVars.tFormHint ← zeroBandD;
  };
 LR => {
  h.imagerVars.t.b ← -scale;
  h.imagerVars.t.d ← scale;
  h.imagerVars.t.c ← pageWidthReal;
```

Copyright © 1992 Xerox Corporation All Rights Reserved

```
    h.imagerVars.c ← [if[frac: 0, int: pageWidth]];
    h.imagerVars.f ← fixedPointReal0;
    h.imagerVars.tFormHint ← zeroAandE;
    };
   UR => {
    h.imagerVars.t.a ← -scale;
    h.imagerVars.t.e ← -scale;
    h.imagerVars.t.c ← pageWidthReal;
    h.imagerVars.t.f ← pageHeightReal;
    h.imagerVars.c ← [if[frac: 0, int: pageWidth]];
    h.imagerVars.f ← [if[frac: 0, int: pageHeight]];
    h.imagerVars.tFormHint ← zeroBandD;
    };
   ENDCASE => {
    h.imagerVars.t.b ← scale;
    h.imagerVars.t.d ← -scale;
    h.imagerVars.t.f ← pageHeightReal;
    h.imagerVars.c ← fixedPointReal0;
    h.imagerVars.f ← [if[frac: 0, int: pageHeight]];
    h.imagerVars.tFormHint ← zeroAandE;
    };
  h.imagerVars.clipper ← [p1: [x: 0, y: 0], p2: [x: pageWidth, y: pageHeight]];
  h.mediumVars.mediumXSize ← h.mediumVars.fieldXMax ←
   Real.Float[pageWidth] / scale;
  h.mediumVars.mediumYSize ← h.mediumVars.fieldYMax ←
   Real.Float[pageHeight] / scale;
  END;
 CleanUpContext: PUBLIC PROCEDURE [
  currentPage: PreParserControl.PageHandle,
  mainHandle: PreParserCommon.MainHandle,
  pageResultsPtr: PreParser.PageResultsPtr] RETURNS [] =
  BEGIN
  ENABLE {
   IIPFragMgr.Error => REJECT;
   IIPFragMgrInternal.IntErrors => REJECT;
   UNWIND => NULL;
   };

  imagingPropsPtr: LONG POINTER TO DecomposerCommon.OrientedImagingProps ←
   @mainHandle.jobMediaDataPtr.orientedImagingProps[mainHandle.mediaIndex];
  pageWidth: INTEGER ←
   imagingPropsPtr.props.xPageEnd - imagingPropsPtr.props.xPageStart + 1;
  pageHeight: INTEGER ←
   imagingPropsPtr.props.yPageEnd - imagingPropsPtr.props.yPageStart + 1;
  resolution: INTEGER ← mainHandle.jobMediaDataPtr.deviceProps.resolution;

  LOOPHOLE[@mainHandle.token, LONG POINTER TO endIIPFrag InternalIP.Token]↑ ← [
   endIIPFrag[]];

  DO
```

Copyright © 1992 Xerox Corporation All Rights Reserved

```
IF IPMicrocode.CALL[
 function: IPFunction.PrePutToken, entryContext: mainHandle].result # 0
 THEN {
 IF mainHandle.remainingIIPCount # 0 THEN {
  mainHandle.iipData.currentWordPtr ← mainHandle.nextIIPWordPtr;
  mainHandle.iipData.currentWordCount ← mainHandle.remainingIIPCount;
  mainHandle.remainingIIPCount ← 0;
  LOOP}
 ELSE {
  currentPage.firstIIPBlock ← FALSE;
  currentPage.iipBlockStream.transmit[
   sH: currentPage.iipBlockStream, block: currentPage.currentIIPBlock];

  currentPage.currentIIPBlock ← currentPage.iipBlockStream.acquire[
   sH: currentPage.iipBlockStream,
   length: PreParserSetup.nominalIIPBlockSize];
  PreParserSkeleton.SetUpIIPBlock[
   h: mainHandle, newIIPBlock: currentPage.currentIIPBlock];
  LOOP}}

ELSE EXIT;
ENDLOOP;

currentPage.currentIIPBlock.stopIndexPlusOne ←
 (mainHandle.iipData.currentWordPtr - mainHandle.iipData.blockPtr) *
  Environment.bytesPerWord;
currentPage.iipBlockStream.transmit[
 sH: currentPage.iipBlockStream, block: currentPage.currentIIPBlock];

mainHandle.bitMapTablePtrCurrent.list ← DESCRIPTOR[
 mainHandle.bitMapTablePtrCurrent.list.BASE,
  mainHandle.bitMapTableCurrentLength];
mainHandle.unknownFontTablePtrCurrent.list ← DESCRIPTOR[
 mainHandle.unknownFontTablePtrCurrent.list.BASE,
  mainHandle.unknownFontTableCurrentLength];

pageResultsPtr.errorStatus ← mainHandle.errorStatus;
pageResultsPtr.mediaIndex ← currentPage.mediaIndex;
pageResultsPtr.iipFragID ← IIPFragMgrPrivate.GetFragID[
 bsH: currentPage.iipBlockStream];

SELECT resolution FROM
 600 => NULL;
 300 => {pageWidth ← pageWidth * 2; pageHeight ← pageHeight * 2; };
 ENDCASE => {
  scale: REAL ← 600.0 / Real.Float[resolution];
  pageWidth ← Real.RoundI[Real.Float[pageWidth] * scale];
  pageHeight ← Real.RoundI[Real.Float[pageHeight] * scale];
  };
```

Copyright © 1992 Xerox Corporation All Rights Reserved

```
pageResultsPtr.boxCoords ← [
 xDimension: pageWidth, yDimension: pageHeight, xPosition: 0, yPosition: 0];

PreParserFrameStack.ImagerVarsComplexNode[h: mainHandle, delta: -1];

PreParserFrameStack.CleanUpFrames[h: mainHandle, delta: -1];

mainHandle.zone ← [NIL, NIL, NIL, NIL, NIL, NIL, NIL, NIL, NIL, zoneLock];
mainHandle.pc.pcm.zoneRecPtr ← NIL;
RETURN;

END;
MgrCleanUpContext: PUBLIC PROCEDURE [mainHandle: PreParserControl.MainHandle]
 RETURNS [] =
 BEGIN
 h: PreParserCommon.MainHandle ← mainHandle;
 currentBitMapPtr, nextBitMapPtr: CoalescerTable.BitMapEntryLinkHandle;
 currentFontPtr, nextFontPtr: CoalescerTable.UnknownFontEntryLinkHandle;

 IF h.pageResultsPtr # NIL THEN h.smZone.FREE[@h.pageResultsPtr];

 IF h.bitMapTablePtrCurrent # NIL THEN
  h.bitMapTablePtrCurrent.list ← DESCRIPTOR[
   h.bitMapTablePtrCurrent.list.BASE, h.bitMapTableCurrentLength];
 IF h.unknownFontTablePtrCurrent # NIL THEN
  h.unknownFontTablePtrCurrent.list ← DESCRIPTOR[
   h.unknownFontTablePtrCurrent.list.BASE, h.unknownFontTableCurrentLength];
 currentBitMapPtr ← h.bitMapTablePtrStart;
 UNTIL currentBitMapPtr = NIL DO
  nextBitMapPtr ← currentBitMapPtr.next;
  h.smZone.FREE[@currentBitMapPtr.list.BASE];
  h.smZone.FREE[@currentBitMapPtr];
  currentBitMapPtr ← nextBitMapPtr;
  ENDLOOP;

 currentFontPtr ← h.unknownFontTablePtrStart;
 UNTIL currentFontPtr = NIL DO
  nextFontPtr ← currentFontPtr.next;
  FOR index: CARDINAL ← 0, index + 1 UNTIL index = currentFontPtr.list.LENGTH
   DO
   IF currentFontPtr.list[index].authorityID # NIL THEN
    h.smZone.FREE[@currentFontPtr.list[index].authorityID];
   IF currentFontPtr.list[index].charCodeID # NIL THEN
    h.smZone.FREE[@currentFontPtr.list[index].charCodeID];
   IF currentFontPtr.list[index].typeFaceID # NIL THEN
    h.smZone.FREE[@currentFontPtr.list[index].typeFaceID];
   ENDLOOP;
  h.smZone.FREE[@currentFontPtr.list.BASE];
  h.smZone.FREE[@currentFontPtr];
  currentFontPtr ← nextFontPtr;
```

Copyright © 1992 Xerox Corporation All Rights Reserved

```
  ENDLOOP;

 END;
InitializeModuleA: PUBLIC PROCEDURE = BEGIN zoneLock ← [0]; END;

END.
```

Copyright © 1992 Xerox Corporation All Rights Reserved

```
DIRECTORY
 Inline USING [LongCOPY],
 InternalIP USING [Token, TokenType],
 PreParserControl USING [preParserZone],
 PreParserData,
 PreParserTokenContext USING [TokenSizeArray];

PreParserDataImplB: PROGRAM
 IMPORTS Inline, PreParserControl, PreParserData EXPORTS PreParserData =
 BEGIN

 InitializeMoreData: PUBLIC PROCEDURE =
  BEGIN
  IF PreParserData.operandLookupTablePtr = NIL THEN {
   PreParserData.operandLookupTablePtr ← PreParserControl.preParserZone.NEW[
    PreParserData.OperandLookupTable];
   {
   MakeRelPtr: PROC [lp: LONG POINTER] RETURNS [PreParserData.OperandRelPtr] =
    {
    RETURN[
     LOOPHOLE[CARDINAL[
      LOOPHOLE[lp, LONG CARDINAL] - LOOPHOLE[PreParserData.operandTablePtr,
       LONG CARDINAL]]]]};
   PreParserData.operandLookupTablePtr[Mark] ← MakeRelPtr[
    @PreParserData.operandTablePtr.oneInt];
   PreParserData.operandLookupTablePtr[PreMaskRectangle] ← MakeRelPtr[
    @PreParserData.operandTablePtr.fourReal];
   PreParserData.operandLookupTablePtr[PreShow] ← MakeRelPtr[
    @PreParserData.operandTablePtr.string];
   PreParserData.operandLookupTablePtr[Pop] ← MakeRelPtr[
    @PreParserData.operandTablePtr.any];
   PreParserData.operandLookupTablePtr[Rotate] ← MakeRelPtr[
    @PreParserData.operandTablePtr.oneInt];
   PreParserData.operandLookupTablePtr[Scale] ← MakeRelPtr[
    @PreParserData.operandTablePtr.oneReal];
   PreParserData.operandLookupTablePtr[Scale2] ← MakeRelPtr[
    @PreParserData.operandTablePtr.twoReal];
   PreParserData.operandLookupTablePtr[Translate] ← MakeRelPtr[
    @PreParserData.operandTablePtr.twoReal];
   PreParserData.operandLookupTablePtr[FGet] ← MakeRelPtr[
    @PreParserData.operandTablePtr.oneInt];
   PreParserData.operandLookupTablePtr[FSet] ← MakeRelPtr[
    @PreParserData.operandTablePtr.integerAny];
   PreParserData.operandLookupTablePtr[ISet] ← MakeRelPtr[
    @PreParserData.operandTablePtr.forISet];
   PreParserData.operandLookupTablePtr[PreSetFont] ← MakeRelPtr[
    @PreParserData.operandTablePtr.oneInt];
   PreParserData.operandLookupTablePtr[MakeVec] ← MakeRelPtr[
    @PreParserData.operandTablePtr.oneInt];
```

Copyright © 1992 Xerox Corporation All Rights Reserved

```
PreParserData.operandLookupTablePtr[MakeVecLU] ← MakeRelPtr[
 @PreParserData.operandTablePtr.twoInt];
PreParserData.operandLookupTablePtr[MakeGray] ← MakeRelPtr[
 @PreParserData.operandTablePtr.oneNum];
PreParserData.operandLookupTablePtr[SetGray] ← MakeRelPtr[
 @PreParserData.operandTablePtr.oneNum];
PreParserData.operandLookupTablePtr[PreSetXRel] ← MakeRelPtr[
 @PreParserData.operandTablePtr.oneReal];
PreParserData.operandLookupTablePtr[PreSetXY] ← MakeRelPtr[
 @PreParserData.operandTablePtr.twoReal];
PreParserData.operandLookupTablePtr[PreSetXYRel] ← MakeRelPtr[
 @PreParserData.operandTablePtr.twoReal];
PreParserData.operandLookupTablePtr[PreSetYRel] ← MakeRelPtr[
 @PreParserData.operandTablePtr.oneReal];
PreParserData.operandLookupTablePtr[lineToX] ← MakeRelPtr[
 @PreParserData.operandTablePtr.realTrajectory];
PreParserData.operandLookupTablePtr[lineToY] ← MakeRelPtr[
 @PreParserData.operandTablePtr.realTrajectory];
PreParserData.operandLookupTablePtr[space] ← MakeRelPtr[
 @PreParserData.operandTablePtr.oneReal];
PreParserData.operandLookupTablePtr[get] ← MakeRelPtr[
 @PreParserData.operandTablePtr.integerVectorOfElements];
PreParserData.operandLookupTablePtr[iGet] ← MakeRelPtr[
 @PreParserData.operandTablePtr.oneInt];
PreParserData.operandLookupTablePtr[lineTo] ← MakeRelPtr[
 @PreParserData.operandTablePtr.twoRealTrajectory];
PreParserData.operandLookupTablePtr[maskStroke] ← MakeRelPtr[
 @PreParserData.operandTablePtr.trajectory];
PreParserData.operandLookupTablePtr[moveTo] ← MakeRelPtr[
 @PreParserData.operandTablePtr.twoReal];
PreParserData.operandLookupTablePtr[findOperator] ← MakeRelPtr[
 @PreParserData.operandTablePtr.oneVec];
PreParserData.operandLookupTablePtr[showAndXRel] ← MakeRelPtr[
 @PreParserData.operandTablePtr.string];
PreParserData.operandLookupTablePtr[showAndFixedXRel] ← MakeRelPtr[
 @PreParserData.operandTablePtr.realString];
PreParserData.operandLookupTablePtr[findFont] ← MakeRelPtr[
 @PreParserData.operandTablePtr.oneVec];
PreParserData.operandLookupTablePtr[modifyFont] ← MakeRelPtr[
 @PreParserData.operandTablePtr.modifyFont];
PreParserData.operandLookupTablePtr[findDecompressor] ← MakeRelPtr[
 @PreParserData.operandTablePtr.oneVec];
PreParserData.operandLookupTablePtr[setCorrectMeasure] ← MakeRelPtr[
 @PreParserData.operandTablePtr.twoReal];
PreParserData.operandLookupTablePtr[setCorrectTolerance] ← MakeRelPtr[
 @PreParserData.operandTablePtr.twoReal];
PreParserData.operandLookupTablePtr[correctSpace] ← MakeRelPtr[
 @PreParserData.operandTablePtr.twoReal];
PreParserData.operandLookupTablePtr[makeT] ← MakeRelPtr[
 @PreParserData.operandTablePtr.sixReal];
```

Copyright © 1992 Xerox Corporation All Rights Reserved

```
PreParserData.operandLookupTablePtr[concat] ← MakeRelPtr[
 @PreParserData.operandTablePtr.twoTransforms];
PreParserData.operandLookupTablePtr[concatT] ← MakeRelPtr[
 @PreParserData.operandTablePtr.transform];
PreParserData.operandLookupTablePtr[dup] ← MakeRelPtr[
 @PreParserData.operandTablePtr.any];
PreParserData.operandLookupTablePtr[copy] ← MakeRelPtr[
 @PreParserData.operandTablePtr.oneInt];
PreParserData.operandLookupTablePtr[roll] ← MakeRelPtr[
 @PreParserData.operandTablePtr.twoInt];
PreParserData.operandLookupTablePtr[exch] ← MakeRelPtr[
 @PreParserData.operandTablePtr.twoAny];
PreParserData.operandLookupTablePtr[unmark] ← MakeRelPtr[
 @PreParserData.operandTablePtr.oneInt];
PreParserData.operandLookupTablePtr[unmark0] ← MakeRelPtr[
 @PreParserData.operandTablePtr.mark];
PreParserData.operandLookupTablePtr[abs] ← MakeRelPtr[
 @PreParserData.operandTablePtr.oneNum];
PreParserData.operandLookupTablePtr[add] ← MakeRelPtr[
 @PreParserData.operandTablePtr.twoReal];
PreParserData.operandLookupTablePtr[and] ← MakeRelPtr[
 @PreParserData.operandTablePtr.twoInt];
PreParserData.operandLookupTablePtr[ceiling] ← MakeRelPtr[
 @PreParserData.operandTablePtr.oneNum];
PreParserData.operandLookupTablePtr[div] ← MakeRelPtr[
 @PreParserData.operandTablePtr.twoReal];
PreParserData.operandLookupTablePtr[eq] ← MakeRelPtr[
 @PreParserData.operandTablePtr.twoAny];
PreParserData.operandLookupTablePtr[floor] ← MakeRelPtr[
 @PreParserData.operandTablePtr.oneNum];
PreParserData.operandLookupTablePtr[ge] ← MakeRelPtr[
 @PreParserData.operandTablePtr.twoReal];
PreParserData.operandLookupTablePtr[gt] ← MakeRelPtr[
 @PreParserData.operandTablePtr.twoReal];
PreParserData.operandLookupTablePtr[mod] ← MakeRelPtr[
 @PreParserData.operandTablePtr.twoReal];
PreParserData.operandLookupTablePtr[mul] ← MakeRelPtr[
 @PreParserData.operandTablePtr.twoReal];
PreParserData.operandLookupTablePtr[neg] ← MakeRelPtr[
 @PreParserData.operandTablePtr.oneNum];
PreParserData.operandLookupTablePtr[not] ← MakeRelPtr[
 @PreParserData.operandTablePtr.oneInt];
PreParserData.operandLookupTablePtr[or] ← MakeRelPtr[
 @PreParserData.operandTablePtr.twoInt];
PreParserData.operandLookupTablePtr[sub] ← MakeRelPtr[
 @PreParserData.operandTablePtr.twoReal];
PreParserData.operandLookupTablePtr[trunc] ← MakeRelPtr[
 @PreParserData.operandTablePtr.oneNum];
PreParserData.operandLookupTablePtr[rem] ← MakeRelPtr[
 @PreParserData.operandTablePtr.twoReal];
```

Copyright © 1992 Xerox Corporation All Rights Reserved

```
PreParserData.operandLookupTablePtr[round] ← MakeRelPtr[
 @PreParserData.operandTablePtr.oneNum];
PreParserData.operandLookupTablePtr[type] ← MakeRelPtr[
 @PreParserData.operandTablePtr.any];
PreParserData.operandLookupTablePtr[do] ← MakeRelPtr[
 @PreParserData.operandTablePtr.composedOp];
PreParserData.operandLookupTablePtr[doSave] ← MakeRelPtr[
 @PreParserData.operandTablePtr.composedOp];
PreParserData.operandLookupTablePtr[doSaveAll] ← MakeRelPtr[
 @PreParserData.operandTablePtr.composedOp];
PreParserData.operandLookupTablePtr[if] ← MakeRelPtr[
 @PreParserData.operandTablePtr.oneNum];
PreParserData.operandLookupTablePtr[ifCopy] ← MakeRelPtr[
 @PreParserData.operandTablePtr.composedOp];
PreParserData.operandLookupTablePtr[ifElse] ← MakeRelPtr[
 @PreParserData.operandTablePtr.oneNum];
PreParserData.operandLookupTablePtr[shape] ← MakeRelPtr[
 @PreParserData.operandTablePtr.oneVec];
PreParserData.operandLookupTablePtr[getProp] ← MakeRelPtr[
 @PreParserData.operandTablePtr.twoAny];
PreParserData.operandLookupTablePtr[getP] ← MakeRelPtr[
 @PreParserData.operandTablePtr.twoAny];
PreParserData.operandLookupTablePtr[mergeProp] ← MakeRelPtr[
 @PreParserData.operandTablePtr.twoAny];
PreParserData.operandLookupTablePtr[curveTo] ← MakeRelPtr[
 @PreParserData.operandTablePtr.sixRealTrajectory];
PreParserData.operandLookupTablePtr[arcTo] ← MakeRelPtr[
 @PreParserData.operandTablePtr.fourRealTrajectory];
PreParserData.operandLookupTablePtr[conicTo] ← MakeRelPtr[
 @PreParserData.operandTablePtr.forConicTo];
PreParserData.operandLookupTablePtr[maskFill] ← MakeRelPtr[
 @PreParserData.operandTablePtr.oneOutline];
PreParserData.operandLookupTablePtr[maskTrapezoidX] ← MakeRelPtr[
 @PreParserData.operandTablePtr.sixReal];
PreParserData.operandLookupTablePtr[maskTrapezoidY] ← MakeRelPtr[
 @PreParserData.operandTablePtr.sixReal];
PreParserData.operandLookupTablePtr[maskUnderline] ← MakeRelPtr[
 @PreParserData.operandTablePtr.twoReal];
PreParserData.operandLookupTablePtr[makeOutlineOdd] ← MakeRelPtr[
 @PreParserData.operandTablePtr.oneInt];
PreParserData.operandLookupTablePtr[makeOutline] ← MakeRelPtr[
 @PreParserData.operandTablePtr.oneInt];
PreParserData.operandLookupTablePtr[clipOutline] ← MakeRelPtr[
 @PreParserData.operandTablePtr.outline];
PreParserData.operandLookupTablePtr[clipRectangle] ← MakeRelPtr[
 @PreParserData.operandTablePtr.fourReal];
PreParserData.operandLookupTablePtr[findColorOp] ← MakeRelPtr[
 @PreParserData.operandTablePtr.oneVec];
PreParserData.operandLookupTablePtr[findColorModelOp] ← MakeRelPtr[
 @PreParserData.operandTablePtr.oneVec];
```

Copyright © 1992 Xerox Corporation All Rights Reserved

```
  PreParserData.operandLookupTablePtr[findColor] ← MakeRelPtr[
   @PreParserData.operandTablePtr.oneVec];
  PreParserData.operandLookupTablePtr[setSampledBlack] ← MakeRelPtr[
   @PreParserData.operandTablePtr.forMakeSampBlack];
  PreParserData.operandLookupTablePtr[makeSampledBlack] ← MakeRelPtr[
   @PreParserData.operandTablePtr.forMakeSampBlack];
  PreParserData.operandLookupTablePtr[maskStrokeClosed] ← MakeRelPtr[
   @PreParserData.operandTablePtr.trajectory];
  PreParserData.operandLookupTablePtr[maskVector] ← MakeRelPtr[
   @PreParserData.operandTablePtr.fourReal];
  PreParserData.operandLookupTablePtr[maskDashedStroke] ← MakeRelPtr[
   @PreParserData.operandTablePtr.forMaskDashStroke];
  PreParserData.operandLookupTablePtr[makePixelArray] ← MakeRelPtr[
   @PreParserData.operandTablePtr.forMakePixel];
  PreParserData.operandLookupTablePtr[extractPixel] ← MakeRelPtr[
   @PreParserData.operandTablePtr.oneNum];
  PreParserData.operandLookupTablePtr[maskPixel] ← MakeRelPtr[
   @PreParserData.operandTablePtr.pixelArray];
  PreParserData.operandLookupTablePtr[errorOperator] ← MakeRelPtr[
   @PreParserData.operandTablePtr.integerString]}};
 IF PreParserData.operandConversionTablePtr = NIL THEN {
  PreParserData.operandConversionTablePtr ←
   PreParserControl.preParserZone.NEW[PreParserData.OperandConversionTable];
  PreParserData.operandConversionTablePtr[VAL[0]][VAL[0]] ← invalidOperand;
  Inline.LongCOPY[
   from: @PreParserData.operandConversionTablePtr[VAL[0]][VAL[0]],
   to: @PreParserData.operandConversionTablePtr[VAL[0]][VAL[1]],
   nwords: SIZE[PreParserData.OperandConversionTable] - 1];
  PreParserData.operandConversionTablePtr[string][string] ← done;
  PreParserData.operandConversionTablePtr[string][pixelVector] ←
   unimplementedConversion;
  PreParserData.operandConversionTablePtr[string][vectorOfElements] ←
   unimplementedConversion;
  PreParserData.operandConversionTablePtr[string][mark] ← markNotFound;
  PreParserData.operandConversionTablePtr[string][anyOtherThanMark] ← done;
  PreParserData.operandConversionTablePtr[real][roundedInteger] ←
   realToInteger;
  PreParserData.operandConversionTablePtr[real][real] ← done;
  PreParserData.operandConversionTablePtr[real][fixedPointReal] ←
   realToFixedPointReal;
  PreParserData.operandConversionTablePtr[real][mark] ← markNotFound;
  PreParserData.operandConversionTablePtr[real][anyOtherThanMark] ← done;
  PreParserData.operandConversionTablePtr[real][anyNumber] ← done;
  PreParserData.operandConversionTablePtr[real][specialISet] ← doSpecialISet;
  PreParserData.operandConversionTablePtr[fixedPointReal][roundedInteger] ←
   fixedPointRealToInteger;
  PreParserData.operandConversionTablePtr[fixedPointReal][fixedPointReal] ←
   done;
  PreParserData.operandConversionTablePtr[fixedPointReal][real] ←
   fixedPointRealToReal;
```

Copyright © 1992 Xerox Corporation All Rights Reserved

```
PreParserData.operandConversionTablePtr[fixedPointReal][mark] ←
 markNotFound;
PreParserData.operandConversionTablePtr[fixedPointReal][anyOtherThanMark] ←
 done;
PreParserData.operandConversionTablePtr[fixedPointReal][anyNumber] ← done;
PreParserData.operandConversionTablePtr[fixedPointReal][specialSet] ←
 doSpecialSet;
PreParserData.operandConversionTablePtr[composedOp][composedOp] ← done;
PreParserData.operandConversionTablePtr[composedOp][mark] ← markNotFound;
PreParserData.operandConversionTablePtr[composedOp][anyOtherThanMark] ←
 done;
PreParserData.operandConversionTablePtr[pixelVector][string] ←
 unimplementedConversion;
PreParserData.operandConversionTablePtr[pixelVector][pixelVector] ← done;
PreParserData.operandConversionTablePtr[pixelVector][vectorOfElements] ←
 unimplementedConversion;
PreParserData.operandConversionTablePtr[pixelVector][mark] ← markNotFound;
PreParserData.operandConversionTablePtr[pixelVector][anyOtherThanMark] ←
 done;
PreParserData.operandConversionTablePtr[pixelArray][pixelArray] ← done;
PreParserData.operandConversionTablePtr[pixelArray][mark] ← markNotFound;
PreParserData.operandConversionTablePtr[pixelArray][anyOtherThanMark] ←
 done;
PreParserData.operandConversionTablePtr[font][font] ← done;
PreParserData.operandConversionTablePtr[font][mark] ← markNotFound;
PreParserData.operandConversionTablePtr[font][anyOtherThanMark] ← done;
PreParserData.operandConversionTablePtr[font][specialSet] ← doSpecialSet;
PreParserData.operandConversionTablePtr[transformation][transformation] ←
 done;
PreParserData.operandConversionTablePtr[transformation][mark] ←
 markNotFound;
PreParserData.operandConversionTablePtr[transformation][anyOtherThanMark] ←
 done;
PreParserData.operandConversionTablePtr[transformation][specialSet] ←
 doSpecialSet;
PreParserData.operandConversionTablePtr[vectorOfElements][string] ←
 vectorOfElementsToString;
PreParserData.operandConversionTablePtr[vectorOfElements][pixelVector] ←
 unimplementedConversion;
PreParserData.operandConversionTablePtr[vectorOfElements][vectorOfElements]
 ← done;
PreParserData.operandConversionTablePtr[vectorOfElements][mark] ←
 markNotFound;
PreParserData.operandConversionTablePtr[vectorOfElements][anyOtherThanMark]
 ← done;
PreParserData.operandConversionTablePtr[nullVectorOfElements] ←
 PreParserData.operandConversionTablePtr[vectorOfElements];
PreParserData.operandConversionTablePtr[outline][outline] ← done;
PreParserData.operandConversionTablePtr[outline][mark] ← markNotFound;
PreParserData.operandConversionTablePtr[outline][anyOtherThanMark] ← done;
```

Copyright © 1992 Xerox Corporation All Rights Reserved

```
  PreParserData.operandConversionTablePtr[grayColor][color] ← done;
  PreParserData.operandConversionTablePtr[grayColor][mark] ← markNotFound;
  PreParserData.operandConversionTablePtr[grayColor][anyOtherThanMark] ← done;
  PreParserData.operandConversionTablePtr[grayColor][specialSet] ←
   doSpecialSet;
  PreParserData.operandConversionTablePtr[color] ←
   PreParserData.operandConversionTablePtr[grayColor];
  PreParserData.operandConversionTablePtr[trajectory][trajectory] ← done;
  PreParserData.operandConversionTablePtr[trajectory][mark] ← markNotFound;
  PreParserData.operandConversionTablePtr[trajectory][anyOtherThanMark] ←
   done;
  PreParserData.operandConversionTablePtr[largeVector][vectorOfElements] ←
   done;
  PreParserData.operandConversionTablePtr[largeVector][pixelVector] ←
   largeVectorToPixelVector;
  PreParserData.operandConversionTablePtr[largeVector][string] ←
   largeVectorToString;
  PreParserData.operandConversionTablePtr[largeVector][mark] ← markNotFound;
  PreParserData.operandConversionTablePtr[largeVector][anyOtherThanMark] ←
   done;
  PreParserData.operandConversionTablePtr[identifier][identifier] ← done;
  PreParserData.operandConversionTablePtr[identifier][mark] ← markNotFound;
  PreParserData.operandConversionTablePtr[identifier][anyOtherThanMark] ←
   done;
  PreParserData.operandConversionTablePtr[mark] ← ALL[unexpectedMark];
  PreParserData.operandConversionTablePtr[mark][mark] ← done;
  PreParserData.operandConversionTablePtr[dupPopOrDie] ← ALL[
   unimplementedRESInfo];
  PreParserData.operandConversionTablePtr[dupPopOrDie][anyOtherThanMark] ←
   done;
  PreParserData.operandConversionTablePtr[dupPopOrDie][mark] ← markNotFound;
  PreParserData.operandConversionTablePtr[clipper][clipper] ← done;
  PreParserData.operandConversionTablePtr[clipper][mark] ← markNotFound;
  PreParserData.operandConversionTablePtr[clipper][anyOtherThanMark] ← done;
  PreParserData.operandConversionTablePtr[clipper][specialSet] ←
   doSpecialSet;
  };
 IF PreParserData.tokenSizes = NIL THEN {
  PreParserData.tokenSizes ← PreParserControl.preParserZone.NEW[
   PreParserTokenContext.TokenSizeArray];
  PreParserData.tokenSizes[invalidTokenType] ← SIZE[
   invalidTokenType InternalIP.Token];
  PreParserData.tokenSizes[coalesceResults] ←
   SIZE[InternalIP.TokenType] + SIZE[LONG CARDINAL];
  PreParserData.tokenSizes[beginJob] ← SIZE[beginJob InternalIP.Token];
  PreParserData.tokenSizes[beginIIPFrag] ← SIZE[
   beginIIPFrag InternalIP.Token];
  PreParserData.tokenSizes[beginPage] ← SIZE[beginPage InternalIP.Token];
  PreParserData.tokenSizes[beginCorrect] ← SIZE[
   beginCorrect InternalIP.Token];
```

Copyright © 1992 Xerox Corporation All Rights Reserved

```
PreParserData.tokenSizes[beginIfCopy] ← SIZE[beginIfCopy InternalIP.Token];
PreParserData.tokenSizes[correctSpace] ← SIZE[
 correctSpace InternalIP.Token];
PreParserData.tokenSizes[correctMask] ← SIZE[correctMask InternalIP.Token];
PreParserData.tokenSizes[endCorrect] ← SIZE[endCorrect InternalIP.Token];
PreParserData.tokenSizes[endIfCopy] ← SIZE[endIfCopy InternalIP.Token];
PreParserData.tokenSizes[endIIPFrag] ← SIZE[endIIPFrag InternalIP.Token];
PreParserData.tokenSizes[endJob] ← SIZE[endJob InternalIP.Token];
PreParserData.tokenSizes[endPage] ← SIZE[endPage InternalIP.Token];
PreParserData.tokenSizes[filler] ← LAST[CARDINAL];
PreParserData.tokenSizes[maskRectSampledColor] ← SIZE[
 maskRectSampledColor InternalIP.Token];
PreParserData.tokenSizes[maskDashedStroke] ← SIZE[
 maskDashedStroke InternalIP.Token];
PreParserData.tokenSizes[maskDashedStrokeTrajectory] ← SIZE[
 maskDashedStrokeTrajectory InternalIP.Token];
PreParserData.tokenSizes[maskFill] ← SIZE[maskFill InternalIP.Token];
PreParserData.tokenSizes[maskImage] ← SIZE[maskImage InternalIP.Token];
PreParserData.tokenSizes[maskImageIIP] ← SIZE[
 maskImageIIP InternalIP.Token];
PreParserData.tokenSizes[maskRectangleInt] ← SIZE[
 maskRectangleInt InternalIP.Token];
PreParserData.tokenSizes[maskRectangle] ← SIZE[
 maskRectangle InternalIP.Token];
PreParserData.tokenSizes[maskStroke] ← SIZE[maskStroke InternalIP.Token];
PreParserData.tokenSizes[maskBoxInt] ← SIZE[maskBoxInt InternalIP.Token];
PreParserData.tokenSizes[maskBox] ← SIZE[maskBox InternalIP.Token];
PreParserData.tokenSizes[maskVectorXInt] ← SIZE[
 maskVectorXInt InternalIP.Token];
PreParserData.tokenSizes[maskVectorYInt] ← SIZE[
 maskVectorYInt InternalIP.Token];
PreParserData.tokenSizes[maskVectorX] ← SIZE[maskVectorX InternalIP.Token];
PreParserData.tokenSizes[maskVectorY] ← SIZE[maskVectorY InternalIP.Token];
PreParserData.tokenSizes[maskVector] ← SIZE[maskVector InternalIP.Token];
PreParserData.tokenSizes[maskTrapezoidX] ← SIZE[
 maskTrapezoidX InternalIP.Token];
PreParserData.tokenSizes[maskTrapezoidY] ← SIZE[
 maskTrapezoidY InternalIP.Token];
PreParserData.tokenSizes[maskUnderline90] ← SIZE[
 maskUnderline90 InternalIP.Token];
PreParserData.tokenSizes[maskUnderline] ← SIZE[
 maskUnderline InternalIP.Token];
PreParserData.tokenSizes[nop] ← SIZE[nop InternalIP.Token];
PreParserData.tokenSizes[restore] ← SIZE[restore InternalIP.Token];
PreParserData.tokenSizes[save] ← SIZE[save InternalIP.Token];
PreParserData.tokenSizes[saveAll] ← SIZE[saveAll InternalIP.Token];
PreParserData.tokenSizes[setColor] ← SIZE[setColor InternalIP.Token];
PreParserData.tokenSizes[setGray] ← SIZE[setGray InternalIP.Token];
PreParserData.tokenSizes[setClipRectangle] ← SIZE[
 setClipRectangle InternalIP.Token];
```

Copyright © 1992 Xerox Corporation All Rights Reserved

```
PreParserData.tokenSizes[setClipRectangleInt] ← SIZE[
 setClipRectangleInt InternalIP.Token];
PreParserData.tokenSizes[setClipOutline] ← SIZE[
 setClipOutline InternalIP.Token];
PreParserData.tokenSizes[setAmplifySpace] ← SIZE[
 setAmplifySpace InternalIP.Token];
PreParserData.tokenSizes[setCorrectMeasure90] ← SIZE[
 setCorrectMeasure90 InternalIP.Token];
PreParserData.tokenSizes[setCorrectMeasure] ← SIZE[
 setCorrectMeasure InternalIP.Token];
PreParserData.tokenSizes[setCorrectShrink] ← SIZE[
 setCorrectShrink InternalIP.Token];
PreParserData.tokenSizes[setCorrectTolerance90] ← SIZE[
 setCorrectTolerance90 InternalIP.Token];
PreParserData.tokenSizes[setCorrectTolerance] ← SIZE[
 setCorrectTolerance InternalIP.Token];
PreParserData.tokenSizes[setFont] ← SIZE[setFont InternalIP.Token];
PreParserData.tokenSizes[setNoImage] ← SIZE[setNoImage InternalIP.Token];
PreParserData.tokenSizes[setPriorityImportant] ← SIZE[
 setPriorityImportant InternalIP.Token];
PreParserData.tokenSizes[setPriorityImportantOverride] ← SIZE[
 setPriorityImportantOverride InternalIP.Token];
PreParserData.tokenSizes[setStrokeEnd] ← SIZE[
 setStrokeEnd InternalIP.Token];
PreParserData.tokenSizes[setStrokeJoint] ← SIZE[
 setStrokeJoint InternalIP.Token];
PreParserData.tokenSizes[setStrokeWidth] ← SIZE[
 setStrokeWidth InternalIP.Token];
PreParserData.tokenSizes[setStrokeWidthEllipse] ← SIZE[
 setStrokeWidthEllipse InternalIP.Token];
PreParserData.tokenSizes[setXYRel] ← SIZE[setXYRel InternalIP.Token];
PreParserData.tokenSizes[setXY] ← SIZE[setXY InternalIP.Token];
PreParserData.tokenSizes[setXYInt] ← SIZE[setXYInt InternalIP.Token];
PreParserData.tokenSizes[show] ← SIZE[show InternalIP.Token];
PreParserData.tokenSizes[tRotate90] ← SIZE[tRotate90 InternalIP.Token];
PreParserData.tokenSizes[tScaleInt] ← SIZE[tScaleInt InternalIP.Token];
PreParserData.tokenSizes[tScale] ← SIZE[tScale InternalIP.Token];
PreParserData.tokenSizes[tTranslate] ← SIZE[tTranslate InternalIP.Token];
PreParserData.tokenSizes[startUnderline] ←
 «SIZE[underlineStart InternalIP.Token]» 1;
PreParserData.tokenSizes[setInk] ← SIZE[setInk InternalIP.Token];
};

END;
InitializeModuleB: PUBLIC PROCEDURE [] = BEGIN END;

END.
```

Copyright © 1992 Xerox Corporation All Rights Reserved

```
DIRECTORY
 ByteBlt USING [ByteBlt],
 DecomposerCommon USING [ObjectIndexNull],
 Environment USING [Byte, bytesPerWord],
 FaultLogger USING [ID, Log],
 FixedPointReal USING [FromReal, Round],
 Ieee USING [SingleReal],
 Inline USING [BytePair, HighByte, LongCOPY, LowByte],
 InternalIP USING [StrokeEnd, StrokeJoint, Token],
 IPFunction USING [
  AllocateNodeNFL, FPRToReal, FreeNodeNFL, PreCheckPosition, PrePopOperands,
  PrePutToken, PreTransformIPPoint, PreTransformIPVector],
 IPMicrocode USING [CALL],
 ParserCommon USING [StackActionType, WordsFromBytes],
 PreParserCallBack USING [ReportESSFault],
 PreParserCommon USING [
  FrameEntryRange, MainContext, MainHandle, StackEntry, String, StringPtr,
  UnknownXY],
 PreParserData USING [OperandEntryPtr, OperandType, OperandTypePtr],
 PreParserExtra USING [],
 PreParserFont USING [CheckFontMesa],
 PreParserFrameStack USING [ComplexNodeRefCount, PopStack, PushStack],
 PreParserInterpress USING [
  ErrorOpCode, ImagerVariable, LongOperator, LongValidOperator],
 PreParserMain USING [],
 PreParserMainErrors,
 PreParserMainOps USING [],
 Real USING [Float, FixC, RoundI, RoundLI];

PreParserExtraImpl: MONITOR
 IMPORTS
  ByteBlt, FaultLogger, FixedPointReal, Inline, IPMicrocode, ParserCommon,
  PreParserCallBack, PreParserFont, PreParserFrameStack, Real
 EXPORTS PreParserExtra, PreParserMainOps =
 BEGIN

 ArithmeticError: PUBLIC SIGNAL [] = CODE;

 ClipRectangle: PUBLIC PROCEDURE [h: PreParserCommon.MainHandle]
  RETURNS [loop: BOOLEAN ← FALSE] =
  BEGIN
  h.stackEntryPtr ← @h.sv.operand01;
  [] ← IPMicrocode.CALL[
   function: IPFunction.PreTransformIPPoint, entryContext: h];
  h.P2 ← h.P1;
  h.stackEntryPtr ← @h.sv.operand03;
  [] ← IPMicrocode.CALL[
   function: IPFunction.PreTransformIPVector, entryContext: h];
```

Copyright © 1992 Xerox Corporation All Rights Reserved

```
h.P1.x.li ← h.P1.x.li + h.P2.x.li;
h.P1.x.int ← FixedPointReal.Round[n: h.P1.x];
h.P1.y.li ← h.P1.y.li + h.P2.y.li;
h.P1.y.int ← FixedPointReal.Round[n: h.P1.y];
h.P2.x.int ← FixedPointReal.Round[n: h.P2.x];
h.P2.y.int ← FixedPointReal.Round[n: h.P2.y];

IF h.P1.x.int > h.P2.x.int THEN {
 temp: INTEGER ← h.P1.x.int; h.P1.x.int ← h.P2.x.int; h.P2.x.int ← temp; };

IF h.P1.y.int > h.P2.y.int THEN {
 temp: INTEGER ← h.P1.y.int; h.P1.y.int ← h.P2.y.int; h.P2.y.int ← temp; };

h.P1.x.int ← MAX[h.P1.x.int, h.imagerVars.clipper.p1.x];
h.P2.x.int ← MIN[h.P2.x.int, h.imagerVars.clipper.p2.x];
h.P1.y.int ← MAX[h.P1.y.int, h.imagerVars.clipper.p1.y];
h.P2.y.int ← MIN[h.P2.y.int, h.imagerVars.clipper.p2.y];

IF (h.P1.x.int >= h.P2.x.int) OR (h.P1.y.int >= h.P2.y.int) THEN
 h.imagerVars.clipper ← [p1: [x: 0, y: 0], p2: [x: 0, y: 0]]
ELSE
 h.imagerVars.clipper ← [
  p1: [x: h.P1.x.int, y: h.P1.y.int], p2: [x: h.P2.x.int, y: h.P2.y.int]];

h.iipData.clipperChanged ← TRUE;
h.iipData.fontChanged ← TRUE;
h.iipData.graphicChanged ← TRUE;
END;
ContinueNextAction: PUBLIC PROCEDURE [h: PreParserCommon.MainHandle] =
BEGIN
{
WITH token: h.pc.tokenOverlay.token SELECT FROM
 shortNumber0, shortNumber8K, shortNumber16K, shortNumber24K => {
  h.pc.tokenOverlay.bytes[1] ← h.pc.ipBufferPtr[h.pc.ipByteIndex];
  h.pc.pcm.action ← h.pc.actionArrayPtr[shortNumber];
  };

 shortOperator => NULL;
 longOperator => {
  h.pc.tokenOverlay.bytes[1] ← h.pc.ipBufferPtr[h.pc.ipByteIndex];
  IF token.longOperator IN PreParserInterpress.LongValidOperator THEN {
   h.pc.pcm.action ← h.pc.actionArrayPtr[VAL[ORD[token.longOperator]]];
   IF h.pc.pcm.action IN ParserCommon.StackActionType THEN {
    h.pc.pcm.data.execAction ← h.pc.pcm.action;
    [] ← IPMicrocode.CALL[
     function: IPFunction.PrePopOperands, entryContext: h];
    };
   }
  ELSE
   IF ORD[token.longOperator] = PreParserInterpress.ErrorOpCode THEN {
```

Copyright © 1992 Xerox Corporation All Rights Reserved

```
    h.pc.pcm.action ← h.pc.actionArrayPtr[errorOperator];
    [] ← IPMicrocode.CALL[
     function: IPFunction.PrePopOperands, entryContext: h];
    }
   ELSE {
    h.pc.pcm.action ← fatalError;
    h.pc.pcm.data.code ← PreParserMainErrors.unrecognizedOperator;
    };
  };

 shortSequence => {
  h.pc.sequenceLength.lc ← h.pc.ipBufferPtr[h.pc.ipByteIndex];
  h.pc.pcm.action ← h.pc.actionArrayPtr[sequence];
  };

 longSequence => {
  IF h.pc.currentTokenBytes <= 1 THEN {
   h.pc.sequenceLength.highbits ← h.pc.ipBufferPtr[h.pc.ipByteIndex];
   h.pc.ipByteIndex ← h.pc.ipByteIndex + 1;
   IF h.pc.ipByteIndex = h.pc.ipStopIndexPlusOne THEN GOTO gotTwoBytes;
   };
  IF h.pc.currentTokenBytes <= 2 THEN {
   h.pc.sequenceLength.bytes[0] ← h.pc.ipBufferPtr[h.pc.ipByteIndex];
   h.pc.ipByteIndex ← h.pc.ipByteIndex + 1;
   IF h.pc.ipByteIndex = h.pc.ipStopIndexPlusOne THEN GOTO gotThreeBytes;
   };
  h.pc.sequenceLength.bytes[1] ← h.pc.ipBufferPtr[h.pc.ipByteIndex];
  h.pc.pcm.action ← h.pc.actionArrayPtr[sequence];
  };

 ENDCASE;

h.pc.ipByteIndex ← h.pc.ipByteIndex + 1;
h.pc.currentTokenBytes ← 0;
RETURN;

EXITS
 gotTwoBytes => h.pc.currentTokenBytes ← 2;
 gotThreeBytes => h.pc.currentTokenBytes ← 3;
};

h.pc.pcm.action ← needIPBlock;
h.pc.pcm.savedAction ← continueNextAction;
END;
FGetMesa: PUBLIC PROCEDURE [h: PreParserCommon.MainHandle]
 RETURNS [loop: BOOLEAN] =
 BEGIN
 IF h.sv.operand01.integer NOT IN PreParserCommon.FrameEntryRange THEN {
  h.pc.pcm.action ← fatalError;
  h.pc.pcm.data.code ← PreParserMainErrors.badFrameIndex;
```

Copyright © 1992 Xerox Corporation All Rights Reserved

```
  RETURN[loop: TRUE];
  };
 h.stackEntry ← h.framePtr.entries[h.sv.operand01.integer];
 h.stackEntryPtr ← @h.stackEntry;
 IF h.stackEntryPtr.type = null THEN {
  h.stackEntryPtr.type ← fixedPointReal; h.stackEntryPtr.fixed.li ← 0; };
 PreParserFrameStack.ComplexNodeRefCount[
  h: h, entryPtr: h.stackEntryPtr, delta: 1];
 IF PreParserFrameStack.PushStack[h: h].extendZone THEN {
  h.pc.pcm.savedAction ← PrePushStack; RETURN[loop: TRUE]; };
 RETURN[loop: FALSE];
 END;
FSetMesa: PUBLIC PROCEDURE [h: PreParserCommon.MainHandle]
 RETURNS [loop: BOOLEAN] =
 BEGIN
 IF h.sv.operand02.integer NOT IN PreParserCommon.FrameEntryRange THEN {
  h.pc.pcm.action ← fatalError;
  h.pc.pcm.data.code ← PreParserMainErrors.badFrameIndexFSet;
  RETURN[loop: TRUE];
  };
 PreParserFrameStack.ComplexNodeRefCount[
  h: h, entryPtr: @h.framePtr.entries[h.sv.operand02.integer], delta: -1];
 h.framePtr.entries[h.sv.operand02.integer] ← h.sv.operand01;
 RETURN[loop: FALSE];
 END;
ISetMesa: PUBLIC PROCEDURE [h: PreParserCommon.MainHandle]
 RETURNS [loop: BOOLEAN ← TRUE] =
 BEGIN
 SELECT PreParserInterpress.ImagerVariable[VAL[h.sv.operand02.integer]] FROM
  DCScpx => {
   h.imagerVars.dcsX ← h.sv.operand01.fixed;
   h.iipData.positionChanged ← TRUE;
   };

  DCScpy => {
   h.imagerVars.dcsY ← h.sv.operand01.fixed;
   h.iipData.positionChanged ← TRUE;
   };

  correctMX => {
   h.imagerVars.correctMX ← h.sv.operand01.fixed;
   h.iipData.textImagerVarChanged ← TRUE;
   };

  correctMY => {
   h.imagerVars.correctMY ← h.sv.operand01.fixed;
   h.iipData.textImagerVarChanged ← TRUE;
   };

  T => {h.imagerVars.t ← h.sv.operand01.transformationPtr ↑ ; NoteNewT[h: h]; };
```

Copyright © 1992 Xerox Corporation All Rights Reserved

```
priorityImportant => {
 h.imagerVars.priorityImportant ← h.sv.operand01.integer;
 h.iipData.graphicChanged ← TRUE;
 h.iipData.fontChanged ← TRUE;
 };

mediumXSize, mediumYSize, fieldXMin, fieldYMin, fieldXMax, fieldYMax => {
 h.pc.pcm.action ← fatalError;
 h.pc.pcm.data.code ← PreParserMainErrors.badISetUsage;
 RETURN;
 };

font => {
 PreParserFrameStack.ComplexNodeRefCount[
  h: h, entryPtr: @h.imagerVars.font, delta: -1];
 h.imagerVars.font ← h.sv.operand01;
 h.iipData.fontChanged ← TRUE;
 h.imagerVars.fontIndex ← DecomposerCommon.ObjectIndexNull};

color => {
 IF h.imagerVars.color # h.sv.operand01 THEN {
  IF h.imagerVars.color.type = color THEN
   PreParserFrameStack.ComplexNodeRefCount[
    h: h, entryPtr: @h.imagerVars.color, delta: -1];
  h.imagerVars.color ← h.sv.operand01;
  h.iipData.graphicChanged ← TRUE;
  h.iipData.fontChanged ← TRUE;
  }
 ELSE
  IF h.sv.operand01.type = color THEN
   PreParserFrameStack.ComplexNodeRefCount[
    h: h, entryPtr: @h.sv.operand01, delta: -1];
 };

noImage => {
 noImage: BOOLEAN;
 h.imagerVars.noImage ← CARDINAL[h.sv.operand01.integer];
 IF (noImage ← (h.imagerVars.noImage # 0)) #
  (h.iipData.imagerVars.noImage # 0) THEN {
  LOOPHOLE[@h.token, LONG POINTER TO setNoImage InternalIP.Token] ↑ ← [
   setNoImage[rec: LOOPHOLE[noImage]]];
  IF IPMicrocode.CALL[
   function: IPFunction.PrePutToken, entryContext: h].result # 0 THEN
   GOTO retry;
  h.iipData.imagerVars.noImage ← h.imagerVars.noImage;
  };
 };

strokeWidth =>
```

Copyright © 1992 Xerox Corporation All Rights Reserved

```
  IF h.imagerVars.strokeWidth # h.sv.operand01.real THEN {
   h.imagerVars.strokeWidth ← h.sv.operand01.real;
   h.iipData.strokeChanged ← TRUE;
   h.iipData.strokeWidthChanged ← TRUE;
   };

 strokeEnd =>
  IF ORD[h.imagerVars.strokeEnd] # h.sv.operand01.integer THEN {
   IF h.sv.operand01.integer > ORD[LAST[InternalIP.StrokeEnd]] THEN {
    h.pc.pcm.action ← fatalError;
    h.pc.pcm.data.code ← PreParserMainErrors.badOperandValue;
    RETURN;
    };
   h.iipData.strokeChanged ← TRUE;
   h.imagerVars.strokeEnd ← VAL[h.sv.operand01.integer];
   };

 underlineStart => {
  [] ← IPMicrocode.CALL[
   function: IPFunction.PreCheckPosition, entryContext: h];
  LOOPHOLE[@h.token, LONG POINTER TO startUnderline InternalIP.Token] ↑ ← [
   startUnderline[]];
  IF IPMicrocode.CALL[
   function: IPFunction.PrePutToken, entryContext: h].result # 0 THEN
   GOTO retry;
  h.imagerVars.underlineStart ← h.sv.operand01.fixed;
  };

 amplifySpace =>
  IF h.imagerVars.amplifySpace # h.sv.operand01.fixed THEN {
   h.imagerVars.amplifySpace ← h.sv.operand01.fixed;
   h.iipData.textImagerVarChanged ← TRUE;
   };

 correctPass =>
  IF h.imagerVars.correctPass # h.sv.operand01.integer THEN {
   h.imagerVars.correctPass ← h.sv.operand01.integer;
   h.iipData.textImagerVarChanged ← TRUE;
   };

 correctShrink =>
  IF (h.sv.operand01.fixed.int < 0) OR (h.sv.operand01.fixed.int > 1) THEN {
   h.pc.pcm.action ← fatalError;
   h.pc.pcm.data.code ← PreParserMainErrors.badISetUsage;
   RETURN[loop ← TRUE];
   }
  ELSE {
   h.imagerVars.correctShrink.fixed ← h.sv.operand01.fixed;
   h.iipData.textImagerVarChanged ← TRUE};
```

Copyright © 1992 Xerox Corporation All Rights Reserved

```
  correctTX => {
   h.imagerVars.correctTX ← h.sv.operand01.fixed;
   h.iipData.textImagerVarChanged ← TRUE;
   };

  correctTY => {
   h.imagerVars.correctTY ← h.sv.operand01.fixed;
   h.iipData.textImagerVarChanged ← TRUE;
   };

  strokeJoint =>
   IF ORD[h.imagerVars.strokeJoint] # h.sv.operand01.integer THEN {
    IF h.sv.operand01.integer > ORD[LAST[InternalIP.StrokeJoint]] THEN {
     h.pc.pcm.action ← fatalError;
     h.pc.pcm.data.code ← PreParserMainErrors.badOperandValue;
     RETURN};
    h.imagerVars.strokeJoint ← VAL[h.sv.operand01.integer];
    h.iipData.strokeChanged ← TRUE;
    };

  clipper => {
   h.imagerVars.clipper ← h.sv.operand01.clipperPtr ↑ .clip;
   PreParserFrameStack.ComplexNodeRefCount[
    h: h, entryPtr: @h.sv.operand01, delta: -1];
   };

  ENDCASE;
 loop ← FALSE;
 EXITS retry => h.pc.pcm.savedAction ← ISet;
 END;
NextActionMesa: PUBLIC PROCEDURE [h: PreParserCommon.MainHandle] =
 BEGIN
 {
 IF h.pc.ipByteIndex = h.pc.ipStopIndexPlusOne THEN {
  h.pc.pcm.action ← needIPBlock; h.pc.pcm.savedAction ← PreLoop; RETURN; };

 IF h.stopRequested THEN {h.pc.pcm.action ← stop; RETURN; };

 h.pc.tokenOverlay.bytes[0] ← h.pc.ipBufferPtr[h.pc.ipByteIndex];
 h.pc.ipByteIndex ← h.pc.ipByteIndex + 1;

 WITH token: h.pc.tokenOverlay.token SELECT FROM
  shortNumber0, shortNumber8K, shortNumber16K, shortNumber24K => {
   IF h.pc.ipByteIndex = h.pc.ipStopIndexPlusOne THEN GOTO continueNextBlock;
   h.pc.tokenOverlay.bytes[1] ← h.pc.ipBufferPtr[h.pc.ipByteIndex];
   h.pc.ipByteIndex ← h.pc.ipByteIndex + 1;
   h.pc.pcm.action ← h.pc.actionArrayPtr[shortNumber];
   };

  shortOperator => {
```

Copyright © 1992 Xerox Corporation All Rights Reserved

```
h.pc.pcm.action ← h.pc.actionArrayPtr[VAL[ORD[token.shortOperator]]];
IF h.pc.pcm.action IN ParserCommon.StackActionType THEN {
 h.pc.pcm.data.execAction ← h.pc.pcm.action;
 [] ← PopOperandsMesa[h: h];
 };
};

longOperator = > {
IF h.pc.ipByteIndex = h.pc.ipStopIndexPlusOne THEN GOTO continueNextBlock;
h.pc.tokenOverlay.bytes[1] ← h.pc.ipBufferPtr[h.pc.ipByteIndex];
h.pc.ipByteIndex ← h.pc.ipByteIndex + 1;
IF token.longOperator IN PreParserInterpress.LongValidOperator THEN {
 h.pc.pcm.action ← h.pc.actionArrayPtr[VAL[ORD[token.longOperator]]];
 IF h.pc.pcm.action IN ParserCommon.StackActionType THEN {
  h.pc.pcm.data.execAction ← h.pc.pcm.action;
  [] ← PopOperandsMesa[h: h];
  };
 }
ELSE
 IF ORD[token.longOperator] = PreParserInterpress.ErrorOpCode THEN {
  h.pc.pcm.data.execAction ← h.pc.actionArrayPtr[errorOperator];
  [] ← PopOperandsMesa[h: h];
  }
 ELSE {
  h.pc.pcm.action ← fatalError;
  h.pc.pcm.data.code ← PreParserMainErrors.unrecognizedOperator;
  };
};

shortSequence = > {
IF h.pc.ipByteIndex = h.pc.ipStopIndexPlusOne THEN GOTO continueNextBlock;
h.pc.sequenceLength.lc ← h.pc.ipBufferPtr[h.pc.ipByteIndex];
h.pc.ipByteIndex ← h.pc.ipByteIndex + 1;
h.pc.pcm.action ← h.pc.actionArrayPtr[sequence];
};

longSequence = > {
IF h.pc.ipByteIndex = h.pc.ipStopIndexPlusOne THEN GOTO gotOneByte;
h.pc.sequenceLength.highbits ← h.pc.ipBufferPtr[h.pc.ipByteIndex];
h.pc.ipByteIndex ← h.pc.ipByteIndex + 1;
IF h.pc.ipByteIndex = h.pc.ipStopIndexPlusOne THEN GOTO gotTwoBytes;
h.pc.sequenceLength.bytes[0] ← h.pc.ipBufferPtr[h.pc.ipByteIndex];
h.pc.ipByteIndex ← h.pc.ipByteIndex + 1;
IF h.pc.ipByteIndex = h.pc.ipStopIndexPlusOne THEN GOTO gotThreeBytes;
h.pc.sequenceLength.bytes[1] ← h.pc.ipBufferPtr[h.pc.ipByteIndex];
h.pc.ipByteIndex ← h.pc.ipByteIndex + 1;
h.pc.pcm.action ← h.pc.actionArrayPtr[sequence];
};

ENDCASE;
```

Copyright © 1992 Xerox Corporation All Rights Reserved

```
 RETURN;
 EXITS
  continueNextBlock => NULL;
  gotOneByte => h.pc.currentTokenBytes ← 1;
  gotTwoBytes => h.pc.currentTokenBytes ← 2;
  gotThreeBytes => h.pc.currentTokenBytes ← 3;
 };
 h.pc.pcm.action ← needIPBlock;
 h.pc.pcm.savedAction ← continueNextAction;
 END;

NoteNewT: PUBLIC PROCEDURE [h: PreParserCommon.MainHandle] RETURNS [] =
 BEGIN
 CheckReal: PROCEDURE [realPtr: LONG POINTER TO REAL] = «INLINE»
  BEGIN
  myRealPtr: LONG POINTER TO Ieee.SingleReal = LOOPHOLE[realPtr];
  SELECT myRealPtr ↑ .m1 FROM
   0 =>
    IF Inline.HighByte[myRealPtr ↑ .m2] = 0 THEN
     LOOPHOLE[myRealPtr ↑ .m2, Inline.BytePair].low ← 0;
   127 =>
    IF Inline.HighByte[myRealPtr ↑ .m2] = LAST[Environment.Byte] THEN {
     myRealPtr ↑ .exp ← myRealPtr ↑ .exp + 1;
     myRealPtr ↑ .m1 ← 0;
     myRealPtr ↑ .m2 ← 0;
     };
   ENDCASE;
  RETURN;
  END;
 IF h.imagerVars.t.a = 0.0 THEN {
  h.imagerVars.tFormHint ← zeroAandE;
  CheckReal[realPtr: @h.imagerVars.t.b];
  CheckReal[realPtr: @h.imagerVars.t.d];
  }
 ELSE {
  h.imagerVars.tFormHint ← zeroBandD;
  CheckReal[realPtr: @h.imagerVars.t.a];
  CheckReal[realPtr: @h.imagerVars.t.e];
  };
 h.imagerVars.c ← [li[li: FixedPointReal.FromReal[h.imagerVars.t.c].li]];
 h.imagerVars.f ← [li[li: FixedPointReal.FromReal[h.imagerVars.t.f].li]];
 h.iipData.strokeWidthChanged ← TRUE;
 h.iipData.strokeChanged ← TRUE;
 h.iipData.fontChanged ← TRUE;
 h.imagerVars.fontIndex ← DecomposerCommon.ObjectIndexNull;
 h.correctMeasureX.type ← null;
 PreParserFrameStack.ComplexNodeRefCount[
  h: h, entryPtr: @h.sv.operand01, delta: -1];
 END;
PopOperandsMesa: PUBLIC PROCEDURE [h: PreParserCommon.MainHandle]
```

Copyright © 1992 Xerox Corporation All Rights Reserved

```
RETURNS [alwaysLoop: BOOLEAN ← TRUE] =
BEGIN
opEntryPtr: PreParserData.OperandEntryPtr ← @h.operandTablePtr[
 h.operandLookupTablePtr[h.pc.pcm.data.execAction]];
count: CARDINAL ← opEntryPtr.count;
operandTypePtr: PreParserData.OperandTypePtr ← @opEntryPtr[0];
h.stackEntryPtr ←
 @h.sv.operand01 + ((count - 1) * SIZE[PreParserCommon.StackEntry]);

DO
 IF h.pc.operationStage > 1 THEN {
  h.pc.operationStage ← h.pc.operationStage - 1; count ← count - 1; }
 ELSE {
  IF h.pc.operationStage = 1 THEN h.pc.operationStage ← 0
  ELSE IF PreParserFrameStack.PopStack[h: h].fatalError THEN RETURN[];
  count ← count - 1;
  DO
   SELECT h.operandConversionTablePtr ↑ [h.stackEntryPtr.type][
   operandTypePtr ↑ ] FROM
    done => EXIT;
    invalidOperand => {
     h.errorCode ← PreParserMainErrors.invalidOperandTypeOnStack;
     GOTO fatalError;
     };

    unimplementedConversion => {
     h.pc.pcm.fixed.frac ← operandTypePtr ↑ .ORD;
     h.errorCode ← PreParserMainErrors.unimplementedTypeConversion;
     GOTO fatalError;
     };

    markNotFound => {
     h.errorCode ← PreParserMainErrors.markNotFoundOnStack;
     GOTO fatalError;
     };

    unexpectedMark => {
     h.errorCode ←
      IF
      ((h.topStackRecordEntryCount = 0)
       AND (h.topStackRecordPtr.next = NIL)) THEN
      PreParserMainErrors.stackUnderflow
      ELSE PreParserMainErrors.unexpectedMark;
     GOTO fatalError;
     };

    realToInteger => {
     h.stackEntryPtr ↑ ← [
      type: roundedInteger,
      frameData: roundedInteger[
```

Copyright © 1992 Xerox Corporation All Rights Reserved

```
      integer: Real.RoundI[
      h.stackEntryPtr.real !
      ANY => {
       h.errorCode ← PreParserMainErrors.numericError;
       GOTO fatalError;
       }; ], fill1: 0]];
     EXIT;
     };
    realToFixedPointReal => {
     h.stackEntryPtr ↑ ← [
      type: fixedPointReal,
      frameData: fixedPointReal[
      fixed: [
      li[
      li: FixedPointReal.FromReal[
      h.stackEntryPtr.real !
      ANY => {
       h.errorCode ← PreParserMainErrors.numericError;
       GOTO fatalError}].li]]]];
     EXIT;
     };
    largeVectorToString => {
     h.pc.pcm.fixed.frac ← operandTypePtr ↑ .ORD;
     h.errorCode ← PreParserMainErrors.unimplementedTypeConversion;
     GOTO fatalError;
     };

    vectorOfElementsToString => {
     IF VectorOfElementsToString[
      h: h, operationStage: opEntryPtr.count - count] THEN RETURN
     ELSE EXIT;
     };
    doSpecialISet => {
     IF h.sv.operand02.integer NOT IN

[PreParserInterpress.ImagerVariable.FIRST.ORD..PreParserInterpress.ImagerVariable.LAST.
ORD]
      THEN {
      h.errorCode ← PreParserMainErrors.badISetIndex;
      GOTO fatalError;
      };
     operandTypePtr ←
      operandTypePtr +
       ((CARDINAL[h.sv.operand02.integer] + 1) * SIZE[
         PreParserData.OperandType]);
     };
    fixedPointRealToInteger => {
     point5: LONG INTEGER = (LONG[LAST[CARDINAL]] + 1) / 2;
     h.stackEntryPtr ↑ .fixed.li ← h.stackEntryPtr.fixed.li + point5;
     h.stackEntryPtr ↑ .type ← roundedInteger;
```

Copyright © 1992 Xerox Corporation All Rights Reserved

```
      h.stackEntryPtr↑.integer ← h.stackEntryPtr↑.fixed.int;
      h.stackEntryPtr↑.fill1 ← 0;
      EXIT;
      };
     unimplementedRESInfo => {
      h.errorCode ← PreParserMainErrors.unimplementedRESInfo;
      GOTO fatalError;
      };

     fixedPointRealToReal => {
      h.stackEntryPtr↑ ← [
       type: real,
       frameData: real[
       real: Real.Float[h.stackEntryPtr.fixed.li] / 65536.0]];
      EXIT;
      };
     largeVectorToPixelVector => {
      h.pc.pcm.fixed.frac ← operandTypePtr↑.ORD;
      h.errorCode ← PreParserMainErrors.unimplementedTypeConversion;
      GOTO fatalError;
      };

     largeVectorToVectorOfElements => {
      h.errorCode ← PreParserMainErrors.unimplementedTypeConversion;
      GOTO fatalError;
      };

     ENDCASE;
    ENDLOOP;
   };
  IF count = 0 THEN EXIT;
  operandTypePtr ← operandTypePtr + SIZE[PreParserData.OperandType];
  h.stackEntryPtr ← h.stackEntryPtr - SIZE[PreParserCommon.StackEntry];
  ENDLOOP;
 h.pc.pcm.action ← h.pc.pcm.data.execAction;
 RETURN[]
 EXITS
  fatalError => {
   h.pc.pcm.action ← fatalError; h.pc.pcm.data.code ← h.errorCode; };
 END;
PutToken: PUBLIC PROCEDURE [h: PreParserCommon.MainHandle]
 RETURNS [needIIPBlock: BOOLEAN] =
 BEGIN
 tokenSize: CARDINAL = h.tokenSizes[h.token.type];
 IF h.iipData.currentWordCount < tokenSize THEN {
  SELECT h.iipData.currentWordCount FROM
   0 => NULL;
   1 =>
    LOOPHOLE[h.iipData.currentWordPtr, LONG POINTER TO nop
     InternalIP.Token]↑ ← [nop[]];
```

Copyright © 1992 Xerox Corporation All Rights Reserved

```
    ENDCASE =>
     LOOPHOLE[h.iipData.currentWordPtr, LONG POINTER TO filler
      InternalIP.Token] ↑ ← [
      filler[
      rec: [
      offsetToNextToken:
      h.iipData.currentWordCount - SIZE[filler InternalIP.Token],
      fillWords: TRASH]]];
   h.pc.pcm.action ← needIIPBlock;
   RETURN[needIIPBlock: TRUE]};

  Inline.LongCOPY[
   from: @h.token, nwords: tokenSize, to: h.iipData.currentWordPtr];
  h.iipData.currentWordPtr ← h.iipData.currentWordPtr + tokenSize;
  h.iipData.currentWordCount ← h.iipData.currentWordCount - tokenSize;
  RETURN[needIIPBlock: FALSE];
  END;
 VectorOfElementsToString: PUBLIC PROCEDURE [
  h: PreParserCommon.MainHandle, operationStage: CARDINAL]
  RETURNS [exitPopOperands: BOOLEAN ← TRUE] =
  BEGIN
  tempArrayOfCardinalPtr: LONG POINTER TO ARRAY CARDINAL OF CARDINAL ← NIL;
  stringByteCount: CARDINAL ← 0;
  lastCharSet: Environment.Byte ← 0;
  stringPtr: PreParserCommon.StringPtr ← NIL;
  count: CARDINAL;
  IF h.stackEntryPtr.type = vectorOfElements THEN {
   count ← h.stackEntryPtr.vectorPtr.count;
   h.tempData.firstStackEntryPtr ← @h.stackEntryPtr.vectorPtr.elements[0]}
  ELSE {count ← 0; h.tempData.firstStackEntryPtr ← NIL; };
  h.pc.pcm.nodeSizeInWords ← count;
  h.pc.pcm.zoneRecPtr ← @h.zone;
  IF IPMicrocode.CALL[
   function: IPFunction.AllocateNodeNFL, entryContext: h].result # 0 THEN
   GOTO retry;
  tempArrayOfCardinalPtr ← h.pc.pcm.nodePtr;
  stringByteCount ← count;
  FOR i: CARDINAL IN [0..count) DO
   SELECT h.tempData.firstStackEntryPtr.type FROM
    fixedPointReal =>
     tempArrayOfCardinalPtr[i] ← CARDINAL[
      FixedPointReal.Round[n: h.tempData.firstStackEntryPtr.fixed]];
    real =>
     tempArrayOfCardinalPtr[i] ← Real.FixC[
      h.tempData.firstStackEntryPtr.real];
    ENDCASE => {
     h.pc.pcm.data.code ← PreParserMainErrors.invalidOperandTypeOnStack;
     h.pc.pcm.action ← fatalError;
     RETURN;
     };
```

Copyright © 1992 Xerox Corporation All Rights Reserved

```
  IF Inline.HighByte[tempArrayOfCardinalPtr[i]] # lastCharSet THEN {
   stringByteCount ← stringByteCount + 2;
   lastCharSet ← Inline.HighByte[tempArrayOfCardinalPtr[i]];
   };
  h.tempData.firstStackEntryPtr ←
   h.tempData.firstStackEntryPtr + SIZE[PreParserCommon.StackEntry];
  ENDLOOP;
 h.pc.pcm.nodeSizeInWords ←
  SIZE[PreParserCommon.String] + ParserCommon.WordsFromBytes[
   bytes: stringByteCount];
 h.pc.pcm.zoneRecPtr ← @h.zone;
 IF IPMicrocode.CALL[
  function: IPFunction.AllocateNodeNFL, entryContext: h].result # 0 THEN {
  h.pc.pcm.nodePtr ← tempArrayOfCardinalPtr;
  [] ← IPMicrocode.CALL[function: IPFunction.FreeNodeNFL, entryContext: h];
  GOTO retry;
  };
 stringPtr ← h.pc.pcm.nodePtr;
 stringPtr ↑ ← [
  cn: [
  fill: 0, preambleOwned: FALSE, referenceCount: 1, next: NIL, type: string,
  zoneRecPtr: @h.zone], length: stringByteCount, byteOffset: 0,
  base: @stringPtr.chars, chars: TRASH];
 lastCharSet ← 0;
 stringByteCount ← 0;
 FOR i: CARDINAL IN [0..count) DO
  IF Inline.HighByte[tempArrayOfCardinalPtr[i]] # lastCharSet THEN {
   lastCharSet ← Inline.HighByte[tempArrayOfCardinalPtr[i]];
   stringPtr.chars[stringByteCount] ← VAL[377B];
   stringByteCount ← stringByteCount + 1;
   stringPtr.chars[stringByteCount] ← VAL[lastCharSet];
   stringByteCount ← stringByteCount + 1};
  stringPtr.chars[stringByteCount] ← VAL[
   Inline.LowByte[tempArrayOfCardinalPtr[i]]];
  stringByteCount ← stringByteCount + 1;
  ENDLOOP;
 h.pc.pcm.nodePtr ← tempArrayOfCardinalPtr;
 [] ← IPMicrocode.CALL[function: IPFunction.FreeNodeNFL, entryContext: h];
 h.tempData.firstStackEntryPtr ← h.stackEntryPtr;
 PreParserFrameStack.ComplexNodeRefCount[
  h: h, entryPtr: h.stackEntryPtr, delta: -1];
 h.stackEntryPtr ← h.tempData.firstStackEntryPtr;
 h.stackEntryPtr ↑ ← [type: string, frameData: string[stringPtr: stringPtr]];
 RETURN[exitPopOperands: FALSE];
 EXITS
  retry => {
   h.pc.operationStage ← operationStage;
   h.pc.pcm.savedAction ← PrePopOperands;
   };
 END;
```

Copyright © 1992 Xerox Corporation All Rights Reserved

```
ReportFPUProblem: PUBLIC PROCEDURE [h: PreParserCommon.MainHandle] RETURNS []
=
 BEGIN
 id: FaultLogger.ID ← FaultLogger.Log[
  fault: [
  subsystem: control, swModule: print,
  faultNumber: PreParserMainErrors.fpuProblem]];
 PreParserCallBack.ReportESSFault[
  context: h.pc.pcm.clientContext, fault: fpuProblem, id: id];
 h.pc.pcm.action ← h.pc.pcm.savedAction;
 END;
SetXYMesa: PUBLIC PROCEDURE [h: PreParserCommon.MainHandle]
 RETURNS [loop: BOOLEAN] =
 BEGIN
 h.stackEntryPtr ← @h.sv.operand01;
 TransformIPPoint[h: h];
 [x: h.imagerVars.dcsX, y: h.imagerVars.dcsY] ← h.P1;
 h.iipData.positionChanged ← TRUE;
 RETURN[loop: FALSE];
 END;
ShowMesa: PUBLIC PROCEDURE [h: PreParserCommon.MainHandle]
 RETURNS [loop: BOOLEAN] =
 BEGIN
 stringLength: CARDINAL ← h.sv.operand01.stringPtr ↑ .length;
 IF IPMicrocode.CALL[
  function: IPFunction.PreCheckPosition, entryContext: h].result # 0 THEN {
  h.pc.pcm.savedAction ← PreShow; RETURN[loop: TRUE]; };
 IF PreParserFont.CheckFontMesa[h].loop THEN {
  h.pc.pcm.savedAction ← PreShow; RETURN[loop: TRUE]; };

 IF h.pc.operationStage = 0 THEN {
  LOOPHOLE[@h.token, LONG POINTER TO show InternalIP.Token] ↑ ← [
   show[
   rec: [
   offsetToNextToken:
   ParserCommon.WordsFromBytes[stringLength] + SIZE[CARDINAL],
   stringLength: stringLength, string: TRASH]]];
  IF IPMicrocode.CALL[
   function: IPFunction.PrePutToken, entryContext: h].result # 0 THEN {
   h.pc.pcm.savedAction ← PreShow; RETURN[loop: TRUE]; };
  h.tempData.bytesCopied ← ByteBlt.ByteBlt[
   from: [
   blockPointer: LOOPHOLE[h.sv.operand01.stringPtr ↑ .base],
   startIndex: h.sv.operand01.stringPtr ↑ .byteOffset,
   stopIndexPlusOne: h.sv.operand01.stringPtr ↑ .byteOffset + stringLength],
   to: [
   blockPointer: LOOPHOLE[h.iipData.currentWordPtr], startIndex: 0,
   stopIndexPlusOne: h.iipData.currentWordCount * Environment.bytesPerWord]];
  IF h.tempData.bytesCopied < stringLength THEN {
   h.pc.operationStage ← h.tempData.bytesCopied + 1;
```

Copyright © 1992 Xerox Corporation All Rights Reserved

```
h.pc.pcm.action ← needIIPBlock;
h.pc.pcm.savedAction ← PreShow;
RETURN[loop: TRUE];
};
}
ELSE {
h.tempData.bytesCopied ← ByteBlt.ByteBlt[
from: [
blockPointer: LOOPHOLE[h.sv.operand01.stringPtr ↑ .base],
startIndex:
h.sv.operand01.stringPtr ↑ .byteOffset + h.pc.operationStage - 1,
stopIndexPlusOne: h.sv.operand01.stringPtr ↑ .byteOffset + stringLength],
to: [
blockPointer: LOOPHOLE[h.iipData.currentWordPtr], startIndex: 0,
stopIndexPlusOne: h.iipData.currentWordCount * Environment.bytesPerWord]];
h.pc.operationStage ← h.pc.operationStage + h.tempData.bytesCopied;
IF (h.pc.operationStage - 1) < stringLength THEN {
h.pc.pcm.action ← needIIPBlock;
h.pc.pcm.savedAction ← PreShow;
RETURN[loop: TRUE];
};
h.pc.operationStage ← 0;
};
{
wordCount: CARDINAL ← ParserCommon.WordsFromBytes[h.tempData.bytesCopied];
h.iipData.currentWordPtr ← h.iipData.currentWordPtr + wordCount;
h.iipData.currentWordCount ← h.iipData.currentWordCount - wordCount};
IF h.sv.operand01.stringPtr.cn.fill # 1 THEN
PreParserFrameStack.ComplexNodeRefCount[
h: h, entryPtr: @h.sv.operand01, delta: -1];
h.imagerVars.dcsX ← PreParserCommon.UnknownXY;
h.iipData.imagerVars.dcsX ← PreParserCommon.UnknownXY;
h.iipData.positionChanged ← TRUE;
RETURN[loop: FALSE];
END;
GetByte: PROCEDURE [h: PreParserCommon.MainHandle]
RETURNS [stringDone: BOOLEAN ← FALSE] = INLINE
BEGIN
IF h.tempData.bytesLeft = 0 THEN RETURN[stringDone: TRUE]
ELSE {
h.tempData.tempByte ← h.sv.operand01.stringPtr ↑ .chars[
h.tempData.byteOffset];
h.tempData.bytesLeft ← h.tempData.bytesLeft - 1;
h.tempData.byteOffset ← h.tempData.byteOffset + 1}
END;
PutShowXRelTokens: PROCEDURE [h: PreParserCommon.MainHandle]
RETURNS [loop: BOOLEAN] =
BEGIN
smallStringLength: CARDINAL = 3;
IF h.tempData.showXRelTokenState = putShow THEN {
```

Copyright © 1992 Xerox Corporation All Rights Reserved

```
  LOOPHOLE[@h.token, LONG POINTER TO show InternalIP.Token] ↑ ←[
   show[
   rec: [
   offsetToNextToken:
   ParserCommon.WordsFromBytes[smallStringLength] + SIZE[CARDINAL],
   stringLength: smallStringLength, string: TRASH]]];
  IF IPMicrocode.CALL[
   function: IPFunction.PrePutToken, entryContext: h].result = 0 THEN
   h.tempData.showXRelTokenState ← putTwoWords;
  };
 IF h.tempData.showXRelTokenState = putTwoWords THEN
  IF h.iipData.currentWordCount < 1 THEN h.pc.pcm.action ← needIIPBlock
  ELSE {
   LOOPHOLE[h.iipData.currentWordPtr, LONG POINTER TO CARDINAL] ↑ ←
    h.tempData.charSetWord;
   h.iipData.currentWordPtr ← h.iipData.currentWordPtr + 1;
   h.iipData.currentWordCount ← h.iipData.currentWordCount - 1;
   h.tempData.showXRelTokenState ← putOneWord;
   };
 IF h.tempData.showXRelTokenState = putOneWord THEN
  IF h.iipData.currentWordCount < 1 THEN h.pc.pcm.action ← needIIPBlock
  ELSE {
   LOOPHOLE[h.iipData.currentWordPtr, LONG POINTER TO CARDINAL] ↑ ←
    h.tempData.charWord;
   h.iipData.currentWordPtr ← h.iipData.currentWordPtr + 1;
   h.iipData.currentWordCount ← h.iipData.currentWordCount - 1;
   h.tempData.showXRelTokenState ← tokensPut;
   };
 IF h.tempData.showXRelTokenState = putSetXYRel THEN {
  LOOPHOLE[@h.token, LONG POINTER TO setXYRel InternalIP.Token] ↑ ←[
   setXYRel[rec: [delta: h.P1]]];
  IF IPMicrocode.CALL[
   function: IPFunction.PrePutToken, entryContext: h].result = 0 THEN
   h.tempData.showXRelTokenState ← tokensPut;
  };
 RETURN[(h.pc.operationStage ← ORD[h.tempData.showXRelTokenState]) # 0];
 END;
ShowAndXRel: PUBLIC PROCEDURE [h: PreParserCommon.MainHandle]
 RETURNS [loop: BOOLEAN] =
 BEGIN
 IF IPMicrocode.CALL[
  function: IPFunction.PreCheckPosition, entryContext: h].result # 0 THEN {
  h.pc.pcm.savedAction ← showAndXRel; RETURN[loop: TRUE]; };
 IF PreParserFont.CheckFontMesa[h].loop THEN {
  h.pc.pcm.savedAction ← showAndXRel; RETURN[loop: TRUE]; };
 IF h.pc.operationStage = 0 THEN {
  h.tempData.showXRelState ← runChar;
  h.tempData.bytesLeft ← h.sv.operand01.stringPtr ↑ .length;
  h.tempData.byteOffset ← h.sv.operand01.stringPtr ↑ .byteOffset;
  h.tempData.charSetWord ← 256 * 377B + 0;
```

Copyright © 1992 Xerox Corporation All Rights Reserved

```
  h.sv.operand03 ← [type: real, frameData: real[real: 0]]}
 ELSE [] ← PutShowXRelTokens[h: h];

 UNTIL GetByte[h: h].stringDone DO
  SELECT h.tempData.showXRelState FROM
   runChar = > {
    IF h.tempData.tempByte # VAL[377B] THEN {
     h.tempData.charWord ← 256 * ORD[h.tempData.tempByte];
     h.tempData.showXRelTokenState ← putShow;
     IF PutShowXRelTokens[h: h].loop THEN {
      h.pc.pcm.savedAction ← showAndXRel;
      h.tempData.showXRelState ← runDisp;
      RETURN[loop: TRUE]};
     h.tempData.showXRelState ← runDisp}

    ELSE h.tempData.showXRelState ← escapeChar};

   runDisp = > {
    IF h.tempData.tempByte # VAL[377B] THEN {
     h.pc.pcm.fixed ← [if[int: ORD[h.tempData.tempByte] - 128, frac: 0]];
     [] ← IPMicrocode.CALL[
      function: IPFunction.FPRToReal, entryContext: h];
     h.sv.operand02 ← [type: real, frameData: real[real: h.pc.pcm.real1]];
     h.stackEntryPtr ← @h.sv.operand02;
     [] ← IPMicrocode.CALL[
      function: IPFunction.PreTransformIPVector, entryContext: h];
     h.tempData.showXRelTokenState ← putSetXYRel;
     IF PutShowXRelTokens[h: h].loop THEN {
      h.pc.pcm.savedAction ← showAndXRel;
      h.tempData.showXRelState ← runChar;
      RETURN[loop: TRUE]};
     h.tempData.showXRelState ← runChar}
    ELSE h.tempData.showXRelState ← escapeDisp};

   escapeChar = > {
    h.tempData.charSetWord ←
     256 * Inline.HighByte[h.tempData.charSetWord] + ORD[
      h.tempData.tempByte];
    h.tempData.showXRelState ← runChar};

   escapeDisp = > {
    h.tempData.charSetWord ←
     256 * Inline.HighByte[h.tempData.charSetWord] + ORD[
      h.tempData.tempByte];
    h.tempData.showXRelState ← runDisp};

   ENDCASE;
  ENDLOOP;

 h.pc.operationStage ← 0;
```

Copyright © 1992 Xerox Corporation All Rights Reserved

```
PreParserFrameStack.ComplexNodeRefCount[
 h: h, entryPtr: @h.sv.operand01, delta: -1];

h.imagerVars.dcsX ← PreParserCommon.UnknownXY;
h.iipData.imagerVars.dcsX ← PreParserCommon.UnknownXY;
h.iipData.positionChanged ← TRUE;

RETURN[loop: FALSE];

END;

ShowAndFixedXRel: PUBLIC PROCEDURE [h: PreParserCommon.MainHandle]
 RETURNS [loop: BOOLEAN] =
 BEGIN
 IF IPMicrocode.CALL[
  function: IPFunction.PreCheckPosition, entryContext: h].result # 0 THEN {
  h.pc.pcm.savedAction ← showAndFixedXRel; RETURN[loop: TRUE]};

 IF PreParserFont.CheckFontMesa[h].loop THEN {
  h.pc.pcm.savedAction ← showAndFixedXRel; RETURN[loop: TRUE]};

 IF h.pc.operationStage = 0 THEN {
  h.tempData.showXRelState ← runChar;
  h.tempData.bytesLeft ← h.sv.operand01.stringPtr ↑ .length;
  h.tempData.byteOffset ← h.sv.operand01.stringPtr ↑ .byteOffset;
  h.tempData.charSetWord ← 256 * 377B + 0;

  h.sv.operand03 ← [type: real, frameData: real[real: 0]];

  h.stackEntryPtr ← @h.sv.operand02;
  [] ← IPMicrocode.CALL[
   function: IPFunction.PreTransformIPVector, entryContext: h]}

 ELSE [] ← PutShowXRelTokens[h: h];

 UNTIL GetByte[h: h].stringDone DO
  SELECT h.tempData.showXRelState FROM

   runChar => {
    IF h.tempData.tempByte # VAL[377B] THEN {
     h.tempData.charWord ← 256 * ORD[h.tempData.tempByte];
     h.tempData.showXRelTokenState ← putShow;
     IF PutShowXRelTokens[h: h].loop THEN {
      h.pc.pcm.savedAction ← showAndFixedXRel; RETURN[loop: TRUE]};
     IF h.tempData.bytesLeft # 0 THEN {
      h.tempData.showXRelTokenState ← putSetXYRel;
      IF PutShowXRelTokens[h: h].loop THEN {
       h.pc.pcm.savedAction ← showAndFixedXRel; RETURN[loop: TRUE]}}}
    ELSE h.tempData.showXRelState ← escapeChar};
```

Copyright © 1992 Xerox Corporation All Rights Reserved

```
    escapeChar => {
     h.tempData.charSetWord ←
      256 * Inline.HighByte[h.tempData.charSetWord] + ORD[
       h.tempData.tempByte];
     h.tempData.showXRelState ← runChar};

    ENDCASE;
   ENDLOOP;

  h.pc.operationStage ← 0;

  PreParserFrameStack.ComplexNodeRefCount[
   h: h, entryPtr: @h.sv.operand01, delta: -1];

  h.imagerVars.dcsX ← PreParserCommon.UnknownXY;
  h.iipData.imagerVars.dcsX ← PreParserCommon.UnknownXY;
  h.iipData.positionChanged ← TRUE;

  RETURN[loop: FALSE];

  END;
 TransformIPPoint: PUBLIC PROCEDURE [h: PreParserCommon.MainHandle] RETURNS [] =
  BEGIN
  TransformIPVector[h: h];
  h.P1.x.li ← h.P1.x.li + h.imagerVars.c.li;
  h.P1.y.li ← h.P1.y.li + h.imagerVars.f.li;
  RETURN[];
  END;
 TransformIPVector: PUBLIC PROCEDURE [h: PreParserCommon.MainHandle] RETURNS []
=
  BEGIN
  SELECT h.imagerVars.tFormHint FROM

   zeroBandD => {
    h.P1.x.li ← Real.RoundLI[
     h.imagerVars.t.a * h.stackEntryPtr↑.real * 65536.0];
    h.stackEntryPtr ← h.stackEntryPtr + SIZE[PreParserCommon.StackEntry];
    h.P1.y.li ← Real.RoundLI[
     h.imagerVars.t.e * h.stackEntryPtr↑.real * 65536.0]};

   zeroAandE => {
    h.P1.y.li ← Real.RoundLI[
     h.imagerVars.t.d * h.stackEntryPtr↑.real * 65536.0];
    h.stackEntryPtr ← h.stackEntryPtr + SIZE[PreParserCommon.StackEntry];
    h.P1.x.li ← Real.RoundLI[
     h.imagerVars.t.b * h.stackEntryPtr↑.real * 65536.0]};

   ENDCASE => NULL;
  h.stackEntryPtr ← h.stackEntryPtr - SIZE[PreParserCommon.StackEntry];
```

Copyright © 1992 Xerox Corporation All Rights Reserved

```
  RETURN[];
  END;
Initialize: PUBLIC PROCEDURE = BEGIN END;

END.
```

Copyright © 1992 Xerox Corporation All Rights Reserved

```
DIRECTORY
 FaultLogger USING [nullLogID],
 FixedPointReal USING [ToReal, FromReal],
 Inline USING [LongCOPY],
 PreParserCallBack USING [Problem, ReportObjectFault, Severity],
 PreParserCommon,
 PreParserData USING [OperandType],
 PreParserExtra USING [],
 PreParserInterpress USING [LongOperator, shortNumberBias],
 PreParserFrameStack USING [PushStack],
 PreParserMainErrors,
 PreParserMainOps USING [],
 PreParserTForm USING [ConvertPPCTransToTMatrix],
 Real USING [Float, RealException, RoundLI, UsualExceptions],
 String USING [CopyToNewString, MakeString],
 Transformation USING [Matrix],
 TransformationOps USING [Invert, TransformVec, Vec];

PreParserExtraImplA: MONITOR
 IMPORTS
  FixedPointReal, Inline, PreParserCallBack, PreParserCommon,
  PreParserFrameStack, PreParserTForm, Real, String, TransformationOps
 EXPORTS PreParserExtra, PreParserMainOps =
 BEGIN

 ErrorOp: PUBLIC PROCEDURE [h: PreParserCommon.MainHandle]
  RETURNS [loop: BOOLEAN ← FALSE] =
  BEGIN
  length: CARDINAL = h.sv.operand01.stringPtr.length;

  h.tempData.errorMessage ← String.MakeString[z: h.smZone, maxlength: length];
  h.tempData.errorMessage.length ← length;
  Inline.LongCOPY[
   from: h.sv.operand01.stringPtr.base,
   nwords: PreParserCommon.WordsFromBytes[length],
   to: @h.tempData.errorMessage.text];
  h.tempData.severity ←
   SELECT h.sv.operand02.integer FROM
    < 10 => masterError,
    < 50 => masterWarning,
    < 60 => appearanceError,
    < 100 => appearanceWarning,
    ENDCASE => comment;
  IF h.tempData.severity = masterError THEN {
   h.pc.pcm.data.code ← PreParserMainErrors.errorOperatorExecuted;
   h.pc.pcm.action ← fatalError;
   RETURN[loop: TRUE];
   };
```

Copyright © 1992 Xerox Corporation All Rights Reserved

```
 PreParserCallBack.ReportObjectFault[
  context: h.pc.pcm.clientContext,
  objectFault: [
  problem: [errorOperatorExecuted[message: h.tempData.errorMessage]],
  severity: h.tempData.severity, side: h.side, sheetNumber: h.sheetNumber,
  copyNumber: 1]];
 RETURN;
 END;
GetCP: PUBLIC PROCEDURE [h: PreParserCommon.MainHandle]
 RETURNS [loop: BOOLEAN] =
 BEGIN
 ENABLE
  Real.RealException = > {
   h.pc.pcm.data.code ← PreParserMainErrors.numericError;
   h.pc.pcm.action ← fatalError;
   loop ← TRUE;
   CONTINUE;
   };
 IF h.imagerVars.dcsX = PreParserCommon.UnknownXY THEN {
  h.pc.pcm.action ← fatalError;
  h.pc.pcm.data.code ← PreParserMainErrors.invalidCurrentPosition;
  RETURN[loop: TRUE];
  }
 ELSE {
  PushX: PROC [] RETURNS [success: BOOLEAN ← TRUE] = INLINE {
   h.stackEntryPtr ← @h.stackEntry;
   h.stackEntry ← [type: real, frameData: real[h.sv.operand01.real]];
   IF PreParserFrameStack.PushStack[h: h].extendZone THEN {
    h.pc.pcm.savedAction ← getCP; h.pc.operationStage ← 1; RETURN[FALSE]; };
   };
  PushY: PROC [] RETURNS [success: BOOLEAN ← TRUE] = INLINE {
   h.stackEntryPtr ← @h.stackEntry;
   h.stackEntry ← [type: real, frameData: real[h.sv.operand02.real]];
   IF PreParserFrameStack.PushStack[h: h].extendZone THEN {
    h.pc.pcm.savedAction ← getCP; h.pc.operationStage ← 2; RETURN[FALSE]; };
   };
  SELECT h.pc.operationStage FROM
   0 = > {
    currentT1, currentT2: Transformation.Matrix;
    tempT: LONG POINTER TO Transformation.Matrix;
    dcsX: REAL = FixedPointReal.ToReal[h.imagerVars.dcsX];
    dcsY: REAL = FixedPointReal.ToReal[h.imagerVars.dcsY];
    v: TransformationOps.Vec;
    PreParserTForm.ConvertPPCTransToTMatrix[@h.imagerVars.t, @currentT1];
    IF ((tempT ← TransformationOps.Invert[@currentT1, @currentT2]) = NIL)
     THEN [] ← SIGNAL Real.RealException[Real.UsualExceptions, NIL];
    currentT2 ← tempT↑;
    v ← TransformationOps.TransformVec[@currentT2, [dcsX, dcsY]];
    h.sv.operand01.real ← v.x;
    h.sv.operand02.real ← v.y;
```

Copyright © 1992 Xerox Corporation All Rights Reserved

```
    IF ~PushX[] THEN RETURN[loop: TRUE];
    IF ~PushY[] THEN RETURN[loop: TRUE];
    };
   1 => {
    IF ~PushX[] THEN RETURN[loop: TRUE];
    IF ~PushY[] THEN RETURN[loop: TRUE];
    };
   2 => IF ~PushY[] THEN RETURN[loop: TRUE];
   ENDCASE => NULL;
  h.pc.operationStage ← 0;
  RETURN[loop: FALSE];
  };
 END;
Move: PUBLIC PROCEDURE [h: PreParserCommon.MainHandle] RETURNS [loop:
BOOLEAN] =
 BEGIN
 ENABLE
  Real.RealException => {
   h.pc.pcm.data.code ← PreParserMainErrors.numericError;
   h.pc.pcm.action ← fatalError;
   loop ← TRUE;
   CONTINUE;
   };
 IF h.imagerVars.dcsX = PreParserCommon.UnknownXY THEN {
  h.pc.pcm.data.code ← PreParserMainErrors.invalidCurrentPosition;
  h.pc.pcm.action ← fatalError;
  RETURN[loop: TRUE]};
 MoveInternal[h: h, rounded: FALSE];
 RETURN[loop: FALSE];
 END;
MoveInternal: PROCEDURE [h: PreParserCommon.MainHandle, rounded: BOOL]
 RETURNS [] = {
 x: REAL ← FixedPointReal.ToReal[h.imagerVars.dcsX];
 y: REAL ← FixedPointReal.ToReal[h.imagerVars.dcsY];
 IF rounded THEN {x ← REAL[Real.RoundLI[x]]; y ← REAL[Real.RoundLI[y]]; };
 h.imagerVars.t.c ← x;
 h.imagerVars.t.f ← y;
 h.imagerVars.c ← FixedPointReal.FromReal[h.imagerVars.t.c];
 h.imagerVars.f ← FixedPointReal.FromReal[h.imagerVars.t.f];
 };
Trans: PUBLIC PROCEDURE [h: PreParserCommon.MainHandle]
 RETURNS [loop: BOOLEAN] =
 BEGIN
 ENABLE
  Real.RealException => {
   h.pc.pcm.data.code ← PreParserMainErrors.numericError;
   h.pc.pcm.action ← fatalError;
   loop ← TRUE;
   CONTINUE;
   };
```

Copyright © 1992 Xerox Corporation All Rights Reserved

```
IF h.imagerVars.dcsX = PreParserCommon.UnknownXY THEN {
 h.pc.pcm.data.code ← PreParserMainErrors.invalidCurrentPosition;
 h.pc.pcm.action ← fatalError;
 RETURN[loop: TRUE];
 };
Movelnternal[h: h, rounded: TRUE];
RETURN[loop: FALSE];
END;
GetOperatorType: PROCEDURE [h: PreParserCommon.MainHandle]
RETURNS [type: CARDINAL] =
BEGIN
WITH token: h.pc.tokenOverlay.token SELECT FROM
 shortOperator => type ← ORD[token.shortOperator];
 longOperator => type ← ORD[token.longOperator];
 shortSequence => type ← ORD[token.sequenceType];
 longSequence => type ← ORD[token.sequenceType];
 ENDCASE;
END;
SetErrorStatus: PUBLIC PROCEDURE [h: PreParserCommon.MainHandle] =
BEGIN
problem: PreParserCallBack.Problem;
severity: PreParserCallBack.Severity;
continueWithNextPage: BOOLEAN ← FALSE;
functionFault: BOOLEAN ← FALSE;

SELECT h.errorCode FROM
 PreParserMainErrors.unexpectedError => {
  problem ← [
   unrecoverableSWProblemWithCode[
   swError: unexpectedError, code: GetOperatorType[h: h]]];
  severity ← masterError;
  };
 PreParserMainErrors.insertFileNotFound => {
  problem ← [
   fileProblem[
   problem: insertFileNotFound,
   fileName: String.CopyToNewString[
   s: NARROW[h.tempData.sifName], z: h.smZone]]];
  severity ← masterError;
  };
 PreParserMainErrors.unimplementedRESInfo => {
  problem ← [fileProblem[problem: unimplementedRESInfo, fileName: NIL]];
  severity ← masterError;
  };
 PreParserMainErrors.insertFileProblem => {
  problem ← [
   fileProblem[
   problem: insertFileProblem,
   fileName: String.CopyToNewString[
   s: NARROW[h.tempData.sifName], z: h.smZone]]];
```

Copyright © 1992 Xerox Corporation All Rights Reserved

```
  severity ← masterError;
  };
 PreParserMainErrors.insufficientMemory = > {
  problem ← [
   printerLimitExceeded[
   problem: insufficientMemory, code: LOOPHOLE[h.integer],
   id: FaultLogger.nullLogID]];
  severity ← masterError;
  };
 PreParserMainErrors.badOperandValue = > {
  problem ← [
   badOperandValue[
   operandType: ORD[PreParserData.OperandType[roundedInteger]],
   value:
   IF h.sv.operand01.type = roundedInteger THEN Real.Float[
   h.sv.operand01.integer] ELSE 0]];
  severity ← masterError;
  };
 PreParserMainErrors.badFrameIndex = > {
  problem ← [
   masterProblemWithCode[
   problem: badFrameIndex, subCode: LOOPHOLE[h.sv.operand01.integer]]];
  severity ← masterError;
  };
 PreParserMainErrors.badFrameIndexFSet = > {
  problem ← [
   masterProblemWithCode[
   problem: badFrameIndex, subCode: LOOPHOLE[h.sv.operand02.integer]]];
  severity ← masterError;
  };
 PreParserMainErrors.badISetIndex = > {
  problem ← [
   masterProblemWithCode[
   problem: badISetIndex, subCode: LOOPHOLE[h.sv.operand02.integer]]];
  severity ← masterError;
  };
 PreParserMainErrors.badISetUsage = > {
  problem ← [
   masterProblemWithCode[
   problem: badISetUsage, subCode: LOOPHOLE[h.sv.operand02.integer]]];
  severity ← masterError;
  };
 PreParserMainErrors.badMediaIndex = > {
  problem ← [masterProblemWithCode[problem: badMediaIndex, subCode: 0]];
  severity ← masterError;
  };
 PreParserMainErrors.badVectorIndex = > {
  problem ← [
   masterProblemWithCode[
   problem: badVectorIndex, subCode: LOOPHOLE[h.sv.operand02.integer]]];
```

Copyright © 1992 Xerox Corporation All Rights Reserved

```
 severity ← masterError;
 };
PreParserMainErrors.iipFragMgrError => {
 problem ← [
  unrecoverableSWProblemWithCode[
  swError: iipFragMgrError, code: LOOPHOLE[h.integer]]];
 severity ← masterError;
 };
PreParserMainErrors.invalidOperandTypeOnStack => {
 problem ← [
  invalidOperandTypeOnStack[
  operatorType: GetOperatorType[h: h], operandNumber: 0, operandType: 0]];
 severity ← masterError;
 };
PreParserMainErrors.invalidTypeForSetFont => {
 problem ← [
  invalidTypeForSetFont[
  frameIndex: h.sv.operand01.integer,
  operandType: ORD[h.imagerVars.font.type]]];
 severity ← masterError;
 };
PreParserMainErrors.longSequencesNotImpld => {
 problem ← [featureNotImplemented[feature: [longSequencesNotImpld[]]]];
 severity ← masterError;
 };
PreParserMainErrors.nestedContentInstrsUnimpld => {
 problem ← [
  featureNotImplemented[feature: [nestedContentInstrsUnimpld[]]]];
 severity ← systemError;
 };
PreParserMainErrors.unimplementedFeature => {
 problem ← [
  featureNotImplemented[
  feature: [unimplementedFeature[subCode: GetOperatorType[h: h]]]]];
 severity ← systemError;
 };
PreParserMainErrors.unimplementedTypeConversion => {
 problem ← [
  featureNotImplemented[
  feature: [
  unimplementedTypeConversion[
  operandType: GetOperatorType[h: h],
  desiredType: ORD[h.stackEntryPtr.type]]]]];
 severity ← systemError;
 };
PreParserMainErrors.markNotFoundOnStack => {
 problem ← [
  markNotFoundOnStack[
  operatorType: GetOperatorType[h: h],
  operandType: ORD[h.stackEntryPtr.type]]];
```

Copyright © 1992 Xerox Corporation All Rights Reserved

```
severity ← masterError;
};
PreParserMainErrors.badInsertFileSyntax = > {
problem ← [
fileProblem[
problem: badInsertFileSyntax,
fileName: String.CopyToNewString[
s: NARROW[h.tempData.sifName], z: h.smZone]]];
severity ← masterError;
};
PreParserMainErrors.notAnInterpressFile = > {
problem ← [masterProblem[problem: notAnInterpressFile]];
severity ← systemError;
};
PreParserMainErrors.nestedCORRECTs = > {
problem ← [masterProblem[problem: nestedCORRECTs]];
severity ← masterError;
};
76, PreParserMainErrors.numericError = > {
problem ← [masterProblem[problem: numericError]];
severity ← masterError;
};
PreParserMainErrors.noFontSpecified = > {
problem ← [masterProblem[problem: noFontSpecified]];
severity ← masterError;
};
PreParserMainErrors.unexpectedIPFunction = > {
problem ← [
unrecoverableSWProblemWithCode[
swError: unexpectedIPFunction, code: h.pc.pcm.data.code]];
severity ← systemError;
};
PreParserMainErrors.unexpectedEOF = > {
problem ← [masterProblem[problem: unexpectedEOF]];
severity ← masterError;
};
PreParserMainErrors.outputOperatorNotAllowed = > {
problem ← [
masterProblemWithCode[
problem: outputOperatorNotAllowed, subCode: GetOperatorType[h: h]]];
severity ← masterError;
};
PreParserMainErrors.stackUnderflow = > {
problem ← [
masterProblemWithCode[
problem: stackUnderflow, subCode: GetOperatorType[h: h]]];
severity ← masterError;
};
PreParserMainErrors.unexpectedMark = > {
problem ← [
```

Copyright © 1992 Xerox Corporation All Rights Reserved

```
   masterProblemWithCode[
   problem: unexpectedMark, subCode: GetOperatorType[h: h]]];
  severity ← masterError;
  };
 PreParserMainErrors.unexpectedOperator = > {
  problem ← [
   masterProblemWithCode[
   problem: unexpectedOperator, subCode: GetOperatorType[h: h]]];
  severity ← masterError;
  };
 PreParserMainErrors.unrecognizedOperator = > {
  problem ← [
   masterProblemWithCode[
   problem: unrecognizedOperator, subCode: GetOperatorType[h: h]]];
  severity ← masterError;
  };
 PreParserMainErrors.pageInitError = > {
  problem ← [unrecoverableSoftwareProblem[swError: pageInitError]];
  severity ← systemError;
  };
 PreParserMainErrors.softwareBugNoIIP = > {
  problem ← [unrecoverableSoftwareProblem[swError: softwareBugNoIIP]];
  severity ← systemError;
  };
 PreParserMainErrors.unexpectedSignal = > {
  problem ← [
   unrecoverableSWProblemWithCode[
   swError: unexpectedSignal, code: GetOperatorType[h: h]]];
  severity ← systemError;
  };
 PreParserMainErrors.unexpectedIPTrap = > {
  problem ← [unrecoverableSoftwareProblem[swError: unexpectedIPTrap]];
  severity ← systemError;
  };
 PreParserMainErrors.errorOperatorExecuted = > {
  problem ← [errorOperatorExecuted[message: h.tempData.errorMessage]];
  severity ← comment;
  };
 PreParserMainErrors.invalidNode = > {
  problem ← [unrecoverableSoftwareProblem[swError: invalidNode]];
  severity ← systemError;
  };
 PreParserMainErrors.badPropertyVectorStructure = > {
  problem ← [masterProblem[problem: badPropertyVectorStructure]];
  severity ← masterError;
  };
 PreParserMainErrors.badTypeForPropertyName = > {
  problem ← [masterProblem[problem: badTypeForPropertyName]];
  severity ← masterError;
  };
```

Copyright © 1992 Xerox Corporation All Rights Reserved

```
PreParserMainErrors.invalidSequenceType => {
 problem ← [
  masterProblemWithCode[
  problem: invalidSequenceType,
  subCode: h.pc.tokenOverlay.sequence.sequenceType.ORD]];
 severity ← masterError;
 };
PreParserMainErrors.propertyNameNotFound => {
 problem ← [masterProblem[problem: propertyNameNotFound]];
 severity ← masterError;
 };
PreParserMainErrors.stackNotEmptyAtPageEnd => {
 problem ← [masterProblem[problem: stackNotEmptyAtPageEnd]];
 severity ← masterError;
 };
PreParserMainErrors.badPrintingInstrType => {
 problem ← [
  instructionProblem[
  problem: badType, instruction: h.tempData.propertyNameString]];
 severity ← masterWarning;
 };
PreParserMainErrors.badPrintingInstrValue => {
 problem ← [
  instructionProblem[
  problem: badValue, instruction: h.tempData.propertyNameString]];
 severity ← masterWarning;
 };
PreParserMainErrors.findOperationFailed => {
 problem ← [
  findOperationFailed[
  operatorType: GetOperatorType[h: h], findArgument: h.tempData.name]];
 severity ← masterError;
 };
PreParserMainErrors.markMissingAtPageEnd => {
 problem ← [masterProblem[problem: markMissingAtPageEnd]];
 severity ← masterError;
 };
PreParserMainErrors.unimplementedSequenceType => {
 problem ← [
  featureNotImplemented[
  feature: [
  unimplementedSequenceType[
  sequenceType: h.pc.tokenOverlay.sequence.sequenceType.ORD]]]];
 severity ← masterError;
 };
PreParserMainErrors.imageInstallError => {
 problem ← [
  unrecoverableSWProblemWithCode[
  swError: imageInstallError, code: LOOPHOLE[h.integer]]];
 severity ← systemError;
```

Copyright © 1992 Xerox Corporation All Rights Reserved

```
 };
PreParserMainErrors.imageInstallDirError => {
 problem ← [
  unrecoverableSWProblemWithCode[
  swError: imageInstallDirectoryError, code: LOOPHOLE[h.integer]]];
 severity ← systemError;
 };
PreParserMainErrors.imageInstallOtherError => {
 problem ← [
  unrecoverableSWProblemWithCode[
  swError: imageInstallOtherError, code: LOOPHOLE[h.integer]]];
 severity ← systemError;
 };
PreParserMainErrors.imageInstallBccError => {
 problem ← [
  unrecoverableSWProblemWithCode[
  swError: imageInstallBccError, code: LOOPHOLE[h.integer]]];
 severity ← systemError;
 };
PreParserMainErrors.imageInstallAcqBufferError => {
 problem ← [
  unrecoverableSWProblemWithCode[
  swError: imageInstallAcqBufferError, code: LOOPHOLE[h.integer]]];
 severity ← systemError;
 };
PreParserMainErrors.negativeMakeVecLUbounds => {
 problem ← [
  masterProblemWithCode[
  problem: negativeMakeVecLUbounds, subCode: LOOPHOLE[h.integer]]];
 severity ← masterError;
 };
PreParserMainErrors.insufficientDiskSpace => {
 problem ← [
  printerLimitExceeded[
  problem: insufficientDiskSpace, code: LOOPHOLE[h.integer],
  id: FaultLogger.nullLogID]];
 severity ← systemError;
 };
PreParserMainErrors.invalidCurrentPosition => {
 problem ← [
  printerLimitExceeded[
  problem: invalidCurrentPosition, code: 0, id: FaultLogger.nullLogID]];
 severity ← masterError;
 };
PreParserMainErrors.smHeapAllocationError => {
 problem ← [
  printerLimitExceeded[
  problem: smHeapAllocationError, code: 0, id: FaultLogger.nullLogID]];
 severity ← systemError;
 };
```

Copyright © 1992 Xerox Corporation All Rights Reserved

```
PreParserMainErrors.mgrSMHeapAllocationError => {
 problem ← [
  printerLimitExceeded[
  problem: mgrSMHeapAllocationError, code: 0, id: FaultLogger.nullLogID]];
 severity ← systemError;
 };
PreParserMainErrors.rasterDirectoryFull => {
 problem ← [
  printerLimitExceeded[
  problem: rasterDirectoryFull, code: LOOPHOLE[h.integer],
  id: FaultLogger.nullLogID]];
 severity ← systemError;
 };
PreParserMainErrors.imageInstallNotAvailable => {
 problem ← [
  unrecoverableSWProblemWithCode[
  swError: imageInstallNotAvailable, code: LOOPHOLE[h.integer]]];
 severity ← systemError;
 };
PreParserMainErrors.coverMediaIndex => {
 problem ← [
  instructionValue[problem: coverMediaIndex, value: LOOPHOLE[h.integer]]];
 severity ← operationError;
 };
PreParserMainErrors.colorSubstituted => {
 problem ← [colorSubstitued[colorName: h.tempData.name]];
 severity ← operationError;
 };
ENDCASE => {
 problem ← [
  unrecoverableSWProblemWithCode[
  swError: unexpectedSignal, code: GetOperatorType[h: h]]];
 severity ← systemError;
 };

continueWithNextPage ←
 SELECT severity FROM
  comment, appearanceError, appearanceWarning, masterWarning,
   operationError, masterError => TRUE,
  systemError => FALSE,
  ENDCASE => FALSE;

IF continueWithNextPage AND h.pc.pcm.contextType = preParserMainLoopContext
 THEN {
 PreParserCallBack.ReportObjectFault[
  context: h.pc.pcm.clientContext,
  objectFault: [
  problem: problem, severity: severity, functionFault: functionFault,
  side: h.side, sheetNumber: h.sheetNumber, copyNumber: 1]];
 h.statusPtr ↑ ← [pageDone[errored: TRUE]];
```

Copyright © 1992 Xerox Corporation All Rights Reserved

```
  }
 ELSE
  h.statusPtr↑ ← [
   error[
   fault: [
   problem: problem, severity: severity, functionFault: functionFault,
   side: h.side, sheetNumber: h.sheetNumber, copyNumber: 1]]];
 END;
ShortNumberMesa: PUBLIC PROCEDURE [h: PreParserCommon.MainHandle]
 RETURNS [loop: BOOLEAN ← FALSE] =
 BEGIN
 h.stackEntry ← [
  type: fixedPointReal,
  frameData: fixedPointReal[
  fixed: [
  if[
  int: h.pc.tokenOverlay.shortNumber - PreParserInterpress.shortNumberBias,
  frac: 0]]]];
 IF PreParserFrameStack.PushStack[h: h].extendZone THEN {
  h.pc.pcm.savedAction ← PrePushStack; RETURN[TRUE]; };
 END;
InitializeModuleA: PUBLIC PROCEDURE = BEGIN END;

END.
```

Copyright © 1992 Xerox Corporation All Rights Reserved

```
DIRECTORY
 InternalIP USING [PixelPoint, Token],
 IPMicrocode USING [CALL],
 IPFunction USING [
  AllocateNodeNFL, PreCheckGraphic, PrePutToken, PreTransformIPPoint],
 PreParserCommon USING [
  MainHandle, Outline, TrajectoryPtr, TrajectoryRecordPtr, StackEntry],
 PreParserExtra USING [TransformIPPoint, TransformIPVector],
 PreParserFilled USING [],
 PreParserFrameStack USING [ComplexNodeRefCount, PopStack, PushStack],
 PreParserMainErrors USING [invalidOperandTypeOnStack, unexpectedMark],
 PreParserMainOps USING [CheckGraphic, PutToken],
 PreParserStroke USING [PutTrajectory];

PreParserFilledImpl: PROGRAM
 IMPORTS
  IPMicrocode, PreParserExtra, PreParserFrameStack, PreParserMainOps,
  PreParserStroke
 EXPORTS PreParserFilled =
 BEGIN

 MakeOutline: PUBLIC PROCEDURE [h: PreParserCommon.MainHandle]
  RETURNS [loop: BOOLEAN ← FALSE] =
  BEGIN
  numElements: CARDINAL ← CARDINAL[h.sv.operand01.integer];
  temp: PreParserCommon.StackEntry;

  IF h.sv.operand01.integer <= 0 THEN {
   h.pc.pcm.data.code ← PreParserMainErrors.invalidOperandTypeOnStack;
   h.pc.pcm.action ← fatalError;
   RETURN[loop: TRUE];
   };

  h.pc.pcm.nodeSizeInWords ←
   SIZE[PreParserCommon.Outline] +
    (SIZE[PreParserCommon.TrajectoryPtr] * numElements);
  h.pc.pcm.zoneRecPtr ← @h.zone;
  IF IPMicrocode.CALL[
   function: IPFunction.AllocateNodeNFL, entryContext: h].result # 0 THEN {
   h.pc.pcm.savedAction ← makeOutline; RETURN[loop: TRUE]; };
  h.stackEntry ← [
   type: outline, frameData: outline[outlinePtr: h.pc.pcm.nodePtr]];
  h.stackEntry.outlinePtr.cn ← [
   fill: 0, preambleOwned: FALSE, referenceCount: 1, next: NIL, type: outLine,
   zoneRecPtr: @h.zone];
  h.stackEntry.outlinePtr.odd ← h.pc.pcm.action = makeOutlineOdd;
  h.stackEntry.outlinePtr.trajectoryCount ← numElements;
  h.stackEntryPtr ← @temp;
```

Copyright © 1992 Xerox Corporation All Rights Reserved

```
FOR i: CARDINAL DECREASING IN [0..numElements) DO
 IF PreParserFrameStack.PopStack[h: h].fatalError THEN RETURN[loop: TRUE];
 IF h.stackEntryPtr.type = mark THEN {
  h.pc.pcm.action ← fatalError;
  h.pc.pcm.data.code ← PreParserMainErrors.unexpectedMark;
  RETURN[loop: TRUE];
  };
 IF h.stackEntryPtr.type # trajectory THEN {
  h.pc.pcm.action ← fatalError;
  h.pc.pcm.data.code ← PreParserMainErrors.invalidOperandTypeOnStack;
  RETURN[loop: TRUE];
  };
 h.stackEntry.outlinePtr.trajectories[i] ← h.stackEntryPtr.trajectory;
 ENDLOOP;

IF PreParserFrameStack.PushStack[h: h].extendZone THEN {
 h.pc.pcm.savedAction ← PrePushStack; RETURN[loop: TRUE]; };
END;
MaskFill: PUBLIC PROCEDURE [h: PreParserCommon.MainHandle]
RETURNS [loop: BOOLEAN ← FALSE] =
BEGIN
trajCount: CARDINAL ← h.sv.operand01.outlinePtr.trajectoryCount;
currentRecPtr: PreParserCommon.TrajectoryRecordPtr;

IF h.pc.operationStage = 0 THEN {
 outlineWords: CARDINAL ← 0;
 h.tempData.currentWords ← 0;
 h.tempData.strokeOffset ← 0;
 h.tempData.trajNum ← 0;

 IF IPMicrocode.CALL[
  function: IPFunction.PreCheckGraphic, entryContext: h].result # 0 THEN {
  h.pc.pcm.savedAction ← maskFill; RETURN[loop: TRUE]; };

 FOR i: CARDINAL IN [0..trajCount) DO
  currentRecPtr ← h.sv.operand01.outlinePtr.trajectories[
   i].trajectoryRecPtr;

  outlineWords ← outlineWords + 1;
  DO
   outlineWords ← outlineWords + currentRecPtr.wordCount;
   IF currentRecPtr.nextPtr = NIL THEN EXIT
   ELSE currentRecPtr ← currentRecPtr.nextPtr;
   ENDLOOP;
  ENDLOOP;

 LOOPHOLE[@h.token, LONG POINTER TO maskFill InternalIP.Token]↑ ← [
  maskFill[
  rec: [
  offsetToNextToken: outlineWords + SIZE[BOOLEAN] + SIZE[CARDINAL],
```

Copyright © 1992 Xerox Corporation All Rights Reserved

```
   odd: h.sv.operand01.outlinePtr.odd, pad: 0,
   outline: [
   numberOfTrajectories: CARDINAL[h.sv.operand01.outlinePtr.trajectoryCount],
   trajectories: TRASH]]]];
  };

 IF h.pc.operationStage < 2 THEN
  IF IPMicrocode.CALL[
   function: IPFunction.PrePutToken, entryContext: h].result # 0 THEN {
   h.pc.operationStage ← 1;
   h.pc.pcm.savedAction ← maskFill;
   RETURN[loop: TRUE];
   };

 IF h.pc.operationStage < 2 THEN h.pc.operationStage ← 4;
 FOR i: CARDINAL IN [h.tempData.trajNum..trajCount) DO
  IF h.pc.operationStage < 5 THEN {
   h.tempData.currentPtr ← h.sv.operand01.outlinePtr.trajectories[
    i].trajectoryRecPtr;

   IF h.iipData.currentWordCount > 0 THEN {
    LOOPHOLE[h.iipData.currentWordPtr, LONG POINTER TO CARDINAL] ↑ ←
     h.sv.operand01.outlinePtr.trajectories[i].strokeCount;
    h.iipData.currentWordPtr ← h.iipData.currentWordPtr + 1;
    h.iipData.currentWordCount ← h.iipData.currentWordCount - 1;
    }
   ELSE {
    h.tempData.trajNum ← i;
    h.pc.pcm.action ← needIIPBlock;
    h.pc.pcm.savedAction ← maskFill;
    RETURN[loop: TRUE];
    };
   };

  IF PreParserStroke.PutTrajectory[h: h].loop THEN {
   h.tempData.trajNum ← i;
   h.pc.pcm.savedAction ← maskFill;
   RETURN[loop: TRUE];
   };
  ENDLOOP;

 h.pc.operationStage ← 0;

 h.nodeList ← NIL;
 PreParserFrameStack.ComplexNodeRefCount[
  h: h, entryPtr: @h.sv.operand01, delta: -1];
 END;
MaskRectangleMesa: PUBLIC PROCEDURE [h: PreParserCommon.MainHandle]
 RETURNS [loop: BOOLEAN] =
 BEGIN
```

Copyright © 1992 Xerox Corporation All Rights Reserved

```
IF PreParserMainOps.CheckGraphic[h: h].needIIPBlock THEN {

 h.pc.pcm.savedAction ← PreMaskRectangle; RETURN[loop: TRUE]; };

h.stackEntryPtr ← @h.sv.operand01;
PreParserExtra.TransformIPPoint[h: h];

h.P2 ← h.P1;
h.stackEntryPtr ← @h.sv.operand03;

PreParserExtra.TransformIPVector[h: h];

h.P1.x.li ← h.P2.x.li + h.P1.x.li;

h.P1.y.li ← h.P2.y.li + h.P1.y.li;

IF h.imagerVars.color.type = grayColor THEN
 LOOPHOLE[@h.token, LONG POINTER TO maskRectangle InternalIP.Token] ↑ ← [
  var: maskRectangle[rec: [p1: h.P1, p2: h.P2]]]
ELSE
 LOOPHOLE[@h.token, LONG POINTER TO maskRectSampledColor InternalIP.Token] ↑
←
  [var: maskRectSampledColor[rec: [p1: h.P1, p2: h.P2]]];

IF PreParserMainOps.PutToken[h: h].needIIPBlock THEN {
 h.pc.pcm.savedAction ← PrePutToken; RETURN[loop: TRUE]; };

RETURN[loop: FALSE];
END;
MaskTrapezoidX: PUBLIC PROCEDURE [h: PreParserCommon.MainHandle]
RETURNS [loop: BOOLEAN ← FALSE] =
BEGIN
IF h.pc.operationStage = 0 THEN {
 p1, p2, p3, p4: InternalIP.PixelPoint;
 IF IPMicrocode.CALL[
  function: IPFunction.PreCheckGraphic, entryContext: h].result # 0 THEN
  BEGIN h.pc.pcm.savedAction ← maskTrapezoidX; RETURN[loop: TRUE]; END;

 h.stackEntryPtr ← @h.sv.operand01;
 [] ← IPMicrocode.CALL[
  function: IPFunction.PreTransformIPPoint, entryContext: h];
 p1 ← LOOPHOLE[h.P1];

 h.sv.operand01 ← h.sv.operand03;
 [] ← IPMicrocode.CALL[
  function: IPFunction.PreTransformIPPoint, entryContext: h];
 p2 ← LOOPHOLE[h.P1];

 h.stackEntryPtr ← @h.sv.operand04;
 [] ← IPMicrocode.CALL[
```

Copyright © 1992 Xerox Corporation All Rights Reserved

```
    function: IPFunction.PreTransformIPPoint, entryContext: h];
   p3 ← LOOPHOLE[h.P1];


   h.sv.operand04 ← h.sv.operand06;
   [] ← IPMicrocode.CALL[
    function: IPFunction.PreTransformIPPoint, entryContext: h];
   p4 ← LOOPHOLE[h.P1];

   SELECT TRUE FROM
    p1.y = p2.y AND p3.y = p4.y =>
     LOOPHOLE[@h.token, LONG POINTER TO maskTrapezoidX InternalIP.Token] ↑ ← [
      maskTrapezoidX[rec: [p1: p1, x2: p2.x, p3: p3, x4: p4.x]]];
    p1.x = p2.x AND p3.x = p4.x =>
     LOOPHOLE[@h.token, LONG POINTER TO maskTrapezoidY InternalIP.Token] ↑ ← [
      maskTrapezoidY[rec: [p1: p1, y2: p2.y, p3: p3, y4: p4.y]]];
    ENDCASE;
   }
  ELSE h.pc.operationStage ← 0;

  IF IPMicrocode.CALL[function: IPFunction.PrePutToken, entryContext: h].result
   # 0 THEN {
   h.pc.operationStage ← 1;
   h.pc.pcm.savedAction ← maskTrapezoidX;
   RETURN[loop: TRUE];
   };
  END;
 MaskTrapezoidY: PUBLIC PROCEDURE [h: PreParserCommon.MainHandle]
  RETURNS [loop: BOOLEAN ← FALSE] =
  BEGIN
  IF h.pc.operationStage = 0 THEN {
   p1, p2, p3, p4: InternalIP.PixelPoint;
   IF IPMicrocode.CALL[
    function: IPFunction.PreCheckGraphic, entryContext: h].result # 0 THEN
    BEGIN h.pc.pcm.savedAction ← maskTrapezoidY; RETURN[loop: TRUE]; END;

   h.stackEntryPtr ← @h.sv.operand01;
   [] ← IPMicrocode.CALL[
    function: IPFunction.PreTransformIPPoint, entryContext: h];
   p1 ← LOOPHOLE[h.P1];

   h.sv.operand02 ← h.sv.operand03;
   [] ← IPMicrocode.CALL[
    function: IPFunction.PreTransformIPPoint, entryContext: h];
   p2 ← LOOPHOLE[h.P1];

   h.stackEntryPtr ← @h.sv.operand04;
   [] ← IPMicrocode.CALL[
    function: IPFunction.PreTransformIPPoint, entryContext: h];
   p3 ← LOOPHOLE[h.P1];
```

Copyright © 1992 Xerox Corporation All Rights Reserved

```
   h.sv.operand05 ← h.sv.operand06;
   [] ← IPMicrocode.CALL[
    function: IPFunction.PreTransformIPPoint, entryContext: h];
   p4 ← LOOPHOLE[h.P1];

   SELECT TRUE FROM
    p1.y = p2.y AND p3.y = p4.y =>
     LOOPHOLE[@h.token, LONG POINTER TO maskTrapezoidX InternalIP.Token]↑ ←[
      maskTrapezoidX[rec: [p1: p1, x2: p2.x, p3: p3, x4: p4.x]]];
    p1.x = p2.x AND p3.x = p4.x =>
     LOOPHOLE[@h.token, LONG POINTER TO maskTrapezoidY InternalIP.Token]↑ ←[
      maskTrapezoidY[rec: [p1: p1, y2: p2.y, p3: p3, y4: p4.y]]];
    ENDCASE;
  }
  ELSE h.pc.operationStage ← 0;

  IF IPMicrocode.CALL[function: IPFunction.PrePutToken, entryContext: h].result
   # 0 THEN {
   h.pc.operationStage ← 1;
   h.pc.pcm.savedAction ← maskTrapezoidY;
   RETURN[loop: TRUE];
   };
  END;
 Initialize: PUBLIC PROCEDURE = BEGIN END;
 END.
```

Copyright © 1992 Xerox Corporation All Rights Reserved

```
DIRECTORY
 CoalescerTable USING [UnknownFontEntryLinkHandle, UnknownFontEntry],
 DecomposerCommon USING [ObjectIndexNull],
 Heap USING [Error],
 InternalIP USING [Token],
 IPMicrocode USING [CALL],
 IPFunction USING [
  AllocateNode4, AllocateNode16, AllocateNode32, AllocateNode64, FreeNode16,
  ParserType, PrePushStack],
 PreParserColor USING [CheckVectorOfIdent],
 PreParserCommon USING [
  AllocateNode16Size, AllocateNode32Size, AllocateNode64Size, Assertion, Font,
  FontLookupRec, FontLookupRecPtr, FontPtr, FoundFont, FoundFontPtr,
  FrameEntryRange, MainHandle, maxFonts, foundFontMaxCount, Transformation,
  TransformationPtr, StackEntry, StackEntryPtr, VectorOfElementsPtr],
 PreParserFont USING [],
 PreParserFrameStack USING [ChangeRefCountAndFree, ComplexNodeRefCount],
 PreParserInline USING [CloseUnknownFontEntry, OpenUnknownFontEntry],
 PreParserInstructions USING [EqualIds, StringValue],
 PreParserMainErrors USING [
  badFrameIndex, invalidTypeForSetFont, invalidOperandTypeOnStack,
  noFontSpecified, smHeapAllocationError],
 PreParserMainOps USING [CheckGraphic, CheckTextVars, PutToken],
 PreParserTForm USING [Concatenate, ConvertPPCTransToTMatrix],
 Real USING [RoundLI],
 ResMgr USING [Error],
 String USING [AppendChar, AppendString, Equal, ExpandString, Length],
 Transformation USING [Matrix];

PreParserFontImpl: PROGRAM
 IMPORTS
  Heap, IPMicrocode, PreParserColor, PreParserFrameStack, PreParserInline,
  PreParserInstructions, PreParserMainOps, PreParserTForm, Real, ResMgr, String
 EXPORTS PreParserFont =
 BEGIN

 FontEntryPtr: TYPE = LONG POINTER TO CoalescerTable.UnknownFontEntry ← NIL;

 AllocateNode4Check: PreParserCommon.Assertion =
  (SIZE[PreParserCommon.FoundFont] <= 4);
 AllocateNode16Check: PreParserCommon.Assertion =
  (SIZE[PreParserCommon.Font] <= PreParserCommon.AllocateNode16Size);
 AllocateNode32Check: PreParserCommon.Assertion =
  (SIZE[PreParserCommon.Transformation] <= PreParserCommon.AllocateNode32Size);
 AllocateNode64Check: PreParserCommon.Assertion =
  (SIZE[PreParserCommon.FontLookupRec] <= PreParserCommon.AllocateNode64Size);

 ExtendZone: SIGNAL = CODE;
```

Copyright © 1992 Xerox Corporation All Rights Reserved

```
FindFont: PUBLIC PROCEDURE [h: PreParserCommon.MainHandle]
 RETURNS [loop: BOOLEAN] = {
 IF PreParserColor.CheckVectorOfIdent[h].failed THEN {
  h.pc.pcm.data.code ← PreParserMainErrors.invalidOperandTypeOnStack;
  h.pc.pcm.action ← fatalError;
  RETURN[loop: TRUE]};
 h.pc.pcm.zoneRecPtr ← @h.zone;
 IF IPMicrocode.CALL[IPFunction.AllocateNode16, h] # 0 THEN {
  h.pc.pcm.savedAction ← findFont; RETURN[loop: TRUE]};
 h.stackEntry ← [
  type: font, frameData: font[fontPtr: NARROW[h.pc.pcm.nodePtr]]];
 h.stackEntry.fontPtr ↑ ← [
  cn: [
  fill: 0, preambleOwned: FALSE, referenceCount: 1, next: NIL, type: font,
  zoneRecPtr: @h.zone], name: h.sv.operand01.vectorPtr,
  transformationPtr: NIL, index: h.currentFoundFontIndex];
 h.currentFoundFontIndex ← h.currentFoundFontIndex + 1;
 IF IPMicrocode.CALL[IPFunction.PrePushStack, h] # 0 THEN {
  h.pc.pcm.savedAction ← PrePushStack; RETURN[loop: TRUE]};
 RETURN[loop: FALSE];
 };
ModifyFont: PUBLIC PROCEDURE [h: PreParserCommon.MainHandle]
 RETURNS [loop: BOOLEAN] = {
 h.pc.pcm.zoneRecPtr ← @h.zone;
 IF IPMicrocode.CALL[IPFunction.AllocateNode16, h] # 0 THEN {
  h.pc.pcm.savedAction ← modifyFont; RETURN[loop: TRUE]};

 h.sv.operand03.type ← font;
 h.sv.operand03.fontPtr ← h.pc.pcm.nodePtr;
 h.sv.operand03.fontPtr ↑ ← h.sv.operand01.fontPtr ↑ ;

 h.sv.operand03.fontPtr.cn.referenceCount ← 1;
 h.sv.operand03.fontPtr.cn.zoneRecPtr ← @h.zone;

 IF h.sv.operand01.fontPtr.transformationPtr = NIL THEN
  h.sv.operand03.fontPtr.transformationPtr ← h.sv.operand02.transformationPtr
 ELSE {
  h.pc.pcm.zoneRecPtr ← @h.zone;
  IF IPMicrocode.CALL[IPFunction.AllocateNode32, h] # 0 THEN {
   h.pc.pcm.nodePtr ← h.sv.operand03.fontPtr;
   [] ← IPMicrocode.CALL[IPFunction.FreeNode16, h];
   h.pc.pcm.savedAction ← modifyFont;
   RETURN[loop: TRUE];
   };
  h.sv.operand03.fontPtr.transformationPtr ← h.pc.pcm.nodePtr;
  PreParserTForm.Concatenate[
   h: h, t1: h.sv.operand01.fontPtr.transformationPtr,
   t2: h.sv.operand02.transformationPtr,
   tResult: h.sv.operand03.fontPtr.transformationPtr];
```

Copyright © 1992 Xerox Corporation All Rights Reserved

```
   PreParserFrameStack.ChangeRefCountAndFree[
    h: h, ptr: h.sv.operand02.transformationPtr, delta: -1];
   PreParserFrameStack.ChangeRefCountAndFree[
    h: h, ptr: h.sv.operand01.fontPtr.transformationPtr, delta: -1];
   };

  PreParserFrameStack.ChangeRefCountAndFree[
   h: h, ptr: h.sv.operand01.fontPtr, delta: -1];
  h.stackEntry ← h.sv.operand03;
  h.stackEntryPtr ← @h.stackEntry;
  IF IPMicrocode.CALL[IPFunction.PrePushStack, h] # 0 THEN {
   h.pc.pcm.savedAction ← PrePushStack; RETURN[loop: TRUE]};
  RETURN[loop: FALSE];
  };
 SetFontMesa: PUBLIC PROCEDURE [h: PreParserCommon.MainHandle]
  RETURNS [loop: BOOLEAN] = {
  IF h.sv.operand01.integer NOT IN PreParserCommon.FrameEntryRange THEN {
   h.pc.pcm.action ← fatalError;
   h.pc.pcm.data.code ← PreParserMainErrors.badFrameIndex;
   RETURN[loop: TRUE]};

  PreParserFrameStack.ComplexNodeRefCount[
   h: h, entryPtr: @h.imagerVars.font, delta: -1];
  h.imagerVars.font ← h.framePtr.entries[h.sv.operand01.integer];
  IF h.imagerVars.font.type # font THEN {
   h.pc.pcm.action ← fatalError;
   h.pc.pcm.data.code ← PreParserMainErrors.invalidTypeForSetFont;
   RETURN[loop: TRUE]};

  PreParserFrameStack.ComplexNodeRefCount[
   h: h, entryPtr: @h.imagerVars.font, delta: 1];

  h.iipData.fontChanged ← TRUE;
  h.imagerVars.fontIndex ← DecomposerCommon.ObjectIndexNull;
  RETURN[loop: FALSE];
  };
 CheckFontMesa: PUBLIC PROCEDURE [h: PreParserCommon.MainHandle]
  RETURNS [loop: BOOLEAN ← FALSE] =
  BEGIN
  ENABLE {
   Heap.Error, ResMgr.Error = > {
    h.pc.pcm.action ← fatalError;
    h.pc.pcm.data.code ← PreParserMainErrors.smHeapAllocationError;
    loop ← TRUE;
    CONTINUE};
   ExtendZone = > {loop ← TRUE; CONTINUE};
   };
  IF h.iipData.fontChanged THEN {
   IF h.imagerVars.fontIndex = DecomposerCommon.ObjectIndexNull THEN {
    IF h.imagerVars.font.type = null THEN {
```

Copyright © 1992 Xerox Corporation All Rights Reserved

```
    h.pc.pcm.action ← fatalError;
    h.pc.pcm.data.code ← PreParserMainErrors.noFontSpecified;
    RETURN[loop: TRUE]};
   };
  h.imagerVars.fontIndex ← GetFontIndexInCoalesce[h];
  IF h.iipData.imagerVars.fontIndex # h.imagerVars.fontIndex THEN {
   LOOPHOLE[@h.token, LONG POINTER TO setFont InternalIP.Token] ↑ ← [
    setFont[[index: h.imagerVars.fontIndex]]];
   IF PreParserMainOps.PutToken[h: h].needIIPBlock THEN RETURN[loop: TRUE];
   h.iipData.imagerVars.fontIndex ← h.imagerVars.fontIndex;
   };
  h.iipData.fontChanged ← FALSE;
  };

 IF PreParserMainOps.CheckGraphic[h: h].needIIPBlock THEN RETURN[loop: TRUE];

 IF PreParserMainOps.CheckTextVars[h: h].loop THEN RETURN[loop: TRUE];

 END;


GetFontIndexInCoalesce: PROC [h: PreParserCommon.MainHandle]
 RETURNS [CARDINAL] = {
 saveC: REAL = h.imagerVars.t.c;
 saveF: REAL = h.imagerVars.t.f;
 found: BOOLEAN;
 foundFontPtr: PreParserCommon.FoundFontPtr;
 charToDevice: Transformation.Matrix;
 defaultTransformation, tempT: PreParserCommon.Transformation;
 currentFont: PreParserCommon.FontPtr ← h.imagerVars.font.fontPtr;
 fontTransformation: PreParserCommon.TransformationPtr ←
  IF currentFont.transformationPtr = NIL THEN @defaultTransformation
  ELSE currentFont.transformationPtr;
 authorityID, charCodeID, typeFaceID, tempStr: LONG STRING ← NIL;
 BEGIN
 ENABLE
  UNWIND => {
   IF authorityID # NIL THEN h.smZone.FREE[@authorityID];
   IF charCodeID # NIL THEN h.smZone.FREE[@charCodeID];
   IF typeFaceID # NIL THEN h.smZone.FREE[@typeFaceID];
   IF tempStr # NIL THEN h.smZone.FREE[@tempStr];
   };

 h.imagerVars.t.c ← h.imagerVars.t.f ← 0.0;
 PreParserTForm.Concatenate[h, fontTransformation, @h.imagerVars.t, @tempT];
 PreParserTForm.ConvertPPCTransToTMatrix[@tempT, @charToDevice];
 RoundTransformation[@charToDevice];
 h.imagerVars.t.c ← saveC;
 h.imagerVars.t.f ← saveF;
```

Copyright © 1992 Xerox Corporation All Rights Reserved

```
[found, foundFontPtr] ← LookUpFont[h, currentFont, @charToDevice];
IF found THEN RETURN[foundFontPtr.indexInCoalesce];


IF PreParserInline.OpenUnknownFontEntry[h: h].error THEN
 ERROR Heap.Error[insufficientSpace];

FOR i: CARDINAL IN [0..currentFont.name.count) DO
 elementPtr: PreParserCommon.StackEntryPtr = @currentFont.name.elements[i];
 SELECT i FROM
  0 =>
   authorityID ← PreParserInstructions.StringValue[h.smZone, elementPtr];
  1 => charCodeID ← PreParserInstructions.StringValue[h.smZone, elementPtr];
  ENDCASE => {
   IF typeFaceID = NIL THEN
    typeFaceID ← PreParserInstructions.StringValue[h.smZone, elementPtr]
   ELSE {
    tempStr ← PreParserInstructions.StringValue[h.smZone, elementPtr];
    String.ExpandString[
     @typeFaceID, (String.Length[tempStr] + 1), h.smZone];
    String.AppendChar[typeFaceID, '/];
    String.AppendString[typeFaceID, tempStr];
    h.smZone.FREE[@tempStr]};
   };
 ENDLOOP;

h.unknownFontEntryPtr↑ ← [
 authorityID: authorityID, charCodeID: charCodeID, typeFaceID: typeFaceID,
 transformation: charToDevice];

foundFontPtr.indexInCoalesce ← h.unknownFontTableTotalLength;
foundFontPtr.coalesceEntry ← h.unknownFontEntryPtr;

PreParserInline.CloseUnknownFontEntry[h: h];
END;
RETURN[h.unknownFontTableTotalLength - 1];
};

LookUpFont: PROC [
 h: PreParserCommon.MainHandle, font: PreParserCommon.FontPtr,
 charToDevice: LONG POINTER TO Transformation.Matrix]
 RETURNS [found: BOOLEAN ← FALSE, foundFontPtr: PreParserCommon.FoundFontPtr]
=
 {
 fontName: PreParserCommon.VectorOfElementsPtr = font.name;
 index: CARDINAL ← 0;
 tablePtr: LONG POINTER TO PreParserCommon.FoundFontPtr ← GetFoundFontInfo[
  h, font.index];
 foundFontPtr ← tablePtr↑;
 IF foundFontPtr # NIL
```

Copyright © 1992 Xerox Corporation All Rights Reserved

```
  AND TransformationEqual[
   charToDevice, @foundFontPtr.coalesceEntry.transformation] THEN
  RETURN[TRUE, foundFontPtr];
 IF foundFontPtr = NIL THEN {
  h.pc.pcm.zoneRecPtr ← @h.zone;
  IF IPMicrocode.CALL[IPFunction.AllocateNode4, h] # 0 THEN SIGNAL ExtendZone;
  tablePtr ↑ ← foundFontPtr ← LOOPHOLE[h.pc.pcm.nodePtr];
  };
 FOR fontTable: CoalescerTable.UnknownFontEntryLinkHandle ←
  h.unknownFontTablePtrStart, fontTable.next UNTIL fontTable = NIL DO
  tableSize: CARDINAL =
   IF (fontTable = h.unknownFontTablePtrCurrent) THEN
   h.unknownFontTableCurrentLength ELSE PreParserCommon.maxFonts;
  FOR i: CARDINAL IN [0..tableSize) DO
   IF FontEntryEqual[@fontTable.list[i], fontName, charToDevice, h.smZone]
    THEN {
    foundFontPtr.indexInCoalesce ← index;
    foundFontPtr.coalesceEntry ← @fontTable.list[i];
    RETURN[TRUE, foundFontPtr]};
   index ← index + 1;
   ENDLOOP;
  ENDLOOP;
 };

GetFoundFontInfo: PROC [h: PreParserCommon.MainHandle, fontIndex: CARDINAL]
 RETURNS [foundFontPtr: LONG POINTER TO PreParserCommon.FoundFontPtr] = {
 tablePtr: PreParserCommon.FontLookupRecPtr ← @h.fontLookup;
 WHILE fontIndex >= PreParserCommon.foundFontMaxCount DO
  fontIndex ← fontIndex - PreParserCommon.foundFontMaxCount;
  IF tablePtr.next = NIL THEN {
   h.pc.pcm.zoneRecPtr ← @h.zone;
   IF IPMicrocode.CALL[IPFunction.AllocateNode64, h] # 0 THEN
    SIGNAL ExtendZone;
   tablePtr.next ← h.pc.pcm.nodePtr;
   tablePtr.next ↑ ← [next: NIL, table: ALL[NIL]];
   };
  tablePtr ← tablePtr.next;
  ENDLOOP;
 RETURN[@tablePtr.table[fontIndex]];
 };

TransformationEqual: PROC [s, t: LONG POINTER TO Transformation.Matrix]
 RETURNS [BOOLEAN] = INLINE {
 RETURN[
  s.a = t.a AND s.b = t.b AND s.c = t.c AND s.d = t.d AND s.e = t.e
   AND s.f = t.f];
 };

RoundTransformation: PROC [t: LONG POINTER TO Transformation.Matrix] = {
 t.a ← REAL[Real.RoundLI[t.a]];
```

Copyright © 1992 Xerox Corporation All Rights Reserved

```
 t.b ← REAL[Real.RoundLI[t.b]];
 t.c ← REAL[Real.RoundLI[t.c]];
 t.d ← REAL[Real.RoundLI[t.d]];
 t.e ← REAL[Real.RoundLI[t.e]];
 t.f ← REAL[Real.RoundLI[t.f]];
 };

FontEntryEqual: PROC [
 cTableEntry: FontEntryPtr, fontVector: PreParserCommon.VectorOfElementsPtr,
 charToDevice: LONG POINTER TO Transformation.Matrix, z: UNCOUNTED ZONE]
 RETURNS [equal: BOOLEAN ← TRUE] = {
 vSize: CARDINAL = fontVector.count;
 numberOfCompares: CARDINAL = MIN[vSize, 3];
 FOR i: CARDINAL IN [0..numberOfCompares) DO
  vElement: PreParserCommon.StackEntryPtr = @fontVector.elements[i];
  SELECT i FROM
   0 =>
    IF NOT PreParserInstructions.EqualIds[cTableEntry.authorityID, vElement]
     THEN RETURN[FALSE];
   1 =>
    IF NOT PreParserInstructions.EqualIds[cTableEntry.charCodeID, vElement]
     THEN RETURN[FALSE];
   ENDCASE => {
    IF vSize > 3 THEN {
     concatedString: LONG STRING ← SubStringFromVector[
      2, (vSize - 1), fontVector, z];
     stringsEqual: BOOLEAN = String.Equal[
      cTableEntry.typeFaceID, concatedString];
     z.FREE[@concatedString];
     IF NOT stringsEqual THEN RETURN[FALSE];
     }
    ELSE {
     IF NOT PreParserInstructions.EqualIds[
      cTableEntry.typeFaceID, vElement] THEN RETURN[FALSE];
     };
    };
  ENDLOOP;
 FOR i: CARDINAL IN [(numberOfCompares + 1)..3] DO
  SELECT i FROM
   1 => IF cTableEntry.authorityID # NIL THEN RETURN[FALSE];
   2 => IF cTableEntry.charCodeID # NIL THEN RETURN[FALSE];
   ENDCASE => IF cTableEntry.typeFaceID # NIL THEN RETURN[FALSE];
  ENDLOOP;
 IF NOT TransformationEqual[@cTableEntry.transformation, charToDevice] THEN
  RETURN[FALSE];
 };

SubStringFromVector: PROC [
 start, end: CARDINAL, v: PreParserCommon.VectorOfElementsPtr,
 z: UNCOUNTED ZONE] RETURNS [subString: LONG STRING ← NIL] = {
```

Copyright © 1992 Xerox Corporation All Rights Reserved

```
tempStr: LONG STRING ← NIL;
subString ← PreParserInstructions.StringValue[z, @v.elements[start]];
BEGIN
ENABLE UNWIND => {z.FREE[@subString]; z.FREE[@tempStr]};
FOR i: CARDINAL IN [(start + 1)..end] DO
 tempStr ← PreParserInstructions.StringValue[z, @v.elements[i]];
 String.ExpandString[@subString, (String.Length[tempStr] + 1), z];
 String.AppendChar[subString, '/];
 String.AppendString[subString, tempStr];
 z.FREE[@tempStr];
 ENDLOOP;
END;
};

Initialize: PUBLIC PROCEDURE = BEGIN END;
END.
```

Copyright © 1992 Xerox Corporation All Rights Reserved

```
DIRECTORY
 Inline USING [LongCOPY],
 IPFunction USING [FreeNodeFFL, FreeNodeNFL, FreeNode16, FreeNode64],
 IPMicrocode USING [CALL],
 ParserCommon USING [ZoneRecPtr],
 ParserZone USING [AllocateNodeFFL, AllocateNode64, FreeNode64, GuaranteeNode64],
 PreParserCommon,
 PreParserData USING [StackType],
 PreParserFrameStack USING [],
 PreParserMainErrors USING [stackUnderflow];

PreParserFrameStackImpl: MONITOR
 IMPORTS Inline, IPMicrocode, ParserZone EXPORTS PreParserFrameStack =

 BEGIN

 AllocateNode64Check: PreParserCommon.Assertion =
  (SIZE[PreParserCommon.StackRecord] <= PreParserCommon.AllocateNode64Size);

 ChangeOneComplexNodeRefCount: PUBLIC ENTRY PROCEDURE [
  cnPtr: LONG POINTER TO PreParserCommon.ComplexNode, delta: INTEGER]
  RETURNS [] =
  BEGIN
  ENABLE UNWIND => NULL;
  cnPtr.referenceCount ← cnPtr.referenceCount + delta;
  END;

 timesFreeNodeNFLCalled: CARDINAL ← 0;
 BumpCounter: PROC [] = {timesFreeNodeNFLCalled ← timesFreeNodeNFLCalled + 1};

 ChangeRefCountAndFree: PUBLIC ENTRY PROCEDURE [
  h: PreParserCommon.MainHandle, ptr: LONG POINTER, delta: INTEGER] RETURNS [] =
  BEGIN
  ENABLE UNWIND => NULL;

  IF ptr # NIL THEN {
   cnPtr: LONG POINTER TO PreParserCommon.ComplexNode ← LOOPHOLE[ptr, LONG
     POINTER TO PreParserCommon.ComplexNode];

   IF (cnPtr.referenceCount ← cnPtr.referenceCount + delta) = 0
    AND cnPtr.zoneRecPtr # NIL THEN {
    h.pc.pcm.zoneRecPtr ← cnPtr.zoneRecPtr;
    h.pc.pcm.nodePtr ← ptr;
    SELECT cnPtr.type FROM
     clipper, font =>
      [] ← IPMicrocode.CALL[
       function: IPFunction.FreeNode16, entryContext: h];

     composedOp => {
```

Copyright © 1992 Xerox Corporation All Rights Reserved

```
    composedOpPtr: PreParserCommon.ComposedOpPtr ← LOOPHOLE[ptr,
     PreParserCommon.ComposedOpPtr];
    WITH x: composedOpPtr SELECT FROM
     normal => {
      composedOpBlockPtr: PreParserCommon.ComposedOpBlockPtr;
      h.pc.pcm.nodePtr ← composedOpBlockPtr ← x.first;
      UNTIL h.pc.pcm.nodePtr = NIL DO
       composedOpBlockPtr ← composedOpBlockPtr.next;
       BumpCounter[];
       [] ← IPMicrocode.CALL[
        function: IPFunction.FreeNodeNFL, entryContext: h];
       h.pc.pcm.nodePtr ← composedOpBlockPtr;
       ENDLOOP};
     ENDCASE => NULL;
    h.pc.pcm.nodePtr ← ptr;
    [] ← IPMicrocode.CALL[
     function: IPFunction.FreeNode16, entryContext: h]};

   trajectory => {
    trajectoryPtr: PreParserCommon.TrajectoryPtr ← LOOPHOLE[ptr,
     PreParserCommon.TrajectoryPtr];
    h.pc.pcm.nodePtr ← trajectoryPtr.trajectoryRecPtr;
    UNTIL h.pc.pcm.nodePtr = NIL DO
     trajectoryPtr.trajectoryRecPtr ←
      trajectoryPtr.trajectoryRecPtr.nextPtr;
     [] ← IPMicrocode.CALL[
      function: IPFunction.FreeNode64, entryContext: h];
     h.pc.pcm.nodePtr ← trajectoryPtr.trajectoryRecPtr;
     ENDLOOP;
    h.pc.pcm.nodePtr ← ptr;
    [] ← IPMicrocode.CALL[
     function: IPFunction.FreeNode16, entryContext: h]};

   pixelVector => {
    pixelVectorPtr: PreParserCommon.PixelVectorPtr ← LOOPHOLE[ptr,
     PreParserCommon.PixelVectorPtr];
    IF pixelVectorPtr.inMemoryReferencePtr # NIL THEN {
     h.pc.pcm.nodePtr ← pixelVectorPtr.inMemoryReferencePtr;
     BumpCounter[];
     [] ← IPMicrocode.CALL[
      function: IPFunction.FreeNodeNFL, entryContext: h]};
    h.pc.pcm.nodePtr ← ptr;
    BumpCounter[];
    [] ← IPMicrocode.CALL[
     function: IPFunction.FreeNodeNFL, entryContext: h]};

   color => {
    colorPtr: PreParserCommon.ColorPtr ← LOOPHOLE[ptr,
     PreParserCommon.ColorPtr];
    IF colorPtr.inkWellDataPtr # NIL THEN {
```

Copyright © 1992 Xerox Corporation All Rights Reserved

```
      h.pc.pcm.nodePtr ← colorPtr.inkWellDataPtr;
      BumpCounter[];
      [] ← IPMicrocode.CALL[
       function: IPFunction.FreeNodeNFL, entryContext: h]};
     h.pc.pcm.nodePtr ← ptr;
     BumpCounter[];
     [] ← IPMicrocode.CALL[
      function: IPFunction.FreeNodeNFL, entryContext: h]};

    ENDCASE = > {
     BumpCounter[];
     [] ← IPMicrocode.CALL[
      function: IPFunction.FreeNodeNFL, entryContext: h];
     };
   };
  };
 RETURN;
 END;
ComplexNodeRefCount: PUBLIC PROCEDURE [
 h: PreParserCommon.MainHandle, entryPtr: PreParserCommon.StackEntryPtr,
 delta: INTEGER] RETURNS [] =
 BEGIN
 entrantStackEntryPtr: PreParserCommon.StackEntryPtr ← h.stackEntryPtr;

 IF h.stackEntryPtr = NIL THEN RETURN;
 h.stackEntryPtr ← entryPtr;
 SELECT h.stackEntryPtr.type FROM
  IN [null..mark] = > NULL;
  composedOp = > {
   WITH x: h.stackEntryPtr.composedOpPtr SELECT FROM
    normal = > {
     IF INTEGER[(x.cn.referenceCount + delta)] = 0 THEN {
      savedFramePtr: PreParserCommon.FramePtr ← h.framePtr;
      savedStackEntryPtr: PreParserCommon.StackEntryPtr ← h.stackEntryPtr;
      h.framePtr ← x.initialFrame;
      CleanUpFrames[h: h, delta: delta];
      h.framePtr ← savedFramePtr;
      h.stackEntryPtr ← savedStackEntryPtr}};
    special = > NULL;
    knownDecompressor = > NULL;
    otherDecompressor = > {
     savedStackEntryPtr: PreParserCommon.StackEntryPtr ← h.stackEntryPtr;
     tempStackEntry: vectorOfElements PreParserCommon.StackEntry ← [
      fill: 0, type: vectorOfElements,
      frameData: vectorOfElements[vectorPtr: x.decompressorNamePtr]];
     ComplexNodeRefCount[h: h, entryPtr: @tempStackEntry, delta: delta];
     h.stackEntryPtr ← savedStackEntryPtr;
     };
    colorOpOrModelOp = >
     IF x.colorOp THEN {
```

Copyright © 1992 Xerox Corporation All Rights Reserved

```
    savedStackEntryPtr: PreParserCommon.StackEntryPtr ← h.stackEntryPtr;
    tempStackEntry: vectorOfElements PreParserCommon.StackEntry ← [
     fill: 0, type: vectorOfElements,
     frameData: vectorOfElements[vectorPtr: x.params]];
    ComplexNodeRefCount[h: h, entryPtr: @tempStackEntry, delta: delta];
    h.stackEntryPtr ← savedStackEntryPtr;
    };
   ENDCASE => ERROR;
  ChangeRefCountAndFree[
   h: h, ptr: h.stackEntryPtr.composedOpPtr, delta: delta];
  };
 pixelArray => {
  SELECT h.stackEntryPtr.pixelArray.type FROM
   sif => NULL;
   embedded => {
    ChangeRefCountAndFree[
     h: h, ptr: h.stackEntryPtr.pixelArray.pv, delta: delta];
    ChangeRefCountAndFree[
     h: h, ptr: h.stackEntryPtr.pixelArray.m, delta: delta];
    };
   ENDCASE => ERROR;

  ChangeRefCountAndFree[
   h: h, ptr: h.stackEntryPtr.pixelArray, delta: delta];
  };
 font => {
  savedStackEntryPtr: PreParserCommon.StackEntryPtr ← h.stackEntryPtr;
  tempStackEntry: vectorOfElements PreParserCommon.StackEntry ← [
   fill: 0, type: vectorOfElements,
   frameData: vectorOfElements[vectorPtr: h.stackEntryPtr.fontPtr.name]];
  ComplexNodeRefCount[h: h, entryPtr: @tempStackEntry, delta: delta];
  h.stackEntryPtr ← savedStackEntryPtr;
  ChangeRefCountAndFree[
   h: h, ptr: h.stackEntryPtr.fontPtr.transformationPtr, delta: delta];
  ChangeRefCountAndFree[h: h, ptr: h.stackEntryPtr.fontPtr, delta: delta];
  };
 outline => {
  FOR i: CARDINAL IN [0..h.stackEntryPtr.outlinePtr.trajectoryCount) DO
   ChangeRefCountAndFree[
    h: h, ptr: h.stackEntryPtr.outlinePtr.trajectories[i], delta: delta];
   ENDLOOP;
  ChangeRefCountAndFree[
   h: h, ptr: h.stackEntryPtr.outlinePtr, delta: delta];
  };
 trajectory => {
  ChangeRefCountAndFree[
   h: h, ptr: h.stackEntryPtr.trajectory, delta: delta];
  };
 vectorOfElements => {
  savedStackEntryPtr: PreParserCommon.StackEntryPtr ← h.stackEntryPtr;
```

Copyright © 1992 Xerox Corporation All Rights Reserved

```
    FOR i: CARDINAL IN [0..h.stackEntryPtr.vectorPtr.count) DO
     ComplexNodeRefCount[
      h: h, entryPtr: @h.stackEntryPtr.vectorPtr.elements[i], delta: delta];
     h.stackEntryPtr ← savedStackEntryPtr;
     ENDLOOP;
    ChangeRefCountAndFree[h: h, ptr: h.stackEntryPtr.vectorPtr, delta: delta];
    };
   pixelVector => {
    ChangeRefCountAndFree[
     h: h, ptr: h.stackEntryPtr.pixelVectorPtr, delta: delta];
    };
   transformation => {
    ChangeRefCountAndFree[
     h: h, ptr: h.stackEntryPtr.transformationPtr, delta: delta];
    };
   clipper => {
    ChangeRefCountAndFree[
     h: h, ptr: h.stackEntryPtr.clipperPtr, delta: delta];
    };
   string => {
    ChangeRefCountAndFree[h: h, ptr: h.stackEntryPtr.stringPtr, delta: delta];
    };
   color => {
    ChangeRefCountAndFree[h: h, ptr: h.stackEntryPtr.colorPtr, delta: delta];
    };
   identifier => {
    ChangeRefCountAndFree[
     h: h, ptr: h.stackEntryPtr.idStringPtr, delta: delta];
    };
   largeVector => {
    ChangeRefCountAndFree[
     h: h, ptr: h.stackEntryPtr.largeVectorPtr, delta: delta];
    };
   runOfCardinalSeq => NULL;
   runOfRunOfCardinalSeq => NULL;
   cardinal => NULL;
   ENDCASE => ERROR;
  h.stackEntryPtr ← entrantStackEntryPtr;
  END;
 CleanUpFrames: PUBLIC PROCEDURE [h: PreParserCommon.MainHandle, delta: INTEGER]
  RETURNS [] =
  BEGIN
  IF h.framePtr = NIL THEN RETURN
  ELSE {
   returnFramePtr: PreParserCommon.FramePtr ← h.framePtr.nextFrame;

   h.stackEntryPtr ← @h.framePtr.entries[0];
   THROUGH PreParserCommon.FrameEntryRange DO
    ComplexNodeRefCount[h: h, entryPtr: h.stackEntryPtr, delta: delta];
    h.stackEntryPtr ← h.stackEntryPtr + SIZE[PreParserCommon.StackEntry];
```

Copyright © 1992 Xerox Corporation All Rights Reserved

```
    ENDLOOP;

   ChangeOneComplexNodeRefCount[@h.framePtr.cn, delta];
   IF h.framePtr.cn.referenceCount = 0 THEN PopFrame[h: h];
   h.framePtr ← returnFramePtr};
  END;
 CopyFrameEntriesPtrs: PUBLIC PROCEDURE [h: PreParserCommon.MainHandle]
  RETURNS [] =
  BEGIN
  h.stackEntryPtr ← @h.tempFramePtr.entries[0];
  Inline.LongCOPY[
   from: @h.framePtr.entries[0],
   nwords: SIZE[PreParserCommon.StackEntry] * PreParserCommon.frameEntryCount,
   to: h.stackEntryPtr];
  THROUGH PreParserCommon.FrameEntryRange DO
   SELECT h.stackEntryPtr↑.type FROM
    IN [composedOp..largeVector] =>
     ComplexNodeRefCount[h: h, entryPtr: h.stackEntryPtr, delta: 1];
    ENDCASE => NULL;
   h.stackEntryPtr ← h.stackEntryPtr + SIZE[PreParserCommon.StackEntry];
   ENDLOOP;
  h.fGetFramePtr ← h.framePtr;
  h.framePtr.validEntries ← h.tempFramePtr.validEntries ← TRUE;
  RETURN[];
  END;
 CopyStackEntry: PUBLIC PROCEDURE [h: PreParserCommon.MainHandle]
  RETURNS [nullEntry: BOOLEAN] =
  BEGIN
  SELECT h.stackEntryPtr↑.type FROM
   null => RETURN[nullEntry: TRUE];
   IN [fixedPointReal..mark] => NULL;
   ENDCASE => ComplexNodeRefCount[h: h, entryPtr: h.stackEntryPtr, delta: 1];
  RETURN[nullEntry: FALSE];
  END;

 GuaranteeStackSpace: PUBLIC PROCEDURE [h: PreParserCommon.MainHandle]
  RETURNS [extendZone: BOOLEAN] = « INLINE »
  BEGIN
  IF INTEGER[PreParserCommon.stackEntryCount - h.topStackRecordEntryCount] <
   h.integer THEN h.pc.pcm.zoneRecPtr ← @h.zone;
  IF ParserZone.GuaranteeNode64[h: @h.pc.pcm].extendZone THEN
   RETURN[extendZone: TRUE];
  RETURN[extendZone: FALSE];
  END;
 ImagerVarsComplexNode: PUBLIC PROCEDURE [
  h: PreParserCommon.MainHandle, delta: INTEGER] RETURNS [] =
  BEGIN
  IF h.imagerVars.font.fontPtr # NIL THEN
   ComplexNodeRefCount[h: h, entryPtr: @h.imagerVars.font, delta: delta];
  IF h.imagerVars.color.type = color THEN
```

Copyright © 1992 Xerox Corporation All Rights Reserved

```
  ComplexNodeRefCount[h: h, entryPtr: @h.imagerVars.color, delta: delta];
 IF h.imagerVars.tPtr # NIL THEN
  ChangeRefCountAndFree[h: h, ptr: h.imagerVars.tPtr, delta: delta];
 IF h.imagerVars.tAtStartUnderline # NIL THEN
  ChangeRefCountAndFree[
   h: h, ptr: h.imagerVars.tAtStartUnderline, delta: delta];
 END;

PopFrame: PUBLIC PROCEDURE [h: PreParserCommon.MainHandle] RETURNS [] =
 BEGIN

 IF h.framePtr.frameSaveOption # do THEN
  ImagerVarsComplexNode[h: h, delta: -1];

 SELECT h.framePtr.frameSaveOption FROM
  doSave => {
   Inline.LongCOPY[
    from: @h.framePtr.imagerVars,
    nwords: PreParserCommon.imagerVarNonPersistSizeOne, to: @h.imagerVars];
   Inline.LongCOPY[
    from:
    @h.framePtr.imagerVars +
     PreParserCommon.imagerVarNonPersistSizeTwoOffset,
    nwords: PreParserCommon.imagerVarNonPersistSizeTwo,
    to: @h.imagerVars + PreParserCommon.imagerVarNonPersistSizeTwoOffset];
   };
  doSaveAll =>
   Inline.LongCOPY[
    from: @h.framePtr.imagerVars, nwords: SIZE[PreParserCommon.ImagerVars],
    to: @h.imagerVars];
  ENDCASE => NULL;
 IF h.framePtr.frameSaveOption # do THEN {
  h.iipData.fontChanged ← TRUE;
  h.iipData.graphicChanged ← TRUE;
  h.iipData.clipperChanged ← TRUE;
  h.iipData.strokeChanged ← TRUE;
  h.iipData.textImagerVarChanged ← TRUE;
  h.iipData.strokeWidthChanged ← TRUE;
  h.iipData.positionChanged ← h.framePtr.frameSaveOption = doSaveAll;
  };

 h.fGetFramePtr ← h.framePtr.nextFrame;
 h.pc.pcm.zoneRecPtr ← h.framePtr.cn.zoneRecPtr;
 h.pc.pcm.nodePtr ← h.framePtr;
 [] ← IPMicrocode.CALL[function: IPFunction.FreeNodeFFL, entryContext: h];
 h.framePtr ← h.fGetFramePtr;
 IF h.framePtr # NIL THEN h.frameSaveOption ← h.framePtr.frameSaveOption;
 IF h.pc.pcm.contextType = preParserManagerContext AND h.framePtr # NIL THEN {
  h.currentFoundFontIndex ← h.framePtr.foundFontIndex;
  h.currentInkWellIndex ← h.framePtr.inkWellBaseIndex;
```

Copyright © 1992 Xerox Corporation All Rights Reserved

```
  };
 RETURN[];
 END;
PopStack: PUBLIC PROCEDURE [h: PreParserCommon.MainHandle]
 RETURNS [fatalError: BOOLEAN] =
 BEGIN
 DO
  IF h.topStackRecordEntryCount > 0 THEN {
   h.topStackRecordEntryCount ← h.topStackRecordEntryCount - 1;
   h.stackEntryPtr↑ ← h.topStackRecordPtr↑.entries[
    h.topStackRecordEntryCount];
   EXIT;
   };
  IF PopStackRecord[h: h].fatalError THEN RETURN[fatalError: TRUE];
  ENDLOOP;
 RETURN[fatalError: FALSE];
 END;
PopStackRecord: PROCEDURE [h: PreParserCommon.MainHandle]
 RETURNS [fatalError: BOOLEAN] =
 BEGIN
 IF h.topStackRecordPtr↑.next = NIL THEN GOTO stackUnderflow;
 h.pc.pcm.zoneRecPtr ← @h.zone;
 h.pc.pcm.nodePtr ← h.topStackRecordPtr;
 h.topStackRecordPtr ← h.topStackRecordPtr↑.next;
 h.topStackRecordEntryCount ← PreParserCommon.stackEntryCount;
 ParserZone.FreeNode64[h: @h.pc.pcm];
 RETURN[fatalError: FALSE];
 EXITS
  stackUnderflow => {
   h.pc.pcm.action ← fatalError;
   h.pc.pcm.data.code ← PreParserMainErrors.stackUnderflow;
   RETURN[fatalError: TRUE];
   };
 END;
PushFrame: PUBLIC PROCEDURE [h: PreParserCommon.MainHandle]
 RETURNS [extendZone: BOOLEAN] =
 BEGIN
 h.pc.pcm.zoneRecPtr ← @h.zone;
 IF ParserZone.AllocateNodeFFL[h: @h.pc.pcm].extendZone THEN
  RETURN[extendZone: TRUE];
 h.tempFramePtr ← h.pc.pcm.nodePtr;
 h.tempFramePtr.cn ← [
  fill: 0, preambleOwned: FALSE, referenceCount: 1, next: NIL, type: frame,
  zoneRecPtr: @h.zone];
 h.tempFramePtr.frameSaveOption ← h.frameSaveOption;
 h.tempFramePtr.nextFrame ← h.framePtr;

 IF h.framePtr = NIL THEN {
  h.tempFramePtr.entries[0] ← [type: null, frameData: null[0]];
  Inline.LongCOPY[
```

Copyright © 1992 Xerox Corporation All Rights Reserved

```
  from: @h.tempFramePtr.entries[0],
  nwords:
  SIZE[PreParserCommon.StackEntry] * (PreParserCommon.frameEntryCount - 1),
  to: @h.tempFramePtr.entries[1]];
 h.fGetFramePtr ← h.tempFramePtr;
 h.tempFramePtr.validEntries ← TRUE;
 IF h.pc.pcm.contextType = preParserManagerContext THEN
  h.tempFramePtr.foundFontIndex ← h.tempFramePtr.inkWellBaseIndex ← 0;
 }
ELSE {
 IF h.pc.pcm.contextType = preParserManagerContext THEN {
  h.tempFramePtr.foundFontIndex ← h.framePtr.foundFontIndex;
  h.tempFramePtr.inkWellBaseIndex ← h.framePtr.inkWellBaseIndex;
  };
 CopyFrameEntriesPtrs[h: h];
 };

h.framePtr ← h.tempFramePtr;
h.tempFramePtr ← NIL;

SELECT h.frameSaveOption FROM
 doSave => {
  Inline.LongCOPY[
   from: @h.imagerVars, nwords: PreParserCommon.imagerVarNonPersistSizeOne,
   to: @h.framePtr.imagerVars];
  Inline.LongCOPY[
   from: @h.imagerVars + PreParserCommon.imagerVarNonPersistSizeTwoOffset,
   nwords: PreParserCommon.imagerVarNonPersistSizeTwo,
   to:
   @h.framePtr.imagerVars +
    PreParserCommon.imagerVarNonPersistSizeTwoOffset];
  };
 doSaveAll =>
  Inline.LongCOPY[
   from: @h.imagerVars, nwords: SIZE[PreParserCommon.ImagerVars],
   to: @h.framePtr.imagerVars];
 ENDCASE => NULL;
IF h.frameSaveOption # do THEN ImagerVarsComplexNode[h: h, delta: 1];

RETURN[extendZone: FALSE];
END;
PushStack: PUBLIC PROCEDURE [h: PreParserCommon.MainHandle]
 RETURNS [extendZone: BOOLEAN] =
 BEGIN
 IF h.topStackRecordEntryCount = PreParserCommon.stackEntryCount THEN
  IF PushStackRecord[h: h].extendZone THEN RETURN[extendZone: TRUE];
 h.topStackRecordPtr ↑ .entries[h.topStackRecordEntryCount] ← h.stackEntry;
 h.topStackRecordEntryCount ← h.topStackRecordEntryCount + 1;
 RETURN[extendZone: FALSE];
 END;
```

Copyright © 1992 Xerox Corporation All Rights Reserved

```
PushStackRecord: PROCEDURE [h: PreParserCommon.MainHandle]
 RETURNS [extendZone: BOOLEAN] =
 BEGIN
 h.pc.pcm.zoneRecPtr ← @h.zone;
 IF ParserZone.AllocateNode64[h: @h.pc.pcm].extendZone THEN
  RETURN[extendZone: TRUE];
 NARROW[h.pc.pcm.nodePtr, PreParserCommon.StackRecordPtr].next ←
  h.topStackRecordPtr;
 h.topStackRecordPtr ← h.pc.pcm.nodePtr;
 h.topStackRecordEntryCount ← 0;
 RETURN[extendZone: FALSE];
 END;
END.
```

Copyright © 1992 Xerox Corporation All Rights Reserved

```
DIRECTORY
 BlockStream USING [Block, Object, StreamHandle],
 FaultLogger USING [ID, Log],
 IPFunction USING [Config],
 IPMicrocode USING [CALL],
 MicroLog USING [StopLogging],
 PreParser USING [
  Command, JobProceedData, JobProceedDataPtr, ResultsErrorStatus, Status],
 PreParserCallBack USING [ObjectFault, Problem, ReportESSFault, Severity],
 PreParserControl USING [
  Handle, IPBlockEntryStatus, IPBlockListEntry, FrameHandle, LogRec, MainAction,
  MainHandle, ManagerAction, Object, PageEntryStatus, PageListEntry,
  preParserLogZone, preParserZone, ProcessorListEntry,
  ProcessorSchedulingAction],
 PreParserInstance USING [],
 PreParserMain USING [DoMainLoop],
 PreParserMainErrors USING [initializeFPUProblem],
 PreParserManager USING [DoManager],
 Process USING [Detach, EnableAborts, GetPriority, Priority, SetPriority],
 PublicPrinting USING [Plex],
 ResMgrHeap USING [MakeNode],
 ResMgrIDs USING [TransactionID],
 RTOSMP2Process USING [
  ChannelStatus, DirectProcess, MpuID, RestrictChannel, UnrestrictChannel],
 System USING [switches];

PreParserInstanceImpl: MONITOR
 IMPORTS
  FaultLogger, IPMicrocode, MicroLog, PreParserCallBack, PreParserControl,
  PreParserMain, PreParserManager, Process, ResMgrHeap, RTOSMP2Process, System
 EXPORTS PreParserInstance =
 BEGIN

 Handle: TYPE = LONG POINTER TO PreParserControl.Object;

 numberOfPagesParallel: CARDINAL = 1;

 numberOfInstances: CARDINAL ← 0;
 serialConfig: BOOLEAN ← FALSE;
 processorConfig: ARRAY
[FIRST[RTOSMP2Process.MpuID]..LAST[RTOSMP2Process.MpuID]]
  OF CARDINAL;
 idHighFpuBcc, idHighFpu, idHighExist: RTOSMP2Process.MpuID ← FIRST[
  RTOSMP2Process.MpuID];
 config, fpuBccCount, fpuCount, existCount: CARDINAL ← 0;
 configCV, getConfigCV, getConfigReadyCV: CONDITION;
 exists, restricted, started, finished: BOOLEAN;
 getConfigReady: BOOLEAN ← FALSE;
 id: RTOSMP2Process.MpuID ← FIRST[RTOSMP2Process.MpuID];
```

Copyright © 1992 Xerox Corporation All Rights Reserved

```
p: PROCESS;

CreateInstance: PUBLIC PROCEDURE [
 priority: Process.Priority, transactionID: ResMgrIDs.TransactionID]
 RETURNS [handle: Handle] =
 BEGIN
 ENABLE UNWIND => NULL;
 h: Handle;
 nLogEntries: CARDINAL ← 50;
 originalPriority: Process.Priority;
 ple, currentProcessor: LONG POINTER TO PreParserControl.ProcessorListEntry;
 numberOfInstances ← numberOfInstances + 1;

 originalPriority ← Process.GetPriority[];

 h ← PreParserControl.preParserZone.NEW[
  PreParserControl.Object ← [
  fwdLink: NIL, acquireContinue: FALSE, acquireCV: [],
  clearMgrResourceFault: FALSE, command: [null[]], controlCV: [],
  copyCount: 0, currentEntryPtr: NIL, currentManagerBlock: NIL,
  currentManagerOffset: 0, currentManagerPage: NIL, endOfJobFound: FALSE,
  eofSet: FALSE, headerPtr: NIL, ipBlockList: NIL, ipStreamHandle: NIL,
  jobErrorState: ok, jobMediaDataPtr: NIL, jobProceedDataPtr: NIL,
  jobResultsPtr: NIL, jobZoneBlockSize: 0, jobZoneSegListEnd: NIL,
  jobZoneSegListStart: NIL, log: [0, 0, NIL, 0], mainLoopAction: run,
  mainLoopActionNeeded: FALSE, mainLoopCV: [], managerAction: [init[]],
  managerActionNeeded: FALSE, managerBetweenPages: TRUE,
  managerBlockStatus: init, managerContextBuffer: NIL, managerContextSize: 0,
  managerCV: [], managerProcess: NIL, mediaCount: 0, needZoneExtend: FALSE,
  newCommand: FALSE, newParserStatus: FALSE, newParserStatusCV: [],
  nextLogicalPageNumber: 0, nextPageFrame: NIL, nextPageIPBlock: NIL,
  nextPageMediaIndex: 0, nextPageOffset: 0, nextPagePlex: simplex,
  nextPageSheetNumber: 0, nextPageSide: simplex, nextPageTFormIndex: 0,
  numberOfIPBlockEntrys: 0, numberOfPageEntrys: 0,
  objectFault: [
  problem: [null[]], severity: systemError, side: simplex, sheetNumber: 0,
  copyNumber: 0], objectPtr: NIL, pageList: NIL,
  parserStatus: [preParserCompleted[NIL]], printingInstructionsPtr: NIL,
  processorList: NIL, ptrToManagerContext: NIL, sifNodeSizeInWords: 0,
  smZone: NIL, state: idle, stateAtInterrupt: idle, streamDeleted: FALSE,
  transactionID: transactionID, zoneExtended: FALSE]];

 Process.EnableAborts[@h.managerCV];
 Process.EnableAborts[@h.mainLoopCV];

 h.log.logPtr ← ResMgrHeap.MakeNode[
  z: PreParserControl.preParserLogZone,
  n: nLogEntries * SIZE[PreParserControl.LogRec]];
 h.log.entriesAllocated ← nLogEntries;
```

Copyright © 1992 Xerox Corporation All Rights Reserved

```
h.ipBlockList ← PreParserControl.preParserZone.NEW[
 PreParserControl.IPBlockListEntry];
h.ipBlockList ↑ ← [
 fwdLink: NIL, status: noBuffer, mainDone: TRUE, mgrDone: TRUE,
 block: BlockStream.Block[
 blockPointer: NIL, startIndex: 0, stopIndexPlusOne: 0], ipBuffer: NIL];
h.ipBlockList.fwdLink ← PreParserControl.preParserZone.NEW[
 PreParserControl.IPBlockListEntry];
h.ipBlockList.fwdLink ↑ ← [
 fwdLink: NIL, status: noBuffer, mainDone: TRUE, mgrDone: TRUE,
 block: BlockStream.Block[NIL, 0, 0], ipBuffer: NIL];
h.numberOfIPBlockEntrys ← 2;
h.pageList ← PreParserControl.preParserZone.NEW[
 PreParserControl.PageListEntry];
h.pageList ↑ ← [
 fwdLink: NIL, contextSize: 0, currentIPBlock: NIL,
 currentIIPBlock: [NIL, 0, 0], firstIIPBlock: TRUE, frame: NIL,
 freeNodeList: NIL, iipBlockStream: NIL, logicalPageNumber: 0,
 mainSystemsError: FALSE, mediaIndex: 0, pageStartOffset: 0,
 pageContextBuffer: NIL, pageResultsPtr: NIL, plex: simplex,
 ptrToPageContext: NIL, sheetNumber: 0, side: simplex, sifInfoDest: NIL,
 sifInfoList: NIL, status: needSetup, tFormIndex: 0, zoneBlockSize: 0,
 zoneSegListEnd: NIL, zoneSegListStart: NIL];
h.numberOfPageEntrys ← 1;
h.currentManagerBlock ← h.ipBlockList;

Process.SetPriority[priority];

h.managerProcess ← FORK PreParserManager.DoManager[handle: LOOPHOLE[h]];

FOR i: CARDINAL IN [1..numberOfPagesParallel] DO
 currentProcessor ← PreParserControl.preParserZone.NEW[
  PreParserControl.ProcessorListEntry];
 currentProcessor ↑ ← [
  processor: LAST[RTOSMP2Process.MpuID], directMainLoop: FALSE,
  mainLoopProcess: NIL, fwdLink: NIL];

 IF h.processorList = NIL THEN h.processorList ← currentProcessor
 ELSE {
  ple ← h.processorList;
  UNTIL ple.fwdLink = NIL DO ple ← ple.fwdLink; ENDLOOP;
  ple.fwdLink ← currentProcessor;
  };

 currentProcessor.mainLoopProcess ← FORK PreParserMain.DoMainLoop[handle: h];

 GetFPUCacheID[processorEntry: currentProcessor];
 IF currentProcessor.directMainLoop THEN
  RTOSMP2Process.DirectProcess[
   process: currentProcessor.mainLoopProcess,
```

Copyright © 1992 Xerox Corporation All Rights Reserved

```
    channel: currentProcessor.processor];
   ENDLOOP;

  IF serialConfig THEN {
   IF h.processorList.directMainLoop THEN
    RTOSMP2Process.DirectProcess[
     process: h.managerProcess, channel: h.processorList.processor];
   };

  Process.SetPriority[originalPriority];
  RETURN[handle: h];
  END;
 DoGetConfig: ENTRY PROCEDURE =
  BEGIN
  ENABLE UNWIND => NULL;
  started ← FALSE;
  p ← FORK GetConfig[];
  Process.Detach[p];
  RTOSMP2Process.DirectProcess[process: p, channel: id];

  UNTIL getConfigReady DO WAIT getConfigReadyCV; ENDLOOP;

  started ← TRUE;
  NOTIFY getConfigCV;
  END;
 GetConfig: ENTRY PROCEDURE =
  BEGIN
  ENABLE UNWIND => NULL;
  UNTIL started DO
   getConfigReady ← TRUE; NOTIFY getConfigReadyCV; WAIT getConfigCV; ENDLOOP;

  config ← IPMicrocode.CALL[
   function: IPFunction.Config, entryContext: NIL !
   ANY => {config ← LAST[CARDINAL]; CONTINUE; }];
  finished ← TRUE;
  NOTIFY configCV;

  RETURN;
  END;
 GetFPUCacheID: PROCEDURE [
  processorEntry: LONG POINTER TO PreParserControl.ProcessorListEntry]
  RETURNS [] =
  BEGIN
  IF System.switches['x] = down THEN {
   processorEntry.processor ← 7;
   processorEntry.directMainLoop ← TRUE;
   RETURN;
   };
  IF numberOfInstances > 1 THEN {
   processorEntry.processor ← FIRST[RTOSMP2Process.MpuID];
```

Copyright © 1992 Xerox Corporation All Rights Reserved

```
 processorEntry.directMainLoop ← FALSE;
 RETURN;
 };

IF fpuBccCount > 1 OR (fpuBccCount = 1 AND fpuCount > 0) THEN {
 processorEntry.processor ← idHighFpuBcc;
 processorEntry.directMainLoop ← TRUE;
 RETURN;
 };

IF fpuCount > 1 THEN {
 processorEntry.processor ← idHighFpu;
 processorEntry.directMainLoop ← TRUE;
 }
ELSE {
 IF existCount > 3 THEN {
  processorEntry.processor ← idHighExist;
  processorEntry.directMainLoop ← TRUE;
  }
 ELSE
  IF System.switches['J] = down THEN {
   processorEntry.processor ← FIRST[RTOSMP2Process.MpuID];
   processorEntry.directMainLoop ← FALSE}
  ELSE {
   id: FaultLogger.ID ← FaultLogger.Log[
    fault: [
    subsystem: control, swModule: print,
    faultNumber: PreParserMainErrors.initializeFPUProblem]];
   PreParserCallBack.ReportESSFault[
    context: LOOPHOLE[LONG[0]], fault: fpuProblem, id: id];
   processorEntry.directMainLoop ← FALSE;
   };
 };
END;
PreParserInit: PUBLIC PROCEDURE [] RETURNS [] =
BEGIN
exist: CARDINAL = 0;
fpu: CARDINAL = 1;
bcc: CARDINAL = 2;
numberOfInstances ← 0;
serialConfig ← FALSE;
id ← idHighFpuBcc ← idHighFpu ← idHighExist ← FIRST[RTOSMP2Process.MpuID];
config ← fpuBccCount ← fpuCount ← existCount ← 0;
getConfigReady ← FALSE;

processorConfig ← ALL[LAST[CARDINAL]];
IF System.switches['u] = down THEN serialConfig ← TRUE;
IF System.switches['x] = down THEN MicroLog.StopLogging[];

FOR id IN [FIRST[RTOSMP2Process.MpuID]..LAST[RTOSMP2Process.MpuID]] DO
```

Copyright © 1992 Xerox Corporation All Rights Reserved

```
    [exists: exists, restricted: restricted] ← RTOSMP2Process.ChannelStatus[
     channel: id];
    IF ~exists THEN LOOP;
    finished ← FALSE;

    getConfigReady ← FALSE;
    DoGetConfig[];
    WaitTillDone[];

    processorConfig[id] ← config;
    IF processorConfig[id] = fpu + bcc THEN {
     idHighFpuBcc ← id; fpuBccCount ← fpuBccCount + 1; }
    ELSE {
     IF processorConfig[id] = fpu THEN {
      idHighFpu ← id; fpuCount ← fpuCount + 1; }
     ELSE
      IF processorConfig[id] = exist THEN {
       idHighExist ← id; existCount ← existCount + 1; };
     };
    ENDLOOP;
   END;
 ProcessorScheduling: PUBLIC PROCEDURE [
   handle: Handle, action: PreParserControl.ProcessorSchedulingAction]
   RETURNS [] =
   BEGIN
   processorEntry: LONG POINTER TO PreParserControl.ProcessorListEntry;
   exists, restricted: BOOLEAN;

   SELECT action FROM
    restrict => {
     processorEntry ← handle.processorList;
     UNTIL processorEntry = NIL DO
      [exists: exists, restricted: restricted] ← RTOSMP2Process.ChannelStatus[
       processorEntry.processor];
      IF exists AND ~restricted THEN {
       RTOSMP2Process.RestrictChannel[processorEntry.processor]};
      processorEntry ← processorEntry.fwdLink;
      ENDLOOP;
     };
    unrestrict => {
     processorEntry ← handle.processorList;
     UNTIL processorEntry = NIL DO
      [exists: exists, restricted: restricted] ← RTOSMP2Process.ChannelStatus[
       processorEntry.processor];
      IF exists AND restricted THEN {
       RTOSMP2Process.UnrestrictChannel[processorEntry.processor]};
      processorEntry ← processorEntry.fwdLink;
      ENDLOOP;
     };
    ENDCASE;
```

Copyright © 1992 Xerox Corporation All Rights Reserved

```
 END;
WaitTillDone: ENTRY PROCEDURE =
 BEGIN ENABLE UNWIND => NULL; UNTIL finished DO WAIT configCV; ENDLOOP; END;
END.
```

Copyright © 1992 Xerox Corporation All Rights Reserved

```
DIRECTORY

 DecomposerCommon USING [ClientContext],
 Inline USING [LongCOPY],
 IPMicrocode USING [CALL],
 IPFunction USING [AllocateNodeNFL, FreeNodeNFL, PopStack],
 PreParser USING [
  Access, AccessGroups, AccessGroupsRep, Covers, JobAttributes,
  JobAttributesRep, Option, OptionsHeader, OptionType, OptionPtr,
  PrintInstructionsResults, PrintInstructionsResultsPtr],
 PreParserCallBack USING [InstructionProblem, Problem, ReportObjectFault],
 PreParserCommon USING [
  MainHandle, OtherOptionType, StackEntry, StackEntryPtr, String, StringPtr,
  VectorOfElements, VectorOfElementsPtr],
 PreParserData USING [OperandType],
 PreParserExtra USING [PopOperandsMesa],
 PreParserFrameStack USING [ChangeRefCountAndFree, ComplexNodeRefCount],
 PreParserInstructions,
 PreParserStackOps USING [GetProp, MergeProp],
 PreParserMainErrors USING [invalidOperandTypeOnStack],
 PublicPrinting USING [
  Finishing, Plex, Priority, RunOfCardinalRep, RunOfCardinalSeq],
 Runtime USING [CallDebugger],
 String USING [AppendString, CopyToNewString, Equal, Length],
 System USING [switches];

PreParserInstructionsImpl: PROGRAM
 IMPORTS
  Inline, IPMicrocode, PreParserCallBack, PreParserExtra, PreParserFrameStack,
  PreParserInstructions, PreParserStackOps, Runtime, String, System
 EXPORTS PreParserInstructions =

 BEGIN OPEN PreParserInstructions;

 globals: PUBLIC PreParserInstructions.GlobalsPtr ← NIL;

 ExtendZone: PUBLIC SIGNAL = CODE;
 InstructionsProblem: PUBLIC SIGNAL [problem: PreParserCallBack.Problem] = CODE;

 CreateStartResults: PROCEDURE [h: PreParserCommon.MainHandle]
  RETURNS [loop: BOOLEAN ← TRUE] =
  BEGIN
  IF h.pc.operationStage < 3 THEN {
   h.pc.pcm.nodeSizeInWords ← SIZE[PreParser.PrintInstructionsResults];
   h.pc.pcm.zoneRecPtr ← @h.zone;
   IF IPMicrocode.CALL[
    function: IPFunction.AllocateNodeNFL, entryContext: h].result # 0 THEN {
    h.pc.operationStage ← 2; RETURN; };
   h.startResultsPtr ← h.pc.pcm.nodePtr;
```

Copyright © 1992 Xerox Corporation All Rights Reserved

```
h.startResultsPtr.resultsFlags.plexMayChange ← TRUE;
h.startResultsPtr.resultsFlags.mediaMayChange ← TRUE;
h.startResultsPtr.resultsFlags.onSimplexMayChange ← TRUE;
h.startResultsPtr.resultsFlags.copySelectMayChange ←
 h.proceedDataPtr.options.offsets[copySelect] = NIL;
h.startResultsPtr.resultsFlags.pageSelectMayChange ←
 h.proceedDataPtr.options.offsets[pageSelect] = NIL;
h.startResultsPtr.resultsFlags.copiesMayVary ← TRUE;
};
h.pc.pcm.nodeSizeInWords ← SIZE[PreParser.OptionsHeader];
h.pc.pcm.zoneRecPtr ← @h.zone;
IF IPMicrocode.CALL[
 function: IPFunction.AllocateNodeNFL, entryContext: h].result # 0 THEN {
 h.pc.operationStage ← 3; RETURN; };
h.startResultsPtr.instructions ← h.pc.pcm.nodePtr;
h.startResultsPtr.instructions ↑ ← [first: NIL, version: 1, offsets: ALL[NIL]];
h.sv.operand02.type ← identifier;
RETURN[loop: FALSE];
END;
DoMergeProps: PUBLIC PROCEDURE [h: PreParserCommon.MainHandle]
 RETURNS [loop: BOOLEAN ← TRUE] =
 BEGIN
 WHILE h.topStackRecordEntryCount > 2 OR h.stack.next # NIL DO
  h.pc.pcm.data.execAction ← mergeProp;
  [] ← PreParserExtra.PopOperandsMesa[h: h];
  IF h.pc.pcm.action = fatalError THEN {
   IF h.pc.pcm.data.code = PreParserMainErrors.invalidOperandTypeOnStack THEN
    WITH token: h.pc.tokenOverlay.token SELECT FROM
     longOperator = > token.longOperator ← mergeProp
     ENDCASE;
   RETURN;
   };
  IF PreParserStackOps.MergeProp[h: h].loop THEN {
   h.pc.operationStage ← 1; RETURN; };
  ENDLOOP;
 IF h.topStackRecordEntryCount = 0 THEN
  h.sv.operand01 ← [
   type: nullVectorOfElements,
   frameData: nullVectorOfElements[low: 0, count: 0]]
 ELSE {
  h.stackEntryPtr ← @h.sv.operand01;
  [] ← IPMicrocode.CALL[function: IPFunction.PopStack, entryContext: h];
  };
 RETURN[loop: FALSE];
 END;
FindOtherOp: PROCEDURE [
 h: PreParserCommon.MainHandle, optionPtr: PreParser.OptionPtr]
 RETURNS [found: BOOLEAN ← TRUE] =
 BEGIN
 h.tempData.optionPtr ← optionPtr;
```

Copyright © 1992 Xerox Corporation All Rights Reserved

```
UNTIL h.tempData.optionPtr = NIL DO
 IF h.tempData.optionPtr.optionType = other THEN
  IF String.Equal[
   s1: globals.myOptionStrings[h.tempData.otherOpType],
   s2: h.tempData.optionPtr.otherOption.name] THEN RETURN;
 h.tempData.optionPtr ← h.tempData.optionPtr.next;
 ENDLOOP;
RETURN[found: FALSE];
END;
LookupInstruction: PUBLIC PROCEDURE [h: PreParserCommon.MainHandle]
 RETURNS [loop: BOOLEAN ← TRUE] =
 BEGIN
 IF h.sv.operand02.idStringPtr = NIL OR h.sv.operand01.type # vectorOfElements
  THEN h.tempData.found ← FALSE
 ELSE {
  PreParserFrameStack.ComplexNodeRefCount[
   h: h, entryPtr: @h.sv.operand01, delta: 1];

  IF PreParserStackOps.GetProp[h: h].loop THEN RETURN;

  h.stackEntryPtr ← @h.stackEntry;
  [] ← IPMicrocode.CALL[function: IPFunction.PopStack, entryContext: h];
  h.tempData.found ← VAL[h.stackEntry.fixed.int];
  IF h.tempData.found THEN
   [] ← IPMicrocode.CALL[function: IPFunction.PopStack, entryContext: h]};
 RETURN[loop: FALSE];
 END;

ProcessCopySelect: PROCEDURE [h: PreParserCommon.MainHandle] = {
 z: UNCOUNTED ZONE = h.smZone;
 copySelectRunPtr: PublicPrinting.RunOfCardinalSeq ← NIL;
 BEGIN
 ENABLE {
  WrongType =>
   SignalBadPrintingInstruction[
    badType, String.CopyToNewString["CopySelect"L, z]];
  WrongValue =>
   SignalBadPrintingInstruction[
    badValue, String.CopyToNewString["CopySelect"L, z]];
  UNWIND => z.FREE[@copySelectRunPtr];
  };
 SELECT h.stackEntry.type FROM
  nullVectorOfElements => NULL;
  vectorOfElements => {
   copySelectVector: PreParserCommon.VectorOfElementsPtr ←
    h.stackEntry.vectorPtr;
   numberofCopies: CARDINAL ← 0;
   srcVectorSize: CARDINAL = copySelectVector.count;
   destVectorSize: CARDINAL = 1;
   IF srcVectorSize MOD 2 # 0 THEN
```

Copyright © 1992 Xerox Corporation All Rights Reserved

```
    SignalBadPrintingInstruction[
     badValue, String.CopyToNewString["CopySelect"L, z]];
   copySelectRunPtr ← z.NEW[
    PublicPrinting .RunOfCardinalRep[destVectorSize]];

   h.tempData.elementCount ← destVectorSize;
   FOR index: CARDINAL ← 0, index + 2 UNTIL index = srcVectorSize DO
    IF CardinalValue[@copySelectVector.elements[index + 1]] = 1 THEN
     numberofCopies ←
      numberofCopies + CardinalValue[@copySelectVector.elements[index]]
    ENDLOOP;
   copySelectRunPtr[0] ← numberofCopies;
   };
  ENDCASE =>
   SignalBadPrintingInstruction[
    badType, String.CopyToNewString["CopySelect"L, z]];
 END;
 h.tempData.option.copySelect ← copySelectRunPtr;
 };
ProcessCopyName: PROCEDURE [h: PreParserCommon.MainHandle] = {
 IF h.stackEntry.type # vectorOfElements THEN
  SignalBadPrintingInstruction[
   badType, String.CopyToNewString["CopyName"L, h.smZone]];
 };

ProcessFinishing: PROCEDURE [h: PreParserCommon.MainHandle] = {
 z: UNCOUNTED ZONE = h.smZone;
 finishing: PublicPrinting.Finishing ← none;
 tempStr, finishingName: LONG STRING ← NIL;
 BEGIN
 ENABLE {
  WrongType =>
   SignalBadPrintingInstruction[
    badType, String.CopyToNewString["finishing"L, z]];
  WrongValue =>
   SignalBadPrintingInstruction[
    badValue, String.CopyToNewString["finishing"L, z]];
  UNWIND => z.FREE[@tempStr];
  };

 IF h.stackEntry.type = identifier THEN
  SELECT TRUE FROM
   PreParserInstructions.EqualIds[
    globals.staticStrings[cornerStaple], @h.stackEntry] =>
    finishing ← portraitSingleStitch;
   PreParserInstructions.EqualIds[globals.staticStrings[none], @h.stackEntry]
    => finishing ← none;
   ENDCASE => {
    tempStr ← StringValue[z, @h.stackEntry];
    finishingName ← StringConcat["finishing/"L, tempStr, z];
```

Copyright © 1992 Xerox Corporation All Rights Reserved

```
    SignalBadPrintingInstruction[unrecognized, finishingName];
    }
  ELSE {
   v: PreParserCommon.VectorOfElementsPtr ← VectorElement[@h.stackEntry];
   IF v.count # 2 THEN ERROR WrongValue;
   IF ~PreParserInstructions.EqualIds[
    globals.staticStrings[Xerox], @v.elements[0]] THEN {
    tempStr ← MesaStringFromVectorOfIdentifier[z, v];
    finishingName ← StringConcat["finishing/"L, tempStr, z];
    SignalBadPrintingInstruction[unrecognized, finishingName];
    };
   SELECT TRUE FROM
    PreParserInstructions.EqualIds[
     globals.staticStrings[bind], @v.elements[1]] => finishing ← bindOnly;
    PreParserInstructions.EqualIds[
     globals.staticStrings[landscapeStaple], @v.elements[1]] =>
     finishing ← landscapeSingleStitch;
    PreParserInstructions.EqualIds[
     globals.staticStrings[doubleStaple], @v.elements[1]] =>
     finishing ← doubleStitch;
    PreParserInstructions.EqualIds[
     globals.staticStrings[sampleTray], @v.elements[1]] =>
     finishing ← sampleTray;
    ENDCASE => {
     tempStr ← MesaStringFromVectorOfIdentifier[z, v];
     finishingName ← StringConcat["finishing/"L, tempStr, z];
     SignalBadPrintingInstruction[unrecognized, finishingName];
     };
   };

  END;
  h.tempData.option.finishing ← finishing;
  };
 ProcessMediaSelect: PROCEDURE [h: PreParserCommon.MainHandle] = {
  runPtr: PreParserInstructions.RunPtr ← NIL;
  v, mediaSelectVector: PreParserCommon.VectorOfElementsPtr ← NIL;
  vectorSize, runLengthPairs, i: CARDINAL ← 0;
  copyRunLength: LONG CARDINAL ← 0;
  BEGIN
  ENABLE {
   WrongValue =>
    SignalBadPrintingInstruction[
     badValue, String.CopyToNewString["MediaSelect"L, h.smZone]];
   WrongType =>
    SignalBadPrintingInstruction[
     badType, String.CopyToNewString["MediaSelect"L, h.smZone]];
   UNWIND =>
    IF runPtr # NIL THEN {
     h.pc.pcm.zoneRecPtr ← @h.zone;
     h.pc.pcm.nodePtr ← runPtr;
```

Copyright © 1992 Xerox Corporation All Rights Reserved

```
    [] ← IPMicrocode.CALL[IPFunction.FreeNodeNFL, h];
    };
  };

 v ← VectorElement[@h.stackEntry];
 IF v.count < 2 THEN ERROR WrongValue;

 IF v.count > 2 THEN
  Warning[
   h.pc.pcm.clientContext, [
   featureNotImplemented[feature: [mediaSelect[]]]]];

 copyRunLength ← LongCardinalValue[@v.elements[0]];

 mediaSelectVector ← VectorElement[@v.elements[1]];
 vectorSize ← mediaSelectVector.count;
 IF vectorSize MOD 2 # 0 OR vectorSize < = 0 THEN ERROR WrongValue;

 runLengthPairs ← mediaSelectVector.count / 2;
 h.pc.pcm.nodeSizeInWords ← SIZE[PreParserInstructions .Run[runLengthPairs]];
 h.pc.pcm.zoneRecPtr ← @h.zone;
 IF IPMicrocode.CALL[IPFunction.AllocateNodeNFL, h].result # 0 THEN
  SIGNAL ExtendZone;
 runPtr ← h.pc.pcm.nodePtr;

 LOOPHOLE[@runPtr.count, LONG POINTER TO CARDINAL] ↑ ← runLengthPairs;

 FOR index: CARDINAL ← 0, index + 2 UNTIL index = vectorSize DO
  runPtr[i].runLength ← LongCardinalValue[@mediaSelectVector.elements[index]];
  runPtr[i].value ← CardinalValue[@mediaSelectVector.elements[index + 1]];
  i ← i + 1;
  ENDLOOP;

 END;
 h.tempData.option.otherOption ← [
  name: globals.myOptionStrings[mediaSelect],
  data: DESCRIPTOR[runPtr, h.pc.pcm.nodeSizeInWords]];
 };
ProcessOnSimplex: PROCEDURE [h: PreParserCommon.MainHandle] = {
 runPtr: PreParserInstructions.RunPtr ← NIL;
 onSimplexVector: PreParserCommon.VectorOfElementsPtr ← NIL;
 vectorSize, runLengthPairs, i: CARDINAL ← 0;
 copyRunLength: LONG CARDINAL ← 0;
 BEGIN
 ENABLE {
  WrongValue = >
   SignalBadPrintingInstruction[
    badValue, String.CopyToNewString["MediaSelect"L, h.smZone]];
  WrongType = >
   SignalBadPrintingInstruction[
```

Copyright © 1992 Xerox Corporation All Rights Reserved

```
    badType, String.CopyToNewString["MediaSelect"L, h.smZone]];
  UNWIND =>
   IF runPtr # NIL THEN {
    h.pc.pcm.zoneRecPtr ← @h.zone;
    h.pc.pcm.nodePtr ← runPtr;
    [] ← IPMicrocode.CALL[IPFunction.FreeNodeNFL, h];
    };
  };

 onSimplexVector ← VectorElement[@h.stackEntry];
 vectorSize ← onSimplexVector.count;

 IF vectorSize <= 0 OR vectorSize MOD 2 # 0 THEN ERROR WrongValue;

 runLengthPairs ← vectorSize / 2;
 h.pc.pcm.nodeSizeInWords ← SIZE[PreParserInstructions .Run[runLengthPairs]];
 h.pc.pcm.zoneRecPtr ← @h.zone;
 IF IPMicrocode.CALL[IPFunction.AllocateNodeNFL, h].result # 0 THEN
  SIGNAL ExtendZone;
 runPtr ← h.pc.pcm.nodePtr;

 LOOPHOLE[@runPtr.count, LONG POINTER TO CARDINAL] ↑ ← runLengthPairs;

 FOR index: CARDINAL ← 0, index + 2 UNTIL index = vectorSize DO
  runPtr[i].runLength ← LongCardinalValue[@onSimplexVector.elements[index]];
  runPtr[i].value ← ORD[
   CardinalValue[@onSimplexVector.elements[index + 1]] # 0];
  i ← i + 1;
  ENDLOOP;

 END;
 h.tempData.option.otherOption ← [
  name: globals.myOptionStrings[onSimplex],
  data: DESCRIPTOR[runPtr, h.pc.pcm.nodeSizeInWords]];
 };
ProcessOtherInstructions: PUBLIC PROCEDURE [h: PreParserCommon.MainHandle]
 RETURNS [loop: BOOLEAN ← TRUE] =
 BEGIN
 ENABLE ExtendZone => {CONTINUE};
 IF h.pc.operationStage < 10 THEN {

  h.tempData.option.optionType ← other;
  h.tempData.otherOpType ← FIRST[PreParserCommon.OtherOptionType]};

 DO
  IF h.pc.operationStage < 11 THEN {
   h.tempData.optionPtr ← NIL;
   h.tempData.newOptionPtr ← NIL;

   h.sv.operand02.type ← identifier;
```

Copyright © 1992 Xerox Corporation All Rights Reserved

```
  h.sv.operand02.idStringPtr ← globals.myOptionNames[
   h.tempData.otherOpType];
  PreParserFrameStack.ChangeRefCountAndFree[
   h: h, ptr: globals.myOptionNames[h.tempData.otherOpType], delta: 1];
  IF LookupInstruction[h: h].loop THEN {h.pc.operationStage ← 10; RETURN; };
  };

IF h.pc.operationStage < 12 THEN
 SELECT TRUE FROM
  FindOtherOp[
   h: h, optionPtr: h.proceedDataPtr.options.offsets[other]].found =>

   SELECT h.tempData.otherOpType FROM
    mediaSelect =>
     h.startResultsPtr.resultsFlags.mediaMayChange ← FALSE;
    onSimplex =>
     h.startResultsPtr.resultsFlags.onSimplexMayChange ← FALSE;
    ENDCASE;
  h.tempData.found => {
   BEGIN
   ENABLE
    InstructionsProblem => {
     Warning[h.pc.pcm.clientContext, problem];
     h.tempData.optionPtr ← NIL;
     CONTINUE;
     };
   h.tempData.optionPtr ← @h.tempData.option;

   h.pc.operationStage ← 11;

   SELECT h.tempData.otherOpType FROM
    copyName => ProcessCopyName[h: h];
    onSimplex => ProcessOnSimplex[h: h];
    ENDCASE => ProcessMediaSelect[h: h];
   END;
   h.pc.operationStage ← 0;
   };

  FindOtherOp[
   h: h, optionPtr: h.proceedDataPtr.defaults.offsets[other]].found =>
   NULL;
  ENDCASE => {h.tempData.optionPtr ← NIL; };
IF h.tempData.optionPtr # NIL THEN {
 IF h.tempData.found THEN {
  PreParserFrameStack.ComplexNodeRefCount[
   h: h, entryPtr: @h.stackEntry, delta: -1]};

 h.pc.pcm.nodeSizeInWords ← SIZE[other PreParser.Option];
 h.pc.pcm.zoneRecPtr ← @h.zone;
 IF IPMicrocode.CALL[
```

Copyright © 1992 Xerox Corporation All Rights Reserved

```
      function: IPFunction.AllocateNodeNFL, entryContext: h].result # 0 THEN {
      h.pc.operationStage ← 8; RETURN; };
     h.tempData.newOptionPtr ← h.pc.pcm.nodePtr;

     Inline.LongCOPY[
      from: h.tempData.optionPtr, nwords: h.pc.pcm.nodeSizeInWords,
      to: h.tempData.newOptionPtr];
     SELECT h.tempData.otherOpType FROM
      onSimplex => h.onSimplexOption ← h.tempData.newOptionPtr;
      mediaSelect => h.mediaSelectOption ← h.tempData.newOptionPtr;
      ENDCASE;
     SELECT TRUE FROM
      h.startResultsPtr.instructions.first = NIL => {

       h.tempData.newOptionPtr.next ← NIL;
       h.startResultsPtr.instructions.first ← h.tempData.newOptionPtr;
       h.startResultsPtr.instructions.offsets[other] ←
        h.tempData.newOptionPtr;
       };
      h.startResultsPtr.instructions.offsets[other] # NIL => {
       h.tempData.newOptionPtr.next ← h.startResultsPtr.instructions.offsets[
        other].next;
       h.startResultsPtr.instructions.offsets[other].next ←
        h.tempData.newOptionPtr;
       };
      ENDCASE => {
       h.tempData.optionPtr ← h.startResultsPtr.instructions.first;
       UNTIL h.tempData.optionPtr.next = NIL DO
        h.tempData.optionPtr ← h.tempData.optionPtr.next; ENDLOOP;
       h.tempData.newOptionPtr.next ← NIL;
       h.startResultsPtr.instructions.offsets[other] ←
        h.tempData.newOptionPtr;
       h.tempData.optionPtr.next ← h.tempData.newOptionPtr;
       };
     };
    IF h.tempData.otherOpType = LAST[PreParserCommon.OtherOptionType] THEN EXIT;
    h.tempData.otherOpType ← SUCC[h.tempData.otherOpType];
    ENDLOOP;
   IF RaiseInstructionsWarnings[h].problem THEN RETURN[loop: TRUE];

   RETURN[loop: FALSE];
   END;
  RaiseInstructionsWarnings: PROC [h: PreParserCommon.MainHandle]
   RETURNS [problem: BOOLEAN ← FALSE] = {
   unSupported: PreParserInstructions.UnSupportedInstructions ←
    PreParserInstructions.unSupportedInstructions;
   h.sv.operand02.type ← vectorOfElements;
   h.sv.operand02.vectorPtr ← unSupported.vectors[standardPrimarySets];
   PreParserFrameStack.ChangeRefCountAndFree[h, h.sv.operand02.vectorPtr, 1];
   IF LookupInstruction[h].loop THEN RETURN[problem: TRUE];
```

Copyright © 1992 Xerox Corporation All Rights Reserved

```
IF h.tempData.found THEN
 Warning[
  h.pc.pcm.clientContext, [
  featureNotImplemented[
  feature: [
  highLightColor[
  color: String.CopyToNewString["Standard/PrimarySets"L, h.smZone]]]]]];

h.sv.operand02.vectorPtr ← unSupported.vectors[standardPrimarySetSelect];
PreParserFrameStack.ChangeRefCountAndFree[h, h.sv.operand02.vectorPtr, 1];
IF LookupInstruction[h].loop THEN RETURN[problem: TRUE];
IF h.tempData.found THEN
 Warning[
  h.pc.pcm.clientContext, [
  featureNotImplemented[
  feature: [
  highLightColor[
  color: String.CopyToNewString[
  "Standard/PrimarySetSelect"L, h.smZone]]]]]];

h.sv.operand02.type ← identifier;
h.sv.operand02.idStringPtr ← unSupported.names[breakPageFont];
PreParserFrameStack.ChangeRefCountAndFree[h, h.sv.operand02.vectorPtr, 1];
IF LookupInstruction[h].loop THEN RETURN[problem: TRUE];
IF h.tempData.found THEN
 Warning[
  h.pc.pcm.clientContext, [
  featureNotImplemented[feature: [breakPageFont[]]]]];

h.sv.operand02.idStringPtr ← unSupported.names[breakPageType];
PreParserFrameStack.ChangeRefCountAndFree[h, h.sv.operand02.vectorPtr, 1];
IF LookupInstruction[h].loop THEN RETURN[problem: TRUE];
IF h.tempData.found THEN
 Warning[
  h.pc.pcm.clientContext, [
  featureNotImplemented[feature: [breakPageType[]]]]];

h.sv.operand02.idStringPtr ← unSupported.names[outPutPositions];
PreParserFrameStack.ChangeRefCountAndFree[h, h.sv.operand02.vectorPtr, 1];
IF LookupInstruction[h].loop THEN RETURN[problem: TRUE];
IF h.tempData.found THEN
 Warning[
  h.pc.pcm.clientContext, [
  featureNotImplemented[feature: [outPutPositions[]]]]];
};

ProcessPlex: PUBLIC PROCEDURE [h: PreParserCommon.MainHandle] = {
 z: UNCOUNTED ZONE = h.smZone;
 tempStr, plexName: LONG STRING ← NIL;
 BEGIN
```

Copyright © 1992 Xerox Corporation All Rights Reserved

```
ENABLE {
 WrongType =>
  SignalBadPrintingInstruction[
   badType, String.CopyToNewString["plex"L, h.smZone]];
 UNWIND => z.FREE[@tempStr];
 };
SELECT TRUE FROM
 PreParserInstructions.EqualIds[
  globals.staticStrings[simplex], @h.stackEntry] =>
  h.tempData.option.plex ← simplex;
 PreParserInstructions.EqualIds[globals.staticStrings[duplex], @h.stackEntry]
  => h.tempData.option.plex ← duplex;
 PreParserInstructions.EqualIds[
  globals.staticStrings[duplexHeadToToe], @h.stackEntry],
  PreParserInstructions.EqualIds[
  globals.staticStrings[tumbleDuplex], @h.stackEntry] =>
  h.tempData.option.plex ← duplexHeadToToe;
 ENDCASE => {
  tempStr ← StringValue[z, @h.stackEntry];
  plexName ← StringConcat["plex/"L, tempStr, z];
  SignalBadPrintingInstruction[unrecognized, plexName];
  };
END;
};

ProcessDocInstruction: PUBLIC PROC [h: PreParserCommon.MainHandle] =
 BEGIN
 h.tempData.option.docName ← StringValue[
  h.smZone, @h.stackEntry !
  WrongType => {
   SignalBadPrintingInstruction[
    badType, String.CopyToNewString["DocumentMessage"L, h.smZone]]}];
 END;
ProcessJobAttributes: PUBLIC PROC [h: PreParserCommon.MainHandle] = {
 z: UNCOUNTED ZONE = h.smZone;
 v: PreParserCommon.VectorOfElementsPtr ← h.stackEntry.vectorPtr;
 jobAttributes: PreParser.JobAttributes ← NIL;
 propName, propVal: PreParserCommon.StackEntryPtr ← NIL;
 tempStr, attributeStr: LONG STRING ← NIL;
 BEGIN
 ENABLE {
  WrongType =>
   IF propName # NIL AND propName.type = identifier THEN {
    tempStr ← StringValue[z, propName];
    attributeStr ← StringConcat["standard/jobAttributes/"L, tempStr, z];
    SignalBadPrintingInstruction[badType, attributeStr];
    }
   ELSE
    SignalBadPrintingInstruction[
     badType, String.CopyToNewString["standard/jobAttributes"L, z]];
```

Copyright © 1992 Xerox Corporation All Rights Reserved

```
  WrongValue =>
   IF propName # NIL AND propName.type = identifier THEN {
    tempStr ← StringValue[z, propName];
    attributeStr ← StringConcat["standard/jobAttributes/"L, tempStr, z];
    SignalBadPrintingInstruction[badValue, StringValue[z, propName]];
    }
   ELSE
    SignalBadPrintingInstruction[
     badValue, String.CopyToNewString["standard/jobAttributes"L, z]];
  UNWIND => {
   z.FREE[@tempStr];
   IF jobAttributes # NIL THEN FreeJobAttributes[z, jobAttributes];
   };
  };
 IF h.stackEntry.type # vectorOfElements THEN ERROR WrongType;
 IF v.count MOD 2 # 0 THEN ERROR WrongValue;
 jobAttributes ← z.NEW[PreParser.JobAttributesRep ← []];
 FOR i: CARDINAL ← 0, i + 2 WHILE i < v.count - 1 DO
  propName ← @v.elements[i];
  propVal ← @v.elements[i + 1];
  SELECT TRUE FROM
   EqualIds[globals.staticStrings[jobCreateDate], propName] =>
    jobAttributes.jobCreateDate ← StringValue[z, propVal];
   EqualIds[globals.staticStrings[jobName], propName] =>
    jobAttributes.jobName ← StringValue[z, propVal];
   EqualIds[globals.staticStrings[jobAccountName], propName] =>
    jobAttributes.jobAccountName ← StringValue[z, propVal];
   EqualIds[globals.staticStrings[jobComment], propName] =>
    jobAttributes.jobComment ← StringValue[z, propVal];
   EqualIds[globals.staticStrings[jobPageCount], propName] =>
    jobAttributes.jobPageCount ← CardinalValue[propVal];
   EqualIds[globals.staticStrings[jobSender], propName] =>
    jobAttributes.jobSender ← StringValue[z, propVal];
   EqualIds[globals.staticStrings[jobRecipient], propName] =>
    jobAttributes.jobRecipient ← StringValue[z, propVal];
   EqualIds[globals.staticStrings[jobStartMessage], propName] =>
    jobAttributes.jobStartMessage ← StringValue[z, propVal];
   EqualIds[globals.staticStrings[jobStartWait], propName] =>
    jobAttributes.jobStartWait ← CardinalValue[propVal];
   EqualIds[globals.staticStrings[jobEndMessage], propName] =>
    jobAttributes.jobEndMessage ← StringValue[z, propVal];
   EqualIds[globals.staticStrings[jobEndWait], propName] =>
    jobAttributes.jobEndWait ← CardinalValue[propVal];
   EqualIds[globals.staticStrings[jobDisposition], propName] =>
    jobAttributes.jobDisposition ← VAL[CardinalValue[propVal, 4]];
   EqualIds[globals.staticStrings[jobTotalSize], propName] =>
    jobAttributes.jobTotalSize ← LongCardinalValue[propVal];
   EqualIds[globals.staticStrings[jobErrorAbort], propName] =>
    jobAttributes.jobErrorAbort ← VAL[CardinalValue[propVal, 2]];
   EqualIds[globals.staticStrings[jobErrorReporting], propName] =>
```

Copyright © 1992 Xerox Corporation All Rights Reserved

```
      jobAttributes.jobErrorReporting ← VAL[CardinalValue[propVal, 1]];
     EqualIds[globals.staticStrings[jobPriority], propName] =>
      jobAttributes.jobPriority ← VAL[
       CardinalValue[propVal, 255] MOD
        (PublicPrinting.Priority.LAST.ORD + 1)];
     EqualIds[globals.staticStrings[jobPolicy], propName] =>
      Warning[
       h.pc.pcm.clientContext, [
       featureNotImplemented[feature: [jobPolicy[]]]]];
     ENDCASE => {
      tempStr ← StringValue[z, propName];
      attributeStr ← StringConcat["standard/jobAttributes/"L, tempStr, z];
      SignalBadPrintingInstruction[unrecognized, attributeStr];
      };
    ENDLOOP;
   END;
   h.tempData.option.jobAttributes ← jobAttributes;
   };
ProcessJobSecurity: PUBLIC PROC [h: PreParserCommon.MainHandle] = {
  z: UNCOUNTED ZONE = h.smZone;
  v: PreParserCommon.VectorOfElementsPtr ← NIL;
  access: PreParser.AccessGroups ← NIL;
  propName, propVal: PreParserCommon.StackEntryPtr ← NIL;
  tempStr, securityStr: LONG STRING ← NIL;
  BEGIN
  ENABLE {
   WrongType =>
    IF propName # NIL AND propName.type = identifier THEN {
     tempStr ← StringValue[z, propName];
     securityStr ← StringConcat["Xerox/jobSecurity/"L, tempStr, z];
     SignalBadPrintingInstruction[badType, securityStr];
     }
    ELSE
     SignalBadPrintingInstruction[
      badType, String.CopyToNewString["Xerox/jobSecurity"L, z]];
   WrongValue =>
    IF propName # NIL AND propName.type = identifier THEN {
     tempStr ← StringValue[z, propName];
     securityStr ← StringConcat["Xerox/jobSecurity/"L, tempStr, z];
     SignalBadPrintingInstruction[badValue, securityStr];
     }
    ELSE
     SignalBadPrintingInstruction[
      badValue, String.CopyToNewString["Xerox/jobSecurity"L, z]];
   UNWIND => {
    z.FREE[@tempStr]; IF access # NIL THEN FreeJobAccess[z, access]; };
   };
  v ← VectorElement[@h.stackEntry];
  IF v.count MOD 2 # 0 THEN ERROR WrongValue;
  access ← z.NEW[PreParser.AccessGroupsRep ← []];
```

Copyright © 1992 Xerox Corporation All Rights Reserved

```
FOR i: CARDINAL ← 0, i + 2 WHILE i < v.count - 1 DO
 propName ← @v.elements[i];
 propVal ← @v.elements[i + 1];
 SELECT TRUE FROM
  EqualIds[globals.staticStrings[acquire], propName] =>
   access.acquire ← AccessValue[z, propVal];
  EqualIds[globals.staticStrings[modify], propName] =>
   access.modify ← AccessValue[z, propVal];
  EqualIds[globals.staticStrings[owner], propName] =>
   access.owner ← AccessValue[z, propVal];
  ENDCASE => {
   tempStr ← StringValue[z, propName];
   securityStr ← StringConcat["Xerox/jobSecurity/"L, tempStr, z];
   SignalBadPrintingInstruction[unrecognized, securityStr];
   };
 ENDLOOP;
END;

h.tempData.option.access ← access;
};
AccessValue: PROC [z: UNCOUNTED ZONE, s: PreParserCommon.StackEntryPtr]
 RETURNS [access: PreParser.Access] =
 BEGIN
 SELECT s.type FROM
  fixedPointReal, real => {
   access.group ←
    SELECT CardinalValue[s] FROM
     0 => all,
     1 => owner,
     2 => none,
     ENDCASE => all;
   access.name ← NIL};
  ENDCASE => {access.group ← named; access.name ← IdentifierValue[z, s]; };
 END;
ProcessPrintingInstrs: PUBLIC PROCEDURE [h: PreParserCommon.MainHandle]
 RETURNS [loop: BOOLEAN ← TRUE] =
 BEGIN
 IF h.pc.operationStage < 10 THEN
  IF ProcessStandardInstructions[h: h].loop THEN RETURN;
 IF ProcessOtherInstructions[h: h].loop THEN RETURN;
 IF h.sv.operand01.type = vectorOfElements THEN {
  PreParserFrameStack.ComplexNodeRefCount[
   h: h, entryPtr: @h.sv.operand01, delta: -1];
  };
 RETURN[loop: FALSE];
 END;
ProcessStandardInstructions: PUBLIC PROCEDURE [h: PreParserCommon.MainHandle]
 RETURNS [loop: BOOLEAN ← TRUE] =
 BEGIN
 IF h.pc.operationStage = 1 THEN {
```

Copyright © 1992 Xerox Corporation All Rights Reserved

```
  h.pc.operationStage ← 0;

  [] ← PreParserStackOps.MergeProp[h: h];
  };

 IF h.pc.operationStage = 0 THEN IF DoMergeProps[h: h].loop THEN RETURN;

 IF h.pc.operationStage < 4 THEN {
  IF CreateStartResults[h: h].loop THEN RETURN;
  h.tempData.opType ← FIRST[PreParser.OptionType];
  };

 UNTIL h.tempData.opType = other DO
  h.tempData.option.modified ← FALSE;
  IF h.pc.operationStage < 5 THEN {
   h.tempData.newOptionPtr ← NIL;
   h.tempData.optionPtr ← NIL;
   h.sv.operand02.type ← vectorOfElements;
   SELECT h.tempData.opType FROM
    jobSecurity = > {
     PreParserFrameStack.ChangeRefCountAndFree[
      h: h, ptr: globals.staticVectors[XeroxJobSecurity], delta: 1];
     h.sv.operand02.vectorPtr ← globals.staticVectors[XeroxJobSecurity];
     };
    jobAttributes = > {
     PreParserFrameStack.ChangeRefCountAndFree[
      h: h, ptr: globals.staticVectors[standardJobAttributes], delta: 1];
     h.sv.operand02.vectorPtr ← globals.staticVectors[
      standardJobAttributes];
     };
    stacking = > {
     PreParserFrameStack.ChangeRefCountAndFree[
      h: h, ptr: globals.staticVectors[standardStacking], delta: 1];
     h.sv.operand02.vectorPtr ← globals.staticVectors[standardStacking];
     };
    binderyFinishing = > {
     PreParserFrameStack.ChangeRefCountAndFree[
      h: h, ptr: globals.staticVectors[standardBinderyFinishing],
      delta: 1];
     h.sv.operand02.vectorPtr ← globals.staticVectors[
      standardBinderyFinishing];
     };
    binderyFinishingSelect = > {
     PreParserFrameStack.ChangeRefCountAndFree[
      h: h, ptr: globals.staticVectors[standardBinderyFinishingSelect],
      delta: 1];
     h.sv.operand02.vectorPtr ← globals.staticVectors[
      standardBinderyFinishingSelect];
     };
    bookletSignature = > {
```

Copyright © 1992 Xerox Corporation All Rights Reserved

```
    PreParserFrameStack.ChangeRefCountAndFree[
     h: h, ptr: globals.staticVectors[xeroxSimplePamphletSignature],
     delta: 1];
    h.sv.operand02.vectorPtr ← globals.staticVectors[
     xeroxSimplePamphletSignature];
    };
   covers => {
    PreParserFrameStack.ChangeRefCountAndFree[
     h: h, ptr: globals.staticVectors[XeroxCovers], delta: 1];
    h.sv.operand02.vectorPtr ← globals.staticVectors[XeroxCovers];
    };
   ENDCASE => {
    h.sv.operand02.type ← identifier;
    PreParserFrameStack.ChangeRefCountAndFree[
     h: h, ptr: globals.optionNames[h.tempData.opType], delta: 1];
    h.sv.operand02.idStringPtr ← globals.optionNames[h.tempData.opType];
    };

  IF LookupInstruction[h: h].loop THEN {h.pc.operationStage ← 4; RETURN; };
  };

 IF h.pc.operationStage < 7 THEN
  SELECT TRUE FROM

   h.proceedDataPtr.options.offsets[h.tempData.opType] # NIL => {
    IF h.tempData.opType = pageSelect THEN {
     IF h.stackEntry.type = vectorOfElements THEN {
      BEGIN
      ENABLE
       InstructionsProblem => {
        Warning[h.pc.pcm.clientContext, problem];
        h.tempData.optionPtr ← h.proceedDataPtr.options.offsets[
         pageSelect];
        CONTINUE;
        };
      h.tempData.optionPtr ← @h.tempData.option;
      h.tempData.option.optionType ← h.tempData.opType;
      ProcessPageSelect[h];
      h.tempData.option.modified ← TRUE;
      END;
      }
     ELSE
      h.tempData.optionPtr ← h.proceedDataPtr.options.offsets[
       h.tempData.opType];
     }
    ELSE {
     h.tempData.optionPtr ← h.proceedDataPtr.options.offsets[
      h.tempData.opType];
     SELECT h.tempData.opType FROM
      plex => h.startResultsPtr.resultsFlags.plexMayChange ← FALSE;
```

Copyright © 1992 Xerox Corporation All Rights Reserved

```
      media => {
       h.startResultsPtr.resultsFlags.mediaMayChange ← FALSE;
       IF System.switches['<] = down THEN {
        FOR i: INTEGER IN [0..h.tempData.optionPtr.media.LENGTH) DO
         IF h.tempData.optionPtr.media[
          i].mediumDimensions.widthInMillimeters = 280
          OR h.tempData.optionPtr.media[
           i].mediumDimensions.lengthInMillimeters = 280 THEN
          Runtime.CallDebugger["Media error 280mm"L];
         ENDLOOP}};
      ENDCASE;
     };
    };
   h.tempData.found => {
    BEGIN
    ENABLE
     InstructionsProblem => {
      Warning[h.pc.pcm.clientContext, problem];
      h.tempData.optionPtr ← h.proceedDataPtr.defaults.offsets[
       h.tempData.opType];
      CONTINUE;
      };

    h.tempData.optionPtr ← @h.tempData.option;
    h.tempData.option.optionType ← h.tempData.opType;


    SELECT h.tempData.opType FROM
     copySelect => ProcessCopySelect[h];
     pageSelect => ProcessPageSelect[h];
     media => ProcessMedia[h];
     plex => ProcessPlex[h];
     xImageShift => ProcessXImageShift[h];
     finishing => ProcessFinishing[h];
     jobAttributes => ProcessJobAttributes[h];
     jobSecurity => ProcessJobSecurity[h];
     stacking => ProcessStacking[h];
     yImageShift => ProcessYImageShift[h];
     bookletSignature => ProcessSimplePamphletSignature[h];
     binderyFinishing => ProcessBinderyFinishing[h];
     binderyFinishingSelect => ProcessBinderyFinishingSelect[h];
     docCreationDate, docCreator, docName, docComment, docStartMessage,
      docEndMessage => ProcessDocInstruction[h];
     covers => ProcessCovers[h];
     ENDCASE;

    h.tempData.option.modified ← TRUE;
    END;
    };
   h.proceedDataPtr.defaults.offsets[h.tempData.opType] # NIL =>
```

Copyright © 1992 Xerox Corporation All Rights Reserved

```
    h.tempData.optionPtr ← h.proceedDataPtr.defaults.offsets[
     h.tempData.opType];
   ENDCASE => {
    IF h.tempData.opType = copySelect THEN {
     h.tempData.optionPtr ← @h.tempData.option;
     h.tempData.option.optionType ← copySelect;
     h.tempData.option.copySelect ← h.smZone.NEW[
      PublicPrinting .RunOfCardinalRep[2]];
     h.tempData.option.copySelect[0] ← 1;
     h.tempData.option.copySelect[1] ← 1;
     };
    };
 IF h.tempData.newOptionPtr = NIL AND h.tempData.optionPtr # NIL THEN {
  h.pc.pcm.nodeSizeInWords ←
   IF globals.optionSizes[h.tempData.opType] # 0 THEN globals.optionSizes[
   h.tempData.opType] ELSE h.tempData.optionSize;
  h.pc.pcm.zoneRecPtr ← @h.zone;
  IF IPMicrocode.CALL[
   function: IPFunction.AllocateNodeNFL, entryContext: h].result # 0 THEN {
   h.pc.operationStage ← 7; RETURN; };
  h.tempData.newOptionPtr ← h.pc.pcm.nodePtr;

  Inline.LongCOPY[
   from: h.tempData.optionPtr, nwords: h.pc.pcm.nodeSizeInWords,
   to: h.tempData.newOptionPtr];
  };
 IF h.tempData.newOptionPtr # NIL THEN {
  h.tempData.newOptionPtr.next ← h.startResultsPtr.instructions.first;
  h.startResultsPtr.instructions.first ← h.tempData.newOptionPtr};

 h.startResultsPtr.instructions.offsets[h.tempData.opType] ←
  h.tempData.newOptionPtr;
 SELECT h.tempData.opType FROM
  plex => h.plexMode ← h.tempData.newOptionPtr.plex;
  finishing => h.finishingOption ← h.tempData.newOptionPtr;
  ENDCASE;
 h.tempData.opType ← SUCC[h.tempData.opType];
 ENDLOOP;
IF h.startResultsPtr # NIL THEN {
 IF h.startResultsPtr.instructions.offsets[media] # NIL
  AND h.startResultsPtr.instructions.offsets[covers] # NIL THEN {
  covers: PreParser.Covers = h.startResultsPtr.instructions.offsets[
   covers].covers;
  firstMediaIndex: CARDINAL = CARDINAL[h.mediaVectorCorrection];
  lastMediaIndex: CARDINAL =
   firstMediaIndex +
    (h.startResultsPtr.instructions.offsets[media].media.LENGTH - 1);
  GetValidCoversIndex: PROC [requestedIndex: CARDINAL]
   RETURNS [actualIndex: CARDINAL ← 0] = INLINE {
   SELECT TRUE FROM
```

Copyright © 1992 Xerox Corporation All Rights Reserved

```
      requestedIndex < firstMediaIndex, requestedIndex > lastMediaIndex => {
       Warning[
        h.pc.pcm.clientContext, [
        instructionValue[
        problem: coverMediaIndex, value: requestedIndex]]]};
      ENDCASE => actualIndex ← requestedIndex - firstMediaIndex;
     };
    IF covers.frontCoverMediumValid THEN
     covers.frontCoverMedium ← GetValidCoversIndex[covers.frontCoverMedium];
    IF covers.backCoverMediumValid THEN
     covers.backCoverMedium ← GetValidCoversIndex[covers.backCoverMedium];
    };
   };

 RETURN[loop: FALSE];
 END;
StringConcat: PUBLIC PROC [first, second: LONG STRING, z: UNCOUNTED ZONE]
 RETURNS [newString: LONG STRING] = {
 newString ← String.CopyToNewString[first, z, String.Length[second]];
 String.AppendString[newString, second];
 };

SignalBadPrintingInstruction: PUBLIC PROC [
 problem: PreParserCallBack.InstructionProblem, instruction: LONG STRING] = {
 SIGNAL InstructionsProblem[
  problem: [instructionProblem[problem: problem, instruction: instruction]]];
 };

Warning: PUBLIC PROC [
 context: DecomposerCommon.ClientContext, problem: PreParserCallBack.Problem] =
 {
 PreParserCallBack.ReportObjectFault[
  context: context,
  objectFault: [
  problem: problem, severity: masterWarning, side: simplex, sheetNumber: 0,
  copyNumber: 1]];
 };

Initialize: PUBLIC PROCEDURE = BEGIN globals ← NIL; END;
END.
```

Copyright © 1992 Xerox Corporation All Rights Reserved

```
DIRECTORY
 Inline USING [LongCOPY],
 IPFunction USING [AllocateNodeNFL, GuaranteeStackSpace, PrePushStack],
 IPMicrocode USING [CALL],
 PreParser USING [
  JobProceedDataPtr, OptionPtr, OptionType, PrintInstructionsResultsPtr],
 PreParserCommon USING [
  MainHandle, StackEntry, String, StringPtr, VectorOfElements,
  VectorOfElementsPtr, WordsFromBytes],
 PreParserData USING [OperandType],
 PreParserFrameStack USING [ChangeRefCountAndFree],
 PreParserInstructions,
 PreParserMain USING [],
 PreParserMainErrors USING [insufficientMemory, unexpectedError],
 PreParserVector USING [MakeVec, MakeVecLU],
 PublicPrinting USING [
  Finishing, InternalMedia, Plex, RunOfCardinalRep, RunOfRunOfCardinalRep,
  RunOfCardinalSeq, RunofRunOfCardinalSeq];

PreParserInstructionsImplA: PROGRAM
 IMPORTS
  Inline, IPMicrocode, PreParserCommon, PreParserFrameStack,
  PreParserInstructions, PreParserVector
 EXPORTS PreParserInstructions, PreParserMain =
 BEGIN

 LongCardinal: TYPE = LONG CARDINAL;
 LINT: TYPE = LONG INTEGER;

 AllocateNodeFailed: SIGNAL = CODE;

 globalsA: PUBLIC PreParserInstructions.GlobalsPtr ← NIL;

 FreeAllOptions: PUBLIC PROCEDURE [
  proceedDataPtr: PreParser.JobProceedDataPtr,
  printingInstructionsPtr: PreParser.PrintInstructionsResultsPtr,
  z: UNCOUNTED ZONE] =
  BEGIN
  theOption, nextOption: PreParser.OptionPtr ← NIL;
  freeResultantPageSelect: BOOLEAN ← TRUE;
  resultantPageSelect: PreParser.OptionPtr ←
   IF printingInstructionsPtr # NIL THEN
   printingInstructionsPtr.instructions.offsets[pageSelect] ELSE NIL;

  FreeTheOption: PROCEDURE =
   BEGIN
   SELECT theOption.optionType FROM
    copySelect = > z.FREE[@theOption.copySelect];
    docComment = > z.FREE[@theOption.docComment];
```

Copyright © 1992 Xerox Corporation All Rights Reserved

```
    docCreationDate => z.FREE[@theOption.createDate];
    docCreator => z.FREE[@theOption.docCreator];
    docName => z.FREE[@theOption.docName];
    docStartMessage => z.FREE[@theOption.docStartMessage];
    docEndMessage => z.FREE[@theOption.docEndMessage];
    media => PreParserInstructions.FreeJobMedia[z, theOption.media];
    pageSelect => {
     IF resultantPageSelect # NIL THEN {
      IF theOption.pageSelect = resultantPageSelect.pageSelect THEN
       freeResultantPageSelect ← FALSE;
      };
     PreParserInstructions.FreeRunOfRunOfCardinal[z, theOption.pageSelect];
     };
    jobSecurity => PreParserInstructions.FreeJobAccess[z, theOption.access];
    jobAttributes =>
     PreParserInstructions.FreeJobAttributes[z, theOption.jobAttributes];
    bookletSignature => {
     z.FREE[@theOption.signature.sourcePageDims];
     z.FREE[@theOption.signature];
     };
    binderyFinishing =>
     PreParserInstructions.FreeBinderySequence[z, theOption.binderySequence];
    binderyFinishingSelect =>
     PreParserInstructions.FreeBinderySequenceSelect[
      z, theOption.binderySelect];
    other => {
     z.FREE[@theOption.otherOption.name];
     z.FREE[@theOption.otherOption.data.BASE];
     };
    ENDCASE;

   z.FREE[@theOption];
   END;
  theOption ← proceedDataPtr.options.first;
  UNTIL theOption = NIL DO
   nextOption ← theOption.next;
   FreeTheOption[];
   theOption ← nextOption;
   ENDLOOP;
  z.FREE[@proceedDataPtr.options];

  theOption ← proceedDataPtr.defaults.first;
  UNTIL theOption = NIL DO
   nextOption ← theOption.next;
   FreeTheOption[];
   theOption ← nextOption;
   ENDLOOP;
  z.FREE[@proceedDataPtr.defaults];

  IF freeResultantPageSelect AND resultantPageSelect # NIL THEN
```

Copyright © 1992 Xerox Corporation All Rights Reserved

```
  PreParserInstructions.FreeRunOfRunOfCardinal[
   z, resultantPageSelect.pageSelect];

 END;
PushStringOp: PUBLIC PROCEDURE [
 h: PreParserCommon.MainHandle, opType: PreParser.OptionType,
 string: LONG STRING, stage: CARDINAL] =
 BEGIN
 IF h.pc.operationStage <= stage THEN {
  IF PushGlobalString[h, globalsA.optionNames[opType]] THEN {
   h.pc.operationStage ← stage; RETURN; };
  h.pc.pcm.nodeSizeInWords ←
   SIZE[PreParserCommon.String] + PreParserCommon.WordsFromBytes[
    string.length];
  };
 IF h.pc.operationStage <= stage + 1 THEN {
  h.pc.pcm.zoneRecPtr ← @h.zone;
  IF IPMicrocode.CALL[
   function: IPFunction.AllocateNodeNFL, entryContext: h].result # 0 THEN {
   h.pc.operationStage ← stage + 1; RETURN; };
  h.stackEntry ← [
   type: string, frameData: string[stringPtr: h.pc.pcm.nodePtr]];
  h.stackEntry.stringPtr↑ ← [
   cn: [
   fill: 0, preambleOwned: FALSE, referenceCount: 1, next: NIL, type: string,
   zoneRecPtr: @h.zone], length: string.length, byteOffset: 0,
   base: @h.stackEntry.stringPtr.chars, chars:];
  Inline.LongCOPY[
   from: @string.text, nwords: PreParserCommon.WordsFromBytes[string.length],
   to: @h.stackEntry.stringPtr.chars];
  };
 IF h.pc.operationStage <= stage + 2 THEN {
  IF IPMicrocode.CALL[
   function: IPFunction.PrePushStack, entryContext: h].result # 0 THEN {
   h.pc.operationStage ← stage + 2; RETURN; };

  h.sv.operand02.integer ← h.sv.operand02.integer + 2};
 END;
PushGlobalString: PUBLIC PROCEDURE [
 h: PreParserCommon.MainHandle, globalStringPtr: PreParserCommon.StringPtr]
 RETURNS [loop: BOOLEAN ← TRUE] =
 BEGIN
 preParserZoneStringPtr: PreParserCommon.StringPtr;
 h.pc.pcm.nodeSizeInWords ←
  SIZE[PreParserCommon.String] + globalStringPtr.length;
 h.pc.pcm.zoneRecPtr ← @h.zone;
 IF IPMicrocode.CALL[
  function: IPFunction.AllocateNodeNFL, entryContext: h].result # 0 THEN
  RETURN[loop: TRUE];
 preParserZoneStringPtr ← h.pc.pcm.nodePtr;
```

Copyright © 1992 Xerox Corporation All Rights Reserved

```
  Inline.LongCOPY[
   from: globalStringPtr, nwords: h.pc.pcm.nodeSizeInWords,
   to: preParserZoneStringPtr];

  preParserZoneStringPtr.cn.zoneRecPtr ← @h.zone;
  preParserZoneStringPtr.base ←
   LOOPHOLE[preParserZoneStringPtr + SIZE[PreParserCommon.String], LONG
   POINTER];
  h.stackEntry ← [
   type: identifier,
   frameData: identifier[idStringPtr: preParserZoneStringPtr]];
 [] ← IPMicrocode.CALL[function: IPFunction.PrePushStack, entryContext: h];
  RETURN[loop: FALSE];
  END;
PushGlobalVector: PUBLIC PROCEDURE [
  h: PreParserCommon.MainHandle,
  globalVectorPtr: PreParserCommon.VectorOfElementsPtr]
  RETURNS [loop: BOOLEAN ← TRUE] =
  BEGIN
  preParserZoneVectorPtr: PreParserCommon.VectorOfElementsPtr;
  h.pc.pcm.nodeSizeInWords ←
   SIZE[PreParserCommon.VectorOfElements] +
    globalVectorPtr.count * SIZE[PreParserCommon.StackEntry];
  h.pc.pcm.zoneRecPtr ← @h.zone;
  IF IPMicrocode.CALL[
   function: IPFunction.AllocateNodeNFL, entryContext: h].result # 0 THEN
   RETURN[loop: TRUE];
  preParserZoneVectorPtr ← h.pc.pcm.nodePtr;
  Inline.LongCOPY[
   from: globalVectorPtr, nwords: h.pc.pcm.nodeSizeInWords,
   to: preParserZoneVectorPtr];

  preParserZoneVectorPtr.cn.zoneRecPtr ← @h.zone;
  FOR count: CARDINAL ← globalVectorPtr.low, count + 1 UNTIL count =
   globalVectorPtr.count DO
   h.pc.pcm.nodeSizeInWords ←
    SIZE[PreParserCommon.String] + globalVectorPtr.elements[
     count].idStringPtr.length;
   h.pc.pcm.zoneRecPtr ← @h.zone;
   IF IPMicrocode.CALL[
    function: IPFunction.AllocateNodeNFL, entryContext: h].result # 0 THEN
    RETURN[loop: TRUE];
   preParserZoneVectorPtr.elements[count].idStringPtr ← h.pc.pcm.nodePtr;
   Inline.LongCOPY[
    from: globalVectorPtr.elements[count].idStringPtr,
    nwords: h.pc.pcm.nodeSizeInWords,
    to: preParserZoneVectorPtr.elements[count].idStringPtr];
   preParserZoneVectorPtr.elements[count].idStringPtr.cn.zoneRecPtr ← @h.zone;
   preParserZoneVectorPtr.elements[count].idStringPtr.base ←
```

Copyright © 1992 Xerox Corporation All Rights Reserved

```
LOOPHOLE[preParserZoneVectorPtr.elements[count].idStringPtr + SIZE[
      PreParserCommon.String], LONG POINTER];
 ENDLOOP;
h.stackEntry ← [
 type: vectorOfElements,
 frameData: vectorOfElements[vectorPtr: preParserZoneVectorPtr]];
[] ← IPMicrocode.CALL[function: IPFunction.PrePushStack, entryContext: h];
RETURN[loop: FALSE];
END;
IdentifierFromString: PROC [h: PreParserCommon.MainHandle, string: LONG STRING]
 RETURNS [stringPtr: PreParserCommon.StringPtr ← NIL] =
 BEGIN
 stringLengthInWords: CARDINAL ← PreParserCommon.WordsFromBytes[string.length];
 h.pc.pcm.nodeSizeInWords ← SIZE[PreParserCommon.String] + stringLengthInWords;
 h.pc.pcm.zoneRecPtr ← @h.zone;
 IF IPMicrocode.CALL[
  function: IPFunction.AllocateNodeNFL, entryContext: h].result # 0 THEN
  SIGNAL AllocateNodeFailed;
 stringPtr ← h.pc.pcm.nodePtr;
 stringPtr↑ ← [
  cn: [
  fill: 0, preambleOwned: FALSE, referenceCount: 1, next: NIL, type: string,
  zoneRecPtr: @h.zone], length: string.length, byteOffset: 0,
  base: @stringPtr.chars, chars:];
 Inline.LongCOPY[
  from: @string.text, nwords: stringLengthInWords, to: @stringPtr.chars];
 END;
PushExternalInstructions: PUBLIC PROCEDURE [h: PreParserCommon.MainHandle]
 RETURNS [loop: BOOLEAN ← TRUE] =
 BEGIN
 extCopySelect, runOfCardSeq: PublicPrinting.RunOfCardinalSeq ← NIL;
 extPageSelect, runOfRunSeq: PublicPrinting.RunofRunOfCardinalSeq ← NIL;
 number: INTEGER ← 0;
 BEGIN
 ENABLE { AllocateNodeFailed => GOTO outOfMemory; };

 h.sv.operand02.integer ← 0;

 IF h.proceedDataPtr.options.offsets[copySelect] # NIL THEN {

  IF h.pc.operationStage <= 14 THEN {
   h.integer ← 2;
   IF IPMicrocode.CALL[
    function: IPFunction.GuaranteeStackSpace, entryContext: h].result # 0
    THEN {h.pc.operationStage ← 14; RETURN; };
   };

  PreParserFrameStack.ChangeRefCountAndFree[
   h: h, ptr: globalsA.optionNames[copySelect], delta: 1];
  h.stackEntry ← [
```

Copyright © 1992 Xerox Corporation All Rights Reserved

```
  type: identifier,
  frameData: identifier[idStringPtr: globalsA.optionNames[copySelect]]];
 [] ← IPMicrocode.CALL[function: IPFunction.PrePushStack, entryContext: h];

 h.stackEntry ← [
  type: dupPopOrDie, frameData: dupPopOrDie[dupPopOrDie: 998]];
 [] ← IPMicrocode.CALL[function: IPFunction.PrePushStack, entryContext: h];


 h.sv.operand02.integer ← h.sv.operand02.integer + 2;
 };

IF h.proceedDataPtr.options.offsets[pageSelect] # NIL THEN {

 IF h.pc.operationStage <= 16 THEN {
  h.integer ← 2;
  IF IPMicrocode.CALL[
   function: IPFunction.GuaranteeStackSpace, entryContext: h].result # 0
   THEN {h.pc.operationStage ← 16; RETURN; };
  };

 PreParserFrameStack.ChangeRefCountAndFree[
  h: h, ptr: globalsA.optionNames[pageSelect], delta: 1];
 h.stackEntry ← [
  type: identifier,
  frameData: identifier[idStringPtr: globalsA.optionNames[pageSelect]]];
 [] ← IPMicrocode.CALL[function: IPFunction.PrePushStack, entryContext: h];

 h.stackEntry ← [
  type: dupPopOrDie, frameData: dupPopOrDie[dupPopOrDie: 997]];
 [] ← IPMicrocode.CALL[function: IPFunction.PrePushStack, entryContext: h];


 h.sv.operand02.integer ← h.sv.operand02.integer + 2;
 };

IF h.proceedDataPtr.options.offsets[media] # NIL AND h.pc.operationStage <= 31
 THEN {
 count: CARDINAL ← h.proceedDataPtr.options.offsets[media].media.LENGTH;

 IF h.pc.operationStage <= 19 THEN {
  h.stackEntry ← [
   type: identifier,
   frameData: identifier[idStringPtr: globalsA.optionNames[media]]];
  IF IPMicrocode.CALL[
   function: IPFunction.PrePushStack, entryContext: h].result # 0 THEN {
   h.pc.operationStage ← 19; RETURN; };
  PreParserFrameStack.ChangeRefCountAndFree[
   h: h, ptr: globalsA.optionNames[media], delta: 1];
```

Copyright © 1992 Xerox Corporation All Rights Reserved

```
  h.tempData.tempCount ← 0;
  };

 WHILE h.tempData.tempCount < count DO
  IF h.pc.operationStage <= 30 THEN {
   h.stackEntry ← [
    type: dupPopOrDie, frameData: dupPopOrDie[dupPopOrDie: 999]];
   };
  IF IPMicrocode.CALL[
   function: IPFunction.PrePushStack, entryContext: h].result # 0 THEN {
   h.pc.operationStage ← 30; RETURN; };
  h.tempData.tempCount ← h.tempData.tempCount + 1;
  ENDLOOP;

 h.sv.operand03.integer ← h.sv.operand02.integer;
 h.sv.operand01.integer ← 1;
 h.sv.operand02.integer ← count;
 IF PreParserVector.MakeVecLU[h: h].loop THEN {
  h.pc.operationStage ← 31;
  h.sv.operand02.integer ← h.sv.operand03.integer;
  RETURN;
  };

 h.sv.operand02.integer ← h.sv.operand03.integer + 2;
 };

IF h.proceedDataPtr.options.offsets[plex] # NIL AND h.pc.operationStage <= 33
 THEN {
 staticStringPlex: PreParserInstructions.StaticStringType ← simplex;
 h.integer ← 2;

 IF IPMicrocode.CALL[
  function: IPFunction.GuaranteeStackSpace, entryContext: h].result # 0 THEN
  {h.pc.operationStage ← 33; RETURN; };

 PreParserFrameStack.ChangeRefCountAndFree[
  h: h, ptr: globalsA.optionNames[plex], delta: 1];
 h.stackEntry ← [
  type: identifier,
  frameData: identifier[idStringPtr: globalsA.optionNames[plex]]];
 [] ← IPMicrocode.CALL[function: IPFunction.PrePushStack, entryContext: h];

 staticStringPlex ←
  SELECT h.proceedDataPtr.options.offsets[plex].plex FROM
   duplex => duplex,
   duplexHeadToToe => duplexHeadToToe,
   ENDCASE => simplex;

 h.stackEntry.idStringPtr ← IdentifierFromString[
  h: h, string: globalsA.staticStrings[staticStringPlex]];
```

Copyright © 1992 Xerox Corporation All Rights Reserved

```
 [] ← IPMicrocode.CALL[function: IPFunction.PrePushStack, entryContext: h];

 h.sv.operand02.integer ← h.sv.operand02.integer + 2;
 };

IF h.proceedDataPtr.options.offsets[xImageShift] # NIL
 AND h.pc.operationStage <= 34 THEN {
 h.integer ← 2;

 IF IPMicrocode.CALL[
  function: IPFunction.GuaranteeStackSpace, entryContext: h].result # 0 THEN
  {h.pc.operationStage ← 34; RETURN; };
 PreParserFrameStack.ChangeRefCountAndFree[
  h: h, ptr: globalsA.optionNames[xImageShift], delta: 1];
 h.stackEntry ← [
  type: identifier,
  frameData: identifier[idStringPtr: globalsA.optionNames[xImageShift]]];
 [] ← IPMicrocode.CALL[function: IPFunction.PrePushStack, entryContext: h];

 h.stackEntry ← [
  type: real,
  frameData: real[
  real: h.proceedDataPtr.options.offsets[xImageShift].xImageShift]];
 [] ← IPMicrocode.CALL[function: IPFunction.PrePushStack, entryContext: h];

 h.sv.operand02.integer ← h.sv.operand02.integer + 2;
 };

IF h.proceedDataPtr.options.offsets[finishing] # NIL
 AND h.pc.operationStage <= 35 THEN {
 h.integer ← 2;

 IF IPMicrocode.CALL[
  function: IPFunction.GuaranteeStackSpace, entryContext: h].result # 0 THEN
  {h.pc.operationStage ← 35; RETURN; };

 PreParserFrameStack.ChangeRefCountAndFree[
  h: h, ptr: globalsA.optionNames[finishing], delta: 1];
 h.stackEntry ← [
  type: identifier,
  frameData: identifier[idStringPtr: globalsA.optionNames[finishing]]];
 [] ← IPMicrocode.CALL[function: IPFunction.PrePushStack, entryContext: h];

 SELECT PublicPrinting.Finishing[
 h.proceedDataPtr.options.offsets[finishing].finishing] FROM
  portraitSingleStitch => {
   h.stackEntry.idStringPtr ← IdentifierFromString[
    h: h, string: globalsA.staticStrings[cornerStaple]];
   };
  landscapeSingleStitch => {
```

Copyright © 1992 Xerox Corporation All Rights Reserved

```
    h.stackEntry.type ← vectorOfElements;
    PreParserFrameStack.ChangeRefCountAndFree[
     h: h, ptr: globalsA.staticVectors[XeroxLandscapeStaple], delta: 1];
    h.stackEntry.vectorPtr ← globalsA.staticVectors[XeroxLandscapeStaple];
    };
   doubleStitch => {
    h.stackEntry.type ← vectorOfElements;
    PreParserFrameStack.ChangeRefCountAndFree[
     h: h, ptr: globalsA.staticVectors[XeroxDoubleStaple], delta: 1];
    h.stackEntry.vectorPtr ← globalsA.staticVectors[XeroxDoubleStaple];
    };
   bindOnly => {
    h.stackEntry.type ← vectorOfElements;
    PreParserFrameStack.ChangeRefCountAndFree[
     h: h, ptr: globalsA.staticVectors[XeroxBind], delta: 1];
    h.stackEntry.vectorPtr ← globalsA.staticVectors[XeroxBind];
    };
   sampleTray => {
    h.stackEntry.type ← vectorOfElements;
    PreParserFrameStack.ChangeRefCountAndFree[
     h: h, ptr: globalsA.staticVectors[XeroxSampleTray], delta: 1];
    h.stackEntry.vectorPtr ← globalsA.staticVectors[XeroxSampleTray];
    };
   none => {
    h.stackEntry.idStringPtr ← IdentifierFromString[
     h: h, string: globalsA.staticStrings[none]];
    };
   ENDCASE => {h.integer ← 5; GOTO unexpectedError; };
  [] ← IPMicrocode.CALL[function: IPFunction.PrePushStack, entryContext: h];

  h.sv.operand02.integer ← h.sv.operand02.integer + 2;
  };

 IF h.proceedDataPtr.options.offsets[yImageShift] # NIL
  AND h.pc.operationStage <= 36 THEN {
  h.integer ← 2;
  IF IPMicrocode.CALL[
   function: IPFunction.GuaranteeStackSpace, entryContext: h].result # 0 THEN
   {h.pc.operationStage ← 36; RETURN; };

  PreParserFrameStack.ChangeRefCountAndFree[
   h: h, ptr: globalsA.optionNames[yImageShift], delta: 1];
  h.stackEntry ← [
   type: identifier,
   frameData: identifier[idStringPtr: globalsA.optionNames[yImageShift]]];
  [] ← IPMicrocode.CALL[function: IPFunction.PrePushStack, entryContext: h];

  h.stackEntry ← [
   type: real,
   frameData: real[
```

Copyright © 1992 Xerox Corporation All Rights Reserved

```
    real: h.proceedDataPtr.options.offsets[yImageShift].yImageShift]];
   [] ← IPMicrocode.CALL[function: IPFunction.PrePushStack, entryContext: h];

   h.sv.operand02.integer ← h.sv.operand02.integer + 2;
   };

  IF h.pc.operationStage <= 37 THEN
   h.tempData.optionPtr ← h.proceedDataPtr.options.offsets[other];

  IF h.pc.operationStage <= 37 THEN
   UNTIL h.tempData.optionPtr = NIL DO
    h.tempData.optionPtr ← h.tempData.optionPtr.next; ENDLOOP;
  h.sv.operand01.integer ← h.sv.operand02.integer;
  IF PreParserVector.MakeVec[h: h].loop THEN {
   h.pc.operationStage ← 37; RETURN; };
  h.pc.operationStage ← 0;
  END;
  RETURN[loop: FALSE];
  EXITS
   unexpectedError => {
    h.pc.pcm.data.code ← PreParserMainErrors.unexpectedError;
    h.pc.pcm.action ← fatalError;
    };
   outOfMemory => {
    h.pc.pcm.data.code ← PreParserMainErrors.insufficientMemory;
    h.pc.pcm.action ← fatalError;
    };
  END;
FreeJobMedia: PUBLIC PROC [
 z: UNCOUNTED ZONE, internalMedia: PublicPrinting.InternalMedia] = {
 internalMediaFields: PreParserInstructions.InternalMediaFields ← name;
 FOR index: CARDINAL ← 0, index + 1 WHILE index < internalMedia.LENGTH DO
  WHILE internalMediaFields IN [name..otherColor] DO
   SELECT internalMediaFields FROM
    name =>
     IF internalMedia[index].name # NIL THEN
      z.FREE[@internalMedia[index].name];
    message =>
     IF internalMedia[index].message # NIL THEN
      z.FREE[@internalMedia[index].message];
    otherPaperType =>
     IF internalMedia[index].otherPaperType # NIL THEN
      z.FREE[@internalMedia[index].otherPaperType];
    otherColor =>
     IF internalMedia[index].otherColor # NIL THEN
      z.FREE[@internalMedia[index].otherColor];
    ENDCASE;
   internalMediaFields ← SUCC[internalMediaFields]
   ENDLOOP;
  ENDLOOP;
```

Copyright © 1992 Xerox Corporation All Rights Reserved

```
 z.FREE[@internalMedia.BASE];
 };

FreeRunOfRunOfCardinal: PUBLIC PROC [
 z: UNCOUNTED ZONE,
 runOfRunOfCardinalSeq: PublicPrinting.RunofRunOfCardinalSeq] =
 BEGIN
 FOR i: CARDINAL ← 0, i + 1 WHILE i < runOfRunOfCardinalSeq ↑ .length DO
  WITH runOfRunOfCardinalSeq ↑ [i] SELECT FROM
   run => NULL;
   select => z.FREE[@select];
   ENDCASE;
  ENDLOOP;
 z.FREE[@runOfRunOfCardinalSeq];
 END;

InitializeModuleA: PUBLIC PROCEDURE = BEGIN globalsA ← NIL; END;
END.
```

Copyright © 1992 Xerox Corporation All Rights Reserved

```
DIRECTORY
 Inline USING [LongCOPY],
 IPMicrocode USING [CALL],
 IPFunction USING [AllocateNodeNFL, FreeNodeNFL],
 PreParser USING [Option, OptionType],
 PreParserCommon USING [
  ContentType, MainHandle, OtherOptionType, StackEntry, StackEntryPtr, String,
  StringPtr, VectorOfElements, VectorOfElementsPtr, WordsFromBytes],
 PreParserControl USING [preParserZone],
 PreParserFrameStack USING [ComplexNodeRefCount],
 PreParserInstructions,
 PreParserMainErrors USING [insufficientMemory, nestedContentInstrsUnimpld],
 PreParserStackOps USING [MergeProp],
 PreParserStaticStrings USING [PreParserStaticStringsImpl],
 PublicPrinting USING [
  Plex, RunOfCardinalRep, RunOfCardinalSeq, RunOfRunOfCardinalRep,
  RunofRunOfCardinalSeq, RunSelect],
 ResMgrHeap USING [MakeNode],
 Runtime USING [GetTableBase],
 String USING [CopyToNewString];

PreParserInstructionsImplB: PROGRAM
 IMPORTS
  Inline, IPMicrocode, PreParserCommon, PreParserControl, PreParserFrameStack,
  PreParserInstructions, PreParserStackOps, PreParserStaticStrings, ResMgrHeap,
  Runtime, String
 EXPORTS PreParserInstructions =
 BEGIN OPEN PreParserInstructions;

 CSRptr: TYPE = LONG BASE POINTER TO StringRecord;
 StringOffset: TYPE = CSRptr RELATIVE POINTER TO StringBody;
 StringRecord: TYPE = RECORD [
  nStrings: CARDINAL,
  StringName: ARRAY PreParserInstructions.StaticStringType OF StringOffset];

 AllocateNodeFailed: SIGNAL = CODE;

 unSupportedInstructions: PUBLIC PreParserInstructions.UnSupportedInstructions;

 globalsB: PreParserInstructions.GlobalsPtr ← NIL;

 MakeStaticString: PROC [text: LONG STRING]
  RETURNS [stringPtr: PreParserCommon.StringPtr ← NIL] =
  BEGIN
  stringPtr ← ResMgrHeap.MakeNode[
   z: PreParserControl.preParserZone,
   n:
   SIZE[PreParserCommon.String] + PreParserCommon.WordsFromBytes[text.length]];
  stringPtr ↑ ← [
```

Copyright © 1992 Xerox Corporation All Rights Reserved

```
    cn: [
    fill: 0, preambleOwned: TRUE, referenceCount: 1, next: NIL, type: string,
    zoneRecPtr: NIL], length: text.length, byteOffset: 0,
    base: @stringPtr.chars, chars:];
  Inline.LongCOPY[
    from: @text.text, nwords: PreParserCommon.WordsFromBytes[text.length],
    to: @stringPtr.chars];
  END;
AddStaticVector: PROCEDURE [
  vectorType: PreParserInstructions.StaticVectorType,
  element1: PreParserInstructions.StaticStringType,
  element2: PreParserInstructions.StaticStringType] =
  BEGIN
  stackEntry1, stackEntry2: PreParserCommon.StackEntry;
  stackEntry1 ← [
    fill: 0, type: identifier,
    frameData: identifier[
    idStringPtr: ResMgrHeap.MakeNode[
    z: PreParserControl.preParserZone, n: SIZE[PreParserCommon.String]]]];
  stackEntry2 ← [
    fill: 0, type: identifier,
    frameData: identifier[
    idStringPtr: ResMgrHeap.MakeNode[
    z: PreParserControl.preParserZone, n: SIZE[PreParserCommon.String]]]];
  stackEntry1.idStringPtr ↑ ← [
    cn: [
    fill: 0, preambleOwned: TRUE, referenceCount: 1, next: NIL, type: string,
    zoneRecPtr: NIL], byteOffset: 0,
    length: globalsB.staticStrings[element1].length,
    base: @globalsB.staticStrings[element1].text, chars:];
  stackEntry2.idStringPtr ↑ ← [
    cn: [
    fill: 0, preambleOwned: TRUE, referenceCount: 1, next: NIL, type: string,
    zoneRecPtr: NIL], byteOffset: 0,
    length: globalsB.staticStrings[element2].length,
    base: @globalsB.staticStrings[element2].text, chars:];
  globalsB.staticVectors[vectorType] ← ResMgrHeap.MakeNode[
    z: PreParserControl.preParserZone,
    n:
    SIZE[PreParserCommon.VectorOfElements] +
     (SIZE[PreParserCommon.StackEntry] * 2)];
  globalsB.staticVectors[vectorType] ↑ ← [
    cn: [
    fill: 0, preambleOwned: TRUE, referenceCount: 1, next: NIL,
    type: vectorOfElements, zoneRecPtr: NIL], low: 0, count: 2,
    elements: TRASH];
  globalsB.staticVectors[vectorType] ↑ .elements[0] ← stackEntry1;
  globalsB.staticVectors[vectorType] ↑ .elements[1] ← stackEntry2;
  END;
AddUnSupportedVector: PROCEDURE [
```

Copyright © 1992 Xerox Corporation All Rights Reserved

```
vectorType: PreParserInstructions.UnSupportedVectors,
element1: PreParserInstructions.StaticStringType,
element2: PreParserInstructions.StaticStringType] = {
stackEntry1, stackEntry2: PreParserCommon.StackEntry;
stackEntry1 ← [
 fill: 0, type: identifier,
 frameData: identifier[
 idStringPtr: ResMgrHeap.MakeNode[
 z: PreParserControl.preParserZone, n: SIZE[PreParserCommon.String]]]];
stackEntry2 ← [
 fill: 0, type: identifier,
 frameData: identifier[
 idStringPtr: ResMgrHeap.MakeNode[
 z: PreParserControl.preParserZone, n: SIZE[PreParserCommon.String]]]];
stackEntry1.idStringPtr ↑ ← [
 cn: [
 fill: 0, preambleOwned: TRUE, referenceCount: 1, next: NIL, type: string,
 zoneRecPtr: NIL], byteOffset: 0,
 length: globalsB.staticStrings[element1].length,
 base: @globalsB.staticStrings[element1].text, chars:];
stackEntry2.idStringPtr ↑ ← [
 cn: [
 fill: 0, preambleOwned: TRUE, referenceCount: 1, next: NIL, type: string,
 zoneRecPtr: NIL], byteOffset: 0,
 length: globalsB.staticStrings[element2].length,
 base: @globalsB.staticStrings[element2].text, chars:];
unSupportedInstructions.vectors[vectorType] ← ResMgrHeap.MakeNode[
 z: PreParserControl.preParserZone,
 n:
 SIZE[PreParserCommon.VectorOfElements] +
  (SIZE[PreParserCommon.StackEntry] * 2)];
unSupportedInstructions.vectors[vectorType] ↑ ← [
 cn: [
 fill: 0, preambleOwned: TRUE, referenceCount: 1, next: NIL,
 type: vectorOfElements, zoneRecPtr: NIL], low: 0, count: 2,
 elements: TRASH];
unSupportedInstructions.vectors[vectorType] ↑ .elements[0] ← stackEntry1;
unSupportedInstructions.vectors[vectorType] ↑ .elements[1] ← stackEntry2;
};

ProcessContentInstrs: PUBLIC PROCEDURE [h: PreParserCommon.MainHandle]
 RETURNS [loop: BOOLEAN ← FALSE] =
 BEGIN
 ENABLE
  AllocateNodeFailed => {
   h.pc.pcm.data.code ← PreParserMainErrors.insufficientMemory;
   h.pc.pcm.action ← fatalError;
   loop ← TRUE;
   CONTINUE};
 IF h.pc.operationStage = 1 THEN {
```

Copyright © 1992 Xerox Corporation All Rights Reserved

```
  h.pc.operationStage ← 0; [] ← PreParserStackOps.MergeProp[h: h]; };
 IF h.pc.operationStage = 0 THEN {
  IF h.contentResults.plex # simultaneousDuplex
   OR h.contentResults.mediaSelect # LAST[CARDINAL]
   OR h.contentResults.onSimplex # simultaneousDuplex THEN {
   h.pc.pcm.data.code ← PreParserMainErrors.nestedContentInstrsUnimpld;
   h.pc.pcm.action ← fatalError;
   RETURN;
   };
  IF PreParserInstructions.DoMergeProps[h: h].loop THEN RETURN[loop: TRUE];
  IF h.sv.operand01.type = nullVectorOfElements THEN RETURN[loop: FALSE];
  };
 IF h.pc.operationStage < 4 THEN
  h.tempData.contentType ← FIRST[PreParserCommon.ContentType];
 DO
  IF h.pc.operationStage < 5 THEN {
   IF h.tempData.contentType = pageBinderyFinishingSelect THEN {
    h.sv.operand02.vectorPtr ← globals.staticVectors[
     standardPageBinderyFinishingSelect];
    h.sv.operand02.type ← vectorOfElements;
    }
   ELSE {
    h.sv.operand02.idStringPtr ← globalsB.contentStrings[
     h.tempData.contentType];
    h.sv.operand02.type ← identifier;
    };
   IF PreParserInstructions.LookupInstruction[h: h].loop THEN {
    h.pc.operationStage ← 4; RETURN[loop: TRUE]};
   };
  IF h.tempData.found THEN {
   BEGIN
   ENABLE
    InstructionsProblem => {
     Warning[h.pc.pcm.clientContext, problem]; CONTINUE};

   SELECT h.tempData.contentType FROM
    contentPlex =>
     IF h.startResultsPtr.resultsFlags.plexMayChange THEN {
      ProcessPlex[h]; h.contentResults.plex ← h.tempData.option.plex};
    pageMediaSelect => {
     BEGIN
     ENABLE {
      WrongType =>
       SignalBadPrintingInstruction[
        badType, String.CopyToNewString["pageMediaSelect"L, h.smZone]];
      WrongValue =>
       SignalBadPrintingInstruction[
        badValue, String.CopyToNewString["pageMediaSelect"L, h.smZone]];
      };
     IF h.startResultsPtr.resultsFlags.mediaMayChange THEN {
```

Copyright © 1992 Xerox Corporation All Rights Reserved

```
  mediaSelect: LONG CARDINAL ← LongCardinalValue[
   @h.stackEntry, LAST[CARDINAL]];
  h.contentResults.mediaSelect ← CARDINAL[mediaSelect];
  };
 END;
 };
contentPageSelect => {
 BEGIN
 ENABLE {
  WrongType =>
   SignalBadPrintingInstruction[
    badType, String.CopyToNewString[
    "contentPageSelect"L, h.smZone]];
  WrongValue =>
   SignalBadPrintingInstruction[
    badValue, String.CopyToNewString[
    "contentPageSelect"L, h.smZone]];
  };
 IF h.contentResults.contentPageSelect # NIL THEN {
  h.pc.pcm.zoneRecPtr ← @h.zone;
  h.pc.pcm.nodePtr ← h.contentResults.contentPageSelect;
  [] ← IPMicrocode.CALL[IPFunction.FreeNodeNFL, h];
  };
 h.contentResults.contentPageSelect ← VectorToRunOfCardinal[
  h, VectorElement[@h.stackEntry]];
 END;
 };
pageBinderyFinishingSelect => {
 Warning[
  h.pc.pcm.clientContext, [
  featureNotImplemented[feature: [pageBinderyFinishingSelect[]]]]];
 };
ENDCASE => {
 BEGIN
 ENABLE {
  WrongType =>
   SignalBadPrintingInstruction[
    badType, String.CopyToNewString["pageOnSimplex"L, h.smZone]];
  WrongValue =>
   SignalBadPrintingInstruction[
    badValue, String.CopyToNewString["pageOnSimplex"L, h.smZone]];
  };
 IF h.startResultsPtr.resultsFlags.onSimplexMayChange THEN {
  onSimplex: CARDINAL = CardinalValue[@h.stackEntry];
  h.contentResults.onSimplex ←
   IF onSimplex # 0 THEN simplex ELSE duplex;
  };
 END;
 };
END;
```

Copyright © 1992 Xerox Corporation All Rights Reserved

```
    PreParserFrameStack.ComplexNodeRefCount[
     h: h, entryPtr: @h.stackEntry, delta: -1];
    };
   IF h.tempData.contentType = LAST[PreParserCommon.ContentType] THEN EXIT;
   h.tempData.contentType ← SUCC[h.tempData.contentType];
   ENDLOOP;
  h.masterContentInstrs ← FALSE;
  END;
 VectorToRunOfCardinal: PROC [
  h: PreParserCommon.MainHandle, v: PreParserCommon.VectorOfElementsPtr]
  RETURNS [run: PublicPrinting.RunOfCardinalSeq ← NIL] = {
  seqLengthPtr: LONG POINTER TO CARDINAL ← NIL;
  IF v.count MOD 2 # 0 THEN ERROR WrongValue;
  h.pc.pcm.nodeSizeInWords ←
   SIZE[PublicPrinting.RunOfCardinalRep] + (SIZE[CARDINAL] * v.count);
  h.pc.pcm.zoneRecPtr ← @h.zone;
  IF IPMicrocode.CALL[
   function: IPFunction.AllocateNodeNFL, entryContext: h].result # 0 THEN
   SIGNAL AllocateNodeFailed;
  seqLengthPtr ← h.pc.pcm.nodePtr;
  seqLengthPtr ↑ ← v.count;
  run ← h.pc.pcm.nodePtr;
  FOR vIndex: CARDINAL IN [0..v.count) DO
   run[vIndex] ← CardinalValue[@v.elements[vIndex]]; ENDLOOP;
  };

 ProcessPageSelect: PUBLIC PROCEDURE [h: PreParserCommon.MainHandle] = {
  copyRun, totalCopyRunEntries: CARDINAL ← 0;
  copyPageRun, currentCopyPageRun, tempPtr:
   PreParserInstructions.CopyPageRunPtr;
  extCopyAND, intCopyAND: PreParserInstructions.CopyANDPtr;
  extPageSelect, intPageSelect: PublicPrinting.RunofRunOfCardinalSeq ← NIL;
  index: CARDINAL ← 0;
  optimize: BOOLEAN ← TRUE;
  runOfRunVectorPtr: PreParserCommon.VectorOfElementsPtr ← NIL;
  run: PublicPrinting.RunSelect ← run;
  select: PublicPrinting.RunSelect ← select;
  BEGIN
  ENABLE {
   WrongType =>
    SignalBadPrintingInstruction[
     badType, String.CopyToNewString["PageSelect"L, h.smZone]];
   WrongValue =>
    SignalBadPrintingInstruction[
     badValue, String.CopyToNewString["PageSelect"L, h.smZone]];
   UNWIND =>
    IF intPageSelect # NIL THEN
     PreParserInstructions.FreeRunOfRunOfCardinal[h.smZone, intPageSelect];
   };
```

Copyright © 1992 Xerox Corporation All Rights Reserved

```
runOfRunVectorPtr ← VectorElement[@h.stackEntry];
IF runOfRunVectorPtr.count MOD 2 # 0 THEN ERROR WrongType;

intPageSelect ← h.smZone.NEW[
 PublicPrinting .RunOfRunOfCardinalRep[runOfRunVectorPtr.count]];

FOR index ← 0, index + 2 UNTIL index = runOfRunVectorPtr.count DO
 selectVector: PreParserCommon.VectorOfElementsPtr ← VectorElement[
  @runOfRunVectorPtr.elements[index + 1]];
 intPageSelect[index] ← [
  run[CardinalValue[@runOfRunVectorPtr.elements[index]]]];
 intPageSelect[index + 1] ← [
  select[
  h.smZone.NEW[PublicPrinting .RunOfCardinalRep[selectVector.count]]]];
 WITH pageRun: intPageSelect[index + 1] SELECT FROM
  select => {
   FOR pageIndex: CARDINAL IN [0..selectVector.count) DO
    pageRun.select[pageIndex] ← CardinalValue[
     @selectVector.elements[pageIndex]];
    ENDLOOP;
   };
  ENDCASE;
 ENDLOOP;

END;
IF h.proceedDataPtr.options.offsets[pageSelect] = NIL THEN {
 h.tempData.option.next ← NIL;
 h.tempData.option.pageSelect ← intPageSelect;
 h.tempData.optionPtr ← @h.tempData.option;
 RETURN};

extPageSelect ← h.proceedDataPtr.options.offsets[pageSelect].pageSelect;
index ← 0;
UNTIL optimize = FALSE DO
 WITH ext: extPageSelect[index] SELECT FROM
  run => {
   IF index = 0 AND ext.run = LAST[CARDINAL] THEN {
    optimize ← TRUE; index ← index + 1}
   ELSE optimize ← FALSE};
  select => {
   IF index = 1 AND ext.select[0] = LAST[CARDINAL] AND ext.select[1] = 1
    THEN {
    h.tempData.option.next ← NIL;
    h.tempData.option.pageSelect ← intPageSelect;
    h.tempData.optionPtr ← @h.tempData.option;
    RETURN}
   ELSE optimize ← FALSE};
  ENDCASE;
 ENDLOOP;
```

Copyright © 1992 Xerox Corporation All Rights Reserved

```
extCopyAND ← h.smZone.NEW[PreParserInstructions.CopyAND];
intCopyAND ← h.smZone.NEW[PreParserInstructions.CopyAND];
extCopyAND.index ← intCopyAND.index ← 0;
extCopyAND.startCopy ← intCopyAND.startCopy ← 0;

FOR index ← 0, index + 1 UNTIL index = 2 DO
 WITH ext: extPageSelect[index] SELECT FROM
  run = > extCopyAND.copies ← extCopyAND.endCopy ← ext.run;
  select = > extCopyAND.pageRun ← ext.select;
  ENDCASE;
 WITH int: intPageSelect[index] SELECT FROM
  run = > intCopyAND.copies ← intCopyAND.endCopy ← int.run;
  select = > intCopyAND.pageRun ← int.select;
  ENDCASE;
 ENDLOOP;
IF intCopyAND.copies < = extCopyAND.copies THEN copyRun ← intCopyAND.copies
ELSE copyRun ← extCopyAND.copies;
copyPageRun ← currentCopyPageRun ← NIL;
totalCopyRunEntries ← 0;

UNTIL (intCopyAND.index > = intPageSelect.length)
 OR (extCopyAND.index > = extPageSelect.length) DO
 IF copyPageRun = NIL THEN {
  copyPageRun ← currentCopyPageRun ← h.smZone.NEW[
   PreParserInstructions.CopyPageRun];
  copyPageRun.next ← NIL;
  copyPageRun.copies ← 0;
  copyPageRun.pageRun ← NIL}
 ELSE {
  tempPtr ← h.smZone.NEW[PreParserInstructions.CopyPageRun];
  currentCopyPageRun.next ← tempPtr;
  currentCopyPageRun ← tempPtr;
  currentCopyPageRun.next ← NIL};

 currentCopyPageRun.copies ← copyRun;
 currentCopyPageRun.pageRun ← ANDRunOfCardinal[
  extSelect: extCopyAND.pageRun, intSelect: intCopyAND.pageRun, h: h,
  z: h.smZone];
 totalCopyRunEntries ← totalCopyRunEntries + 1;

 IF intCopyAND.endCopy < = extCopyAND.endCopy THEN {
  extCopyAND.startCopy ← extCopyAND.startCopy + copyRun;
  intCopyAND.index ← intCopyAND.index + 2;
  IF intCopyAND.index < intPageSelect.length THEN {
   FOR index ← intCopyAND.index, index + 1 UNTIL index =
    intCopyAND.index + 2 DO
    WITH int: intPageSelect[index] SELECT FROM
     run = > {
```

Copyright © 1992 Xerox Corporation All Rights Reserved

```
      intCopyAND.startCopy ← intCopyAND.startCopy + copyRun;
      intCopyAND.copies ← int.run;
      intCopyAND.endCopy ← intCopyAND.endCopy + int.run};
     select => intCopyAND.pageRun ← int.select;
     ENDCASE;
    ENDLOOP}
  ELSE LOOP};
 IF extCopyAND.endCopy < intCopyAND.endCopy
  OR extCopyAND.endCopy = intCopyAND.startCopy THEN {
  IF extCopyAND.endCopy # intCopyAND.startCopy THEN
   intCopyAND.startCopy ← intCopyAND.startCopy + copyRun;
  extCopyAND.index ← extCopyAND.index + 2;
  IF extCopyAND.index < extPageSelect.length THEN {
   FOR index ← extCopyAND.index, index + 1 UNTIL index =
    extCopyAND.index + 2 DO
    WITH ext: extPageSelect[index] SELECT FROM
     run => {
      extCopyAND.startCopy ← extCopyAND.startCopy + copyRun;
      extCopyAND.copies ← ext.run;
      extCopyAND.endCopy ← extCopyAND.endCopy + ext.run};
     select => extCopyAND.pageRun ← ext.select;
     ENDCASE;
    ENDLOOP}
  ELSE LOOP};
 IF intCopyAND.endCopy <= extCopyAND.endCopy THEN
  copyRun ← intCopyAND.endCopy - intCopyAND.startCopy
 ELSE copyRun ← extCopyAND.endCopy - extCopyAND.startCopy;

 ENDLOOP;

h.tempData.option.next ← NIL;
h.tempData.option.pageSelect ← h.smZone.NEW[
 PublicPrinting .RunOfRunOfCardinalRep[totalCopyRunEntries * 2]];
h.tempData.optionPtr ← @h.tempData.option;
currentCopyPageRun ← copyPageRun;
FOR index ← 0, index + 2 UNTIL index = (totalCopyRunEntries * 2) DO
 h.tempData.option.pageSelect[index] ← [run[currentCopyPageRun.copies]];
 h.tempData.option.pageSelect[index + 1] ← [
  select[currentCopyPageRun.pageRun]];
 currentCopyPageRun ← currentCopyPageRun.next;
 ENDLOOP;
currentCopyPageRun ← copyPageRun;
UNTIL currentCopyPageRun = NIL DO
 tempPtr ← currentCopyPageRun.next;
 h.smZone.FREE[@currentCopyPageRun];
 currentCopyPageRun ← tempPtr;
 ENDLOOP;

PreParserInstructions.FreeRunOfRunOfCardinal[h.smZone, intPageSelect];
};
```

Copyright © 1992 Xerox Corporation All Rights Reserved

```
ANDRunOfCardinal: PUBLIC PROCEDURE [
 extSelect: PublicPrinting.RunOfCardinalSeq,
 intSelect: PublicPrinting.RunOfCardinalSeq, h: PreParserCommon.MainHandle,
 z: UNCOUNTED ZONE]
 RETURNS [mergePrintPage: PublicPrinting.RunOfCardinalSeq ← NIL] =
 BEGIN
 intPageAND, extPageAND: PreParserInstructions.PageANDPtr;
 mergeEntries: CARDINAL ← 0;

 extPageAND ← z.NEW[PreParserInstructions.PageAND];
 intPageAND ← z.NEW[PreParserInstructions.PageAND];

 UNTIL (extPageAND = NIL) OR (intPageAND = NIL) DO
  extPageAND.endPage ← extPageAND.pages ← extSelect[0];
  intPageAND.endPage ← intPageAND.pages ← intSelect[0];
  extPageAND.run ← extSelect;
  intPageAND.run ← intSelect;
  extPageAND.runIndex ← 1;
  intPageAND.runIndex ← 1;
  extPageAND.startPage ← intPageAND.startPage ← 0;

  mergeEntries ← MergeEntry[
   extPageAND: extPageAND, intPageAND: intPageAND,
   mergePrintPage: mergePrintPage, z: z];

  IF mergePrintPage = NIL THEN
   mergePrintPage ← z.NEW[PublicPrinting .RunOfCardinalRep[mergeEntries]]
  ELSE {
   z.FREE[@extPageAND]; z.FREE[@intPageAND]; extPageAND ← intPageAND ← NIL}
  ENDLOOP;
 END;
MergeEntry: PUBLIC PROCEDURE [
 extPageAND: PreParserInstructions.PageANDPtr,
 intPageAND: PreParserInstructions.PageANDPtr,
 mergePrintPage: PublicPrinting.RunOfCardinalSeq, z: UNCOUNTED ZONE]
 RETURNS [mergeEntries: CARDINAL] =
 BEGIN
 otherPageAND, pageAND: PreParserInstructions.PageANDPtr;
 mergeEntries ← 0;

 DO
  SELECT TRUE FROM
   (intPageAND.run[intPageAND.runIndex] = 0) => {
    pageAND ← intPageAND; otherPageAND ← extPageAND};
   (extPageAND.run[extPageAND.runIndex] = 0) => {
    pageAND ← extPageAND; otherPageAND ← intPageAND};
   (intPageAND.endPage <= extPageAND.endPage) => {
    pageAND ← intPageAND; otherPageAND ← extPageAND};
   ENDCASE => {pageAND ← extPageAND; otherPageAND ← intPageAND};
```

Copyright © 1992 Xerox Corporation All Rights Reserved

```
IF mergePrintPage # NIL THEN {
 mergePrintPage[mergeEntries] ← CARDINAL[pageAND.pages];
 mergePrintPage[mergeEntries + 1] ← pageAND.run[pageAND.runIndex];
 mergeEntries ← mergeEntries + 2}
ELSE mergeEntries ← mergeEntries + 2;

otherPageAND.startPage ← otherPageAND.startPage + pageAND.pages;
IF otherPageAND.startPage < otherPageAND.endPage THEN
 otherPageAND.pages ← otherPageAND.endPage - otherPageAND.startPage
ELSE {
 UNTIL (otherPageAND.startPage <= otherPageAND.endPage)
  OR ((otherPageAND.runIndex + 1) >= otherPageAND.run.length) DO
  otherPageAND.endPage ←
   otherPageAND.endPage + otherPageAND.run[otherPageAND.runIndex + 1];
  otherPageAND.runIndex ← otherPageAND.runIndex + 2;
  ENDLOOP;
 IF otherPageAND.endPage > otherPageAND.startPage THEN
  otherPageAND.pages ← otherPageAND.endPage - otherPageAND.startPage
 ELSE RETURN};

IF pageAND.runIndex < pageAND.run.length - 1 THEN {
 pageAND.startPage ← pageAND.endPage;
 pageAND.pages ← pageAND.run[pageAND.runIndex + 1];
 pageAND.endPage ← pageAND.endPage + pageAND.pages;
 pageAND.runIndex ← pageAND.runIndex + 2}
ELSE {
 IF otherPageAND.endPage <= pageAND.endPage THEN RETURN
 ELSE {
  IF mergePrintPage # NIL THEN {
   mergePrintPage[mergeEntries] ← LAST[CARDINAL];
   mergePrintPage[mergeEntries + 1] ← 0}
  ELSE mergeEntries ← mergeEntries + 2;
  RETURN}};
ENDLOOP;
END;
InitializeStaticStringTable: PROC [] =
BEGIN
staticStringsBase: CSRptr = Runtime.GetTableBase[
 PreParserStaticStrings.PreParserStaticStringsImpl];
FOR sIndex: PreParserInstructions.StaticStringType IN
 PreParserInstructions.StaticStringType DO
 globalsB.staticStrings[sIndex] ← @staticStringsBase[
  staticStringsBase.StringName[sIndex]];
 ENDLOOP;
END;
InitializeData: PUBLIC PROCEDURE =
BEGIN

AddMyOption: PROCEDURE [
 type: PreParserCommon.OtherOptionType, name: LONG STRING] =
```

Copyright © 1992 Xerox Corporation All Rights Reserved

```
 BEGIN
 IF name = NIL THEN globalsB.myOptionStrings[type] ← NIL
 ELSE {
  globalsB.myOptionStrings[type] ← String.CopyToNewString[
   s: name, z: PreParserControl.preParserZone];
  globalsB.myOptionNames[type] ← MakeStaticString[name];
  };
 END;
globalsB ← PreParserControl.preParserZone.NEW[PreParserInstructions.Globals];
InitializeStaticStringTable[];

AddOption[
 type: docName, name: "docName"L, size: SIZE[docName PreParser.Option]];
AddOption[
 type: docCreationDate, name: "docCreationDate"L,
 size: SIZE[docCreationDate PreParser.Option]];
AddOption[
 type: docCreator, name: "docCreator"L,
 size: SIZE[docCreator PreParser.Option]];
AddOption[
 type: docComment, name: "docComment"L,
 size: SIZE[docComment PreParser.Option]];
AddOption[
 type: docStartMessage, name: "docStartMessage"L,
 size: SIZE[docStartMessage PreParser.Option]];
AddOption[
 type: docEndMessage, name: "docEndMessage"L,
 size: SIZE[docEndMessage PreParser.Option]];
AddOption[
 type: copySelect, name: "copySelect"L,
 size: SIZE[copySelect PreParser.Option]];
AddOption[
 type: pageSelect, name: "pageSelect"L,
 size: SIZE[pageSelect PreParser.Option]];
AddOption[type: media, name: "media"L, size: SIZE[media PreParser.Option]];
AddOption[type: plex, name: "plex"L, size: SIZE[plex PreParser.Option]];
AddOption[
 type: xImageShift, name: "xImageShift"L,
 size: SIZE[xImageShift PreParser.Option]];
AddOption[
 type: finishing, name: "finishing"L,
 size: SIZE[finishing PreParser.Option]];

AddOption[type: other, name: NIL, size: 0];


AddMyOption[type: copyName, name: "copyName"L];
AddMyOption[type: mediaSelect, name: "mediaSelect"L];
AddMyOption[type: onSimplex, name: "onSimplex"L];
```

Copyright © 1992 Xerox Corporation All Rights Reserved

```
AddStaticVector[vectorType: XeroxBind, element1: Xerox, element2: bind];

AddStaticVector[
 vectorType: XeroxLandscapeStaple, element1: Xerox,
 element2: landscapeStaple];

AddStaticVector[
 vectorType: XeroxDoubleStaple, element1: Xerox, element2: doubleStaple];

AddStaticVector[
 vectorType: XeroxSampleTray, element1: Xerox, element2: sampleTray];

globalsB.contentStrings[contentPlex] ← MakeStaticString["contentPlex"L];
globalsB.contentStrings[pageMediaSelect] ← MakeStaticString[
 "pageMediaSelect"L];
globalsB.contentStrings[pageOnSimplex] ← MakeStaticString["pageOnSimplex"L];
globalsB.contentStrings[contentPageSelect] ← MakeStaticString[
 "contentPageSelect"L];

PreParserInstructions.globals ← globalsB;
PreParserInstructions.globalsA ← globalsB;

AddXenithIconStringsAndOptions[];

END;
AddXenithIconStringsAndOptions: PROC [] =
 BEGIN
 AddOption[
  type: yImageShift, name: "yImageShift"L,
  size: SIZE[yImageShift PreParser.Option]];

 AddStaticVector[
  vectorType: XeroxJobSecurity, element1: Xerox, element2: jobSecurity];
 globalsB.optionSizes[jobSecurity] ← SIZE[jobSecurity PreParser.Option];
 AddStaticVector[
  vectorType: standardJobAttributes, element1: standard,
  element2: jobAttributes];
 globalsB.optionSizes[jobAttributes] ← SIZE[jobAttributes PreParser.Option];
 AddStaticVector[
  vectorType: standardBinderyFinishing, element1: standard,
  element2: binderyFinishing];
 globalsB.optionSizes[binderyFinishing] ← SIZE[
  binderyFinishing PreParser.Option];
 AddStaticVector[
  vectorType: standardBinderyFinishingSelect, element1: standard,
  element2: binderyFinishingSelect];
 globalsB.optionSizes[binderyFinishingSelect] ← SIZE[
  binderyFinishingSelect PreParser.Option];
 AddStaticVector[
```

Copyright © 1992 Xerox Corporation All Rights Reserved

```
    vectorType: standardPageBinderyFinishingSelect, element1: standard,
    element2: pageBinderyFinishingSelect];

   AddStaticVector[
    vectorType: standardStacking, element1: standard, element2: stacking];
   globalsB.optionSizes[stacking] ← SIZE[stacking PreParser.Option];
   AddStaticVector[
    vectorType: xeroxSimplePamphletSignature, element1: Xerox,
    element2: simplePamphletSignature];
   globalsB.optionSizes[bookletSignature] ← SIZE[
    bookletSignature PreParser.Option];
   AddStaticVector[vectorType: XeroxCovers, element1: Xerox, element2: covers];
   globalsB.optionSizes[covers] ← SIZE[covers PreParser.Option];

   AddUnSupportedVector[
    vectorType: standardPrimarySets, element1: standard, element2: primarySets];
   AddUnSupportedVector[
    vectorType: standardPrimarySetSelect, element1: standard,
    element2: primarySetSelect];
   AddUnSupportedVector[
    vectorType: standardPagePrimarySetSelect, element1: standard,
    element2: pagePrimarySetSelect];
   unSupportedInstructions.names[breakPageFont] ← MakeStaticString[
    "breakPageFont"L];
   unSupportedInstructions.names[breakPageType] ← MakeStaticString[
    "breakPageType"L];
   unSupportedInstructions.names[outPutPositions] ← MakeStaticString[
    "outPutPosition"L];
   END;
  AddOption: PROCEDURE [
   type: PreParser.OptionType, name: LONG STRING, size: CARDINAL] =
   BEGIN
   stringPtr: PreParserCommon.StringPtr ← NIL;
   IF name = NIL THEN globalsB.optionNames[type] ← NIL
   ELSE globalsB.optionNames[type] ← MakeStaticString[name];
   globalsB.optionSizes[type] ← size;
   END;
  UninitializeData: PUBLIC PROCEDURE [] RETURNS [] =
   BEGIN
   FOR type: PreParser.OptionType IN [docName..other) DO
    PreParserControl.preParserZone.FREE[@globalsB.optionNames[type]]; ENDLOOP;
   FOR myType: PreParserCommon.OtherOptionType IN
PreParserCommon.OtherOptionType
    DO
    PreParserControl.preParserZone.FREE[@globalsB.myOptionNames[myType]];
    PreParserControl.preParserZone.FREE[@globalsB.myOptionStrings[myType]];
    ENDLOOP;


   FOR vType: PreParserInstructions.StaticVectorType IN
```

Copyright © 1992 Xerox Corporation All Rights Reserved

```
  PreParserInstructions.StaticVectorType DO
  PreParserControl.preParserZone.FREE[@globalsB.staticVectors[vType]];
  ENDLOOP;
 FOR vType: PreParserInstructions.UnSupportedVectors IN
  PreParserInstructions.UnSupportedVectors DO
  PreParserControl.preParserZone.FREE[@unSupportedInstructions.vectors[
   vType]];
  ENDLOOP;
 FOR myType: PreParserInstructions.UnSupportedStrings IN
  PreParserInstructions.UnSupportedStrings DO
  PreParserControl.preParserZone.FREE[@unSupportedInstructions.names[myType]];
  ENDLOOP;
 PreParserControl.preParserZone.FREE[@globalsB];
 PreParserInstructions.globals ← NIL;
 PreParserInstructions.globalsA ← NIL;
 END;
InitializeModuleB: PUBLIC PROCEDURE = BEGIN globalsB ← NIL; END;
END.
```

Copyright © 1992 Xerox Corporation All Rights Reserved

```
DIRECTORY
 FixedPointReal USING [ToReal],
 Inline USING [LongCOPY, LowByte],
 PreParser USING [
  Access, AccessGroups, BinderyFinishingOption, BindFinishSelectSeq,
  BindFinishSelectRep, BookletSignatureOptionRep, BookletSignatureOption,
  BinderyFinishingSequence, BinderyFinishingSequenceRep, BinderyOperation,
  BinderyFinishingOptionRep, BindingColor, BindingType, Covers, CoversRep,
  CoverImaging, FinishOptionSeq, FinishOptionRep, FinishSeq, FinishRep,
  InsertSeq, InsertSeqRep, JobAttributes, RealSequence, RealSequenceRep,
  SourcePageSequence, SourcePageSequenceRep],
 PreParserCommon USING [
  MainHandle, StackEntry, StackEntryPtr, String, VectorOfElements,
  VectorOfElementsPtr, WordsFromBytes],
 PreParserInstructions,
 PreParserInline USING [WordSeq],
 PublicPrinting USING [InternalMedia, InternalMedium],
 Real USING [RealException, RoundC, RoundLI],
 String USING [
  AppendCharAndGrow, AppendString, AppendStringAndGrow, CopyToNewString,
Length,
  LowerCase, MakeString];

PreParserInstructionsImplC: PROGRAM
 IMPORTS
  FixedPointReal, Inline, PreParserCommon, PreParserInstructions, Real, String
 EXPORTS PreParserInstructions =
 BEGIN OPEN PreParserInstructions;

 WrongType: PUBLIC ERROR = CODE;
 WrongValue: PUBLIC ERROR = CODE;

 ProcessBinderyFinishing: PUBLIC PROC [h: PreParserCommon.MainHandle] = {
  z: UNCOUNTED ZONE = h.smZone;
  binderySequence: PreParser.BinderyFinishingSequence ← NIL;
  v: PreParserCommon.VectorOfElementsPtr ← h.stackEntry.vectorPtr;
  propName, propVal: PreParserCommon.StackEntryPtr ← NIL;
  tempStr, binderyStr: LONG STRING ← NIL;
  BEGIN
  ENABLE {
   WrongType = > {
    IF propName # NIL AND propName.type = identifier THEN {
     tempStr ← StringValue[z, propName];
     binderyStr ← StringConcat["standard/binderyFinishing/"L, tempStr, z];
     SignalBadPrintingInstruction[badType, binderyStr];
     }
    ELSE
     SignalBadPrintingInstruction[
      badType, String.CopyToNewString["standard/binderyFinishing"L, z]];
```

Copyright © 1992 Xerox Corporation All Rights Reserved

```
  };
 WrongValue, Real.RealException => {
  IF propName # NIL AND propName.type = identifier THEN {
   tempStr ← StringValue[z, propName];
   binderyStr ← StringConcat["standard/binderyFinishing/"L, tempStr, z];
   SignalBadPrintingInstruction[badValue, binderyStr];
   }
  ELSE
   SignalBadPrintingInstruction[
    badValue, String.CopyToNewString["standard/binderyFinishing"L, z]];
  };
 UNWIND => {
  z.FREE[@tempStr];
  IF binderySequence # NIL THEN FreeBinderySequence[z, binderySequence];
  };
 };

IF h.stackEntry.type # vectorOfElements THEN ERROR WrongType;
binderySequence ← z.NEW[PreParser .BinderyFinishingSequenceRep[v.count]];
FOR vIndex: CARDINAL IN [0..v.count) DO
 binderyOp: PreParser.BinderyFinishingOption;
 pv: PreParserCommon.VectorOfElementsPtr ← v.elements[vIndex].vectorPtr;
 IF v.elements[vIndex].type # vectorOfElements THEN ERROR WrongType;
 IF pv.count MOD 2 # 0 THEN ERROR WrongValue;
 binderyOp ← z.NEW[PreParser.BinderyFinishingOptionRep];
 binderySequence[vIndex] ← binderyOp;

 FOR pvIndex: CARDINAL ← 0, pvIndex + 2 WHILE pvIndex < pv.count DO
  propName ← @pv.elements[pvIndex];
  propVal ← @pv.elements[pvIndex + 1];
  SELECT TRUE FROM
   EqualIds[globals.staticStrings[referenceXSize], propName] =>
    binderyOp.referenceXSize ← RealValue[propVal];
   EqualIds[globals.staticStrings[referenceYSize], propName] =>
    binderyOp.referenceYSize ← RealValue[propVal];
   EqualIds[globals.staticStrings[referenceEdge], propName] =>
    binderyOp.referenceEdge ← VAL[CardinalValue[propVal, 3]];
   EqualIds[globals.staticStrings[locations], propName] =>
    ProcessLocations[binderyOp, propVal, z];
   EqualIds[globals.staticStrings[bindingColor], propName] =>
    [binderyOp.bindingColor, binderyOp.otherbindingColor] ←
     BindingColorValue[propVal, z];
   EqualIds[globals.staticStrings[bindingType], propName] =>
    [binderyOp.bindingType, binderyOp.otherBindingType] ←
     BindingTypeValue[propVal, z];
   EqualIds[globals.staticStrings[trimmedSize], propName] =>
    ProcessTrimmedSize[binderyOp, propVal];
   EqualIds[globals.staticStrings[binderyOperation], propName] =>
    [binderyOp.operation, binderyOp.otherOperation] ←
     BinderyOperationValue[propVal, z];
```

Copyright © 1992 Xerox Corporation All Rights Reserved

```
    EqualIds[globals.staticStrings[finishingMessage], propName] =>
     binderyOp.finishingMessage ← StringValue[z, propVal];
    EqualIds[globals.staticStrings[inserts], propName] =>
     ProcessInserts[binderyOp, propVal, z];
    EqualIds[globals.staticStrings[dieCutName], propName] =>
     binderyOp.dieCutName ← StringValue[z, propVal];
    EqualIds[globals.staticStrings[dieCutPosition], propName] =>
     ProcessDieCutPosition[binderyOp, propVal];
    ENDCASE => {
     tempStr ← StringValue[z, propName];
     binderyStr ← StringConcat["standard/binderyFinishing/"L, tempStr, z];
     SignalBadPrintingInstruction[unrecognized, binderyStr];
     };
   ENDLOOP;
  ENDLOOP;
 END;
 h.tempData.option.binderySequence ← binderySequence;
 };
ProcessBinderyFinishingSelect: PUBLIC PROC [h: PreParserCommon.MainHandle] = {
 z: UNCOUNTED ZONE = h.smZone;
 finishingVector: PreParserCommon.VectorOfElementsPtr ← NIL;
 binderySelect: PreParser.BindFinishSelectSeq ← NIL;
 copyRun, pageRun: CARDINAL ← 0;
 pageVector, finishVector: PreParserCommon.VectorOfElementsPtr ← NIL;
 pageInfo: PreParser.FinishOptionSeq ← NIL;
 finishSeq: PreParser.FinishSeq ← NIL;
 BEGIN
 ENABLE {
  WrongType =>
   SignalBadPrintingInstruction[
    badType, String.CopyToNewString["BinderyFinishingSelect"L, z]];
  WrongValue =>
   SignalBadPrintingInstruction[
    badValue, String.CopyToNewString["BinderyFinishingSelect"L, z]];
  UNWIND =>
   IF binderySelect # NIL THEN FreeBinderySequenceSelect[z, binderySelect];
  };
 finishingVector ← VectorElement[@h.stackEntry];
 binderySelect ← z.NEW[PreParser .BindFinishSelectRep[finishingVector.count]];
 FOR i: CARDINAL ← 0, i + 2 WHILE i < finishingVector.count DO
  copyRun ← CardinalValue[@finishingVector.elements[i]];
  pageVector ← VectorElement[@finishingVector.elements[i + 1]];
  pageInfo ← z.NEW[PreParser .FinishOptionRep[pageVector.count]];
  binderySelect[i] ← [copyRun[copyRun: copyRun]];
  binderySelect[i + 1] ← [pageInfo[pageInfo: pageInfo]];
  FOR j: CARDINAL ← 0, j + 2 WHILE j < pageVector.count DO
   pageRun ← CardinalValue[@pageVector.elements[j]];
   finishVector ← VectorElement[@pageVector.elements[j + 1]];
   finishSeq ← z.NEW[PreParser .FinishRep[finishVector.count]];
   pageInfo[j] ← [pageRun[pageRun: pageRun]];
```

Copyright © 1992 Xerox Corporation All Rights Reserved

```
    pageInfo[j + 1] ← [finish[finish: finishSeq]];
    FOR j: CARDINAL IN [0..finishVector.count) DO
     finishSeq[j] ← CardinalValue[@finishVector.elements[j]]; ENDLOOP;
    ENDLOOP;
   ENDLOOP;
  END;
  h.tempData.option.binderySelect ← binderySelect;
  };
 ProcessPageBinderyFinishingSelect: PUBLIC PROC [h: PreParserCommon.MainHandle] =
  {

  };
 ProcessSimplePamphletSignature: PUBLIC PROC [h: PreParserCommon.MainHandle] = {
  z: UNCOUNTED ZONE = h.smZone;
  v: PreParserCommon.VectorOfElementsPtr ← h.stackEntry.vectorPtr;
  signature: PreParser.BookletSignatureOption ← NIL;
  propName, propVal: PreParserCommon.StackEntryPtr ← NIL;
  tempStr, pamphletStr: LONG STRING ← NIL;
  BEGIN
  ENABLE {
   WrongType =>
    IF propName # NIL AND propName.type = identifier THEN {
     tempStr ← StringValue[z, propName];
     pamphletStr ← StringConcat[
      "Xerox/simplePamphletSignature/"L, tempStr, z];
     SignalBadPrintingInstruction[badType, tempStr];
     }
    ELSE
     SignalBadPrintingInstruction[
      badType, String.CopyToNewString["Xerox/simplePamphletSignature"L, z]];
   WrongValue =>
    IF propName # NIL AND propName.type = identifier THEN {
     tempStr ← StringValue[z, propName];
     pamphletStr ← StringConcat[
      "Xerox/simplePamphletSignature/"L, tempStr, z];
     SignalBadPrintingInstruction[badValue, StringValue[z, propName]];
     }
    ELSE
     SignalBadPrintingInstruction[
      badValue, String.CopyToNewString[
      "Xerox/simplePamphletSignature"L, z]];
   UNWIND => {
    z.FREE[@tempStr];
    IF signature # NIL THEN {
     z.FREE[@signature.sourcePageDims]; z.FREE[@signature]; };
    };
   };
  IF h.stackEntry.type # vectorOfElements THEN ERROR WrongType;
  IF v.count MOD 2 # 0 THEN ERROR WrongValue;
```

Copyright © 1992 Xerox Corporation All Rights Reserved

```
signature ← z.NEW[PreParser.BookletSignatureOptionRep];
signature.maxShift ← 0;
signature.bindDirection ← null;
signature.impositionsPerSurface ← 0;
signature.sourcePageDims ← NIL;
signature.resultXSheetSize ← 0;
signature.resultYSheetSize ← 0;

FOR i: CARDINAL ← 0, i + 2 WHILE i < v.count DO
 propName ← @v.elements[i];
 propVal ← @v.elements[i + 1];
 SELECT TRUE FROM
  EqualIds[globals.staticStrings[maximumShift], propName] =>
   signature.maxShift ← RealValue[propVal];
  EqualIds[globals.staticStrings[bindingEdgeFold], propName] =>
   signature.bindDirection ← VAL[CardinalValue[propVal, 1]];
  EqualIds[globals.staticStrings[impositionsPerSurface], propName] =>
   signature.impositionsPerSurface ← CardinalValue[propVal, 4];
  EqualIds[globals.staticStrings[sourcePageDims], propName] =>
   signature.sourcePageDims ← SourceDimsFromRunOfVectors[z, propVal];
  EqualIds[globals.staticStrings[resultSheetSize], propName] =>
   [signature.resultXSheetSize, signature.resultYSheetSize] ←
    XYCoordinateValue[propVal];
  ENDCASE => {
   tempStr ← StringValue[z, propName];
   pamphletStr ← StringConcat[
    "Xerox/simplePamphletSignature/"L, tempStr, z];
   SignalBadPrintingInstruction[unrecognized, pamphletStr];
   };
 ENDLOOP;
END;
h.tempData.option.signature ← signature;
};

ProcessMedia: PUBLIC PROC [h: PreParserCommon.MainHandle] = {
 z: UNCOUNTED ZONE = h.smZone;
 media: PublicPrinting.InternalMedia ← DESCRIPTOR[NIL, 0];
 v: PreParserCommon.VectorOfElementsPtr ← NIL;
 propName, propVal: PreParserCommon.StackEntryPtr ← NIL;
 tempStr, mediaStr: LONG STRING ← NIL;
 FreeMedia: PROC [] = {
  FOR i: CARDINAL IN [0..v.count) DO
   z.FREE[@media[i].name]; z.FREE[@media[i].message]; ENDLOOP;
  z.FREE[@media.BASE]};
 BEGIN
 ENABLE {
  WrongType =>
   IF propName # NIL AND propName.type = identifier THEN {
    tempStr ← StringValue[z, propName];
    mediaStr ← StringConcat["media/"L, tempStr, z];
```

Copyright © 1992 Xerox Corporation All Rights Reserved

```
    SignalBadPrintingInstruction[badType, mediaStr];
    }
   ELSE
    SignalBadPrintingInstruction[
     badType, String.CopyToNewString["media"L, z]];
  WrongValue =>
   IF propName # NIL AND propName.type = identifier THEN {
    tempStr ← StringValue[z, propName];
    mediaStr ← StringConcat["media/"L, tempStr, z];
    SignalBadPrintingInstruction[badValue, mediaStr];
    }
   ELSE
    SignalBadPrintingInstruction[
     badValue, String.CopyToNewString["media"L, z]];
  UNWIND => {z.FREE[@tempStr]; IF media.BASE # NIL THEN FreeMedia[]; };
  };

 v ← VectorElement[@h.stackEntry];

 h.mediaVectorCorrection ← v.low;
 media ← DESCRIPTOR[
  z.NEW[
   PreParserInline .WordSeq[PublicPrinting.InternalMedium.SIZE * v.count]],
   v.count];

 FOR i: CARDINAL IN [0..v.count) DO
  media[i].name ← media[i].message ← NIL; ENDLOOP;

 FOR vIndex: CARDINAL IN [0..v.count) DO
  medium: PreParserInstructions.MediumDescriptionRep ← [];
  pv: PreParserCommon.VectorOfElementsPtr ← VectorElement[
   @v.elements[vIndex]];
  IF pv.count MOD 2 # 0 THEN ERROR WrongValue;
  FOR pvIndex: CARDINAL ← 0, pvIndex + 2 WHILE pvIndex < pv.count - 1 DO
   propName ← @pv.elements[pvIndex];
   propVal ← @pv.elements[pvIndex + 1];
   SELECT TRUE FROM
    EqualIds[globals.staticStrings[mediumName], propName] => {
     medium.name ← IdentifierValue[z, propVal, TRUE];
     medium.specifiedFields[name] ← TRUE};
    EqualIds[globals.staticStrings[mediumX], propName] => {
     medium.xDim ← RealValue[propVal];
     medium.specifiedFields[xDim] ← TRUE};
    EqualIds[globals.staticStrings[mediumY], propName] => {
     medium.yDim ← RealValue[propVal];
     medium.specifiedFields[yDim] ← TRUE};
    EqualIds[globals.staticStrings[mediumMessage], propName] => {
     medium.message ← StringValue[z, propVal];
     medium.specifiedFields[message] ← TRUE};
    EqualIds[globals.staticStrings[color], propName] => {
```

Copyright © 1992 Xerox Corporation All Rights Reserved

```
  medium.color ← MediumColorValue[propVal, z];
  medium.specifiedFields[color] ← TRUE};
 EqualIds[globals.staticStrings[weight], propName] = > {
  medium.weight ← RealValue[propVal];
  medium.specifiedFields[weight] ← TRUE};
 EqualIds[globals.staticStrings[opacity], propName] = > {
  medium.opaque ← VAL[CardinalValue[propVal, 1]];
  medium.specifiedFields[opaque] ← TRUE};

 EqualIds[globals.staticStrings[holeCount], propName]
  OR EqualIds[globals.staticStrings[inlineHoleCount], propName] = > {
  medium.holeCount ← CardinalValue[propVal];
  medium.specifiedFields[holeCount] ← TRUE};

 EqualIds[globals.staticStrings[holeCount], propName] = > {
  medium.holeCount ← CardinalValue[propVal];
  medium.specifiedFields[holeCount] ← TRUE};
 EqualIds[globals.staticStrings[preFinish], propName] = > {
  DoPreFinish[@medium, propVal, z];
  medium.specifiedFields[preFinish] ← TRUE};

 EqualIds[globals.staticStrings[preOrderedCount], propName]
  OR EqualIds[globals.staticStrings[orderedCount], propName] = > {
  medium.preOrderedCount ← CardinalValue[propVal];
  medium.specifiedFields[preOrderedCount] ← TRUE};

 EqualIds[globals.staticStrings[preOrderedPosition], propName]
  OR EqualIds[globals.staticStrings[orderedPosition], propName] = > {
  medium.preOrderedPosition ← CardinalValue[propVal];
  medium.specifiedFields[preOrderedPosition] ← TRUE};

 EqualIds[globals.staticStrings[tabEdge], propName]
  OR EqualIds[globals.staticStrings[finishEdge], propName] = > {
  medium.tabEdge ← VAL[CardinalValue[propVal, 3]];
  medium.specifiedFields[tabEdge] ← TRUE};

 EqualIds[globals.staticStrings[labelsPerRow], propName] = > {
  medium.labelsPerRow ← CardinalValue[propVal];
  medium.specifiedFields[labelsPerRow] ← TRUE};
 EqualIds[globals.staticStrings[labelsPerColumn], propName] = > {
  medium.labelsPerColumn ← CardinalValue[propVal];
  medium.specifiedFields[labelsPerColumn] ← TRUE};
 EqualIds[globals.staticStrings[cluster], propName] = >
  PreParserInstructions.Warning[
   h.pc.pcm.clientContext, [
   featureNotImplemented[
   feature: [cluster[name: StringValue[z, propName]]]]]];
 EqualIds[globals.staticStrings[ask], propName] = > {
  medium.ask ← VAL[CardinalValue[propVal, 2]];
  medium.specifiedFields[ask] ← TRUE};
```

Copyright © 1992 Xerox Corporation All Rights Reserved

```
    ENDCASE => {
     tempStr ← StringValue[z, propName];
     mediaStr ← StringConcat["media/"L, tempStr, z];
     SignalBadPrintingInstruction[unrecognized, mediaStr];
     };
   ENDLOOP;
  media[vIndex] ← PreParserInstructions.ConvertMedium[@medium, h.smZone];
  propName ← NIL;
  ENDLOOP;
 END;
 h.tempData.option.media ← media;
 };
ProcessStacking: PUBLIC PROC [h: PreParserCommon.MainHandle] = {
 z: UNCOUNTED ZONE = h.smZone;
 propName, propVal: PreParserCommon.StackEntryPtr ← NIL;
 tempStr, stackingStr: LONG STRING ← NIL;
 BEGIN
 ENABLE {
  WrongType => {
   IF propName # NIL AND propName.type = identifier THEN {
    tempStr ← StringValue[z, propName];
    stackingStr ← StringConcat["standard/stacking/"L, tempStr, z];
    SignalBadPrintingInstruction[badType, stackingStr];
    }
   ELSE
    SignalBadPrintingInstruction[
     badType, String.CopyToNewString["standard/stacking"L, z]];
   };
  WrongValue => {
   IF propName # NIL AND propName.type = identifier THEN {
    tempStr ← StringValue[z, propName];
    stackingStr ← StringConcat["standard/stacking/"L, tempStr, z];
    SignalBadPrintingInstruction[badValue, stackingStr];
    }
   ELSE
    SignalBadPrintingInstruction[
     badValue, String.CopyToNewString["standard/stacking"L, z]];
   };
  UNWIND => z.FREE[@tempStr];
  };
 v: PreParserCommon.VectorOfElementsPtr ← VectorElement[@h.stackEntry];
 IF v.count MOD 2 # 0 THEN ERROR WrongValue;

 h.tempData.option.slipSheet ← FALSE;
 h.tempData.option.collated ← TRUE;
 h.tempData.option.offset ← FALSE;
 FOR i: CARDINAL ← 0, i + 2 WHILE i < v.count - 1 DO
  propName ← @v.elements[i];
  propVal ← @v.elements[i + 1];
  SELECT TRUE FROM
```

Copyright © 1992 Xerox Corporation All Rights Reserved

```
   EqualIds[globals.staticStrings[slipSheet], propName] =>
    h.tempData.option.slipSheet ← VAL[CardinalValue[propVal, 1]];
   EqualIds[globals.staticStrings[collated], propName] =>
    h.tempData.option.collated ← VAL[CardinalValue[propVal, 1]];
   EqualIds[globals.staticStrings[offset], propName] =>
    h.tempData.option.offset ← VAL[CardinalValue[propVal, 1]];
   ENDCASE => {
    tempStr ← StringValue[z, propName];
    stackingStr ← StringConcat["standard/stacking/"L, tempStr, z];
    SignalBadPrintingInstruction[unrecognized, stackingStr];
    };
  ENDLOOP;
 END;
 };

ProcessCovers: PUBLIC PROC [h: PreParserCommon.MainHandle] = {
 z: UNCOUNTED ZONE = h.smZone;
 covers: PreParser.Covers ← NIL;
 propName, propVal: PreParserCommon.StackEntryPtr ← NIL;
 tempStr, coverStr: LONG STRING ← NIL;
 BEGIN
 ENABLE {
  WrongType =>
   IF propName # NIL AND propName.type = identifier THEN {
    tempStr ← StringValue[z, propName];
    coverStr ← StringConcat["Xerox/covers/"L, tempStr, z];
    SignalBadPrintingInstruction[badType, coverStr];
    }
   ELSE
    SignalBadPrintingInstruction[
     badType, String.CopyToNewString["Xerox/covers"L, z]];
  WrongValue =>
   IF propName # NIL AND propName.type = identifier THEN {
    tempStr ← StringValue[z, propName];
    coverStr ← StringConcat["Xerox/covers/"L, tempStr, z];
    SignalBadPrintingInstruction[badValue, coverStr];
    }
   ELSE
    SignalBadPrintingInstruction[
     badType, String.CopyToNewString["Xerox/covers"L, z]];
  UNWIND => {z.FREE[@covers]; z.FREE[@tempStr]; };
  };
 v: PreParserCommon.VectorOfElementsPtr ← VectorElement[@h.stackEntry];
 IF v.count MOD 2 # 0 THEN ERROR WrongValue;
 covers ← z.NEW[PreParser.CoversRep ← []];
 FOR i: CARDINAL ← 0, i + 2 WHILE i < v.count - 1 DO
  propName ← @v.elements[i];
  propVal ← @v.elements[i + 1];
  SELECT TRUE FROM
   EqualIds[globals.staticStrings[frontCoverMedium], propName] => {
```

Copyright © 1992 Xerox Corporation All Rights Reserved

```
    covers.frontCoverMediumValid ← TRUE;
    covers.frontCoverMedium ← CardinalValue[propVal]};
   EqualIds[globals.staticStrings[backCoverMedium], propName] => {
    covers.backCoverMediumValid ← TRUE;
    covers.backCoverMedium ← CardinalValue[propVal]};
   EqualIds[globals.staticStrings[frontCover], propName] =>
    covers.frontCover ← VAL[CardinalValue[propVal, 3]];
   EqualIds[globals.staticStrings[backCover], propName] =>
    covers.backCover ← VAL[CardinalValue[propVal, 3]];
   ENDCASE => {
    tempStr ← StringValue[z, propName];
    coverStr ← StringConcat["Xerox/covers/"L, tempStr, z];
    SignalBadPrintingInstruction[unrecognized, coverStr];
    };
  ENDLOOP;
 END;
 h.tempData.option.covers ← covers;
 };
ProcessXImageShift: PUBLIC PROC [h: PreParserCommon.MainHandle] = {
 h.tempData.option.xImageShift ← RealValue[
  @h.stackEntry !
  WrongType =>
   SignalBadPrintingInstruction[
    badType, String.CopyToNewString["xImageShift"L, h.smZone]]; ];
 };
ProcessYImageShift: PUBLIC PROC [h: PreParserCommon.MainHandle] = {
 h.tempData.option.yImageShift ← RealValue[
  @h.stackEntry !
  WrongType =>
   SignalBadPrintingInstruction[
    badType, String.CopyToNewString["yImageShift"L, h.smZone]]; ];
 };


BinderyOperationValue: PROC [
 s: PreParserCommon.StackEntryPtr, z: UNCOUNTED ZONE]
 RETURNS [op: PreParser.BinderyOperation, otherOp: LONG STRING ← NIL] =
 BEGIN
 SELECT s.type FROM
  identifier => {
   op ←
    SELECT TRUE FROM
     EqualIds[globals.staticStrings[edgeStitching], s] => edgeStitching,
     EqualIds[globals.staticStrings[saddleStitching], s] =>
      saddleStitching,
     EqualIds[globals.staticStrings[binding], s] => binding,
     EqualIds[globals.staticStrings[punching], s] => punching,
     EqualIds[globals.staticStrings[slitting], s] => slitting,
     EqualIds[globals.staticStrings[perforating], s] => perforating,
     EqualIds[globals.staticStrings[folding], s] => folding,
```

Copyright © 1992 Xerox Corporation All Rights Reserved

```
      EqualIds[globals.staticStrings[trimming], s] => trimming,
      EqualIds[globals.staticStrings[inserting], s] => inserting,
      EqualIds[globals.staticStrings[dieCutting], s] => dieCutting,
      ENDCASE => other;
    IF op = other THEN otherOp ← IdentifierValue[z, s];
    };
   vectorOfElements => {
    op ← other;
    otherOp ← MesaStringFromVectorOfIdentifier[z, s.vectorPtr, '/];
    };
   ENDCASE => ERROR WrongType;
  END;
BindingColorValue: PROC [s: PreParserCommon.StackEntryPtr, z: UNCOUNTED ZONE]
  RETURNS [color: PreParser.BindingColor, otherColor: LONG STRING ← NIL] =
  BEGIN
  SELECT s.type FROM
   identifier => {
    color ←
     SELECT TRUE FROM
      EqualIds[globals.staticStrings[black], s] => black,
      EqualIds[globals.staticStrings[blue], s] => blue,
      EqualIds[globals.staticStrings[brown], s] => brown,
      EqualIds[globals.staticStrings[gray], s] => gray,
      EqualIds[globals.staticStrings[green], s] => green,
      EqualIds[globals.staticStrings[red], s] => red,
      EqualIds[globals.staticStrings[yellow], s] => yellow,
      ENDCASE => other;
    IF color = other THEN otherColor ← IdentifierValue[z, s];
    };
   vectorOfElements => {
    color ← other;
    otherColor ← MesaStringFromVectorOfIdentifier[z, s.vectorPtr, '/];
    };
   ENDCASE => ERROR WrongType;
  END;
BindingTypeValue: PROC [s: PreParserCommon.StackEntryPtr, z: UNCOUNTED ZONE]
  RETURNS [type: PreParser.BindingType, otherBindType: LONG STRING ← NIL] =
  BEGIN
  SELECT s.type FROM
   identifier => {
    type ←
     SELECT TRUE FROM
      EqualIds[globals.staticStrings[tape], s] => tape,
      EqualIds[globals.staticStrings[plastic], s] => plastic,
      EqualIds[globals.staticStrings[velo], s] => velo,
      EqualIds[globals.staticStrings[perfect], s] => perfect,
      EqualIds[globals.staticStrings[spiral], s] => spiral,
      ENDCASE => other;
    IF type = other THEN otherBindType ← IdentifierValue[z, s];
    };
```

Copyright © 1992 Xerox Corporation All Rights Reserved

```
  vectorOfElements => {
   type ← other;
   otherBindType ← MesaStringFromVectorOfIdentifier[z, s.vectorPtr, '/'];
   };
  ENDCASE => ERROR WrongType;
 END;
MediumColorValue: PROC [s: PreParserCommon.StackEntryPtr, z: UNCOUNTED ZONE]
 RETURNS [color: PreParserInstructions.MediumColor] =
 BEGIN
 SELECT s.type FROM
  identifier =>
   SELECT TRUE FROM
    EqualIds[globals.staticStrings[white], s] => {color ← [known[white]]};
    EqualIds[globals.staticStrings[pink], s] => {color ← [known[pink]]};
    EqualIds[globals.staticStrings[yellow], s] => {color ← [known[yellow]]};
    EqualIds[globals.staticStrings[buff], s] => {color ← [known[buff]]};
    EqualIds[globals.staticStrings[goldenrod], s] => {
     color ← [known[goldenrod]]};
    EqualIds[globals.staticStrings[blue], s] => {color ← [known[blue]]};
    EqualIds[globals.staticStrings[green], s] => {color ← [known[green]]};
    EqualIds[globals.staticStrings[noColor], s] => {
     color ← [known[noColor]]};
    ENDCASE =>
     color ← [other[String.CopyToNewString[StringLength[z, s], z]]];
  vectorOfElements =>
   color ← [other[MesaStringFromVectorOfIdentifier[z, s.vectorPtr, '/']]];
  ENDCASE => ERROR WrongType;
 END;
DoPreFinish: PROC [
 medium: PreParserInstructions.MediumDescription,
 s: PreParserCommon.StackEntryPtr, z: UNCOUNTED ZONE] =
 BEGIN
 SELECT s.type FROM
  vectorOfElements => {
   v: PreParserCommon.VectorOfElementsPtr = VectorElement[s];
   FOR vIndex: CARDINAL IN [0..v.count) DO
    DoPreFinish[medium, @v.elements[vIndex], z]; ENDLOOP;
   };
  identifier => {
   preFinish: PreParserInstructions.PreFinish =
    SELECT TRUE FROM
     EqualIds[globals.staticStrings[plain], s] => plain,
     EqualIds[globals.staticStrings[drilled], s] => drilled,
     EqualIds[globals.staticStrings[preCutTab], s] => preCutTab,
     EqualIds[globals.staticStrings[continuous], s] => continuous,
     EqualIds[globals.staticStrings[adhesiveLabel], s] => adhesiveLabel,
     EqualIds[globals.staticStrings[coverStock], s] => coverStock,
     EqualIds[globals.staticStrings[bond], s] => bond,
     EqualIds[globals.staticStrings[antique], s] => antique,
     EqualIds[globals.staticStrings[parchment], s] => parchment,
```

Copyright © 1992 Xerox Corporation All Rights Reserved

```
      EqualIds[globals.staticStrings[smooth], s] => smooth,
      EqualIds[globals.staticStrings[mylarReinforced], s] =>
       mylarReinforced,
      EqualIds[globals.staticStrings[envelopePlain], s] => envelopePlain,
      EqualIds[globals.staticStrings[envelopeWindow], s] => envelopeWindow,
      EqualIds[globals.staticStrings[carbonless], s] => carbonless,
      ENDCASE => other;
    medium.preFinish[preFinish] ← TRUE;
    IF preFinish = other THEN {
     IF medium.otherPreFinishType = NIL THEN
      medium.otherPreFinishType ← IdentifierValue[z, s]
     ELSE {
      tempStr: LONG STRING ← IdentifierValue[z, s];
      String.AppendStringAndGrow[
       @medium.otherPreFinishType, "/", z, String.Length[tempStr]];
      String.AppendString[medium.otherPreFinishType, tempStr];
      z.FREE[@tempStr];
      };
     };
    };
   ENDCASE => ERROR WrongType;
  END;
 ProcessLocations: PROC [
  binderyOp: PreParser.BinderyFinishingOption, s: PreParserCommon.StackEntryPtr,
  z: UNCOUNTED ZONE] =
  BEGIN
  pv: PreParserCommon.VectorOfElementsPtr ← VectorElement[s];
  IF pv.count MOD 2 # 0 THEN ERROR WrongValue;
  FOR i: CARDINAL ← 0, i + 2 WHILE i < pv.count DO
   propName: PreParserCommon.StackEntryPtr = @pv.elements[i];
   propVal: PreParserCommon.StackEntryPtr = @pv.elements[i + 1];
   SELECT TRUE FROM
    EqualIds[globals.staticStrings[headCount], propName] =>
     binderyOp.headCount ← CardinalValue[propVal];
    EqualIds[globals.staticStrings[processOffset], propName] =>
     binderyOp.headOffset ← RealValue[propVal];
    EqualIds[globals.staticStrings[headLocations], propName] =>
     binderyOp.headPositions ← RealSequenceFromVector[z, propVal];
    ENDCASE => ERROR WrongValue;
   ENDLOOP;
  END;
 ProcessTrimmedSize: PROC [
  binderyOp: PreParser.BinderyFinishingOption,
  s: PreParserCommon.StackEntryPtr] =
  BEGIN
  pv: PreParserCommon.VectorOfElementsPtr ← VectorElement[s];
  IF pv.elements[0].type = identifier THEN {
   IF pv.count MOD 2 # 0 THEN ERROR WrongValue;
   FOR i: CARDINAL ← 0, i + 2 WHILE i < pv.count DO
    propName: PreParserCommon.StackEntryPtr = @pv.elements[i];
```

Copyright © 1992 Xerox Corporation All Rights Reserved

```
    propVal: PreParserCommon.StackEntryPtr = @pv.elements[i + 1];
    SELECT TRUE FROM
     EqualIds[globals.staticStrings[referenceEdgeOffset], propName] =>
      binderyOp.trimOffset ← RealValue[propVal];
     EqualIds[globals.staticStrings[trimXSize], propName] =>
      binderyOp.trimXSize ← RealValue[propVal];
     EqualIds[globals.staticStrings[trimYSize], propName] =>
      binderyOp.trimYSize ← RealValue[propVal];
     ENDCASE => ERROR WrongValue;
    ENDLOOP;
  }
  ELSE {
   binderyOp.trimXSize ← binderyOp.trimYSize ← binderyOp.trimOffset ← 0;
   IF pv.count > 0 THEN binderyOp.trimXSize ← RealValue[@pv.elements[0]];
   IF pv.count > 1 THEN binderyOp.trimYSize ← RealValue[@pv.elements[1]];
   IF pv.count > 2 THEN binderyOp.trimOffset ← RealValue[@pv.elements[2]];
   };
  END;
ProcessInserts: PROC [
 binderyOp: PreParser.BinderyFinishingOption, s: PreParserCommon.StackEntryPtr,
 z: UNCOUNTED ZONE] =
 BEGIN
 v: PreParserCommon.VectorOfElementsPtr ← VectorElement[s];
 inserts: PreParser.InsertSeq ← z.NEW[PreParser .InsertSeqRep[v.count]];
 BEGIN
 ENABLE UNWIND => IF inserts # NIL THEN z.FREE[@inserts];
 FOR j: CARDINAL IN [0..v.count) DO
  pv: PreParserCommon.VectorOfElementsPtr ← VectorElement[@v.elements[j]];
  IF pv.count MOD 2 # 0 THEN ERROR WrongValue;
  inserts[j].insertSizeValid ← inserts[j].insertTopSurfaceValid ← FALSE;
  inserts[j].insertName ← NIL;
  inserts[j].insertSizeX ← inserts[j].insertSizeY ← inserts[j].insertBin ← 0;
  inserts[j].insertEdge ← left;
  inserts[j].insertAfter ← LAST[CARDINAL];
  FOR i: CARDINAL ← 0, i + 2 WHILE i < pv.count DO
   propName: PreParserCommon.StackEntryPtr = @pv.elements[i];
   propVal: PreParserCommon.StackEntryPtr = @pv.elements[i + 1];
   SELECT TRUE FROM
    EqualIds[globals.staticStrings[insertName], propName] =>
     inserts[j].insertName ← StringValue[z, propName];
    EqualIds[globals.staticStrings[insertSize], propName] => {
     insertSizeVector: PreParserCommon.VectorOfElementsPtr ← VectorElement[
      propVal];
     IF insertSizeVector.count # 2 THEN ERROR WrongValue;
     inserts[j].insertSizeX ← RealValue[@insertSizeVector.elements[0]];
     inserts[j].insertSizeY ← RealValue[@insertSizeVector.elements[1]];
     inserts[j].insertSizeValid ← TRUE;
     };
    EqualIds[globals.staticStrings[insertEdge], propName] =>
     inserts[j].insertEdge ← VAL[CardinalValue[propVal, 3]];
```

Copyright © 1992 Xerox Corporation All Rights Reserved

```
    EqualIds[globals.staticStrings[insertTopSurface], propName] => {
     inserts[j].insertTopSurface ← CardinalValue[propVal];
     inserts[j].insertTopSurfaceValid ← TRUE;
     };
    EqualIds[globals.staticStrings[insertBin], propName] =>
     inserts[j].insertBin ← CardinalValue[propVal];
    EqualIds[globals.staticStrings[insertAfter], propName] =>
     inserts[j].insertAfter ← CardinalValue[propVal];
    ENDCASE => ERROR WrongValue;
   ENDLOOP;
  ENDLOOP;
 binderyOp.inserts ← inserts;
 END;
 END;
ProcessDieCutPosition: PROC [
 binderyOp: PreParser.BinderyFinishingOption,
 s: PreParserCommon.StackEntryPtr] =
 BEGIN
 pv: PreParserCommon.VectorOfElementsPtr ← VectorElement[s];
 IF pv.count # 4 THEN ERROR WrongValue;
 binderyOp.dieCutDimensionX ← RealValue[@pv.elements[0]];
 binderyOp.dieCutDimensionY ← RealValue[@pv.elements[1]];
 binderyOp.dieCutOffsetX ← RealValue[@pv.elements[2]];
 binderyOp.dieCutOffsetY ← RealValue[@pv.elements[3]];
 END;
SourceDimsFromRunOfVectors: PROC [
 z: UNCOUNTED ZONE, s: PreParserCommon.StackEntryPtr]
 RETURNS [sourcePageSequence: PreParser.SourcePageSequence ← NIL] =
 BEGIN
 ENABLE UNWIND => IF sourcePageSequence # NIL THEN
z.FREE[@sourcePageSequence];
 v: PreParserCommon.VectorOfElementsPtr ← VectorElement[s];

 IF v.count MOD 2 # 0 THEN ERROR WrongValue;
 sourcePageSequence ← z.NEW[PreParser .SourcePageSequenceRep[v.count]];
 FOR vIndex: CARDINAL ← 0, vIndex + 2 WHILE vIndex < v.count DO
  runLength: CARDINAL = CardinalValue[@v.elements[vIndex]];
  xy: PreParserCommon.VectorOfElementsPtr ← VectorElement[
   @v.elements[vIndex + 1]];
  IF runLength = 0 OR xy.count # 2 THEN ERROR WrongValue;
  sourcePageSequence[vIndex] ← [pageRun[pageRun: runLength]];
  sourcePageSequence[vIndex + 1] ← [
   mediaDim[
   mediaDim: [
   widthInMillimeters: Real.RoundC[RealValue[@xy.elements[0]] * 1000],
   lengthInMillimeters: Real.RoundC[RealValue[@xy.elements[1]] * 1000]]]];
  ENDLOOP;
 END;
XYCoordinateValue: PUBLIC PROC [s: PreParserCommon.StackEntryPtr]
 RETURNS [x, y: REAL] = INLINE
```

Copyright © 1992 Xerox Corporation All Rights Reserved

```
 BEGIN
 v: PreParserCommon.VectorOfElementsPtr ← VectorElement[s];
 IF v.count # 2 THEN ERROR WrongValue;
 RETURN[x: RealValue[@v.elements[0]], y: RealValue[@v.elements[1]]];
 END;

CardinalValue: PUBLIC PROC [
 s: PreParserCommon.StackEntryPtr, max: CARDINAL ← CARDINAL.LAST]
 RETURNS [c: CARDINAL] =
 BEGIN
 SELECT s.type FROM
  fixedPointReal =>
   IF s.fixed.int < 0 THEN ERROR WrongValue ELSE c ← s.fixed.int;
  real => IF s.real < 0 THEN ERROR WrongValue ELSE c ← Real.RoundC[s.real];
  ENDCASE => ERROR WrongType;
 IF c > max THEN ERROR WrongValue;
 END;
EqualIds: PUBLIC PROC [a: LONG STRING, b: PreParserCommon.StackEntryPtr]
 RETURNS [BOOL] =
 BEGIN
 IF b.type # identifier THEN ERROR WrongType;
 IF a.length # b.stringPtr.length THEN RETURN[FALSE];
 FOR i: CARDINAL IN [0..a.length) DO
  c1: CHAR = String.LowerCase[VAL[a.text[i]]];
  c2: CHAR = String.LowerCase[VAL[b.stringPtr.base[i]]];
  IF c1 # c2 THEN RETURN[FALSE];
  ENDLOOP;
 RETURN[TRUE];
 END;
IdentifierValue: PUBLIC PROC [
 z: UNCOUNTED ZONE, s: PreParserCommon.StackEntryPtr,
 acceptVectors: BOOL ← FALSE] RETURNS [id: LONG STRING] =
 BEGIN
 SELECT s.type FROM
  identifier => {
   id ← String.MakeString[z, s.stringPtr.length];
   id.length ← s.stringPtr.length;
   Inline.LongCOPY[
    from: s.stringPtr.base, to: @id.text,
    nwords: PreParserCommon.WordsFromBytes[s.stringPtr.length]]};
  vectorOfElements =>
   IF acceptVectors THEN
    id ← MesaStringFromVectorOfIdentifier[z, s.vectorPtr, '/]

   ELSE ERROR WrongType;
  ENDCASE => ERROR WrongType;
 END;
LongCardinalValue: PUBLIC PROC [
 s: PreParserCommon.StackEntryPtr, max: LONG CARDINAL ← LAST[LONG CARDINAL]]
 RETURNS [c: LONG CARDINAL] =
```

Copyright © 1992 Xerox Corporation All Rights Reserved

```
 BEGIN
 SELECT s.type FROM
  fixedPointReal = >
   IF s.fixed.int < 0 THEN ERROR WrongValue ELSE c ← s.fixed.int;
  real = > IF s.real < 0 THEN ERROR WrongValue ELSE c ← Real.RoundLI[s.real];
  ENDCASE = > ERROR WrongType;
 IF c > max THEN ERROR WrongValue;
 END;
MesaStringFromVectorOfCardinal: PUBLIC PROC [
 z: UNCOUNTED ZONE, v: PreParserCommon.VectorOfElementsPtr]
 RETURNS [string: LONG STRING] =
 BEGIN
 string ← String.MakeString[z, v.count];
 string.length ← v.count;
 FOR i: CARDINAL IN [0..v.count) DO
  string[i] ← VAL[Inline.LowByte[CardinalValue[@v.elements[i]]]]; ENDLOOP;
 END;
MesaStringFromVectorOfIdentifier: PUBLIC PROC [
 z: UNCOUNTED ZONE, v: PreParserCommon.VectorOfElementsPtr, delimiter: CHAR]
 RETURNS [string: LONG STRING ← NIL] =
 BEGIN
 FOR i: CARDINAL IN [0..v.count) DO
  id: LONG STRING ← IdentifierValue[z, @v.elements[i]];
  String.AppendStringAndGrow[@string, id, z];
  IF i < v.count - 1 THEN String.AppendCharAndGrow[@string, delimiter, z];
  z.FREE[@id];
  ENDLOOP;
 END;
RealSequenceFromVector: PUBLIC PROC [
 z: UNCOUNTED ZONE, s: PreParserCommon.StackEntryPtr]
 RETURNS [r: PreParser.RealSequence] =
 BEGIN
 SELECT s.type FROM
  nullVectorOfElements = > r ← NIL;
  vectorOfElements = > {
   r ← z.NEW[PreParser .RealSequenceRep[s.vectorPtr.count]];
   FOR i: CARDINAL IN [0..s.vectorPtr.count) DO
    r[i] ← RealValue[@s.vectorPtr.elements[i]]; ENDLOOP;
   };
  ENDCASE = > ERROR WrongType;
 END;
RealValue: PUBLIC PROC [s: PreParserCommon.StackEntryPtr] RETURNS [r: REAL] =
 BEGIN
 SELECT s.type FROM
  fixedPointReal = >
   r ← FixedPointReal.ToReal[s.fixed ! ANY = > ERROR WrongValue];
  real = > r ← s.real;
  ENDCASE = > ERROR WrongType;
 END;
StringLength: PROC [z: UNCOUNTED ZONE, s: PreParserCommon.StackEntryPtr]
```

Copyright © 1992 Xerox Corporation All Rights Reserved

```
 RETURNS [string: LONG STRING] = INLINE
 BEGIN
 SELECT s.type FROM
  identifier, string => {
   string ← String.MakeString[z, s.stringPtr.length];
   string.length ← string.maxlength;
   Inline.LongCOPY[
    from: s.stringPtr.base, to: @string.text,
    nwords: PreParserCommon.WordsFromBytes[s.stringPtr.length]]};
  vectorOfElements => string ← MesaStringFromVectorOfCardinal[z, s.vectorPtr];
  nullVectorOfElements => string ← NIL;
  ENDCASE => ERROR WrongType;
 END;
StringValue: PUBLIC PROC [z: UNCOUNTED ZONE, s: PreParserCommon.StackEntryPtr]
 RETURNS [string: LONG STRING] =
 BEGIN
 SELECT s.type FROM
  identifier, string => {
   string ← String.MakeString[z, s.stringPtr.length];
   string.length ← string.maxlength;
   Inline.LongCOPY[
    from: s.stringPtr.base, to: @string.text,
    nwords: PreParserCommon.WordsFromBytes[s.stringPtr.length]]};
  vectorOfElements => string ← MesaStringFromVectorOfCardinal[z, s.vectorPtr];
  nullVectorOfElements => string ← NIL;
  ENDCASE => ERROR WrongType;
 END;
VectorElement: PUBLIC PROC [s: PreParserCommon.StackEntryPtr]
 RETURNS [PreParserCommon.VectorOfElementsPtr] =
 BEGIN
 IF s.type = vectorOfElements THEN RETURN[s.vectorPtr] ELSE ERROR WrongType;
 END;

FreeBinderySequence: PUBLIC PROC [
 z: UNCOUNTED ZONE, bSeq: PreParser.BinderyFinishingSequence] =
 BEGIN
 FOR i: CARDINAL IN [0..bSeq.length) DO
  z.FREE[@bSeq[i].headPositions];
  IF bSeq[i].otherbindingColor # NIL THEN z.FREE[@bSeq[i].otherbindingColor];
  IF bSeq[i].otherBindingType # NIL THEN z.FREE[@bSeq[i].otherBindingType];
  IF bSeq[i].otherOperation # NIL THEN z.FREE[@bSeq[i].otherOperation];
  z.FREE[@bSeq[i].finishingMessage];
  ENDLOOP;
 z.FREE[@bSeq];
 END;
FreeBinderySequenceSelect: PUBLIC PROC [
 z: UNCOUNTED ZONE, bSelect: PreParser.BindFinishSelectSeq] =
 BEGIN
 FOR i: CARDINAL IN [0..bSelect.length) DO
  WITH bindFinish: @bSelect[i] SELECT FROM
```

Copyright © 1992 Xerox Corporation All Rights Reserved

```
   pageInfo =>
    IF bindFinish.pageInfo # NIL THEN {
     finishOption: PreParser.FinishOptionSeq ← bindFinish.pageInfo;
     FOR j: CARDINAL IN [0..finishOption.length) DO
      WITH finish: @finishOption[j] SELECT FROM
       finish => IF finish.finish # NIL THEN z.FREE[@finish.finish];
       ENDCASE => NULL;
      ENDLOOP;
     z.FREE[@bindFinish.pageInfo]};
   ENDCASE => NULL;
  ENDLOOP;
 z.FREE[@bSelect];
 END;
FreeJobAccess: PUBLIC PROC [z: UNCOUNTED ZONE, access: PreParser.AccessGroups] =
 BEGIN
 z.FREE[@access.acquire.name];
 z.FREE[@access.modify.name];
 z.FREE[@access.owner.name];
 z.FREE[@access];
 END;
FreeJobAttributes: PUBLIC PROC [
 z: UNCOUNTED ZONE, attributes: PreParser.JobAttributes] =
 BEGIN
 z.FREE[@attributes.jobCreateDate];
 z.FREE[@attributes.jobName];
 z.FREE[@attributes.jobAccountName];
 z.FREE[@attributes.jobComment];
 z.FREE[@attributes.jobSender];
 z.FREE[@attributes.jobRecipient];
 z.FREE[@attributes.jobStartMessage];
 z.FREE[@attributes.jobEndMessage];
 END;
InitializeModuleC: PUBLIC PROC = BEGIN END;
END.
```

Copyright © 1992 Xerox Corporation All Rights Reserved

```
DIRECTORY
 PreParserInstructions,
 PublicPrinting USING [ColorTypes, InternalMedium, MediumDimensions, PaperType],
 Real USING [RoundC],
 Runtime USING [CallDebugger],
 String USING [
  AppendChar, AppendNumber, AppendStringAndGrow, CopyToNewString, Equivalent],
 System USING [switches];

PreParserInstructionsImplD: PROGRAM
 IMPORTS Real, Runtime, String, System EXPORTS PreParserInstructions =
 BEGIN

 MediumIndex: TYPE = {
  unknown, usLetter, usLegal, a0, a1, a2, a3, a4, a5, a6, a7, a8, a9, a10,
  isoB0, isoB1, isoB2, isoB3, isoB4, isoB5, isoB6, isoB7, isoB8, isoB9, isoB10,
  jisoB0, jisoB1, jisoB2, jisoB3, jisoB4, jisoB5, jisoB6, jisoB7, jisoB8,
  jisoB9, jisoB10, letter, eightPointFiveBy11, legal, elevenBySeventeen,
  seventeenByEleven, std4020dpWhite, std4020dpYellow, std4020dpBlue,
  std4020dpPink, std4020dpGoldenrod};
 mediumDimensions: ARRAY MediumIndex OF PublicPrinting.MediumDimensions = [
  [0, 0], [216, 279], [216, 356], [841, 1189], [594, 841], [420, 594], [
  297, 420], [210, 297], [148, 210], [105, 148], [74, 105], [52, 74], [37, 52],
  [26, 37], [1000, 1414], [707, 1000], [500, 707], [353, 500], [250, 353], [
  176, 250], [125, 176], [88, 125], [62, 88], [44, 62], [31, 44], [1030, 1456],
  [728, 1030], [515, 728], [364, 515], [257, 364], [182, 257], [128, 182], [
  91, 128], [64, 91], [45, 64], [32, 45], [216, 279], [216, 279], [216, 356], [
  279, 432], [432, 279], [216, 279], [216, 279], [216, 279], [216, 279], [
  216, 279]];
 mediumNames: ARRAY MediumIndex OF LONG STRING = [
  "", "usLetter", "usLegal", "a0", "a1", "a2", "a3", "a4", "a5", "a6", "a7",
  "a8", "a9", "a10", "isoB0", "isoB1", "isoB2", "isoB3", "isoB4", "isoB5",
  "isoB6", "isoB7", "isoB8", "isoB9", "isoB10", "jisoB0", "jisoB1", "jisoB2",
  "jisoB3", "jisoB4", "jisoB5", "jisoB6", "jisoB7", "jisoB8", "jisoB9",
  "jisoB10", "letter", "eightPointFiveBy11", "legal", "elevenBySeventeen",
  "seventeenByEleven", "std4020dpWhite", "std4020dpYellow", "std4020dpBlue",
  "std4020dpPink", "std4020dpGoldenrod"];
 mediumColor: ARRAY PreParserInstructions.KnownColor OF LONG STRING = [
  "white", "pink", "yellow", "buff", "goldenrod", "blue", "green", "noColor"];


 ConvertMedium: PUBLIC PROC [
  medium: PreParserInstructions.MediumDescription, z: UNCOUNTED ZONE]
  RETURNS [internalMedium: PublicPrinting.InternalMedium] =
  BEGIN
  colorSpecified: BOOLEAN ← FALSE;
  field: PreParserInstructions.MediumDescriptionRepFields;
  firstPreFinish: BOOLEAN ← TRUE;
  firstPreFinishOption: LONG STRING ← NIL;
```

Copyright © 1992 Xerox Corporation All Rights Reserved

```
intMediumPtr: LONG POINTER TO PublicPrinting.InternalMedium;
internalMedium ← [
 NIL, [216, 279], NIL, standard, white, right, NIL, NIL, 0, 0, 0, 0, 0, 0];
intMediumPtr ← @internalMedium;

FOR field IN PreParserInstructions.MediumDescriptionRepFields DO
 IF medium.specifiedFields[field] THEN {
  SELECT field FROM
   name => {
    internalMedium.name ← String.CopyToNewString[medium.name, z];
    MapMedium[intMediumPtr, z];
    IF internalMedium.paperType = other THEN
     String.AppendStringAndGrow[
      @internalMedium.otherPaperType, internalMedium.name, z, 1]
    ELSE {
     internalMedium.paperType ← other;
     internalMedium.otherPaperType ← String.CopyToNewString[
      medium.name, z, 1]};
    String.AppendChar[intMediumPtr.otherPaperType, '/];
    z.FREE[@medium.name]};
   xDim => {
    internalMedium.mediumDimensions.widthInMillimeters ← Real.RoundC[
     (medium.xDim * 1000.0)];
    IF System.switches['<] = down
     AND internalMedium.mediumDimensions.widthInMillimeters = 280 THEN
     Runtime.CallDebugger["Media error 280mm"L]};
   yDim => {
    internalMedium.mediumDimensions.lengthInMillimeters ← Real.RoundC[
     (medium.yDim * 1000.0)];
    IF System.switches['<] = down
     AND internalMedium.mediumDimensions.lengthInMillimeters = 280 THEN
     Runtime.CallDebugger["Media error 280mm"L]};
   color => {
    WITH color: medium.color SELECT FROM
     other => {
      IF internalMedium.otherColor # NIL THEN
       z.FREE[@internalMedium.otherColor];
      internalMedium.color ← other;
      internalMedium.otherColor ← String.CopyToNewString[color.name, z];
      z.FREE[@color.name];
      colorSpecified ← TRUE};
     known => {
      colorSpecified ← TRUE;
      SELECT color.color FROM
       white => internalMedium.color ← white;
       pink => internalMedium.color ← pink;
       yellow => internalMedium.color ← yellow;
       blue => internalMedium.color ← blue;
       green => internalMedium.color ← green;
       buff => {
```

Copyright © 1992 Xerox Corporation All Rights Reserved

```
      IF internalMedium.otherColor # NIL THEN
       z.FREE[@internalMedium.otherColor];
      internalMedium.color ← other;
      internalMedium.otherColor ← String.CopyToNewString[
       "buff", z]};
     goldenrod = > {
      IF internalMedium.otherColor # NIL THEN
       z.FREE[@internalMedium.otherColor];
      internalMedium.color ← other;
      internalMedium.otherColor ← String.CopyToNewString[
       "goldenrod", z]};
     noColor = > internalMedium.color ← noColor;
     ENDCASE = > colorSpecified ← FALSE}
   ENDCASE;
  };
 weight = > internalMedium.weight ← Real.RoundC[medium.weight];
 opaque = >
  IF ~medium.opaque THEN {
   IF ~colorSpecified THEN internalMedium.color ← noColor;
   IF internalMedium.paperType # other THEN
    internalMedium.paperType ← transparency
   ELSE
    String.AppendStringAndGrow[
     @internalMedium.otherPaperType, "transparency/", z];
  };
 preFinish = > {
  preFinishResult: PublicPrinting.PaperType ← standard;
  preFinishString: LONG STRING ← NIL;
  numberOn: CARDINAL ← 0;


  FOR index: PreParserInstructions.PreFinish IN
   PreParserInstructions.PreFinish DO
   IF medium.preFinish[index] AND index # plain THEN
    numberOn ← numberOn + 1;
   ENDLOOP;

  IF numberOn > 0 THEN {
   SELECT TRUE FROM
    internalMedium.paperType = transparency = >
     String.AppendStringAndGrow[
      @internalMedium.otherPaperType, "transparency/", z];
    numberOn = 1 AND medium.preFinish[drilled]
     AND (medium.holeCount = 0 OR medium.holeCount = 3)
     AND internalMedium.paperType # other = > {
     internalMedium.drilled ← medium.holeCount; LOOP};
    numberOn > 1 = > internalMedium.paperType ← other;
    ENDCASE;
   }
  ELSE LOOP;
```

Copyright © 1992 Xerox Corporation All Rights Reserved

```
FOR index: PreParserInstructions.PreFinish IN
 PreParserInstructions.PreFinish DO
 IF medium.preFinish[index] THEN {
  SELECT index FROM
   plain => {
    preFinishResult ← standard; preFinishString ← "plain/"L};
   drilled => {
    preFinishResult ← other;
    preFinishString ← "drilled[xxxxx]/"L;
    preFinishString.length ← 8;
    String.AppendNumber[preFinishString, medium.holeCount];
    String.AppendChar[preFinishString, ']];
    String.AppendChar[preFinishString, '/]};
   preCutTab => {
    IF medium.preOrderedCount = 0 THEN {
     preFinishResult ← fullcutTab;
     preFinishString ← "fullcutTab/"L}
    ELSE {
     preFinishResult ← precutTab;
     preFinishString ← "precutTab/"L};
    };
   continuous => {
    preFinishResult ← other; preFinishString ← "continuous/"L};
   adhesiveLabel => {
    preFinishResult ← other; preFinishString ← "label/"L};
   coverStock => {
    preFinishResult ← other; preFinishString ← "coverStock/"L};
   bond => {preFinishResult ← other; preFinishString ← "bond/"L};
   antique => {
    preFinishResult ← other; preFinishString ← "antique/"L};
   parchment => {
    preFinishResult ← other; preFinishString ← "parchment/"L};
   smooth => {
    preFinishResult ← other; preFinishString ← "smooth/"L};
   mylarReinforced => {
    preFinishResult ← other;
    preFinishString ← "mylarReinforced/"L};
   envelopePlain => {
    preFinishResult ← other; preFinishString ← "envelopePlain/L"};
   envelopeWindow => {
    preFinishResult ← other;
    preFinishString ← "envelopeWindow/"L};
   carbonless => {
    preFinishResult ← other; preFinishString ← "carbonless/"L};
   other => {
    preFinishResult ← other;
    preFinishString ← medium.otherPreFinishType};
   ENDCASE => preFinishResult ← internalMedium.paperType;

  IF internalMedium.paperType = other OR preFinishResult = other
```

Copyright © 1992 Xerox Corporation All Rights Reserved

```
        THEN {
        String.AppendStringAndGrow[
          @internalMedium.otherPaperType, preFinishString, z];
        internalMedium.paperType ← other}
       ELSE internalMedium.paperType ← preFinishResult;
       };
      ENDLOOP;
     IF medium.otherPreFinishType # NIL THEN
      z.FREE[@medium.otherPreFinishType];
     };
    holeCount => NULL;
    preOrderedCount => internalMedium.modulus ← medium.preOrderedCount;
    preOrderedPosition =>
     internalMedium.modulusIndex ← medium.preOrderedPosition;
    tabEdge => {
     SELECT medium.tabEdge FROM
      left => internalMedium.tabEdge ← left;
      right => internalMedium.tabEdge ← right;
      top => internalMedium.tabEdge ← top;
      bottom => internalMedium.tabEdge ← bottom;
      ENDCASE};
    labelsPerRow => internalMedium.labelRows ← medium.labelsPerRow;
    labelsPerColumn => internalMedium.labelColumns ← medium.labelsPerColumn;
    ask => NULL;
    message => {
     IF medium.ask = postMessage THEN {
      IF internalMedium.message # NIL THEN
       z.FREE[@internalMedium.message];
      internalMedium.message ← String.CopyToNewString[medium.message, z];
      z.FREE[@medium.message];
      };
     };
    ENDCASE;
   };
  ENDLOOP;
 END;
MapMedium: PUBLIC PROC [
 intMediumPtr: LONG POINTER TO PublicPrinting.InternalMedium,
 z: UNCOUNTED ZONE] =
 BEGIN
 FOR i: MediumIndex IN MediumIndex DO
  IF String.Equivalent[mediumNames[i], intMediumPtr.name] THEN {
   intMediumPtr.mediumDimensions ← mediumDimensions[i];
   SELECT i FROM
    std4020dpWhite => intMediumPtr.color ← white;
    std4020dpYellow => intMediumPtr.color ← yellow;
    std4020dpBlue => intMediumPtr.color ← blue;
    std4020dpPink => intMediumPtr.color ← pink;
    std4020dpGoldenrod => {
     intMediumPtr.color ← other;
```

Copyright © 1992 Xerox Corporation All Rights Reserved

```
      intMediumPtr.otherColor ← String.CopyToNewString["goldenrod", z]};
     ENDCASE;
    };
   ENDLOOP;
  END;
 InitializeModuleD: PUBLIC PROC = BEGIN END;
 END.
```

Copyright © 1992 Xerox Corporation All Rights Reserved

```
DIRECTORY
 PreParserControl USING [LogRec, Object];

PreParserLogImpl: MONITOR EXPORTS PreParserControl =
 BEGIN

 LogProc: PUBLIC ENTRY PROC [
  h: LONG POINTER TO PreParserControl.Object, rec: PreParserControl.LogRec] =
  BEGIN
  h.log.logPtr[h.log.next] ← rec;
  IF h.log.entriesInUse < h.log.entriesAllocated THEN
   h.log.entriesInUse ← SUCC[h.log.entriesInUse];
  h.log.next ←
   IF h.log.next = h.log.entriesAllocated - 1 THEN 0 ELSE SUCC[h.log.next];
  END;

 END.
```

Copyright © 1992 Xerox Corporation All Rights Reserved

```
DIRECTORY
 BlockStream USING [Block, nullBlock],
 ByteBlt USING [ByteBlt],
 CoalescerTable USING [BitMapEntryLinkHandle],
 DecomposerCommon USING [ObjectIndexNull],
 FixedPointReal USING [Number],
 InternalIP,
 IPFunction USING [
  AllocateNodeNFL, Count, FPRToReal, FreeNodeNFL, LeftBrace, MakeGray, MakeVec,
  MakeVecLU, Mark, PreCheckPosition, PreNextAction, PrePopOperands,
  PrePushStack, PrePutToken, PushShortNumber, PreSkipSequence, PreSetXRel,
  PreSetXYRel, PreSetYRel, Rotate, Scale, Scale2, SetGray, PreSetXY, Translate,
  PreTransformIPVector],
 IPMicrocode USING [CALL],
 ParserCommon USING [ActionTraceSize, State],
 ParserZone USING [AddZoneSegment, GetMinBlockSize],
 PreParserCommon USING [MainContext, MainHandle, maxImages],
 PreParserColor USING [
  FindColor, FindColorModelOp, FindColorOp, FindDecompressor, MakePixelArray,
  MakeSampledBlack, MaskPixel, SetSampledBlack, SetInkWell],
 PreParserControl USING [
  Handle, MainAction, MainHandle, MainStatus, NotifyMainLoopReady, PageHandle,
  SIFResultPtr],
 PreParserData USING [
  OperandConversionTablePtr, OperandLookupTablePtr, OperandTablePtr],
 PreParserExtra USING [
  ClipRectangle, ContinueNextAction, ErrorOp, FGetMesa, FSetMesa, GetCP,
  ISetMesa, Move, ReportFPUProblem, SetErrorStatus, ShowMesa, ShowAndXRel,
  ShowAndFixedXRel, Trans],
 PreParserFilled USING [
  MakeOutline, MaskFill, MaskRectangleMesa, MaskTrapezoidX, MaskTrapezoidY],
 PreParserFont USING [FindFont, ModifyFont, SetFontMesa],
 PreParserFrameStack USING [
  ChangeRefCountAndFree, ComplexNodeRefCount, PushFrame],
 PreParserInline USING [CloseBitMapEntry, OpenBitMapEntry],
 PreParserMain USING [],
 PreParserMainErrors USING [
  invalidNode, nestedCORRECTs, numericError, «outputOperatorNotAllowed,»
  unexpectedError, unexpectedIPFunction, unexpectedIPTrap, unexpectedOperator,
  unexpectedSignal, unimplementedFeature],
 PreParserMainOps USING [],
 PreParserSequence USING [SequenceMesa],
 PreParserSkeleton USING [
  CheckIPHeader, DoOperator, FindOperator, InitContentInstrs, MakeSimpleCO,
  ProcessBegin, ProcessEnd, PushRBrace, RightBraceMesa, SaveCOData,
  SetUpIPBlock, SetUpIIPBlock],
 PreParserStackOps USING [
  Abs, Add, And, Ceiling, Copy, Div, Dup, Exch, EQ, Floor, GE, GetP, GetProp,
  GT, IGet, MergeProp, Mod, Mul, Neg, Not, Or, Pop, Rem, Roll, Round, Sub,
```

Copyright © 1992 Xerox Corporation All Rights Reserved

```
 Trunc, Type, UnMark],
PreParserStroke USING [
 ArcTo, ConicTo, CurveTo, LineTo, LineToX, LineToY, MaskDashedStroke,
 MaskStroke, MaskVector, MoveTo],
PreParserTForm USING [Concat, ConcatT, MakeT],
PreParserTokenContext USING [ActionArrayPtr, TokenSizeArray, TokenSizeArrayPtr],
ParserTraps USING [IPTrap],
PreParserVector USING [Get, Shape],
Real USING [RealException],
ResMgrStorage USING [BufferList];

PreParserMainImpl: PROGRAM
 IMPORTS
  ByteBlt, IPMicrocode, ParserZone, PreParserColor, PreParserControl,
  PreParserExtra, PreParserFilled, PreParserFont, PreParserFrameStack,
  PreParserInline, PreParserSequence, PreParserSkeleton, PreParserStackOps,
  PreParserStroke, PreParserTForm, ParserTraps, PreParserVector, Real
 EXPORTS PreParserControl, PreParserData, PreParserMain, PreParserMainOps =
 BEGIN
 MainContext: PUBLIC TYPE = PreParserCommon.MainContext;

 debug: PUBLIC BOOLEAN ← TRUE;
 microcodeMismatch: PUBLIC BOOLEAN ← FALSE;
 trace: BOOLEAN ← TRUE;
 execActions: PUBLIC PreParserTokenContext.ActionArrayPtr ← NIL;
 skipActions: PUBLIC PreParserTokenContext.ActionArrayPtr ← NIL;
 tokenSizes: PUBLIC PreParserTokenContext.TokenSizeArrayPtr ← NIL;
 microcodeVersion: PUBLIC CARDINAL ← 0;
 operandTablePtr: PUBLIC PreParserData.OperandTablePtr ← NIL;
 operandLookupTablePtr: PUBLIC PreParserData.OperandLookupTablePtr ← NIL;
 operandConversionTablePtr: PUBLIC PreParserData.OperandConversionTablePtr ← NIL;

 MaskUnderline: PUBLIC PROCEDURE [h: PreParserCommon.MainHandle]
  RETURNS [loop: BOOLEAN ← TRUE] = INLINE
  BEGIN
  underlinePtr: LONG POINTER TO maskUnderline90 InternalIP.Token =
   LOOPHOLE[@h.token];

  LOOPHOLE[underlinePtr, LONG POINTER TO InternalIP.TokenType] ↑ ←
   maskUnderline90;

  h.sv.operand03.real ← h.sv.operand02.real;

  h.sv.operand02.real ← -h.sv.operand01.real;
  h.sv.operand01.real ← 0.0;
  h.stackEntryPtr ← @h.sv.operand01;
  [] ← IPMicrocode.CALL[
   function: IPFunction.PreTransformIPVector, entryContext: h];

  underlinePtr.rec.dY ←
```

Copyright © 1992 Xerox Corporation All Rights Reserved

```
  IF h.P1.y.li = 0 THEN [direction: plusX, pad: 0, distance: h.P1.x]
  ELSE [direction: plusY, pad: 0, distance: h.P1.y];

 h.sv.operand02.real ← -h.sv.operand03.real;
 [] ← IPMicrocode.CALL[
  function: IPFunction.PreTransformIPVector, entryContext: h];

 underlinePtr.rec.dHx ← IF h.P1.y.li = 0 THEN h.P1.x ELSE h.P1.y;
 IF IPMicrocode.CALL[function: IPFunction.PrePutToken, entryContext: h].result
  # 0 THEN {h.pc.pcm.savedAction ← PrePutToken; RETURN; };
 loop ← FALSE;
 END;
CheckGraphic: PUBLIC PROCEDURE [h: PreParserCommon.MainHandle]
 RETURNS [needIIPBlock: BOOLEAN] =
 BEGIN
 IF ~h.iipData.graphicChanged THEN RETURN[needIIPBlock: FALSE];

 IF h.iipData.imagerVars.priorityImportant # h.imagerVars.priorityImportant
  THEN {

  LOOPHOLE[@h.token, LONG POINTER TO setPriorityImportant InternalIP.Token] ↑ ←
   [
   setPriorityImportant[
   [important: LOOPHOLE[h.imagerVars.priorityImportant]]]];
  IF IPMicrocode.CALL[
   function: IPFunction.PrePutToken, entryContext: h].result # 0 THEN
   RETURN[needIIPBlock: TRUE];

  h.iipData.imagerVars.priorityImportant ← h.imagerVars.priorityImportant};

 IF h.iipData.imagerVars.color # h.imagerVars.color THEN {
  inkWellSent: BOOLEAN ← FALSE;
  SELECT h.imagerVars.color.type FROM
   grayColor =>
    LOOPHOLE[@h.token, LONG POINTER TO setGray InternalIP.Token] ↑ ← [
     setGray[rec: [gray: h.imagerVars.color.colorRange]]];
   ENDCASE => {
    IF h.imagerVars.color.colorPtr.inkWellDataPtr # NIL THEN {
     IF PreParserColor.SetInkWell[
      h, h.imagerVars.color.colorPtr].needIIPBlock THEN
      RETURN[needIIPBlock: TRUE];
     inkWellSent ← TRUE;
     }
    ELSE {
     IF CheckColor[h].error THEN {
      h.pc.pcm.action ← fatalError; RETURN[needIIPBlock: TRUE]};
     LOOPHOLE[@h.token, LONG POINTER TO setColor InternalIP.Token] ↑ ← [
      setColor[
      rec: [
      origin: h.imagerVars.color.colorPtr.origin,
```

Copyright © 1992 Xerox Corporation All Rights Reserved

```
      index: h.imagerVars.color.colorPtr.cTableIndex,
      opaque: h.imagerVars.color.colorPtr.opaque]]);
     };
    PreParserFrameStack.ChangeRefCountAndFree[
     h: h, ptr: h.imagerVars.color.colorPtr, delta: 1];
    };

  IF NOT inkWellSent THEN {
   IF IPMicrocode.CALL[
    function: IPFunction.PrePutToken, entryContext: h].result # 0 THEN
    RETURN[needIIPBlock: TRUE]};

  IF h.iipData.imagerVars.color.type = color THEN {
   PreParserFrameStack.ComplexNodeRefCount[
    h: h, entryPtr: @h.iipData.imagerVars.color, delta: -1]};
  h.iipData.imagerVars.color ← h.imagerVars.color};

 IF h.iipData.clipperChanged THEN {
  LOOPHOLE[@h.token, LONG POINTER TO setClipRectangleInt InternalIP.Token] ↑ ←
   [setClipRectangleInt[rec: h.imagerVars.clipper]];
  IF IPMicrocode.CALL[
   function: IPFunction.PrePutToken, entryContext: h].result # 0 THEN
   RETURN[needIIPBlock: TRUE];

  h.iipData.imagerVars.clipper ← h.imagerVars.clipper;

  h.iipData.clipperChanged ← FALSE;
  };

 h.iipData.graphicChanged ← FALSE;
 RETURN[needIIPBlock: FALSE];
 END;
CheckColor: PUBLIC PROCEDURE [h: PreParserCommon.MainHandle]
 RETURNS [error: BOOLEAN ← FALSE] =
 BEGIN
 tableIndex, totalCount: CARDINAL ← 0;
 tableRecordPtr: CoalescerTable.BitMapEntryLinkHandle ← h.bitMapTablePtrStart;
 WHILE tableRecordPtr # NIL DO
  FOR tableIndex IN [0..PreParserCommon.maxImages) DO
   IF tableRecordPtr.list[tableIndex] =
    h.imagerVars.color.colorPtr.coalesceEntry THEN {
    h.imagerVars.color.colorPtr.cTableIndex ← totalCount + tableIndex;
    RETURN};
   ENDLOOP;
  tableRecordPtr ← tableRecordPtr.next;
  totalCount ← totalCount + PreParserCommon.maxImages;
  ENDLOOP;

 IF PreParserInline.OpenBitMapEntry[h: h].error THEN RETURN[error ← TRUE];
 h.bitMapEntryPtr ↑ ← h.imagerVars.color.colorPtr.coalesceEntry;
```

Copyright © 1992 Xerox Corporation All Rights Reserved

```
h.imagerVars.color.colorPtr.cTableIndex ← h.bitMapTableCurrentLength;
PreParserInline.CloseBitMapEntry[h: h];
END;
CheckStroke: PUBLIC PROCEDURE [h: PreParserCommon.MainHandle]
RETURNS [needIIPBlock: BOOLEAN] =
BEGIN
IF ~h.iipData.strokeChanged THEN RETURN[needIIPBlock: FALSE];

IF h.iipData.imagerVars.strokeEnd # h.imagerVars.strokeEnd THEN {

 LOOPHOLE[@h.token, LONG POINTER TO setStrokeEnd InternalIP.Token] ↑ ← [
  setStrokeEnd[[ends: h.imagerVars.strokeEnd]]];

 IF IPMicrocode.CALL[
  function: IPFunction.PrePutToken, entryContext: h].result # 0 THEN
  RETURN[needIIPBlock: TRUE];

 h.iipData.imagerVars.strokeEnd ← h.imagerVars.strokeEnd};

IF h.iipData.imagerVars.strokeJoint # h.imagerVars.strokeJoint THEN {
 LOOPHOLE[@h.token, LONG POINTER TO setStrokeJoint InternalIP.Token] ↑ ← [
  setStrokeJoint[[joints: h.imagerVars.strokeJoint]]];
 IF IPMicrocode.CALL[
  function: IPFunction.PrePutToken, entryContext: h].result # 0 THEN
  RETURN[needIIPBlock: TRUE];

 h.iipData.imagerVars.strokeJoint ← h.imagerVars.strokeJoint};

IF h.iipData.strokeWidthChanged THEN {
 h.stackEntryPtr ← @h.sv.operand06;
 h.sv.operand06.real ← h.imagerVars.strokeWidth;
 h.sv.operand07.real ← h.imagerVars.strokeWidth;
 [] ← IPMicrocode.CALL[
  function: IPFunction.PreTransformIPVector, entryContext: h];
 h.P1.x.li ← ABS[h.P1.x.li];
 h.P1.y.li ← ABS[h.P1.y.li];
 IF h.P1.x # h.iipData.imagerVars.strokeWidthX
  OR h.P1.y # h.iipData.imagerVars.strokeWidthY THEN {
  IF h.P1.x.li # h.P1.y.li THEN
   LOOPHOLE[@h.token, LONG POINTER TO setStrokeWidthEllipse
    InternalIP.Token] ↑ ← [
    setStrokeWidthEllipse[
    rec: [
    length: [
    short: [direction: plusX, pad: 0, distance: h.P1.x],
    long: [direction: plusY, pad: 0, distance: h.P1.y]]]]]
  ELSE
   LOOPHOLE[@h.token, LONG POINTER TO setStrokeWidth InternalIP.Token] ↑ ← [
    setStrokeWidth[rec: [length: h.P1.x]]];
```

Copyright © 1992 Xerox Corporation All Rights Reserved

```
    IF IPMicrocode.CALL[
     function: IPFunction.PrePutToken, entryContext: h].result # 0 THEN
     RETURN[needIIPBlock: TRUE];

    h.iipData.imagerVars.strokeWidthX ← h.P1.x;
    h.iipData.imagerVars.strokeWidthY ← h.P1.y};

   h.iipData.strokeWidthChanged ← FALSE;
   };
  h.iipData.strokeChanged ← FALSE;
  RETURN[needIIPBlock: FALSE];
  END;
 CheckTextVars: PUBLIC PROCEDURE [h: PreParserCommon.MainHandle]
  RETURNS [loop: BOOLEAN] =
  BEGIN

  IF ~h.iipData.textImagerVarChanged THEN RETURN[loop: FALSE];

  IF h.iipData.imagerVars.amplifySpace # h.imagerVars.amplifySpace THEN {

   LOOPHOLE[@h.token, LONG POINTER TO setAmplifySpace InternalIP.Token] ↑ ← [
    setAmplifySpace[rec: [factor: [lc[lc: h.imagerVars.amplifySpace.li]]]]];
   IF IPMicrocode.CALL[
    function: IPFunction.PrePutToken, entryContext: h].result # 0 THEN
    RETURN[loop: TRUE];

   h.iipData.imagerVars.amplifySpace ← h.imagerVars.amplifySpace};

  IF h.imagerVars.correctShrink.fixed # h.iipData.imagerVars.correctShrink.fixed
   THEN {
   LOOPHOLE[@h.token, LONG POINTER TO setCorrectShrink InternalIP.Token] ↑ ← [
    setCorrectShrink[rec: [factor: h.imagerVars.correctShrink.fixed]]];
   IF IPMicrocode.CALL[
    function: IPFunction.PrePutToken, entryContext: h].result # 0 THEN
    RETURN[loop: TRUE];
   h.iipData.imagerVars.correctShrink.fixed ← h.imagerVars.correctShrink.fixed;
   };

  IF h.imagerVars.correctMX # h.iipData.imagerVars.correctMX
   OR h.imagerVars.correctMY # h.iipData.imagerVars.correctMY THEN {
   direction: InternalIP.VectorDirection;
   distance: FixedPointReal.Number;
   IF h.imagerVars.correctMX.li = 0 THEN {
    direction ← plusY; distance ← h.imagerVars.correctMY}
   ELSE {distance ← h.imagerVars.correctMX; direction ← plusX; };

   LOOPHOLE[@h.token, LONG POINTER TO setCorrectMeasure90 InternalIP.Token] ↑ ←
    [
    setCorrectMeasure90[
    rec: [measure: [direction: direction, pad: 0, distance: distance]]]];
```

Copyright © 1992 Xerox Corporation All Rights Reserved

```
IF IPMicrocode.CALL[
 function: IPFunction.PrePutToken, entryContext: h].result # 0 THEN
 RETURN[loop: TRUE];

h.iipData.imagerVars.correctMX ← h.imagerVars.correctMX;
h.iipData.imagerVars.correctMY ← h.imagerVars.correctMY};

IF h.imagerVars.correctTX # h.iipData.imagerVars.correctTX
 OR h.imagerVars.correctTY # h.iipData.imagerVars.correctTY THEN {

 LOOPHOLE[@h.token, LONG POINTER TO setCorrectTolerance InternalIP.Token] ↑ ←
  [
  setCorrectTolerance[
  rec: [
  tolerance: [x: h.imagerVars.correctTX, y: h.imagerVars.correctTY]]]];
 IF IPMicrocode.CALL[
  function: IPFunction.PrePutToken, entryContext: h].result # 0 THEN
  RETURN[loop: TRUE];

 h.iipData.imagerVars.correctTX ← h.imagerVars.correctTX;
 h.iipData.imagerVars.correctTY ← h.imagerVars.correctTY};

h.iipData.textImagerVarChanged ← FALSE;
RETURN[loop: FALSE];
END;
CheckPosition: PUBLIC PROCEDURE [h: PreParserCommon.MainHandle]
 RETURNS [needIIPBlock: BOOLEAN] =
 BEGIN
 IF ~h.iipData.positionChanged THEN RETURN[needIIPBlock: FALSE];

 IF h.iipData.imagerVars.dcsX # h.imagerVars.dcsX
  OR h.iipData.imagerVars.dcsY # h.imagerVars.dcsY THEN {

  LOOPHOLE[@h.token, LONG POINTER TO setXYInt InternalIP.Token] ↑ ← [
   setXYInt[
   rec: [xy: [x: h.imagerVars.dcsX.int, y: h.imagerVars.dcsY.int]]]];
  IF IPMicrocode.CALL[
   function: IPFunction.PrePutToken, entryContext: h].result # 0 THEN
   RETURN[needIIPBlock: TRUE];

  h.iipData.imagerVars.dcsX ← h.imagerVars.dcsX;
  h.iipData.imagerVars.dcsY ← h.imagerVars.dcsY};

 h.iipData.positionChanged ← FALSE;
 RETURN[needIIPBlock: FALSE];
 END;
AllocateNode: PUBLIC PROCEDURE [
 mainHandle: PreParserControl.MainHandle, nodeSizeInWords: CARDINAL]
 RETURNS [nodePtr: LONG POINTER, extendZone: BOOLEAN] =
 BEGIN
```

Copyright © 1992 Xerox Corporation All Rights Reserved

```
h: PreParserCommon.MainHandle = mainHandle;
h.pc.pcm.nodeSizeInWords ← nodeSizeInWords;
h.pc.pcm.zoneRecPtr ← @h.zone;
extendZone ← IPMicrocode.CALL[
 function: IPFunction.AllocateNodeNFL, entryContext: h] # 0;
nodePtr ← h.pc.pcm.nodePtr
END;
FreeNode: PUBLIC PROCEDURE [
 mainHandle: PreParserControl.MainHandle, nodePtr: LONG POINTER] RETURNS [] =
 BEGIN
 h: PreParserCommon.MainHandle = mainHandle;
 h.pc.pcm.zoneRecPtr ← @h.zone;
 h.pc.pcm.nodePtr ← nodePtr;
 [] ← IPMicrocode.CALL[function: IPFunction.FreeNodeNFL, entryContext: h];
 END;

DoMainLoop: PUBLIC PROCEDURE [handle: PreParserControl.Handle] =
 BEGIN
 ENABLE ABORTED => CONTINUE;
 mainAction: PreParserControl.MainAction;
 mainHandle: PreParserControl.MainHandle;
 pageHandle: PreParserControl.PageHandle ← NIL;
 newIPBlock: BlockStream.Block;
 newZoneBlock: ResMgrStorage.BufferList;
 newIIPBlock: BlockStream.Block;
 status: PreParserControl.MainStatus ← [ready[]];
 smZone: UNCOUNTED ZONE;

 DO
  [h: mainHandle, pageHandle: pageHandle, action: mainAction,
   newIPBlock: newIPBlock, newZoneBlock: newZoneBlock,
   newIIPBlock: newIIPBlock, smZone: smZone] ←
   PreParserControl.NotifyMainLoopReady[
   handle: handle, currentPageHandle: pageHandle, status: status];

  [status: status] ← DoTokenLoop[
   mainHandle: mainHandle, newZoneBlock: newZoneBlock, smZone: smZone,
   newIPBlock: newIPBlock, newIIPBlock: newIIPBlock];

  ENDLOOP;
 END;

DoTokenLoop: PUBLIC PROCEDURE [
 mainHandle: PreParserControl.MainHandle,
 newZoneBlock: ResMgrStorage.BufferList, smZone: UNCOUNTED ZONE,
 newIPBlock: BlockStream.Block, newIIPBlock: BlockStream.Block]
 RETURNS [status: PreParserControl.MainStatus] =
 BEGIN
 h: PreParserCommon.MainHandle = mainHandle;
 h.statusPtr ← @status;
```

Copyright © 1992 Xerox Corporation All Rights Reserved

```
{
ENABLE {
 ParserTraps.IPTrap => {
  WITH trap SELECT FROM
   unknownIPPrincOpFunction => {
    h.errorCode ← PreParserMainErrors.unexpectedIPFunction;
    h.pc.pcm.data.code ← «trap.» ipFunction;
    };
   invalidNode => h.errorCode ← PreParserMainErrors.invalidNode;
   ENDCASE => h.errorCode ← PreParserMainErrors.unexpectedIPTrap;
  GOTO fatalError;
  };
 Real.RealException => {
  h.errorCode ← PreParserMainErrors.numericError; GOTO fatalError; };
 ANY => {
  h.errorCode ← PreParserMainErrors.unexpectedSignal; GOTO fatalError; };
 };

IF newIPBlock.blockPointer # NIL THEN
 PreParserSkeleton.SetUpIPBlock[h: h, newIPBlock: newIPBlock];
IF newIIPBlock.blockPointer # NIL THEN
 PreParserSkeleton.SetUpIIPBlock[h: h, newIIPBlock: newIIPBlock];
IF newZoneBlock # NIL THEN
 ParserZone.AddZoneSegment[h: @h.pc.pcm, zoneSegment: newZoneBlock];
h.smZone ← smZone;
IF microcodeMismatch THEN {
 h.errorCode ← PreParserMainErrors.unexpectedError; GOTO fatalError; };
h.pc.pcm.action ← h.pc.pcm.savedAction;
DO
 IF trace THEN {
  h.pc.pcm.actionTraceTable[h.pc.pcm.currentTraceIndex] ← h.pc.pcm.action;
  h.pc.pcm.currentTraceIndex ←
   (h.pc.pcm.currentTraceIndex + 1) MOD ParserCommon.ActionTraceSize};
 SELECT h.pc.pcm.action FROM

  abs => IF PreParserStackOps.Abs[h: h].loop THEN LOOP;
  add => IF PreParserStackOps.Add[h: h].loop THEN LOOP;
  and => IF PreParserStackOps.And[h: h].loop THEN LOOP;
  arcTo => IF PreParserStroke.ArcTo[h: h].loop THEN LOOP;

  begin => IF PreParserSkeleton.ProcessBegin[h: h].loop THEN LOOP;

  ceiling => IF PreParserStackOps.Ceiling[h: h].loop THEN LOOP;
  changeState => {
   h.pc.state ← h.pc.pcm.data.newState;
   h.pc.actionArrayPtr ←
    IF h.pc.state IN [executing..executingNoOutput] THEN execActions
    ELSE skipActions;
   };
  checkIPHeader => IF PreParserSkeleton.CheckIPHeader[h: h].loop THEN LOOP;
```

Copyright © 1992 Xerox Corporation All Rights Reserved

```
clipRectangle = > IF PreParserExtra.ClipRectangle[h: h].loop THEN LOOP;
clipOutline = > GOTO unimplemented;
concat = > IF PreParserTForm.Concat[h: h].loop THEN LOOP;
concatT = > IF PreParserTForm.ConcatT[h: h].loop THEN LOOP;
conicTo = > IF PreParserStroke.ConicTo[h: h].loop THEN LOOP;
contentInstructions = > {PreParserSkeleton.InitContentInstrs[h: h]; LOOP};
continueNextAction = > {PreParserExtra.ContinueNextAction[h: h]; LOOP; };
continueSequence = > {
 h.pc.ipByteIndex ←
  h.pc.ipByteIndex + h.pc.sequenceLength.lowbits -
   h.tempData.bytesCopied;
 h.tempData.bytesCopied ←
  h.tempData.bytesCopied + ByteBlt.ByteBlt[
   from: [
   blockPointer: h.pc.ipBufferPtr, startIndex: 0,
   stopIndexPlusOne: h.pc.ipStopIndexPlusOne],
   to: [
   blockPointer: LOOPHOLE[@h.stackEntry.stringPtr ↑ .chars],
   startIndex: h.tempData.bytesCopied,
   stopIndexPlusOne: h.pc.sequenceLength.lowbits], overLap: move];
 IF h.tempData.bytesCopied # h.pc.sequenceLength.lowbits THEN {
  h.pc.pcm.savedAction ← continueSequence;
  h.pc.pcm.action ← needIPBlock;
  LOOP;
  };
 };
copy = > IF PreParserStackOps.Copy[h: h].loop THEN LOOP;
correct = >
 SELECT h.pc.state FROM
  executing = > {
   IF h.pc.operationStage = 0 THEN {
    IF IPMicrocode.CALL[
     function: IPFunction.PreCheckPosition, entryContext: h].result #
     0 THEN {h.pc.pcm.savedAction ← correct; LOOP; };
    h.frameSaveOption ← doSave;
    IF PreParserFrameStack.PushFrame[h: h].extendZone THEN {
     h.pc.pcm.savedAction ← correct; LOOP; };
    };

   IF (h.pc.operationStage < = 1) AND (h.iipData.currentWordCount < 50)
    THEN {

    LOOPHOLE[@h.token, LONG POINTER TO filler InternalIP.Token] ↑ ← [
     filler[rec: [offsetToNextToken: 0, fillWords: TRASH]]];
    [] ← IPMicrocode.CALL[
     function: IPFunction.PrePutToken, entryContext: h];
    h.pc.pcm.savedAction ← correct;
    h.pc.operationStage ← 1;
    LOOP;
    };
```

Copyright © 1992 Xerox Corporation All Rights Reserved

```
IF h.pc.operationStage <= 2 THEN {
 IF PreParserSkeleton.PushRBrace[
  h: h, rBraceAction: [endCORRECT[]]] THEN {
  h.pc.pcm.savedAction ← correct;
  h.pc.operationStage ← 2;
  LOOP;
  };
 };
IF h.pc.operationStage <= 3 THEN {
 LOOPHOLE[@h.token, LONG POINTER TO beginCorrect InternalIP.Token] ↑
  ← [beginCorrect[]];
 IF IPMicrocode.CALL[
  function: IPFunction.PrePutToken, entryContext: h].result # 0
  THEN {
  h.pc.pcm.savedAction ← correct;
  h.pc.operationStage ← 3;
  LOOP;
  };
 };
h.pc.operationStage ← 0;
h.iipData.fontChanged ← TRUE;
h.iipData.imagerVars.fontIndex ←
 DecomposerCommon.ObjectIndexNull - 1;
h.pc.state ← needLBrace;
h.pc.nextState ← executingInCORRECT;
};
executingInCORRECT => {
 h.pc.pcm.action ← fatalError;
 h.pc.pcm.data.code ← PreParserMainErrors.nestedCORRECTs;
 LOOP;
 };
executingNoOutput, needBegin, needLBrace, node, pastContentInstrs,
 startOfMaster => {
 h.pc.pcm.action ← fatalError;
 h.pc.pcm.data.code ← PreParserMainErrors.unexpectedOperator;
 LOOP;
 };
recordingCO, skippingBody => NULL;
ENDCASE;
correctMask => {
 LOOPHOLE[@h.token, LONG POINTER TO correctMask InternalIP.Token] ↑ ← [
  correctMask[]];
 IF IPMicrocode.CALL[
  function: IPFunction.PrePutToken, entryContext: h].result # 0 THEN {
  h.pc.pcm.savedAction ← PrePutToken; LOOP}};
 };
correctSpace => {
 h.stackEntryPtr ← @h.sv.operand01;
 [] ← IPMicrocode.CALL[
  function: IPFunction.PreTransformIPVector, entryContext: h];
```

Copyright © 1992 Xerox Corporation All Rights Reserved

```
 LOOPHOLE[@h.token, LONG POINTER TO correctSpace InternalIP.Token] ↑ ← [
  correctSpace[rec: [vector: h.P1]]];
 IF IPMicrocode.CALL[
  function: IPFunction.PrePutToken, entryContext: h].result # 0 THEN {
  h.pc.pcm.savedAction ← PrePutToken; LOOP};
 };
Count => 
 IF IPMicrocode.CALL[function: IPFunction.Count, entryContext: h].result
  # 0 THEN LOOP;
curveTo => IF PreParserStroke.CurveTo[h: h].loop THEN LOOP;

div => IF PreParserStackOps.Div[h: h].loop THEN LOOP;
do => {
 h.frameSaveOption ← do;
 IF PreParserSkeleton.DoOperator[h: h].loop THEN LOOP};
doSave => {
 h.frameSaveOption ← doSave;
 IF PreParserSkeleton.DoOperator[h: h].loop THEN LOOP};
doSaveAll => {
 h.frameSaveOption ← doSaveAll;
 IF PreParserSkeleton.DoOperator[h: h].loop THEN LOOP};
doSaveSimpleBody => {
 SELECT h.pc.state FROM
  executing, executingInCORRECT, executingNoOutput, recordingCO,
   skippingBody => {
   IF h.pc.operationStage = 0 THEN {
    h.frameSaveOption ← doSave;
    IF h.pc.state # skippingBody THEN
     IF PreParserFrameStack.PushFrame[h: h].extendZone THEN {
      h.pc.pcm.savedAction ← doSaveSimpleBody; LOOP; };
    }
   ELSE h.pc.operationStage ← 0;
   IF PreParserSkeleton.PushRBrace[
    h: h,
    rBraceAction: [endBody[prevState: h.pc.state, ifCase: noIFElse]]]
    THEN {
    h.pc.pcm.savedAction ← doSaveSimpleBody;
    h.pc.operationStage ← 1;
    LOOP;
    };
   h.pc.nextState ← h.pc.state;
   h.pc.state ← needLBrace;
   };
  needBegin, needLBrace, node, pastContentInstrs, startOfMaster => {
   h.pc.pcm.action ← fatalError;
   h.pc.pcm.data.code ← PreParserMainErrors.unexpectedOperator;
   LOOP;
   };
  ENDCASE;
 };
```

Copyright © 1992 Xerox Corporation All Rights Reserved

```
dup => IF PreParserStackOps.Dup[h: h].loop THEN LOOP;

end => IF PreParserSkeleton.ProcessEnd[h: h].loop THEN LOOP;
eq => IF PreParserStackOps.EQ[h: h].loop THEN LOOP;
errorOperator => IF PreParserExtra.ErrorOp[h: h].loop THEN LOOP;
exch => IF PreParserStackOps.Exch[h: h].loop THEN LOOP;
exitLoop => EXIT;
extendZone => {
 status ← [
  needZoneExtend[
  minimumBlockSize: ParserZone.GetMinBlockSize[h: @h.pc.pcm]]];
 EXIT;
 };
extractPixel => GOTO unimplemented;

fatalError => {h.errorCode ← h.pc.pcm.data.code; GOTO fatalError; };
findColor => IF PreParserColor.FindColor[h: h].loop THEN LOOP;
findColorModelOp =>
 IF PreParserColor.FindColorModelOp[h: h].loop THEN LOOP;
findColorOp => IF PreParserColor.FindColorOp[h: h].loop THEN LOOP;
findDecompressor =>
 IF PreParserColor.FindDecompressor[h: h].loop THEN LOOP;
findFont => IF PreParserFont.FindFont[h: h].loop THEN LOOP;
findOperator => IF PreParserSkeleton.FindOperator[h: h].loop THEN LOOP;
FGet => IF PreParserExtra.FGetMesa[h: h].loop THEN LOOP;
floor => IF PreParserStackOps.Floor[h: h].loop THEN LOOP;
FPUProblem => {PreParserExtra.ReportFPUProblem[h: h]; LOOP};
FSet => IF PreParserExtra.FSetMesa[h: h].loop THEN LOOP;

ge => IF PreParserStackOps.GE[h: h].loop THEN LOOP;
get => IF PreParserVector.Get[h: h].loop THEN LOOP;
getCP => IF PreParserExtra.GetCP[h: h].loop THEN LOOP;
getP => IF PreParserStackOps.GetP[h: h].loop THEN LOOP;
getProp => IF PreParserStackOps.GetProp[h: h].loop THEN LOOP;
gt => IF PreParserStackOps.GT[h: h].loop THEN LOOP;

if => {
 IF h.pc.operationStage = 0
  AND
   ((h.sv.operand01.type = fixedPointReal
     AND h.sv.operand01.fixed.li # 0) OR h.sv.operand01.real # 0) THEN
   {
   h.frameSaveOption ← do;
   IF PreParserFrameStack.PushFrame[h: h].extendZone THEN {
    h.pc.pcm.savedAction ← if; LOOP; };
   h.pc.nextState ← h.pc.state;
   }
  ELSE h.pc.nextState ← skippingBody;
 IF PreParserSkeleton.PushRBrace[
  h: h, rBraceAction: [endBody[prevState: h.pc.state]]] THEN {
```

Copyright © 1992 Xerox Corporation All Rights Reserved

```
    h.pc.pcm.savedAction ← if; h.pc.operationStage ← 1; LOOP; };
   h.pc.operationStage ← 0;
   h.pc.state ← needLBrace;
   };
  ifCopy => GOTO unimplemented;
  ifElse => {
   ifFlag: BOOLEAN ←
    (h.sv.operand01.type = fixedPointReal AND h.sv.operand01.fixed.li # 0)
    OR h.sv.operand01.real # 0;
   IF h.pc.operationStage = 0 THEN {
    IF ifFlag THEN {
     h.frameSaveOption ← do;
     IF PreParserFrameStack.PushFrame[h: h].extendZone THEN {
      h.pc.pcm.savedAction ← ifElse; LOOP; };
     h.pc.nextState ← h.pc.state;
     }
    ELSE h.pc.nextState ← skippingBody;
    }
   ELSE h.pc.operationStage ← 0;
   IF PreParserSkeleton.PushRBrace[
    h: h,
    rBraceAction: [
    endBody[
    prevState: h.pc.state,
    ifCase: IF ifFlag THEN IFElsePush0 ELSE IFElsePush1]]] THEN {
    h.pc.pcm.savedAction ← ifElse; h.pc.operationStage ← 1; LOOP; };
   h.pc.state ← needLBrace;
   };
  iGet => IF PreParserStackOps.IGet[h: h].loop THEN LOOP;
  ISet => IF PreParserExtra.ISetMesa[h: h].loop THEN LOOP;

  LeftBrace => {
   [] ← IPMicrocode.CALL[function: IPFunction.LeftBrace, entryContext: h];
   LOOP;
   };
  lineTo => IF PreParserStroke.LineTo[h: h].loop THEN LOOP;
  lineToX => IF PreParserStroke.LineToX[h: h].loop THEN LOOP;
  lineToY => IF PreParserStroke.LineToY[h: h].loop THEN LOOP;

  MakeGray =>
   IF IPMicrocode.CALL[
    function: IPFunction.MakeGray, entryContext: h].result # 0 THEN LOOP;
  makePixelArray => IF PreParserColor.MakePixelArray[h: h].loop THEN LOOP;
  makeOutlineOdd, makeOutline =>
   IF PreParserFilled.MakeOutline[h: h].loop THEN LOOP;
  makeSampledBlack =>
   IF PreParserColor.MakeSampledBlack[h: h].loop THEN LOOP;
  makeSimpleCO => IF PreParserSkeleton.MakeSimpleCO[h: h].loop THEN LOOP;
  makeT => IF PreParserTForm.MakeT[h: h].loop THEN LOOP;
  MakeVec =>
```

Copyright © 1992 Xerox Corporation All Rights Reserved

```
 IF IPMicrocode.CALL[
  function: IPFunction.MakeVec, entryContext: h].result # 0 THEN LOOP;
MakeVecLU =>
 IF IPMicrocode.CALL[
  function: IPFunction.MakeVecLU, entryContext: h].result # 0 THEN LOOP;
Mark =>
 IF IPMicrocode.CALL[function: IPFunction.Mark, entryContext: h].result #
  0 THEN LOOP;
maskDashedStroke =>
 IF PreParserStroke.MaskDashedStroke[h: h].loop THEN LOOP;
maskFill => IF PreParserFilled.MaskFill[h: h].loop THEN LOOP;
maskPixel => IF PreParserColor.MaskPixel[h: h].loop THEN LOOP;
maskStroke, maskStrokeClosed =>
 IF PreParserStroke.MaskStroke[h: h].loop THEN LOOP;
maskTrapezoidX => IF PreParserFilled.MaskTrapezoidX[h: h].loop THEN LOOP;
maskTrapezoidY => IF PreParserFilled.MaskTrapezoidY[h: h].loop THEN LOOP;
maskUnderline => {
 IF IPMicrocode.CALL[
  function: IPFunction.PreCheckPosition, entryContext: h].result # 0
  THEN {h.pc.pcm.savedAction ← maskUnderline; LOOP};
 IF CheckGraphic[h: h].needIIPBlock THEN {
  h.pc.pcm.savedAction ← maskUnderline; LOOP};
 IF MaskUnderline[h: h].loop THEN {
  h.pc.pcm.savedAction ← maskUnderline; LOOP}};
maskVector => IF PreParserStroke.MaskVector[h: h].loop THEN LOOP;
mergeProp => IF PreParserStackOps.MergeProp[h: h].loop THEN LOOP;
mod => IF PreParserStackOps.Mod[h: h].loop THEN LOOP;
modifyFont => IF PreParserFont.ModifyFont[h: h].loop THEN LOOP;
move => IF PreParserExtra.Move[h: h].loop THEN LOOP;
moveTo => IF PreParserStroke.MoveTo[h: h].loop THEN LOOP;
mul => IF PreParserStackOps.Mul[h: h].loop THEN LOOP;

needIPBlock => {
 IF h.recordingCO THEN {
  IF h.pc.operationStage = 0 THEN
   h.pc.ipByteIndex ← h.pc.ipStopIndexPlusOne;
  IF PreParserSkeleton.SaveCOData[h: h].loop THEN
   GOTO continueProcessing;
  };
 IF h.remainingBytesInBlock = 0 THEN {
  IF h.composedOpBlockPtr = NIL THEN {
   status ← [needIPBlock[betweenPages: h.betweenPages]]; EXIT; };
  h.remainingBytesInBlock ← h.composedOpBlockPtr.nBytes;
  h.pc.ipBufferPtr ← LOOPHOLE[@h.composedOpBlockPtr.ipData];
  h.pc.ipStopIndexPlusOne ← 0;
  h.composedOpBlockPtr ← h.composedOpBlockPtr.next;
  };
 PreParserSkeleton.SetUpIPBlock[h: h, newIPBlock: BlockStream.nullBlock];
 IF h.recordingCO THEN [] ← PreParserSkeleton.SaveCOData[h: h];
 GOTO continueProcessing;
```

Copyright © 1992 Xerox Corporation All Rights Reserved

```
 EXITS
  continueProcessing => {
   h.pc.pcm.action ← h.pc.pcm.savedAction; LOOP; };
 };
needIIPBlock => {
 IF h.remainingIIPCount # 0 THEN {
  h.iipData.currentWordPtr ← h.nextIIPWordPtr;
  h.iipData.currentWordCount ← h.remainingIIPCount;
  h.remainingIIPCount ← 0;
  h.pc.pcm.action ← h.pc.pcm.savedAction;
  LOOP}
 ELSE {status ← [needIIPBlock[]]; EXIT; };
 };
needSIF => {
 status ← [needInsertFileInfo[sifResultPtr: h.tempData.sifResultPtr]];
 EXIT};
neg => IF PreParserStackOps.Neg[h: h].loop THEN LOOP;
nop =>
 IF h.pc.pcm.contextType = preParserMainLoopContext AND debug THEN {
  LOOPHOLE[@h.token, LONG POINTER TO nop InternalIP.Token] ↑ ← [nop[]];
  IF IPMicrocode.CALL[
   function: IPFunction.PrePutToken, entryContext: h].result # 0 THEN {
   h.pc.pcm.action ← PrePutToken; h.pc.pcm.savedAction ← nop; LOOP; };
  };
not => IF PreParserStackOps.Not[h: h].loop THEN LOOP;

or => IF PreParserStackOps.Or[h: h].loop THEN LOOP;

PreMaskRectangle =>
 IF PreParserFilled.MaskRectangleMesa[h: h].loop THEN LOOP;
PreLoop => NULL;
PrePopOperands => {
 [] ← IPMicrocode.CALL[
  function: IPFunction.PrePopOperands, entryContext: h];
 LOOP;
 };
PrePushStack =>
 IF IPMicrocode.CALL[
  function: IPFunction.PrePushStack, entryContext: h].result # 0 THEN
  LOOP;
PrePutToken => {
 IF IPMicrocode.CALL[
  function: IPFunction.PrePutToken, entryContext: h].result # 0 THEN
  LOOP;
 };
PreSetFont => IF PreParserFont.SetFontMesa[h: h].loop THEN LOOP;
PreSetXRel => {
 IF IPMicrocode.CALL[
  function: IPFunction.PreSetXRel, entryContext: h].result # 0 THEN
  LOOP;
```

Copyright © 1992 Xerox Corporation All Rights Reserved

```
  IF h.pc.operationStage # 0 THEN {
   h.pc.operationStage ← 0; h.pc.pcm.action ← correctSpace; LOOP; };
  };
PreSetXY =>
  IF IPMicrocode.CALL[
   function: IPFunction.PreSetXY, entryContext: h].result # 0 THEN LOOP;
PreSetXYRel =>
  IF IPMicrocode.CALL[
   function: IPFunction.PreSetXYRel, entryContext: h].result # 0 THEN
   LOOP;
PreSetYRel =>
  IF IPMicrocode.CALL[
   function: IPFunction.PreSetYRel, entryContext: h].result # 0 THEN
   LOOP;
PreSequence => IF PreParserSequence.SequenceMesa[h: h].loop THEN LOOP;
PreSkipSequence =>
  IF IPMicrocode.CALL[
   function: IPFunction.PreSkipSequence, entryContext: h].result # 0 THEN
   LOOP;
PreShow => IF PreParserExtra.ShowMesa[h: h].loop THEN LOOP;
Pop => IF PreParserStackOps.Pop[h: h].loop THEN LOOP;
PushShortNumber =>
  IF IPMicrocode.CALL[
   function: IPFunction.PushShortNumber, entryContext: h].result # 0 THEN
   LOOP;

rem => IF PreParserStackOps.Rem[h: h].loop THEN LOOP;
RightBrace => IF PreParserSkeleton.RightBraceMesa[h: h].loop THEN LOOP;
roll => IF PreParserStackOps.Roll[h: h].loop THEN LOOP;
Rotate =>
  IF IPMicrocode.CALL[function: IPFunction.Rotate, entryContext: h].result
   # 0 THEN LOOP;
round => IF PreParserStackOps.Round[h: h].loop THEN LOOP;

Scale =>
  IF IPMicrocode.CALL[function: IPFunction.Scale, entryContext: h].result
   # 0 THEN LOOP;
Scale2 =>
  IF IPMicrocode.CALL[function: IPFunction.Scale2, entryContext: h].result
   # 0 THEN LOOP;
setCorrectMeasure => {
  IF h.sv.operand01 # h.correctMeasureX
   OR h.sv.operand02 # h.correctMeasureY THEN {
   h.correctMeasureX ← h.sv.operand01;
   h.correctMeasureY ← h.sv.operand02;
   IF h.sv.operand01.type = fixedPointReal THEN {
    h.pc.pcm.fixed ← h.sv.operand01.fixed;
    [] ← IPMicrocode.CALL[
     function: IPFunction.FPRToReal, entryContext: h];
    h.sv.operand01 ← [
```

Copyright © 1992 Xerox Corporation All Rights Reserved

```
    type: real, frameData: real[real: h.pc.pcm.real1]];
   };
  IF h.sv.operand02.type = fixedPointReal THEN {
   h.pc.pcm.fixed ← h.sv.operand02.fixed;
   [] ← IPMicrocode.CALL[
    function: IPFunction.FPRToReal, entryContext: h];
   h.sv.operand02 ← [
    type: real, frameData: real[real: h.pc.pcm.real1]];
   };
  h.stackEntryPtr ← @h.sv.operand01;
  [] ← IPMicrocode.CALL[
   function: IPFunction.PreTransformIPVector, entryContext: h];
  h.imagerVars.correctMX ← h.P1.x;
  h.imagerVars.correctMY ← h.P1.y;
  h.iipData.textImagerVarChanged ← TRUE;
  }};
setCorrectTolerance => {
 h.stackEntryPtr ← @h.sv.operand01;
 [] ← IPMicrocode.CALL[
  function: IPFunction.PreTransformIPVector, entryContext: h];
 h.imagerVars.correctTX ← h.P1.x;
 h.imagerVars.correctTY ← h.P1.y;
 h.iipData.textImagerVarChanged ← TRUE;
 };
SetGray =>
 IF IPMicrocode.CALL[
  function: IPFunction.SetGray, entryContext: h].result # 0 THEN LOOP;
setSampledBlack => IF PreParserColor.SetSampledBlack[h: h].loop THEN LOOP;
shape => IF PreParserVector.Shape[h: h].loop THEN LOOP;
showAndFixedXRel =>
 IF PreParserExtra.ShowAndFixedXRel[h: h].loop THEN LOOP;
showAndXRel => IF PreParserExtra.ShowAndXRel[h: h].loop THEN LOOP;
space => {h.pc.operationStage ← 1; h.pc.pcm.action ← PreSetXRel; LOOP};
startUnderline => {
 [] ← IPMicrocode.CALL[
  function: IPFunction.PreCheckPosition, entryContext: h];
 LOOPHOLE[@h.token, LONG POINTER TO startUnderline InternalIP.Token] ↑ ← [
  startUnderline[]];
 IF IPMicrocode.CALL[
  function: IPFunction.PrePutToken, entryContext: h].result # 0 THEN {
  h.pc.pcm.savedAction ← PrePutToken; LOOP; };
 };
stop => {status ← [stopped[]]; h.pc.pcm.savedAction ← PreLoop; EXIT};
sub => IF PreParserStackOps.Sub[h: h].loop THEN LOOP;

trans => IF PreParserExtra.Trans[h: h].loop THEN LOOP;
Translate => {
 IF IPMicrocode.CALL[
  function: IPFunction.Translate, entryContext: h].result # 0 THEN LOOP;
 };
```

Copyright © 1992 Xerox Corporation All Rights Reserved

```
    trunc = > IF PreParserStackOps.Trunc[h: h].loop THEN LOOP;
    type = > IF PreParserStackOps.Type[h: h].loop THEN LOOP;

    uCodeToMesaTransition = > {h.pc.pcm.action ← h.pc.pcm.savedAction; };
    unmark = > IF PreParserStackOps.UnMark[h: h].loop THEN LOOP;
    unmark0 = > NULL;
    unrecognizedOperator = > {
     h.pc.pcm.action ← fatalError;
     h.pc.pcm.data.code ← PreParserMainErrors.unimplementedFeature;
     LOOP;
     };

    ENDCASE = > {
     h.pc.pcm.action ← fatalError;
     h.pc.pcm.data.code ← PreParserMainErrors.unexpectedError;
     LOOP;
     };
   WHILE IPMicrocode.CALL[
    function: IPFunction.PreNextAction, entryContext: h].result = 0 DO
    ENDLOOP;
   REPEAT
    unimplemented = > {
     h.errorCode ← PreParserMainErrors.unimplementedFeature;
     GOTO fatalError;
     };
   ENDLOOP;
  EXITS
   fatalError = > {
   «       IF h.pc.pcm.data.code # PreParserMainErrors.stackNotEmptyAtPageEnd THEN {
    IF PreParserFrameStack.CleanUpPage[h: h].extendZone THEN {
     status ← [needZoneExtend[
     minimumBlockSize: ParserZone.GetMinBlockSize[h: @h.pc.pcm]]];
     RETURN[status]}};
»
    PreParserExtra.SetErrorStatus[h: h]; h.errorStatus ← errors};
  };
  END;
 Initialize: PUBLIC PROCEDURE =
  BEGIN
  debug ← TRUE;
  microcodeMismatch ← FALSE;
  trace ← TRUE;
  execActions ← NIL;
  skipActions ← NIL;
  tokenSizes ← NIL;
  microcodeVersion ← 0;
  operandTablePtr ← NIL;
  operandLookupTablePtr ← NIL;
  operandConversionTablePtr ← NIL;
  END;
```

Copyright © 1992 Xerox Corporation All Rights Reserved

END.

Copyright © 1992 Xerox Corporation All Rights Reserved

```
DIRECTORY
 BlockStream USING [Block, nullBlock],
 Inline USING [LongCOPY],
 PreParser USING [PageResults],
 PreParserColor USING [DeleteNodesForPage],
 PreParserControl USING [
  Handle, PageHandle, PageListEntry, MainHandle, MainAction, MainStatus, Object,
  SIFResult],
 PreParserMainLoopControl,
 ResMgrStorage USING [BufferList];


PreParserMainLoopControlImpl: PROGRAM
 IMPORTS Inline, PreParserColor EXPORTS PreParserMainLoopControl =

 BEGIN

 Handle: PUBLIC TYPE = LONG POINTER TO PreParserControl.Object;

 Initialize: PUBLIC PROCEDURE [] RETURNS [] = {};

 SetMainLoopStatus: PUBLIC PROCEDURE [
  handle: PreParserControl.Handle,
  currentPageHandle: LONG POINTER TO PreParserControl.PageListEntry,
  status: PreParserControl.MainStatus] RETURNS [] =
  BEGIN
  sendPageZeroResults: BOOLEAN ← FALSE;
  tempResults: LONG POINTER TO PreParser.PageResults ← NIL;


  EndPageIPBlockAdjust: PROCEDURE [
   cp: PreParserControl.PageHandle, error: BOOLEAN,
   handle: PreParserControl.Handle] RETURNS [] =
   BEGIN

   IF error THEN
    BEGIN
    IF (cp.fwdLink # NIL) AND (cp.fwdLink.status # needSetup) THEN
     BEGIN
     UNTIL cp.currentIPBlock = cp.fwdLink.currentIPBlock DO
      cp.currentIPBlock.mainDone ← TRUE;
      cp.currentIPBlock ← cp.currentIPBlock.fwdLink;
      ENDLOOP;
     cp.status ← pageCompleted;
     END
    ELSE
     BEGIN
     UNTIL (cp.currentIPBlock = handle.currentManagerBlock)
      OR (cp.currentIPBlock = NIL) DO
```

Copyright © 1992 Xerox Corporation All Rights Reserved

```
      cp.currentIPBlock.mainDone ← TRUE;
      cp.currentIPBlock ← cp.currentIPBlock.fwdLink;
      ENDLOOP;
     cp.status ← slewWithErrors;
     END;
    END
   ELSE
    BEGIN
    cp.status ← pageCompleted;

    IF (cp.fwdLink # NIL) AND (cp.fwdLink.status # needSetup)
     AND (cp.currentIPBlock = cp.fwdLink.currentIPBlock) THEN
     cp.currentIPBlock.mainDone ← FALSE
    ELSE cp.currentIPBlock.mainDone ← TRUE;
    END;
   END;


 IF status.type IN [pageDone..error] AND currentPageHandle.sheetNumber # 0 THEN
  PreParserColor.DeleteNodesForPage[CARDINAL[currentPageHandle.sheetNumber]];

 WITH s: status SELECT FROM
  ready => handle.mainLoopActionNeeded ← TRUE;

  needIPBlock => {
   currentPageHandle.status ← needIPBlock;
   handle.mainLoopActionNeeded ← TRUE};

  needIIPBlock => {
   currentPageHandle.status ← needIIPBlock;
   handle.mainLoopActionNeeded ← TRUE};

  needZoneExtend => {
   currentPageHandle.status ← needZoneExtend;
   currentPageHandle.zoneBlockSize ← s.minimumBlockSize;
   handle.mainLoopActionNeeded ← TRUE};

  needInsertFileInfo => {
   currentPageHandle.status ← needInsertFileInfo;
   currentPageHandle.sifInfoDest ← s.sifResultPtr;
   handle.mainLoopActionNeeded ← TRUE};

  pageDone => {
   EndPageIPBlockAdjust[
    cp: currentPageHandle, error: s.errored, handle: handle];
   handle.mainLoopActionNeeded ← TRUE};

  stopped => {
   currentPageHandle.status ← stopped;
```

Copyright © 1992 Xerox Corporation All Rights Reserved

```
    currentPageHandle.currentIPBlock.mainDone ← TRUE;
    handle.mainLoopActionNeeded ← FALSE};

   error = > {
    handle.objectFault ← s.fault;
    currentPageHandle.mainSystemsError ← TRUE;
    EndPageIPBlockAdjust[cp: currentPageHandle, error: TRUE, handle: handle];
    handle.mainLoopActionNeeded ← FALSE};

   ENDCASE;

  END;

 SetMainLoopReturn: PUBLIC PROCEDURE [handle: PreParserControl.Handle]
  RETURNS [
   needIPBlock: BOOLEAN, needToWait: BOOLEAN,
   action: PreParserControl.MainAction, h: PreParserControl.MainHandle,
   pageHandle: LONG POINTER TO PreParserControl.PageListEntry,
   newIPBlock: BlockStream.Block, newZoneBlock: ResMgrStorage.BufferList,
   newIIPBlock: BlockStream.Block] =
  BEGIN
  pageEntry: LONG POINTER TO PreParserControl.PageListEntry ← NIL;
  tempSIFResultPtr: LONG POINTER TO PreParserControl.SIFResult ← NIL;

  needIPBlock ← FALSE;
  needToWait ← TRUE;
  action ← run;
  h ← handle.ptrToManagerContext;
  pageHandle ← NIL;
  newIPBlock ← BlockStream.nullBlock;
  newZoneBlock ← NIL;
  newIIPBlock ← BlockStream.nullBlock;

  pageEntry ← handle.pageList;
  UNTIL pageEntry = NIL DO
   IF pageEntry.status = newIIPBlock THEN
    BEGIN
    needToWait ← FALSE;
    h ← pageEntry.ptrToPageContext;
    pageHandle ← pageEntry;
    newIPBlock ← BlockStream.nullBlock;
    newZoneBlock ← NIL;
    newIIPBlock ← pageEntry.currentIIPBlock;
    RETURN;
    END;
   pageEntry ← pageEntry.fwdLink;
   ENDLOOP;

  pageEntry ← handle.pageList;
  UNTIL pageEntry = NIL DO
```

Copyright © 1992 Xerox Corporation All Rights Reserved

```
  IF pageEntry.status = zoneExtended THEN
   BEGIN
   needToWait ← FALSE;
   h ← pageEntry.ptrToPageContext;
   pageHandle ← pageEntry;
   newIPBlock ← BlockStream.nullBlock;
   newZoneBlock ← pageEntry.zoneSegListEnd;
   newIIPBlock ← BlockStream.nullBlock;
   RETURN;
   END;
  pageEntry ← pageEntry.fwdLink;
  ENDLOOP;

 pageEntry ← handle.pageList;
 UNTIL pageEntry = NIL DO
  IF pageEntry.status = needInsertFileInfo THEN
   BEGIN
   IF pageEntry.sifInfoList = NIL THEN RETURN;

   Inline.LongCOPY[
    from: LOOPHOLE[pageEntry.sifInfoList, LONG POINTER],
    nwords: SIZE[PreParserControl.SIFResult],
    to: LOOPHOLE[pageEntry.sifInfoDest, LONG POINTER]];

   IF pageEntry.freeNodeList = NIL THEN
    BEGIN
    pageEntry.freeNodeList ← pageEntry.sifInfoList;
    pageEntry.sifInfoList ← pageEntry.sifInfoList.next;
    pageEntry.freeNodeList.next ← NIL;
    END
   ELSE
    BEGIN
    tempSIFResultPtr ← pageEntry.freeNodeList;
    UNTIL tempSIFResultPtr.next = NIL DO
     tempSIFResultPtr ← tempSIFResultPtr.next; ENDLOOP;
    tempSIFResultPtr.next ← pageEntry.sifInfoList;

    pageEntry.sifInfoList ← pageEntry.sifInfoList.next;

    tempSIFResultPtr.next.next ← NIL;
    END;

   pageEntry.sifInfoDest ← NIL;

   pageEntry.status ← inProcess;

   needToWait ← FALSE;
   h ← pageEntry.ptrToPageContext;
   pageHandle ← pageEntry;
   newIPBlock ← BlockStream.nullBlock;
```

Copyright © 1992 Xerox Corporation All Rights Reserved

```
    newZoneBlock ← NIL;
    newIIPBlock ← BlockStream.nullBlock;
    RETURN;
    END;
   pageEntry ← pageEntry.fwdLink;
   ENDLOOP;

  pageEntry ← handle.pageList;
  UNTIL pageEntry = NIL DO
   IF pageEntry.status = needIPBlock THEN
    BEGIN
    IF pageEntry.currentIPBlock.fwdLink # NIL
     AND pageEntry.currentIPBlock.fwdLink.status = atPreParser
     AND
      (NOT pageEntry.currentIPBlock.fwdLink.mainDone
       OR NOT pageEntry.currentIPBlock.fwdLink.mgrDone) THEN
     BEGIN
     pageEntry.currentIPBlock.mainDone ← TRUE;

     pageEntry.currentIPBlock ← pageEntry.currentIPBlock.fwdLink;

     pageEntry.currentIPBlock.mainDone ← FALSE;

     pageEntry.status ← inProcess;

     needIPBlock ← TRUE;
     needToWait ← FALSE;
     h ← pageEntry.ptrToPageContext;
     pageHandle ← pageEntry;
     newIPBlock ← pageEntry.currentIPBlock.block;
     newZoneBlock ← NIL;
     newIIPBlock ← BlockStream.nullBlock;

     RETURN;
     END
    ELSE RETURN;
    END;
   pageEntry ← pageEntry.fwdLink;
   ENDLOOP;

  pageEntry ← handle.pageList;
  UNTIL pageEntry = NIL DO
   IF pageEntry.status = ready THEN
    BEGIN
    pageEntry.status ← inProcess;

    needToWait ← FALSE;
    h ← pageEntry.ptrToPageContext;
    pageHandle ← pageEntry;
    newIPBlock ← pageEntry.currentIPBlock.block;
```

Copyright © 1992 Xerox Corporation All Rights Reserved

```
    newIPBlock.startIndex ← pageEntry.pageStartOffset;
    newZoneBlock ← NIL;
    newIIPBlock ← pageEntry.currentIIPBlock;

    newIPBlock.startIndex ← pageEntry.pageStartOffset;

    RETURN;
    END;
   pageEntry ← pageEntry.fwdLink;
   ENDLOOP;
  END;
 END.
```

Copyright © 1992 Xerox Corporation All Rights Reserved

```
DIRECTORY
 BlockStream USING [Block, nullBlock, StreamHandle],
 ByteBlt USING [ByteBlt],
 CoalescerTable USING [BitMapEntryLinkHandle, UnknownFontEntryLinkHandle],
 DirectoryID USING [nullObjectID],
 EventLogger USING [Log],
 FaultLogger USING [nullLogID],
 FileFinder USING [Directory, FindSIF, Status],
 Heap USING [Error],
 IIPFragMgr USING [Error],
 IIPFragMgrInternal USING [DiskErrors, IntErrors],
 IIPFragMgrPrivate USING [InstallFrag],
 Image USING [Box],
 Inline USING [BITSHIFT],
 PreParser USING [
  JobProceedDataPtr, JobResults, OptionsPtr, OptionType, OptionPtr, Option,
  PageResultsPtr, PageResults, ResultsErrorStatus],
 PreParserCallBack USING [
  ClearResourceFault, ObjectFault, Problem, ReportObjectFault, Severity,
  SoftwareProblem],
 PreParserCommon USING [MainHandle],
 PreParserControl USING [
  CardinalBlock, Handle, IPBlockHandle, IPBlockListEntry, LogProc, MainHandle,
  MainStatus, ManagerAction, ManagerStatus, NotifyManagerReady, Object,
  PageEntryStatus, PageListEntry, PageHandle, ProcessorSchedulingAction,
  SetState, SIFDataType, SIFResult, SIFStatusType, SIFResultPtr],
 PreParserInstance USING [ProcessorScheduling],
 PreParserMain USING [
  CleanUpContext, DoTokenLoop, FreeNode, InitContext, InitMedia],
 PreParserManager USING [DoProcessorScheduling],
 PreParserSetup USING [nominalIIPBlockSize, SetupPreParser],
 RasterDirectorySupervisor USING [Error, GetIDFromName, GetRESInfo],
 ResMgr USING [Error, FreeBufferList],
 ResMgrIDs USING [ModuleID, TransactionID],
 ResMgrStorage USING [BufferList, Pages],
 String USING [Equal, UpperCase];

PreParserManagerImpl: MONITOR
 IMPORTS
  ByteBlt, EventLogger, FileFinder, Heap, IIPFragMgr, IIPFragMgrInternal,
  IIPFragMgrPrivate, Inline, PreParserCallBack, PreParserControl,
  PreParserInstance, PreParserMain, PreParserManager, PreParserSetup,
  RasterDirectorySupervisor, ResMgr, String
 EXPORTS PreParserManager =

 BEGIN

 FolderType: TYPE = {img, res, lgo, xcs, lib, spl, seq, frm, fnt, unknown};
```

Copyright © 1992 Xerox Corporation All Rights Reserved

```
Handle: TYPE = LONG POINTER TO PreParserControl.Object;
IPBlockHandle: TYPE = LONG POINTER TO IPBlockContext;
IPBlockContext: PUBLIC TYPE = PreParserControl.IPBlockListEntry;
PageHandle: TYPE = LONG POINTER TO PreParserControl.PageListEntry;
PageContext: PUBLIC TYPE = PreParserControl.PageListEntry;

endPreParse: CARDINAL = 152;


Initialize: PUBLIC PROCEDURE [] RETURNS [] = {};

DoManager: PUBLIC PROCEDURE [handle: Handle] RETURNS [] =
 BEGIN

 ENABLE ABORTED => CONTINUE;

 char: CHARACTER;
 charCount: CARDINAL ← 0;
 currentPage: PageHandle ← NIL;
 fileName: LONG STRING;
 fileNameLength: CARDINAL ← 0;
 folder: LONG STRING;
 folderLength: CARDINAL ← 0;
 folderName: LONG STRING ← [4];
 folderType: FolderType;
 fragError: BOOLEAN ← FALSE;
 handleMain: PreParserCommon.MainHandle ← NIL;
 initError: BOOLEAN;
 insertFileResultPtr: PreParserControl.SIFResultPtr;
 mainHandle: PreParserControl.MainHandle;
 managerAction: PreParserControl.ManagerAction;
 managerStatus: PreParserControl.ManagerStatus;
 newIPBlock, newIIPBlock: BlockStream.Block;
 s: LONG CARDINAL;
 sh: BlockStream.StreamHandle;
 sifData: PreParserControl.CardinalBlock;
 slashIndex, scanStop, i: CARDINAL;
 smZone: UNCOUNTED ZONE;
 status: PreParserControl.ManagerStatus ← [null[]];
 tempBuffer, tempBufferList, newZoneBlock: ResMgrStorage.BufferList;
 testString: LONG STRING ← [4];
 theOption: PreParser.OptionPtr ← NIL;
 tokenLoopStatus: PreParserControl.MainStatus;

 IIPFragMgrError: PROCEDURE [objectFault: PreParserCallBack.ObjectFault]
  RETURNS [] =
  BEGIN
  IF NOT currentPage.mainSystemsError THEN {
   objectFault.severity ← systemError;
   objectFault.side ← currentPage.side;
```

Copyright © 1992 Xerox Corporation All Rights Reserved

```
    objectFault.sheetNumber ← currentPage.sheetNumber;
    objectFault.copyNumber ← 1};

   IF currentPage.iipBlockStream # NIL THEN fragError ← TRUE;
   managerStatus ← [error[fault: objectFault, ph: currentPage]];
   END;

  managerStatus ← [ready[]];

  DO
   ENABLE {

    IIPFragMgr.Error = > {
     IF NOT currentPage.mainSystemsError THEN {
      SELECT code FROM
       allocError, invalidHandle, noResources, other, wrongBlock = >
        handle.objectFault.problem ← [
         unrecoverableSWProblemWithCode[
         swError: iipFragMgrError, code: ORD[code]]];
       ENDCASE = > REJECT};
     IIPFragMgrError[handle.objectFault];
     RETRY};
    IIPFragMgrInternal.IntErrors = > {
     IF NOT currentPage.mainSystemsError THEN {
      SELECT code FROM
       tooManyFragFiles = > {
        handle.objectFault.problem ← [
         printerLimitExceeded[
         problem: tooManyFragFiles, code: 0,
         id: FaultLogger.nullLogID]]};
       tooManyFrags = > {
        handle.objectFault.problem ← [
         printerLimitExceeded[
         problem: tooManyFrags, code: 0, id: FaultLogger.nullLogID]]};
       ENDCASE = > REJECT};
     IF currentPage.pageResultsPtr # NIL THEN
      currentPage.pageResultsPtr.iipFragID ← DirectoryID.nullObjectID;
     IIPFragMgrError[handle.objectFault];
     RETRY};

    IIPFragMgrInternal.DiskErrors = > {
     IF NOT currentPage.mainSystemsError THEN {
      WITH error: error SELECT FROM
       rtosFileError = > {
        handle.objectFault.problem ← [
         printerLimitExceeded[
         problem: rtosFileError, code: ORD[error.errorType],
         id: error.faultID]];
        handle.objectFault.functionFault ← TRUE};
       rmError = > {
```

Copyright © 1992 Xerox Corporation All Rights Reserved

```
      handle.objectFault.problem ← [
       printerLimitExceeded[
       problem: resMgrError, code: ORD[error.code],
       id: error.faultID]];
      handle.objectFault.functionFault ← TRUE};
     ENDCASE => REJECT};
   IIPFragMgrError[handle.objectFault];
   RETRY}};
 IF fragError THEN {
  sh ← currentPage.iipBlockStream;
  IF currentPage.currentIIPBlock # BlockStream.nullBlock THEN
   sh.return[
    sH: sh, block: currentPage.currentIIPBlock !
    IIPFragMgr.Error => CONTINUE];
  sh.setAbort[sH: sh ! IIPFragMgr.Error => CONTINUE];
  currentPage.currentIIPBlock ← BlockStream.nullBlock;
  fragError ← FALSE};

 managerAction ← PreParserControl.NotifyManagerReady[
  handle: handle, status: managerStatus];


 PreParserControl.LogProc[
  h: handle, rec: {var: mgrAction[mgrA: managerAction]}];

 WITH ma: managerAction SELECT FROM
  parseBlock => {
   mainHandle ← ma.mainHandle;
   newZoneBlock ← ma.newZoneBlock;
   smZone ← ma.smZone;

   IF ma.newIPBlock = NIL THEN {newIPBlock ← BlockStream.nullBlock}
   ELSE {newIPBlock ← ma.newIPBlock.block};
   newIIPBlock ← BlockStream.nullBlock;

   tokenLoopStatus ← PreParserMain.DoTokenLoop[
    mainHandle: mainHandle, newZoneBlock: newZoneBlock, smZone: smZone,
    newIPBlock: newIPBlock, newIIPBlock: newIIPBlock];

   WITH tls: tokenLoopStatus SELECT FROM
    startResults => managerStatus ← [startResults[tls.startResultsPtr]];
    needIPBlock => managerStatus ← [needIPBlock[tls.betweenPages]];
    needZoneExtend =>
     managerStatus ← [
      needZoneExtend[minimumBlockSize: tls.minimumBlockSize]];
    error => managerStatus ← [error[fault: tls.fault, ph: NIL]];
    pageFound => {
     managerStatus ← [
      pageFound[
      byteOffset: tls.byteOffset, frame: tls.frame,
```

Copyright © 1992 Xerox Corporation All Rights Reserved

```
  logicalPageNumber: tls.logicalPageNumber,
  mediaIndex: tls.mediaIndex, sheetNumber: tls.sheetNumber,
  plex: tls.plex, side: tls.side, tFormIndex: tls.tFormIndex]];
 };
insertFileFound => {
 sifData ← tls.bounds;

 folderName.length ← 0;
 slashIndex ← sifData.startIndex;

 IF (sifData.stopIndexPlusOne - sifData.startIndex) < 4 THEN {
  scanStop ← sifData.stopIndexPlusOne - sifData.startIndex}
 ELSE {scanStop ← sifData.startIndex + 3};

 FOR i IN [sifData.startIndex..scanStop] DO
  char ← VAL[sifData.blockPointer[i]];
  IF char = '/ OR char = '> THEN {slashIndex ← i; EXIT};
  char ← String.UpperCase[char];
  folderName[folderName.length] ← char;
  folderName.length ← folderName.length + 1;
  ENDLOOP;

 testString ← "LGO"L;
 IF String.Equal[s1: folderName, s2: testString] THEN {
  folderType ← lgo; GOTO foundIt};
 testString ← "IMG"L;
 IF String.Equal[s1: folderName, s2: testString] THEN {
  folderType ← img; GOTO foundIt};
 testString ← "LIB"L;
 IF String.Equal[s1: folderName, s2: testString] THEN {
  folderType ← lib; GOTO foundIt};
 testString ← "FRM"L;
 IF String.Equal[s1: folderName, s2: testString] THEN {
  folderType ← frm; GOTO foundIt};
 testString ← "FNT"L;
 IF String.Equal[s1: folderName, s2: testString] THEN {
  folderType ← fnt; GOTO foundIt};

 folderType ← unknown;
 GOTO foundIt;

 EXITS
  foundIt => {
   s ← SIZE[PreParserControl.SIFResult];
   s ← s + SIZE[StringBody];
   s ←
    s + LOOPHOLE[Inline.BITSHIFT[
     value: (sifData.stopIndexPlusOne - sifData.startIndex + 1),
     count: -1], CARDINAL];
   managerStatus ← [needSIFNode[nodeSizeInWords: s]]};
```

Copyright © 1992 Xerox Corporation All Rights Reserved

```
  };
 stopped => managerStatus ← [stopped[]];
 endJobFound => managerStatus ← [endOfJobFound[]];
 needIIPBlock => {
  token: CARDINAL;
  handleMain ← LOOPHOLE[handle.ptrToManagerContext,
   PreParserCommon.MainHandle];
  WITH type: handleMain.pc.tokenOverlay.token SELECT FROM
   shortOperator => token ← ORD[type.shortOperator];
   longOperator => token ← ORD[type.longOperator];
   ENDCASE;
  managerStatus ← [
   error[
   fault: [
   problem: [
   masterProblemWithCode[
   problem: outputOperatorNotAllowed, subCode: token]],
   severity: masterError, functionFault: FALSE,
   side: handleMain.side, sheetNumber: handleMain.sheetNumber,
   copyNumber: 1], ph: NIL]]};
 ENDCASE => {
  handleMain ← LOOPHOLE[handle.ptrToManagerContext,
   PreParserCommon.MainHandle];
  managerStatus ← [
   error[
   fault: [
   problem: [
   unrecoverableSWProblemWithCode[
   swError: unexpectedIPFunction,
   code: handleMain.pc.pcm.data.code]], severity: systemError,
   functionFault: FALSE, side: handleMain.side,
   sheetNumber: handleMain.sheetNumber, copyNumber: 1], ph: NIL]]};
 };

setMedia =>
 BEGIN
 IF handle.state = settingMedia THEN {
  initError ← PreParserMain.InitMedia[
   mainHandle: handle.ptrToManagerContext,
   jobMediaDataPtr: handle.jobMediaDataPtr];
  IF initError THEN
   BEGIN
   handle.objectFault.problem ← [
    unrecoverableSoftwareProblem[pageInitError]];
   handle.objectFault.severity ← systemError;
   handle.objectFault.side ← simplex;
   handle.objectFault.sheetNumber ← 0;
   handle.objectFault.copyNumber ← 0;

   managerStatus ← [error[fault: handle.objectFault, ph: NIL]];
```

Copyright © 1992 Xerox Corporation All Rights Reserved

```
  LOOP;
  END;

 theOption ← handle.printingInstructionsPtr.instructions.first;
 UNTIL theOption = NIL DO
  IF theOption.optionType = copySelect THEN
   handle.copyCount ← theOption.copySelect ↑ [0];
  IF theOption.optionType = media THEN
   BEGIN handle.mediaCount ← theOption.media.LENGTH; END;
  theOption ← theOption.next;
  ENDLOOP;

 LOOPHOLE[handle.ptrToManagerContext,
  PreParserCommon.MainHandle].plexMode ←
  handle.printingInstructionsPtr.instructions.offsets[plex].plex;
 LOOPHOLE[handle.ptrToManagerContext, PreParserCommon.MainHandle].plex
  ← handle.printingInstructionsPtr.instructions.offsets[plex].plex;
 LOOPHOLE[handle.ptrToManagerContext, PreParserCommon.MainHandle].side
  ← handle.printingInstructionsPtr.instructions.offsets[plex].plex;

 handle.jobResultsPtr ← handle.smZone.NEW[
  PreParser.JobResults[handle.mediaCount]];
 handle.jobResultsPtr.errorStatus ← ok;
 handle.jobResultsPtr.pageVariations.plexMayChange ← FALSE;
 handle.jobResultsPtr.pageVariations.mediaMayChange ← FALSE;
 handle.jobResultsPtr.pageVariations.onSimplexMayChange ← FALSE;
 handle.jobResultsPtr.pageVariations.copySelectMayChange ← FALSE;
 handle.jobResultsPtr.pageVariations.pageSelectMayChange ← FALSE;
 handle.jobResultsPtr.pageVariations.copiesMayVary ← FALSE;
 FOR i IN [0..handle.mediaCount) DO
  handle.jobResultsPtr.mediaUses[i] ← FALSE; ENDLOOP;

 managerStatus ← [mediaSet[]]};
END;

processSIF =>
 BEGIN
 insertFileResultPtr ← ma.nodePtr;
 folder ← NIL;
 folderLength ← 0;
 fileName ← NIL;
 fileNameLength ← 0;
 charCount ← 0;

 slashIndex ← slashIndex + 1;
 FOR i IN [slashIndex..sifData.stopIndexPlusOne) DO
  charCount ← charCount + 1;
  IF folderLength = 0 THEN {
   char ← VAL[sifData.blockPointer[i]];
   IF char = '/ OR char = '> THEN {
```

Copyright © 1992 Xerox Corporation All Rights Reserved

```
      folderLength ← charCount - 1; charCount ← 0}};
    ENDLOOP;
  fileNameLength ← charCount;

  IF folderLength # 0 THEN {
    folder ←
      LOOPHOLE[insertFileResultPtr + SIZE[PreParserControl.SIFResult],
      LONG POINTER];
    folder ↑ ← [length: folderLength, maxlength: folderLength, text:];
    [] ← ByteBlt.ByteBlt[
      from: [
      LOOPHOLE[sifData.blockPointer, LONG POINTER], slashIndex,
      (sifData.stopIndexPlusOne - fileNameLength)],
      to: [LOOPHOLE[@folder.text, LONG POINTER], 0, folder.length],
      overLap: ripple]};

  IF folderLength # 0 THEN folderLength ← folderLength + 1;
  fileName ←
    LOOPHOLE[insertFileResultPtr + SIZE[PreParserControl.SIFResult] +
          folderLength, LONG POINTER];
  fileName ↑ ← [length: fileNameLength, maxlength: fileNameLength, text:];
  [] ← ByteBlt.ByteBlt[
    from: [
    LOOPHOLE[sifData.blockPointer, LONG POINTER],
    (slashIndex + folderLength), sifData.stopIndexPlusOne],
    to: [LOOPHOLE[@fileName.text, LONG POINTER], 0, fileName.length],
    overLap: ripple];

  SELECT folderType FROM
    img =>
      BEGIN
      insertFileResultPtr ↑ ← [
        next: NIL,
        zoneRecPtr: @LOOPHOLE[handle.ptrToManagerContext,
        PreParserCommon.MainHandle].zone,
        objectID: DirectoryID.nullObjectID, status: found, var: RES[]];

      insertFileResultPtr.objectID ←
        RasterDirectorySupervisor.GetIDFromName[
        name: fileName !
        RasterDirectorySupervisor.Error =>
          BEGIN insertFileResultPtr.status ← notFound; CONTINUE; END];
      IF insertFileResultPtr.status = found THEN
        BEGIN
        WITH ifr: insertFileResultPtr SELECT FROM
          RES =>
            BEGIN
            RasterDirectorySupervisor.GetRESInfo[
              id: ifr.objectID, resInfoPtr: @ifr.RESInfo !
              RasterDirectorySupervisor.Error =>
```

Copyright © 1992 Xerox Corporation All Rights Reserved

```
      BEGIN ifr.status ← notFound; CONTINUE; END];
     END;
    ENDCASE;
   END;
  END;

 lib =>
  BEGIN
  insertFileResultPtr↑ ← [
   next: NIL,
   zoneRecPtr: @LOOPHOLE[handle.ptrToManagerContext,
   PreParserCommon.MainHandle].zone,
   objectID: DirectoryID.nullObjectID, status: found, var: ILF[]];
  END;

 frm =>
  BEGIN
  insertFileResultPtr↑ ← [
   next: NIL,
   zoneRecPtr: @LOOPHOLE[handle.ptrToManagerContext,
   PreParserCommon.MainHandle].zone,
   objectID: DirectoryID.nullObjectID, status: found, var: form[]];
  END;
 lgo =>
  BEGIN
  fileFinderStatus: FileFinder.Status ← notFound;

  insertFileResultPtr↑ ← [
   next: NIL,
   zoneRecPtr: @LOOPHOLE[handle.ptrToManagerContext,
   PreParserCommon.MainHandle].zone,
   objectID: DirectoryID.nullObjectID, status: found, var: LGO[]];


  [fileFinderStatus, insertFileResultPtr.objectID] ←
   FileFinder.FindSIF[
   name: fileName, folder: folder,
   directory: LOOPHOLE[folderType, FileFinder.Directory]];

  SELECT fileFinderStatus FROM
   notFound => insertFileResultPtr.status ← notFound;
   noAccess => insertFileResultPtr.status ← noAccess;
   ENDCASE => insertFileResultPtr.status ← found;



  IF insertFileResultPtr.status = found THEN
   BEGIN
   WITH ifr: insertFileResultPtr SELECT FROM
    LGO =>
```

Copyright © 1992 Xerox Corporation All Rights Reserved

```
      BEGIN
      RasterDirectorySupervisor.GetRESInfo[
       id: ifr.objectID, resInfoPtr: @ifr.RESInfo !
       RasterDirectorySupervisor.Error =>
        BEGIN ifr.status ← notFound; CONTINUE; END];
      END;
     ENDCASE;
    END;
   END;
  fnt =>
   BEGIN
   insertFileResultPtr↑ ←[
    next: NIL,
    zoneRecPtr: @LOOPHOLE[handle.ptrToManagerContext,
    PreParserCommon.MainHandle].zone,
    objectID: DirectoryID.nullObjectID, status: found, var: font[]];
   END;
  unknown => BEGIN insertFileResultPtr.status ← noSuchDirectory; END;
  ENDCASE;

 managerStatus ← [insertFileInfo[sifResultPtr: insertFileResultPtr]];
 END;

pageSetup =>
 BEGIN
 currentPage ← ma.ph;
 tempBuffer ← NIL;
 tempBufferList ← NIL;
 initError ← FALSE;

 initError ← PreParserMain.InitContext[
  currentPageHandle: currentPage, execute: TRUE,
  initialFrame: currentPage.frame,
  initialZoneBlock: currentPage.zoneSegListEnd, handle: handle,
  jobMediaDataPtr: handle.jobMediaDataPtr,
  logicalPageNumber: currentPage.logicalPageNumber,
  mainHandle: currentPage.ptrToPageContext,
  mediaIndex: currentPage.mediaIndex, plex: currentPage.plex,
  proceedDataPtr: handle.jobProceedDataPtr,
  sheetNumber: currentPage.sheetNumber, side: currentPage.side,
  tFormIndex: currentPage.tFormIndex];
 IF initError THEN
  BEGIN
  handle.objectFault.severity ← systemError;
  handle.objectFault.side ← currentPage.side;
  handle.objectFault.sheetNumber ← currentPage.sheetNumber;
  handle.objectFault.copyNumber ← 1;

  PreParserCallBack.ReportObjectFault[
   context: handle.jobProceedDataPtr.clientContext,
```

Copyright © 1992 Xerox Corporation All Rights Reserved

```
    objectFault: handle.objectFault];

   managerStatus ← [error[fault: handle.objectFault, ph: currentPage]];
   LOOP;
   END;

  currentPage.iipBlockStream ← NIL;
  currentPage.iipBlockStream ← IIPFragMgrPrivate.InstallFrag[
   h: LOOPHOLE[handle.jobProceedDataPtr.fragMgrHandle]];

  sh ← currentPage.iipBlockStream;
  currentPage.currentIIPBlock ← sh.acquire[
   sH: sh, length: PreParserSetup.nominalIIPBlockSize];

  handle.jobResultsPtr.mediaUses[currentPage.mediaIndex] ← TRUE;
  managerStatus ← [pageSetupDone[ph: currentPage]];
  END;

 getIIPBlock = >
  BEGIN
  currentPage ← ma.ph;

  currentPage.firstIIPBlock ← FALSE;
  sh ← currentPage.iipBlockStream;
  sh.transmit[sH: sh, block: currentPage.currentIIPBlock];

  currentPage.currentIIPBlock ← sh.acquire[
   sH: sh, length: PreParserSetup.nominalIIPBlockSize];

  managerStatus ← [newIIPBlock[ph: currentPage]];
  END;

 extendJobZone = > BEGIN ERROR; END;

 extendPageZone = > BEGIN ERROR; END;

 releasePage = >
  BEGIN
  currentPage ← ma.ph;
  handleMain ← LOOPHOLE[currentPage.ptrToPageContext,
   PreParserCommon.MainHandle];
  currentPage.pageResultsPtr ← handleMain.pageResultsPtr;

  PreParserMain.CleanUpContext[
   currentPage: currentPage, mainHandle: handleMain,
   pageResultsPtr: currentPage.pageResultsPtr];

  IF currentPage.mainSystemsError THEN
   managerStatus ← [error[fault: handle.objectFault, ph: currentPage]]
  ELSE managerStatus ← [pageReleased[ph: currentPage]];
```

Copyright © 1992 Xerox Corporation All Rights Reserved

```
    END;

   cleanupJob => BEGIN managerStatus ← [jobCleanupDone[]]; END;

   init => managerStatus ← PreParserSetup.SetupPreParser[handle: handle];

   abort => managerStatus ← [abortStarted[]];

   suspend => managerStatus ← [suspended[]];

   ENDCASE => ERROR;

  ENDLOOP;

 END;

DoProcessorScheduling: PUBLIC ENTRY PROCEDURE [
 parserList: PreParserControl.Handle, handle: PreParserControl.Handle,
 action: PreParserControl.ProcessorSchedulingAction] RETURNS [] =
 BEGIN
 UNTIL parserList = NIL DO
  IF parserList # handle THEN {IF parserList.state # idle THEN RETURN};
  parserList ← parserList.fwdLink;
  ENDLOOP;
 IF handle.processorList.directMainLoop THEN {
  PreParserInstance.ProcessorScheduling[handle: handle, action: action]};
 END;
PutPreParserCommand: PUBLIC PROCEDURE [
 parserList: PreParserControl.Handle, h: PreParserControl.Handle] RETURNS [] =
 BEGIN
 pageEntry: LONG POINTER TO PreParserControl.PageListEntry ← NIL;

 WITH c: h.command SELECT FROM
  abort =>
   BEGIN
   h.state ← aborting;
   h.newCommand ← TRUE;

   IF h.ptrToManagerContext # NIL THEN
    LOOPHOLE[h.ptrToManagerContext,
     PreParserCommon.MainHandle].stopRequested ← TRUE;

   pageEntry ← h.pageList;
   UNTIL pageEntry = NIL DO
    IF pageEntry.ptrToPageContext # NIL THEN
     LOOPHOLE[pageEntry.ptrToPageContext,
      PreParserCommon.MainHandle].stopRequested ← TRUE;
    pageEntry ← pageEntry.fwdLink;
    ENDLOOP;
   END;
```

Copyright © 1992 Xerox Corporation All Rights Reserved

```
  proceedWithJob =>
   BEGIN
   h.jobProceedDataPtr ← c.proceedRecord;
   h.smZone ← c.proceedRecord.zone;
   h.printingInstructionsPtr ← NIL;
   h.jobMediaDataPtr ← NIL;
   h.jobResultsPtr ← NIL;
   h.copyCount ← 0;
   h.mediaCount ← 0;
   h.state ← starting;
   h.eofSet ← FALSE;
   h.objectFault.problem ← [null[]];
   h.objectFault.severity ← systemError;
   h.objectFault.side ← simplex;
   h.objectFault.sheetNumber ← 0;
   h.objectFault.copyNumber ← 1;
   h.jobErrorState ← ok;
   h.streamDeleted ← FALSE;
   h.nextPageSheetNumber ← 0;

   PreParserManager.DoProcessorScheduling[
    parserList: parserList, handle: h, action: restrict];
   END;

  mediaReady =>
   BEGIN
   h.jobMediaDataPtr ← c.mediaRecord;
   h.newCommand ← TRUE;
   h.state ← settingMedia;
   END;

  proceedFromSuspend =>
   BEGIN h.state ← proceedingFromSuspend; h.newCommand ← TRUE; END;

  suspend => NULL;

  ENDCASE;

 PreParserControl.LogProc[h: h, rec: [var: state[pState: h.state]]];
 END;
ReportPreParserStatus: PUBLIC PROCEDURE [h: PreParserControl.Handle]
 RETURNS [] =
 BEGIN

 SELECT h.state FROM
  starting =>
   BEGIN
   h.parserStatus ← [preParserReady[ipData: h.ipStreamHandle]];
   h.state ← parsingPrintingInstructions;
```

Copyright © 1992 Xerox Corporation All Rights Reserved

```
   END;
  parsingPrintingInstructions =>
   BEGIN
   h.parserStatus ← [
    preParserStartCompleted[printInstrs: h.printingInstructionsPtr]];
   h.state ← waitingForMediaReady;
   END;
  settingMedia =>
   BEGIN h.parserStatus ← [preParserResumed[]]; h.state ← proceeding; END;
  proceeding =>
   BEGIN
   h.parserStatus ← [preParserCompleted[h.jobResultsPtr]];
   h.state ← idle;
   END;
  suspendingForResources =>
   BEGIN h.parserStatus ← [preParserSuspended[reason: resources]]; END;
  suspendingForPreParserFatalError =>
   BEGIN
   h.parserStatus ← [preParserSuspended[reason: fatalErrorPreParser]];
   END;
  suspendingForPreParserDiskSaturation =>
   BEGIN
   h.parserStatus ← [preParserSuspended[reason: diskFullPreParser]];
   END;
  proceedingFromSuspend =>
   BEGIN h.parserStatus ← [preParserResumed[]]; h.state ← proceeding; END;
  aborting =>
   BEGIN h.parserStatus ← [preParserAborted[]]; h.state ← idle; END;
  ENDCASE;


 PreParserControl.LogProc[h: h, rec: [var: state[pState: h.state]]];

 h.jobProceedDataPtr.statusProc[
  clientContext: h.jobProceedDataPtr.clientContext, status: h.parserStatus];

 END;
SetManagerStatus: PUBLIC PROCEDURE [
 handle: PreParserControl.Handle, status: PreParserControl.ManagerStatus]
 RETURNS [
  notifyMainLoop: BOOLEAN ← FALSE, notifyStreamAquire: BOOLEAN ← FALSE] =
 BEGIN
 pageEntry: LONG POINTER TO PreParserControl.PageListEntry;
 needToWait, initError, extendZone: BOOLEAN ← FALSE;
 nodePtr: LONG POINTER ← NIL;
 tempSIFResultPtr: LONG POINTER TO PreParserControl.SIFResult;
 tempResults: LONG POINTER TO PreParser.PageResults ← NIL;

 WITH s: status SELECT FROM
  ready => handle.managerActionNeeded ← TRUE;
```

Copyright © 1992 Xerox Corporation All Rights Reserved

```
initialized =>
 BEGIN
 notifyStreamAquire ← TRUE;

 ReportPreParserStatus[h: handle];

 handle.managerActionNeeded ← TRUE;
 END;

needIPBlock =>
 BEGIN
 handle.managerBlockStatus ← needIPBlock;

 handle.managerBetweenPages ← s.betweenPages;

 handle.managerActionNeeded ← TRUE;
 END;

startResults =>
 BEGIN
 handle.printingInstructionsPtr ← s.startResultsPtr;

 ReportPreParserStatus[h: handle];

 handle.managerActionNeeded ← FALSE;
 END;

mediaSet =>
 BEGIN

 ReportPreParserStatus[h: handle];

 handle.managerActionNeeded ← TRUE;
 END;

needZoneExtend =>
 BEGIN
 handle.needZoneExtend ← TRUE;
 handle.jobZoneBlockSize ← s.minimumBlockSize;

 handle.managerActionNeeded ← TRUE;
 END;

needSIFNode =>
 BEGIN
 handle.managerBlockStatus ← sif;
 handle.sifNodeSizeInWords ← s.nodeSizeInWords;

 handle.managerActionNeeded ← TRUE;
```

Copyright © 1992 Xerox Corporation All Rights Reserved

```
END;

pageFound =>
 BEGIN
 handle.nextPageIPBlock ← handle.currentManagerBlock;
 handle.nextPageOffset ← s.byteOffset;
 handle.nextPageFrame ← s.frame;
 handle.nextPageMediaIndex ← s.mediaIndex;
 handle.nextLogicalPageNumber ← s.logicalPageNumber;
 handle.nextPagePlex ← s.plex;
 handle.nextPageSide ← s.side;
 handle.nextPageSheetNumber ← s.sheetNumber;
 handle.nextPageTFormIndex ← s.tFormIndex;

 handle.managerActionNeeded ← TRUE;
 END;

pageSetupDone =>
 BEGIN
 pageEntry ← s.ph;

 pageEntry.status ← ready;
 handle.currentManagerPage ← pageEntry;

 handle.currentManagerBlock.mainDone ← FALSE;

 IF handle.state = proceeding THEN BEGIN notifyMainLoop ← TRUE; END;
 handle.managerActionNeeded ← TRUE;
 END;

insertFileInfo =>
 BEGIN
 IF handle.currentManagerPage.sifInfoList = NIL THEN
  BEGIN handle.currentManagerPage.sifInfoList ← s.sifResultPtr; END
 ELSE
  BEGIN
  tempSIFResultPtr ← handle.currentManagerPage.sifInfoList;
  UNTIL tempSIFResultPtr.next = NIL DO
   tempSIFResultPtr ← tempSIFResultPtr.next; ENDLOOP;
  tempSIFResultPtr.next ← s.sifResultPtr;
  END;

 IF handle.state = proceeding THEN BEGIN notifyMainLoop ← TRUE; END;
 handle.managerActionNeeded ← TRUE;
 END;

newIIPBlock =>
 BEGIN
 pageEntry ← s.ph;
```

Copyright © 1992 Xerox Corporation All Rights Reserved

```
  pageEntry.status ← newIIPBlock;

  IF handle.state = proceeding OR handle.state = aborting THEN
   BEGIN notifyMainLoop ← TRUE; END;

  handle.managerActionNeeded ← TRUE;
  END;

 jobZoneExtended = > ERROR;
 pageZoneExtended = > ERROR;
 pageReleased = >
  BEGIN
  pageEntry ← s.ph;
  handle.jobErrorState ← LOOPHOLE[MAX[
   ORD[handle.jobErrorState], ORD[pageEntry.pageResultsPtr.errorStatus]]];

  handle.jobProceedDataPtr.statusProc[
   clientContext: handle.jobProceedDataPtr.clientContext,
   status: [preParserPageCompleted[pageEntry.pageResultsPtr]]];

  ResetPageEntry[handle: handle, pageEntry: pageEntry];

  handle.managerActionNeeded ← TRUE;
  END;

 endOfJobFound = > {
  handle.managerBlockStatus ← eoj; handle.managerActionNeeded ← TRUE; };

 jobCleanupDone = > {
  ReportPreParserStatus[h: handle];
  EventLogger.Log[event: endPreParse];
  handle.managerActionNeeded ← FALSE;
  };

 stopped = > {};
 error = >
  BEGIN
  IF handle.state # aborting THEN
   BEGIN
   handle.objectFault ← s.fault;
   pageEntry ← s.ph;

   IF handle.state = parsingPrintingInstructions
    OR handle.state = settingMedia THEN {
    tempResults ← handle.smZone.NEW[
     PreParser.PageResults !
     Heap.Error, ResMgr.Error = > {tempResults ← NIL; CONTINUE}; ];
    IF tempResults # NIL THEN {
     tempResults.errorStatus ← pageZero;
     tempResults.boxCoords ← [0, 0, 0, 0];
```

Copyright © 1992 Xerox Corporation All Rights Reserved

```
  tempResults.iipFragID ← DirectoryID.nullObjectID;
  tempResults.mediaIndex ← 0;
  tempResults.copyRange.begin ← 0;
  tempResults.copyRange.end ← 0;
  tempResults.plex ← simplex;
  tempResults.side ← simplex;
  tempResults.bitMapLinks ← NIL;
  tempResults.fontLinks ← NIL};
 handle.jobProceedDataPtr.statusProc[
  clientContext: handle.jobProceedDataPtr.clientContext,
  status: [preParserPageCompleted[tempResults]]]};

WITH p: handle.objectFault.problem SELECT FROM
 printerLimitExceeded => 
  IF p.problem = insufficientDiskSpace THEN
   PreParserControl.SetState[
    handle: handle, state: suspendingForPreParserDiskSaturation]
  ELSE
   PreParserControl.SetState[
    handle: handle, state: suspendingForPreParserFatalError];
 ENDCASE =>
  PreParserControl.SetState[
   handle: handle, state: suspendingForPreParserFatalError];

PreParserCallBack.ReportObjectFault[
 context: handle.jobProceedDataPtr.clientContext,
 objectFault: handle.objectFault];

IF pageEntry # NIL AND pageEntry.mainSystemsError THEN {
 IF pageEntry.currentIIPBlock # BlockStream.nullBlock
  AND pageEntry.pageResultsPtr.iipFragID # DirectoryID.nullObjectID
  THEN
  handle.jobProceedDataPtr.statusProc[
   clientContext: handle.jobProceedDataPtr.clientContext,
   status: [preParserPageCompleted[pageEntry.pageResultsPtr]]]};

 handle.command ← [suspend[]];
 handle.newCommand ← TRUE;
 END;

IF pageEntry # NIL THEN
 ResetPageEntry[handle: handle, pageEntry: pageEntry];

handle.managerActionNeeded ← TRUE;
END;

abortStarted => {
 notifyStreamAquire ← TRUE; handle.managerActionNeeded ← TRUE; };

suspended => {
```

Copyright © 1992 Xerox Corporation All Rights Reserved

```
   ReportPreParserStatus[h: handle];
   IF handle.parserStatus.msg = preParserSuspended THEN
    handle.managerActionNeeded ← FALSE;
   };
  ENDCASE;

 END;
ResetPageEntry: PROCEDURE [
 handle: PreParserControl.Handle, pageEntry: PreParserControl.PageHandle]
 RETURNS [] =
 BEGIN
 pageTemp: PreParserControl.PageHandle;
 tempBufferList: ResMgrStorage.BufferList;
 tempSIFResultPtr: LONG POINTER TO PreParserControl.SIFResult;

 IF pageEntry.freeNodeList # NIL THEN
  BEGIN
  UNTIL pageEntry.freeNodeList = NIL DO
   tempSIFResultPtr ← pageEntry.freeNodeList;
   pageEntry.freeNodeList ← pageEntry.freeNodeList.next;
   PreParserMain.FreeNode[
    mainHandle: handle.ptrToManagerContext, nodePtr: tempSIFResultPtr];
   ENDLOOP;
  END;

 IF pageEntry.zoneSegListStart.next # NIL THEN
  BEGIN
  tempBufferList ← pageEntry.zoneSegListStart.next;
  pageEntry.zoneSegListStart.next ← NIL;

  IF tempBufferList # NIL THEN {
   ResMgr.FreeBufferList[
    id: [trans: handle.transactionID, module: preParse],
    buffer: tempBufferList ! ResMgr.Error => CONTINUE];
   tempBufferList ← NIL};

  IF handle.clearMgrResourceFault THEN
   BEGIN
   PreParserCallBack.ClearResourceFault[transID: handle.transactionID];

   handle.clearMgrResourceFault ← FALSE;
   END;

  pageEntry.zoneSegListEnd ← pageEntry.zoneSegListStart;
  END;

 IF pageEntry.fwdLink # NIL THEN
  BEGIN
  pageTemp ← handle.pageList;
  UNTIL pageTemp.fwdLink = NIL DO pageTemp ← pageTemp.fwdLink; ENDLOOP;
```

Copyright © 1992 Xerox Corporation All Rights Reserved

```
  handle.pageList ← pageEntry.fwdLink;

  pageTemp.fwdLink ← pageEntry;
  END;

 pageEntry.fwdLink ← NIL;
 pageEntry.status ← needSetup;
 pageEntry.currentIPBlock ← NIL;
 pageEntry.pageStartOffset ← 0;
 pageEntry.frame ← NIL;
 pageEntry.mainSystemsError ← FALSE;
 pageEntry.mediaIndex ← 0;
 pageEntry.pageResultsPtr ← NIL;
 pageEntry.plex ← simplex;
 pageEntry.tFormIndex ← 0;
 pageEntry.iipBlockStream ← NIL;
 pageEntry.firstIIPBlock ← TRUE;
 pageEntry.currentIIPBlock ← BlockStream.nullBlock;
 pageEntry.freeNodeList ← NIL;
 pageEntry.sifInfoList ← NIL;
 pageEntry.sifInfoDest ← NIL;
 LOOPHOLE[pageEntry.ptrToPageContext,
  PreParserCommon.MainHandle].pageResultsPtr ← NIL;
 LOOPHOLE[pageEntry.ptrToPageContext,
  PreParserCommon.MainHandle].bitMapTablePtrStart ← NIL;
 LOOPHOLE[pageEntry.ptrToPageContext,
  PreParserCommon.MainHandle].bitMapTablePtrCurrent ← NIL;
 LOOPHOLE[pageEntry.ptrToPageContext,
  PreParserCommon.MainHandle].unknownFontTablePtrStart ← NIL;
 LOOPHOLE[pageEntry.ptrToPageContext,
  PreParserCommon.MainHandle].unknownFontTablePtrCurrent ← NIL;

 END;
END.
```

Copyright © 1992 Xerox Corporation All Rights Reserved

```
DIRECTORY
 ByteBlt USING [ByteBlt],
 DirectoryID USING [nullObjectID],
 Environment USING [Byte, bytesPerPage, bytesPerWord, wordsPerPage],
 IM USING [
  AcquireBuffer, Buffer, CreateInstall, Error, InstallType, InstallHandle,
  InstallStatusProcType, TransmitPixelBufferList, NullInstallHandle],
 Inline USING [BITAND, BytePair, LongCOPY, LowByte, LowHalf],
 IPFunction USING [AllocateNodeNFL, PopStack],
 IPMicrocode USING [CALL],
 PreParserColor USING [AddNode, ReportInstallStatus],
 ParserCommon USING [WordsFromBytes],
 ParserZone USING [
  AllocateNode16, AllocateNode64, AllocateNodeNFL, FreeNodeNFL,
  GuaranteeNode64],
 PreParserCommon USING [
  AllocateNode16Size, AllocateNode64Size, Assertion, MainHandle, PixelArray,
  PixelVector, PixelVectorPtr, stackEntryCount, String],
 PreParserControl USING [PageHandle, preParserZone, SIFResult],
 PreParserData USING [OperandType],
 PreParserExtra USING [],
 PreParserFrameStack USING [PopStack, PushStack],
 PreParserInterpress USING [LongOperator],
 PreParserMain USING [],
 PreParserMainErrors USING [
  badInsertFileSyntax, imageInstallAcqBufferError, imageInstallError,
  imageInstallBccError, imageInstallDirError, imageInstallNotAvailable,
  imageInstallOtherError, insertFileNotFound, insertFileProblem,
  insufficientMemory, insufficientDiskSpace, invalidSequenceType,
  longSequencesNotImpld, rasterDirectoryFull, unimplementedFeature,
  unimplementedSequenceType],
 PreParserSequence USING [LookAhead],
 PreParserSequencePrivate USING [
  ExtendZone, NeedIPBlock, StartupPixelVectorInstall, TryInMemoryPixelVector],
 PreParserTokenContext USING [ByteArrayPtr, SequenceLength],
 Real USING [Float],
 ResMgrStorage USING [BufferDescriptor, BufferList],
 String USING [MakeString];

PreParserSequenceImpl: MONITOR
 IMPORTS
  ByteBlt, IM, Inline, IPMicrocode, ParserCommon, ParserZone, PreParserColor,
  PreParserControl, PreParserFrameStack, PreParserSequence,
  PreParserSequencePrivate, Real, String
 EXPORTS PreParserSequence =

 BEGIN

 AllocateNode16Check: PreParserCommon.Assertion =
```

Copyright © 1992 Xerox Corporation All Rights Reserved

```
 (SifResVectorSize <= PreParserCommon.AllocateNode16Size);
AllocateNode64Check: PreParserCommon.Assertion =
 (SIZE[PreParserControl.SIFResult] <= PreParserCommon.AllocateNode64Size);
SifResVectorSize: CARDINAL = 16;


GuaranteeStackSpace: PROCEDURE [h: PreParserCommon.MainHandle]
 RETURNS [extendZone: BOOLEAN] = « INLINE »
 BEGIN
 IF INTEGER[PreParserCommon.stackEntryCount - h.topStackRecordEntryCount] <
  h.integer THEN
  IF ParserZone.GuaranteeNode64[h: @h.pc.pcm].extendZone THEN
   RETURN[extendZone: TRUE];
 RETURN[extendZone: FALSE];
 END;
SkipSequenceMesa: PUBLIC PROCEDURE [h: PreParserCommon.MainHandle]
 RETURNS [loop: BOOLEAN] =
 BEGIN
 IF h.pc.tokenOverlay.sequence.sequenceType = sequenceInsertMaster THEN {
  h.pc.pcm.action ← fatalError;
  h.pc.pcm.data.code ← PreParserMainErrors.unimplementedSequenceType;
  RETURN[loop: TRUE];
  };
 IF h.pc.tokenOverlay.sequence.sequenceType = sequenceInsertFile THEN
  IF SIFFound[h: h].loop THEN RETURN[TRUE] ELSE RETURN[FALSE]
 ELSE {
  h.tempData.byteIndex.lc ← h.pc.ipByteIndex + h.pc.sequenceLength.lc;
  IF h.tempData.byteIndex.highbits = 0
   AND h.tempData.byteIndex.lowbits < h.pc.ipStopIndexPlusOne THEN {
   h.pc.ipByteIndex ← h.tempData.byteIndex.lowbits;
   IF h.pc.operationStage # 0 THEN {
    h.pc.pcm.action ← maskPixel; h.pc.operationStage ← 0; RETURN[TRUE]; }
   ELSE RETURN[FALSE];
   }
  ELSE {
   h.pc.sequenceLength.lc ←
    h.tempData.byteIndex.lc - h.pc.ipStopIndexPlusOne;
   h.pc.pcm.savedAction ← PreSkipSequence;
   h.pc.pcm.action ← needIPBlock;
   RETURN[TRUE];
   };
  };
 END;

GetPixelOverhead: PROCEDURE [h: PreParserCommon.MainHandle, vCount: CARDINAL]
 RETURNS [newBlock: BOOLEAN ← FALSE] =
 BEGIN
 pixelVectorPtr: LONG POINTER TO PreParserCommon.PixelVector;
 IF h.pc.operationStage = 0 THEN {
```

Copyright © 1992 Xerox Corporation All Rights Reserved

```
IF h.pc.ipByteIndex = h.pc.ipStopIndexPlusOne THEN GOTO GetNewBlock;

h.pc.pcm.nodeSizeInWords ← SIZE[PreParserCommon.PixelVector];
h.pc.pcm.zoneRecPtr ← @h.zone;
IF IPMicrocode.CALL[
 function: IPFunction.AllocateNodeNFL, entryContext: h].result # 0 THEN {
 h.pc.pcm.savedAction ← PreSequence; RETURN[newBlock: TRUE]};
h.pc.sequenceLength.lc ←
 h.pc.sequenceLength.lc - (vCount * Environment.bytesPerWord);

h.stackEntry.pixelVectorPtr ← pixelVectorPtr ← h.pc.pcm.nodePtr;
h.stackEntry.type ← pixelVector;
pixelVectorPtr.cn ← [
 fill: 0, preambleOwned: FALSE, referenceCount: 1, next: NIL,
 type: pixelVector, zoneRecPtr: @h.zone];
pixelVectorPtr.pixelLengthInBytes ← h.pc.sequenceLength.lc;
pixelVectorPtr.transmitPixelVectorInfo ← TRUE;
pixelVectorPtr.inMemoryReferencePtr ← NIL;
pixelVectorPtr.installed ← pixelVectorPtr.inMemory ← FALSE;

pixelVectorPtr.installH ← IM.NullInstallHandle;
pixelVectorPtr.resInfoObjectID ← DirectoryID.nullObjectID;
pixelVectorPtr.pixelSequenceType ← spare1;
pixelVectorPtr.pixelV0ThroughV3.words[0] ← 0;
pixelVectorPtr.pixelV0ThroughV3.words[1] ← 0;
pixelVectorPtr.pixelV0ThroughV3.words[2] ← 0;
pixelVectorPtr.pixelV0ThroughV3.words[3] ← 0;
pixelVectorPtr.bufferIM ← [NIL, 0, 0];
pixelVectorPtr.continueFileSizeInBytes ← 0;
pixelVectorPtr.currentTokenBytes ← 0;
pixelVectorPtr.firstBuffer ← FALSE;
pixelVectorPtr.sequenceContinued ← FALSE;
pixelVectorPtr.pixelEncodingOffset ← 0;
pixelVectorPtr.oddByte ← FALSE;
h.tempData.vSave ← 0};
pixelVectorPtr ← h.stackEntry.pixelVectorPtr;

DO
 SELECT TRUE FROM
  h.pc.operationStage = 2 => {
   h.tempData.number.bytes[1] ← h.pc.ipBufferPtr[h.pc.ipByteIndex];
   pixelVectorPtr.pixelV0ThroughV3.words[h.tempData.vSave] ←
    h.tempData.number.c;
   h.pc.ipByteIndex ← h.pc.ipByteIndex + 1;
   h.pc.operationStage ← 1};

  h.pc.ipByteIndex + 2 <= h.pc.ipStopIndexPlusOne => {
   h.tempData.number.bytes[0] ← h.pc.ipBufferPtr[h.pc.ipByteIndex];
   h.pc.ipByteIndex ← h.pc.ipByteIndex + 1;
```

Copyright © 1992 Xerox Corporation All Rights Reserved

```
    h.tempData.number.bytes[1] ← h.pc.ipBufferPtr[h.pc.ipByteIndex];
    h.pc.ipByteIndex ← h.pc.ipByteIndex + 1;
    pixelVectorPtr.pixelV0ThroughV3.words[h.tempData.vSave] ←
     h.tempData.number.c};

   h.pc.ipByteIndex + 1 = h.pc.ipStopIndexPlusOne => {
    h.tempData.number.bytes[0] ← h.pc.ipBufferPtr[h.pc.ipByteIndex];
    h.pc.operationStage ← 2;
    GOTO GetNewBlock};

   ENDCASE => {h.pc.operationStage ← 1; GOTO GetNewBlock};

  h.tempData.vSave ← h.tempData.vSave + 1;
  IF h.tempData.vSave = vCount THEN EXIT;
  ENDLOOP;

 h.pc.operationStage ← 5;

 IF h.pc.ipByteIndex = h.pc.ipStopIndexPlusOne THEN GOTO GetNewBlock;

 EXITS
  GetNewBlock => {
   IF h.pc.pcm.contextType = preParserMainLoopContext THEN
    LOOPHOLE[h.pc.pcm.currentPageHandle, PreParserControl.PageHandle].status
     ← needIPBlock;

   h.pc.pcm.action ← needIPBlock;
   h.pc.pcm.savedAction ← PreSequence;
   RETURN[newBlock: TRUE]};

 END;

GetNum: PROCEDURE [
 byteStatus: {oneBlock, firstPart, secondPart}, h: PreParserCommon.MainHandle]
 RETURNS [LONG INTEGER] =
 BEGIN
 b: CARDINAL;
 bytes: CARDINAL;
 result: PreParserTokenContext.SequenceLength;

 SELECT byteStatus FROM
  oneBlock => {
   bytes ← h.pc.sequenceLength.lowbits;
   h.tempData.num.lc ← 0;

   b ← h.tempData.byteStart ← 4 - h.pc.sequenceLength.lowbits};

  firstPart => {
   bytes ← h.pc.currentTokenBytes;
   h.tempData.num.lc ← 0;
```

Copyright © 1992 Xerox Corporation All Rights Reserved

```
b ← h.tempData.byteStart ← 4 - h.pc.sequenceLength.lowbits};

ENDCASE = > {
 bytes ← h.pc.sequenceLength.lowbits - h.pc.currentTokenBytes;

 b ← h.tempData.byteStart + h.pc.currentTokenBytes};

FOR i: CARDINAL IN [0..bytes) DO
 h.tempData.num.bytes[b] ← h.pc.ipBufferPtr[h.pc.ipByteIndex];
 h.pc.ipByteIndex ← h.pc.ipByteIndex + 1;
 b ← b + 1;
 ENDLOOP;

IF byteStatus = firstPart THEN RETURN[0];

IF Inline.BITAND[128, h.tempData.num.bytes[h.tempData.byteStart]] # 0 THEN
 SELECT h.tempData.byteStart FROM
  3 = > {
   h.tempData.num.bytes[2] ← LOOPHOLE[Inline.LowByte[-1]];
   h.tempData.num.lowbits ← LOOPHOLE[-1]};
  2 = > h.tempData.num.lowbits ← LOOPHOLE[-1];
  1 = > h.tempData.num.bytes[0] ← LOOPHOLE[Inline.LowByte[-1]];
  ENDCASE;

result ← [
 words[lowbits: h.tempData.num.highbits, highbits: h.tempData.num.lowbits]];

RETURN[result.lc];
END;
InstallPixels: PROCEDURE [h: PreParserCommon.MainHandle]
 RETURNS [newBlock, sequenceDone: BOOLEAN ← FALSE] =
 BEGIN
 ENABLE
  BEGIN
  UNWIND = > NULL;
  IM.Error = > {
   SELECT fault FROM
    12 = > h.pc.pcm.data.code ← PreParserMainErrors.imageInstallDirError;
    19 = > h.pc.pcm.data.code ← PreParserMainErrors.imageInstallError;
    72 = > h.pc.pcm.data.code ← PreParserMainErrors.insufficientDiskSpace;
    110 = > h.pc.pcm.data.code ← PreParserMainErrors.insufficientMemory;
    114, 115 = >
     h.pc.pcm.data.code ← PreParserMainErrors.imageInstallBccError;
    ENDCASE = >
     h.pc.pcm.data.code ← PreParserMainErrors.imageInstallOtherError;
   h.integer ← INTEGER[fault];
   GOTO IMError};
  END;
```

Copyright © 1992 Xerox Corporation All Rights Reserved

```
blockBytes, pixelBytes, tempBytes: CARDINAL ← 0;
firstBuffer, lastBuffer, oddByte, sequenceContinued: BOOLEAN ← FALSE;
lookAheadAgain: BOOLEAN ← TRUE;
bufferIM: IM.Buffer;
bufferIMBytes: LONG CARDINAL;
bufferIMStartPointer: LONG POINTER TO PACKED ARRAY OF Environment.Byte;
createInstallAttemptCount: CARDINAL ← 0;
installType: IM.InstallType ← nonRotated;
startCopyPtr: PreParserTokenContext.ByteArrayPtr;
startCopyPtrOffset: CARDINAL ← 0;
pixelEncodingOffset: LONG CARDINAL ← 0;
remainder: CARDINAL ← 0;
tempBufferDesc: ResMgrStorage.BufferDescriptor ← [NIL, NIL, 0, 0];
tempBufferList: ResMgrStorage.BufferList ← NIL;
wordsToCopy: CARDINAL ← 0;

pixelVectorPtr: LONG POINTER TO PreParserCommon.PixelVector =
 h.stackEntry.pixelVectorPtr;

pixelVectorPtr.installed ← TRUE;

IF h.pc.operationStage < 6 THEN {
 pixelVectorPtr.installH ← IM.CreateInstall[
  clientId: [trans: captureIP, module: imageInstall],
  installStatusProc: PreParserColor.ReportInstallStatus,
  fileSizeInBytesHint: h.pc.sequenceLength.lc + 1,
  maxBlockSizeInBytes: LAST[CARDINAL], aswFileType: 119,
  installType: installType, overrideLimits: FALSE !
  IM.Error => {
   SELECT fault FROM
    112 => {
     createInstallAttemptCount ← createInstallAttemptCount + 1;
     IF createInstallAttemptCount < 6 THEN RETRY
     ELSE
      h.pc.pcm.data.code ←
       PreParserMainErrors.imageInstallNotAvailable};
    110 => h.pc.pcm.data.code ← PreParserMainErrors.insufficientMemory;
    80 => h.pc.pcm.data.code ← PreParserMainErrors.rasterDirectoryFull;
    ENDCASE =>
     h.pc.pcm.data.code ← PreParserMainErrors.imageInstallOtherError;
   h.integer ← INTEGER[fault];
   GOTO IMError}];

 PreParserColor.AddNode[hPageHandle: h];

 firstBuffer ← TRUE;

 IF Inline.BITAND[1, h.pc.ipByteIndex] = 0 THEN {
  pixelEncodingOffset ←
   (h.pc.ipByteIndex / Environment.bytesPerWord) +
```

Copyright © 1992 Xerox Corporation All Rights Reserved

```
    (h.pc.ipBufferPtr - h.bufferPtr);
   h.tempData.byteInd ← CARDINAL[
    h.pc.ipByteIndex +
     ((h.pc.ipBufferPtr - h.bufferPtr) * Environment.bytesPerWord)];
   startCopyPtrOffset ← h.pc.ipByteIndex / Environment.bytesPerWord}
  ELSE {
   oddByte ← TRUE;
   pixelEncodingOffset ←
    (h.pc.ipByteIndex - 1) / Environment.bytesPerWord +
     (h.pc.ipBufferPtr - h.bufferPtr);
   h.tempData.byteInd ← CARDINAL[
    h.pc.ipByteIndex - 1 +
     ((h.pc.ipBufferPtr - h.bufferPtr) * Environment.bytesPerWord)];
   startCopyPtrOffset ← (h.pc.ipByteIndex - 1) / Environment.bytesPerWord}}
 ELSE {h.tempData.byteInd ← 0; };

 IF h.pc.operationStage = 8 THEN {
  toStartIndex, toStopIndexPlusOne, fromStopIndex: CARDINAL ← 0;
  needNewBlock: BOOLEAN ← FALSE;
  pixelBytes ← CARDINAL[
   pixelVectorPtr.bufferIM.bufferSizeInBytes -
    pixelVectorPtr.bufferIM.lengthInBytes];
  IF pixelBytes > h.pc.sequenceLength.lc THEN {
   IF (h.pc.ipStopIndexPlusOne - h.pc.ipByteIndex) >= h.pc.sequenceLength.lc
    THEN {
    pixelBytes ← h.pc.sequenceLength.lowbits;
    lastBuffer ← TRUE;
    h.pc.operationStage ← 7}
   ELSE {
    pixelBytes ← CARDINAL[h.pc.ipStopIndexPlusOne - h.pc.ipByteIndex];
    needNewBlock ← TRUE}}
  ELSE {
   IF (h.pc.ipStopIndexPlusOne - h.pc.ipByteIndex) < pixelBytes THEN {
    pixelBytes ← CARDINAL[h.pc.ipStopIndexPlusOne - h.pc.ipByteIndex];
    needNewBlock ← TRUE}};
  fromStopIndex ← CARDINAL[h.pc.ipByteIndex + pixelBytes];
  toStartIndex ← CARDINAL[pixelVectorPtr.bufferIM.lengthInBytes];
  toStopIndexPlusOne ← CARDINAL[
   pixelVectorPtr.bufferIM.lengthInBytes + pixelBytes];
  IF pixelVectorPtr.firstBuffer AND pixelVectorPtr.oddByte THEN {
   toStartIndex ← toStartIndex + 1;
   toStopIndexPlusOne ← toStopIndexPlusOne + 1};
  [] ← ByteBlt.ByteBlt[
   from: [
   blockPointer: h.pc.ipBufferPtr, startIndex: h.pc.ipByteIndex,
   stopIndexPlusOne: fromStopIndex],
   to: [
   blockPointer: LOOPHOLE[pixelVectorPtr.bufferIM.pointer],
   startIndex: toStartIndex, stopIndexPlusOne: toStopIndexPlusOne],
   overLap: move];
```

Copyright © 1992 Xerox Corporation All Rights Reserved

```
pixelVectorPtr.bufferIM.lengthInBytes ←
 pixelVectorPtr.bufferIM.lengthInBytes + pixelBytes;
h.pc.ipByteIndex ← h.pc.ipByteIndex + pixelBytes;
h.pc.sequenceLength.lc ← h.pc.sequenceLength.lc - pixelBytes;
IF needNewBlock THEN GOTO GetNewBlock;
IF h.pc.operationStage # 7 THEN {
 createContinueFile: BOOLEAN ← FALSE;
 IF pixelVectorPtr.continueFileSizeInBytes # 0 THEN
  createContinueFile ← TRUE;
 tempBufferDesc ← [
  next: NIL,
  base: LOOPHOLE[pixelVectorPtr.bufferIM.pointer, LONG POINTER],
  allocateSize:
  pixelVectorPtr.bufferIM.bufferSizeInBytes / Environment.bytesPerPage,
  extendByPages: 0];
 tempBufferList ← @tempBufferDesc;
 IM.TransmitPixelBufferList[
  installHandle: pixelVectorPtr.installH, bufferList: tempBufferList,
  continueDataLengthInBytes: 0,
  continueFileSizeInBytes: pixelVectorPtr.continueFileSizeInBytes,
  dataLengthInBytes: pixelVectorPtr.bufferIM.lengthInBytes,
  pixelEncodingOffset: 0,
  pixelSequenceType: pixelVectorPtr.pixelSequenceType,
  pixelV0ThroughV3: pixelVectorPtr.pixelV0ThroughV3,
  createContinueFile: createContinueFile, firstBuffer: FALSE,
  oddByte: FALSE];
 h.pc.ipBufferPtr ←
  h.pc.ipBufferPtr + (h.pc.ipByteIndex / Environment.bytesPerWord);
 h.pc.ipStopIndexPlusOne ← h.pc.ipStopIndexPlusOne - h.pc.ipByteIndex;
 h.pc.ipByteIndex ← 0;
 h.pc.operationStage ← 6}};

IF h.pc.operationStage = 7 THEN {
 WHILE lookAheadAgain DO
  [lastBuffer, newBlock, sequenceContinued, lookAheadAgain] ←
   PreParserSequence.LookAhead[h: h];
  IF newBlock THEN {h.pc.operationStage ← 7; GOTO GetNewBlock};
  IF sequenceContinued THEN {
   h.pc.operationStage ← 6; RETURN[newBlock: FALSE, sequenceDone: FALSE]}
  ELSE
   IF ¯lookAheadAgain THEN {
    h.pc.operationStage ← 9; RETURN[newBlock: FALSE, sequenceDone: TRUE]};
  ENDLOOP};


tempBytes ← h.pc.ipStopIndexPlusOne - h.pc.ipByteIndex;
startCopyPtr ← h.pc.ipBufferPtr + startCopyPtrOffset;

IF h.remainingBytesInBlock # 0 THEN {
 blockBytes ← tempBytes + Inline.LowHalf[h.remainingBytesInBlock];
```

Copyright © 1992 Xerox Corporation All Rights Reserved

```
IF h.pc.sequenceLength.lc <= tempBytes THEN {
 lastBuffer ← TRUE;
 pixelBytes ← h.pc.sequenceLength.lowbits;
 h.pc.ipByteIndex ← h.pc.ipByteIndex + h.pc.sequenceLength.lowbits}
ELSE {
 IF h.pc.sequenceLength.lc <= blockBytes THEN {
  lastBuffer ← TRUE;
  pixelBytes ← h.pc.sequenceLength.lowbits;
  h.pc.ipBufferPtr ←
   h.pc.ipBufferPtr +
    (h.pc.ipStopIndexPlusOne / Environment.bytesPerWord);
  h.pc.ipByteIndex ←
   h.pc.sequenceLength.lowbits -
    (h.pc.ipStopIndexPlusOne - h.pc.ipByteIndex);
  h.pc.sequenceLength.lc ← 0;
  h.pc.ipStopIndexPlusOne ← Inline.LowHalf[h.remainingBytesInBlock];
  h.remainingBytesInBlock ← 0}
 ELSE {
  lastBuffer ← FALSE;
  pixelBytes ← blockBytes;
  h.pc.ipByteIndex ← h.pc.ipByteIndex + pixelBytes;
  h.remainingBytesInBlock ← 0}}}
ELSE {
 blockBytes ← tempBytes;
 IF h.pc.sequenceLength.lc <= blockBytes THEN {
  lastBuffer ← TRUE;
  pixelBytes ← CARDINAL[h.pc.sequenceLength.lc];
  h.pc.ipByteIndex ← h.pc.ipByteIndex + CARDINAL[h.pc.sequenceLength.lc]}
 ELSE {
  pixelBytes ← blockBytes;
  h.pc.ipByteIndex ← h.pc.ipByteIndex + pixelBytes}};

IF h.pc.operationStage = 7 THEN {
 WHILE lookAheadAgain DO
  [lastBuffer, newBlock, sequenceContinued, lookAheadAgain] ←
   PreParserSequence.LookAhead[h: h];
  IF newBlock THEN {h.pc.operationStage ← 7; GOTO GetNewBlock};
  IF sequenceContinued THEN {
   h.pc.operationStage ← 6; RETURN[newBlock: FALSE, sequenceDone: FALSE]}
  ELSE
   IF ~lookAheadAgain THEN {
    h.pc.operationStage ← 9; RETURN[newBlock: FALSE, sequenceDone: TRUE]};
  ENDLOOP};
IF oddByte THEN wordsToCopy ← (pixelBytes + 2) / Environment.bytesPerWord
ELSE wordsToCopy ← (pixelBytes + 1) / Environment.bytesPerWord;

remainder ← (wordsToCopy MOD Environment.wordsPerPage);
IF remainder > 0 THEN
 bufferIMBytes ←
  ((wordsToCopy - remainder) * Environment.bytesPerWord) +
```

Copyright © 1992 Xerox Corporation All Rights Reserved

```
    Environment.bytesPerPage
  ELSE bufferIMBytes ← wordsToCopy * Environment.bytesPerWord;

  bufferIM ← IM.AcquireBuffer[
   installHandle: pixelVectorPtr.installH,
   allocateBufferSizeInBytes: bufferIMBytes, waitTillAvailable: FALSE];
  IF bufferIM.pointer = NIL THEN {
   h.pc.pcm.data.code ← PreParserMainErrors.imageInstallAcqBufferError;
   h.integer ← 56;
   GOTO IMError};

  IF firstBuffer AND ~lastBuffer THEN {
   pixelEncodingOffset ←
    (bufferIMBytes / Environment.bytesPerWord) - wordsToCopy;
   bufferIMStartPointer ← bufferIM.pointer + pixelEncodingOffset}
  ELSE {pixelEncodingOffset ← 0; bufferIMStartPointer ← bufferIM.pointer};

  Inline.LongCOPY[
   from: startCopyPtr, nwords: wordsToCopy, to: bufferIMStartPointer];

  bufferIM.bufferSizeInBytes ← bufferIMBytes;
  bufferIM.lengthInBytes ← wordsToCopy * Environment.bytesPerWord;
  tempBufferDesc ← [
   next: NIL, base: LOOPHOLE[bufferIM.pointer, LONG POINTER],
   allocateSize: bufferIMBytes / Environment.bytesPerPage, extendByPages: 0];
  tempBufferList ← @tempBufferDesc;
  IF ~lastBuffer THEN {
   IF firstBuffer OR ((pixelBytes MOD Environment.bytesPerPage) = 0) THEN {
    IM.TransmitPixelBufferList[
     installHandle: pixelVectorPtr.installH, bufferList: tempBufferList,
     continueDataLengthInBytes: 0, continueFileSizeInBytes: 0,
     dataLengthInBytes: pixelBytes, pixelEncodingOffset: pixelEncodingOffset,
     pixelSequenceType: pixelVectorPtr.pixelSequenceType,
     pixelV0ThroughV3: pixelVectorPtr.pixelV0ThroughV3,
     createContinueFile: FALSE, firstBuffer: firstBuffer, lastBuffer: FALSE,
     oddByte: oddByte];
    h.pc.operationStage ← 6}
   ELSE {
    pixelVectorPtr.bufferIM.pointer ← bufferIM.pointer;
    pixelVectorPtr.bufferIM.bufferSizeInBytes ← bufferIMBytes;
    pixelVectorPtr.bufferIM.lengthInBytes ← pixelBytes;
    pixelVectorPtr.firstBuffer ← firstBuffer;
    h.pc.operationStage ← 8};
   h.pc.sequenceLength.lc ← h.pc.sequenceLength.lc - pixelBytes;
   GOTO GetNewBlock}
  ELSE {
   pixelVectorPtr.bufferIM.pointer ← bufferIM.pointer;
   pixelVectorPtr.bufferIM.bufferSizeInBytes ← bufferIMBytes;
   pixelVectorPtr.bufferIM.lengthInBytes ← pixelBytes;
   pixelVectorPtr.firstBuffer ← firstBuffer;
```

Copyright © 1992 Xerox Corporation All Rights Reserved

```
  IF firstBuffer THEN {
   pixelVectorPtr.pixelEncodingOffset ← pixelEncodingOffset;
   pixelVectorPtr.oddByte ← oddByte};
  WHILE lookAheadAgain DO
   [lastBuffer, newBlock, sequenceContinued, lookAheadAgain] ←
    PreParserSequence.LookAhead[h: h];
   IF newBlock THEN {h.pc.operationStage ← 7; GOTO GetNewBlock};
   IF sequenceContinued THEN {
    h.pc.operationStage ← 6; RETURN[newBlock: FALSE, sequenceDone: FALSE]}
   ELSE
    IF ~lookAheadAgain THEN {
     h.pc.operationStage ← 9; RETURN[newBlock: FALSE, sequenceDone: TRUE]};
   ENDLOOP};
 h.pc.operationStage ← 9;

 EXITS

  GetNewBlock => {
   IF h.pc.pcm.contextType = preParserMainLoopContext THEN
    LOOPHOLE[h.pc.pcm.currentPageHandle, PreParserControl.PageHandle].status
     ← needIPBlock;
   h.pc.pcm.action ← needIPBlock;
   h.pc.pcm.savedAction ← PreSequence;
   RETURN[newBlock: TRUE, sequenceDone: FALSE]};
  IMError => {
   h.pc.pcm.action ← fatalError; RETURN[newBlock: TRUE, sequenceDone: TRUE]};
 END;
SequenceMesa: PUBLIC PROCEDURE [h: PreParserCommon.MainHandle]
 RETURNS [loop: BOOLEAN ← FALSE] =
 BEGIN
 ENABLE {
  PreParserSequencePrivate.ExtendZone => {
   h.pc.pcm.savedAction ← PreSequence; loop ← TRUE; CONTINUE};
  PreParserSequencePrivate.NeedIPBlock => {
   h.pc.pcm.action ← needIPBlock;
   h.pc.pcm.savedAction ← PreSequence;
   loop ← TRUE;
   CONTINUE};
  };

 newBlock, sequenceDone: BOOLEAN ← FALSE;

 SELECT h.pc.tokenOverlay.sequence.sequenceType FROM

  sequenceString, sequenceIdentifier => {

   h.tempData.byteIndex.lc ← h.pc.ipByteIndex + h.pc.sequenceLength.lc;

   IF h.tempData.byteIndex.highbits = 0
    AND h.tempData.byteIndex.lowbits < h.pc.ipStopIndexPlusOne
```

Copyright © 1992 Xerox Corporation All Rights Reserved

```
AND h.pc.ipBufferPtr[h.tempData.byteIndex.lowbits] =
 (200B + ORD[PreParserInterpress.LongOperator[show]])
AND h.pc.state IN [executing..executingInCORRECT] THEN {

h.string ← [
 cn: [
 fill: 1, preambleOwned: FALSE, referenceCount: 1, next: NIL,
 type: string, zoneRecPtr: @h.zone],
 length: h.pc.sequenceLength.lowbits, byteOffset: h.pc.ipByteIndex,
 base: LOOPHOLE[h.pc.ipBufferPtr], chars: TRASH];
h.sv.operand01 ← [type: string, frameData: string[@h.string]];

h.pc.ipByteIndex ← h.tempData.byteIndex.lowbits + 1;
h.pc.pcm.action ← h.pc.actionArrayPtr[show];
RETURN[loop: TRUE]};

IF h.pc.sequenceLength.highbits # 0 THEN {

 h.pc.pcm.action ← fatalError;
 h.pc.pcm.data.code ← PreParserMainErrors.longSequencesNotImpld;

 RETURN[loop: TRUE]};

h.pc.pcm.nodeSizeInWords ←
 SIZE[PreParserCommon.String] + ParserCommon.WordsFromBytes[
  h.pc.sequenceLength.lowbits];
h.pc.pcm.zoneRecPtr ← @h.zone;
IF ParserZone.AllocateNodeNFL[h: @h.pc.pcm].extendZone THEN
 GOTO retrySequence;

h.stackEntry ← [
 type:
 IF h.pc.tokenOverlay.sequence.sequenceType = sequenceString THEN string
 ELSE identifier, frameData: string[h.pc.pcm.nodePtr]];
h.stackEntry.stringPtr ↑ ← [
 cn: [
 fill: 0, preambleOwned: FALSE, referenceCount: 1, next: NIL,
 type: string, zoneRecPtr: @h.zone], length: h.pc.sequenceLength.lowbits,
 byteOffset: 0, base: @h.stackEntry.stringPtr ↑ .chars, chars: TRASH];

IF PreParserFrameStack.PushStack[h: h].extendZone THEN {
 h.pc.pcm.zoneRecPtr ← h.stackEntry.stringPtr.cn.zoneRecPtr;
 h.pc.pcm.nodePtr ← h.stackEntry.stringPtr;
 ParserZone.FreeNodeNFL[h: @h.pc.pcm];
 GOTO retrySequence};

h.tempData.bytesCopied ← ByteBlt.ByteBlt[
 from: [
 blockPointer: h.pc.ipBufferPtr, startIndex: h.pc.ipByteIndex,
 stopIndexPlusOne: h.pc.ipStopIndexPlusOne],
```

Copyright © 1992 Xerox Corporation All Rights Reserved

```
  to: [
  blockPointer: LOOPHOLE[@h.stackEntry.stringPtr↑.chars], startIndex: 0,
  stopIndexPlusOne: h.pc.sequenceLength.lowbits], overLap: move];

 IF h.tempData.bytesCopied >= h.pc.sequenceLength.lowbits THEN
  h.pc.ipByteIndex ← h.tempData.byteIndex.lowbits
 ELSE {
  h.pc.pcm.savedAction ← continueSequence;
  h.pc.pcm.action ← needIPBlock;
  RETURN[loop: TRUE]}};

sequenceInteger => {
 int: LONG INTEGER;
 IF h.pc.ipByteIndex = h.pc.ipStopIndexPlusOne THEN
  BEGIN
  h.pc.pcm.savedAction ← PreSequence;
  h.pc.pcm.action ← needIPBlock;
  RETURN[loop: TRUE];
  END;
 IF h.pc.operationStage = 0 THEN
  BEGIN
  IF h.pc.sequenceLength.lc NOT IN [1..4] THEN
   BEGIN
   h.pc.pcm.action ← fatalError;
   h.pc.pcm.data.code ← PreParserMainErrors.unimplementedFeature;
   RETURN[loop: TRUE];
   END;

  IF h.pc.ipByteIndex + h.pc.sequenceLength.lc <= h.pc.ipStopIndexPlusOne
   THEN int ← GetNum[h: h, byteStatus: oneBlock]
  ELSE
   BEGIN
   h.pc.currentTokenBytes ← h.pc.ipStopIndexPlusOne - h.pc.ipByteIndex;
   [] ← GetNum[h: h, byteStatus: firstPart];
   h.pc.operationStage ← 1;
   h.pc.pcm.savedAction ← PreSequence;
   h.pc.pcm.action ← needIPBlock;
   RETURN[loop: TRUE];
   END;
  END
 ELSE
  BEGIN
  int ← GetNum[h: h, byteStatus: secondPart];
  h.pc.operationStage ← 0;
  END;

 h.stackEntry ← [type: real, frameData: real[real: Real.Float[int]]];

 IF PreParserFrameStack.PushStack[h: h].extendZone THEN
  BEGIN h.pc.pcm.savedAction ← PrePushStack; RETURN[loop: TRUE]; END};
```

Copyright © 1992 Xerox Corporation All Rights Reserved

```
sequenceRational => {
 den: LONG INTEGER;
 IF h.pc.ipByteIndex = h.pc.ipStopIndexPlusOne THEN
  BEGIN
  h.pc.pcm.savedAction ← PreSequence;
  h.pc.pcm.action ← needIPBlock;
  RETURN[loop: TRUE];
  END;
 SELECT h.pc.operationStage FROM
  0 =>
   BEGIN
   IF h.pc.sequenceLength.lc NOT IN [2..8]
    OR h.pc.sequenceLength.lc MOD 2 ~= 0 THEN
    BEGIN
    h.pc.pcm.action ← fatalError;
    h.pc.pcm.data.code ← PreParserMainErrors.unimplementedFeature;
    RETURN[loop: TRUE];
    END;
   h.pc.sequenceLength.lc ← h.pc.sequenceLength.lc / 2;
   SELECT TRUE FROM
    h.pc.ipByteIndex + 2 * h.pc.sequenceLength.lc <=
     h.pc.ipStopIndexPlusOne =>
     BEGIN
     h.tempData.numerator ← GetNum[h: h, byteStatus: oneBlock];
     den ← GetNum[h: h, byteStatus: oneBlock];
     END;
    h.pc.ipByteIndex + h.pc.sequenceLength.lc < h.pc.ipStopIndexPlusOne
     =>
     BEGIN
     h.tempData.numerator ← GetNum[h: h, byteStatus: oneBlock];
     h.pc.currentTokenBytes ←
      h.pc.ipStopIndexPlusOne - h.pc.ipByteIndex;
     [] ← GetNum[h: h, byteStatus: firstPart];
     h.pc.operationStage ← 1;
     GOTO needNewBlock;
     END;
    h.pc.ipByteIndex + h.pc.sequenceLength.lc = h.pc.ipStopIndexPlusOne
     =>
     BEGIN
     h.tempData.numerator ← GetNum[h: h, byteStatus: oneBlock];
     h.pc.operationStage ← 2;
     GOTO needNewBlock;
     END;
    ENDCASE =>
     BEGIN
     h.pc.currentTokenBytes ←
      h.pc.ipStopIndexPlusOne - h.pc.ipByteIndex;
     [] ← GetNum[h: h, byteStatus: firstPart];
     h.pc.operationStage ← 3;
```

Copyright © 1992 Xerox Corporation All Rights Reserved

```
        GOTO needNewBlock;
        END;
      EXITS
       needNewBlock =>
        BEGIN
        h.pc.pcm.savedAction ← PreSequence;
        h.pc.pcm.action ← needIPBlock;
        RETURN[loop: TRUE];
        END;
      END;
    1 => den ← GetNum[h: h, byteStatus: secondPart];
    2 => den ← GetNum[h: h, byteStatus: oneBlock];
    ENDCASE =>
      BEGIN
      h.tempData.numerator ← GetNum[h: h, byteStatus: secondPart];
      den ← GetNum[h: h, byteStatus: oneBlock];
      END;
  h.pc.operationStage ← 0;
  h.stackEntry ← [
    type: real,
    frameData: real[
    real: Real.Float[h.tempData.numerator] / Real.Float[den]]];
  IF PreParserFrameStack.PushStack[h: h].extendZone THEN
    BEGIN h.pc.pcm.savedAction ← PrePushStack; RETURN[loop: TRUE]; END;
  };

sequenceInsertFile => {
  IF h.pc.operationStage = 0 THEN {
    h.pc.pcm.zoneRecPtr ← @h.zone;
    IF ParserZone.AllocateNode64[h: @h.pc.pcm].extendZone THEN {
      h.pc.pcm.savedAction ← PreSequence; RETURN[loop: TRUE]};
    h.tempData.sifResultPtr ← h.pc.pcm.nodePtr;
    h.tempData.sifResultPtr.zoneRecPtr ← LOOPHOLE[@h.zone];

    h.pc.operationStage ← 1;
    h.pc.pcm.savedAction ← PreSequence;

    h.pc.pcm.action ← needSIF;
    RETURN[loop: TRUE]};

  IF h.pc.operationStage < 3 AND h.tempData.sifResultPtr↑.status # found
    THEN {
    IF h.pc.operationStage = 1 THEN {

      IF h.pc.sequenceLength.highbits # 0 THEN {
        h.pc.pcm.action ← fatalError;
        h.pc.pcm.data.code ← PreParserMainErrors.longSequencesNotImpld;
        RETURN[loop: TRUE]};

      h.tempData.sifName ← String.MakeString[
```

Copyright © 1992 Xerox Corporation All Rights Reserved

```
    z: PreParserControl.preParserZone,
    maxlength: h.pc.sequenceLength.lowbits];
   h.tempData.sifName.length ← h.pc.sequenceLength.lowbits;
   h.tempData.bytesCopied ← 0};

  h.tempData.bytesCopied ←
   h.tempData.bytesCopied + ByteBlt.ByteBlt[
    from: [
    blockPointer: h.pc.ipBufferPtr, startIndex: h.pc.ipByteIndex,
    stopIndexPlusOne: h.pc.ipStopIndexPlusOne],
    to: [
    blockPointer: @h.tempData.fakeSifName.chars,
    startIndex: h.tempData.bytesCopied,
    stopIndexPlusOne: h.pc.sequenceLength.lowbits], overLap: move];

  IF h.tempData.bytesCopied < h.pc.sequenceLength.lowbits THEN {
   h.pc.operationStage ← 2;
   h.pc.pcm.action ← needIPBlock;
   h.pc.pcm.savedAction ← PreSequence;
   RETURN[loop: TRUE]};

  h.pc.pcm.action ← fatalError;
  h.pc.pcm.data.code ←
   SELECT h.tempData.sifResultPtr↑.status FROM
    notFound, noSuchDirectory => PreParserMainErrors.insertFileNotFound,
    badSyntax => PreParserMainErrors.badInsertFileSyntax,
    ENDCASE => PreParserMainErrors.insertFileProblem;
  RETURN[loop: TRUE]};

 WITH sifResult: h.tempData.sifResultPtr SELECT FROM
  font, form, ILF => {
   h.pc.operationStage ← 0;
   h.pc.tokenOverlay.sequence.sequenceType ← sequenceString;
   h.pc.pcm.action ← h.pc.actionArrayPtr[skipSequence];
   RETURN[loop: TRUE]};

  LGO => {
   h.pc.pcm.zoneRecPtr ← @h.zone;
   h.pc.pcm.nodeSizeInWords ← SIZE[PreParserCommon.PixelArray];
   IF IPMicrocode.CALL[
    function: IPFunction.AllocateNodeNFL, entryContext: h].result # 0
    THEN {h.pc.operationStage ← 3; RETURN[loop: TRUE]};
   h.sv.operand01.type ← pixelArray;
   h.sv.operand01.pixelArray ← h.pc.pcm.nodePtr;

   h.stackEntryPtr ← @h.stackEntry;
   [] ← IPMicrocode.CALL[function: IPFunction.PopStack, entryContext: h];
   h.stackEntry.transformationPtr.a ← 1.0;
   h.stackEntry.transformationPtr.b ← 0.0;
   h.stackEntry.transformationPtr.d ← 0.0;
```

Copyright © 1992 Xerox Corporation All Rights Reserved

```
h.stackEntry.transformationPtr.e ← 1.0;
h.tempData.tln ← h.stackEntry.transformationPtr ↑ ;

h.sv.operand01.pixelArray ↑ ← [
 cn: [
 fill: 0, preambleOwned: FALSE, referenceCount: 1, next: NIL,
 type: sifResults, zoneRecPtr: @h.zone], type: sif,
 var: sif[sifResultPtr: h.tempData.sifResultPtr]];

h.pc.tokenOverlay.sequence.sequenceType ← sequenceString;
h.pc.pcm.action ← h.pc.actionArrayPtr[skipSequence];
RETURN[loop: TRUE]};

RES = > {
 IF h.pc.operationStage = 1 THEN {
  h.integer ← 8;
  h.pc.pcm.zoneRecPtr ← @h.zone;
  IF GuaranteeStackSpace[h: h].extendZone
   OR ParserZone.AllocateNode16[h: @h.pc.pcm].extendZone THEN {
   h.pc.pcm.savedAction ← PreSequence; RETURN[loop: TRUE]};
  h.stackEntry ← [
   type: vectorOfElements,
   frameData: vectorOfElements[vectorPtr: h.pc.pcm.nodePtr]];
  h.stackEntry.vectorPtr ↑ ← [
   cn: [
   fill: 0, preambleOwned: FALSE, referenceCount: 1, next: NIL,
   type: vectorOfElements, zoneRecPtr: @h.zone], low: 0, count: 2,
   elements: TRASH];
  h.stackEntry.vectorPtr ↑ .elements[0] ← [
   type: real, frameData: real[real: sifResult.RESInfo.imageScaleX]];
  h.stackEntry.vectorPtr ↑ .elements[1] ← [
   type: real, frameData: real[real: sifResult.RESInfo.imageScaleY]];
  [] ← PreParserFrameStack.PushStack[h: h];

  h.stackEntry ← [
   type: fixedPointReal,
   frameData: fixedPointReal[
   fixed: [
   if[frac: 0, int: INTEGER[sifResult.RESInfo.xDimension]]]]];
  [] ← PreParserFrameStack.PushStack[h: h];

  h.stackEntry.fixed.int ← INTEGER[sifResult.RESInfo.yDimension];
  [] ← PreParserFrameStack.PushStack[h: h]};

 h.pc.operationStage ← 0;

 h.pc.pcm.nodeSizeInWords ← SIZE[PreParserCommon.PixelArray];
 h.pc.pcm.zoneRecPtr ← @h.zone;
 IF IPMicrocode.CALL[
  function: IPFunction.AllocateNodeNFL, entryContext: h].result # 0
```

Copyright © 1992 Xerox Corporation All Rights Reserved

```
THEN {
h.pc.operationStage ← 2;
h.pc.pcm.savedAction ← PreSequence;
RETURN[loop: TRUE]};

h.stackEntry ← [
 type: pixelArray,
 frameData: pixelArray[pixelArray: h.pc.pcm.nodePtr]];
h.stackEntry.pixelArray↑ ← [
 cn: [
 fill: 0, preambleOwned: FALSE, referenceCount: 1, next: NIL,
 type: pixelArray, zoneRecPtr: @h.zone], type: sif,
 var: sif[sifResultPtr: h.tempData.sifResultPtr]];

[] ← PreParserFrameStack.PushStack[h: h];

h.stackEntry ←
 IF sifResult.RESInfo.hasColorImage THEN [
 type: dupPopOrDie, frameData: dupPopOrDie[dupPopOrDie: 0]]
 ELSE [
  type: fixedPointReal,
  frameData: fixedPointReal[fixed: [li[li: 0]]]];

[] ← PreParserFrameStack.PushStack[h: h];

h.stackEntry ←
 IF sifResult.RESInfo.hasColorOpr THEN [
 type: dupPopOrDie, frameData: dupPopOrDie[dupPopOrDie: 0]]
 ELSE [type: fixedPointReal, frameData: fixedPointReal[[li[li: 0]]]];

[] ← PreParserFrameStack.PushStack[h: h];

h.stackEntry ←
 IF sifResult.RESInfo.hasImageProps THEN [
 type: dupPopOrDie, frameData: dupPopOrDie[dupPopOrDie: 0]]
 ELSE [
  type: nullVectorOfElements,
  frameData: nullVectorOfElements[low: 0, count: 0]];

[] ← PreParserFrameStack.PushStack[h: h];

h.stackEntry ← [
 type: fixedPointReal,
 frameData: fixedPointReal[
 fixed: [if[frac: 0, int: INTEGER[sifResult.RESInfo.signature]]]]];
[] ← PreParserFrameStack.PushStack[h: h];
h.pc.operationStage ← 0;
h.pc.tokenOverlay.sequence.sequenceType ← sequenceString;
h.pc.pcm.action ← h.pc.actionArrayPtr[skipSequence];
RETURN[loop: TRUE]};
```

Copyright © 1992 Xerox Corporation All Rights Reserved

```
  unknown => {
   h.pc.pcm.action ← fatalError;
   h.pc.pcm.data.code ← PreParserMainErrors.insertFileProblem;
   RETURN[loop: TRUE]};
  ENDCASE};

sequenceComment => {
 h.pc.pcm.action ← h.pc.actionArrayPtr[skipSequence]; RETURN[loop: TRUE]};

sequenceAdaptivePixelVector => {
 IF h.pc.operationStage < 5 THEN {
  IF GetPixelOverhead[h: h, vCount: 4].newBlock THEN RETURN[loop: TRUE]};
 h.stackEntry.pixelVectorPtr.hasPBT ←
  h.stackEntry.pixelVectorPtr.pixelV0ThroughV3.words[0] # 0;
 h.stackEntry.pixelVectorPtr.pixelSequenceType ← adaptive;
 IF h.pc.operationStage < 9 THEN {
  WHILE ~sequenceDone DO
   [newBlock, sequenceDone] ← InstallPixels[h: h];
   IF newBlock THEN RETURN[loop: TRUE];
   ENDLOOP};
 h.pc.operationStage ← 0;

 IF PreParserFrameStack.PushStack[h: h].extendZone THEN
  BEGIN h.pc.pcm.savedAction ← PrePushStack; RETURN[loop: TRUE]; END};

sequenceCompressedPixelVector => {
 IF h.pc.operationStage < 5 THEN
  BEGIN
  IF GetPixelOverhead[h: h, vCount: 3].newBlock THEN RETURN[loop: TRUE];
  END;
 h.stackEntry.pixelVectorPtr.hasPBT ←
  h.stackEntry.pixelVectorPtr.pixelV0ThroughV3.words[0] # 0;
 h.stackEntry.pixelVectorPtr.pixelSequenceType ← compressed;
 IF h.pc.operationStage < 9 THEN {
  WHILE ~sequenceDone DO
   [newBlock, sequenceDone] ← InstallPixels[h: h];
   IF newBlock THEN RETURN[loop: TRUE];
   ENDLOOP};
 h.pc.operationStage ← 0;
 IF PreParserFrameStack.PushStack[h: h].extendZone THEN {
  h.pc.pcm.savedAction ← PrePushStack; RETURN[loop: TRUE]}};

sequencePackedPixelVector => {
 pv: PreParserCommon.PixelVectorPtr ← NIL;
 IF h.pc.operationStage < 5 THEN {
  IF GetPixelOverhead[h: h, vCount: 2].newBlock THEN RETURN[loop: TRUE]};
 pv ← h.stackEntry.pixelVectorPtr;
 pv.hasPBT ← FALSE;
 pv.pixelSequenceType ← packed;
```

Copyright © 1992 Xerox Corporation All Rights Reserved

```
IF NOT PreParserSequencePrivate.TryInMemoryPixelVector[h, pv] THEN {
 IF h.pc.operationStage < 9 THEN {
  WHILE ~sequenceDone DO
   [newBlock, sequenceDone] ← InstallPixels[h: h];
   IF newBlock THEN RETURN[loop: TRUE];
   ENDLOOP};
 };
h.pc.operationStage ← 0;
IF PreParserFrameStack.PushStack[h: h].extendZone THEN {
 h.pc.pcm.savedAction ← PrePushStack; RETURN[loop: TRUE]}};

sequenceCCITT4PixelVector => {
 h.pc.pcm.action ← fatalError;
 h.pc.pcm.data.code ← PreParserMainErrors.unimplementedSequenceType;
 RETURN[loop: TRUE]};

sequenceContinued => {
 pv: PreParserCommon.PixelVectorPtr ← h.stackEntry.pixelVectorPtr;
 IF pv.inMemory THEN {
  IF PreParserFrameStack.PopStack[h: h].fatalError THEN
   RETURN[loop: TRUE];
  PreParserSequencePrivate.StartupPixelVectorInstall[h: h, pv: pv];
  pv.pixelLengthInBytes ← pv.pixelLengthInBytes + h.pc.sequenceLength.lc;
  IF h.pc.sequenceLength.lc >
   (pv.bufferIM.bufferSizeInBytes - pv.bufferIM.lengthInBytes) THEN
   pv.continueFileSizeInBytes ← h.pc.sequenceLength.lc;
  h.pc.operationStage ← 8;
  sequenceDone ← FALSE;
  WHILE ~sequenceDone DO
   [newBlock, sequenceDone] ← InstallPixels[h: h];
   IF newBlock THEN RETURN[loop: TRUE];
   ENDLOOP;
  }
 ELSE {
  IF h.pc.operationStage < 6 THEN {
   h.pc.pcm.action ← fatalError;
   h.pc.pcm.data.code ← PreParserMainErrors.unimplementedSequenceType;
   RETURN[loop: TRUE]}
  ELSE {
   WHILE ~sequenceDone DO
    [newBlock, sequenceDone] ← InstallPixels[h: h];
    IF newBlock THEN RETURN[loop: TRUE];
    ENDLOOP;
   };
  };
 h.pc.operationStage ← 0;
 IF PreParserFrameStack.PushStack[h: h].extendZone THEN {
  h.pc.pcm.savedAction ← PrePushStack; RETURN[loop: TRUE]; };
 };
```

Copyright © 1992 Xerox Corporation All Rights Reserved

```
  VAL[0], sequenceLargeVector = > {
   h.pc.pcm.action ← fatalError;
   h.pc.pcm.data.code ← PreParserMainErrors.unimplementedSequenceType;
   RETURN[loop: TRUE];
   };
  ENDCASE = > {
   h.pc.pcm.action ← fatalError;
   h.pc.pcm.data.code ← PreParserMainErrors.invalidSequenceType;
   RETURN[loop: TRUE]};
 RETURN[loop: FALSE];
 EXITS
  retrySequence = > {h.pc.pcm.savedAction ← PreSequence; RETURN[loop: TRUE]; };
 END;
SIFFound: PUBLIC PROCEDURE [h: PreParserCommon.MainHandle]
 RETURNS [loop: BOOLEAN ← FALSE] =
 BEGIN
 IF h.pc.operationStage = 0 THEN {
  h.tempData.byteIndex.lc ← h.pc.ipByteIndex + h.pc.sequenceLength.lc;
  IF h.tempData.byteIndex.highbits = 0
   AND h.tempData.byteIndex.lowbits < h.pc.ipStopIndexPlusOne THEN {
   h.statusPtr↑ ← [
    insertFileFound[
    bounds: [
    blockPointer: LOOPHOLE[h.pc.ipBufferPtr], startIndex: h.pc.ipByteIndex,
    stopIndexPlusOne: h.tempData.byteIndex.lowbits]]];
   h.pc.pcm.savedAction ← PreLoop;
   h.pc.pcm.action ← exitLoop;
   h.pc.ipByteIndex ← h.tempData.byteIndex.lowbits;
   RETURN[loop: TRUE];
   };

  IF h.pc.sequenceLength.highbits # 0 THEN {
   h.pc.pcm.action ← fatalError;
   h.pc.pcm.data.code ← PreParserMainErrors.longSequencesNotImpld;
   RETURN[loop: TRUE]};

  h.pc.pcm.nodeSizeInWords ← ParserCommon.WordsFromBytes[
   h.pc.sequenceLength.lowbits];
  h.pc.pcm.zoneRecPtr ← @h.zone;
  IF ParserZone.AllocateNodeNFL[h: @h.pc.pcm].extendZone THEN GOTO retrySIF;

  h.tempData.bytesCopied ← ByteBlt.ByteBlt[
   from: [
   blockPointer: h.pc.ipBufferPtr, startIndex: h.pc.ipByteIndex,
   stopIndexPlusOne: h.pc.ipStopIndexPlusOne],
   to: [
   blockPointer: LOOPHOLE[h.pc.pcm.nodePtr], startIndex: 0,
   stopIndexPlusOne: h.pc.sequenceLength.lowbits], overLap: move];

  h.pc.operationStage ← 1;
```

Copyright © 1992 Xerox Corporation All Rights Reserved

```
  h.pc.pcm.action ← needIPBlock;
  GOTO retrySIF};

 IF h.pc.operationStage = 1 THEN {
  h.pc.ipByteIndex ←
   h.pc.ipByteIndex + h.pc.sequenceLength.lowbits - h.tempData.bytesCopied;

  [] ← ByteBlt.ByteBlt[
   from: [
   blockPointer: h.pc.ipBufferPtr, startIndex: 0,
   stopIndexPlusOne: h.pc.ipStopIndexPlusOne],
   to: [
   blockPointer: LOOPHOLE[@h.stackEntry.stringPtr ↑ .chars],
   startIndex: h.tempData.bytesCopied,
   stopIndexPlusOne: h.pc.sequenceLength.lowbits], overLap: move];

  h.statusPtr ↑ ← [
   insertFileFound[
   bounds: [
   blockPointer: LOOPHOLE[h.pc.pcm.nodePtr], startIndex: 0,
   stopIndexPlusOne: h.pc.sequenceLength.lowbits]]];

  h.pc.operationStage ← 2;
  GOTO retrySIF;
  };

 h.pc.pcm.zoneRecPtr ← @h.zone;
 ParserZone.FreeNodeNFL[h: @h.pc.pcm];
 h.pc.operationStage ← 0;
 RETURN[loop: FALSE];

 EXITS
  retrySIF => {h.pc.pcm.savedAction ← PreSkipSequence; RETURN[loop: TRUE]};
 END;

Initialize: PUBLIC PROCEDURE = BEGIN END;
END.
```

Copyright © 1992 Xerox Corporation All Rights Reserved

```
DIRECTORY
 ByteBlt USING [ByteBlt],
 Environment USING [Byte, bytesPerPage, bytesPerWord],
 IPFunction USING [AllocateNodeNFL, FreeNodeNFL],
 IPMicrocode USING [CALL],
 IM USING [
  AbortPreParserInstall, AcquireBuffer, Buffer, CreateInstall, Error, FaultCode,
  InstallHandle, InstallStatusProcType, NullInstallHandle,
  TransmitPixelBufferList, TransmitPixelVectorInfo],
 Inline USING [LowHalf, LongCOPY],
 ParserCommon USING [WordsFromBytes],
 PreParserColor USING [
  AddNode, InMemorySizeThreshold, InkWellScanLineLength,
  InkWellNumberOfScanLines, PaddedInkWellBytesPerScanLine, ReportInstallStatus],
 PreParserCommon USING [
  ByteSeq, MainHandle, PixelArrayPtr, PixelVector, PixelVectorPtr],
 PreParserMainErrors USING [
  imageInstallAcqBufferError, imageInstallError, imageInstallDirError,
  imageInstallNotAvailable, imageInstallOtherError, insufficientMemory,
  insufficientDiskSpace, rasterDirectoryFull, InternalErrorCode],
 PreParserSequence USING [],
 PreParserSequencePrivate,
 PreParserTForm USING [ConvertPPCTransToTMatrix],
 RasterDirectorySupervisor USING [ID, nullID],
 ResMgrStorage USING [BufferDescriptor, BufferList, PagesFromBytes],
 Transformation USING [Matrix];

PreParserSequenceImplA: MONITOR
 IMPORTS
  ByteBlt, IPMicrocode, IM, Inline, ParserCommon, PreParserColor,
  PreParserTForm, ResMgrStorage
 EXPORTS PreParserSequence, PreParserSequencePrivate =
 BEGIN

 ExtendZone: PUBLIC SIGNAL = CODE;
 NeedIPBlock: PUBLIC SIGNAL = CODE;
 InstallFailed: PUBLIC SIGNAL [
  imError: PreParserMainErrors.InternalErrorCode, faultCode: CARDINAL] = CODE;


 LookAhead: PUBLIC PROCEDURE [h: PreParserCommon.MainHandle]
  RETURNS [
   lastBuffer, newBlock, sequenceContinued, lookAheadAgain: BOOLEAN ← FALSE] =
  BEGIN
  ENABLE UNWIND => NULL;
  bytesNeeded, bytesNeeded1: LONG CARDINAL ← 0;
  boundaryCrossing, oddByte, needNextBlock: BOOLEAN ← FALSE;
  pixelEncodingOffset: LONG CARDINAL ← 0;
  pixelVectorPtr: LONG POINTER TO PreParserCommon.PixelVector =
```

Copyright © 1992 Xerox Corporation All Rights Reserved

```
  h.stackEntry.pixelVectorPtr;
 tempBufferDesc: ResMgrStorage.BufferDescriptor ← [NIL, NIL, 0, 0];
 tempBufferList: ResMgrStorage.BufferList ← NIL;
 toStartIndex, toStopIndexPlusOne: CARDINAL ← 0;
 [newBlock, sequenceContinued] ← GetNextToken[h];
 IF newBlock THEN
  RETURN[newBlock: TRUE, sequenceContinued: FALSE, lookAheadAgain: FALSE];
 IF pixelVectorPtr.firstBuffer THEN {
  oddByte ← pixelVectorPtr.oddByte;
  pixelEncodingOffset ← pixelVectorPtr.pixelEncodingOffset};
 IF ~sequenceContinued THEN {
  pixelVectorPtr.continueFileSizeInBytes ← 0;
  tempBufferDesc ← [
   next: NIL, base: LOOPHOLE[pixelVectorPtr.bufferIM.pointer, LONG POINTER],
   allocateSize:
   pixelVectorPtr.bufferIM.bufferSizeInBytes / Environment.bytesPerPage,
   extendByPages: 0];
  tempBufferList ← @tempBufferDesc;
  IM.TransmitPixelBufferList[
   installHandle: pixelVectorPtr.installH, bufferList: tempBufferList,
   continueDataLengthInBytes: 0,
   continueFileSizeInBytes: pixelVectorPtr.continueFileSizeInBytes,
   dataLengthInBytes: pixelVectorPtr.bufferIM.lengthInBytes,
   pixelEncodingOffset: pixelEncodingOffset,
   pixelSequenceType: pixelVectorPtr.pixelSequenceType,
   pixelV0ThroughV3: pixelVectorPtr.pixelV0ThroughV3,
   createContinueFile: FALSE, firstBuffer: pixelVectorPtr.firstBuffer,
   lastBuffer: TRUE, oddByte: oddByte];
  pixelVectorPtr.continuedAgain ← FALSE;
  RETURN[newBlock: FALSE, sequenceContinued: FALSE, lookAheadAgain: FALSE]}
 ELSE {
  pixelVectorPtr.sequenceContinued ← TRUE;
  IF pixelVectorPtr.continuedAgain THEN
   pixelVectorPtr.continueFileSizeInBytes ←
    pixelVectorPtr.continueFileSizeInBytes + h.pc.sequenceLength.lc
  ELSE pixelVectorPtr.continueFileSizeInBytes ← h.pc.sequenceLength.lc;
  pixelVectorPtr.pixelLengthInBytes ←
   h.pc.sequenceLength.lc + pixelVectorPtr.pixelLengthInBytes;

  IF pixelVectorPtr.firstBuffer THEN {
   bytesNeeded ← bytesNeeded1 ←
    pixelVectorPtr.bufferIM.bufferSizeInBytes -
     (pixelVectorPtr.bufferIM.lengthInBytes +
      (pixelEncodingOffset * Environment.bytesPerWord));
   IF pixelVectorPtr.oddByte THEN
    bytesNeeded ← bytesNeeded1 ← bytesNeeded - 1}
  ELSE
   bytesNeeded ← bytesNeeded1 ←
    pixelVectorPtr.bufferIM.bufferSizeInBytes -
     pixelVectorPtr.bufferIM.lengthInBytes;
```

Copyright © 1992 Xerox Corporation All Rights Reserved

```
IF bytesNeeded > h.pc.sequenceLength.lc THEN
 bytesNeeded ← h.pc.sequenceLength.lowbits;

IF (h.pc.ipStopIndexPlusOne - h.pc.ipByteIndex) < bytesNeeded THEN {
 bytesNeeded ← bytesNeeded1 ← h.pc.ipStopIndexPlusOne - h.pc.ipByteIndex;
 IF h.remainingBytesInBlock = 0 THEN needNextBlock ← TRUE
 ELSE boundaryCrossing ← TRUE};

toStartIndex ← CARDINAL[pixelVectorPtr.bufferIM.lengthInBytes];
toStopIndexPlusOne ← CARDINAL[
 bytesNeeded + pixelVectorPtr.bufferIM.lengthInBytes];
IF pixelVectorPtr.firstBuffer AND pixelVectorPtr.oddByte THEN {
 toStartIndex ← toStartIndex + 1;
 toStopIndexPlusOne ← toStopIndexPlusOne + 1};
[] ← ByteBlt.ByteBlt[
 from: [
 blockPointer: LOOPHOLE[h.pc.ipBufferPtr], startIndex: h.pc.ipByteIndex,
 stopIndexPlusOne: (h.pc.ipByteIndex + CARDINAL[bytesNeeded])],
 to: [
 blockPointer: LOOPHOLE[pixelVectorPtr.bufferIM.pointer],
 startIndex: toStartIndex, stopIndexPlusOne: toStopIndexPlusOne],
 overLap: move];

h.pc.sequenceLength.lc ← h.pc.sequenceLength.lc - bytesNeeded;
h.pc.ipByteIndex ← h.pc.ipByteIndex + CARDINAL[bytesNeeded];
pixelVectorPtr.bufferIM.lengthInBytes ←
 bytesNeeded + pixelVectorPtr.bufferIM.lengthInBytes;
bytesNeeded ←
 pixelVectorPtr.bufferIM.bufferSizeInBytes -
  pixelVectorPtr.bufferIM.lengthInBytes;

IF needNextBlock THEN
 RETURN[newBlock: TRUE, sequenceContinued: FALSE, lookAheadAgain: FALSE];

IF boundaryCrossing THEN {
 IF h.pc.sequenceLength.lc <= h.remainingBytesInBlock THEN {
  lastBuffer ← TRUE;
  IF h.pc.sequenceLength.lc < bytesNeeded THEN
   bytesNeeded ← h.pc.sequenceLength.lowbits}
 ELSE {
  lastBuffer ← FALSE;
  IF h.remainingBytesInBlock < bytesNeeded THEN
   bytesNeeded ← h.remainingBytesInBlock;
  needNextBlock ← TRUE};
 h.pc.ipBufferPtr ←
  h.pc.ipBufferPtr + (h.pc.ipStopIndexPlusOne / Environment.bytesPerWord);
 h.pc.ipByteIndex ← 0;
 h.pc.ipStopIndexPlusOne ← Inline.LowHalf[h.remainingBytesInBlock];
 h.remainingBytesInBlock ← 0;
 toStartIndex ← CARDINAL[pixelVectorPtr.bufferIM.lengthInBytes];
```

Copyright © 1992 Xerox Corporation All Rights Reserved

```
toStopIndexPlusOne ← CARDINAL[
 bytesNeeded + pixelVectorPtr.bufferIM.lengthInBytes];
IF pixelVectorPtr.firstBuffer AND pixelVectorPtr.oddByte THEN {
 toStartIndex ← toStartIndex + 1;
 toStopIndexPlusOne ← toStopIndexPlusOne + 1};
[] ← ByteBlt.ByteBlt[
 from: [
 blockPointer: LOOPHOLE[h.pc.ipBufferPtr], startIndex: h.pc.ipByteIndex,
 stopIndexPlusOne: (h.pc.ipByteIndex + CARDINAL[bytesNeeded])],
 to: [
 blockPointer: LOOPHOLE[pixelVectorPtr.bufferIM.pointer],
 startIndex: toStartIndex, stopIndexPlusOne: toStopIndexPlusOne],
 overLap: move];
h.pc.ipByteIndex ← h.pc.ipByteIndex + CARDINAL[bytesNeeded];
h.pc.sequenceLength.lc ← h.pc.sequenceLength.lc - bytesNeeded;
pixelVectorPtr.bufferIM.lengthInBytes ←
 bytesNeeded + pixelVectorPtr.bufferIM.lengthInBytes;
};

IF pixelVectorPtr.firstBuffer THEN {
 bytesNeeded1 ←
  pixelVectorPtr.bufferIM.bufferSizeInBytes -
   (pixelVectorPtr.bufferIM.lengthInBytes +
    (pixelEncodingOffset * Environment.bytesPerWord));
 IF pixelVectorPtr.oddByte THEN bytesNeeded1 ← bytesNeeded1 - 1}
ELSE
 bytesNeeded1 ←
  pixelVectorPtr.bufferIM.bufferSizeInBytes -
   pixelVectorPtr.bufferIM.lengthInBytes;
IF bytesNeeded1 # 0 THEN {
 pixelVectorPtr.continuedAgain ← TRUE;
 IF h.pc.sequenceLength.lc = 0 THEN {
  IF h.pc.ipByteIndex = h.pc.ipStopIndexPlusOne THEN
   RETURN[newBlock: TRUE, sequenceContinued: FALSE, lookAheadAgain: TRUE]
  ELSE
   RETURN[
    newBlock: FALSE, sequenceContinued: FALSE, lookAheadAgain: TRUE]}}
ELSE {
 tempBufferDesc ← [
  next: NIL,
  base: LOOPHOLE[pixelVectorPtr.bufferIM.pointer, LONG POINTER],
  allocateSize: ResMgrStorage.PagesFromBytes[
  pixelVectorPtr.bufferIM.lengthInBytes], extendByPages: 0];
 tempBufferList ← @tempBufferDesc;
 IM.TransmitPixelBufferList[
  installHandle: pixelVectorPtr.installH, bufferList: tempBufferList,
  continueDataLengthInBytes: 0,
  continueFileSizeInBytes: pixelVectorPtr.continueFileSizeInBytes,
  dataLengthInBytes: pixelVectorPtr.bufferIM.lengthInBytes,
  pixelEncodingOffset: pixelEncodingOffset,
```

Copyright © 1992 Xerox Corporation All Rights Reserved

```
      pixelSequenceType: pixelVectorPtr.pixelSequenceType,
      pixelV0ThroughV3: pixelVectorPtr.pixelV0ThroughV3,
      createContinueFile: TRUE, firstBuffer: pixelVectorPtr.firstBuffer,
      lastBuffer: FALSE, oddByte: oddByte];
     pixelVectorPtr.continuedAgain ← FALSE;
     pixelVectorPtr.continueFileSizeInBytes ← 0;
     h.pc.ipBufferPtr ←
      h.pc.ipBufferPtr + (h.pc.ipByteIndex / Environment.bytesPerWord);
     h.pc.ipStopIndexPlusOne ← h.pc.ipStopIndexPlusOne - h.pc.ipByteIndex;
     h.pc.ipByteIndex ← 0;
     IF pixelVectorPtr.firstBuffer THEN {
      pixelVectorPtr.firstBuffer ← FALSE;
      pixelVectorPtr.pixelEncodingOffset ← 0;
      pixelVectorPtr.oddByte ← FALSE};
     h.pc.operationStage ← 6;
     RETURN[newBlock: FALSE, sequenceContinued: TRUE, lookAheadAgain: FALSE]};
   };
  END;
 GetNextToken: PROCEDURE [h: PreParserCommon.MainHandle]
  RETURNS [newBlock, sequenceContinued: BOOLEAN ← FALSE] =
  BEGIN
  ENABLE UNWIND => NULL;
  pixelVectorPtr: LONG POINTER TO PreParserCommon.PixelVector =
   h.stackEntry.pixelVectorPtr;
  IF h.pc.ipByteIndex = h.pc.ipStopIndexPlusOne THEN RETURN[TRUE, FALSE];
  IF pixelVectorPtr.currentTokenBytes = 0 THEN {
   h.pc.tokenOverlay.bytes[0] ← h.pc.ipBufferPtr[h.pc.ipByteIndex];
   pixelVectorPtr.currentTokenBytes ← 1;
   IF h.pc.tokenOverlay.sequence.sequenceType # sequenceContinued THEN
    RETURN[FALSE, FALSE];
   h.pc.ipByteIndex ← h.pc.ipByteIndex + 1;
   IF h.pc.ipByteIndex = h.pc.ipStopIndexPlusOne THEN RETURN[TRUE, FALSE]};
  WITH token: h.pc.tokenOverlay.token SELECT FROM
   shortSequence =>
    h.pc.sequenceLength.lc ← h.pc.ipBufferPtr[h.pc.ipByteIndex];
   longSequence => {
    IF pixelVectorPtr.currentTokenBytes <= 1 THEN {
     h.pc.sequenceLength.highbits ← h.pc.ipBufferPtr[h.pc.ipByteIndex];
     pixelVectorPtr.currentTokenBytes ← 2;
     h.pc.ipByteIndex ← h.pc.ipByteIndex + 1;
     IF h.pc.ipByteIndex = h.pc.ipStopIndexPlusOne THEN RETURN[TRUE, FALSE]};
    IF pixelVectorPtr.currentTokenBytes <= 2 THEN {
     h.pc.sequenceLength.bytes[0] ← h.pc.ipBufferPtr[h.pc.ipByteIndex];
     pixelVectorPtr.currentTokenBytes ← 3;
     h.pc.ipByteIndex ← h.pc.ipByteIndex + 1;
     IF h.pc.ipByteIndex = h.pc.ipStopIndexPlusOne THEN RETURN[TRUE, FALSE]};
    IF pixelVectorPtr.currentTokenBytes <= 3 THEN
     h.pc.sequenceLength.bytes[1] ← h.pc.ipBufferPtr[h.pc.ipByteIndex];
    };
   ENDCASE => RETURN[FALSE, FALSE];
```

Copyright © 1992 Xerox Corporation All Rights Reserved

```
 h.pc.ipByteIndex ← h.pc.ipByteIndex + 1;
 h.pc.pcm.action ← h.pc.actionArrayPtr[sequence];
 pixelVectorPtr.currentTokenBytes ← 0;
 RETURN[FALSE, TRUE];
 END;
TryInMemoryPixelVector: PUBLIC PROC [
 h: PreParserCommon.MainHandle, pv: PreParserCommon.PixelVectorPtr]
 RETURNS [succesful: BOOLEAN ← FALSE] = {
 IF IsPixelVectorInkWellCandidate[pv] THEN {
  pixelLengthInBytes: CARDINAL = CARDINAL[pv.pixelLengthInBytes];
  numberOfScanLines: CARDINAL =
   pixelLengthInBytes / PreParserColor.PaddedInkWellBytesPerScanLine;
  replicateIndex: CARDINAL ← pixelLengthInBytes;
  timesReplicated: CARDINAL ←
   ((PreParserColor.InkWellNumberOfScanLines / numberOfScanLines) - 1);
  bytesToCopy: CARDINAL ← MIN[
   pixelLengthInBytes, (h.pc.ipStopIndexPlusOne - h.pc.ipByteIndex)];
  IF pv.inMemoryReferencePtr = NIL THEN {
   h.pc.pcm.nodeSizeInWords ← ParserCommon.WordsFromBytes[
    PreParserColor.InMemorySizeThreshold];
   h.pc.pcm.zoneRecPtr ← @h.zone;
   IF IPMicrocode.CALL[IPFunction.AllocateNodeNFL, h].result # 0 THEN
    SIGNAL ExtendZone;
   pv.inMemoryReferencePtr ← LOOPHOLE[h.pc.pcm.nodePtr,
    PreParserCommon.ByteSeq];
   h.tempData.bytesCopied ← 0;
   };
  FOR i: CARDINAL IN [h.tempData.bytesCopied..bytesToCopy) DO
   pv.inMemoryReferencePtr[i] ← h.pc.ipBufferPtr[h.pc.ipByteIndex];
   h.pc.ipByteIndex ← h.pc.ipByteIndex + 1;
   ENDLOOP;
  IF pixelLengthInBytes > bytesToCopy THEN {
   h.tempData.bytesCopied ← bytesToCopy; SIGNAL NeedIPBlock};
  FOR i: CARDINAL IN [0..timesReplicated) DO
   FOR j: CARDINAL IN [0..pixelLengthInBytes) DO
    pv.inMemoryReferencePtr[replicateIndex] ← pv.inMemoryReferencePtr[j];
    replicateIndex ← replicateIndex + 1;
    ENDLOOP;
   ENDLOOP;
  pv.inMemory ← TRUE;
  RETURN[succesful: TRUE];
  };
 };

ValidNumberOfScanLines: PROC [numberOfScanLines: LONG CARDINAL]
 RETURNS [BOOLEAN] = INLINE {
 SELECT numberOfScanLines FROM
  1, 2, 4, 8, PreParserColor.InkWellNumberOfScanLines => RETURN[TRUE];
  ENDCASE => RETURN[FALSE];
 };
```

Copyright © 1992 Xerox Corporation All Rights Reserved

```
IsPixelVectorInkWellCandidate: PROC [pv: PreParserCommon.PixelVectorPtr]
 RETURNS [BOOLEAN] = {
 WITH vec: pv.pixelV0ThroughV3 SELECT pv.pixelSequenceType FROM
  packed = > {
   numberOfScanLines: LONG CARDINAL =
    pv.pixelLengthInBytes / PreParserColor.PaddedInkWellBytesPerScanLine;
   RETURN[
    (pv.pixelLengthInBytes < = PreParserColor.InMemorySizeThreshold)
     AND (vec.scanLength = PreParserColor.InkWellScanLineLength)
     AND ValidNumberOfScanLines[numberOfScanLines]];
   };
  ENDCASE = > RETURN[FALSE];
 };

TransIMToPreParserError: PROC [imfault: IM.FaultCode]
 RETURNS [transError: PreParserMainErrors.InternalErrorCode] = {
 transError ←
  SELECT imfault FROM
   12 = > PreParserMainErrors.imageInstallDirError,
   19 = > PreParserMainErrors.imageInstallError,
   72 = > PreParserMainErrors.insufficientDiskSpace,
   80 = > PreParserMainErrors.rasterDirectoryFull,
   110 = > PreParserMainErrors.insufficientMemory,
   112 = > PreParserMainErrors.imageInstallNotAvailable,
   ENDCASE = > PreParserMainErrors.imageInstallOtherError;
 };

InstallPixelArray: PUBLIC PROC [
 h: PreParserCommon.MainHandle, pa: PreParserCommon.PixelArrayPtr] = {
 IF NOT pa.pv.installed THEN {
  buffer: IM.Buffer;
  installSuccessful: BOOLEAN ← FALSE;
  createInstallAttemptCount, faultCode: CARDINAL ← 0;
  imError: PreParserMainErrors.InternalErrorCode;
  installIMHandle: IM.InstallHandle ← IM.NullInstallHandle;
  pv: PreParserCommon.PixelVectorPtr ← pa.pv;
  rasterID: RasterDirectorySupervisor.ID ← RasterDirectorySupervisor.nullID;
  installed: BOOLEAN ← FALSE;
  imageInstallCompleted: CONDITION;
  NotifyInstallComplete: INTERNAL PROC [] = {
   ENABLE UNWIND = > NULL; installed ← TRUE; NOTIFY imageInstallCompleted};
  WaitForInstallComplete: ENTRY PROC [] = {
   ENABLE UNWIND = > NULL;
   UNTIL installed DO WAIT imageInstallCompleted; ENDLOOP};
  InstallCompleteProc: ENTRY IM.InstallStatusProcType = {
   ENABLE UNWIND = > NULL;
   WITH installStatus SELECT FROM
    completed = > {rasterID ← id; installSuccessful ← TRUE};
    imError = > {
```

Copyright © 1992 Xerox Corporation All Rights Reserved

```
      imError ← TransIMToPreParserError[fault]; faultCode ← fault};
     dirError = > {
      imError ← PreParserMainErrors.imageInstallDirError;
      faultCode ← fault};
     ENDCASE;
   NotifyInstallComplete[]};
  AbortInstall: PROC [
   abortError: PreParserMainErrors.InternalErrorCode,
   abortFaultCode: CARDINAL] = {
   IF installIMHandle # IM.NullInstallHandle THEN
    IM.AbortPreParserInstall[installIMHandle];
   WaitForInstallComplete[];
   SIGNAL InstallFailed[abortError, abortFaultCode]};
  BEGIN
  ENABLE
   IM.Error = > {
    imError ← TransIMToPreParserError[fault];
    IF imError = PreParserMainErrors.imageInstallNotAvailable THEN {
     createInstallAttemptCount ← createInstallAttemptCount + 1;
     IF createInstallAttemptCount < 6 THEN RETRY
     ELSE imError ← PreParserMainErrors.imageInstallNotAvailable;
     };
    faultCode ← fault;
    GOTO abortInstall;
    };
  installIMHandle ← IM.CreateInstall[
   clientId: [captureIP, imageInstall],
   installStatusProc: InstallCompleteProc,
   fileSizeInBytesHint: pv.pixelLengthInBytes,
   maxBlockSizeInBytes: pv.pixelLengthInBytes];
  buffer ← IM.AcquireBuffer[
   installHandle: installIMHandle,
   allocateBufferSizeInBytes: pv.pixelLengthInBytes,
   waitTillAvailable: TRUE];
  IF buffer.pointer = NIL THEN
   AbortInstall[
    abortError: PreParserMainErrors.imageInstallAcqBufferError,
    abortFaultCode: 56]
  ELSE {
   bufferDesc: ResMgrStorage.BufferDescriptor ← [
    next: NIL, base: NARROW[buffer.pointer],
    allocateSize: ResMgrStorage.PagesFromBytes[pv.pixelLengthInBytes],
    extendByPages: 0];
   transformation: Transformation.Matrix;
   PreParserTForm.ConvertPPCTransToTMatrix[pa.m, @transformation];
   Inline.LongCOPY[
    from: pv.inMemoryReferencePtr,
    nwords: ParserCommon.WordsFromBytes[CARDINAL[pv.pixelLengthInBytes]],
    to: buffer.pointer];
   IM.TransmitPixelBufferList[
```

Copyright © 1992 Xerox Corporation All Rights Reserved

```
      installHandle: installIMHandle, bufferList: @bufferDesc, oddByte: FALSE,
      dataLengthInBytes: pv.pixelLengthInBytes, pixelEncodingOffset: 0,
      pixelSequenceType: packed, pixelV0ThroughV3: pv.pixelV0ThroughV3,
      lastBuffer: TRUE, firstBuffer: TRUE];
     IM.TransmitPixelVectorInfo[
      installHandle: installIMHandle, transformation: transformation,
      imageType: ipPixelVector,
      pixelArrayLengthInBytes: pv.pixelLengthInBytes, xScale: 0, yScale: 0,
      xPixel: pa.xPixels, yPixel: pa.yPixels];
     WaitForInstallComplete[];
     IF NOT installSuccessful THEN
      SIGNAL InstallFailed[imError, LOOPHOLE[faultCode]];
     pv.installed ← TRUE;
     pv.transmitPixelVectorInfo ← FALSE;
     pa.resInfoObjectID ← pv.resInfoObjectID ← rasterID;
     };
    EXITS
     abortInstall =>
      AbortInstall[abortError: imError, abortFaultCode: faultCode];
    END;
   };
  };

 StartupPixelVectorInstall: PUBLIC PROC [
  h: PreParserCommon.MainHandle, pv: PreParserCommon.PixelVectorPtr] = {
  IF NOT pv.installed THEN {
   buffer: IM.Buffer;
   createInstallAttemptCount, faultCode: CARDINAL ← 0;
   imError: PreParserMainErrors.InternalErrorCode;
   installIMHandle: IM.InstallHandle ← IM.NullInstallHandle;
   BEGIN
   ENABLE
    IM.Error => {
     imError ← TransIMToPreParserError[fault];
     IF imError = PreParserMainErrors.imageInstallNotAvailable THEN {
      createInstallAttemptCount ← createInstallAttemptCount + 1;
      IF createInstallAttemptCount < 6 THEN RETRY
      ELSE imError ← PreParserMainErrors.imageInstallNotAvailable;
      };
     SIGNAL InstallFailed[imError, fault];
     };
   installIMHandle ← IM.CreateInstall[
    clientId: [captureIP, imageInstall],
    installStatusProc: PreParserColor.ReportInstallStatus,
    fileSizeInBytesHint: pv.pixelLengthInBytes,
    maxBlockSizeInBytes: pv.pixelLengthInBytes];
   pv.installH ← installIMHandle;
   PreParserColor.AddNode[hPageHandle: h];
   buffer ← IM.AcquireBuffer[
    installHandle: installIMHandle,
```

Copyright © 1992 Xerox Corporation All Rights Reserved

```
    allocateBufferSizeInBytes: pv.pixelLengthInBytes,
    waitTillAvailable: TRUE];
   IF buffer.pointer = NIL THEN {
    IM.AbortPreParserInstall[installIMHandle];
    SIGNAL InstallFailed[PreParserMainErrors.imageInstallAcqBufferError, 56];
    }
   ELSE {
    bufferDesc: ResMgrStorage.BufferDescriptor ← [
     next: NIL, base: NARROW[buffer.pointer],
     allocateSize: ResMgrStorage.PagesFromBytes[pv.pixelLengthInBytes],
     extendByPages: 0];
    Inline.LongCOPY[
     from: pv.inMemoryReferencePtr,
     nwords: ParserCommon.WordsFromBytes[CARDINAL[pv.pixelLengthInBytes]],
     to: buffer.pointer];
    h.pc.pcm.zoneRecPtr ← @h.zone;
    h.pc.pcm.nodePtr ← pv.inMemoryReferencePtr;
    [] ← IPMicrocode.CALL[IPFunction.FreeNodeNFL, h];
    pv.inMemoryReferencePtr ← NIL;
    pv.inMemory ← FALSE;
    pv.installed ← pv.transmitPixelVectorInfo ← pv.firstBuffer ← TRUE;
    buffer.lengthInBytes ← pv.pixelLengthInBytes;
    pv.bufferIM ← buffer;
    };
   END;
  };
 };

END.
```

Copyright © 1992 Xerox Corporation All Rights Reserved

```
DIRECTORY
 BlockStream USING [Block, StreamHandle],
 Environment USING [bytesPerPage, wordsPerPage],
 Inline USING [HighHalf],
 MemoryPartitions USING [GetStaticPages],
 PreParser USING [JobProceedDataPtr],
 PreParserCallBack USING [
  ObjectFault, Problem, ReportObjectFault, Severity, SoftwareProblem],
 PreParserCommon USING [MainHandle],
 PreParserControl USING [
  Handle, IPBlockEntryStatus, IPBlockListEntry, MainHandle, ManagerStatus,
  PageEntryStatus, PageListEntry, PageHandle, preParserZone, SIFResult,
  SIFResultPtr],
 PreParserMain USING [GetAllocSizes],
 PreParserSetup USING [nominalIPBlockSize, SetupPageList],
 ResMgr USING [Allocate, Error, FreeBufferList],
 ResMgrIDs USING [TransactionID, ModuleID],
 ResMgrStorage USING [BufferList, Pages];

PreParserSetupImpl: PROGRAM
 IMPORTS
  Inline, MemoryPartitions, PreParserCallBack, PreParserControl, PreParserMain,
  PreParserSetup, ResMgr
 EXPORTS PreParserSetup =
 BEGIN

 IPBlockContext: PUBLIC TYPE = PreParserControl.IPBlockListEntry;
 IPBlockHandle: TYPE = LONG POINTER TO IPBlockContext;
 PageHandle: TYPE = LONG POINTER TO PreParserControl.PageListEntry;

 Initialize: PUBLIC PROCEDURE [] RETURNS [] = BEGIN END;

 NilContextPtrs: PROCEDURE [mainHandle: PreParserControl.MainHandle] RETURNS [] =
  BEGIN
  h: PreParserCommon.MainHandle ← LOOPHOLE[mainHandle];

  h.pc.pcm.nodePtr ← NIL;
  h.pc.pcm.memoryHandle ← NIL;
  h.pc.pcm.currentPageHandle ← NIL;
  h.pc.pcm.handle ← NIL;
  h.pc.pcm.currentBlockPtr ← NIL;
  h.pc.pcm.nextIIPWordPtr ← NIL;
  h.pc.pcm.zoneRecPtr ← NIL;

  h.pc.ipBufferPtr ← NIL;
  h.pc.actionArrayPtr ← NIL;
  h.pc.rBraceActionRecordPtr ← NIL;

  h.fGetFramePtr ← NIL;
```

Copyright © 1992 Xerox Corporation All Rights Reserved

```
h.framePtr ← NIL;
h.nodeList ← NIL;
h.stackEntryPtr ← NIL;
h.tokenSizes ← NIL;
h.topStackRecordPtr ← NIL;

h.bufferPtr ← NIL;
h.bitMapLookedUpPtr ← NIL;
h.bitMapEntryPtr ← NIL;
h.bitMapTablePtrCurrent ← NIL;
h.bitMapTablePtrStart ← NIL;
h.composedOpBlockPtr ← NIL;
h.finishingOption ← NIL;
h.foundFontChain ← NIL;
h.jobMediaDataPtr ← NIL;
h.lastFontLookUpRecPtr ← NIL;
h.mainZoneRecPtr ← NIL;
h.mediaSelectOption ← NIL;
h.mgrZoneRecPtr ← NIL;
h.nextIIPWordPtr ← NIL;
h.onSimplexOption ← NIL;
h.pageResultsPtr ← NIL;
h.proceedDataPtr ← NIL;
h.startResultsPtr ← NIL;
h.statusPtr ← NIL;
h.tempFramePtr ← NIL;
h.tempVectorPtr ← NIL;
h.unknownFontLookedUpPtr ← NIL;
h.unknownFontEntryPtr ← NIL;
h.unknownFontTablePtrStart ← NIL;
h.unknownFontTablePtrCurrent ← NIL;

END;

SetupPageList: PUBLIC PROCEDURE [handle: PreParserControl.Handle]
 RETURNS [status: PreParserControl.ManagerStatus] =
 BEGIN
 previousPageEntry, pageEntry: PageHandle;
 mcb, r, n, s: LONG CARDINAL;

 status ← [ready[]];

 r ← PreParserSetup.nominalIPBlockSize + PreParserSetup.nominalIPBlockSize;

 s ← handle.managerContextSize + handle.jobZoneBlockSize;

 n ← MemoryPartitions.GetStaticPages[
  id: [trans: handle.transactionID, module: preParse]];
 IF (r + s) >= n THEN {
  handle.objectFault.problem ← [unrecoverableSoftwareProblem[pageInitError]];
```

Copyright © 1992 Xerox Corporation All Rights Reserved

```
handle.objectFault.severity ← systemError;
handle.objectFault.side ← simplex;
handle.objectFault.sheetNumber ← 0;
handle.objectFault.copyNumber ← 0;
PreParserCallBack.ReportObjectFault[
 context: handle.jobProceedDataPtr.clientContext,
 objectFault: handle.objectFault];
status ← [error[fault: handle.objectFault, ph: NIL]];
RETURN;
};

n ← (n - r - s) / s;

IF n < 1 THEN {
 handle.objectFault.problem ← [unrecoverableSoftwareProblem[pageInitError]];
 handle.objectFault.severity ← systemError;
 handle.objectFault.side ← simplex;
 handle.objectFault.sheetNumber ← 0;
 handle.objectFault.copyNumber ← 0;
 PreParserCallBack.ReportObjectFault[
  context: handle.jobProceedDataPtr.clientContext,
  objectFault: handle.objectFault];
 status ← [error[fault: handle.objectFault, ph: NIL]];
 RETURN;
 };

IF n > 2 THEN n ← 2;

THROUGH [1..n] DO
 pageEntry ← handle.pageList;
 previousPageEntry ← pageEntry;

 UNTIL pageEntry.status = needSetup DO
  IF pageEntry.fwdLink = NIL THEN {
   pageEntry.fwdLink ← PreParserControl.preParserZone.NEW[
    PreParserControl.PageListEntry];
   pageEntry.fwdLink ↑ ← [
    fwdLink: NIL, contextSize: 0, currentIPBlock: NIL,
    currentIIPBlock: [NIL, 0, 0], firstIIPBlock: TRUE, frame: NIL,
    freeNodeList: NIL, iipBlockStream: NIL, logicalPageNumber: 0,
    mainSystemsError: FALSE, mediaIndex: 0, pageStartOffset: 0,
    pageContextBuffer: NIL, pageResultsPtr: NIL, plex: simplex,
    ptrToPageContext: NIL, sheetNumber: 0, side: simplex,
    sifInfoDest: NIL, sifInfoList: NIL, status: needSetup, tFormIndex: 0,
    zoneBlockSize: 0, zoneSegListEnd: NIL, zoneSegListStart: NIL];
   handle.numberOfPageEntrys ← handle.numberOfPageEntrys + 1;
   };
  previousPageEntry ← pageEntry;
  pageEntry ← pageEntry.fwdLink;
  ENDLOOP;
```

Copyright © 1992 Xerox Corporation All Rights Reserved

```
pageEntry.status ← ready;
[contextSizeInWords: pageEntry.contextSize,
 zoneBlockSizeInPages: pageEntry.zoneBlockSize] ←
 PreParserMain.GetAllocSizes[];

pageEntry.contextSize ←
 ((pageEntry.contextSize + Environment.wordsPerPage - 1) /
  Environment.wordsPerPage);
pageEntry.pageContextBuffer ← ResMgr.Allocate[
 id: [trans: handle.transactionID, module: preParse],
 Pages: pageEntry.contextSize, waitTillAvailable: TRUE !
 ResMgr.Error = > {pageEntry.pageContextBuffer ← NIL; CONTINUE}];
IF pageEntry.pageContextBuffer = NIL THEN {
 handle.objectFault.problem ← [
  unrecoverableSoftwareProblem[pageInitError]];
 handle.objectFault.severity ← systemError;
 handle.objectFault.side ← simplex;
 handle.objectFault.sheetNumber ← 0;
 handle.objectFault.copyNumber ← 0;
 PreParserCallBack.ReportObjectFault[
  context: handle.jobProceedDataPtr.clientContext,
  objectFault: handle.objectFault];
 status ← [error[fault: handle.objectFault, ph: NIL]];
 GOTO exitInit;
 };
mcb ← LOOPHOLE[pageEntry.pageContextBuffer.base, LONG CARDINAL];
r ← LONG[(pageEntry.contextSize * Environment.wordsPerPage)];
n ← mcb + r - 1;
IF Inline.HighHalf[n] # Inline.HighHalf[mcb] THEN {
 ResMgr.FreeBufferList[
  id: [trans: handle.transactionID, module: preParse],
  buffer: pageEntry.pageContextBuffer ! ResMgr.Error = > CONTINUE];
 pageEntry.pageContextBuffer ← NIL;
 };

pageEntry.zoneSegListStart ← ResMgr.Allocate[
 id: [trans: handle.transactionID, module: preParse],
 Pages: pageEntry.zoneBlockSize, waitTillAvailable: TRUE !
 ResMgr.Error = > {pageEntry.zoneSegListStart ← NIL; CONTINUE}];
IF pageEntry.zoneSegListStart = NIL THEN {
 handle.objectFault.problem ← [
  unrecoverableSoftwareProblem[pageInitError]];
 handle.objectFault.severity ← systemError;
 handle.objectFault.side ← simplex;
 handle.objectFault.sheetNumber ← 0;
 handle.objectFault.copyNumber ← 0;
 PreParserCallBack.ReportObjectFault[
  context: handle.jobProceedDataPtr.clientContext,
  objectFault: handle.objectFault];
```

Copyright © 1992 Xerox Corporation All Rights Reserved

```
   status ← [error[fault: handle.objectFault, ph: NIL]];
   GOTO exitInit;
   };
  pageEntry.zoneSegListEnd ← pageEntry.zoneSegListStart;

  IF pageEntry.pageContextBuffer = NIL THEN {
   pageEntry.pageContextBuffer ← ResMgr.Allocate[
    id: [trans: handle.transactionID, module: preParse],
    Pages: pageEntry.contextSize, waitTillAvailable: TRUE !
    ResMgr.Error = > {pageEntry.pageContextBuffer ← NIL; CONTINUE}];
   IF pageEntry.pageContextBuffer = NIL THEN {
    handle.objectFault.problem ← [
     unrecoverableSoftwareProblem[pageInitError]];
    handle.objectFault.severity ← systemError;
    handle.objectFault.side ← simplex;
    handle.objectFault.sheetNumber ← 0;
    handle.objectFault.copyNumber ← 0;
    PreParserCallBack.ReportObjectFault[
     context: handle.jobProceedDataPtr.clientContext,
     objectFault: handle.objectFault];
    status ← [error[fault: handle.objectFault, ph: NIL]];
    GOTO exitInit;
    };
   mcb ← LOOPHOLE[pageEntry.pageContextBuffer.base, LONG CARDINAL];
   r ← LONG[(pageEntry.contextSize * Environment.wordsPerPage)];
   n ← mcb + r - 1;
   IF Inline.HighHalf[n] # Inline.HighHalf[mcb] THEN {
    handle.objectFault.problem ← [
     unrecoverableSoftwareProblem[pageInitError]];
    handle.objectFault.severity ← systemError;
    handle.objectFault.side ← simplex;
    handle.objectFault.sheetNumber ← 0;
    handle.objectFault.copyNumber ← 0;
    PreParserCallBack.ReportObjectFault[
     context: handle.jobProceedDataPtr.clientContext,
     objectFault: handle.objectFault];
    status ← [error[fault: handle.objectFault, ph: NIL]];
    GOTO exitInit;
    };
   };
  pageEntry.ptrToPageContext ← pageEntry.pageContextBuffer.base;
  NilContextPtrs[mainHandle: pageEntry.ptrToPageContext];
  ENDLOOP;
 pageEntry ← handle.pageList;
 UNTIL pageEntry = NIL DO
  pageEntry.status ← needSetup; pageEntry ← pageEntry.fwdLink; ENDLOOP;
 status ← [initialized[]];

 EXITS exitInit = > {};
```

Copyright © 1992 Xerox Corporation All Rights Reserved

```
END;

SetupPreParser: PUBLIC PROCEDURE [handle: PreParserControl.Handle]
 RETURNS [status: PreParserControl.ManagerStatus] =
 BEGIN
 currentBlock: IPBlockHandle;
 mcb, r, n: LONG CARDINAL;
 initError: BOOLEAN;

 status ← [ready[]];

 currentBlock ← handle.ipBlockList;
 currentBlock.ipBuffer ← ResMgr.Allocate[
  id: [trans: handle.transactionID, module: preParse],
  Pages: PreParserSetup.nominalIPBlockSize, waitTillAvailable: TRUE !
  ResMgr.Error => {currentBlock.ipBuffer ← NIL; CONTINUE}];
 IF handle.ipBlockList.ipBuffer # NIL THEN {
  currentBlock.block.blockPointer ← currentBlock.ipBuffer.base;
  currentBlock.block.startIndex ← 0;
  currentBlock.block.stopIndexPlusOne ←
   (currentBlock.ipBuffer.allocateSize * Environment.bytesPerPage);
  currentBlock.status ← atPreParser;
  }
 ELSE {
  handle.objectFault.problem ← [unrecoverableSoftwareProblem[pageInitError]];
  handle.objectFault.severity ← systemError;
  handle.objectFault.side ← simplex;
  handle.objectFault.sheetNumber ← 0;
  handle.objectFault.copyNumber ← 0;
  PreParserCallBack.ReportObjectFault[
   context: handle.jobProceedDataPtr.clientContext,
   objectFault: handle.objectFault];
  status ← [error[fault: handle.objectFault, ph: NIL]];
  RETURN;
  };

 currentBlock ← currentBlock.fwdLink;
 currentBlock.ipBuffer ← ResMgr.Allocate[
  id: [trans: handle.transactionID, module: preParse],
  Pages: PreParserSetup.nominalIPBlockSize, waitTillAvailable: TRUE !
  ResMgr.Error => {currentBlock.ipBuffer ← NIL; CONTINUE}];
 IF handle.ipBlockList.ipBuffer # NIL THEN {
  currentBlock.block.blockPointer ← currentBlock.ipBuffer.base;
  currentBlock.block.startIndex ← 0;
  currentBlock.block.stopIndexPlusOne ←
   (currentBlock.ipBuffer.allocateSize * Environment.bytesPerPage);
  currentBlock.status ← atPreParser;
  }
 ELSE {
  handle.objectFault.problem ← [unrecoverableSoftwareProblem[pageInitError]];
```

Copyright © 1992 Xerox Corporation All Rights Reserved

```
  handle.objectFault.severity ← systemError;
  handle.objectFault.side ← simplex;
  handle.objectFault.sheetNumber ← 0;
  handle.objectFault.copyNumber ← 0;

  PreParserCallBack.ReportObjectFault[
   context: handle.jobProceedDataPtr.clientContext,
   objectFault: handle.objectFault];

  status ← [error[fault: handle.objectFault, ph: NIL]];
  RETURN;
  };

 initError ← FALSE;
 [contextSizeInWords: handle.managerContextSize,
  zoneBlockSizeInPages: handle.jobZoneBlockSize] ←
  PreParserMain.GetAllocSizes[];

 handle.managerContextSize ←
  ((handle.managerContextSize + Environment.wordsPerPage - 1) /
   Environment.wordsPerPage);
 handle.managerContextBuffer ← ResMgr.Allocate[
  id: [trans: handle.transactionID, module: preParse],
  Pages: handle.managerContextSize, waitTillAvailable: TRUE !
  ResMgr.Error => {handle.managerContextBuffer ← NIL; CONTINUE}];
 IF handle.managerContextBuffer = NIL THEN {
  handle.objectFault.problem ← [unrecoverableSoftwareProblem[pageInitError]];
  handle.objectFault.severity ← systemError;
  handle.objectFault.side ← simplex;
  handle.objectFault.sheetNumber ← 0;
  handle.objectFault.copyNumber ← 0;
  PreParserCallBack.ReportObjectFault[
   context: handle.jobProceedDataPtr.clientContext,
   objectFault: handle.objectFault];
  status ← [error[fault: handle.objectFault, ph: NIL]];
  RETURN;
  };
 mcb ← LOOPHOLE[handle.managerContextBuffer.base, LONG CARDINAL];
 r ← LONG[(handle.managerContextSize * Environment.wordsPerPage)];
 n ← mcb + r - 1;
 IF Inline.HighHalf[n] # Inline.HighHalf[mcb] THEN {
  ResMgr.FreeBufferList[
   id: [trans: handle.transactionID, module: preParse],
   buffer: handle.managerContextBuffer ! ResMgr.Error => CONTINUE];
  handle.managerContextBuffer ← NIL;
  };

 handle.jobZoneSegListStart ← ResMgr.Allocate[
  id: [trans: handle.transactionID, module: preParse],
  Pages: handle.jobZoneBlockSize, waitTillAvailable: TRUE !
```

Copyright © 1992 Xerox Corporation All Rights Reserved

```
  ResMgr.Error => {handle.jobZoneSegListStart ← NIL; CONTINUE}];
 IF handle.jobZoneSegListStart = NIL THEN {
  handle.objectFault.problem ← [unrecoverableSoftwareProblem[pageInitError]];
  handle.objectFault.severity ← systemError;
  handle.objectFault.side ← simplex;
  handle.objectFault.sheetNumber ← 0;
  handle.objectFault.copyNumber ← 0;
  PreParserCallBack.ReportObjectFault[
   context: handle.jobProceedDataPtr.clientContext,
   objectFault: handle.objectFault];
  status ← [error[fault: handle.objectFault, ph: NIL]];
  RETURN;
  };
 handle.jobZoneSegListEnd ← handle.jobZoneSegListStart;

 IF handle.managerContextBuffer = NIL THEN {
  handle.managerContextBuffer ← ResMgr.Allocate[
   id: [trans: handle.transactionID, module: preParse],
   Pages: handle.managerContextSize, waitTillAvailable: TRUE !
   ResMgr.Error => {handle.managerContextBuffer ← NIL; CONTINUE}];
  IF handle.managerContextBuffer = NIL THEN {
   handle.objectFault.problem ← [
    unrecoverableSoftwareProblem[pageInitError]];
   handle.objectFault.severity ← systemError;
   handle.objectFault.side ← simplex;
   handle.objectFault.sheetNumber ← 0;
   handle.objectFault.copyNumber ← 0;
   PreParserCallBack.ReportObjectFault[
    context: handle.jobProceedDataPtr.clientContext,
    objectFault: handle.objectFault];
   status ← [error[fault: handle.objectFault, ph: NIL]];
   RETURN;
   };
  mcb ← LOOPHOLE[handle.managerContextBuffer.base, LONG CARDINAL];
  r ← LONG[(handle.managerContextSize * Environment.wordsPerPage)];
  n ← mcb + r - 1;
  IF Inline.HighHalf[n] # Inline.HighHalf[mcb] THEN {
   handle.objectFault.problem ← [
    unrecoverableSoftwareProblem[pageInitError]];
   handle.objectFault.severity ← systemError;
   handle.objectFault.side ← simplex;
   handle.objectFault.sheetNumber ← 0;
   handle.objectFault.copyNumber ← 0;
   PreParserCallBack.ReportObjectFault[
    context: handle.jobProceedDataPtr.clientContext,
    objectFault: handle.objectFault];
   status ← [error[fault: handle.objectFault, ph: NIL]];
   RETURN;
   };
  };
```

Copyright © 1992 Xerox Corporation All Rights Reserved

```
 handle.ptrToManagerContext ← handle.managerContextBuffer.base;
 NilContextPtrs[mainHandle: handle.ptrToManagerContext];

 status ← PreParserSetup.SetupPageList[handle: handle];

 END;
END.
```

Copyright © 1992 Xerox Corporation All Rights Reserved

```
DIRECTORY
 Ascii USING [SP],
 BlockStream USING [Block, nullBlock],
 ByteBlt USING [ByteBlt],
 Environment USING [bytesPerWord],
 FixedPointReal USING [FromReal, Number],
 Inline USING [HighHalf, LowHalf],
 InternalIP USING [Token],
 IPMicrocode USING [CALL],
 IPFunction USING [
  AllocateNode16, AllocateNode64, AllocateNodeNFL, FreeNode64, FreeNode16,
  PopStack, PrePutToken, PrePushStack],
 PreParser USING [OptionPtr],
 PreParserColor USING [CheckVectorOfIdent, EqualIdentifier, DoColorOperator],
 PreParserCommon USING [
  AllocateNode16Size, Assertion, ComplexNode, ComposedOp, ComposedOpBlock,
  composedOpBlockSize, ComposedOpPtr, FontPtr, FrameEntryRange, FramePtr,
  MainHandle, StackEntry],
 PreParserControl USING [MainStatus],
 PreParserData USING [debug, OperandSimpleRange, OperandType],
 PreParserExtra USING [ISetMesa],
 PreParserFrameStack USING [CleanUpFrames, ComplexNodeRefCount, PushFrame],
 PreParserInstructions USING [
  ProcessContentInstrs, ProcessPrintingInstrs, PushExternalInstructions,
  RunEntry, RunEntryPtr, RunPtr, IdentifierValue],
 PreParserInterpress USING [ImagerVariable],
 PreParserMainErrors USING [
  badMediaIndex, findOperationFailed, invalidOperandTypeOnStack,
  markMissingAtPageEnd, notAnInterpressFile, outputOperatorNotAllowed,
  stackNotEmptyAtPageEnd, unexpectedOperator, unexpectedError,
  unimplementedTypeConversion],
 PreParserMainOps USING [CheckTextVars],
 PreParserSkeleton USING [],
 PublicPrinting USING [
  Plex, RunOfRunOfCardinalRep, RunOfCardinalSeq, RunofRunOfCardinalSeq],
 PreParserTokenContext USING [
  maxExecDepth, RBraceAction, RBraceActionRecordPtr, RBraceOpData],
 Real USING [Float];

PreParserSkeletonImpl: PROGRAM
 IMPORTS
  ByteBlt, FixedPointReal, Inline, IPMicrocode, PreParserColor, PreParserData,
  PreParserExtra, PreParserFrameStack, PreParserInstructions, PreParserMainOps,
  Real
 EXPORTS PreParserSkeleton =
 BEGIN

 AllocateNode16Check: PreParserCommon.Assertion =
  (SIZE[PreParserTokenContext.RBraceOpData] <=
```

Copyright © 1992 Xerox Corporation All Rights Reserved

```
  PreParserCommon.AllocateNode16Size)
  OR (SIZE[PreParserCommon.ComposedOp] <= PreParserCommon.AllocateNode16Size);

enableTScale: BOOLEAN ← FALSE;
CheckIPHeader: PUBLIC PROCEDURE [h: PreParserCommon.MainHandle]
 RETURNS [loop: BOOLEAN] =
 BEGIN
 {
 stopIndex: CARDINAL ← h.pc.ipStopIndexPlusOne - 1;
 IF h.pc.operationStage = 0 THEN {
  IF h.pc.ipStopIndexPlusOne - h.pc.ipByteIndex < 3
   OR h.pc.ipBufferPtr[h.pc.ipByteIndex] # ORD['I]
   OR h.pc.ipBufferPtr[h.pc.ipByteIndex ← h.pc.ipByteIndex + 1] # ORD['n]
   OR h.pc.ipBufferPtr[h.pc.ipByteIndex ← h.pc.ipByteIndex + 1] # ORD['t]
   THEN GOTO failed;
  UNTIL h.pc.ipByteIndex = stopIndex DO
   h.pc.ipByteIndex ← h.pc.ipByteIndex + 1;
   IF h.pc.ipBufferPtr[h.pc.ipByteIndex] = ORD[Ascii.SP] THEN EXIT;
   REPEAT FINISHED => GOTO failed;
   ENDLOOP;

  h.pc.ipByteIndex ← h.pc.ipByteIndex + 1};

 IF PreParserInstructions.PushExternalInstructions[h: h].loop THEN {
  h.pc.pcm.savedAction ← checkIPHeader;
  h.pc.operationStage ← 1;
  RETURN[loop: TRUE];
  };
 RETURN[loop: FALSE];
 EXITS
  failed => {
   h.pc.pcm.action ← fatalError;
   h.pc.pcm.data.code ← PreParserMainErrors.notAnInterpressFile;
   RETURN[loop: TRUE];
   };
 };
 END;

DoOperator: PUBLIC PROCEDURE [h: PreParserCommon.MainHandle]
 RETURNS [loop: BOOLEAN ← TRUE] =
 BEGIN
 h.pc.pcm.savedAction ← h.pc.pcm.action;
 WITH co: h.sv.operand01.composedOpPtr↑ SELECT FROM
  normal => {
   IF h.pc.operationStage < 1 THEN {
    h.pc.pcm.zoneRecPtr ← @h.zone;
    IF IPMicrocode.CALL[
     function: IPFunction.AllocateNode16, entryContext: h].result # 0 THEN
     RETURN;
```

Copyright © 1992 Xerox Corporation All Rights Reserved

```
  h.tempData.rBracePtr ← h.pc.pcm.nodePtr;
  };
 IF h.pc.operationStage < 2 THEN {
  IF PushRBrace[
   h: h, rBraceAction: [endCO[rBraceOpDataPtr: h.tempData.rBracePtr]]]
   THEN {h.pc.operationStage ← 1; RETURN; };

  h.tempData.rBracePtr ↑ ← [
   ipBufferPtr: h.pc.ipBufferPtr, ipByteIndex: h.pc.ipByteIndex,
   ipStopIndexPlusOne: h.pc.ipStopIndexPlusOne,
   ipRemainingBytes: h.remainingBytesInBlock, savedFramePtr: h.framePtr,
   savedFGetFramePtr: h.fGetFramePtr,
   composedOpPtrSave: h.sv.operand01.composedOpPtr,
   composedOpBlockPtrSave: h.composedOpBlockPtr];

  h.fGetFramePtr ← h.framePtr};

 h.framePtr ← co.initialFrame;
 IF PreParserFrameStack.PushFrame[h: h].extendZone THEN {
  h.pc.operationStage ← 2; RETURN; };


 h.framePtr.nextFrame ← h.tempData.rBracePtr.savedFramePtr;

 h.fGetFramePtr ← co.initialFrame;

 h.pc.ipBufferPtr ← LOOPHOLE[@co.first.ipData];
 h.pc.ipStopIndexPlusOne ← 0;
 h.remainingBytesInBlock ← co.first.nBytes;
 h.composedOpBlockPtr ← co.first.next;

 SetUpIPBlock[h: h, newIPBlock: BlockStream.nullBlock];

 h.pc.state ← needLBrace;
 h.pc.nextState ← executing;

 h.pc.operationStage ← 0;
 };
special => {};
knownDecompressor => {
 h.stackEntryPtr ← @h.stackEntry;
 IF IPMicrocode.CALL[function: IPFunction.PopStack, entryContext: h].result
  # 0 THEN RETURN;
 SELECT h.stackEntry.type FROM
  vectorOfElements => {
   h.pc.pcm.data.code ← PreParserMainErrors.unimplementedTypeConversion;
   GOTO fatalError;
   };
  largeVector => {
   h.pc.pcm.data.code ← PreParserMainErrors.findOperationFailed;
```

Copyright © 1992 Xerox Corporation All Rights Reserved

```
      GOTO fatalError;
      };
     ENDCASE => {
      h.pc.pcm.data.code ← PreParserMainErrors.invalidOperandTypeOnStack;
      GOTO fatalError;
      };
    };
   otherDecompressor => {
    h.pc.pcm.data.code ← PreParserMainErrors.findOperationFailed;
    GOTO fatalError;
    };
   colorOpOrModelOp => {
    h.stackEntryPtr ← @h.sv.operand02;
    [] ← IPMicrocode.CALL[function: IPFunction.PopStack, entryContext: h];
    IF h.sv.operand02.type # vectorOfElements THEN {
     h.pc.pcm.data.code ← PreParserMainErrors.unimplementedTypeConversion;
     GOTO fatalError;
     };
    IF co.colorOp THEN {
     IF PreParserColor.DoColorOperator[
      h: h, colorOp: co.colorOpType, params: co.params,
      coords: h.sv.operand02.vectorPtr].loop THEN RETURN;
     PreParserFrameStack.ComplexNodeRefCount[
      h: h, entryPtr: @h.sv.operand02, delta: -1];
     }
    ELSE {co.colorOp ← TRUE; co.params ← h.sv.operand02.vectorPtr; };

    [] ← IPMicrocode.CALL[function: IPFunction.PrePushStack, entryContext: h];
    };
   ENDCASE;
  RETURN[loop: FALSE];
  EXITS fatalError => {h.pc.pcm.action ← fatalError; };
  END;
FindOperator: PUBLIC PROCEDURE [h: PreParserCommon.MainHandle]
  RETURNS [loop: BOOLEAN ← TRUE] =
  BEGIN
  alwaysFail: BOOLEAN ← TRUE;
  IF PreParserColor.CheckVectorOfIdent[h: h].failed THEN RETURN;
  IF h.sv.operand01.vectorPtr.count # 2 THEN GOTO failed;
  h.stackEntryPtr ← @h.sv.operand01.vectorPtr.elements[0];
  IF ~PreParserColor.EqualIdentifier[h: h, s: "Xerox"L] THEN GOTO failed;
  h.stackEntryPtr ← @h.sv.operand01.vectorPtr.elements[1];

  IF ~PreParserColor.EqualIdentifier[h: h, s: "Xxx"L] OR alwaysFail THEN
   GOTO failed;

  h.pc.pcm.zoneRecPtr ← @h.zone;
  IF IPMicrocode.CALL[
   function: IPFunction.AllocateNode16, entryContext: h].result # 0 THEN {
   h.pc.pcm.savedAction ← findOperator; RETURN};
```

Copyright © 1992 Xerox Corporation All Rights Reserved

```
h.stackEntry.type ← composedOp;
h.stackEntry.composedOpPtr ← h.pc.pcm.nodePtr;
h.stackEntry.composedOpPtr.cn ← [
 fill: 0, preambleOwned: FALSE, referenceCount: 1, next: NIL,
 type: composedOp, zoneRecPtr: @h.zone];
h.stackEntry.composedOpPtr.var ← special[operatorType: null];
IF IPMicrocode.CALL[function: IPFunction.PrePushStack, entryContext: h].result
 # 0 THEN {h.pc.pcm.savedAction ← findColor; RETURN; };
RETURN[loop: FALSE];
EXITS
 failed => {
  h.pc.pcm.data.code ← PreParserMainErrors.findOperationFailed;
  h.pc.pcm.action ← fatalError;
  h.tempData.name ← PreParserInstructions.IdentifierValue[
   z: h.smZone, s: @h.sv.operand01, acceptVectors: TRUE];
  };
END;
GetRunOfCardinal: PUBLIC PROCEDURE [
 select: PublicPrinting.RunOfCardinalSeq, sheet: LONG CARDINAL]
 RETURNS [status: BOOLEAN ← FALSE] =
 BEGIN
 endRun, startRun: LONG CARDINAL ← 0;
 pageFound: BOOLEAN ← FALSE;
 FOR selectIndex: CARDINAL ← 0, selectIndex + 2 UNTIL pageFound
  OR (selectIndex >= select.length) DO
  endRun ← endRun + select[selectIndex];
  IF sheet > startRun AND (sheet <= endRun) THEN {
   pageFound ← TRUE; IF select[selectIndex + 1] = 1 THEN status ← TRUE}
  ELSE startRun ← startRun + select[selectIndex];
  ENDLOOP;
 END;
InitContentInstrs: PUBLIC PROCEDURE [h: PreParserCommon.MainHandle] =
 BEGIN
 IF h.pc.state # node THEN {
  h.pc.pcm.action ← fatalError;
  h.pc.pcm.data.code ← PreParserMainErrors.unexpectedOperator;
  };
 h.pc.nextState ← executingNoOutput;
 IF PushRBrace[h: h, rBraceAction: [endContentInstrs[]]] THEN {
  h.pc.pcm.savedAction ← contentInstructions; RETURN; };
 h.pc.pcm.action ← changeState;
 h.pc.pcm.data.newState ← needLBrace;
 END;
LeftBraceMesa: PUBLIC PROCEDURE [h: PreParserCommon.MainHandle] RETURNS [] =
 BEGIN
 SELECT h.pc.state FROM
  startOfMaster => {
   IF h.pc.operationStage = 0 THEN
    IF PushRBrace[h: h, rBraceAction: [endPrintingInstrs[]]] THEN {
     h.pc.pcm.savedAction ← LeftBrace; RETURN; };
```

Copyright © 1992 Xerox Corporation All Rights Reserved

```
    h.pc.pcm.action ← changeState;
    h.pc.pcm.data.newState ← executingNoOutput;
    };
  node, pastContentInstrs => NoteNewPageFound[h: h];
  needLBrace => {
    h.pc.pcm.action ← changeState; h.pc.pcm.data.newState ← h.pc.nextState; };
  skippingBody => {
    IF PushRBrace[h: h, rBraceAction: [endBody[prevState: skippingBody]]] THEN
      {h.pc.pcm.savedAction ← LeftBrace; RETURN[]; };
    h.pc.pcm.action ← PreLoop;
    };
  recordingCO, needBegin => {
    h.pc.pcm.action ← fatalError;
    h.pc.pcm.data.code ← PreParserMainErrors.unexpectedOperator;
    };
  executing, executingInCORRECT => {
    h.pc.pcm.action ← fatalError;
    h.pc.pcm.data.code ← PreParserMainErrors.unexpectedOperator;
    };
  executingNoOutput => {
    h.pc.pcm.action ← fatalError;
    h.pc.pcm.data.code ← PreParserMainErrors.outputOperatorNotAllowed;
    };
  ENDCASE;
 END;
MakeSimpleCO: PUBLIC PROCEDURE [h: PreParserCommon.MainHandle]
 RETURNS [loop: BOOLEAN ← FALSE] =
 BEGIN
 IF h.pc.operationStage < 1 THEN {
  h.pc.pcm.zoneRecPtr ← @h.zone;
  IF IPMicrocode.CALL[
    function: IPFunction.AllocateNode16, entryContext: h].result # 0 THEN
    GOTO retry;
  h.stackEntry.composedOpPtr ← h.pc.pcm.nodePtr;
  h.stackEntry.type ← composedOp;
  };
 IF h.pc.operationStage < 2 THEN
  IF IPMicrocode.CALL[
    function: IPFunction.PrePushStack, entryContext: h].result # 0 THEN {
    h.pc.operationStage ← 1; GOTO retry; };
 IF h.pc.operationStage < 3 THEN {
  currentFramePtr: PreParserCommon.FramePtr ← h.framePtr;
  h.frameSaveOption ← do;
  IF PreParserFrameStack.PushFrame[h: h].extendZone THEN {
    h.pc.operationStage ← 2; GOTO retry; };

  h.framePtr.nextFrame ← NIL;
  h.stackEntry.composedOpPtr ↑ ← [
    cn: [
    fill: 0, preambleOwned: FALSE, referenceCount: 1, next: NIL,
```

Copyright © 1992 Xerox Corporation All Rights Reserved

```
    type: composedOp, zoneRecPtr: @h.zone],
    var: normal[first: NIL, initialFrame: h.framePtr]];

   h.framePtr ← currentFramePtr;

   WITH co: h.stackEntry.composedOpPtr SELECT FROM
    normal => h.tempData.currentOpBlockPtrPtr ← @co.first;
    ENDCASE;
   h.tempData.savedIPByteIndex ← h.pc.ipByteIndex;
   h.tempData.currentOpBlockPtr ← NIL;
   h.pc.nextState ← skippingBody;
   h.tempData.savedState ← h.pc.state;
   h.pc.state ← needLBrace;
   };
  IF PushRBrace[h: h, rBraceAction: [endMakeCO[]]] THEN {
   h.pc.operationStage ← 3; GOTO retry; };
  h.pc.operationStage ← 0;
  h.recordingCO ← TRUE;
  EXITS retry => {h.pc.pcm.savedAction ← makeSimpleCO; loop ← TRUE; };
  END;
SaveCOData: PUBLIC PROCEDURE [h: PreParserCommon.MainHandle]
  RETURNS [loop: BOOLEAN ← TRUE] =
  BEGIN
  totalBytesToCopy: CARDINAL ← h.pc.ipByteIndex - h.tempData.savedIPByteIndex;
  bytesCopied: CARDINAL;
  IF h.pc.operationStage # 0 THEN {
   h.pc.pcm.savedAction ← h.tempData.savedActionSave;
   IF h.pc.operationStage = 2 THEN {
    h.tempData.savedIPByteIndex ← h.pc.ipByteIndex;
    h.pc.operationStage ← 0;
    RETURN;
    };
   h.pc.operationStage ← 0;
   };
  UNTIL totalBytesToCopy = 0 DO
   IF h.tempData.currentOpBlockPtr = NIL
    OR h.tempData.currentOpBlockPtr↑.nBytes =
     PreParserCommon.composedOpBlockSize THEN {
    h.pc.pcm.nodeSizeInWords ← SIZE[PreParserCommon.ComposedOpBlock];
    h.pc.pcm.zoneRecPtr ← @h.zone;
    IF IPMicrocode.CALL[
     function: IPFunction.AllocateNodeNFL, entryContext: h].result # 0 THEN {
     h.tempData.savedActionSave ← h.pc.pcm.savedAction;
     h.pc.pcm.savedAction ← h.pc.pcm.action;
     h.pc.operationStage ← 1;
     h.tempData.savedIPByteIndex ← h.pc.ipByteIndex - totalBytesToCopy;
     RETURN;
     };
    h.tempData.currentOpBlockPtr ← h.pc.pcm.nodePtr;
    h.tempData.currentOpBlockPtr↑ ← [next: NIL, nBytes: 0];
```

Copyright © 1992 Xerox Corporation All Rights Reserved

```
   h.tempData.currentOpBlockPtrPtr↑ ← h.tempData.currentOpBlockPtr;
   h.tempData.currentOpBlockPtrPtr ← @h.tempData.currentOpBlockPtr.next;
   };
  bytesCopied ← ByteBlt.ByteBlt[
   to: [
   blockPointer: LOOPHOLE[@h.tempData.currentOpBlockPtr.ipData],
   startIndex: h.tempData.currentOpBlockPtr.nBytes,
   stopIndexPlusOne: PreParserCommon.composedOpBlockSize],
   from: [
   blockPointer: h.pc.ipBufferPtr, startIndex: h.tempData.savedIPByteIndex,
   stopIndexPlusOne: h.pc.ipByteIndex], overLap: move].nBytes;
  totalBytesToCopy ← totalBytesToCopy - bytesCopied;
  h.tempData.savedIPByteIndex ← h.tempData.savedIPByteIndex + bytesCopied;
  h.tempData.currentOpBlockPtr.nBytes ←
   h.tempData.currentOpBlockPtr.nBytes + bytesCopied;
  ENDLOOP;

 IF h.pc.pcm.action = needIPBlock THEN {
  h.pc.operationStage ← 2;
  h.tempData.savedActionSave ← h.pc.pcm.savedAction;
  h.pc.pcm.savedAction ← needIPBlock;
  };
 RETURN[loop: FALSE];
 END;
RunGet: PROCEDURE [
 h: PreParserCommon.MainHandle, runPtr: PreParserInstructions.RunPtr] =
 BEGIN
 runEntryPtr: PreParserInstructions.RunEntryPtr ← @runPtr[0];
 h.tempData.tempCount ← runPtr.count;
 h.tempData.found ← FALSE;
 h.tempData.elementCount ← h.logicalPageNumber;
 UNTIL h.tempData.tempCount = 0 DO
  IF runEntryPtr.runLength > h.tempData.elementCount THEN EXIT;
  h.tempData.elementCount ← h.tempData.elementCount - runEntryPtr.runLength;
  h.tempData.tempCount ← h.tempData.tempCount - 1;
  runEntryPtr ← runEntryPtr + SIZE[PreParserInstructions.RunEntry];
  REPEAT FINISHED => RETURN;
  ENDLOOP;
 h.tempData.tempCount ← runEntryPtr.value;
 h.tempData.found ← TRUE;
 END;
NoteNewPageFound: PROCEDURE [h: PreParserCommon.MainHandle] =
 BEGIN
 mediaArrayLength: CARDINAL ← 1;
 newMediaIndex: INTEGER ← 0;
 newSheetPlex: PublicPrinting.Plex;
 oldMediaIndex: CARDINAL ← h.mediaIndex;
 skipIfSimplex: BOOLEAN ← FALSE;
 {
 IF h.pc.operationStage = 0
```

Copyright © 1992 Xerox Corporation All Rights Reserved

```
 AND PushRBrace[h: h, rBraceAction: [endPageFound[]]] THEN {
 h.pc.pcm.savedAction ← LeftBrace; RETURN; };
h.betweenPages ← FALSE;
h.pc.pcm.action ← exitLoop;
h.pc.pcm.savedAction ← changeState;
IF h.startResultsPtr.resultsFlags.mediaMayChange THEN {
 IF h.contentResults.mediaSelect # LAST[CARDINAL] THEN
  newMediaIndex ←
   INTEGER[h.contentResults.mediaSelect] - h.mediaVectorCorrection
 ELSE
  IF h.mediaSelectOption # NIL THEN {
   RunGet[
    h: h, runPtr: LOOPHOLE[@h.mediaSelectOption.otherOption.data[0]]];
   IF h.tempData.found THEN
    newMediaIndex ←
     INTEGER[h.tempData.tempCount] - h.mediaVectorCorrection;
   };
 };
IF newMediaIndex < 0
 OR
  (h.startResultsPtr.instructions.offsets[media] # NIL
   AND
    (LOOPHOLE[newMediaIndex, CARDINAL] > =
     (mediaArrayLength ← h.startResultsPtr.instructions.offsets[
      media].media.LENGTH))) THEN GOTO badMediaIndex
ELSE h.mediaIndex ← LOOPHOLE[newMediaIndex];
IF h.logicalPageNumber = 0 THEN
 IF h.pc.operationStage = 1 THEN h.pc.operationStage ← 0
 ELSE {
  h.pc.operationStage ← 1;
  IF h.finishingOption # NIL THEN
   h.finishingOption.firstPageMediaIndex ← h.mediaIndex;
  IF h.startResultsPtr.instructions.offsets[stacking] # NIL THEN {
   stacking: PreParser.OptionPtr ← h.startResultsPtr.instructions.offsets[
    stacking];
   SELECT stacking.optionType FROM
    stacking = >
     IF stacking.slipSheet THEN stacking.slipMedia ← h.mediaIndex;
    ENDCASE};
  h.statusPtr ↑ ← [startResults[h.startResultsPtr]];
  h.pc.pcm.savedAction ← LeftBrace;
  RETURN;
  };


IF h.contentResults.onSimplex # simultaneousDuplex THEN
 skipIfSimplex ← h.contentResults.onSimplex = duplex
ELSE
 IF h.onSimplexOption # NIL THEN {
  RunGet[h: h, runPtr: LOOPHOLE[@h.onSimplexOption.otherOption.data[0]]];
```

Copyright © 1992 Xerox Corporation All Rights Reserved

```
  IF h.tempData.found THEN skipIfSimplex ← h.tempData.tempCount = 0};
IF skipIfSimplex AND h.plexMode = simplex THEN GOTO skipPage;

IF h.startResultsPtr.instructions.offsets[pageSelect] # NIL THEN {
 copyPrinting: CARDINAL ← 1;
 endCopy: CARDINAL ← 0;
 printPage, searchDone: BOOLEAN ← FALSE;
 selectIndex: CARDINAL ← 0;
 pageSelect: PublicPrinting.RunofRunOfCardinalSeq ←
  h.startResultsPtr.instructions.offsets[pageSelect].pageSelect;
 UNTIL searchDone OR (selectIndex > pageSelect.length) DO
  WITH ps: pageSelect[selectIndex] SELECT FROM
   run => {
    endCopy ← endCopy + ps.run;
    IF copyPrinting <= ps.run THEN selectIndex ← selectIndex + 1
    ELSE selectIndex ← selectIndex + 2;
    };
   select => {
    printPage ← GetRunOfCardinal[
     select: ps.select, sheet: h.logicalPageNumber + 1];
    searchDone ← TRUE;
    };
   ENDCASE => {
    h.pc.pcm.action ← fatalError;
    h.pc.pcm.data.code ← PreParserMainErrors.unexpectedError;
    h.integer ← 6;
    RETURN;
    };
  ENDLOOP;
 IF h.contentResults.contentPageSelect # NIL THEN {
  contentPageSelect: PublicPrinting.RunOfCardinalSeq ←
   h.contentResults.contentPageSelect;
  externalPageSelect: PublicPrinting.RunofRunOfCardinalSeq ←
   h.startResultsPtr.instructions.offsets[pageSelect].pageSelect;
  copyNumber: CARDINAL = 1;
  WITH external: externalPageSelect[copyNumber] SELECT FROM
   select =>
    printPage ← GetRunOfCardinal[
     select: contentPageSelect, sheet: copyNumber]
     AND GetRunOfCardinal[
      select: external.select, sheet: h.logicalPageNumber + 1];
   ENDCASE => ERROR;
  };
 IF ~printPage THEN GOTO skipPage;
 };

newSheetPlex ←
 IF h.contentResults.plex # simultaneousDuplex THEN h.contentResults.plex
 ELSE h.plexMode;
IF h.mediaIndex = oldMediaIndex AND h.side = simplex AND h.plex # simplex
```

Copyright © 1992 Xerox Corporation All Rights Reserved

```
  AND newSheetPlex # simplex THEN h.side ← duplex
 ELSE {h.sheetNumber ← h.sheetNumber + 1; h.side ← simplex};

 h.plex ← newSheetPlex;

 IF h.mediaIndex > mediaArrayLength AND ~h.mediaIndexReported THEN
  GOTO badMediaIndex;

 h.framePtr.foundFontIndex ← h.currentFoundFontIndex;
 h.framePtr.inkWellBaseIndex ← h.currentInkWellIndex;
 h.statusPtr↑ ← [
  pageFound[
  byteOffset:
  h.pc.ipByteIndex +
   (Environment.bytesPerWord * ((h.pc.ipBufferPtr - h.bufferPtr))),
  frame: LOOPHOLE[h.framePtr], logicalPageNumber: h.logicalPageNumber + 1,
  mediaIndex: h.mediaIndex, sheetNumber: h.sheetNumber, plex: newSheetPlex,
  side: h.side, tFormIndex: h.currentTIndex]];

 EXITS
  skipPage => h.pc.pcm.action ← changeState;
  badMediaIndex => {
   h.pc.pcm.action ← fatalError;
   h.pc.pcm.data.code ← PreParserMainErrors.badMediaIndex;
   h.integer ← newMediaIndex;
   h.mediaIndexReported ← TRUE;
   RETURN;
   };
 };
 h.pc.pcm.data.newState ← skippingBody;
 h.logicalPageNumber ← h.logicalPageNumber + 1;
 END;
ProcessBegin: PUBLIC PROCEDURE [h: PreParserCommon.MainHandle]
 RETURNS [loop: BOOLEAN ← TRUE] =
 BEGIN
 DO
  SELECT h.pc.state FROM
   startOfMaster => {
    IF PreParserInstructions.ProcessPrintingInstrs[h: h].loop THEN {
     h.pc.pcm.savedAction ← begin; RETURN; };
    h.pc.state ← needBegin;
    LOOP;
    };
   needBegin, pastContentInstrs => {
    IF h.pc.operationStage = 0 THEN {
     h.frameSaveOption ← doSaveAll;
     IF PreParserFrameStack.PushFrame[h: h].extendZone THEN {
      h.pc.pcm.savedAction ← begin; RETURN; };

     IF h.framePtr.nextFrame # NIL THEN {h.masterContentInstrs ← TRUE; };
```

Copyright © 1992 Xerox Corporation All Rights Reserved

```
      };
     h.pc.operationStage ← 0;
     IF PushRBrace[h: h, rBraceAction: [endPreamble[]]] THEN {
      h.pc.operationStage ← 1; h.pc.pcm.savedAction ← begin; RETURN; };
     h.pc.pcm.action ← changeState;
     h.pc.pcm.data.newState ← needLBrace;
     h.pc.nextState ← executingNoOutput;
     RETURN;
     };
    needLBrace, executingInCORRECT, executing, skippingBody, recordingCO = > {
     h.pc.pcm.action ← fatalError;
     h.pc.pcm.data.code ← PreParserMainErrors.unexpectedOperator;
     RETURN;
     };
    executingNoOutput = > {
     h.pc.pcm.action ← fatalError;
     h.pc.pcm.data.code ← PreParserMainErrors.outputOperatorNotAllowed;
     };
    node = > {
     SetPreambleOwnedFlags[h: h, preambleFlag: TRUE];
     h.pc.state ← needBegin;
     LOOP;
     };
    ENDCASE;
   EXIT;
   ENDLOOP;
  RETURN[loop: FALSE];
  END;
 ProcessEnd: PUBLIC PROCEDURE [h: PreParserCommon.MainHandle]
  RETURNS [loop: BOOLEAN] =
  BEGIN
  IF h.pc.state = node THEN
   WITH h.pc.rBraceActionRecordPtr.entries[h.pc.rBraceRecordCount - 1] SELECT
   FROM
    endMaster = > {
     PreParserFrameStack.CleanUpFrames[h: h, delta: -1];

     IF h.framePtr = NIL THEN {
      h.statusPtr ↑ ← [endJobFound[]];
      h.pc.pcm.action ← exitLoop;
      RETURN[loop: TRUE];
      };

     h.contentResults ← [];

     h.pc.rBraceRecordCount ← h.pc.rBraceRecordCount + 1;
     };
    endInsertFile = > {
     h.pc.state ←
      «h.pc.rBraceActionPtr.» rBraceStreamDataPtr.savedState;
```

Copyright © 1992 Xerox Corporation All Rights Reserved

```
h.pc.ipBufferPtr ←
 «h.pc.rBraceActionPtr.» rBraceStreamDataPtr.ipBufferPtr;
h.pc.ipByteIndex ←
 «h.pc.rBraceActionPtr.» rBraceStreamDataPtr.ipByteIndex;
h.pc.ipStopIndexPlusOne ←
 «h.pc.rBraceActionPtr.» rBraceStreamDataPtr.ipStopIndexPlusOne;
};
endInsertMaster => {
 PreParserFrameStack.CleanUpFrames[h: h, delta: -1];
 h.pc.ipBufferPtr ←
  «h.pc.rBraceActionPtr.» rBraceStreamDataPtr.ipBufferPtr;
 h.pc.ipByteIndex ←
  «h.pc.rBraceActionPtr.» rBraceStreamDataPtr.ipByteIndex;
 h.pc.ipStopIndexPlusOne ←
  «h.pc.rBraceActionPtr.» rBraceStreamDataPtr.ipStopIndexPlusOne;
 };
ENDCASE => {
 h.pc.pcm.action ← fatalError;
 h.pc.pcm.data.code ← PreParserMainErrors.unexpectedOperator;
 RETURN[loop: TRUE];
 }
ELSE {
 h.pc.pcm.action ← fatalError;
 h.pc.pcm.data.code ← PreParserMainErrors.unexpectedOperator;
 RETURN[loop: TRUE];
 };
PopRBrace[h: h];
RETURN[loop: FALSE];
END;
RightBraceMesa: PUBLIC PROCEDURE [h: PreParserCommon.MainHandle]
 RETURNS [loop: BOOLEAN ← TRUE] =
 BEGIN
 SELECT h.pc.state FROM
  executing, executingInCORRECT, executingNoOutput, skippingBody => {
   WITH h.pc.rBraceActionRecordPtr.entries[h.pc.rBraceRecordCount - 1] SELECT
   FROM
    endBody => {
     IF h.pc.state # skippingBody THEN {
      PreParserFrameStack.CleanUpFrames[h: h, delta: -1];
      h.pc.state ← prevState;
      loop ← FALSE;
      }
     ELSE {
      h.pc.pcm.data.newState ← prevState;
      h.pc.pcm.action ← changeState;
      };
     IF ifCase # noIFElse THEN {
      h.stackEntry ← [
       type: fixedPointReal,
       frameData: fixedPointReal[
```

Copyright © 1992 Xerox Corporation All Rights Reserved

```
    fixed: [
    if[int: (IF ifCase = IFElsePush0 THEN 0 ELSE 1), frac: 0]]]];
   IF IPMicrocode.CALL[
    function: IPFunction.PrePushStack, entryContext: h].result # 0
    THEN GOTO retry;
  };
 };
endContentInstrs => {
 IF PreParserInstructions.ProcessContentInstrs[h: h].loop THEN {
  h.pc.pcm.savedAction ← RightBrace; RETURN};
 h.pc.pcm.action ← changeState;
 h.pc.pcm.data.newState ← pastContentInstrs;
 };
endCORRECT => {
 IF h.pc.operationStage = 0 THEN
  PreParserFrameStack.CleanUpFrames[h: h, delta: -1];

 IF h.pc.operationStage < 2 THEN
  IF PreParserMainOps.CheckTextVars[h: h].loop THEN {
   h.pc.operationStage ← 1; GOTO retry};

 IF h.pc.operationStage < 3 THEN {
  LOOPHOLE[@h.token, LONG POINTER TO endCorrect InternalIP.Token] ↑ ← [
   endCorrect[]];
  IF IPMicrocode.CALL[
   function: IPFunction.PrePutToken, entryContext: h].result # 0 THEN
   {h.pc.operationStage ← 2; GOTO retry}};

 IF h.imagerVars.noImage # h.iipData.imagerVars.noImage
  AND h.pc.operationStage < 4 THEN {
  h.sv.operand02.integer ← PreParserInterpress.ImagerVariable[
   noImage].ORD;
  h.sv.operand01.integer ← INTEGER[h.imagerVars.noImage];
  IF PreParserExtra.ISetMesa[h: h].loop THEN {
   h.pc.operationStage ← 3; GOTO retry}};

 h.pc.operationStage ← 0;
 h.pc.state ← executing;
 loop ← FALSE;
 };
endPage => {
 h.stackEntryPtr ← @h.stackEntry;
 IF IPMicrocode.CALL[
  function: IPFunction.PopStack, entryContext: h].result # 0 THEN {
  h.pc.pcm.action ← fatalError;
  h.pc.pcm.data.code ← PreParserMainErrors.markMissingAtPageEnd;
  RETURN[TRUE];
  };
 IF h.stackEntry.type # mark OR h.topStackRecordEntryCount # 0 THEN {
  h.pc.pcm.action ← fatalError;
```

Copyright © 1992 Xerox Corporation All Rights Reserved

```
h.pc.pcm.data.code ← PreParserMainErrors.stackNotEmptyAtPageEnd;
RETURN[TRUE];
};
h.pc.pcm.action ← exitLoop;
h.statusPtr↑ ← [pageDone[]];
};
endPageFound => {
h.pc.pcm.action ← changeState;
h.pc.pcm.data.newState ← node;
IF ~h.masterContentInstrs THEN h.contentResults ← [];
h.betweenPages ← TRUE;
};
endPreamble => {
h.pc.pcm.action ← changeState; h.pc.pcm.data.newState ← node; };
endPrintingInstrs =>
IF PreParserInstructions.ProcessPrintingInstrs[h: h].loop THEN
h.pc.pcm.savedAction ← RightBrace
ELSE {
h.pc.pcm.action ← changeState;
h.pc.pcm.data.newState ← needBegin;
};
endCO => {
h.stackEntry ← [
type: composedOp,
frameData: composedOp[rBraceOpDataPtr.composedOpPtrSave]];
WITH co: h.stackEntry.composedOpPtr↑ SELECT FROM
normal => PreParserFrameStack.CleanUpFrames[h: h, delta: -1];
ENDCASE;
PreParserFrameStack.ComplexNodeRefCount[
h: h, entryPtr: @h.stackEntry, delta: -1];

h.framePtr ← rBraceOpDataPtr.savedFramePtr;
h.fGetFramePtr ← rBraceOpDataPtr.savedFGetFramePtr;
h.pc.ipBufferPtr ← rBraceOpDataPtr.ipBufferPtr;
h.pc.ipByteIndex ← rBraceOpDataPtr.ipByteIndex;
h.pc.ipStopIndexPlusOne ← rBraceOpDataPtr.ipStopIndexPlusOne;
h.remainingBytesInBlock ← rBraceOpDataPtr.ipRemainingBytes;
h.composedOpBlockPtr ← rBraceOpDataPtr.composedOpBlockPtrSave;

h.pc.pcm.zoneRecPtr ← @h.zone;
h.pc.pcm.nodePtr ← rBraceOpDataPtr;
[] ← IPMicrocode.CALL[
function: IPFunction.FreeNode16, entryContext: h];
loop ← FALSE;
};
endMakeCO => {
IF SaveCOData[h: h].loop THEN GOTO retry;
h.pc.pcm.data.newState ← h.tempData.savedState;
h.pc.pcm.action ← changeState;
h.recordingCO ← FALSE;
```

Copyright © 1992 Xerox Corporation All Rights Reserved

```
      };
     ENDCASE => {
      h.pc.pcm.action ← fatalError;
      h.pc.pcm.data.code ← PreParserMainErrors.unexpectedError;
      h.integer ← 0;
      };
    };
   ENDCASE => {
    h.pc.pcm.action ← fatalError;
    h.pc.pcm.data.code ← PreParserMainErrors.unexpectedOperator;
    };
  PopRBrace[h: h];
  EXITS retry => {h.pc.pcm.savedAction ← RightBrace; };
  END;
 SetOnePreambleFlag: PUBLIC PROCEDURE [
  h: PreParserCommon.MainHandle, preambleFlag: BOOLEAN] RETURNS [] = INLINE
  BEGIN
  SELECT h.stackEntryPtr↑.type FROM
   IN PreParserData.OperandSimpleRange => NULL;
   IN [outline..largeVector] =>
    h.stackEntryPtr↑.stringPtr.cn.preambleOwned ← preambleFlag;
   composedOp, vectorOfElements, font => {
    cnPtr: LONG POINTER TO PreParserCommon.ComplexNode =
     @h.stackEntryPtr↑.vectorPtr.cn;
    IF cnPtr.preambleOwned # preambleFlag THEN {
     cnPtr.preambleOwned ← preambleFlag;
     cnPtr.next ← h.nodeList;
     h.nodeList ← cnPtr;
     };
    };
   ENDCASE;
  RETURN[];
  END;
 SetPreambleOwnedFlags: PUBLIC PROCEDURE [
  h: PreParserCommon.MainHandle, preambleFlag: BOOLEAN] RETURNS [] =
  BEGIN
  IF h.framePtr.cn.preambleOwned = preambleFlag THEN RETURN;
  h.framePtr.cn.preambleOwned ← preambleFlag;
  h.nodeList ← @h.framePtr.cn;
  h.nodeList.next ← NIL;
  UNTIL h.nodeList = NIL DO
   SELECT h.nodeList↑.type FROM
    frame => {
     h.tempFramePtr ← LOOPHOLE[h.nodeList];
     h.nodeList ← h.nodeList.next;
     IF h.tempFramePtr.validEntries THEN {
      h.stackEntryPtr ← @h.tempFramePtr.entries[0];
      THROUGH PreParserCommon.FrameEntryRange DO
       SetOnePreambleFlag[h: h, preambleFlag: preambleFlag];
       h.stackEntryPtr ←
```

Copyright © 1992 Xerox Corporation All Rights Reserved

```
      h.stackEntryPtr + SIZE[PreParserCommon.StackEntry];
     ENDLOOP;
    };
   h.tempFramePtr.cn.next ← NIL;
   };
  vectorOfElements => {
   h.tempVectorPtr ← LOOPHOLE[h.nodeList];
   h.nodeList ← h.nodeList.next;
   h.tempVectorPtr.cn.next ← NIL;
   h.stackEntryPtr ← @h.tempVectorPtr.elements[h.tempVectorPtr.count];
   DO
    IF h.stackEntryPtr = @h.tempVectorPtr.elements[0] THEN EXIT;
    h.stackEntryPtr ← h.stackEntryPtr - SIZE[PreParserCommon.StackEntry];
    SetOnePreambleFlag[h: h, preambleFlag: preambleFlag];
    ENDLOOP;
   };
  composedOp => {
   composedOpPtr: PreParserCommon.ComposedOpPtr ← LOOPHOLE[h.nodeList];
   cnPtr: LONG POINTER TO PreParserCommon.ComplexNode ← NIL;
   h.nodeList ← h.nodeList.next;
   composedOpPtr.cn.next ← NIL;
   WITH co: composedOpPtr↑ SELECT FROM
    normal => cnPtr ← @co.initialFrame.cn;
    otherDecompressor => cnPtr ← @co.decompressorNamePtr.cn;
    colorOpOrModelOp => IF co.params # NIL THEN cnPtr ← @co.params.cn;
    ENDCASE => LOOP;
   IF cnPtr # NIL AND cnPtr.preambleOwned # preambleFlag THEN {
    cnPtr.preambleOwned ← preambleFlag;
    cnPtr.next ← h.nodeList;
    h.nodeList ← cnPtr;
    };
   };
  font => {
   fontPtr: PreParserCommon.FontPtr ← LOOPHOLE[h.nodeList];
   h.nodeList ← h.nodeList.next;
   IF fontPtr.transformationPtr # NIL THEN
    fontPtr.transformationPtr.cn.preambleOwned ← preambleFlag;
   IF fontPtr.name.cn.preambleOwned = preambleFlag THEN LOOP;
   fontPtr.name.cn.preambleOwned ← preambleFlag;
   fontPtr.name.cn.next ← h.nodeList;
   h.nodeList ← @fontPtr.name.cn};
  ENDCASE;
 ENDLOOP;
RETURN[];
END;
SetUpIPBlock: PUBLIC PROCEDURE [
 h: PreParserCommon.MainHandle, newIPBlock: BlockStream.Block] RETURNS [] =
 BEGIN
 IF newIPBlock.blockPointer # NIL THEN {
  h.pc.ipBufferPtr ← LOOPHOLE[newIPBlock.blockPointer];
```

Copyright © 1992 Xerox Corporation All Rights Reserved

```
   h.bufferPtr ← h.pc.ipBufferPtr;
   IF newIPBlock.startIndex = newIPBlock.stopIndexPlusOne THEN {
    h.pc.ipByteIndex ← CARDINAL[newIPBlock.startIndex];
    h.pc.ipStopIndexPlusOne ← CARDINAL[newIPBlock.stopIndexPlusOne];
    h.remainingBytesInBlock ← 0;
    h.pc.pcm.savedAction ← h.pc.pcm.action;
    h.pc.pcm.action ← needIPBlock;
    RETURN};

   h.remainingBytesInBlock ←
    newIPBlock.stopIndexPlusOne - newIPBlock.startIndex;
   h.pc.ipStopIndexPlusOne ← CARDINAL[newIPBlock.startIndex];
   newIPBlock.blockPointer ← NIL;
   }
  ELSE h.pc.pcm.action ← h.pc.pcm.savedAction;
  h.pc.ipBufferPtr ←
   h.pc.ipBufferPtr + (h.pc.ipStopIndexPlusOne / Environment.bytesPerWord);
  h.pc.ipByteIndex ← h.pc.ipStopIndexPlusOne MOD Environment.bytesPerWord;
  IF h.remainingBytesInBlock >= LAST[CARDINAL] THEN
   h.pc.ipStopIndexPlusOne ← LAST[CARDINAL]
  ELSE
   h.pc.ipStopIndexPlusOne ←
    CARDINAL[h.remainingBytesInBlock] + h.pc.ipByteIndex;

  h.pc.pcm.nodePtr ←
   (h.pc.ipBufferPtr +
    ((h.pc.ipStopIndexPlusOne - 1) / Environment.bytesPerWord));

  IF Inline.HighHalf[h.pc.pcm.nodePtr] # Inline.HighHalf[h.pc.ipBufferPtr] THEN
   {
   h.pc.ipStopIndexPlusOne ←
    CARDINAL[
     (LONG[LAST[CARDINAL]] + 1) - LONG[Inline.LowHalf[h.pc.ipBufferPtr]]] *
     Environment.bytesPerWord};

  h.remainingBytesInBlock ←
   h.remainingBytesInBlock - h.pc.ipStopIndexPlusOne + h.pc.ipByteIndex;
  RETURN[];
  END;
 SetUpIIPBlock: PUBLIC PROCEDURE [
  h: PreParserCommon.MainHandle, newIIPBlock: BlockStream.Block] RETURNS [] =
  BEGIN
  startOfPage: BOOLEAN ← h.iipData.currentWordPtr = NIL;
  resolution: INTEGER ← h.jobMediaDataPtr.deviceProps.resolution;
  tempLP: LONG POINTER ← NIL;

  IF PreParserData.debug
   AND
    (newIIPBlock.startIndex MOD 2 = 1
     OR newIIPBlock.stopIndexPlusOne MOD 2 = 1) THEN ERROR;
```

Copyright © 1992 Xerox Corporation All Rights Reserved

```
h.iipData.blockPtr ← LOOPHOLE[newIIPBlock.blockPointer];
h.iipData.currentWordPtr ←
 LOOPHOLE[newIIPBlock.blockPointer +
      (newIIPBlock.startIndex / Environment.bytesPerWord)];

h.iipData.currentWordCount ← CARDINAL[
 (newIIPBlock.stopIndexPlusOne - newIIPBlock.startIndex) /
  Environment.bytesPerWord];
tempLP ← h.iipData.currentWordPtr + h.iipData.currentWordCount - 1;

IF Inline.HighHalf[tempLP] = Inline.HighHalf[h.iipData.currentWordPtr] THEN
 h.remainingIIPCount ← 0
ELSE {
 tempCard: CARDINAL = Inline.LowHalf[tempLP] + 1;
 h.remainingIIPCount ← tempCard;
 h.iipData.currentWordCount ← h.iipData.currentWordCount - tempCard;
 h.nextIIPWordPtr ← h.iipData.currentWordPtr + h.iipData.currentWordCount;
 };

IF startOfPage THEN {
 LOOPHOLE[@h.token, LONG POINTER TO beginIIPFrag InternalIP.Token] ↑ ←[
  beginIIPFrag[[sourceParms: []]]];

 IF IPMicrocode.CALL[
  function: IPFunction.PrePutToken, entryContext: h].result # 0 THEN ERROR;
 IF resolution # 600 THEN {
  scale: FixedPointReal.Number;
  scale ←
   IF resolution = 300 THEN [if[frac: 0, int: 2]]
   ELSE FixedPointReal.FromReal[600.0 / Real.Float[resolution]];

  LOOPHOLE[@h.token, LONG POINTER TO tScale InternalIP.Token] ↑ ←[
   tScale[[xScale: scale, yScale: scale]]];
  IF enableTScale
   AND IPMicrocode.CALL[
    function: IPFunction.PrePutToken, entryContext: h].result # 0 THEN
   ERROR;
  };

 LOOPHOLE[@h.token, LONG POINTER TO setClipRectangleInt InternalIP.Token] ↑ ←
  [setClipRectangleInt[rec: h.imagerVars.clipper]];

 IF IPMicrocode.CALL[
  function: IPFunction.PrePutToken, entryContext: h].result # 0 THEN ERROR;

 h.pc.pcm.savedAction ← PreLoop};

RETURN[];
END;
```

Copyright © 1992 Xerox Corporation All Rights Reserved

```
PushRBrace: PUBLIC PROCEDURE [
 h: PreParserCommon.MainHandle,
 rBraceAction: PreParserTokenContext.RBraceAction] RETURNS [BOOLEAN] = «INLINE»
 BEGIN
 IF h.pc.rBraceRecordCount = PreParserTokenContext.maxExecDepth THEN {
  h.pc.pcm.zoneRecPtr ← @h.zone;
  IF IPMicrocode.CALL[
   function: IPFunction.AllocateNode64, entryContext: h].result # 0 THEN
   RETURN[TRUE];
  LOOPHOLE[h.pc.pcm.nodePtr, PreParserTokenContext.RBraceActionRecordPtr].next
   ← h.pc.rBraceActionRecordPtr;
  h.pc.rBraceActionRecordPtr ← h.pc.pcm.nodePtr;
  h.pc.rBraceRecordCount ← 0;
  };
 h.pc.rBraceActionRecordPtr.entries[h.pc.rBraceRecordCount] ← rBraceAction;
 h.pc.rBraceRecordCount ← h.pc.rBraceRecordCount + 1;
 RETURN[FALSE];
 END;
PopRBrace: PUBLIC PROCEDURE [h: PreParserCommon.MainHandle] = «INLINE»
 BEGIN
 h.pc.rBraceRecordCount ← h.pc.rBraceRecordCount - 1;
 IF h.pc.rBraceRecordCount = 0 THEN {
  h.pc.pcm.zoneRecPtr ← @h.zone;
  h.pc.pcm.nodePtr ← h.pc.rBraceActionRecordPtr;
  h.pc.rBraceActionRecordPtr ← h.pc.rBraceActionRecordPtr.next;
  [] ← IPMicrocode.CALL[function: IPFunction.FreeNode64, entryContext: h];
  h.pc.rBraceRecordCount ← PreParserTokenContext.maxExecDepth;
  };
 END;
Initialize: PUBLIC PROCEDURE = BEGIN enableTScale ← FALSE; END;
END.
```

Copyright © 1992 Xerox Corporation All Rights Reserved

```
DIRECTORY
 FixedPointReal USING [Abs, Add, Ceil, Fix, Floor, half, Neg, Number],
 Ieee USING [Ext, Unpack],
 InternalIP USING [StrokeEnd, StrokeJoint, Token],
 Inline USING [DBITAND],
 IPFunction USING [
  AllocateNode16, AllocateNodeNFL, CopyStackEntry, FreeNodeNFL, PopStack,
  PrePushStack, FPRToReal],
 IPMicrocode USING [CALL],
 PreParserCommon USING [
  AllocateNode16Size, Assertion, Clipper, MainHandle, StackEntry, StringPtr,
  UnknownXY, VectorOfElements, VectorOfElementsPtr, stackEntryCount,
  StackRecordPtr, Transformation],
 PreParserExtra USING [TransformIPVector],
 PreParserFrameStack USING [ComplexNodeRefCount],
 PreParserInterpress USING [ImagerVariable],
 PreParserMainErrors USING [
  badISetIndex, badOperandValue, badPropertyVectorStructure,
  badTypeForPropertyName, invalidCurrentPosition, invalidOperandTypeOnStack,
  markNotFoundOnStack, numericError, propertyNameNotFound, unexpectedMark],
 PreParserMainOps USING [PutToken],
 PreParserStackOps,
 Real USING [FixI, Float],
 RealOps USING [RoundLI],
 String USING [LowerCase];

PreParserStackOpsImpl: PROGRAM
 IMPORTS
  FixedPointReal, Ieee, Inline, IPMicrocode, PreParserExtra,
  PreParserFrameStack, PreParserMainOps, Real, RealOps, String
 EXPORTS PreParserStackOps =

 BEGIN

 AllocateNode16Check: PreParserCommon.Assertion =
  (SIZE[PreParserCommon.Clipper] <= PreParserCommon.AllocateNode16Size);
 unsafeForRound: FixedPointReal.Number ← [if[int: LAST[INTEGER], frac: 100000B]];

 PushInt: PROCEDURE [h: PreParserCommon.MainHandle, int: INTEGER]
  RETURNS [loop: BOOLEAN] =
  BEGIN
  h.stackEntry ← [
   type: fixedPointReal,
   frameData: fixedPointReal[fixed: [if[int: int, frac: 0]]]];
  loop ← IPMicrocode.CALL[
   function: IPFunction.PrePushStack, entryContext: h].result # 0;
  IF loop THEN h.pc.pcm.savedAction ← PrePushStack;
  RETURN;
  END;
```

Copyright © 1992 Xerox Corporation All Rights Reserved

```
SetXYRelMesa: PUBLIC PROCEDURE [h: PreParserCommon.MainHandle]
 RETURNS [loop: BOOLEAN] =
 BEGIN
 h.iipData.positionChanged ← TRUE;
 h.stackEntryPtr ← @h.sv.operand01;
 PreParserExtra.TransformIPVector[h: h];
 IF h.imagerVars.dcsX # PreParserCommon.UnknownXY THEN {
  h.imagerVars.dcsX ← FixedPointReal.Add[h.imagerVars.dcsX, h.P1.x];
  h.imagerVars.dcsY ← FixedPointReal.Add[h.imagerVars.dcsY, h.P1.y];
  }
 ELSE {
  LOOPHOLE[@h.token, LONG POINTER TO setXYRel InternalIP.Token] ↑ ← [
   setXYRel[rec: [delta: h.P1]]];
  IF PreParserMainOps.PutToken[h: h].needIIPBlock THEN
   BEGIN h.pc.pcm.savedAction ← PrePutToken; RETURN[loop: TRUE]; END;
  };
 RETURN[loop: FALSE];
 END;
SetXRelMesa: PUBLIC PROCEDURE [h: PreParserCommon.MainHandle]
 RETURNS [loop: BOOLEAN] =
 BEGIN
 h.sv.operand02 ← [type: real, frameData: real[real: 0.0]];
 RETURN[SetXYRelMesa[h: h]];
 END;
SetYRelMesa: PUBLIC PROCEDURE [h: PreParserCommon.MainHandle]
 RETURNS [loop: BOOLEAN] =
 BEGIN
 h.sv.operand02 ← h.sv.operand01;
 h.sv.operand01 ← [type: real, frameData: real[real: 0.0]];
 RETURN[SetXYRelMesa[h: h]];
 END;
Add: PUBLIC PROCEDURE [h: PreParserCommon.MainHandle] RETURNS [loop: BOOLEAN]
=
 BEGIN
 h.stackEntryPtr ← @h.stackEntry;
 h.stackEntry ← [
  type: real,
  frameData: real[real: h.sv.operand01.real + h.sv.operand02.real]];
 IF IPMicrocode.CALL[function: IPFunction.PrePushStack, entryContext: h].result
  # 0 THEN {h.pc.pcm.savedAction ← PrePushStack; RETURN[loop: TRUE]; };
 RETURN[loop: FALSE];
 END;
Sub: PUBLIC PROCEDURE [h: PreParserCommon.MainHandle] RETURNS [loop: BOOLEAN]
=
 BEGIN
 h.stackEntryPtr ← @h.stackEntry;
 h.stackEntry ← [
  type: real,
  frameData: real[real: h.sv.operand01.real - h.sv.operand02.real]];
 IF IPMicrocode.CALL[function: IPFunction.PrePushStack, entryContext: h].result
```

Copyright © 1992 Xerox Corporation All Rights Reserved

```
 END;
Neg: PUBLIC PROCEDURE [h: PreParserCommon.MainHandle] RETURNS [loop: BOOLEAN]
=
 BEGIN
 h.stackEntryPtr ← @h.stackEntry;
 SELECT h.sv.operand01.type FROM
  fixedPointReal =>
   h.stackEntry ← [
    type: fixedPointReal,
    frameData: fixedPointReal[
    fixed: FixedPointReal.Neg[h.sv.operand01.fixed]]];
  real =>
   h.stackEntry ← [type: real, frameData: real[real: -h.sv.operand01.real]];
  ENDCASE => {
   h.pc.pcm.action ← fatalError;
   h.pc.pcm.data.code ← PreParserMainErrors.numericError;
   RETURN[loop: FALSE];
   };
 IF IPMicrocode.CALL[function: IPFunction.PrePushStack, entryContext: h].result
  # 0 THEN {h.pc.pcm.savedAction ← PrePushStack; RETURN[loop: TRUE]; };
 RETURN[loop: FALSE];
 END;
Abs: PUBLIC PROCEDURE [h: PreParserCommon.MainHandle] RETURNS [loop: BOOLEAN]
=
 BEGIN
 h.stackEntryPtr ← @h.stackEntry;
 SELECT h.sv.operand01.type FROM
  fixedPointReal =>
   h.stackEntry ← [
    type: fixedPointReal,
    frameData: fixedPointReal[
    fixed: FixedPointReal.Abs[h.sv.operand01.fixed]]];
  real =>
   h.stackEntry ← [
    type: real,
    frameData: real[
    real:
    IF h.sv.operand01.real < 0 THEN -h.sv.operand01.real
    ELSE h.sv.operand01.real]];
  ENDCASE => {
   h.pc.pcm.action ← fatalError;
   h.pc.pcm.data.code ← PreParserMainErrors.numericError;
   RETURN[loop: FALSE];
   };
 IF IPMicrocode.CALL[function: IPFunction.PrePushStack, entryContext: h].result
  # 0 THEN {h.pc.pcm.savedAction ← PrePushStack; RETURN[loop: TRUE]};
 RETURN[loop: FALSE];
 END;
Floor: PUBLIC PROCEDURE [h: PreParserCommon.MainHandle]
 RETURNS [loop: BOOLEAN] =
```

Copyright © 1992 Xerox Corporation All Rights Reserved

```
SELECT h.sv.operand01.type FROM
 fixedPointReal =>
  h.stackEntry ← [
   type: fixedPointReal,
   frameData: fixedPointReal[
   fixed: [if[int: FixedPointReal.Floor[h.sv.operand01.fixed], frac: 0]]]];
 real =>
  h.stackEntry ← [
   type: fixedPointReal,
   frameData: fixedPointReal[
   fixed: [
   if[
   int:
   IF h.sv.operand01.real > 0
   OR h.sv.operand01.real = Real.FixI[h.sv.operand01.real] THEN Real.FixI[
   h.sv.operand01.real] ELSE Real.FixI[h.sv.operand01.real] - 1,
   frac: 0]]]];
 ENDCASE => {
  h.pc.pcm.action ← fatalError;
  h.pc.pcm.data.code ← PreParserMainErrors.numericError;
  RETURN[loop: FALSE];
  };
IF IPMicrocode.CALL[function: IPFunction.PrePushStack, entryContext: h].result
 # 0 THEN {h.pc.pcm.savedAction ← PrePushStack; RETURN[loop: TRUE]; };
RETURN[loop: FALSE];
END;
Ceiling: PUBLIC PROCEDURE [h: PreParserCommon.MainHandle]
 RETURNS [loop: BOOLEAN] =
 BEGIN
 h.stackEntryPtr ← @h.stackEntry;
 SELECT h.sv.operand01.type FROM
  fixedPointReal =>
   h.stackEntry ← [
    type: fixedPointReal,
    frameData: fixedPointReal[
    fixed: [if[int: FixedPointReal.Ceil[h.sv.operand01.fixed], frac: 0]]]];
  real => {
   h.stackEntry ← [
    type: fixedPointReal,
    frameData: fixedPointReal[
    fixed: [
    if[
    int:
    IF h.sv.operand01.real < 0
    OR h.sv.operand01.real = Real.FixI[h.sv.operand01.real] THEN Real.FixI[
    h.sv.operand01.real] ELSE Real.FixI[h.sv.operand01.real] + 1,
    frac: 0]]]];
   };
  ENDCASE => {
   h.pc.pcm.action ← fatalError;
```

Copyright © 1992 Xerox Corporation All Rights Reserved

```
    h.pc.pcm.data.code ← PreParserMainErrors.numericError;
    RETURN[loop: FALSE];
    };
  IF IPMicrocode.CALL[function: IPFunction.PrePushStack, entryContext: h].result
   # 0 THEN {h.pc.pcm.savedAction ← PrePushStack; RETURN[loop: TRUE]; };
  RETURN[loop: FALSE];
  END;
Trunc: PUBLIC PROCEDURE [h: PreParserCommon.MainHandle]
  RETURNS [loop: BOOLEAN] =
  BEGIN
  h.stackEntryPtr ← @h.stackEntry;
  SELECT h.sv.operand01.type FROM
   fixedPointReal =>
    h.stackEntry ← [
     type: fixedPointReal,
     frameData: fixedPointReal[
     fixed: [if[int: FixedPointReal.Fix[h.sv.operand01.fixed], frac: 0]]]];
   real =>
    h.stackEntry ← [
     type: fixedPointReal,
     frameData: fixedPointReal[
     fixed: [if[int: Real.Fix[h.sv.operand01.real], frac: 0]]]];
   ENDCASE => {
    h.pc.pcm.action ← fatalError;
    h.pc.pcm.data.code ← PreParserMainErrors.numericError;
    RETURN[loop: FALSE];
    };
  IF IPMicrocode.CALL[function: IPFunction.PrePushStack, entryContext: h].result
   # 0 THEN {h.pc.pcm.savedAction ← PrePushStack; RETURN[loop: TRUE]; };
  RETURN[loop: FALSE];
  END;
Round: PUBLIC PROCEDURE [h: PreParserCommon.MainHandle]
  RETURNS [loop: BOOLEAN] =

  BEGIN
  h.stackEntryPtr ← @h.stackEntry;
  SELECT h.sv.operand01.type FROM
   fixedPointReal =>
    IF h.sv.operand01.fixed.li < unsafeForRound.li THEN {
     h.pc.pcm.fixed ← FixedPointReal.Add[
      m: h.sv.operand01.fixed, n: FixedPointReal.half];
     h.stackEntry ← [
      type: fixedPointReal,
      frameData: fixedPointReal[
      fixed: [if[frac: 0, int: h.pc.pcm.fixed.int]]]];
     }
    ELSE
     h.stackEntry ← [
      type: real,
      frameData: real[real: Real.Float[LONG[LAST[INTEGER]] + 1]]];
```

Copyright © 1992 Xerox Corporation All Rights Reserved

```
   real => {
    h.tempData.lint ← RealOps.RoundLI[
     a: h.sv.operand01.real + 0.5, m: [round: rm]];
    IF h.tempData.lint > LAST[INTEGER] THEN
     h.stackEntry ← [
      type: real, frameData: real[real: Real.Float[h.tempData.lint]]]
    ELSE
     h.stackEntry ← [
      type: fixedPointReal,
      frameData: fixedPointReal[
      fixed: [if[int: INTEGER[h.tempData.lint], frac: 0]]]]};
   ENDCASE;
  IF IPMicrocode.CALL[function: IPFunction.PrePushStack, entryContext: h].result
   # 0 THEN {h.pc.pcm.savedAction ← PrePushStack; RETURN[loop: TRUE]; };
  RETURN[loop: FALSE];
  END;
 Mul: PUBLIC PROCEDURE [h: PreParserCommon.MainHandle] RETURNS [loop: BOOLEAN]
=
  BEGIN
  h.stackEntryPtr ← @h.stackEntry;
  h.stackEntry ← [
   type: real,
   frameData: real[real: h.sv.operand01.real * h.sv.operand02.real]];
  IF IPMicrocode.CALL[function: IPFunction.PrePushStack, entryContext: h].result
   # 0 THEN {h.pc.pcm.savedAction ← PrePushStack; RETURN[loop: TRUE]; };
  RETURN[loop: FALSE];
  END;
 Div: PUBLIC PROCEDURE [h: PreParserCommon.MainHandle] RETURNS [loop: BOOLEAN]
=
  BEGIN
  h.stackEntryPtr ← @h.stackEntry;
  h.stackEntry ← [
   type: real,
   frameData: real[real: h.sv.operand01.real / h.sv.operand02.real]];
  IF IPMicrocode.CALL[function: IPFunction.PrePushStack, entryContext: h].result
   # 0 THEN {h.pc.pcm.savedAction ← PrePushStack; RETURN[loop: TRUE]; };
  RETURN[loop: FALSE];
  END;
 Mod: PUBLIC PROCEDURE [h: PreParserCommon.MainHandle] RETURNS [loop:
BOOLEAN] =
  BEGIN
  h.stackEntryPtr ← @h.stackEntry;
  h.pc.pcm.real1 ← h.sv.operand01.real / h.sv.operand02.real;
  h.stackEntry ← [
   type: real,
   frameData: real[
   real:
   h.sv.operand01.real -
    h.sv.operand02.real *
     (IF h.pc.pcm.real1 < 0 THEN Real.FixI[h.pc.pcm.real1] - 1
```

Copyright © 1992 Xerox Corporation All Rights Reserved

```
  RETURN[loop: FALSE];
  END;
 Rem: PUBLIC PROCEDURE [h: PreParserCommon.MainHandle] RETURNS [loop:
BOOLEAN] =
  BEGIN
  h.stackEntryPtr ← @h.stackEntry;
  h.stackEntry ← [
   type: real,
   frameData: real[
   real:
   h.sv.operand01.real -
    h.sv.operand02.real * Real.FixI[
     h.sv.operand01.real / h.sv.operand02.real]]];
  IF IPMicrocode.CALL[function: IPFunction.PrePushStack, entryContext: h].result
   # 0 THEN {h.pc.pcm.savedAction ← PrePushStack; RETURN[loop: TRUE]; };
  RETURN[loop: FALSE];
  END;
 IGet: PUBLIC PROCEDURE [h: PreParserCommon.MainHandle]
  RETURNS [loop: BOOLEAN ← TRUE] =
  BEGIN
  IF h.sv.operand01.integer NOT IN

[PreParserInterpress.ImagerVariable.FIRST.ORD..PreParserInterpress.ImagerVariable.LAST.
ORD]
   THEN {
   h.pc.pcm.data.code ← PreParserMainErrors.badISetIndex;
   h.pc.pcm.action ← fatalError;
   RETURN;
   };
  h.stackEntryPtr ← @h.stackEntry;
  SELECT PreParserInterpress.ImagerVariable[VAL[h.sv.operand01.integer]] FROM
   DCScpx = > {
    IF h.imagerVars.dcsX = PreParserCommon.UnknownXY THEN {
     h.errorCode ← PreParserMainErrors.invalidCurrentPosition;
     h.pc.pcm.action ← fatalError;
     RETURN;
     };
    h.stackEntry ← [
     type: fixedPointReal,
     frameData: fixedPointReal[fixed: h.imagerVars.dcsX]];
    };
   DCScpy = > {
    IF h.imagerVars.dcsX = PreParserCommon.UnknownXY THEN {
     h.errorCode ← PreParserMainErrors.invalidCurrentPosition;
     h.pc.pcm.action ← fatalError;
     RETURN;
     };
    h.stackEntry ← [
     type: fixedPointReal,
     frameData: fixedPointReal[fixed: h.imagerVars.dcsY]];
```

Copyright © 1992 Xerox Corporation All Rights Reserved

```
    type: fixedPointReal,
    frameData: fixedPointReal[fixed: h.imagerVars.correctMX]];
  correctMY =>
   h.stackEntry ← [
    type: fixedPointReal,
    frameData: fixedPointReal[fixed: h.imagerVars.correctMY]];
 T => {
   h.pc.pcm.nodeSizeInWords ← SIZE[PreParserCommon.Transformation];
   h.pc.pcm.zoneRecPtr ← @h.zone;
   IF IPMicrocode.CALL[
    function: IPFunction.AllocateNodeNFL, entryContext: h].result # 0 THEN {
    h.pc.pcm.savedAction ← iGet; RETURN};
   h.stackEntry ← [
    type: transformation,
    frameData: transformation[transformationPtr: h.pc.pcm.nodePtr]];
   h.stackEntry.transformationPtr ↑ ← h.imagerVars.t;
   h.stackEntry.transformationPtr.cn ← [
    fill: 0, preambleOwned: FALSE, referenceCount: 1, next: NIL,
    type: vectorOfElements, zoneRecPtr: @h.zone];
   };
  priorityImportant =>
   h.stackEntry ← [
    type: fixedPointReal,
    frameData: fixedPointReal[
    fixed: [if[int: h.imagerVars.priorityImportant, frac: 0]]]];
  mediumXSize =>
   h.stackEntry ← [
    type: real, frameData: real[real: h.mediumVars.mediumXSize]];
  mediumYSize =>
   h.stackEntry ← [
    type: real, frameData: real[real: h.mediumVars.mediumYSize]];
  fieldXMin =>
   h.stackEntry ← [
    type: real, frameData: real[real: h.mediumVars.fieldXMin]];
  fieldYMin =>
   h.stackEntry ← [
    type: real, frameData: real[real: h.mediumVars.fieldYMin]];
  fieldXMax =>
   h.stackEntry ← [
    type: real, frameData: real[real: h.mediumVars.fieldXMax]];
  fieldYMax =>
   h.stackEntry ← [
    type: real, frameData: real[real: h.mediumVars.fieldYMax]];
  font => {
   h.stackEntry ← h.imagerVars.font;
   [] ← IPMicrocode.CALL[
    function: IPFunction.CopyStackEntry, entryContext: h];
   };
  color => {
   h.stackEntry ← h.imagerVars.color;
```

Copyright © 1992 Xerox Corporation All Rights Reserved

```
  IF h.stackEntry.type = color THEN {
   h.stackEntryPtr ← @h.stackEntry;
   [] ← IPMicrocode.CALL[
    function: IPFunction.CopyStackEntry, entryContext: h]}};
noImage =>
  h.stackEntry ← [
   type: fixedPointReal,
   frameData: fixedPointReal[
   fixed: [
   if[
   int:
   IF h.imagerVars.noImage > LAST[CARDINAL] THEN LAST[CARDINAL]
   ELSE CARDINAL[h.imagerVars.noImage], frac: 0]]]];
strokeWidth =>
  h.stackEntry ← [
   type: real, frameData: real[real: h.imagerVars.strokeWidth]];
strokeEnd =>
  h.stackEntry ← [
   type: fixedPointReal,
   frameData: fixedPointReal[
   fixed: [if[int: ORD[h.imagerVars.strokeEnd], frac: 0]]]];
underlineStart => {
  h.stackEntry ← [
   type: fixedPointReal,
   frameData: fixedPointReal[fixed: h.imagerVars.underlineStart]]};
amplifySpace =>
  h.stackEntry ← [
   type: fixedPointReal,
   frameData: fixedPointReal[fixed: h.imagerVars.amplifySpace]];
correctPass =>
  h.stackEntry ← [
   type: fixedPointReal,
   frameData: fixedPointReal[
   fixed: [if[int: h.imagerVars.correctPass, frac: 0]]]];
correctShrink => h.stackEntry ← h.imagerVars.correctShrink;
correctTX =>
  h.stackEntry ← [
   type: fixedPointReal,
   frameData: fixedPointReal[fixed: h.imagerVars.correctTX]];
correctTY =>
  h.stackEntry ← [
   type: fixedPointReal,
   frameData: fixedPointReal[fixed: h.imagerVars.correctTY]];
strokeJoint =>
  h.stackEntry ← [
   type: fixedPointReal,
   frameData: fixedPointReal[
   fixed: [if[int: ORD[h.imagerVars.strokeJoint], frac: 0]]]];
clipper => {
  h.pc.pcm.zoneRecPtr ← @h.zone;
```

Copyright © 1992 Xerox Corporation All Rights Reserved

```
    IF IPMicrocode.CALL[function: IPFunction.AllocateNode16, entryContext: h]
     # 0 THEN {h.pc.pcm.savedAction ← iGet; RETURN[TRUE]};
    h.stackEntry ← [
     type: clipper, frameData: clipper[clipperPtr: h.pc.pcm.nodePtr]];
    h.stackEntry.clipperPtr ↑ ← [
     cn: [
     fill: 0, preambleOwned: FALSE, referenceCount: 1, next: NIL,
     type: clipper, zoneRecPtr: @h.zone], clip: h.imagerVars.clipper];
    };
   ENDCASE;
  IF IPMicrocode.CALL[function: IPFunction.PrePushStack, entryContext: h].result
   # 0 THEN {h.pc.pcm.savedAction ← PrePushStack; RETURN; };
  RETURN[loop: FALSE];
  END;
 GetProp: PUBLIC PROCEDURE [h: PreParserCommon.MainHandle]
  RETURNS [loop: BOOLEAN ← FALSE] =
  BEGIN
  found: BOOLEAN;
  error: BOOLEAN;
  [found: found, error: error] ← GetPropInline[h: h];
  IF error THEN RETURN[TRUE];
  [] ← PushInt[h: h, int: ORD[found]];
  END;
 GetP: PUBLIC PROCEDURE [h: PreParserCommon.MainHandle]
  RETURNS [loop: BOOLEAN ← FALSE] =
  BEGIN
  found: BOOLEAN;
  error: BOOLEAN;
  [found: found, error: error] ← GetPropInline[h: h];
  IF error THEN RETURN[TRUE];
  IF ~found THEN {
   h.pc.pcm.data.code ← PreParserMainErrors.propertyNameNotFound;
   h.pc.pcm.action ← fatalError;
   RETURN[TRUE]};
  END;
 GetPropInline: PUBLIC PROCEDURE [h: PreParserCommon.MainHandle]
  RETURNS [found: BOOLEAN ← FALSE, error: BOOLEAN ← FALSE] =
  BEGIN
  count: CARDINAL ← 0;
  SELECT h.sv.operand02.type FROM
   fixedPointReal, real, identifier, vectorOfElements, nullVectorOfElements =>
    NULL;
   ENDCASE => {
    h.pc.pcm.data.code ← PreParserMainErrors.badTypeForPropertyName;
    h.pc.pcm.action ← fatalError;
    RETURN[error: TRUE];
    };
  IF h.sv.operand01.type # nullVectorOfElements THEN {
   IF h.sv.operand01.type # vectorOfElements THEN {
    h.pc.pcm.data.code ← PreParserMainErrors.invalidOperandTypeOnStack;
```

Copyright © 1992 Xerox Corporation All Rights Reserved

```
  h.pc.pcm.action ← fatalError;
  RETURN[error: TRUE];
  };
 IF h.sv.operand01.vectorPtr.count MOD 2 # 0 THEN {
  h.pc.pcm.data.code ← PreParserMainErrors.badPropertyVectorStructure;
  h.pc.pcm.action ← fatalError;
  RETURN[error: TRUE];
  };
 WHILE count < h.sv.operand01.vectorPtr.count DO
  IF EQNProc[
   h: h, stackEntry1: h.sv.operand02,
   stackEntry2: h.sv.operand01.vectorPtr.elements[count]] THEN GOTO found;
  count ← count + 2;
  REPEAT
   found => {
    h.stackEntryPtr ← @h.sv.operand01.vectorPtr.elements[count + 1];
    [] ← IPMicrocode.CALL[
     function: IPFunction.CopyStackEntry, entryContext: h];
    h.stackEntry ← h.stackEntryPtr↑;
    [] ← IPMicrocode.CALL[
     function: IPFunction.PrePushStack, entryContext: h];
    found ← TRUE;
    };
  ENDLOOP;
 };
 PreParserFrameStack.ComplexNodeRefCount[
  h: h, entryPtr: @h.sv.operand01, delta: -1];
 PreParserFrameStack.ComplexNodeRefCount[
  h: h, entryPtr: @h.sv.operand02, delta: -1];
 END;
MergeProp: PUBLIC PROCEDURE [h: PreParserCommon.MainHandle]
 RETURNS [loop: BOOLEAN ← FALSE] =
 BEGIN
 IF h.sv.operand02.type = nullVectorOfElements THEN {
  h.sv.operand03 ← h.sv.operand01;
  h.sv.operand01 ← h.sv.operand02;
  h.sv.operand02 ← h.sv.operand03;
  };
 IF h.sv.operand01.type = nullVectorOfElements THEN
  h.stackEntry ← h.sv.operand02
 ELSE {
  count: CARDINAL ←
   h.sv.operand01.vectorPtr.count + h.sv.operand02.vectorPtr.count;
  IF h.sv.operand01.type # vectorOfElements
   OR h.sv.operand02.type # vectorOfElements THEN {
   h.pc.pcm.data.code ← PreParserMainErrors.invalidOperandTypeOnStack;
   h.pc.pcm.action ← fatalError;
   RETURN[loop: TRUE];
   };
  IF ((h.sv.operand01.vectorPtr.count MOD 2) # 0)
```

Copyright © 1992 Xerox Corporation All Rights Reserved

```
    OR ((h.sv.operand02.vectorPtr.count MOD 2) # 0) THEN {
    h.pc.pcm.data.code ← PreParserMainErrors.badPropertyVectorStructure;
    h.pc.pcm.action ← fatalError;
    RETURN[loop: TRUE];
    };
   h.pc.pcm.nodeSizeInWords ←
    SIZE[PreParserCommon.VectorOfElements] +
     (SIZE[PreParserCommon.StackEntry] * count);
   h.pc.pcm.zoneRecPtr ← @h.zone;
   IF IPMicrocode.CALL[
    function: IPFunction.AllocateNodeNFL, entryContext: h].result # 0 THEN {
    h.pc.pcm.savedAction ← mergeProp; RETURN[TRUE]};
   h.stackEntry ← [
    type: vectorOfElements,
    frameData: vectorOfElements[vectorPtr: h.pc.pcm.nodePtr]];
   h.stackEntry.vectorPtr.cn ← [
    fill: 0, preambleOwned: FALSE, referenceCount: 1, next: NIL,
    type: vectorOfElements, zoneRecPtr: @h.zone];
   h.stackEntry.vectorPtr.low ← 0;
   h.stackEntry.vectorPtr.count ← count;
   FOR index: CARDINAL IN [0..h.sv.operand02.vectorPtr.count) DO
    h.stackEntryPtr ← @h.sv.operand02.vectorPtr.elements[index];
    [] ← IPMicrocode.CALL[
     function: IPFunction.CopyStackEntry, entryContext: h];
    h.stackEntry.vectorPtr.elements[index] ← h.stackEntryPtr ↑ ;
    ENDLOOP;
   FOR index: CARDINAL IN [0..h.sv.operand01.vectorPtr.count) DO
    h.stackEntryPtr ← @h.sv.operand01.vectorPtr.elements[index];
    [] ← IPMicrocode.CALL[
     function: IPFunction.CopyStackEntry, entryContext: h];
    h.stackEntry.vectorPtr.elements[index + h.sv.operand02.vectorPtr.count] ←
     h.stackEntryPtr ↑ ;
    ENDLOOP;
   PreParserFrameStack.ComplexNodeRefCount[
    h: h, entryPtr: @h.sv.operand01, delta: -1];
   PreParserFrameStack.ComplexNodeRefCount[
    h: h, entryPtr: @h.sv.operand02, delta: -1];
   };
  [] ← IPMicrocode.CALL[function: IPFunction.PrePushStack, entryContext: h];
  END;
 EQ: PUBLIC PROCEDURE [h: PreParserCommon.MainHandle]
  RETURNS [loop: BOOLEAN ← TRUE] =
  BEGIN
  eq: BOOLEAN;
  eq ← EQProc[h: h, stackEntry1: h.sv.operand01, stackEntry2: h.sv.operand02];
  loop ← PushInt[h: h, int: ORD[eq]];
  END;
 EQProc: PUBLIC PROCEDURE [
  h: PreParserCommon.MainHandle, stackEntry1: PreParserCommon.StackEntry,
  stackEntry2: PreParserCommon.StackEntry] RETURNS [eq: BOOLEAN ← TRUE] =
```

Copyright © 1992 Xerox Corporation All Rights Reserved

```
BEGIN
realUnpack1, realUnpack2: Ieee.Ext;

CompareString: PROCEDURE [
 str1: PreParserCommon.StringPtr, str2: PreParserCommon.StringPtr]
 RETURNS [BOOLEAN ← TRUE] = INLINE
 BEGIN
 ptr1: LONG POINTER TO PACKED ARRAY [0..0) OF CHARACTER;
 ptr2: LONG POINTER TO PACKED ARRAY [0..0) OF CHARACTER;
 IF str1.length # str2.length THEN RETURN[FALSE];
 IF str1.base # NIL THEN ptr1 ← str1.base + str1.byteOffset
 ELSE ptr1 ← @str1.chars;
 IF str2.base # NIL THEN ptr2 ← str2.base + str1.byteOffset
 ELSE ptr2 ← @str2.chars;

 FOR count: CARDINAL IN [0..str1.length) DO
  a: CHAR = String.LowerCase[VAL[ptr1 ↑ [count]]];
  b: CHAR = String.LowerCase[VAL[ptr2 ↑ [count]]];
  IF a # b THEN RETURN[FALSE];
  ENDLOOP;
 END;
SELECT stackEntry1.type FROM
 fixedPointReal = > {
  h.pc.pcm.fixed ← stackEntry1.fixed;
  [] ← IPMicrocode.CALL[function: IPFunction.FPRToReal, entryContext: h];
  stackEntry1.type ← real;
  stackEntry1.real ← h.pc.pcm.real1;
  };
 real = > NULL;
 identifier = >
  RETURN[
   stackEntry2.type = identifier
    AND CompareString[
     str1: stackEntry1.stringPtr, str2: stackEntry2.stringPtr]];
 ENDCASE = > RETURN[FALSE];

SELECT stackEntry2.type FROM
 fixedPointReal = > {
  h.pc.pcm.fixed ← stackEntry2.fixed;
  [] ← IPMicrocode.CALL[function: IPFunction.FPRToReal, entryContext: h];
  stackEntry2.type ← real;
  stackEntry2.real ← h.pc.pcm.real1;
  };
 real = > NULL;
 ENDCASE = > RETURN[FALSE];

realUnpack1 ← Ieee.Unpack[stackEntry1.real];
realUnpack2 ← Ieee.Unpack[stackEntry2.real];
h.integer ← realUnpack1.exp - realUnpack2.exp;
IF ABS[h.integer] > 1 THEN {
```

Copyright © 1992 Xerox Corporation All Rights Reserved

```
  eq ← (realUnpack1.frac.li = 0 AND realUnpack2.exp < -18)
   OR (realUnpack2.frac.li = 0 AND realUnpack1.exp < -18);
  RETURN;
  };
 IF realUnpack1.det.sign # realUnpack2.det.sign THEN RETURN[eq: FALSE];
 IF h.integer < 0 THEN
  realUnpack1.frac.lc ← Inline.DBITAND[
   (realUnpack1.frac.lc / 2) + 0FFFFH, 0FFFF0000H]
 ELSE
  realUnpack1.frac.lc ← Inline.DBITAND[
   realUnpack1.frac.li + 0FFFFH, 0FFFF0000H];
 IF h.integer > 0 THEN
  realUnpack2.frac.lc ← Inline.DBITAND[
   (realUnpack2.frac.lc / 2) + 0FFFFH, 0FFFF0000H]
 ELSE
  realUnpack2.frac.lc ← Inline.DBITAND[
   realUnpack2.frac.li + 0FFFFH, 0FFFF0000H];
 RETURN[realUnpack1.frac = realUnpack2.frac];
 END;
EQNProc: PUBLIC PROCEDURE [
 h: PreParserCommon.MainHandle, stackEntry1: PreParserCommon.StackEntry,
 stackEntry2: PreParserCommon.StackEntry] RETURNS [eqn: BOOLEAN ← TRUE] =
 BEGIN

 CompareVector: PROCEDURE [
  vec1: PreParserCommon.VectorOfElementsPtr,
  vec2: PreParserCommon.VectorOfElementsPtr] RETURNS [BOOLEAN ← TRUE] = {
  count: CARDINAL;
  h.nodeList ← NIL;
  IF (vec1.low # vec2.low) OR (vec1.count # vec2.count) THEN RETURN[FALSE];
  FOR count IN [0..vec1.count) DO
   IF ~EQProc[
    h: h, stackEntry1: vec1.elements[count],
    stackEntry2: vec2.elements[count]] THEN RETURN[FALSE];
   ENDLOOP;
  RETURN[TRUE]};
 SELECT stackEntry1.type FROM
  fixedPointReal, real, identifier =>
   RETURN[EQProc[h: h, stackEntry1: stackEntry1, stackEntry2: stackEntry2]];
  vectorOfElements => {
   IF stackEntry2.type # vectorOfElements THEN RETURN[FALSE];
   RETURN[
    CompareVector[
     vec1: stackEntry1.vectorPtr, vec2: stackEntry2.vectorPtr]]};
  nullVectorOfElements => RETURN[stackEntry2.type = nullVectorOfElements];
  ENDCASE => RETURN[FALSE];
 END;
GT: PUBLIC PROCEDURE [h: PreParserCommon.MainHandle]
 RETURNS [loop: BOOLEAN ← TRUE] =
 BEGIN
```

Copyright © 1992 Xerox Corporation All Rights Reserved

```
 int: INTEGER ← 0;
 IF h.sv.operand01.real > h.sv.operand02.real THEN int ← 1;
 RETURN[PushInt[h: h, int: int]];
 END;
GE: PUBLIC PROCEDURE [h: PreParserCommon.MainHandle]
 RETURNS [loop: BOOLEAN ← TRUE] =
 BEGIN
 int: INTEGER ← 0;
 IF h.sv.operand01.real >= h.sv.operand02.real THEN int ← 1;
 RETURN[PushInt[h: h, int: int]];
 END;
And: PUBLIC PROCEDURE [h: PreParserCommon.MainHandle]
 RETURNS [loop: BOOLEAN ← TRUE] =
 BEGIN
 loop ← PushInt[
  h: h,
  int: ORD[(h.sv.operand01.fixed.li # 0) AND (h.sv.operand02.fixed.li # 0)]];
 END;
Or: PUBLIC PROCEDURE [h: PreParserCommon.MainHandle]
 RETURNS [loop: BOOLEAN ← TRUE] =
 BEGIN
 loop ← PushInt[
  h: h,
  int: ORD[(h.sv.operand01.fixed.li # 0) OR (h.sv.operand02.fixed.li # 0)]];
 END;
Not: PUBLIC PROCEDURE [h: PreParserCommon.MainHandle]
 RETURNS [loop: BOOLEAN ← TRUE] =
 BEGIN loop ← PushInt[h: h, int: ORD[(h.sv.operand01.fixed.li = 0)]]; END;
Type: PUBLIC PROCEDURE [h: PreParserCommon.MainHandle]
 RETURNS [loop: BOOLEAN ← TRUE] =
 BEGIN
 h.integer ←
  SELECT h.sv.operand01.type FROM
   fixedPointReal, real, roundedInteger => 1,
   identifier => 2,
   string, vectorOfElements, nullVectorOfElements, largeVector, pixelVector
    => 3,
   composedOp => 4,
   transformation => 5,
   pixelArray => 6,
   grayColor, color => 7,
   trajectory => 8,
   outline => 9,
   font => 10,
   clipper => 11,
   ENDCASE => 0;
 loop ← PushInt[h: h, int: h.integer];
 END;
Copy: PUBLIC PROCEDURE [h: PreParserCommon.MainHandle]
 RETURNS [loop: BOOLEAN ← FALSE] =
```

Copyright © 1992 Xerox Corporation All Rights Reserved

```
BEGIN
start: INTEGER ← INTEGER[h.pc.operationStage];
count: INTEGER;
IF h.sv.operand01.integer = 0 THEN RETURN[FALSE];
IF h.sv.operand01.integer < 0 THEN {
 h.pc.pcm.action ← fatalError;
 h.pc.pcm.data.code ← PreParserMainErrors.badOperandValue;
 RETURN[loop: TRUE];
 };
IF h.pc.operationStage = 0 THEN {
 h.pc.pcm.nodeSizeInWords ←
  h.sv.operand01.integer * SIZE[PreParserCommon.StackEntry];
 h.pc.pcm.zoneRecPtr ← @h.zone;
 IF IPMicrocode.CALL[
  function: IPFunction.AllocateNodeNFL, entryContext: h].result # 0 THEN {
  h.pc.pcm.savedAction ← copy; RETURN[TRUE]};
 h.tempData.firstStackEntryPtr ← h.pc.pcm.nodePtr;
 h.tempData.nodePtr ← h.pc.pcm.nodePtr;
 h.stackEntryPtr ← h.pc.pcm.nodePtr;
 FOR count IN [0..h.sv.operand01.integer) DO
  IF IPMicrocode.CALL[function: IPFunction.PopStack, entryContext: h].result
   # 0 THEN RETURN[TRUE];
  h.stackEntryPtr ← h.stackEntryPtr + SIZE[PreParserCommon.StackEntry];
  ENDLOOP;
 h.stackEntryPtr ← h.stackEntryPtr - SIZE[PreParserCommon.StackEntry];
 h.tempData.lastStackEntryPtr ← h.stackEntryPtr;
 FOR count IN [0..h.sv.operand01.integer) DO
  h.stackEntry ← h.stackEntryPtr ↑ ;
  IF h.stackEntry.type IN [composedOp..runOfRunOfCardinalSeq] THEN
   h.stackEntry.stringPtr.cn.zoneRecPtr ← @h.zone;
  [] ← IPMicrocode.CALL[function: IPFunction.PrePushStack, entryContext: h];
  h.stackEntryPtr ← h.stackEntryPtr - SIZE[PreParserCommon.StackEntry];
  ENDLOOP};
h.stackEntryPtr ← h.tempData.lastStackEntryPtr;
FOR count IN [start..h.sv.operand01.integer) DO
 h.stackEntry ← h.stackEntryPtr ↑ ;
 [] ← IPMicrocode.CALL[function: IPFunction.CopyStackEntry, entryContext: h];
 IF IPMicrocode.CALL[
  function: IPFunction.PrePushStack, entryContext: h].result # 0 THEN {
  h.pc.pcm.savedAction ← copy; h.pc.operationStage ← count; RETURN[TRUE]};
 h.stackEntryPtr ← h.stackEntryPtr - SIZE[PreParserCommon.StackEntry];
 ENDLOOP;
h.pc.pcm.zoneRecPtr ← @h.zone;
h.pc.pcm.nodePtr ← h.tempData.firstStackEntryPtr;
[] ← IPMicrocode.CALL[function: IPFunction.FreeNodeNFL, entryContext: h];
END;

Count: PUBLIC PROCEDURE [h: PreParserCommon.MainHandle]
 RETURNS [loop: BOOLEAN ← FALSE] =
 BEGIN
```

Copyright © 1992 Xerox Corporation All Rights Reserved

```
stackCount: CARDINAL ← h.topStackRecordEntryCount;
stackRecordPtr: PreParserCommon.StackRecordPtr ← h.topStackRecordPtr;
entryCount: CARDINAL ← 0;
DO
 IF stackCount = 0 THEN
  BEGIN
  stackRecordPtr ← stackRecordPtr↑.next;
  stackCount ← PreParserCommon.stackEntryCount;
  END;
 stackCount ← stackCount - 1;
 IF stackRecordPtr↑.entries[stackCount].type = mark THEN
  IF (stackRecordPtr.next = NIL) AND (stackCount = 0) THEN
   BEGIN
   h.pc.pcm.action ← fatalError;
   h.pc.pcm.data.code ← PreParserMainErrors.markNotFoundOnStack;
   RETURN[loop: TRUE];
   END
  ELSE EXIT;
 entryCount ← entryCount + 1;
 ENDLOOP;
h.stackEntry ← [
 type: fixedPointReal,
 frameData: fixedPointReal[fixed: [if[int: entryCount, frac: 0]]]];
IF IPMicrocode.CALL[function: IPFunction.PrePushStack, entryContext: h].result
 # 0 THEN {h.pc.pcm.savedAction ← PrePushStack; RETURN[loop: TRUE]};
END;
Dup: PUBLIC PROCEDURE [h: PreParserCommon.MainHandle]
 RETURNS [loop: BOOLEAN ← FALSE] =
 BEGIN
 h.stackEntry ← h.sv.operand01;
 [] ← IPMicrocode.CALL[function: IPFunction.PrePushStack, entryContext: h];
 h.stackEntryPtr ← @h.sv.operand01;
 [] ← IPMicrocode.CALL[function: IPFunction.CopyStackEntry, entryContext: h];
 IF IPMicrocode.CALL[function: IPFunction.PrePushStack, entryContext: h].result
  # 0 THEN BEGIN h.pc.pcm.savedAction ← PrePushStack; RETURN[loop: TRUE]; END;
 END;
Exch: PUBLIC PROCEDURE [h: PreParserCommon.MainHandle]
 RETURNS [loop: BOOLEAN ← FALSE] =
 BEGIN
 h.stackEntry ← h.sv.operand02;
 [] ← IPMicrocode.CALL[function: IPFunction.PrePushStack, entryContext: h];
 h.stackEntry ← h.sv.operand01;
 [] ← IPMicrocode.CALL[function: IPFunction.PrePushStack, entryContext: h];
 END;
Pop: PUBLIC PROCEDURE [h: PreParserCommon.MainHandle]
 RETURNS [loop: BOOLEAN ← FALSE] =
 BEGIN
 PreParserFrameStack.ComplexNodeRefCount[
  h: h, entryPtr: @h.sv.operand01, delta: -1];
 END;
```

Copyright © 1992 Xerox Corporation All Rights Reserved

```
Roll: PUBLIC PROCEDURE [h: PreParserCommon.MainHandle]
 RETURNS [loop: BOOLEAN ← FALSE] =
 BEGIN
 count: INTEGER;
 h.tempData.bottomCount ← h.sv.operand01.integer - h.sv.operand02.integer;
 IF h.tempData.bottomCount < 0 THEN {
  h.pc.pcm.action ← fatalError;
  h.pc.pcm.data.code ← PreParserMainErrors.badOperandValue;
  RETURN[loop: TRUE]};
 IF h.sv.operand01.integer = 0 OR h.tempData.bottomCount = 0 THEN
  RETURN[loop: FALSE];
 h.pc.pcm.nodeSizeInWords ←
  h.sv.operand01.integer * SIZE[PreParserCommon.StackEntry];
 h.pc.pcm.zoneRecPtr ← @h.zone;
 IF IPMicrocode.CALL[
  function: IPFunction.AllocateNodeNFL, entryContext: h].result # 0 THEN {
  h.pc.pcm.savedAction ← roll; RETURN[loop: TRUE]};
 h.tempData.firstStackEntryPtr ← h.pc.pcm.nodePtr;
 h.stackEntryPtr ←
  h.tempData.firstStackEntryPtr +
   (h.sv.operand02.integer * SIZE[PreParserCommon.StackEntry]);
 FOR count IN [1..h.tempData.bottomCount] DO
  IF IPMicrocode.CALL[function: IPFunction.PopStack, entryContext: h].result #
   0 THEN RETURN[loop: TRUE];
  h.stackEntryPtr ← h.stackEntryPtr + SIZE[PreParserCommon.StackEntry];
  ENDLOOP;
 h.tempData.lastStackEntryPtr ← h.stackEntryPtr;
 h.stackEntryPtr ← h.tempData.firstStackEntryPtr;
 FOR count IN [1..h.sv.operand02.integer] DO
  IF IPMicrocode.CALL[function: IPFunction.PopStack, entryContext: h].result #
   0 THEN RETURN[loop: TRUE];
  h.stackEntryPtr ← h.stackEntryPtr + SIZE[PreParserCommon.StackEntry];
  ENDLOOP;
 h.stackEntryPtr ← h.tempData.lastStackEntryPtr;
 FOR count IN [1..h.sv.operand01.integer] DO
  h.stackEntryPtr ← h.stackEntryPtr - SIZE[PreParserCommon.StackEntry];
  h.stackEntry ← h.stackEntryPtr↑;
  [] ← IPMicrocode.CALL[function: IPFunction.PrePushStack, entryContext: h];
  ENDLOOP;
 h.pc.pcm.zoneRecPtr ← @h.zone;
 h.pc.pcm.nodePtr ← h.tempData.firstStackEntryPtr;
 [] ← IPMicrocode.CALL[function: IPFunction.FreeNodeNFL, entryContext: h];
 END;
Mark: PUBLIC PROCEDURE [h: PreParserCommon.MainHandle]
 RETURNS [loop: BOOLEAN ← FALSE] =
 BEGIN
 count: INTEGER;
 h.pc.pcm.nodeSizeInWords ←
  h.sv.operand01.integer * SIZE[PreParserCommon.StackEntry];
 h.pc.pcm.zoneRecPtr ← @h.zone;
```

Copyright © 1992 Xerox Corporation All Rights Reserved

```
IF h.sv.operand01.integer # 0
 AND IPMicrocode.CALL[
  function: IPFunction.AllocateNodeNFL, entryContext: h].result # 0 THEN {
 h.pc.pcm.savedAction ← Mark; RETURN[TRUE]};
h.tempData.firstStackEntryPtr ← h.pc.pcm.nodePtr;
h.stackEntryPtr ← h.pc.pcm.nodePtr;
FOR count IN [0..h.sv.operand01.integer) DO
 IF IPMicrocode.CALL[function: IPFunction.PopStack, entryContext: h].result #
  0 THEN RETURN[TRUE];
 IF h.stackEntryPtr.type = mark THEN {
  h.pc.pcm.action ← fatalError;
  h.pc.pcm.data.code ← PreParserMainErrors.unexpectedMark;
  RETURN[loop: TRUE]};
 h.stackEntryPtr ← h.stackEntryPtr + SIZE[PreParserCommon.StackEntry];
 ENDLOOP;
h.stackEntry ← [type: mark, frameData: mark[mark: h.framePtr]];
[] ← IPMicrocode.CALL[function: IPFunction.PrePushStack, entryContext: h];
FOR count IN [1..h.sv.operand01.integer] DO
 h.stackEntryPtr ← h.stackEntryPtr - SIZE[PreParserCommon.StackEntry];
 h.stackEntry ← h.stackEntryPtr↑ ;
 [] ← IPMicrocode.CALL[function: IPFunction.PrePushStack, entryContext: h];
 ENDLOOP;
IF h.sv.operand01.integer # 0 THEN {
 h.pc.pcm.zoneRecPtr ← @h.zone;
 h.pc.pcm.nodePtr ← h.tempData.firstStackEntryPtr;
 [] ← IPMicrocode.CALL[function: IPFunction.FreeNodeNFL, entryContext: h]};
END;
UnMark: PUBLIC PROCEDURE [h: PreParserCommon.MainHandle]
 RETURNS [loop: BOOLEAN ← FALSE] =
 BEGIN
 count: INTEGER;
 h.pc.pcm.nodeSizeInWords ←
  h.sv.operand01.integer * SIZE[PreParserCommon.StackEntry];
 h.pc.pcm.zoneRecPtr ← @h.zone;
 IF h.sv.operand01.integer # 0
  AND IPMicrocode.CALL[
   function: IPFunction.AllocateNodeNFL, entryContext: h].result # 0 THEN {
  h.pc.pcm.savedAction ← unmark; RETURN[TRUE]};
 h.tempData.firstStackEntryPtr ← h.pc.pcm.nodePtr;
 h.stackEntryPtr ← h.pc.pcm.nodePtr;
 FOR count IN [0..h.sv.operand01.integer) DO
  IF IPMicrocode.CALL[function: IPFunction.PopStack, entryContext: h].result #
   0 THEN RETURN[TRUE];
  IF h.stackEntryPtr.type = mark THEN {
   h.pc.pcm.action ← fatalError;
   h.pc.pcm.data.code ← PreParserMainErrors.unexpectedMark;
   RETURN[loop: TRUE]};
  h.stackEntryPtr ← h.stackEntryPtr + SIZE[PreParserCommon.StackEntry];
  ENDLOOP;
 h.tempData.lastStackEntryPtr ← h.stackEntryPtr;
```

Copyright © 1992 Xerox Corporation All Rights Reserved

```
 h.stackEntryPtr ← @h.stackEntry;
 IF IPMicrocode.CALL[function: IPFunction.PopStack, entryContext: h].result # 0
  THEN RETURN[TRUE];
 IF h.stackEntry.type = mark THEN {
  IF h.stackEntry.mark # h.framePtr THEN {
   h.pc.pcm.action ← fatalError;
   h.pc.pcm.data.code ← PreParserMainErrors.unexpectedMark;
   RETURN[TRUE]};
  }
 ELSE {
  h.pc.pcm.action ← fatalError;
  h.pc.pcm.data.code ← PreParserMainErrors.markNotFoundOnStack;
  RETURN[TRUE]};
 h.stackEntryPtr ← h.tempData.lastStackEntryPtr;
 FOR count IN [0..h.sv.operand01.integer) DO
  h.stackEntryPtr ← h.stackEntryPtr - SIZE[PreParserCommon.StackEntry];
  h.stackEntry ← h.stackEntryPtr↑ ;
  [] ← IPMicrocode.CALL[function: IPFunction.PrePushStack, entryContext: h];
  ENDLOOP;
 IF h.sv.operand01.integer # 0 THEN {
  h.pc.pcm.zoneRecPtr ← @h.zone;
  h.pc.pcm.nodePtr ← h.tempData.firstStackEntryPtr;
  [] ← IPMicrocode.CALL[function: IPFunction.FreeNodeNFL, entryContext: h]};
 END;
Initialize: PUBLIC PROCEDURE = BEGIN END;
END.
```

Copyright © 1992 Xerox Corporation All Rights Reserved

```
DIRECTORY
 PreParserInstructions USING [StaticStringType];

PreParserStaticStringsImpl: PROGRAM =
 BEGIN

 StringName: ARRAY PreParserInstructions.StaticStringType OF STRING = [
  "mediumName", "mediumMessage", "mediumXSize", "mediumYSize", "low",
"normal",
  "high", "simplex", "duplex", "finishing", "cornerStaple", "Xerox", "bind",
  "landscapeStaple", "doubleStaple", "sampleTray", "standard", "jobSecurity",
  "jobAttributes", "binderyFinishing", "simplePamphletSignature", "stacking",
  "slipSheet", "collated", "jobCreateDate", "jobName", "jobAccountName",
  "jobComment", "jobPageCount", "jobPriority", "jobSender", "jobRecipient",
  "jobStartMessage", "jobStartWait", "jobEndMessage", "jobEndWait",
  "jobDisposition", "jobTotalSize", "jobErrorAbort", "jobErrorReporting",
  "jobPolicy", "acquire", "modify", "all", "owner", "none", "duplexHeadToToe",
  "tumbleDuplex", "referenceEdge", "referenceXSize", "referenceYSize",
  "bindingType", "bindingColor", "binderyOperation", "locations", "headCount",
  "processOffset", "headLocations", "trimmedSize", "referenceEdgeOffset",
  "trimXSize", "trimYSize", "inserting", "inserts", "insertSheet", "insertName",
  "insertSize", "insertEdge", "insertTopSurface", "insertBin", "insertAfter",
  "dieCutting", "dieCutName", "dieCutPosition", "maximumShift",
  "bindingEdgeFold", "impositionsPerSurface", "sourcePageDims",
  "resultSheetSize", "preserveCovers", "edgeStitching", "saddleStitching",
  "binding", "punching", "folding", "perforating", "slitting", "trimming",
  "finishingMessage", "velo", "plastic", "perfect", "spiral", "tape", "color",
  "weight", "opacity", "preFinish", "holeCount", "preOrderedCount",
  "preOrderedPosition", "tabEdge", "inlineHoleCount", "orderedCount",
  "orderedPosition", "finishEdge", "labelsPerRow", "labelsPerColumn", "ask",
  "defaultName", "white", "pink", "yellow", "buff", "goldenrod", "blue",
  "green", "red", "noColor", "black", "brown", "gray", "plain", "drilled",
  "preCutTab", "continuous", "adhesiveLabel", "coverStock", "bond", "antique",
  "parchment", "smooth", "mylarReinforced", "envelopePlain", "envelopeWindow",
  "carbonless", "binderyFinishingSelect", "pageBinderyFinishingSelect",
  "covers", "frontCoverMedium", "backCoverMedium", "frontCover", "backCover",
  "offset", "cluster", "primarySets", "primarySetSelect",
  "pagePrimarySetSelect"];
```

Copyright © 1992 Xerox Corporation All Rights Reserved

```
DIRECTORY
 Inline USING [BITAND, HighHalf, LongCOPY, LowHalf],
 InternalIP USING [
  PixelPoint, RealPixelPoint, StrokeAction, StrokeType, Token, ValidTokenType],
 IPMicrocode USING [CALL],
 IPFunction USING [
  AllocateNode16, AllocateNode64, Mid3, FPRToReal, PrePushStack, PrePutToken,
  PreTransformIPPoint],
 ParserCommon USING [
  Add, Bezier, ConicToCurves, Cross, CurveLength, Dot, FSC, Length, Mul,
  RealPlusOrMinus, Sub, Square, SqRt],
 PreParserCommon USING [
  AllocateNode16Size, Assertion, MainHandle, Trajectory, TrajectoryFillSize,
  TrajectoryRecordPtr],
 PreParserFrameStack USING [ChangeRefCountAndFree, ComplexNodeRefCount],
 PreParserMainErrors USING [invalidOperandTypeOnStack],
 PreParserMainOps USING [CheckGraphic, CheckStroke],
 PreParserStroke USING [],
 Real USING [FixC],
 RealFns USING [ArcTanDeg, Cos, Sin],
 Transformation USING [Matrix];

PreParserStrokeImpl: PROGRAM
 IMPORTS
  Inline, IPMicrocode, ParserCommon, PreParserFrameStack, PreParserMainOps,
  Real, RealFns
 EXPORTS PreParserStroke =
 BEGIN

 Vector: TYPE = InternalIP.RealPixelPoint;

 AllocateNode16Check: PreParserCommon.Assertion =
  (SIZE[PreParserCommon.Trajectory] <= PreParserCommon.AllocateNode16Size);
 twoToSigBits: REAL = 4.0;

 ArcTo: PUBLIC PROCEDURE [h: PreParserCommon.MainHandle]
  RETURNS [loop: BOOLEAN ← FALSE] =
  BEGIN

  h.pc.pcm.autoExtend ← TRUE;

  ArcToConics[
   h: h, p0: h.lastPtMCS, p1: [x: h.sv.operand02.real, y: h.sv.operand03.real],
   p2: [x: h.sv.operand04.real, y: h.sv.operand05.real]];

  h.pc.pcm.autoExtend ← FALSE;

  h.lastPtMCS ← [x: h.sv.operand04.real, y: h.sv.operand05.real];
```

Copyright © 1992 Xerox Corporation All Rights Reserved

```
 h.stackEntry ← h.sv.operand01;
 IF IPMicrocode.CALL[function: IPFunction.PrePushStack, entryContext: h].result
  # 0 THEN BEGIN h.pc.pcm.savedAction ← PrePushStack; RETURN[loop: TRUE]; END;
 END;
ConicTo: PUBLIC PROCEDURE [h: PreParserCommon.MainHandle]
 RETURNS [loop: BOOLEAN ← FALSE] =
 BEGIN

 IF PutConic[
  h: h, p1: [x: h.sv.operand02.real, y: h.sv.operand03.real],
  p2: [x: h.sv.operand04.real, y: h.sv.operand05.real],
  r: h.sv.operand06.real].loop THEN
  BEGIN h.pc.pcm.savedAction ← conicTo; RETURN[loop: TRUE]; END;

 h.lastPtMCS ← [x: h.sv.operand04.real, y: h.sv.operand05.real];

 h.stackEntry ← h.sv.operand01;
 IF IPMicrocode.CALL[function: IPFunction.PrePushStack, entryContext: h].result
  # 0 THEN BEGIN h.pc.pcm.savedAction ← PrePushStack; RETURN[loop: TRUE]; END;
 END;
CurveTo: PUBLIC PROCEDURE [h: PreParserCommon.MainHandle]
 RETURNS [loop: BOOLEAN ← FALSE] =
 BEGIN
 strokePtr: LONG POINTER TO InternalIP.StrokeAction;

 h.tempData.strokeSize ← SIZE[curveTo InternalIP.StrokeAction];

 IF CheckTrajectorySpace[h: h].loop THEN
  BEGIN h.pc.pcm.savedAction ← curveTo; RETURN[loop: TRUE]; END;

 strokePtr ← LOOPHOLE[@h.tempData.currentPtr.strokes[
  h.tempData.currentPtr.wordCount]];
 strokePtr ↑ ← [
  type: curveTo,
  strokeData: curveTo[
  strokeCurveTo: [
  p1: [x: h.sv.operand02.real, y: h.sv.operand03.real],
  p2: [x: h.sv.operand04.real, y: h.sv.operand05.real],
  p3: [x: h.sv.operand06.real, y: h.sv.operand07.real]]]];

 h.lastPtMCS ← [x: h.sv.operand06.real, y: h.sv.operand07.real];

 h.tempData.currentPtr.wordCount ←
  h.tempData.currentPtr.wordCount + h.tempData.strokeSize;

 h.stackEntry ← h.sv.operand01;
 IF IPMicrocode.CALL[function: IPFunction.PrePushStack, entryContext: h].result
  # 0 THEN BEGIN h.pc.pcm.savedAction ← PrePushStack; RETURN[loop: TRUE]; END;
 END;
LineTo: PUBLIC PROCEDURE [h: PreParserCommon.MainHandle]
```

Copyright © 1992 Xerox Corporation All Rights Reserved

```
RETURNS [loop: BOOLEAN ← FALSE] =
BEGIN
strokePtr: LONG POINTER TO InternalIP.StrokeAction;

h.tempData.strokeSize ← SIZE[lineToXY InternalIP.StrokeAction];

IF CheckTrajectorySpace[h: h].loop THEN
 BEGIN h.pc.pcm.savedAction ← lineTo; RETURN[loop: TRUE]; END;

strokePtr ← LOOPHOLE[@h.tempData.currentPtr.strokes[
 h.tempData.currentPtr.wordCount]];
strokePtr ↑ ← [
 type: lineToXY,
 strokeData: lineToXY[
 strokeLineToXY: [x: h.sv.operand02.real, y: h.sv.operand03.real]]];

h.lastPtMCS ← [x: h.sv.operand02.real, y: h.sv.operand03.real];

h.tempData.currentPtr.wordCount ←
 h.tempData.currentPtr.wordCount + h.tempData.strokeSize;

h.stackEntry ← h.sv.operand01;
IF IPMicrocode.CALL[function: IPFunction.PrePushStack, entryContext: h].result
 # 0 THEN BEGIN h.pc.pcm.savedAction ← PrePushStack; RETURN[loop: TRUE]; END;
END;
LineToX: PUBLIC PROCEDURE [h: PreParserCommon.MainHandle]
RETURNS [loop: BOOLEAN ← FALSE] =
BEGIN
strokePtr: LONG POINTER TO InternalIP.StrokeAction;

h.tempData.strokeSize ← SIZE[lineToX InternalIP.StrokeAction];

IF CheckTrajectorySpace[h: h].loop THEN
 BEGIN h.pc.pcm.savedAction ← lineToX; RETURN[loop: TRUE]; END;

strokePtr ← LOOPHOLE[@h.tempData.currentPtr.strokes[
 h.tempData.currentPtr.wordCount]];
strokePtr ↑ ← [
 type: lineToX, strokeData: lineToX[strokeLineToX: h.sv.operand02.real]];

h.lastPtMCS.x ← h.sv.operand02.real;

h.tempData.currentPtr.wordCount ←
 h.tempData.currentPtr.wordCount + h.tempData.strokeSize;

h.stackEntry ← h.sv.operand01;
IF IPMicrocode.CALL[function: IPFunction.PrePushStack, entryContext: h].result
 # 0 THEN BEGIN h.pc.pcm.savedAction ← PrePushStack; RETURN[loop: TRUE]; END;
END;
LineToY: PUBLIC PROCEDURE [h: PreParserCommon.MainHandle]
```

Copyright © 1992 Xerox Corporation All Rights Reserved

```
RETURNS [loop: BOOLEAN ← FALSE] =
BEGIN
strokePtr: LONG POINTER TO InternalIP.StrokeAction;

h.tempData.strokeSize ← SIZE[lineToY InternalIP.StrokeAction];

IF CheckTrajectorySpace[h: h].loop THEN
 BEGIN h.pc.pcm.savedAction ← lineToY; RETURN[loop: TRUE]; END;

strokePtr ← LOOPHOLE[@h.tempData.currentPtr.strokes[
 h.tempData.currentPtr.wordCount]];
strokePtr ↑ ← [
 type: lineToY, strokeData: lineToY[strokeLineToY: h.sv.operand02.real]];

h.lastPtMCS.y ← h.sv.operand02.real;

h.tempData.currentPtr.wordCount ←
 h.tempData.currentPtr.wordCount + h.tempData.strokeSize;

h.stackEntry ← h.sv.operand01;
IF IPMicrocode.CALL[function: IPFunction.PrePushStack, entryContext: h].result
 # 0 THEN BEGIN h.pc.pcm.savedAction ← PrePushStack; RETURN[loop: TRUE]; END;
END;
MaskDashedStroke: PUBLIC PROCEDURE [h: PreParserCommon.MainHandle]
RETURNS [loop: BOOLEAN ← FALSE] =
BEGIN
currentRecPtr: PreParserCommon.TrajectoryRecordPtr ← NIL;

IF h.pc.operationStage = 0 THEN
 BEGIN
 patternPlusWords, trajectoryWords: CARDINAL ← 0;
 h.tempData.currentPtr ← h.sv.operand01.trajectory.trajectoryRecPtr;
 h.tempData.currentWords ← 0;
 h.tempData.midReal ← FALSE;
 h.tempData.patternCount ← 0;
 h.tempData.strokeOffset ← 0;
 IF PreParserMainOps.CheckGraphic[h: h].needIIPBlock THEN {
  h.pc.pcm.savedAction ← maskStroke; RETURN[loop: TRUE]};
 IF PreParserMainOps.CheckStroke[h: h].needIIPBlock THEN
  BEGIN h.pc.pcm.savedAction ← maskStroke; RETURN[loop: TRUE]; END;
 currentRecPtr ← h.tempData.currentPtr;
 DO
  trajectoryWords ← trajectoryWords + currentRecPtr.wordCount;
  IF currentRecPtr.nextPtr = NIL THEN EXIT
  ELSE currentRecPtr ← currentRecPtr.nextPtr;
  ENDLOOP;

 patternPlusWords ←
  3 * SIZE[REAL] + SIZE[Transformation.Matrix] + SIZE[CARDINAL] +
   h.sv.operand02.vectorPtr.count * SIZE[REAL] + SIZE[
```

Copyright © 1992 Xerox Corporation All Rights Reserved

```
    InternalIP.ValidTokenType];

  LOOPHOLE[@h.token, LONG POINTER TO maskDashedStroke InternalIP.Token] ↑ ← [
   maskDashedStroke[
   rec: [
   offsetToNextToken: patternPlusWords + trajectoryWords + SIZE[CARDINAL],
   mappedLength: h.sv.operand04.real, totalLength: MeasurePath[h: h],
   offset: h.sv.operand03.real,
   transformation: [
   a: h.imagerVars.t.a, b: h.imagerVars.t.b, c: h.imagerVars.t.c,
   d: h.imagerVars.t.d, e: h.imagerVars.t.e, f: h.imagerVars.t.f,
   form: LOOPHOLE[h.imagerVars.tFormHint]],
   patternCount: h.sv.operand02.vectorPtr.count, pattern: TRASH]]];
  END;

 IF h.pc.operationStage < 2 THEN
  IF IPMicrocode.CALL[
   function: IPFunction.PrePutToken, entryContext: h].result # 0 THEN
   BEGIN
   h.pc.operationStage ← 1;
   h.pc.pcm.savedAction ← maskDashedStroke;
   RETURN[loop: TRUE];
   END;

 IF h.pc.operationStage < 3 THEN
  BEGIN
  FOR i: CARDINAL IN [h.tempData.patternCount..h.sv.operand02.vectorPtr.count)
   DO
   real: REAL;
   SELECT h.sv.operand02.vectorPtr.elements[i].type FROM
    fixedPointReal =>
     BEGIN
     h.pc.pcm.fixed.li ← h.sv.operand02.vectorPtr.elements[i].fixed.li;
     [] ← IPMicrocode.CALL[
      function: IPFunction.FPRToReal, entryContext: h];
     real ← h.pc.pcm.real1;
     END;
    real => real ← h.sv.operand02.vectorPtr.elements[i].real;
    ENDCASE =>
     BEGIN
     h.pc.pcm.action ← fatalError;
     h.pc.pcm.data.code ← PreParserMainErrors.invalidOperandTypeOnStack;
     END;

   IF h.tempData.midReal THEN
    BEGIN
    LOOPHOLE[h.iipData.currentWordPtr, LONG POINTER TO UNSPECIFIED] ↑ ←
     Inline.HighHalf[real];
    h.iipData.currentWordPtr ← h.iipData.currentWordPtr + 1;
    h.iipData.currentWordCount ← h.iipData.currentWordCount - 1;
```

Copyright © 1992 Xerox Corporation All Rights Reserved

```
h.tempData.midReal ← FALSE;
END
ELSE
IF h.iipData.currentWordCount < SIZE[REAL] THEN
 BEGIN
 IF h.iipData.currentWordCount = 1 THEN
  BEGIN
  LOOPHOLE[h.iipData.currentWordPtr, LONG POINTER TO UNSPECIFIED] ↑ ←
   Inline.LowHalf[real];
  h.iipData.currentWordPtr ← h.iipData.currentWordPtr + 1;
  h.iipData.currentWordCount ← h.iipData.currentWordCount - 1;
  h.tempData.midReal ← TRUE;
  END;

 h.tempData.patternCount ← i;
 h.pc.operationStage ← 2;
 h.pc.pcm.action ← needIIPBlock;
 RETURN[loop: TRUE];
 END
ELSE
 BEGIN
 LOOPHOLE[h.iipData.currentWordPtr, LONG POINTER TO REAL] ↑ ← real;
 h.iipData.currentWordPtr ← h.iipData.currentWordPtr + SIZE[REAL];
 h.iipData.currentWordCount ← h.iipData.currentWordCount - SIZE[REAL];
 END;
ENDLOOP;

LOOPHOLE[@h.token, LONG POINTER TO maskDashedStrokeTrajectory
 InternalIP.Token] ↑ ← [
 maskDashedStrokeTrajectory[
 rec: [
 trajectory: [
 numberOfStrokes: h.sv.operand01.trajectory.strokeCount,
 strokes: TRASH]]]];
END;

IF h.pc.operationStage < 4 THEN
 BEGIN
 IF IPMicrocode.CALL[
  function: IPFunction.PrePutToken, entryContext: h].result # 0 THEN
  BEGIN
  h.pc.operationStage ← 3;
  h.pc.pcm.savedAction ← maskDashedStroke;
  RETURN[loop: TRUE];
  END;
 h.pc.operationStage ← 0;
 END;

currentRecPtr ← h.tempData.currentPtr;
```

Copyright © 1992 Xerox Corporation All Rights Reserved

```
IF h.pc.operationStage = 0 THEN
 h.tempData.strokeSize ← currentRecPtr.wordCount;

DO
 IF PutWords[h: h, data: @currentRecPtr.strokes[0]].needIIPBlock THEN
  BEGIN
  h.pc.operationStage ← 5;
  h.tempData.currentPtr ← currentRecPtr;
  h.pc.pcm.savedAction ← maskDashedStroke;
  RETURN[loop: TRUE];
  END;

 IF currentRecPtr.nextPtr = NIL THEN EXIT
 ELSE
  BEGIN
  currentRecPtr ← currentRecPtr.nextPtr;
  h.tempData.strokeSize ← currentRecPtr.wordCount;
  END;
 ENDLOOP;

h.pc.operationStage ← 0;

PreParserFrameStack.ComplexNodeRefCount[
 h: h, entryPtr: @h.sv.operand02, delta: -1];
PreParserFrameStack.ComplexNodeRefCount[
 h: h, entryPtr: @h.sv.operand01, delta: -1];
h.nodeList ← NIL;
END;
MaskStroke: PUBLIC PROCEDURE [h: PreParserCommon.MainHandle]
RETURNS [loop: BOOLEAN ← FALSE] =
BEGIN
currentRecPtr: PreParserCommon.TrajectoryRecordPtr ← NIL;

IF h.pc.operationStage = 0 THEN
 BEGIN
 trajectoryWords: CARDINAL ← 0;

 h.tempData.currentPtr ← h.sv.operand01.trajectory.trajectoryRecPtr;
 h.tempData.currentWords ← 0;
 h.tempData.strokeOffset ← 0;

 IF PreParserMainOps.CheckGraphic[h: h].needIIPBlock THEN {
  h.pc.pcm.savedAction ← maskStroke; RETURN[loop: TRUE]};

 IF PreParserMainOps.CheckStroke[h: h].needIIPBlock THEN
  BEGIN h.pc.pcm.savedAction ← maskStroke; RETURN[loop: TRUE]; END;

 currentRecPtr ← h.tempData.currentPtr;
 DO
```

Copyright © 1992 Xerox Corporation All Rights Reserved

```
  trajectoryWords ← trajectoryWords + currentRecPtr.wordCount;
  IF currentRecPtr.nextPtr = NIL THEN EXIT
  ELSE currentRecPtr ← currentRecPtr.nextPtr;
  ENDLOOP;

 LOOPHOLE[@h.token, LONG POINTER TO maskStroke InternalIP.Token] ↑ ← [
  maskStroke[
  rec: [
  offsetToNextToken: trajectoryWords + SIZE[BOOLEAN] + SIZE[CARDINAL],
  closed: h.pc.pcm.action = maskStrokeClosed, pad: 0,
  trajectory: [
  numberOfStrokes: h.sv.operand01.trajectory.strokeCount,
  strokes: TRASH]]]];
 END;

IF h.pc.operationStage < 2 THEN
 IF IPMicrocode.CALL[
  function: IPFunction.PrePutToken, entryContext: h].result # 0 THEN
  BEGIN
  h.pc.operationStage ← 1;
  h.pc.pcm.savedAction ← maskStroke;
  RETURN[loop: TRUE];
  END;


IF h.pc.operationStage < 2 THEN h.pc.operationStage ← 4;
IF PutTrajectory[h: h].loop THEN
 BEGIN h.pc.pcm.savedAction ← maskStroke; RETURN[loop: TRUE]; END;

h.pc.operationStage ← 0;

h.nodeList ← NIL;
PreParserFrameStack.ComplexNodeRefCount[
 h: h, entryPtr: @h.sv.operand01, delta: -1];
END;
MaskVector: PUBLIC PROCEDURE [h: PreParserCommon.MainHandle]
 RETURNS [loop: BOOLEAN ← FALSE] =
 BEGIN
 p2: InternalIP.PixelPoint;

 IF h.pc.operationStage = 0 THEN
  BEGIN
  IF PreParserMainOps.CheckGraphic[h: h].needIIPBlock THEN {
   h.pc.pcm.savedAction ← maskVector; RETURN[loop: TRUE]};

  IF PreParserMainOps.CheckStroke[h: h].needIIPBlock THEN
   BEGIN h.pc.pcm.savedAction ← maskVector; RETURN[loop: TRUE]; END;

  h.stackEntryPtr ← @h.sv.operand03;
  [] ← IPMicrocode.CALL[
```

Copyright © 1992 Xerox Corporation All Rights Reserved

```
    function: IPFunction.PreTransformIPPoint, entryContext: h];
   p2 ← h.P1;
   h.stackEntryPtr ← @h.sv.operand01;
   [] ← IPMicrocode.CALL[
    function: IPFunction.PreTransformIPPoint, entryContext: h];

   SELECT TRUE FROM
    h.P1.x.int = p2.x.int =>
     LOOPHOLE[@h.token, LONG POINTER TO maskVectorY InternalIP.Token] ↑ ← [
      maskVectorY[rec: [p1: h.P1, y: p2.y]]];
    h.P1.y.int = p2.y.int =>
     LOOPHOLE[@h.token, LONG POINTER TO maskVectorX InternalIP.Token] ↑ ← [
      maskVectorX[rec: [p1: h.P1, x: p2.x]]];
    ENDCASE =>
     LOOPHOLE[@h.token, LONG POINTER TO maskVector InternalIP.Token] ↑ ← [
      maskVector[rec: [p1: h.P1, y: p2]]];
   END
  ELSE h.pc.operationStage ← 0;

  IF IPMicrocode.CALL[function: IPFunction.PrePutToken, entryContext: h].result
   # 0 THEN
   BEGIN
   h.pc.operationStage ← 1;
   h.pc.pcm.savedAction ← maskVector;
   RETURN[loop: TRUE];
   END;
  END;
 MoveTo: PUBLIC PROCEDURE [h: PreParserCommon.MainHandle]
  RETURNS [loop: BOOLEAN ← FALSE] =
  BEGIN
  strokePtr: LONG POINTER TO InternalIP.StrokeAction;

  IF h.pc.operationStage = 0 THEN
   BEGIN
   h.pc.pcm.zoneRecPtr ← @h.zone;
   IF IPMicrocode.CALL[
    function: IPFunction.AllocateNode16, entryContext: h].result # 0 THEN
    BEGIN h.pc.pcm.savedAction ← moveTo; RETURN[loop: TRUE]; END;
   h.stackEntry ← [
    type: trajectory, frameData: trajectory[trajectory: h.pc.pcm.nodePtr]];

   h.stackEntry.trajectory.cn ← [
    fill: 0, preambleOwned: FALSE, referenceCount: 1, next: NIL,
    type: trajectory, zoneRecPtr: @h.zone];
   h.stackEntry.trajectory.strokeCount ← 1;
   END
  ELSE h.pc.operationStage ← 0;

  h.pc.pcm.zoneRecPtr ← @h.zone;
  IF IPMicrocode.CALL[
```

Copyright © 1992 Xerox Corporation All Rights Reserved

```
  function: IPFunction.AllocateNode64, entryContext: h].result # 0 THEN
  BEGIN
  h.pc.operationStage ← 1;
  h.pc.pcm.savedAction ← moveTo;
  RETURN[loop: TRUE];
  END;
 h.stackEntry.trajectory.trajectoryRecPtr ← h.pc.pcm.nodePtr;
 h.stackEntry.trajectory.trajectoryRecPtr.nextPtr ← NIL;
 h.stackEntry.trajectory.trajectoryRecPtr.wordCount ← SIZE[
  moveTo InternalIP.StrokeAction];
 strokePtr ← LOOPHOLE[@h.stackEntry.trajectory.trajectoryRecPtr.strokes[0]];

 strokePtr ↑ ← [
  type: moveTo,
  strokeData: moveTo[
  strokeMoveTo: [x: h.sv.operand01.real, y: h.sv.operand02.real]]];

 h.lastPtMCS ← [x: h.sv.operand01.real, y: h.sv.operand02.real];

 IF IPMicrocode.CALL[function: IPFunction.PrePushStack, entryContext: h].result
  # 0 THEN BEGIN h.pc.pcm.savedAction ← PrePushStack; RETURN[loop: TRUE]; END;
 END;
PutTrajectory: PUBLIC PROCEDURE [h: PreParserCommon.MainHandle]
 RETURNS [loop: BOOLEAN ← FALSE] =
 BEGIN
 currentRecPtr: PreParserCommon.TrajectoryRecordPtr ← NIL;
 currentWords: CARDINAL;
 deviceCSx, deviceCSy: REAL ← 0.0;
 masterCSx, masterCSy: REAL ← 0.0;


 TransformXY: PROCEDURE [h: PreParserCommon.MainHandle] RETURNS [r: Vector] =
  BEGIN
  SELECT h.imagerVars.tFormHint FROM
   zeroBandD => {
    r.x ← (h.imagerVars.t.a * masterCSx) + h.imagerVars.t.c;
    r.y ← (h.imagerVars.t.e * masterCSy) + h.imagerVars.t.f};
   zeroAandE => {
    r.y ← (h.imagerVars.t.d * masterCSx) + h.imagerVars.t.f;
    r.x ← (h.imagerVars.t.b * masterCSy) + h.imagerVars.t.c};
   ENDCASE => {r.x ← 0.0; r.y ← 0.0};

  IF ~(h.tempData.stroke.type IN [lineToX..lineToY]) THEN {
   deviceCSx ← r.x; deviceCSy ← r.y};

  END;
 StrokeType: PROCEDURE [h: PreParserCommon.MainHandle, r: Vector] =
  BEGIN
  SELECT TRUE FROM
   deviceCSx # r.x => {
```

Copyright © 1992 Xerox Corporation All Rights Reserved

```
    h.tempData.stroke.type ← lineToX;
    h.tempData.stroke.strokeLineToX ← r.x;
    h.tempData.strokeSize ← SIZE[lineToX InternalIP.StrokeAction]};
   deviceCSy # r.y => {
    h.tempData.stroke.type ← lineToY;
    h.tempData.stroke.strokeLineToY ← r.y;
    h.tempData.strokeSize ← SIZE[lineToY InternalIP.StrokeAction]};
   ENDCASE => {
    IF h.tempData.stroke.type = lineToX THEN
     h.tempData.stroke.strokeLineToX ← r.x
    ELSE h.tempData.stroke.strokeLineToY ← r.y;
    h.tempData.strokeSize ← SIZE[lineToX InternalIP.StrokeAction]};

  deviceCSx ← r.x;
  deviceCSy ← r.y;

  END;

 currentRecPtr ← h.tempData.currentPtr;
 DO
  currentWords ← h.tempData.currentWords;
  UNTIL currentWords = currentRecPtr.wordCount DO
   stroke: InternalIP.StrokeType ← Inline.BITAND[
    currentRecPtr.strokes[currentWords], 17B];
   IF h.pc.operationStage < 5 THEN
    SELECT stroke FROM
     moveTo =>
      BEGIN

      masterCSx ← LOOPHOLE[@currentRecPtr.strokes[currentWords + 1], LONG
       POINTER TO REAL] ↑ ;
      masterCSy ←
       LOOPHOLE[@currentRecPtr.strokes[currentWords + 1] + SIZE[REAL],
       LONG POINTER TO REAL] ↑ ;
      h.tempData.stroke.type ← moveTo;
      h.tempData.stroke.strokeMoveTo ← TransformXY[h: h];
      h.tempData.strokeSize ← SIZE[moveTo InternalIP.StrokeAction];
      END;
     lineToX =>
      BEGIN
      masterCSx ← LOOPHOLE[@currentRecPtr.strokes[currentWords + 1], LONG
       POINTER TO REAL] ↑ ;
      h.tempData.stroke.type ← lineToX;
      StrokeType[h: h, r: TransformXY[h: h]];
      END;
     lineToY =>
      BEGIN
      masterCSy ← LOOPHOLE[@currentRecPtr.strokes[currentWords + 1], LONG
       POINTER TO REAL] ↑ ;
      h.tempData.stroke.type ← lineToY;
```

Copyright © 1992 Xerox Corporation All Rights Reserved

```
 StrokeType[h: h, r: TransformXY[h: h]];
 END;
lineToXY =>
 BEGIN
 masterCSx ← LOOPHOLE[@currentRecPtr.strokes[currentWords + 1], LONG
  POINTER TO REAL] ↑ ;
 masterCSy ←
  LOOPHOLE[@currentRecPtr.strokes[currentWords + 1] + SIZE[REAL],
  LONG POINTER TO REAL] ↑ ;
 h.tempData.stroke.type ← lineToXY;
 h.tempData.stroke.strokeLineToXY ← TransformXY[h: h];
 h.tempData.strokeSize ← SIZE[lineToXY InternalIP.StrokeAction];
 END;
curveTo =>
 BEGIN
 h.tempData.stroke.type ← curveTo;

 masterCSx ← LOOPHOLE[@currentRecPtr.strokes[currentWords + 1], LONG
  POINTER TO REAL] ↑ ;
 masterCSy ←
  LOOPHOLE[@currentRecPtr.strokes[currentWords + 1] + SIZE[REAL],
  LONG POINTER TO REAL] ↑ ;
 h.tempData.stroke.strokeCurveTo.p1 ← TransformXY[h: h];

 masterCSx ← LOOPHOLE[@currentRecPtr.strokes[currentWords + 5], LONG
  POINTER TO REAL] ↑ ;
 masterCSy ←
  LOOPHOLE[@currentRecPtr.strokes[currentWords + 5] + SIZE[REAL],
  LONG POINTER TO REAL] ↑ ;
 h.tempData.stroke.strokeCurveTo.p2 ← TransformXY[h: h];

 masterCSx ← LOOPHOLE[@currentRecPtr.strokes[currentWords + 9], LONG
  POINTER TO REAL] ↑ ;
 masterCSy ←
  LOOPHOLE[@currentRecPtr.strokes[currentWords + 9] + SIZE[REAL],
  LONG POINTER TO REAL] ↑ ;
 h.tempData.stroke.strokeCurveTo.p3 ← TransformXY[h: h];

 h.tempData.strokeSize ← SIZE[curveTo InternalIP.StrokeAction];
 END;
conicTo =>
 BEGIN
 h.tempData.stroke.type ← conicTo;

 masterCSx ← LOOPHOLE[@currentRecPtr.strokes[currentWords + 1], LONG
  POINTER TO REAL] ↑ ;
 masterCSy ←
  LOOPHOLE[@currentRecPtr.strokes[currentWords + 1] + SIZE[REAL],
  LONG POINTER TO REAL] ↑ ;
 h.tempData.stroke.strokeConicTo.p1 ← TransformXY[h: h];
```

Copyright © 1992 Xerox Corporation All Rights Reserved

```
      masterCSx ← LOOPHOLE[@currentRecPtr.strokes[currentWords + 5], LONG
       POINTER TO REAL] ↑ ;
      masterCSy ←
       LOOPHOLE[@currentRecPtr.strokes[currentWords + 5] + SIZE[REAL],
       LONG POINTER TO REAL] ↑ ;
      h.tempData.stroke.strokeConicTo.p2 ← TransformXY[h: h];

      h.tempData.stroke.strokeConicTo.s ← LOOPHOLE[@currentRecPtr.strokes[
       currentWords + 9], LONG POINTER TO REAL] ↑ ;

      h.tempData.strokeSize ← SIZE[conicTo InternalIP.StrokeAction];
      END;
     ENDCASE
    ELSE h.pc.operationStage ← 4;


    IF PutWords[h: h, data: @h.tempData.stroke].needIIPBlock THEN
     BEGIN
     h.pc.operationStage ← 5;

     h.tempData.currentPtr ← currentRecPtr;
     h.tempData.currentWords ← currentWords;
     h.tempData.currentRecIncrement ← h.tempData.strokeSize;
     h.pc.pcm.savedAction ← maskStroke;
     RETURN[loop: TRUE];
     END
    ELSE currentWords ← currentWords + h.tempData.strokeSize;
    ENDLOOP;

   h.tempData.currentWords ← 0;
   IF currentRecPtr.nextPtr = NIL THEN EXIT
   ELSE currentRecPtr ← currentRecPtr.nextPtr;
   ENDLOOP;
  END;

ArcToConics: PROCEDURE [h: PreParserCommon.MainHandle, p0, p1, p2: Vector] =
 BEGIN
 degToRad: REAL = 57.29577951;
 sqrt2Less1: REAL = ParserCommon.SqRt[2.0] - 1.0;
 DistSqr: PROC [a, b: Vector] RETURNS [REAL] = INLINE {
  RETURN[ParserCommon.Square[ParserCommon.Sub[a, b]]]};

 IF p0 = p2 THEN {
  c: Vector = [
   x: ParserCommon.FSC[a: (p0.x + p1.x), scalePowerOf2: -1],
   y: ParserCommon.FSC[a: (p0.y + p1.y), scalePowerOf2: -1]];
  v: Vector = [p0.x - c.x, p0.y - c.y];
  p: Vector = [-v.y, v.x];
  [] ← PutConic[
```

Copyright © 1992 Xerox Corporation All Rights Reserved

```
  h: h, p1: ParserCommon.Add[p0, p], p2: ParserCommon.Add[c, p],
  r: sqrt2Less1];
 [] ← PutConic[h: h, p1: ParserCommon.Add[p1, p], p2: p1, r: sqrt2Less1];
 [] ← PutConic[
  h: h, p1: ParserCommon.Sub[p1, p], p2: ParserCommon.Sub[c, p],
  r: sqrt2Less1];
 [] ← PutConic[h: h, p1: ParserCommon.Sub[p2, p], p2: p2, r: sqrt2Less1];
 }
ELSE
 BEGIN
 distProd: REAL = ParserCommon.SqRt[DistSqr[p0, p1] * DistSqr[p2, p1]];
 IF distProd = 0 THEN [] ← PutConic[h: h, p1: p1, p2: p2, r: 0.5]
 ELSE
  BEGIN
  U: Vector = ParserCommon.Sub[p0, p1];
  V: Vector = ParserCommon.Sub[p2, p1];
  dot: REAL = ParserCommon.Dot[U, V];
  cos: REAL = -dot / distProd;

  IF cos >= 0.5 THEN {
   tan: REAL = ParserCommon.Cross[U, V] / dot;
   m: Vector = [
    x: ParserCommon.FSC[a: (p0.x + p2.x), scalePowerOf2: -1],
    y: ParserCommon.FSC[a: (p0.y + p2.y), scalePowerOf2: -1]];
   p: Vector = [tan * (m.y - p0.y) + m.x, tan * (p0.x - m.x) + m.y];
   r: REAL = cos / (1.0 + cos);
   [] ← PutConic[h: h, p1: p, p2: p2, r: r];
   }
  ELSE
   BEGIN
   Center: PROC [p0, p1, p2: Vector] RETURNS [center: Vector] = INLINE
    BEGIN
    m1: Vector = [
     x: ParserCommon.FSC[a: (p0.x + p1.x), scalePowerOf2: -1],
     y: ParserCommon.FSC[a: (p0.y + p1.y), scalePowerOf2: -1]];
    m2: Vector = [
     x: ParserCommon.FSC[a: (p1.x + p2.x), scalePowerOf2: -1],
     y: ParserCommon.FSC[a: (p1.y + p2.y), scalePowerOf2: -1]];
    v1: Vector = [-m1.y + p1.y, m1.x - p1.x];
    v2: Vector = [-m2.y + p1.y, m2.x - p1.x];
    v3: Vector = [m2.x - m1.x, m2.y - m1.y];
    det: REAL = ParserCommon.Cross[v1, v2];
    c1: REAL = ParserCommon.Cross[v3, v2] / det;
    center ← ParserCommon.Add[m1, ParserCommon.Mul[v1, c1]];
    END;
   nConics: CARDINAL;
   step, cos, sin, angle, rem, x1, y1, theta1, theta2, theta3: REAL;
   center, lp, p, v: Vector;
   det: REAL =
    IF ParserCommon.Cross[
```

Copyright © 1992 Xerox Corporation All Rights Reserved

```
 ParserCommon.Sub[p1, p0], ParserCommon.Sub[p2, p0]] >= 0 THEN 1.0
 ELSE -1.0;
sgn: INTEGER = IF det > 0.0 THEN 1 ELSE IF det < 0.0 THEN -1 ELSE 0;

IF sgn = 0 THEN {[] ← PutConic[h: h, p1: p1, p2: p2, r: 0.0]; RETURN};
center ← Center[p0, p1, p2];
theta1 ← RealFns.ArcTanDeg[p0.y - center.y, p0.x - center.x];
theta2 ← RealFns.ArcTanDeg[p1.y - center.y, p1.x - center.x];
theta3 ← RealFns.ArcTanDeg[p2.y - center.y, p2.x - center.x];

SELECT TRUE FROM
 theta1 < theta2 =>
  IF theta2 >= theta3 THEN
   BEGIN
   theta1 ← theta1 - 360.0;
   IF ABS[theta3 - theta1] >= 360.0 THEN {
    theta1 ← theta1 + 360.0; theta3 ← theta3 - 360.0};
   END;
 theta2 <= theta3 =>
  BEGIN
  theta3 ← theta3 - 360.0;
  IF ABS[theta3 - theta1] >= 360.0 THEN {
   theta3 ← theta3 + 360.0; theta1 ← theta1 - 360.0};
  END;
 ENDCASE;

angle ← theta3 - theta1;
nConics ← MIN[2, Real.FixC[ABS[angle] / 90.0]];
rem ← ABS[angle] - (REAL[nConics] * 90.0);
IF angle < 0 THEN rem ← -rem;
v ← [p0.x - center.x, p0.y - center.y];
p ← IF sgn >= 0 THEN [-v.y, v.x] ELSE [v.y, -v.x];
IF nConics >= 1 THEN
 [] ← PutConic[
  h: h, p1: ParserCommon.Add[p0, p],
  p2: lp ← ParserCommon.Add[center, p], r: sqrt2Less1];
IF nConics >= 2 THEN {
 p0 ← lp;
 [] ← PutConic[
  h: h, p1: ParserCommon.Sub[p0, v],
  p2: lp ← ParserCommon.Sub[center, v], r: sqrt2Less1]};
IF nConics >= 3 THEN {
 p0 ← lp;
 [] ← PutConic[
  h: h, p1: ParserCommon.Sub[p0, p],
  p2: lp ← ParserCommon.Sub[center, p], r: sqrt2Less1]};
IF rem + 1.0 = 1.0 THEN RETURN;
step ← rem / (degToRad * 2);
sin ← RealFns.Sin[step];
cos ← RealFns.Cos[step];
```

Copyright © 1992 Xerox Corporation All Rights Reserved

```
    x1 ← lp.x - center.x;
    y1 ← lp.y - center.y;
    p1 ← [
     center.x + (x1 * cos - y1 * sin), center.y + (x1 * sin + y1 * cos)];
    ArcToConics[h: h, p0: lp, p1: p1, p2: p2];
    END;
   END;
  END;
 END;
CheckTrajectorySpace: PROCEDURE [h: PreParserCommon.MainHandle]
 RETURNS [loop: BOOLEAN ← FALSE] =
 BEGIN
 IF h.sv.operand01.trajectory.cn.referenceCount > 1
  OR h.sv.operand01.trajectory.cn.preambleOwned THEN {

  oldTrajectoryRecPtr: PreParserCommon.TrajectoryRecordPtr;

  trajectoryRecPtrPtr: LONG POINTER TO PreParserCommon.TrajectoryRecordPtr;

  h.sv.operand07 ← h.sv.operand01;

  h.pc.pcm.zoneRecPtr ← @h.zone;
  [] ← IPMicrocode.CALL[function: IPFunction.AllocateNode16, entryContext: h];
  h.sv.operand01.trajectory ← h.pc.pcm.nodePtr;

  h.sv.operand01.trajectory ↑ ← h.sv.operand07.trajectory ↑ ;

  h.sv.operand01.trajectory ↑ .cn ← [
   fill: 0, preambleOwned: FALSE, referenceCount: 1, next: NIL,
   type: trajectory, zoneRecPtr: @h.zone];

  trajectoryRecPtrPtr ← @h.sv.operand01.trajectory.trajectoryRecPtr;

  oldTrajectoryRecPtr ← h.sv.operand07.trajectory.trajectoryRecPtr;

  h.pc.pcm.zoneRecPtr ← @h.zone;
  UNTIL oldTrajectoryRecPtr = NIL DO

   [] ← IPMicrocode.CALL[
    function: IPFunction.AllocateNode64, entryContext: h];
   trajectoryRecPtrPtr ↑ ← h.pc.pcm.nodePtr;
   trajectoryRecPtrPtr ↑ ↑ ← oldTrajectoryRecPtr ↑ ;
   trajectoryRecPtrPtr ← @trajectoryRecPtrPtr ↑ ↑ .nextPtr;
   oldTrajectoryRecPtr ← oldTrajectoryRecPtr.nextPtr;
   ENDLOOP;

  PreParserFrameStack.ChangeRefCountAndFree[
   h: h, ptr: @h.sv.operand07, delta: -1]};

 h.tempData.currentPtr ← h.sv.operand01.trajectory.trajectoryRecPtr;
```

Copyright © 1992 Xerox Corporation All Rights Reserved

```
  UNTIL h.tempData.currentPtr.nextPtr = NIL DO
   h.tempData.currentPtr ← h.tempData.currentPtr.nextPtr; ENDLOOP;

  IF PreParserCommon.TrajectoryFillSize - h.tempData.currentPtr.wordCount <
   h.tempData.strokeSize THEN
   BEGIN
   h.pc.pcm.zoneRecPtr ← @h.zone;
   IF IPMicrocode.CALL[
    function: IPFunction.AllocateNode64, entryContext: h].result # 0 THEN
    RETURN[loop: TRUE];
   h.tempData.currentPtr.nextPtr ← h.pc.pcm.nodePtr;
   h.tempData.currentPtr ← h.pc.pcm.nodePtr;
   h.tempData.currentPtr.nextPtr ← NIL;
   h.tempData.currentPtr.wordCount ← 0;
   END;

  h.sv.operand01.trajectory.strokeCount ←
   h.sv.operand01.trajectory.strokeCount + 1;
  END;
 MeasurePath: PROCEDURE [h: PreParserCommon.MainHandle]
  RETURNS [sum: REAL ← 0.0] =
  BEGIN


  lp, p1: Vector ← [0, 0];
  currentWords: CARDINAL ← 0;
  currentRecPtr: PreParserCommon.TrajectoryRecordPtr ← NIL;
  size: CARDINAL;


  Curve: PROCEDURE [p1, p2, p3: Vector] =
   BEGIN
   p: ParserCommon.Bezier = [lp, p1, p2, p3];
   fullScale: REAL = ParserCommon.CurveLength[p].value;
   IF fullScale > 0.0 THEN DivideUntilSmooth[p, fullScale];
   lp ← p3;
   END;
  DivideUntilSmooth: PROCEDURE [p: ParserCommon.Bezier, fullScale: REAL] =
   BEGIN
   a: ParserCommon.RealPlusOrMinus ← ParserCommon.CurveLength[p];

   UNTIL (a.error * twoToSigBits) <= fullScale DO
    h.pc.pcm.mid.p0 ← p[0];
    h.pc.pcm.mid.p1 ← p[1];
    h.pc.pcm.mid.p2 ← p[2];
    h.pc.pcm.mid.p3 ← p[3];
    [] ← IPMicrocode.CALL[function: IPFunction.Mid3, entryContext: h];

    DivideUntilSmooth[
```

Copyright © 1992 Xerox Corporation All Rights Reserved

```
    [
    h.pc.pcm.mid.p0, h.pc.pcm.mid.p01, h.pc.pcm.mid.p012,
    h.pc.pcm.mid.p0123], fullScale];

   p ← [
    h.pc.pcm.mid.p0123, h.pc.pcm.mid.p123, h.pc.pcm.mid.p23,
    h.pc.pcm.mid.p3];
   a ← ParserCommon.CurveLength[p];
   ENDLOOP;

  sum ← sum + a.value;
  END;

 currentRecPtr ← h.tempData.currentPtr;
 DO
  UNTIL currentWords = currentRecPtr.wordCount DO
   stroke: InternalIP.StrokeType ← Inline.BITAND[
    currentRecPtr.strokes[currentWords], 17B];
   SELECT stroke FROM
    moveTo =>
     BEGIN
     lp ← LOOPHOLE[@currentRecPtr.strokes[currentWords + 1], LONG POINTER
      TO Vector] ↑ ;
     size ← SIZE[moveTo InternalIP.StrokeAction];
     END;
    lineToX =>
     BEGIN
     p1 ← lp;
     p1.x ← LOOPHOLE[@currentRecPtr.strokes[currentWords + 1], LONG POINTER
      TO REAL] ↑ ;
     sum ← sum + ABS[p1.x - lp.x];
     lp ← p1;
     size ← SIZE[lineToX InternalIP.StrokeAction];
     END;
    lineToY =>
     BEGIN
     p1 ← lp;
     p1.y ← LOOPHOLE[@currentRecPtr.strokes[currentWords + 1], LONG POINTER
      TO REAL] ↑ ;
     sum ← sum + ABS[p1.y - lp.y];
     lp ← p1;
     size ← SIZE[lineToY InternalIP.StrokeAction];
     END;
    lineToXY =>
     BEGIN
     p1 ← LOOPHOLE[@currentRecPtr.strokes[currentWords + 1], LONG POINTER
      TO Vector] ↑ ;
     sum ← sum + ParserCommon.Length[ParserCommon.Sub[p1, lp]];
     lp ← p1;
     size ← SIZE[lineToXY InternalIP.StrokeAction];
```

Copyright © 1992 Xerox Corporation All Rights Reserved

```
        END;
      curveTo =>
        BEGIN
        Curve[
         p1: LOOPHOLE[@currentRecPtr.strokes[currentWords + 1], LONG POINTER
         TO Vector] ↑ ,
         p2: LOOPHOLE[@currentRecPtr.strokes[currentWords + 5], LONG POINTER
         TO Vector] ↑ ,
         p3: LOOPHOLE[@currentRecPtr.strokes[currentWords + 9], LONG POINTER
         TO Vector] ↑ ];
        size ← SIZE[curveTo InternalIP.StrokeAction];
        END;
      conicTo =>
        BEGIN
        ParserCommon.ConicToCurves[
         p0: lp,
         p1: LOOPHOLE[@currentRecPtr.strokes[currentWords + 1], LONG POINTER
         TO Vector] ↑ ,
         p2: LOOPHOLE[@currentRecPtr.strokes[currentWords + 5], LONG POINTER
         TO Vector] ↑ ,
         r: LOOPHOLE[@currentRecPtr.strokes[currentWords + 9], LONG POINTER
         TO REAL] ↑ , curveProc: Curve];
        size ← SIZE[conicTo InternalIP.StrokeAction];
        END;
      ENDCASE;
    currentWords ← currentWords + size;
    ENDLOOP;

   IF currentRecPtr.nextPtr = NIL THEN EXIT
   ELSE BEGIN currentRecPtr ← currentRecPtr.nextPtr; currentWords ← 0; END;
   ENDLOOP;

  END;
 PutConic: PROCEDURE [h: PreParserCommon.MainHandle, p1, p2: Vector, r: REAL]
  RETURNS [loop: BOOLEAN ← FALSE] =
  BEGIN
  strokePtr: LONG POINTER TO InternalIP.StrokeAction;

  h.tempData.strokeSize ← SIZE[conicTo InternalIP.StrokeAction];

  IF CheckTrajectorySpace[h: h].loop THEN RETURN[loop: TRUE];

  strokePtr ← LOOPHOLE[@h.tempData.currentPtr.strokes[
   h.tempData.currentPtr.wordCount]];
  strokePtr ↑ ← [
   type: conicTo, strokeData: conicTo[strokeConicTo: [p1: p1, p2: p2, s: r]]];

  h.tempData.currentPtr.wordCount ←
   h.tempData.currentPtr.wordCount + h.tempData.strokeSize;
  END;
```

Copyright © 1992 Xerox Corporation All Rights Reserved

```
PutWords: PROCEDURE [
 h: PreParserCommon.MainHandle, data: LONG POINTER TO UNSPECIFIED]
 RETURNS [needIIPBlock: BOOLEAN ← FALSE] =
 BEGIN
 IF h.iipData.currentWordCount < h.tempData.strokeSize THEN
  BEGIN
  IF h.iipData.currentWordCount > 0 THEN
   BEGIN
   Inline.LongCOPY[
    from: data + h.tempData.strokeOffset,
    nwords: h.iipData.currentWordCount, to: h.iipData.currentWordPtr];

   h.tempData.strokeOffset ←
    h.tempData.strokeOffset + h.iipData.currentWordCount;
   h.tempData.strokeSize ←
    h.tempData.strokeSize - h.iipData.currentWordCount;
   END;

  h.pc.pcm.action ← needIIPBlock;
  RETURN[needIIPBlock: TRUE];
  END;

 Inline.LongCOPY[
  from: data + h.tempData.strokeOffset, nwords: h.tempData.strokeSize,
  to: h.iipData.currentWordPtr];

 h.iipData.currentWordPtr ← h.iipData.currentWordPtr + h.tempData.strokeSize;
 h.iipData.currentWordCount ←
  h.iipData.currentWordCount - h.tempData.strokeSize;
 h.tempData.strokeSize ← h.tempData.strokeSize + h.tempData.strokeOffset;
 h.tempData.strokeOffset ← 0;
 END;
Initialize: PUBLIC PROCEDURE = BEGIN END;
END.
```

Copyright © 1992 Xerox Corporation All Rights Reserved

```
DIRECTORY
 DecomposerCommon USING [Transformation],
 FixedPointReal USING [FromReal],
 IPMicrocode USING [CALL],
 IPFunction USING [AllocateNodeNFL, PrePushStack],
 ParserZone USING [AllocateNodeNFL],
 PreParserCommon USING [
  MainHandle, Transformation, TFormIndex, TransformationPtr],
 PreParserExtra USING [NoteNewT],
 PreParserFrameStack USING [ComplexNodeRefCount, PushStack],
 PreParserMainErrors USING [unimplementedFeature],
 PreParserTForm USING [],
 Real USING [Float],
 Transformation USING [Matrix];

PreParserTFormImpl: PROGRAM
 IMPORTS
  FixedPointReal, IPMicrocode, ParserZone, PreParserExtra, PreParserFrameStack,
  Real
 EXPORTS PreParserTForm =
 BEGIN

 Concat: PUBLIC PROCEDURE [h: PreParserCommon.MainHandle]
  RETURNS [loop: BOOLEAN ← FALSE] =
  BEGIN
  h.pc.pcm.nodeSizeInWords ← SIZE[PreParserCommon.Transformation];
  h.pc.pcm.zoneRecPtr ← @h.zone;
  IF IPMicrocode.CALL[
   function: IPFunction.AllocateNodeNFL, entryContext: h].result # 0 THEN
   BEGIN h.pc.pcm.savedAction ← concat; RETURN[loop: TRUE]; END;
  h.stackEntry ← [
   type: transformation,
   frameData: transformation[transformationPtr: h.pc.pcm.nodePtr]];
  h.stackEntry.transformationPtr.cn ← [
   fill: 0, preambleOwned: FALSE, referenceCount: 1, next: NIL,
   type: transformation, zoneRecPtr: @h.zone];
  Concatenate[
   h: h, t1: h.sv.operand01.transformationPtr,
   t2: h.sv.operand02.transformationPtr,
   tResult: h.stackEntry.transformationPtr];
  PreParserFrameStack.ComplexNodeRefCount[
   h: h, entryPtr: @h.sv.operand01, delta: -1];
  PreParserFrameStack.ComplexNodeRefCount[
   h: h, entryPtr: @h.sv.operand02, delta: -1];
  IF IPMicrocode.CALL[function: IPFunction.PrePushStack, entryContext: h].result
   # 0 THEN BEGIN h.pc.pcm.savedAction ← PrePushStack; RETURN[loop: TRUE]; END;
  END;
 Concatenate: PUBLIC PROCEDURE [
  h: PreParserCommon.MainHandle, t1: PreParserCommon.TransformationPtr,
```

Copyright © 1992 Xerox Corporation All Rights Reserved

```
t2: PreParserCommon.TransformationPtr,
tResult: PreParserCommon.TransformationPtr] =
BEGIN
tIndex: PreParserCommon.TFormIndex;
SELECT TRUE FROM
 t1.a = 1.0 AND t1.b = 0.0 AND t1.d = 0.0 AND t1.e = 1.0 =>
  tIndex ← t2.tIndex;
 t2.a = 1.0 AND t2.b = 0.0 AND t2.d = 0.0 AND t2.e = 1.0 =>
  tIndex ← t1.tIndex;
 ENDCASE => {
  tIndex ← h.currentTIndex; h.currentTIndex ← h.currentTIndex + 1};
tResult↑ ← [
 cn: [
 fill: 0, preambleOwned: FALSE, referenceCount: 1, next: NIL,
 type: transformation, zoneRecPtr: @h.zone], a: t1.a * t2.a + t1.d * t2.b,
 b: t1.b * t2.a + t1.e * t2.b, c: t1.c * t2.a + t1.f * t2.b + t2.c,
 d: t1.a * t2.d + t1.d * t2.e, e: t1.b * t2.d + t1.e * t2.e,
 f: t1.c * t2.d + t1.f * t2.e + t2.f, tIndex: tIndex,
 includesICSToDCS: t1.includesICSToDCS OR t2.includesICSToDCS];
END;
ConcatT: PUBLIC PROCEDURE [h: PreParserCommon.MainHandle]
 RETURNS [loop: BOOLEAN ← FALSE] =
 BEGIN
 Concatenate[
  h: h, t1: h.sv.operand01.transformationPtr, t2: @h.imagerVars.t,
  tResult: @h.tempData.tForm];
 h.imagerVars.t ← h.tempData.tForm;
 PreParserExtra.NoteNewT[h: h];
 END;
ConvertDCTransToPPCTrans: PUBLIC PROCEDURE [
 h: PreParserCommon.MainHandle,
 fromT: LONG POINTER TO DecomposerCommon.Transformation,
 toT: PreParserCommon.TransformationPtr] =
 BEGIN
 toT.cn ← [
  fill: 0, preambleOwned: FALSE, referenceCount: 1, next: NIL,
  type: transformation, zoneRecPtr: @h.zone];
 toT.tIndex ← h.currentTIndex;
 h.currentTIndex ← h.currentTIndex + 1;
 IF fromT.tFormNumbers = real THEN {
  toT.c ← fromT.realC;
  toT.f ← fromT.realF;
  IF fromT.tFormRotation = normal THEN {
   toT.b ← toT.d ← 0.0; toT.a ← fromT.realAorB; toT.e ← fromT.realDorE; }
  ELSE {
   toT.a ← toT.e ← 0.0; toT.b ← fromT.realAorB; toT.d ← fromT.realDorE; };
  }
 ELSE {
  toT.c ← Real.Float[LONG[fromT.c]];
  toT.f ← Real.Float[LONG[fromT.f]];
```

Copyright © 1992 Xerox Corporation All Rights Reserved

```
  IF fromT.tFormRotation = normal THEN {
   toT.b ← toT.d ← 0;
   toT.a ← Real.Float[LONG[fromT.AorB]];
   toT.e ← Real.Float[LONG[fromT.DorE]];
   }
  ELSE {
   toT.a ← toT.e ← 0;
   toT.b ← Real.Float[LONG[fromT.AorB]];
   toT.d ← Real.Float[LONG[fromT.DorE]];
   };
  };
 END;
ConvertPPCTransToTMatrix: PUBLIC PROCEDURE [
 tIn: PreParserCommon.TransformationPtr,
 tOut: LONG POINTER TO Transformation.Matrix] =
 BEGIN
 tOut.a ← tIn.a;
 tOut.b ← tIn.b;
 tOut.c ← tIn.c;
 tOut.d ← tIn.d;
 tOut.e ← tIn.e;
 tOut.f ← tIn.f;
 SELECT TRUE FROM
  tOut.b = 0.0 AND tOut.d = 0.0 =>
   BEGIN
   tOut.form ← zeroBandD;
   IF tOut.c = 0 AND tOut.f = 0 THEN
    BEGIN
    SELECT tOut.a FROM
     1.0 =>
      SELECT tOut.e FROM
       1.0 => tOut.form ← identity;
       -1.0 => tOut.form ← yFlip;
       ENDCASE =>
        tOut.form ←
         IF FixedPointReal.FromReal[real: tIn.e].frac = 0 THEN
         integerScale ELSE pureScaling;
     -1.0 =>
      SELECT tOut.e FROM
       1.0 => tOut.form ← xFlip;
       -1.0 => tOut.form ← rotate180;
       ENDCASE =>
        tOut.form ←
         IF FixedPointReal.FromReal[real: tIn.e].frac = 0 THEN
         integerScale ELSE pureScaling;
     ENDCASE =>
      tOut.form ←
       IF FixedPointReal.FromReal[real: tIn.a].frac = 0
       AND FixedPointReal.FromReal[real: tIn.e].frac = 0 THEN
       integerScale ELSE pureScaling;
```

Copyright © 1992 Xerox Corporation All Rights Reserved

```
    END
   ELSE IF tOut.a = 1.0 AND tOut.e = 1.0 THEN tOut.form ← pureTranslation;
   END;
  tOut.a = 0.0 AND tOut.e = 0.0 = >
   BEGIN
   tOut.form ← zeroAandE;
   IF tOut.c = 0.0 AND tOut.f = 0.0 THEN
    SELECT tOut.b FROM
     1.0 = >
      SELECT tOut.d FROM
       1.0 = > tOut.form ← swapXY;
       -1.0 = > tOut.form ← rotate270;
       ENDCASE;
     -1.0 = >
      SELECT tOut.d FROM
       1.0 = > tOut.form ← rotate90;
       -1.0 = > tOut.form ← swapNegateXY;
       ENDCASE;
     ENDCASE;
   END;
  ENDCASE = > tOut.form ← full;
 END;
ConvertTMatrixToPPCTrans: PUBLIC PROCEDURE [
 h: PreParserCommon.MainHandle, fromT: LONG POINTER TO Transformation.Matrix,
 toT: PreParserCommon.TransformationPtr] =
 BEGIN
 toT ↑ ← [
  cn: [
  fill: 0, preambleOwned: FALSE, referenceCount: 1, next: NIL,
  type: transformation, zoneRecPtr: @h.zone], a: fromT.a, b: fromT.b,
  c: fromT.c, d: fromT.d, e: fromT.e, f: fromT.f, tIndex: h.currentTIndex,
  includesICSToDCS: FALSE];
 h.currentTIndex ← h.currentTIndex + 1;
 END;
MakeT: PUBLIC PROCEDURE [h: PreParserCommon.MainHandle]
 RETURNS [loop: BOOLEAN ← FALSE] =
 BEGIN
 IF
  ((h.sv.operand02.real = 0 AND h.sv.operand04.real = 0)
   OR (h.sv.operand01.real = 0 AND h.sv.operand05.real = 0)) THEN {
  h.pc.pcm.nodeSizeInWords ← SIZE[PreParserCommon.Transformation];
  h.pc.pcm.zoneRecPtr ← @h.zone;
  IF IPMicrocode.CALL[
   function: IPFunction.AllocateNodeNFL, entryContext: h].result # 0 THEN {
   h.pc.pcm.savedAction ← makeT; RETURN[loop: TRUE]; };
  h.stackEntry ← [
   type: transformation,
   frameData: transformation[transformationPtr: h.pc.pcm.nodePtr]];
  h.stackEntry.transformationPtr ↑ ← [
   cn: [
```

Copyright © 1992 Xerox Corporation All Rights Reserved

```
fill: 0, preambleOwned: FALSE, referenceCount: 1, next: NIL,
type: transformation, zoneRecPtr: @h.zone], a: h.sv.operand01.real,
b: h.sv.operand02.real, c: h.sv.operand03.real, d: h.sv.operand04.real,
e: h.sv.operand05.real, f: h.sv.operand06.real, tIndex: h.currentTIndex,
includesICSToDCS: FALSE];
h.currentTIndex ← h.currentTIndex + 1;
IF IPMicrocode.CALL[
function: IPFunction.PrePushStack, entryContext: h].result # 0 THEN {
h.pc.pcm.savedAction ← PrePushStack; RETURN[loop: TRUE]; };
}
ELSE {
h.pc.pcm.data.code ← PreParserMainErrors.unimplementedFeature;
h.pc.pcm.action ← fatalError;
RETURN[loop: TRUE];
};
END;
Rotate: PUBLIC PROCEDURE [h: PreParserCommon.MainHandle]
RETURNS [loop: BOOLEAN ← FALSE] =
BEGIN
degrees: INTEGER ← h.sv.operand01.integer;
h.pc.pcm.nodeSizeInWords ← SIZE[PreParserCommon.Transformation];
h.pc.pcm.zoneRecPtr ← @h.zone;
IF ParserZone.AllocateNodeNFL[h: @h.pc.pcm].extendZone THEN
BEGIN h.pc.pcm.savedAction ← Rotate; RETURN[loop: TRUE]; END;
h.stackEntry ← [
type: transformation,
frameData: transformation[transformationPtr: h.pc.pcm.nodePtr]];
degrees ← degrees MOD 360;
IF degrees < 0 THEN degrees ← degrees + 360;
SELECT degrees FROM
0 => {
h.stackEntry.transformationPtr.a ← 1;
h.stackEntry.transformationPtr.b ← 0;
h.stackEntry.transformationPtr.d ← 0;
h.stackEntry.transformationPtr.e ← 1;
};
90 => {
h.stackEntry.transformationPtr.a ← 0;
h.stackEntry.transformationPtr.b ← -1;
h.stackEntry.transformationPtr.d ← 1;
h.stackEntry.transformationPtr.e ← 0;
};
180 => {
h.stackEntry.transformationPtr.a ← -1;
h.stackEntry.transformationPtr.b ← 0;
h.stackEntry.transformationPtr.d ← 0;
h.stackEntry.transformationPtr.e ← -1;
};
270 => {
h.stackEntry.transformationPtr.a ← 0;
```

Copyright © 1992 Xerox Corporation All Rights Reserved

```
    h.stackEntry.transformationPtr.b ← 1;
    h.stackEntry.transformationPtr.d ← -1;
    h.stackEntry.transformationPtr.e ← 0;
    };
   ENDCASE => {
    h.pc.pcm.action ← fatalError;
    h.pc.pcm.data.code ← PreParserMainErrors.unimplementedFeature;
    RETURN[loop: TRUE];
    };
  h.stackEntry.transformationPtr.cn ← [
   fill: 0, preambleOwned: FALSE, referenceCount: 1, next: NIL,
   type: transformation, zoneRecPtr: @h.zone];
  h.stackEntry.transformationPtr.c ← 0;
  h.stackEntry.transformationPtr.f ← 0;
  IF degrees = 0 THEN h.stackEntry.transformationPtr.tIndex ← 0
  ELSE {
   h.stackEntry.transformationPtr.tIndex ← h.currentTIndex;
   h.currentTIndex ← h.currentTIndex + 1};
  h.stackEntry.transformationPtr.tIndex ← h.currentTIndex;
  h.stackEntry.transformationPtr.includesICSToDCS ← FALSE;
  IF PreParserFrameStack.PushStack[h: h].extendZone THEN {
   h.pc.pcm.savedAction ← PrePushStack; RETURN[loop: TRUE]; };
  END;
 Scale: PUBLIC PROCEDURE [h: PreParserCommon.MainHandle]
  RETURNS [loop: BOOLEAN ← FALSE] =
  BEGIN
  h.pc.pcm.nodeSizeInWords ← SIZE[PreParserCommon.Transformation];
  h.pc.pcm.zoneRecPtr ← @h.zone;
  IF ParserZone.AllocateNodeNFL[h: @h.pc.pcm].extendZone THEN {
   h.pc.pcm.savedAction ← Scale; RETURN[loop: TRUE]; };
  h.stackEntry ← [
   type: transformation,
   frameData: transformation[transformationPtr: h.pc.pcm.nodePtr]];
  h.stackEntry.transformationPtr ↑ ← [
   cn: [
   fill: 0, preambleOwned: FALSE, referenceCount: 1, next: NIL,
   type: transformation, zoneRecPtr: @h.zone], a: h.sv.operand01.real, b: 0,
   c: 0, d: 0, e: h.sv.operand01.real, f: 0, tIndex: h.currentTIndex,
   includesICSToDCS: FALSE];
  h.currentTIndex ← h.currentTIndex + 1;
  IF PreParserFrameStack.PushStack[h: h].extendZone THEN {
   h.pc.pcm.savedAction ← PrePushStack; RETURN[loop: TRUE]; };
  END;
 Scale2: PUBLIC PROCEDURE [h: PreParserCommon.MainHandle]
  RETURNS [loop: BOOLEAN ← FALSE] =
  BEGIN
  h.pc.pcm.nodeSizeInWords ← SIZE[PreParserCommon.Transformation];
  h.pc.pcm.zoneRecPtr ← @h.zone;
  IF ParserZone.AllocateNodeNFL[h: @h.pc.pcm].extendZone THEN {
   h.pc.pcm.savedAction ← Scale2; RETURN[loop: TRUE]; };
```

Copyright © 1992 Xerox Corporation All Rights Reserved

```
  h.stackEntry ← [
   type: transformation,
   frameData: transformation[transformationPtr: h.pc.pcm.nodePtr]];
  h.stackEntry.transformationPtr ↑ ← [
   cn: [
   fill: 0, preambleOwned: FALSE, referenceCount: 1, next: NIL,
   type: transformation, zoneRecPtr: @h.zone], a: h.sv.operand01.real, b: 0,
   c: 0, d: 0, e: h.sv.operand02.real, f: 0, tIndex: h.currentTIndex,
   includesICSToDCS: FALSE];
  h.currentTIndex ← h.currentTIndex + 1;
  IF PreParserFrameStack.PushStack[h: h].extendZone THEN {
   h.pc.pcm.savedAction ← PrePushStack; RETURN[loop: TRUE]; };
  END;
 Translate: PUBLIC PROCEDURE [h: PreParserCommon.MainHandle]
  RETURNS [loop: BOOLEAN ← FALSE] =
  BEGIN
  h.pc.pcm.nodeSizeInWords ← SIZE[PreParserCommon.Transformation];
  h.pc.pcm.zoneRecPtr ← @h.zone;
  IF ParserZone.AllocateNodeNFL[h: @h.pc.pcm].extendZone THEN {
   h.pc.pcm.savedAction ← Translate; RETURN[loop: TRUE]; };
  h.stackEntry ← [
   type: transformation,
   frameData: transformation[transformationPtr: h.pc.pcm.nodePtr]];
  h.stackEntry.transformationPtr ↑ ← [
   cn: [
   fill: 0, preambleOwned: FALSE, referenceCount: 1, next: NIL,
   type: transformation, zoneRecPtr: @h.zone], a: 1, b: 0,
   c: h.sv.operand01.real, d: 0, e: 1, f: h.sv.operand02.real,
   tIndex: h.currentTIndex, includesICSToDCS: FALSE];
  h.currentTIndex ← h.currentTIndex + 1;
  IF PreParserFrameStack.PushStack[h: h].extendZone THEN {
   h.pc.pcm.savedAction ← PrePushStack; RETURN[loop: TRUE]; };
  END;
 Initialize: PUBLIC PROCEDURE = BEGIN END;

 END.
```

Copyright © 1992 Xerox Corporation All Rights Reserved

```
DIRECTORY
 IPMicrocode USING [CALL],
 IPFunction USING [PrePushStack],
 PreParserCommon USING [MainHandle, StackEntry, VectorOfElements],
 ParserZone USING [AllocateNodeNFL],
 PreParserFrameStack USING [
  ComplexNodeRefCount, CopyStackEntry, PopStack, PushStack],
 PreParserMainErrors USING [
  badVectorIndex, negativeMakeVecLUbounds, unexpectedMark],
 PreParserVector USING [];

PreParserVectorImpl: PROGRAM
 IMPORTS IPMicrocode, ParserZone, PreParserFrameStack EXPORTS PreParserVector =
 BEGIN

 Get: PUBLIC PROCEDURE [h: PreParserCommon.MainHandle]
  RETURNS [loop: BOOLEAN ← FALSE] =
  BEGIN
  IF h.sv.operand02.integer < 0 THEN {
   h.pc.pcm.action ← fatalError;
   h.pc.pcm.data.code ← PreParserMainErrors.badVectorIndex;
   RETURN[loop: TRUE];
   };
  IF h.sv.operand01.type = nullVectorOfElements
   OR CARDINAL[h.sv.operand02.integer] NOT IN
    [h.sv.operand01.vectorPtr.low..(h.sv.operand01.vectorPtr.low +
                    h.sv.operand01.vectorPtr.count - 1)]
   THEN {
   h.pc.pcm.action ← fatalError;
   h.pc.pcm.data.code ← PreParserMainErrors.badVectorIndex;
   RETURN[loop: TRUE];
   };

  h.stackEntryPtr ← @h.sv.operand01.vectorPtr.elements[
   h.sv.operand02.integer - h.sv.operand01.vectorPtr.low];

  [] ← PreParserFrameStack.CopyStackEntry[h: h];
  h.stackEntry ← h.stackEntryPtr ↑ ;

  IF IPMicrocode.CALL[function: IPFunction.PrePushStack, entryContext: h].result
   # 0 THEN {h.pc.pcm.savedAction ← get; RETURN[loop: TRUE]; };
  PreParserFrameStack.ComplexNodeRefCount[
   h: h, entryPtr: @h.sv.operand01, delta: -1];
  RETURN[loop: FALSE];
  END;
 MakeVec: PUBLIC PROCEDURE [h: PreParserCommon.MainHandle]
  RETURNS [loop: BOOLEAN ← FALSE] =
  BEGIN
  numElements: INTEGER ← h.sv.operand01.integer;
```

Copyright © 1992 Xerox Corporation All Rights Reserved

```
IF numElements < 0 THEN {
 h.pc.pcm.action ← fatalError;
 h.pc.pcm.data.code ← PreParserMainErrors.badVectorIndex;
 RETURN[loop: TRUE];
 };
IF numElements = 0 THEN
 h.stackEntry ← [
  type: nullVectorOfElements,
  frameData: nullVectorOfElements[low: 0, count: 0]]
ELSE {
 h.pc.pcm.nodeSizeInWords ←
  SIZE[PreParserCommon.VectorOfElements] +
   (SIZE[PreParserCommon.StackEntry] * numElements);
 h.pc.pcm.zoneRecPtr ← @h.zone;
 IF ParserZone.AllocateNodeNFL[h: @h.pc.pcm].extendZone THEN {
  h.pc.pcm.savedAction ← MakeVec; RETURN[loop: TRUE]; };
 h.stackEntry ← [
  type: vectorOfElements,
  frameData: vectorOfElements[vectorPtr: h.pc.pcm.nodePtr]];
 h.stackEntry.vectorPtr.cn ← [
  fill: 0, preambleOwned: FALSE, referenceCount: 1, next: NIL,
  type: vectorOfElements, zoneRecPtr: @h.zone];
 h.stackEntry.vectorPtr.low ← 0;
 h.stackEntry.vectorPtr.count ← numElements;
 h.stackEntryPtr ← @h.stackEntry.vectorPtr.elements[numElements - 1];

 THROUGH [0..numElements) DO
  IF PreParserFrameStack.PopStack[h: h].fatalError THEN RETURN[loop: TRUE];
  IF h.stackEntryPtr.type = mark THEN {
   h.pc.pcm.action ← fatalError;
   h.pc.pcm.data.code ← PreParserMainErrors.unexpectedMark;
   RETURN[loop: TRUE];
   };
  h.stackEntryPtr ← h.stackEntryPtr - SIZE[PreParserCommon.StackEntry];
  ENDLOOP;
 };

IF PreParserFrameStack.PushStack[h: h].extendZone THEN {
 h.pc.pcm.savedAction ← PrePushStack; RETURN[loop: TRUE]; };
END;
MakeVecLU: PUBLIC PROCEDURE [h: PreParserCommon.MainHandle]
 RETURNS [loop: BOOLEAN ← FALSE] =
 BEGIN
 lower: INTEGER ← h.sv.operand01.integer;
 upper: INTEGER ← h.sv.operand02.integer;
 numElements: INTEGER ← upper - lower + 1;

 IF ((lower < 0) OR (upper < 0)) THEN {
  h.pc.pcm.action ← fatalError;
  h.pc.pcm.data.code ← PreParserMainErrors.negativeMakeVecLUbounds;
```

Copyright © 1992 Xerox Corporation All Rights Reserved

```
h.integer ← IF (lower < 0) THEN lower ELSE upper;
RETURN[loop: TRUE];
};

IF lower > upper THEN
 h.stackEntry ← [
  type: nullVectorOfElements,
  frameData: nullVectorOfElements[low: lower, count: 0]]
ELSE {
 h.pc.pcm.nodeSizeInWords ←
  SIZE[PreParserCommon.VectorOfElements] +
   (SIZE[PreParserCommon.StackEntry] * numElements);
 h.pc.pcm.zoneRecPtr ← @h.zone;
 IF ParserZone.AllocateNodeNFL[h: @h.pc.pcm].extendZone THEN {
  h.pc.pcm.savedAction ← MakeVecLU; RETURN[loop: TRUE]; };
 h.stackEntry ← [
  type: vectorOfElements,
  frameData: vectorOfElements[vectorPtr: h.pc.pcm.nodePtr]];
 h.stackEntry.vectorPtr.cn ← [
  fill: 0, preambleOwned: FALSE, referenceCount: 1, next: NIL,
  type: vectorOfElements, zoneRecPtr: @h.zone];
 h.stackEntry.vectorPtr.low ← lower;
 h.stackEntry.vectorPtr.count ← numElements;
 h.stackEntryPtr ← @h.stackEntry.vectorPtr.elements[numElements - 1];

 THROUGH [0..numElements) DO
  IF PreParserFrameStack.PopStack[h: h].fatalError THEN RETURN[loop: TRUE];
  IF h.stackEntryPtr.type = mark THEN {
   h.pc.pcm.action ← fatalError;
   h.pc.pcm.data.code ← PreParserMainErrors.unexpectedMark;
   RETURN[loop: TRUE];
   };
  h.stackEntryPtr ← h.stackEntryPtr - SIZE[PreParserCommon.StackEntry];
  ENDLOOP;
 };

IF PreParserFrameStack.PushStack[h: h].extendZone THEN {
 h.pc.pcm.savedAction ← PrePushStack; RETURN[loop: TRUE]; };
END;
Shape: PUBLIC PROCEDURE [h: PreParserCommon.MainHandle]
 RETURNS [loop: BOOLEAN ← FALSE] =
 BEGIN
 low, count: INTEGER;

 IF h.sv.operand01.type = nullVectorOfElements THEN {
  low ← INTEGER[h.sv.operand01.low]; count ← INTEGER[h.sv.operand01.count]; }
 ELSE {
  low ← INTEGER[h.sv.operand01.vectorPtr.low];
  count ← INTEGER[h.sv.operand01.vectorPtr.count];
  PreParserFrameStack.ComplexNodeRefCount[
```

Copyright © 1992 Xerox Corporation All Rights Reserved

```
   h: h, entryPtr: @h.sv.operand01, delta: -1];
  };

 h.stackEntry ← [
  type: fixedPointReal,
  frameData: fixedPointReal[fixed: [if[int: low, frac: 0]]]];
 [] ← IPMicrocode.CALL[function: IPFunction.PrePushStack, entryContext: h];

 h.stackEntry ← [
  type: fixedPointReal,
  frameData: fixedPointReal[fixed: [if[int: count, frac: 0]]]];
 [] ← IPMicrocode.CALL[function: IPFunction.PrePushStack, entryContext: h];
 END;
Initialize: PUBLIC PROCEDURE = BEGIN END;
END.
```

Copyright © 1992 Xerox Corporation All Rights Reserved

```
DIRECTORY
 Real USING [Fix],
 Transformation USING [Form, Matrix],
 TransformationOps USING [];

TransformationImpl: PROGRAM IMPORTS Real EXPORTS TransformationOps =

 BEGIN

 SetForm: PUBLIC PROC [m: LONG POINTER TO Transformation.Matrix] = {
  form: Transformation.Form ← full;
  SELECT TRUE FROM
   m.b = 0 AND m.d = 0 => {
    form ← zeroBandD;
    IF m.a + 3.0 = 4.0 THEN {
     IF m.e + 3.0 = 4.0 THEN {
      IF m.c = 0 AND m.f = 0 THEN form ← identity
      ELSE form ← pureTranslation}
     ELSE IF -m.e + 3.0 = 4.0 THEN form ← yFlip}
    ELSE
     IF -m.a + 3.0 = 4.0 THEN {
      IF m.e + 3.0 = 4.0 THEN form ← xFlip
      ELSE IF -m.e + 3.0 = 4.0 THEN form ← rotate180};
    IF form = zeroBandD THEN {
     IF Real.Fix[m.e] = m.e AND Real.Fix[m.a] = m.a THEN form ← integerScale
     ELSE IF m.c = 0 AND m.f = 0 THEN form ← pureScaling}};
   m.a = 0 AND m.e = 0 => {
    form ← zeroAandE;
    IF m.b + 3.0 = 4.0 THEN {
     IF m.d + 3.0 = 4.0 THEN form ← swapXY
     ELSE IF -m.d + 3.0 = 4.0 THEN form ← rotate270}
    ELSE
     IF -m.b + 3.0 = 4.0 THEN {
      IF m.d + 3.0 = 4.0 THEN form ← rotate90
      ELSE IF -m.d + 3.0 = 4.0 THEN form ← swapNegateXY}};
   ENDCASE => NULL;
  m.form ← form};

 END.
```

Copyright © 1992 Xerox Corporation All Rights Reserved

```
DIRECTORY
 BlockStream USING [Block, nullBlock],
 DecomposerCommon USING [ClientContext],
 FaultLogger USING [ID, nullLogID],
 InternalIP USING [SourceParameters],
 ResMgr USING [Status],
 ResMgrIDs USING [ID, TransactionID],
 ResMgrStorage USING [BufferList, Pages],
 RTOSFile USING [ErrorType, FileID, nullID];

IIPFragMgrInternal: DEFINITIONS =
 BEGIN

 IIPGenBlockSizeInPages: CARDINAL = 1;
 MaxIIPFragBufferSizeInPages: CARDINAL = 30;
 NumberOfPrePBlocks: CARDINAL = 3;
 NumberOfIIPGenBlocks: CARDINAL = 4;
 FileSizeInPages: CARDINAL = 3100;
 ExtendSizeInPages: CARDINAL = FileSizeInPages;
 DefaultRMID: ResMgrIDs.ID = [trans: captureIP, module: iipGen];

 CurrentDirectoryPtr: TYPE = LONG POINTER TO CurrentDirectory ← NIL;
 CurrentDirectory: TYPE = RECORD [
  dir: DirectoryPtr ← NIL, next: CurrentDirectoryPtr ← NIL];

 DirectoryPtr: TYPE = LONG POINTER TO Directory ← NIL;
 Directory: TYPE = RECORD [
  fileID: RTOSFile.FileID ← RTOSFile.nullID,
  RMID: ResMgrIDs.ID ← DefaultRMID,
  fragCount: CARDINAL ← 0,
  fileSizeInPages: ResMgrStorage.Pages ← 0,
  freePages: ResMgrStorage.Pages ← FileSizeInPages,
  next: DirectoryPtr ← NIL];

 CurrentFragment: TYPE = RECORD [
  dir: DirectoryPtr ← NIL,
  basePage: ResMgrStorage.Pages ← 0,
  lengthInWords: LONG CARDINAL ← 0];

 Object: TYPE = RECORD [
  prePH: DecomposerCommon.ClientContext ← LOOPHOLE[LONG[0]],
  currentFragment: CurrentFragment ← [],
  prePBlockAvail: CONDITION,
  availPrePQ: InternalPrePBlockPtr ← NIL,
  acquirePrePQ: InternalPrePBlockPtr ← NIL,
  ID: ResMgrIDs.ID ← DefaultRMID];

 InternalIIPGenBlockPtr: TYPE = LONG POINTER TO InternalIIPGenBlock;
 InternalIIPGenBlock: TYPE = RECORD [
```

Copyright © 1992 Xerox Corporation All Rights Reserved

```
 next: InternalIIPGenBlockPtr ← NIL,
 buffer: ResMgrStorage.BufferList ← NIL,
 block: BlockStream.Block ← BlockStream.nullBlock];

InternalPrePBlockPtr: TYPE = LONG POINTER TO InternalPrePBlock;
InternalPrePBlock: TYPE = RECORD [
 next: InternalPrePBlockPtr ← NIL,
 buffer: ResMgrStorage.BufferList ← NIL,
 block: BlockStream.Block ← BlockStream.nullBlock];

PostParseMemQPtr: TYPE = LONG POINTER TO PostParseMemQRec;
PostParseMemQRec: TYPE = RECORD [
 next: PostParseMemQPtr ← NIL,
 transID: ResMgrIDs.TransactionID,
 availIIPGenQ: InternalIIPGenBlockPtr ← NIL,
 usedIIPGenQ: InternalIIPGenBlockPtr ← NIL,
 iipGenBlockAvail: CONDITION];

ErrCode: TYPE = {
 noFreeStaticSpace, notMyStatic, notAllocated, staticAllocationFailed,
 corruptStatic, corruptInternalList, memoryNotInitialized, tooManyFragFiles,
 tooManyFrags, other};
IntErrors: ERROR [code: ErrCode];

DiskErrCodeType: TYPE = {rtosFileError, rmError};
DiskErrCodeRec: TYPE = RECORD [
 context: DecomposerCommon.ClientContext,
 faultID: FaultLogger.ID ← FaultLogger.nullLogID,
 var: SELECT err: DiskErrCodeType FROM
  rtosFileError = > [errorType: RTOSFile.ErrorType],
  rmError = > [code: ResMgr.Status],
  ENDCASE];
DiskErrors: ERROR [error: DiskErrCodeRec];


zone: UNCOUNTED ZONE;
sourceParms: InternalIP.SourceParameters;

END.
```

Copyright © 1992 Xerox Corporation All Rights Reserved

```
DIRECTORY
 ASWFileTypes USING [iipFragJob],
 DBError USING [OperationFailed],
 BlockStream USING [
  AcquireBlockProcedure, Block, DeleteProcedure, nullBlock, Object,
  ReturnBlockProcedure, SetAbortProcedure, StreamHandle,
  TransmitBlockProcedure],
 DecomposerCommon USING [ClientContext],
 DirectoryID USING [nullObjectID, ObjectID],
 IIPFragMgrInternal USING [
  CurrentDirectory, CurrentDirectoryPtr, Directory, DirectoryPtr,
  DiskErrCodeRec, ErrCode, ExtendSizeInPages, FileSizeInPages,
  InternalPrePBlock, InternalPrePBlockPtr, MaxIIPFragBufferSizeInPages,
  NumberOfPrePBlocks, Object],
 Heap USING [Create, FreeNode, Prune],
 IIPFragmentDS USING [
  Add, EnumerateIIPFragments, IIPFragmentFileArray, IIPFragmentRec],
 IIPFragMgr USING [ErrorCode],
 IIPFragMgrPrivate,
 InternalIP USING [SourceParameters],
 MemoryPartitions USING [GetVirtualRange],
 ResMgr USING [Allocate, Error, FreeBufferList],
 ResMgrIDs USING [ID, TransactionID],
 ResMgrStorage USING [
  BufferDescriptor, BufferList, bytesPerPage, Pages, PagesFromBytes,
  PagesFromWords],
 RMCache USING [DeleteAllForFile, MakeStatic, SwapToCache],
 RTOSOutload USING [Include],
 RTOSFile USING [Create, Delete, Error, Extend, FileID, nullID, Truncate],
 SystemLimits,
 TopLevel USING [WaitAllUp];

IIPFragMgrImplA: MONITOR
 IMPORTS
  DBError, Heap, IIPFragmentDS, MemoryPartitions, ResMgr, ResMgrStorage,
  RMCache, RTOSFile, RTOSOutload, SystemLimits, TopLevel
 EXPORTS IIPFragMgrInternal, IIPFragMgr, IIPFragMgrPrivate =

 BEGIN

 Handle: TYPE = LONG POINTER TO Object ← NIL;
 Object: PUBLIC TYPE = IIPFragMgrInternal.Object;


 zone: PUBLIC UNCOUNTED ZONE ← NIL;
 sourceParms: PUBLIC InternalIP.SourceParameters ← [];

 directoryListHead: IIPFragMgrInternal.DirectoryPtr ← NIL;
 directoryListTail: IIPFragMgrInternal.DirectoryPtr ← NIL;
```

Copyright © 1992 Xerox Corporation All Rights Reserved

```
currentDirectories: IIPFragMgrInternal.CurrentDirectoryPtr ← NIL;
numberOfFragFiles: CARDINAL ← 0;


Error: PUBLIC ERROR [code: IIPFragMgr.ErrorCode] = CODE;
IntErrors: PUBLIC ERROR [code: IIPFragMgrInternal.ErrCode] = CODE;
DiskErrors: PUBLIC ERROR [error: IIPFragMgrInternal.DiskErrCodeRec] = CODE;



AddFileToList: PUBLIC ENTRY PROCEDURE [
 fileID: RTOSFile.FileID, fragCount: CARDINAL] =
 BEGIN
 ENABLE UNWIND => NULL;
 newDir: IIPFragMgrInternal.DirectoryPtr ← NIL;
 tempDir: IIPFragMgrInternal.DirectoryPtr ← NIL;

 IF numberOfFragFiles = SystemLimits.iipFragFiles THEN
  ERROR IntErrors[tooManyFragFiles];

 newDir ← zone.NEW[
  IIPFragMgrInternal.Directory ← [
  fileID: fileID, RMID:, fragCount: fragCount, fileSizeInPages: 0,
  freePages: 0, next: NIL]];
 IF directoryListHead # NIL THEN {
  tempDir ← directoryListHead;
  directoryListHead ← newDir;
  directoryListHead.next ← tempDir;
  }
 ELSE directoryListHead ← newDir;

 numberOfFragFiles ← numberOfFragFiles + 1;
 END;

DeleteFrag: PUBLIC ENTRY PROCEDURE [fragInfo: IIPFragmentDS.IIPFragmentRec] =
 BEGIN
 ENABLE UNWIND => NULL;
 dir: IIPFragMgrInternal.DirectoryPtr ← NIL;
 FOR dir ← directoryListHead, dir.next UNTIL dir = NIL DO
  IF dir.fileID = fragInfo.fileID THEN GOTO found;
  REPEAT
   found => {
    dir.fragCount ← dir.fragCount - 1;
    IF dir.fragCount = 0 AND ~CurrentDirectory[dir: dir] THEN {
     RMCache.DeleteAllForFile[id: dir.RMID, fileID: fragInfo.fileID];
     RTOSFile.Delete[
      fileID: fragInfo.fileID !
      RTOSFile.Error =>
       SELECT errorType FROM unknownFile => CONTINUE; ENDCASE => REJECT];
     numberOfFragFiles ← numberOfFragFiles - 1;
```

Copyright © 1992 Xerox Corporation All Rights Reserved

```
      RemoveFromDirectoryList[dir: dir];
      zone.FREE[@dir]}};
    FINISHED => ERROR Error[invalidFileID];
   ENDLOOP;
  END;

 FreePrePStatic: PUBLIC ENTRY PROCEDURE [h: Handle] =
  BEGIN
  ENABLE UNWIND => NULL;
  tempBlock: IIPFragMgrInternal.InternalPrePBlockPtr ← NIL;
  WHILE h.availPrePQ # NIL DO
   tempBlock ← h.availPrePQ.next;
   ResMgr.FreeBufferList[id: h.ID, buffer: h.availPrePQ.buffer];
   zone.FREE[@h.availPrePQ];
   h.availPrePQ ← tempBlock;
   ENDLOOP;
  IF h.acquirePrePQ # NIL THEN ERROR Error[other];
  Heap.Prune[z: zone];
  END;

 IncFragCount: PUBLIC ENTRY PROCEDURE [
  fileID: RTOSFile.FileID, num: CARDINAL ← 1] =
  BEGIN
  ENABLE UNWIND => NULL;
  FOR tempDir: IIPFragMgrInternal.DirectoryPtr ← directoryListHead, tempDir.next
   UNTIL tempDir = NIL DO
   IF tempDir.fileID = fileID THEN GOTO found;
   REPEAT
    found => tempDir.fragCount ← tempDir.fragCount + num;
    FINISHED => ERROR Error[invalidFileID];
   ENDLOOP
  END;


 Init: PUBLIC ENTRY PROCEDURE [] =
  BEGIN
  ENABLE UNWIND => NULL;
  fileArray: IIPFragmentDS.IIPFragmentFileArray ← DESCRIPTOR[NIL, 0];
  previousDirectoryList: IIPFragMgrInternal.DirectoryPtr ← NIL;

  IF zone = NIL THEN
   zone ← Heap.Create[
    initial: 28, increment: 1, maxSize: 28, largeNodeThreshold: 2000];
  TopLevel.WaitAllUp[];
  fileArray ← IIPFragmentDS.EnumerateIIPFragments[zone: zone];
  numberOfFragFiles ← fileArray.LENGTH;
  Heap.Prune[z: zone];
  FOR i: CARDINAL IN [0..fileArray.LENGTH) DO
   directoryListTail ← zone.NEW[
    IIPFragMgrInternal.Directory ← [
```

Copyright © 1992 Xerox Corporation All Rights Reserved

```
   fileID: fileArray[i].fileID, RMID:, fragCount: fileArray[i].fragCount,
   fileSizeInPages: 0, freePages: 0, next: NIL]];
  IF directoryListHead = NIL THEN directoryListHead ← directoryListTail
  ELSE previousDirectoryList.next ← directoryListTail;
  previousDirectoryList ← directoryListTail;
  ENDLOOP;

 RegisterOutloadMem[id: [captureIP, iipGen]];
 RegisterOutloadMem[id: [coalesceJob, iipGen]];
 RegisterOutloadMem[id: [diskToPrint, iipGen]];
 RegisterOutloadMem[id: [pageEdit, iipGen]];

 Heap.FreeNode[z: zone, p: fileArray.BASE];
 END;


InstallFrag: PUBLIC ENTRY PROCEDURE [h: Handle]
 RETURNS [bsH: BlockStream.StreamHandle ← NIL] =
 BEGIN
 ENABLE UNWIND => NULL;

 IF h.currentFragment.dir.fileID = RTOSFile.nullID THEN
  BEGIN
  IF numberOfFragFiles = SystemLimits.iipFragFiles THEN
   ERROR IntErrors[tooManyFragFiles];
  h.currentFragment.dir.fileID ← RTOSFile.Create[
   fileType: ASWFileTypes.iipFragJob,
   size: IIPFragMgrInternal.FileSizeInPages, replicated: FALSE,
   contiguous: FALSE !
   RTOSFile.Error =>
    ERROR DiskErrors[
     error: [
     context: h.prePH, faultID: faultID,
     var: rtosFileError[errorType: errorType]]]];
  numberOfFragFiles ← numberOfFragFiles + 1;
  END;

 bsH ← zone.NEW[
  BlockStream.Object ← [
  bufPtr: LOOPHOLE[h], delete: PreParseDelete, acquire: PreParseAcquire,
  receive: NIL, return: PreParseReturn, transmit: PreParseTransmit,
  setAbort: PreParseSetAbort, setEOF: NIL, setTimeout: NIL]];
 IF h.availPrePQ = NIL AND h.acquirePrePQ = NIL THEN AllocatePrePBlocks[h: h];
 END;


Create: PUBLIC PROCEDURE [
 prePH: DecomposerCommon.ClientContext, transID: ResMgrIDs.TransactionID]
 RETURNS [h: Handle] =
 BEGIN
```

Copyright © 1992 Xerox Corporation All Rights Reserved

```
h ← zone.NEW[IIPFragMgrInternal.Object ← []];
h.prePH ← prePH;
h.ID ← [trans: transID, module: iipGen];
h.currentFragment ← [
 dir: zone.NEW[
 IIPFragMgrInternal.Directory ← [
 fileID: RTOSFile.nullID, RMID: [trans: transID, module: iipGen],
 fragCount: 0, fileSizeInPages: 0,
 freePages: IIPFragMgrInternal.FileSizeInPages, next: NIL]], basePage: 0,
 lengthInWords: 0];
NewCurrentDirectory[dir: h.currentFragment.dir];
END;

EndOfJob: PUBLIC PROCEDURE [h: Handle] =
 BEGIN
 oldFragmentDir: IIPFragMgrInternal.DirectoryPtr ← h.currentFragment.dir;
 IF h.currentFragment.dir.fileID = RTOSFile.nullID THEN RETURN;
 RTOSFile.Truncate[
  fileID: h.currentFragment.dir.fileID,
  size: h.currentFragment.dir.fileSizeInPages !
  RTOSFile.Error =>
   ERROR DiskErrors[
    error: [
    context: h.prePH, faultID: faultID,
    var: rtosFileError[errorType: errorType]]]];
 h.currentFragment ← [
  dir: zone.NEW[
  IIPFragMgrInternal.Directory ← [
  fileID: RTOSFile.nullID, RMID: oldFragmentDir.RMID, fragCount: 0,
  fileSizeInPages: 0, freePages: IIPFragMgrInternal.FileSizeInPages,
  next: NIL]], basePage: 0, lengthInWords: 0];
 ReplaceCurrentDirectory[dir: h.currentFragment.dir, old: oldFragmentDir];
 END;


GetFragID: PUBLIC PROCEDURE [bsH: BlockStream.StreamHandle]
 RETURNS [fragID: DirectoryID.ObjectID] = {
 sH: LONG POINTER TO BlockStream.Object ← LOOPHOLE[bsH];
 h: Handle ← NIL;

 IF bsH = NIL THEN ERROR Error[invalidHandle];
 h ← LOOPHOLE[bsH.bufPtr];

 fragID ← IIPFragmentDS.Add[
  iipFragmentRec: [
  fileID: h.currentFragment.dir.fileID, offset: h.currentFragment.basePage,
  lengthInWords: h.currentFragment.lengthInWords,
  version: sourceParms.version] !
  DBError.OperationFailed =>
   SELECT code FROM
```

Copyright © 1992 Xerox Corporation All Rights Reserved

```
    diskFull, memoryFull => fragID ← DirectoryID.nullObjectID;
    maxExceeded => ERROR IntErrors[tooManyFrags];
    ENDCASE => REJECT];

 UpdateCurrentFrag[h: h];
 zone.FREE[@sH]};

ReOpenFrag: PUBLIC PROCEDURE [
 fragID: DirectoryID.ObjectID, bsH: BlockStream.StreamHandle,
 length: LONG CARDINAL]
 RETURNS [block: BlockStream.Block ← BlockStream.nullBlock] = {};


Resume: PUBLIC PROCEDURE [h: Handle, abort: BOOLEAN ← FALSE] = {};


NewCurrentDirectory: ENTRY PROCEDURE [dir: IIPFragMgrInternal.DirectoryPtr] = {
 ENABLE UNWIND => NULL;
 IF directoryListHead = NIL THEN directoryListHead ← directoryListTail ← dir
 ELSE {directoryListTail.next ← dir; directoryListTail ← dir};
 currentDirectories ← zone.NEW[
  IIPFragMgrInternal.CurrentDirectory ← [
  dir: dir, next: currentDirectories]]};


PreParseAcquire: ENTRY BlockStream.AcquireBlockProcedure =
 BEGIN
 ENABLE UNWIND => NULL;
 h: Handle ← NIL;
 tempPrePBlock: IIPFragMgrInternal.InternalPrePBlockPtr ← NIL;

 IF sH = NIL THEN ERROR Error[invalidHandle];
 IF length #
  IIPFragMgrInternal.MaxIIPFragBufferSizeInPages * ResMgrStorage.bytesPerPage
  THEN ERROR Error[other];

 h ← LOOPHOLE[sH.bufPtr];

 tempPrePBlock ← h.acquirePrePQ;

 WHILE h.availPrePQ = NIL DO WAIT h.prePBlockAvail; ENDLOOP;

 block ← h.availPrePQ.block;
 h.acquirePrePQ ← h.availPrePQ;
 h.availPrePQ ← h.availPrePQ.next;
 h.acquirePrePQ.next ← tempPrePBlock;
 END;

PreParseReturn: ENTRY BlockStream.ReturnBlockProcedure =
```

Copyright © 1992 Xerox Corporation All Rights Reserved

```
 BEGIN
 ENABLE UNWIND => NULL;

 h: Handle ← NIL;
 IF sH = NIL THEN ERROR Error[invalidHandle];
 h ← LOOPHOLE[sH.bufPtr];
 RemoveFromAcquireQ[h: h, block: block];
 END;

PreParseSetAbort: ENTRY BlockStream.SetAbortProcedure =
 BEGIN
 ENABLE UNWIND => NULL;
 h: Handle ← NIL;
 IF sH = NIL THEN ERROR Error[invalidHandle];
 h ← LOOPHOLE[sH.bufPtr];
 PreParseDelete[sH: sH];
 h.currentFragment.basePage ← h.currentFragment.dir.fileSizeInPages;
 h.currentFragment.lengthInWords ← 0;
 END;

PreParseTransmit: ENTRY BlockStream.TransmitBlockProcedure =
 BEGIN
 ENABLE {
  UNWIND => NULL;

  RTOSFile.Error => {
   RemoveFromAcquireQ[h: LOOPHOLE[sH.bufPtr], block: block];
   ERROR DiskErrors[
    error: [
    context: LOOPHOLE[sH.bufPtr, LONG POINTER TO
    IIPFragMgrInternal.Object].prePH, faultID: faultID,
    var: rtosFileError[errorType: errorType]]]};
  ResMgr.Error => {
   RemoveFromAcquireQ[h: LOOPHOLE[sH.bufPtr], block: block];
   ERROR DiskErrors[
    error: [
    context: LOOPHOLE[sH.bufPtr, LONG POINTER TO
    IIPFragMgrInternal.Object].prePH, faultID: faultID,
    var: rmError[code: code]]]}};

 bufferLengthInPages: ResMgrStorage.Pages ← ResMgrStorage.PagesFromBytes[
  block.stopIndexPlusOne];
 buffer: ResMgrStorage.BufferDescriptor ← [
  next: NIL, base: block.blockPointer, allocateSize: bufferLengthInPages,
  extendByPages: 0];
 h: Handle ← NIL;

 IF sH = NIL THEN ERROR Error[invalidHandle];
 h ← LOOPHOLE[sH.bufPtr];
```

Copyright © 1992 Xerox Corporation All Rights Reserved

```
IF block.stopIndexPlusOne = 0 OR block.startIndex # 0
 OR (block.stopIndexPlusOne - block.startIndex) <= 0 THEN ERROR Error[other];

h.currentFragment.lengthInWords ←
 h.currentFragment.lengthInWords +
  (block.stopIndexPlusOne - block.startIndex) / 2;

IF bufferLengthInPages > h.currentFragment.dir.freePages THEN {
 extAmount: LONG CARDINAL ←
  FindExt[
   number:
   h.currentFragment.dir.freePages + h.currentFragment.dir.fileSizeInPages,
   cutOff: IIPFragMgrInternal.ExtendSizeInPages] *
   IIPFragMgrInternal.ExtendSizeInPages;
 RTOSFile.Extend[
  fileID: h.currentFragment.dir.fileID, nPagesToExtendBy: extAmount];
 h.currentFragment.dir.freePages ←
  h.currentFragment.dir.freePages + extAmount;
 };

RMCache.MakeStatic[
 id: h.currentFragment.dir.RMID,
 segment: [
 backingFile: h.currentFragment.dir.fileID,
 filePage: h.currentFragment.dir.fileSizeInPages,
 length: bufferLengthInPages], buffer: @buffer, dontRead: TRUE];
RMCache.SwapToCache[
 id: h.currentFragment.dir.RMID,
 segment: [
 backingFile: h.currentFragment.dir.fileID,
 filePage: h.currentFragment.dir.fileSizeInPages,
 length: bufferLengthInPages], priority: [keepMostRecent[]],
 forceOut: writeAsync, staticBuffer: @buffer];

h.currentFragment.dir.fileSizeInPages ←
 h.currentFragment.dir.fileSizeInPages + bufferLengthInPages;
h.currentFragment.dir.freePages ←
 h.currentFragment.dir.freePages - bufferLengthInPages;
RemoveFromAcquireQ[h: h, block: block];

END;

ReplaceCurrentDirectory: ENTRY PROCEDURE [
 dir: IIPFragMgrInternal.DirectoryPtr, old: IIPFragMgrInternal.DirectoryPtr] =
 {
 ENABLE UNWIND => NULL;
 FOR tempDir: IIPFragMgrInternal.CurrentDirectoryPtr ← currentDirectories,
  tempDir.next UNTIL tempDir = NIL DO
  IF tempDir.dir = old THEN GOTO found;
  REPEAT found => tempDir.dir ← dir; FINISHED => ERROR Error[other];
```

Copyright © 1992 Xerox Corporation All Rights Reserved

```
ENDLOOP;
IF dir # NIL THEN {directoryListTail.next ← dir; directoryListTail ← dir}};


UpdateCurrentFrag: ENTRY PROCEDURE [h: Handle] = {
 ENABLE UNWIND => NULL;
 h.currentFragment.dir.fragCount ← h.currentFragment.dir.fragCount + 1;
 h.currentFragment ← [
  dir: h.currentFragment.dir,
  basePage:
  h.currentFragment.basePage + ResMgrStorage.PagesFromWords[
   h.currentFragment.lengthInWords], lengthInWords: 0]};



AllocatePrePBlocks: INTERNAL PROCEDURE [h: Handle] = {
 buffer: ResMgrStorage.BufferList ← ResMgr.Allocate[
  id: h.ID, Pages: IIPFragMgrInternal.MaxIIPFragBufferSizeInPages,
  waitTillAvailable: FALSE];
 tempPrePBlock: IIPFragMgrInternal.InternalPrePBlockPtr ← NIL;

 IF buffer = NIL
  OR buffer.allocateSize # IIPFragMgrInternal.MaxIIPFragBufferSizeInPages THEN
  ERROR Error[noResources];

 h.availPrePQ ← tempPrePBlock ← zone.NEW[
  IIPFragMgrInternal.InternalPrePBlock ← [
  next: NIL, buffer: buffer,
  block: [
  blockPointer: LOOPHOLE[buffer.base], startIndex: 0,
  stopIndexPlusOne: buffer.allocateSize * ResMgrStorage.bytesPerPage]]];

 THROUGH [1..IIPFragMgrInternal.NumberOfPrePBlocks) DO

  buffer ← ResMgr.Allocate[
   id: h.ID, Pages: IIPFragMgrInternal.MaxIIPFragBufferSizeInPages,
   waitTillAvailable: FALSE];

  IF buffer = NIL
   OR buffer.allocateSize # IIPFragMgrInternal.MaxIIPFragBufferSizeInPages
   THEN ERROR Error[noResources];

  tempPrePBlock.next ← zone.NEW[
   IIPFragMgrInternal.InternalPrePBlock ← [
   next: NIL, buffer: buffer,
   block: [
   blockPointer: LOOPHOLE[buffer.base], startIndex: 0,
   stopIndexPlusOne: buffer.allocateSize * ResMgrStorage.bytesPerPage]]];

  tempPrePBlock ← tempPrePBlock.next;
```

Copyright © 1992 Xerox Corporation All Rights Reserved

```
  ENDLOOP};

CurrentDirectory: INTERNAL PROCEDURE [dir: IIPFragMgrInternal.DirectoryPtr]
 RETURNS [BOOLEAN] = {
 ENABLE UNWIND => NULL;
 FOR tempDir: IIPFragMgrInternal.CurrentDirectoryPtr ← currentDirectories,
  tempDir.next UNTIL tempDir = NIL DO
  IF tempDir.dir = dir THEN GOTO found;
  REPEAT found => RETURN[TRUE]; FINISHED => RETURN[FALSE];
  ENDLOOP};

FindExt: INTERNAL PROCEDURE [number: LONG CARDINAL, cutOff: CARDINAL]
 RETURNS [amount: CARDINAL ← 1] =
 BEGIN
 runCutOff: CARDINAL ← cutOff;

 WHILE runCutOff < number DO
  number ← number - runCutOff;
  amount ← amount + 1;
  runCutOff ← runCutOff + cutOff;
  ENDLOOP;
 RETURN[amount]
 END;

RegisterOutloadMem: PROCEDURE [id: ResMgrIDs.ID] =
 BEGIN
 vmStart, vmEnd: LONG POINTER;
 count: ResMgrStorage.Pages;

 [vmStart, vmEnd] ← MemoryPartitions.GetVirtualRange[id: id];
 count ← ResMgrStorage.PagesFromWords[words: (vmEnd - vmStart)];
 RTOSOutload.Include[interval: [pointer: vmStart, count: count]];
 END;

RemoveFromAcquireQ: INTERNAL PROCEDURE [h: Handle, block: BlockStream.Block] = {
 ENABLE UNWIND => NULL;
 tempBlock: IIPFragMgrInternal.InternalPrePBlockPtr;
 previousBlock: IIPFragMgrInternal.InternalPrePBlockPtr ← h.acquirePrePQ;
 FOR tempBlock ← h.acquirePrePQ, tempBlock.next UNTIL tempBlock = NIL DO
  IF tempBlock.block.blockPointer = block.blockPointer THEN GOTO foundBlock;
  previousBlock ← tempBlock;
  REPEAT
   foundBlock =>
    IF tempBlock = h.acquirePrePQ THEN h.acquirePrePQ ← tempBlock.next
    ELSE previousBlock.next ← tempBlock.next;
   FINISHED => ERROR Error[wrongBlock];
  ENDLOOP;
 tempBlock.next ← h.availPrePQ;
 h.availPrePQ ← tempBlock;
 h.availPrePQ.block.startIndex ← 0;
```

Copyright © 1992 Xerox Corporation All Rights Reserved

```
h.availPrePQ.block.stopIndexPlusOne ←
  h.availPrePQ.buffer.allocateSize * ResMgrStorage.bytesPerPage;
BROADCAST h.prePBlockAvail};


RemoveFromDirectoryList: INTERNAL PROCEDURE [
 dir: IIPFragMgrInternal.DirectoryPtr] = {
 previousDir, tempDir: IIPFragMgrInternal.DirectoryPtr ← NIL;
 FOR tempDir ← directoryListHead, tempDir.next UNTIL tempDir = NIL DO
  IF dir = tempDir THEN GOTO found;
  previousDir ← tempDir;
  REPEAT
   found => {
    IF dir = directoryListHead THEN
     directoryListHead ← directoryListHead.next
    ELSE previousDir.next ← tempDir.next;
    IF dir = directoryListTail THEN directoryListTail ← previousDir}
   FINISHED => ERROR Error[other];
  ENDLOOP};


PreParseDelete: BlockStream.DeleteProcedure =
 BEGIN
 bsH: LONG POINTER TO BlockStream.Object ← NIL;
 IF sH = NIL THEN ERROR Error[invalidHandle];
 bsH ← LOOPHOLE[sH];
 zone.FREE[@bsH];
 END;

END.
```

Copyright © 1992 Xerox Corporation All Rights Reserved

```
DIRECTORY
 BlockStream USING [AcquireBlockProcedure, Block, ReturnBlockProcedure],
 DirectoryID USING [ObjectID],
 Environment USING [wordsPerPage],
 Heap USING [Prune],
 IIPFragMgrInternal USING [
  ErrCode, IIPGenBlockSizeInPages, InternalIIPGenBlock, InternalIIPGenBlockPtr,
  MaxIIPFragBufferSizeInPages, NumberOfIIPGenBlocks, PostParseMemQPtr,
  PostParseMemQRec, sourceParms, zone],
 IIPFragmentDS USING [GetIIPFragment, IIPFragmentRec],
 IIPFragMgr USING [Error],
 IIPFragMgrPrivate,
 IIPGenTypes USING [Handle],
 IIPGenInternal USING [AddBlockToQ, Handle],
 JobQ USING [UnlockJob],
 MemoryPartitions USING [GetStaticPages],
 ResMgr USING [Allocate, Error, FreeBufferList],
 ResMgrIDs USING [TransactionID],
 ResMgrStorage USING [
  BufferDescriptor, BufferList, bytesPerPage, Pages, PagesFromWords,
  wordsPerPage],
 RMCache USING [Delete, MakeStatic];

IIPFragMgrImplB: MONITOR
 IMPORTS
  Heap, IIPFragMgr, IIPFragMgrInternal, IIPFragmentDS, IIPGenInternal, JobQ,
  MemoryPartitions, ResMgr, ResMgrStorage, RMCache
 EXPORTS IIPFragMgrPrivate =

 BEGIN


 ListType: TYPE = {free, alloc};

 ObjPtr: TYPE = LONG POINTER TO ObjRec;
 ObjRec: TYPE = RECORD [
  prev: ObjPtr ← NIL,
  next: ObjPtr ← NIL,
  base: LONG POINTER ← NIL,
  pages: LONG CARDINAL ← 0];

 TransIDPtr: TYPE = LONG POINTER TO TransIDRec;
 TransIDRec: TYPE = RECORD [
  transID: ResMgrIDs.TransactionID,
  buffer: ResMgrStorage.BufferList ← NIL,
  free: ObjPtr ← NIL,
  alloc: ObjPtr ← NIL,
  static: LONG POINTER ← NIL,
  staticPages: LONG CARDINAL ← 0,
```

Copyright © 1992 Xerox Corporation All Rights Reserved

```
  staticAvail: CONDITION,
  next: TransIDPtr ← NIL];


postPMemQs: IIPFragMgrInternal.PostParseMemQPtr ← NIL;
transIDList: TransIDPtr ← NIL;


IntError: SIGNAL [code: IIPFragMgrInternal.ErrCode] = CODE;


AcquireBlock: PUBLIC ENTRY BlockStream.AcquireBlockProcedure =
  BEGIN
  ENABLE UNWIND => NULL;
  memQ: IIPFragMgrInternal.PostParseMemQPtr ← NIL;
  tempIIPGenBlock: IIPFragMgrInternal.InternalIIPGenBlockPtr ← NIL;
  iipH: IIPGenInternal.Handle ← NIL;

  IF sH = NIL THEN ERROR IIPFragMgr.Error[invalidHandle];
  iipH ← LOOPHOLE[sH.bufPtr];

  FOR memQ ← postPMemQs, memQ.next UNTIL memQ = NIL DO
   IF memQ.transID = iipH.transID THEN EXIT;
   REPEAT
    FINISHED => {
     memQ ← AllocateIIPGenBlocks[transID: iipH.transID];
     memQ.next ← postPMemQs;
     postPMemQs ← memQ};
   ENDLOOP;

  WHILE memQ.availIIPGenQ = NIL DO
   IF iipH.jobLocked THEN
    BEGIN
    JobQ.UnlockJob[lockID: iipH.lockID];
    WAIT memQ.iipGenBlockAvail;
    iipH.lockID ← iipH.relock[];
    END
   ELSE WAIT memQ.iipGenBlockAvail;
   ENDLOOP;

  block ← [
   blockPointer: memQ.availIIPGenQ.block.blockPointer, startIndex: 0,
   stopIndexPlusOne: length];

  tempIIPGenBlock ← memQ.usedIIPGenQ;
  memQ.usedIIPGenQ ← memQ.availIIPGenQ;
  memQ.availIIPGenQ ← memQ.availIIPGenQ.next;
```

Copyright © 1992 Xerox Corporation All Rights Reserved

```
memQ.usedIIPGenQ.next ← tempIIPGenBlock;
END;

FreePostPStatic: PUBLIC ENTRY PROCEDURE [transID: ResMgrIDs.TransactionID] =
BEGIN
ENABLE UNWIND => NULL;
memQ, previousQ: IIPFragMgrInternal.PostParseMemQPtr;
tempPtr: LONG POINTER ← NIL;

FOR memQ ← postPMemQs, memQ.next UNTIL memQ = NIL DO
 IF memQ.transID = transID THEN EXIT;
 previousQ ← memQ;
 REPEAT FINISHED => RETURN;
 ENDLOOP;

IF memQ = postPMemQs THEN postPMemQs ← memQ.next
ELSE previousQ.next ← memQ.next;

ShutDownMemory[transID: transID];

WHILE memQ.availIIPGenQ # NIL DO
 ResMgr.FreeBufferList[
  id: [trans: transID, module: iipGen], buffer: memQ.availIIPGenQ.buffer];
 tempPtr ← memQ.availIIPGenQ;
 memQ.availIIPGenQ ← memQ.availIIPGenQ.next;
 IIPFragMgrInternal.zone.FREE[@tempPtr];
 ENDLOOP;

WHILE memQ.usedIIPGenQ # NIL DO
 ResMgr.FreeBufferList[
  id: [trans: transID, module: iipGen], buffer: memQ.usedIIPGenQ.buffer];
 tempPtr ← memQ.usedIIPGenQ;
 memQ.usedIIPGenQ ← memQ.usedIIPGenQ.next;
 IIPFragMgrInternal.zone.FREE[@tempPtr];
 ENDLOOP;

IIPFragMgrInternal.zone.FREE[@memQ];

Heap.Prune[z: IIPFragMgrInternal.zone];

END;

ReturnBlock: PUBLIC ENTRY BlockStream.ReturnBlockProcedure =
BEGIN
ENABLE UNWIND => NULL;
memQ: IIPFragMgrInternal.PostParseMemQPtr ← NIL;
iipH: IIPGenInternal.Handle ← NIL;

IF sH = NIL THEN ERROR IIPFragMgr.Error[invalidHandle];
iipH ← LOOPHOLE[sH.bufPtr];
```

Copyright © 1992 Xerox Corporation All Rights Reserved

```
FOR memQ ← postPMemQs, memQ.next UNTIL memQ = NIL DO
 IF memQ.transID = iipH.transID THEN EXIT;
 REPEAT FINISHED => ERROR IIPFragMgr.Error[other];
 ENDLOOP;

IF ~CheckForIIPGenBlock[memQ: memQ, block: block] THEN
 FreeStaticSpace[transID: memQ.transID, lp: block.blockPointer];
END;

SendFrag: PUBLIC ENTRY PROCEDURE [
 iipH: IIPGenTypes.Handle, frag: DirectoryID.ObjectID] =
 BEGIN
 ENABLE UNWIND => NULL;
 buffer: ResMgrStorage.BufferDescriptor;
 fragInfo: IIPFragmentDS.IIPFragmentRec ← IIPFragmentDS.GetIIPFragment[
  id: frag];
 h: IIPGenInternal.Handle ← LOOPHOLE[iipH];
 lengthInPages: ResMgrStorage.Pages ← 0;
 lengthInWords: LONG CARDINAL ←
  IIPFragMgrInternal.MaxIIPFragBufferSizeInPages * ResMgrStorage.wordsPerPage;
 memQ: IIPFragMgrInternal.PostParseMemQPtr ← NIL;
 offset: ResMgrStorage.Pages ← fragInfo.offset;
 wordsRemaining: LONG CARDINAL ← fragInfo.lengthInWords;

 IF h.bsH = NIL THEN ERROR IIPFragMgr.Error[invalidHandle];

 IF fragInfo.version # IIPFragMgrInternal.sourceParms.version THEN {};

 FOR memQ ← postPMemQs, memQ.next UNTIL memQ = NIL DO
  IF memQ.transID = h.transID THEN EXIT;
  REPEAT FINISHED => ERROR IIPFragMgr.Error[invalidTransID];
  ENDLOOP;

 InitMemory[transID: h.transID];

 UNTIL wordsRemaining = 0 DO
  offset ← offset + lengthInPages;
  lengthInWords ← MIN[wordsRemaining, lengthInWords];
  lengthInPages ← ResMgrStorage.PagesFromWords[lengthInWords];
  buffer ← [
   next: NIL, base: FindStaticSpace[iipH: h, pages: lengthInPages],
   allocateSize: lengthInPages, extendByPages: 0];

  RMCache.MakeStatic[
   id: [trans: captureIP, module: iipGen],
   segment: [
   backingFile: fragInfo.fileID, filePage: offset, length: lengthInPages],
   buffer: @buffer, dontRead: FALSE !
   ResMgr.Error =>
```

Copyright © 1992 Xerox Corporation All Rights Reserved

```
    SELECT code FROM
     diskFault => {
      FreeStaticSpace[transID: h.transID, lp: buffer.base]; REJECT};
     ENDCASE => REJECT];
  RMCache.Delete[
   id: [trans: captureIP, module: iipGen],
   segment: [
   backingFile: fragInfo.fileID, filePage: offset, length: lengthInPages]];
  IIPGenInternal.AddBlockToQ[
   iipH: h,
   block: [
   blockPointer: LOOPHOLE[buffer.base], startIndex: 0,
   stopIndexPlusOne: lengthInWords * 2]];
  wordsRemaining <- wordsRemaining - lengthInWords;
  ENDLOOP;

 END;


AllocateIIPGenBlocks: INTERNAL PROCEDURE [transID: ResMgrIDs.TransactionID]
 RETURNS [memQ: IIPFragMgrInternal.PostParseMemQPtr] = {
 buffer: ResMgrStorage.BufferList <- NIL;
 tempIIPGenBlock: IIPFragMgrInternal.InternalIIPGenBlockPtr <- NIL;

 memQ <- IIPFragMgrInternal.zone.NEW[
  IIPFragMgrInternal.PostParseMemQRec <- [
  next: NIL, transID: transID, availIIPGenQ: NIL, usedIIPGenQ: NIL]];

 buffer <- ResMgr.Allocate[
  id: [trans: transID, module: iipGen],
  Pages: IIPFragMgrInternal.IIPGenBlockSizeInPages, waitTillAvailable: FALSE];
 IF buffer = NIL THEN ERROR IIPFragMgr.Error[noResources];
 memQ.availIIPGenQ <- tempIIPGenBlock <- IIPFragMgrInternal.zone.NEW[
  IIPFragMgrInternal.InternalIIPGenBlock <- [
  next: NIL,
  block: [
  blockPointer: buffer.base, startIndex: 0,
  stopIndexPlusOne:
  IIPFragMgrInternal.IIPGenBlockSizeInPages * ResMgrStorage.bytesPerPage],
  buffer: buffer]];
 THROUGH [1..IIPFragMgrInternal.NumberOfIIPGenBlocks) DO
  buffer <- ResMgr.Allocate[
   id: [trans: transID, module: iipGen],
   Pages: IIPFragMgrInternal.IIPGenBlockSizeInPages,
   waitTillAvailable: FALSE];
  IF buffer = NIL THEN ERROR IIPFragMgr.Error[noResources];
  tempIIPGenBlock.next <- IIPFragMgrInternal.zone.NEW[
   IIPFragMgrInternal.InternalIIPGenBlock <- [
   next: NIL,
   block: [
```

Copyright © 1992 Xerox Corporation All Rights Reserved

```
   blockPointer: buffer.base, startIndex: 0,
   stopIndexPlusOne:
   IIPFragMgrInternal.IIPGenBlockSizeInPages * ResMgrStorage.bytesPerPage],
   buffer: buffer]];
  tempIIPGenBlock ← tempIIPGenBlock.next;
  ENDLOOP};

CheckForIIPGenBlock: INTERNAL PROCEDURE [
 memQ: IIPFragMgrInternal.PostParseMemQPtr, block: BlockStream.Block]
 RETURNS [found: BOOLEAN] =
 BEGIN
 tempIIPGenBlock, previousIIPGenBlock:
  IIPFragMgrInternal.InternalIIPGenBlockPtr;
 FOR tempIIPGenBlock ← memQ.usedIIPGenQ, tempIIPGenBlock.next UNTIL
  tempIIPGenBlock = NIL DO
  IF tempIIPGenBlock.block.blockPointer = block.blockPointer THEN GOTO found;
  previousIIPGenBlock ← tempIIPGenBlock;
  REPEAT
   found => {

    IF tempIIPGenBlock = memQ.usedIIPGenQ THEN
     memQ.usedIIPGenQ ← tempIIPGenBlock.next
    ELSE previousIIPGenBlock.next ← tempIIPGenBlock.next;

    tempIIPGenBlock.next ← memQ.availIIPGenQ;
    memQ.availIIPGenQ ← tempIIPGenBlock;
    NOTIFY memQ.iipGenBlockAvail;
    RETURN[TRUE]};
   FINISHED => RETURN[FALSE];
  ENDLOOP;
 END;

FindStaticSpace: INTERNAL PROCEDURE [
 iipH: IIPGenInternal.Handle, pages: LONG CARDINAL]
 RETURNS [lp: LONG POINTER] =
 BEGIN
 ENABLE UNWIND => NULL;
 insert: ObjPtr ← NIL;
 objPtr: ObjPtr ← NIL;
 onList: BOOLEAN ← FALSE;
 tempList: TransIDPtr ← NIL;

 FOR tempList ← transIDList, tempList.next UNTIL tempList = NIL DO
  IF tempList.transID = iipH.transID THEN EXIT;
  REPEAT FINISHED => ERROR IntError[memoryNotInitialized];
  ENDLOOP;

 objPtr ← FindPages[list: tempList, type: free, pages: pages];
 WHILE objPtr = NIL DO
  IF iipH.jobLocked THEN
```

Copyright © 1992 Xerox Corporation All Rights Reserved

```
    BEGIN
    JobQ.UnlockJob[lockID: iipH.lockID];
    WAIT tempList.staticAvail;
    iipH.lockID ← iipH.relock[];
    END
   ELSE WAIT tempList.staticAvail;
   objPtr ← FindPages[list: tempList, type: free, pages: pages];
   ENDLOOP;
  objPtr ← Remove[objPtr: objPtr, list: tempList, type: free, pages: pages];
  [insert: insert, onList: onList] ← FindPtr[
   ptr: objPtr.base, list: tempList, type: alloc];
  IF onList
   OR OverLap[objPtr: objPtr, insert: insert, list: tempList, type: alloc] THEN
   ERROR IntError[corruptStatic];
  IF insert = NIL THEN InsertHead[objPtr: objPtr, list: tempList, type: alloc]
  ELSE InsertAfter[objPtr: objPtr, after: insert];
  lp ← objPtr.base;
  END;

 FreeStaticSpace: INTERNAL PROCEDURE [
  transID: ResMgrIDs.TransactionID, lp: LONG POINTER] =
  BEGIN
  ENABLE UNWIND => NULL;
  insert: ObjPtr ← NIL;
  objPtr: ObjPtr ← NIL;
  onList: BOOLEAN ← FALSE;
  tempList: TransIDPtr ← NIL;

  FOR tempList ← transIDList, tempList.next UNTIL tempList = NIL DO
   IF tempList.transID = transID THEN EXIT;
   REPEAT FINISHED => ERROR IntError[memoryNotInitialized];
   ENDLOOP;

  IF NOT ValidPointer[list: tempList, p: lp] THEN ERROR IntError[notMyStatic];
  [insert: objPtr, onList: onList] ← FindPtr[
   ptr: lp, list: tempList, type: alloc];
  IF NOT onList THEN ERROR IntError[notAllocated];
  objPtr ← Remove[
   objPtr: objPtr, list: tempList, type: alloc, pages: objPtr.pages];
  [insert: insert, onList: onList] ← FindPtr[
   ptr: objPtr.base, list: tempList, type: free];
  IF onList
   OR OverLap[objPtr: objPtr, insert: insert, list: tempList, type: free] THEN
   ERROR IntError[corruptStatic];
  IF insert = NIL THEN InsertHead[objPtr: objPtr, list: tempList, type: free]
  ELSE InsertAfter[objPtr: objPtr, after: insert];
  CoalesceList[list: tempList, type: free];
  NOTIFY tempList.staticAvail;
  END;
```

Copyright © 1992 Xerox Corporation All Rights Reserved

```
InitMemory: PROCEDURE [transID: ResMgrIDs.TransactionID] =
 BEGIN
 tempList: TransIDPtr ← NIL;

 FOR tempList ← transIDList, tempList.next UNTIL tempList = NIL DO
  IF tempList.transID = transID THEN EXIT;
  REPEAT
   FINISHED => {
    staticPages: ResMgrStorage.Pages ←
     MemoryPartitions.GetStaticPages[id: [trans: transID, module: iipGen]]
      -
      (IIPFragMgrInternal.NumberOfIIPGenBlocks *
       IIPFragMgrInternal.IIPGenBlockSizeInPages);
    tempList ← transIDList;
    transIDList ← IIPFragMgrInternal.zone.NEW[
     TransIDRec ← [
     transID: transID,
     buffer: ResMgr.Allocate[
     id: [trans: transID, module: iipGen], Pages: staticPages, base: NIL,
     waitTillAvailable: FALSE], free: NIL, alloc: NIL, static: NIL,
     staticPages: staticPages, next: tempList]];
    IF transIDList.buffer = NIL
     OR transIDList.buffer.allocateSize # staticPages THEN
     ERROR IntError[staticAllocationFailed];
    transIDList.free ← IIPFragMgrInternal.zone.NEW[
     ObjRec ← [base: transIDList.buffer.base, pages: staticPages]];
    transIDList.static ← transIDList.buffer.base};
  ENDLOOP;
 END;

ShutDownMemory: PROCEDURE [transID: ResMgrIDs.TransactionID] =
 BEGIN
 temp: ObjPtr;
 tempList, previousList: TransIDPtr;

 FOR tempList ← transIDList, tempList.next UNTIL tempList = NIL DO
  IF tempList.transID = transID THEN GOTO foundTransID;
  previousList ← tempList;
  REPEAT
   foundTransID => {
    ResMgr.FreeBufferList[
     id: [trans: transID, module: iipGen], buffer: tempList.buffer];
    temp ← tempList.free;
    WHILE temp # NIL DO
     tempList.free ← temp.next;
     IIPFragMgrInternal.zone.FREE[@temp];
     temp ← tempList.free;
     ENDLOOP;
    temp ← tempList.alloc;
```

Copyright © 1992 Xerox Corporation All Rights Reserved

```
    WHILE temp # NIL DO
     tempList.alloc ← temp.next;
     IIPFragMgrInternal.zone.FREE[@temp];
     temp ← tempList.alloc;
     ENDLOOP;
    IF tempList = transIDList THEN transIDList ← transIDList.next
    ELSE previousList.next ← tempList.next;
    IIPFragMgrInternal.zone.FREE[@tempList]};
  ENDLOOP;
 END;

CoalesceList: PROCEDURE [list: TransIDPtr, type: ListType] =
 BEGIN
 next: ObjPtr ← NIL;
 nextStart: LONG UNSPECIFIED ← 0;
 nextStop: LONG UNSPECIFIED ← 0;
 this: ObjPtr ← NIL;
 thisStart: LONG UNSPECIFIED ← 0;
 thisStop: LONG UNSPECIFIED ← 0;

 SELECT type FROM
  free = > this ← list.free;
  alloc = > this ← list.alloc;
  ENDCASE = > ERROR;
 IF this # NIL THEN {
  next ← this.next;
  WHILE next # NIL DO
   [rangeStart: thisStart, rangeStop: thisStop] ← GetRanges[objPtr: this];
   [rangeStart: nextStart, rangeStop: nextStop] ← GetRanges[objPtr: next];
   IF (thisStop + 1) = nextStart THEN {
    this.pages ← this.pages + next.pages;
    this.next ← next.next;
    IF next.next # NIL THEN next.next.prev ← this;
    IIPFragMgrInternal.zone.FREE[@next];
    next ← this.next}
   ELSE {this ← next; next ← next.next};
   ENDLOOP};
 END;

FindPtr: PROCEDURE [ptr: LONG UNSPECIFIED, list: TransIDPtr, type: ListType]
 RETURNS [insert: ObjPtr ← NIL, onList: BOOLEAN ← FALSE] =
 BEGIN
 next: ObjPtr ← NIL;
 prev: ObjPtr ← NIL;
 rangeStart: LONG UNSPECIFIED ← 0;
 rangeStop: LONG UNSPECIFIED ← 0;
 search: ObjPtr ← NIL;

 search ←
```

Copyright © 1992 Xerox Corporation All Rights Reserved

```
  SELECT type FROM free => list.free, alloc => list.alloc, ENDCASE => ERROR;
 IF search # NIL THEN {
  [rangeStart: rangeStart, rangeStop: rangeStop] ← GetRanges[search];
  IF ptr > rangeStop THEN {
   prev ← search;
   next ← search.next;
   WHILE next # NIL DO
    [rangeStart: rangeStart, rangeStop: rangeStop] ← GetRanges[next];
    IF ptr > rangeStop THEN {prev ← next; next ← next.next}
    ELSE {
     IF ptr IN [rangeStart..rangeStop] THEN {onList ← TRUE; insert ← next}
     ELSE {onList ← FALSE; insert ← prev};
     EXIT};
    REPEAT FINISHED => {onList ← FALSE; insert ← prev};
    ENDLOOP}
  ELSE {
   IF ptr IN [rangeStart..rangeStop] THEN {onList ← TRUE; insert ← search}
   ELSE {onList ← FALSE; insert ← NIL}}};
 END;

FindPages: PROCEDURE [list: TransIDPtr, type: ListType, pages: LONG CARDINAL]
 RETURNS [objPtr: ObjPtr] =
 BEGIN
 SELECT type FROM
  free => objPtr ← list.free;
  alloc => objPtr ← list.alloc;
  ENDCASE => ERROR;
 WHILE objPtr # NIL DO
  IF objPtr.pages >= pages THEN EXIT; objPtr ← objPtr.next; ENDLOOP;
 END;


GetRanges: PROCEDURE [objPtr: ObjPtr]
 RETURNS [rangeStart: LONG UNSPECIFIED, rangeStop: LONG UNSPECIFIED] =
 BEGIN
 rangeStart ← objPtr.base;
 rangeStop ← objPtr.base + (objPtr.pages * Environment.wordsPerPage) - 1;
 END;


InsertAfter: PROCEDURE [objPtr: ObjPtr, after: ObjPtr] =
 BEGIN
 objPtr.next ← after.next;
 objPtr.prev ← after;
 IF after.next # NIL THEN after.next.prev ← objPtr;
 after.next ← objPtr;
 END;


InsertHead: PROCEDURE [objPtr: ObjPtr, list: TransIDPtr, type: ListType] =
```

Copyright © 1992 Xerox Corporation All Rights Reserved

```
BEGIN
head: ObjPtr;
head ←
 SELECT type FROM free => list.free, alloc => list.alloc, ENDCASE => ERROR;
objPtr.next ← head;
IF head # NIL THEN head.prev ← objPtr;
SELECT type FROM
 free => list.free ← objPtr;
 alloc => list.alloc ← objPtr;
 ENDCASE => ERROR;
END;


OverLap: PROCEDURE [
 objPtr: ObjPtr, insert: ObjPtr, list: TransIDPtr, type: ListType]
 RETURNS [overLap: BOOLEAN] =
 BEGIN
 ckObj: ObjPtr ← NIL;
 ckStart: LONG UNSPECIFIED ← 0;
 ckStop: LONG UNSPECIFIED ← 0;
 objStart: LONG UNSPECIFIED ← 0;
 objStop: LONG UNSPECIFIED ← 0;
 IF insert = NIL THEN
  SELECT type FROM
   free => ckObj ← list.free;
   alloc => ckObj ← list.alloc;
   ENDCASE => ERROR
 ELSE ckObj ← insert.next;
 IF ckObj = NIL THEN overLap ← FALSE
 ELSE {
  [rangeStart: ckStart, rangeStop: ckStop] ← GetRanges[objPtr: ckObj];
  [rangeStart: objStart, rangeStop: objStop] ← GetRanges[objPtr: objPtr];
  overLap ← objStop >= ckStart};
 END;


Remove: PROCEDURE [
 objPtr: ObjPtr, list: TransIDPtr, type: ListType, pages: LONG CARDINAL]
 RETURNS [newObjPtr: ObjPtr] =
 BEGIN
 SELECT TRUE FROM
  objPtr.pages = pages => {
   IF objPtr.next # NIL THEN objPtr.next.prev ← objPtr.prev;
   IF objPtr.prev # NIL THEN objPtr.prev.next ← objPtr.next
   ELSE
    SELECT type FROM
     free => list.free ← objPtr.next;
     alloc => list.alloc ← objPtr.next;
     ENDCASE => ERROR;
   objPtr.next ← NIL;
```

Copyright © 1992 Xerox Corporation All Rights Reserved

```
    objPtr.prev ← NIL;
    newObjPtr ← objPtr};
   objPtr.pages > pages => {
    newObjPtr ← IIPFragMgrInternal.zone.NEW[ObjRec ← []];
    newObjPtr.base ← objPtr.base;
    newObjPtr.pages ← pages;
    objPtr.base ← objPtr.base + (pages * Environment.wordsPerPage);
    objPtr.pages ← objPtr.pages - pages};
   ENDCASE => ERROR;
  END;


 ValidPointer: PROCEDURE [list: TransIDPtr, p: LONG UNSPECIFIED]
  RETURNS [valid: BOOLEAN] =
  BEGIN
  start: LONG UNSPECIFIED;
  stop: LONG UNSPECIFIED;
  start ← list.static;
  stop ← start + (list.staticPages * Environment.wordsPerPage) - 1;
  valid ← p IN [start..stop];
  END;

 END.
```

Copyright © 1992 Xerox Corporation All Rights Reserved

```
DIRECTORY
 CoalescerControl USING [CallBackProc, StatePtr],
 CoalesceSchedJob USING [ErrorCodeType, JobPtr],
 EventHandler USING [MemoryActionCompleteProcType],
 JobID USING [ID],
 Page USING [Handle, Side],
 ResMgrIDs USING [TransactionID],
 SMCoalesceSSC USING [TaskID];

CoalesceSched: DEFINITIONS =

 BEGIN


 InstancePtr: TYPE = LONG POINTER TO Instance;

 Instance: TYPE = RECORD [
  job: CoalesceSchedJob.JobPtr,
  statePtr: CoalescerControl.StatePtr,
  command: Command,
  id: ResMgrIDs.TransactionID,
  state: StateType,
  start: BOOLEAN,
  startIt: CONDITION];

 Command: TYPE = {abort, fault, freeAndWait, none, wait, recoalesce};

 State: TYPE = {init, ready, running, shutdown};

 StateType: TYPE = RECORD [currentState: State, lastState: State];


 SSCCommand: SIGNAL [code: Command];

 heap: UNCOUNTED ZONE;


 AcquireInstance: PROCEDURE [id: ResMgrIDs.TransactionID]
  RETURNS [instance: InstancePtr];
 ReleaseInstance: PROCEDURE [instance: InstancePtr];

 CreateInstance: PROCEDURE [id: ResMgrIDs.TransactionID]
  RETURNS [instance: InstancePtr];
 DestroyInstance: PROCEDURE [id: ResMgrIDs.TransactionID]
  RETURNS [successful: BOOLEAN];

 FindResMgrID: PROCEDURE [resMgrID: ResMgrIDs.TransactionID]
  RETURNS [instance: InstancePtr];
 FindTaskID: PROCEDURE [taskID: SMCoalesceSSC.TaskID]
```

Copyright © 1992 Xerox Corporation All Rights Reserved

```
 RETURNS [instance: InstancePtr];
FindJobID: PROCEDURE [jobID: JobID.ID] RETURNS [instance: InstancePtr];

AbortJob: PROCEDURE [
 instance: InstancePtr, faultJob: BOOLEAN, switchToDiag: BOOLEAN];

CoalescerCallBack: CoalescerControl.CallBackProc;

Faulted: PROCEDURE [instance: InstancePtr] RETURNS [faulted: BOOLEAN];

FaultTask: PROCEDURE [instance: InstancePtr];

GetEndInfo: PROCEDURE [instance: InstancePtr]
 RETURNS [switchToDiag: BOOLEAN, aborted: BOOLEAN];

GetPageInfo: PROCEDURE [jobID: JobID.ID, fault: BOOLEAN]
 RETURNS [page: Page.Handle, side: Page.Side];

IncPageCount: PROCEDURE [instance: InstancePtr] RETURNS [command: Command];

NewState: PROCEDURE [instance: CoalesceSched.InstancePtr, newState: State];

NewJobProc: PROCEDURE [instance: InstancePtr];

NotifySSCReady: PROCEDURE [instance: InstancePtr] RETURNS [command: Command];

ResumeJob: PROCEDURE [instance: InstancePtr];

RollSystem: PROCEDURE [jobID: JobID.ID, faultNumber: CARDINAL];

SetBackSide: PROCEDURE [instance: InstancePtr];

SetFrontSide: PROCEDURE [instance: InstancePtr, page: Page.Handle];

SetJob: PROCEDURE [instance: InstancePtr, jobPtr: CoalesceSchedJob.JobPtr];

SetFatalError: PROCEDURE [
 jobID: JobID.ID, error: CoalesceSchedJob.ErrorCodeType];

StartNewJob: PROCEDURE [instance: InstancePtr];

StopJob: PROCEDURE [
 id: ResMgrIDs.TransactionID, proc: EventHandler.MemoryActionCompleteProcType];

WaitForNewJob: PROCEDURE [instance: InstancePtr];

END.
```

Copyright © 1992 Xerox Corporation All Rights Reserved

```
CoalesceSchedBucket: DEFINITIONS =

 BEGIN
 dryUp: CARDINAL = 4601;

 fatalSWErrorReboot: CARDINAL = 4600;
 fatalSWErrorInCoalescer: CARDINAL = 2000;
 fatalSWErrorInSched: CARDINAL = 1800;

 functionFault: CARDINAL = 4602;

 END.
```

Copyright © 1992 Xerox Corporation All Rights Reserved

```
DIRECTORY
 EventHandler USING [MemoryActionCompleteProcType],
 JobID USING [ID, nullID],
 JobFault USING [FaultList],
 JobStep USING [nullStepHandle, StepHandle],
 JobQ USING [JobReference, nullJobReference],
 Page USING [Handle, nullHandle, Side],
 ServCoalesce USING [ParmsHandle],
 StreamScheduler USING [Handle, nullHandle];

CoalesceSchedJob: DEFINITIONS =

 BEGIN

 AbortStepType: TYPE = {unset, setAborted, setFaulted};

 ErrorCodeType: TYPE = {diskFull, fault, jobCorrupted, other, roll};

 JobPtr: TYPE = LONG POINTER TO Job;

 Job: TYPE = RECORD [
  aborted: BOOLEAN ← FALSE,
  abortStep: AbortStepType ← unset,
  error: BOOLEAN ← FALSE,
  errorCode: ErrorCodeType ← other,
  faultJob: BOOLEAN ← FALSE,
  fontSub: BOOLEAN ← FALSE,
  streamOn: BOOLEAN ← FALSE,
  switchToDiag: BOOLEAN ← FALSE,
  waiting: BOOLEAN ← FALSE,
  copyCount: CARDINAL ← 0,
  faults: JobFault.FaultList ← DESCRIPTOR[NIL, 0],
  jobID: JobID.ID ← JobID.nullID,
  jobQReference: JobQ.JobReference ← JobQ.nullJobReference,
  page: Page.Handle ← Page.nullHandle,
  pageCount: CARDINAL ← 0,
  parms: ServCoalesce.ParmsHandle ← NIL,
  shutdownProc: EventHandler.MemoryActionCompleteProcType ← NIL,
  side: Page.Side ← back,
  stepHandle: JobStep.StepHandle ← JobStep.nullStepHandle,
  streamHandle: StreamScheduler.Handle ← StreamScheduler.nullHandle];

 END.
```

Copyright © 1992 Xerox Corporation All Rights Reserved

```
CoalesceSchedObject: DEFINITIONS =

 BEGIN

 fontNameNotFound: CARDINAL = 1303;
 fontSubstituted: CARDINAL = 1305;
 fontSubstitutionFailed1: CARDINAL = 1306;
 fontSubstitutionFailed2: CARDINAL = 1307;
 fullFormRaster: CARDINAL = 1308;
 fontNotFound: CARDINAL = 1310;
 fontSubstitutionTableError: CARDINAL = 1329;
 illegalFormFont: CARDINAL = 1313;
 irsTooBig: CARDINAL = 1330;
 irsWrongType: CARDINAL = 1331;
 otherFormRaster: CARDINAL = 1318;
 scaleApproximated: CARDINAL = 1328;
 unImplementedObjectEntryType: CARDINAL = 1319;
 unknownFormFont: CARDINAL = 1320;
 unknownFormRaster: CARDINAL = 1321;
 zeroAorEonZeroBandD: CARDINAL = 1323;
 zeroBorDonZeroAandE: CARDINAL = 1324;

 coalescerTableError: CARDINAL = 1300;
 dbError: CARDINAL = 1325;
 rasterDSError: CARDINAL = 1309;
 icsFaulted: CARDINAL = 1312;
 imageError: CARDINAL = 1326;
 jobQError: CARDINAL = 1316;
 nullRasterID: CARDINAL = 1317;
 pageError: CARDINAL = 1327;
 unknownObjectEntryType: CARDINAL = 1322;
 resourceFault: CARDINAL = 1332;
 realException: CARDINAL = 1333;

 FECoalesceError: CARDINAL = 1301;
 fontDSError: CARDINAL = 1302;
 genericSWError: CARDINAL = 1311;
 invalidState: CARDINAL = 1315;

 invalidFontEntry: CARDINAL = 1314;

 switchToDiag: CARDINAL = 1334;

 genericAbort: CARDINAL = 1335;

 END.
```

Copyright © 1992 Xerox Corporation All Rights Reserved

```
DIRECTORY
 CoalescerControl USING [Create, Init],
 CoalesceSched USING [
  AcquireInstance, CoalescerCallBack, CreateInstance, InstancePtr, NewJobProc,
  NewState, ReleaseInstance, SetJob, StartNewJob],
 CoalesceSchedJob USING [Job, JobPtr],
 DBError USING [OperationFailed],
 EventHandler USING [Error, ErrorCode, ReportStateChange],
 EventLogger USING [Log],
 FeatureStatusDefaults USING [GetFontSubstitutionEnabled],
 Heap USING [systemZone],
 JobBackUp USING [LockID],
 JobID USING [ID, nullID],
 JobQ USING [
  Error, JobReference, LockJob, nullJobReference, ReferenceJob, UnlockJob,
  BackUpJob],
 JobStep USING [Error, GetNextJob, GetRootStep, RootStep, StatusPut, StepHandle],
 PrintTTY USING [LogEvent],
 Process USING [Detach],
 ResMgrIDs USING [TransactionID],
 ServCoalesce USING [coalesceStep],
 SMCoalesceSSC USING [],
 SMPreParse USING [Dereference, GetReference],
 SMStep USING [GetStepParms],
 StreamScheduler USING [Error, GetHandle],
 System USING [switches],
 TopLevel USING [WaitAllUp];

CoalesceSchedImplA: MONITOR
 IMPORTS
  CoalescerControl, CoalesceSched, DBError, EventHandler, EventLogger,
  FeatureStatusDefaults, Heap, JobQ, JobStep, PrintTTY, Process, SMPreParse,
  SMStep, StreamScheduler, System, TopLevel
 EXPORTS SMCoalesceSSC, CoalesceSched =

 BEGIN


 heap: PUBLIC UNCOUNTED ZONE ← NIL;


 GetNewTask: PUBLIC ENTRY PROCEDURE [] =

  BEGIN
  ENABLE UNWIND => NULL;
  instPtr: CoalesceSched.InstancePtr ← NIL;

  instPtr ← CoalesceSched.AcquireInstance[coalesceJob];
  IF instPtr # NIL THEN
```

Copyright © 1992 Xerox Corporation All Rights Reserved

```
  BEGIN
  jobPtr: CoalesceSchedJob.JobPtr ← NIL;
  jobID: JobID.ID;

  jobID ← JobStep.GetNextJob[
   stepType: ServCoalesce.coalesceStep, transaction: instPtr.id,
   skipRunningJobs: TRUE !
   JobStep.Error => {
    CoalesceSched.ReleaseInstance[instPtr];
    SIGNAL EventHandler.Error[noJobAccepted]}; ];

  EventLogger.Log[event: 553];
  jobPtr ← BuildJob[jobID, instPtr.id];

  IF jobPtr # NIL THEN {
   CoalesceSched.SetJob[instPtr, jobPtr]; CreateCoalescer[instPtr]; }
  ELSE {
   CoalesceSched.ReleaseInstance[instPtr];
   SIGNAL EventHandler.Error[noJobAccepted];
   };

  END
 ELSE SIGNAL EventHandler.Error[noJobAccepted];

 END;

Init: PUBLIC PROCEDURE [] =

 BEGIN
 heap ← Heap.systemZone;



 Process.Detach[FORK WaitForAllUp[]];
 END;


BuildJob: PROCEDURE [jobID: JobID.ID, id: ResMgrIDs.TransactionID]
 RETURNS [jobPtr: CoalesceSchedJob.JobPtr ← NIL] =
 BEGIN
 lockID: JobBackUp.LockID;
 rootStep: JobStep.RootStep;
 jobReference: JobQ.JobReference ← JobQ.nullJobReference;

 jobReference ← SMPreParse.GetReference[jobID];
 IF jobReference = JobQ.nullJobReference THEN
  jobReference ← JobQ.ReferenceJob[
   jobID: jobID ! JobQ.Error, DBError.OperationFailed => GOTO Failed];

 lockID ← JobQ.LockJob[
```

Copyright © 1992 Xerox Corporation All Rights Reserved

```
  job: jobReference, jobID: jobID, readOnly: FALSE !
  JobQ.Error, DBError.OperationFailed = > {
   SMPreParse.Dereference[jobID, jobReference]; GOTO Failed}];

 rootStep ← JobStep.GetRootStep[
  lockID: lockID, stepType: ServCoalesce.coalesceStep, transaction: id !
  JobStep.Error, DBError.OperationFailed = > {
   JobQ.UnlockJob[lockID: lockID];
   SMPreParse.Dereference[jobID, jobReference];
   GOTO Failed}];

 JobStep.StatusPut[
  lockID, running, rootStep.stepHandle !
  JobStep.Error, DBError.OperationFailed = >
   BEGIN
   JobQ.UnlockJob[lockID: lockID];
   SMPreParse.Dereference[jobID, jobReference];
   GOTO Failed;
   END; ];

 JobQ.BackUpJob[lockID: lockID];

 jobPtr ← heap.NEW[CoalesceSchedJob.Job];
 jobPtr.jobID ← jobID;
 jobPtr.jobQReference ← jobReference;
 jobPtr.stepHandle ← rootStep.stepHandle;

 jobPtr.parms ← SMStep.GetStepParms[
  lockID: lockID, stepRecord: rootStep.jobStep.stepRecord];
 IF jobPtr.parms.fontList # NIL AND jobPtr.parms.fontList.LENGTH > 0 THEN
  jobPtr.fontSub ← TRUE;

 IF System.switches['C] = up THEN
  BEGIN
  jobPtr.streamOn ← TRUE;
  jobPtr.streamHandle ← StreamScheduler.GetHandle[
   lockID: lockID, jobID: jobID, step: rootStep.stepHandle !
   StreamScheduler.Error = >
    BEGIN
    JobQ.UnlockJob[lockID: lockID];
    SMPreParse.Dereference[jobID, jobReference];
    heap.FREE[@jobPtr];
    jobPtr ← NIL;
    GOTO Failed;
    END; ];
  END;

 JobQ.UnlockJob[lockID: lockID];

 EXITS Failed = > NULL;
```

Copyright © 1992 Xerox Corporation All Rights Reserved

```
END;

CreateCoalescer: PROCEDURE [instPtr: CoalesceSched.InstancePtr] =
 BEGIN

 instPtr.job.fontSub ← FeatureStatusDefaults.GetFontSubstitutionEnabled[];

 PrintTTY.LogEvent[
  sched: coalesce, event: jobAccepted, id: instPtr.job.jobID,
  transID: instPtr.id];

 EventHandler.ReportStateChange[
  id: [trans: instPtr.id, module: coalesce],
  data: [
  state: running,
  jobInfo: [
  jobID: instPtr.job.jobID, jobChange: add, priority: medium,
  jobSize: instPtr.job.copyCount, state: running], resume: none,
  faultList: [NIL, NIL, NIL, NIL]]];

 CoalescerControl.Create[
  jobID: instPtr.job.jobID, jobRef: instPtr.job.jobQReference,
  fontSubList: instPtr.job.parms.fontList,
  fontSubstitution: instPtr.job.fontSub, statePtr: instPtr.statePtr];

 CoalesceSched.StartNewJob[instPtr];

 END;

WaitForAllUp: PROCEDURE [] =
 BEGIN
 inst: CoalesceSched.InstancePtr ← NIL;

 TopLevel.WaitAllUp[];

 EventHandler.ReportStateChange[
  id: [trans: coalesceJob, module: coalesce],
  data: [
  state: notReady, jobInfo: [JobID.nullID, add, medium, 0, running],
  resume: none, faultList: [NIL, NIL, NIL, NIL]]];

 inst ← CoalesceSched.CreateInstance[id: coalesceJob];
 Process.Detach[FORK CoalesceSched.NewJobProc[inst]];

 inst.statePtr ← CoalescerControl.Init[
  context: inst, callBack: CoalesceSched.CoalescerCallBack];

 CoalesceSched.NewState[inst, ready];
 EventHandler.ReportStateChange[
```

Copyright © 1992 Xerox Corporation All Rights Reserved

```
  id: [trans: coalesceJob, module: coalesce],
  data: [
  state: ready, jobInfo: [JobID.nullID, add, medium, 0, running],
  resume: none, faultList: [NIL, NIL, NIL, NIL]]];
 END;

END.
```

Copyright © 1992 Xerox Corporation All Rights Reserved

```
DIRECTORY
 CoalescerControl USING [Create, Coalesce, Init, StatePtr],
 CoalesceSched USING [
  AbortJob, Command, CoalescerCallBack, Faulted, FindResMgrID, GetEndInfo,
  FindTaskID, IncPageCount, InstancePtr, NotifySSCReady, ReleaseInstance,
  ResumeJob, SetBackSide, SetFrontSide, StopJob, WaitForNewJob],
 CoalesceSchedBucket USING [dryUp],
 DBError USING [OperationFailed],
 EventHandler USING [
  FaultPointer, MemoryActionCompleteProcType, ReportFaultChange,
  ReportStateChange],
 EventLogger USING [Log],
 Image USING [Handle, nullHandle],
 JobBackUp USING [LockID, nullLockID],
 JobID USING [ID, nullID],
 JobStep USING [Status, StatusPut],
 JobQ USING [BackUpJob, Error, JobReference, LockJob, UnlockJob],
 NetworkLog USING [UpdateStatus],
 NodeHandler USING [RequestFaultNode],
 Page USING [
  Error, GetBackImage, GetFirst, GetFrontImage, GetNext, GetPlex, Handle,
  nullHandle, PageListIncomplete],
 PrintTTY USING [LogEvent],
 PublicPrinting USING [Plex],
 ResMgrIDs USING [TransactionID],
 SMCoalesceSSC USING [ErrorCode, TaskID],
 SMPreParse USING [Dereference],
 StreamScheduler USING [MonitorService, StepComplete];

CoalesceSchedImplB: PROGRAM
 IMPORTS
  CoalescerControl, CoalesceSched, DBError, EventHandler, EventLogger, JobStep,
  JobQ, NetworkLog, NodeHandler, Page, PrintTTY, SMPreParse, StreamScheduler
 EXPORTS CoalesceSched, SMCoalesceSSC =

 BEGIN


 Error: PUBLIC SIGNAL [code: SMCoalesceSSC.ErrorCode] = CODE;

 SSCCommand: PUBLIC SIGNAL [code: CoalesceSched.Command] = CODE;


 EnterDegradedMode: PUBLIC PROCEDURE [] = BEGIN ENABLE UNWIND => NULL; END;

 ExitDegradedMode: PUBLIC PROCEDURE [] = BEGIN ENABLE UNWIND => NULL; END;

 Shutdown: PUBLIC PROCEDURE [
```

Copyright © 1992 Xerox Corporation All Rights Reserved

```
 id: ResMgrIDs.TransactionID,
 proc: EventHandler.MemoryActionCompleteProcType] =
 BEGIN
 ENABLE UNWIND => NULL;

 CoalesceSched.StopJob[id, proc]
 END;

Abort: PUBLIC PROCEDURE [
 task: SMCoalesceSSC.TaskID, faultJob: BOOLEAN ← FALSE,
 switchToDiag: BOOLEAN ← FALSE] =

 BEGIN
 instPtr: CoalesceSched.InstancePtr;

 instPtr ← CoalesceSched.FindTaskID[task];

 IF instPtr = NIL THEN SIGNAL Error[taskNotFound];

 PrintTTY.LogEvent[
  sched: coalesce, event: abort, id: instPtr.job.jobID, transID: instPtr.id];

 CoalesceSched.AbortJob[
  instance: instPtr, faultJob: faultJob, switchToDiag: switchToDiag];

 END;

NewJobProc: PUBLIC PROCEDURE [instance: CoalesceSched.InstancePtr] =

 BEGIN

 DO
  CoalesceSched.WaitForNewJob[instance];

  BEGIN
  jobReference: JobQ.JobReference ← instance.job.jobQReference;
  jobID: JobID.ID ← instance.job.jobID;
  firstPage: BOOLEAN ← TRUE;
  transID: ResMgrIDs.TransactionID ← instance.id;
  plex: PublicPrinting.Plex ← simplex;
  page: Page.Handle ← Page.nullHandle;
  statePtr: CoalescerControl.StatePtr ← instance.statePtr;
  lockID: JobBackUp.LockID ← JobBackUp.nullLockID;

  BEGIN
  WHILE (firstPage OR page # Page.nullHandle) DO
   ENABLE
    BEGIN
    JobQ.Error => {
     IF lockID # JobBackUp.nullLockID THEN JobQ.UnlockJob[lockID: lockID];
```

Copyright © 1992 Xerox Corporation All Rights Reserved

```
   CoalesceSched.CoalescerCallBack[
    context: instance, problem: [jobQError[code]]];
   EndJob[faulted, instance, statePtr];
   PrintTTY.LogEvent[
    sched: coalesce, event: faulted, id: jobID, transID: transID];
   GOTO exit};
  DBError.OperationFailed => {
   IF lockID # JobBackUp.nullLockID THEN JobQ.UnlockJob[lockID: lockID];
   CoalesceSched.CoalescerCallBack[
    context: instance, problem: [dbError[code]]];
   EndJob[faulted, instance, statePtr];
   PrintTTY.LogEvent[
    sched: coalesce, event: faulted, id: jobID, transID: transID];
   GOTO exit};
  SSCCommand =>
   SELECT code FROM
    abort => {
     EndJob[aborted, instance, statePtr];
     PrintTTY.LogEvent[
      sched: coalesce, event: aborted, id: jobID, transID: transID];
     GOTO exit};
    fault => {
     EndJob[faulted, instance, statePtr];
     PrintTTY.LogEvent[
      sched: coalesce, event: faulted, id: jobID, transID: transID];
     GOTO exit};
    ENDCASE;
  END;

 SELECT CoalesceSched.IncPageCount[instance: instance] FROM
  abort => SIGNAL SSCCommand[abort];
  fault => SIGNAL SSCCommand[fault];
  recoalesce => ReDoLastPage[instance];
  ENDCASE;

 IF firstPage THEN
  BEGIN
  [page, plex] ← DoFirstSide[jobReference, statePtr, jobID, instance];
  firstPage ← FALSE;
  END
 ELSE
  [page, plex] ← DoFrontSide[
   jobReference, statePtr, page, jobID, instance];

 IF plex # simplex THEN
  DoBackSide[jobReference, statePtr, page, jobID, instance];

 lockID ← JobQ.LockJob[job: jobReference, jobID: jobID, readOnly: FALSE];
 JobQ.BackUpJob[lockID: lockID];
 JobQ.UnlockJob[lockID: lockID];
```

Copyright © 1992 Xerox Corporation All Rights Reserved

```
DIRECTORY
 DecomposerCommon USING [CopyRange, ID, OrientedImagingProps],
 DirectoryID USING [ObjectID],
 FaultLogger,
 IIPFragmentDS USING [Error],
 IIPFragMgrPrivate USING [SendFrag],
 IIPGen USING [defaultMedia, Error, LockProc],
 IIPGenCallBack USING [ReportProblem],
 IIPGenInternal USING [AddBlockToQ, Object, PutToken, z],
 IIPGenTypes,
 IIPReportGen USING [PutNumber, SetXY],
 Image USING [
  black, Box, EnumerateProc, EnumerateSingleObjectsFirstToLast,
  GetIpFragmentAttributes, GetObjectData, GetObjectType, GetRasterAttributes,
  Handle, nullHandle, ObjectData, ObjectType, white],
 InternalIP USING [CoalesceResultsEntry, ColorRange, Token, TokenType],
 JobBackUp USING [LockID],
 JobQ USING [UnlockJob],
 PageNumTypes USING [PageNumPos, SelectPageNum],
 PublicPrinting USING [black, Plex],
 RasterDirectorySupervisor USING [
  Error, GetRESInfoPtr, ID, nullID, ReleaseRESInfoPtr],
 RasterObjects USING [RESInfoPointer],
 Real USING [FixI],
 ResMgr USING [Error],
 SignatureUtility USING [SignatureSidePtr];

IIPGenImplB: PROGRAM
 IMPORTS
  IIPFragmentDS, IIPFragMgrPrivate, IIPGen, IIPGenCallBack, IIPGenInternal,
  Image, IIPReportGen, JobQ, RasterDirectorySupervisor, Real, ResMgr
 EXPORTS IIPGen, IIPGenTypes =
 BEGIN


 Handle: TYPE = LONG POINTER TO Object ← NIL;
 Object: PUBLIC TYPE = IIPGenInternal.Object;

 ImageListHandle: TYPE = LONG POINTER TO ImageListObject ← NIL;
 ImageListObject: TYPE = RECORD [
  iH: Image.Handle ← Image.nullHandle,
  next: ImageListHandle ← NIL,
  overlapped: BOOLEAN ← FALSE,
  priority: BOOLEAN ← FALSE,
  ip: BOOLEAN ← TRUE,
  data: Image.ObjectData];

 ImageListData: TYPE = RECORD [
  imageList: ImageListHandle ← NIL,
```

Copyright © 1992 Xerox Corporation All Rights Reserved

```
 type: Image.ObjectType ← TRASH,
 special: BOOLEAN ← FALSE];

EncodeSide: PUBLIC PROCEDURE [
 iipH: Handle, iH: Image.Handle, lockID: JobBackUp.LockID,
 plex: PublicPrinting.Plex, sheet: LONG CARDINAL,
 mediaIndex: CARDINAL ← IIPGen.defaultMedia, relock: IIPGen.LockProc,
 headToToe: BOOLEAN, selectPageNum: PageNumTypes.SelectPageNum,
 pageID: DecomposerCommon.ID, simplifiedPage: BOOLEAN ← FALSE,
 copyRange: DecomposerCommon.CopyRange] =
 BEGIN
 ENABLE UNWIND => {iipH.jobLocked ← FALSE};

 beginPage: beginPage InternalIP.Token;
 endPage: endPage InternalIP.Token;
 imageListData: ImageListData ← [];
 currentImagingProps: DecomposerCommon.OrientedImagingProps;

 iipH.jobLocked ← TRUE;
 endPage ← [var: endPage[]];
 currentImagingProps ← iipH.propsDesc[mediaIndex];
 IF iipH = NIL THEN ERROR IIPGen.Error[invalidIIPHandle];

 iipH.plex ← plex;
 iipH.sheet ← sheet;
 iipH.mediaIndex ← mediaIndex;
 iipH.pageID ← pageID;
 iipH.lockID ← lockID;
 iipH.relock ← relock;
 iipH.color ← Image.black;
 iipH.rotate180 ← FALSE;

 imageListData ← BuildImageListData[iipH: iipH, iH: iH];

 beginPage ← [
  var: beginPage[
  rec: [
  sheetData: [
  pageID: pageID, sheet: sheet,
  plate: [color: PublicPrinting.black, plex: plex], copyRange: copyRange,
  sheetCopies: iipH.copyCount, mediaIndex: mediaIndex, complex: FALSE,
  simplifiedPage: simplifiedPage], imagingProps: currentImagingProps,
  special: imageListData.special]]];
 IIPGenInternal.PutToken[
  iipH: iipH, token: @beginPage, size: SIZE[beginPage InternalIP.Token]];

 IF headToToe AND plex = duplex THEN {
  tTranslate: tTranslate InternalIP.Token ← [
```

Copyright © 1992 Xerox Corporation All Rights Reserved

```
    IF code = nilPageHandle THEN
      BEGIN JobQ.UnlockJob[lockID: lockID]; GOTO badPage; END; ];

  JobQ.UnlockJob[lockID: lockID];
  IF image = Image.nullHandle THEN GOTO noFrontImage;

  CoalesceSched.SetFrontSide[inst, page];
  CoalescerControl.Coalesce[statePtr: statePtr, pageImage: image];

  EXITS badPage, endOfJob, noFrontImage => NULL;
  END;

DoFrontSide: PROCEDURE [
  jobRef: JobQ.JobReference, statePtr: CoalescerControl.StatePtr,
  lastPage: Page.Handle, jobID: JobID.ID, inst: CoalesceSched.InstancePtr]
  RETURNS [page: Page.Handle, plex: PublicPrinting.Plex] =
  BEGIN
  image: Image.Handle;
  lockID: JobBackUp.LockID;

  IF inst.job.error THEN SIGNAL SSCCommand[fault];

  lockID ← JobQ.LockJob[job: jobRef, jobID: jobID, readOnly: TRUE];

  page ← Page.GetNext[
   target: lastPage, lockID: lockID, raisePageListIncomplete: TRUE !
   Page.Error =>
    IF code = nilPageHandle THEN
     BEGIN JobQ.UnlockJob[lockID: lockID]; GOTO badPage; END;
   Page.PageListIncomplete =>
    SELECT DryUp[inst, lockID] FROM
     none => {
      lockID ← JobQ.LockJob[job: jobRef, jobID: jobID, readOnly: TRUE];
      RETRY};
     abort => GOTO abortJob;
     fault => GOTO faultJob;
     recoalesce => {
      ReDoLastPage[inst];
      lockID ← JobQ.LockJob[job: jobRef, jobID: jobID, readOnly: TRUE];
      RETRY};
     ENDCASE; ];

  IF page = Page.nullHandle THEN
   BEGIN JobQ.UnlockJob[lockID: lockID]; plex ← simplex; GOTO endOfJob; END;

  plex ← Page.GetPlex[
   lockID: lockID, page: page !
   Page.Error =>
    IF code = nilPageHandle THEN
     BEGIN JobQ.UnlockJob[lockID: lockID]; GOTO badPage; END; ];
```

Copyright © 1992 Xerox Corporation All Rights Reserved

```
image ← Page.GetFrontImage[
 page: page, lockID: lockID !
 Page.Error = >
  IF code = nilPageHandle THEN
   BEGIN JobQ.UnlockJob[lockID: lockID]; GOTO badPage; END; ];

JobQ.UnlockJob[lockID: lockID];
IF image = Image.nullHandle THEN GOTO noFrontImage;

CoalesceSched.SetFrontSide[inst, page];
CoalescerControl.Coalesce[statePtr: statePtr, pageImage: image];

EXITS
 badPage,
 endOfJob,
 noFrontImage = > NULL;
 abortJob = > SIGNAL SSCCommand[abort];
 faultJob = > SIGNAL SSCCommand[fault];
END;

DryUp: PROCEDURE [inst: CoalesceSched.InstancePtr, lockID: JobBackUp.LockID]
 RETURNS [command: CoalesceSched.Command] =
 BEGIN
 ptr: EventHandler.FaultPointer;

 JobQ.UnlockJob[lockID: lockID];

 ptr ← NodeHandler.RequestFaultNode[number: 1];

 ptr.record ← [
  faultBucket: CoalesceSchedBucket.dryUp, priority: information, mask: FALSE,
  sense: 0, zone: 0, uniqueID: NIL, jobID: JobID.nullID];

 EventHandler.ReportFaultChange[
  id: [trans: inst.id, module: coalesce],
  faultList: [adds: NIL, deletes: NIL, changes: NIL, notifies: ptr]];

 lockID ← JobQ.LockJob[
  job: inst.job.jobQReference, jobID: inst.job.jobID, readOnly: FALSE];

 JobStep.StatusPut[
  lockID: lockID, status: runningWaiting, stepHandle: inst.job.stepHandle];

 StreamScheduler.MonitorService[lockID: lockID, handle: inst.job.streamHandle];
 JobQ.UnlockJob[lockID: lockID];

 PrintTTY.LogEvent[
  sched: coalesce, event: dryUp, id: inst.job.jobID, transID: inst.id];
```

Copyright © 1992 Xerox Corporation All Rights Reserved

```
EventHandler.ReportStateChange[
 id: [trans: inst.id, module: coalesce],
 data: [
 state: notReady, jobInfo: [JobID.nullID, add, medium, 0, running],
 resume: none, faultList: [NIL, NIL, NIL, NIL]]];

command ← CoalesceSched.NotifySSCReady[inst];
END;

ReDoLastPage: PROCEDURE [instance: CoalesceSched.InstancePtr] =

BEGIN
image: Image.Handle;
lockID: JobBackUp.LockID ← JobBackUp.nullLockID;

BEGIN
ENABLE
 Page.Error = >
  IF code = nilPageHandle THEN
   BEGIN JobQ.UnlockJob[lockID: lockID]; CONTINUE; END;

instance.statePtr ← CoalescerControl.Init[
 context: instance, callBack: CoalesceSched.CoalescerCallBack];
[] ← CoalescerControl.Create[
 jobID: instance.job.jobID, jobRef: instance.job.jobQReference,
 fontSubList: instance.job.parms.fontList,
 fontSubstitution: instance.job.fontSub, statePtr: instance.statePtr];

IF instance.job.page # Page.nullHandle THEN
 BEGIN
 lockID ← JobQ.LockJob[
  job: instance.job.jobQReference, jobID: instance.job.jobID,
  readOnly: TRUE];
 image ←
  IF instance.job.side = front THEN Page.GetFrontImage[
  page: instance.job.page, lockID: lockID]
  ELSE Page.GetBackImage[page: instance.job.page, lockID: lockID];
 CoalescerControl.Coalesce[statePtr: instance.statePtr, pageImage: image];
 JobQ.UnlockJob[lockID: lockID];
 END;

IF instance.job.error THEN SIGNAL SSCCommand[fault];

END;
END;


EndJob: PROCEDURE [
 endingStatus: JobStep.Status, instance: CoalesceSched.InstancePtr,
 statePtr: CoalescerControl.StatePtr] =
```

Copyright © 1992 Xerox Corporation All Rights Reserved

```
BEGIN
lockID: JobBackUp.LockID;
aborted: BOOLEAN ← FALSE;
switchToDiag: BOOLEAN ← FALSE;

[switchToDiag, aborted] ← CoalesceSched.GetEndInfo[instance];
IF switchToDiag THEN
 CoalesceSched.CoalescerCallBack[
  context: instance, problem: [switchToDiag[]]]
ELSE
 IF aborted THEN
  CoalesceSched.CoalescerCallBack[
   context: instance, problem: [genericAbort[]]];

IF endingStatus = faulted THEN
 NetworkLog.UpdateStatus[
  jobID: instance.job.jobID, update: jobStatus, messageStatus: noMessage,
  jobStatus: faulted];

lockID ← JobQ.LockJob[
 job: instance.job.jobQReference, jobID: instance.job.jobID, readOnly: FALSE
 ! JobQ.Error, DBError.OperationFailed = > CONTINUE];

JobStep.StatusPut[
 lockID: lockID, status: endingStatus, stepHandle: instance.job.stepHandle !
 DBError.OperationFailed = > CONTINUE];

IF instance.job.streamOn THEN
 StreamScheduler.StepComplete[
  lockID: lockID, handlePtr: @instance.job.streamHandle,
  faulted: IF endingStatus = done THEN FALSE ELSE TRUE];

JobQ.BackUpJob[lockID: lockID];
JobQ.UnlockJob[lockID: lockID];
SMPreParse.Dereference[
 instance.job.jobID, instance.job.jobQReference !
 JobQ.Error, DBError.OperationFailed = > CONTINUE];


EventHandler.ReportStateChange[
 id: [trans: instance.id, module: coalesce],
 data: [
 state: notReady,
 jobInfo: [
 jobID: instance.job.jobID, jobChange: delete, priority: medium, jobSize: 0,
 state: running], resume: none, faultList: [NIL, NIL, NIL, NIL]]];

CoalesceSched.ReleaseInstance[instance];
```

Copyright © 1992 Xerox Corporation All Rights Reserved

```
  EventHandler.ReportStateChange[
   id: [trans: instance.id, module: coalesce],
   data: [
   state: ready, jobInfo: [JobID.nullID, add, medium, 0, running],
   resume: none, faultList: [NIL, NIL, NIL, NIL]]];
  EventLogger.Log[event: 554];
  END;

END.
```

Copyright © 1992 Xerox Corporation All Rights Reserved

```
DIRECTORY
 CoalescerControl USING [CallBackProc, ProblemType],
 CoalesceSched USING [InstancePtr, SetFatalError],
 CoalesceSchedBucket USING [fatalSWErrorReboot, functionFault],
 CoalesceSchedObject,
 DBError USING [ErrorCode],
 DirectoryID USING [ObjectID],
 EventHandler USING [FaultPointer, LoggerPointer, ReportFaultChange],
 FaultLogger USING [ID, Log, nullLogID, SubSystem, SWModule],
 JobBackUp USING [LockID, nullLockID],
 JobFault USING [Add, AddWarning, SeverityType],
 JobID USING [ID],
 JobQ USING [LockJob, UnlockJob],
 NodeHandler USING [RequestFaultNode, RequestUniqueID],
 Page USING [nullHandle],
 SMCoalesceSSC USING [],
 SMPreParse USING [LogFault],
 SSCRollover USING [WaitForRoll];


CoalesceSchedImplC: PROGRAM
 IMPORTS
  CoalesceSched, EventHandler, FaultLogger, JobFault, JobQ, NodeHandler,
  SMPreParse, SSCRollover
 EXPORTS CoalesceSched, SMCoalesceSSC =

 BEGIN


 CoalescerCallBack: PUBLIC CoalescerControl.CallBackProc =

  BEGIN
  lockID: JobBackUp.LockID ← JobBackUp.nullLockID;

  BEGIN
  ENABLE UNWIND => IF lockID # JobBackUp.nullLockID THEN JobQ.UnlockJob[lockID];

  faultNum: CARDINAL ← 0;
  uniqueID: FaultLogger.ID ← FaultLogger.nullLogID;
  severity: JobFault.SeverityType ← appearanceError;
  card1: CARDINAL ← 0;
  card2: CARDINAL ← 0;
  card3: CARDINAL ← 0;
  string1: LONG STRING ← NIL;
  string2: LONG STRING ← NIL;
  real: REAL ← 0.0;
  redetectable: BOOLEAN ← FALSE;
  operatorClearable: BOOLEAN ← FALSE;
```

Copyright © 1992 Xerox Corporation All Rights Reserved

```
warning: BOOLEAN ← FALSE;
functionFault: BOOLEAN ← FALSE;
instance: CoalesceSched.InstancePtr ← LOOPHOLE[context];

IF instance = NIL THEN RETURN;

WITH problem SELECT FROM
 coalescerTableError =>
  BEGIN
  functionFault ← TRUE;
  instance.job.faultJob ← TRUE;
  faultNum ← CoalesceSchedObject.coalescerTableError;
  severity ← systemError;
  card1 ← ORD[code];
  END;

 FECoalesceError =>
  BEGIN
  instance.job.faultJob ← TRUE;
  faultNum ← CoalesceSchedObject.FECoalesceError;
  severity ← systemError;
  card1 ← ORD[code];
  END;

 fontDSError =>
  BEGIN
  functionFault ← TRUE;
  instance.job.faultJob ← TRUE;
  faultNum ← CoalesceSchedObject.fontDSError;
  severity ← systemError;
  string1 ← name;
  card1 ← ORD[code];
  END;

 fontNameNotFound =>
  BEGIN
  instance.job.faultJob ← TRUE;
  operatorClearable ← TRUE;
  faultNum ← CoalesceSchedObject.fontNameNotFound;
  severity ← appearanceError;
  string1 ← name;
  END;

 fontSubstituted =>
  BEGIN
  tempFontID: ARRAY [0..SIZE[DirectoryID.ObjectID]) OF CARDINAL;
  tempFontID ← LOOPHOLE[newFontID.fontDir];
  warning ← TRUE;
  faultNum ← CoalesceSchedObject.fontSubstituted;
  severity ← appearanceWarning;
```

Copyright © 1992 Xerox Corporation All Rights Reserved

```
 string1 ← newName;
 string2 ← oldName;
 card1 ← tempFontID[0];
 card2 ← tempFontID[1];
 card3 ← tempFontID[2];
 END;

fontSubstitutionFailed1 = >
 BEGIN
 instance.job.faultJob ← TRUE;
 operatorClearable ← TRUE;
 faultNum ← CoalesceSchedObject.fontSubstitutionFailed1;
 severity ← appearanceError;
 string1 ← name;
 END;

fontSubstitutionFailed2 = >
 BEGIN
 instance.job.faultJob ← TRUE;
 operatorClearable ← TRUE;
 faultNum ← CoalesceSchedObject.fontSubstitutionFailed2;
 severity ← appearanceError;
 string1 ← name;
 END;

fullFormRaster = >
 BEGIN
 instance.job.faultJob ← TRUE;
 faultNum ← CoalesceSchedObject.fullFormRaster;
 severity ← systemError;
 END;

rasterDSError = >
 BEGIN
 functionFault ← TRUE;
 instance.job.faultJob ← TRUE;
 faultNum ← CoalesceSchedObject.rasterDSError;
 card1 ← fault;
 card2 ← code;
 severity ← systemError;
 uniqueID ← faultID;
 END;

fontNotFound = >
 BEGIN
 instance.job.faultJob ← TRUE;
 faultNum ← CoalesceSchedObject.fontNotFound;
 severity ← appearanceError;
 string1 ← name;
 END;
```

Copyright © 1992 Xerox Corporation All Rights Reserved

```
genericSWError =>
 BEGIN
 instance.job.faultJob ← TRUE;
 faultNum ← CoalesceSchedObject.genericSWError;
 severity ← systemError;
 card1 ← code;
 END;

icsFaulted =>
 BEGIN
 instance.job.faultJob ← TRUE;
 faultNum ← CoalesceSchedObject.icsFaulted;
 severity ← systemError;
 END;

illegalFormFont =>
 BEGIN
 instance.job.faultJob ← TRUE;
 faultNum ← CoalesceSchedObject.illegalFormFont;
 severity ← masterError;
 string1 ← name;
 END;


invalidState =>
 BEGIN
 functionFault ← TRUE;
 instance.job.faultJob ← TRUE;
 faultNum ← CoalesceSchedObject.invalidState;
 severity ← systemError;
 card1 ← code;
 END;

jobQError =>
 BEGIN
 functionFault ← TRUE;
 instance.job.faultJob ← TRUE;
 faultNum ← CoalesceSchedObject.jobQError;
 severity ← systemError;
 card1 ← ORD[code];
 END;

nullRasterID =>
 BEGIN
 instance.job.faultJob ← TRUE;
 faultNum ← CoalesceSchedObject.nullRasterID;
 severity ← systemError;
 END;
```

Copyright © 1992 Xerox Corporation All Rights Reserved

```
unImplementedObjectEntryType =>
 BEGIN
 instance.job.faultJob ← TRUE;
 faultNum ← CoalesceSchedObject.unImplementedObjectEntryType;
 severity ← systemError;
 END;

zeroAorEonZeroBandD =>
 BEGIN
 instance.job.faultJob ← TRUE;
 faultNum ← CoalesceSchedObject.zeroAorEonZeroBandD;
 severity ← systemError;
 END;

zeroBorDonZeroAandE =>
 BEGIN
 instance.job.faultJob ← TRUE;
 faultNum ← CoalesceSchedObject.zeroBorDonZeroAandE;
 severity ← systemError;
 END;

dbError =>
 BEGIN
 functionFault ← TRUE;
 instance.job.faultJob ← TRUE;
 faultNum ← CoalesceSchedObject.dbError;
 severity ← systemError;
 card1 ← ORD[code];
 END;

resourceFault =>
 BEGIN
 instance.job.faultJob ← TRUE;
 faultNum ← CoalesceSchedObject.resourceFault;
 severity ← systemError;
 card1 ← code;
 END;

realException =>
 BEGIN
 instance.job.faultJob ← TRUE;
 faultNum ← CoalesceSchedObject.realException;
 severity ← systemError;
 card1 ← code;
 END;
```

Copyright © 1992 Xerox Corporation All Rights Reserved

```
  switchToDiag =>
   BEGIN
   faultNum ← CoalesceSchedObject.switchToDiag;
   instance.job.faultJob ← TRUE;
   severity ← systemError;
   operatorClearable ← TRUE;
   END;

  genericAbort =>
   BEGIN
   faultNum ← CoalesceSchedObject.genericAbort;
   instance.job.faultJob ← TRUE;
   severity ← systemError;
   operatorClearable ← TRUE;
   END;

  ENDCASE;

IF uniqueID = FaultLogger.nullLogID THEN
 uniqueID ← SMPreParse.LogFault[faultNum];

IF functionFault THEN
 FunctionFault[
  jobID: instance.job.jobID, uniqueID: uniqueID,
  faultBucket: CoalesceSchedBucket.functionFault];

IF severity = systemError THEN
 CoalesceSched.SetFatalError[jobID: instance.job.jobID, error: fault];
lockID ← JobQ.LockJob[
 job: instance.job.jobQReference, jobID: instance.job.jobID,
 readOnly: FALSE];
IF NOT warning THEN
 JobFault.Add[
  lockID: lockID,
  fault: [
  fault: faultNum, uniqueID: uniqueID, page1: instance.job.page,
  side1: instance.job.side, page2: Page.nullHandle, side2: front,
  severityType: severity, card1: card1, card2: card2, card3: card3,
  real: real, string1: string1, string2: string2]];
IF NOT operatorClearable THEN
 JobFault.AddWarning[
  lockID: lockID,
  warning: [
  redetectable: FALSE, pageNumber1: instance.job.pageCount, pageNumber2: 0,
  warning: [
  fault: faultNum, uniqueID: uniqueID, page1: instance.job.page,
  side1: instance.job.side, page2: Page.nullHandle, side2: front,
  severityType: severity, card1: card1, card2: card2, card3: card3,
  real: real, string1: string1, string2: string2]]];
JobQ.UnlockJob[lockID: lockID];
```

Copyright © 1992 Xerox Corporation All Rights Reserved

```
  END;
  END;

 ClearFault: PUBLIC PROCEDURE [bucket: CARDINAL] =
  BEGIN


  END;

 RollSystem: PUBLIC PROCEDURE [jobID: JobID.ID, faultNumber: CARDINAL] =
  BEGIN
  id: FaultLogger.ID;

  id ← FaultLogger.Log[
   fault: [subsystem: control, swModule: sysMgr, faultNumber: faultNumber]];

  FunctionFault[jobID, id, CoalesceSchedBucket.fatalSWErrorReboot];

  SSCRollover.WaitForRoll[];

  END;

 FunctionFault: PROCEDURE [
  jobID: JobID.ID, uniqueID: FaultLogger.ID, faultBucket: CARDINAL] =
  BEGIN
  faultPtr: EventHandler.FaultPointer;
  uniqueIDNode: EventHandler.LoggerPointer;

  faultPtr ← NodeHandler.RequestFaultNode[number: 1];
  uniqueIDNode ← NodeHandler.RequestUniqueID[number: 1];
  uniqueIDNode ↑ ← [uniqueID: uniqueID, next: NIL];
  faultPtr ↑ ← [
   record: [
   faultBucket: faultBucket, priority: operNow, mask: FALSE, sense: 0, zone: 0,
   uniqueID: uniqueIDNode, jobID: jobID], next: NIL, prev: NIL];

  EventHandler.ReportFaultChange[
   id: [trans: coalesceJob, module: coalesce],
   faultList: [adds: NIL, deletes: NIL, changes: NIL, notifies: faultPtr]];

  END;

 END.
```

Copyright © 1992 Xerox Corporation All Rights Reserved

```
DIRECTORY
 CoalescerControl USING [Abort, Destroy, FreeStatic, Init],
 CoalesceSched USING [
  Command, heap, Instance, InstancePtr, State, CoalescerCallBack],
 CoalesceSchedJob USING [ErrorCodeType, JobPtr],
 EventHandler USING [MemoryActionCompleteProcType,
ReportStateChange],
 JobID USING [ID, nullID],
 Page USING [Handle, Side],
 PrintTTY USING [LogEvent],
 Process USING [Detach, InitializeCondition, DisableTimeout],
 ResMgrIDs USING [TransactionID],
 ServCoalesce USING [coalesceStep],
 SMCoalesceSSC USING [Error, TaskID],
 SMStep USING [FreeParmsHandle];

CoalesceSchedImplD: MONITOR
 IMPORTS
  CoalescerControl, CoalesceSched, EventHandler, PrintTTY, Process,
  SMCoalesceSSC, SMStep
 EXPORTS CoalesceSched =

 BEGIN


 coalesceJobInstance: CoalesceSched.InstancePtr ← NIL;

 numOfInst: CARDINAL ← 0;
 numOfAvailInst: CARDINAL ← 0;

 AbortJob: PUBLIC ENTRY PROCEDURE [
  instance: CoalesceSched.InstancePtr, faultJob: BOOLEAN,
  switchToDiag: BOOLEAN] =
  BEGIN
  ENABLE UNWIND => NULL;

  IF instance.job = NIL THEN SIGNAL SMCoalesceSSC.Error[taskNotFound];

  instance.command ← IF faultJob THEN fault ELSE abort;
  instance.job.switchToDiag ← switchToDiag;
  instance.job.aborted ← TRUE;

  NotifyCoalescer[instance];

  END;

 AcquireInstance: PUBLIC ENTRY PROCEDURE [id:
ResMgrIDs.TransactionID]
```

Copyright © 1992 Xerox Corporation All Rights Reserved

```
 ENABLE UNWIND => NULL;

 SELECT id FROM
  coalesceJob =>
   IF coalesceJobInstance # NIL THEN
    SELECT coalesceJobInstance.state.currentState FROM
     ready, shutdown => {
      IF coalesceJobInstance.state.currentState = shutdown THEN {
       PrintTTY.LogEvent[
        sched: coalesce, event: r1NoLongerNeeded, id: JobID.nullID,
        transID: coalesceJobInstance.id];
       coalesceJobInstance.statePtr ← CoalescerControl.Init[
        context: coalesceJobInstance,
        callBack: CoalesceSched.CoalescerCallBack]};

      numOfAvailInst ← numOfAvailInst - 1;
      ChangeState[coalesceJob, running];
      RETURN[coalesceJobInstance]};
     ENDCASE;
  ENDCASE;
 instance ← NIL;
 END;

CreateInstance: PUBLIC ENTRY PROCEDURE [id: ResMgrIDs.TransactionID]
 RETURNS [instance: CoalesceSched.InstancePtr ← NIL] =
 BEGIN
 ENABLE UNWIND => NULL;

 SELECT id FROM
  coalesceJob => {
   instance ← Create[coalesceJobInstance, id];
   coalesceJobInstance ← instance;
   };
  ENDCASE;
 END;

DestroyInstance: PUBLIC ENTRY PROCEDURE [id:
ResMgrIDs.TransactionID]
 RETURNS [ok: BOOLEAN ← TRUE] =
 BEGIN
 ENABLE UNWIND => NULL;

 ok: BOOLEAN;

 SELECT id FROM
  coalesceJob => {
   ok ← Destroy[coalesceJobInstance];
   IF ok THEN coalesceJobInstance ← NIL;
   };
  ENDCASE;
```

Copyright © 1992 Xerox Corporation All Rights Reserved

```
 Faulted: PUBLIC ENTRY PROCEDURE [instance: CoalesceSched.InstancePtr]
  RETURNS [faulted: BOOLEAN ← FALSE] =
  BEGIN
  ENABLE UNWIND => NULL;

  IF instance.job.faultJob THEN faulted ← TRUE;
  END;

 FaultTask: PUBLIC ENTRY PROCEDURE [instance:
CoalesceSched.InstancePtr] =
  BEGIN
  ENABLE UNWIND => NULL;

  instance.job.faultJob ← TRUE;
  END;

 FindResMgrID: PUBLIC ENTRY PROCEDURE [resMgrID:
ResMgrIDs.TransactionID]
  RETURNS [instance: CoalesceSched.InstancePtr ← NIL] =
  BEGIN
  ENABLE UNWIND => NULL;

  SELECT resMgrID FROM
   coalesceJob =>
    IF coalesceJobInstance # NIL THEN RETURN[instance:
coalesceJobInstance];
   ENDCASE;
  END;

 FindJobID: PUBLIC ENTRY PROCEDURE [jobID: JobID.ID]
  RETURNS [instance: CoalesceSched.InstancePtr ← NIL] =
  BEGIN
  ENABLE UNWIND => NULL;

  IF coalesceJobInstance # NIL AND coalesceJobInstance.job # NIL
   AND coalesceJobInstance.job.jobID = jobID THEN
   RETURN[instance: coalesceJobInstance];
  END;

 FindTaskID: PUBLIC ENTRY PROCEDURE [taskID: SMCoalesceSSC.TaskID]
  RETURNS [instance: CoalesceSched.InstancePtr ← NIL] =
  BEGIN
  ENABLE UNWIND => NULL;

  SELECT taskID.transID FROM
   coalesceJob =>
    IF coalesceJobInstance # NIL AND coalesceJobInstance.job # NIL
     AND coalesceJobInstance.job.jobID = taskID.jobID THEN
     RETURN[instance: coalesceJobInstance];
```

Copyright © 1992 Xerox Corporation All Rights Reserved

```
 GetEndInfo: PUBLIC ENTRY PROCEDURE [instance:
CoalesceSched.InstancePtr]
  RETURNS [switchToDiag: BOOLEAN ← FALSE, aborted: BOOLEAN ←
FALSE] =
  BEGIN
  ENABLE UNWIND => NULL;

  IF instance = NIL OR instance.job = NIL THEN RETURN;
  switchToDiag ← instance.job.switchToDiag;
  aborted ← instance.job.aborted;
  END;

 GetPageInfo: PUBLIC ENTRY PROCEDURE [jobID: JobID.ID, fault:
BOOLEAN]
  RETURNS [page: Page.Handle, side: Page.Side] =
  BEGIN
  ENABLE UNWIND => NULL;

  IF coalesceJobInstance.job.jobID = jobID THEN
   BEGIN
   page ← coalesceJobInstance.job.page;
   side ← coalesceJobInstance.job.side;
   IF fault THEN coalesceJobInstance.job.faultJob ← TRUE;
   END;
  END;

 IncPageCount: PUBLIC ENTRY PROCEDURE [instance:
CoalesceSched.InstancePtr]
  RETURNS [command: CoalesceSched.Command] =
  BEGIN
  ENABLE UNWIND => NULL;

  instance.job.pageCount ← instance.job.pageCount + 1;

  SELECT instance.command FROM
   abort, fault, none => {command ← instance.command;
instance.command ← none};
   wait, freeAndWait => command ← DoWait[instance];
   ENDCASE;
  END;

 NewState: PUBLIC ENTRY PROCEDURE [
  instance: CoalesceSched.InstancePtr, newState: CoalesceSched.State] =
  BEGIN
  ENABLE UNWIND => NULL;

  ChangeState[instance.id, newState];

  END;
```

Copyright © 1992 Xerox Corporation All Rights Reserved

```
  ENABLE UNWIND => NULL;

  SELECT instance.command FROM
   abort, fault => {
    command ← instance.command; instance.command ← none;
RETURN[command]};
   freeAndWait => {command ← DoWait[instance]; RETURN[command]};
   ENDCASE => {instance.command ← none; command ← none};

  EventHandler.ReportStateChange[
   id: [trans: instance.id, module: coalesce],
   data: [
   state: ready, jobInfo: [JobID.nullID, add, medium, 0, running],
   resume: none, faultList: [NIL, NIL, NIL, NIL]]];

  instance.job.waiting ← TRUE;
  UNTIL instance.start DO WAIT instance.startIt; ENDLOOP;
  instance.start ← FALSE;

  SELECT instance.command FROM
   none, abort, fault => {command ← instance.command;
instance.command ← none};
   wait, freeAndWait => command ← DoWait[instance];
   ENDCASE;

  END;

 ReleaseInstance: PUBLIC ENTRY PROCEDURE [instance:
CoalesceSched.InstancePtr] =
  BEGIN
  ENABLE UNWIND => NULL;

  numOfAvailInst ← numOfAvailInst + 1;
  ChangeState[instance.id, ready];
  IF instance.job # NIL THEN
   BEGIN
   CoalescerControl.Destroy[instance.statePtr];

   IF instance.job.parms # NIL THEN
    SMStep.FreeParmsHandle[ServCoalesce.coalesceStep,
instance.job.parms];
   CoalesceSched.heap.FREE[@instance.job];
   instance.job ← NIL;
   instance.command ← none;
   END;
  END;

 ResumeJob: PUBLIC ENTRY PROCEDURE [instance:
CoalesceSched.InstancePtr] =
  BEGIN
```

Copyright © 1992 Xerox Corporation All Rights Reserved

```
 IF instance.job # NIL AND instance.job.waiting THEN
  BEGIN
  EventHandler.ReportStateChange[
   id: [trans: instance.id, module: coalesce],
   data: [
   state: running, jobInfo: [JobID.nullID, add, medium, 0, running],
   resume: none, faultList: [NIL, NIL, NIL, NIL]]];
  instance.start ← TRUE;
  NOTIFY instance.startIt;
  instance.job.waiting ← FALSE;
  END;

 END;

SetBackSide: PUBLIC ENTRY PROCEDURE [instance:
CoalesceSched.InstancePtr] =
 BEGIN
 ENABLE UNWIND => NULL;

 instance.job.side ← back;
 END;

SetFrontSide: PUBLIC ENTRY PROCEDURE [
 instance: CoalesceSched.InstancePtr, page: Page.Handle] =
 BEGIN
 ENABLE UNWIND => NULL;

 instance.job.page ← page;
 instance.job.side ← front;
 END;

SetJob: PUBLIC ENTRY PROCEDURE [
 instance: CoalesceSched.InstancePtr, jobPtr: CoalesceSchedJob.JobPtr] =
 BEGIN
 ENABLE UNWIND => NULL;

 SELECT instance.id FROM
  coalesceJob => coalesceJobInstance.job ← jobPtr;
  ENDCASE;
 END;

SetFatalError: PUBLIC ENTRY PROCEDURE [
 jobID: JobID.ID, error: CoalesceSchedJob.ErrorCodeType] =
 BEGIN
 ENABLE UNWIND => NULL;

 IF coalesceJobInstance # NIL AND coalesceJobInstance.job # NIL
  AND coalesceJobInstance.job.jobID = jobID THEN
  BEGIN
  coalesceJobInstance.job.error ← TRUE;
```

Copyright © 1992 Xerox Corporation All Rights Reserved

```
   END;
  END;

 StartNewJob: PUBLIC ENTRY PROCEDURE [instance:
CoalesceSched.InstancePtr] =
  BEGIN
  ENABLE UNWIND => NULL;


  instance.start ← TRUE;
  NOTIFY instance.startIt;
  END;

 StopJob: PUBLIC ENTRY PROCEDURE [
  id: ResMgrIDs.TransactionID,
  proc: EventHandler.MemoryActionCompleteProcType] =
  BEGIN
  ENABLE UNWIND => NULL;

  instance: CoalesceSched.InstancePtr;

  IF coalesceJobInstance # NIL THEN instance ← coalesceJobInstance
  ELSE SIGNAL SMCoalesceSSC.Error[stopIgnored];

  IF instance.job = NIL THEN
   BEGIN
   IF instance.state.currentState # ready THEN
    SIGNAL SMCoalesceSSC.Error[stopIgnored];

   ChangeState[instance.id, shutdown];

   PrintTTY.LogEvent[
    sched: coalesce, event: r1Needed, id: JobID.nullID, transID:
instance.id];
   [] ← CoalescerControl.FreeStatic[instance.statePtr];
   instance.statePtr ← NIL;

   IF proc # NIL THEN
    Process.Detach[FORK proc[[trans: instance.id, module: coalesce]]];
   RETURN;
   END;

  instance.job.shutdownProc ← proc;

  PrintTTY.LogEvent[
   sched: coalesce, event: suspend, id: instance.job.jobID,
   transID: instance.id];
  EventHandler.ReportStateChange[
   id: [trans: instance.id, module: coalesce],
   data: [
```

Copyright © 1992 Xerox Corporation All Rights Reserved

```
  instance.command ← freeAndWait;

  NotifyCoalescer[instance];

  END;

 WaitForNewJob: PUBLIC ENTRY PROCEDURE [instance:
CoalesceSched.InstancePtr] =
  BEGIN
  ENABLE UNWIND = > NULL;

  UNTIL instance.start DO WAIT instance.startIt; ENDLOOP;
  instance.start ← FALSE;
  END;


 DoWait: INTERNAL PROCEDURE [instance: CoalesceSched.InstancePtr]
  RETURNS [command: CoalesceSched.Command] =
  BEGIN
  staticFreed: BOOLEAN ← FALSE;

  IF instance.command = freeAndWait THEN {
   PrintTTY.LogEvent[
    sched: coalesce, event: r1Needed, id: JobID.nullID, transID:
instance.id];
   [] ← CoalescerControl.FreeStatic[instance.statePtr];
   instance.statePtr ← NIL;
   IF instance.job.shutdownProc # NIL THEN {
    instance.job.shutdownProc[id: [trans: instance.id, module: coalesce]];
    instance.job.shutdownProc ← NIL};
   staticFreed ← TRUE};

  EventHandler.ReportStateChange[
   id: [trans: instance.id, module: coalesce],
   data: [
   state: ready, jobInfo: [JobID.nullID, add, medium, 0, running],
   resume: none, faultList: [NIL, NIL, NIL, NIL]]];
  PrintTTY.LogEvent[
   sched: coalesce,
   event: IF staticFreed THEN suspendFreeStatic ELSE suspendedByRequest,
   id: instance.job.jobID, transID: instance.id, code: 0];

  command ← IF staticFreed THEN recoalesce ELSE none;
  instance.command ← none;

  instance.job.waiting ← TRUE;
  UNTIL instance.start DO WAIT instance.startIt; ENDLOOP;
  instance.start ← FALSE;
```

Copyright © 1992 Xerox Corporation All Rights Reserved

```
 NotifyCoalescer: INTERNAL PROCEDURE [instance:
CoalesceSched.InstancePtr] =
  BEGIN
  IF instance.job.waiting THEN
   BEGIN
   instance.start ← TRUE;
   NOTIFY instance.startIt;
   instance.job.waiting ← FALSE;
   END
  ELSE CoalescerControl.Abort[instance.statePtr];
  END;

 ChangeState: PROCEDURE [
  id: ResMgrIDs.TransactionID, newState: CoalesceSched.State] =
  BEGIN
  temp: CoalesceSched.InstancePtr ← NIL;

  SELECT id FROM coalesceJob => temp ← coalesceJobInstance;
ENDCASE;
  temp.state.lastState ← temp.state.currentState;
  temp.state.currentState ← newState;

  END;

 Create: PROCEDURE [
  temp: CoalesceSched.InstancePtr, transID: ResMgrIDs.TransactionID]
  RETURNS [inst: CoalesceSched.InstancePtr ← NIL] =
  BEGIN << Create >>

  IF temp = NIL THEN
   BEGIN

   inst ← CoalesceSched.heap.NEW[CoalesceSched.Instance];
   inst.id ← transID;
   inst.state ← [init, init];
   inst.job ← NIL;
   inst.start ← FALSE;
   inst.command ← none;
   Process.InitializeCondition[condition: @inst.startIt, ticks: 1];
   Process.DisableTimeout[condition: @inst.startIt];
   numOfInst ← numOfInst + 1;
   numOfAvailInst ← numOfAvailInst + 1;
   END;

  END;

 Destroy: PROCEDURE [temp: CoalesceSched.InstancePtr]
  RETURNS [ok: BOOLEAN ← FALSE] =
  BEGIN
```

Copyright © 1992 Xerox Corporation All Rights Reserved

```
    CoalesceSched.heap.FREE[@temp];
    numOfInst ← numOfInst - 1;
    numOfAvailInst ← numOfAvailInst - 1;
    ok ← TRUE;
    END;
  END;

END.
```

Copyright © 1992 Xerox Corporation All Rights Reserved

```
-- File: CoalescerOps.mesa - last edit:

-- Copyright (C) 1989, 1990, 1991 by Xerox Corporation. All rights reserved.

DIRECTORY
 IMSTypes USING [CropParams, ScalingParams],
 MRImageConversionService USING [ImageOrientation],
 Transformation USING [Matrix],
 TransformAnalyzerOps USING [TransformationResultsPtr];

CoalescerOps: DEFINITIONS =
 BEGIN

 -- CONSTANTS

 IMSIdentityScale: IMSTypes.ScalingParams = [16, 16];

 PointsPerDot: REAL = 0.1204819; « 1.0 / Font.pixelsPerPoint »

 -- Used with RealFns.AlmostEqual and RealFns.AlmostZero.
 -- This number was chosen to work with fonts from pt sizes 4 to 200.
 -- This number is large enough to avoid calling equal ptsizes unequal and
 -- small enought to avoid calling  unequal pt sizes equal.
 -- For pt size = 4 the error has to be less than X*10 to the -3.
 -- For pt size = 200 the error has to be less than X*10 to the -1.
 -- So we wouldn't want it larger than -4 and any smaller simply gives the
 -- fuzz a greater opportunity to falsely fault the job.
 --
 Fuzz: INTEGER = -4;

 -- TYPES

 -- PROCS

 SetOffsets: PROCEDURE [orient: MRImageConversionService.ImageOrientation,
            xPixel, yPixel: CARDINAL]
       RETURNS[originXOffset, originYOffset: CARDINAL];

 SetUpICS: PROCEDURE [orient: MRImageConversionService.ImageOrientation,
           scale: IMSTypes.ScalingParams,
           t: Transformation.Matrix,
           cropParms: LONG POINTER TO IMSTypes.CropParams,
           yPad: CARDINAL, scanLineModulus: CARDINAL]
      RETURNS[newYPad: CARDINAL];

 SetUpPasses: PROCEDURE [xFormResults:
            TransformAnalyzerOps.TransformationResultsPtr]
       RETURNS [passCount: LONG CARDINAL,
           gbdOrient: MRImageConversionService.ImageOrientation,
```

Copyright © 1992 Xerox Corporation All Rights Reserved

```
        gbdScale: IMSTypes.ScalingParams,
        gbdT: Transformation.Matrix];

END.
```

Copyright © 1992 Xerox Corporation All Rights Reserved

```
-- File: TransformAnalyzerOps.mesa - last edit:

-- Copyright (C) 1990, 1991 by Xerox Corporation. All rights reserved.

DIRECTORY
 IMSTypes USING [ScaleFactor],
 MRImageConversionService USING [ImageOrientation],
 RasterObjects USING [PixelSequence],
 Transformation USING [Matrix];

TransformAnalyzerOps: DEFINITIONS =
 BEGIN

 ErrorCode: TYPE = {corruptResultsRec, arbitraryRotate, nonsenseTransformation,
zeroAorEonZeroBandD, zeroBorDonZeroAandE};

 -- none = not an inkwell candidate.
 -- normal = 16x16 inkwell.
 -- double = 32x32 inkwell with scale=2, so make scale=1 & use inkwell double.
 -- special = can be made into a 16x16 w/o doubling, but at least one of the
 --       dimensions is a power of 2 < 16, so we need to do some repeating
 --       (not scaling) of the pattern to get that(those) dimension(s) = 16.
 -- specialDouble = same as special except that scale=2 and
 --          1 of the dimensions is 32.
 InkwellType: TYPE = {double, none, normal, special, specialDouble};

 InputSpec: TYPE = RECORD [
  inputXDim, inputYDim: CARDINAL,
  pixelSequence: RasterObjects.PixelSequence,
  sampledColor: BOOLEAN,
  t: Transformation.Matrix];

 InputSpecPtr: TYPE = LONG POINTER TO InputSpec ← NIL;

 MultiplePassGbdScale: TYPE = RECORD [
  passesAt2x, passesAt3x, passesAt4x,
  passesAt5x, passesAt6x, passesAt7x, passesAt8x: CARDINAL ← 0,
  deMag: IMSTypes.ScaleFactor ← 16];

 PostRotateType: TYPE = {flip, ninety, none};

 ResultsType: TYPE = {empty, ig, multiplePassGbd, resampler, singlePassGbd};

 SinglePassGbdScale: TYPE = RECORD [
  mag: REAL ← 1.0,
  deMag: IMSTypes.ScaleFactor ← 16];

 TransformationResults: TYPE = RECORD [
  inkwellType: InkwellType ← none,
```

Copyright © 1992 Xerox Corporation All Rights Reserved

```
var: SELECT type: ResultsType FROM

  empty => [],

  ig => [t: Transformation.Matrix],

  multiplePassGbd => [orientation: MRImageConversionService.ImageOrientation,
          x, y: MultiplePassGbdScale],

  resampler => [compress: BOOLEAN,
         decompress: BOOLEAN,
         orientation: MRImageConversionService.ImageOrientation,
         postRotate: PostRotateType,
         t: Transformation.Matrix],

  singlePassGbd => [orientation: MRImageConversionService.ImageOrientation,
          x, y: SinglePassGbdScale],

  ENDCASE] ← [none, empty[]];

TransformationResultsPtr: TYPE = LONG POINTER TO TransformationResults ← NIL;

Error: ERROR [code: ErrorCode];

EvaluateT: PROCEDURE [inputSpecPtr: InputSpecPtr,
          resultsPtr: TransformationResultsPtr];

END.
```

Copyright © 1992 Xerox Corporation All Rights Reserved

```
-- File: CoalescerImpl.mesa - last edit:

-- Copyright (C) 1989, 1990, 1991 by Xerox Corporation. All rights reserved.

DIRECTORY
 Coalescer USING [],
 CoalescerControl USING [AbortReason, CallBackProc, Context, Problem, ProblemType],
 CoalescerFont USING [CoalescerFontRec],
 CoalescerOps USING [IMSIdentityScale, PointsPerDot, Fuzz, SetOffsets, SetUpICS,
SetUpPasses],
 CoalescerTable USING [BitMapEntry, ClearInvalidUnknownFonts, CoalescerBitMapEntry,
CoalescerLists, CoalescerListsHandle, CoalesceTables, Error, ErrorCode],
 DBError USING [ErrorCode, OperationFailed],
 DirectoryType USING [nullObjectID, ObjectID],
 Environment USING [bitsPerWord],
 EventLogger USING [Log],
 FaultLogger USING [ID],
 FECoalesce USING [CoalesceInfo, Error, ErrorCode, ScheduleCoalesceSteps],
 FontDS USING [CoalesceFonts, Error, LookUpFontForFamilySub, LookUpFontForFontSub],
 FontManager USING [MakeCCID, MakeFamilyName, MakeFullName],
 FontSubstitutionTable USING [Error, FindSubstitute],
 Image USING [Error, GetFirstChild, GetNext, GetObjectType, Handle, nullHandle,
ObjectType],
 ImageResamplingService USING [SetUpResampler],
 IMSTypes USING [CropParams, ScaleFactor, ScalingParams],
 JobBackUp USING [LockID, nullLockID],
 JobID USING [ID, nullID],
 JobQ USING [Error, ErrorCode, JobReference, LockJob, nullJobReference, UnlockJob],
 MemoryPartitions USING[GetVirtualRange],
 MRImageConversionService USING [ImageOrientation, ImageProcessingTask],
 Page USING [nullHandle],
 RasterDirectorySupervisor USING [DereferenceRaster, Error, FaultCode, GetRESInfoPtr,
GetTransformedImage, ID, nullID, ReferenceRaster, ReleaseRESInfoPtr,
ResetRasterRefCount],
 RasterObjects USING [PixelSequence, RESInfoPointer],
 Real USING [FixC, RealException],
 RealFns USING [AlmostEqual, AlmostZero],
 ResMgr USING [Allocate, Error, FreeBufferList],
 ResMgrHeap USING [Create, Error, HeapFullProc],
 ResMgrIDs USING [ID],
 ResMgrStorage USING [BufferList, Pages, PagesFromWords],
 RTOSFile USING [FileID, nullID],
 RTOSOutload USING [Include],
 ServCoalesce USING [FontSubList, FontSub],
 StringSort USING [Compare],
 System USING [switches],
 Transformation USING [Identity, Matrix],
 TransformAnalyzerOps USING [Error, EvaluateT, InputSpec, PostRotateType,
TransformationResults],
 TransformationOps USING [SetForm];
```

Copyright © 1992 Xerox Corporation All Rights Reserved

```
RasterDirectorySupervisor, Real, RealFns, ResMgr, ResMgrHeap, ResMgrStorage,
RTOSOutload, StringSort, System, TransformAnalyzerOps, TransformationOps
 EXPORTS Coalescer, CoalescerControl =

 BEGIN

 -- TYPES & CONSTANTS FOR INIT --
 BitMapArrayType: TYPE =
  ARRAY [0..maxBitMaps) OF CoalescerTable.CoalescerBitMapEntry;

 FontArrayType: TYPE = ARRAY [0..maxFonts) OF CoalescerFont.CoalescerFontRec;

 nullBitMapEntry: CoalescerTable.CoalescerBitMapEntry = [
  index: 0,
  bitMap: [bitMapType: other, id: DirectoryType.nullObjectID,
      transformation: Transformation.Identity, xPixel: 0, yPixel: 0,
      yPad: 0, originXOffset: 0, originYOffset: 0]];

 nullFontEntry: CoalescerFont.CoalescerFontRec = [
  index: 0, authorityID: NIL, charCodeID: NIL, typeFaceID: NIL,
  transformation: Transformation.Identity, pointSize: 0, orientation: portrait,
  id: DirectoryType.nullObjectID, subdirectory: DirectoryType.nullObjectID,
  metricsFile: RTOSFile.nullID, metricsPageOffset: 0, metricPageLength: 0,
  requestedCCID: xcOneOneOne, availableCCID: xcOneOneOne];

 -- TYPES --
 BitMapArrayPtr: TYPE = LONG POINTER TO ARRAY OF
           CoalescerTable.CoalescerBitMapEntry;
 BitMapPtr: TYPE = LONG POINTER TO CoalescerTable.BitMapEntry;

 DoICSTaskType: TYPE = {compression, decompression, normal, resample};

 FontArrayPtr: TYPE = LONG POINTER TO ARRAY OF CoalescerFont.CoalescerFontRec;
 FontPtr: TYPE = LONG POINTER TO CoalescerFont.CoalescerFontRec;

 ICSStateType: TYPE = {idle, waiting, faulted, succeeded, abortPending};

 State: PUBLIC TYPE = RECORD [
  bitMapIndex: CARDINAL [0..maxBitMaps] ← 0,
  fontSubstitution: BOOLEAN ← FALSE,
  noIRSFaultForThisPage: BOOLEAN ← TRUE,
  type: StateType ← shutDown,

  buffer: ResMgrStorage.BufferList ← NIL,
  callBack: CoalescerControl.CallBackProc ← NIL,
  callBackContext: CoalescerControl.Context ← NIL,
  jobID: JobID.ID ← JobID.nullID,
  jobLevelFontSubList: ServCoalesce.FontSubList ← DESCRIPTOR[NIL, 0],
  jobRef: JobQ.JobReference ← JobQ.nullJobReference,
  lists: CoalescerTable.CoalescerLists,
```

Copyright © 1992 Xerox Corporation All Rights Reserved

```
  pageImage: Image.Handle ← Image.nullHandle,
  rasterOriginal, rasterFamily, rasterInterim: RasterDirectorySupervisor.ID ←
   RasterDirectorySupervisor.nullID,
  zone: UNCOUNTED ZONE];

 StateChange: TYPE = {startUp, create, coalesce, coalesceReturns, abort, destroy,
freeStatic};

 StateControl: TYPE = ARRAY StateChange OF PACKED ARRAY StateType OF StateType;

 StatePtr: TYPE = LONG POINTER TO State;

 StateType: TYPE = {shutDown, readyNoJob, readyWithJob, running, abortPending,
aborted, error};

 -- ERRORS --
 FatalError: ERROR [problem: CoalescerControl.Problem] = CODE;
 UnimplementedInkwellType: SIGNAL = CODE;

 «
  LEGEND FOR THE MEANING OF code FOR rasterDSError CoalescerControl.Problem
   1. DoSingleImage GetTransformedImage incoming raster
   2. DoSingleImage GetRESInfoPtr often incoming raster; otherwise, return of 1.
   3. DoSingleImage ReleaseRESInfoPtr same as 2.
   4. DoSingleImage ReferenceRaster
   5. DoSingleImage DereferenceRaster
   6. DoSingleImage ResetRasterRefCount
   7. DoICS ResetRasterRefCount
   8. DoICS DereferenceRaster
   9. PreventOrphanRasters DereferenceRaster statePtr.rasterInterim
  10. PreventOrphanRasters DereferenceRaster statePtr.rasterFamily
  11. PreventOrphanRasters ResetRasterRefCount active bitmap id
  12. PreventOrphanRasters DereferenceRaster active bitmap id
 »

 -- EventLogger --
 startCoalesceImage: CARDINAL = 431;
 endCoalesceImage: CARDINAL = 432;

 -- GLOBAL VARIABLES --

 gState: StatePtr ← NIL;

 maxBitMaps: CARDINAL = 12; « max bitmaps / chunk. »
 maxFonts: CARDINAL = 32; « max fonts / chunk. »
 rmID: ResMgrIDs.ID = [trans: coalesceJob, module: preParse];
 rmStaticAllocation: ResMgrStorage.Pages = 16;

 « RM Static Allocation:    16 Pages = 4096 words.
```

Copyright © 1992 Xerox Corporation All Rights Reserved

Coalescer Table String Maximums:
CoalescerFont.CoalescerFontRec.authorityID = 20 chars + 2 words = 12 words
CoalescerFont.CoalescerFontRec.charCodeID = 20 chars + 2 words = 12 words
CoalescerFont.CoalescerFontRec.typeFaceID = 80 chars + 2 words = 42 words
---
120 chars = 66 words Fault String Maximums:
120 chars + 2 '/' + 6 digits = 128 chars + 2 words = 66 words maximum of 2 strings existing simultaneously (incoming & substituting font)

total maximum = 132 words.

Worst case expected fragmentation is due to the case of when 1st error string work space ends up 67 words instead of 68.
Can get 5 words (6 char + 2 wd) out of the 67 and leave a 62 word hole.

BIT MAPS: 23 * 12 = 276 words
FONT DATA: 38 * 32 = 1216 words
FONT STRINGS: 66 * 32 = 2112 words
STATE: 36 words
ERRORS: 132 words
extra work space error char
(6 chars + 2w + 122 chars + 2w): 68 words
expected fragmentation node: 62 words
---
SUB TOTAL(DATA): 3902 words ResMgr Heap Overhead:
---
1 NORMAL HEAP: 23 words
1 NORMAL ZONE: 18 words
end of heap node: 2 words
end of heap node node O. H.: 1 word
Waiting for ResMgr Explaination: 1 word
state NODE: 1 word
bitMap array NODE: 1 word
font array NODE: 1 word
32 fonts * 3 names = 96 NODES: 96 words
2 error string NODES: 2 words
2 extra work space error NODES: 2 words
1 expected fragmentation node: 1 word
---
SUB TOTAL(OVERHEAD): 149 words TOTAL = 3902 + 149 = 4051 words
(gives a 45 word unexpected fragmentation safety net).

Copyright © 1992 Xerox Corporation All Rights Reserved

```
stateControl: StateControl = [
   startUp: [shutDown: readyNoJob, readyNoJob: error,     readyWithJob: error,
running: error,    abortPending: error,    aborted: error,    error: error],
    create: [shutDown: error,    readyNoJob: readyWithJob, readyWithJob: error,
running: error,    abortPending: error,    aborted: error,    error: error],
   coalesce: [shutDown: error,    readyNoJob: error,    readyWithJob: running,
running: error,    abortPending: error,    aborted: aborted,  error: error],
coalesceReturns: [shutDown: error,    readyNoJob: error,    readyWithJob: error,
running: readyWithJob, abortPending: aborted,    aborted: aborted,  error: error],
    abort: [shutDown: shutDown,  readyNoJob: readyNoJob,  readyWithJob: aborted,
running: abortPending, abortPending: abortPending, aborted: aborted,   error: error],
   destroy: [shutDown: shutDown,  readyNoJob: readyNoJob,  readyWithJob:
readyNoJob,  running: error,    abortPending: error,    aborted: readyNoJob, error:
error],
  freeStatic: [shutDown: shutDown,  readyNoJob: shutDown,   readyWithJob:
shutDown,  running: error,    abortPending: error,    aborted: shutDown,  error:
error]];

wakeUp: CONDITION;

icsState: ICSStateType ← idle;

-- PUBLIC PROCEDURES --

Abort: PUBLIC ENTRY PROCEDURE [statePtr: StatePtr,
              reason: CoalescerControl.AbortReason ← normal] =
 {ENABLE UNWIND => NULL;
  NotifyInternal [jobID: statePtr.jobID, faulted: FALSE,
         aborted: TRUE, curState: statePtr];
 }; « Abort »

Coalesce: PUBLIC PROCEDURE [statePtr: StatePtr, pageImage: Image.Handle]
     RETURNS [] =
 {ENABLE FatalError => {IF problem=[coalescerTableError[imageNotAnIPFragment]]
           THEN {Ready[statePtr];
              EventLogger.Log[endCoalesceImage];
              GOTO arbitraryImageTree;
              -- If the top level image passed in to Coalesce
              -- is not an ipFragment, then we have an
              -- arbitrary image tree to process.
              -- Need to coalesce arbitrary image trees to
              -- support the Filing Retrieve Operation.
              }

           ELSE {statePtr.callBack[statePtr.callBackContext,
                   problem];
              Ready[statePtr];
              EventLogger.Log[endCoalesceImage];
```

Copyright © 1992 Xerox Corporation All Rights Reserved

```
            CONTINUE;
           };

 lists: CoalescerTable.CoalescerListsHandle ← @statePtr.lists;

 LocalCoalesceTables: PROCEDURE [readOnly: BOOLEAN] =
  {lockID: JobBackUp.LockID ← JobBackUp.nullLockID;

  lockID ← JobQ.LockJob [job: statePtr.jobRef, jobID: statePtr.jobID,
   readOnly: readOnly
   ! DBError.OperationFailed => ERROR FatalError[[dbError[code]]];
    JobQ.Error => ERROR FatalError[[jobQError[code]]];];

  -- Note that the Fatal coalescerTableError gets caught and rejected in
  -- the FatalError arm immediately above it and that is where the job
  -- gets unlocked. The only other entry into that FatalError arm is via
  -- the heap resource error.
  CoalescerTable.CoalesceTables [image: pageImage, lockID: lockID,
   lists: lists, zone: statePtr.zone
   ! FatalError => JobQ.UnlockJob [lockID: lockID]; -- heap resource error
    CoalescerTable.Error =>
              ERROR FatalError[[coalescerTableError[code]]]];

  JobQ.UnlockJob [lockID: lockID];
  }; « LocalCoalesceTables »

 EventLogger.Log[startCoalesceImage];

 Busy[pageImage, statePtr];

 statePtr.noIRSFaultForThisPage ← TRUE;

 « lock for readOnly, get initial set of entries; unlock the job »
 statePtr.bitMapIndex ← lists.bitMapListLength ← lists.fontListLength ← 0;
 LocalCoalesceTables [readOnly: TRUE];

 « process, update/get next set of coalescer table entries until no more »
 UNTIL ((lists.bitMapListLength + lists.fontListLength) = 0)
 DO ENABLE FatalError => {-- do not fault aborts
           IF (problem # [invalidState[code: 4]])
           THEN statePtr.callBack[statePtr.callBackContext,
                    problem];

           SELECT problem.type FROM
            dbError, jobQError,
            coalescerTableError => GOTO dbCleanUp;

            ENDCASE => GOTO cleanUp;
           };
```

Copyright © 1992 Xerox Corporation All Rights Reserved

```
IF (AbortPending[]) THEN GOTO cleanUp;

« process the fonts, if any »
IF (lists.fontListLength > 0)
THEN DoFonts [lists.fonts.BASE, lists.fontListLength, statePtr];

« process the bitmaps, if any »
IF (lists.bitMapListLength > 0)
THEN DoMultipleImages[lists.bitMaps.BASE,lists.bitMapListLength,statePtr];

IF (AbortPending[]) THEN GOTO cleanUp;

« lock for update; update this set; get the next set; unlock the job »
FreeNameStrings[lists.fonts.BASE, lists.fontListLength, statePtr];
LocalCoalesceTables [readOnly: FALSE];

-- must reset to 0 at this point since we just got a new crop of bitmaps.
statePtr.bitMapIndex ← 0;

« go back to the top of the loop to process this new bunch, if any »

REPEAT
 dbCleanUp =>
   {FreeNameStrings[lists.fonts.BASE, lists.fontListLength, statePtr];
    PreventOrphanRasters[statePtr]; -- for the bitmap that failed.

   -- Since the data base failed, it is risky to try to clean
   -- anything up. Orphans could result here, but it should be rare.
   };

 cleanUp =>
   {FreeNameStrings[lists.fonts.BASE, lists.fontListLength, statePtr];
    PreventOrphanRasters[statePtr]; -- for the bitmap that failed.
    IF (statePtr.bitMapIndex > 0)
    THEN {-- Prevent orphan rasters for successful bitmaps
       -- and avoid repeating good work if the fault is cleared.
       -- Tell the database the number of SUCCESSFUL bitmaps.
       lists.bitMapListLength ← statePtr.bitMapIndex;
       LocalCoalesceTables [readOnly: FALSE];
       statePtr.bitMapIndex ← 0;

       FreeNameStrings[lists.fonts.BASE, lists.fontListLength,
               statePtr];
      };
   };

ENDLOOP;

Ready[statePtr];
EventLogger.Log[endCoalesceImage];
```

Copyright © 1992 Xerox Corporation All Rights Reserved

```
EXITS
 --
 -- This was added in ME1.511 to handle Filing Retrieve.
 --
 -- Normal Coalesce expects the image object on the page to consist of
 -- an ipFragment, only. This is what the PreParser provides. When
 -- recoalescing due to filing; however, the job composition could have
 -- been changed by the operator. Pages may not contain ipFragments;
 -- pages may contain ipFragments mixed with scanned images and/or rules
 -- (e.g. merged logos); and in the future, pages may contain multiple
 -- ipFragments. Currently, ME1.5, a page should contain 0 or 1
 -- ipFragment. This code should should be able to handle N ipFragments
 -- per page where N is a nonNegative whole number.
 --
 -- The procedure implemented here uses the same Coalescer that processes
 -- jobs sent via Print Protocol. This EXITS clause handles the pages that
 -- were updated by an operator prior to the Filing Store operation. Pages
 -- that were updated by the operator have a composite image on them
 -- instead of just a single ipFragment. Note also, that only font binding
 -- needs to be performed for reCoalescing for reCoalescing for Filing
 -- Retrieve; all the image processing was completed during the initial
 -- coalesce when the job was received via Print Protocol.
 --
 -- This is not the most effecient algorithm for reCoalescing for
 -- Filing Retrieve; however, it was the method chosen in order to meet
 -- schedule and risk criteria. A more efficient algorithm should be
 -- considered for the future: provide a separate procedure that simply
 -- updates the Job Level Font List directly. Unfortunately, this requires
 -- much support code from the data base, SSC, LTS, the Coalescer Scheduler
 -- and has VUDU impacts. Also note that reCoalesce for Filing Retrieve
 -- could be made concurrent with coalesce for Print Protocol by providing
 -- separate resources for each version.
 --
 arbitraryImageTree =>
   {-- This is a global lock id used for walking the image tree.
    -- It is passed to CoalesceArbitraryImageTree[] because
    -- CoalesceArbitraryImageTree[] will change the lock id and the
    -- ENABLE clause here needs it for error processing.
    lockID: JobBackUp.LockID ← JobBackUp.nullLockID;

    -- save the real callBack proc because it is overwritten with a
    -- local callBack proc. The local callBack proc sets error to TRUE if
    -- Coalesce[] reports a fatal error. If CoalesceArbitraryImageTree[]
    -- sees error = TRUE it must not continue.
    oldCallBack: CoalescerControl.CallBackProc ← statePtr.callBack;
    error: BOOLEAN ← FALSE;

    BEGIN ENABLE
     {DBError.OperationFailed =>
```

Copyright © 1992 Xerox Corporation All Rights Reserved

```
          {oldCallBack [statePtr.callBackContext,[dbError[code]]];
           statePtr.callBack ← oldCallBack;
           CONTINUE;
          };

        JobQ.Error = >
          {oldCallBack [statePtr.callBackContext,[jobQError[code]]];
           statePtr.callBack ← oldCallBack;
           CONTINUE;
          };

        Image.Error = >
          {JobQ.UnlockJob [lockID: lockID];
           oldCallBack [statePtr.callBackContext,[imageError[code]]];
           statePtr.callBack ← oldCallBack;
           CONTINUE;
          };
        };

        LocalCallBack: CoalescerControl.CallBackProc =
         {oldCallBack[context, problem];

          SELECT problem.type FROM
           fontNameNotFound, fontNotFound, fontSubstituted,
           fontSubstitutionFailed1, fontSubstitutionFailed2 = > NULL;
           ENDCASE = > error ← TRUE;
         }; « LocalCallBack »

        -- Coalesce[] must use the LocalCallBack proc so
        -- CoalesceArbitraryImageTree[] can be told to stop on fatal errors
        statePtr.callBack ← LocalCallBack;
        lockID ← JobQ.LockJob [statePtr.jobRef, statePtr.jobID, TRUE];
        CoalesceArbitraryImageTree [statePtr, pageImage, @lockID, @error];
        JobQ.UnlockJob [lockID: lockID];
        statePtr.callBack ← oldCallBack;

      END;
     };

 }; « Coalesce »

-- set up to start coalescing a job.
Create: PUBLIC ENTRY PROCEDURE [jobID: JobID.ID, jobRef:JobQ.JobReference,
 fontSubList: ServCoalesce.FontSubList, fontSubstitution: BOOLEAN,
 statePtr: StatePtr] =

 {{ENABLE {UNWIND = > NULL;

      FatalError = > {gState.callBack[gState.callBackContext, problem];
```

Copyright © 1992 Xerox Corporation All Rights Reserved

```
            CONTINUE;
            };
    };

  newState: StateType;
  lockID: JobBackUp.LockID;

  IF (gState = NIL) THEN ERROR; -- can't report an error because no context.

  IF ((newState ← stateControl[create][gState.type]) = error)
  THEN ERROR FatalError[[invalidState[code: 1]]];

  -- clear the flag that says "we already looked at these fonts, but
  -- they aren't on disk and there is no substitution for them so don't
  -- look at them again". We clear it because now we want to start fresh.
  lockID ← JobQ.LockJob [job: jobRef, jobID: jobID, readOnly: FALSE
   ! DBError.OperationFailed = > ERROR FatalError[[dbError[code]]];
     JobQ.Error = > ERROR FatalError[[jobQError[code]]];];

  CoalescerTable.ClearInvalidUnknownFonts[lockID: lockID];
  JobQ.UnlockJob [lockID: lockID];

  -- set up the state for the current job
  gState.jobID ← jobID;
  gState.jobRef ← jobRef;
  gState.jobLevelFontSubList ← fontSubList;
  gState.fontSubstitution ← fontSubstitution;
  gState.type ← newState;

  gState.lists.bitMapListLength ← gState.lists.fontListLength ← 0;
  gState.bitMapIndex ← 0;
 }}; « Create »

Destroy: PUBLIC ENTRY PROCEDURE [statePtr: StatePtr]
 RETURNS[] =

 {ENABLE UNWIND = > NULL;

  SELECT TRUE FROM
   (gState = NIL OR gState # statePtr) = > ERROR;
   (stateControl[destroy][gState.type] = error) = > ERROR;
   ENDCASE = > gState.type ← stateControl[destroy][gState.type];

 }; « Destroy »

FreeStatic: PUBLIC ENTRY PROCEDURE [statePtr: StatePtr]
 RETURNS [delayed: BOOLEAN ← FALSE] =
 {ENABLE UNWIND = > NULL;

  IF (gState = NIL OR gState # statePtr) THEN ERROR;
```

Copyright © 1992 Xerox Corporation All Rights Reserved

```
IF (stateControl[freeStatic][gState.type] = error) THEN ERROR;

 {buffer: ResMgrStorage.BufferList ← statePtr.buffer;
  jobID: JobID.ID ← statePtr.jobID;
  callBack: CoalescerControl.CallBackProc ← statePtr.callBack;
  context: CoalescerControl.Context ← statePtr.callBackContext;

  ResMgr.FreeBufferList[id: rmID, buffer: buffer
   ! ResMgr.Error => {callBack [context, [resourceFault[3]]]; CONTINUE;}];

  gState ← NIL;
 };
}; « FreeStatic »

ICSCallBack: PUBLIC ENTRY PROCEDURE [jobID: JobID.ID, image: Image.Handle,
 coalescerTableIndex: CARDINAL, newRaster: RasterDirectorySupervisor.ID,
 newX: CARDINAL, newY: CARDINAL]
 RETURNS[] =
 {ENABLE UNWIND => NULL;

 -- local proc to delete a raster that the Coalescer can't handle.
 DeleteRaster: PROCEDURE [] =
  {noError: BOOLEAN ← TRUE;

   -- ignore it if it is null.
   IF (newRaster = RasterDirectorySupervisor.nullID) THEN RETURN;

   -- ics refcount is 1, but irs refcount is 0, so force it to 1 to delete.
   RasterDirectorySupervisor.ResetRasterRefCount [newRaster, 1
    ! RasterDirectorySupervisor.Error => {noError ← FALSE; CONTINUE}];

   IF (noError) -- delete the raster
   THEN RasterDirectorySupervisor.DereferenceRaster [newRaster
       ! RasterDirectorySupervisor.Error => CONTINUE];

  }; « DeleteRaster »


 SELECT TRUE FROM
           -- no active instances; must have been shutdown.
  (gState = NIL) => {DeleteRaster[]; RETURN};

  (icsState = waiting AND gState.jobID = jobID AND
   gState.pageImage = image AND
   gState.bitMapIndex = coalescerTableIndex) =>
      {b: BitMapPtr =
         @gState.lists.bitMaps.BASE[gState.bitMapIndex].bitMap;

       b.id ← newRaster;
```

Copyright © 1992 Xerox Corporation All Rights Reserved

```
        b.xPixel ← newX;
        b.yPixel ← newY;
       };

       -- no match or not waiting for ICS; must have been aborted.
   ENDCASE => DeleteRaster[];
 }; « ICSCallBack »

-- initialize the Coalescer memory, called before create
Init: PUBLIC ENTRY PROCEDURE [callBack: CoalescerControl.CallBackProc,
               context: CoalescerControl.Context]
    RETURNS [statePtr: StatePtr] =

 {buffer: ResMgrStorage.BufferList ← NIL;

 {ENABLE {UNWIND => NULL;

      FatalError => {callBack[context, problem];

             IF (buffer # NIL)
             THEN ResMgr.FreeBufferList[id: rmID, buffer: buffer
               ! ResMgr.Error => CONTINUE];

             statePtr ← NIL;

             CONTINUE;
             };
     };

  count: ResMgrStorage.Pages;
  vmStart, vmEnd: LONG POINTER;

  zone: UNCOUNTED ZONE;

  IF (gState # NIL) THEN ERROR;

  buffer ← ResMgr.Allocate[id: rmID, Pages: rmStaticAllocation, base: NIL,
   waitTillAvailable: FALSE
   ! ResMgr.Error => ERROR FatalError[[resourceFault[1]]]];

  zone ← ResMgrHeap.Create [bl: buffer, heapFull: HeapFull,
   heapFullWarning: NIL, warningThreshold: 0, maxSize: rmStaticAllocation,
   ownerChecking: FALSE, checking: FALSE, incrementSize: 0
   ! ResMgrHeap.Error => ERROR FatalError[[resourceFault[2]]]];

  -- Make sure that the RM static gets saved in the outload file.
  [vmStart, vmEnd] ← MemoryPartitions.GetVirtualRange[rmID];
  count ← ResMgrStorage.PagesFromWords[words: (vmEnd - vmStart)];
  RTOSOutload.Include[interval: [pointer: vmStart, count: count]];
```

Copyright © 1992 Xerox Corporation All Rights Reserved

```
  statePtr ← zone.NEW[State];
  statePtr.zone ← zone;
  statePtr.buffer ← buffer;

  statePtr.lists.bitMaps ← DESCRIPTOR[zone.NEW[BitMapArrayType ←
   ALL[nullBitMapEntry]], maxBitMaps];

  statePtr.lists.fonts ← DESCRIPTOR[zone.NEW[FontArrayType ←
   ALL[nullFontEntry]], maxFonts];

  statePtr.lists.bitMapListLength ← statePtr.lists.fontListLength ← 0;
  statePtr.bitMapIndex ← 0;

  statePtr.callBack ← callBack;
  statePtr.callBackContext ← context;

  statePtr.type ← readyNoJob;
  gState ← statePtr;
 }}; « Init »

Notify: PUBLIC ENTRY PROCEDURE [jobID: JobID.ID, faulted: BOOLEAN ← FALSE]
 RETURNS[] =
 {ENABLE UNWIND => NULL;

  NotifyInternal [jobID: jobID, faulted: faulted, aborted: FALSE,
        curState: gState];
 }; « Notify »

NotifyInternal: INTERNAL PROCEDURE [jobID: JobID.ID, faulted, aborted: BOOLEAN,
               curState: StatePtr]
 RETURNS[] =
 {SELECT TRUE FROM
  (curState = NIL) => RETURN; -- no active instances
  (curState.jobID = jobID) =>
   {SELECT TRUE FROM
     (aborted) => {IF (stateControl[abort][curState.type] = error) THEN ERROR;

          curState.type ← stateControl[abort][curState.type];
          IF (icsState = waiting)
          THEN {icsState ← abortPending;
             NOTIFY wakeUp;
            };
          };

     (faulted AND icsState = waiting) =>
      {icsState ← faulted; NOTIFY wakeUp};

     (NOT faulted AND icsState = waiting) =>
      {icsState ← succeeded; NOTIFY wakeUp};
```

Copyright © 1992 Xerox Corporation All Rights Reserved

```
      ENDCASE;
    };

   ENDCASE;
}; « NotifyInternal »

-- LOCAL PROCEDURES --

Aborted: ENTRY PROCEDURE []
RETURNS [aborted: BOOLEAN ← (gState.type = aborted)] =
 {ENABLE UNWIND => NULL;}; « Aborted »

AbortPending: ENTRY PROCEDURE []
RETURNS [abortPending: BOOLEAN ← (gState.type = abortPending)] =
 {ENABLE UNWIND => NULL;}; « AbortPending »

Busy: ENTRY PROCEDURE [pageImage: Image.Handle, statePtr: StatePtr] =
 {ENABLE UNWIND => NULL;

  SELECT TRUE FROM
   (gState = NIL OR gState # statePtr) => ERROR;
   (stateControl[coalesce][gState.type] = error) => ERROR;
   ENDCASE => {gState.type ← stateControl[coalesce][gState.type];
         gState.pageImage ← pageImage;
         };
 }; « Busy »

« Supports Filing Retrieve. Looks for ipFragments that need fonts rebound. »
CoalesceArbitraryImageTree: PROCEDURE [statePtr: StatePtr, image: Image.Handle,
 lockID: LONG POINTER TO JobBackUp.LockID, error: LONG POINTER TO BOOLEAN] =

 {-- This image handle is passed to CoalesceArbitraryImageTree[] for
  -- recursively walking composite nodes.
  child: Image.Handle;

  -- Only Call Coalesce for ipFragment types.
  -- Recursively Call CoalesceArbitraryImageTree[] for composite nodes.
  imageType: Image.ObjectType; -- Coalesce ipFragment types

  -- When image = Image.nullHandle, the current node is complete.
  -- When Aborted[], the Coalescer scheduler requested immediate termination.
  -- When error ↑ = TRUE, Coalesce[] reported a fatal error, so don't continue.
  UNTIL (image = Image.nullHandle OR Aborted[] OR error ↑)
  DO imageType ← Image.GetObjectType [image, [job[lockID ↑]]];

    SELECT imageType FROM
     ipFragment => {JobQ.UnlockJob [lockID: lockID ↑];
            Coalesce [statePtr, image];
            lockID ↑ ← JobQ.LockJob[statePtr.jobRef, statePtr.jobID,
                   TRUE];
```

Copyright © 1992 Xerox Corporation All Rights Reserved

```
        };

   composite => {-- found a composite node, so get the first child image
        -- and step through the leaves of that node.
        child ← Image.GetFirstChild[image, [job[lockID ↑]]];
        CoalesceArbitraryImageTree [statePtr,child,lockID,error];
        };

   ENDCASE; -- don't care about other leafs (rasters, rules)

  -- get the next sequential image handle, if any, of this node.
  image ← Image.GetNext[image, [job[lockID ↑]]];
  ENDLOOP;

 }; « CoalesceArbitraryImageTree »

DoFonts: PROCEDURE [fonts: FontArrayPtr, fontListLength: CARDINAL,
 statePtr: StatePtr] =
 {IF GetPointSizeAndOrientation[fonts,fontListLength,statePtr] = fontListLength
  THEN RETURN;

  IF (FontDS.CoalesceFonts [DESCRIPTOR[fonts, fontListLength]])
  THEN {-- then the master needs some fonts that are not in the Font Directory.
     IF (statePtr.fontSubstitution OR -- system level font sub enabled
       statePtr.jobLevelFontSubList.LENGTH > 0) -- job level list exists
     THEN DoFontSubstitution [fonts, fontListLength, statePtr]

     ELSE -- system level font sub disabled and no job level list
       -- so just find the missing fonts and fault them
       DoFontFaults [fonts, fontListLength, statePtr];
    };

 }; « DoFonts »

DoFontFaults: PROCEDURE [fonts: FontArrayPtr, fontListLength: CARDINAL,
 statePtr: StatePtr] =
 {pln: FontPtr ← NIL;

  « looking for fonts that need substitution »
  FOR missingFontIndex: CARDINAL IN [0..fontListLength)
  DO sln: LONG STRING ← NIL;
   pln ← @fonts[missingFontIndex];

   IF (AbortPending[]) THEN EXIT;

   « look for fonts not found for which we found a good point size »
   IF (pln.id = DirectoryType.nullObjectID AND pln.pointSize # 0)
   THEN {sln ← FontManager.MakeFullName[pln.authorityID,
       pln.charCodeID, pln.typeFaceID, pln.pointSize, statePtr.zone];
```

Copyright © 1992 Xerox Corporation All Rights Reserved

```
        IF (pln.subdirectory = DirectoryType.nullObjectID)
        THEN statePtr.callBack [context: statePtr.callBackContext,
            problem: [fontNameNotFound[sln]]]

        ELSE statePtr.callBack [context: statePtr.callBackContext,
            problem: [fontNotFound[sln]]];

        IF (sln # NIL) THEN statePtr.zone.FREE[@sln];
       };
    ENDLOOP;
  }; « DoFontFaults »

DoFontSubstitution: PROCEDURE [fonts: FontArrayPtr, fontListLength: CARDINAL,
  statePtr: StatePtr] =
  {pln: FontPtr ← NIL;
   nSubs: CARDINAL = statePtr.jobLevelFontSubList.LENGTH;
   subs: LONG POINTER TO ARRAY OF ServCoalesce.FontSub ←
     statePtr.jobLevelFontSubList.BASE;

   « looking for fonts that need substitution »
   FOR missingFontIndex: CARDINAL IN [0..fontListLength)
   DO pln ← @fonts[missingFontIndex];

     IF (AbortPending[]) THEN EXIT;

     « look for fonts not found that didn't have RealExceptions »
     IF (pln.id = DirectoryType.nullObjectID AND pln.pointSize # 0)
     THEN {found: INTEGER = 0;
        tryAgain: INTEGER = -1;

        comparison: INTEGER ← tryAgain;
        subIndex: CARDINAL ← 0;

        sln: LONG STRING ← FontManager.MakeFullName[pln.authorityID,
          pln.charCodeID, pln.typeFaceID, pln.pointSize, statePtr.zone];

        subName: LONG STRING ← NIL;
        problem: CoalescerControl.Problem ←
              IF (pln.subdirectory = DirectoryType.nullObjectID)
              THEN [fontNameNotFound[sln]]
              ELSE [fontNotFound[sln]];

        « look to see if a Job Level Substitution was specified »
        WHILE (subIndex < nSubs AND
            (comparison ← StringSort.Compare [s1: sln,
            s2: subs[subIndex].fontName, ignoreCase: TRUE]) # found)
        DO subIndex ← subIndex + 1 ENDLOOP;

        « was a match found in the list and was a substitution speicified? »
        IF (comparison = found AND
```

Copyright © 1992 Xerox Corporation All Rights Reserved

```
  subs[subIndex].subFont.fontSubDir # DirectoryType.nullObjectID)
THEN {« Job Level Font Substitution »
  pJob: LONG POINTER TO ServCoalesce.FontSub = @subs[subIndex];

  IF (pJob.subFont.fontDir = DirectoryType.nullObjectID)
  THEN {« Font Family Substitution »
 « out » [font:        pIn.id,
      metricsFile:   pIn.metricsFile,
      metricPageOffset: pIn.metricsPageOffset,
      metricPageLength: pIn.metricPageLength,
      ccid:          pIn.availableCCID,
      name: subName] ← FontDS.LookUpFontForFamilySub
  « in » [subdirectory: pJob.subFont.fontSubDir,
      size:      pIn.pointSize,
      orientation: pIn.orientation,
      zone:      statePtr.zone
      ! FontDS.Error = > {problem ←
        IF (pIn.subdirectory = DirectoryType.nullObjectID)
        THEN [fontSubstitutionFailed1[sIn]]
        ELSE [fontSubstitutionFailed2[sIn]];
        CONTINUE}];

      IF (subName # NIL)
      THEN {pIn.subdirectory ← pJob.subFont.fontSubDir;
         pIn.requestedCCID ←
          FontManager.MakeCCID [pIn.charCodeID];
         problem ← [fontSubstituted[subName, [pIn.id,
          pIn.subdirectory], sIn]];
        };
     }« end of Font Family Substitution »

  ELSE {« Full Font Substitution »
 « out » [metricsFile:   pIn.metricsFile,
      metricPageOffset: pIn.metricsPageOffset,
      metricPageLength: pIn.metricPageLength,
      ccid:          pIn.availableCCID,
      name: subName] ← FontDS.LookUpFontForFontSub
  « in » [subdirectory: pJob.subFont.fontSubDir,
      font:      pJob.subFont.fontDir,
      orientation: pIn.orientation,
      zone:      statePtr.zone
      ! FontDS.Error = > {problem ←
        IF (pIn.subdirectory = DirectoryType.nullObjectID)
        THEN [fontSubstitutionFailed1[sIn]]
        ELSE [fontSubstitutionFailed2[sIn]];
        CONTINUE}];

      IF (subName # NIL)
      THEN {pIn.id ← pJob.subFont.fontDir;
         pIn.subdirectory ← pJob.subFont.fontSubDir;
```

Copyright © 1992 Xerox Corporation All Rights Reserved

```
            pln.requestedCCID ←
             FontManager.MakeCCID [pln.charCodeID];
            problem ← [fontSubstituted[subName, [pln.id,
             pln.subdirectory], sln]];
           };
         }; « end of Full Font Substitution »
       }; « end of Job Level Font Substitution »

     « If no substitution found yet & system level sub. is enabled »
     IF (subName = NIL AND statePtr.fontSubstitution)
     THEN {« System Level Font Substitution »
    « out » [substitutingFamily:        pln.subdirectory,
        substitutingFont:         pln.id,
        substitutingMetricsFile:     pln.metricsFile,
        substitutingMetricsPageOffset: pln.metricsPageOffset,
        substitutingMetricsPageLength: pln.metricPageLength,
        characterCode:          pln.availableCCID,
        name: subName] ← FontSubstitutionTable.FindSubstitute
    « in » [authorityID: pln.authorityID,
        charCodeID: pln.charCodeID,
        typeFaceID: pln.typeFaceID,
        size:    pln.pointSize,
        orientation: pln.orientation,
        zone:    statePtr.zone
        ! FontSubstitutionTable.Error => {problem ←
          IF (pln.subdirectory = DirectoryType.nullObjectID)
          THEN [fontSubstitutionFailed1[sln]]
          ELSE [fontSubstitutionFailed2[sln]];
          CONTINUE}];

        IF (subName # NIL)
        THEN {pln.requestedCCID ←
            FontManager.MakeCCID [pln.charCodeID];
           problem ← [fontSubstituted[subName, [pln.id,
            pln.subdirectory], sln]];
          };
        }; « end of System Level Font Substitution »

     « report the appearance warning or object fault »
     statePtr.callBack [context: statePtr.callBackContext,
            problem: problem];

     IF (sln # NIL) THEN statePtr.zone.FREE[@sln];
     IF (subName # NIL) THEN statePtr.zone.FREE[@subName];
    }; « end of fonts not found that didn't have RealExceptions »
   ENDLOOP; « end of looking for fonts that need substitution »

 }; « DoFontSubstitution »

DoICS: PROCEDURE [task: DoICSTaskType,
```

Copyright © 1992 Xerox Corporation All Rights Reserved

```
        orient: MRImageConversionService.ImageOrientation,
        scale: IMSTypes.ScalingParams,
        t: Transformation.Matrix,
        statePtr: StatePtr,
        yPad: CARDINAL]
RETURNS [newYPad: CARDINAL] =
{bitMap: BitMapPtr ← @statePtr.lists.bitMaps[statePtr.bitMapIndex].bitMap;
 cropParms: IMSTypes.CropParams;
 coalesceInfo: FECoalesce.CoalesceInfo;
 problem: CoalescerControl.Problem ← TRASH;
 rdsError: BOOLEAN ← FALSE;
 rID: RasterDirectorySupervisor.ID;

 statePtr.rasterInterim ← rID ← bitMap.id;
 cropParms ← [xLength: bitMap.xPixel, yLength: bitMap.yPixel,
       xDisplacement: 0, yDisplacement: 0];

 IF (task = resample)
 THEN {-- set up for RESAMPLER TASKS
    coalesceInfo ← [pageHdl: Page.nullHandle,
             pageSide: front,
             task: [transaction: coalesceJob,
                 destination: statePtr.pageImage,
                 jobRef: statePtr.jobRef,
                 var: imageResampling [
                     transformation: t,
                     rasterID: rID,
                     yPadding: yPad,
                     coalescerIndex: statePtr.bitMapIndex]],
             transformation: t];
    }

 ELSE {-- set up for G-BOARD TASKS
    -- Set the proper signs in the transformation for the Post Parser.
    -- PMS #290534 Net jobs that require the gbd decomp. to do x & y flips.
    SELECT orient FROM
     rotate180, rotate270 => {t.a ← -t.a; t.e ← -t.e};
     mirrorLeftToRight, mirrorTopToLeft => t.a ← -t.a;
     mirrorTopToBottom, mirrorTopToRight => t.e ← -t.e;
     ENDCASE; « none, rotate90 »

    TransformationOps.SetForm[@t];

    -- Call SetUpICS to take care of all the padding in the original raster
    -- and the padding introduced by the G board.
    --
    -- PMS #290553 Coalescer must compensate for G-Bd scanline quantization
    -- PMS #290546 Coalescer doesn't always handle packed pixel arrays
    newYPad ← CoalescerOps.SetUpICS [orient: orient, scale: scale, t: t,
                    cropParms: @cropParms, yPad: yPad,
```

Copyright © 1992 Xerox Corporation All Rights Reserved

```
                    scanLineModulus:
                     IF (task = decompression)
                     THEN 32
                     ELSE Environment.bitsPerWord];

   coalesceInfo ← [pageHdl: Page.nullHandle,
           pageSide: front,
           task: [transaction: coalesceJob,
               destination: statePtr.pageImage,
               jobRef: statePtr.jobRef,
               var: printResolutionConversion [
                   action: IF (task = decompression)
                       THEN decompression
                       ELSE normal,
                   crop: cropParms,
                   orientation: orient,
                   scale: scale,
                   rasterID: rID,
                   coalescerIndex: statePtr.bitMapIndex]],
           transformation: t];
  };

FECoalesce.ScheduleCoalesceSteps [statePtr.jobID, @coalesceInfo
 ! FECoalesce.Error => ERROR FatalError[[FECoalesceError[code]]];];

WaitForICS [statePtr];

-- set up new interim raster as the newly created raster.
-- In case of an error, it needs to be dereferenced.
-- The old one is taken care of immediately below.
statePtr.rasterInterim ← bitMap.id;

-- newYPad is set up here for the resampler task
IF (task = resample)
THEN {bitMap.yPixel ← bitMap.yPixel +
    (newYPad ← (((bitMap.yPixel+31)/32)*32) - bitMap.yPixel);

   -- IRS installs with ref count = 0.
   -- Must set it to 1 to be able to delete it.
   -- The only way to delete it is with DereferenceRaster
   -- which raises an error if ref count goes from 0 to -1.
   RasterDirectorySupervisor.ResetRasterRefCount [bitMap.id, 1
    ! RasterDirectorySupervisor.Error =>
      {rdsError ← TRUE;
       problem ← [rasterDSError[fault: fault, faultID: faultID,
                  rasterID: bitMap.id, code: 7]];
       CONTINUE}]; IF (rdsError) THEN ERROR FatalError [problem];
   };

 -- dereference Interim Rasters during a multipass operation.
```

Copyright © 1992 Xerox Corporation All Rights Reserved

```
 -- this rID is the input to the current pass that is now finishing,
 -- we are done with it, so it needs to be deleted.
 IF (rID # statePtr.rasterOriginal AND rID # statePtr.rasterFamily)
 THEN {RasterDirectorySupervisor.DereferenceRaster [id: rID
      ! RasterDirectorySupervisor.Error = >
        {rdsError <- TRUE;
         problem <- [rasterDSError[fault: fault, faultID: faultID,
                      rasterID: rID, code: 8]];
         CONTINUE}]; IF (rdsError) THEN ERROR FatalError [problem];
    };

 }; « DoICS »

--
-- When DoMultipleImages[] RETURNs or ERRORs,
-- statePtr.bitMapIndex MUST = the number of successfully completed bitMaps.
--
DoMultipleImages: PROCEDURE [bitMaps: BitMapArrayPtr,
 bitMapListLength: CARDINAL, statePtr: StatePtr] =
 {FOR i: CARDINAL IN [0..bitMapListLength)
  DO ENABLE Real.RealException = > ERROR FatalError [[realException[code: 1]]];

   statePtr.bitMapIndex <- i;

   IF (AbortPending[]) THEN RETURN;

   SELECT bitMaps[i].bitMap.bitMapType FROM
    raster, sampled = > DoSingleImage [@bitMaps[i].bitMap, statePtr];
    form = > ERROR FatalError [[unImplementedObjectEntryType[]]];
    ENDCASE; « logo, other »

   ENDLOOP;

  statePtr.bitMapIndex <- bitMapListLength;

 }; « DoMultipleImages »

DoSingleImage: PROCEDURE [bitMap: BitMapPtr, statePtr: StatePtr] =
 {icsT, igT, neededT: Transformation.Matrix;

  -- image resampling service booleans.
  compressIt, decompressIt: BOOLEAN <- FALSE;
  postRotateIt: TransformAnalyzerOps.PostRotateType <- none;

  -- used by both irs and ics.
  icsIt, needsICS: BOOLEAN <- FALSE;

  compressOrient, gbdOrient,
  icsOrientSave: MRImageConversionService.ImageOrientation;
```

Copyright © 1992 Xerox Corporation All Rights Reserved

```
gbdScale: IMSTypes.ScalingParams;
passCount: LONG CARDINAL ← 0;
pixelSequence: RasterObjects.PixelSequence;
problem: CoalescerControl.Problem ← TRASH;
rdsError: BOOLEAN ← FALSE;
requiredTRaster: RasterDirectorySupervisor.ID;
resInfoPointer: RasterObjects.RESInfoPointer;
xFormInput: TransformAnalyzerOps.InputSpec;
xFormResults: TransformAnalyzerOps.TransformationResults ← [none, empty[]];
yPadLocal: CARDINAL ← 0;

bitMap.yPad ← bitMap.originXOffset ← bitMap.originYOffset ← 0;

statePtr.rasterOriginal ← statePtr.rasterFamily ← statePtr.rasterInterim ←
  RasterDirectorySupervisor.nullID;

IF (bitMap.id = RasterDirectorySupervisor.nullID)
THEN ERROR FatalError [[nullRasterID[]]];

statePtr.rasterOriginal ← bitMap.id;

[requiredTRaster, neededT, needsICS] ←
 RasterDirectorySupervisor.GetTransformedImage
  [currentRaster: statePtr.rasterOriginal,
   desiredTransformation: bitMap.transformation
  ! RasterDirectorySupervisor.Error =>
     {rdsError ← TRUE;
      problem ← [rasterDSError[fault: fault, faultID: faultID,
            rasterID: statePtr.rasterOriginal, code: 1]];
      CONTINUE}]; IF (rdsError) THEN ERROR FatalError[problem];

resInfoPointer ← RasterDirectorySupervisor.GetRESInfoPtr[id: requiredTRaster,
 needPBT: FALSE
 ! RasterDirectorySupervisor.Error =>
     {rdsError ← TRUE;
      problem ← [rasterDSError[fault: fault, faultID: faultID,
            rasterID: requiredTRaster, code: 2]];
      CONTINUE}]; IF (rdsError) THEN ERROR FatalError[problem];

pixelSequence ← resInfoPointer.maskImage.samples.pixelSequenceType;

RasterDirectorySupervisor.ReleaseRESInfoPtr [id: requiredTRaster
 ! RasterDirectorySupervisor.Error =>
     {rdsError ← TRUE;
      problem ← [rasterDSError[fault: fault, faultID: faultID,
            rasterID: requiredTRaster, code: 3]];
      CONTINUE}]; IF (rdsError) THEN ERROR FatalError[problem];

bitMap.id ← requiredTRaster;
xFormInput ← [inputXDim: bitMap.xPixel,
```

Copyright © 1992 Xerox Corporation All Rights Reserved

```
        inputYDim: bitMap.yPixel,
        pixelSequence: pixelSequence,
        sampledColor: IF (bitMap.bitMapType = sampled)
              THEN TRUE ELSE FALSE,
        t: neededT];

 IF (pixelSequence = packed)
 THEN {-- pad to 32 bit boundary
     bitMap.yPixel ← bitMap.yPixel +
         (yPadLocal ← (((bitMap.yPixel+31)/32)*32) - bitMap.yPixel);
   };

 -- find out what to do with the transformation.
 TransformAnalyzerOps.EvaluateT [@xFormInput, @xFormResults
 ! TransformAnalyzerOps.Error =>
    ERROR FatalError [
        SELECT code FROM
         arbitraryRotate      => [fullFormRaster[]],

         corruptResultsRec     => [genericSWError[1]],

         nonsenseTransformation => [genericSWError[2]],

         zeroAorEonZeroBandD   => [zeroAorEonZeroBandD[]],

         zeroBorDonZeroAandE   => [zeroBorDonZeroAandE[]],

         ENDCASE => [genericSWError[3]]]];

 WITH xFormResults SELECT FROM
   ig => igT ← t;

   singlePassGbd =>  {icsIt ← TRUE;
             icsOrientSave ← orientation;
            };

   multiplePassGbd => {icsIt ← TRUE;
             icsOrientSave ← orientation;
            };

   resampler =>     {icsIt ← TRUE;
             icsOrientSave ← orientation;
             icsT ← t;

             compressIt ← compress;
             decompressIt ← decompress;
             postRotateIt ← postRotate;
            };

   empty => ERROR FatalError[[genericSWError[4]]];
```

Copyright © 1992 Xerox Corporation All Rights Reserved

```
  ENDCASE = > ERROR FatalError[[genericSWError[5]]];

-- If we got a raster family id instead of the one from the table and
-- we have to ics it, then reference it to make sure it doesn't get deleted.
IF (icsIt AND requiredTRaster # statePtr.rasterOriginal)
THEN {RasterDirectorySupervisor.ReferenceRaster [id: requiredTRaster
     ! RasterDirectorySupervisor.Error = >
       {rdsError ← TRUE;
        problem ← [rasterDSError[fault: fault, faultID: faultID,
                   rasterID: requiredTRaster, code: 4]];
        CONTINUE}]; IF (rdsError) THEN ERROR FatalError[problem];

   statePtr.rasterFamily ← requiredTRaster;
   };

SELECT xFormResults.type FROM

 ig = > bitMap.transformation ← igT;

 -- RESAMPLER TASKS
 resampler = >
   {-- set up the postRotate for IRS Large Input
    SELECT postRotateIt FROM
     flip = > {compressIt ← TRUE;
          compressOrient ← icsOrientSave;

          -- get rid of minus signs for flips.
          icsT.a ← ABS[icsT.a];
          icsT.e ← ABS[icsT.e];

          TransformationOps.SetForm[@icsT];
         };

     ninety = > {compressIt ← TRUE;
           compressOrient ← icsOrientSave;

           -- set up IRS's transformation for no rotation.
           icsT.a ← ABS[icsT.d];
           icsT.e ← ABS[icsT.b];

           icsT.b ← icsT.d ← 0.0;

           TransformationOps.SetForm[@icsT];
          };

     ENDCASE = > compressOrient ← none;

    -- do the decompression if necessary
    IF (decompressIt)
```

Copyright © 1992 Xerox Corporation All Rights Reserved

```
THEN yPadLocal ← DoICS [task: decompression, orient: none,
            scale: CoalescerOps.IMSIdentityScale,
            t: Transformation.Identity,
            statePtr: statePtr, yPad: yPadLocal];

-- do the resampling
-- ME1.407: for output bitmaps smaller than 16x16, but with
--       power of 2 dimensions < 32 the resampler has to tile
--       the output to 16x16.
--       This call sets irs up for tiling.
--
SELECT xFormResults.inkwellType FROM
 special, specialDouble =>
   ImageResamplingService.SetUpResampler[];
 ENDCASE;

yPadLocal ← DoICS [task: resample, orient: none,
          scale: CoalescerOps.IMSIdentityScale,
          t: icsT, statePtr: statePtr, yPad: yPadLocal];

-- do the compression if necessary
IF (compressIt)
THEN yPadLocal ← DoICS [task: compression, orient: compressOrient,
            scale: CoalescerOps.IMSIdentityScale,
            t: Transformation.Identity,
            statePtr: statePtr, yPad: yPadLocal];
}; « RESAMPLER TASKS »

-- G-BOARD TASKS
singlePassGbd,
multiplePassGbd =>
 {xFlipped, rotated, deMagged: BOOLEAN;
 minScale: CARDINAL;

 -- if we have an inkwell, we must leave it as decompressed. ME1.406
 lastTask: DoICSTaskType ← IF (xFormResults.inkwellType = none)
             THEN normal ELSE decompression;

 -- get the information for the gBoard task
 [passCount, gbdOrient, gbdScale, icsT] ←
   CoalescerOps.SetUpPasses [@xFormResults];

 -- Must simplify if incoming raster is font mode tiled.
 -- The decompressors cannot mag tiles.
 -- PMS # 310105 Font Mode Not Supported at ME1
 IF (pixelSequence = font AND NOT(icsT = Transformation.Identity AND
                  gbdOrient = none AND
                gbdScale = CoalescerOps.IMSIdentityScale))
 THEN yPadLocal ← DoICS [task: normal, orient: none,
            scale: CoalescerOps.IMSIdentityScale,
```

Copyright © 1992 Xerox Corporation All Rights Reserved

```
            t: Transformation.Identity, statePtr: statePtr,
            yPad: yPadLocal];
--
-- Do this loop until there is one pass left, which is done post-loop.
-- That last pass is also the only pass for the singlePassGbd.
-- While in this loop no demags should be done.
--
UNTIL (passCount <= 1) -- gbdScale should always be [16, 16]
DO yPadLocal ← DoICS [task: normal, orient: gbdOrient,
           scale: CoalescerOps.IMSIdentityScale,
           t: icsT, statePtr: statePtr, yPad: yPadLocal];

  -- If rotated then simplify because the decompressor
  -- can't magnify input from Font Encoding Mode Rotates.
  -- PMS # 310105 Font Mode Not Supported at ME1
  -- Remember, while we are in this loop there is at least one
  -- more pass to do outside the loop.
  SELECT gbdOrient FROM
    rotate90, rotate270, mirrorTopToLeft, mirrorTopToRight =>
      yPadLocal ← DoICS [task: normal, orient: none,
              scale: CoalescerOps.IMSIdentityScale,
              t: Transformation.Identity,
              statePtr: statePtr, yPad: yPadLocal];
    ENDCASE;

  -- get the information for the next gBoard task
  [passCount, gbdOrient, gbdScale, icsT] ←
    CoalescerOps.SetUpPasses [@xFormResults];
  ENDLOOP;

-- This is the only place where demags should be done
-- PMS # 310134 DeMag XFlips Do Not Work.
-- PMS # 290558 Coalescer may scale to small for rotates
xFlipped ← SELECT gbdOrient FROM
        rotate270, rotate180,
        mirrorLeftToRight, mirrorTopToLeft => TRUE,
        ENDCASE => FALSE;

rotated ← SELECT gbdOrient FROM
        rotate90, rotate270,
        mirrorTopToLeft, mirrorTopToRight => TRUE,
        ENDCASE => FALSE;

deMagged ← IF (gbdScale = CoalescerOps.IMSIdentityScale)
      THEN FALSE ELSE TRUE;

minScale ← IF (System.switches['g] = down)
      THEN 8 ELSE 3;

-- demag & xflips or if scale is too small for rotate
```

Copyright © 1992 Xerox Corporation All Rights Reserved

```
    -- then do two separate passes.
    SELECT TRUE FROM
     (deMagged AND xFlipped),

     ((gbdScale.xScale < minScale OR
      gbdScale.yScale < minScale) AND rotated) =>

       {yPadLocal ← DoICS [task: normal, orient: none,
                   scale: gbdScale, t: icsT,
                   statePtr: statePtr, yPad: yPadLocal];

        yPadLocal ← DoICS [task: lastTask, orient: gbdOrient,
                   scale: CoalescerOps.IMSIdentityScale,
                   t: Transformation.Identity,
                   statePtr: statePtr, yPad: yPadLocal];
       };

     ENDCASE => yPadLocal ← DoICS [task: lastTask, orient: gbdOrient,
                     scale: gbdScale, t: icsT,
                     statePtr: statePtr, yPad: yPadLocal];
  }; « G-BOARD TASKS »

  ENDCASE => ERROR FatalError[[genericSWError[6]]];

  -- do the final set up of the coalescer table entry
  -- PMS # 290553, 290546, 290575
  bitMap.yPad ← yPadLocal;
  bitMap.yPixel ← bitMap.yPixel - bitMap.yPad;

  IF (icsIt)
  THEN {-- dereference the family id that was referenced up above
    IF (statePtr.rasterFamily # RasterDirectorySupervisor.nullID)
    THEN {
      -- note that requiredTRaster = statePtr.rasterFamily
      statePtr.rasterFamily ← RasterDirectorySupervisor.nullID;
      RasterDirectorySupervisor.DereferenceRaster [id: requiredTRaster
       ! RasterDirectorySupervisor.Error =>
        {rdsError ← TRUE;
        problem ← [rasterDSError[fault: fault, faultID: faultID,
               rasterID: requiredTRaster, code: 5]];
        CONTINUE}]; IF (rdsError) THEN ERROR FatalError[problem];
     };

    -- offset bit maps due to rotation and flips
    -- PMS # 290542 bitmaps in wrong positions
    [originXOffset: bitMap.originXOffset,
     originYOffset: bitMap.originYOffset] ← CoalescerOps.SetOffsets [
     orient: icsOrientSave, xPixel: bitMap.xPixel, yPixel: bitMap.yPixel];

    bitMap.transformation ← Transformation.Identity;
```

Copyright © 1992 Xerox Corporation All Rights Reserved

```
    -- done to avoid orphan rasters.
    statePtr.rasterInterim ← RasterDirectorySupervisor.nullID;
    RasterDirectorySupervisor.ResetRasterRefCount [bitMap.id, 0
     ! RasterDirectorySupervisor.Error = >
       {rdsError ← TRUE;
        problem ← [rasterDSError[fault: fault, faultID: faultID,
              rasterID: bitMap.id, code: 6]];
        CONTINUE}]; IF (rdsError) THEN ERROR FatalError[problem];
   };

  -- inkwell stuff for ME1.407
  {scale2: Transformation.Matrix =
       [a:2.0, e:2.0, b:0.0, d:0.0, c:0.0, f:0.0, form: integerScale];

   -- tell Post Parser that it has an inkwell
   IF (xFormResults.inkwellType # none) THEN bitMap.bitMapType ← other;

   -- set up for doubling and take care of any special pattern replication.
   SELECT xFormResults.inkwellType FROM
    double, specialDouble = > bitMap.transformation ← scale2;
    ENDCASE;
  };

  statePtr.rasterOriginal ← statePtr.rasterFamily ← statePtr.rasterInterim ←
    RasterDirectorySupervisor.nullID;
 }; « DoSingleImage »

FreeNameStrings: PROCEDURE [fonts: FontArrayPtr, fontListLength: CARDINAL,
 statePtr: StatePtr] =
 {p: FontPtr ← NIL;
  zone: UNCOUNTED ZONE = statePtr.zone;

  FOR i: CARDINAL IN [0..fontListLength)
  DO p ← @fonts[i];
    IF (p.authorityID # NIL) THEN zone.FREE[@p.authorityID];
    IF (p.charCodeID  # NIL) THEN zone.FREE[@p.charCodeID];
    IF (p.typeFaceID  # NIL) THEN zone.FREE[@p.typeFaceID];
    ENDLOOP;

 }; « FreeNameStrings »

« Converts the transformation into a pointSize and orienation »
GetPointSizeAndOrientation: PROCEDURE [fonts: FontArrayPtr,
  fontListLength: CARDINAL, statePtr: StatePtr]
  RETURNS [errorCount: CARDINAL ← 0] =

  {p: FontPtr ← NIL;
   t: Transformation.Matrix ← Transformation.Identity;
```

Copyright © 1992 Xerox Corporation All Rights Reserved

```
ReportError: PROCEDURE [problem: CoalescerControl.ProblemType] =
 {s: LONG STRING ← FontManager.MakeFamilyName [p.authorityID,
          p.charCodeID, p.typeFaceID, statePtr.zone];

  statePtr.callBack [context: statePtr.callBackContext,
          problem: [illegalFormFont[name: s]]];

  IF (s # NIL) THEN statePtr.zone.FREE[@s];

  p.pointSize ← 0;
  errorCount ← errorCount + 1;
 }; « ReportError »

errorCount ← 0;

FOR i: CARDINAL IN [0..fontListLength)
DO ENABLE Real.RealException = > ERROR FatalError[[realException[code: 0]]];

  p ← @fonts[i];
  t ← p.transformation;

  p.id ← p.subdirectory ← DirectoryType.nullObjectID;
  p.metricsFile ← RTOSFile.nullID;
  p.metricsPageOffset ← p.metricPageLength ← 0;
  p.requestedCCID ← p.availableCCID ← FontManager.MakeCCID[p.charCodeID];

  -- These RealFns are used to handle floating point errors that may
  -- cause equal point sizes for x & y dims to not appear equal.
  -- If a = 100 and e = 99.9999, we want to assume that they are equal and
  -- not to fault the job with 1313.
  --
  -- ME1.406 CR 140452: Skewed rounding for pointsize for .
  -- If the pointsize is within a pixel of X use X; otherwise, use X-1.
  --
  -- So add CoalescerOps.PointsPerDot and truncate.
  --
  -- Real.FixC[pixels*CoalescerOps.PointsPerDot + CoalescerOps.PointsPerDot]
  --
  -- is the same as Real.FixC[(pixels+1)*CoalescerOps.PointsPerDot]
  --
  SELECT TRUE FROM
   ((NOT RealFns.AlmostZero[t.a, CoalescerOps.Fuzz]) AND
      RealFns.AlmostEqual[t.e, t.a, CoalescerOps.Fuzz] AND
      RealFns.AlmostZero[t.b, CoalescerOps.Fuzz] AND
      RealFns.AlmostZero[t.d, CoalescerOps.Fuzz]) = >
    {p.pointSize ←
      MAX[1, Real.FixC[(ABS[t.a] + 1) * CoalescerOps.PointsPerDot]];
     p.orientation ← IF (t.a > 0.0) THEN portrait ELSE inversePortrait;
    };
```

Copyright © 1992 Xerox Corporation All Rights Reserved

```
((NOT RealFns.AlmostZero[t.b, CoalescerOps.Fuzz]) AND
    RealFns.AlmostEqual[t.d, -t.b, CoalescerOps.Fuzz] AND
    RealFns.AlmostZero[t.a, CoalescerOps.Fuzz] AND
    RealFns.AlmostZero[t.e, CoalescerOps.Fuzz]) =>
 {p.pointSize ←
    MAX[1, Real.FixC[(ABS[t.b] + 1) * CoalescerOps.PointsPerDot]];
  p.orientation ← IF (t.b > 0.0) THEN inverseLandscape ELSE landscape;
 };

ENDCASE => ReportError[illegalFormFont];

ENDLOOP;
}; « GetPointSizeAndOrientation »

HeapFull: ResMgrHeap.HeapFullProc =
 {ERROR FatalError [[resourceFault[0]]]};

PreventOrphanRasters: PROCEDURE [statePtr: StatePtr] =
 {IF (statePtr.rasterInterim # RasterDirectorySupervisor.nullID AND
    statePtr.rasterInterim # statePtr.rasterOriginal AND
    statePtr.rasterInterim # statePtr.rasterFamily)
  THEN {RasterDirectorySupervisor.DereferenceRaster [id: statePtr.rasterInterim
       ! RasterDirectorySupervisor.Error =>
         {statePtr.callBack[statePtr.callBackContext,
          [rasterDSError[fault: fault, faultID: faultID,
                 rasterID: statePtr.rasterInterim, code: 9]]];
         CONTINUE}];
    };

  IF (statePtr.rasterFamily # RasterDirectorySupervisor.nullID)
  THEN {RasterDirectorySupervisor.DereferenceRaster [id: statePtr.rasterFamily
       ! RasterDirectorySupervisor.Error =>
         {statePtr.callBack[statePtr.callBackContext,
          [rasterDSError[fault: fault, faultID: faultID,
                 rasterID: statePtr.rasterFamily, code: 10]]];
         CONTINUE}];
    };

  -- If rasterOriginal is NULL, then we don't have an active bitMap process.
  -- This next case deletes the bitMap supplied by IRS/ICS just now.
  -- we want to delete this one rather than save it because we don't know
  -- whether we were done with it or not. Assume not to be safe.
  IF (statePtr.rasterOriginal # RasterDirectorySupervisor.nullID)
  THEN {rID: RasterDirectorySupervisor.ID ←
         statePtr.lists.bitMaps.BASE[statePtr.bitMapIndex].bitMap.id;

     -- If ICS/IRS just supplied one, it won't equal any of these.
     -- If it does then, it is already taken care of.
     IF (rID # statePtr.rasterOriginal AND
       rID # statePtr.rasterFamily AND
```

Copyright © 1992 Xerox Corporation All Rights Reserved

```
      rID # statePtr.rasterInterim AND
      rID # RasterDirectorySupervisor.nullID)
    THEN {noError: BOOLEAN ← TRUE;

       -- ics refcount is 1, but irs refcount is 0,
       -- so force it to 1 to delete.
       RasterDirectorySupervisor.ResetRasterRefCount [rID, 1
        ! RasterDirectorySupervisor.Error = >
          {noError ← FALSE;
           statePtr.callBack[statePtr.callBackContext,
            [rasterDSError[fault: fault, faultID: faultID,
             rasterID: rID, code: 11]]];
           CONTINUE}];

       IF (noError) -- delete the raster
       THEN RasterDirectorySupervisor.DereferenceRaster [rID
           ! RasterDirectorySupervisor.Error = >
             {noError ← FALSE;
              statePtr.callBack[statePtr.callBackContext,
               [rasterDSError[fault: fault, faultID: faultID,
                rasterID: rID, code: 12]]];
              CONTINUE}];
      };
    };

  statePtr.rasterOriginal ← statePtr.rasterFamily ← statePtr.rasterInterim ←
    RasterDirectorySupervisor.nullID;
 }; « PreventOrphanRasters »

Ready: ENTRY PROCEDURE [statePtr: StatePtr] =
 {ENABLE UNWIND = > NULL;

  SELECT TRUE FROM
   (gState = NIL OR gState # statePtr) = > ERROR;
   (stateControl[coalesceReturns][gState.type] = error) = > ERROR;
   ENDCASE = > gState.type ← stateControl[coalesceReturns][gState.type];
 }; « Ready »

WaitForICS: ENTRY PROCEDURE [statePtr: StatePtr] =
 {ENABLE UNWIND = > NULL;

  IF (icsState = idle AND statePtr.type = running)
  THEN {icsState ← waiting;
     WHILE (icsState = waiting) DO WAIT wakeUp ENDLOOP;

     SELECT (icsState) FROM

     faulted = > {icsState ← idle;
          ERROR FatalError[[icsFaulted[]]];
          };
```

Copyright © 1992 Xerox Corporation All Rights Reserved

```
    abortPending => {icsState ← idle;
              ERROR FatalError[[invalidState[4]]];
              };

    ENDCASE => icsState ← idle;
   }

  ELSE ERROR FatalError[[invalidState[(IF (statePtr.type = abortPending)
                     THEN 4 ELSE 5)]]];
 }; « WaitForICS »

END.
```

Copyright © 1992 Xerox Corporation All Rights Reserved

```
-- File: CoalescerOpsImpl.mesa - last edit:

-- Copyright (C) 1989, 1990, 1991, 1992 by Xerox Corporation. All rights reserved.

DIRECTORY
  CoalescerOps USING [],
  TransformAnalyzerOps USING [MultiplePassGbdScale, TransformationResultsPtr],
  IMSTypes USING [CropParams, ScaleFactor, ScalingParams],
  MRImageConversionService USING [ImageOrientation],
  Real USING [RoundC],
  System USING [switches],
  Transformation USING [Identity, Matrix],
  TransformationOps USING [SetForm];

CoalescerOpsImpl: PROGRAM
  IMPORTS Real, System, TransformationOps
  EXPORTS CoalescerOps =
  BEGIN

  -- PROCEDURES --

  --
  -- Used to scale and descale cropParms & padParms in SetUpICS.
  -- PMS # 290553 Coalescer must compensate for G-Board scanline quantization
  -- PMS # 290546 Coalescer doesn't always handle packed pixel arrays correctly
  --
  ScaleIt: PROCEDURE [v: CARDINAL, numerator, denominator: CARDINAL, tScale: REAL]
       RETURNS [scaledV: CARDINAL] = INLINE
   {temp: LONG CARDINAL ← v;

    temp ← temp * Real.RoundC[ABS[tScale]] * numerator;
    scaledV ← CARDINAL[(temp + denominator - 1) / denominator];
   }; « ScaleIt »

  --
  -- SetOffsets must offset bit maps due to rotation and flips
  -- PMS # 290542 bitmaps in wrong positions
  --
  SetOffsets: PUBLIC PROCEDURE [orient: MRImageConversionService.ImageOrientation,
                  xPixel, yPixel: CARDINAL]
        RETURNS [originXOffset, originYOffset: CARDINAL] =
   {SELECT orient FROM
     rotate90 =>      {originXOffset ← xPixel;
                  originYOffset ← 0;
                 };

     rotate180 =>     {originXOffset ← xPixel;
                  originYOffset ← yPixel;
                 };
```

Copyright © 1992 Xerox Corporation All Rights Reserved

```
  rotate270 => {originXOffset ← 0;
            originYOffset ← yPixel;
            };

  mirrorLeftToRight => {originXOffset ← xPixel;
            originYOffset ← 0;
            };

  mirrorTopToLeft => {originXOffset ← xPixel;
            originYOffset ← yPixel;
            };

  mirrorTopToBottom => {originXOffset ← 0;
            originYOffset ← yPixel;
            };

  mirrorTopToRight => originXOffset ← originYOffset ← 0;

  ENDCASE => « none » originXOffset ← originYOffset ← 0;

}; « SetOffsets »

--
-- compensates for G Board idiosynchrocies & raw padding to 32 bits.
-- ICS always rounds down, ie crops the image,
-- Coalescer must always round up, ie pad the image. Can't lose image!!
-- G Board rules: output ylength >= 48 & MOD 16 on non rotated.
--        xlength >= 48 for font encoding or 128 for regular compressed
--        and MOD 16 for rotated (input x becomes output y).
--        On the rotated cases, must be sure that the x displacement
--        doesn't make too small of a tile in the 1st band either!
--
-- PMS # 290553 Coalescer must compensate for G-Board scanline quantization
-- PMS # 290546 Coalescer doesn't always handle packed pixel arrays correctly
--
SetUpICS: PUBLIC PROCEDURE [orient: MRImageConversionService.ImageOrientation,
            scale: IMSTypes.ScalingParams,
            t: Transformation.Matrix,
            cropParms: LONG POINTER TO IMSTypes.CropParams,
            yPad: CARDINAL, scanLineModulus: CARDINAL]
    RETURNS[newYPad: CARDINAL] =
 {scanLinesPerBand: CARDINAL = 256;
 temp: CARDINAL ← 0;

 -- Scale everything (crop displacements are always 0 at this point)
 cropParms.xLength ← ScaleIt[cropParms.xLength, scale.xScale, 16, t.a];
 cropParms.yLength ← ScaleIt[cropParms.yLength, scale.yScale, 16, t.e];

 yPad ← ScaleIt[yPad, scale.yScale, 16, t.e];
```

Copyright © 1992 Xerox Corporation All Rights Reserved

```
-- Start out by getting rid of the input padding.
-- Later on, we'll add the padding back in only where necessary.
cropParms.yLength ← cropParms.yLength - yPad;
yPad ← 0;

-- deal with the 48|128 pixel minimums and rounding UP to nearest MOD 16 y.
SELECT orient FROM
 -- These are no rotate (compression only) cases for the G-Board.
 none, rotate180, mirrorLeftToRight, mirrorTopToBottom =>
  {minimumScanlineLength: CARDINAL ← 48;

   IF (cropParms.yLength < minimumScanlineLength)
   THEN {yPad ← minimumScanlineLength - cropParms.yLength;
       cropParms.yLength ← minimumScanlineLength;
      }

   ELSE yPad ← 0;

   cropParms.yLength ← cropParms.yLength + (newYPad ←
    (((cropParms.yLength + scanLineModulus - 1) / scanLineModulus) *
     scanLineModulus) - cropParms.yLength);

   newYPad ← newYPad + yPad;
  };

 -- These are all rotate 90 cases for the G-Board. Old x become new y.
 ENDCASE => « rotate90, rotate270, mirrorTopToLeft, mirrorTopToRight »
  {denominator: CARDINAL = 16;
   maximumTileWidth: CARDINAL;
   minimumTileWidth: CARDINAL ← IF (System.switches['g] = down)
                    THEN 128 ELSE 48;
   longTemp: LONG CARDINAL ← scanLinesPerBand;


   -- get maximum tile width
   longTemp ← longTemp * scale.xScale;
   maximumTileWidth ← CARDINAL[longTemp / denominator];

   --
   -- ALIGN LEFT CROP EDGE
   -- NOTE: since there is one and only one rotate pass the
   --     x & y displacement will always be zero;
   --    so the left edge never needs aligning.
   --
   -- ALIGN RIGHT CROP EDGE
   --
   temp ← cropParms.xLength MOD maximumTileWidth;
   IF ((temp > 0) AND (temp < minimumTileWidth))
   THEN {temp ← minimumTileWidth - temp;
```

Copyright © 1992 Xerox Corporation All Rights Reserved

```
        cropParms.xLength ← cropParms.xLength + temp;
        yPad ← temp;
        temp ← minimumTileWidth;
        }

    ELSE yPad ← 0;

    cropParms.xLength ← cropParms.xLength + (newYPad ← (((temp +
     scanLineModulus - 1) / scanLineModulus) * scanLineModulus) - temp);

    newYPad ← newYPad + yPad;
   };

 -- UnDo the DEMAG portion of the scaling on the crop parms because
 -- ICS does the demag scaling of the crop parms.
 cropParms.xLength ← ScaleIt[cropParms.xLength, 16, scale.xScale, 1.0];
 cropParms.yLength ← ScaleIt[cropParms.yLength, 16, scale.yScale, 1.0];
 cropParms.xDisplacement←ScaleIt[cropParms.xDisplacement,16,scale.xScale,1.0];
 cropParms.yDisplacement←ScaleIt[cropParms.yDisplacement,16,scale.yScale,1.0];

}; « SetUpICS »

SetUpPasses: PUBLIC PROCEDURE [xFormResults:
                TransformAnalyzerOps.TransformationResultsPtr]
      RETURNS [passCount: LONG CARDINAL,
           gbdOrient: MRImageConversionService.ImageOrientation,
           gbdScale: IMSTypes.ScalingParams,
           gbdT: Transformation.Matrix] =

 {passCount ← 0;
  gbdOrient ← none;
  gbdScale ← [16, 16];
  gbdT ← Transformation.Identity;

  WITH xFormResults SELECT FROM
    multiplePassGbd => {passCount ← MAX[(x.passesAt2x + x.passesAt3x +
                     x.passesAt4x + x.passesAt5x +
                     x.passesAt6x + x.passesAt7x +
                     x.passesAt8x),
                    (y.passesAt2x + y.passesAt3x +
                     y.passesAt4x + y.passesAt5x +
                     y.passesAt6x + y.passesAt7x +
                     y.passesAt8x)];

             gbdOrient ← orientation;

             -- eliminate the orientationfrom subsequent passes.
             orientation ← none;

             IF (passCount <= 1) -- then on the last pass
```

Copyright © 1992 Xerox Corporation All Rights Reserved

```
THEN {gbdScale.xScale ← x.deMag;
   gbdScale.yScale ← y.deMag;

   -- eliminate deMag from subsequent passes.
   -- (there should be no more passes).
   x.deMag ← 16;
   y.deMag ← 16;
  }

ELSE gbdScale ← [16, 16];

SELECT TRUE FROM
x.passesAt8x > 0 => {gbdT.a ← 8.0;
          x.passesAt8x ← x.passesAt8x - 1;
          };

x.passesAt7x > 0 => {gbdT.a ← 7.0;
          x.passesAt7x ← x.passesAt7x - 1;
          };

x.passesAt6x > 0 => {gbdT.a ← 6.0;
          x.passesAt6x ← x.passesAt6x - 1;
          };

x.passesAt5x > 0 => {gbdT.a ← 5.0;
          x.passesAt5x ← x.passesAt5x - 1;
          };

x.passesAt4x > 0 => {gbdT.a ← 4.0;
          x.passesAt4x ← x.passesAt4x - 1;
          };

x.passesAt3x > 0 => {gbdT.a ← 3.0;
          x.passesAt3x ← x.passesAt3x - 1;
          };

x.passesAt2x > 0 => {gbdT.a ← 2.0;
          x.passesAt2x ← x.passesAt2x - 1;
          };

ENDCASE => gbdT.a ← 1.0;

SELECT TRUE FROM
y.passesAt8x > 0 => {gbdT.e ← 8.0;
          y.passesAt8x ← y.passesAt8x - 1;
          };

y.passesAt7x > 0 => {gbdT.e ← 7.0;
          y.passesAt7x ← y.passesAt7x - 1;
          };
```

Copyright © 1992 Xerox Corporation All Rights Reserved

```
            y.passesAt6x > 0 = > {gbdT.e ← 6.0;
                        y.passesAt6x ← y.passesAt6x - 1;
                       };

            y.passesAt5x > 0 = > {gbdT.e ← 5.0;
                        y.passesAt5x ← y.passesAt5x - 1;
                       };

            y.passesAt4x > 0 = > {gbdT.e ← 4.0;
                        y.passesAt4x ← y.passesAt4x - 1;
                       };

            y.passesAt3x > 0 = > {gbdT.e ← 3.0;
                        y.passesAt3x ← y.passesAt3x - 1;
                       };

            y.passesAt2x > 0 = > {gbdT.e ← 2.0;
                        y.passesAt2x ← y.passesAt2x - 1;
                       };

            ENDCASE = > gbdT.e ← 1.0;

            gbdT.b ← gbdT.d ← gbdT.c ← gbdT.f ← 0.0;

            -- If this pass is a 90 rotate
            -- swap x & y for subsequent passes.
            SELECT gbdOrient FROM
             rotate90, rotate270,
             mirrorTopToLeft, mirrorTopToRight = >
              {t: TransformAnalyzerOps.MultiplePassGbdScale ← x;
               x ← y;
               y ← t;
              };

             ENDCASE;
            };

   singlePassGbd = > {passCount ← 1;
           gbdOrient ← orientation;
           gbdScale.xScale ← x.deMag;
           gbdScale.yScale ← y.deMag;
           gbdT.a ← x.mag;
           gbdT.e ← y.mag;
           gbdT.b ← gbdT.d ← gbdT.c ← gbdT.f ← 0.0;
          };

   ENDCASE; -- should never happen, if so, use defaults.

  TransformationOps.SetForm[@gbdT];
```

Copyright © 1992 Xerox Corporation All Rights Reserved

```
}; « SetUpPasses »
END.
```

Copyright © 1992 Xerox Corporation All Rights Reserved

```
-- File: TransformAnalyzerOpsImpl.mesa - last edit:

-- Copyright (C) 1990, 1991 by Xerox Corporation. All rights reserved.

--
-- NOTE: There are several ENDCASE's that mean something good instead of an error.
--   This works for now, BUT Beware of this when making changes.
--
--   The next time someone edits this code for major changes, the ENDCASE's
--   should be changed to mean errors with appropriate arms added to handle
--   the good things that now fall into the ENDCASE's. This will require
--   changes to TransformAnalyzerOps and to CoalescerImpl.
--

DIRECTORY
 Environment USING [bitsPerWord],
 MemoryPartitions USING [GetStaticPages],
 MRImageConversionService USING [ImageOrientation],
 Real USING [FDiv, Fix, Float, RoundLI],
 ResMgrStorage USING [PagesFromWords, Pages],
 Transformation USING [Identity, Matrix, Rotate180, Rotate90, Rotate270, XFlip, YFlip],
 TransformAnalyzerOps USING [ErrorCode, InputSpecPtr, MultiplePassGbdScale,
ResultsType, SinglePassGbdScale, TransformationResults, TransformationResultsPtr],
 TransformationOps USING [SetForm];

TransformAnalyzerOpsImpl: PROGRAM
 IMPORTS MemoryPartitions, Real, ResMgrStorage, TransformationOps
 EXPORTS TransformAnalyzerOps =
 BEGIN

 forceCompression: BOOLEAN ← FALSE; -- debug variable
 forceResampler: BOOLEAN ← FALSE;  -- debug variable

 -- determines when input exceeds IRS allocations, must then force to G-Bd.
 maxRawInputSize: ResMgrStorage.Pages = MemoryPartitions.GetStaticPages [
  id: [trans: pageEdit, module: ics]];

 -- determines when to compress resampled output.
 maxRawOutputSize: ResMgrStorage.Pages = 400; -- according to team decision.
                    -- Rulli, Krist, Infortuna, Berger

 Error: PUBLIC ERROR [code: TransformAnalyzerOps.ErrorCode] = CODE;

 -- PROCEDURES --

 EvaluateResults: PROCEDURE [inputSpecPtr: TransformAnalyzerOps.InputSpecPtr,
     resultsPtr: TransformAnalyzerOps.TransformationResultsPtr,
     rotated: BOOLEAN]
     RETURNS [resample: BOOLEAN ← FALSE,
```

Copyright © 1992 Xerox Corporation All Rights Reserved

```
            inputSize: ResMgrStorage.Pages ← 0,
            outputSize: ResMgrStorage.Pages ← 0,
            expectedX, expectedY: LONG CARDINAL ← 0] =
{actualX, actualY, tempInputY: LONG CARDINAL ← 0;

 expectedX ← expectedY ← 0;

 -- Get EXPECTED results
 expectedX ← ScaleIt [c: inputSpecPtr.inputXDim,
           r: (IF (rotated)
             THEN inputSpecPtr.t.d ELSE inputSpecPtr.t.a)];

 expectedY ← ScaleIt [c: inputSpecPtr.inputYDim,
           r: (IF (rotated)
             THEN inputSpecPtr.t.b ELSE inputSpecPtr.t.e)];

 -- Get ACTUAL results
 WITH resultsPtr SELECT FROM
  ig => {actualX ← inputSpecPtr.inputXDim * ABS[Real.Fix[t.a]];
     actualY ← inputSpecPtr.inputYDim * ABS[Real.Fix[t.e]];
    };

  multiplePassGbd =>
    {[actualX] ← ScaleItMPG [c:inputSpecPtr.inputXDim, s:x];

     [actualY] ← ScaleItMPG [c:inputSpecPtr.inputYDim, s:y];
    };

  singlePassGbd =>
    {actualX ← ScaleIt [c: inputSpecPtr.inputXDim,
              r: (x.mag * Real.Float[x.deMag] / 16.0)];

     actualY ← ScaleIt [c: inputSpecPtr.inputYDim,
              r: (y.mag * Real.Float[y.deMag] / 16.0)];
    };

  ENDCASE => ERROR Error[code: corruptResultsRec];

 -- Do the Comparison to see if we need to resample
 resample ← IF (actualX = expectedX AND actualY = expectedY)
       THEN FALSE ELSE TRUE;

 -- Calculate the outputSize for use in the client.
 -- account for packed pixelSequence padding.
 outputSize ← ResMgrStorage.PagesFromWords [
  ((((expectedY + 31) / 32) * 32) / Environment.bitsPerWord) * expectedX];

 -- get the input size so we can make sure the input doesn't exceed memory.
 tempInputY ← ((inputSpecPtr.inputYDim + 31) / 32) * 32;
 inputSize ← ResMgrStorage.PagesFromWords [
```

Copyright © 1992 Xerox Corporation All Rights Reserved

```
   (tempInputY / Environment.bitsPerWord) * inputSpecPtr.inputXDim];
  }; « EvaluateResults »

EvaluateScale: PROCEDURE [scale: REAL]
 RETURNS [multiPass: TransformAnalyzerOps.MultiplePassGbdScale] =
 {factor: LONG CARDINAL ← 2;
 originalResult, result: LONG CARDINAL ← ABS[Real.RoundLI[scale * 16.0]];
 done: BOOLEAN ← FALSE;
 count: CARDINAL;

 -- if scale <= 1/16 then set & RETURN.
 IF (result <= 1)
 THEN {multiPass ← [0, 0, 0, 0, 0, 0, 0, 1]; RETURN;};

 -- do the factoring
 UNTIL (done)
 DO IF ((factor ← GetFactor[scale: result, factor: factor]) = 1)
   THEN {-- If we can't factor this, then subtract 1 from it until we can
       result ← originalResult ← originalResult + 1;
       multiPass ← [0, 0, 0, 0, 0, 0, 0, 16];
       factor ← 2;
      }

   ELSE {[result: result, count: count] ← Factor [scale: result,
                          factor: factor];

       SELECT factor FROM
        2 => multiPass.passesAt2x ← count;
        3 => multiPass.passesAt3x ← count;
        5 => multiPass.passesAt5x ← count;
        ENDCASE « 7 » => multiPass.passesAt7x ← count;

       SELECT result FROM
        1, 11, 13 => done ← TRUE;
        ENDCASE;
      };

   ENDLOOP;

 --
 -- remove the largest factor of 16 possible.
 --
 SELECT TRUE FROM
  (result # 1) => multiPass.deMag ← CARDINAL[result]; -- 11 or 13

  (multiPass.passesAt2x >= 4) =>
      {multiPass.deMag ← 16;
       multiPass.passesAt2x ← multiPass.passesAt2x - 4;
      };
```

Copyright © 1992 Xerox Corporation All Rights Reserved

```
(multiPass.passesAt3x >= 1 AND multiPass.passesAt5x >= 1) =>
     {multiPass.deMag ← 15;
      multiPass.passesAt3x ← multiPass.passesAt3x - 1;
      multiPass.passesAt5x ← multiPass.passesAt5x - 1;
     };

(multiPass.passesAt2x >= 1 AND multiPass.passesAt7x >= 1) =>
     {multiPass.deMag ← 14;
      multiPass.passesAt2x ← multiPass.passesAt2x - 1;
      multiPass.passesAt7x ← multiPass.passesAt7x - 1;
     };

(multiPass.passesAt2x >= 2 AND multiPass.passesAt3x >= 1) =>
     {multiPass.deMag ← 12;
      multiPass.passesAt2x ← multiPass.passesAt2x - 2;
      multiPass.passesAt3x ← multiPass.passesAt3x - 1;
     };

(multiPass.passesAt2x >= 1 AND multiPass.passesAt5x >= 1) =>
     {multiPass.deMag ← 10;
      multiPass.passesAt2x ← multiPass.passesAt2x - 1;
      multiPass.passesAt5x ← multiPass.passesAt5x - 1;
     };

(multiPass.passesAt3x >= 2) =>
     {multiPass.deMag ← 9;
      multiPass.passesAt3x ← multiPass.passesAt3x - 2;
     };

(multiPass.passesAt2x >= 3) =>
     {multiPass.deMag ← 8;
      multiPass.passesAt2x ← multiPass.passesAt2x - 3;
     };

(multiPass.passesAt7x >= 1) =>
     {multiPass.deMag ← 7;
      multiPass.passesAt7x ← multiPass.passesAt7x - 1;
     };

(multiPass.passesAt2x >= 1 AND multiPass.passesAt3x >= 1) =>
     {multiPass.deMag ← 6;
      multiPass.passesAt2x ← multiPass.passesAt2x - 1;
      multiPass.passesAt3x ← multiPass.passesAt3x - 1;
     };

(multiPass.passesAt5x >= 1) =>
     {multiPass.deMag ← 5;
      multiPass.passesAt5x ← multiPass.passesAt5x - 1;
     };
```

Copyright © 1992 Xerox Corporation All Rights Reserved

```
 (multiPass.passesAt2x >= 2) =>
      {multiPass.deMag ← 4;
       multiPass.passesAt2x ← multiPass.passesAt2x - 2;
      };

 (multiPass.passesAt3x >= 1) =>
      {multiPass.deMag ← 3;
       multiPass.passesAt3x ← multiPass.passesAt3x - 1;
      };

 (multiPass.passesAt2x >= 1) =>
      {multiPass.deMag ← 2;
       multiPass.passesAt2x ← multiPass.passesAt2x - 1;
      };

 ENDCASE => multiPass.deMag ← 1;

--
-- now coalesce counts into minimum number of passes.
--
WHILE (multiPass.passesAt2x >= 3)
DO multiPass.passesAt8x ← multiPass.passesAt8x + 1;
  multiPass.passesAt2x ← multiPass.passesAt2x - 3;
  ENDLOOP;

WHILE (multiPass.passesAt2x >= 1 AND multiPass.passesAt3x >= 1)
DO multiPass.passesAt6x ← multiPass.passesAt6x + 1;
  multiPass.passesAt2x ← multiPass.passesAt2x - 1;
  multiPass.passesAt3x ← multiPass.passesAt3x - 1;
  ENDLOOP;

WHILE (multiPass.passesAt2x >= 2)
DO multiPass.passesAt4x ← multiPass.passesAt4x + 1;
  multiPass.passesAt2x ← multiPass.passesAt2x - 2;
  ENDLOOP;
}; « EvaluateScale »

EvaluateT: PUBLIC PROCEDURE [inputSpecPtr: TransformAnalyzerOps.InputSpecPtr,
          resultsPtr: TransformAnalyzerOps.TransformationResultsPtr] =
 {gbdOrient: MRImageConversionService.ImageOrientation ← none;
 rotated: BOOLEAN ← FALSE;
 t: Transformation.Matrix ← inputSpecPtr.t;
 xMag, yMag: REAL ← 1.0;
 xScale, yScale: TransformAnalyzerOps.MultiplePassGbdScale;

 -- Plan for a G-Board operation,
 -- then do tests to see if it should be resampled

 -- determine the orientation
 SELECT TRUE FROM
```

Copyright © 1992 Xerox Corporation All Rights Reserved

```
 (t.a = 0.0 AND t.e = 0.0 AND (t.b = 0.0 OR t.d = 0.0)) = >
   ERROR Error[code: zeroBorDonZeroAandE];

 (t.b = 0.0 AND t.d = 0.0 AND (t.a = 0.0 OR t.e = 0.0)) = >
   ERROR Error[code: zeroAorEonZeroBandD];

 (t.a # 0.0 AND t.e # 0.0 AND (t.b # 0.0 OR t.d # 0.0)),
 (t.b # 0.0 AND t.d # 0.0 AND (t.a # 0.0 OR t.e # 0.0)) = >
   ERROR Error[code: arbitraryRotate];

 (t.a < 0.0 AND t.e < 0.0) = > gbdOrient ← rotate180;
 (t.a < 0.0 AND t.e > 0.0) = > gbdOrient ← mirrorLeftToRight;
 (t.a > 0.0 AND t.e < 0.0) = > gbdOrient ← mirrorTopToBottom;
 (t.a > 0.0 AND t.e > 0.0) = > gbdOrient ← none;

 (t.b < 0.0 AND t.d < 0.0) = > {gbdOrient ← mirrorTopToLeft; rotated ← TRUE};
 (t.b < 0.0 AND t.d > 0.0) = > {gbdOrient ← rotate90; rotated ← TRUE};
 (t.b > 0.0 AND t.d < 0.0) = > {gbdOrient ← rotate270; rotated ← TRUE};
 (t.b > 0.0 AND t.d > 0.0) = > {gbdOrient ← mirrorTopToRight; rotated ←TRUE};

 ENDCASE = > ERROR Error[code: nonsenseTransformation];

-- determine the scaling
SELECT TRUE FROM
 (rotated) = > {xScale ← EvaluateScale [scale: t.d];
        yScale ← EvaluateScale [scale: t.b];
        };

 -- NOT rotated
 ENDCASE = > {xScale ← EvaluateScale [scale: t.a];
       yScale ← EvaluateScale [scale: t.e];
       };

-- set up the results record
SELECT TRUE FROM
 -- SINGLE PASS
 (((xScale.passesAt2x + xScale.passesAt3x + xScale.passesAt4x +
  xScale.passesAt5x + xScale.passesAt6x + xScale.passesAt7x +
  xScale.passesAt8x) < = 1) AND
 ((yScale.passesAt2x + yScale.passesAt3x + yScale.passesAt4x +
  yScale.passesAt5x + yScale.passesAt6x + yScale.passesAt7x +
  yScale.passesAt8x) < = 1)) = >
   {xMag ← SELECT TRUE FROM
        (xScale.passesAt2x # 0) = > 2.0,
        (xScale.passesAt3x # 0) = > 3.0,
        (xScale.passesAt4x # 0) = > 4.0,
        (xScale.passesAt5x # 0) = > 5.0,
        (xScale.passesAt6x # 0) = > 6.0,
        (xScale.passesAt7x # 0) = > 7.0,
        (xScale.passesAt8x # 0) = > 8.0,
```

Copyright © 1992 Xerox Corporation All Rights Reserved

```
        ENDCASE => 1.0;

    yMag ← SELECT TRUE FROM
        (yScale.passesAt2x # 0) => 2.0,
        (yScale.passesAt3x # 0) => 3.0,
        (yScale.passesAt4x # 0) => 4.0,
        (yScale.passesAt5x # 0) => 5.0,
        (yScale.passesAt6x # 0) => 6.0,
        (yScale.passesAt7x # 0) => 7.0,
        (yScale.passesAt8x # 0) => 8.0,
        ENDCASE => 1.0;

    SELECT TRUE FROM
     (inputSpecPtr.sampledColor AND
      (SELECT TRUE FROM
        xMag # 1.0,
        yMag # 1.0,
        inputSpecPtr.pixelSequence # packed => TRUE,
        ENDCASE => FALSE)),

     rotated,
     xScale.deMag # 16,
     yScale.deMag # 16,
     inputSpecPtr.pixelSequence = font =>
       {-- gotta gbd it
       resultsPtr↑ ← [none, singlePassGbd[orientation: gbdOrient,
                          x: [mag: REAL[xMag],
                            deMag: xScale.deMag],
                          y: [mag: REAL[yMag],
                            deMag: yScale.deMag]]];

       };

     ENDCASE =>
       {-- can ig it
       t.a ← REAL[xMag];
       t.e ← REAL[yMag];
       t.b ← t.c ← t.d ← t.f ← 0.0;

       SELECT gbdOrient FROM
        rotate180 => {t.a ← -t.a; t.e ← -t.e};
        mirrorLeftToRight => t.a ← -t.a;
        mirrorTopToBottom => t.e ← -t.e;
        ENDCASE; -- none

       TransformationOps.SetForm[@t];
       resultsPtr↑ ← [none, ig[t: t]];
       };
    };
```

Copyright © 1992 Xerox Corporation All Rights Reserved

```
  -- MULTIPLE PASS
  ENDCASE => resultsPtr↑ ← [none, multiplePassGbd[orientation: gbdOrient,
                      x: xScale, y: yScale]];

 -- Do final set up for resampling and inkwells
 SetUpResult [inputSpecPtr: inputSpecPtr, orientation: gbdOrient,
       resultsPtr: resultsPtr, rotated: rotated];
}; « EvaluateT »

Factor: PROCEDURE [scale, factor: LONG CARDINAL]
    RETURNS [result: LONG CARDINAL, count: CARDINAL ← 0] =
 {done: BOOLEAN ← FALSE;

 result ← scale;

 UNTIL (done)
 DO IF (result MOD factor # 0)
   THEN done ← TRUE

   ELSE {result ← result / factor;

      count ← count + 1;
      SELECT result FROM
       1, 11, 13 => done ← TRUE;
       ENDCASE;
      };
  ENDLOOP;
}; « Factor »

GetFactor: PROCEDURE [scale, factor: LONG CARDINAL]
 RETURNS [newFactor: LONG CARDINAL] =
 {UNTIL (scale MOD factor = 0 OR factor = 1)
 DO factor ← SELECT factor FROM
         2 => 3,
         3 => 5,
         5 => 7,
         ENDCASE => 1;
   ENDLOOP;

 newFactor ← factor;
 }; « GetFactor »

MyPow: PROCEDURE [b, e: CARDINAL] RETURNS [result: CARDINAL ← 1] = INLINE
 {FOR i: CARDINAL IN [1..e] DO result ← result * b ENDLOOP};

SetUpResult: PROCEDURE [inputSpecPtr: TransformAnalyzerOps.InputSpecPtr,
       orientation: MRImageConversionService.ImageOrientation,
       resultsPtr: TransformAnalyzerOps.TransformationResultsPtr,
       rotated: BOOLEAN] =
 {resample: BOOLEAN ← FALSE;
```

Copyright © 1992 Xerox Corporation All Rights Reserved

```
inputSize: ResMgrStorage.Pages ← 0;
outputSize: ResMgrStorage.Pages ← 0;
xOut, yOut: LONG CARDINAL ← 0;

[resample, inputSize, outputSize, xOut, yOut] ←
  EvaluateResults [inputSpecPtr, resultsPtr, rotated];

-- Can we take advantage of IG inkwells? ME1.407
IF (inputSpecPtr.sampledColor)
THEN SetUpInkWell[(inputSpecPtr.pixelSequence = packed),
          xOut, yOut, resultsPtr];

-- If we have an inkwell and an orientation component is 90 degrees,
-- then we should resample it. At worst it will be a pass to decompress
-- and a pass to resample. With the gbd it would have always been 2 passes:
-- a pass to rotate and a pass to get it out of font encoding mode.
-- Note: special and specialDouble inkwell types require resampling because
-- of the special tiling that is required. ME1.407
--
resample ← (resample OR (SELECT resultsPtr.inkwellType FROM
                -- use current resample boolean for non-inkwells
                none = > FALSE,

                -- must resample to be efficient for 90 rotates
                double, normal = > rotated,

                -- must resample to do the required tiling.
                ENDCASE = > TRUE « special, specialDouble »));

SELECT TRUE FROM
 resample, forceResampler = >
  {-- set up the resampler task.
   topToLeft: Transformation.Matrix =
    [a: 0, b: -1, c: 0, d: -1, e: 0, f: 0, form: swapNegateXY];

   topToRight: Transformation.Matrix =
    [a: 0, b: 1, c: 0, d: 1, e: 0, f: 0, form: swapXY];

   resultsPtr ↑ ← [resultsPtr.inkwellType, resampler[
     compress:   (outputSize > maxRawOutputSize OR forceCompression),

     decompress:  (NOT (inputSpecPtr.pixelSequence = packed)),

     orientation: orientation,

     -- ME1.403 for IRS large input.
     postRotate:   SELECT TRUE FROM
            (inputSize < = maxRawInputSize) = > none,

            (orientation = none) = > none, -- no rotate at all
```

Copyright © 1992 Xerox Corporation All Rights Reserved

```
            (rotated) => ninety, -- a 90 degree component

            ENDCASE => flip, -- a flip component only

      -- we will do the doubling with IG inkwell doubling.
      -- so get rid of the scaling. ME1.407
      t: SELECT resultsPtr.inkwellType FROM
         double, specialDouble =>
          SELECT orientation FROM
           none =>          Transformation.Identity,
           mirrorLeftToRight => Transformation.XFlip,
           mirrorTopToBottom => Transformation.YFlip,
           rotate180 =>      Transformation.Rotate180,
           mirrorTopToLeft => topToLeft,
           rotate90 =>       Transformation.Rotate90,
           rotate270 =>      Transformation.Rotate270,
           mirrorTopToRight => topToRight,
           ENDCASE =>        ERROR Error[code:corruptResultsRec],

         ENDCASE => inputSpecPtr.t]];
    };

  ENDCASE;

 -- otherwise, ok to use G-Bd or IG
}; « SetUpResult »

SetUpInkWell: PROCEDURE [packed: BOOLEAN, xOut, yOut: LONG CARDINAL,
      resultsPtr: TransformAnalyzerOps.TransformationResultsPtr] =
{-- set up for inkwell, if possible.
 doubleGBd: TransformAnalyzerOps.SinglePassGbdScale=[mag:2.0,deMag:16];
 singleGBd: TransformAnalyzerOps.SinglePassGbdScale=[mag:1.0,deMag:16];
 doubled: BOOLEAN =
   WITH resultsPtr SELECT FROM
     ig => FALSE, -- the only way ig could get here is on identity
     singlePassGbd => (x=doubleGBd AND y=doubleGBd),
     multiplePassGbd => FALSE,
     ENDCASE => ERROR Error[code: corruptResultsRec];
 --
 -- none = not an inkwell candidate.
 --
 -- normal = 16x16 inkwell.
 --
 -- double = 32x32 inkwell with scale=2, so make scale=1 & use inkwell double.
 --
 -- special = can be made into a 16x16 w/o doubling,
 --        but at least one of the dimensions is a power of 2 < 16,
 --        so we need to do some repeating (tiling not scaling)
 --       of the pattern to get that(those) dimension(s) = 16.
```

Copyright © 1992 Xerox Corporation All Rights Reserved

```
--
-- specialDouble = same as special except that scale=2 and
--          1 of the dimensions is 32.
--
-- note that special and specialDouble require resampling.
--
resultsPtr.inkwellType ← SELECT TRUE FROM
 -- xOut and yOut must be a power of 2 <= 32
 (SELECT xOut FROM 1,2,4,8,16,32 => FALSE, ENDCASE => TRUE) => none,
 (SELECT yOut FROM 1,2,4,8,16,32 => FALSE, ENDCASE => TRUE) => none,

 (xOut = 16 AND yOut = 16) => normal,

 (doubled AND xOut = 32 AND yOut = 32) => double,

 (doubled AND xOut = 32) => specialDouble,

 (doubled AND yOut = 32) => specialDouble,

 (xOut < 32 AND yOut < 32) => special,

 ENDCASE => none;
--
-- The purpose of this select statement is to set the results record
-- to use Identity IG scaling or Identity GBd scaling based on the following:
--
-- (1), note that the only way double or specialDouble could be set is
-- if the results type initially was singlePassGbd. This is because
-- double and specialDouble can only be set if the scaling was exactly 2.
-- Normally, a scale of exactly 2 would go through the IGs, but because
-- this is a "sampled" bitmap, EvaluateT[] would force it through the Gbd
-- because a nonInkWell "sampled" bitmap cannot be scaled by the IGs. We
-- have just now determined that it can be used as an inkwell, so now we
-- want to set it up for the IGs, if possible...
--
-- (2), if the orientation is not none, then we cannot use the IGs.
-- (3), if the incoming bitmap is not packed we cannot use the IGs,
-- because the post parser is expecting the bit map to be in packed
-- form to read into its in-memory inkwell bitmap array; therefore,
-- we must use the Gbd to decompress it.
--
-- If the results type is not singlePassGbd, something is wrong.
--
-- If the orientation = none AND the input bitmap is packed, we don't
-- need to process it so set it up for IG Identity.
--
-- If the orientation # none OR the input bitmap is not packed, then
-- it needs to be processed by IRS or ICS so for now set the
-- x & y scale of the singlePassGbd varient arm to be an identity scale.
-- The decision to use IRS or not is follows in SetUpResults[].
```

Copyright © 1992 Xerox Corporation All Rights Reserved

```
–
SELECT resultsPtr.inkwellType FROM
  double, specialDouble = >
    {WITH resultsPtr SELECT FROM
      singlePassGbd = > IF (orientation = none AND packed)
              THEN resultsPtr ↑ ← [resultsPtr.inkwellType,
                     ig[Transformation.Identity]]

              ELSE x ← y ← singleGBd; -- set to identity.

      ENDCASE = >      ERROR Error[code: corruptResultsRec];
    };

  ENDCASE;
}; « SetUpInkWell: added ME1.407 »

ScaleIt: PROCEDURE [c: CARDINAL, r: REAL]
    RETURNS [result: LONG CARDINAL] = INLINE
 {result ← ABS[Real.RoundLI[Real.Float[c] * r]]};

ScaleItMPG: PROCEDURE [c: CARDINAL,
            s: TransformAnalyzerOps.MultiplePassGbdScale]
      RETURNS [result: LONG CARDINAL] = INLINE
 {temp: CARDINAL ← MyPow[b: 2, e: s.passesAt2x] *
          MyPow[b: 3, e: s.passesAt3x] *
          MyPow[b: 4, e: s.passesAt4x] *
          MyPow[b: 5, e: s.passesAt5x] *
          MyPow[b: 6, e: s.passesAt6x] *
          MyPow[b: 7, e: s.passesAt7x] *
          MyPow[b: 8, e: s.passesAt8x];

 result ← ScaleIt [c: temp * c, r: Real.FDiv[Real.Float[s.deMag], 16.0]];
 }; « ScaleItMPG »

END.
```

Copyright © 1992 Xerox Corporation All Rights Reserved

```
DIRECTORY
 BlockStream USING [Block, nullBlock, StreamHandle],
 DecomposerCommon USING [
  ID, ImagerDeviceProperties, nullID, OrientedImagingPropsArray],
 IIPGen USING [defaultMedia, LockProc],
 Image USING [black, Color],
 JobBackUp USING [LockID, nullLockID],
 PublicPrinting USING [Plex],
 ResMgrIDs USING [TransactionID],
 System USING [gmtEpoch, GreenwichMeanTime];

IIPGenInternal: DEFINITIONS =
 BEGIN

 Handle: TYPE = LONG POINTER TO Object ← NIL;

 Object: PUBLIC TYPE = RECORD [
  bsH: BlockStream.StreamHandle,
  block: BlockStream.Block ← BlockStream.nullBlock,
  blockLength: LONG CARDINAL ← 0,
  needBlock: BOOLEAN ← TRUE,
  copyCount: CARDINAL,
  imagerDeviceProps: DecomposerCommon.ImagerDeviceProperties ← TRASH,
  propsDesc: DecomposerCommon.OrientedImagingPropsArray ← TRASH,
  color: Image.Color ← Image.black,
  plex: PublicPrinting.Plex ← simplex,
  sheet: LONG CARDINAL ← 0,
  mediaIndex: CARDINAL ← IIPGen.defaultMedia,
  rotate180: BOOLEAN ← FALSE,
  pageID: DecomposerCommon.ID ← DecomposerCommon.nullID,
  blockQ: BlockQueue ← [],
  p: PROCESS ← TRASH,
  lockID: JobBackUp.LockID ← JobBackUp.nullLockID,
  relock: IIPGen.LockProc ← TRASH,
  jobLocked: BOOLEAN ← FALSE,
  time: System.GreenwichMeanTime ← System.gmtEpoch,
  transID: ResMgrIDs.TransactionID];

 BlockQueue: TYPE = RECORD [
  blockAvail: CONDITION,
  blockTransmit: CONDITION,
  destroy: BOOLEAN ← FALSE,
  head: QBlockPtr ← NIL,
  tail: QBlockPtr ← NIL];

 QBlockPtr: TYPE = LONG POINTER TO QBlock;
 QBlock: TYPE = RECORD [
  next: QBlockPtr ← NIL, block: BlockStream.Block ← BlockStream.nullBlock];
```

Copyright © 1992 Xerox Corporation All Rights Reserved

```
z: UNCOUNTED ZONE;

AddBlockToQ: PROCEDURE [iipH: Handle, block: BlockStream.Block];
PutToken: PROCEDURE [iipH: Handle, token: LONG POINTER, size: LONG CARDINAL];
END.
```

Copyright © 1992 Xerox Corporation All Rights Reserved

```
DIRECTORY
 BlockStream USING [Block, Object, nullBlock, StreamHandle],
 DecomposerCommon USING [
  ID, ImagerDeviceProperties, Orientation, OrientedImagingPropsArray,
  PassCommand, SegmentCommand],
 DirectoryID USING [ObjectID],
 Heap USING [Create, Prune],
 IIPFragMgrPrivate USING [SendFrag],
 IIPGen USING [defaultMedia, ErrorCode, LockProc],
 IIPGenCallBack USING [ReportProblem],
 IIPGenInternal USING [Object, PutToken, QBlock, QBlockPtr],
 IIPGenTypes,
 Image USING [
  Handle, GetIpFragmentAttributes, GetObjectData, GetRasterAttributes,
  ObjectData],
 Inline USING [LongCOPY],
 InternalIP USING [BeginSegment, CoalesceResultsEntry, Token],
 JobQ USING [UnlockJob],
 JobBackUp USING [LockID],
 PublicPrinting USING [black, Plex],
 RasterDirectorySupervisor USING [Error, GetRESInfoPtr, ID, ReleaseRESInfoPtr],
 RasterObjects USING [RESInfoPointer],
 Real USING [FixI],
 ResMgr USING [Error],
 ResMgrIDs USING [TransactionID],
 Transformation USING [Matrix],
 System USING [GetGreenwichMeanTime];

IIPGenImplA: MONITOR
 IMPORTS
  Heap, IIPFragMgrPrivate, IIPGenCallBack, IIPGenInternal, Image, Inline, JobQ,
  RasterDirectorySupervisor, Real, ResMgr, System
 EXPORTS IIPGen, IIPGenInternal, IIPGenTypes =
 BEGIN

 bLength: CARDINAL = 512;

 Handle: TYPE = LONG POINTER TO Object ← NIL;
 Object: PUBLIC TYPE = IIPGenInternal.Object;

 Error: PUBLIC ERROR [code: IIPGen.ErrorCode] = CODE;
 z: PUBLIC UNCOUNTED ZONE ← NIL;
```

Copyright © 1992 Xerox Corporation All Rights Reserved

```
AddBlockToQ: PUBLIC ENTRY PROCEDURE [iipH: Handle, block: BlockStream.Block] = {
 ENABLE UNWIND => NULL;
 qBlockPtr: IIPGenInternal.QBlockPtr ← z.NEW[
  IIPGenInternal.QBlock ← [next: NIL, block: block]];
 IF iipH.blockQ.head = NIL THEN iipH.blockQ.head ← iipH.blockQ.tail ← qBlockPtr
 ELSE iipH.blockQ.tail ← iipH.blockQ.tail.next ← qBlockPtr;
 NOTIFY iipH.blockQ.blockAvail};


AbortBuffers: PUBLIC PROCEDURE [iipH: Handle] = {
 IF iipH = NIL THEN ERROR Error[invalidIIPHandle];
 ReturnBlocks[iipH: iipH];
 iipH.bsH.setAbort[sH: iipH.bsH]};


Create: PUBLIC PROCEDURE [
 bsH: BlockStream.StreamHandle, transID: ResMgrIDs.TransactionID,
 copyCount: CARDINAL] RETURNS [iipH: Handle] = {
 sH: LONG POINTER TO BlockStream.Object ← LOOPHOLE[bsH];
 IF bsH = NIL THEN ERROR Error[invalidIIPHandle];
 IF z = NIL THEN z ← Heap.Create[initial: 2, increment: 1, maxSize: 24];
 iipH ← z.NEW[Object ← [bsH: bsH, copyCount: copyCount, transID: transID]];
 sH.bufPtr ← LOOPHOLE[iipH];
 iipH.p ← FORK TransmitBlock[iipH: iipH]};


Destroy: PUBLIC PROCEDURE [iipH: Handle] = {
 sH: LONG POINTER TO BlockStream.Object ← LOOPHOLE[iipH.bsH];
 IF iipH = NIL THEN ERROR Error[invalidIIPHandle];
 NotifyDestroy[iipH: iipH];
 JOIN iipH.p;
 z.FREE[@iipH];
 Heap.Prune[z: z]};


EncodeImage: PUBLIC PROCEDURE [
 iipH: Handle, rasterID: RasterDirectorySupervisor.ID,
 t: Transformation.Matrix, plex: PublicPrinting.Plex,
 pageID: DecomposerCommon.ID] = {
 IF iipH = NIL THEN ERROR Error[invalidIIPHandle];
 DoImage[
  iipH: iipH, rasterID: rasterID, partOfLogo: FALSE, xMag: Real.FixI[t.a],
  yMag: Real.FixI[t.e], plex: plex, pageID: pageID]};


EncodeObject: PUBLIC PROCEDURE [
 iipH: Handle, image: Image.Handle, lockID: JobBackUp.LockID,
 orientation: DecomposerCommon.Orientation, relock: IIPGen.LockProc,
 plex: PublicPrinting.Plex, pageID: DecomposerCommon.ID] =
 BEGIN
```

Copyright © 1992 Xerox Corporation All Rights Reserved

```
ENABLE UNWIND => {iipH.jobLocked ← FALSE};

object: Image.ObjectData;
xMag: INTEGER;
yMag: INTEGER;

iipH.jobLocked ← TRUE;
object ← Image.GetObjectData[
 object: image, location: [item: job[lockID: lockID]]];
xMag ← Real.FixI[object.t.a];
yMag ← Real.FixI[object.t.e];
IF iipH = NIL THEN ERROR Error[invalidIIPHandle];
iipH.lockID ← lockID;
iipH.relock ← relock;
iipH.rotate180 ← FALSE;
SELECT orientation FROM
 none => {};
 rotate90 => {};
 rotate180, rotate270 => {xMag ← -xMag; yMag ← -yMag};
 mirrorLeftToRight, mirrorTopToLeft => {xMag ← -xMag};
 mirrorTopToBottom, mirrorTopToRight => {yMag ← -yMag};
 ENDCASE => ERROR;
SELECT object.objectType FROM
 raster =>
  DoImage[
   iipH: iipH, partOfLogo: object.partOfLogo,
   rasterID: Image.GetRasterAttributes[
   object: image, location: [item: job[lockID: lockID]]].rasterID,
   xMag: xMag, yMag: yMag, plex: plex, pageID: pageID];
 ipFragment =>
  DoFragment[
   iipH: iipH, image: image, xMag: xMag, yMag: yMag, plex: plex,
   pageID: pageID];
 ENDCASE => ERROR Error[imageError];
iipH.jobLocked ← FALSE;
END;

FinishMaster: PUBLIC PROCEDURE [iipH: Handle, highPriority: BOOLEAN] =
 BEGIN
 endJob: endJob InternalIP.Token ← [
  var: endJob[rec: [hPriority: highPriority]]];
 IF iipH = NIL THEN ERROR Error[invalidIIPHandle];
 PutToken[iipH: iipH, token: @endJob, size: SIZE[endJob InternalIP.Token]];
 IF iipH.block.stopIndexPlusOne # 0 THEN {
  AddBlockToQ[iipH: iipH, block: iipH.block];
  iipH.block ← [blockPointer: NIL, startIndex: 0, stopIndexPlusOne: 0];
  iipH.needBlock ← TRUE};
 WaitTransmit[iipH: iipH];
 END;
```

Copyright © 1992 Xerox Corporation All Rights Reserved

```
Pass: PUBLIC PROCEDURE [iipH: Handle, passRec: DecomposerCommon.PassCommand]
={
 IF iipH = NIL THEN ERROR Error[invalidIIPHandle];
 SELECT passRec.type FROM
  beginPass => {
   beginPass: beginPass InternalIP.Token ← [
    var: beginPass[rec: [number: passRec.number]]];
   PutToken[
    iipH: iipH, token: @beginPass, size: SIZE[beginPass InternalIP.Token]];
   };
  endPass => {
   endPass: endPass InternalIP.Token ← [
    var: endPass[rec: [number: passRec.number]]];
   PutToken[
    iipH: iipH, token: @endPass, size: SIZE[endPass InternalIP.Token]];
   IF iipH.block.stopIndexPlusOne # 0 THEN {
    AddBlockToQ[iipH: iipH, block: iipH.block];
    iipH.block ← [blockPointer: NIL, startIndex: 0, stopIndexPlusOne: 0];
    iipH.needBlock ← TRUE}};
  ENDCASE => NULL};


PutToken: PUBLIC PROCEDURE [
 iipH: Handle, token: LONG POINTER, size: LONG CARDINAL] =
 BEGIN
 nwords, freeWords: LONG CARDINAL ← 0;
 IF iipH = NIL THEN ERROR Error[invalidIIPHandle];
 WHILE size # 0 DO
  IF iipH.block.blockPointer # NIL THEN
   BEGIN
   freeWords ← (iipH.blockLength - iipH.block.stopIndexPlusOne) / 2;
   nwords ← IF freeWords > size THEN size ELSE freeWords;
   IF nwords > LAST[CARDINAL] THEN ERROR Error[other];
   Inline.LongCOPY[
    from: token, nwords: CARDINAL[nwords],
    to: iipH.block.blockPointer + iipH.block.stopIndexPlusOne / 2];
   iipH.block.stopIndexPlusOne ← iipH.block.stopIndexPlusOne + (nwords * 2);
   IF freeWords = nwords THEN {
    AddBlockToQ[iipH: iipH, block: iipH.block];
    iipH.needBlock ← TRUE;
    token ← token + nwords};
   size ← size - nwords;
   END;
  IF iipH.needBlock THEN
   BEGIN
   iipH.block ← iipH.bsH.acquire[sH: iipH.bsH, length: bLength];
   iipH.needBlock ← FALSE;
   iipH.blockLength ← iipH.block.stopIndexPlusOne;
   iipH.block.stopIndexPlusOne ← 0;
```

Copyright © 1992 Xerox Corporation All Rights Reserved

```
   END;
  ENDLOOP;
 END;

Segment: PUBLIC PROCEDURE [
 iipH: Handle, command: DecomposerCommon.SegmentCommand] = {
 IF iipH = NIL THEN ERROR Error[invalidIIPHandle];
 WITH type: command SELECT FROM
  newSegment = > {
   beginSegment: beginSegment InternalIP.Token ← [
    var: beginSegment[rec: [args: type.args]]];
   PutToken[
    iipH: iipH, token: @beginSegment,
    size: SIZE[beginSegment InternalIP.Token]];
   iipH.copyCount ← type.args.numberOfCopies};
  endSegment = > {
   endSegment: endSegment InternalIP.Token ← [
    var: endSegment[rec: [endData: type.endData]]];
   PutToken[
    iipH: iipH, token: @endSegment,
    size: SIZE[endSegment InternalIP.Token]];
   IF iipH.block.stopIndexPlusOne # 0 THEN {
    AddBlockToQ[iipH: iipH, block: iipH.block];
    iipH.block ← [blockPointer: NIL, startIndex: 0, stopIndexPlusOne: 0];
    iipH.needBlock ← TRUE}};
  ENDCASE = > NULL};

StartMaster: PUBLIC PROCEDURE [
 iipH: Handle, imagerDeviceProperties: DecomposerCommon.ImagerDeviceProperties,
 propsDesc: DecomposerCommon.OrientedImagingPropsArray] = {
 beginJob: beginJob InternalIP.Token ← [
  var: beginJob[
  rec: [sourceParms: [], imagerDeviceProperties: imagerDeviceProperties]]];
 IF iipH = NIL THEN ERROR Error[invalidIIPHandle];
 iipH.imagerDeviceProps ← imagerDeviceProperties;
 iipH.propsDesc ← propsDesc;
 iipH.time ← System.GetGreenwichMeanTime[];
 PutToken[
  iipH: iipH, token: @beginJob, size: SIZE[beginJob InternalIP.Token]]};

NotifyDestroy: ENTRY PROCEDURE [iipH: Handle] = {
 ENABLE UNWIND = > NULL;
 IF iipH.blockQ.head # NIL THEN ERROR Error[other];
 iipH.blockQ.destroy ← TRUE;
 NOTIFY iipH.blockQ.blockAvail};
```

Copyright © 1992 Xerox Corporation All Rights Reserved

```
NotifyTransmit: ENTRY PROCEDURE [iipH: Handle] = {
 ENABLE UNWIND = > NULL; NOTIFY iipH.blockQ.blockTransmit};


ReturnBlocks: ENTRY PROCEDURE [iipH: Handle] = {
 ENABLE UNWIND = > NULL;
 UNTIL iipH.blockQ.head = NIL DO
  nextQBlock: IIPGenInternal.QBlockPtr ← iipH.blockQ.head.next;
  iipH.bsH.return[sH: iipH.bsH, block: iipH.blockQ.head.block];
  z.FREE[@iipH.blockQ.head];
  iipH.blockQ.head ← nextQBlock;
  ENDLOOP;
 iipH.blockQ.tail ← NIL;
 IF iipH.block.stopIndexPlusOne # 0 THEN {
  iipH.bsH.return[sH: iipH.bsH, block: iipH.block];
  iipH.block ← [blockPointer: NIL, startIndex: 0, stopIndexPlusOne: 0];
  iipH.needBlock ← TRUE}};


WaitForBlock: ENTRY PROCEDURE [iipH: Handle]
 RETURNS [block: BlockStream.Block, destroy: BOOLEAN ← FALSE] = {
 ENABLE UNWIND = > NULL;
 nextBlockPtr: IIPGenInternal.QBlockPtr ← NIL;
 WHILE iipH.blockQ.head = NIL AND iipH.blockQ.destroy = FALSE DO
  WAIT iipH.blockQ.blockAvail; ENDLOOP;
 IF iipH.blockQ.destroy THEN
  RETURN[BlockStream.nullBlock, iipH.blockQ.destroy];
 nextBlockPtr ← iipH.blockQ.head.next;
 block ← iipH.blockQ.head.block;
 IF iipH.blockQ.head = iipH.blockQ.tail THEN iipH.blockQ.tail ← NIL;
 z.FREE[@iipH.blockQ.head];
 iipH.blockQ.head ← nextBlockPtr};


WaitTransmit: ENTRY PROCEDURE [iipH: Handle] = {
 ENABLE UNWIND = > NULL;
 WHILE iipH.blockQ.head # NIL DO WAIT iipH.blockQ.blockTransmit; ENDLOOP};


DoFragment: PROCEDURE [
 iipH: Handle, image: Image.Handle, xMag: INTEGER, yMag: INTEGER,
 plex: PublicPrinting.Plex, pageID: DecomposerCommon.ID] =
 BEGIN

 coalesceResultsEntry: coalesceEntry InternalIP.CoalesceResultsEntry;
 beginPage: beginPage InternalIP.Token ← [
  var: beginPage[
  rec: [
```

Copyright © 1992 Xerox Corporation All Rights Reserved

```
sheetData: [
pageID: pageID, sheet: 1, plate: [color: PublicPrinting.black, plex: plex],
copyRange: [begin: 1, end: 1], sheetCopies: 1,
mediaIndex: IIPGen.defaultMedia, complex: FALSE, simplifiedPage: FALSE],
imagingProps: iipH.propsDesc[IIPGen.defaultMedia], special: TRUE]]];
endPage: endPage InternalIP.Token ← [var: endPage[]];
coalesceResults: coalesceResults InternalIP.Token ← [
var: coalesceResults[
rec: [
offsetToNextToken: SIZE[coalesceEntry InternalIP.CoalesceResultsEntry],
entries: TRASH]]];

IF (xMag = -1 AND yMag = -1) THEN iipH.rotate180 ← TRUE;
coalesceResultsEntry ← [
var: coalesceEntry[
coalesceEntryData: [iH: image, rotate180: iipH.rotate180]]];

PutToken[
iipH: iipH, token: @beginPage, size: SIZE[beginPage InternalIP.Token]];
IF iipH.rotate180 THEN {
tTranslate: tTranslate InternalIP.Token ← [
var: tTranslate[
rec: [
xy: [
x: [
if[
frac: 0,
int:
(((iipH.propsDesc[IIPGen.defaultMedia].props.xPageEnd + 1 -
iipH.propsDesc[IIPGen.defaultMedia].props.xPageStart) / 16) * 16) -
1]],
y: [
if[
frac: 0,
int:
iipH.propsDesc[IIPGen.defaultMedia].props.yPageEnd - iipH.propsDesc[
IIPGen.defaultMedia].props.yPageStart]]]]]];
tRotate90: tRotate90 InternalIP.Token ← [
var: tRotate90[rec: [direction: r180]]];
PutToken[
iipH: iipH, token: @tTranslate, size: SIZE[tTranslate InternalIP.Token]];
PutToken[
iipH: iipH, token: @tRotate90, size: SIZE[tRotate90 InternalIP.Token]];
};

IIPGenInternal.PutToken[
iipH: iipH, token: @coalesceResults,
size: SIZE[coalesceResults InternalIP.Token]];
IIPGenInternal.PutToken[
iipH: iipH, token: @coalesceResultsEntry,
```

Copyright © 1992 Xerox Corporation All Rights Reserved

```
size: SIZE[coalesceEntry InternalIP.CoalesceResultsEntry]];

IF iipH.block.stopIndexPlusOne # 0 THEN {
 AddBlockToQ[iipH: iipH, block: iipH.block];
 iipH.block ← [blockPointer: NIL, startIndex: 0, stopIndexPlusOne: 0];
 iipH.needBlock ← TRUE};
IIPFragMgrPrivate.SendFrag[
 iipH: iipH,
 frag: Image.GetIpFragmentAttributes[
 object: image, location: [item: job[lockID: iipH.lockID]]].ipFragmentID !
 ResMgr.Error => 
  SELECT code FROM
   diskFault => ERROR Error[iipFragError];
   ENDCASE => REJECT];
PutToken[iipH: iipH, token: @endPage, size: SIZE[endPage InternalIP.Token]];
END;

DoImage: PROCEDURE [
iipH: Handle, partOfLogo: BOOLEAN, rasterID: RasterDirectorySupervisor.ID,
xMag: INTEGER, yMag: INTEGER, plex: PublicPrinting.Plex,
pageID: DecomposerCommon.ID] =
BEGIN
beginPage: beginPage InternalIP.Token ← [
 var: beginPage[
 rec: [
 sheetData: [
 pageID: pageID, sheet: 1, plate: [color: PublicPrinting.black, plex: plex],
 copyRange: [begin: 1, end: 1], sheetCopies: 1,
 mediaIndex: IIPGen.defaultMedia, complex: FALSE, simplifiedPage: TRUE],
 imagingProps: iipH.propsDesc[IIPGen.defaultMedia], special: FALSE]]];
endPage: endPage InternalIP.Token ← [var: endPage[]];
maskImage: maskImage InternalIP.Token;
newX, newY: INTEGER ← 0;
resInfoPtr: RasterObjects.RESInfoPointer ← NIL;

PutToken[
 iipH: iipH, token: @beginPage, size: SIZE[beginPage InternalIP.Token]];
resInfoPtr ← RasterDirectorySupervisor.GetRESInfoPtr[
 id: rasterID, needPBT: FALSE !
 RasterDirectorySupervisor.Error => {
  IF iipH.jobLocked THEN {
   JobQ.UnlockJob[lockID: iipH.lockID]; iipH.jobLocked ← FALSE};
  SELECT fault FROM
   54, 62, 82, 84, 86, 87 => {
    IIPGenCallBack.ReportProblem[
     iipH: LOOPHOLE[iipH], faultID: faultID, pgID: pageID,
     problem: IF partOfLogo THEN logoNotFound ELSE imageNotFound,
     sheetNumber: 1, plex: plex, rasterID: rasterID];
    GOTO done;
```

Copyright © 1992 Xerox Corporation All Rights Reserved

```
    };
   51, 52, 75, 78 = > {
    IIPGenCallBack.ReportProblem[
     iipH: LOOPHOLE[iipH], faultID: faultID, pgID: pageID,
     problem: diskError, sheetNumber: 1, plex: plex, rasterID: rasterID];
    GOTO done;
    };
   ENDCASE = > REJECT}];

IF xMag < 0 THEN newX ← (resInfoPtr.xDimension * ABS[xMag]) - 1;
IF yMag < 0 THEN newY ← (resInfoPtr.yDimension * ABS[yMag]) - 1;
maskImage ← [
 var: maskImage[
 rec: [
 origin: [x: [if[frac: 0, int: newX]], y: [if[frac: 0, int: newY]]],
 imageData: [
 xPixels: resInfoPtr.maskImage.xPixel, yPixels: resInfoPtr.maskImage.yPixel,
 logo: FALSE, xMag: INTEGER[xMag], yMag: INTEGER[yMag], originXOffset: 0,
 originYOffset: 0, var: id[id: rasterID]]]]];
RasterDirectorySupervisor.ReleaseRESInfoPtr[id: rasterID];
PutToken[
 iipH: iipH, token: @maskImage, size: SIZE[maskImage InternalIP.Token]];
PutToken[iipH: iipH, token: @endPage, size: SIZE[endPage InternalIP.Token]];

EXITS
 done = >
  IF ~iipH.jobLocked THEN {
   iipH.lockID ← iipH.relock[]; iipH.jobLocked ← TRUE; };

END;

TransmitBlock: PROCEDURE [iipH: Handle] = {
 block: BlockStream.Block ← BlockStream.nullBlock;
 destroy: BOOLEAN ← FALSE;
 IF iipH = NIL THEN ERROR Error[invalidIIPHandle];
 DO
  [block, destroy] ← WaitForBlock[iipH: iipH];
  IF destroy THEN RETURN;
  iipH.bsH.transmit[sH: iipH.bsH, block: block];
  NotifyTransmit[iipH: iipH];
  ENDLOOP};

END.
```

Copyright © 1992 Xerox Corporation All Rights Reserved

```
DIRECTORY
 DecomposerCommon USING [CopyRange, ID, OrientedImagingProps],
 DirectoryID USING [ObjectID],
 FaultLogger,
 IIPFragmentDS USING [Error],
 IIPFragMgrPrivate USING [SendFrag],
 IIPGen USING [defaultMedia, Error, LockProc],
 IIPGenCallBack USING [ReportProblem],
 IIPGenInternal USING [AddBlockToQ, Object, PutToken, z],
 IIPGenTypes,
 IIPReportGen USING [PutNumber, SetXY],
 Image USING [
  black, Box, EnumerateProc, EnumerateSingleObjectsFirstToLast,
  GetIpFragmentAttributes, GetObjectData, GetObjectType, GetRasterAttributes,
  Handle, nullHandle, ObjectData, ObjectType, white],
 InternalIP USING [CoalesceResultsEntry, ColorRange, Token, TokenType],
 JobBackUp USING [LockID],
 JobQ USING [UnlockJob],
 PageNumTypes USING [PageNumPos, SelectPageNum],
 PublicPrinting USING [black, Plex],
 RasterDirectorySupervisor USING [
  Error, GetRESInfoPtr, ID, nullID, ReleaseRESInfoPtr],
 RasterObjects USING [RESInfoPointer],
 Real USING [Fixl],
 ResMgr USING [Error],
 SignatureUtility USING [SignatureSidePtr];

IIPGenImplB: PROGRAM
 IMPORTS
  IIPFragmentDS, IIPFragMgrPrivate, IIPGen, IIPGenCallBack, IIPGenInternal,
  Image, IIPReportGen, JobQ, RasterDirectorySupervisor, Real, ResMgr
 EXPORTS IIPGen, IIPGenTypes =
 BEGIN


 Handle: TYPE = LONG POINTER TO Object ← NIL;
 Object: PUBLIC TYPE = IIPGenInternal.Object;

 ImageListHandle: TYPE = LONG POINTER TO ImageListObject ← NIL;
 ImageListObject: TYPE = RECORD [
  iH: Image.Handle ← Image.nullHandle,
  next: ImageListHandle ← NIL,
  overlapped: BOOLEAN ← FALSE,
  priority: BOOLEAN ← FALSE,
  ip: BOOLEAN ← TRUE,
  data: Image.ObjectData];

 ImageListData: TYPE = RECORD [
  imageList: ImageListHandle ← NIL,
```

Copyright © 1992 Xerox Corporation All Rights Reserved

```
type: Image.ObjectType ← TRASH,
special: BOOLEAN ← FALSE];


EncodeSide: PUBLIC PROCEDURE [
 iipH: Handle, iH: Image.Handle, lockID: JobBackUp.LockID,
 plex: PublicPrinting.Plex, sheet: LONG CARDINAL,
 mediaIndex: CARDINAL ← IIPGen.defaultMedia, relock: IIPGen.LockProc,
 headToToe: BOOLEAN, selectPageNum: PageNumTypes.SelectPageNum,
 pageID: DecomposerCommon.ID, simplifiedPage: BOOLEAN ← FALSE,
 copyRange: DecomposerCommon.CopyRange] =
 BEGIN
 ENABLE UNWIND => {iipH.jobLocked ← FALSE};

 beginPage: beginPage InternalIP.Token;
 endPage: endPage InternalIP.Token;
 imageListData: ImageListData ← [];
 currentImagingProps: DecomposerCommon.OrientedImagingProps;

 iipH.jobLocked ← TRUE;
 endPage ← [var: endPage[]];
 currentImagingProps ← iipH.propsDesc[mediaIndex];
 IF iipH = NIL THEN ERROR IIPGen.Error[invalidIIPHandle];

 iipH.plex ← plex;
 iipH.sheet ← sheet;
 iipH.mediaIndex ← mediaIndex;
 iipH.pageID ← pageID;
 iipH.lockID ← lockID;
 iipH.relock ← relock;
 iipH.color ← Image.black;
 iipH.rotate180 ← FALSE;

 imageListData ← BuildImageListData[iipH: iipH, iH: iH];

 beginPage ← [
  var: beginPage[
  rec: [
  sheetData: [
  pageID: pageID, sheet: sheet,
  plate: [color: PublicPrinting.black, plex: plex], copyRange: copyRange,
  sheetCopies: iipH.copyCount, mediaIndex: mediaIndex, complex: FALSE,
  simplifiedPage: simplifiedPage], imagingProps: currentImagingProps,
  special: imageListData.special]]];
 IIPGenInternal.PutToken[
  iipH: iipH, token: @beginPage, size: SIZE[beginPage InternalIP.Token]];

 IF headToToe AND plex = duplex THEN {
  tTranslate: tTranslate InternalIP.Token ← [
```

Copyright © 1992 Xerox Corporation All Rights Reserved

```
   var: tTranslate[
   rec: [
   xy: [
   x: [
   if[
   frac: 0,
   int:
   (((currentImagingProps.props.xPageEnd + 1 -
     currentImagingProps.props.xPageStart) / 16) * 16) - 1]],
   y: [
   if[
   frac: 0,
   int:
   currentImagingProps.props.yPageEnd -
    currentImagingProps.props.yPageStart]]]]]];
  tRotate90: tRotate90 InternalIP.Token ← [
   var: tRotate90[rec: [direction: r180]]];
  IIPGenInternal.PutToken[
   iipH: iipH, token: @tTranslate, size: SIZE[tTranslate InternalIP.Token]];
  IIPGenInternal.PutToken[
   iipH: iipH, token: @tRotate90, size: SIZE[tRotate90 InternalIP.Token]];
  iipH.rotate180 ← TRUE};

 IF imageListData.imageList # NIL THEN
  IF imageListData.type = composite THEN
   DoCompositeObject[iipH: iipH, imageList: imageListData.imageList]
  ELSE
   DoSingleObject[
    iipH: iipH, object: imageListData.imageList, priorityImportant: FALSE];

 FreeImageList[imageList: imageListData.imageList];

 WITH type: selectPageNum SELECT FROM
  none => NULL;
  normal => {
   priorityImportant: setPriorityImportant InternalIP.Token ← [
    var: setPriorityImportant[rec: [important: 1]]];
   IIPGenInternal.PutToken[
    iipH: iipH, token: @priorityImportant,
    size: SIZE[setPriorityImportant InternalIP.Token]];
   DoPageNum[iipH: iipH, num: type.num, pos: type.pos];
   priorityImportant ← [var: setPriorityImportant[rec: [important: 0]]];
   IIPGenInternal.PutToken[
    iipH: iipH, token: @priorityImportant,
    size: SIZE[setPriorityImportant InternalIP.Token]]};
  ENDCASE => ERROR;

 IIPGenInternal.PutToken[
  iipH: iipH, token: @endPage, size: SIZE[endPage InternalIP.Token]];
 iipH.jobLocked ← FALSE;
```

Copyright © 1992 Xerox Corporation All Rights Reserved

```
END;

EncodeSignatureSide: PUBLIC PROCEDURE [
 iipH: Handle, side: SignatureUtility.SignatureSidePtr,
 lockID: JobBackUp.LockID, relock: IIPGen.LockProc, sheet: LONG CARDINAL,
 pageID: DecomposerCommon.ID, copyRange: DecomposerCommon.CopyRange] =
 BEGIN
 ENABLE UNWIND => {iipH.jobLocked ← FALSE};

 beginPage: beginPage InternalIP.Token;
 endPage: endPage InternalIP.Token;
 imageListData1: ImageListData ← [];
 imageListData2: ImageListData ← [];
 tTranslate: tTranslate InternalIP.Token;
 currentImagingProps: DecomposerCommon.OrientedImagingProps;

 iipH.jobLocked ← TRUE;
 endPage ← [var: endPage[]];
 currentImagingProps ← iipH.propsDesc[side.mediaIndex];
 IF iipH = NIL THEN ERROR IIPGen.Error[invalidIIPHandle];

 iipH.plex ← side.plex;
 iipH.sheet ← sheet;
 iipH.mediaIndex ← side.mediaIndex;
 iipH.pageID ← pageID;
 iipH.lockID ← lockID;
 iipH.relock ← relock;
 iipH.color ← Image.black;
 iipH.rotate180 ← FALSE;

 imageListData1 ← BuildImageListData[iipH: iipH, iH: side.image1];
 imageListData2 ← BuildImageListData[iipH: iipH, iH: side.image2];

 beginPage ← [
  var: beginPage[
  rec: [
  sheetData: [
  pageID: pageID, sheet: sheet,
  plate: [color: PublicPrinting.black, plex: side.plex], copyRange: copyRange,
  sheetCopies: iipH.copyCount, mediaIndex: side.mediaIndex, complex: FALSE,
  simplifiedPage: FALSE], imagingProps: currentImagingProps,
  special: imageListData1.special OR imageListData2.special]]];
 IIPGenInternal.PutToken[
  iipH: iipH, token: @beginPage, size: SIZE[beginPage InternalIP.Token]];

 IF side.t1.form = rotate180 THEN {
  tRotate90: tRotate90 InternalIP.Token ← [
   var: tRotate90[rec: [direction: r180]]];
  tTranslate ← [
   var: tTranslate[
```

Copyright © 1992 Xerox Corporation All Rights Reserved

```
  rec: [
  xy: [
  x: [
  if[
  frac: 0,
  int:
  (((currentImagingProps.props.xPageEnd + 1 -
     currentImagingProps.props.xPageStart) / 16) * 16) - 1]],
  y: [
  if[
  frac: 0,
  int:
  currentImagingProps.props.yPageEnd -
    currentImagingProps.props.yPageStart]]]]]];
 IIPGenInternal.PutToken[
  iipH: iipH, token: @tTranslate, size: SIZE[tTranslate InternalIP.Token]];
 IIPGenInternal.PutToken[
  iipH: iipH, token: @tRotate90, size: SIZE[tRotate90 InternalIP.Token]];
 iipH.rotate180 ← TRUE};

tTranslate ← [
 var: tTranslate[
 rec: [
 xy: [
 x: [if[frac: 0, int: Real.FixI[side.t1.c]]],
 y: [if[frac: 0, int: Real.FixI[side.t1.f]]]]]]];
IIPGenInternal.PutToken[
 iipH: iipH, token: @tTranslate, size: SIZE[tTranslate InternalIP.Token]];

IF imageListData1.imageList # NIL THEN {
 IF imageListData1.type = composite THEN
  DoCompositeObject[iipH: iipH, imageList: imageListData1.imageList]
 ELSE
  DoSingleObject[
   iipH: iipH, object: imageListData1.imageList, priorityImportant: FALSE];
 FreeImageList[imageList: imageListData1.imageList]};

tTranslate ← [
 var: tTranslate[
 rec: [
 xy: [
 x: [if[frac: 0, int: Real.FixI[-side.t1.c]]],
 y: [if[frac: 0, int: Real.FixI[-side.t1.f]]]]]]];
IIPGenInternal.PutToken[
 iipH: iipH, token: @tTranslate, size: SIZE[tTranslate InternalIP.Token]];

tTranslate ← [
 var: tTranslate[
 rec: [
 xy: [
```

Copyright © 1992 Xerox Corporation All Rights Reserved

```
x: [if[frac: 0, int: Real.FixI[side.t2.c]]],
y: [if[frac: 0, int: Real.FixI[side.t2.f]]]]]]];
IIPGenInternal.PutToken[
 iipH: iipH, token: @tTranslate, size: SIZE[tTranslate InternalIP.Token]];

IF imageListData2.imageList # NIL THEN {
 IF imageListData2.type = composite THEN
  DoCompositeObject[iipH: iipH, imageList: imageListData2.imageList]
 ELSE
  DoSingleObject[
   iipH: iipH, object: imageListData2.imageList, priorityImportant: FALSE];
 FreeImageList[imageList: imageListData2.imageList]};

tTranslate ← [
 var: tTranslate[
 rec: [
 xy: [
 x: [if[frac: 0, int: Real.FixI[-side.t2.c]]],
 y: [if[frac: 0, int: Real.FixI[-side.t2.f]]]]]]];
IIPGenInternal.PutToken[
 iipH: iipH, token: @tTranslate, size: SIZE[tTranslate InternalIP.Token]];

WITH type: side.pageNum SELECT FROM
 none => NULL;
 signature => {
  priorityImportant: setPriorityImportant InternalIP.Token ← [
   var: setPriorityImportant[rec: [important: 1]]];
  IIPGenInternal.PutToken[
   iipH: iipH, token: @priorityImportant,
   size: SIZE[setPriorityImportant InternalIP.Token]];
  WITH pageAType: type.pageA SELECT FROM
   blank => NULL;
   valid =>
    DoPageNum[iipH: iipH, num: pageAType.num, pos: pageAType.position];
   ENDCASE => ERROR;
  WITH pageBType: type.pageB SELECT FROM
   blank => NULL;
   valid =>
    DoPageNum[iipH: iipH, num: pageBType.num, pos: pageBType.position];
   ENDCASE => ERROR;
  priorityImportant ← [var: setPriorityImportant[rec: [important: 0]]];
  IIPGenInternal.PutToken[
   iipH: iipH, token: @priorityImportant,
   size: SIZE[setPriorityImportant InternalIP.Token]]};
 ENDCASE => ERROR;

IIPGenInternal.PutToken[
 iipH: iipH, token: @endPage, size: SIZE[endPage InternalIP.Token]];
iipH.jobLocked ← FALSE;
END;
```

Copyright © 1992 Xerox Corporation All Rights Reserved

```
BuildImageListData: PROCEDURE [iipH: Handle, iH: Image.Handle]
 RETURNS [imageListData: ImageListData ← []] = {
 IF iH # Image.nullHandle THEN {
  imageListData.type ← Image.GetObjectType[
   object: iH, location: [item: job[lockID: iipH.lockID]]];
  IF imageListData.type = composite THEN {
   last: ImageListHandle ← NIL;
   flattenEnum: Image.EnumerateProc = {
    temp: ImageListHandle ← IIPGenInternal.z.NEW[
     ImageListObject ← [
     iH: object, next: NIL, overlapped: FALSE, priority: FALSE, ip: TRUE,
     data: Image.GetObjectData[object: object, location: location]]];
    IF temp.data.objectType = ipFragment THEN imageListData.special ← TRUE;
    IF last = NIL THEN imageListData.imageList ← temp ELSE last.next ← temp;
    last ← temp};
   Image.EnumerateSingleObjectsFirstToLast[
    composite: iH, location: [item: job[lockID: iipH.lockID]],
    proc: flattenEnum]}
  ELSE {
   imageListData.imageList ← IIPGenInternal.z.NEW[
    ImageListObject ← [
    iH: iH, next: NIL, overlapped: FALSE, priority: FALSE, ip: TRUE,
    data: Image.GetObjectData[
    object: iH, location: [item: job[lockID: iipH.lockID]]]]]];
   IF imageListData.imageList.data.objectType = ipFragment THEN
    imageListData.special ← TRUE}}};


DoCompositeObject: PROCEDURE [iipH: Handle, imageList: ImageListHandle] = INLINE
 {
 priorityImportant: BOOLEAN ← FindPriorityObjects[
  imageList: imageList, lockID: iipH.lockID];
 IIPGenNonPriority[imageList: imageList, iipH: iipH];
 IF priorityImportant THEN IIPGenPriority[imageList: imageList, iipH: iipH]};


DoIIPFragment: PROCEDURE [
 iipH: Handle, object: ImageListHandle, priorityImportant: BOOLEAN] =
 BEGIN
 coalesceResults: coalesceResults InternalIP.Token ← [
  var: coalesceResults[
  rec: [
  offsetToNextToken: SIZE[coalesceEntry InternalIP.CoalesceResultsEntry],
  entries: TRASH]]];
 coalesceResultsEntry: coalesceEntry InternalIP.CoalesceResultsEntry ← [
  var: coalesceEntry[
  coalesceEntryData: [iH: object.iH, rotate180: iipH.rotate180]]];
 fragID: DirectoryID.ObjectID ← Image.GetIpFragmentAttributes[
```

Copyright © 1992 Xerox Corporation All Rights Reserved

```
  object: object.iH, location: [item: job[lockID: iipH.lockID]]].ipFragmentID;
 setPIO: setPriorityImportantOverride InternalIP.Token ← [
  var: setPriorityImportantOverride[rec: [override: 1]]];
 tTranslate: tTranslate InternalIP.Token ← [
  var: tTranslate[
  rec: [
  xy: [
  x: [if[frac: 0, int: object.data.box.xPosition]],
  y: [if[frac: 0, int: object.data.box.yPosition]]]]]];
 setGray: setGray InternalIP.Token ← [
  var: setGray[rec: [gray: LAST[InternalIP.ColorRange]]]];

 IF iipH.color # Image.black THEN {
  IIPGenInternal.PutToken[
   iipH: iipH, token: @setGray, size: SIZE[setGray InternalIP.Token]];
  iipH.color ← Image.black};

 IIPGenInternal.PutToken[
  iipH: iipH, token: @coalesceResults,
  size: SIZE[coalesceResults InternalIP.Token]];
 IIPGenInternal.PutToken[
  iipH: iipH, token: @coalesceResultsEntry,
  size: SIZE[coalesceEntry InternalIP.CoalesceResultsEntry]];

 IF object.data.box.xPosition # 0 OR object.data.box.yPosition # 0 THEN
  IIPGenInternal.PutToken[
   iipH: iipH, token: @tTranslate, size: SIZE[tTranslate InternalIP.Token]];

 IF priorityImportant THEN
  IIPGenInternal.PutToken[
   iipH: iipH, token: @setPIO,
   size: SIZE[setPriorityImportantOverride InternalIP.Token]];


 IF iipH.block.stopIndexPlusOne # 0 THEN {
  IIPGenInternal.AddBlockToQ[iipH: iipH, block: iipH.block];
  iipH.block ← [blockPointer: NIL, startIndex: 0, stopIndexPlusOne: 0];
  iipH.needBlock ← TRUE};

 IIPFragMgrPrivate.SendFrag[
  iipH: iipH, frag: fragID !
  IIPFragmentDS.Error =>
   SELECT code FROM
    iipFragmentNotFound => {
     IF iipH.jobLocked THEN {
      JobQ.UnlockJob[lockID: iipH.lockID]; iipH.jobLocked ← FALSE};
     IIPGenCallBack.ReportProblem[
      iipH: LOOPHOLE[iipH], faultID: FaultLogger.nullLogID,
      pgID: iipH.pageID, problem: imageNotFound, sheetNumber: iipH.sheet,
      plex: iipH.plex, rasterID: RasterDirectorySupervisor.nullID];
```

Copyright © 1992 Xerox Corporation All Rights Reserved

```
    IF ~iipH.jobLocked THEN {
     iipH.lockID ← iipH.relock[]; iipH.jobLocked ← TRUE};
    CONTINUE};
   ENDCASE;
 ResMgr.Error = >
  SELECT code FROM
   diskFault = > {
    IF iipH.jobLocked THEN {
     JobQ.UnlockJob[lockID: iipH.lockID]; iipH.jobLocked ← FALSE};
    IIPGenCallBack.ReportProblem[
     iipH: LOOPHOLE[iipH], faultID: faultID, pgID: iipH.pageID,
     problem: diskError, sheetNumber: iipH.sheet, plex: iipH.plex,
     rasterID: RasterDirectorySupervisor.nullID];
    IF ~iipH.jobLocked THEN {
     iipH.lockID ← iipH.relock[]; iipH.jobLocked ← TRUE};
    CONTINUE};
   ENDCASE = > REJECT];

IF priorityImportant THEN {
 setPIO.rec.override ← 0;
 IIPGenInternal.PutToken[
  iipH: iipH, token: @setPIO,
  size: SIZE[setPriorityImportantOverride InternalIP.Token]]};

IF object.data.box.xPosition # 0 OR object.data.box.yPosition # 0 THEN {
 tTranslate ← [
  var: tTranslate[
  rec: [
  xy: [
  x: [if[frac: 0, int: -object.data.box.xPosition]],
  y: [if[frac: 0, int: -object.data.box.yPosition]]]]]];
 IIPGenInternal.PutToken[
  iipH: iipH, token: @tTranslate, size: SIZE[tTranslate InternalIP.Token]]};

END;

DoPageNum: PROCEDURE [
 iipH: Handle, num: LONG CARDINAL, pos: PageNumTypes.PageNumPos] =
 BEGIN
 currentImagingProps: DecomposerCommon.OrientedImagingProps ← iipH.propsDesc[
  iipH.mediaIndex];
 beginIIPFrag: beginIIPFrag InternalIP.Token ← [
  var: beginIIPFrag[rec: [sourceParms: []]]];
 endIIPFrag: endIIPFrag InternalIP.Token ← [var: endIIPFrag[]];
 tRotate90: tRotate90 InternalIP.Token ← [
  var: tRotate90[rec: [direction: r270]]];
 tTranslate: tTranslate InternalIP.Token ← [
  var: tTranslate[
  rec: [
  xy: [
```

Copyright © 1992 Xerox Corporation All Rights Reserved

```
  x: [if[frac: 0, int: 0]],
  y: [
  if[
  frac: 0,
  int:
  currentImagingProps.props.xPageEnd -
   currentImagingProps.props.xPageStart]]]]]];
coalesceResults: coalesceResults InternalIP.Token ← [
 var: coalesceResults[
 rec: [
 offsetToNextToken: SIZE[systemFont InternalIP.CoalesceResultsEntry],
 entries: TRASH]]];
coalesceResultsEntry: systemFont InternalIP.CoalesceResultsEntry ← [
 var: systemFont[
 systemFontData: [
 id: pos.fontID, subDirectory: pos.fontSubDirID,
 metricsFile: pos.metricsFile, metricPageOffset: pos.metricPageOffset,
 metricPageLength: pos.metricPageLength]]];
setFont: setFont InternalIP.Token ← [var: setFont[rec: [index: 0]]];
setGray: setGray InternalIP.Token ← [
 var: setGray[rec: [gray: LAST[InternalIP.ColorRange]]]];

IF iipH.color # Image.black THEN {
 IIPGenInternal.PutToken[
  iipH: iipH, token: @setGray, size: SIZE[setGray InternalIP.Token]];
 iipH.color ← Image.black};

IIPGenInternal.PutToken[
 iipH: iipH, token: @coalesceResults,
 size: SIZE[coalesceResults InternalIP.Token]];
IIPGenInternal.PutToken[
 iipH: iipH, token: @coalesceResultsEntry,
 size: SIZE[systemFont InternalIP.CoalesceResultsEntry]];
IIPGenInternal.PutToken[
 iipH: iipH, token: @beginIIPFrag,
 size: SIZE[beginIIPFrag InternalIP.Token]];
IIPGenInternal.PutToken[
 iipH: iipH, token: @setFont, size: SIZE[setFont InternalIP.Token]];
IIPReportGen.SetXY[iipH: iipH, xy: LOOPHOLE[pos.coarseLoc]];

SELECT pos.orientation FROM
 portrait, inversePortrait => NULL;
 landscape, inverseLandscape => {
  IF pos.orientation = landscape THEN {
   tRotate90 ← [var: tRotate90[rec: [direction: r90]]];
   tTranslate ← [
    var: tTranslate[
    rec: [
    xy: [
    x: [
```

Copyright © 1992 Xerox Corporation All Rights Reserved

```
      if[
      frac: 0,
      int:
      currentImagingProps.props.yPageEnd -
        currentImagingProps.props.yPageStart]],
      y: [if[frac: 0, int: 0]]]]]]};
    IIPGenInternal.PutToken[
     iipH: iipH, token: @tTranslate,
     size: SIZE[tTranslate InternalIP.Token]];
    IIPGenInternal.PutToken[
     iipH: iipH, token: @tRotate90, size: SIZE[tRotate90 InternalIP.Token]]};
   ENDCASE => ERROR;

 IIPReportGen.PutNumber[iipH: iipH, n: num, nFormat: []];
 IIPGenInternal.PutToken[
  iipH: iipH, token: @endIIPFrag, size: SIZE[endIIPFrag InternalIP.Token]];
 END;

DoRaster: PROCEDURE [iipH: Handle, object: ImageListHandle] =
 BEGIN
 maskImage: maskImage InternalIP.Token;
 newX: INTEGER ← object.data.box.xPosition;
 newY: INTEGER ← object.data.box.yPosition;
 xMag: INTEGER ← Real.FixI[object.data.t.a];
 yMag: INTEGER ← Real.FixI[object.data.t.e];
 rasterID: RasterDirectorySupervisor.ID ← Image.GetRasterAttributes[
  object: object.iH, location: [item: job[lockID: iipH.lockID]]].rasterID;
 resPtr: RasterObjects.RESInfoPointer ←
  RasterDirectorySupervisor.GetRESInfoPtr[
  id: rasterID, needPBT: FALSE !
  RasterDirectorySupervisor.Error => {
   IF iipH.jobLocked THEN {
    JobQ.UnlockJob[lockID: iipH.lockID]; iipH.jobLocked ← FALSE};
   SELECT fault FROM
    54, 62, 82, 84, 86, 87 => {
     IIPGenCallBack.ReportProblem[
      iipH: LOOPHOLE[iipH], faultID: faultID, pgID: iipH.pageID,
      problem:
      IF object.data.partOfLogo THEN logoNotFound ELSE imageNotFound,
      sheetNumber: iipH.sheet, plex: iipH.plex, rasterID: rasterID];
     GOTO done;
     };
    51, 52, 75, 78 => {
     IIPGenCallBack.ReportProblem[
      iipH: LOOPHOLE[iipH], faultID: faultID, pgID: iipH.pageID,
      problem: diskError, sheetNumber: iipH.sheet, plex: iipH.plex,
      rasterID: rasterID];
     GOTO done;
     };
    ENDCASE => REJECT}];
```

Copyright © 1992 Xerox Corporation All Rights Reserved

```
CheckColor[iipH: iipH, object: object];
IF xMag = -1 THEN newX ← newX + object.data.box.xDimension - 1;
IF yMag = -1 THEN newY ← newY + object.data.box.yDimension - 1;
IF iipH.rotate180 THEN {xMag ← -xMag; yMag ← -yMag};
maskImage ← [
 var: maskImage[
 rec: [
 origin: [x: [if[frac: 0, int: newX]], y: [if[frac: 0, int: newY]]],
 imageData: [
 xPixels: resPtr.maskImage.xPixel, yPixels: resPtr.maskImage.yPixel,
 logo: object.data.partOfLogo, xMag: xMag, yMag: yMag, originXOffset: 0,
 originYOffset: 0, var: id[id: rasterID]]]]];
IIPGenInternal.PutToken[
 iipH: iipH, token: @maskImage, size: SIZE[maskImage InternalIP.Token]];
RasterDirectorySupervisor.ReleaseRESInfoPtr[
 id: rasterID !
 RasterDirectorySupervisor.Error =>
  IF fault = 82 THEN {
   IF iipH.jobLocked THEN {
    JobQ.UnlockJob[lockID: iipH.lockID]; iipH.jobLocked ← FALSE};
   IIPGenCallBack.ReportProblem[
    iipH: LOOPHOLE[iipH], faultID: faultID, pgID: iipH.pageID,
    problem:
    IF object.data.partOfLogo THEN logoNotFound ELSE imageNotFound,
    sheetNumber: iipH.sheet, plex: iipH.plex, rasterID: rasterID];
   IF ~iipH.jobLocked THEN iipH.jobLocked ← TRUE;
   CONTINUE}
  ELSE REJECT];

EXITS
 done =>
  IF ~iipH.jobLocked THEN {
   iipH.lockID ← iipH.relock[]; iipH.jobLocked ← TRUE; }

END;

DoRule: PROCEDURE [iipH: Handle, object: ImageListHandle] = INLINE
 BEGIN
 maskRectangleInt: maskRectangleInt InternalIP.Token;
 CheckColor[iipH: iipH, object: object];
 maskRectangleInt ← [
  var: maskRectangleInt[
  rec: [
  p1: [x: object.data.box.xPosition, y: object.data.box.yPosition],
  p2: [
  x: object.data.box.xPosition + object.data.box.xDimension,
  y: object.data.box.yPosition + object.data.box.yDimension]]]];
 IIPGenInternal.PutToken[
  iipH: iipH, token: @maskRectangleInt,
```

Copyright © 1992 Xerox Corporation All Rights Reserved

```
  size: SIZE[maskRectangleInt InternalIP.Token]];
 END;

DoSingleObject: PROCEDURE [
 iipH: Handle, object: ImageListHandle, priorityImportant: BOOLEAN] = {
 SELECT object.data.objectType FROM
  raster = > DoRaster[iipH: iipH, object: object];
  rule = > DoRule[iipH: iipH, object: object];
  ipFragment = >
   DoIIPFragment[
    iipH: iipH, object: object, priorityImportant: priorityImportant];
  composite = > ERROR IIPGen.Error[imageError];
  ENDCASE};


FindPriorityObjects: PROCEDURE [
 imageList: ImageListHandle, lockID: JobBackUp.LockID]
 RETURNS [priorityImportant: BOOLEAN ← FALSE] = INLINE
 BEGIN
 FOR outerLoopListPnter: ImageListHandle ← imageList, outerLoopListPnter.next
  UNTIL outerLoopListPnter = NIL DO
  IF outerLoopListPnter.overlapped = FALSE
   AND outerLoopListPnter.data.color = Image.white
   AND outerLoopListPnter.data.objectType = rule
   AND outerLoopListPnter.next # NIL THEN outerLoopListPnter.ip ← FALSE
  ELSE {
   FOR innerLoopListPnter: ImageListHandle ← outerLoopListPnter.next,
    innerLoopListPnter.next UNTIL innerLoopListPnter = NIL DO
    IF OverLappingBoxes[
     a: outerLoopListPnter.data.box, b: innerLoopListPnter.data.box] THEN {
     outerLoopListPnter.overlapped ← TRUE;
     innerLoopListPnter.overlapped ← TRUE;
     IF outerLoopListPnter.data.color # innerLoopListPnter.data.color THEN
      {
      outerLoopListPnter.priority ← TRUE;
      innerLoopListPnter.priority ← TRUE;
      priorityImportant ← TRUE}};
    ENDLOOP};
  ENDLOOP;
 END;


FreeImageList: PROC [imageList: ImageListHandle] = {
 nextList: ImageListHandle ← NIL;
 UNTIL imageList = NIL DO
  nextList ← imageList.next;
  IIPGenInternal.z.FREE[@imageList];
  imageList ← nextList;
  ENDLOOP};
```

Copyright © 1992 Xerox Corporation All Rights Reserved

```
IIPGenNonPriority: PROC [imageList: ImageListHandle, iipH: Handle] = INLINE {
 FOR LoopListPnter: ImageListHandle ← imageList, LoopListPnter.next UNTIL
  LoopListPnter = NIL DO
  IF LoopListPnter.priority # TRUE AND LoopListPnter.ip = TRUE THEN
   DoSingleObject[
    iipH: iipH, object: LoopListPnter, priorityImportant: FALSE];
  ENDLOOP};


IIPGenPriority: PROC [imageList: ImageListHandle, iipH: Handle] = INLINE {
 priorityImportant: setPriorityImportant InternalIP.Token ← [
  var: setPriorityImportant[rec: [important: 1]]];
 IIPGenInternal.PutToken[
  iipH: iipH, token: @priorityImportant,
  size: SIZE[setPriorityImportant InternalIP.Token]];
 FOR LoopListPnter: ImageListHandle ← imageList, LoopListPnter.next UNTIL
  LoopListPnter = NIL DO
  IF LoopListPnter.priority = TRUE AND LoopListPnter.ip = TRUE THEN
   DoSingleObject[
    iipH: iipH, object: LoopListPnter, priorityImportant: TRUE];
  ENDLOOP;
 priorityImportant ← [var: setPriorityImportant[rec: [important: 0]]];
 IIPGenInternal.PutToken[
  iipH: iipH, token: @priorityImportant,
  size: SIZE[setPriorityImportant InternalIP.Token]]};


OverLappingBoxes: PROCEDURE [a, b: Image.Box]
 RETURNS [overlap: BOOLEAN ← FALSE] = INLINE {
 overlap ← TestOverlap[a.xPosition, b.xPosition, a.xDimension, b.xDimension]
  AND TestOverlap[a.yPosition, b.yPosition, a.yDimension, b.yDimension]};


TestOverlap: PROCEDURE [x1, x2: INTEGER, dx1, dx2: CARDINAL]
 RETURNS [overlap: BOOLEAN ← FALSE] = INLINE {
 overlap ←
  IF x1 < x2 THEN x2 < LOOPHOLE[x1 + dx1, INTEGER]
  ELSE x1 < LOOPHOLE[x2 + dx2, INTEGER]};


CheckColor: PROCEDURE [iipH: Handle, object: ImageListHandle] = {
 setGray: setGray InternalIP.Token;
 IF object.data.color # iipH.color THEN {
  IF object.data.color = Image.black THEN
   setGray ← [var: setGray[rec: [gray: LAST[InternalIP.ColorRange]]]]
  ELSE
   setGray ← [
    var: setGray[
    rec: [
```

Copyright © 1992 Xerox Corporation All Rights Reserved

```
    gray:

    SELECT object.data.color FROM
     0 => 0,
     2184 => 145,
     4368 => 258,
     6552 => 382,
     8736 => 450,
     10920 => 523,
     13104 => 628,
     15288 => 715,
     17472 => 778,
     19656 => 800,
     21840 => 850,
     24024 => 901,
     26208 => 922,
     28392 => 960,
     30576 => 999,
     ENDCASE => 1024]]];
  IIPGenInternal.PutToken[
   iipH: iipH, token: @setGray, size: SIZE[setGray InternalIP.Token]];
  iipH.color ← object.data.color}};

END.
```

Copyright © 1992 Xerox Corporation All Rights Reserved

```
DIRECTORY
 Ascii USING [SP],
 CSRDefaults USING [GetMarketRegion, MarketRegion],
 DecomposerCommon USING [nullID],
 Environment USING [bytesPerWord],
 Format USING [
  Char, DateFormat, LongString, NumberFormat, SubString, StringProc],
 Heap USING [FreeNode, MakeNode],
 IIPGen USING [Error],
 IIPGenTypes USING [Handle],
 IIPGenInternal USING [Handle, PutToken, z],
 IIPReportGen USING [ColorRange, FormData, PixelPointInt, UnderLine],
 InternalIP USING [CoalesceResultsEntry, Token, TokenType],
 PublicPrinting USING [black, Plex],
 Real USING [DefaultSinglePrecision, RoundC],
 StandardReport USING [Logo, nullLogo],
 String USING [
  AppendChar, AppendDecimal, AppendLongNumber, AppendString, AppendSubString,
  SubString, SubStringDescriptor],
 System USING [GreenwichMeanTime],
 SystemFont USING [SystemFontArray, PtSize],
 Time USING [Append, Packed, Unpack, Unpacked];

IIPGenImplC: PROGRAM
 IMPORTS CSRDefaults, Format, Heap, IIPGen, IIPGenInternal, Real, String, Time
 EXPORTS IIPReportGen =
 BEGIN

 currentFont: SystemFont.PtSize;
 resolution: CARDINAL ← 0;

 Order: TYPE = {dFirst, mFirst, yFirst};
 Period: TYPE = {half, full};


 BeginPage: PUBLIC PROCEDURE [
  iipH: IIPGenTypes.Handle, mediaIndex: CARDINAL ← 0, sheet: LONG CARDINAL ← 0,
  plex: PublicPrinting.Plex ← simplex, fontArray: SystemFont.SystemFontArray,
  initialFont: SystemFont.PtSize ← twelve] =
  BEGIN
  h: IIPGenInternal.Handle ← LOOPHOLE[iipH];
  beginPage: beginPage InternalIP.Token;
  beginIIPFrag: beginIIPFrag InternalIP.Token ← [
   var: beginIIPFrag[rec: [sourceParms: []]]];
  fontArrayLength: CARDINAL ← fontArray.LENGTH;
  coalesceResultsPtr: LONG POINTER ← Heap.MakeNode[
   z: IIPGenInternal.z,
   n:
```

Copyright © 1992 Xerox Corporation All Rights Reserved

```
 SIZE[coalesceResults InternalIP.Token] +
  SIZE[InternalIP.CoalesceResultsEntry] * fontArrayLength];
offsetToNextTokenPtr: LONG POINTER TO LONG CARDINAL ←
 coalesceResultsPtr + SIZE[InternalIP.TokenType];
nextFontCoalesceEntry: LONG POINTER TO systemFont
 InternalIP.CoalesceResultsEntry ←
 LOOPHOLE[coalesceResultsPtr + SIZE[coalesceResults InternalIP.Token]];

IF iipH = NIL THEN ERROR IIPGen.Error[invalidIIPHandle];

h.mediaIndex ← mediaIndex;

beginPage ← [
 var: beginPage[
 rec: [
 sheetData: [
 pageID: DecomposerCommon.nullID, sheet: sheet,
 plate: [color: PublicPrinting.black, plex: plex],
 copyRange: [begin: 1, end: h.copyCount], sheetCopies: h.copyCount,
 mediaIndex: mediaIndex, complex: FALSE, simplifiedPage: TRUE],
 imagingProps: h.propsDesc[mediaIndex], special: FALSE]]];
IIPGenInternal.PutToken[
 iipH: h, token: @beginPage, size: SIZE[beginPage InternalIP.Token]];

coalesceResultsPtr↑ ← InternalIP.TokenType.coalesceResults;
FOR ptSize: SystemFont.PtSize IN [eight..fourteenBold] DO
 nextFontCoalesceEntry↑ ← [
  var: systemFont[
  systemFontData: [
  id: fontArray[ptSize].font.fontDir,
  subDirectory: fontArray[ptSize].font.fontSubDir,
  metricsFile: fontArray[ptSize].metricsFile,
  metricPageOffset: fontArray[ptSize].metricPageOffset,
  metricPageLength: fontArray[ptSize].metricPageLength]]];
 nextFontCoalesceEntry ←
  nextFontCoalesceEntry + SIZE[systemFont InternalIP.CoalesceResultsEntry];
 ENDLOOP;

IF fontArray[other].available THEN
 nextFontCoalesceEntry↑ ← [
  var: systemFont[
  systemFontData: [
  id: fontArray[other].font.fontDir,
  subDirectory: fontArray[other].font.fontSubDir,
  metricsFile: fontArray[other].metricsFile,
  metricPageOffset: fontArray[other].metricPageOffset,
  metricPageLength: fontArray[other].metricPageLength]]]
 ELSE fontArrayLength ← fontArrayLength - 1;

offsetToNextTokenPtr↑ ←
```

Copyright © 1992 Xerox Corporation All Rights Reserved

```
fontArrayLength * SIZE[systemFont InternalIP.CoalesceResultsEntry];
IIPGenInternal.PutToken[
 iipH: h, token: coalesceResultsPtr,
 size: SIZE[coalesceResults InternalIP.Token] + offsetToNextTokenPtr ↑ ];
Heap.FreeNode[z: IIPGenInternal.z, p: coalesceResultsPtr];

IIPGenInternal.PutToken[
 iipH: h, token: @beginIIPFrag, size: SIZE[beginIIPFrag InternalIP.Token]];
SetFont[iipH: iipH, ptSize: initialFont];
currentFont ← initialFont;
resolution ← h.imagerDeviceProps.resolution;
END;

EndPage: PUBLIC PROCEDURE [iipH: IIPGenTypes.Handle] = {
 h: IIPGenInternal.Handle ← LOOPHOLE[iipH];
 endIIPFrag: endIIPFrag InternalIP.Token ← [var: endIIPFrag[]];
 endPage: endPage InternalIP.Token ← [var: endPage[]];
 IF iipH = NIL THEN ERROR IIPGen.Error[invalidIIPHandle];
 IIPGenInternal.PutToken[
  iipH: h, token: @endIIPFrag, size: SIZE[endIIPFrag InternalIP.Token]];
 IIPGenInternal.PutToken[
  iipH: h, token: @endPage, size: SIZE[endPage InternalIP.Token]]};


MaskRectangle: PUBLIC PROCEDURE [
 iipH: IIPGenTypes.Handle, p1: IIPReportGen.PixelPointInt,
 p2: IIPReportGen.PixelPointInt,
 gray: IIPReportGen.ColorRange ← LAST[IIPReportGen.ColorRange]] = {
 h: IIPGenInternal.Handle ← LOOPHOLE[iipH];
 maskRectangleInt: maskRectangleInt InternalIP.Token ← [
  var: maskRectangleInt[
  rec: [p1: [x: p1.x, y: p1.y], p2: [x: p2.x, y: p2.y]]]];
 setGray: setGray InternalIP.Token ← [var: setGray[rec: [gray: gray]]];
 IF iipH = NIL THEN ERROR IIPGen.Error[invalidIIPHandle];
 IF gray # LAST[IIPReportGen.ColorRange] THEN
  IIPGenInternal.PutToken[
   iipH: h, token: @setGray, size: SIZE[setGray InternalIP.Token]];
 IIPGenInternal.PutToken[
  iipH: h, token: @maskRectangleInt,
  size: SIZE[maskRectangleInt InternalIP.Token]];
 IF gray # LAST[IIPReportGen.ColorRange] THEN {
  setGray.rec.gray ← LAST[IIPReportGen.ColorRange];
  IIPGenInternal.PutToken[
   iipH: h, token: @setGray, size: SIZE[setGray InternalIP.Token]]}};


PutDateAndTime: PUBLIC PROCEDURE [
 iipH: IIPGenTypes.Handle, time: System.GreenwichMeanTime,
 dateFormat: Format.DateFormat ← full,
 marketRegion: CSRDefaults.MarketRegion ← uso,
```

Copyright © 1992 Xerox Corporation All Rights Reserved

```
underLine: IIPReportGen.UnderLine ← []] = {
h: IIPGenInternal.Handle ← LOOPHOLE[iipH];
IF iipH = NIL THEN ERROR IIPGen.Error[invalidIIPHandle];
IF underLine.h # 0 THEN {
 startUnderline: startUnderline InternalIP.Token ← [var: startUnderline[]];
 IIPGenInternal.PutToken[
  iipH: h, token: @startUnderline,
  size: SIZE[startUnderline InternalIP.Token]]};
FormatDate[
 proc: ShowString, pt: time, dateFormat: dateFormat, clientData: h,
 region: marketRegion];
IF underLine.h # 0 THEN {
 maskUnderline90: maskUnderline90 InternalIP.Token ← [
  var: maskUnderline90[
  rec: [
  dY: [
  direction: plusY, pad: 0, distance: [if[frac: 0, int: underLine.dY]]],
  dHx: [if[frac: 0, int: underLine.h]]]]]];
 IIPGenInternal.PutToken[
  iipH: h, token: @maskUnderline90,
  size: SIZE[maskUnderline90 InternalIP.Token]]}};


PutLogo: PUBLIC PROCEDURE [
 iipH: IIPGenTypes.Handle, logo: StandardReport.Logo,
 position: IIPReportGen.PixelPointInt] = {
 h: IIPGenInternal.Handle ← LOOPHOLE[iipH];
 maskImage: maskImage InternalIP.Token ← [
  var: maskImage[
  rec: [
  origin: [
  x: [if[frac: 0, int: position.x]], y: [if[frac: 0, int: position.y]]],
  imageData: [
  xPixels: logo.xDimension, yPixels: logo.yDimension, logo: TRUE, xMag: 1,
  yMag: 1, originXOffset: 0, originYOffset: 0, var: id[id: logo.rasterID]]]]];
 IF iipH = NIL THEN ERROR IIPGen.Error[invalidIIPHandle];
 IIPGenInternal.PutToken[
  iipH: h, token: @maskImage, size: SIZE[maskImage InternalIP.Token]]};


PutLString: PUBLIC PROCEDURE [
 iipH: IIPGenTypes.Handle, string: LONG STRING ← NIL,
 underLine: IIPReportGen.UnderLine ← []] = {
 h: IIPGenInternal.Handle ← LOOPHOLE[iipH];
 IF iipH = NIL THEN ERROR IIPGen.Error[invalidIIPHandle];
 IF underLine.h # 0 THEN {
  startUnderline: startUnderline InternalIP.Token ← [var: startUnderline[]];
  IIPGenInternal.PutToken[
   iipH: h, token: @startUnderline,
   size: SIZE[startUnderline InternalIP.Token]]};
```

Copyright © 1992 Xerox Corporation All Rights Reserved

```
Format.LongString[proc: ShowString, s: string, clientData: h];
IF underLine.h # 0 THEN {
 maskUnderline90: maskUnderline90 InternalIP.Token ← [
  var: maskUnderline90[
  rec: [
  dY: [
  direction: plusY, pad: 0, distance: [if[frac: 0, int: underLine.dY]]],
  dHx: [if[frac: 0, int: underLine.h]]]]];
 IIPGenInternal.PutToken[
  iipH: h, token: @maskUnderline90,
  size: SIZE[maskUnderline90 InternalIP.Token]]}};


PutNumber: PUBLIC PROCEDURE [
 iipH: IIPGenTypes.Handle, n: LONG UNSPECIFIED,
 nFormat: Format.NumberFormat ← [], underLine: IIPReportGen.UnderLine ← []] = {
 h: IIPGenInternal.Handle ← LOOPHOLE[iipH];
 nString: LONG STRING ← [32];
 IF iipH = NIL THEN ERROR IIPGen.Error[invalidIIPHandle];
 IF underLine.h # 0 THEN {
  startUnderline: startUnderline InternalIP.Token ← [var: startUnderline[]];
  IIPGenInternal.PutToken[
   iipH: h, token: @startUnderline,
   size: SIZE[startUnderline InternalIP.Token]]};
 String.AppendLongNumber[s: nString, n: n, radix: nFormat.base];
 FormatLNumber[proc: ShowString, n: n, format: nFormat, clientData: h];
 IF underLine.h # 0 THEN {
  maskUnderline90: maskUnderline90 InternalIP.Token ← [
   var: maskUnderline90[
   rec: [
   dY: [
   direction: plusY, pad: 0, distance: [if[frac: 0, int: underLine.dY]]],
   dHx: [if[frac: 0, int: underLine.h]]]]];
  IIPGenInternal.PutToken[
   iipH: h, token: @maskUnderline90,
   size: SIZE[maskUnderline90 InternalIP.Token]]}};


PutReal: PUBLIC PROCEDURE [
 iipH: IIPGenTypes.Handle, r: REAL,
 decPlaces: CARDINAL ← Real.DefaultSinglePrecision,
 nFormat: Format.NumberFormat ← [],
 marketRegion: CSRDefaults.MarketRegion ← uso,
 underLine: IIPReportGen.UnderLine ← []] = {};


PutReportForm: PUBLIC PROCEDURE [
 iipH: IIPGenTypes.Handle, formData: IIPReportGen.FormData ← [other[]],
 logo: StandardReport.Logo ← StandardReport.nullLogo,
 pageNumber: CARDINAL ← 0] = {
```

Copyright © 1992 Xerox Corporation All Rights Reserved

```
lineThicknessInPixels: CARDINAL = ConvertToPixels[0.0133];
oneInch: CARDINAL = ConvertToPixels[1.0];
pt45In: CARDINAL = ConvertToPixels[0.45];
thirteen16thsIn: CARDINAL = ConvertToPixels[0.8125];
threeQuartersIn: CARDINAL = ConvertToPixels[.75];
breakPageMax: CARDINAL = ConvertToPixels[9.05];
usSignSize: CARDINAL = ConvertToPixels[17.0];
rxSignSize: CARDINAL = ConvertToPixels[16.5];
uniformSize: CARDINAL = ConvertToPixels[8.5];

h: IIPGenInternal.Handle ← LOOPHOLE[iipH];
reportWidthInPixels: CARDINAL ←
 h.propsDesc[h.mediaIndex].props.xPageEnd - h.propsDesc[
  h.mediaIndex].props.xPageStart + 1;
reportHeightInPixels: CARDINAL ←
 h.propsDesc[h.mediaIndex].props.yPageEnd - h.propsDesc[
  h.mediaIndex].props.yPageStart + 1;

SELECT reportWidthInPixels FROM
 = usSignSize => reportWidthInPixels ← usSignSize / 2;
 = rxSignSize => reportWidthInPixels ← rxSignSize / 2;
 > breakPageMax => reportWidthInPixels ← uniformSize;
 ENDCASE;

MaskRectangle[
 iipH: iipH, p1: [x: threeQuartersIn, y: reportHeightInPixels - oneInch],
 p2: [
 x: reportWidthInPixels - threeQuartersIn,
 y: reportHeightInPixels - oneInch - lineThicknessInPixels]];
MaskRectangle[
 iipH: iipH, p1: [x: threeQuartersIn, y: threeQuartersIn],
 p2: [
 x: reportWidthInPixels - threeQuartersIn,
 y: threeQuartersIn + lineThicknessInPixels]];

IF logo # StandardReport.nullLogo THEN
 PutLogo[
  iipH: iipH, logo: logo,
  position: [
  x: reportWidthInPixels - threeQuartersIn - logo.xDimension,
  y: reportHeightInPixels - thirteen16thsIn]];

WITH type: formData SELECT FROM
 breakPage => {
  h: IIPGenInternal.Handle ← LOOPHOLE[iipH];
  priorityImportant: setPriorityImportant InternalIP.Token ← [
   var: setPriorityImportant[rec: [important: 1]]];

  SetFont[iipH: iipH, ptSize: eight];
```

Copyright © 1992 Xerox Corporation All Rights Reserved

```
SetXY[iipH: iipH, xy: [x: threeQuartersIn, y: pt45In]];
PutLString[iipH: iipH, string: type.version];

IIPGenInternal.PutToken[
 iipH: h, token: @priorityImportant,
 size: SIZE[setPriorityImportant InternalIP.Token]];
PutBrkPgGraphic[
 iipH: iipH,
 position: [
 x: threeQuartersIn, y: reportHeightInPixels - thirteen16thsIn]];
PutBrkPgGraphic[
 iipH: iipH,
 position: [
 x: reportWidthInPixels - threeQuartersIn - ConvertToPixels[1.625],
 y: oneInch]];
priorityImportant ← [var: setPriorityImportant[rec: [important: 0]]];
IIPGenInternal.PutToken[
 iipH: h, token: @priorityImportant,
 size: SIZE[setPriorityImportant InternalIP.Token]]};

errorPage, jobAcctPage, other => {
 SetFont[iipH: iipH, ptSize: fourteenBold];
 SetXY[
  iipH: iipH,
  xy: [
  x: threeQuartersIn,
  y: reportHeightInPixels - thirteen16thsIn + ConvertToPixels[0.25]]];
 PutLString[iipH: iipH, string: type.title1];
 SetXY[
  iipH: iipH,
  xy: [x: threeQuartersIn, y: reportHeightInPixels - thirteen16thsIn]];
 PutLString[iipH: iipH, string: type.title2];

 SetFont[iipH: iipH, ptSize: eight];
 SetXY[iipH: iipH, xy: [x: threeQuartersIn, y: pt45In]];
 PutDateAndTime[
  iipH: iipH, time: h.time, marketRegion: CSRDefaults.GetMarketRegion[]]};

 ENDCASE => ERROR;

IF pageNumber # 0 THEN {
 SetXY[iipH: iipH, xy: [x: reportWidthInPixels / 2, y: pt45In]];
 PutNumber[iipH: iipH, n: pageNumber]};

SetFont[iipH: iipH, ptSize: currentFont];
};

PutSubString: PUBLIC PROCEDURE [
 iipH: IIPGenTypes.Handle, ss: String.SubString ← NIL,
 underLine: IIPReportGen.UnderLine ← []] = {
```

Copyright © 1992 Xerox Corporation All Rights Reserved

```
h: IIPGenInternal.Handle ← LOOPHOLE[iipH];
IF iipH = NIL THEN ERROR IIPGen.Error[invalidIIPHandle];
IF underLine.h # 0 THEN {
 startUnderline: startUnderline InternalIP.Token ← [var: startUnderline[]];
 IIPGenInternal.PutToken[
  iipH: h, token: @startUnderline,
  size: SIZE[startUnderline InternalIP.Token]]};
Format.SubString[proc: ShowString, ss: ss, clientData: h];
IF underLine.h # 0 THEN {
 maskUnderline90: maskUnderline90 InternalIP.Token ← [
  var: maskUnderline90[
  rec: [
  dY: [
  direction: plusY, pad: 0, distance: [if[frac: 0, int: underLine.dY]]],
  dHx: [if[frac: 0, int: underLine.h]]]]]];
 IIPGenInternal.PutToken[
  iipH: h, token: @maskUnderline90,
  size: SIZE[maskUnderline90 InternalIP.Token]]}};

SetFont: PUBLIC PROCEDURE [
 iipH: IIPGenTypes.Handle, ptSize: SystemFont.PtSize ← twelve] = {
 h: IIPGenInternal.Handle ← LOOPHOLE[iipH];
 setFont: setFont InternalIP.Token ← [
  var: setFont[rec: [index: LOOPHOLE[ptSize]]]];
 IF iipH = NIL THEN ERROR IIPGen.Error[invalidIIPHandle];
 IIPGenInternal.PutToken[
  iipH: h, token: @setFont, size: SIZE[setFont InternalIP.Token]]};


SetXY: PUBLIC PROCEDURE [
 iipH: IIPGenTypes.Handle, xy: IIPReportGen.PixelPointInt] = {
 h: IIPGenInternal.Handle ← LOOPHOLE[iipH];
 setXYInt: setXYInt InternalIP.Token ← [
  var: setXYInt[rec: [xy: LOOPHOLE[xy]]]];
 IF iipH = NIL THEN ERROR IIPGen.Error[invalidIIPHandle];
 IIPGenInternal.PutToken[
  iipH: h, token: @setXYInt, size: SIZE[setXYInt InternalIP.Token]]};


ConvertToPixels: PROCEDURE [inches: REAL] RETURNS [pixels: CARDINAL] = INLINE {
 pixels ← Real.RoundC[inches * resolution]};


FormatDate: PROCEDURE [
 proc: Format.StringProc, pt: Time.Packed,
 dateFormat: Format.DateFormat ← full, clientData: LONG POINTER ← NIL,
 region: CSRDefaults.MarketRegion ← uso] = {
 temp: STRING ← [18];
 date: STRING ← [20];
```

Copyright © 1992 Xerox Corporation All Rights Reserved

```
unpacked: Time.Unpacked = Time.Unpack[pt];
DoDate: PROCEDURE [order: Order] = {
 subString: String.SubStringDescriptor ← [base: temp, offset: 0, length: 2];

 DoYear: PROC [] = {
  String.AppendChar[s: date, c: '/];
  subString.offset ← 7;
  String.AppendSubString[to: date, from: @subString];
  String.AppendChar[s: date, c: Ascii.SP]};

 SELECT order FROM
  dFirst = > {
   String.AppendSubString[to: date, from: @subString];
   IF date[0] = Ascii.SP THEN date[0] ← '0;
   String.AppendChar[s: date, c: '/];
   IF unpacked.month < 9 THEN String.AppendChar[s: date, c: '0];
   String.AppendDecimal[s: date, n: unpacked.month + 1];
   DoYear[]};
  mFirst = > {
   IF unpacked.month < 9 THEN String.AppendChar[s: date, c: '0];
   String.AppendDecimal[s: date, n: unpacked.month + 1];
   String.AppendChar[s: date, c: '/];
   String.AppendSubString[to: date, from: @subString];
   IF date[3] = Ascii.SP THEN date[3] ← '0;
   DoYear[]};
  ENDCASE = > {
   String.AppendDecimal[s: date, n: unpacked.year];
   String.AppendChar[s: date, c: '/];
   IF unpacked.month < 9 THEN String.AppendChar[s: date, c: '0];
   String.AppendDecimal[s: date, n: unpacked.month + 1];
   String.AppendChar[s: date, c: '/];
   String.AppendSubString[to: date, from: @subString];
   IF date[8] = Ascii.SP THEN date[8] ← '0;
   String.AppendChar[s: date, c: Ascii.SP]}};

 DoTime: PROC [period: Period] = {
  subString: String.SubStringDescriptor ← [base: temp, offset: 10, length: 6];
  AorP: STRING ← IF unpacked.hour < 12 THEN " AM"L ELSE " PM"L;
  hour: CARDINAL ←
   SELECT unpacked.hour FROM
    = 0 = > 12,
    IN [1..12] = > unpacked.hour,
    IN [13..23] = > unpacked.hour - 12,
    ENDCASE = > 0;
  SELECT period FROM
   half = > {
    IF hour < 10 THEN String.AppendChar[s: date, c: '0];
    String.AppendDecimal[s: date, n: hour];
    subString.offset ← 12;
    String.AppendSubString[to: date, from: @subString];
```

Copyright © 1992 Xerox Corporation All Rights Reserved

```
    String.AppendString[to: date, from: AorP]};
   ENDCASE => {
    subString.length ← 8;
    String.AppendSubString[to: date, from: @subString]}};

 Time.Append[s: temp, unpacked: unpacked];
 DoDate[
  order:
  SELECT region FROM
   uso, xci => mFirst,
   rx, rxUK => dFirst,
   ENDCASE => yFirst];
 SELECT dateFormat FROM
  full =>
   DoTime[period: SELECT region FROM uso, rxUK => half, ENDCASE => full];
  dateOnly => date.length ← date.length - 1;
  ENDCASE => NULL;
 proc[date, clientData]};


FormatLNumber: PROCEDURE [
 proc: Format.StringProc, n: LONG UNSPECIFIED, format: Format.NumberFormat,
 clientData: LONG POINTER ← NIL] = {
 s: STRING ← [34];
 neg: BOOLEAN;
 l: CARDINAL;
 fill: STRING ← [8];
 fillChar: CHARACTER ← IF format.zerofill THEN '0 ELSE VAL[376B];

 THROUGH [0..8) DO String.AppendChar[s: fill, c: fillChar]; ENDLOOP;
 IF LOOPHOLE[n, LONG INTEGER] < 0 AND ~format.unsigned THEN {
  n ← -LOOPHOLE[n, LONG INTEGER]; neg ← TRUE}
 ELSE neg ← FALSE;
 String.AppendLongNumber[s, n, format.base];
 l ← s.length + (IF neg THEN 1 ELSE 0);
 IF l < format.columns THEN
  BEGIN
  fillChars: CARDINAL ← format.columns - l;
  IF neg AND format.zerofill THEN Format.Char[proc, '-, clientData];
  THROUGH [0..fillChars / 8) DO proc[fill, clientData]; ENDLOOP;
  IF (fill.length ← fillChars MOD 8) # 0 THEN proc[fill, clientData];
  IF neg AND ~format.zerofill THEN Format.Char[proc, '-, clientData];
  END
 ELSE IF neg THEN Format.Char[proc, '-, clientData];
 proc[s, clientData]};


PutBrkPgGraphic: PROCEDURE [
 iipH: IIPGenTypes.Handle, position: IIPReportGen.PixelPointInt] = {
```

Copyright © 1992 Xerox Corporation All Rights Reserved

```
DoGraphicBox: PROCEDURE [position: IIPReportGen.PixelPointInt] = {
 borderThickness: INTEGER ← ConvertToPixels[0.05];
 MaskRectangle[
  iipH: iipH, p1: [x: position.x, y: position.y],
  p2: [
  x: position.x + ConvertToPixels[0.4],
  y: position.y + ConvertToPixels[0.5]]];
 MaskRectangle[
  iipH: iipH,
  p1: [x: position.x + borderThickness, y: position.y + borderThickness],
  p2: [
  x: position.x + borderThickness + ConvertToPixels[0.3],
  y: position.y + borderThickness + ConvertToPixels[0.4]],
  gray: LAST[IIPReportGen.ColorRange] / 2]};

 DoGraphicBox[position: position];
 DoGraphicBox[
  position: [x: position.x + ConvertToPixels[0.625], y: position.y]];
 DoGraphicBox[
  position: [x: position.x + ConvertToPixels[1.25], y: position.y]]};


ShowString: Format.StringProc = {
 IF s = NIL THEN RETURN
 ELSE {
  stringWords: CARDINAL ←
   (s.length + (Environment.bytesPerWord - 1)) / Environment.bytesPerWord;
  show: show InternalIP.Token ← [
   var: show[
   rec: [
   offsetToNextToken: SIZE[CARDINAL] + stringWords, stringLength: s.length,
   string: TRASH]]];
  IIPGenInternal.PutToken[
   iipH: clientData, token: @show, size: SIZE[show InternalIP.Token]];
  IIPGenInternal.PutToken[
   iipH: clientData, token: @s.text, size: stringWords]}};

END.
```

Copyright © 1992 Xerox Corporation All Rights Reserved

What is claimed is:

1. A decomposing apparatus for use in a printing system of a type having a font storage section and being adapted to receive a first set of information and a second set of information, each of the first and second sets of information being written in a printer page description language, comprising:

an apparatus for parsing each of the first set of information and the second set of information into a first set of image related components and a second set of image related components, respectively, said parsing apparatus designating each of the image related components with an image identifier, at least one of the image identifiers comprising a font name for a corresponding font;

said parsing apparatus parsing the first set of information during a first time interval and the second set of information during a second time interval, the first time interval preceding the second time interval, and said decomposing apparatus generating a printable format based on the first set of information;

a coalescing apparatus for performing image related operations on one or more selected components of the first set of image related components or the second set of image related components; and prior to generating the printable format based on the first set of information and during the second time interval, said coalescing apparatus determining whether the corresponding font for the font name is available in the font storage area.

2. The decomposing apparatus of claim 1, wherein a font available in the font storage area is mapped with the font name when the corresponding font is not available in the font storage section.

3. The decomposing apparatus of claim 2, wherein the font name is mapped with the available font by reference to a font substitution table in which unavailable fonts are mapped against fonts available in the font storage section.

4. The decomposing apparatus of claim 1, wherein the corresponding font is loaded into the printing machine when it is determined, with said coalescing apparatus, that the corresponding font is unavailable in the font storage area.

5. The decomposing apparatus of claim 4, wherein, removable memory media is selectively coupled with the printing machine so that the font storage section communicates with said removable memory media, and the corresponding font is loaded into the printing machine by reference to the removable memory media.

6. A method of decomposing for use in a printing system of the type having an input device for programming a job with global information and page-level information, the printing system including a decomposing system and the decomposing system including a dual stage preparser, the dual stage preparser having both a first stage including a first processor and a second stage including a second processor, comprising the steps of:

programming the job at the input device with global information and page-level information;

communicating the job to the first stage of the dual stage preparser;

in the first stage of the dual stage preparser, splitting the job into the global information and the page-level information with the first processor;

storing the global information in a first memory section;

passing the page-level information to the second stage of the dual stage preparser;

in the second stage of the dual stage preparser, parsing the page-level information with the second processor to create image related components; and storing the image related components, created as a result of said page-level information parsing, in a second memory section.

7. The method of 6 wherein the step of programming comprises the step of using a job ticket.

8. The method of claim 7, wherein the using step comprises the step of designating billing and accounting information in the global information.

9. The method of 6, further comprising the step of storing selected image related components in the printing machine substantially prior to performing the programming step, wherein the programming step comprises designating, in the job, a call to one of the selected image related components so that a copy of the called for image appears on a substrate when the job is printed.

10. A decomposing apparatus for use in a printing machine of a type having a raster image storage section and being adapted to receive a first set of information and a second set of information, each of the first and second sets of information being written in a page description language, the first and second sets of information including a first set of image related components and a second set of image related components, respectively, comprising:

a parsing apparatus for parsing the first set of information into the first set of image related components;

a coalescing system for performing image related operations on a selected image related component of the second set of image related components, the selected image related component of the second set of information being a raster image;and said coalescing system including an image processing subsystem, said image processing subsystem performing an image processing operation on the raster image while said parsing apparatus is parsing the first set of information into the first set of image related components.

11. An apparatus for decomposing a job having a plurality of electronic pages, each of the electronic pages being written in a page description language, and said decomposing apparatus communicating with a memory section, comprising:

a preparsing apparatus, receiving the electronic pages of the job, for generating data structures representative of each electronic page of the job, said preparsing apparatus including, a first preparse system for dividing each electronic page of the job into a first set of information and a second set of information, each of the first sets of information including a data structure for an associated one of the electronic pages and each of the second sets of information including one or more executable data structures respectively relating to one or more image related components for an associated one of the electronic pages, each of the data structures of the first sets of information being stored in the memory section, and a second preparse system coupled with said first preparse system;

said first preparse system passing the second set of information for each of the electronic pages of job to said second preparse system; and said second preparse system executing the one or more executable data structures of each of the second sets of information for storage in the memory section.

12. The decomposer of claim 11, in which each of the first sets of information comprises global information and each of the second sets of information comprises page level information, wherein, said preparsing apparatus includes a processor, and said processor is adapted to perform said dividing.

13. The decomposer of claim 11, further comprising an apparatus, associated with said preparsing apparatus, for storing each of the image related components in the memory section.

14. The decomposer of claim 13, in which said storing apparatus is provided with image related identifiers for each of the image related components stored in the memory section, wherein, said decomposer includes a database, said database communicating with said storing apparatus, and said storing apparatus communicates the image related identifiers to said database.

15. The decomposer of claim 11, wherein said first preparse system processes a portion of one of the electronic pages while said second preparse system processes a second portion of the same one of the electronic pages.

16. A printing system for producing prints from a job having a plurality of electronic pages, each of the electronic pages being written in a page description language, comprising:

a memory section;

an input source for creating a job;

a decomposer, communicating with said input source, for receiving the job and interpreting the page description of the job so that the electronic pages can be placed into a printable format, said decomposer including, a preparsing apparatus, receiving the electronic pages of the job, for generating data structures representative of each electronic page of the job, said preparsing apparatus including, a first preparse system for dividing each electronic page of the job into a first set of information and a second set of information, each of the first sets of information including a data structure for an associated one of the electronic pages and each of the second sets of information including one or more executable data structures respectively relating to one or more image related components for an associated one of the electronic pages, each of the data structures of the first sets of information being stored in said memory section, and a second preparse system coupled with said first preparse system;

said first preparse system passing the second set of information for each of the electronic pages of job to said second preparse system, and said second preparse system executing the one or more executable data structures of each of the second sets of information for storage in said memory section.

17. The printing system of claim 16, further comprising an apparatus, associated with said preparsing apparatus, for storing each of the image related components in said memory section.

18. The decomposer of claim 17, in which said storing apparatus is provided with image related identifiers for each of the image related components stored in the memory section, wherein, said decomposer includes a database, said database communicating with said storing apparatus, and said storing apparatus communicates the image related identifiers to said database.

19. A method of managing a plurality of jobs in a printing system with a decomposer, the decomposer interpreting a first job and a second job, sequentially, to place each of the first and second jobs into a printable format, each of the first and second jobs being written in a page description language and including one or more electronic pages with each electronic page including one or more image related components, each job being communicated to the decomposer by way of a network connective arrangement, the decomposer communicating with a mass memory section and the network connective arrangement communicating with a page description language storage section, comprising:

inputting each electronic page of the first job to the decomposer;

preparsing each electronic page of the first job so that the one or more image related components of each electronic page is made available for storage in the mass memory section;

determining if inputting the second job to the decomposer would interfere with said preparsing of the first job;

when it is determined, with said determining, that the inputting of the second job would interfere with said preparsing, storing the second job in the page description language storage section;

when it is determined, with said determining, that the inputting of the second job would not interfere with said preparsing, transmitting the job from the page description language storage section to the decomposer for preparsing thereby.

* * * * *